US011961252B1

(12) United States Patent
Ebrahimi Afrouzi et al.

(10) Patent No.: US 11,961,252 B1
(45) Date of Patent: Apr. 16, 2024

(54) METHOD AND APPARATUS FOR COMBINING DATA TO CONSTRUCT A FLOOR PLAN

(71) Applicants: Ali Ebrahimi Afrouzi, Henderson, NV (US); Chen Zhang, Redmond, WA (US); Sebastian Schweigert, San Carlos, CA (US); Lukas Robinson, York (CA)

(72) Inventors: Ali Ebrahimi Afrouzi, Henderson, NV (US); Chen Zhang, Redmond, WA (US); Sebastian Schweigert, San Carlos, CA (US); Lukas Robinson, York (CA)

(73) Assignee: AI Incorporated, Toronto (CA)

(*) Notice: Subject to any disclaimer, the term of this patent is extended or adjusted under 35 U.S.C. 154(b) by 60 days.

(21) Appl. No.: 18/166,958

(22) Filed: Feb. 9, 2023

Related U.S. Application Data

(63) Continuation of application No. 17/876,634, filed on Jul. 29, 2022, now Pat. No. 11,657,531, which is a (Continued)

(51) Int. Cl.
*G06T 7/593* (2017.01)
*G01S 7/48* (2006.01)

(Continued)

(52) U.S. Cl.
CPC ............ *G06T 7/593* (2017.01); *G01S 7/4804* (2013.01); *G01S 17/48* (2013.01); *G01S 17/86* (2020.01);

(Continued)

(58) Field of Classification Search
CPC ......... G06T 7/593; G06T 7/0002; G06T 7/13; G06T 7/33; G06T 7/136; G06T 7/30; G06T 7/344; G06T 7/73; G06T 7/74; G06T 7/246; G06T 7/579; G06T 2207/10028; G06T 2207/30244; G06T 2207/20084; G01S 7/4804; G01S 17/48; G01S 17/86; G01S 17/89; G05D 1/0253; G05D 1/0246; G05D 1/0088; G05D 1/0251; G05D 1/0272; G05D 1/0227; G05D 1/0242; G05D 1/0214; G05D 1/0219; G05D 1/0221; G05D 1/0225;

(Continued)

(56) References Cited

U.S. PATENT DOCUMENTS 6,690,134 B1 * 2/2004 Jones .................... G05D 1/028 318/587
6,728,635 B2 * 4/2004 Hamada ............ G01C 21/3644 701/438

(Continued)

*Primary Examiner* — Michael S Osinski

(57) ABSTRACT

A robot configured to perceive a model of an environment, including: a chassis; a set of wheels; a plurality of sensors; a processor; and memory storing instructions that when executed by the processor effectuates operations including: capturing a plurality of data while the robot moves within the environment; perceiving the model of the environment based on at least a portion of the plurality of data, the model being a top view of the environment; storing the model of the environment in a memory accessible to the processor; and transmitting the model of the environment and a status of the robot to an application of a smartphone previously paired with the robot.

50 Claims, 504 Drawing Sheets

Related U.S. Application Data continuation of application No. 17/582,512, filed on Jan. 24, 2022, now Pat. No. 11,481,918, which is a continuation of application No. 16/920,328, filed on Jul. 2, 2020, now Pat. No. 11,348,269, which is a continuation-in-part of application No. 16/594,923, filed on Oct. 7, 2019, now Pat. No. 10,740,920, which is a continuation of application No. 16/048,179, filed on Jul. 27, 2018, now Pat. No. 10,482,619.

(60) Provisional application No. 63/037,465, filed on Jun. 10, 2020, provisional application No. 62/986,946, filed on Mar. 9, 2020, provisional application No. 62/952,384, filed on Dec. 22, 2019, provisional application No. 62/952,376, filed on Dec. 22, 2019, provisional application No. 62/942,237, filed on Dec. 2, 2019, provisional application No. 62/933,882, filed on Nov. 11, 2019, provisional application No. 62/914,190, filed on Oct. 11, 2019, provisional application No. 62/618,964, filed on Jan. 18, 2018, provisional application No. 62/591,219, filed on Nov. 28, 2017, provisional application No. 62/537,858, filed on Jul. 27, 2017.

(51) Int. Cl.

| | |
|---|---|
| ***G01S 17/48*** | (2006.01) |
| ***G01S 17/86*** | (2020.01) |
| ***G01S 17/89*** | (2020.01) |
| ***G05D 1/00*** | (2006.01) |
| ***G05D 1/02*** | (2020.01) |
| ***G06N 5/047*** | (2023.01) |
| ***G06T 7/00*** | (2017.01) |
| ***G06T 7/13*** | (2017.01) |
| ***G06T 7/136*** | (2017.01) |
| ***G06T 7/30*** | (2017.01) |
| ***G06T 7/33*** | (2017.01) |
| ***G06V 10/10*** | (2022.01) |
| ***G06V 10/75*** | (2022.01) |
| ***G06V 20/10*** | (2022.01) |
| ***G06V 20/64*** | (2022.01) |

(52) U.S. Cl.

CPC ............ *G01S 17/89* (2013.01); *G05D 1/0253* (2013.01); *G05D 1/0274* (2013.01); *G06N 5/047* (2013.01); *G06T 7/0002* (2013.01); *G06T 7/13* (2017.01); *G06T 7/136* (2017.01); *G06T 7/30* (2017.01); *G06T 7/344* (2017.01); *G06V 10/10* (2022.01); *G06V 10/16* (2022.01); *G06V 10/751* (2022.01); *G06V 20/10* (2022.01); *G06V 20/64* (2022.01); *G05D 2201/0203* (2013.01); *G06T 2207/10028* (2013.01)

(58) Field of Classification Search

CPC .. G05D 1/0231; G05D 1/0234; G05D 1/0238; G05D 1/027; G05D 1/0274; G05D 2201/0203; G05D 2201/0215; G06N 5/047; G06V 10/10; G06V 10/751; G06V 20/10; G06V 20/64; G06V 20/56; G06V 20/58; G06V 10/16; A47L 2201/04; A47L 9/2852; A47L 9/2826; A47L 9/2821; A47L 9/2831; A47L 9/009; A47L 9/28; A47L 9/2805; A47L 9/2894; A47L 9/30

See application file for complete search history.

(56) References Cited

U.S. PATENT DOCUMENTS

| | | | | |
|---|---|---|---|---|
| 7,388,343 | B2 * | 6/2008 | Jones | G05D 1/0272 701/1 |
| 8,467,628 | B2 * | 6/2013 | Coffman | G06T 7/593 348/42 |
| 8,558,832 | B1 * | 10/2013 | Cook | H04N 13/161 348/42 |
| 9,373,190 | B2 * | 6/2016 | Wei | G06T 17/05 |
| 10,186,080 | B2 * | 1/2019 | Skrobanski | G01S 7/4817 |
| 10,217,234 | B2 * | 2/2019 | Lee | G06T 7/13 |
| 10,872,228 | B1 * | 12/2020 | Zhou | G06V 20/64 |
| 11,200,429 | B1 * | 12/2021 | Evans | G01S 17/58 |
| 11,275,673 | B1 * | 3/2022 | Dolan | G06F 11/3664 |
| 2003/0007682 | A1 * | 1/2003 | Koshizen | G06V 40/20 382/206 |
| 2003/0025472 | A1 * | 2/2003 | Jones | G05D 1/0272 318/568.12 |
| 2003/0160788 | A1 * | 8/2003 | Buehler | G06T 15/405 345/422 |
| 2004/0167670 | A1 * | 8/2004 | Goncalves | G01C 21/12 700/259 |
| 2005/0234679 | A1 * | 10/2005 | Karlsson | G05D 1/0248 702/181 |
| 2008/0140255 | A1 * | 6/2008 | Ziegler | A47L 11/02 15/4 |
| 2010/0324769 | A1 * | 12/2010 | Takaoka | G06V 20/10 701/25 |
| 2011/0123135 | A1 * | 5/2011 | Hsieh | G06T 7/73 382/285 |
| 2012/0155744 | A1 * | 6/2012 | Kennedy | A63F 13/45 382/154 |
| 2013/0278755 | A1 * | 10/2013 | Starns | G06T 7/68 382/106 |
| 2014/0100693 | A1 * | 4/2014 | Fong | B25J 11/0085 700/253 |
| 2014/0207282 | A1 * | 7/2014 | Angle | B25J 13/006 901/1 |
| 2014/0293016 | A1 * | 10/2014 | Benhimane | G06T 7/246 348/50 |
| 2014/0324271 | A1 * | 10/2014 | Oh | G05D 1/0246 701/28 |
| 2015/0109409 | A1 * | 4/2015 | Isogai | H04N 13/128 348/43 |
| 2015/0304545 | A1 * | 10/2015 | Zhou | H04N 23/959 348/47 |
| 2016/0000289 | A1 * | 1/2016 | Senoo | A47L 9/2852 15/319 |
| 2016/0012633 | A1 * | 1/2016 | Wei | G06T 7/593 345/420 |
| 2016/0070265 | A1 * | 3/2016 | Liu | B64C 39/024 701/25 |
| 2017/0010623 | A1 * | 1/2017 | Tang | G06V 20/13 |
| 2017/0045895 | A1 * | 2/2017 | Wang | G06T 7/246 |
| 2017/0046868 | A1 * | 2/2017 | Chernov | G06T 7/246 |
| 2017/0214899 | A1 * | 7/2017 | Meier | G06T 7/73 |
| 2017/0301111 | A1 * | 10/2017 | Zhao | H04N 17/002 |
| 2018/0068202 | A1 * | 3/2018 | Sala | G06F 18/22 |
| 2018/0074500 | A1 * | 3/2018 | Nonaka | B25J 9/1697 |
| 2018/0100927 | A1 * | 4/2018 | Zweigle | G06T 7/73 |
| 2018/0124371 | A1 * | 5/2018 | Kamal | H04N 13/282 |
| 2018/0186321 | A1 * | 7/2018 | Naghizadeh | B60R 21/01534 |
| 2018/0253108 | A1 * | 9/2018 | Heinla | G05D 1/0274 |
| 2018/0357775 | A1 * | 12/2018 | Wang | G06V 10/757 |
| 2019/0012818 | A1 * | 1/2019 | Fine | H04N 5/2624 |
| 2019/0017838 | A1 * | 1/2019 | Ryde | G01C 21/3638 |
| 2019/0026920 | A1 * | 1/2019 | Yi | G06V 20/582 |
| 2019/0035100 | A1 * | 1/2019 | Ebrahimi Afrouzi | G01S 17/86 |
| 2020/0050213 | A1 * | 2/2020 | Lim | B25J 19/023 |
| 2020/0057449 | A1 * | 2/2020 | Watanabe | G05D 1/0088 |
| 2020/0064838 | A1 * | 2/2020 | Izawa | A47L 9/2826 |
| 2020/0121147 | A1 * | 4/2020 | Izawa | A47L 11/4011 |
| 2020/0184651 | A1 * | 6/2020 | Mukasa | G06T 7/194 |
| 2020/0241140 | A1 * | 7/2020 | Kuijk | G01S 17/42 |
| 2020/0306983 | A1 * | 10/2020 | Noh | B25J 9/163 |

(56) References Cited

U.S. PATENT DOCUMENTS

| | | | | |
|---|---|---|---|---|
| 2020/0333790 | A1* | 10/2020 | Kobayashi | G06T 7/277 |
| 2020/0402256 | A1* | 12/2020 | Kobayashi | G05D 1/0251 |
| 2021/0132382 | A1* | 5/2021 | Yamaguchi | G02B 7/34 |
| 2021/0165109 | A1* | 6/2021 | Yang | G01S 19/49 |
| 2021/0174539 | A1* | 6/2021 | Duong | G06N 5/01 |
| 2021/0182596 | A1* | 6/2021 | Adams | G06V 20/588 |
| 2021/0191429 | A1* | 6/2021 | Kameyama | G08G 5/04 |
| 2021/0272304 | A1* | 9/2021 | Yang | G06V 10/454 |
| 2021/0292998 | A1* | 9/2021 | Kawamoto | E02F 9/261 |
| 2021/0375044 | A1* | 12/2021 | George | G06T 15/04 |

* cited by examiner

FIG. 24F
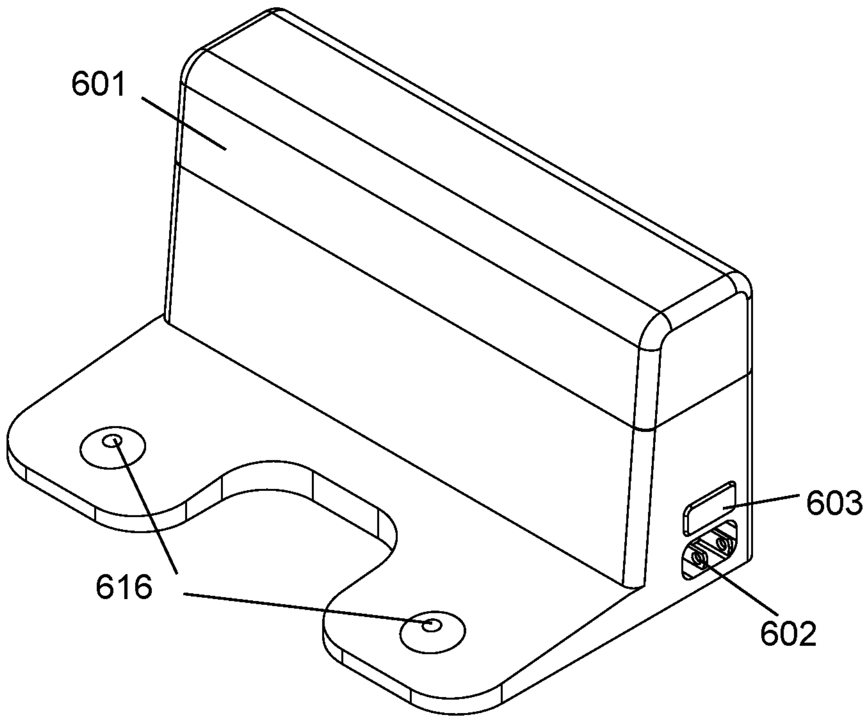
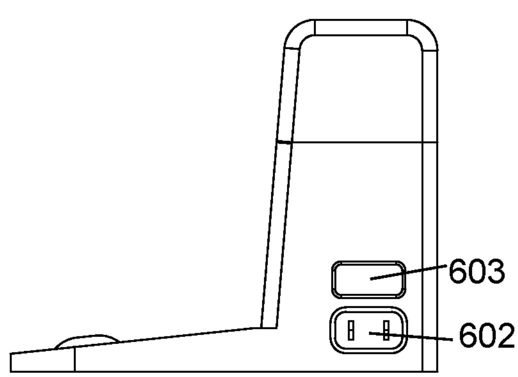

FIG. 29

| | Time to boot (seconds) | Time to start work |
|---|---|---|
| Robot using real time navigational stack | 2.0 | 3.0 |
| Robot 1 using traditional technologies | 7.7 | 15.9 |
| Robot 2 using traditional technologies | 26.5 | 32.75 |
| Robot 3 using traditional technologies | 17.7 | 18.5 |
| Robot 4 using traditional technologies | 14 | 23.8 |
| Robot 5 using traditional technologies | 12.5 | 19.9 |

Code compatibility with different operating systems

FIG. 34

Expedited Map Completion and Display

| Time and coverage required to generate a complete map in a complex environment | Real Time SLAM Navigational Stack | Traditional SLAM |
|---|---|---|
| Time to map entire area<br>(less is better) | 11.2 minutes | > 60 minutes |
| Area travelled in order to build complete map<br>(less is better) | 12% | >100% |

On average: area was mapped in 11.5 minutes with 12% coverage in this extremely complex/large space (Standard IEC room mapped in only 2.2 minutes.)

FIG. 43A
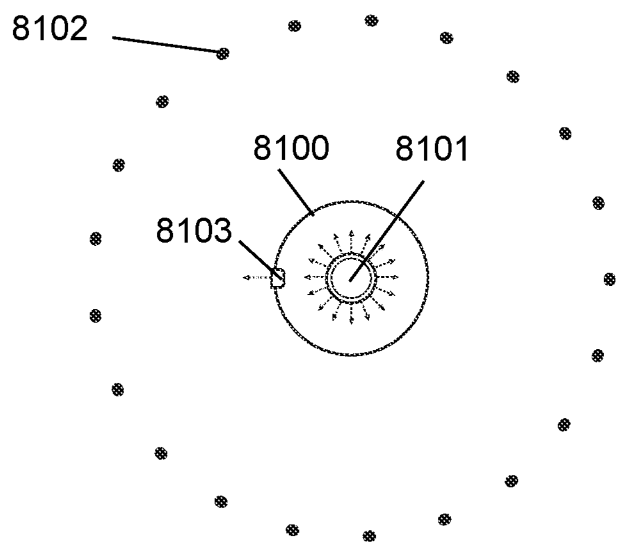
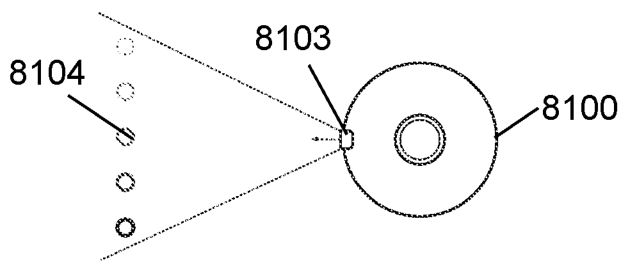
FIG. 43B
FIG. 43C
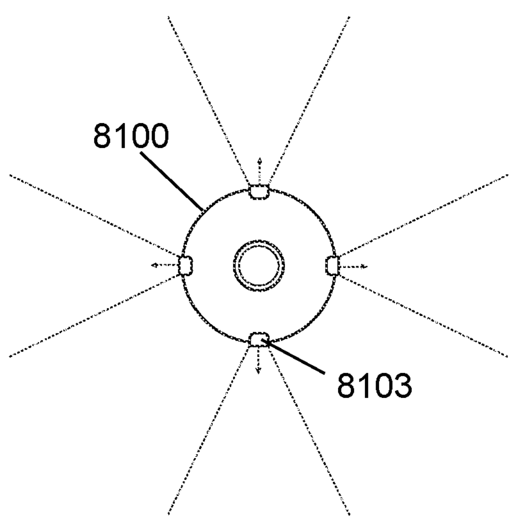

Object identification based on depth data

7501 {011003112123203323}

{021722345756} 7503

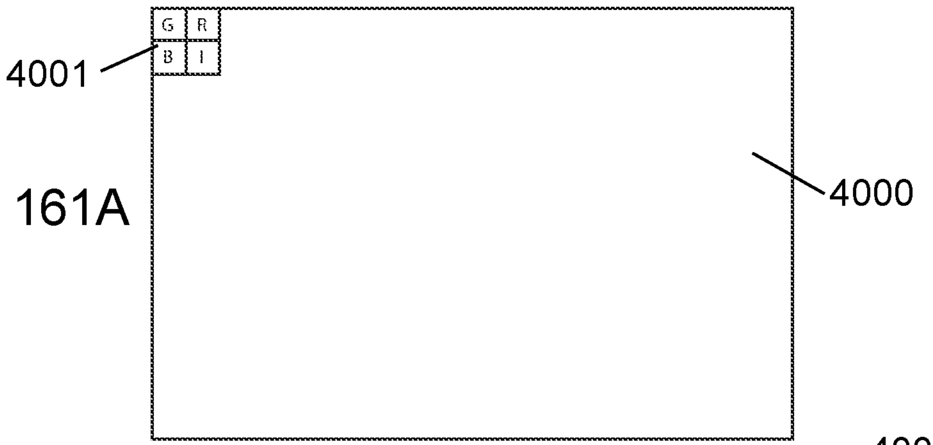
FIG. 161A
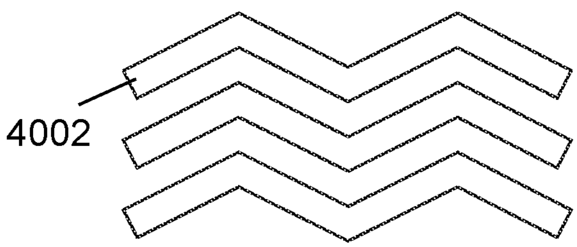
FIG. 161B
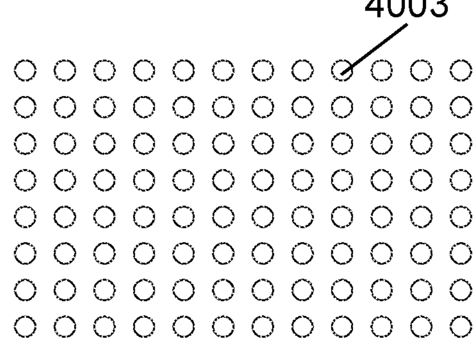
FIG. 161C
FIG. 161D
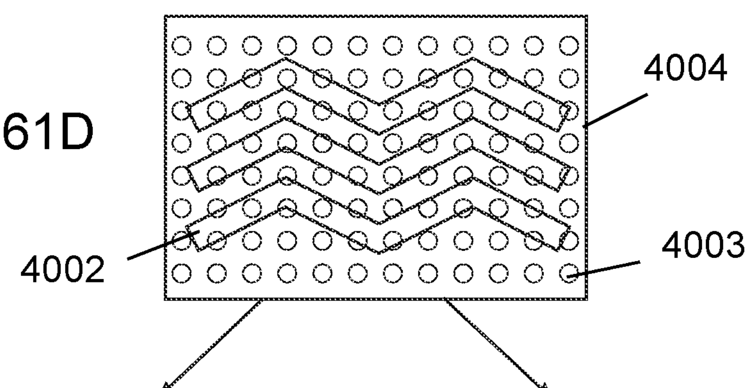
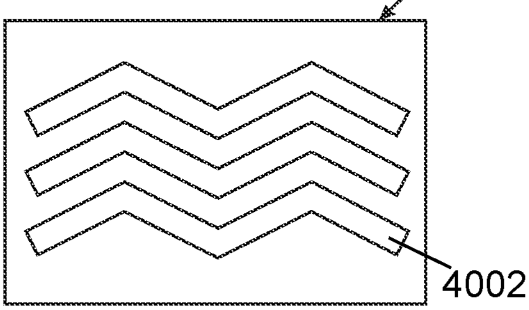
FIG. 161E
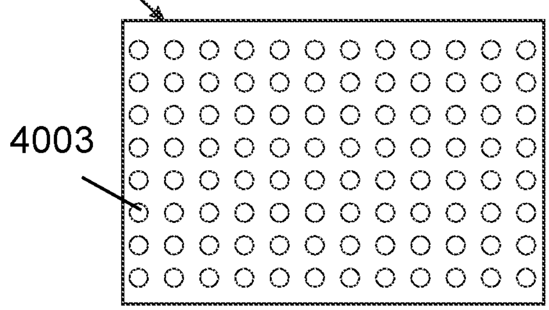
FIG. 161F Functionality A: Covering the area Functionality B: Point to point and multipoints navigation Functionality C: Patrolling Complex layout of the area Area mapped by robot in details
with less than 15% of coverage.
*note the chairs and table legs,
angled obstacles, hallways and doors First pass: Covering the majority of the area Not only does the robot avoid map-fences, but "wall-follows" their perimeter Phase 1, odom, IMU, OTS agree that the robot is rotating:

```
[2019-10-22 15:34:04.315] [TEST]: OTS: -0.0333247, 0.12000
[2019-10-22 15:34:04.316] [TEST]: Imu: 1.0573, 40.961
[2019-10-22 15:34:04.353] [TEST]: Odom: 0, 1.11224, 40.975
[2019-10-22 15:34:04.354] [TEST]: Imu: 1.05354, 40.982
[2019-10-22 15:34:04.361] [TEST]: OTS: -0.0326444, 0.12081
[2019-10-22 15:34:04.362] [TEST]: Imu: 1.02979, 41.003
[2019-10-22 15:34:04.389] [CONTROL]: Command headingRotati
[2019-10-22 15:34:04.391] [CONTROL]: RobotStopper::fullSto
[2019-10-22 15:34:04.403] [TEST]: Imu: 1.03989, 41.023
[2019-10-22 15:34:04.409] [TEST]: Odom: -0.0069969, 1.0422
[2019-10-22 15:34:04.410] [TEST]: Imu: 1.06817, 41.044
[2019-10-22 15:34:04.415] [TEST]: OTS: -0.0333249, 0.11666
[2019-10-22 15:34:04.416] [TEST]: Imu: 1.03715, 41.064
```

FIG. 184A

Phase 2: odom reports 0 out of the blue (no ramping down), OTS and IMU report movement -> EKF rejects odom:

```
[2019-10-22 15:34:04.453] [TEST]: Odom: 0, 0, 41.075
[2019-10-22 15:34:04.454] [TEST]: EKF rejects 0 data
[2019-10-22 15:34:04.455] [TEST]: Imu: 1.10676, 41.084
[2019-10-22 15:34:04.461] [TEST]: OTS: -0.0366573, 0.13000
[2019-10-22 15:34:04.462] [TEST]: Imu: 1.15991, 41.104
[2019-10-22 15:34:04.503] [TEST]: Imu: 1.05644, 41.124
[2019-10-22 15:34:04.510] [TEST]: Odom: 0, 0, 41.125
[2019-10-22 15:34:04.512] [TEST]: EKF rejects 0 data
[2019-10-22 15:34:04.512] [TEST]: Imu: 0.775479, 41.144
[2019-10-22 15:34:04.522] [TEST]: OTS: -0.0214223, 0.08714
[2019-10-22 15:34:04.524] [TEST]: Imu: 0.471425, 41.164
[2019-10-22 15:34:04.554] [TEST]: Odom: 0, 0, 41.175
[2019-10-22 15:34:04.555] [TEST]: EKF rejects 0 data
[2019-10-22 15:34:04.556] [TEST]: Imu: 0.177909, 41.191
[2019-10-22 15:34:04.567] [TEST]: OTS: -0.00313658, 0.0094
[2019-10-22 15:34:04.568] [TEST]: Imu: -0.0346797, 41.214
```

FIG. 184B

Phase 3: all three report low movement / 0.0:

```
[2019-10-22 15:34:04.603] [TEST]: Odom: 0, 0, 41.225
[2019-10-22 15:34:04.605] [TEST]: Imu: -0.0984258, 41.236
[2019-10-22 15:34:04.615] [TEST]: OTS: 0.00166619, -0.0066
[2019-10-22 15:34:04.616] [TEST]: Imu: -0.0860859, 41.258
[2019-10-22 15:34:04.653] [TEST]: Odom: 0, 0, 41.275
[2019-10-22 15:34:04.654] [TEST]: EKF rejects 0 data
[2019-10-22 15:34:04.656] [TEST]: Imu: -0.00990826, 41.278
[2019-10-22 15:34:04.665] [TEST]: OTS: -0, 0, 41.297
[2019-10-22 15:34:04.666] [TEST]: Imu: 0.0426586, 41.3
[2019-10-22 15:34:04.705] [TEST]: Imu: 0.0169708, 41.321
[2019-10-22 15:34:04.714] [TEST]: Odom: 0, 0, 41.325
[2019-10-22 15:34:04.717] [TEST]: Imu: -0.0123518, 41.342
```

| 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|
| 14 | | | | | | | | | | | | | | |
| 13 | | | | | | | | | | | | | | |
| 12 | | | | | | | | | | | | | | |
| 11 | | | | 5 | 5 | 5 | 5 | 5 | 5 | | | | | |
| 10 | | | | 5 | 5 | 5 | 5 | 8 | 5 | | | | | |
| 9 | | | | 5 | 5 | 5 | 5 | 8 | 5 | | | | | |
| 8 | | | | 5 | 5 | 5 | 5 | 5 | 5 | | | | | |
| 7 | | | | | | | | | | | | | | |
| 6 | | | | | | | | | | | | | | |
| 5 | | | | | | | | | | | | | | |
| 4 | | | | | | | | | | | | | | |
| 3 | | | | | | | | | | | | | | |
| 2 | | | | | | | | | | | | | | |
| 1 | | | | | | | | | | | | | | |

| 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|
| 14 | | | | | | | | | | | | | | |
| 13 | | | | | | | | | | | | | | |
| 12 | | | | | | | | | | | | | | |
| 11 | | | | 5 | 5 | 5 | 5 | 5 | 5 | | | | | |
| 10 | | | | 5 | 5 | 5 | 5 | 8 | 5 | | | | | |
| 9 | | | | 5 | 5 | 5 | 5 | 8 | 5 | | | | | |
| 8 | | | | 5 | 5 | 5 | 5 | 5 | 5 | | | | | |
| 7 | | | | | | | | | | | | | | |
| 6 | | | | | | | | | | | | | | |
| 5 | | | | | | | | | | | | | | |
| 4 | | | | | | | | | | | | | | |
| 3 | | | | | | | | | | | | | | |
| 2 | | | | | | | | | | | | | | |
| 1 | | | | | | | | | | | | | | |

T = traversability

Object (person) identification based on moving volume (different signature patterns for different objects, people, animals)

FIG. 223A
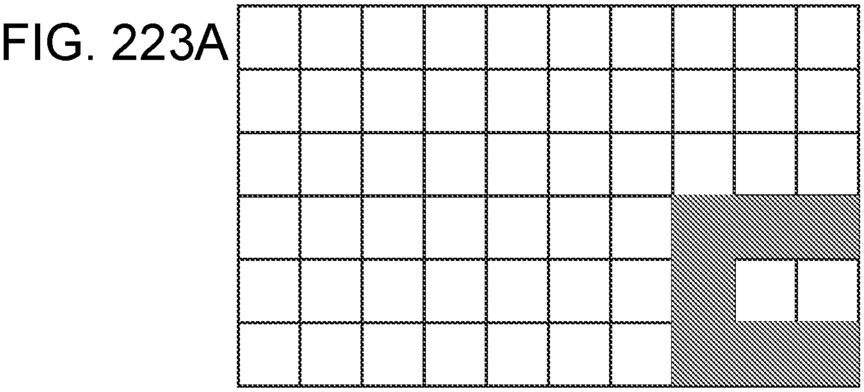
FIG. 223B
```
P2
10 6
255
0  0  0  0  0  0  0  0  0  0
0  0  0  0  0  0  0  0  0  0
0  0  0  0  0  0  0  0  0  0
0  0  0  0  0  0  0  99  99 99
0  0  0  0  0  0  0  99  0  0
0  0  0  0  0  0  0  99 99 99

# XYZ
```
FIG. 223C
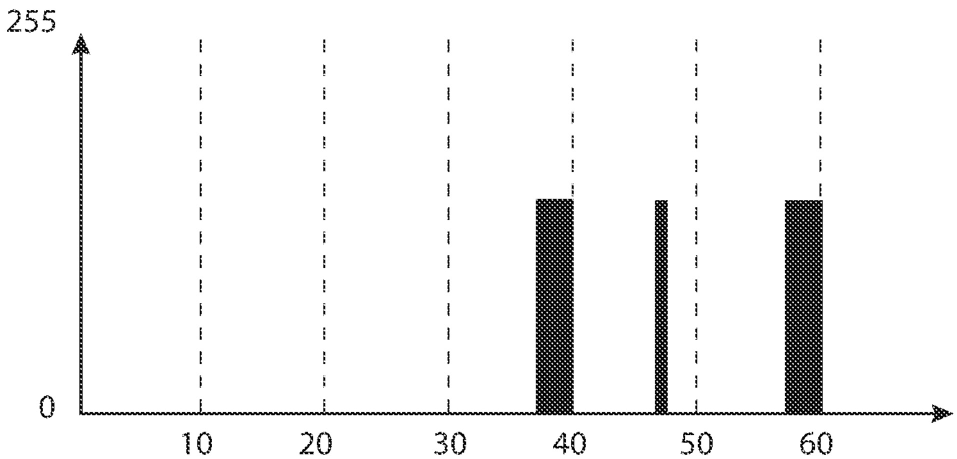

Config 1.
Camera 1 and 2 parallel to the ground
Structured light aligned to camera 1 & parallel to the ground Camera 1

Camera 2

Config 2.
Camera 1 and 2 parallel to the ground
Structured light above camera 1 & tilted downward Config 3.
Camera 1 and 2 parallel to the ground
Structured light in the middle & parallel to the ground Config 4.
Camera 1 and 2 parallel to the ground
Structured light in the middle & tilted downward Config 5.
Camera 1 and 2 parallel to the ground
Structured light the right side of camera 1 & parallel to the ground Config 6.
Camera 1 and 2 parallel to the ground
Structured light the right side of camera 1 & tilted downward Config 7.
Camera 1 and 2 looking downward
Structured light is bellow camera one and parallel to the ground FIG. 225H
Config 8.
Camera 1 and 2 looking downward
Structured light is aligned to camera one and tilted downward
Camera 1
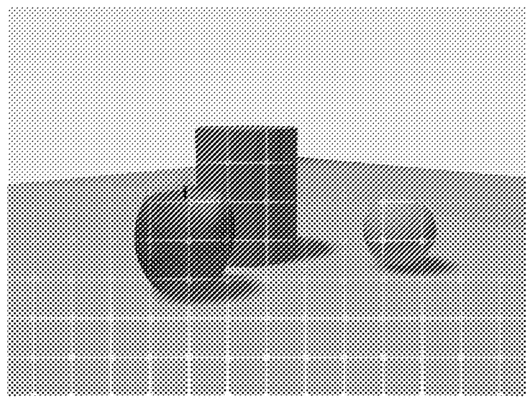
Camera 2
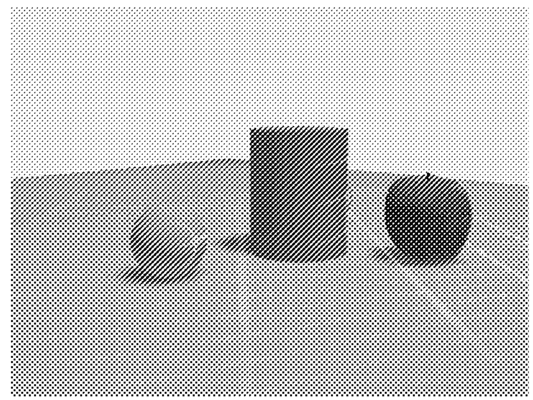
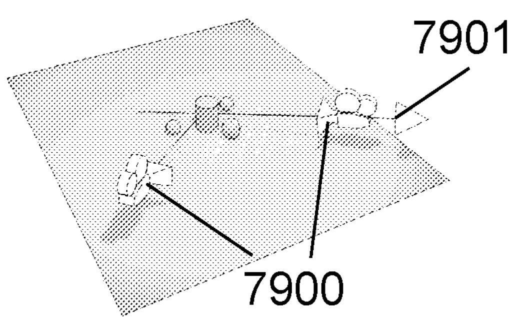
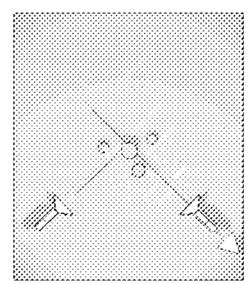

(In all 3d and top views camera 1 is on the right and camera 2 in on the left)

```
P2
10 6
255
0  0  0  0  0  0  0  0  0  0
0  0  0  0  0  0  0  0  0  0
0  0  0  0  0  0  0  0  0  0
0  0  0  0  0  0  0  99 99 99
0  0  0  0  0  0  0  99 0  0
0  0  0  0  0  0  0  99 99 99

# XYZ
```

```
P2
10 6
1
0  0  0  0  0  0  0  0  0  0
0  0  0  0  0  0  0  0  0  0
0  0  0  0  0  0  0  0  0  0
0  0  0  0  0  0  0  1  1  1
0  0  0  0  0  0  0  1  0  0
0  0  0  0  0  0  0  1  1  1

# XYZ
```

FIG. 240

Test Condition 1: ambient daylight, facing away from the window.

| | TSOP Sensor | Generic IR Sensor |
|---|---|---|
| No obstruction within 45cm | 3.28v | 3.255v |
| Detection of black plastic surface | 16cm(0.24v) | At 16cm 3.253v |
| Detection of cardboard box at 45cm | 0.24v | 3.251v |
| Detection of cardboard box at 5cm | 0.24v | 3.03v |
| Detection of cardboard box at 10cm | 0.24v | 3.214v |

Test Condition 2: ambient daylight, facing towards the window.

| | TSOP Sensor | Generic IR Sensor |
|---|---|---|
| No obstruction within 45cm | 3.20v | 3.225v |
| Detection of black plastic surface | 10cm(0.24v) | At 10cm 3.245v |
| Detection of cardboard box at 45cm | 0.24v | 3.254v |
| Detection of cardboard box at 5cm | 0.24v | 3.099v |
| Detection of cardboard box at 10cm | 0.24v | 3.221v |

Test Condition 3: ambient daylight, facing towards the window plus infrared noise.

| | TSOP Sensor | Generic IR Sensor |
|---|---|---|
| No obstruction within 45cm | 3.2v | 2.73v |

FIG. 248
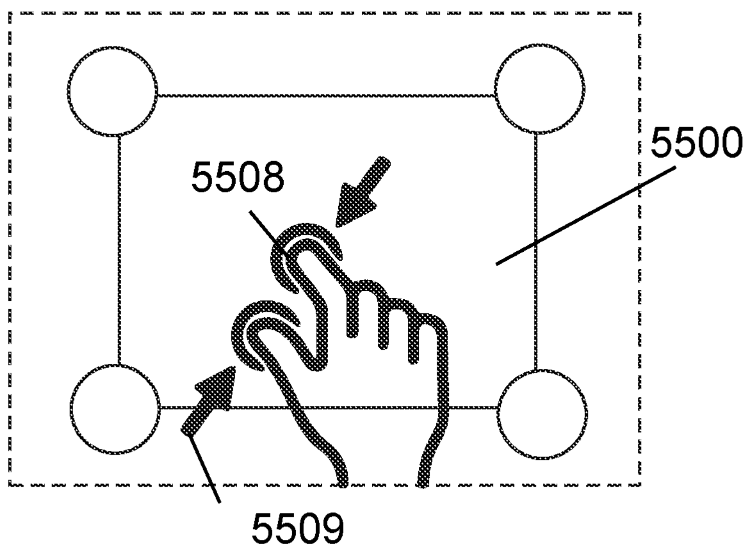
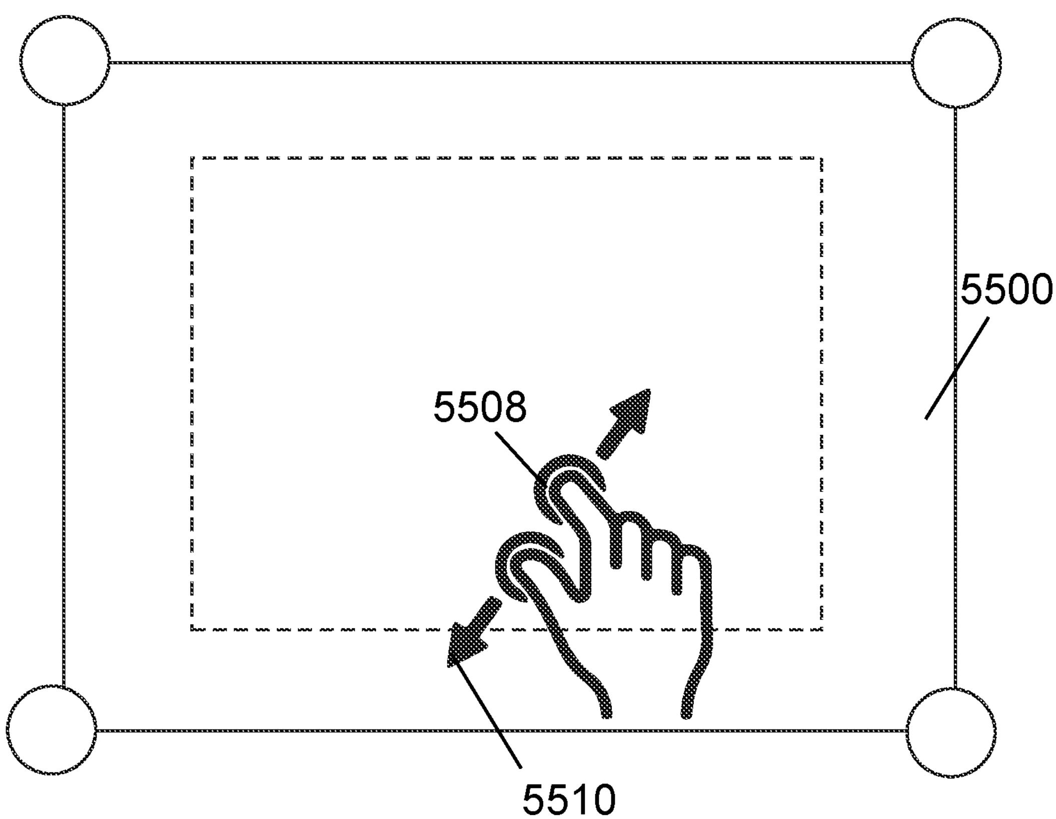

FIG. 256
Command issued on the remote GUI for the robot to take a path like this.
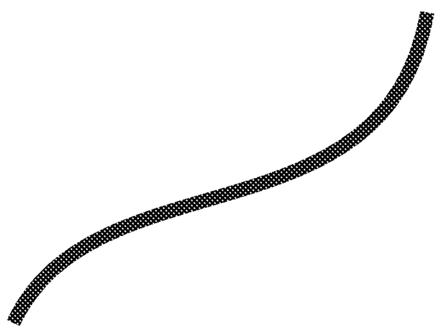
The real movement in the environment despite SLAM
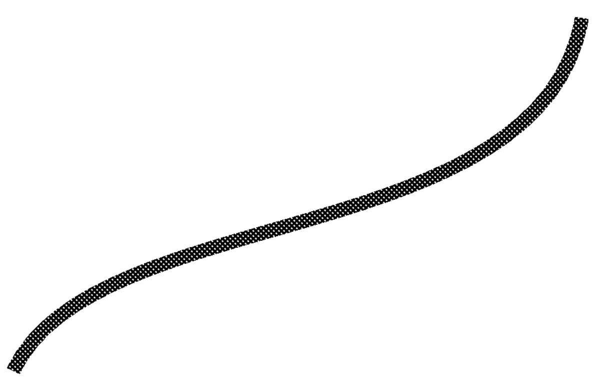
New location communicated to user, the user making incremental adjustments.

FIG. 258

```
17:00:57.513 send upgradeFirmware request
17:00:57:658 send upgradeFirmware request success
17:01:02.732 firmware upgrade progress 0 0.0
17:01:04.457 firmware upgrade progress 0 19.0
17:01:05.750 firmware upgrade progress 0 30.0
17:01:07.573 firmware upgrade progress 0 49.0
17:01:08.682 firmware upgrade progress 0 60.0
17:01:10.697 firmware upgrade progress 0 79.0
17:01:12.085 firmware upgrade progress 0 90.0
17:01:12.098 firmware upgrade progress 0 98.0
17:02:20.190 deviceInfoUpdate Connected true
```

FIG. 259A
Ready to Clean
Upstairs - robot
Software update available
Software version 0.0.33 is now available for your robot
Update now
Remind me later
Sweep
Charge
Schedule
Ready to Clean
Upstairs - robot
Sweep
Charge
Schedule
Bot Settings
Cleaning Preferences
Software Update
1

FIG. 260C
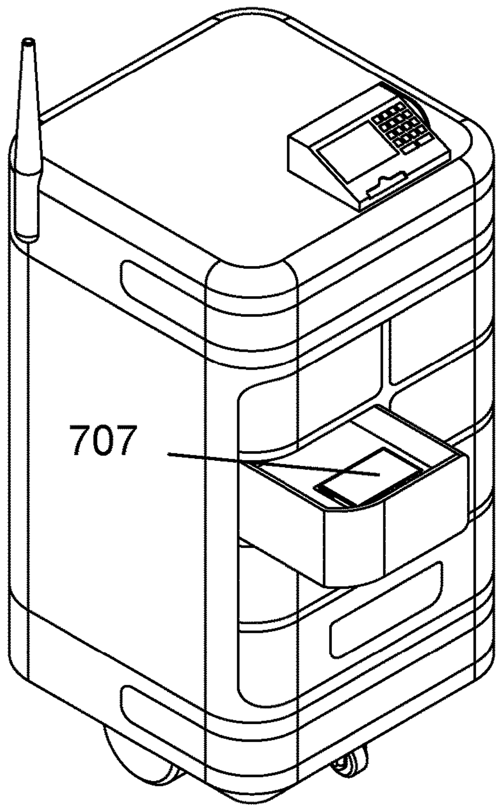
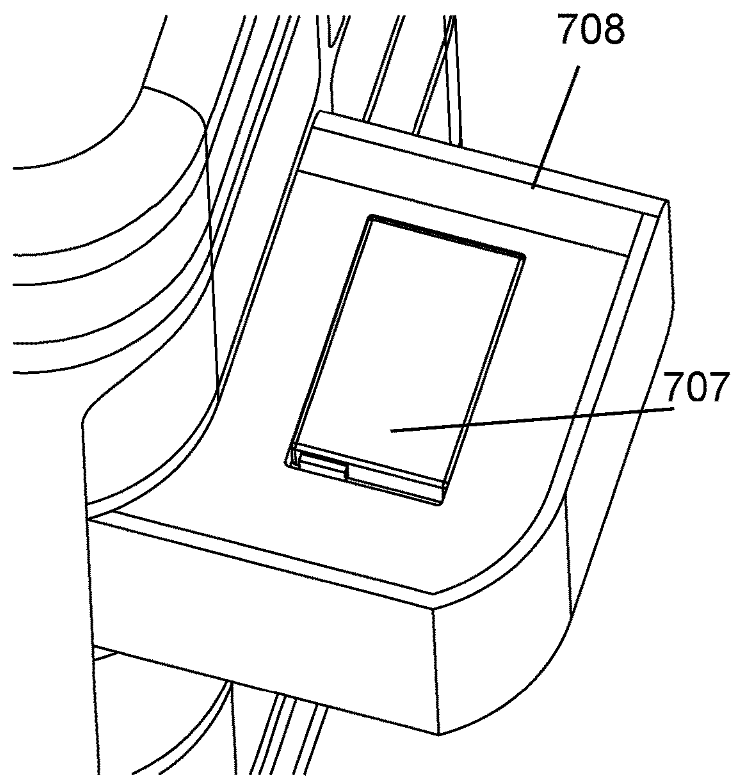

FIG. 261

```
enum ErrorState
{
        Occurred = 0,
        Cleared = 1,
};
enum ErrorCode : uint8_t
{
        //A code of the recoverable error is increased
        RecoverableErrorCode,

        //A code of the nonrecoverable error is decreased
        NonrecoverableErrorCode = 0xff,
};
Struct timeStamp
{
        ErrorCode code;
        uint32_t year:6;// 0 ~ 63(2018 ~ 2081)
        unit32_t month:4;     // 1 ~ 12
        uint32_t day:5; // 1 ~ 31
        uint32_t hour:5;       // 0 ~ 23
        uint32_t minute:6;    // 0 ~ 59
        uint32_t second:6;    // 0 ~ 59
} __attribute__((packed));

uint8_t errorTable[32]; // 256bit
```

FIG. 262

Tested method

1. Press GO
2. Hold the main brush
3. Check console Main Brush Jammed: Occurred
4. Check IND2 LED on in the UI panel.
5. Hold the left or right side brush (keep holding the main brush)
6. Check console Left Brush JammedL Occurred or Right Brush Jammed: Occurred
7. Check IND2 LED still on in the UI panel.
8. Release the main brush
9. Check console Main Brush Jammed: Cleared
10. Check IND2 LED still on the UI panel.
11. Release the side brush.
12. Check console Left Brush Jammed: Cleared or Right Brush Jammed: Cleared
13. Check IND2 LED off in the UI panel.

FIG. 267A
11000
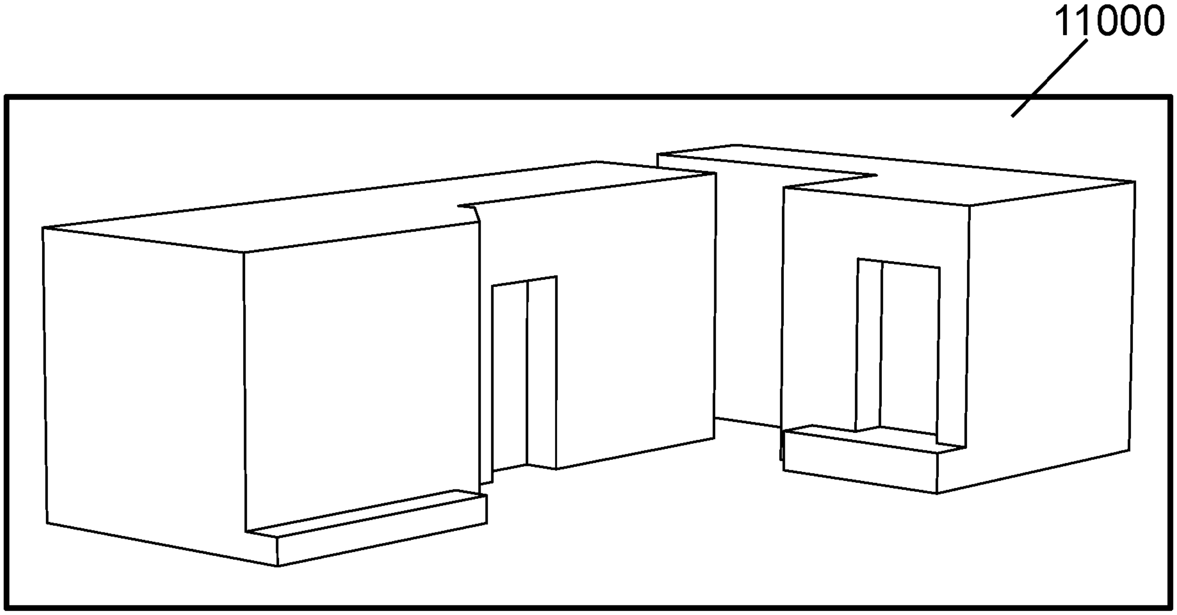
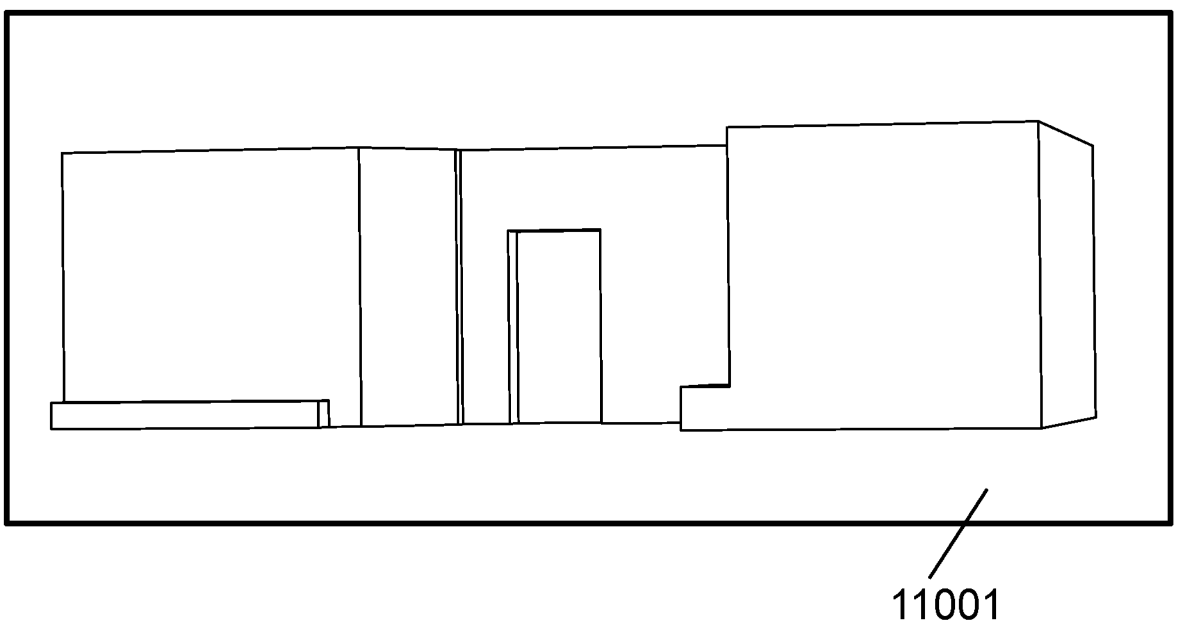
11001

11112

METHOD AND APPARATUS FOR COMBINING DATA TO CONSTRUCT A FLOOR PLAN

CROSS-REFERENCE TO RELATED APPLICATIONS

This application is a Continuation of U.S. Non-Provisional patent application Ser. No. 17/876,634, filed Jul. 29, 2022, which is a Continuation of U.S. Non-Provisional patent application Ser. No. 17/582,512, filed Jan. 24, 2022, which is a Continuation of U.S. Non-Provisional patent application Ser. No. 16/920,328, filed Jul. 2, 2020, which is a Continuation in Part of U.S. Non-Provisional application Ser. No. 16/594,923, filed Oct. 7, 2019, which is a Continuation of U.S. Non-Provisional patent application Ser. No. 16/048,179, filed Jul. 27, 2018, which claims the benefit of Provisional Patent Application Nos. 62/537,858, filed Jul. 27, 2017; 62/618,964, filed Jan. 18, 2018; and 62/591,219, filed Nov. 28, 2017, each of which is hereby incorporated by reference. U.S. Non-Provisional patent application Ser. No. 16/920,328 claims the benefit of U.S. Provisional Patent Application Nos. 62/914,190, filed Oct. 11, 2019; 62/933,882, filed Nov. 11, 2019; 62/942,237, filed Dec. 2, 2019; 62/952,376, filed Dec. 22, 2019; 62/952,384, filed Dec. 22, 2019; 62/986,946, filed Mar. 9, 2020; and 63/037,465, filed Jun. 10, 2020, each of which is hereby incorporated herein by reference.

In this patent, certain U.S. patents, U.S. patent applications, or other materials (e.g., articles) have been incorporated by reference. Specifically, U.S. patent application Ser. Nos. 15/272,752, 15/949,708, 16/667,461, 16/277,991, 16/048,179, 16/048,185, 16/163,541, 16/851,614, 16/163,562, 16/597,945, 16/724,328, 16/163,508, 16/185,000, 16/109,617, 16/051,328, 15/449,660, 16/667,206, 16/041,286, 16/422,234,15/406,890, 16/796,719, 14/673,633, 15/676,888, 16/558,047, 15/449,531, 16/446,574, 16/219,647, 16/163,530, 16/297,508, 16/418,988, 15/614,284, 16/554,040, 15/955,480, 15/425,130, 15/955,344, 15/243,783, 15/954,335, 15/954,410, 16/832,221, 15/257,798, 16/525,137, 15/674,310, 15/224,442, 15/683,255, 16/880,644, 15/048,827, 14/817,952, 15/619,449, 16/198,393, 16/599,169, 15/981,643, 16/747,334, 15/986,670, 16/568,367, 15/444,966, 15/447,450, 15/447,623, 15/951,096, 16/270,489, 16/130,880, 14/948,620, 16/402,122, 16/127,038, 14/922,143, 15/878,228, 15/924,176, 16/024,263, 16/203,385, 15/647,472, 15/462,839, 16/239,410, 16/230,805, 16/411,771, 16/578,549, 16/129,757, 16/245,998, 16/127,038, 16/243,524, 16/244,833, 16/751,115, 16/353,019, 15/447,122, 16/393,921, 16/389,797, 16/509,099, 16/440,904, 15/673,176, 16/058,026, 14/970,791, 16/375,968, 15/432,722, 16/238,314, 14/941,385, 16/279,699, 16/041,470, 15/006,434, 15/410,624, 16/504,012, 16/389,797, 15/917,096, 15/706,523, 16/241,436, 15/377,674, 16/883,327, 16/427,317, 16/850,269, 16/179,855, 15/071,069, 16/186,499, 15/976,853, 15/442,992, 16/570,242, 16/832,180, 16/399,368, 14/997,801, 16/726,471, 15/924,174, 16/212,463, 16/212,468, 14/820,505, 16/221,425, and 15/986,670, are hereby incorporated herein by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF THE DISCLOSURE

The disclosure relates to autonomous robots.

BACKGROUND

Autonomous or semi-autonomous robotic devices are increasingly used within consumer homes and commercial establishments. Such robotic devices may include a drone, a robotic vacuum cleaner, a robotic lawn mower, a robotic mop, or other robotic devices. To operate autonomously or with minimal (or less than fully manual) input and/or external control within an environment, methods such as mapping, localization, object recognition, and path planning methods, among others, are required such that robotic devices may autonomously create a map of the environment, subsequently use the map for navigation, and devise intelligent path and task plans for efficient navigation and task completion.

SUMMARY

The following presents a simplified summary of some embodiments of the techniques described herein in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Some aspects provide a robot configured to perceive a model of an environment, including: a chassis; a set of wheels coupled to the chassis comprising at least a right wheel and a left wheel; a plurality of sensors coupled with the robot; a processor; and memory storing instructions that when executed by the processor effectuates operations including: capturing, with the plurality of sensors, a plurality of data while the robot moves within the environment, wherein: the plurality of data includes at least a first data and a second data captured by a first sensor of a first sensor type and a second sensor of a second sensor type, respectively; the first sensor type is an imaging sensor; the second senor type captures movement data; the first sensor is coupled with an active source of illumination positioned adjacent to the first sensor such that upon incidence of illumination light with an object in a path of the robot reflections of the illumination light fall within a field of view of the first sensor; perceiving, with the processor, the model of the environment based on at least a portion of the plurality of data, the model being a top view of the environment; storing, with the processor, the model of the environment in a memory accessible to the processor; and transmitting, with the processor, the model of the environment and a status of the robot to an application of a smartphone previously paired with the robot; wherein: the application is configured to: display the model of the environment in the current work session or a subsequent work session; historical information relating to a previous work session comprising at least areas within which debris was detected, areas cleaned, and a total cleaning time; a robot status; a total area cleaned after completion of a work session; a battery level; a current cleaning duration; an estimated total cleaning duration required to complete a work session; an image of an object and an object type of the object; maintenance information; and firmware information; and receive at least one user input designating a modification to a divider dividing at least a portion of the model of the environment; a deletion of a divider to merge at least two subareas within the model of the environment; an addition of a divider to divide an area within the model of the environment; a selection, an addition, or a modification of a label of a subarea within the model of the environment; an addition, a modification, or a deletion of a subarea within which the robot is not permitted to enter; scheduling information corresponding to different subareas; a number of coverage repetitions of a subarea or the environment by the robot during a work session; a vacuum power of the robot to use in a subarea or the environment; a vacuuming task to be performed within a subarea or the environment; a deletion or an addition of a robot paired with the application; an instruction to find the robot; an instruction to contact customer service; an instruction for the docking station of the robot to empty a bin of the robot into a bin of the docking station; an instruction to dock at the docking station; and an instruction to navigate to a particular location to perform work; the model of the environment is stored in the memory of the robot or on the cloud and is accessible in a subsequent work session for use in autonomously navigating the environment; and the robot displays at least one status of the robot using a combination of LEDs disposed on the robot.

Some aspects include a method of perceiving a model of an environment, including: capturing, with a plurality of sensors coupled to a robot, a plurality of data while the robot moves within the environment, wherein: the plurality of data is captured from different positions within the environment through which the robot moves; the plurality of sensors include at least a first sensor and a second sensor; the first sensor is coupled with an active source of illumination positioned adjacent to the first sensor such that upon incidence of illumination light with an object in a path of the robot, reflections of the illumination light fall within a field of view of the first sensor; and the first sensor is a camera and the second sensor captures movement data; perceiving, with a processor of the robot, a model of the environment based on at least a portion of the plurality of data, the model being a top view of the environment; actuating, with the processor of the robot, the robot to avoid or perform work around an object encountered by the robot on a driving surface during a work session by adjusting a path of the robot; capturing, with an image sensor of the robot, an image of the object encountered by the robot; determining, with the processor of the robot, a processor on the cloud, or an application of a smartphone previously paired with the robot, an object type of a detected object, wherein the object type comprises at least one of cords, garments, socks, shoes, feces, and earphones; storing, with the processor of the robot, the model of the environment in a memory accessible to the processor of the robot in a subsequent work session; and transmitting, with the processor of the robot, the model of the environment to the application of the smartphone; wherein: the application is configured to: display the model of the environment autonomously divided into subareas; historical information relating to a previous work session comprising at least areas within which debris was detected, areas cleaned, and a total cleaning time; a robot status; a total area cleaned after completion of a work session; a battery level; a current cleaning duration; an estimated total cleaning duration required to complete a work session; an image of an object and an object type of the object; maintenance information; and firmware information; and receive at least one user input designating a modification to a divider dividing at least a portion of the model of the environment; a deletion of a divider to merge at least two subareas within the model of the environment; an addition of a divider to divide an area within the model of the environment; a selection, an addition, or a modification of a label of a subarea within the model of the environment; an addition, a modification, or a deletion of a subarea within which the robot is not permitted to enter; scheduling information corresponding to different subareas; a number of coverage repetitions of a subarea or the environment by the robot during a work session; a vacuum power of the robot to use in a subarea or the environment; a vacuuming task to be performed within a subarea or the environment; a deletion or an addition of a robot paired with the application; an instruction to find the robot; an instruction to contact customer service; an instruction for the docking station of the robot to empty a bin of the robot into a bin of the docking station; an instruction to dock at the docking station; and an instruction to navigate to a particular location to perform work; an intensity of cleaning; and a preference associated with content of a captured image; and the robot comprises a cleaning tool.

Some aspects provide a memory storing instructions that when executed by a processor of a robot effectuates operations including: obtaining, with the processor of the robot, a plurality of data captured with a plurality of sensors coupled to the robot while the robot moves within the environment, wherein: the plurality of data is captured from different positions within the environment through which the robot moves; the plurality of sensors include at least a first sensor and a second sensor; the first sensor is coupled with an active source of illumination positioned adjacent to the first sensor such that upon incidence of illumination light with an object in a path of the robot, reflections of the illumination light fall within a field of view of the first sensor; and the first sensor is a camera and the second sensor captures movement data; perceiving, with the processor of the robot, a model of the environment based on at least a portion of the plurality of data, the model being a top view of the environment; actuating, with the processor of the robot, the robot to avoid or perform work around an object encountered by the robot on a driving surface during a work session by adjusting a path of the robot; obtaining, with the processor of the robot, an image of the object encountered by the robot captured with an image sensor disposed on the robot, wherein: the processor of the robot, a processor on the cloud, or an application of a smartphone previously paired with the robot; and the object type comprises at least one of cords, garments, socks, shoes, feces, and earphones; storing, with the processor of the robot, the model of the environment in a memory accessible to the processor of the robot in a subsequent work session; and transmitting, with the processor of the robot, the model of the environment to the application of the smartphone; wherein: the application is configured to: display the model of the environment autonomously divided into subareas; historical information relating to a previous work session comprising at least areas within which debris was detected, areas cleaned, and a total cleaning time; a robot status; a total area cleaned after completion of a work session; a battery level; a current cleaning duration; an estimated total cleaning duration required to complete a work session; an image of an object and an object type of the object; maintenance information; and firmware information; and receive at least one user input designating a modification to a divider dividing at least a portion of the model of the environment; a deletion of a divider to merge at least two subareas within the model of the environment; an addition of a divider to divide an area within the model of the environment; a selection, an addition, or a modification of a label of a subarea within the model of the environment; an addition, a modification, or a deletion of a subarea within which the robot is not permitted to enter; scheduling information corresponding to different subareas; a number of coverage repetitions of a subarea or the environment by the robot during a work session; a vacuum power of the robot to use in a subarea or the environment; a vacuuming task to be performed within a subarea or the environment; a deletion or an addition of a robot paired with the application; an instruction to find the robot; an instruction to contact customer service; an instruction for the docking station of the robot to empty a bin of the robot into a bin of the docking station; an instruction to dock at the docking station; and an instruction to navigate to a particular location to perform work; an intensity of cleaning; and a preference associated with content of a captured image; and the robot comprises a cleaning tool.

BRIEF DESCRIPTION OF DRAWINGS

FIGS. 24A-24I illustrate an example of a robot and charging station, according to some embodiments.

FIG. 29 illustrates an example of a comparison of boot up times of different robots.

FIG. 34 illustrates an example of table comparing time to map an entire area and percentage of coverage to entire coverable area.

FIGS. 43A-43C illustrate an example of a robot with a LIDAR and camera, according to some embodiments.

FIGS. 136A-136E illustrate an example of evolution of a wave function in a position and momentum space with observed momentum, according to some embodiments.

FIGS. 137A-137E illustrate an example of evolution of a wave function in a position and momentum space with observed momentum, according to some embodiments.

FIGS. 138A and 138B illustrate an example of an initial wave function of a state of a robotic device, according to some embodiments.

FIGS. 139A and 139B illustrate an example of a wave function of a state of a robotic device after observations, according to some embodiments.

FIGS. 140A and 140B illustrate an example of an evolved wave function of a state of a robotic device, according to some embodiments.

FIGS. 141A, 141B, 142A-142H, and 143A-143F illustrate an example of a wave function of a state of a robotic device after observations, according to some embodiments.

FIGS. 144A, 144B, 145A, and 145B illustrate point clouds representing walls in the environment, according to some embodiments.

Figure 146:
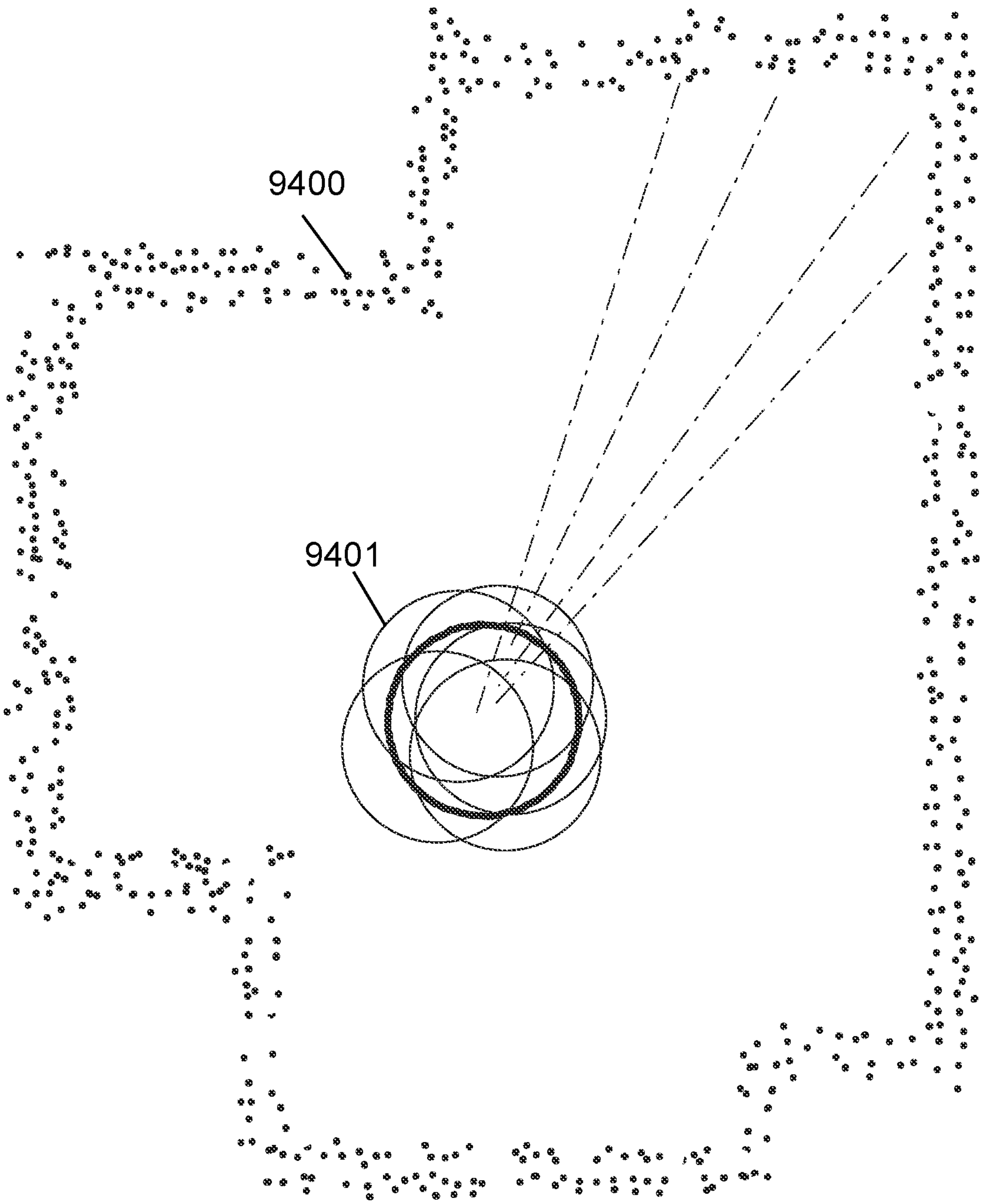

FIG. 146 illustrates seed localization, according to some embodiments.

Figure 147A:
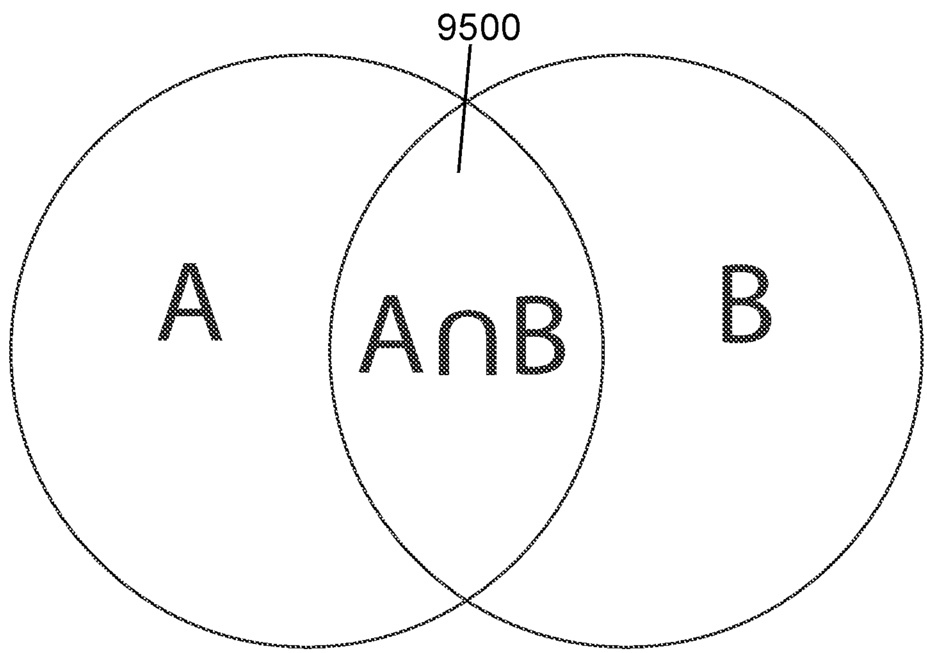
Figure 147B:
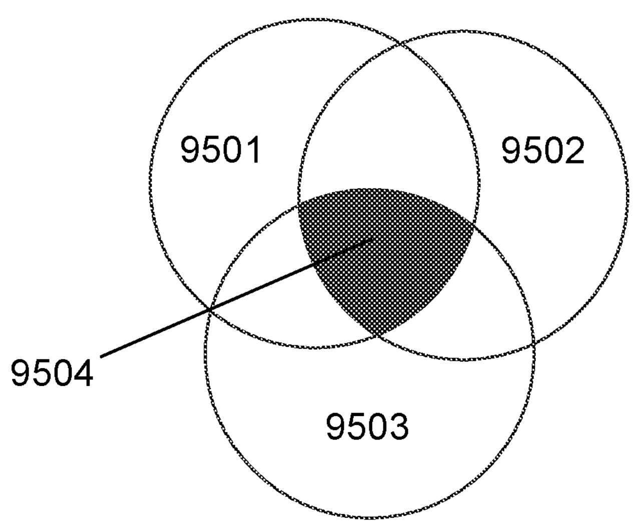

FIGS. 147A and 147B illustrate examples of overlap between possible locations of the robot, according to some embodiments.

Figure 148A:
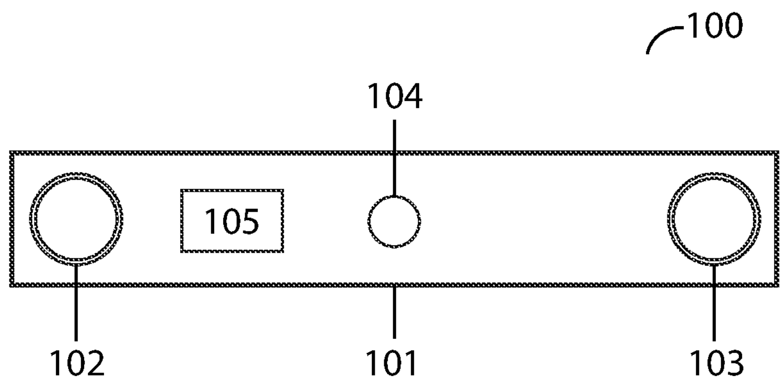

FIG. 148A illustrates a front elevation view of an embodiment of a distance estimation device, according to some embodiments.

Figure 148B:
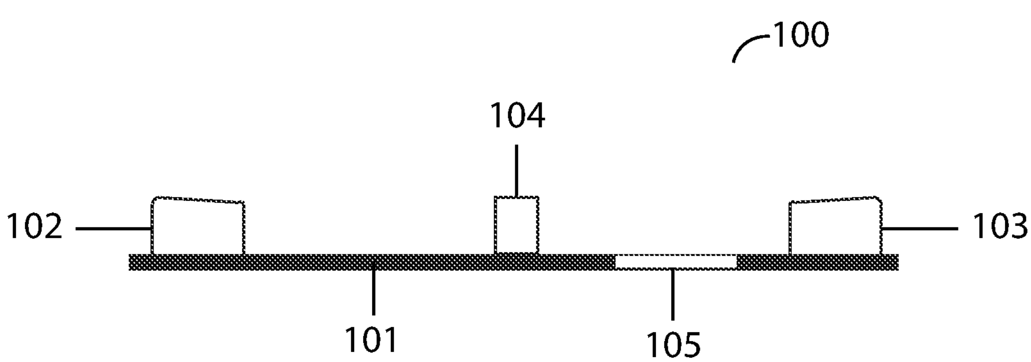

FIG. 148B illustrates an overhead view of an embodiment of a distance estimation device, according to some embodiments.

Figure 149:
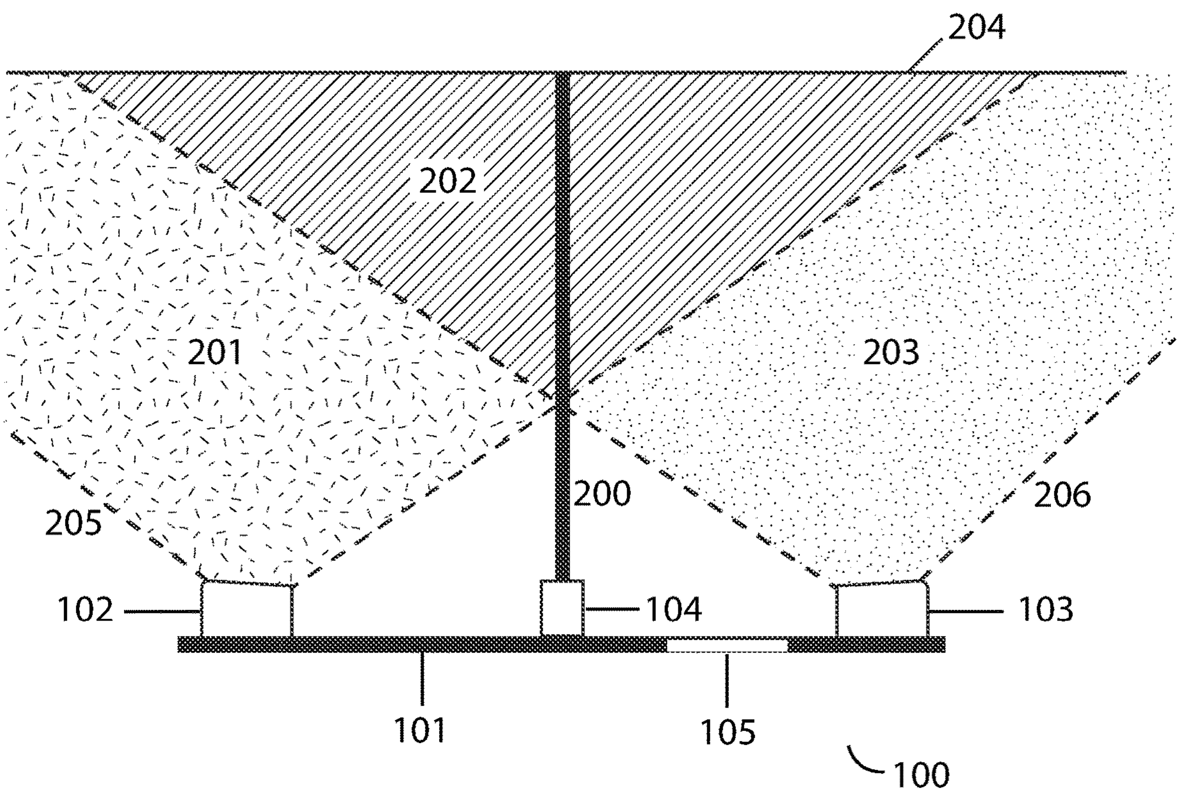

FIG. 149 illustrates an overhead view of an embodiment of a distance estimation device and fields of view of its image sensors, according to some embodiments.

Figure 150A:
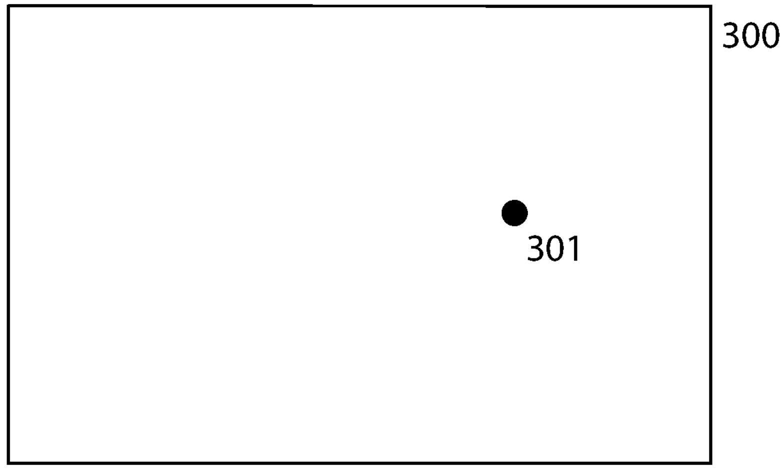
Figure 150B:
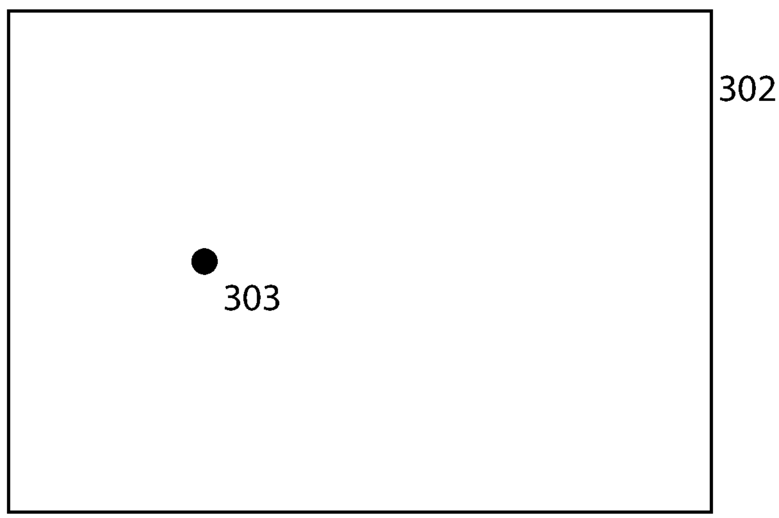
Figure 150C:
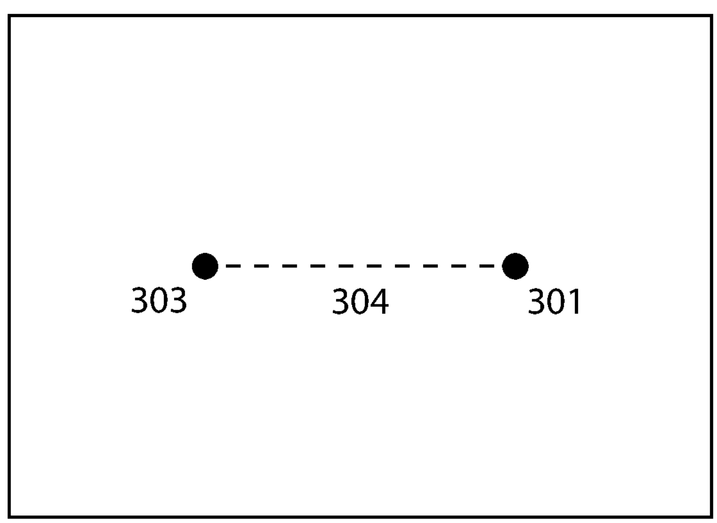

FIGS. 150A-150C illustrate an embodiment of distance estimation using a variation of a distance estimation device, according to some embodiments.

FIGS. 151A-151D illustrate an embodiment of minimum distance measurement varying with angular position of image sensors, according to some embodiments.

Figure 152A:
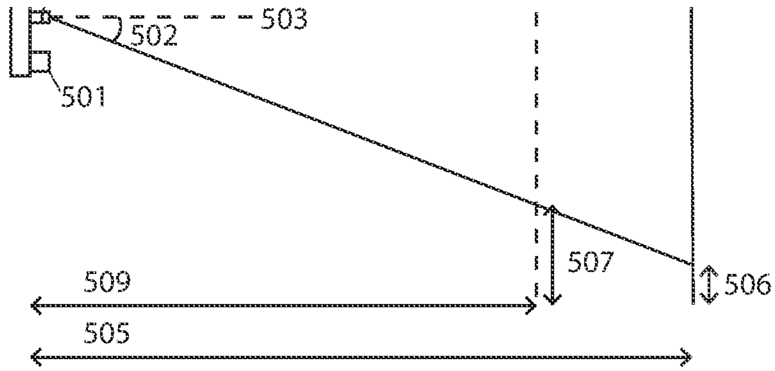
Figure 152B:
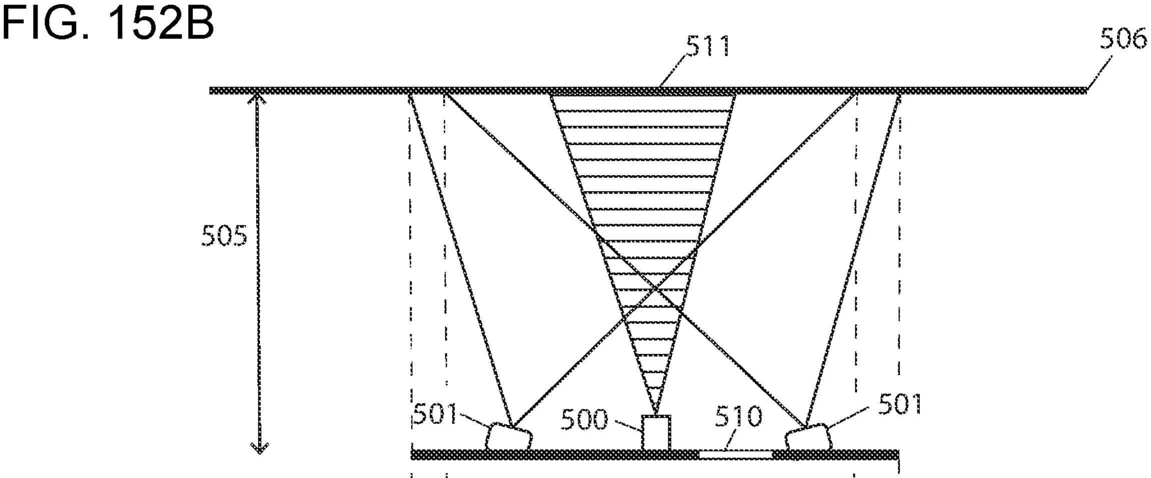
Figure 152C:
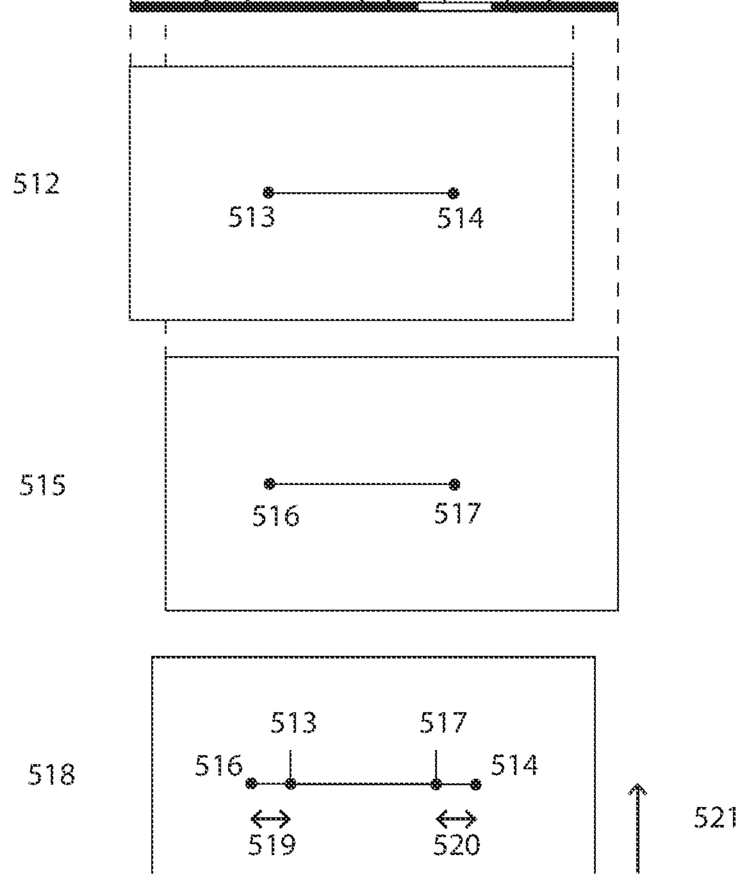

FIGS. 152A-152C illustrate an embodiment of distance estimation using a variation of a distance estimation device, according to some embodiments.

FIG. 153A-153F illustrate an embodiment of a camera detecting a corner, according to some embodiments.

FIGS. 154A, 154B and 155A-155E Illustrate examples of structured light patterns that may be used to infer distance and create three-dimensional images, according to some embodiments.

FIGS. 156, 157, 158, 159A, 159B, 160A, and 160B illustrate embodiments of distance estimation using a variation of a distance estimation device, according to some embodiments.

FIGS. 161A-161F, 162A-162C, and 163A-163C illustrate examples of images of structured light patterns, according to some embodiments.

FIGS. 164A-164C and 165A-165F illustrate an example of a robot measuring distance, according to some embodiments.

Figure 166A:
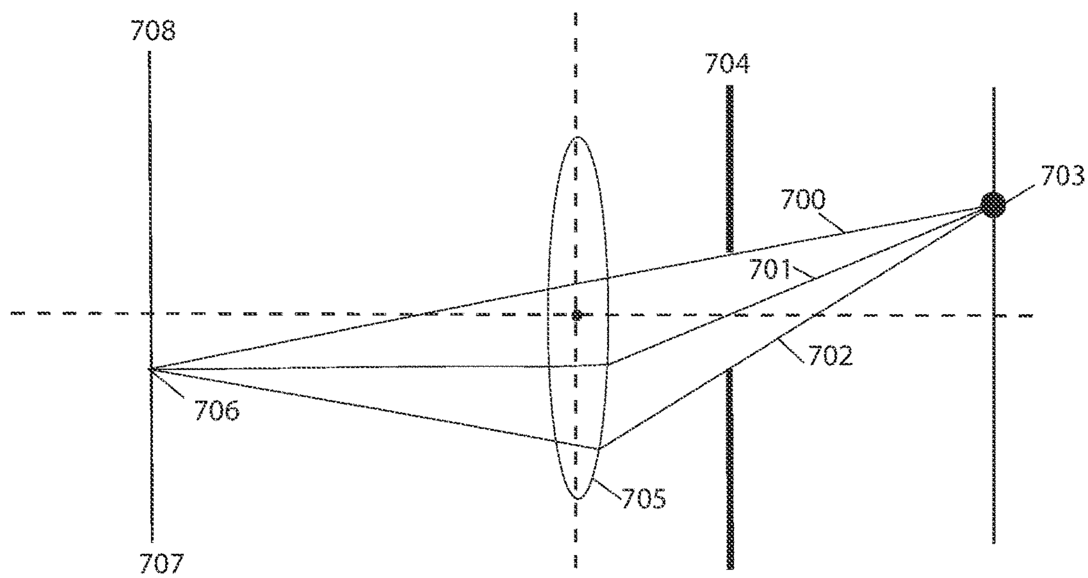
Figure 166B:
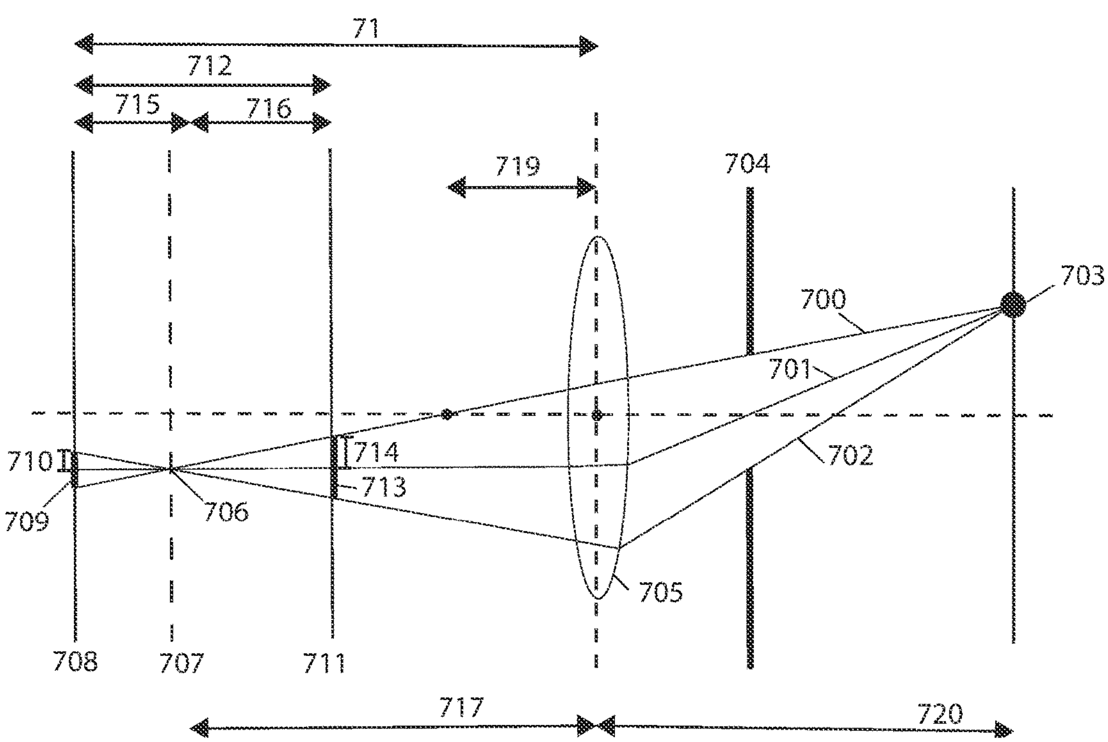

FIGS. 166A and 166B illustrate an embodiment of measured depth using de-focus technique, according to some embodiments.

FIGS. 167A-167C, 168A, 168B, 169A, and 169B illustrate examples of measuring distances using a LIDAR sensor, according to some embodiments.

Figure 170A:
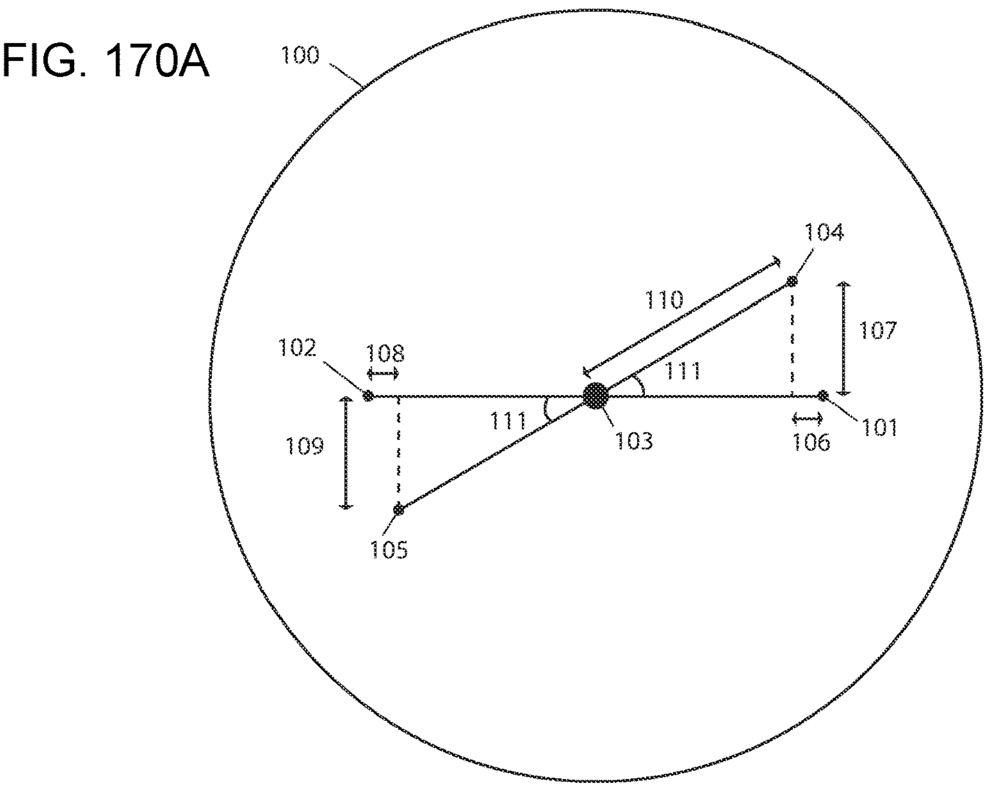
Figure 170B:
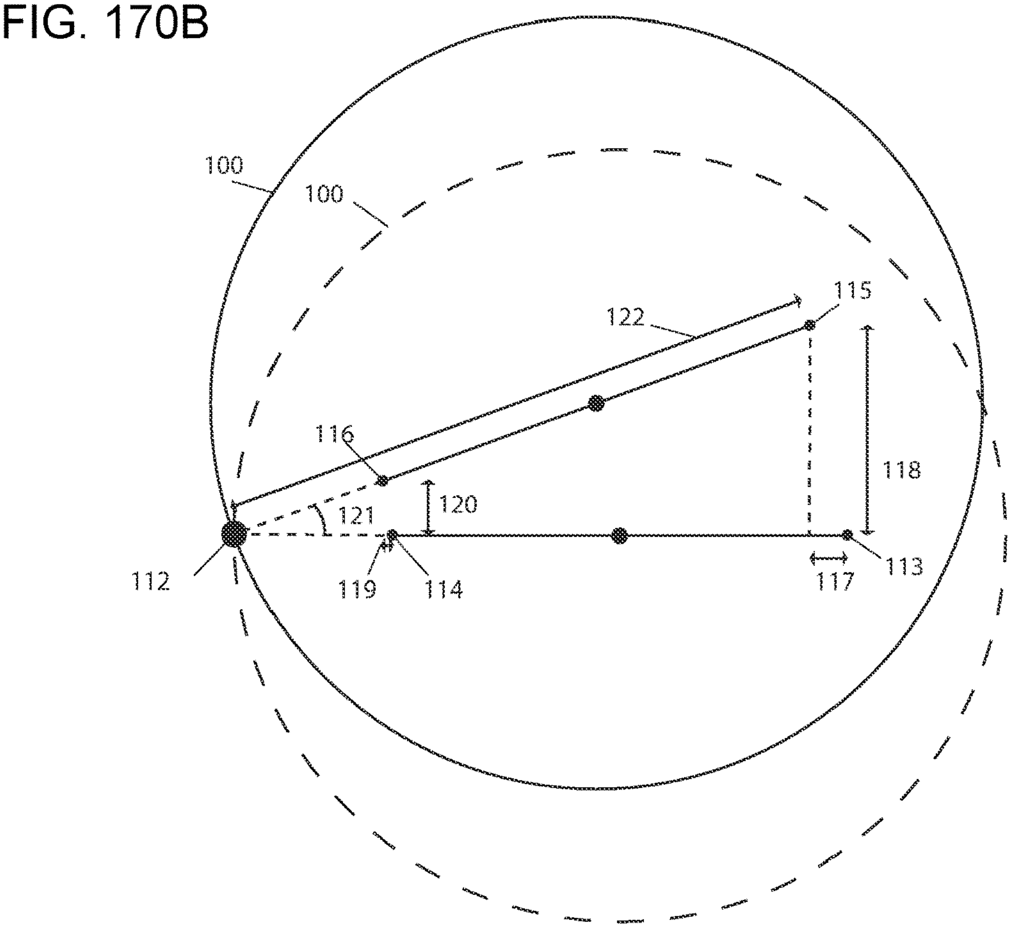
Figure 170C:
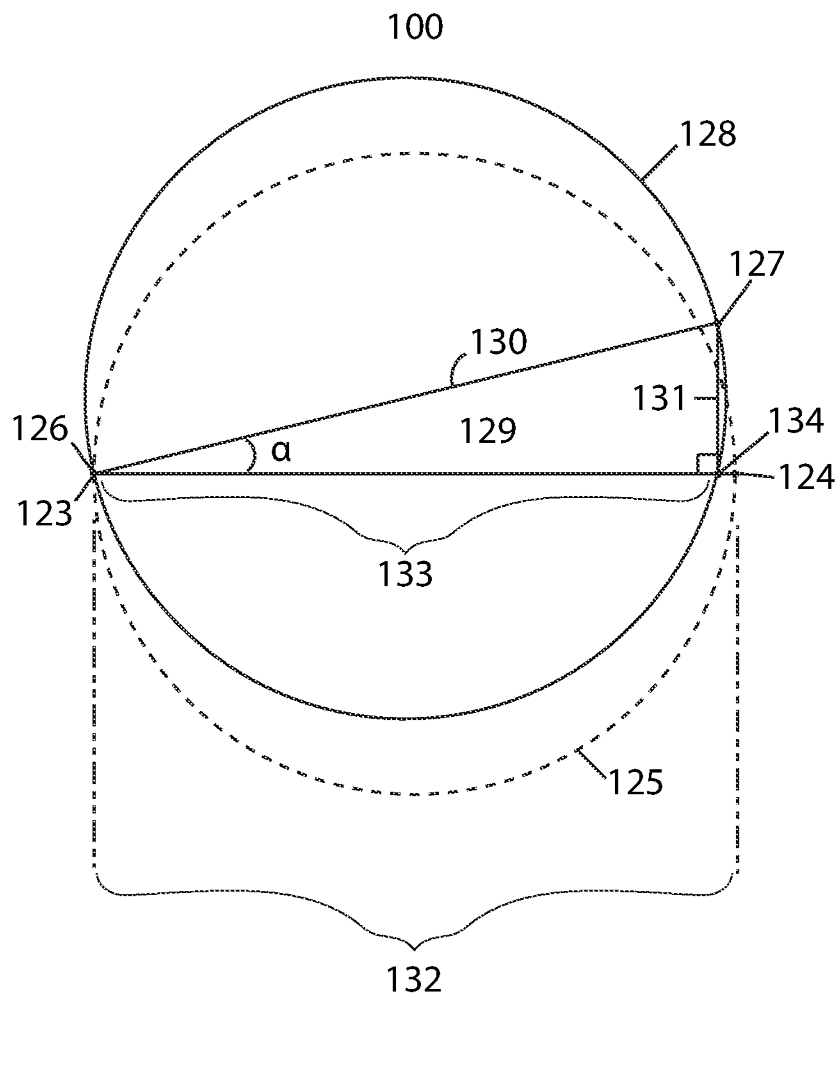

FIGS. 170A-170C illustrate a method for determining a rotation angle of a robotic device, according to some embodiments.

Figure 171:
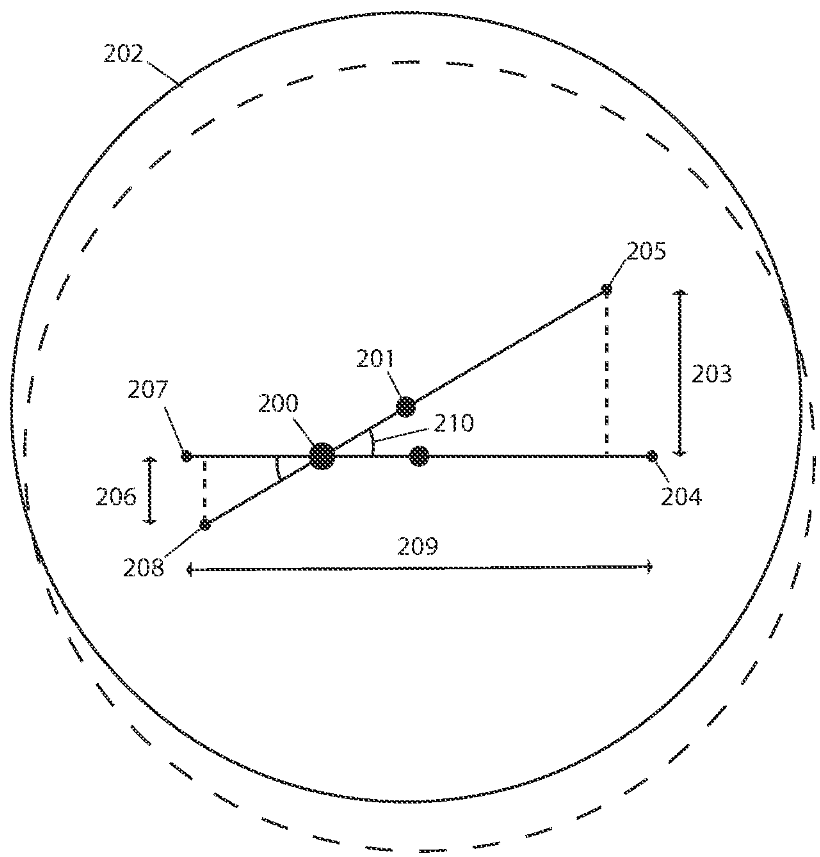

FIG. 171 illustrates a method for calculating a rotation angle of a robotic device, according to some embodiments.

Figure 172A:
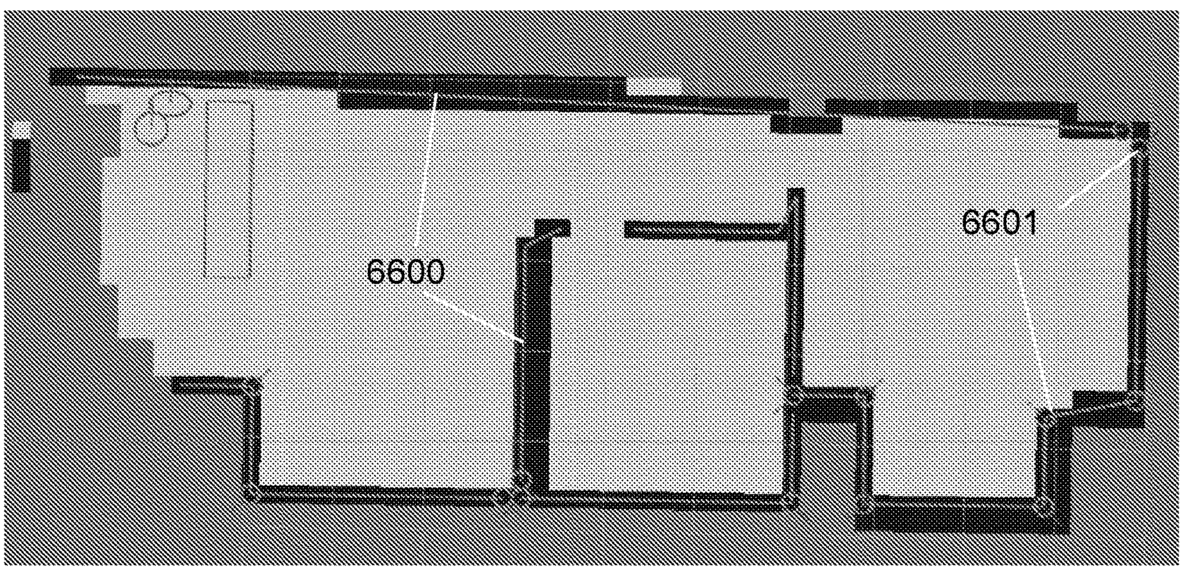
Figure 172B:
Figure 172C:
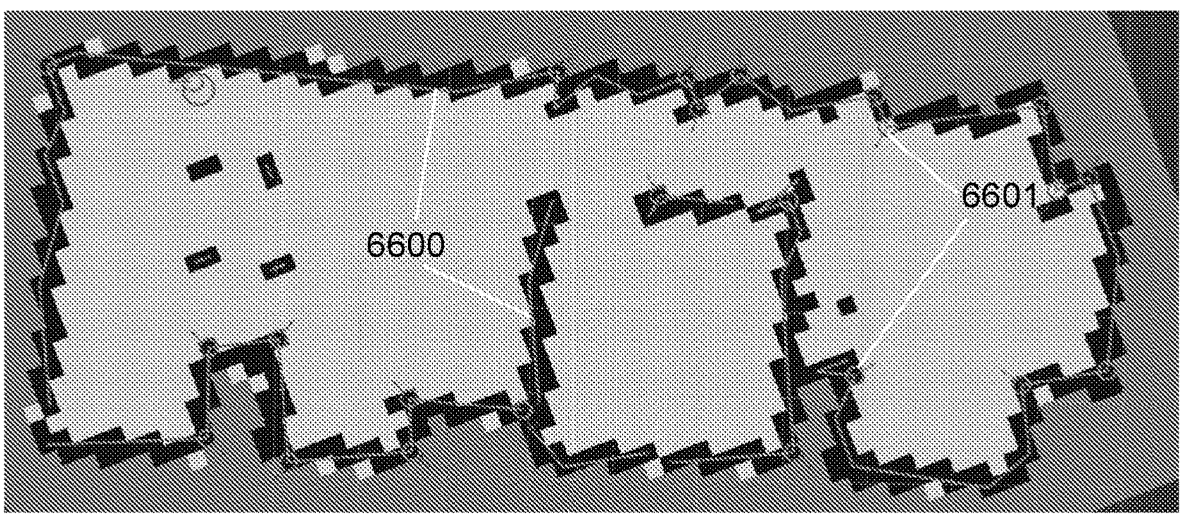

FIGS. 172A-172C illustrate examples of wall and corner extraction from a map, according to some embodiments.

Figure 173:
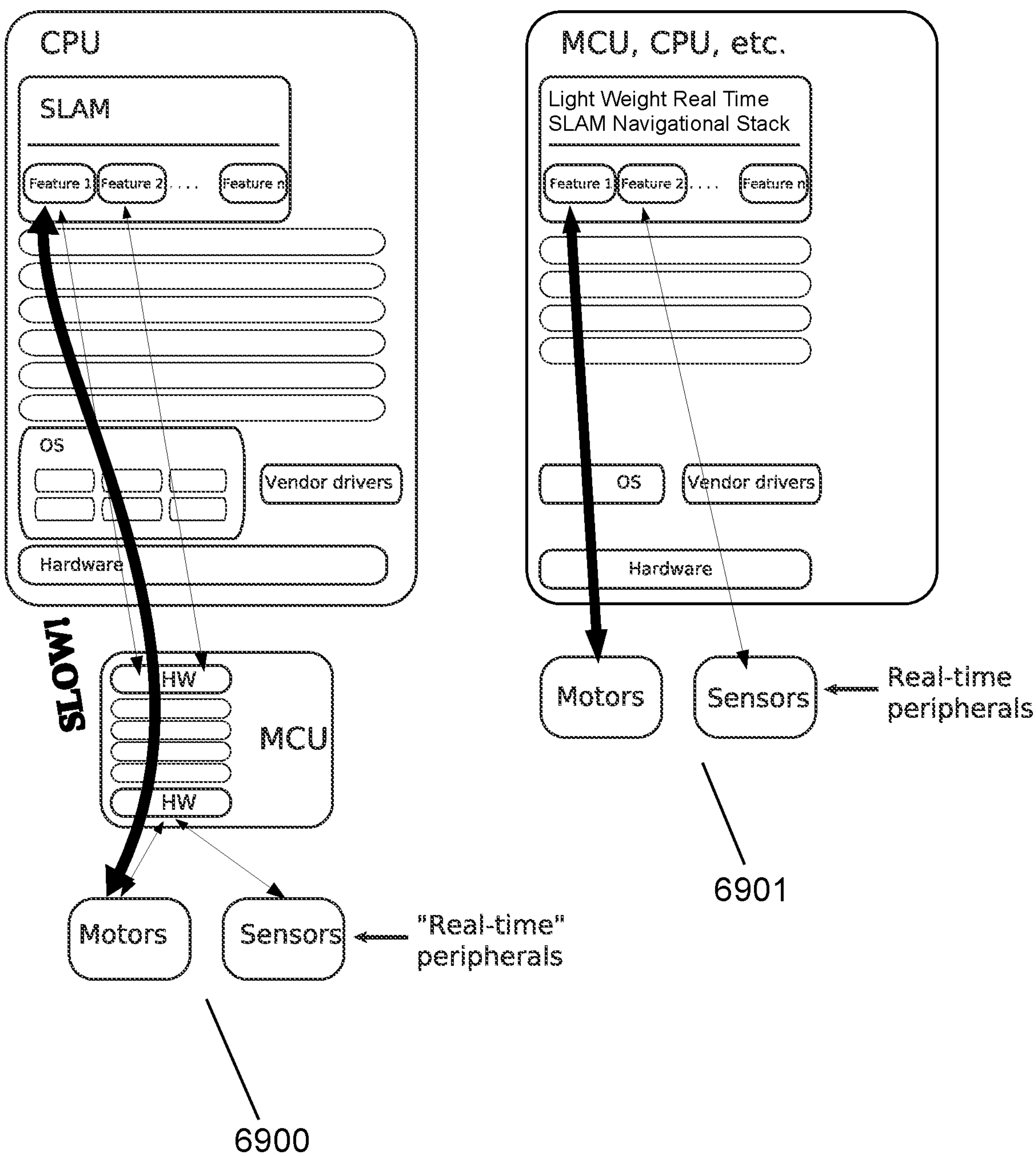

FIG. 173 illustrates an example of the flow of information for traditional SLAM and Light Weight Real SLAM Time Navigational Stack techniques, according to some embodiments.

Figure 174A:
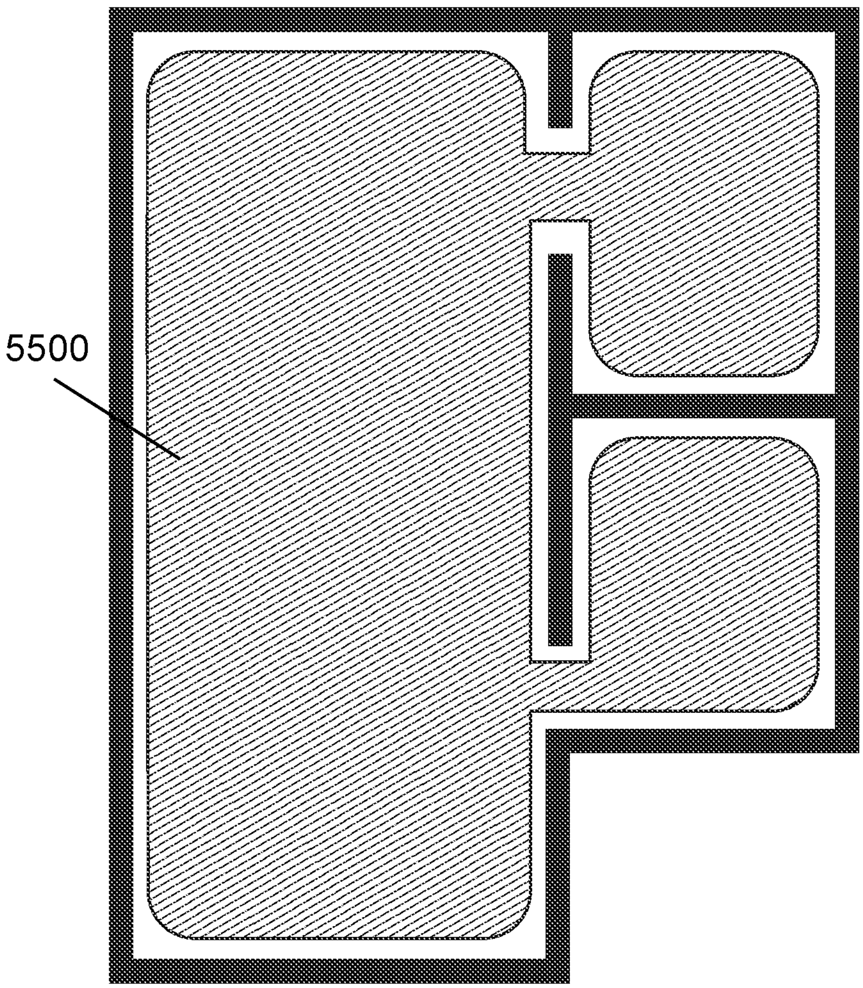
Figure 174B:
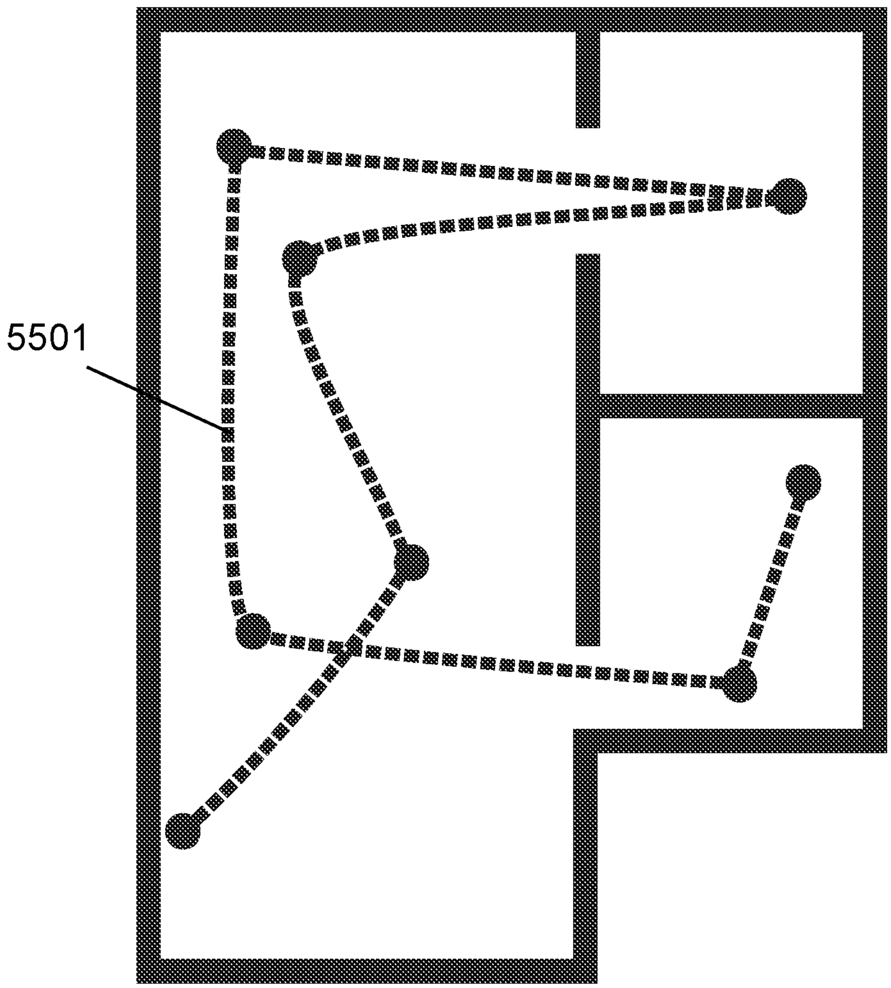
Figure 174C:
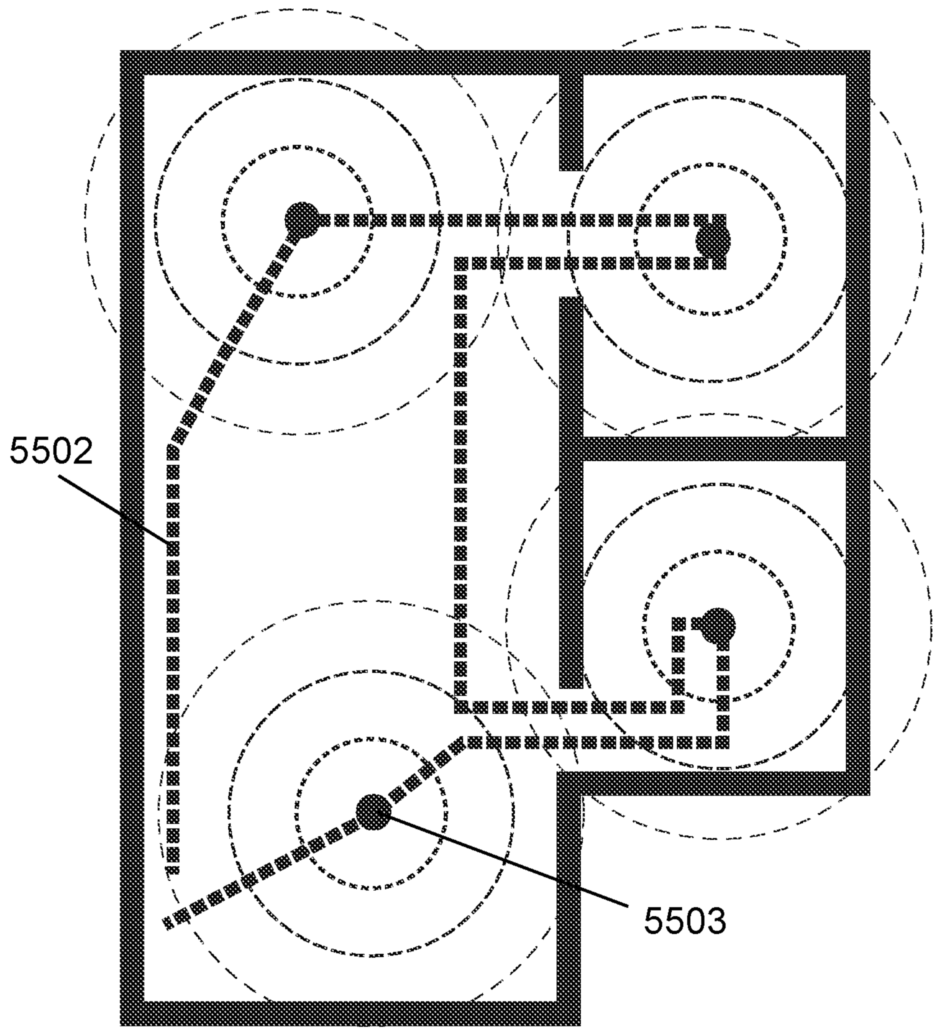

FIGS. 174A-174C illustrate examples of coverage functionalities of a robot, according to some embodiments.

FIGS. 175A-175D illustrate examples of coverage by a robot, according to some embodiments.

FIGS. 176A, 176B, 177A, and 177B illustrate examples of spatial representations of an environment, according to some embodiments.

FIGS. 178A, 178B, 179A-179F, and 180A-180D illustrate examples of a movement path of a robot during coverage, according to some embodiments.

Figure 181:
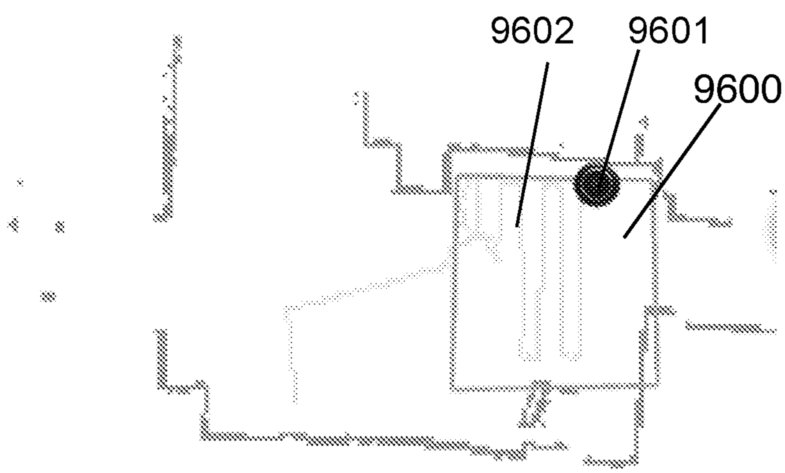

FIG. 181 illustrates a map, according to some embodiments.

Figure 182A:
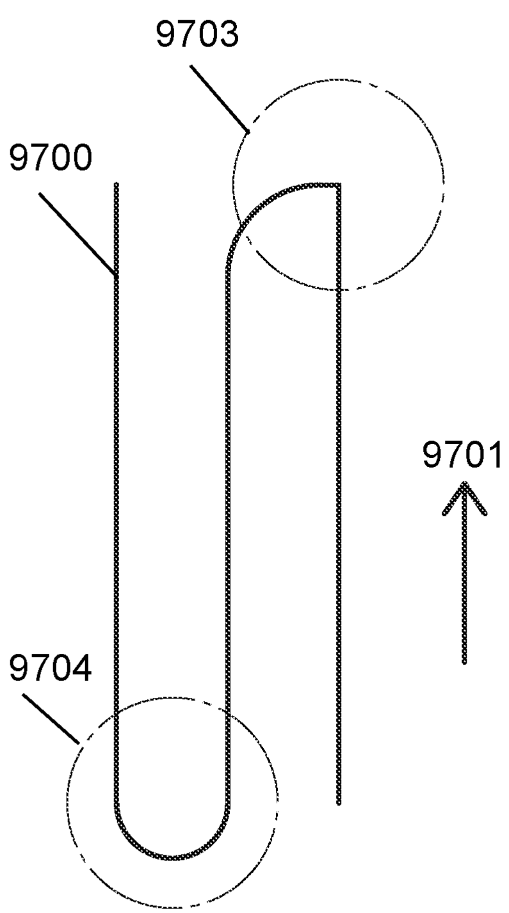
Figure 182B:
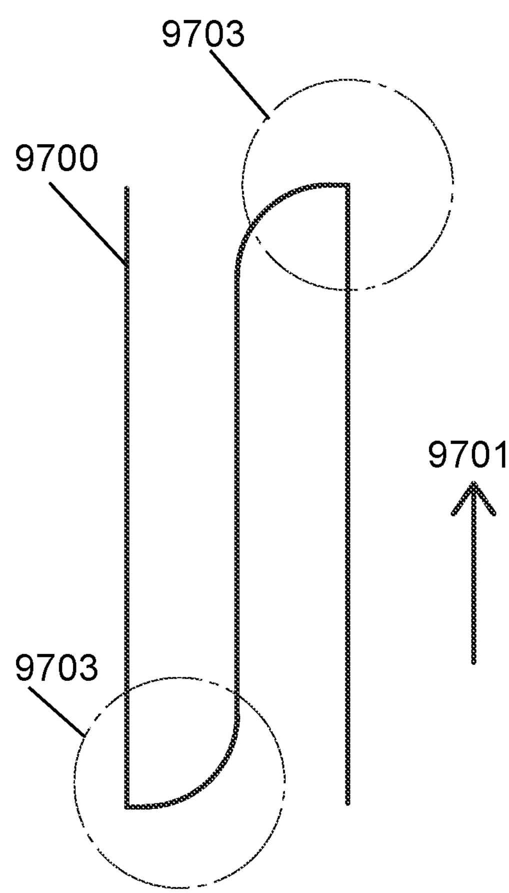

FIGS. 182A and 182B illustrate a path of a robot, according to some embodiments.

FIGS. 183A-183E illustrate a path of a robot, according to some embodiments.

FIGS. 184A-184C illustrate an example of EKF output, according to some embodiments.

Figure 185:
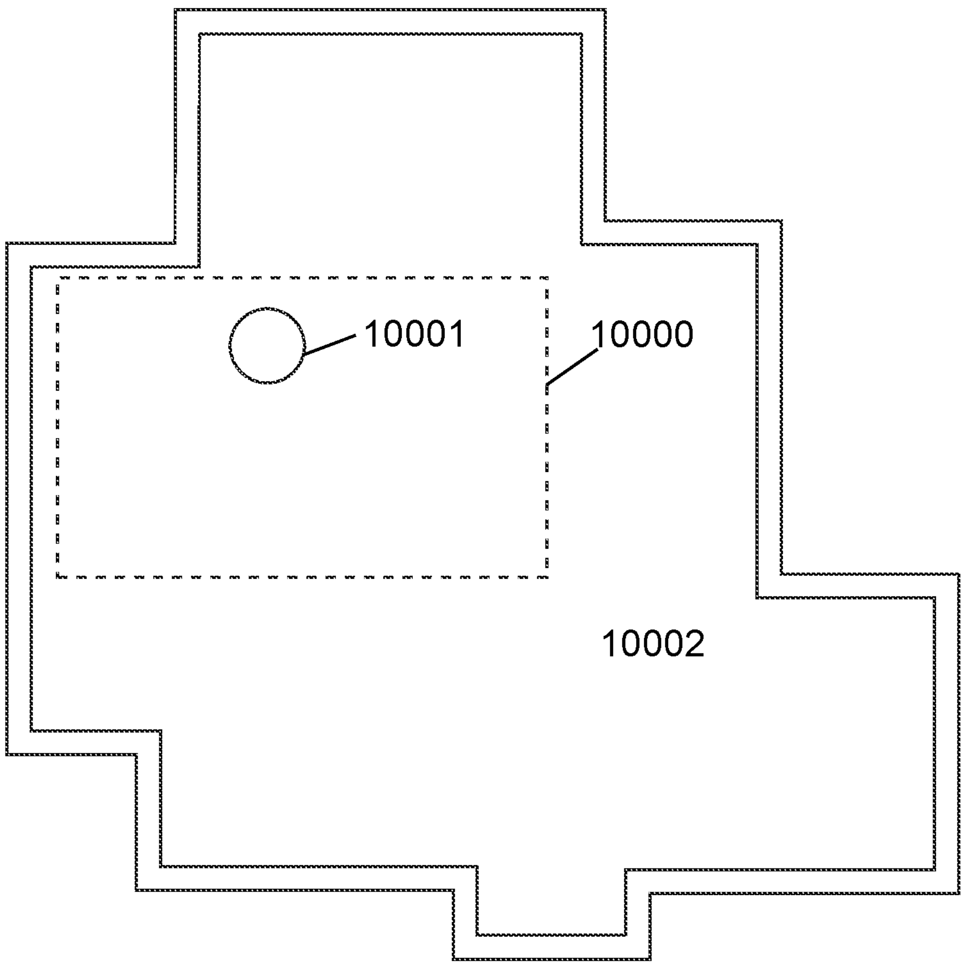
Figure 186:
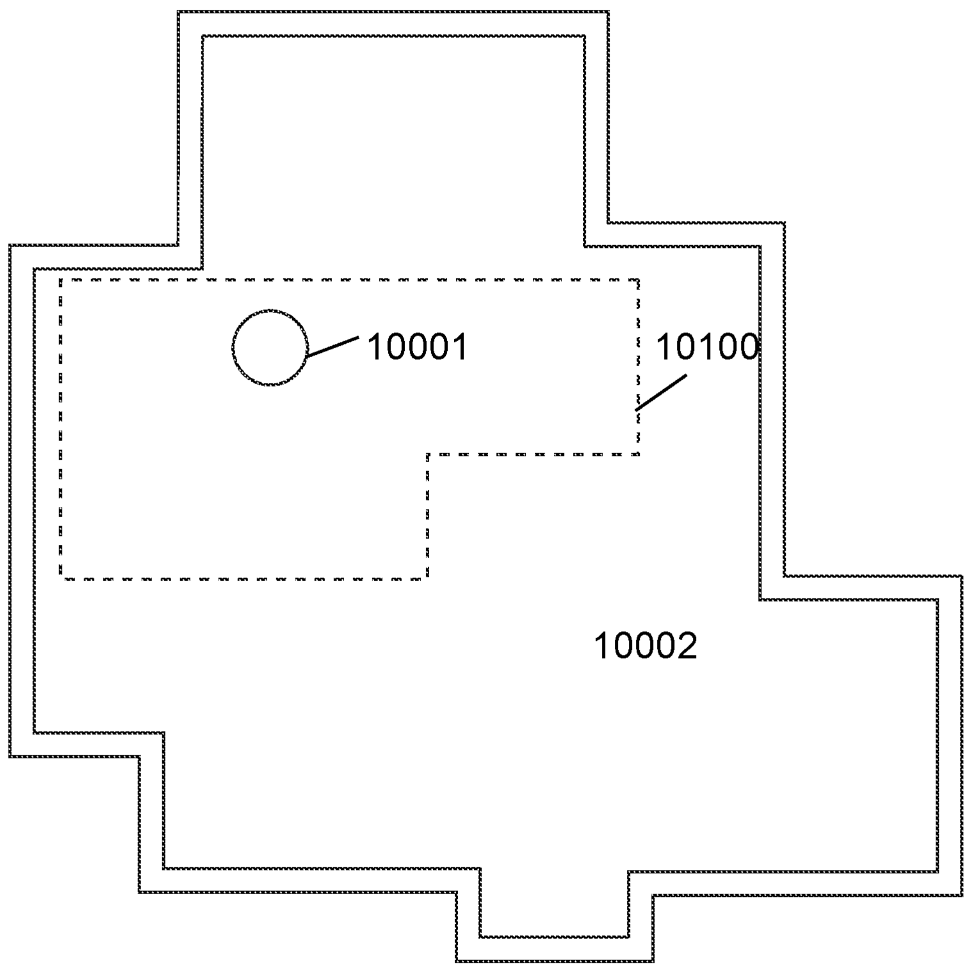

FIGS. 185 and 186 illustrate an example of a coverage area, according to some embodiments.

Figure 187:
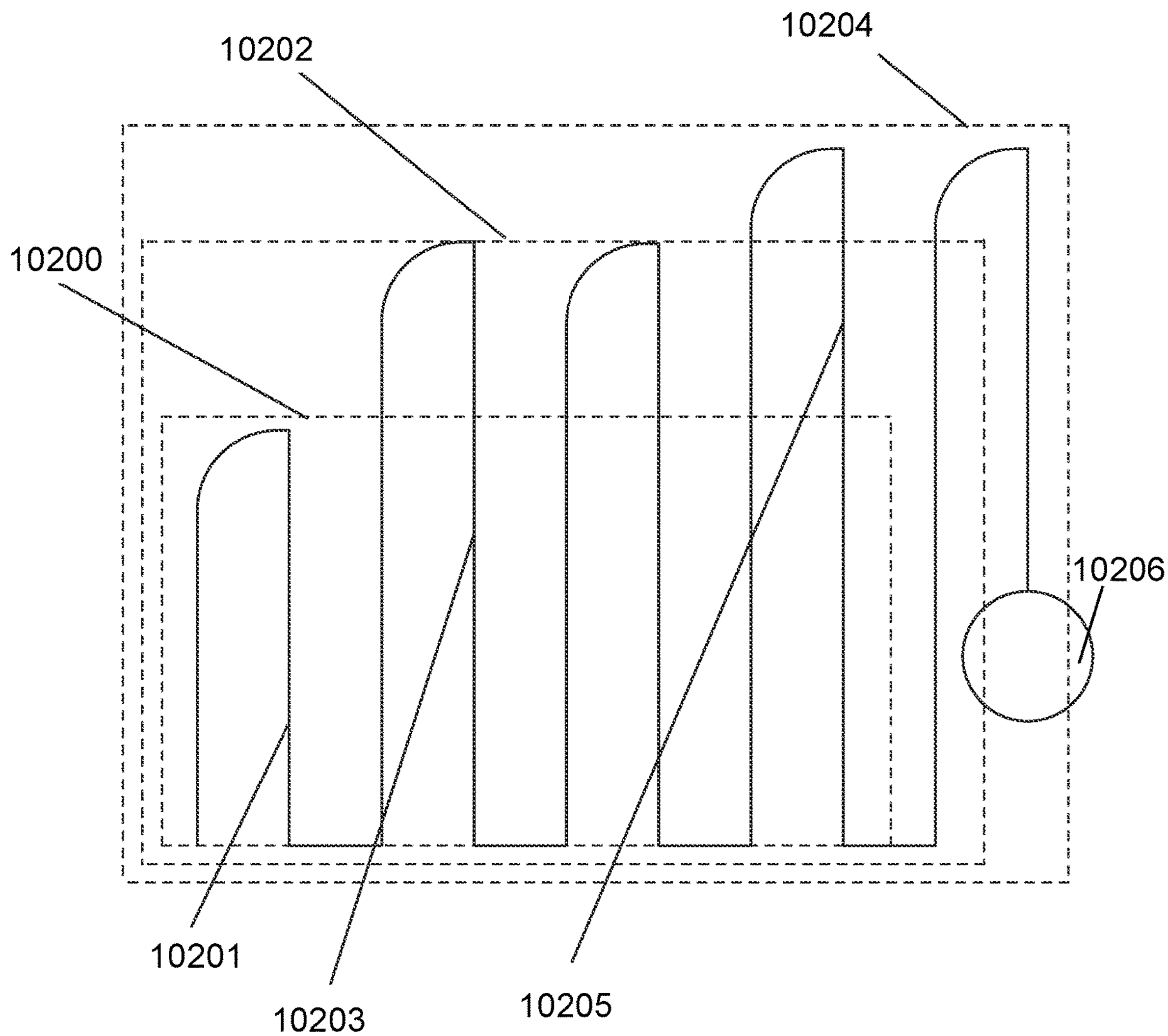

FIG. 187 illustrates an example of a polymorphic path, according to some embodiments.

Figure 188:
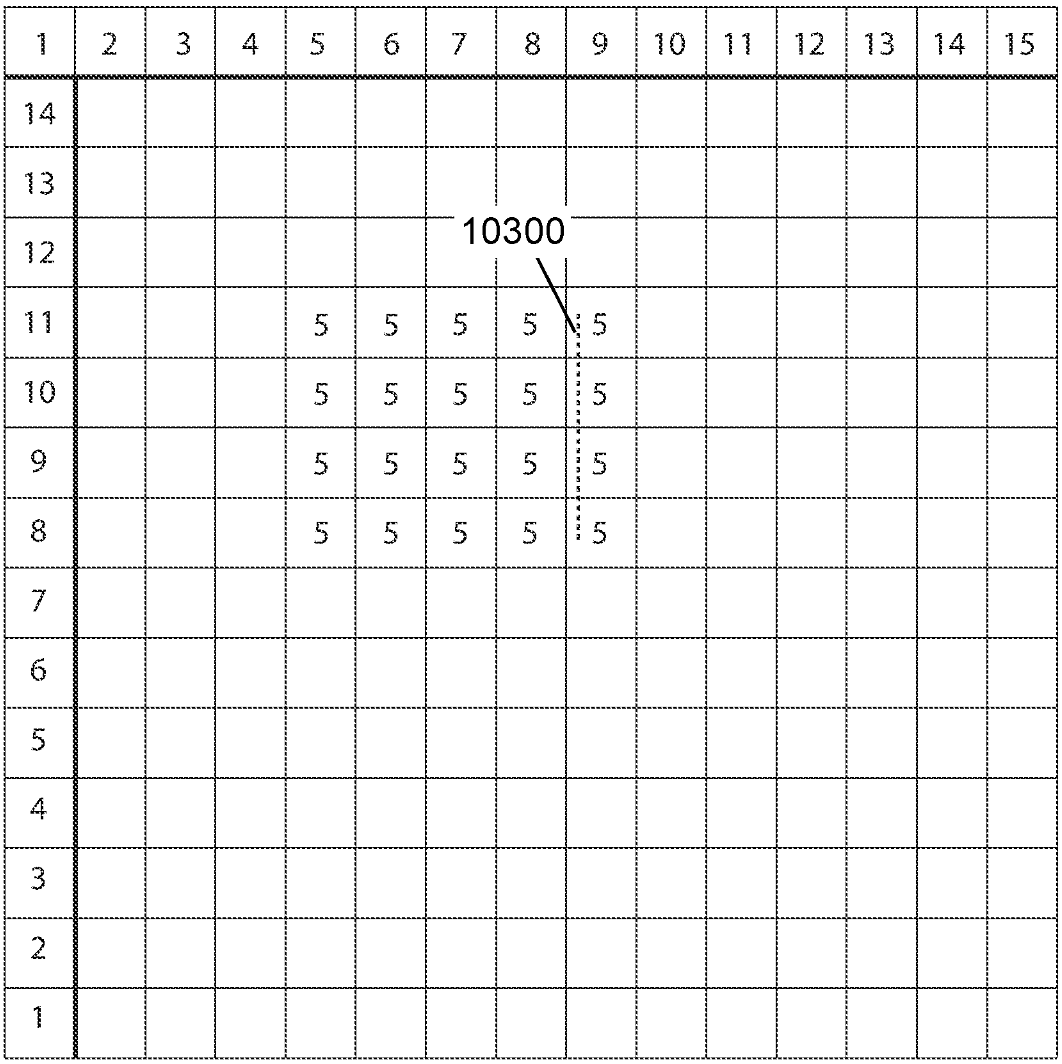
Figure 189:
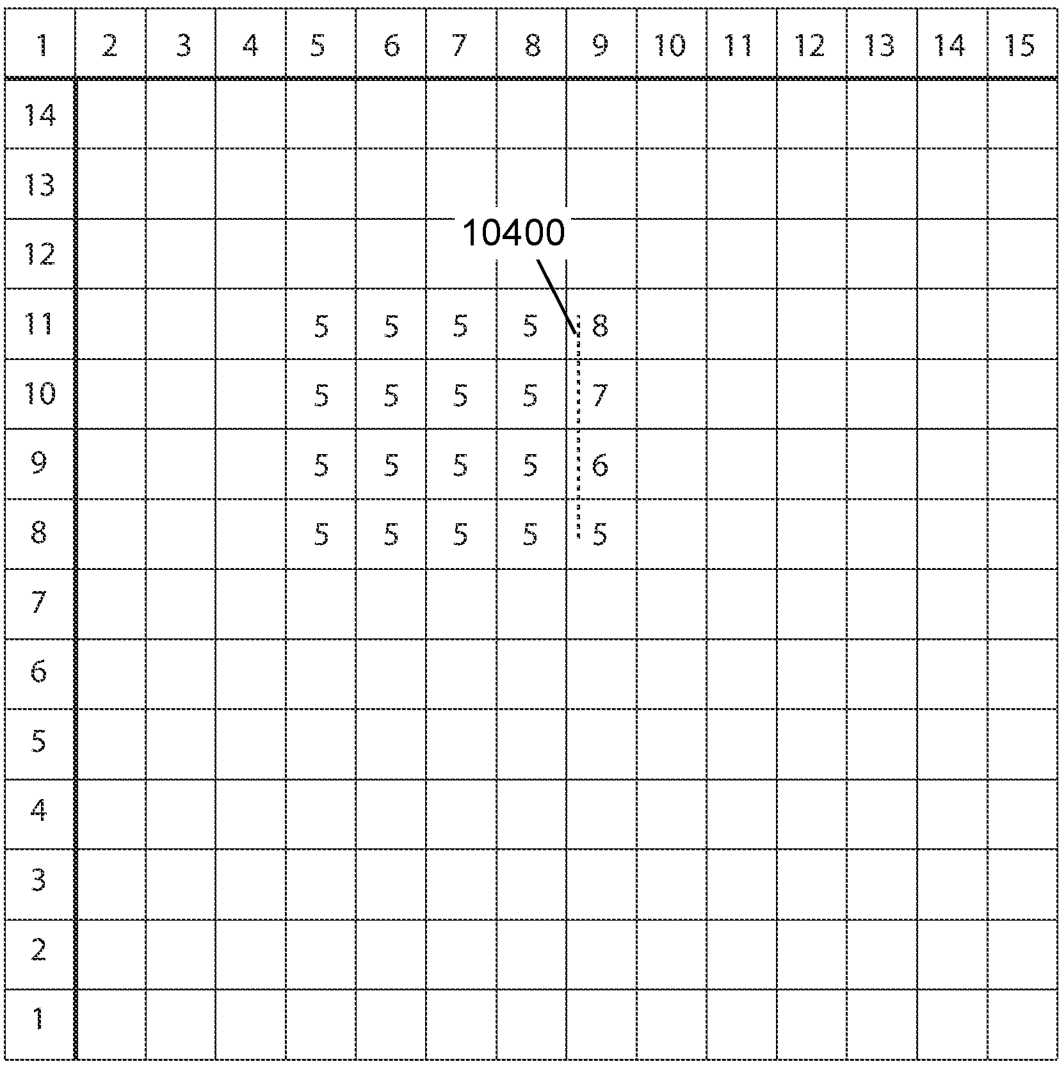

FIGS. 188 and 189 illustrate an example of a traversable path of a robot, according to some embodiments.

FIG. 190 illustrates an example of an untraversable path of a robot, according to some embodiments.

FIG. 191 illustrates an example of a traversable path of a robot, according to some embodiments.

Figure 192:
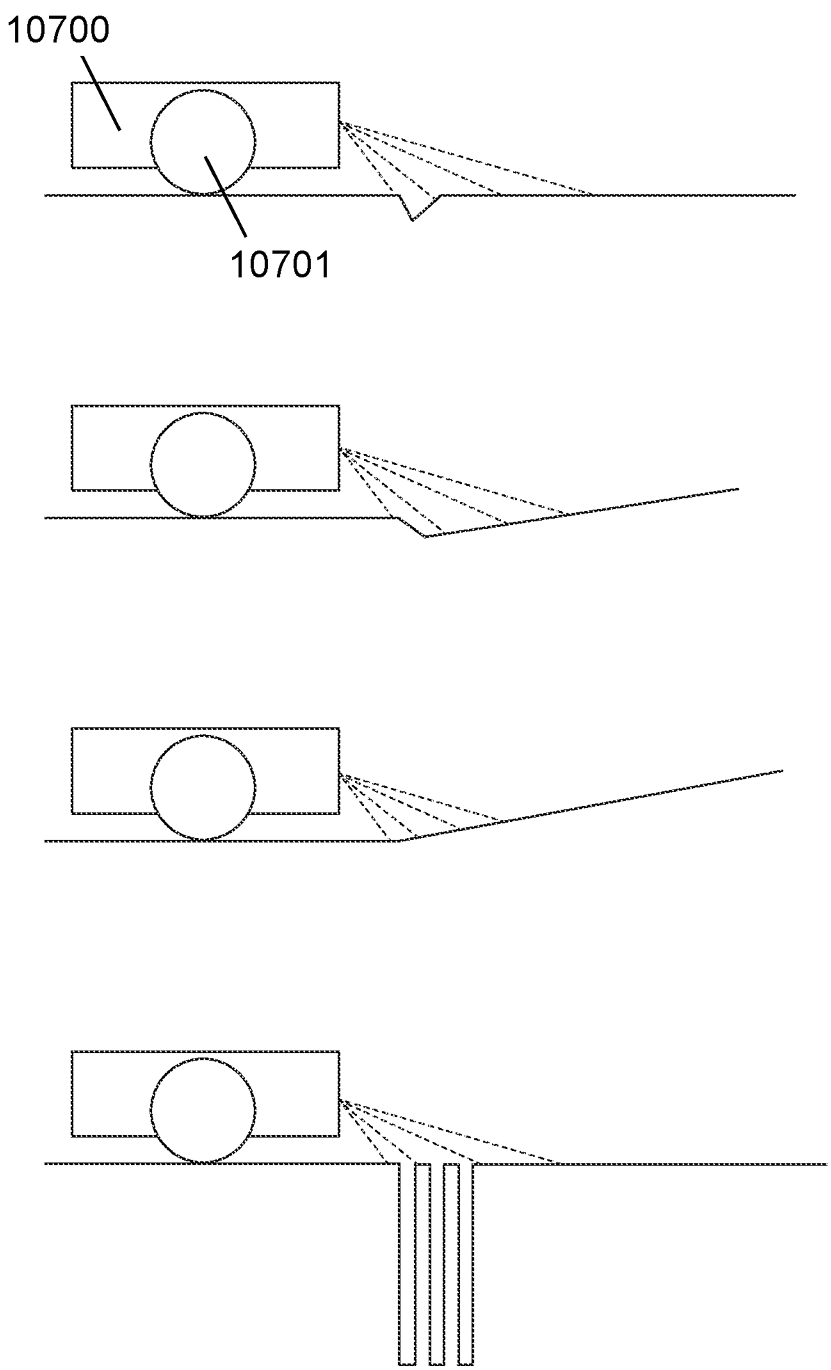

FIG. 192 illustrates areas traversable by a robot, according to some embodiments.

Figure 193:
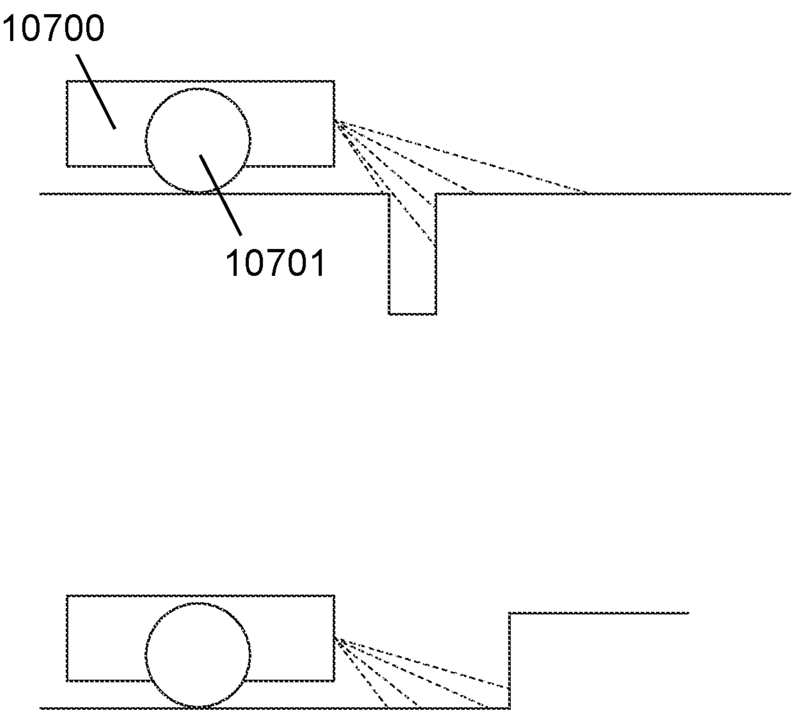

FIG. 193 illustrates areas untraversable by a robot, according to some embodiments.

FIGS. 194A-194D, 195A, 195B, 196A, and 196B illustrate how risk level of areas change with sensor measurements, according to some embodiments.

Figure 197A:
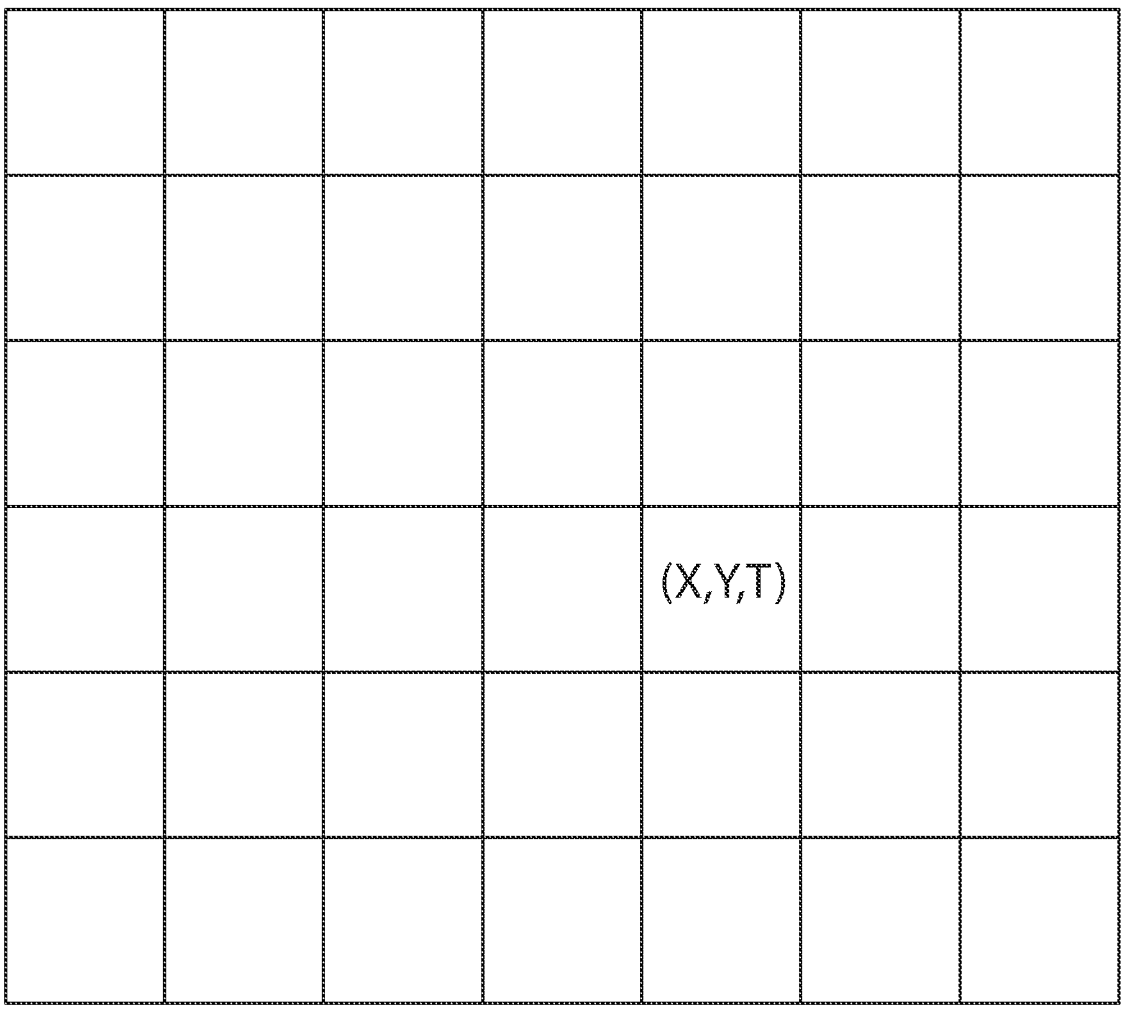

FIG. 197A illustrates an example of a Cartesian plane used for marking traversability of areas, according to some embodiments.

Figure 197B:
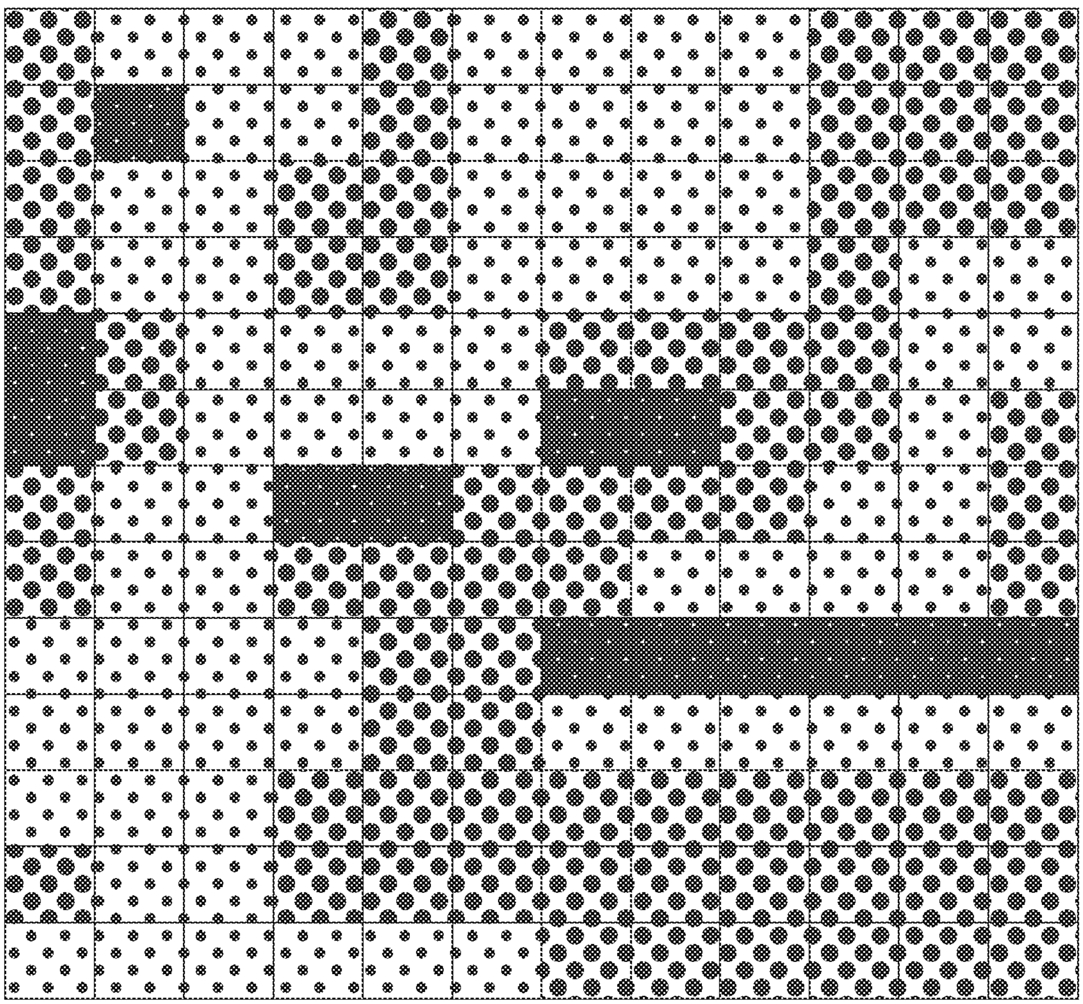

FIG. 197B illustrates an example of a traversability map, according to some embodiments.

FIGS. 198A-198E illustrate an example of path planning, according to some embodiments.

Figure 199A:
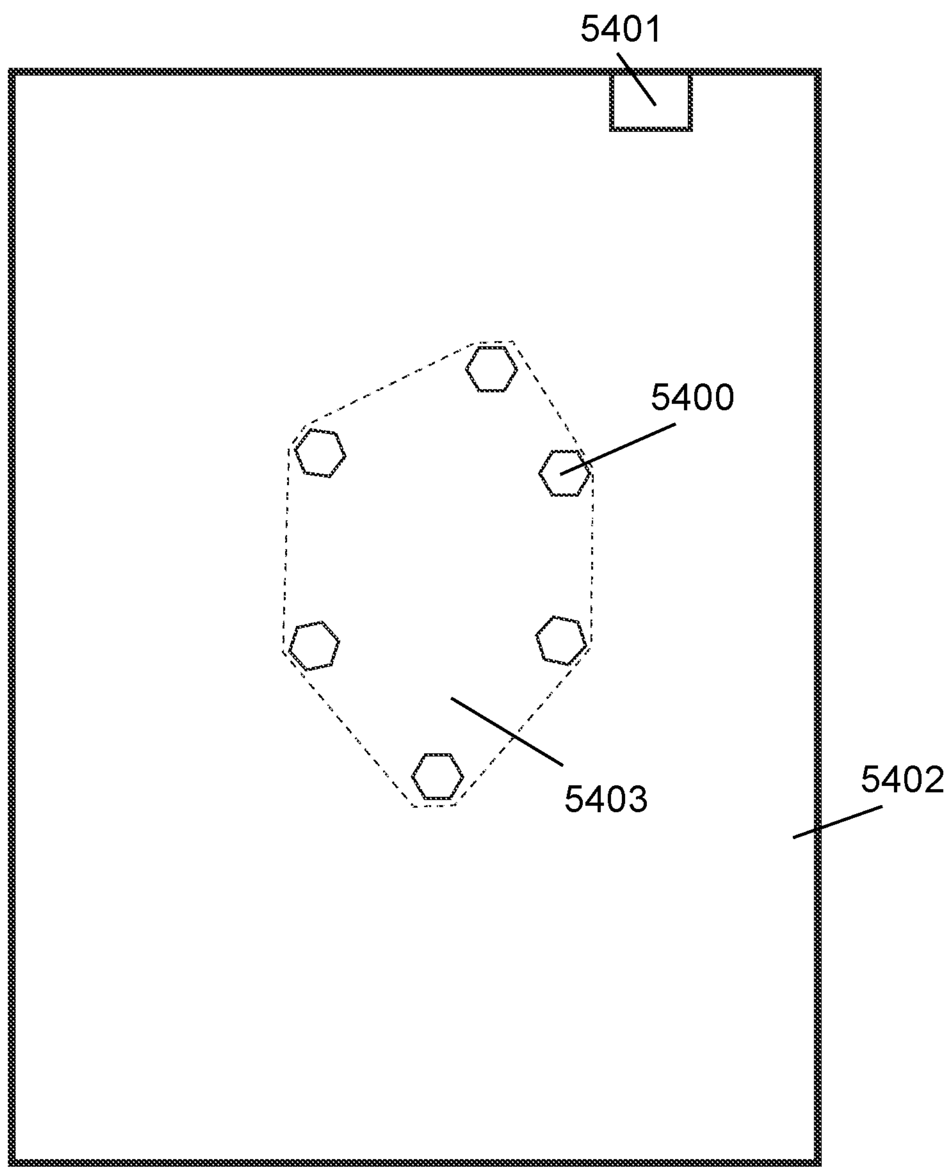
Figure 199B:
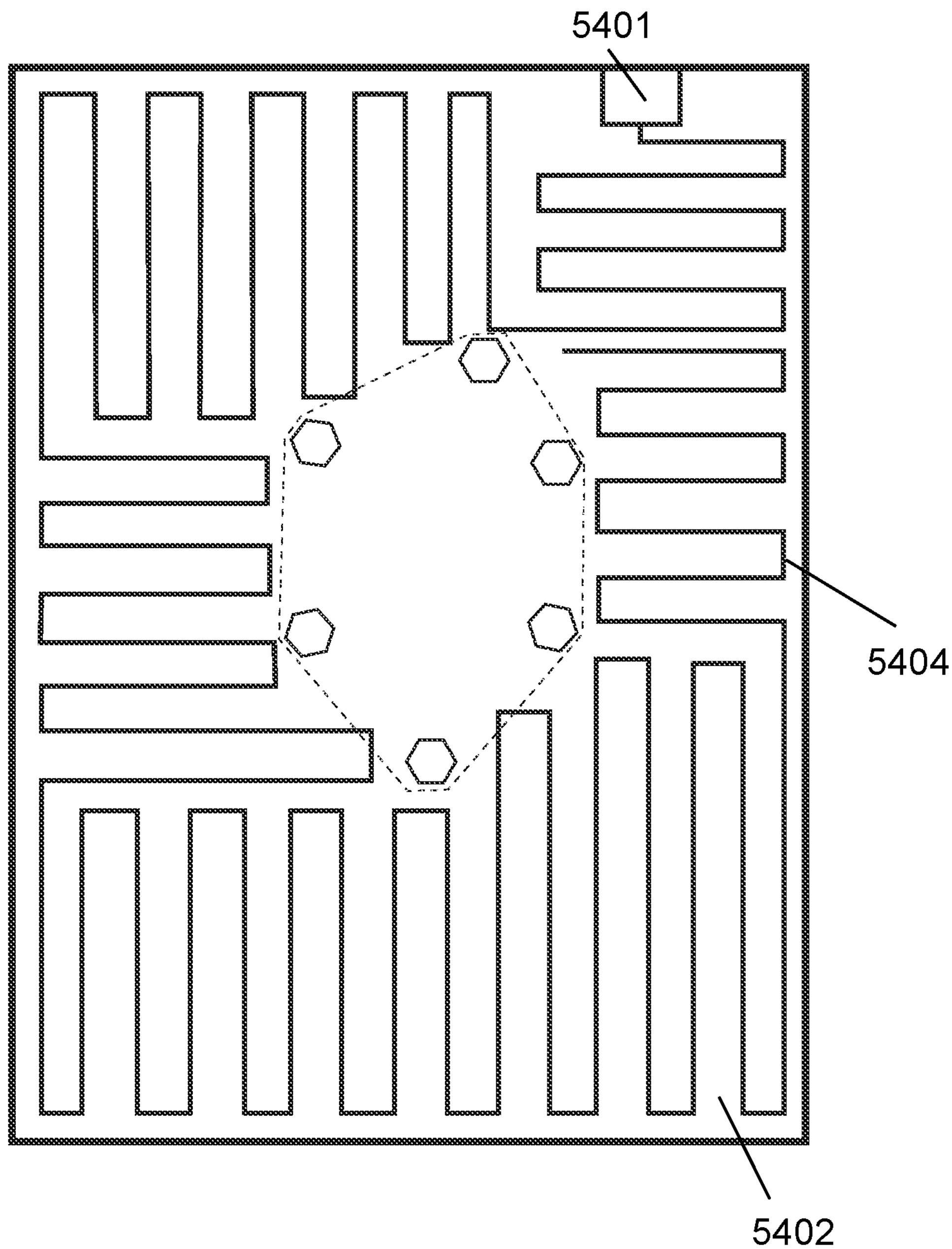
Figure 199C:
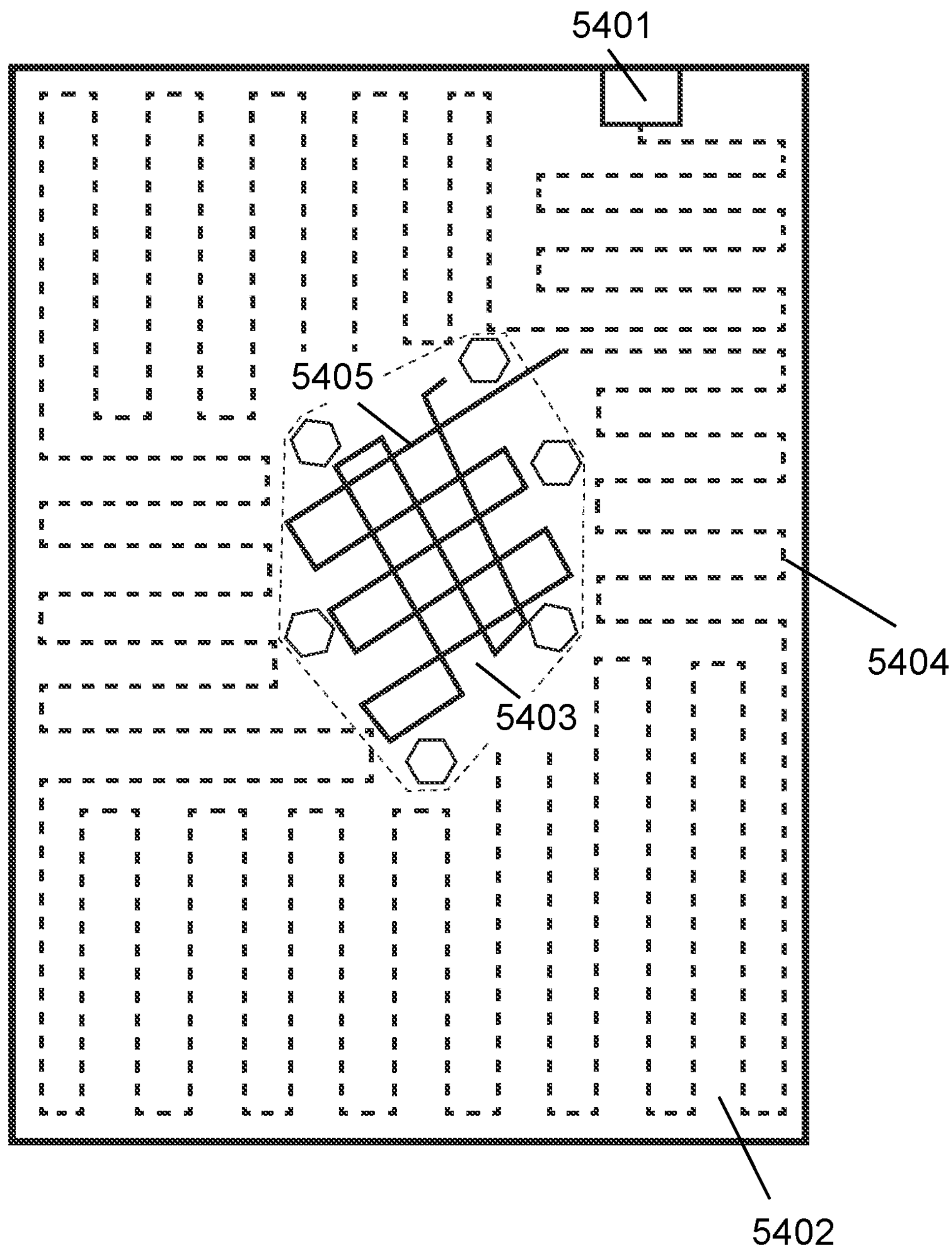

FIGS. 199A-199C illustrates an example of coverage by a robot, according to some embodiments.

Figure 200A:
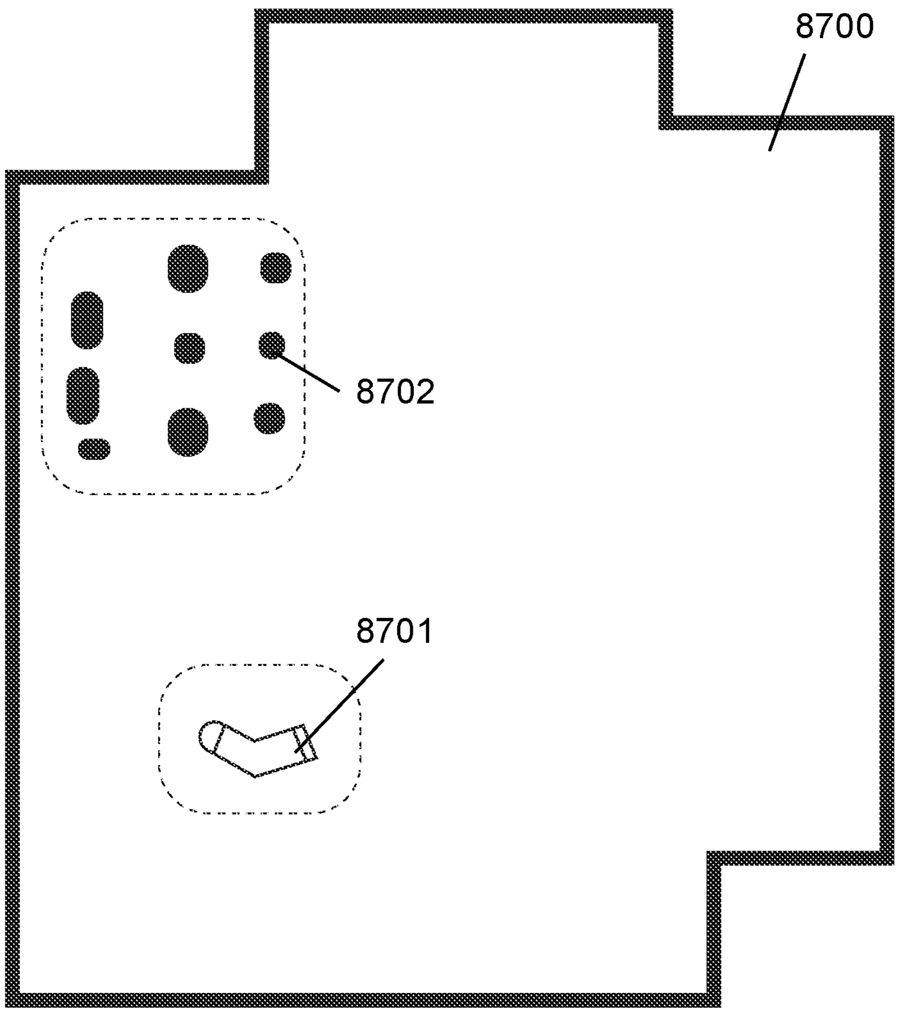
Figure 200B:
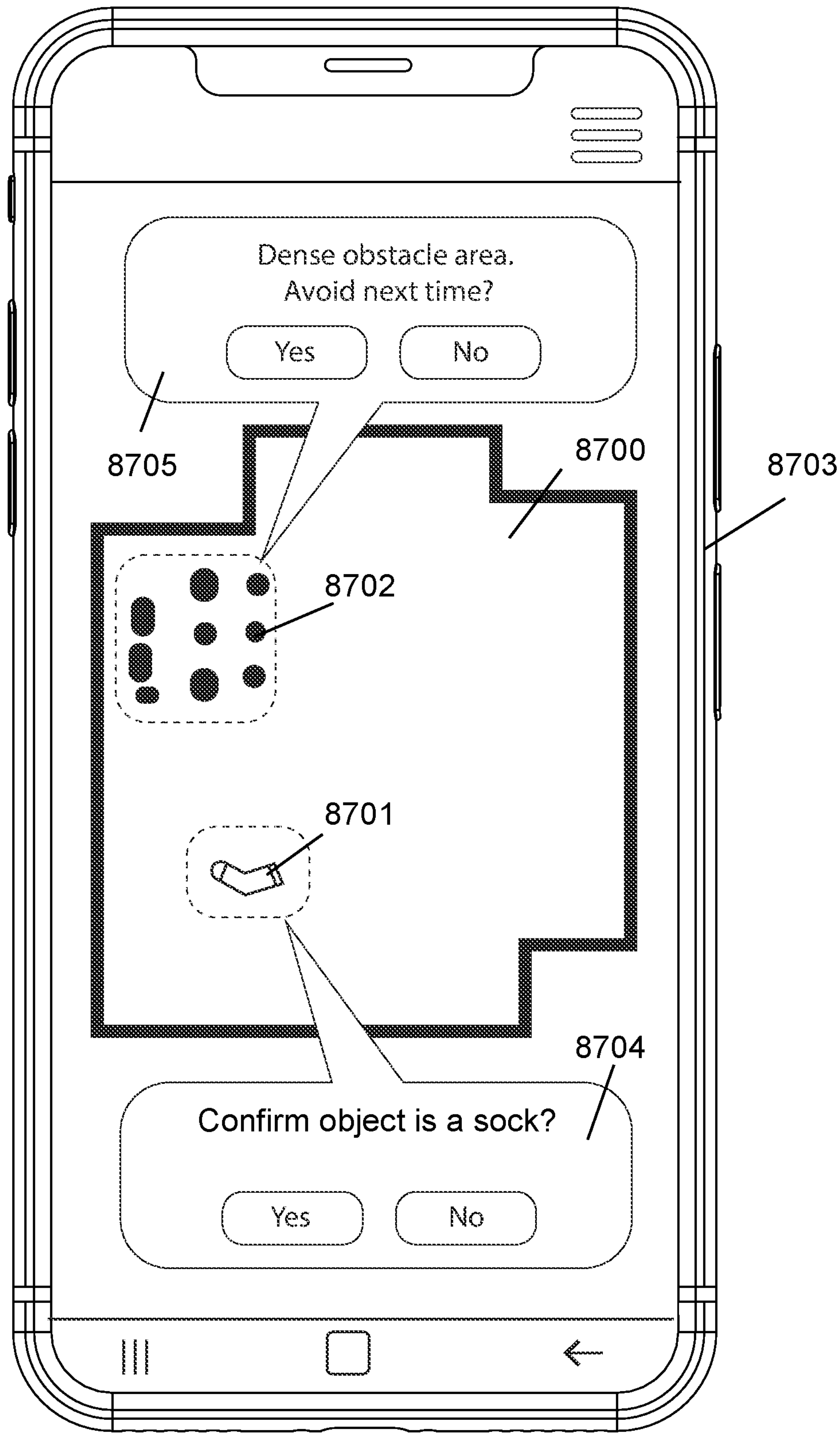

FIGS. 200A and 200B illustrate an example of a map of an environment, according to some embodiments.

Figure 201:
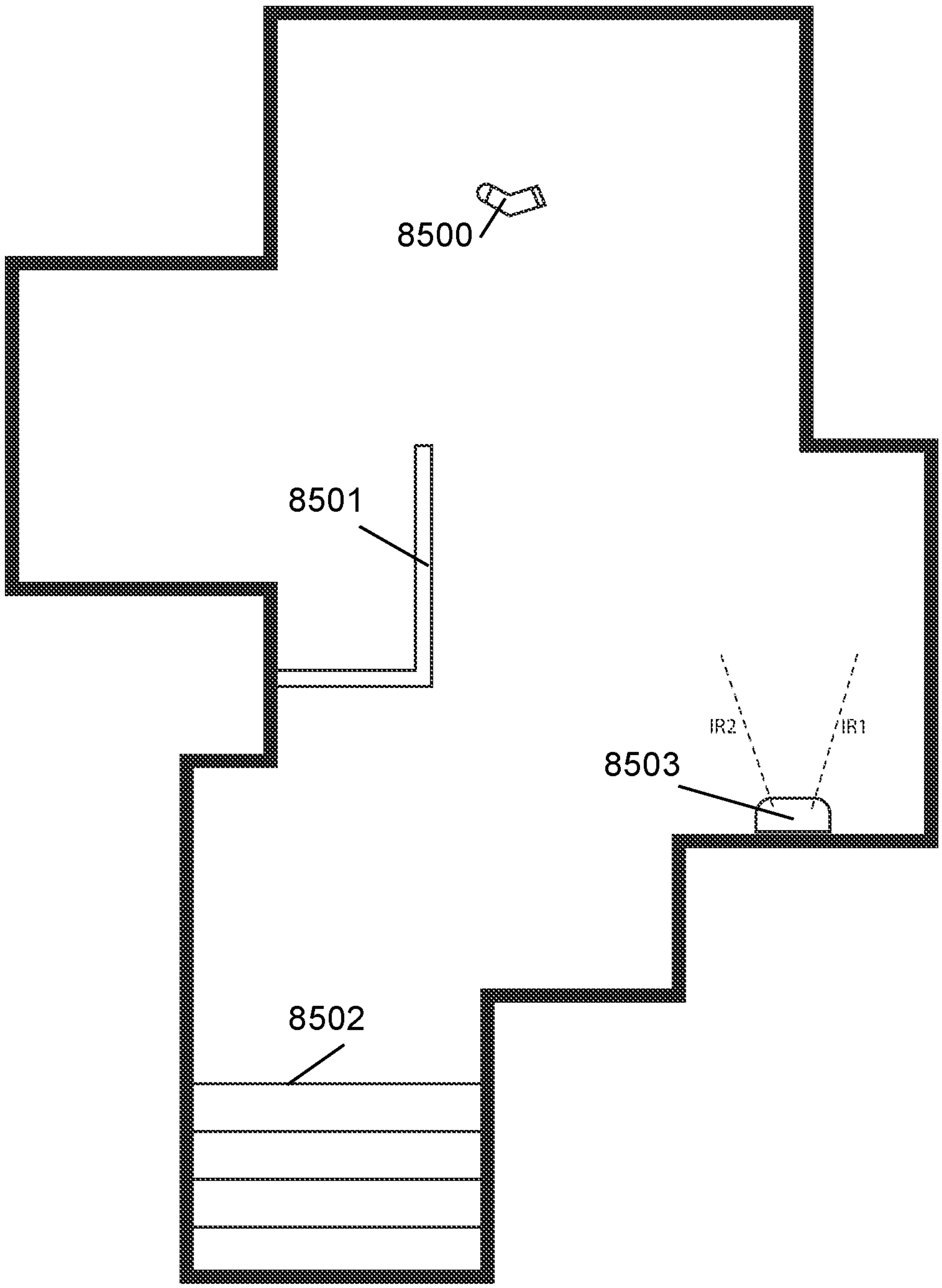

FIG. 201 illustrates an example of different information that may be added to a map, according to some embodiments.

FIGS. 202A, 202B, 203A, 203B, 204A-204D, and 205A-205D illustrate the robot detecting and identifying objects, according to some embodiments.

FIGS. 206A, 206B, 207A-207C, 208A-208C, illustrate identification of an object, according to some embodiments.

Figure 209:
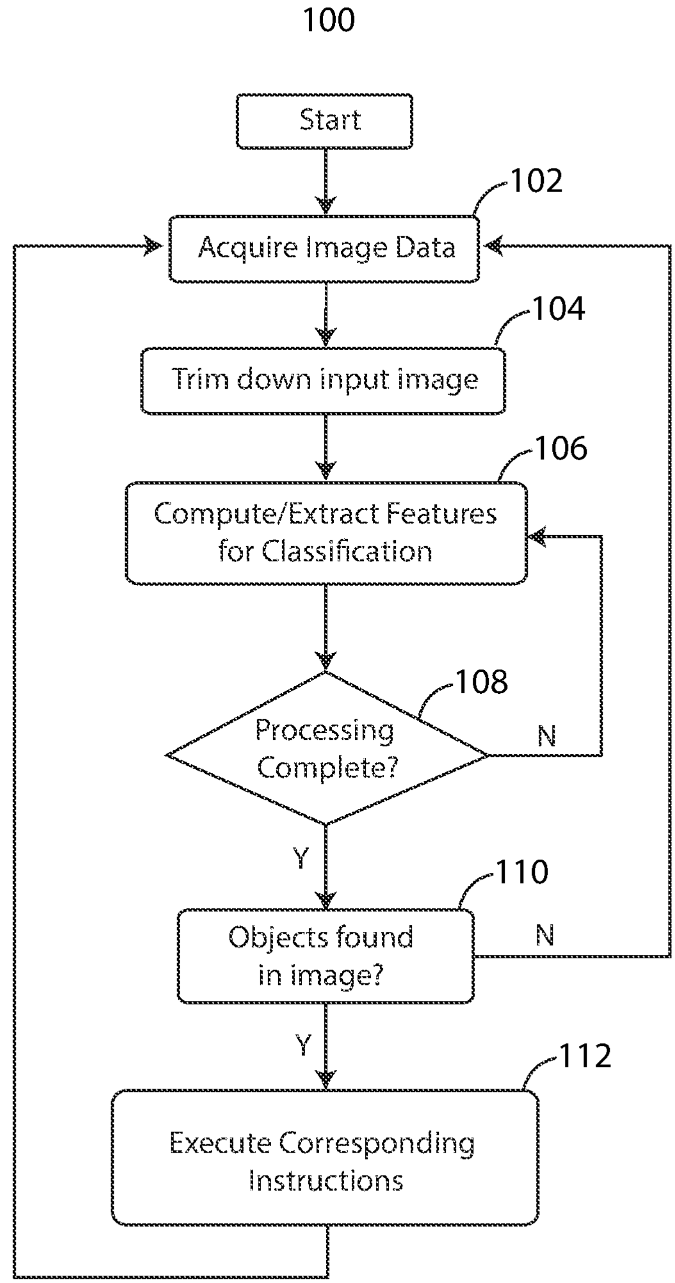

FIG. 209 illustrates an example of a process for identifying objects, according to some embodiments.

FIGS. 210A-210E, 211A-211E, and 212A-212F illustrate examples of facial recognition, according to some embodiments.

Figure 213A:
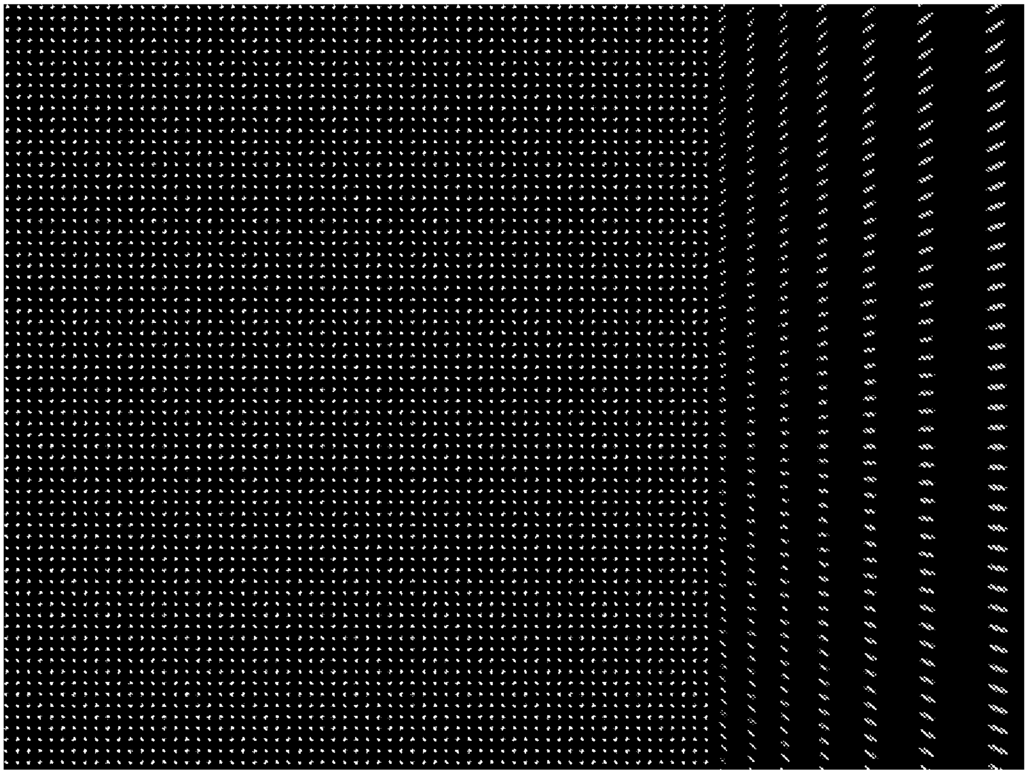
Figure 213B:
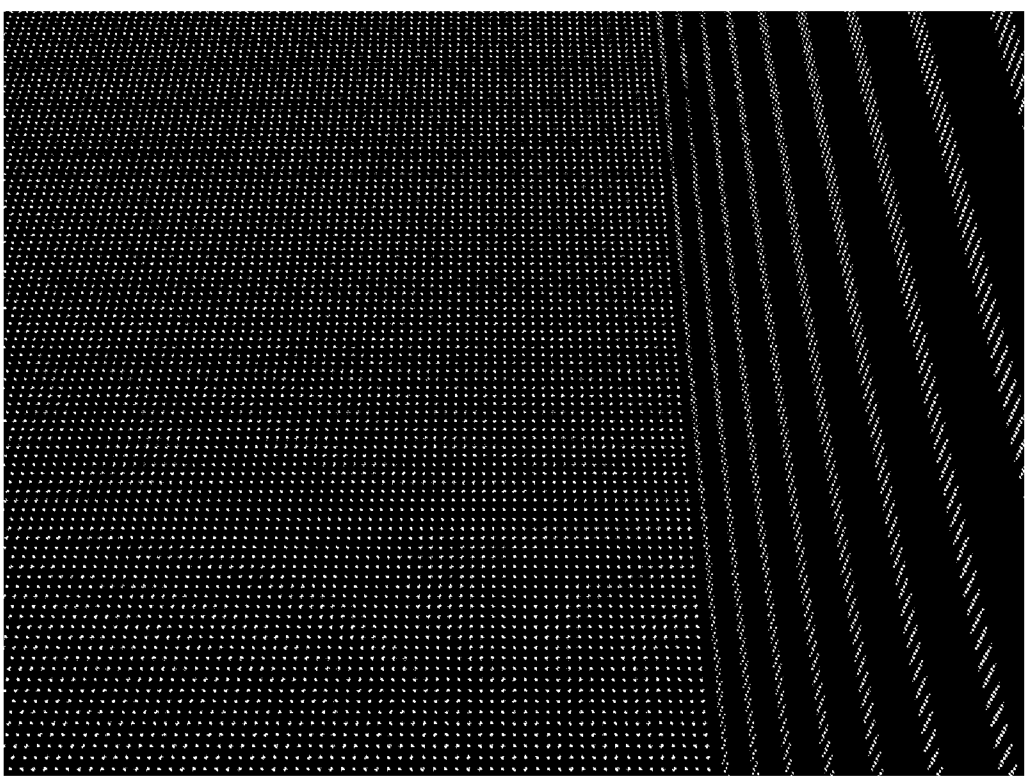

FIGS. 213A and 213B illustrate an example of identifying a corner, according to some embodiments.

Figure 214:
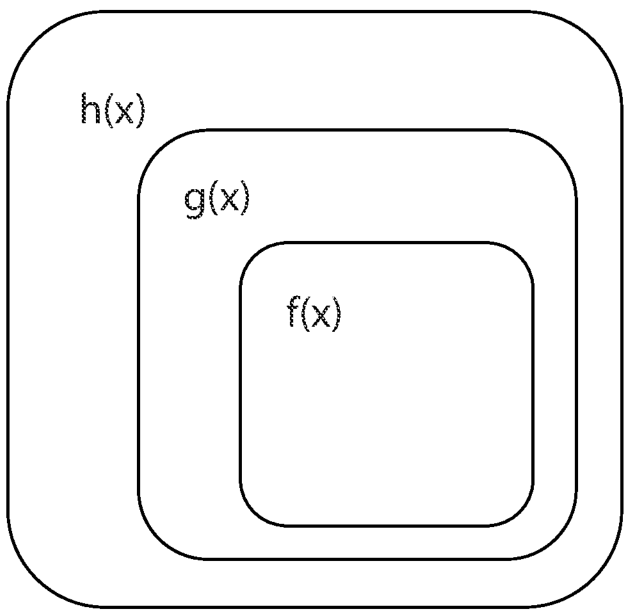

FIG. 214 illustrates a visualization of the chain rule.

Figure 215:
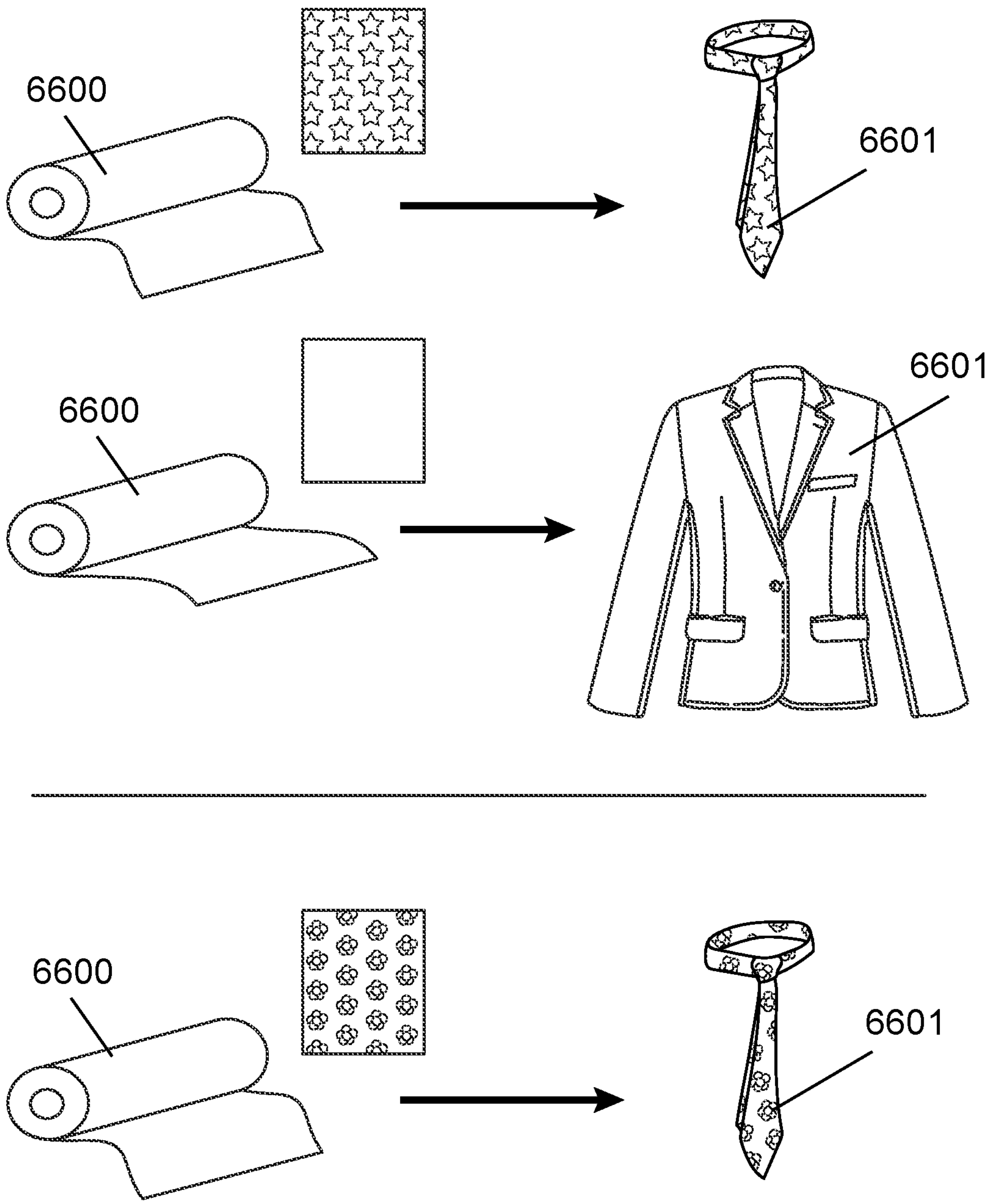

FIG. 215 illustrates a visualization of only knowing input and output of a system.

Figure 216:
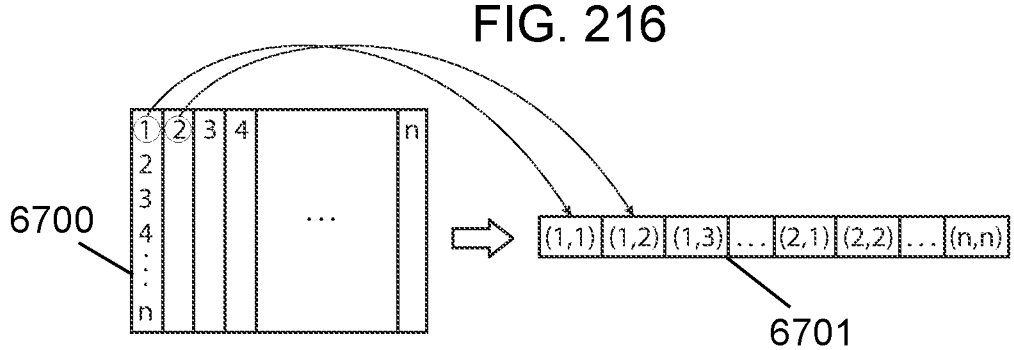

FIG. 216 illustrates an example of flattening a two dimensional image array, according to some embodiments.

Figure 217:
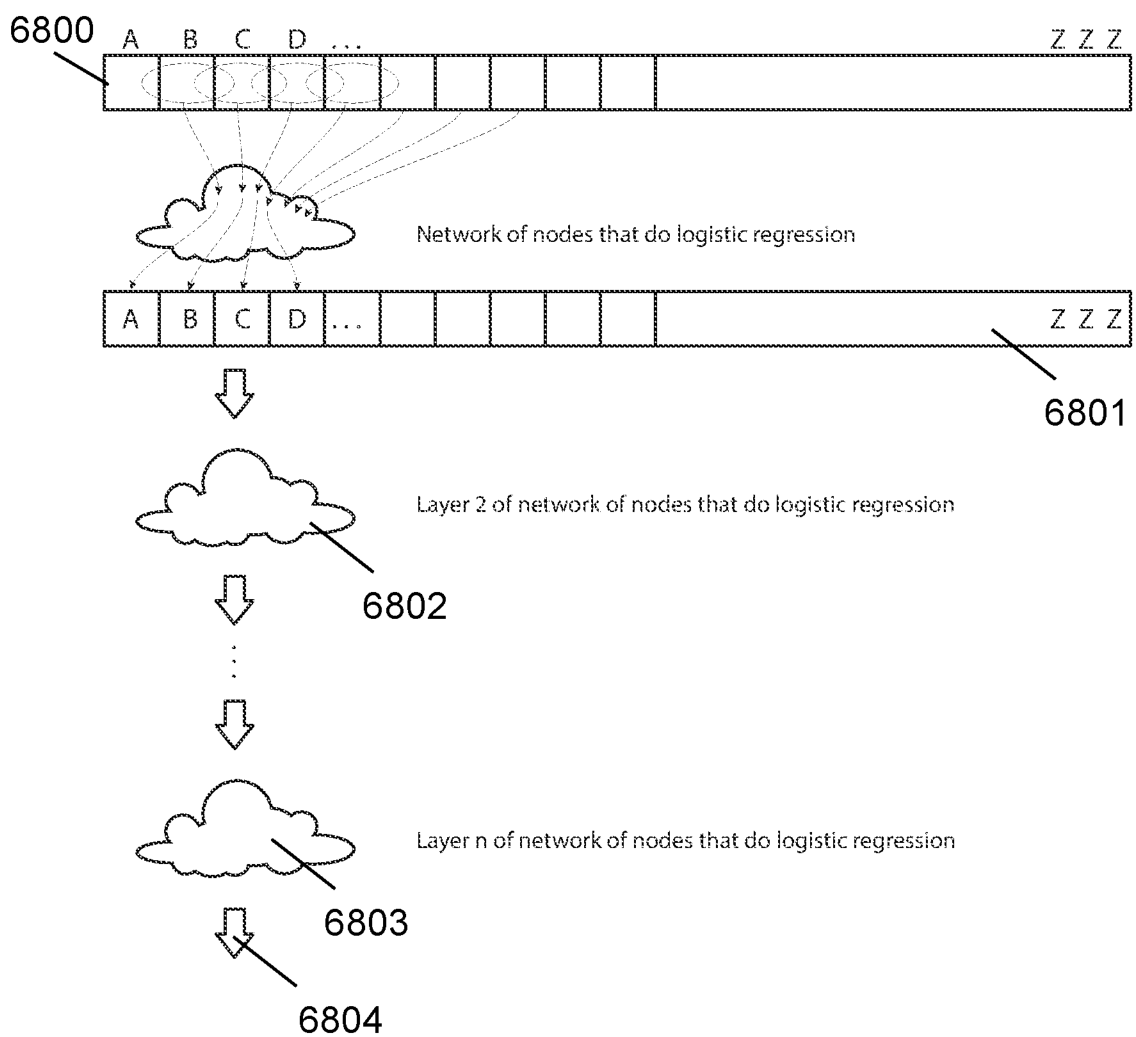

FIG. 217 illustrates an example of providing an input into a network, according to some embodiments.

Figure 218:
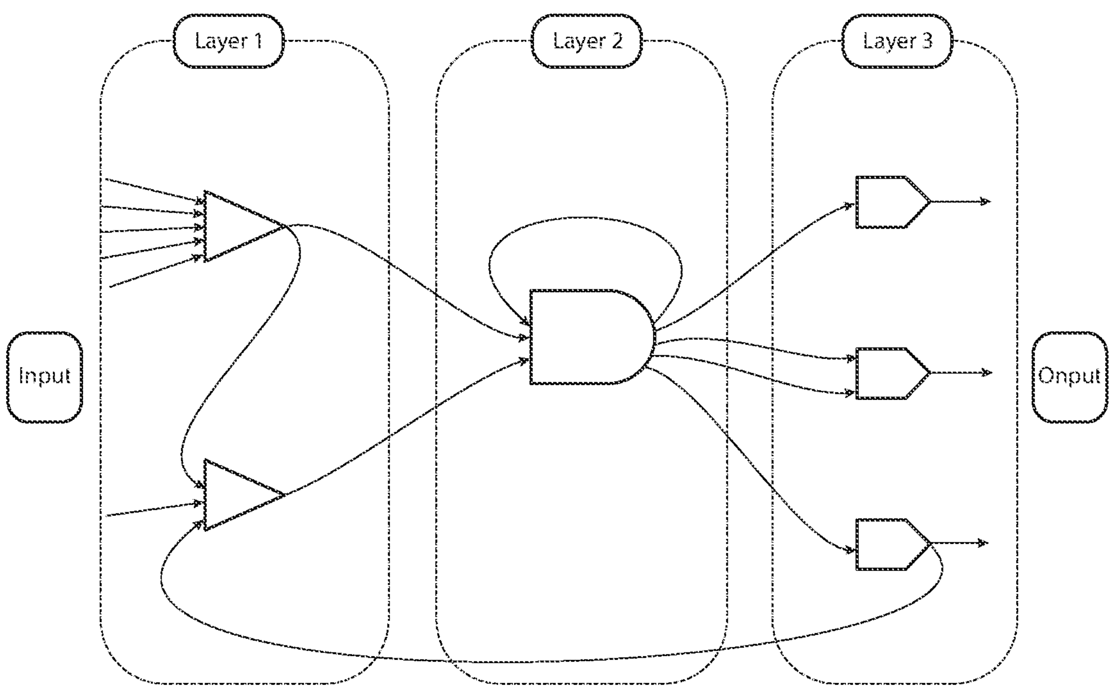

FIG. 218 illustrates an example of a three layer network, according to some embodiments.

Figure 219A:
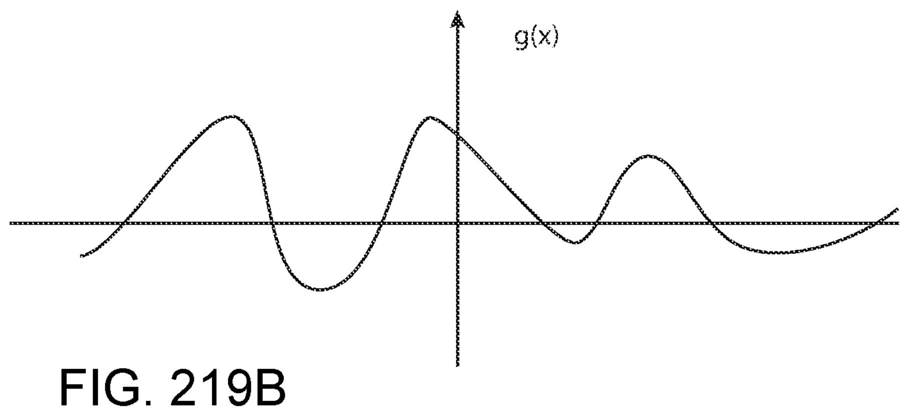
Figure 219B:
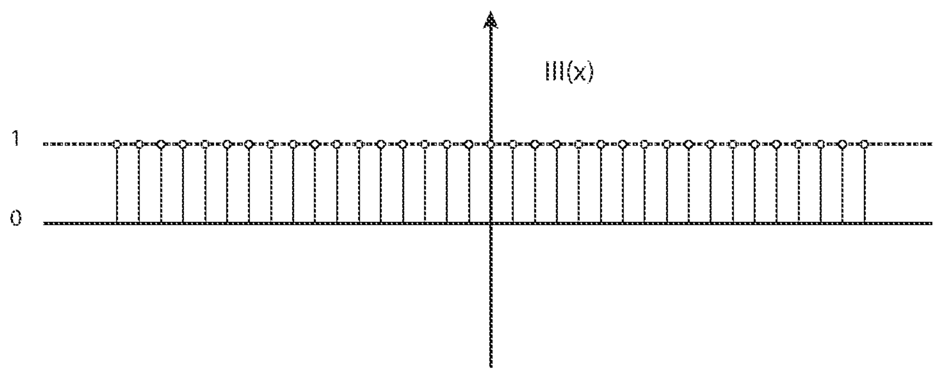
Figure 219C:
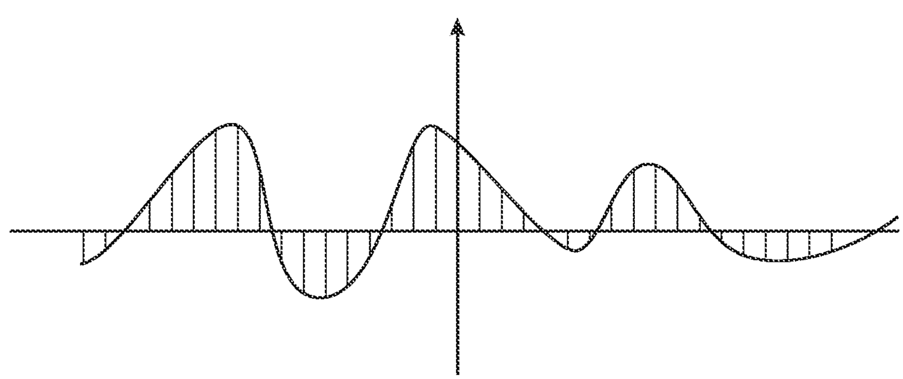

FIGS. 219A-219C illustrate multiplying a continuous function with a comb function.

Figure 220:
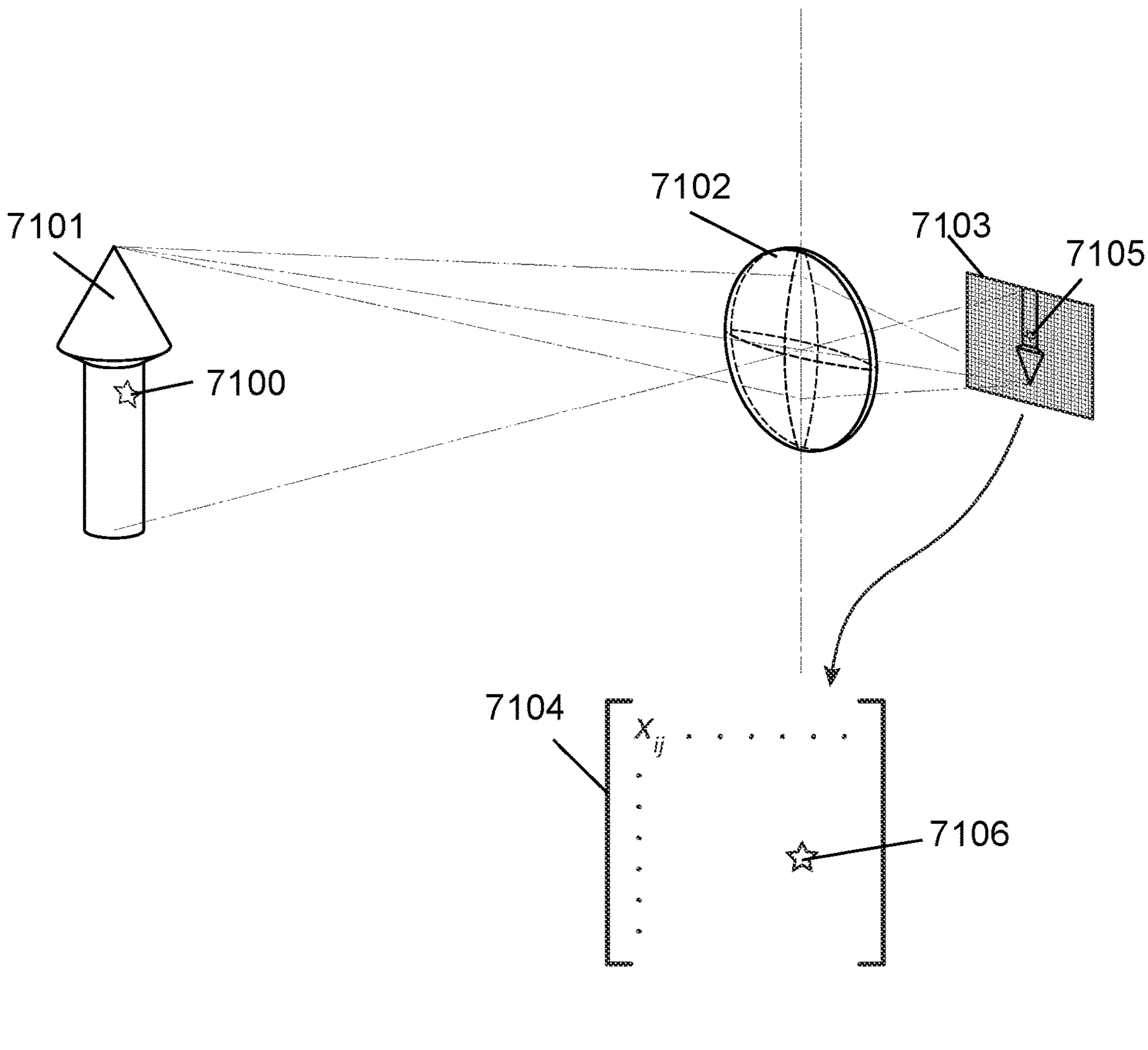

FIG. 220 illustrates an example of illumination of a point on an object, according to some embodiments.

Figure 221:
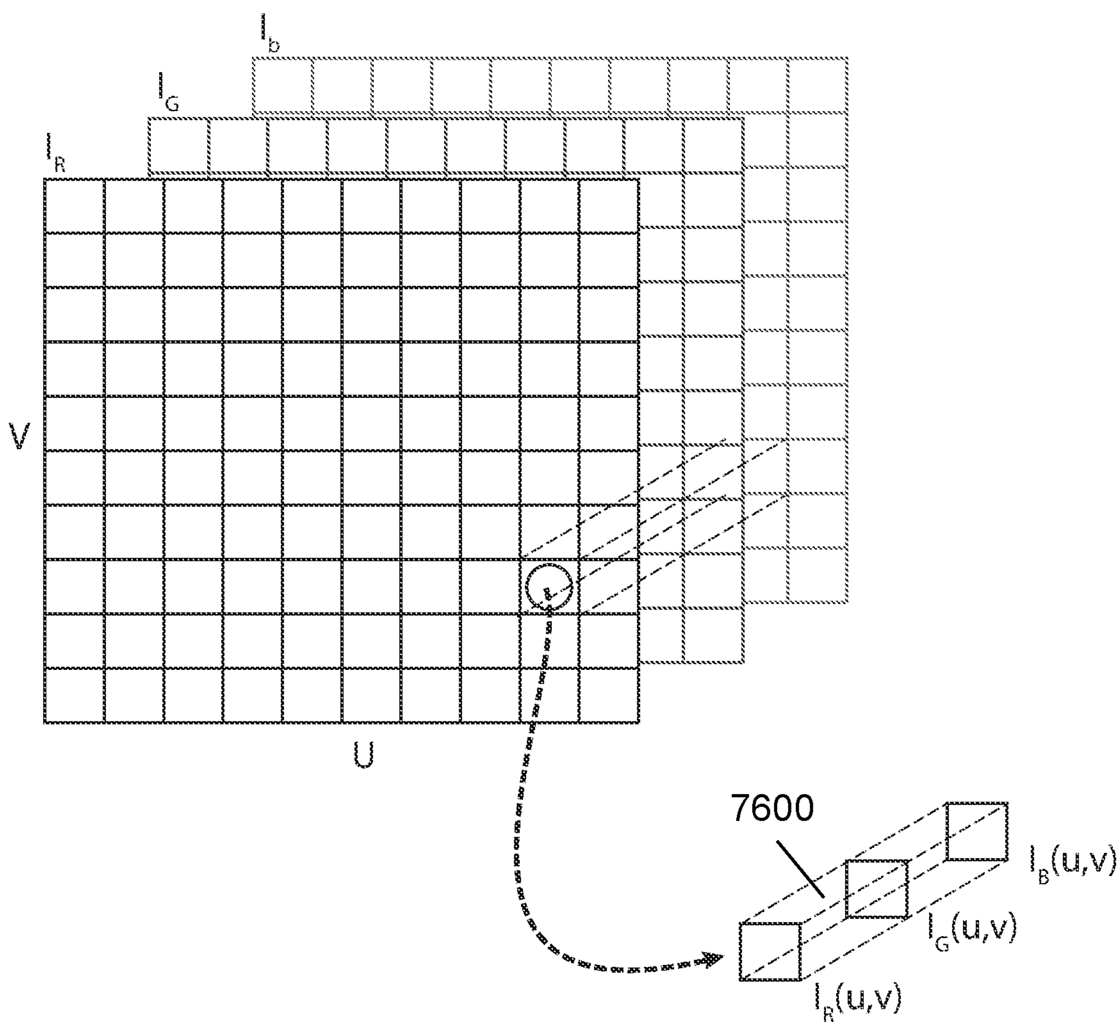
Figure 222:
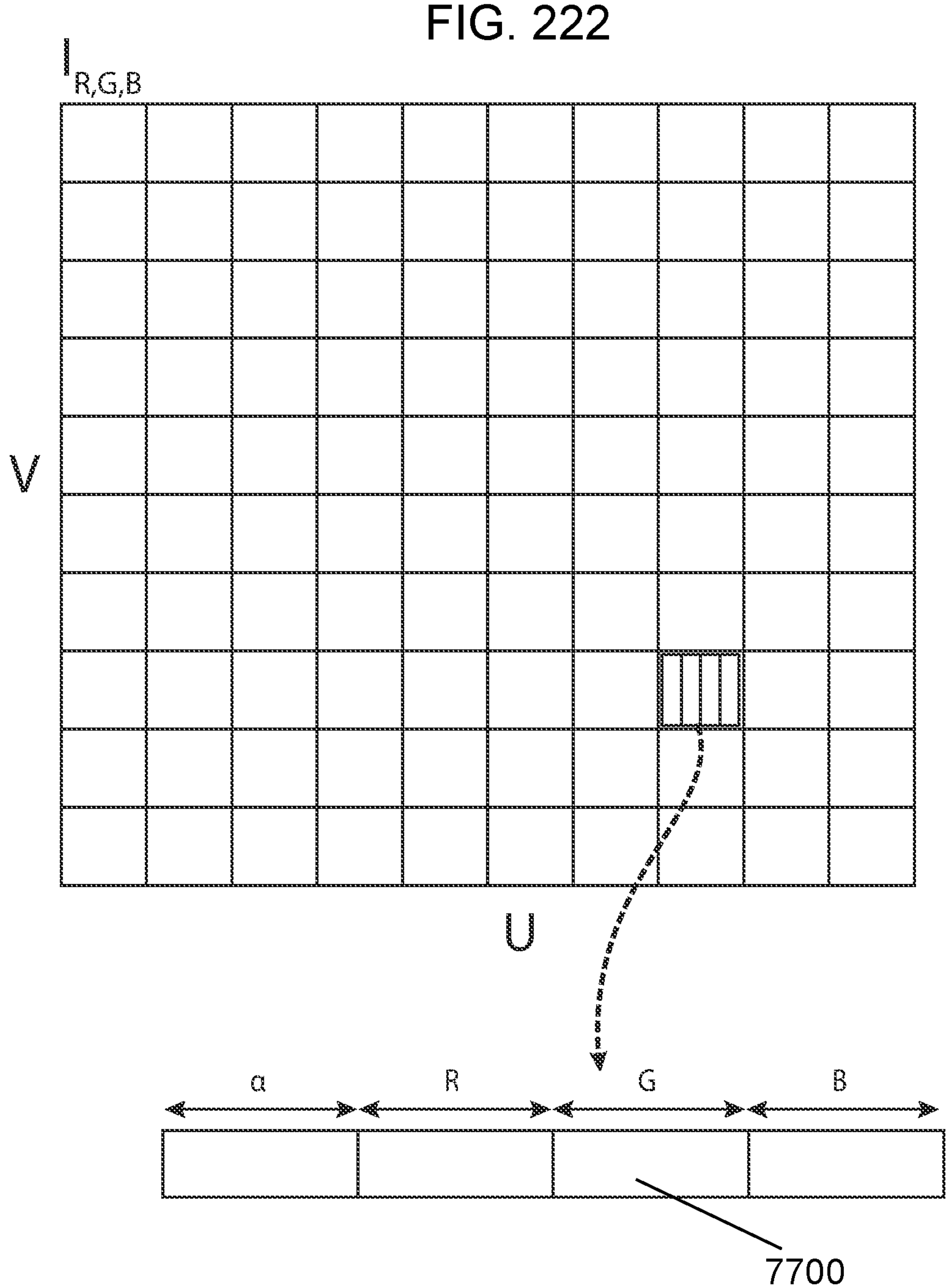

FIGS. 221 and 222 illustrate an example image arrays, according to some embodiments.

FIGS. 223A-223C illustrate examples of representing an image, according to some embodiments.

FIGS. 224A-224G illustrate examples of different mesh densities, according to some embodiments.

FIGS. 224H-224K and 224N illustrate examples of different structured light densities, according to some embodiments.

Figure 224A:
Figure 224B:
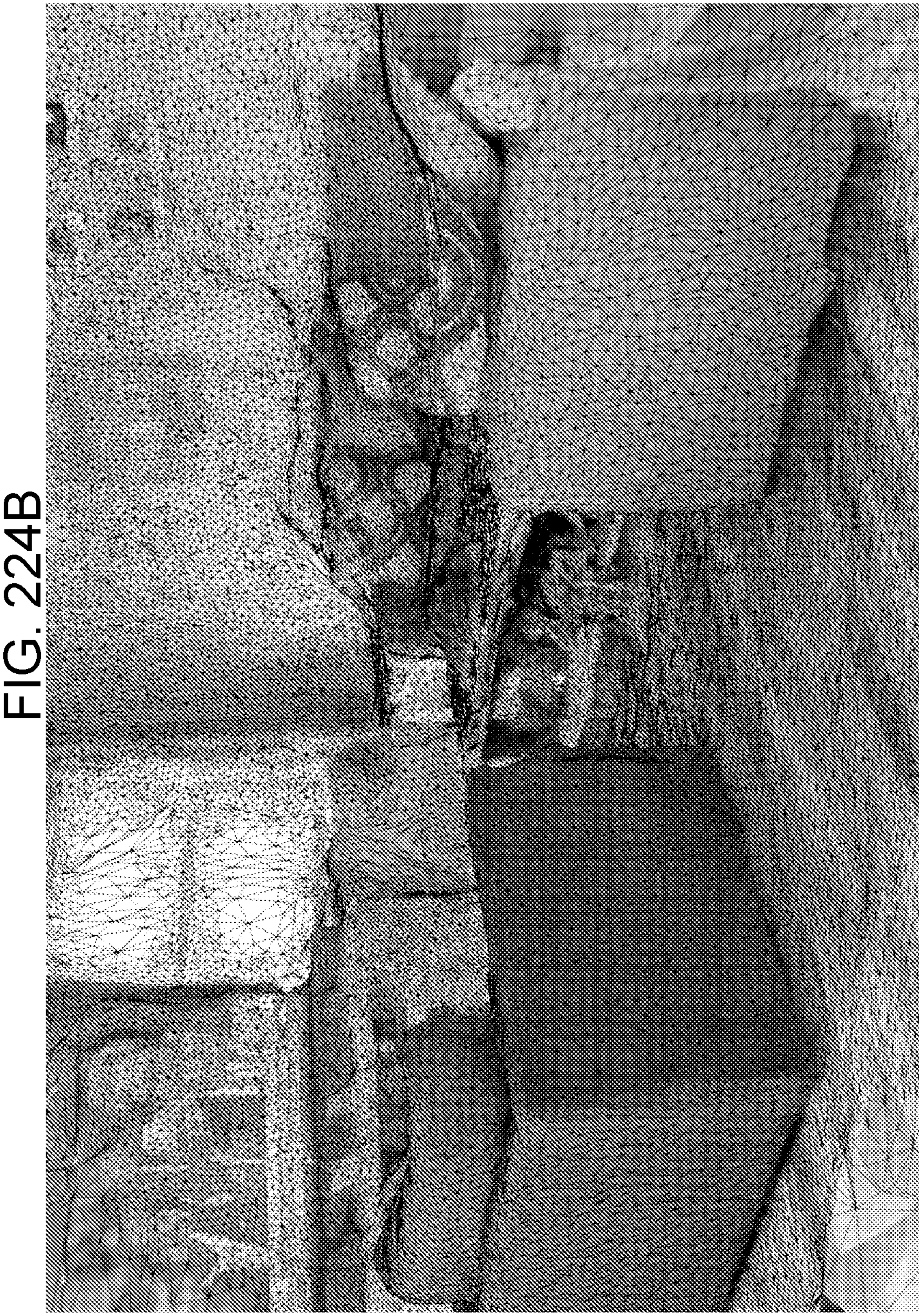
Figure 224C:
Figure 224D:
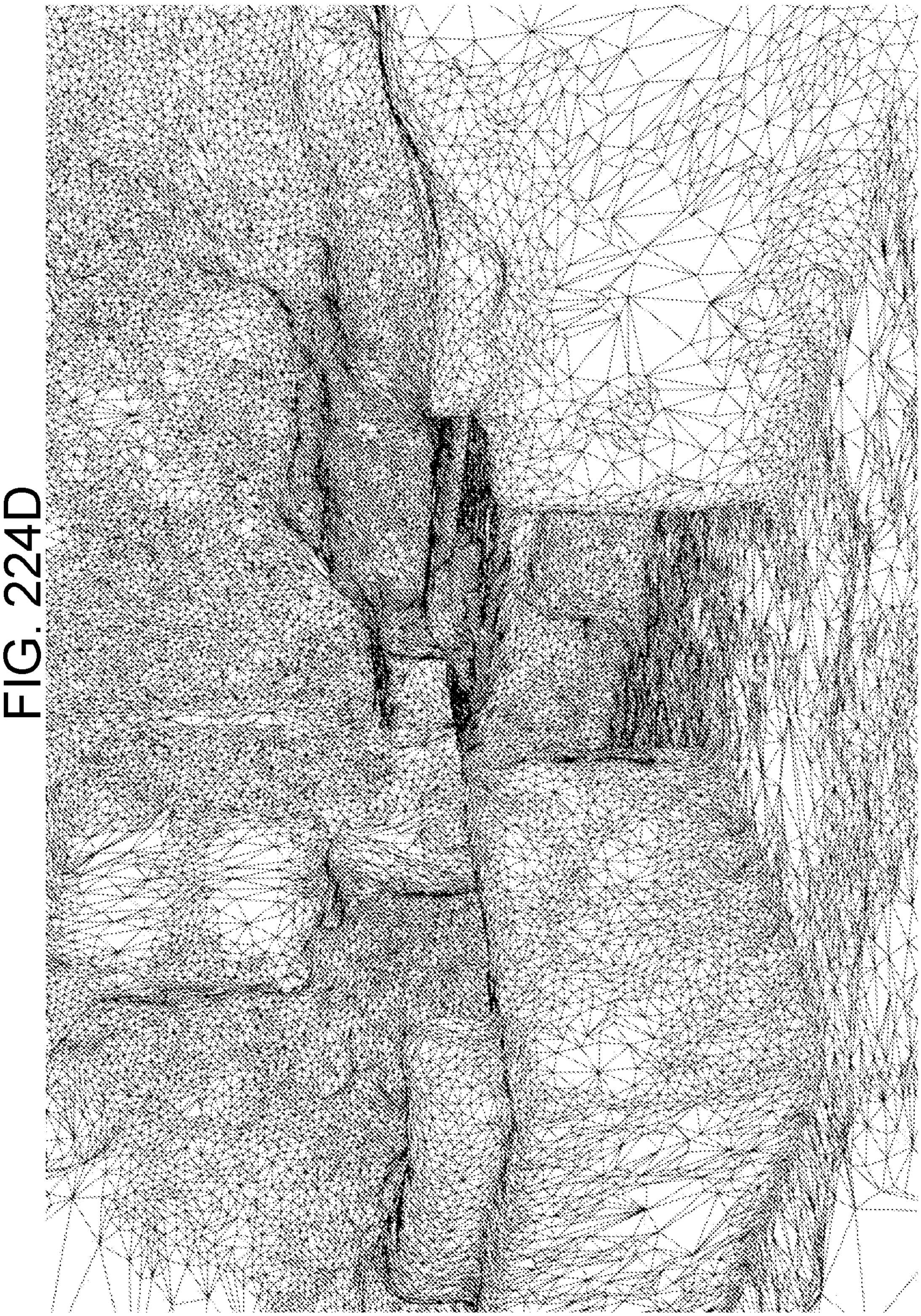
Figure 224E:
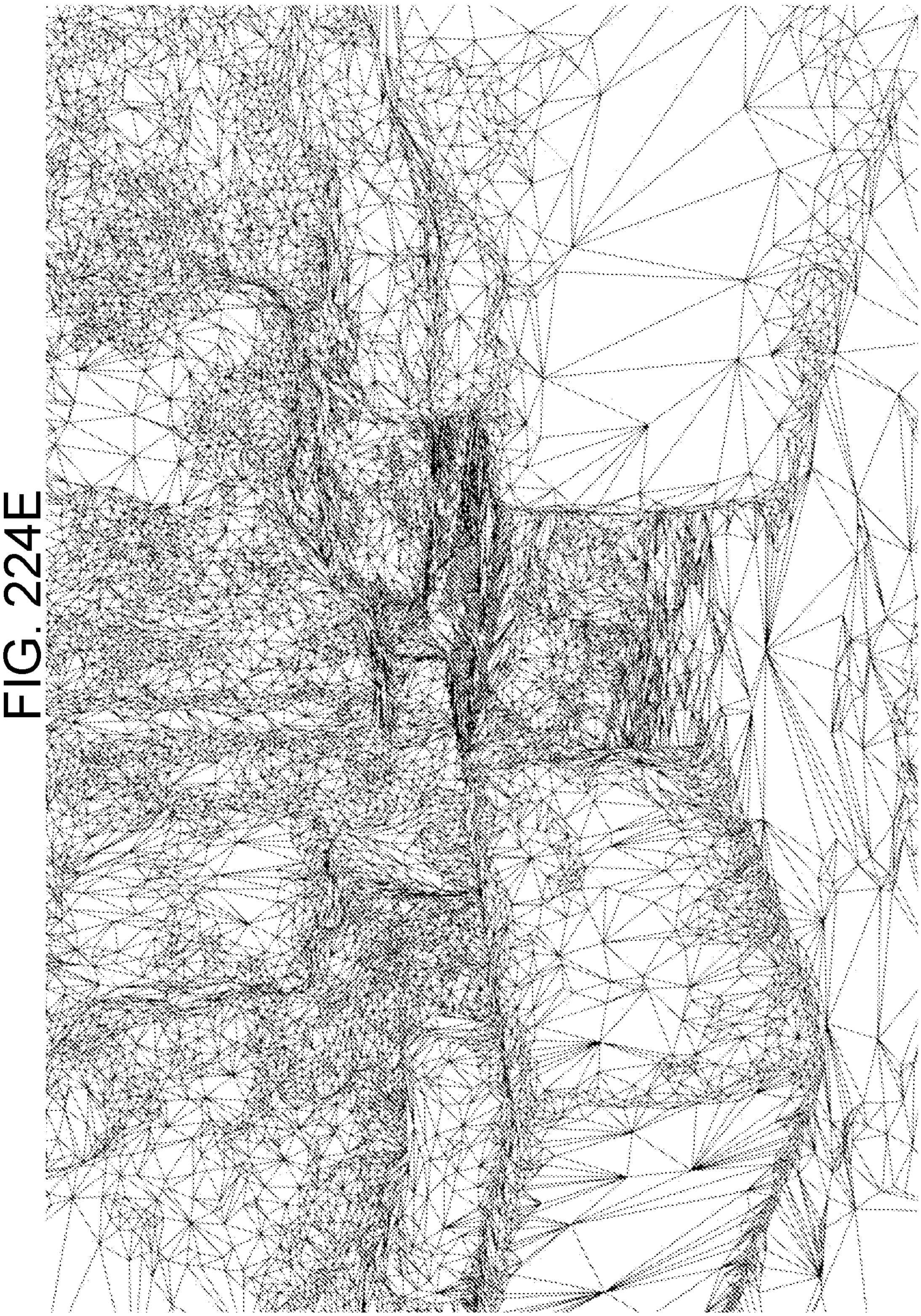
Figure 224F:
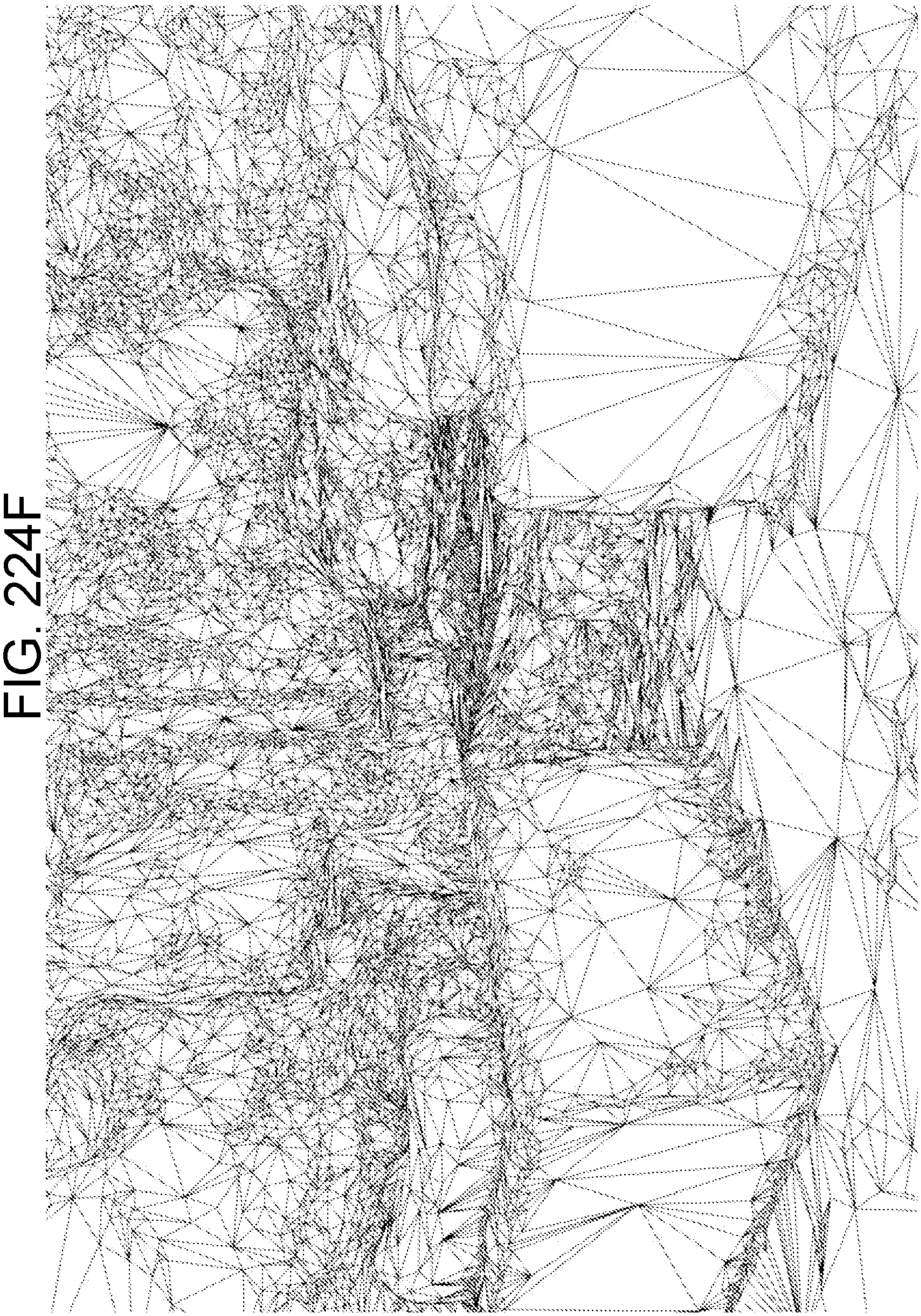
Figure 224G:
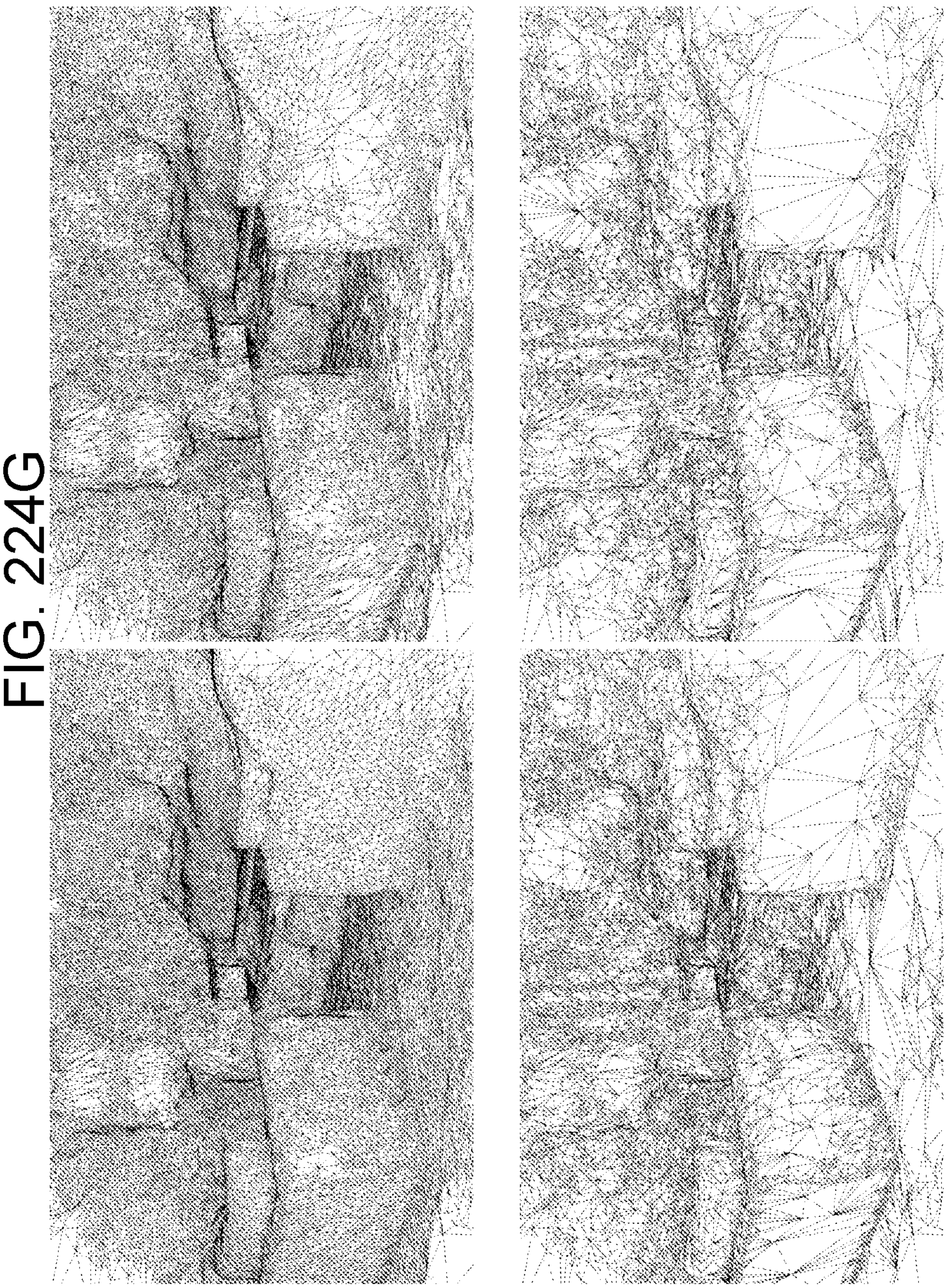
Figure 224H:
Figure 224I:
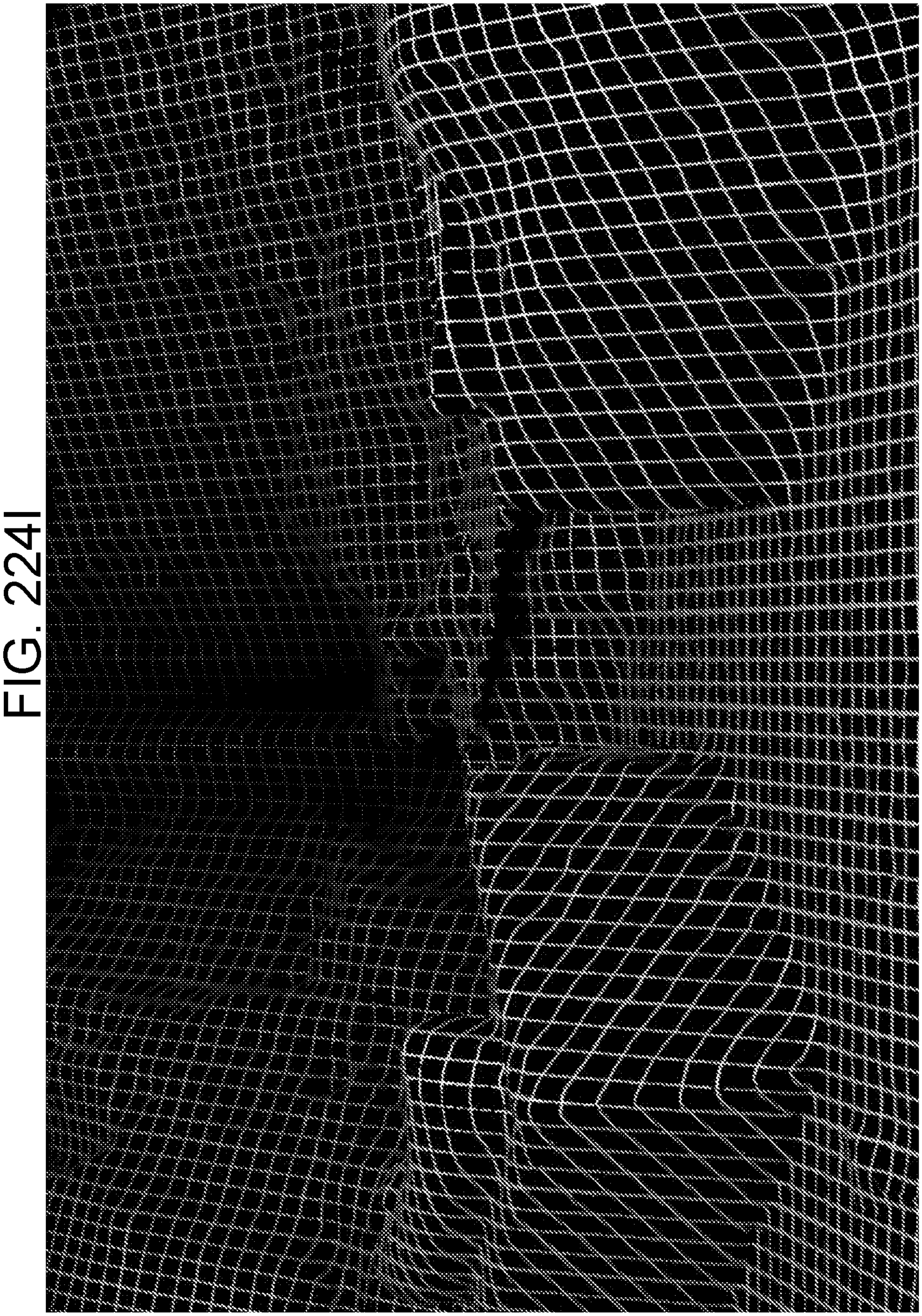
Figure 224J:
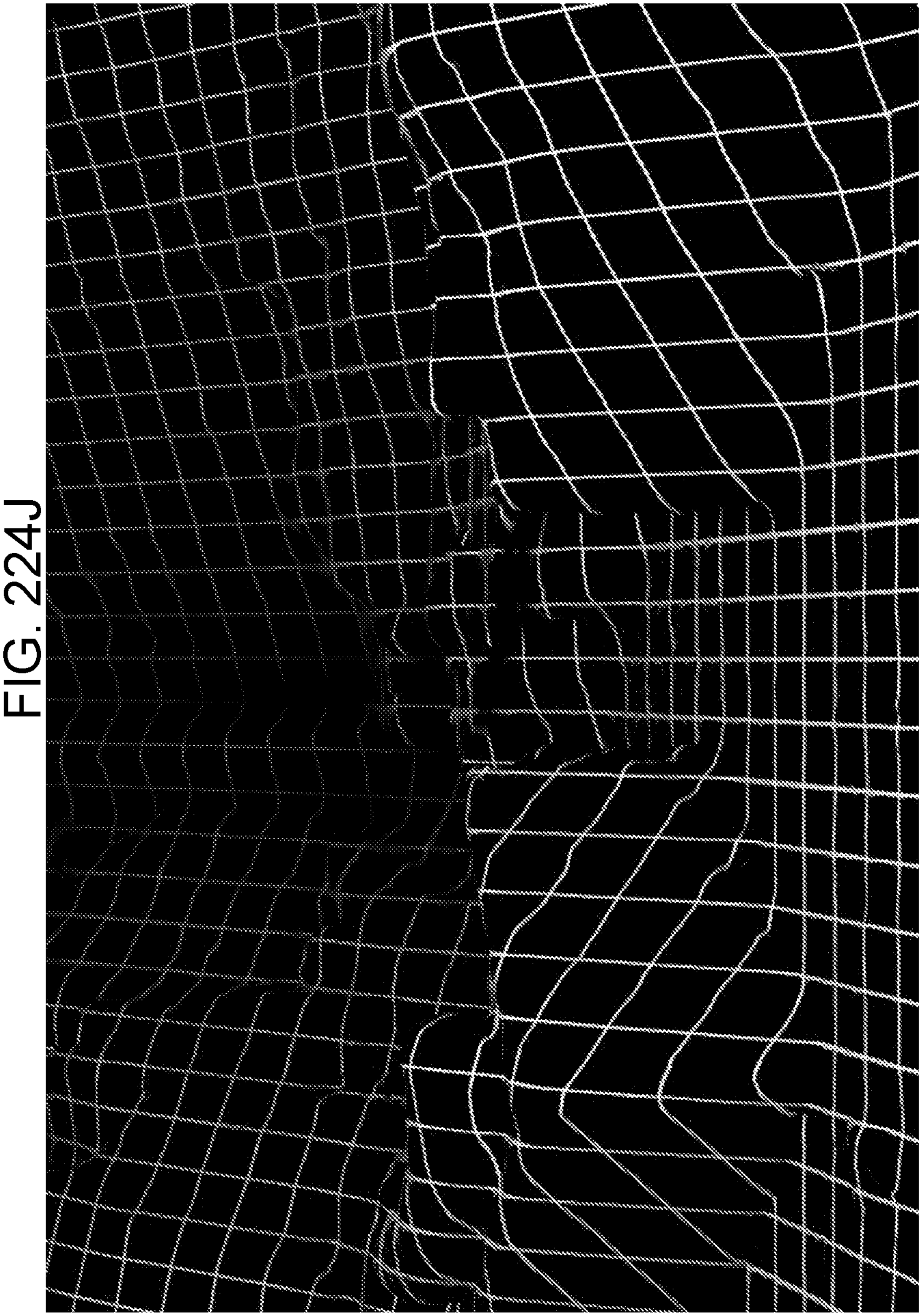
Figure 224K:
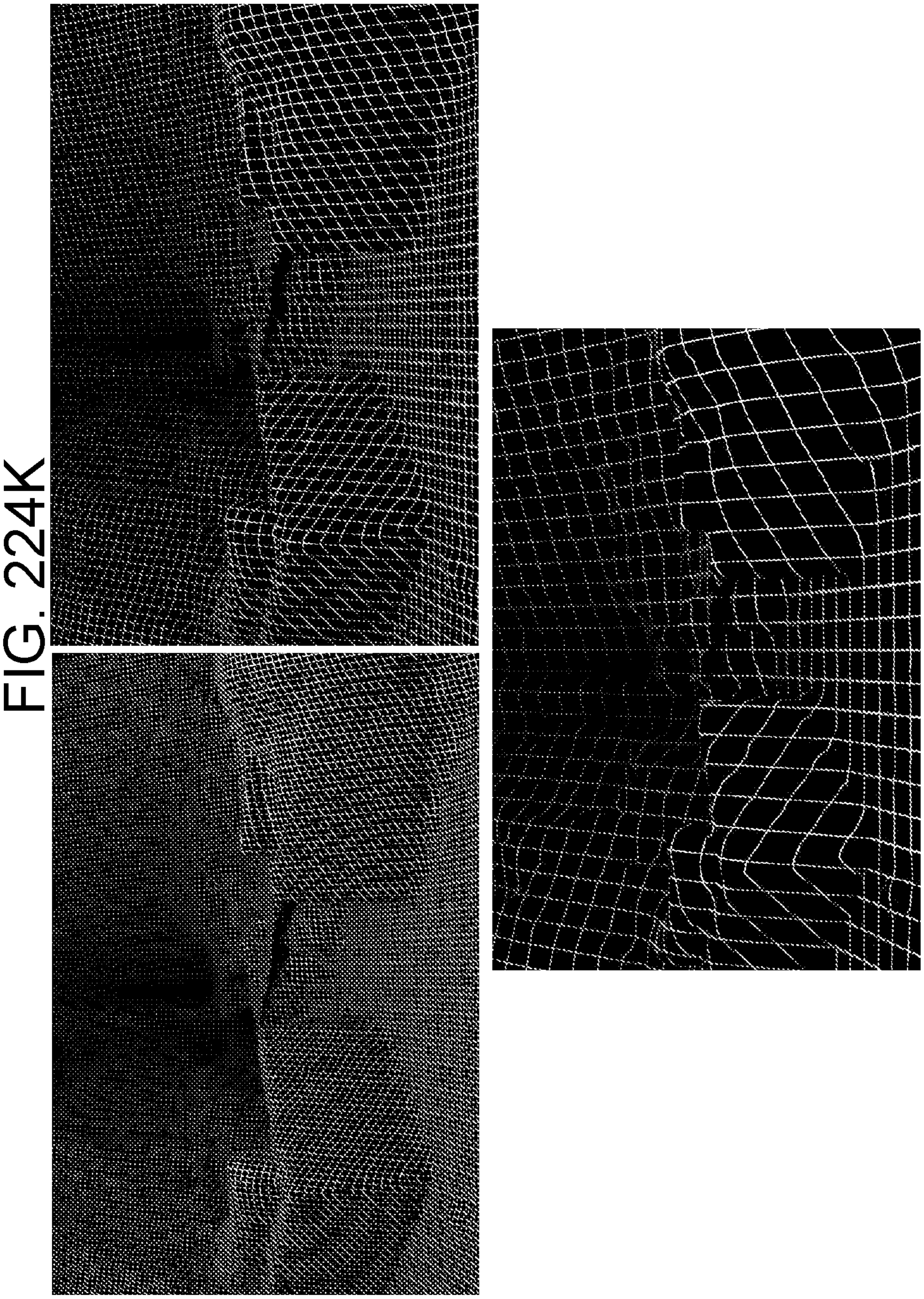
Figure 224L:
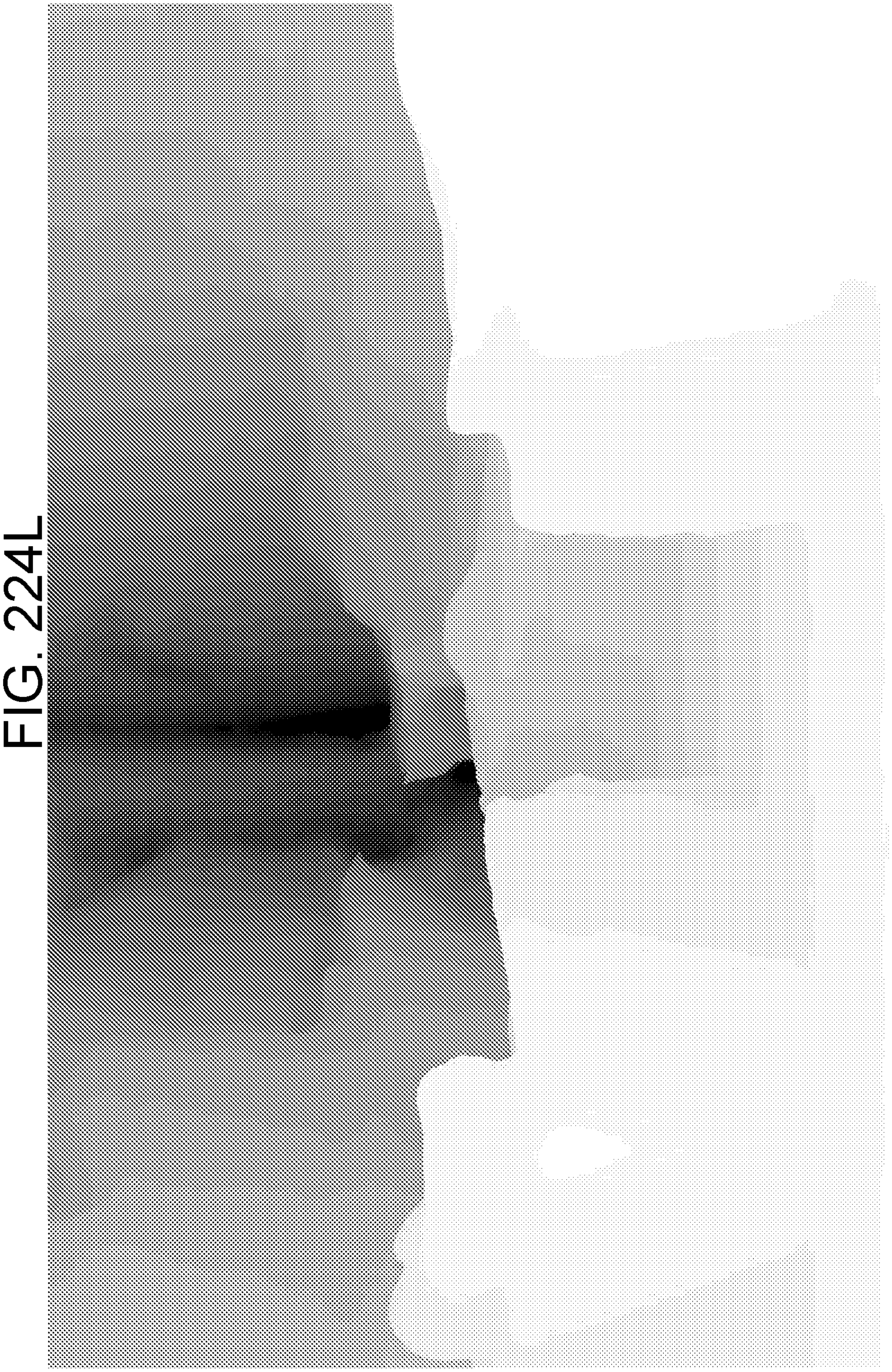
Figure 224M:

FIGS. 224L and 224M illustrate examples of different methods of representing an environment, according to some embodiments.

FIGS. 225A-225I illustrate examples of different light patterns resulting from different camera and light source configurations, according to some embodiments.

FIGS. 226A-226D illustrate an example of data decomposition, according to some embodiments.

Figures 227A, 227B, 227C:
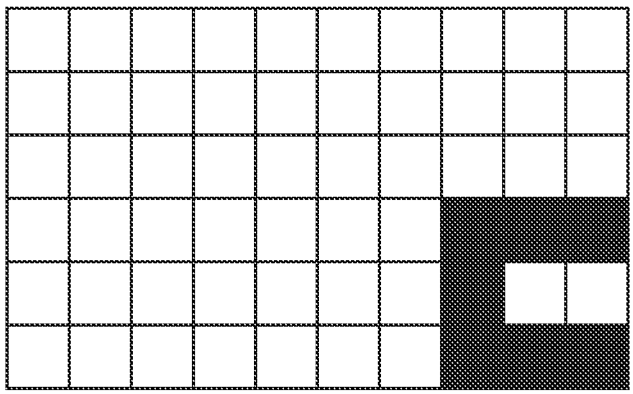

FIGS. 227A-227C illustrate an example of a method for storing an image, according to some embodiments.

FIGS. 228A-228D illustrate an example of collaborating robots, according to some embodiments.

Figure 229:
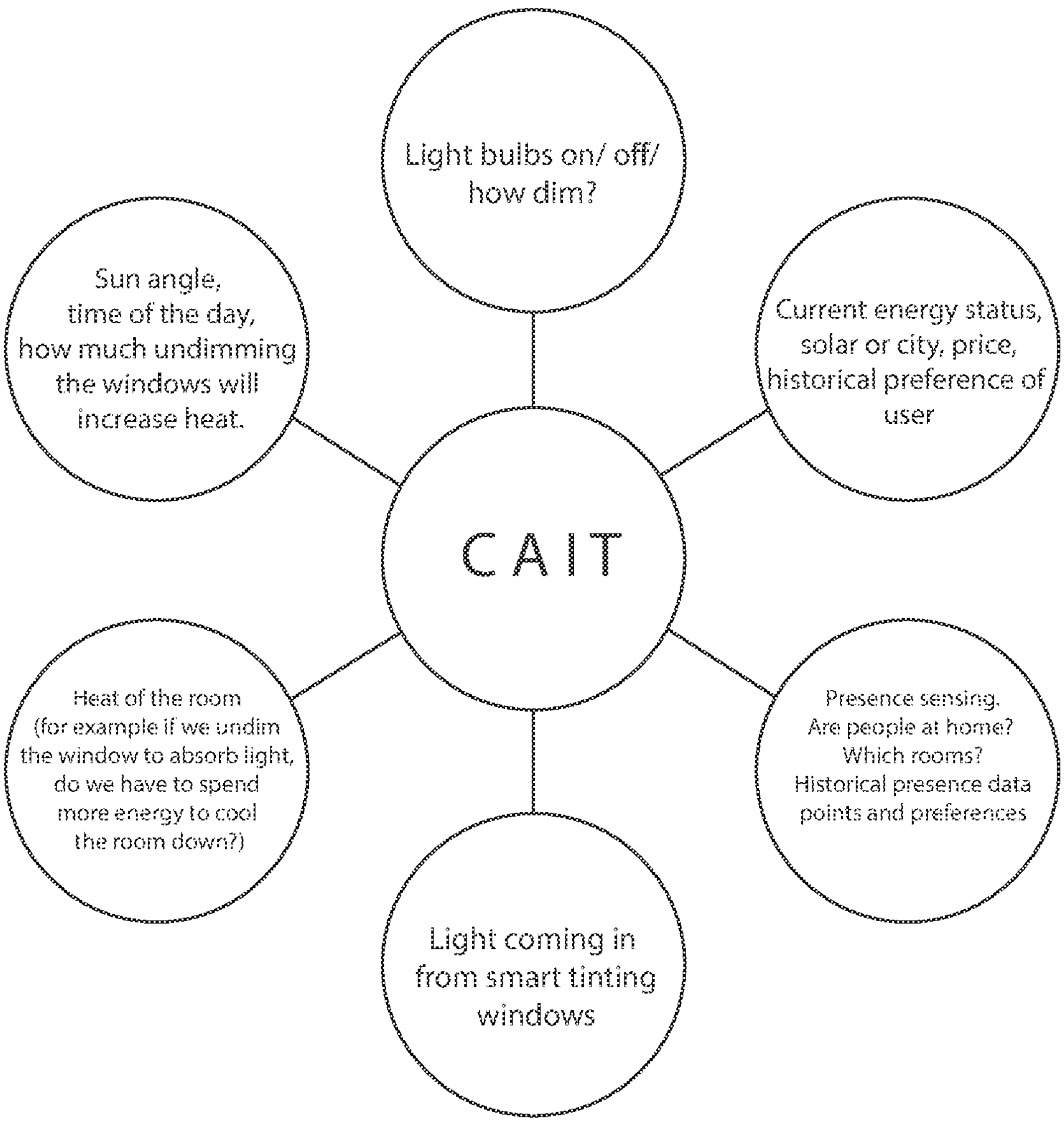

FIG. 229 illustrates an example of CAIT, according to some embodiments.

Figure 230:
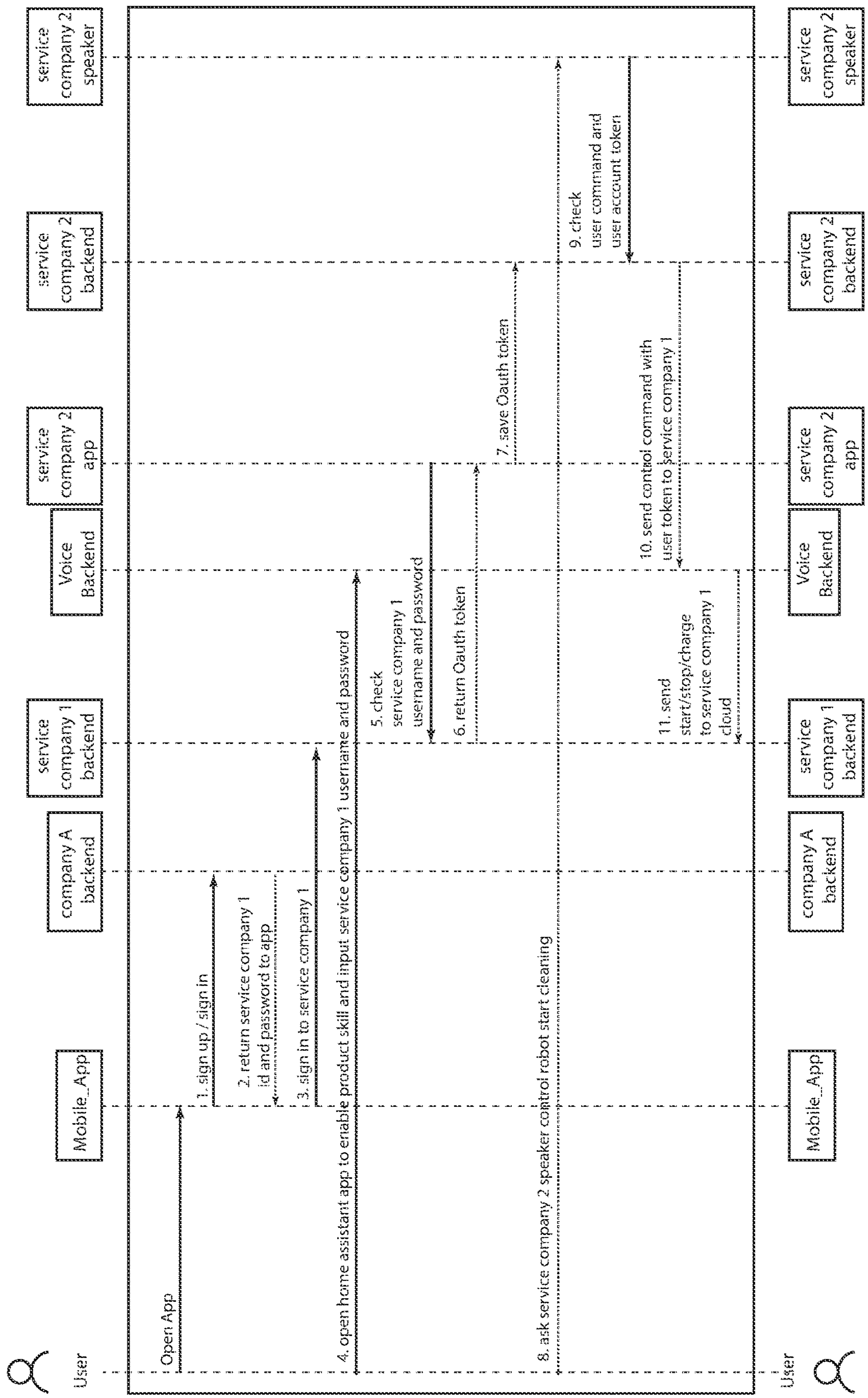

FIG. 230 illustrates a diagram depicting a connection between backend of different companies, according to some embodiments.

Figure 231:
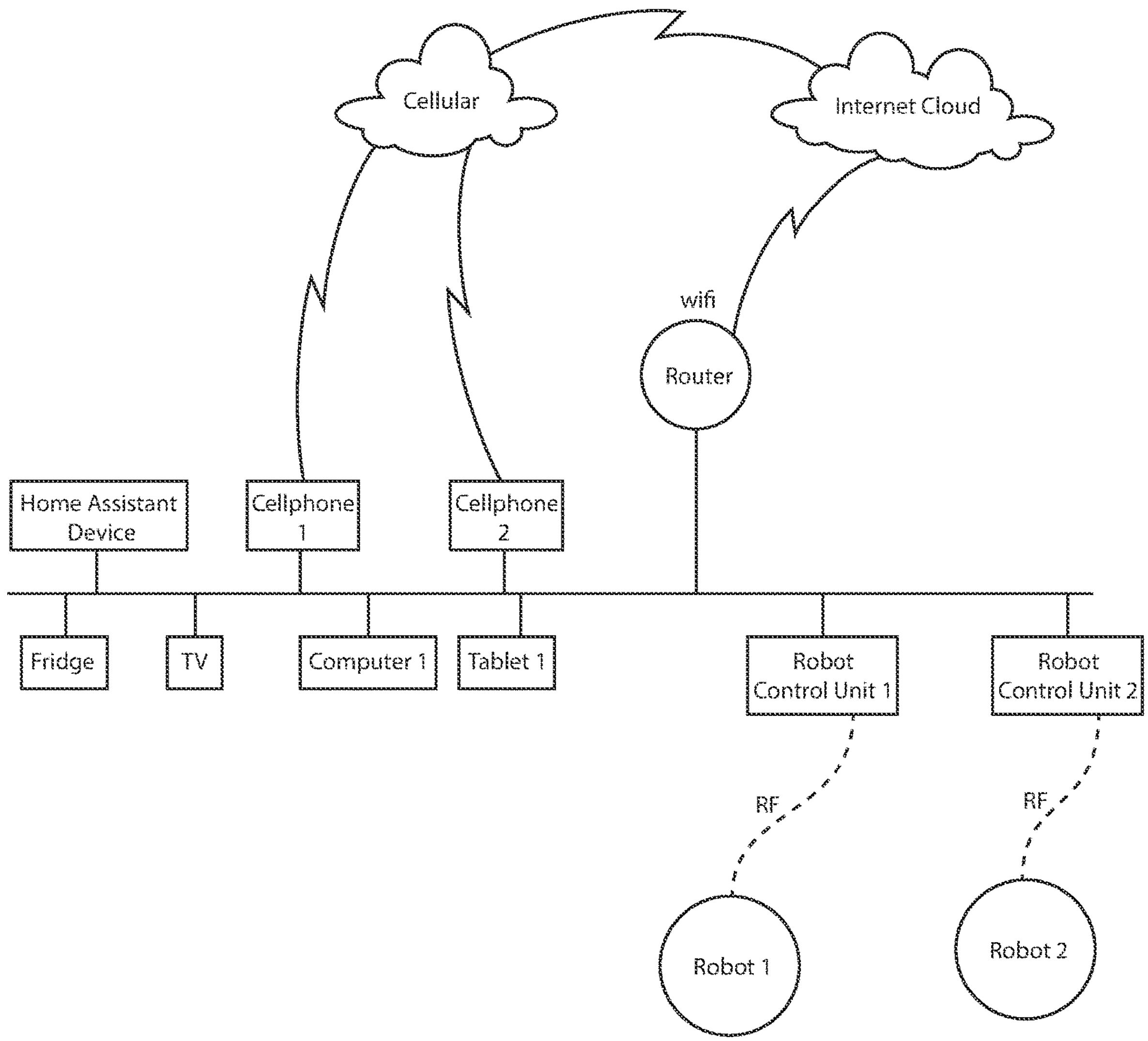

FIG. 231 illustrates an example of a home network, according to some embodiments.

Figure 232A:
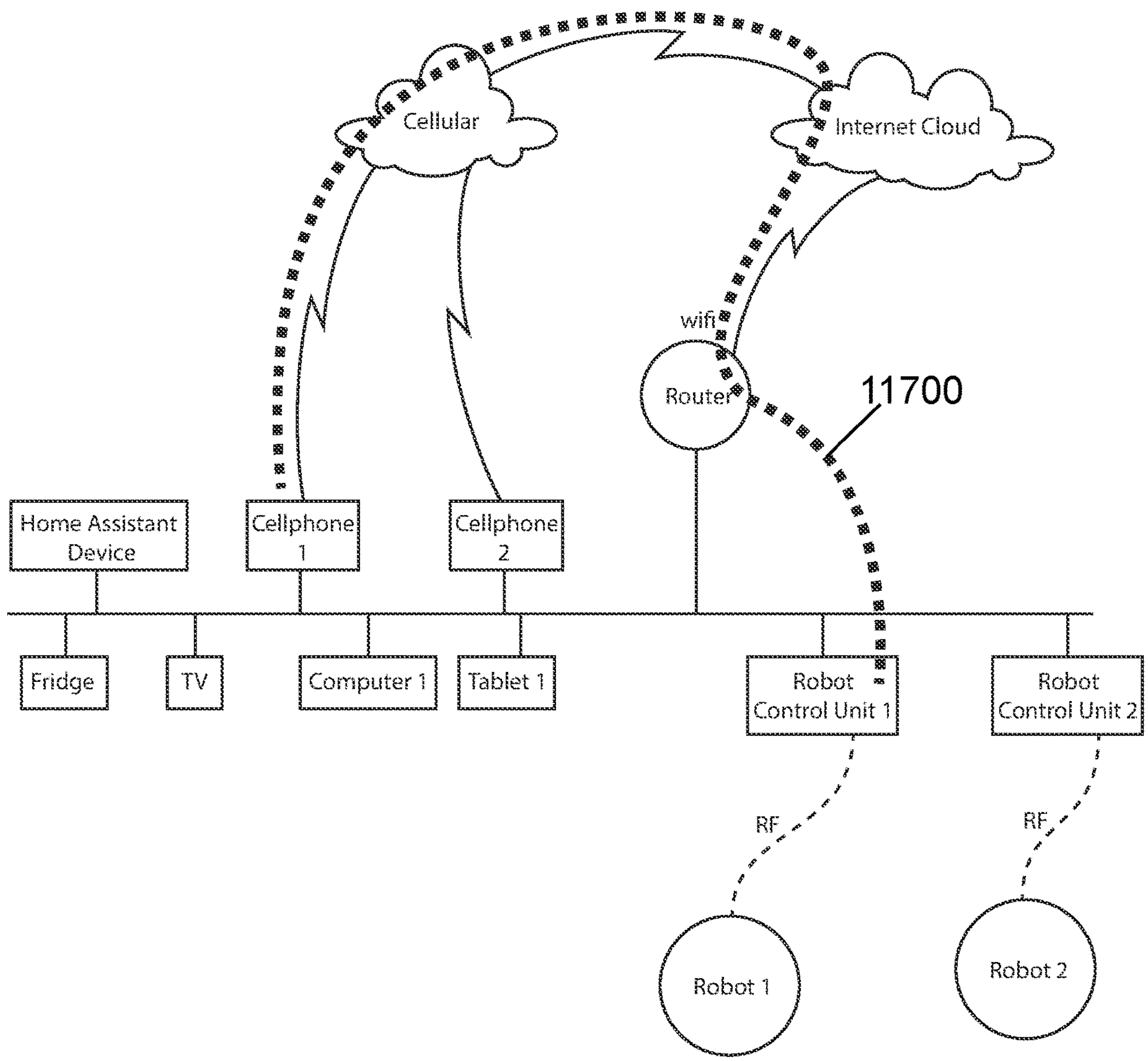
Figure 232B:
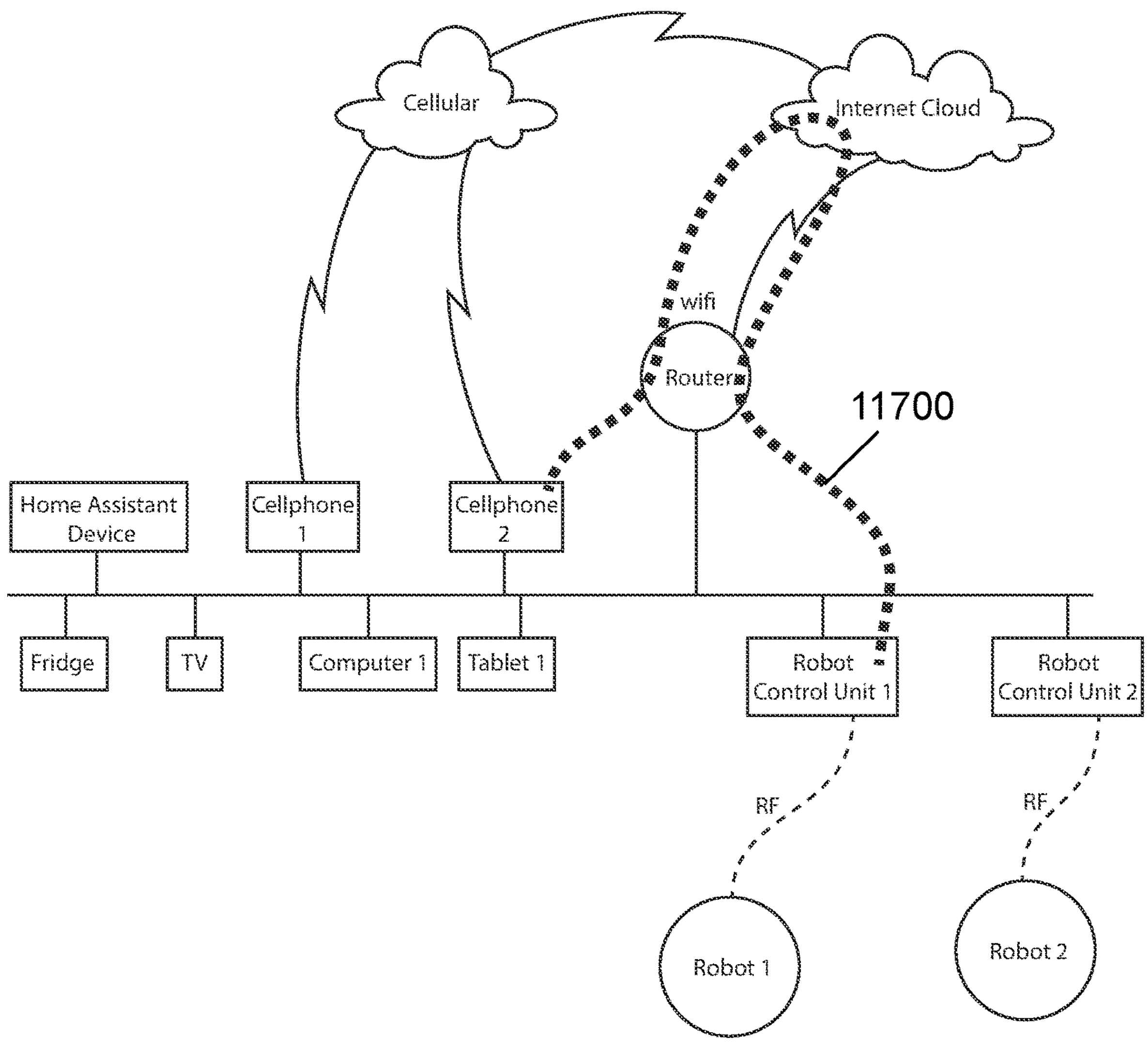

FIGS. 232A and 232B illustrate examples of connection path of devices through the cloud, according to some embodiments.

Figure 233:
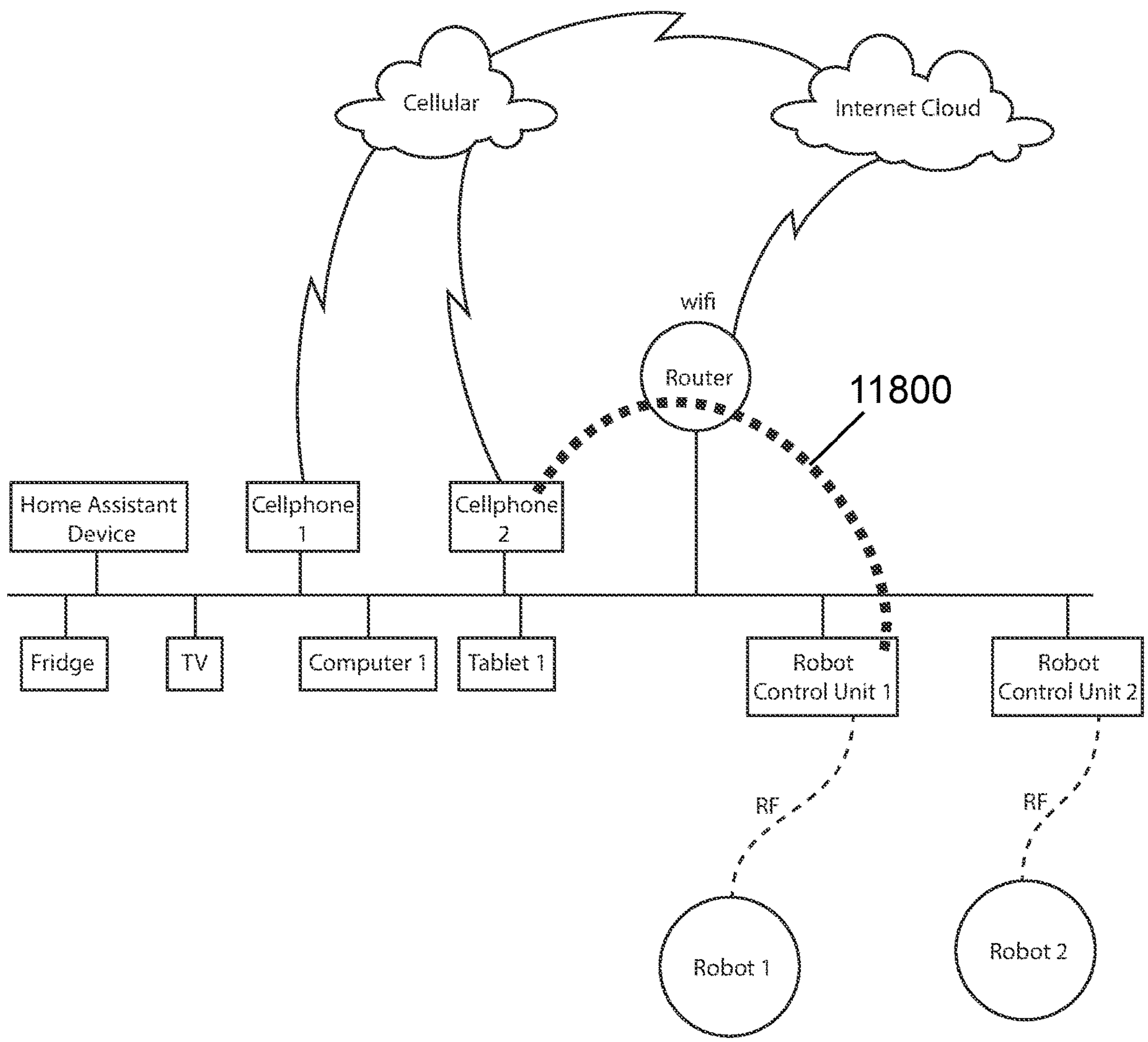

FIG. 233 illustrates an example of local connection path of devices, according to some embodiments.

Figure 234:
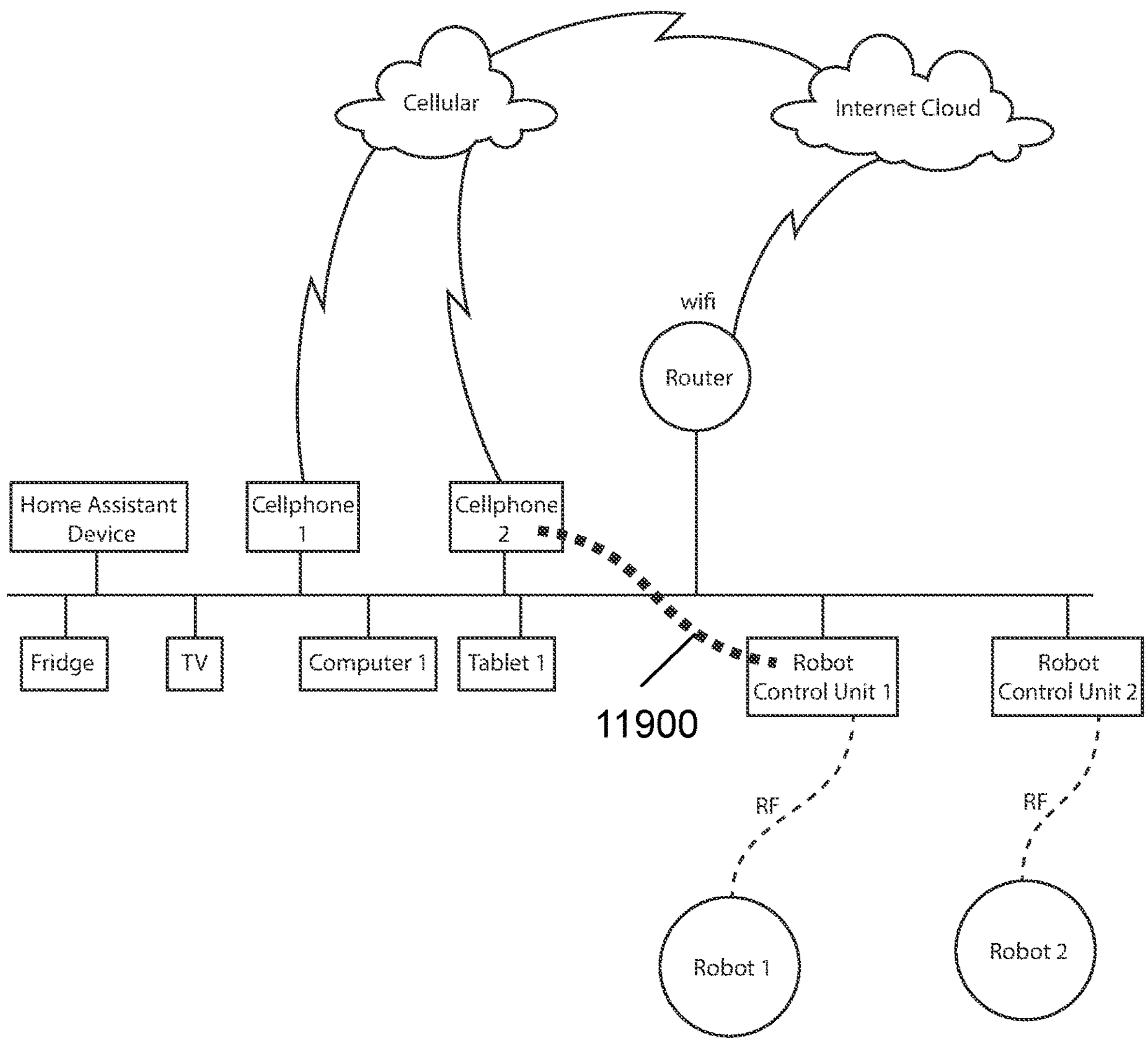

FIG. 234 illustrates direct connection path between devices, according to some embodiments.

Figure 235:
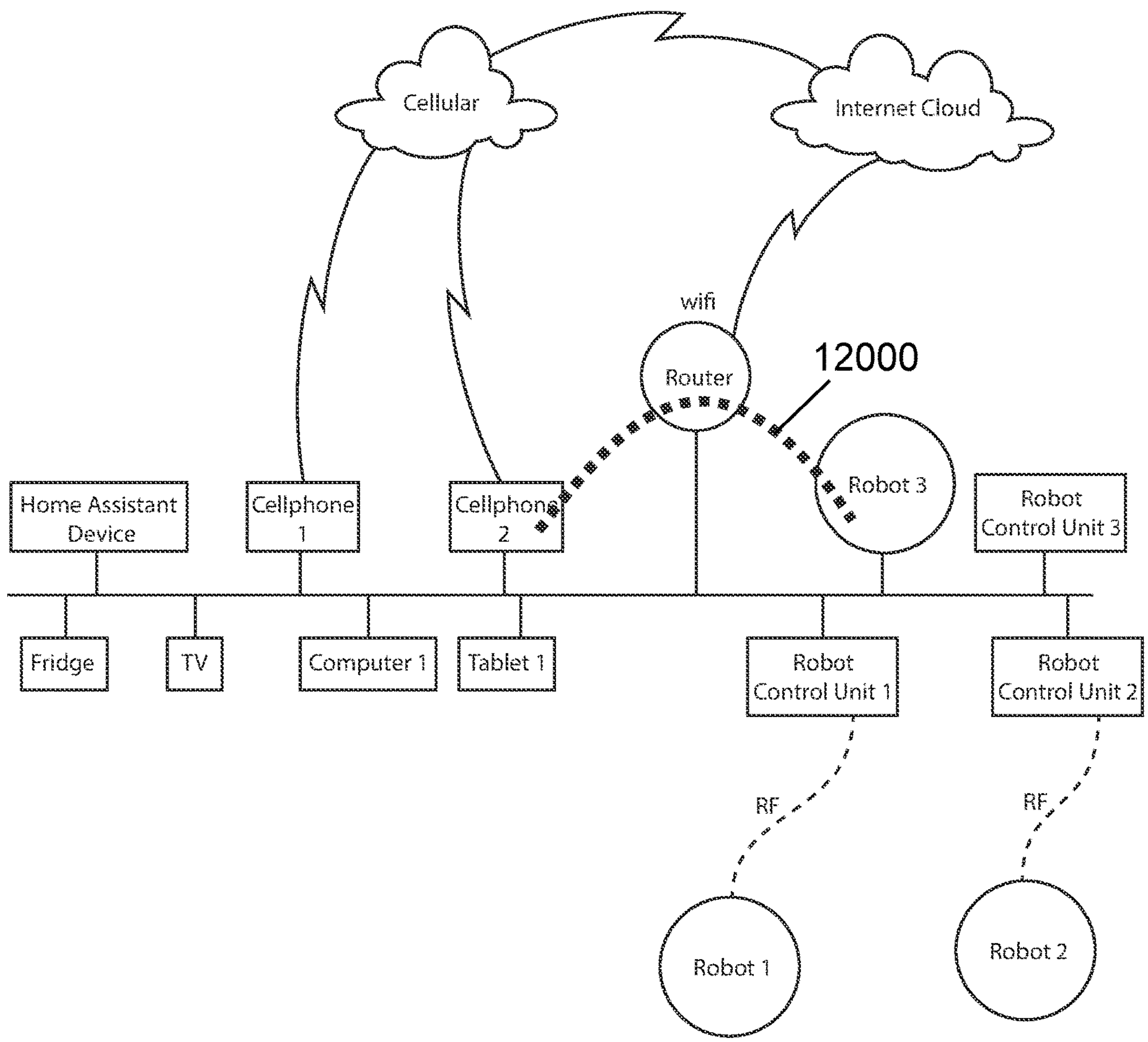

FIG. 235 illustrates an example of local connection path of devices, according to some embodiments.

Figure 236A:
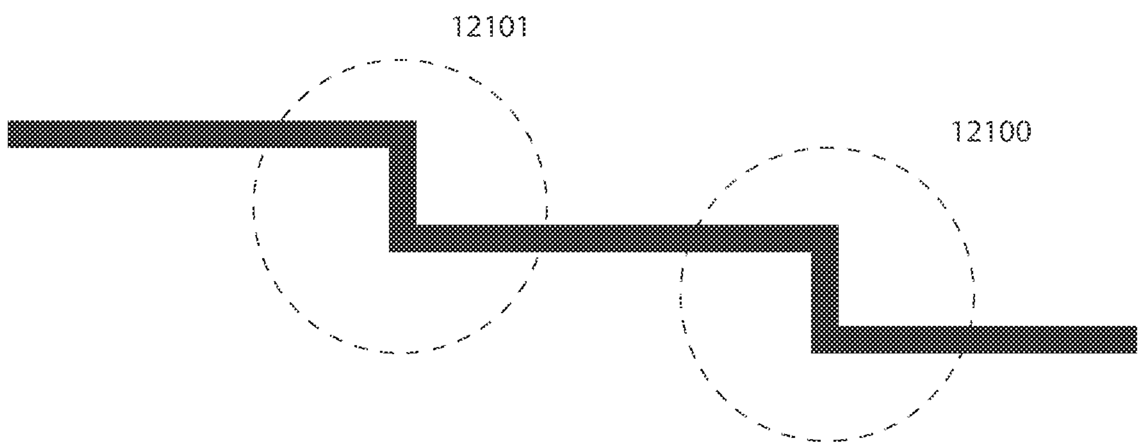
Figure 236B:
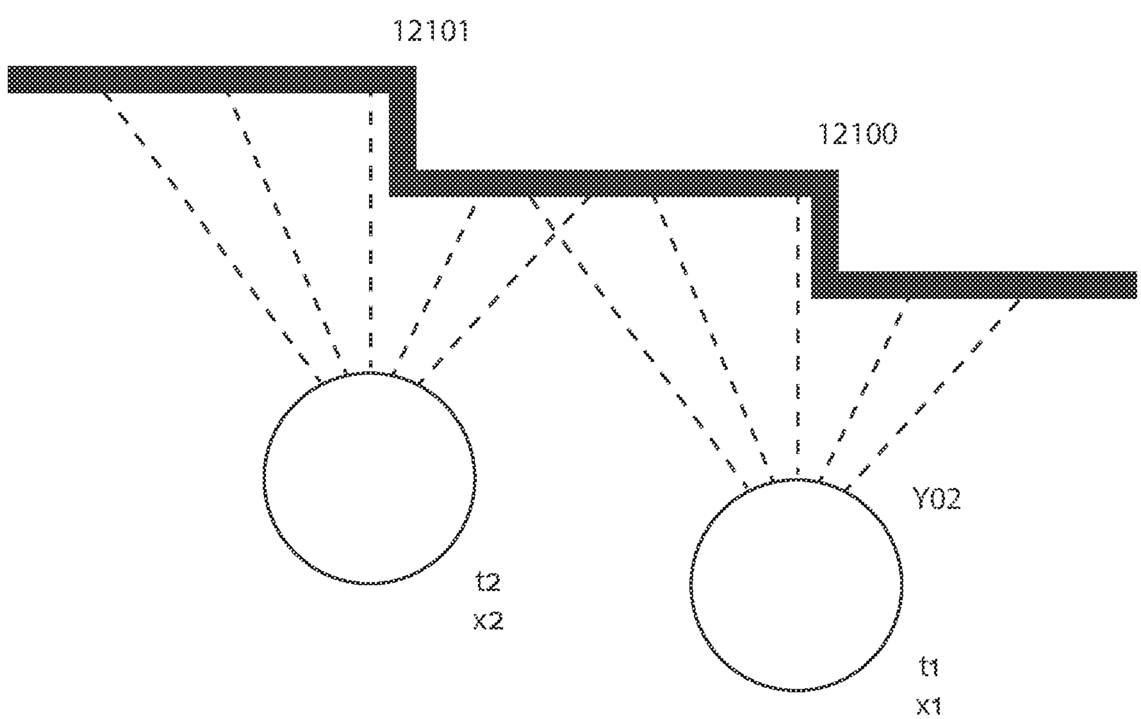
Figure 236C:
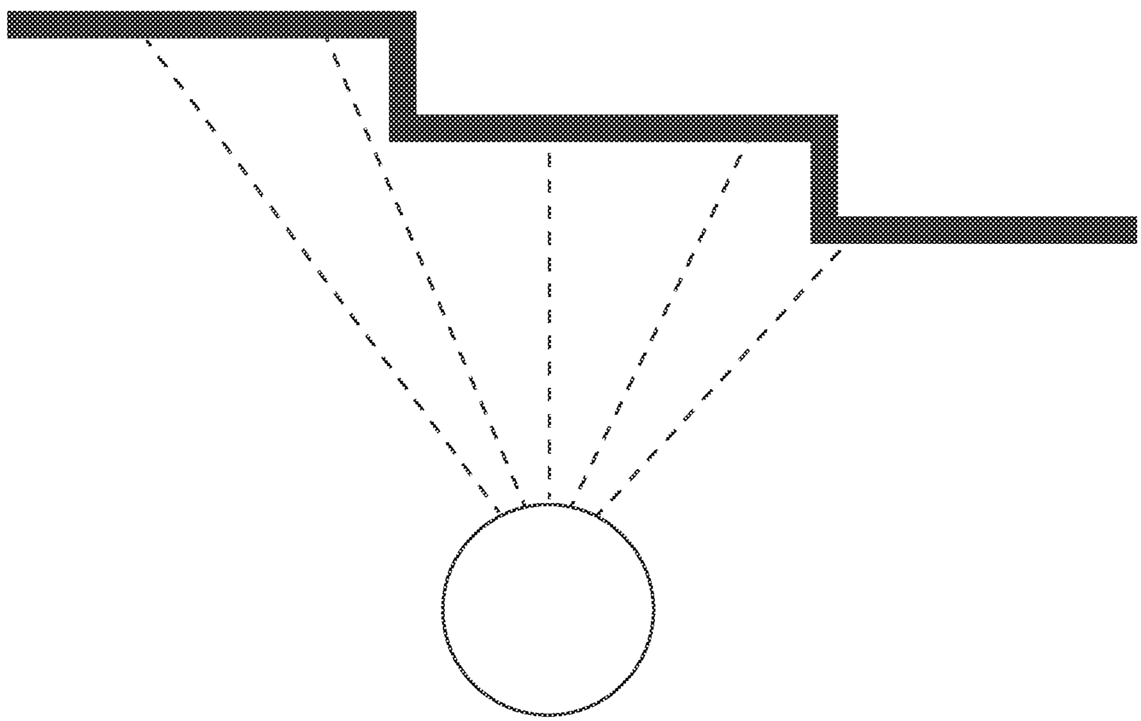

FIGS. 236A-236C illustrate an example of observations of a robot at two time points, according to some embodiments.

Figure 237:
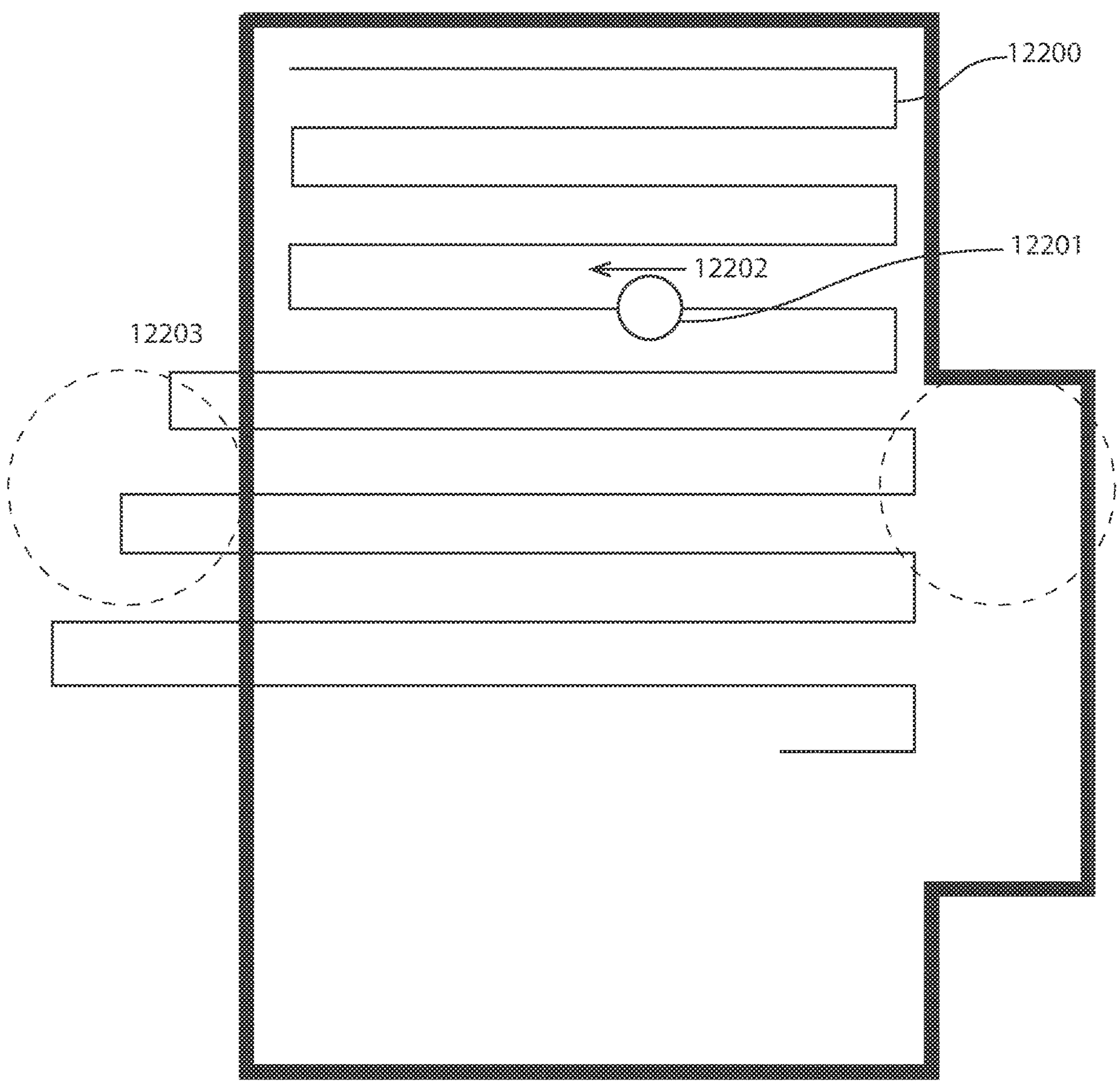

FIG. 237 illustrates a movement path of a robot, according to some embodiments.

Figure 238A:
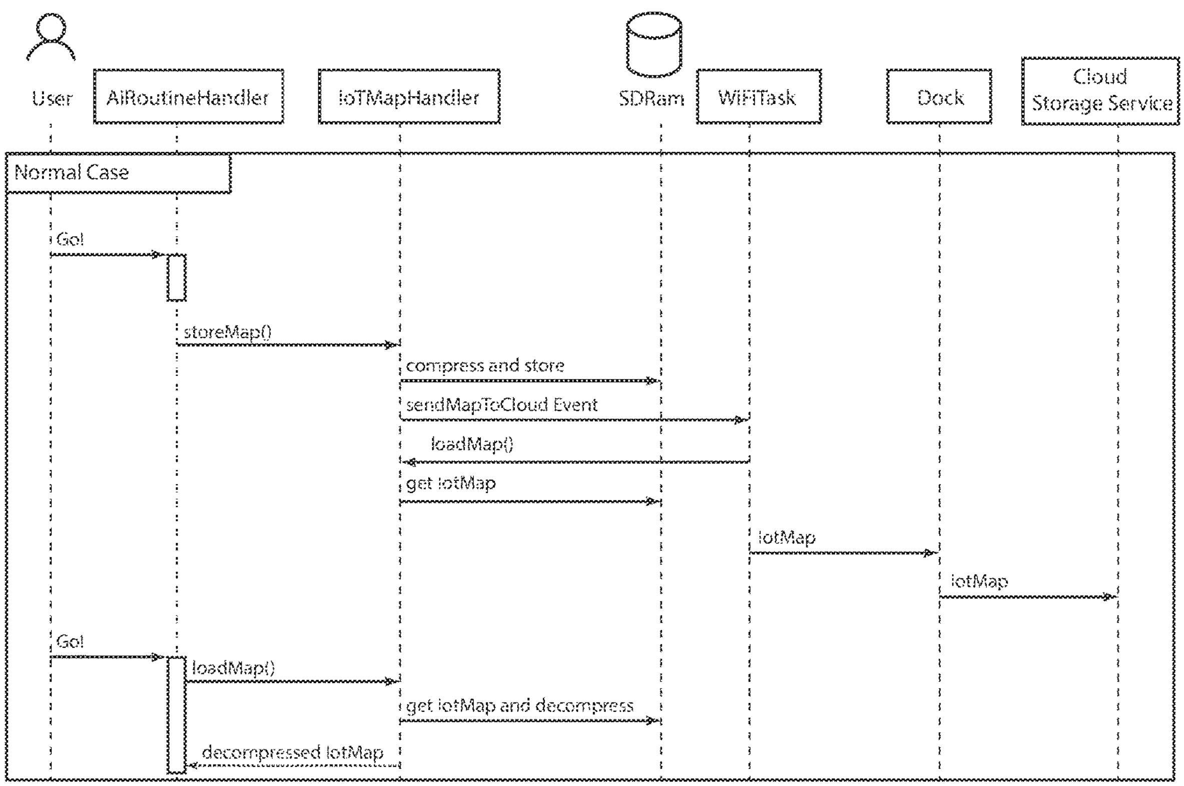
Figure 238B:
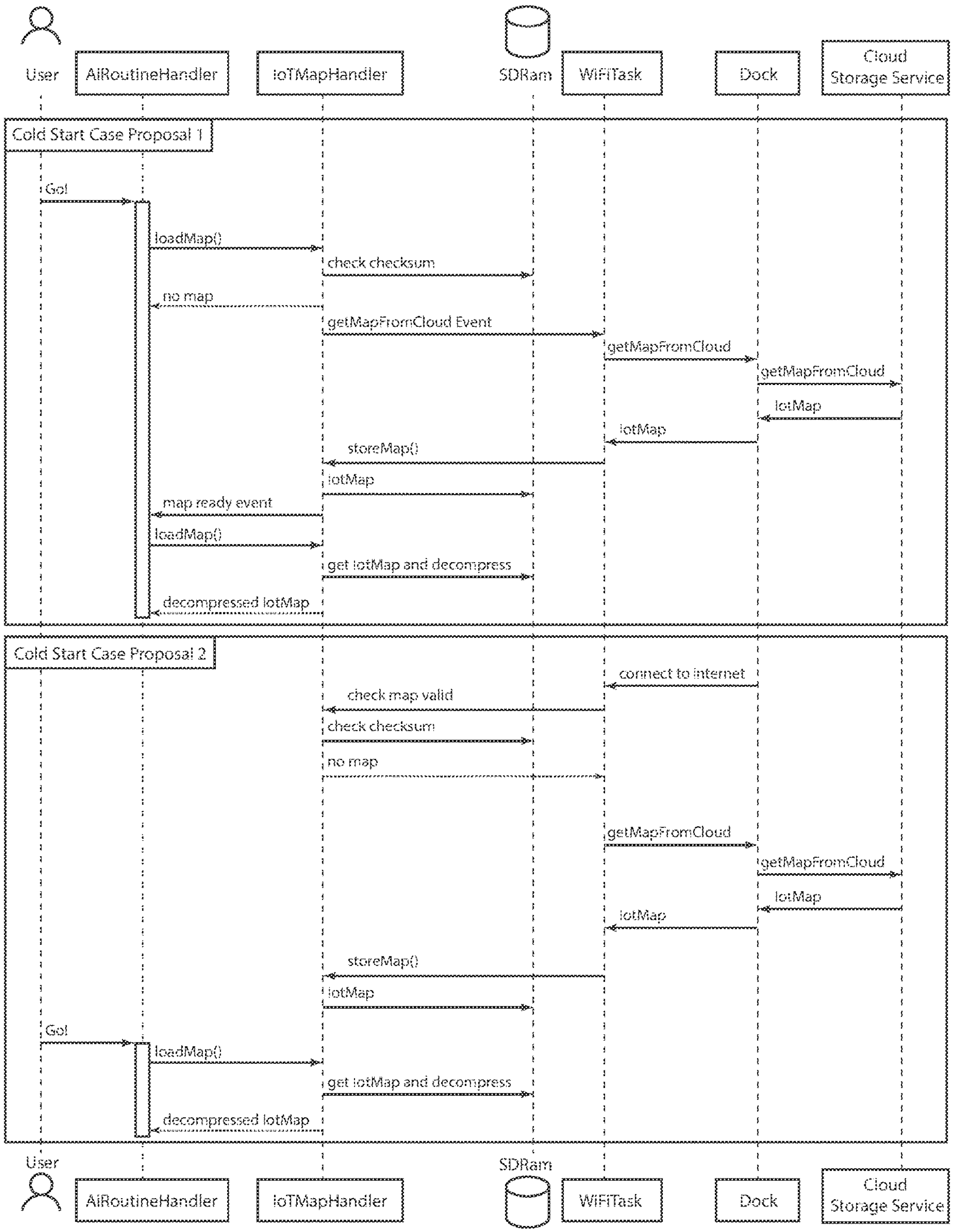

FIGS. 238A and 238B illustrate examples of flow paths for uploading and downloading a map, according to some embodiments.

Figure 239:
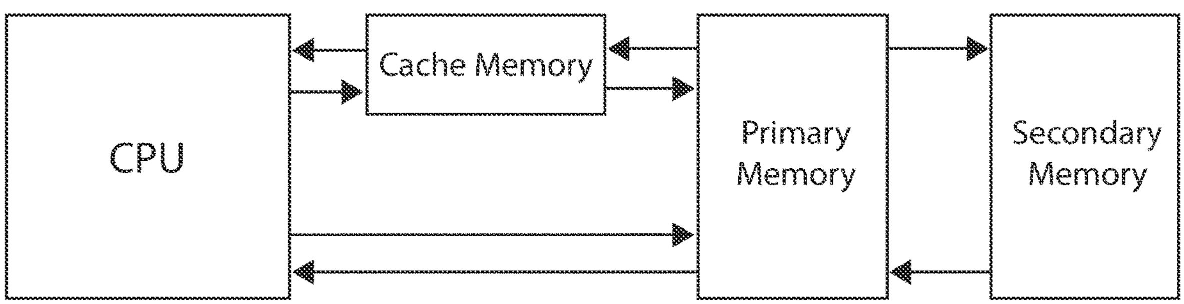

FIG. 239 illustrates the use of cache memory, according to some embodiments.

FIG. 240 illustrates performance of a TSOP sensor under various conditions.

Figure 241:
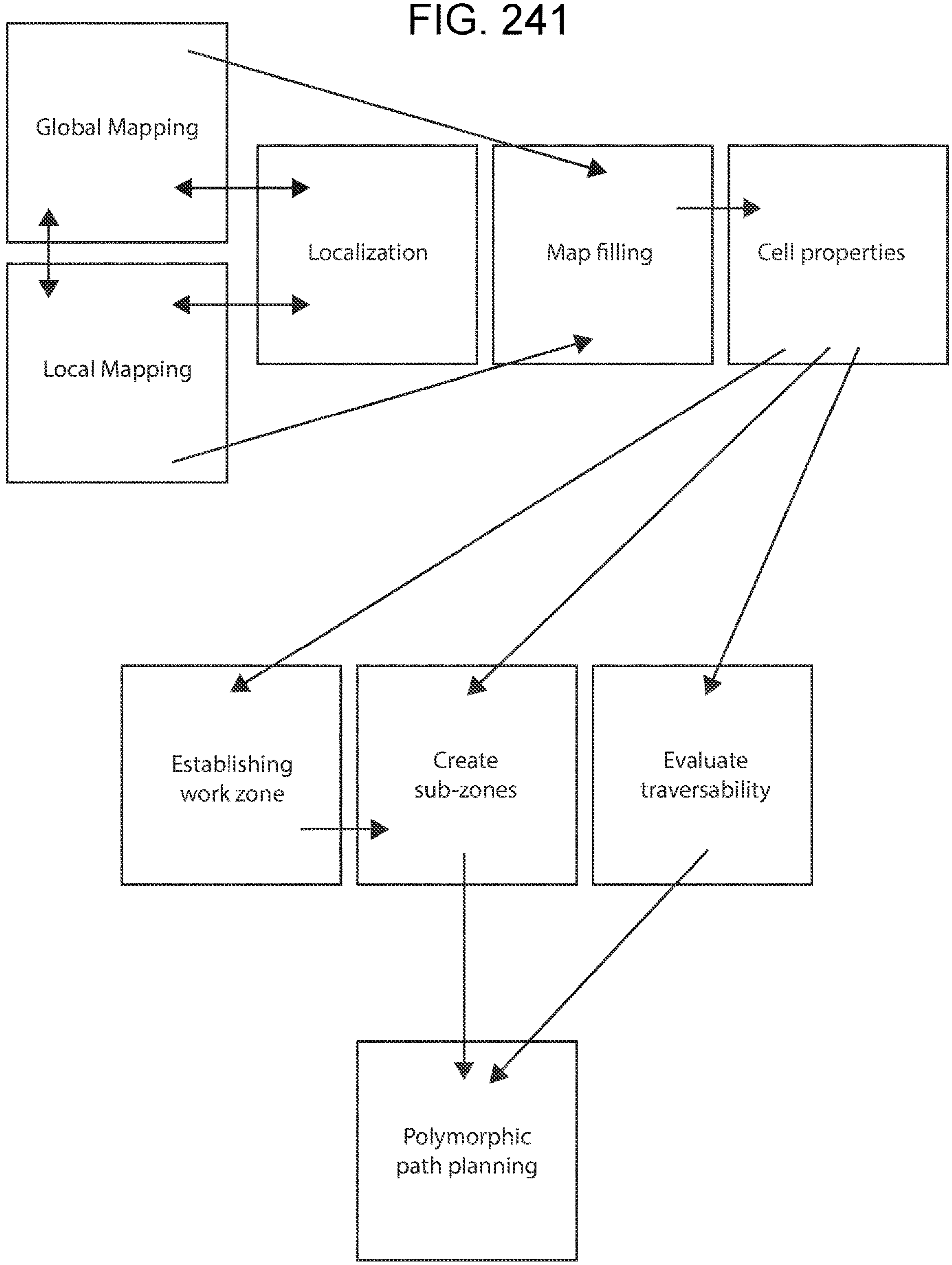

FIG. 241 illustrates an example of subsystems of a robot, according to some embodiments.

Figure 242:
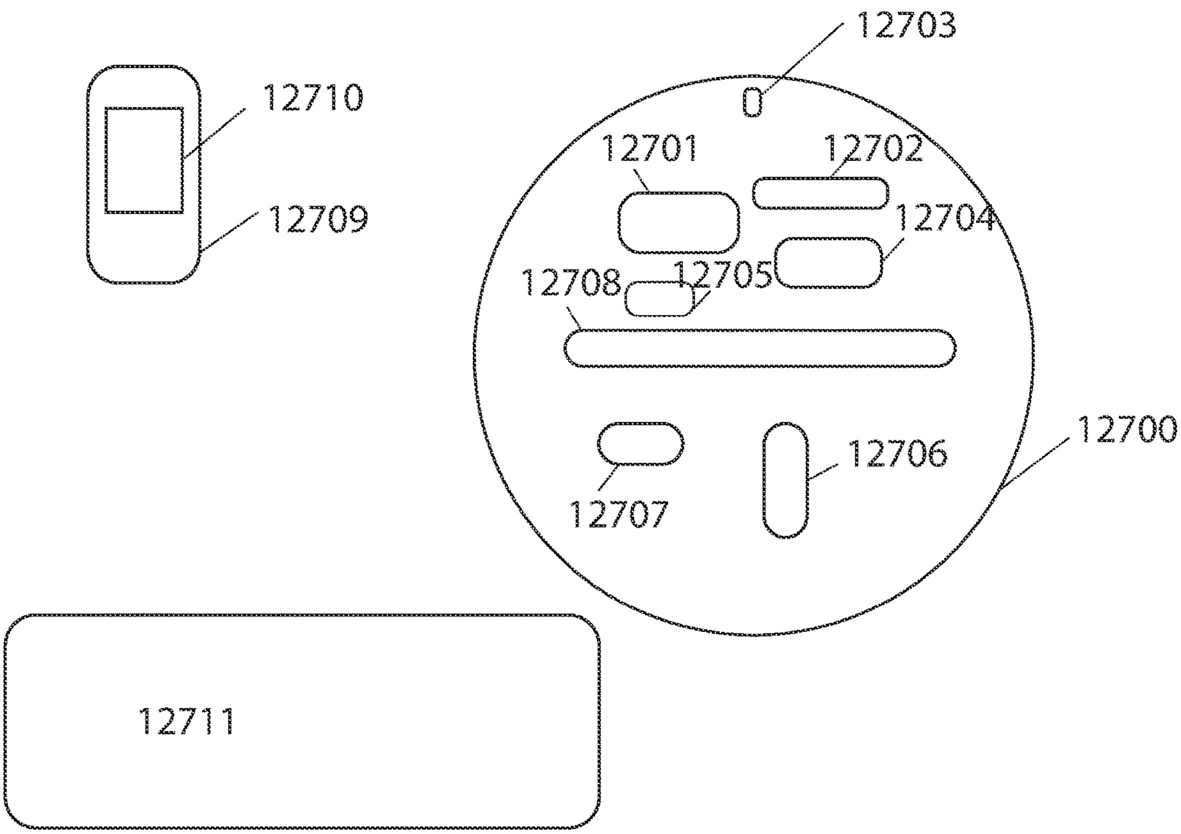

FIG. 242 illustrates an example of a robot, according to some embodiments.

Figure 243:
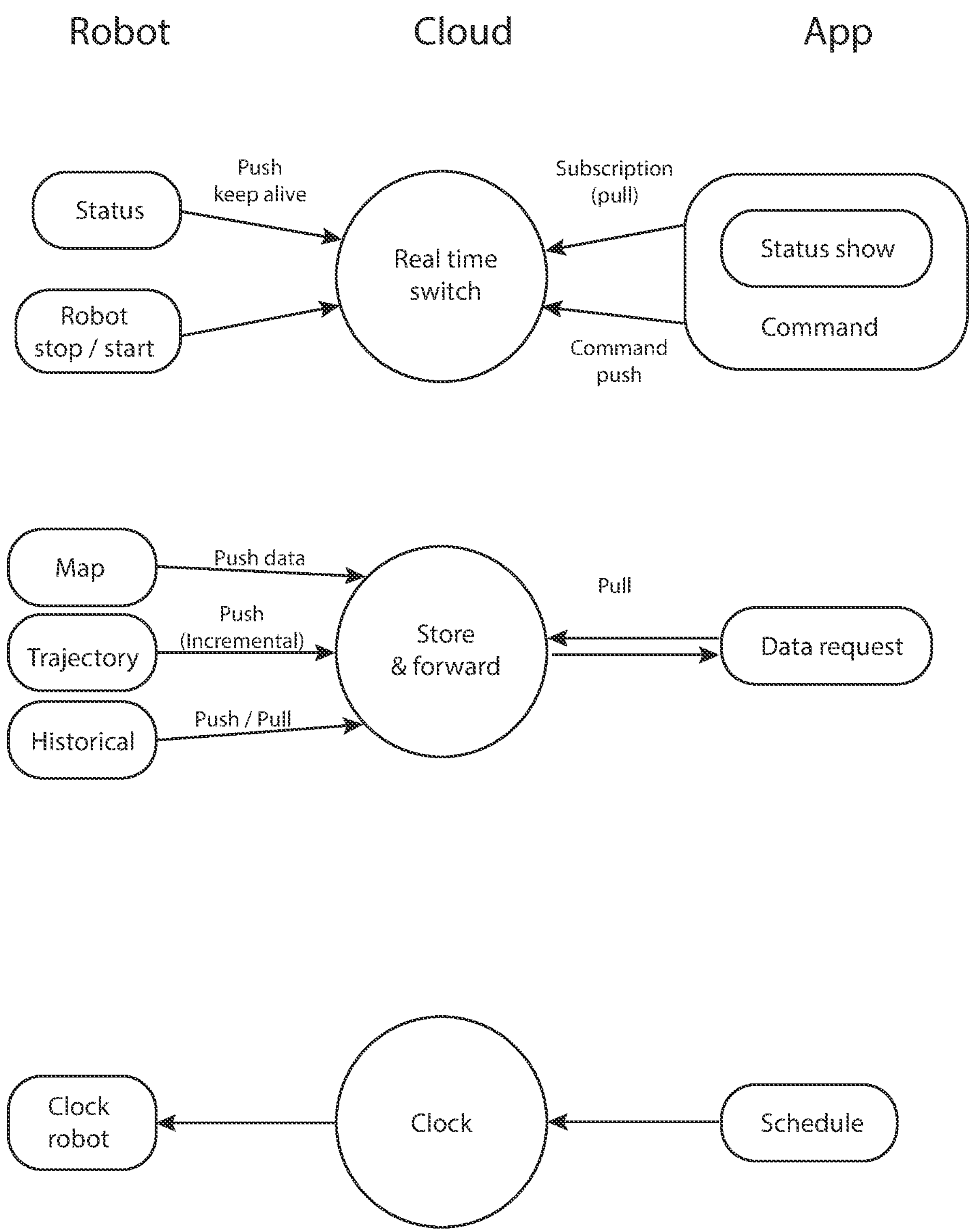

FIG. 243 illustrates an example of communication between the system of the robot and the application via the cloud, according to some embodiments.

FIGS. 244-252 illustrate examples of methods for creating, deleting, and modifying zones using an application of a communication device, according to some embodiments.

FIGS. 253A-253H illustrate an example of an application of a communication device paired with a robot, according to some embodiments.

Figure 254A:
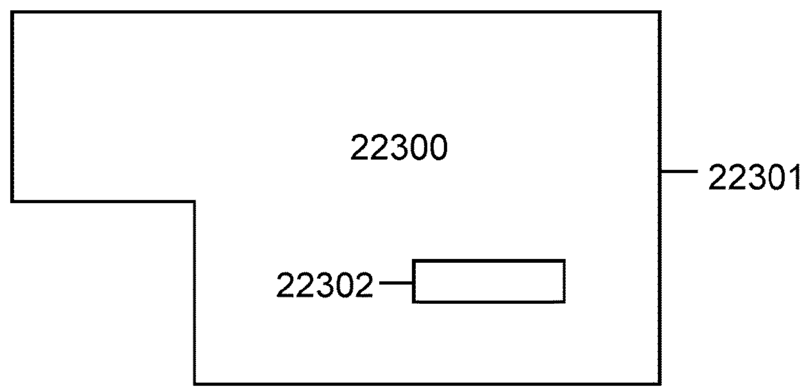

FIG. 254A illustrates a plan view of an exemplary environment in some use cases, according to some embodiments.

Figure 254B:
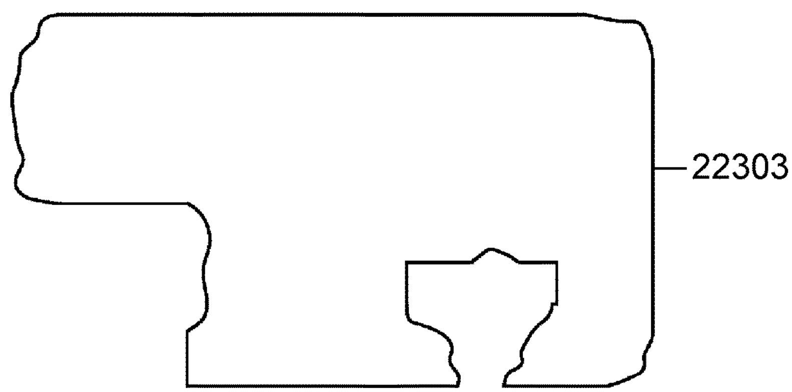

FIG. 254B illustrates an overhead view of an exemplary two-dimensional map of the environment generated by a processor of a robot, according to some embodiments.

Figure 254C:
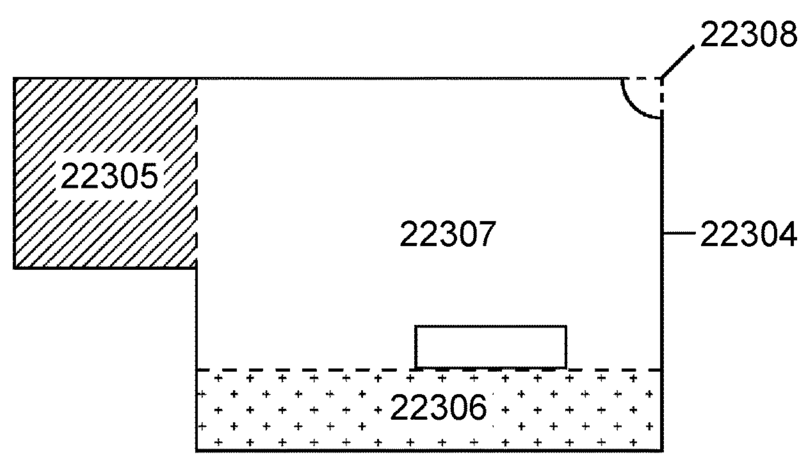

FIG. 254C illustrates a plan view of the adjusted, exemplary two-dimensional map of the workspace, according to some embodiments.

Figure 255A:
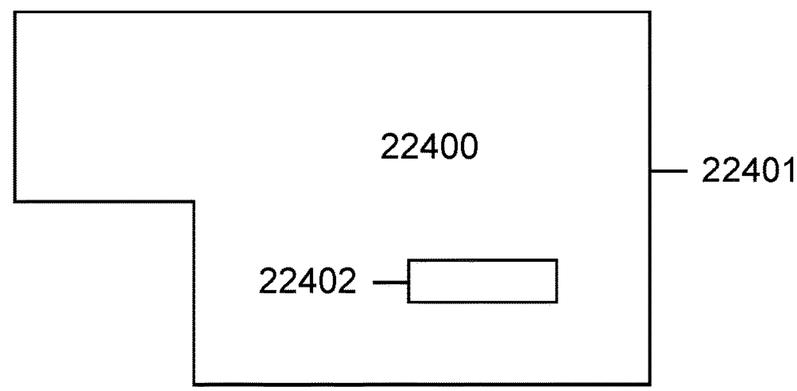
Figure 255B:
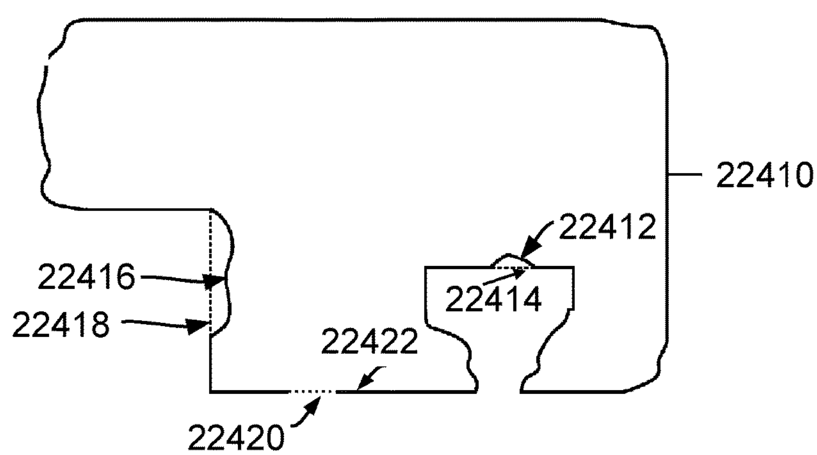

FIGS. 255A and 255B illustrate an example of the process of adjusting perimeter lines of a map, according to some embodiments.

FIG. 256 illustrates an example of a movement path of a robot, according to some embodiments.

Figure 257:
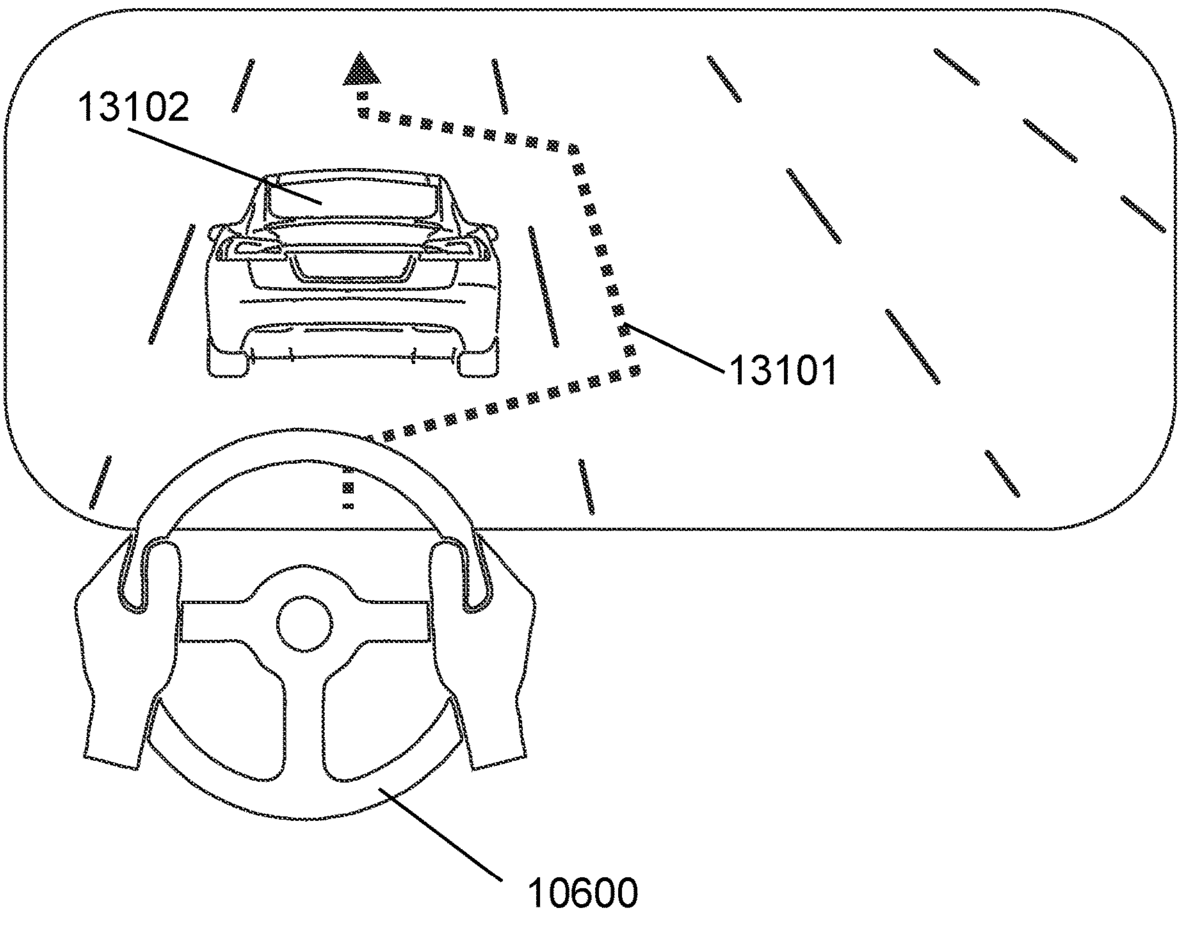

FIG. 257 illustrates an example of a system notifying a user prior to passing another vehicle, according to some embodiments.

FIG. 258 illustrates an example of a log during a firmware update, according to some embodiments.

Figure 259A:
Figure 259B:
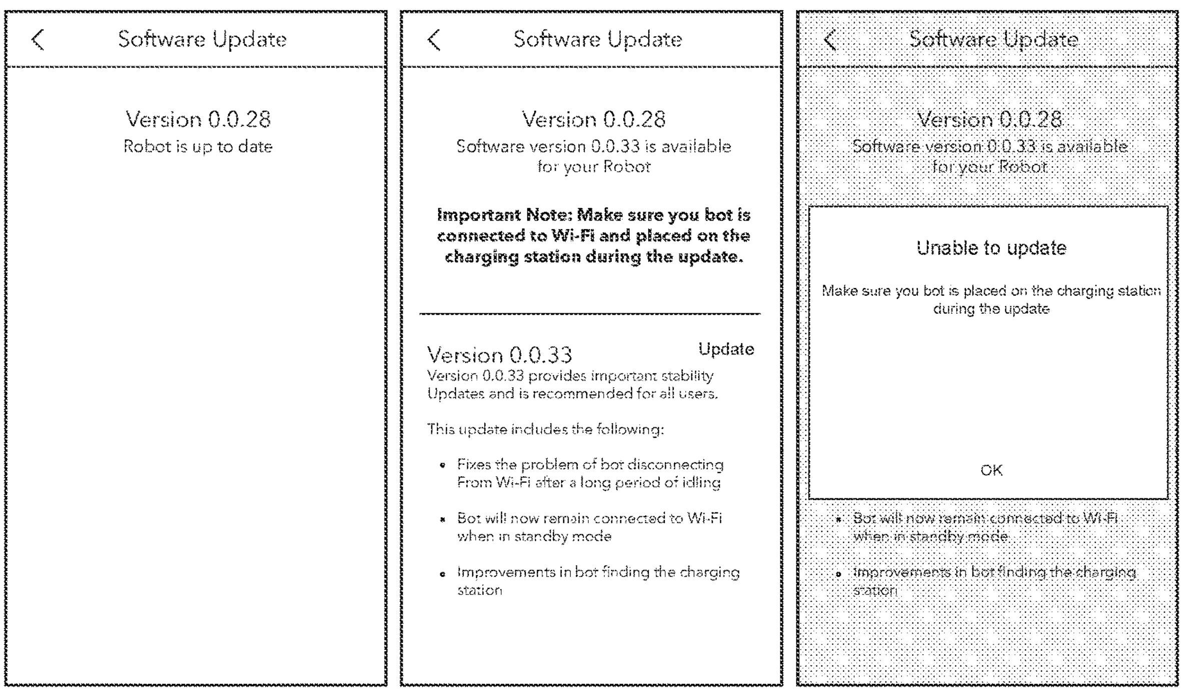
Figure 259C:
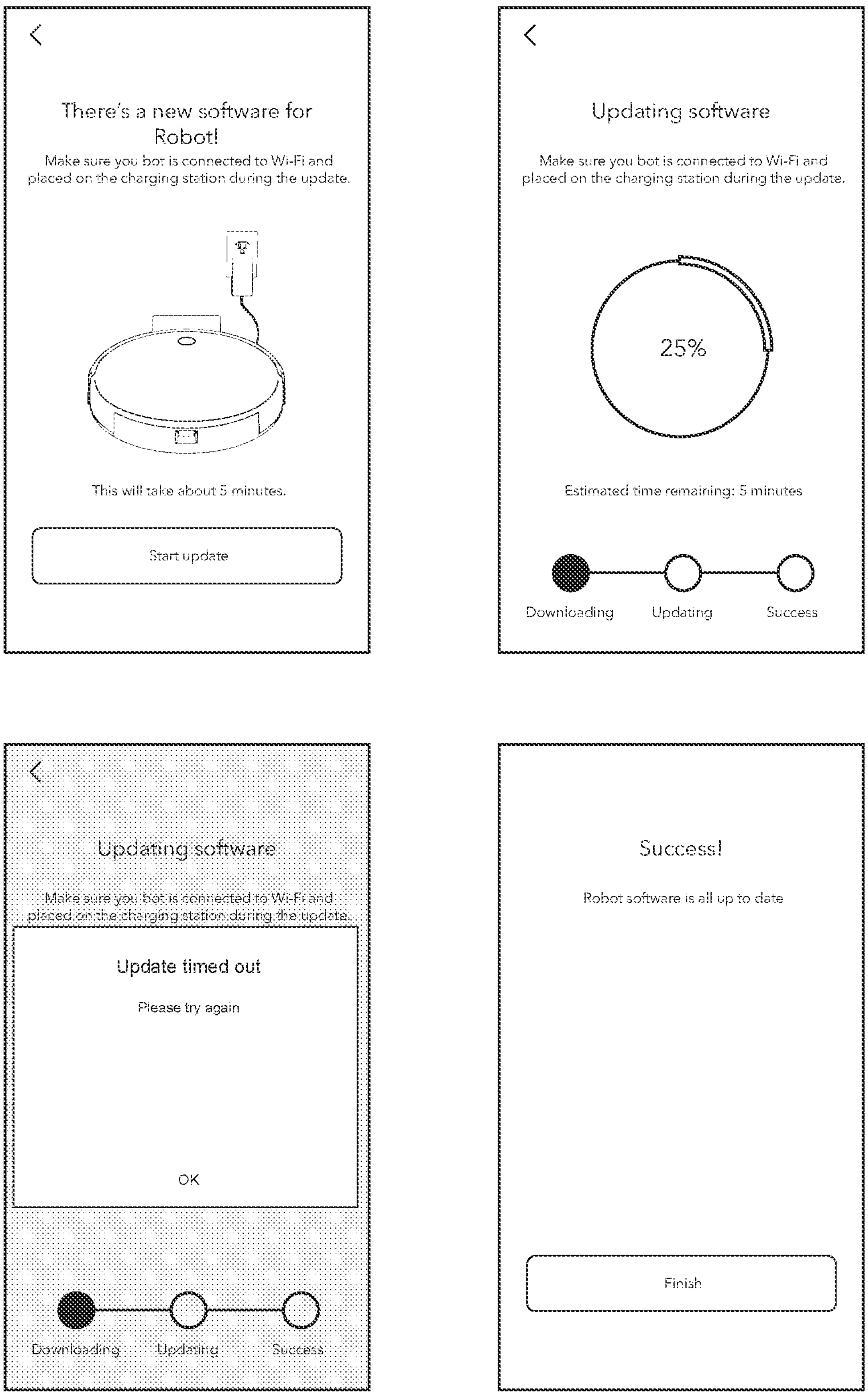

FIGS. 259A-259C illustrate an application of a communication device paired with a robot, according to some embodiments.

Figure 260A:
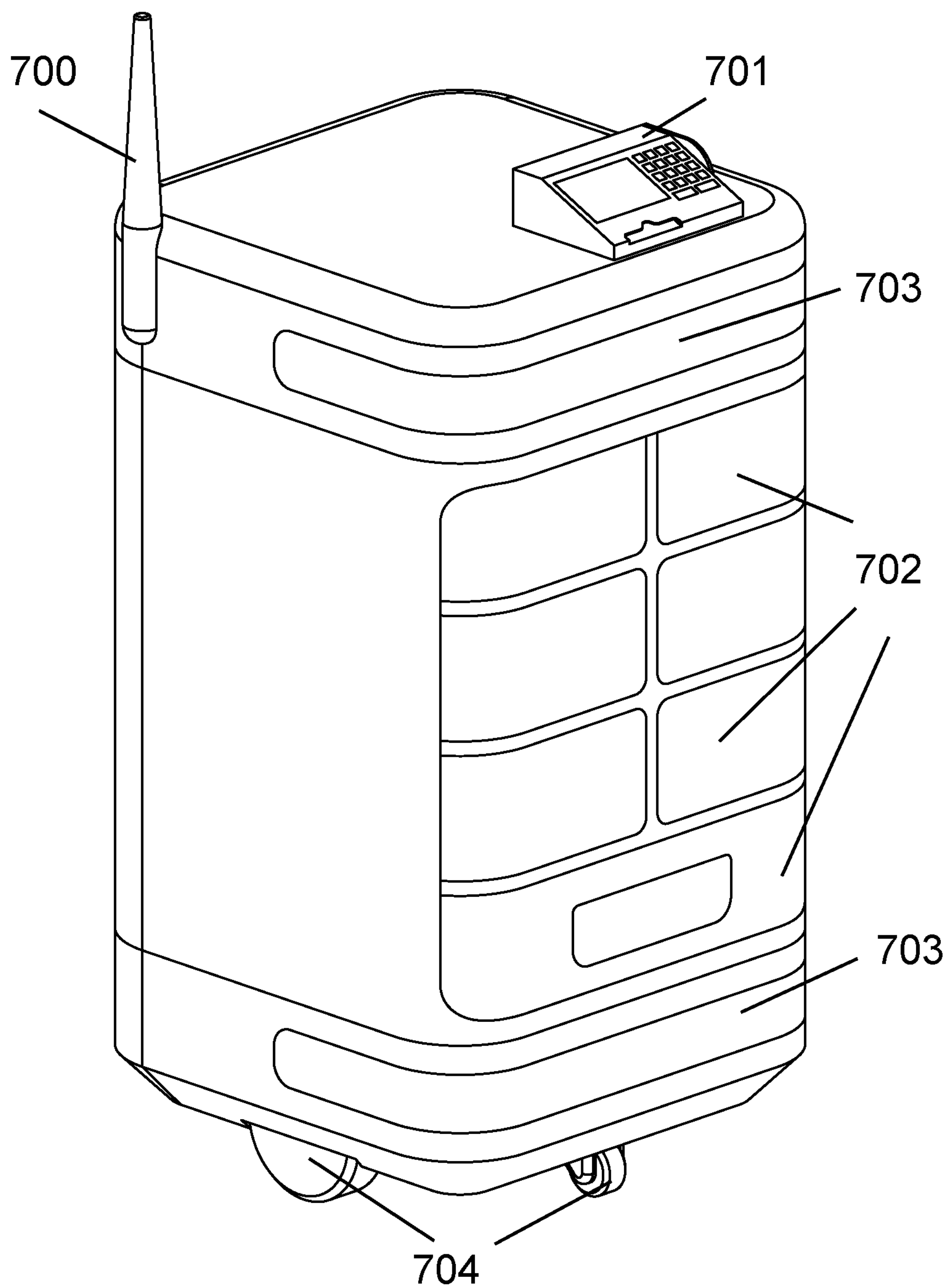
Figure 260B:
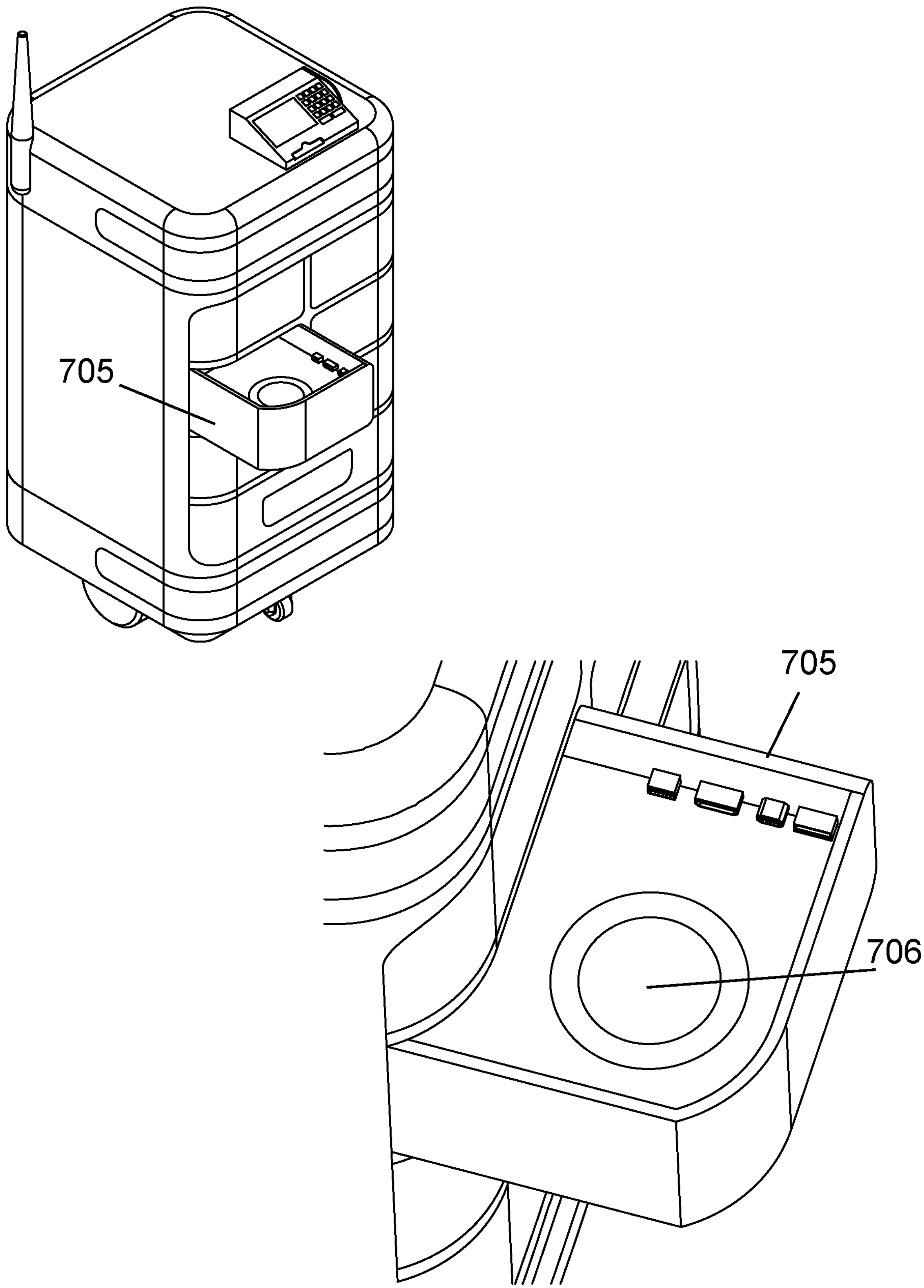

FIGS. 260A-260C illustrate an example of a vending machine robot, according to some embodiments.

FIG. 261 illustrates an example of a computer code for generating an error log, according to some embodiments.

FIG. 262 illustrates an example of a diagnostic test method for a robot, according to some embodiments.

FIGS. 263A-263C and 264A-264D illustrate examples of simultaneous localization and mapping (SLAM) and virtual reality (VR) integration, according to some embodiments.

FIGS. 265A-265K illustrate examples of virtual reality, according to some embodiments.

FIGS. 265L-265O illustrate synchronization of multiple devices, according to some embodiments.

FIGS. 266A-266H illustrate flowcharts depicting examples of methods for combining SLAM and augmented reality (AR), according to some embodiments.

FIGS. 267A-267C, 268A-268I, and 269A-269I illustrate examples of SLAM and AR integration, according to some embodiments.

FIGS. 270A-270I illustrate an example of a medical care robot, according to some embodiments.

FIGS. 271A-271J, 272A-272D, and 273A-273F illustrate an example of a testing process of a medical care robot, according to some embodiments.

FIGS. 274A-274I, 275A, and 275B illustrate examples of a robotic shopping cart, according to some embodiments.

Figure 276A:
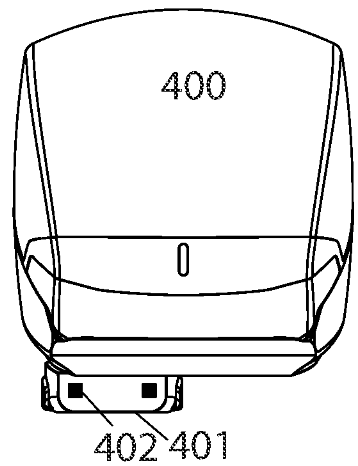
Figure 276B:
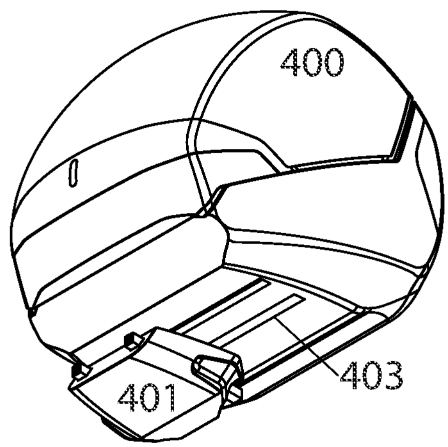
Figure 276C:
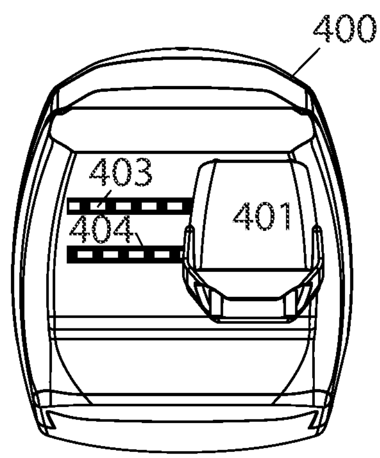

FIGS. 276A-276C illustrate an example of a pod and transfer part of a pod loading and unloading mechanism, according to some embodiments.

Figure 277A:
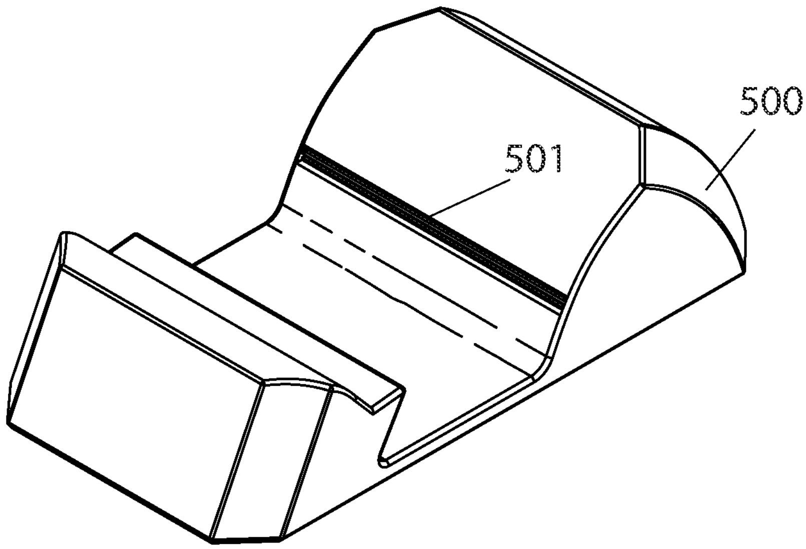
Figure 277B:
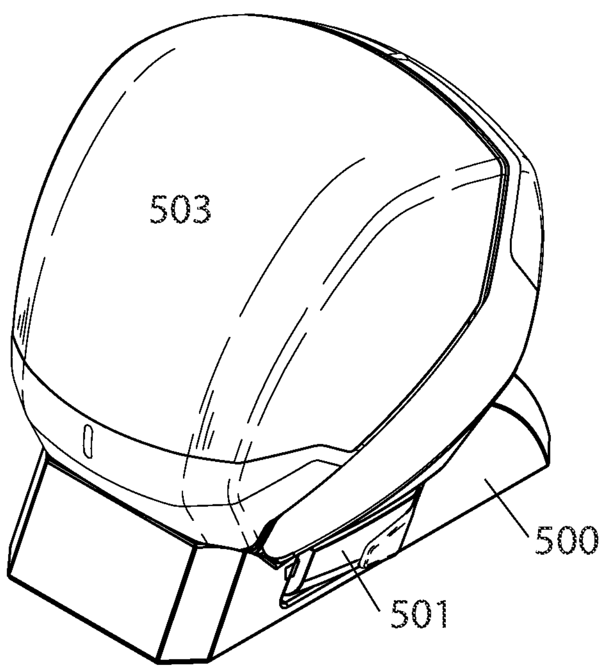

FIGS. 277A and 277B illustrate an example of a pod station with a docked pod and transfer part of a pod loading and unloading mechanism, according to some embodiments.

Figure 278:
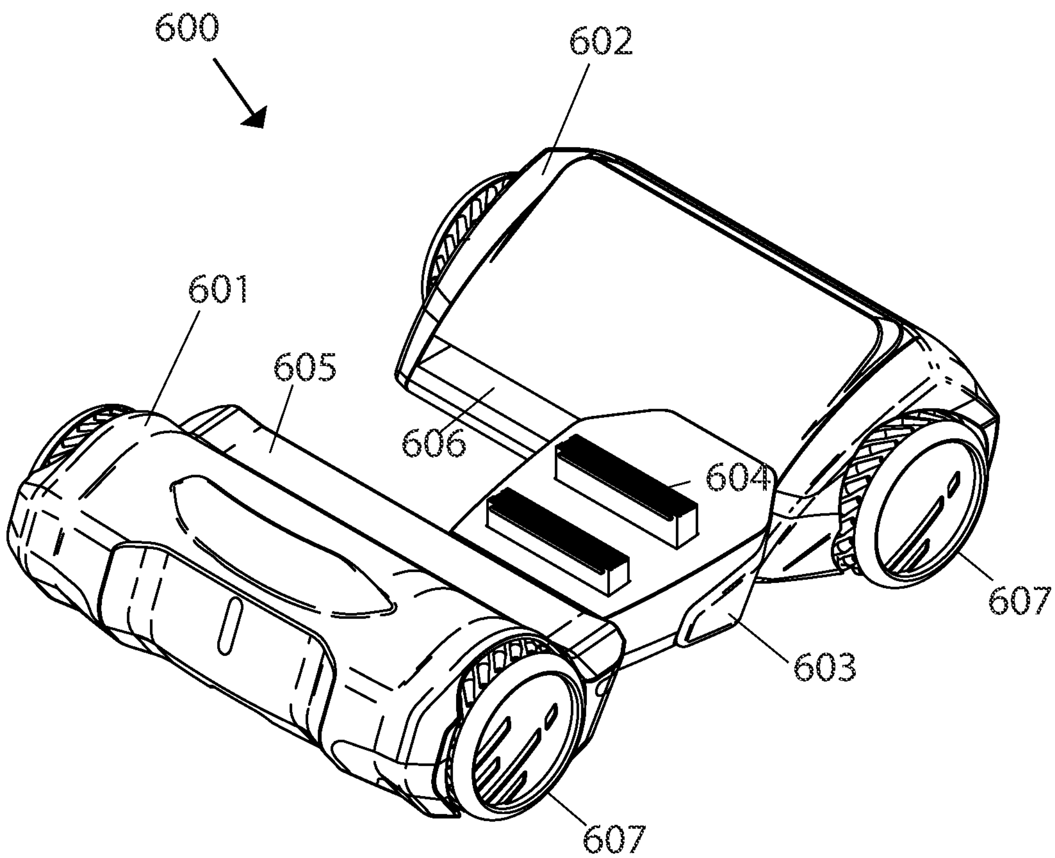

FIG. 278 illustrates an example of a mobile robotic chassis customized to transport pods, according to some embodiments.

FIGS. 279A-279D illustrate an example of a middle or transfer part of a pod loading and unloading mechanism with extended and retracted pins, according to some embodiments.

FIGS. 280A-280G illustrate an example of a sequence of steps for loading a pod onto a mobile robotic chassis, according to some embodiments.

Figure 281:
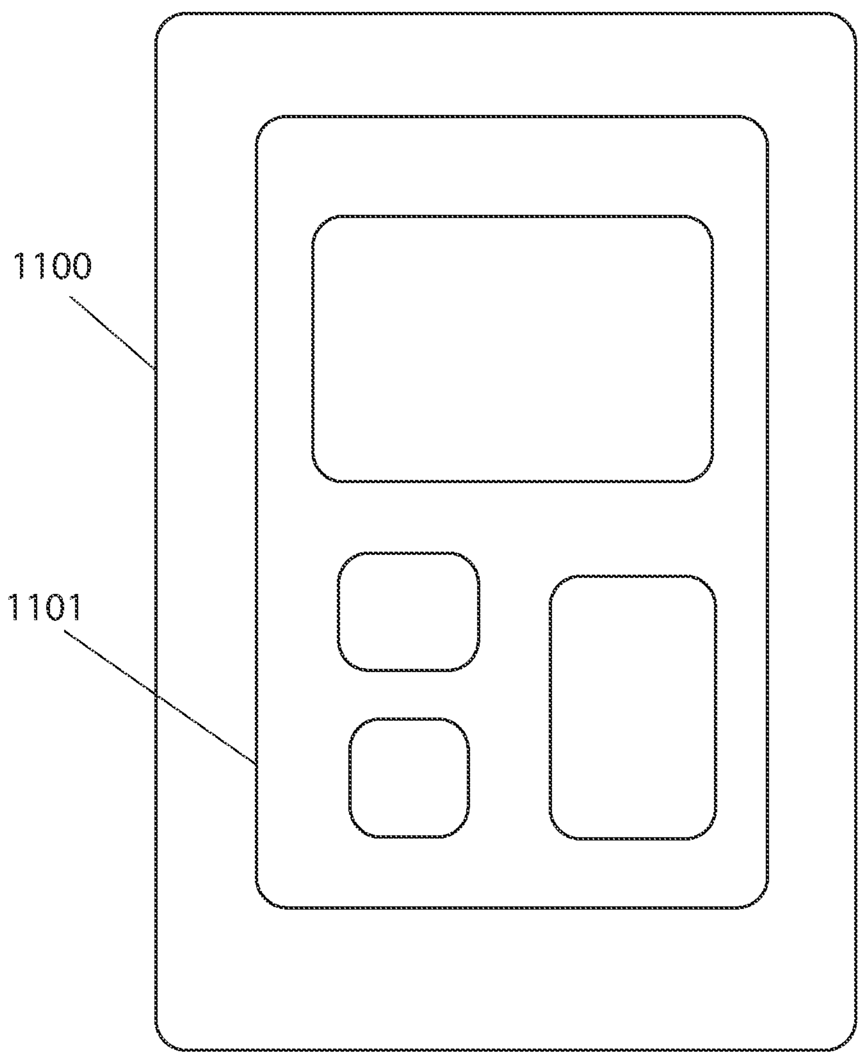

FIG. 281 illustrates an example of a communication device, according to some embodiments.

Figure 282:
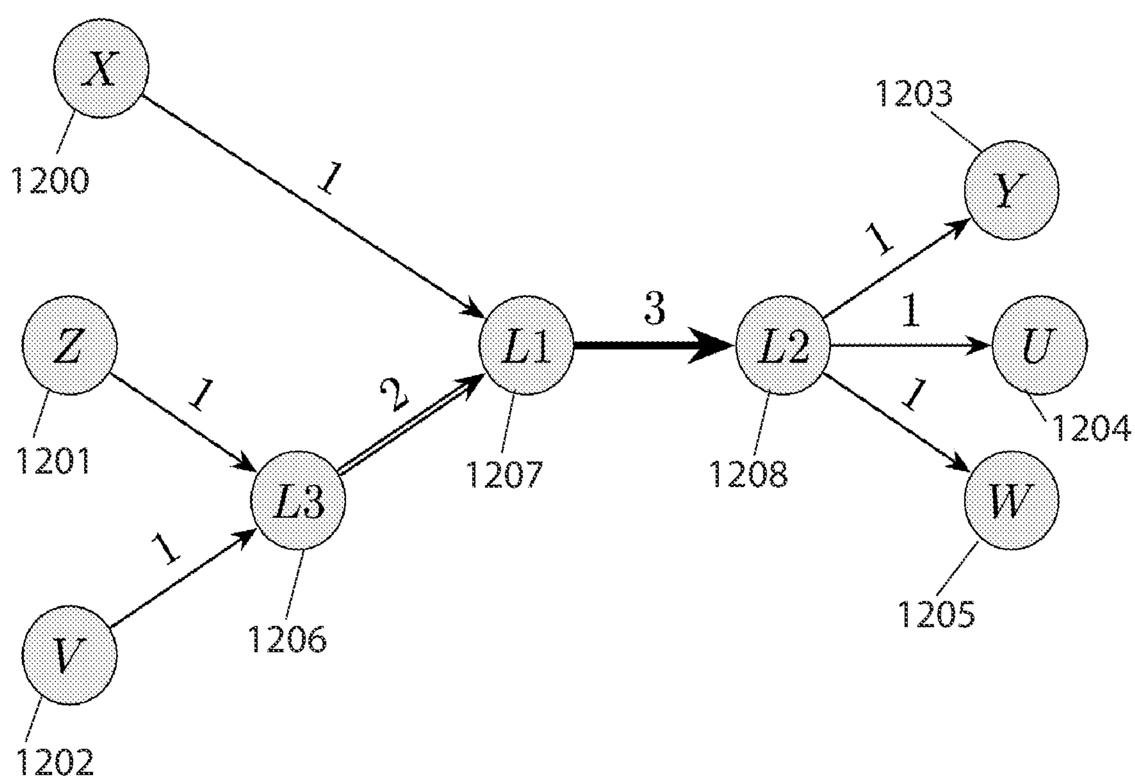

FIG. 282 illustrates an example of mobile robotic chassis paths when linking and unlinking together, according to some embodiments.

Figure 283A:
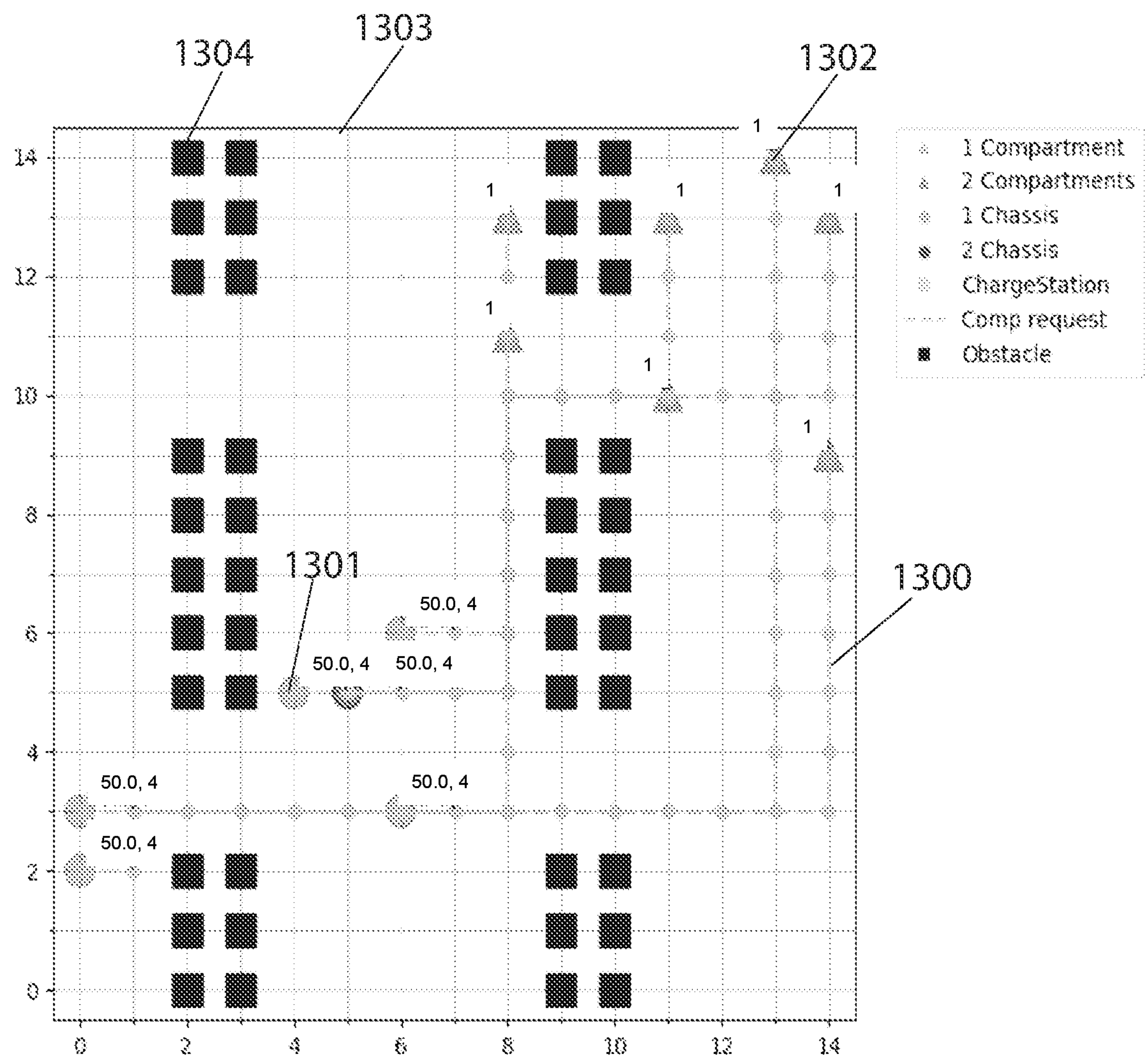

FIGS. 283A and 283 B illustrate results of method for finding matching route segments between two robotic chassis, according to some embodiments.

Figure 284:
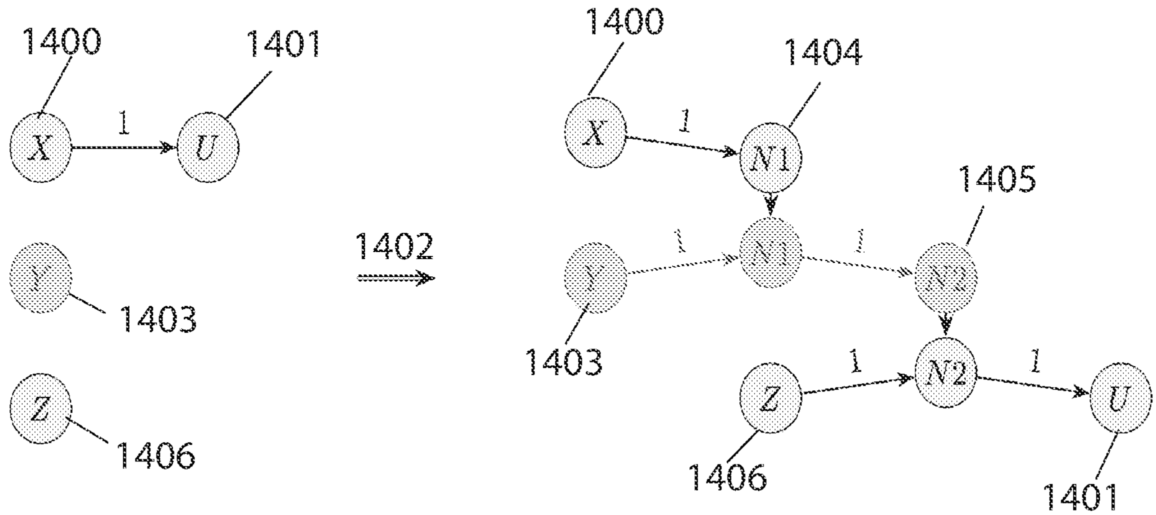

FIG. 284 illustrates an example of mobile robotic chassis paths when transferring pods between one another, according to some embodiments.

Figure 285:
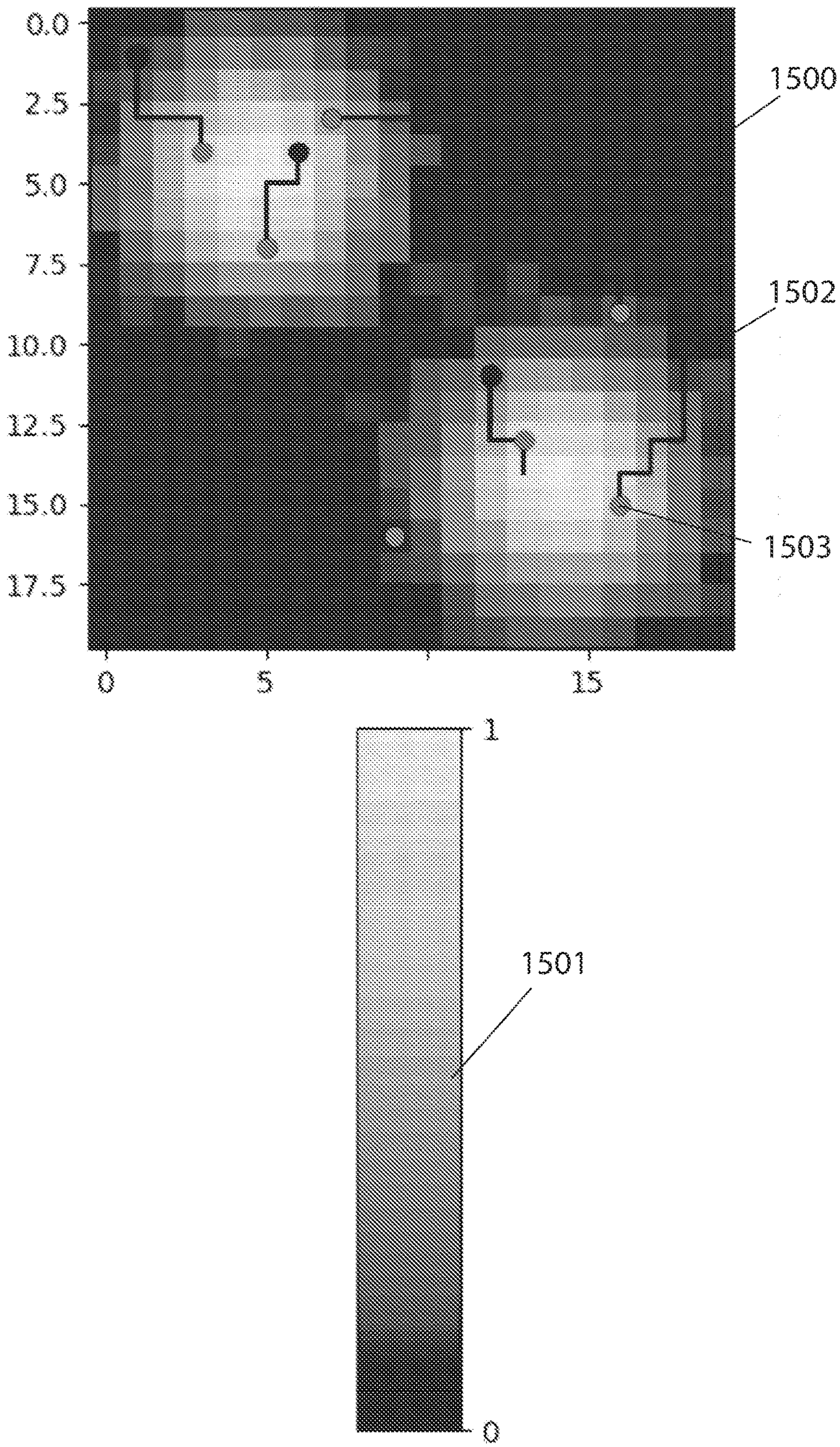

FIG. 285 illustrates how pod distribution changes after minimization of a cost function, according to some embodiments.

DETAILED DESCRIPTION OF SOME EMBODIMENTS

The present inventions will now be described in detail with reference to a few embodiments thereof as illustrated in the accompanying drawings. In the following description, numerous specific details are set forth in order to provide a thorough understanding of the present inventions. It will be apparent, however, to one skilled in the art, that the present inventions, or subsets thereof, may be practiced without some or all of these specific details. In other instances, well known process steps and/or structures have not been described in detail in order to not unnecessarily obscure the present inventions. Further, it should be emphasized that several inventive techniques are described, and embodiments are not limited to systems implanting all of those techniques, as various cost and engineering trade-offs may warrant systems that only afford a subset of the benefits described herein or that will be apparent to one of ordinary skill in the art.

Some embodiments may provide an autonomous or semi-autonomous robot including communication, mobility, actuation, and processing elements. In some embodiments, the robot may be wheeled (e.g., rigidly fixed, suspended fixed, steerable, suspended steerable, caster, or suspended caster), legged, or tank tracked. In some embodiments, the wheels, legs, tracks, etc. of the robot may be controlled individually or controlled in pairs (e.g., like cars) or in groups of other sizes, such as three or four as in omnidirectional wheels. In some embodiments, the robot may use differential-drive wherein two fixed wheels have a common axis of rotation and angular velocities of the two wheels are equal and opposite such that the robot may rotate on the spot. In some embodiments, the robot may include a terminal device such as those on computers, mobile phones, tablets, or smart wearable devices. In some embodiments, the robot may include one or more of a casing, a chassis including a set of wheels, a motor to drive the wheels, a receiver that acquires signals transmitted from, for example, a transmitting beacon, a transmitter for transmitting signals, a processor, a memory storing instructions that when executed by the processor effectuates robotic operations, a controller, a plurality of sensors (e.g., tactile sensor, obstacle sensor, temperature sensor, imaging sensor, light detection and ranging (LIDAR) sensor, camera, depth sensor, time-of-flight (TOF) sensor, TSSP sensor, optical tracking sensor, sonar sensor, ultrasound sensor, laser sensor, light emitting diode (LED) sensor, etc.), network or wireless communications, radio frequency (RF) communications, power management such as a rechargeable battery, solar panels, or fuel, and one or more clock or synchronizing devices. In some cases, the robot may include communication means such as Wi-Fi, Worldwide Interoperability for Microwave Access (WiMax), WiMax mobile, wireless, cellular, Bluetooth, RF, etc. In some cases, the robot may support the use of a 360 degrees LIDAR and a depth camera with limited field of view. In some cases, the robot may support proprioceptive sensors (e.g., independently or in fusion), odometry devices, optical tracking sensors, smart phone inertial measurement units (IMU), and gyroscopes. In some cases, the robot may include at least one cleaning tool (e.g., disinfectant sprayer, brush, mop, scrubber, steam mop, cleaning pad, ultraviolet (UV) sterilizer, etc.). The processor may, for example, receive and process data from internal or external sensors, execute commands based on data received, control motors such as wheel motors, map the environment, localize the robot, determine division of the environment into zones, and determine movement paths. In some cases, the robot may include a microcontroller on which computer code required for executing the methods and techniques described herein may be stored.

In some embodiments, at least a portion of the sensors of the robot are provided in a sensor array, wherein the at least a portion of sensors are coupled to a flexible, semi-flexible, or rigid frame. In some embodiments, the frame is fixed to a chassis or casing of the robot. In some embodiments, the sensors are positioned along the frame such that the field of view of the robot is maximized while the cross-talk or interference between sensors is minimized. In some cases, a component may be placed between adjacent sensors to minimize cross-talk or interference. In some embodiments, the robot may include sensors to detect or sense acceleration, angular and linear movement, motion, static and dynamic obstacles, temperature, humidity, water, pollution, particles in the air, supplied power, proximity, external motion, device motion, sound signals, ultrasound signals, light signals, fire, smoke, carbon monoxide, global-positioning-satellite (GPS) signals, radio-frequency (RF) signals, other electromagnetic signals or fields, visual features, textures, optical character recognition (OCR) signals, spectrum meters, system status, cliffs or edges, types of flooring, and the like. In some embodiments, a microprocessor or a microcontroller of the robot may poll a variety of sensors at intervals. In some embodiments, more than one sensor of the robot may be used to provide additional measurement points to further enhance accuracy of estimations or predictions. In some embodiments, the additional sensors of the robot may be connected to the microprocessor or microcontroller. In some embodiments, the additional sensors may be complementary to other sensing methods of the robot.

In some embodiments, the MCU of the robot (e.g., ARM Cortex M7 MCU, model SAM70) may provide an onboard camera controller. In some embodiments, the camera may be communicatively coupled with a microprocessor or microcontroller. In some embodiments, the onboard camera controller may receive data from the environment and may send the data to the MCU, an additional CPU/MCU, or to the cloud for processing. In some embodiments, the camera controller may be coupled with a laser pointer that emits a structured light pattern onto surfaces of objects within the environment. In some embodiments, that the camera may use the structured light pattern to create a three dimensional model of the objects. In some embodiments, the structured light pattern may be emitted onto a face of a person, the camera may capture an image of the structured light pattern projected onto the face, and the processor may identify the face of the person more accurately than when using an image without the structured light pattern. In some embodiments, frames captured by the camera may be time-multiplexed to serve the purpose of a camera and depth camera in a single device. In some embodiments, several components may exist separately, such as an image sensor, imaging module, depth module, depth sensor, etc. and data from the different the components may be combined in an appropriate data structure. For example, the processor of the robot may transmit image or video data captured by the camera of the robot for video conferencing while also displaying video conference participants on the touch screen display. The processor may use depth information collected by the same camera to maintain the position of the user in the middle of the frame of the camera seen by video conferencing participants. The processor may maintain the position of the user in the middle of the frame of the camera by zooming in and out, using image processing to correct the image, and/or by the robot moving and making angular and linear position adjustments.

In embodiments, the camera of the robot may be a charge-coupled device (CCD) or a complementary metal-oxide semiconductor (CMOS). In some embodiments, the camera may receive ambient light from the environment or a combination of ambient light and a light pattern projected into the surroundings by an LED, IR light, projector, etc., either directly or through a lens. In some embodiments, the processor may convert the captured light into data representing an image, depth, heat, presence of objects, etc. In some embodiments, the camera may include various optical and non-optical imaging devices, like a depth camera, stereovision camera, time-of-flight camera, or any other type of camera that outputs data from which depth to objects can be inferred over a field of view, or any other type of camera capable of generating a pixmap, or any device whose output data may be used in perceiving the environment. The camera may also be combined with an infrared (IR) illuminator (such as a structured light projector), and depth to objects may be inferred from images captured of objects onto which IR light is projected (e.g., based on distortions in a pattern of structured light). Examples of methods for estimating depths to objects using at least one IR laser, at least one image sensor, and an image processor are detailed in U.S. patent application Ser. Nos. 15/243,783, 15/954,335, 15/954,410, 16/832,221, 15/257,798, 16/525,137, 15/674,310, 15/224,442, 15/683,255, 16/880,644, 15/447,122, and 16/393,921, the entire contents of each of which are hereby incorporated by reference. Other imaging devices capable of observing depth to objects may also be used, such as ultrasonic sensors, sonar, LIDAR, and LADAR devices. Thus, various combinations of one or more cameras and sensors may be used.

In embodiments, the camera of the robot (e.g., depth camera or other camera) may be positioned in any area of the robot and in various orientations. For example, sensors may be positioned on a back, a front, a side, a bottom, and/or a top of the robot. Also, sensors may be oriented upwards, downwards, sideways, and/or in any specified angle. In some cases, the position of sensors may be complementary to one other to increase the FOV of the robot or enhance images captured in various FOVs.

In some embodiments, the camera of the robot may capture still images and record videos and may be a depth camera. For example, a camera may be used to capture images or videos in a first time interval and may be used as a depth camera emitting structured light in a second time interval. Given high frame rates of cameras some frame captures may be time multiplexed into two or more types of sensing. In some embodiments, the camera output may be provided to an image processor for use by a user and to a microcontroller of the camera for depth sensing, obstacle detection, presence detection, etc. In some embodiments, the camera output may be processed locally on the robot by a processor that combines standard image processing functions and user presence detection functions. Alternatively, in some embodiments, the video/image output from the camera may be streamed to a host for further processing or visual usage.

In some embodiments, images captured by the camera may be processed to identify objects or faces, as further described below. For example, the microprocessor may identify a face in an image and perform an image search in a database on the cloud to identify an owner of the robot. In some embodiments, the camera may include an integrated processor. For example, object detection and face recognition may be executed on an integrated processor of a camera. In some embodiments, the camera may capture still images and record videos and may be a depth camera. For example, a camera may be used to capture images or videos in a first time interval and may be used as a depth camera emitting structured light in a second time interval. Given high frame rates of cameras some frame captures may be time multiplexed into two or more types of sensing. In some embodiments, the camera may be used to capture still images and video by a user of the robot. For example, a user may use the camera of the robot to perform a video chat, wherein the robot may optimally position itself to face the user. In embodiments, various configurations (e.g., types of camera, number of cameras, internal or external cameras, etc.) that allow for desired types of sensing (e.g., distance, obstacle, presence) and desired functions (e.g., sensing and capturing still images and videos) may be used to provide a better user experience. In some embodiments, the camera of the robot may have different fields of view (FOV). For example, a camera may have a horizontal FOV up to or greater than 90 degrees and a vertical FOV up to or greater than 20 degrees. In another example, the camera may have a horizontal FOV between 60-120 degrees and a vertical FOV between 10-80 degrees. In some embodiments, the camera may include lenses and optical arrangements of lenses to increase the FOV vertically or horizontally. For example, the camera may include fish eye lenses to achieve a greater field of view. In some embodiments, the robot may include more than one camera and each camera may be used for a different function. For example, one camera may be used in establishing a perimeter of the environment, a second camera may be used for obstacle sensing, and a third camera may be used for presence sensing. In another example, a depth camera may be used in addition to a main camera. The depth camera may be of various forms. In some embodiments, the camera output may be provided to an image processor for use by a user and to a microcontroller of the camera for depth sensing, obstacle detection, presence detection, etc. In some embodiments, the camera output may be processed locally on the robot by a processor that combine standard image processing functions and user presence detection functions. Alternatively, in some embodiments, the video/image output from the camera may be streamed to a host for processing further or visual usage. In some embodiments, there may be different options for communication and data processing between a dedicated image processor and an obstacle detecting co-processor. For example, a presence of an obstacle in the FOV of a camera may be detected, then a distance to the obstacle may be determined, then the type of obstacle may be determined (e.g., human, pet, table, wire, or another object), then, in the case where the obstacle type is a human, facial recognition may be performed to identify the human. All the information may be processed in multiple layers of abstraction. In embodiments, information may be processed by local microcontrollers, microprocessors, GPUs, on the cloud, or on a central home control unit.

In some embodiments, the robot may include a controller, a multiplexer, and an array of light emitting diodes (LEDs) that may operate in a time division multiplex to create a structured light which the camera may capture at a desired time slot. In some embodiments, a suitable software filter may be used at each time interval to instruct the LED lights to alternate in a particular order or combination and the camera to capture images at a desirable time slot. In some embodiments, a micro electrical-mechanical device may be used to multiplex one or more of the LEDs such that fields of view of one or more cameras may be covered. In some embodiments, the LEDs may operate in any suitable range of wavelengths and frequencies, such as a near-infrared region of the electromagnetic spectrum. In some embodiments, pulses of light may be emitted at a desired frequency and the phase shift of the reflected light signal may be measured. In some sensor types, the emitted lights may be in the form of square waves or other waveforms. A light may be mixed with a sine wave and a cosine wave that may be synchronized with the LED modulation. Then, a first and a second object present in the FOV of the sensor, each of which is positioned at a different distance, may produce a different phase shift that may be associated with their respective distance.

In some embodiments, the robot may include a tiered sensing system, wherein data of a first sensor may be used to initially infer a result and data of a second sensor, complementary to the first sensor, may be used to confirm the inferred result. In some embodiments, the robot may include a conditional sensing system, wherein data of a first sensor may be used to initially infer a result and a second sensor may be operated based on the result being successful or unsuccessful. Additionally, in some embodiments, data collected with the first sensor may be used to determine if data collected with the second sensor is needed or preferred. In some embodiments, the robot may include a state machine sensing system, wherein data from a first sensor may be used to initially infer a result and if a condition is met, a second sensor may be operated. In some embodiments, the robot may include a poll based sensing system wherein data from a first sensor may be used to initially infer a result, and if a condition is met, a second sensor may be operated. In some embodiments, the robot may include a silent synapse activator sensing system, wherein data from a first a sensor may be used to make an observation but the observation does not cause an actuation. In some embodiments, an actuation occurs when a second similar sensing occurs within a predefined time period. In some embodiments, there may be variations wherein a microcontroller may ignore a first sensor reading and may allow processing of a second (or third) sensor reading. For example, a missed light reflection from the floor may not be interpreted to be a cliff unless a second light reflection from the floor is missed. In some embodiments, a Hebbian based sensing method may be used to create correlations between different types of sensing. For example, in Hebb's theory, any two cells repeatedly active at the same time may become associated such that activity in one neuron facilitates activity in the other. When one cell repeatedly assists in firing another cell, an axon of the first cell may develop (or enlarge) synaptic knobs in contact with the soma of the second cell. In some embodiments, Hebb's principle may be used to determine how to alter the weights between artificial neurons (i.e., nodes) of an artificial neural network. In some embodiments, the weight between two neurons increases when two neurons activate simultaneously and decreases when they activate at different times. For example, two nodes that are both positive or negative may have strong positive weights while nodes with opposite sign may have strong negative weights. In some embodiments, the weight $\omega_{ij}=x_i x_j$ may be determined, wherein $\omega_{ij}$ is the weight of the connection from neuron j to neuron i and $x_i$ the input for neuron i. For binary neurons, connections may be set to one when connected neurons have the same activation for a pattern. In some embodiments, the weight $\omega_{ij}$ be determined using $$\frac{1}{p}\sum_{k=1}^{p} x_i^k x_j^k,$$

wherein p is the number of training patterns, and $x_i^k$ is input k for neuron i. In some embodiments, Hebb's rule $\Delta\omega_i=\eta x_i y$ may be used, wherein $\Delta\omega_i$ is the change in synaptic weight i, $\eta$ is a learning rate, and y a postsynaptic response. In some embodiments, the postsynaptic response may be determined using $y=\omega_j x_j$. In some embodiments, other methods such as BCM theory, Oja's rule, or generalized Hebbian algorithm may be used.

Figure 1A:
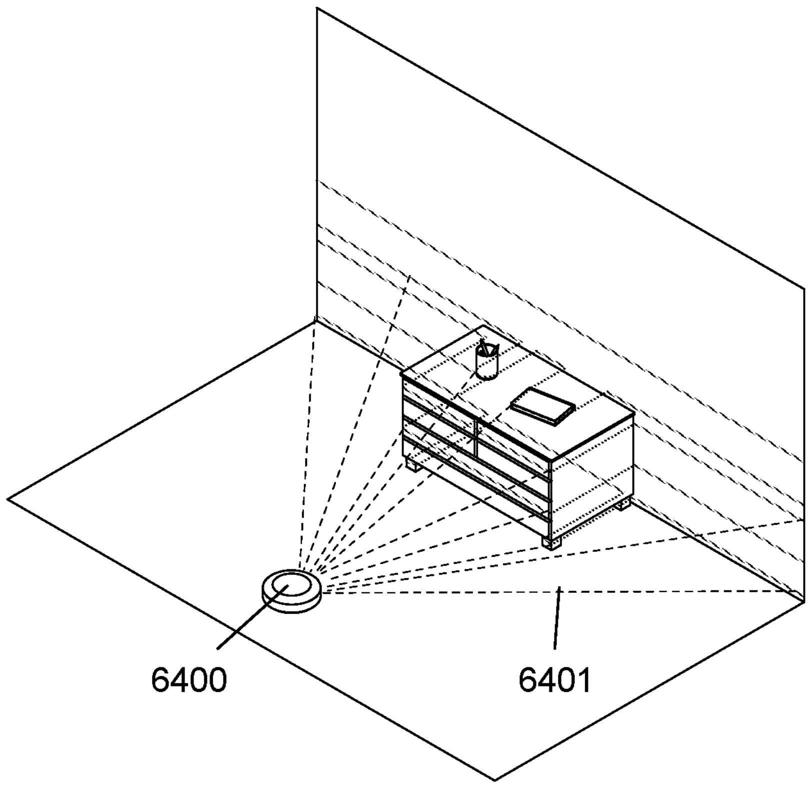
FIGS. 1A and 1B illustrate an example of a sensor observing an environment, according to some embodiments.
Figure 1B:
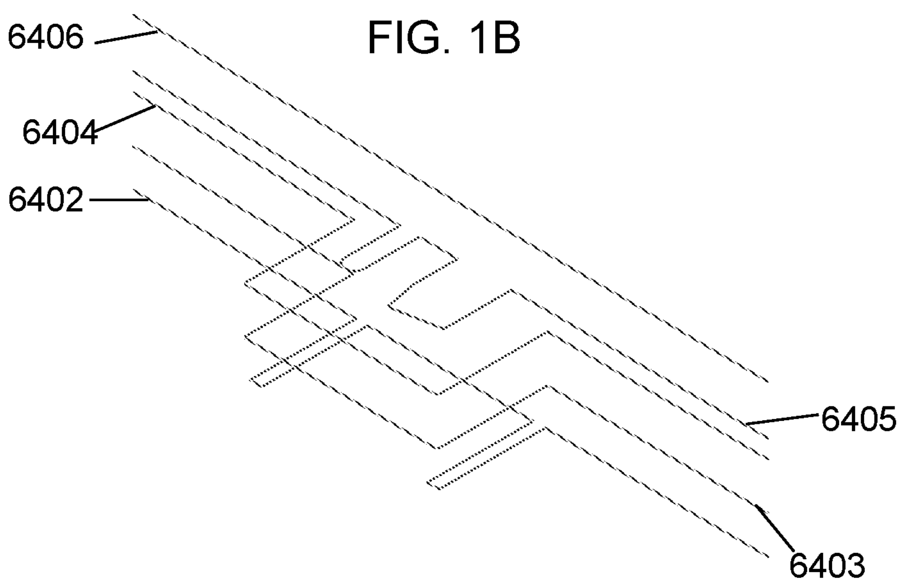

In some embodiments, a sensor of the robot (e.g., two-and-a-half dimensional LIDAR) observes the environment in layers. For example, FIG. 1A illustrates a robot 6400 taking sensor readings 6401 using a sensor, such as a two-and-a-half dimensional LIDAR. The sensor may observe the environment in layers. For example, FIG. 1B illustrates an example of a first layer 6402 observed by the sensor at a height 10 cm above the driving surface, a second layer 6403 at a height 40 cm above the driving surface, a third layer 6404 at a height 80 cm above the driving surface, a fourth layer 6405 at a height 120 cm above the driving surface, and a fifth layer 6406 at a height 140 cm from the driving surface, corresponding with the five measurement lines in FIG. 1A. In some embodiments, the processor of the robot determines an imputation of the layers in between those observed by the sensor based on the set of layers S={layer 1, layer 2, layer 3, . . . } observed by the sensor. In some embodiments, the processor may generate a set of layers S'={layer 1', layer 2', layer 3', . . . } in between the layers observed by the sensor, wherein layer 1', layer 2', layer 3' may correspond with layers that are located a predetermined height above layer 1, layer 2, layer 3, respectively. In some embodiments, the processor may combine the set of layers observed by the sensor and the set of layers in between those observed by the sensor, S'+S={layer 1, layer 1', layer 2, layer 2', layer 3, layer 3', . . . }. In some embodiments, the processor of the robot may therefore generate a complete three dimensional map (or two-and-a-half dimensional when the height of the map is limited to a particular range) with any desired resolution. This may be useful in avoiding analysis of unwanted or useless data during three dimensional processing of the visual data captured by a camera. In some embodiments, data may be transmitted in a medium such as bits, each comprised of a zero or one. In some embodiments, the processor of the robot may use entropy to quantify the average amount of information or surprise (or unpredictability) associated with the transmitted data. For example, if compression of data is lossless, wherein the entire original message transmitted can be recovered entirely by decompression, the compressed data has the same quantity of information but is communicated in fewer characters. In such cases, there is more information per character, and hence higher entropy. In some embodiments, the processor may use Shannon's entropy to quantify an amount of information in a medium. In some embodiments, the processor may use Shannon's entropy in processing, storage, transmission of data, or manipulation of the data. For example, the processor may use Shannon's entropy to quantify the absolute minimum amount of storage and transmission needed for transmitting, computing, or storing any information and to compare and identify different possible ways of representing the information in fewer number of bits. In some embodiments, the processor may determine entropy using $H(X)=E[-\log_2 p(x_i)]$, $H(X)=-\int p(x_i)\log_2 p(x_i)dx$ in a continuous form, or $H(X)=-\Sigma_i p(x_i)\log_2 p(x_i)$ in a discrete form, wherein H(X) is Shannon's entropy of random variable X with possible outcomes $x_i$ and $p(x_i)$ is the probability of $x_i$ occurring. In the discrete case, $-\log_2 p(x)$ is the number of bits required to encode $x_i$.

In some embodiments, the arrangement of LEDs, proximity sensors, and cameras of the robot may be directed towards a particular FOV. In some embodiments, at least some adjacent sensors of the robot may have overlapping FOVs. In some embodiments, at least some sensors may have a FOV that does not overlap with a FOV of another sensor. In some embodiments, sensors may be coupled to a curved structure to form a sensor array wherein sensors have diverging FOVs. Given the geometry of the robot is known, implementation and arrangement of sensors may be chosen based on the purpose of the sensors and the application.

In some embodiments, some peripherals or sensors may require calibration before information collected by the sensors is usable by the processor. For example, traditionally, robots may be calibrated on the assembly line. However, the calibration process is time consuming and slows production, adding costs to production. Additionally, some environmental parameters of the environment within which the peripherals or sensors are calibrated may impact the readings of the sensors when operating in other surroundings. For example, a pressure sensor may experience different atmospheric pressure levels depending on its proximity to the ocean or a mountain. Some embodiments may include a method to self-calibrate sensors. For instance, some embodiments may self-calibrate the gyroscope and wheel encoder.

In some embodiments, sensor may be conditioned. A function $f(x)=A^{-1}x$, given $A\in R^{n\times n}$, with an eigenvalue decomposition may have a condition number $$\max_{i,j}\left|\frac{\lambda_i}{\lambda_j}\right|.$$

The condition number may be the ratio of the largest eigenvalue to the smallest eigenvalue. A large condition number may indicate that the matrix inversion is very sensitive to error in the input. In some cases, a small error may propagate. The speed at which the output of a function changes with the input the function receives is affected by the ability of a sensor to provide proper information to the algorithm. This may be known as sensor conditioning. For example, poor conditioning may occur when a small change in input causes a significant change in the output. For instance, rounding errors in the input may have a large impact on the interpretation of the data. Consider the functions $$y = f(x)f'(x) = \frac{dy}{dx},$$

wherein $$\frac{dy}{dx}$$

is the slope of $f(x)$ at point x. Given a small error $\in$, $f(x+E) \approx f(x) + \in f'(x)$. In some embodiments, the processor may use partial derivatives to gauge effects of changes in the input on the output. The use of a gradient may be a generalization of a derivative in respect to a vector. The gradient $\nabla_x f(x)$ of the function $f(x)$ may be a vector including all first partial derivatives. The matrix including all first partial derivatives may be the Jacobian while the matrix including all the second derivatives may be the Hessian, $$H(f(x))_{i,j} = \frac{\partial^2}{\partial x_i \partial x_j} f(x).$$

The second derivatives may indicate how the first derivatives may change in response to changing the input knob, which may be visualized by a curvature.

In some embodiments, any of a Digital Signal Processor (DSP) and Single Input-Multiple Data (SIMD) architecture may be used. In some embodiments, any of a Reduced Instruction Set (RISC) system, an emulated hardware environment, and a Complex Instruction Set (CISC) system using various components such as a Graphic Processing Unit (GPU) and different types of memory (e.g., Hash, RAM, double data rate (DDR) random access memory (RAM), etc.) may be used. In some embodiments, various interfaces, such as Inter-Integrated Circuit (I2C), Universal Asynchronous Receiver/Transmitter (UART), Universal Synchronous/Asynchronous Receiver/Transmitter (USART), Universal Serial Bus (USB), and Camera Serial Interface (CSI), may be used. In embodiments, each of the interfaces may have an associated speed (i.e., data rate). For example, thirty 1 MB images captured per second results in the transfer of data at a speed of 30 MB per second. In some embodiments, memory allocation may be used to buffer incoming or outgoing data or images. In some embodiments, there may be more than one buffer working in parallel, round robin, or in serial. In some embodiments, at least some incoming data may be time stamped, such as images or readings from odometry sensors, IMU sensor, gyroscope sensor, LIDAR sensor, etc.

In some embodiments, the robot may include cable management infrastructure. For example, the robot may include shelves with one or more cables extending from a main cable path and channeled through apertures available to a user with access to the corresponding shelf. In some embodiments, there may be more than one cable per shelf and each cable may include a different type of connector. In some embodiments, some cables may be capable of transmitting data at the same time. In some embodiments, data cables such as USB cables, mini-USB cables, firewire cables, category 5 (CAT-5) cables, CAT-6 cables, or other cables may be used to transfer power. In some embodiments, to protect the security and privacy of users plugging their mobile device into the cables, all data may be copied or erased. Alternatively, in some embodiments, inductive power transfer without the use of cables may be used.

In some embodiments, the robot may include various software components and/or drivers for controlling and managing general system tasks (e.g., memory management, storage device control, power management, etc.) and facilitating communication between various hardware and software components and data received by various software components from RF and/or external ports such as USB, firewire, or Ethernet. In some embodiments, the robot may include capacitate buttons, push buttons, rocker buttons, dials, slider switches, joysticks, click wheels, keyboard, an infrared port, a USB port, and a pointer device such as a mouse, a laser pointer, motion detector (e.g., a motion detector for detecting a spiral motion of fingers), etc. In embodiments, different interactions with user interfaces of the robot may provide different reactions or results from the robot. For example, a long press, a short press, and/or a press with increased pressure of a button may each provide different reactions or results from the robot. In some cases, an action may be enacted upon the release of a button or upon pressing a button.

Figure 2A:
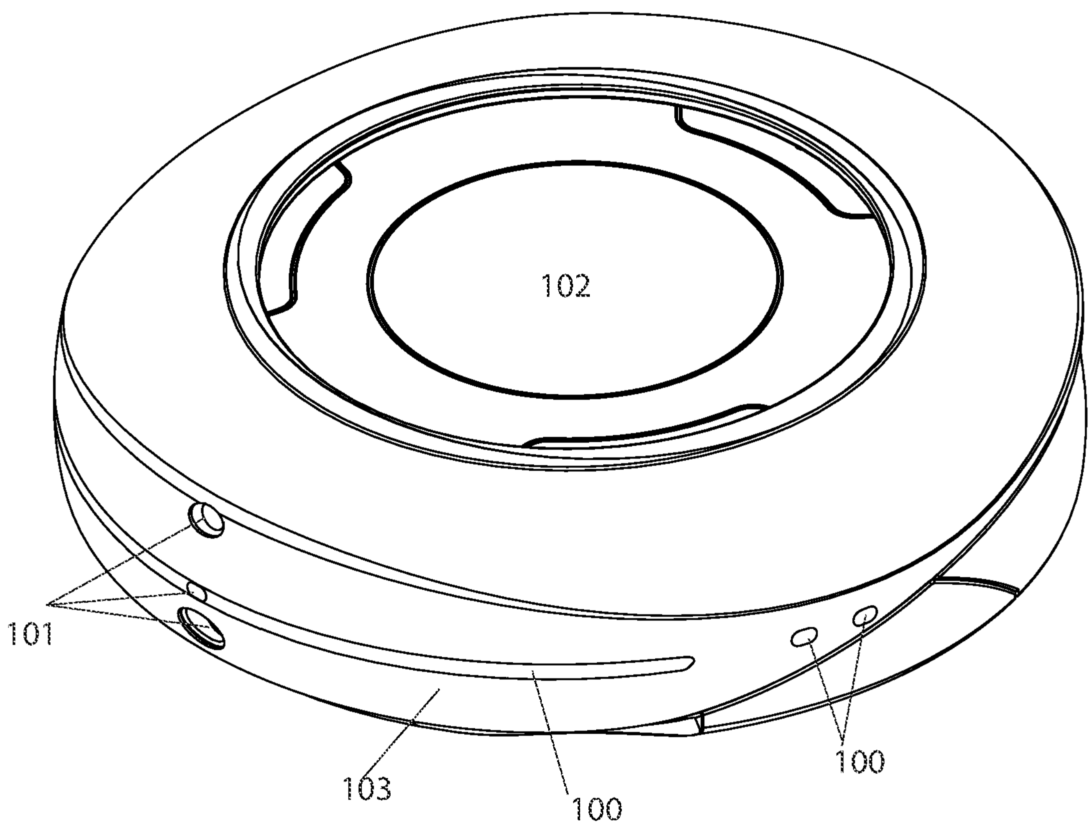
FIGS. 2A and 2B illustrate an example of a robot, according to some embodiments.
Figure 2B:
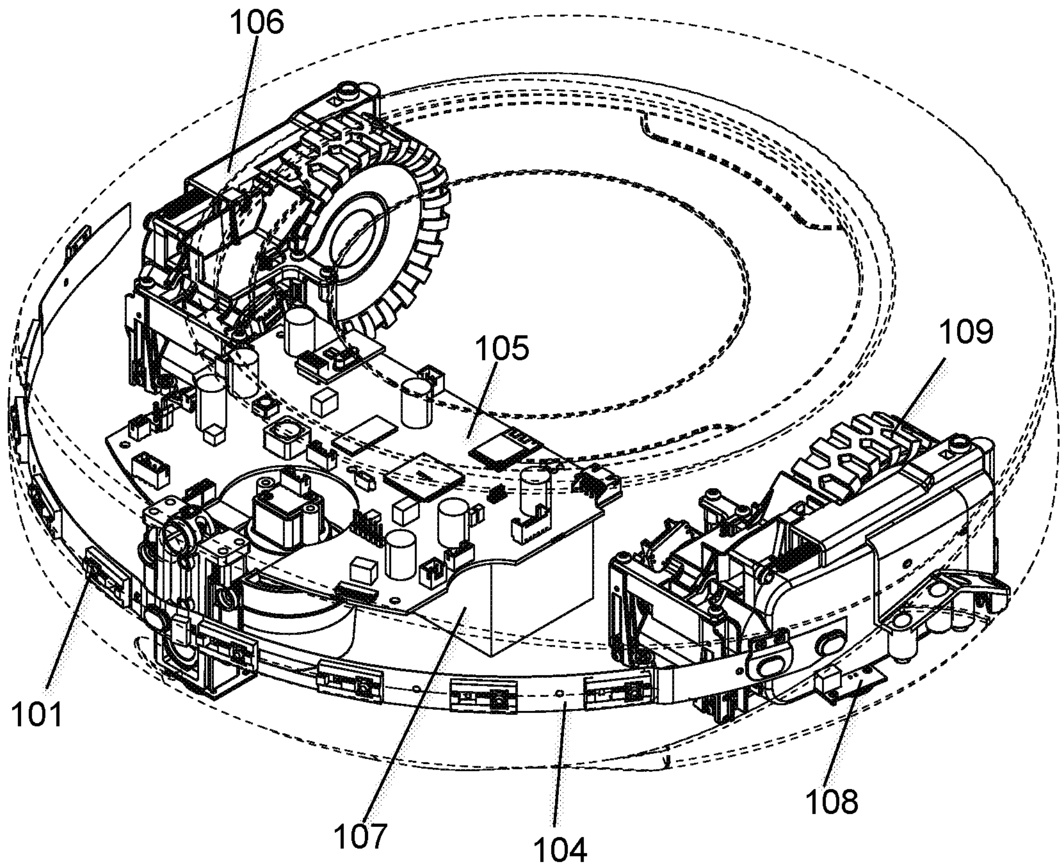
Figure 3:
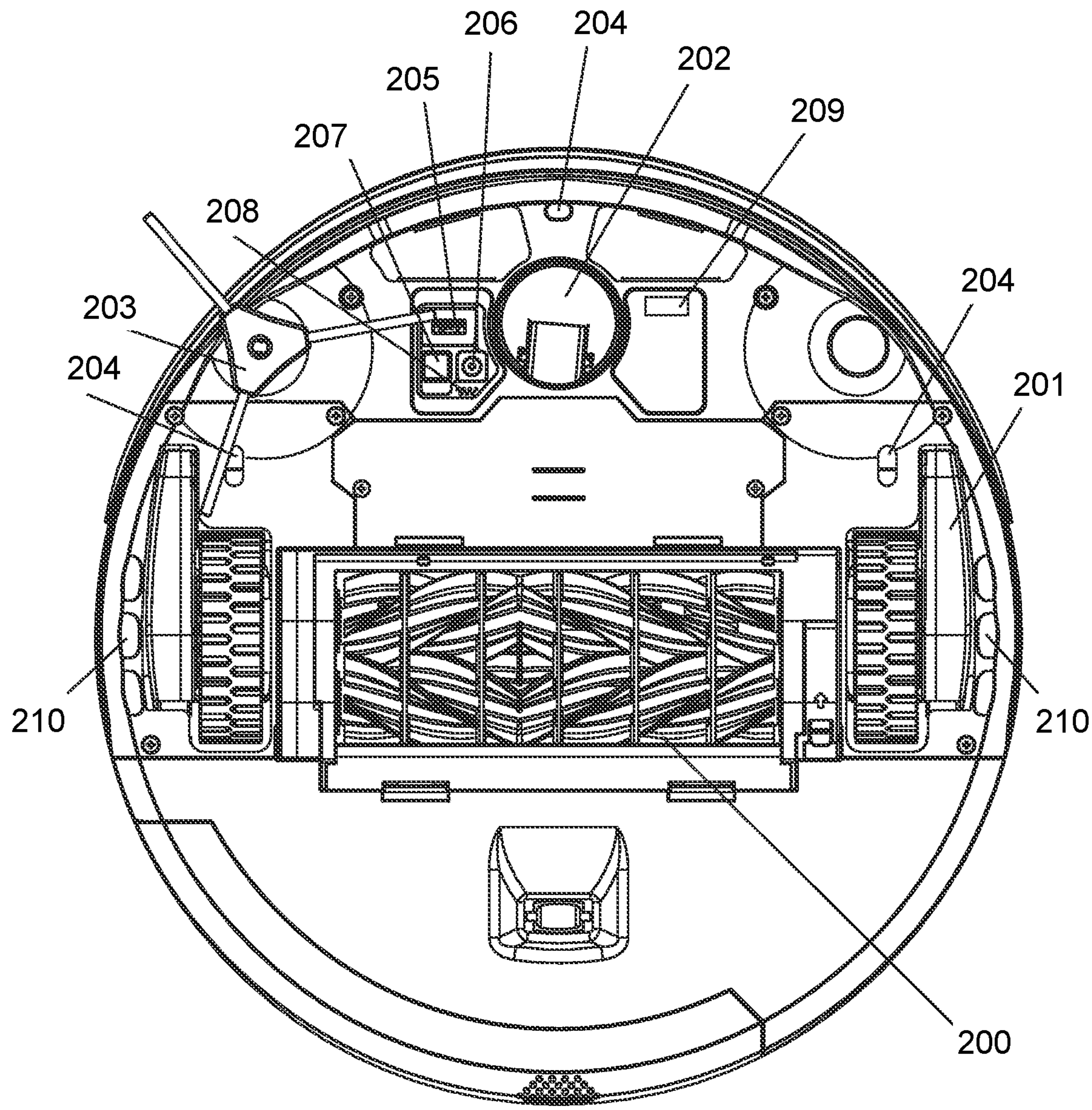
FIG. 3 illustrates an example of an underside of a robotic cleaner, according to some embodiments.

FIG. 2A illustrates an example of a robot including sensor windows 100 behind which sensors are positioned, sensors 101 (e.g., camera, laser emitter, TOF sensor, IR sensors, range finders, LIDAR, depth cameras, etc.), user interface 102, and bumper 103. FIG. 2B illustrates internal components of the robot including sensors 101 of sensor array 104, PCB 105, wheel modules each including suspension 106, battery 107, floor sensor 108, and wheel 109. In some embodiments, a processor of the robot may use data collected by various sensors to devise, through various phases of processing, a polymorphic path plan. FIG. 3 illustrates another example of a robot, specifically an underside of a robotic cleaner including rotating screw compressor type dual brushes 200, drive wheels 201, castor wheel 202, peripheral brush 203, sensors on an underside of the robot 204, USB port 205, power port 206, power button 207, speaker 208, and a microphone 209. Indentations 210 may be indentations for fingers of a user for lifting the robot. In some embodiments, the indentations may be coated with a material different than the underside of the robot such that a user may easily distinguish the indentations. In this example, there are three sensors, one in the front and two on the side. The sensors may be used to sense presence and a type of driving surface. In some embodiments, some sensors are positioned on the front, sides, and underneath the robot. In some embodiments, the robot may include one or more castor wheels. In some embodiments, the wheels of the robot include a wheel suspension system. In some embodiments, the wheel suspension includes a trailing arm suspension coupled to each wheel and positioned between the wheel and perimeter of the robot chassis. An example of a dual wheel suspension system is described in U.S. patent application Ser. Nos. 15/951,096 and 16/270,489, the entire contents of which are hereby incorporated by reference. Other examples of wheel suspension systems that may be used are described in U.S. patent application Ser. No. 16/389,797, the entire contents of which is hereby incorporated by reference. In some embodiments, the different wheel suspension systems may be used independently or in combination. In some embodiments, one or more wheels of the robot may be driven by one or more electric motors. In some embodiments, the wheels of the robot are mecanum wheels. Examples of wheels of the robot are described in U.S. Patent Application Ser. Nos. 15/444,966 and 15/447,623, the entire contents of which are hereby incorporated by reference. In some embodiments, the robot may include an integrated bumper, such as those described in U.S. patent application Ser. Nos. 15/924,174, 16/212,463, 16/212,468, the entire contents of which are hereby incorporated by reference.

Figure 4A:
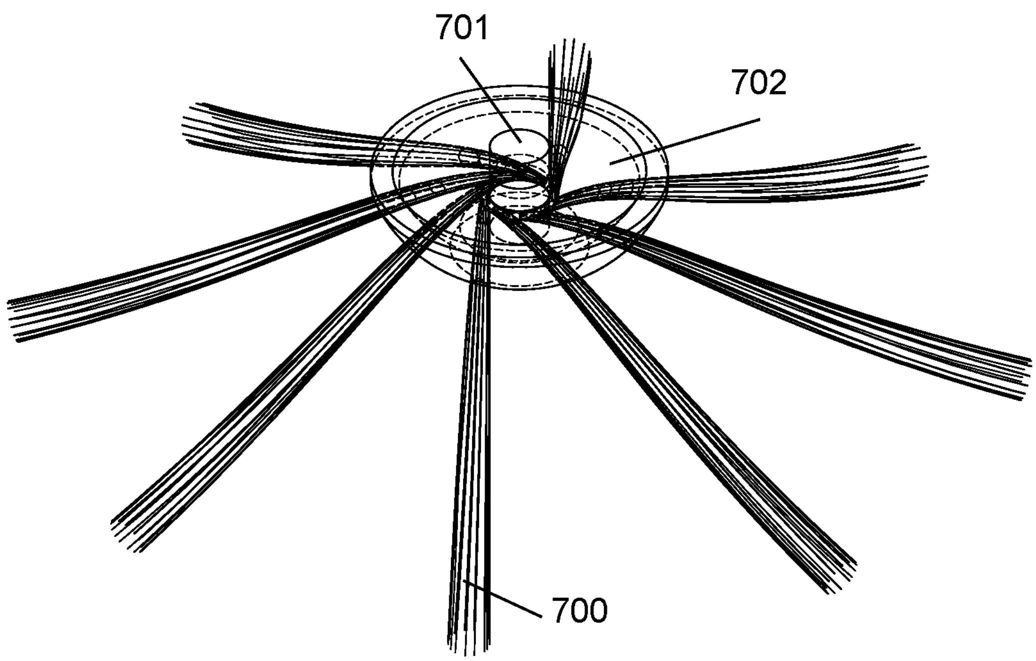
FIGS. 4A-4F illustrate examples of peripheral brushes, according to some embodiments.
Figure 4B:
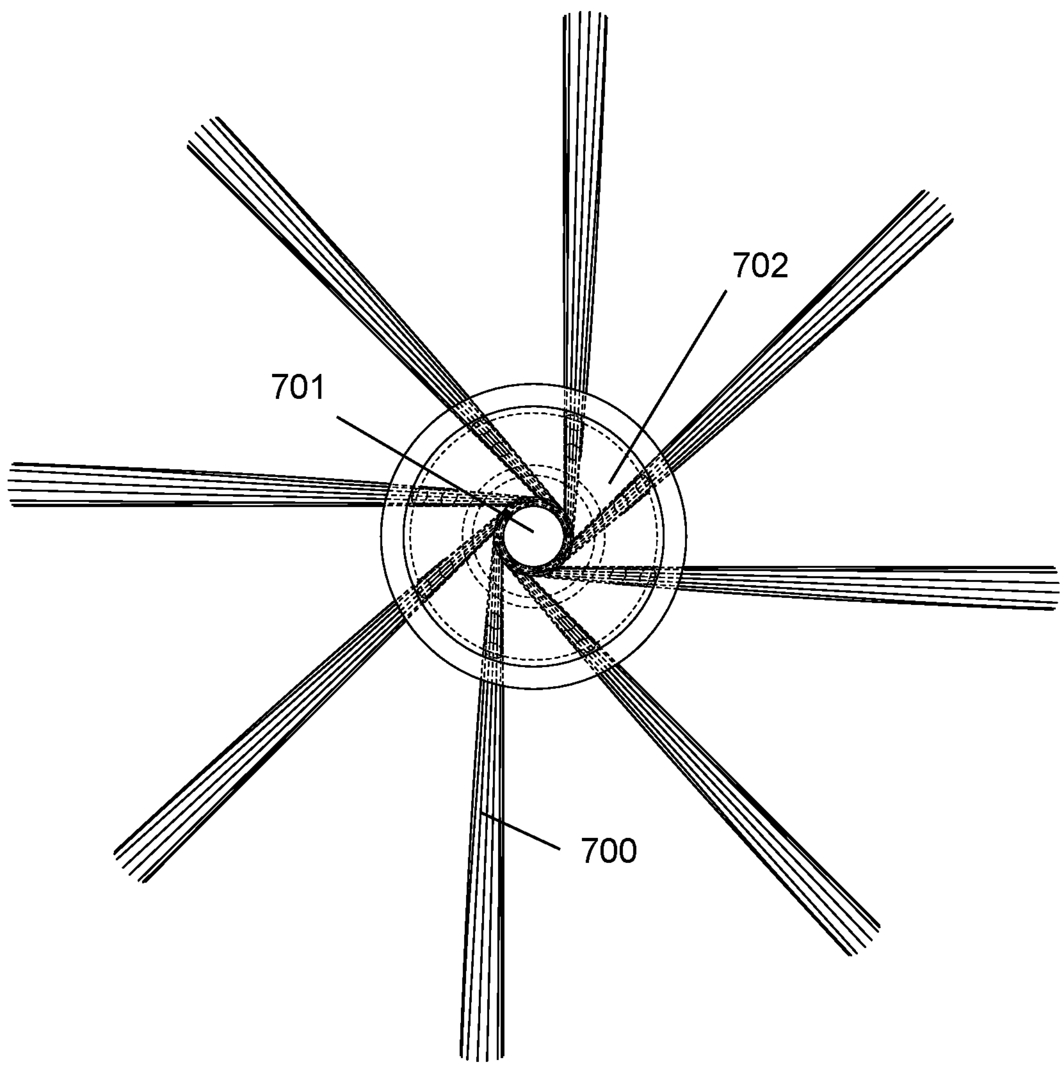
Figure 4C:
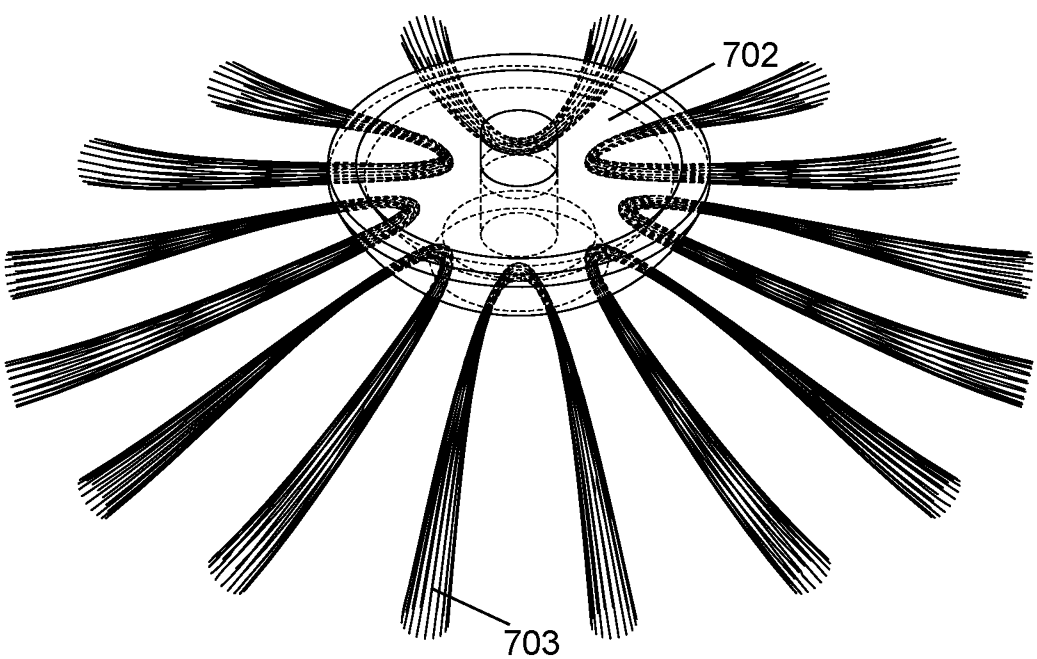
Figure 4D:
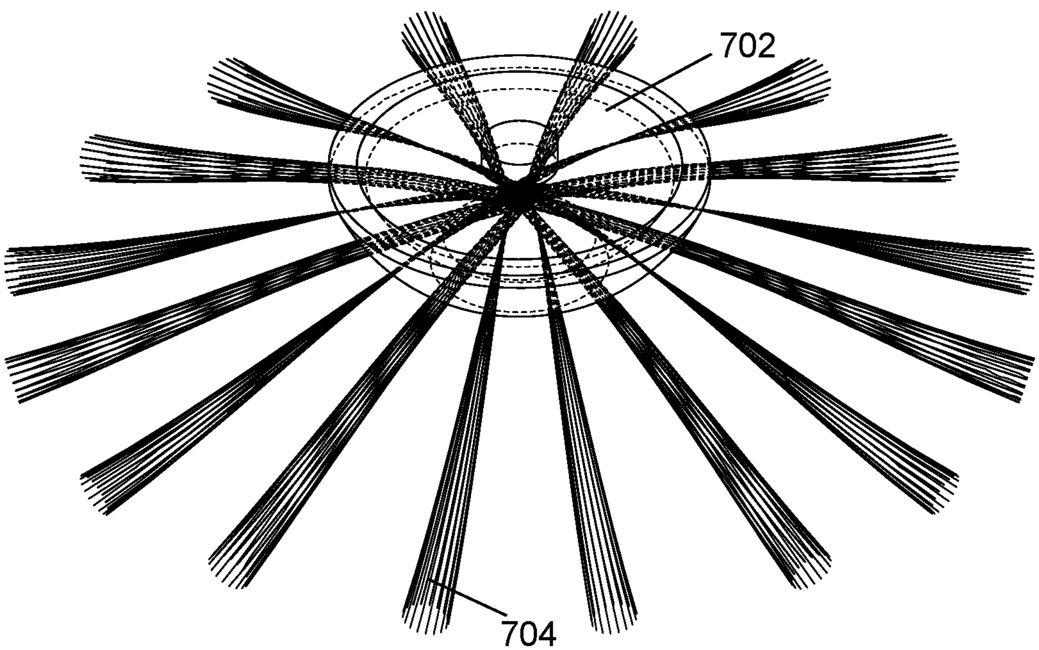
Figure 4E:
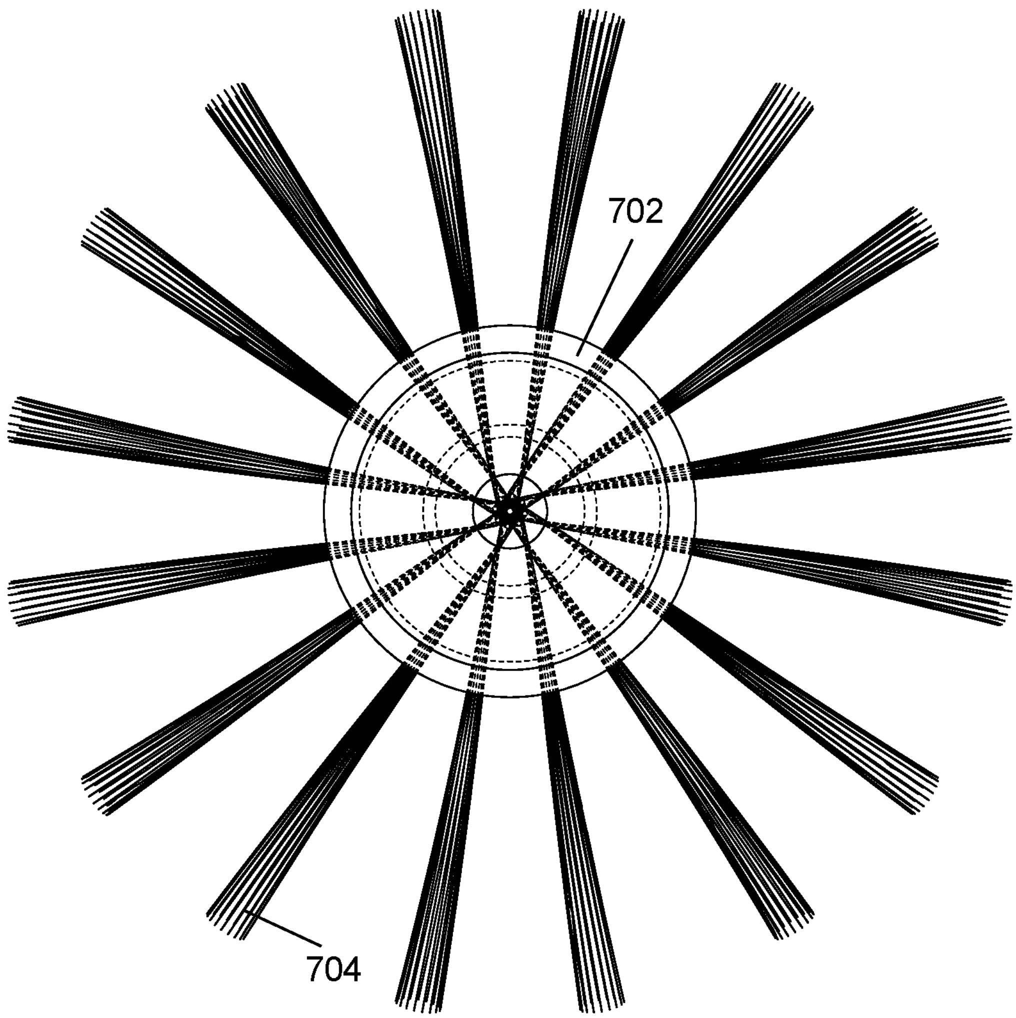
Figure 4F:
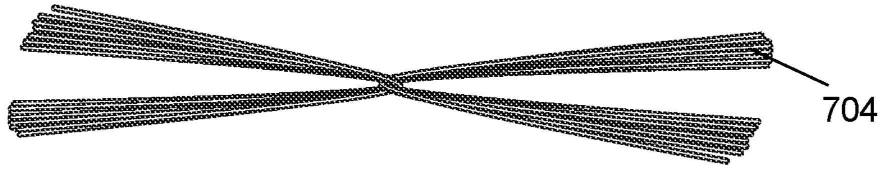
Figure 5A:
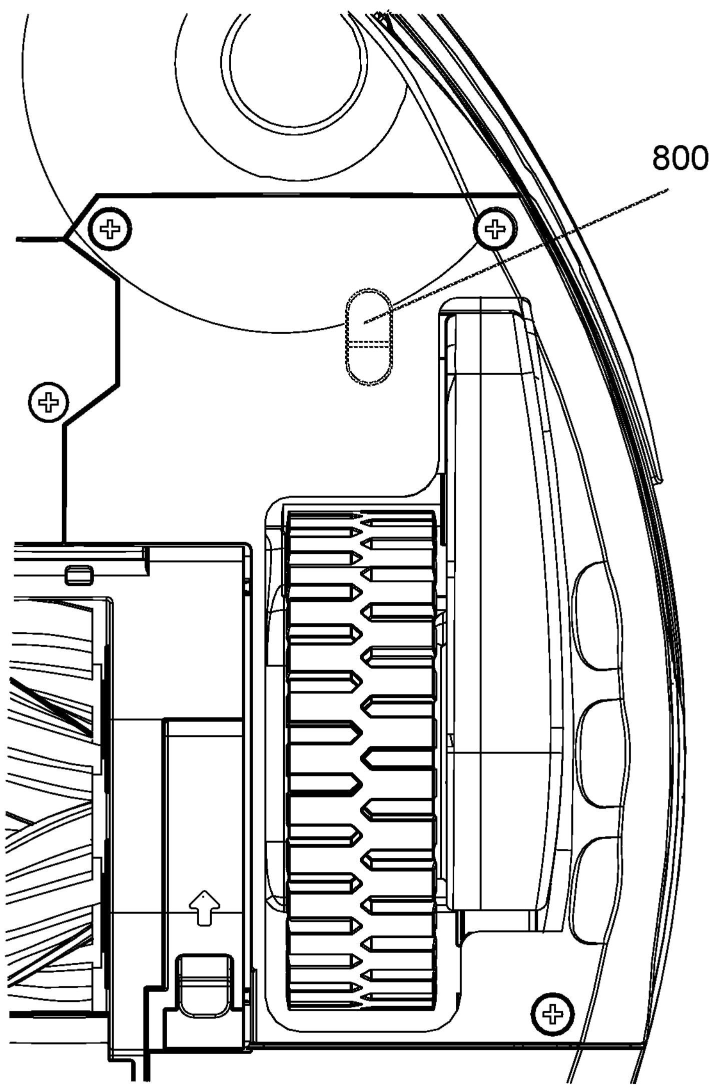
FIGS. 5A-5D illustrate examples of different positions and orientations of floor sensors, according to some embodiments.
Figure 5B:
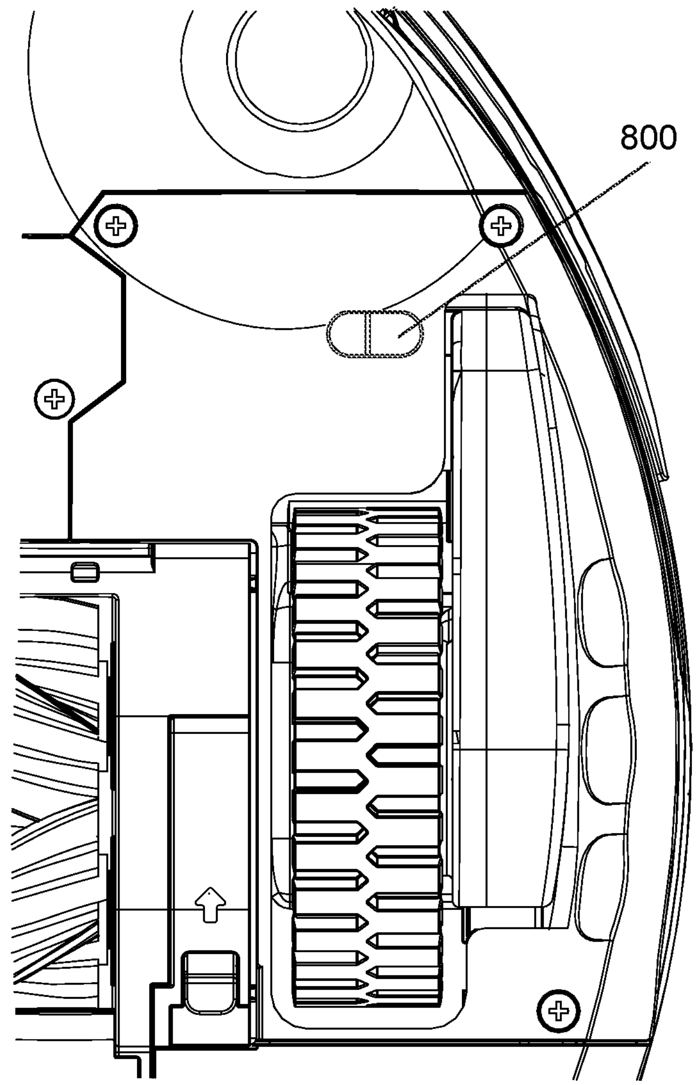
Figure 5C:
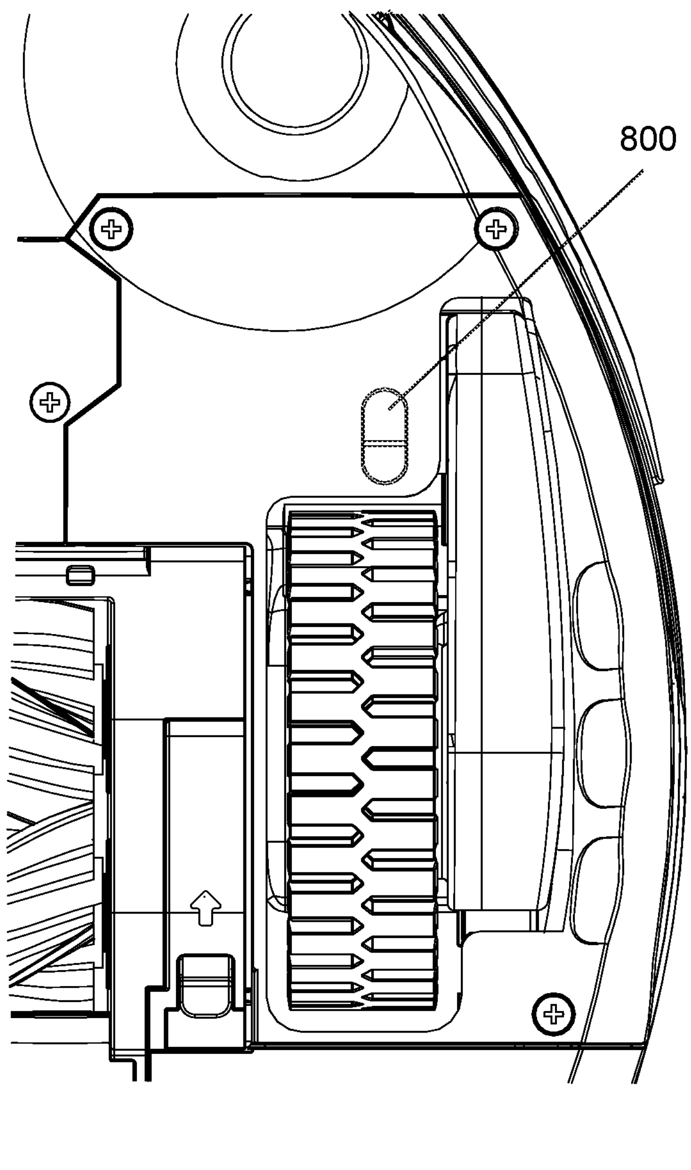
Figure 5D:
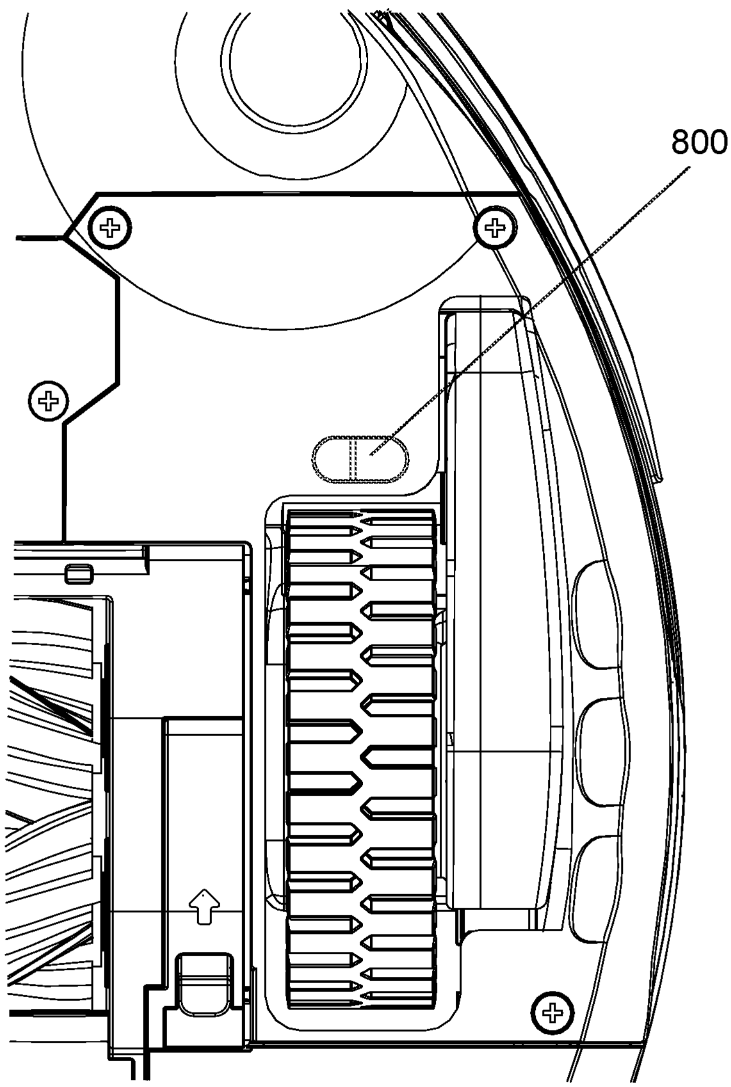

In some embodiments, peripheral brushes of a robotic cleaner, such as peripheral brush 203 of the robotic cleaner in FIG. 3, may implement strategic methods for bristle attachment to reduce the loss of bristles during operation. For example, FIGS. 4A and 4B illustrate one method for bristle attachment wherein each bristle bundle 700 may be wrapped around a cylinder 701 coupled to a main body 702 of the peripheral brush. Each bristle bundle 700 may be wrapped around the cylinder 701 at least once and then knotted with itself to secure its attachment to the main body 702 of the peripheral brush. FIG. 4C illustrates another method for bristle attachment wherein each bristle bundle 703 may be threaded in and out of main body 702 to create two adjacent bristle bundles which may reduce the loss of bristles during operation. In some cases, the portion of each bristle bundle within the main body 702 may attached to the inside of main body 702 using glue, stitching, or another means. FIGS. 4D-4F illustrate another method for bristle attachments wherein bristle bundles 704 positioned opposite to one another are hooked together, as illustrated in FIG. 4F. In all embodiments, the number of bristles in each bristle bundle may vary. Examples of side brushes and a main brush of the robot are described in U.S. patent application Ser. Nos. 15/924,176, 16/024,263, 16/203,385, 15/647,472, 14/922,143, 15/878,228, and 15/462,839.

Figure 6A:
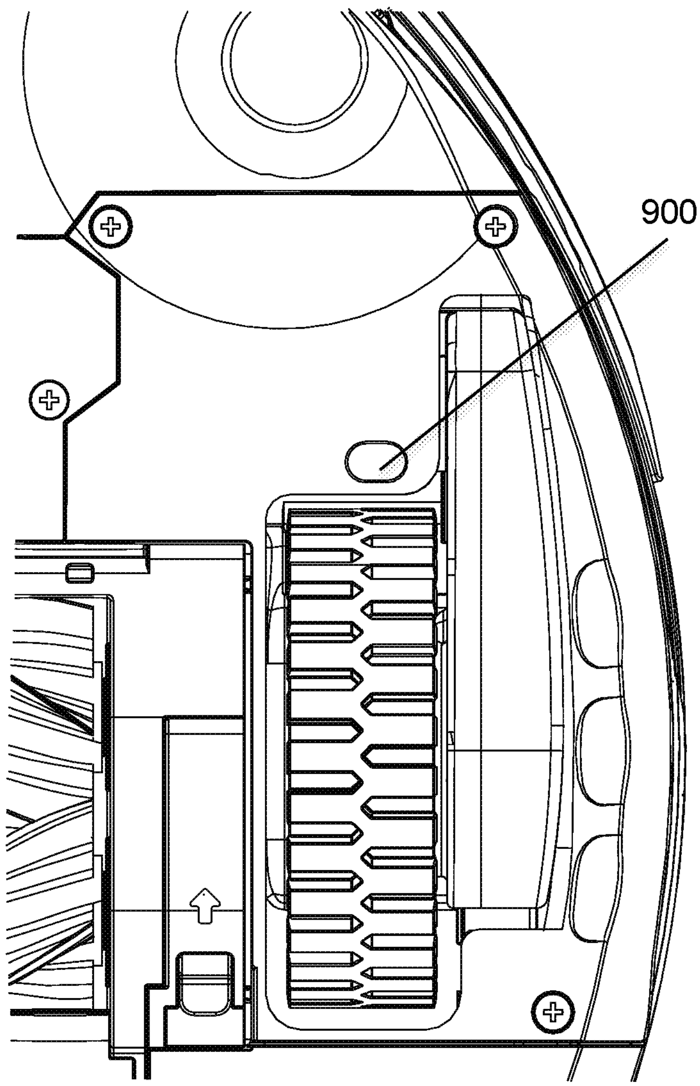
FIGS. 6A and 6B illustrate examples of different positions and types of floor sensors, according to some embodiments.
Figure 6B:
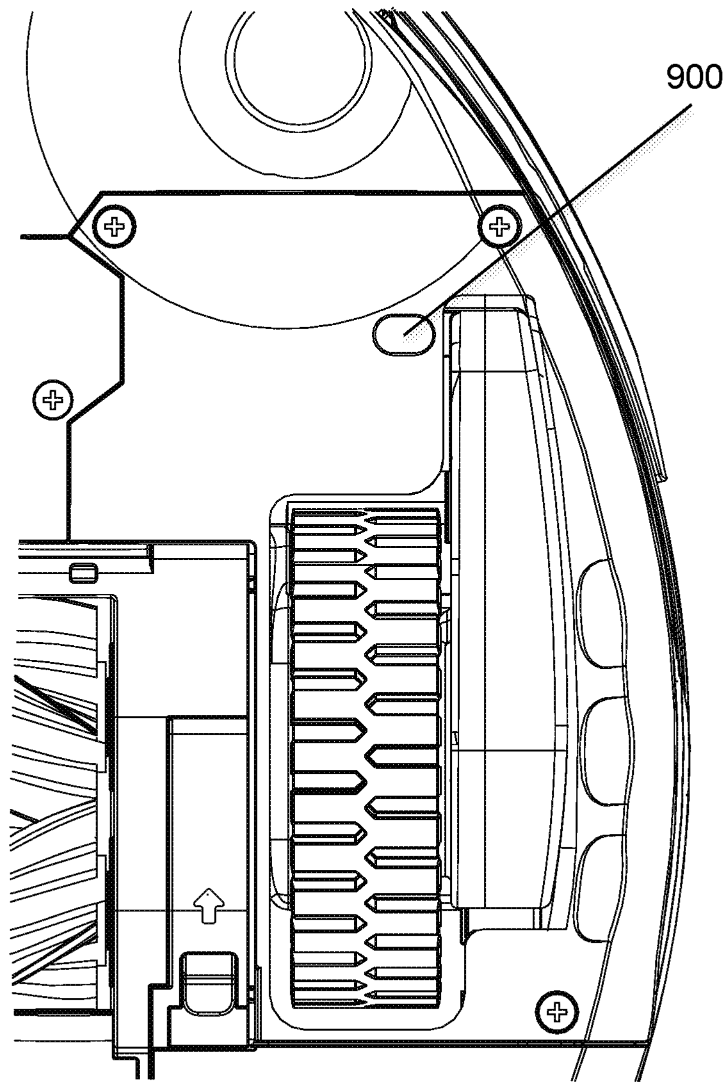
Figure 7:
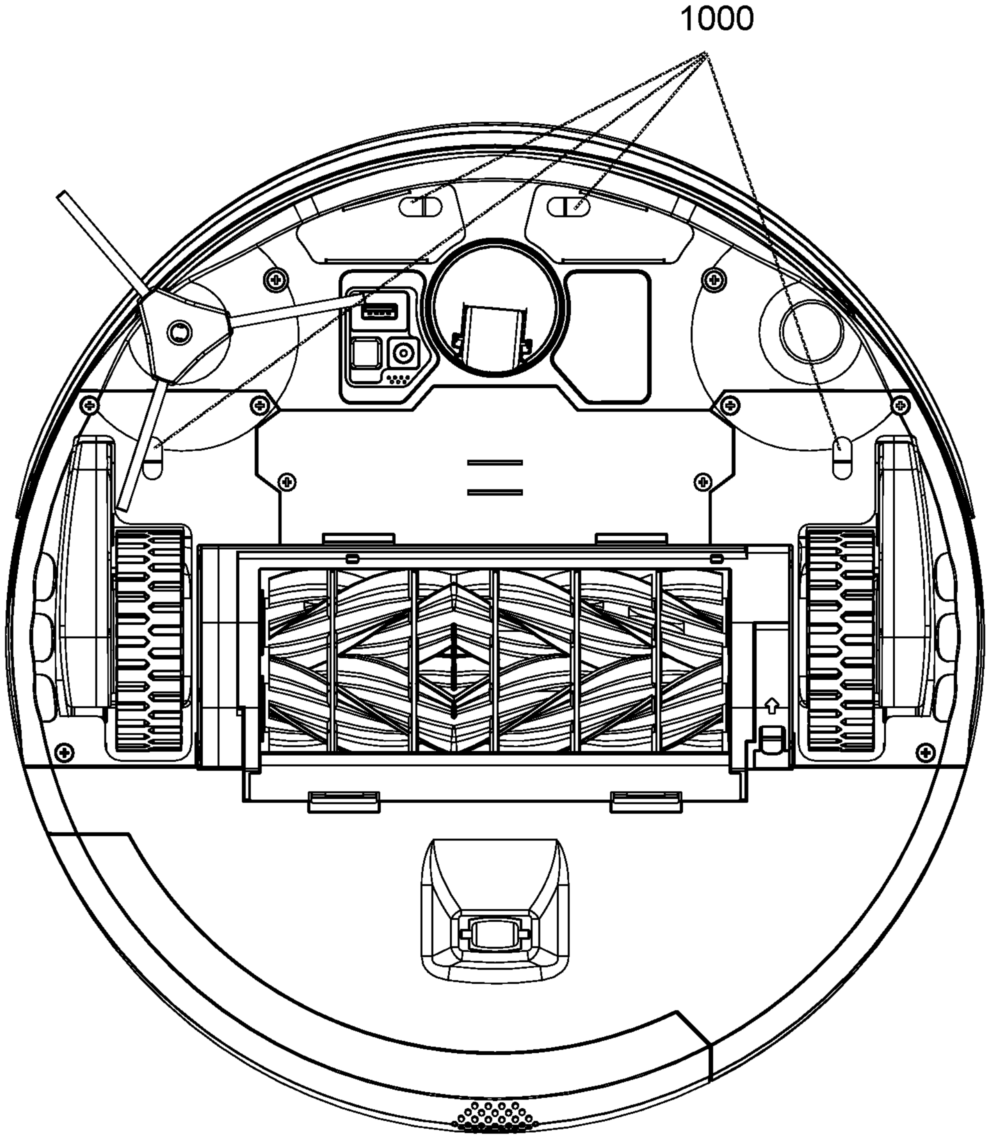
FIG. 7 illustrates an example of an underside of a robotic cleaner, according to some embodiments.
Figure 8:
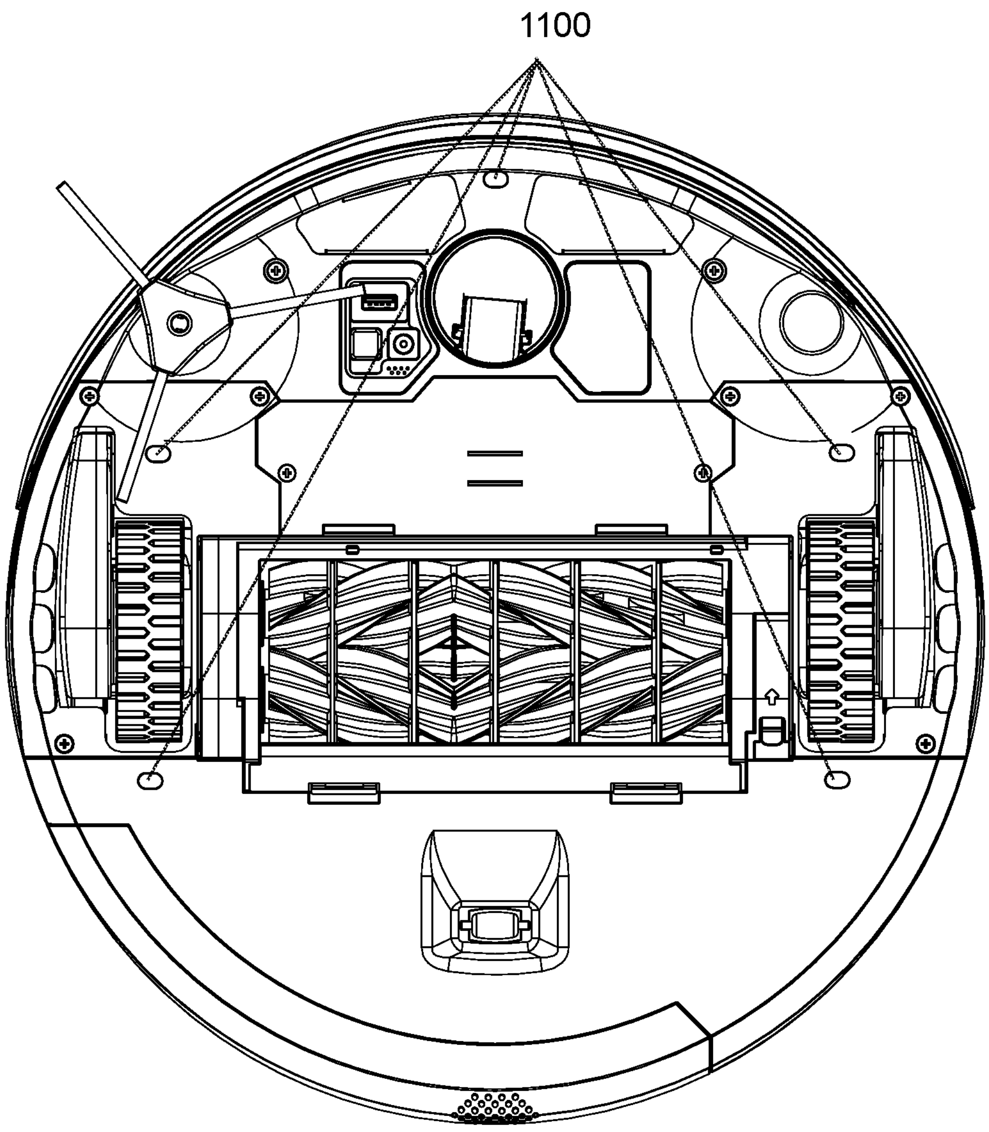
FIG. 8 illustrates an example of an underside of a robotic cleaner, according to some embodiments.
Figure 9:
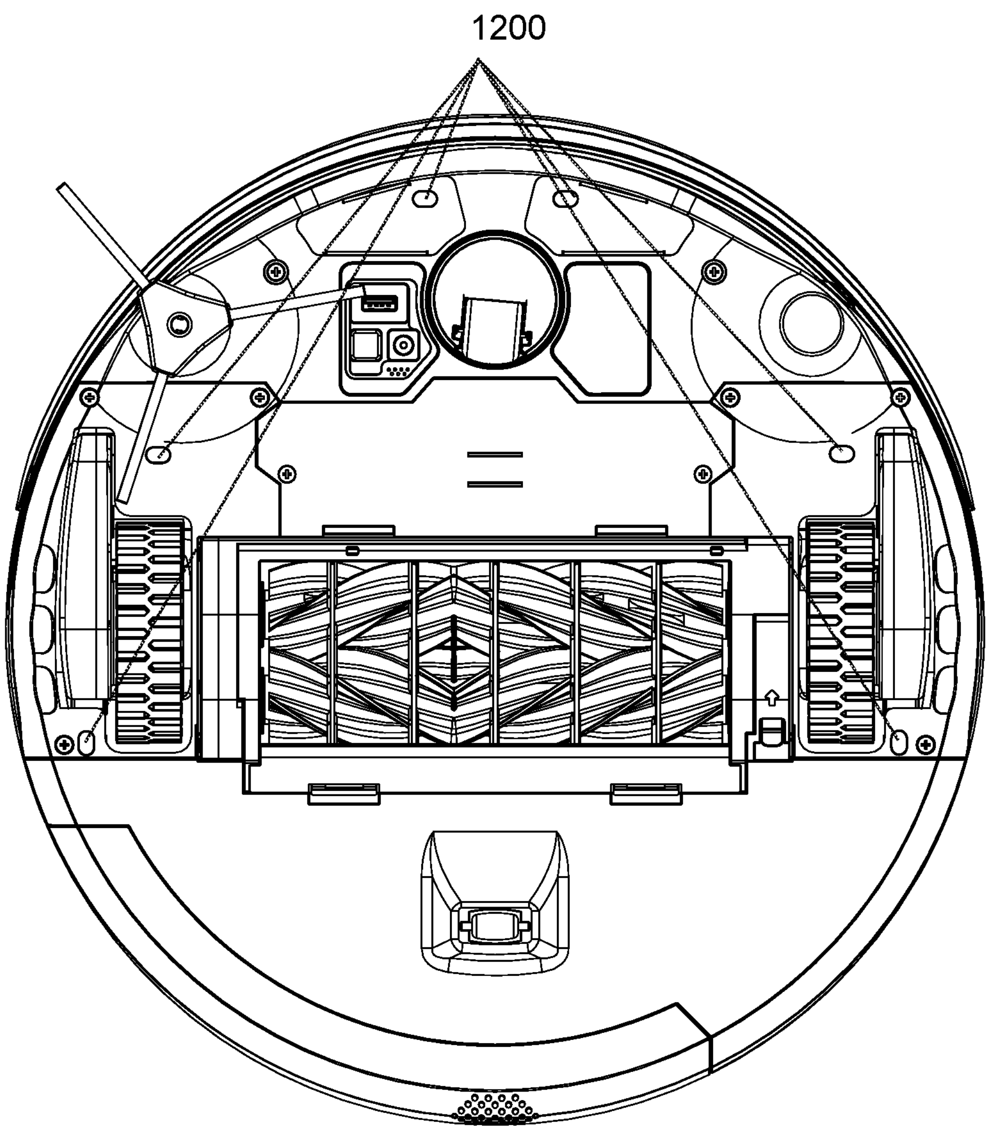
FIG. 9 illustrates an example of an underside of a robotic cleaner, according to some embodiments.

In embodiments, floor sensors, such as those illustrated in FIGS. 2B and 3, may be positioned in different locations on an underside of the robot and may also have different orientations and sizes. FIGS. 5A-5D illustrate examples of alternative positions (e.g., displaced at some distance from the wheel or immediately adjacent to the wheel) and orientations (e.g., vertical or horizontal) for floor sensors 800. The specific arrangement of sensors may depend on the geometry of the robot. In some embodiments, floor sensors may be infrared (IR) sensors, ultrasonic sensors, laser sensors, time-of-flight (TOF) sensors, distance sensors, 3D or 2D range finders, 3D or 2D depth cameras, etc. For example, the floor sensor positioned on the front of the robot in FIG. 3 may be an IR sensor while the floor sensors positioned on the sides of the robot may be TOF sensors. In another example, FIGS. 6A and 6B illustrate examples of alternative positions (e.g., displaced at some distance from the wheel so there is time for the robot to react, wherein the reaction time depends on the speed of the robot and the sensor position) of IR floor sensors 900 positioned on the sides of the underside of the robot. In these examples, the floor sensors are positioned in front of the wheel (relative to a forward moving direction of the wheel) to detect a cliff as the robot moves forward within the environment. Floor sensors positioned in front of the wheel may detect cliffs faster than floor sensors positioned adjacent to or further away from the wheel. In embodiments, the number of floor sensors coupled to the underside of the robot may vary depending on the functionality. For example, some robots may rarely drive backwards while others may drive backwards more often. Some robots may only turn clockwise while some may turn counterclockwise while some may do both. Some robots may execute a coastal drive or navigation from one side of the room. For example, FIG. 7 illustrates an example of an underside of a robotic cleaner with four floor sensors 1000. FIG. 8 illustrates an example of an underside of a robotic cleaner with five floor sensors 1100. FIG. 9 illustrates an example of an underside of a robotic cleaner with six floor sensors 1200. In some embodiments, the processor of the robot may detect cliffs based on data collected by the floor sensors. Such methods are further described in U.S. patent application Ser. Nos. 14/941,385, 16/279,699, and 16/041,470, the entire contents of which are hereby incorporated by reference.

Figure 10:
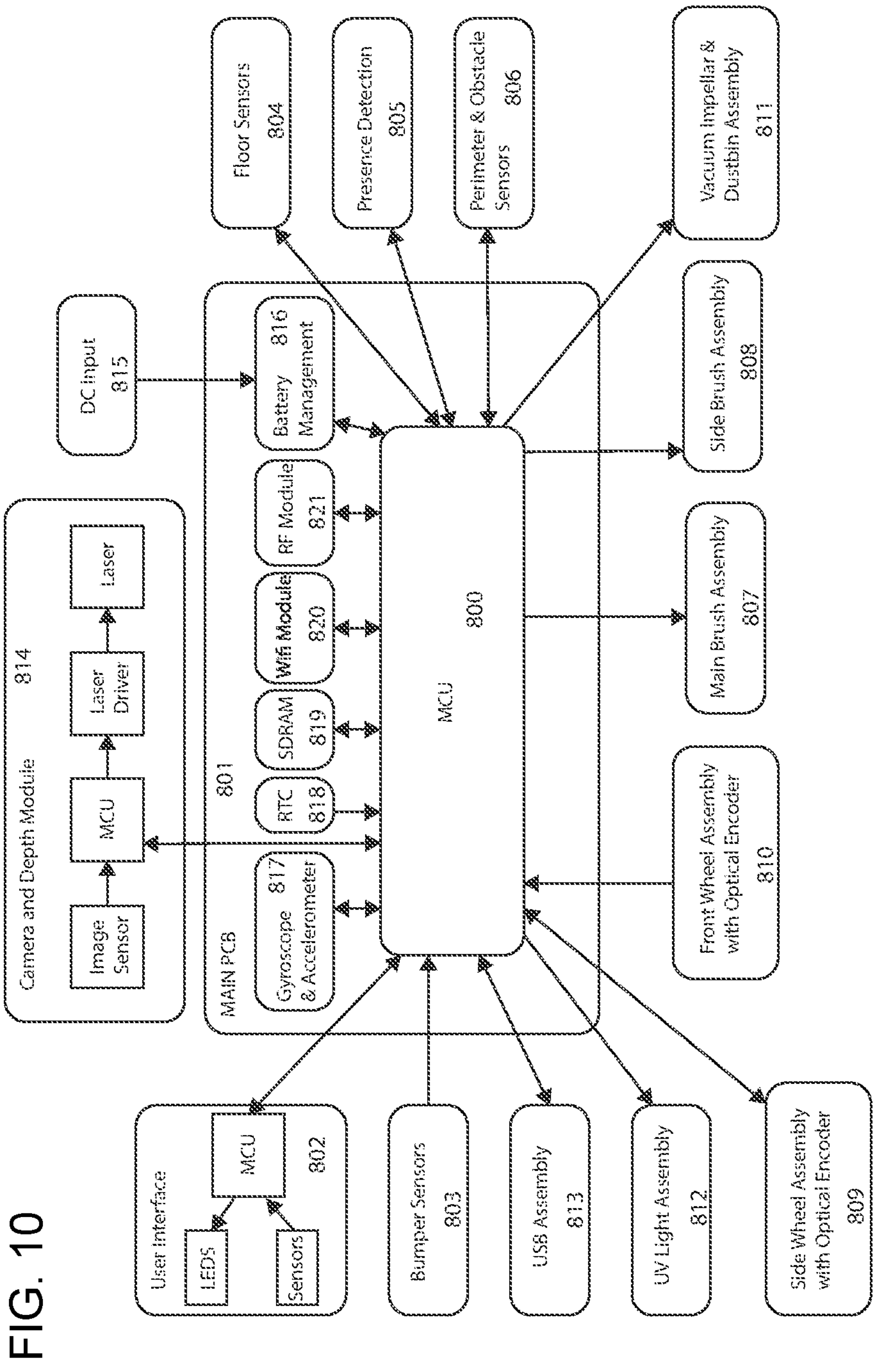
FIG. 10 illustrates an example of a control system and components connected thereto, according to some embodiments.

FIG. 10 illustrates an example of a control system of a robot and components connected thereto. In some embodiments, the control system and related components are part of a robot and carried by the robot as the robot moves. Microcontroller unit (MCU) 800 of main printed circuit board (PCB) 801, or otherwise the control system or processor, has connected to it user interface module 802 to receive and respond to user inputs; bumper sensors 803, floor sensors 804, presence sensors 805 and perimeter and obstacle sensors 806, such as those for detecting physical contacts with objects, edges, docking station, and the wall; main brush assembly motor 807 and side brush assembly motor 808; side wheel assembly 809 and front wheel assembly 810, both with encoders for measuring movement; vacuum impeller motor 811; UV light assembly 812 for disinfection of a floor, for example; USB assembly 813 including those for user programming; camera and depth module 814 for mapping; and power input 815. Included in the main PCB are also battery management 816 for charging; accelerometer and gyroscope 817 for measuring movement; RTC 818 for keeping time; SDRAM 819 for memory; Wi-Fi module 820 for wireless control; and RF module 821 for confinement or communication with docking station. The components shown in FIG. 10 are for illustrative purposes and are not meant to limit the control system and components connected thereto, which is not to suggest that any other description is limiting. Direction of arrows signifies direction of information transfer and is also for illustrative purposes as in other instances direction of information transfer may vary.

Figure 11A:
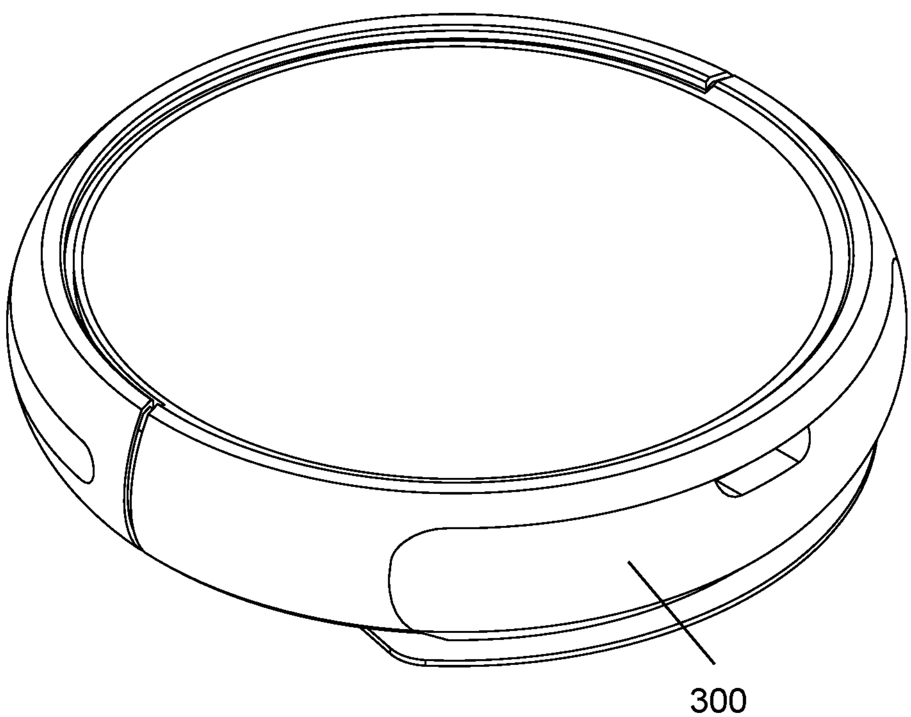
FIGS. 11A-11G and 12A-12C illustrate an example of a robot with vacuuming and mopping capabilities, according to some embodiments.
Figure 11B:
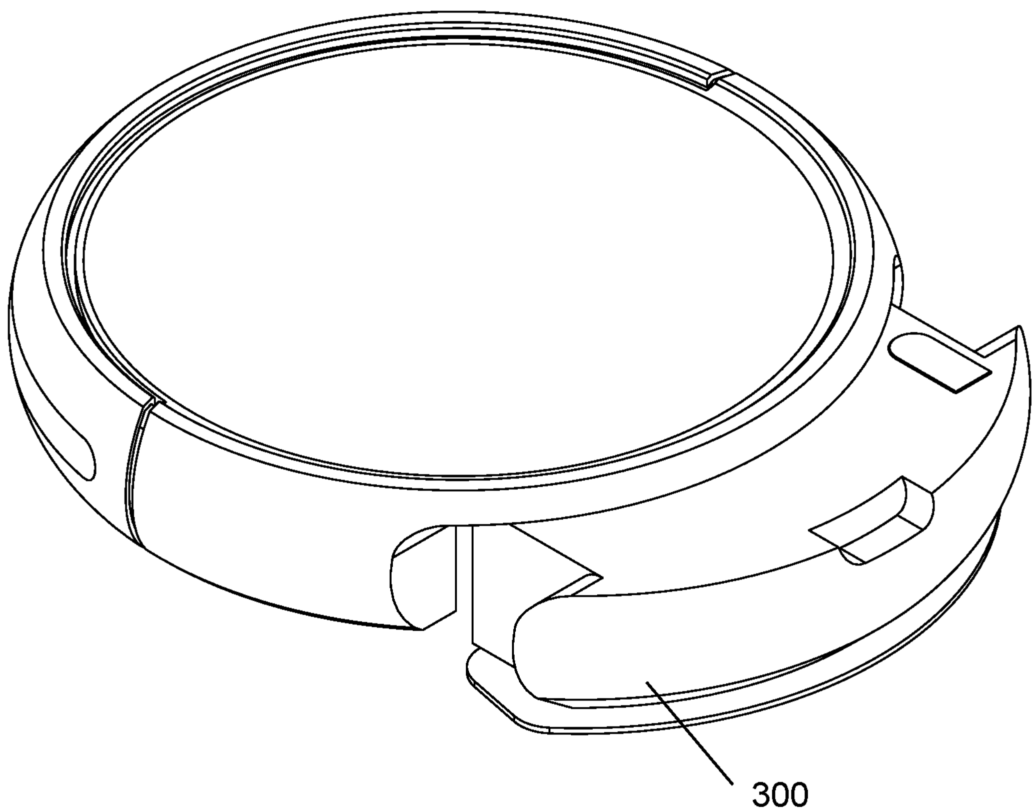
Figure 11C:
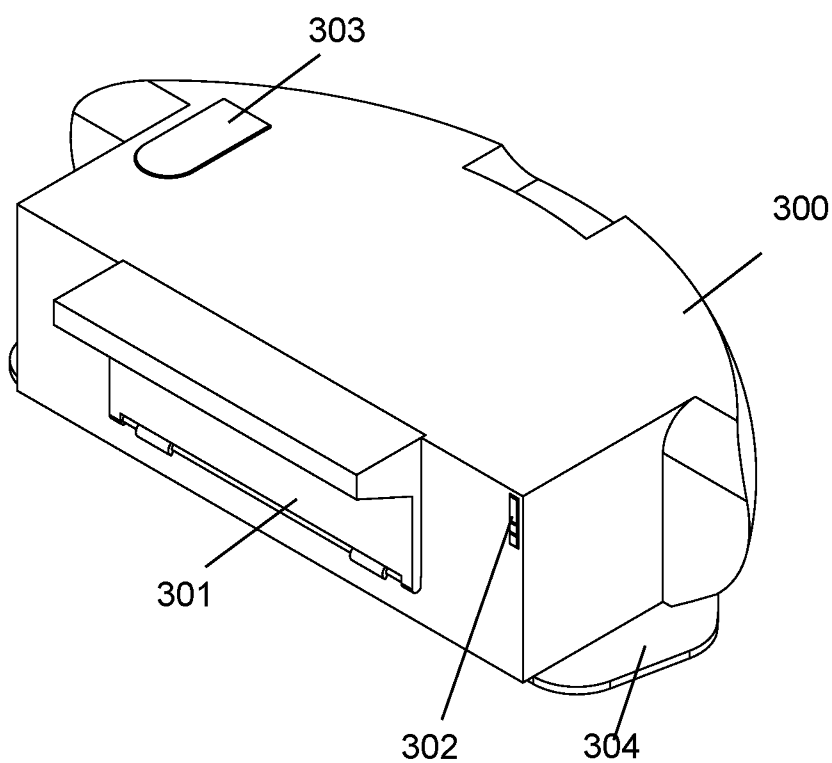
Figure 11D:
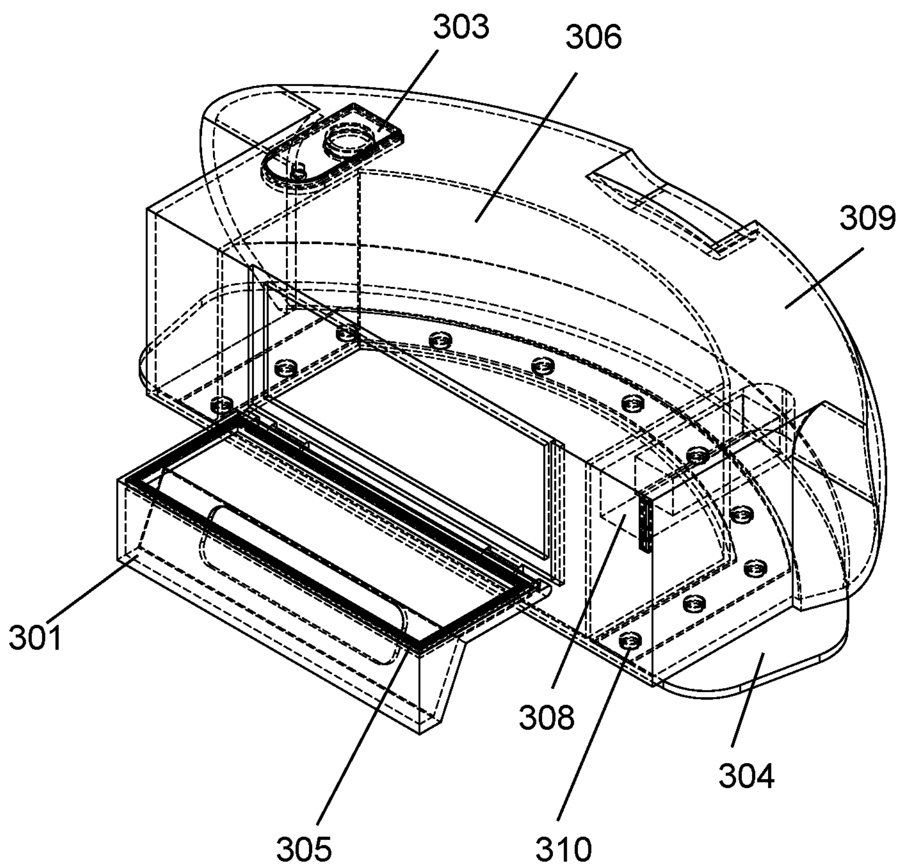
Figure 11E:
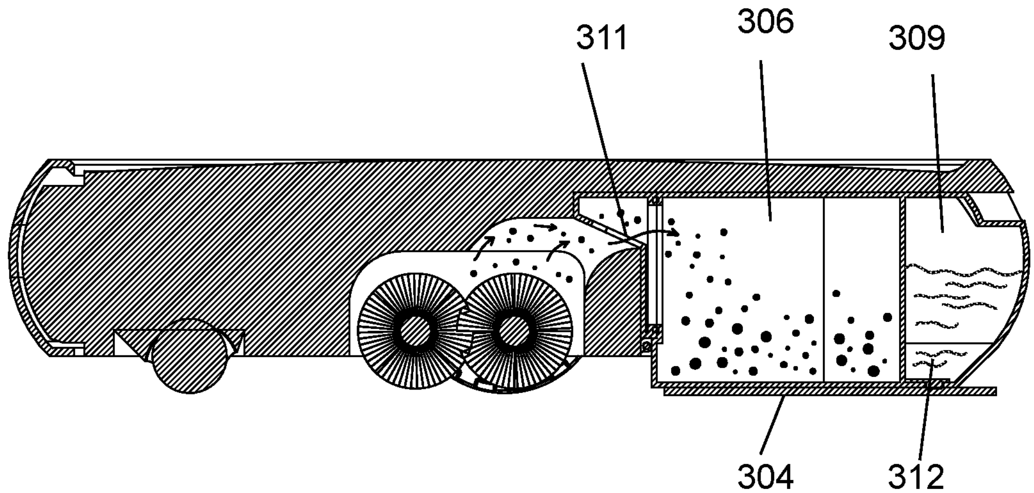
Figure 11F:
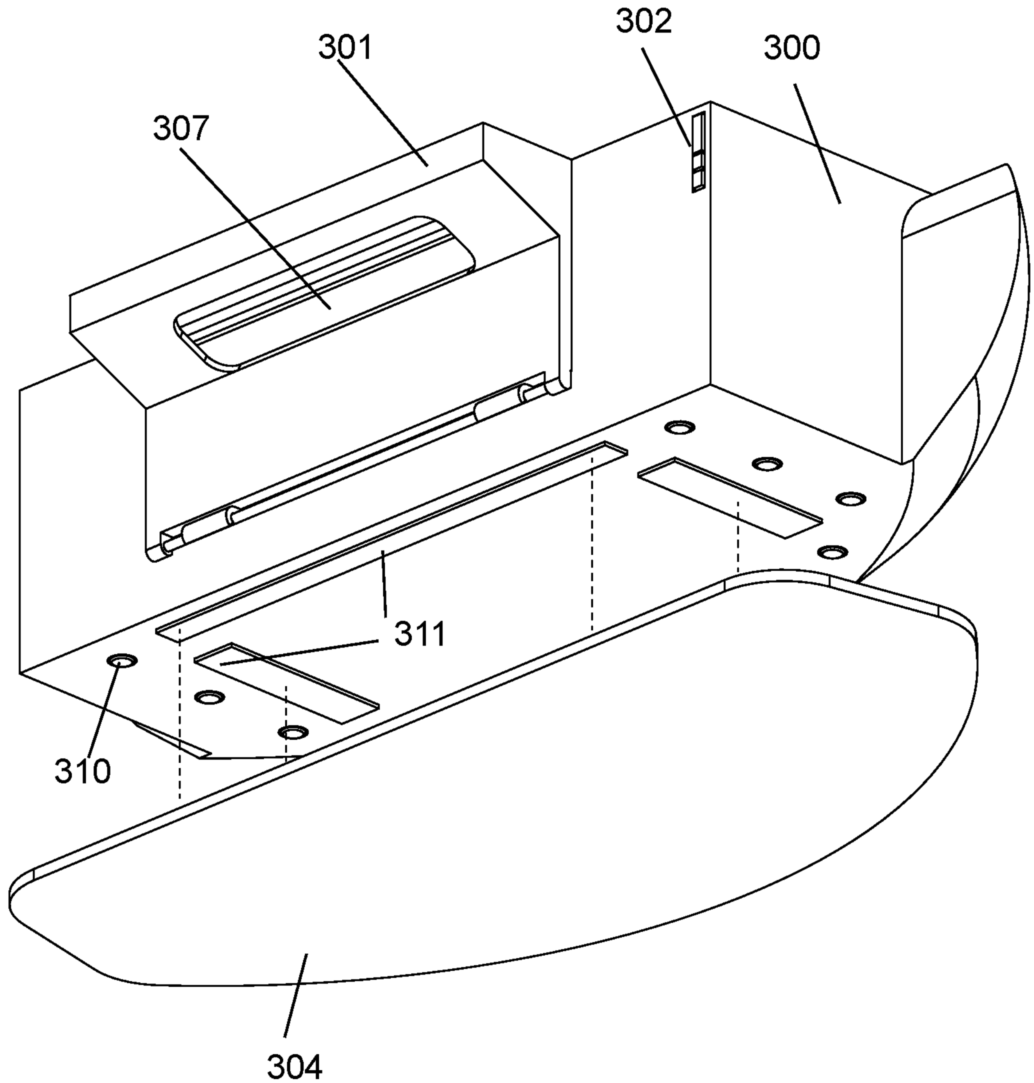
Figure 11G:
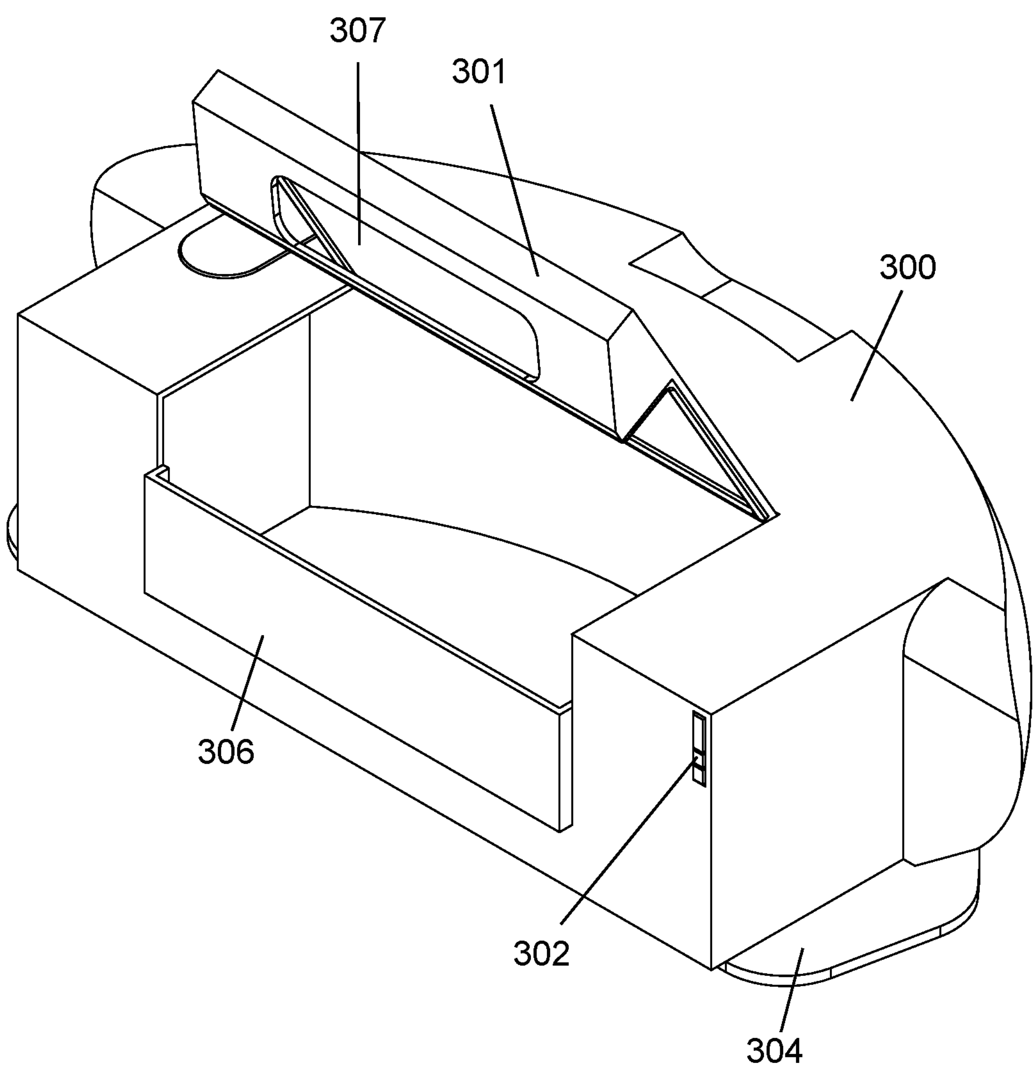
Figure 12A:
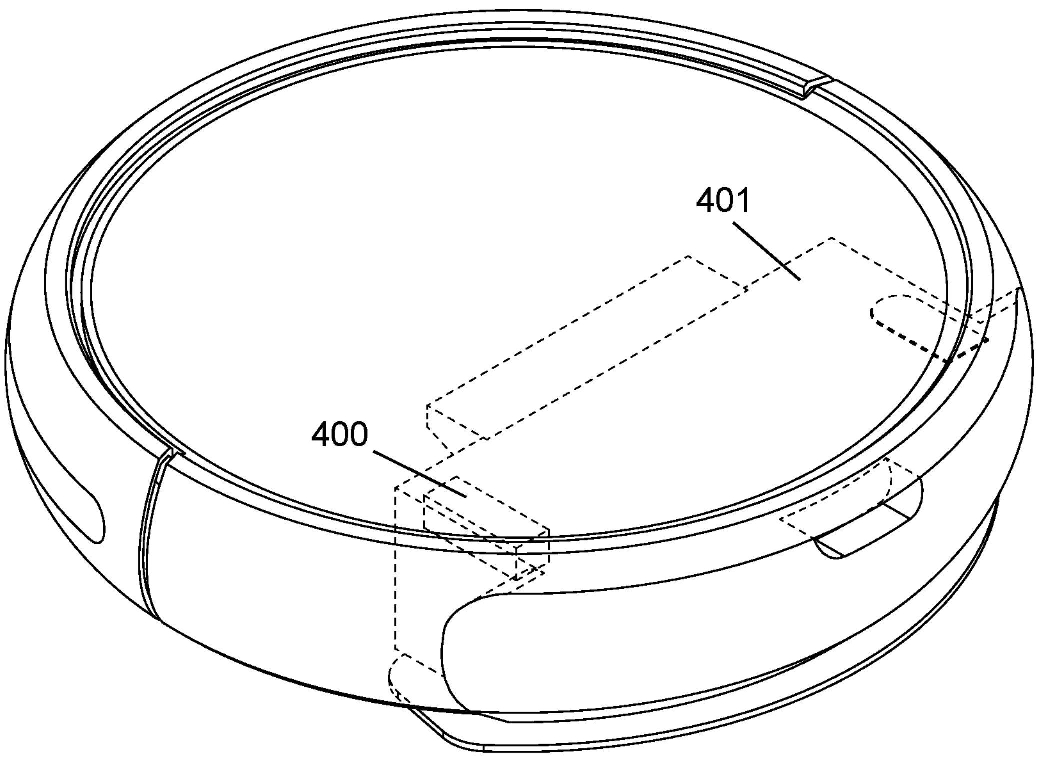
Figure 12B:
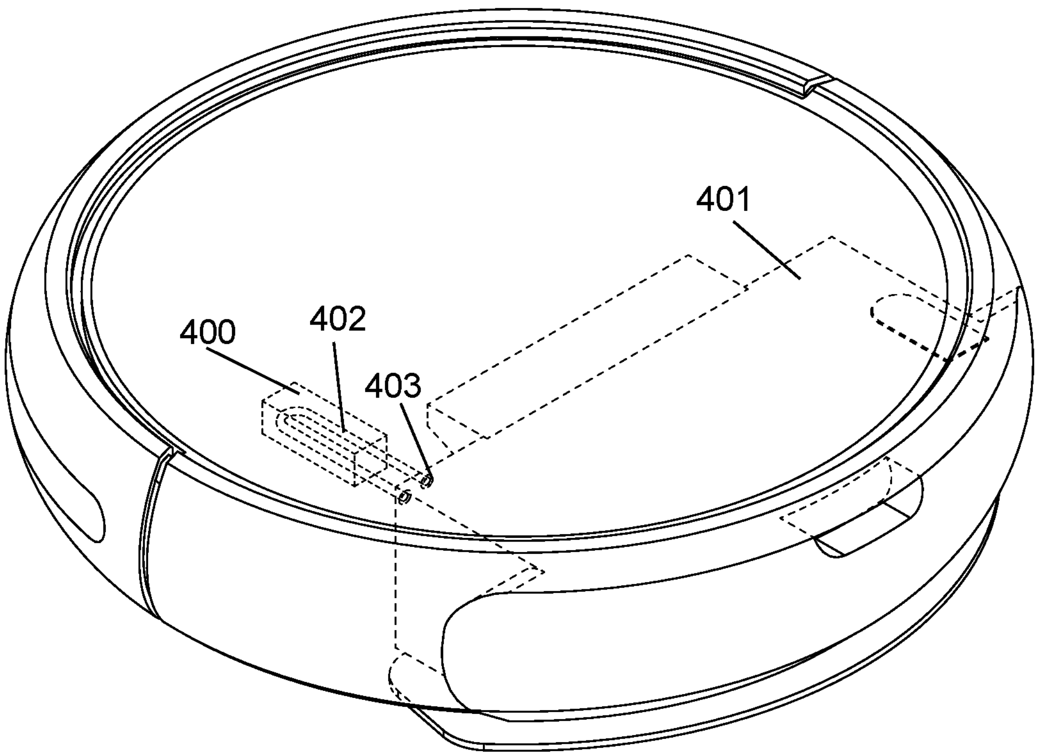
Figure 12C:
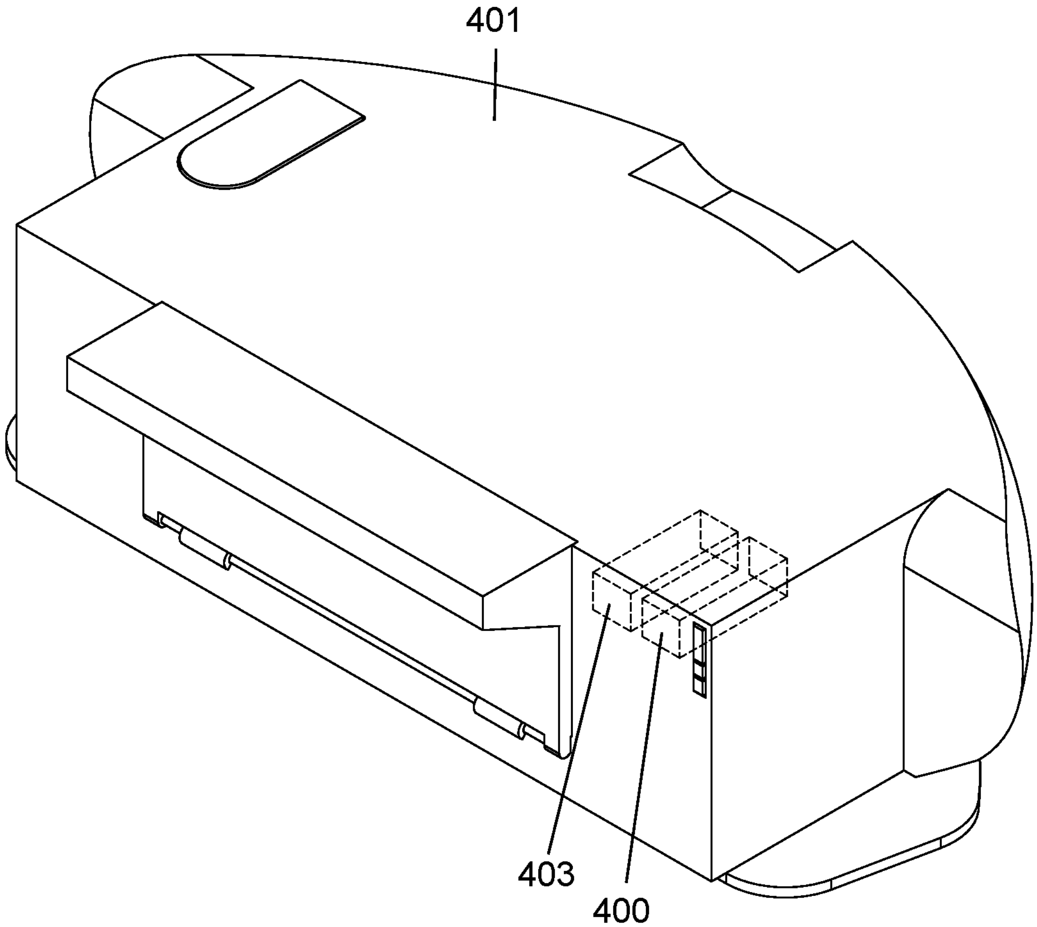

FIG. 11A illustrates another example of a robot with vacuuming and mopping capabilities. In some embodiments, the robot may vacuum and mop simultaneously or individually, depending on the type of cleaning required in different areas of the environment or based on the floor type of different areas (e.g., only vacuuming on carpeted floors). In some embodiments, the robot may clean areas of the environment that require only vacuuming before cleaning areas of the environment that require mopping. The robot includes a module 300 that is removable from the robot, as illustrated in FIG. 11B. FIG. 11C illustrates the module 300 with a dustbin lid 301 that interfaces with an intake path of debris, module connector 302 for connecting the module 300 to the robot, water intake tab 303 that may be opened to insert water into a water container, and a mopping pad (or cloth) 304. FIG. 11D illustrates internal components of the module 300 including a gasket 305 of the dustbin lid 301 to prevent the contents of dustbin 306 from escaping, opening 307 of the dustbin lid 301 that allows debris collected by the robot to enter the dustbin 306, and a water pump 308 positioned outside of the water tank 309 that pumps water from the water tank 309 to water dispensers 310. Mopping pad 304 receives water from water dispensers 310 which moistens the mopping pad 304 for cleaning a floor. FIG. 11E illustrates debris path 311 from the robot into the dustbin 306 and water 312 within water tank 309. Both the dustbin 306 and the water tank 309 may be washed as the impeller is not positioned within the dustbin 306 and the water pump 308 is not positioned within the water tank 309. FIG. 11F illustrates a bottom of module 300 including water dispensers 310 and Velcro strips 311 that may be used to secure mopping pad 304 to the bottom of module 300. FIG. 11G illustrates an alternative embodiment for dustbin lid 301, wherein dustbin lid 301 opens from the top of module 300. FIGS. 12A and 12B illustrates alternative embodiment of the robot in FIGS. 11A-11E. In FIG. 12A the water pump 400 is positioned within the dustbin of module 401 and in FIG. 12B the water pump 400 is positioned outside the module 401 and is connected to the module via connecting tube 402 with gasket 403 to seal fluid and prevent it from escaping at the connection point. FIG. 12C illustrates a module 403 for converting water into hydrogen peroxide and water pump 400 positioned within module 401. In some cases, module 403 may suction water (or may be provided water using a pump) from the water tank of the module 401, convert the water into hydrogen peroxide, and dispense the hydrogen peroxide into an additional container for storing the hydrogen peroxide. The container storing hydrogen peroxide may use similar methods as described for dispensing the fluid onto the mopping pad. In some embodiments, the process of water electrolysis may be used to generate the hydrogen peroxide. In some embodiments, the process of converting water to hydrogen peroxide may include water oxidation over an electrocatalyst in an electrolyte, that results in hydrogen peroxide dissolved in the electrolyte which may be directly applied to the surface or may be further processed before applying it to the surface.

In some embodiments, the robot is a robotic cleaner. In some embodiments, the robot includes a removable brush compartment with roller brushes designed to avoid collection of hair and debris at a connecting point of the roller brushes and a motor rotating the roller brushes. In some embodiments, the component powering rotation of the roller brushes may be masked from a user, the brush compartment, and the roller brushes by separating the power transmission from the brush compartment. In some embodiments, the roller brushes may be cleaned without complete removal of the roller brushes thereby avoiding tedious removal and realignment and replacement of the brushes after cleaning.

Figure 13A:
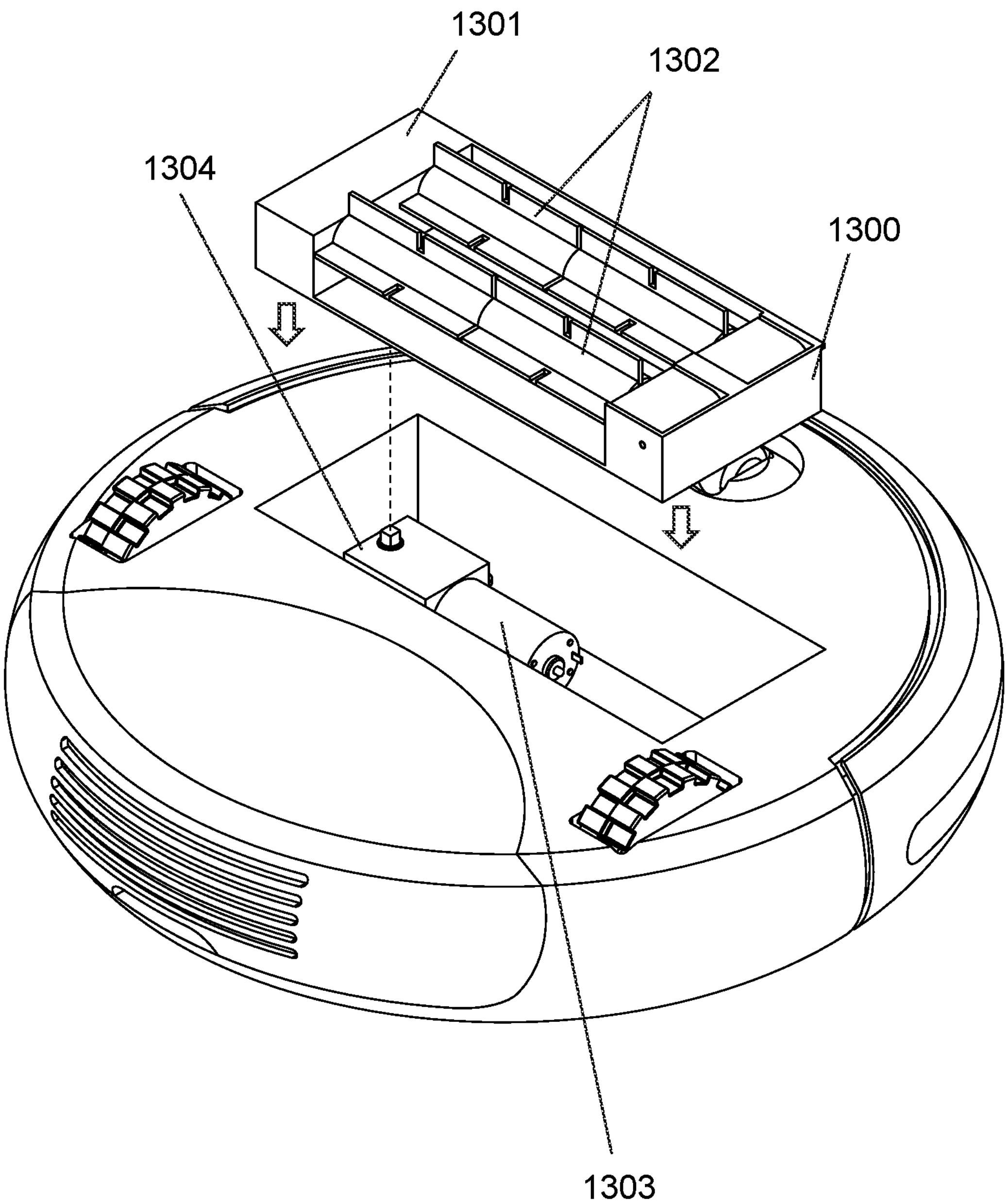
FIGS. 13A-13H illustrate an example of a brush compartment, according to some embodiments.
Figure 13B:
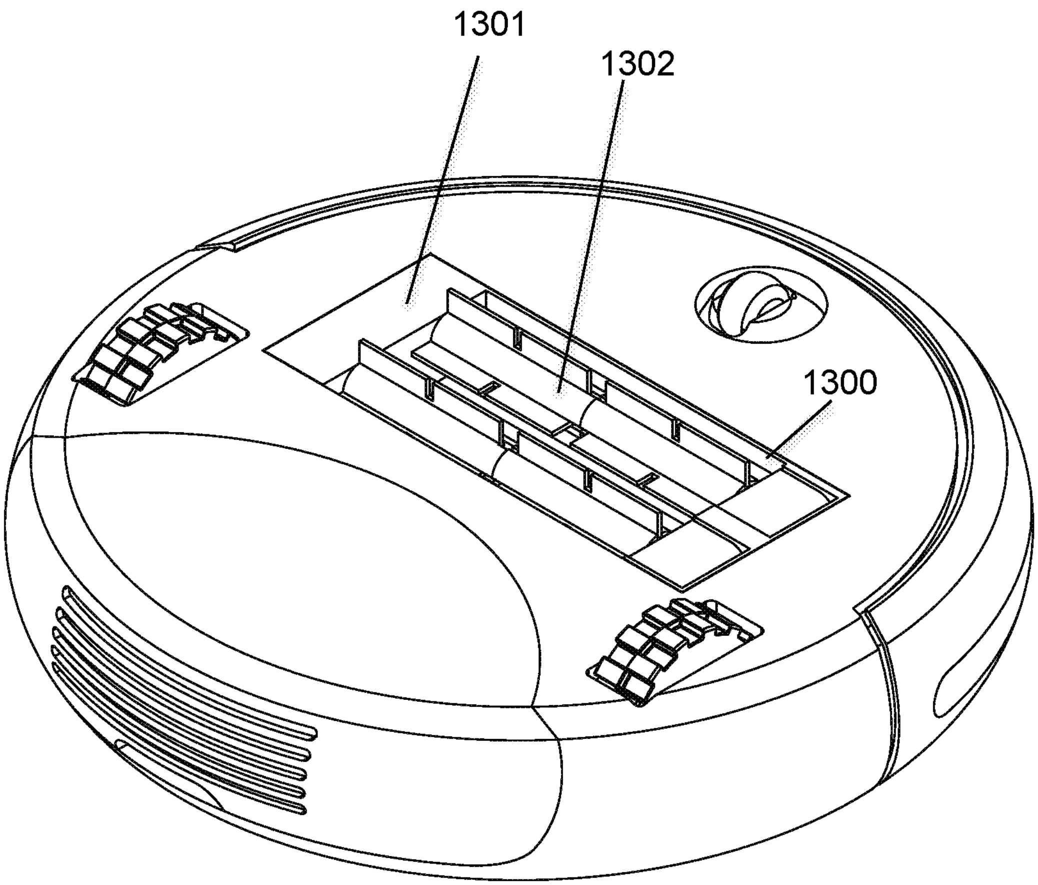
Figure 13C:
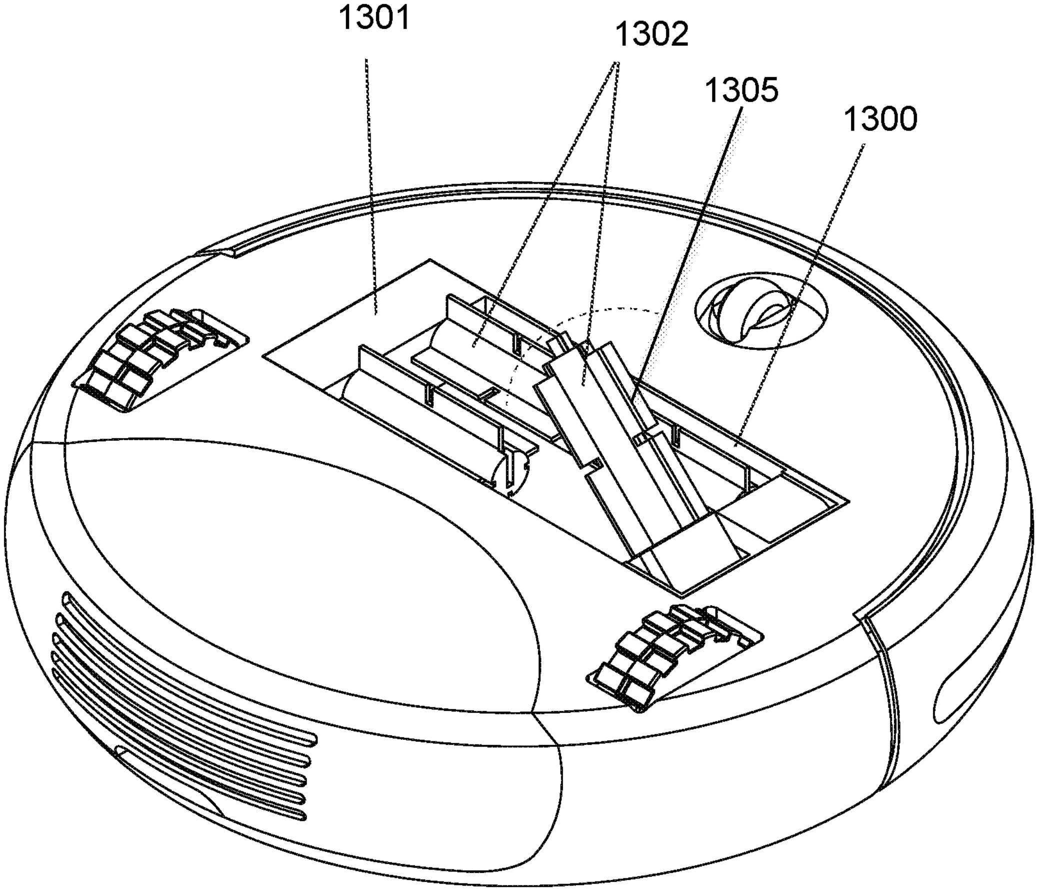
Figure 13D:
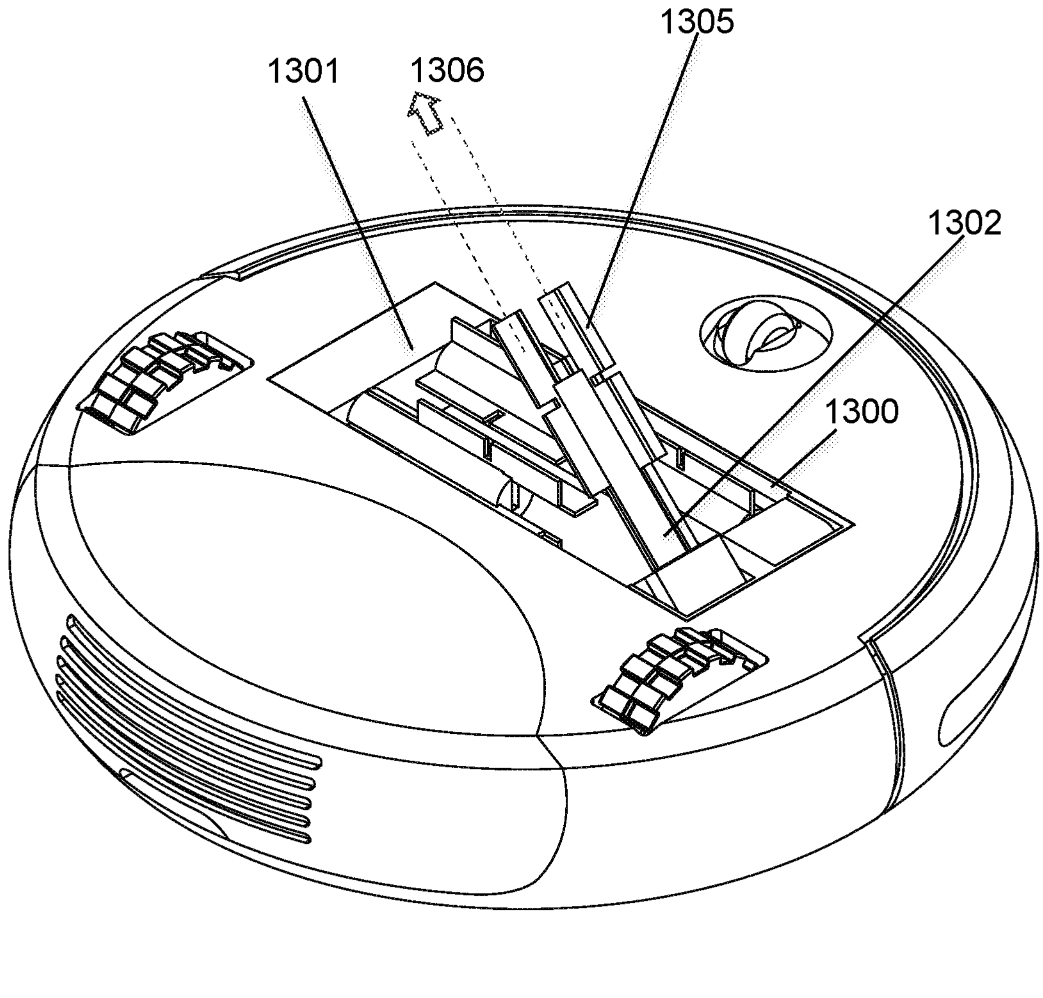
Figure 13E:
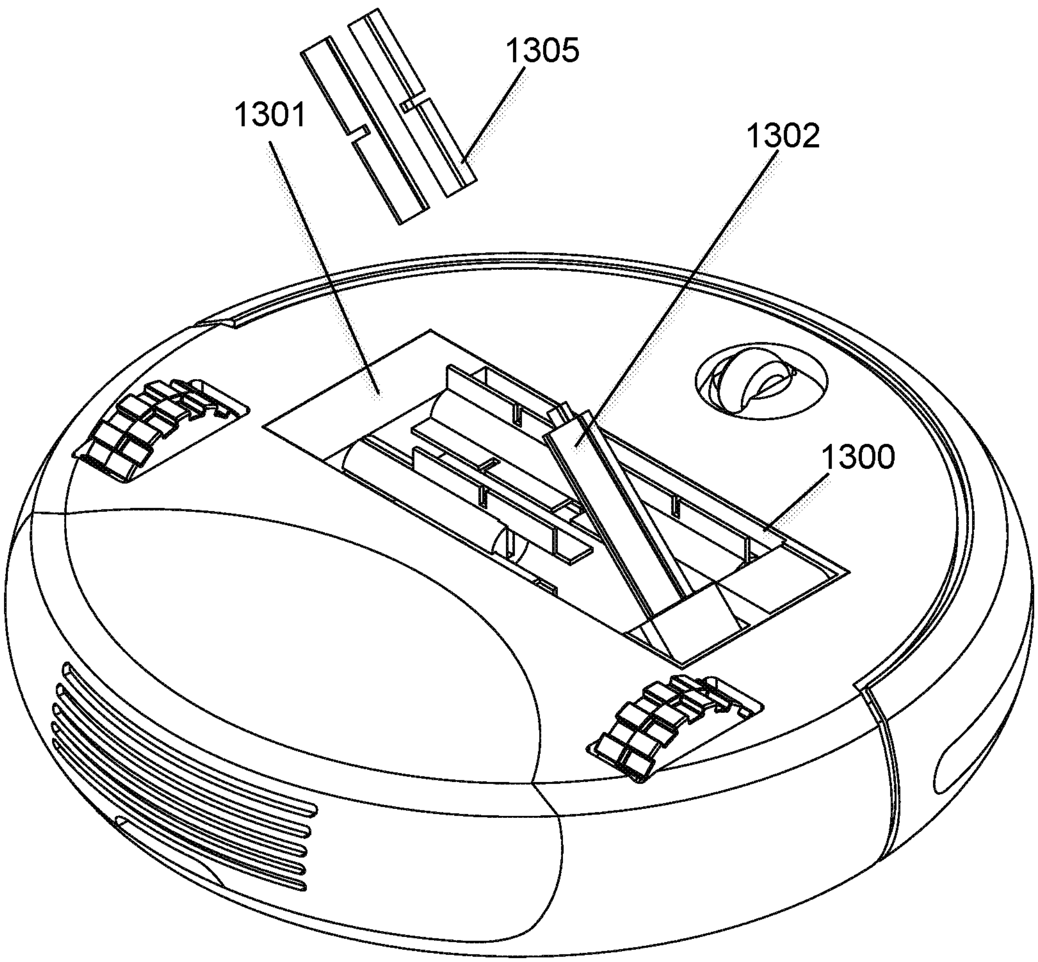
Figure 13F:
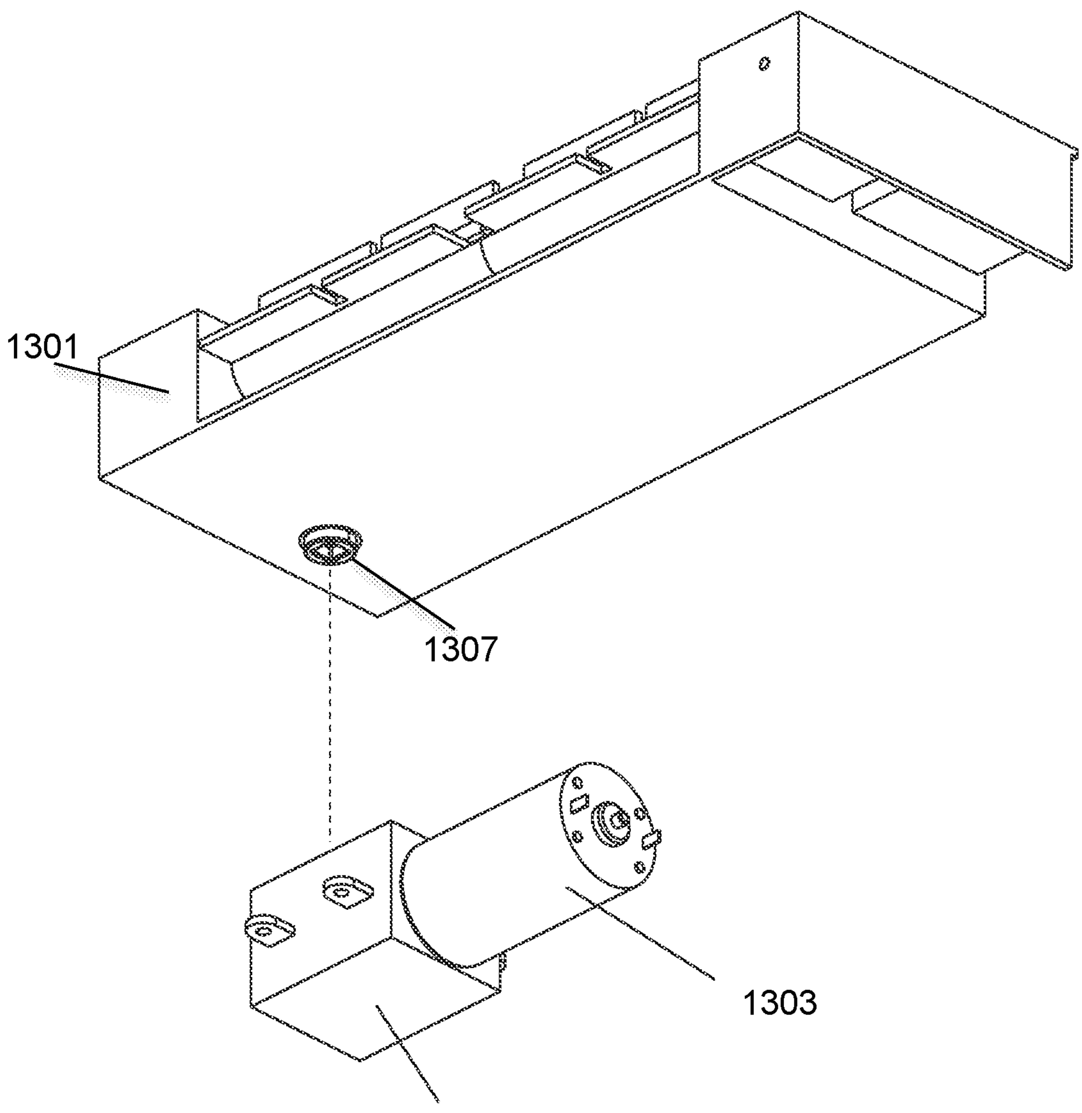
Figure 13G:
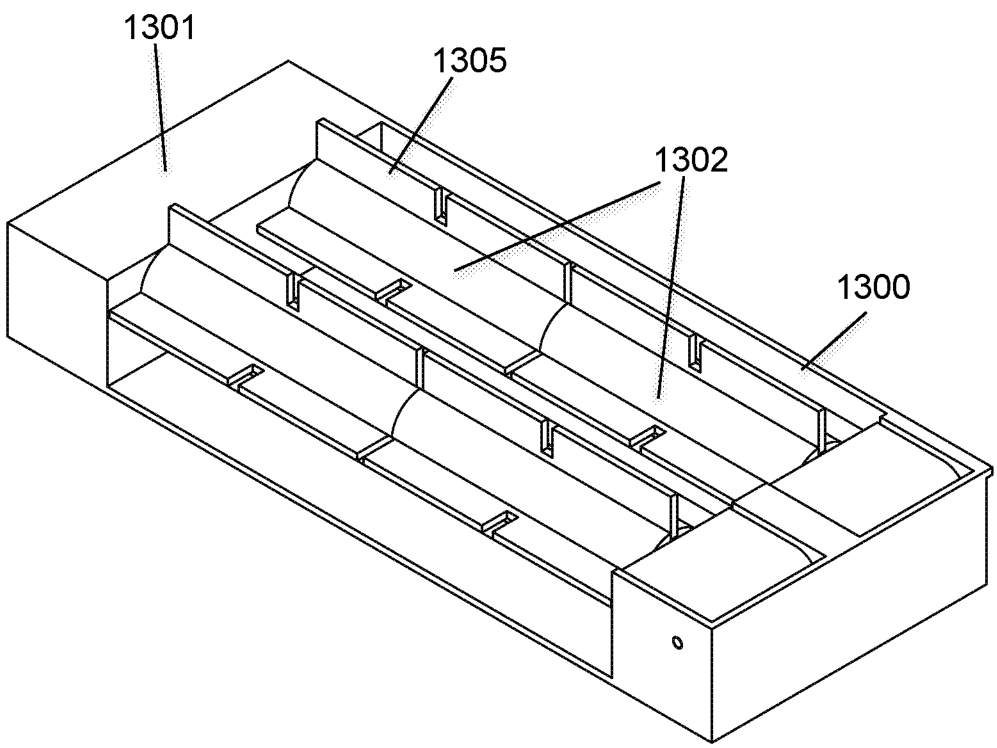
Figure 13H:
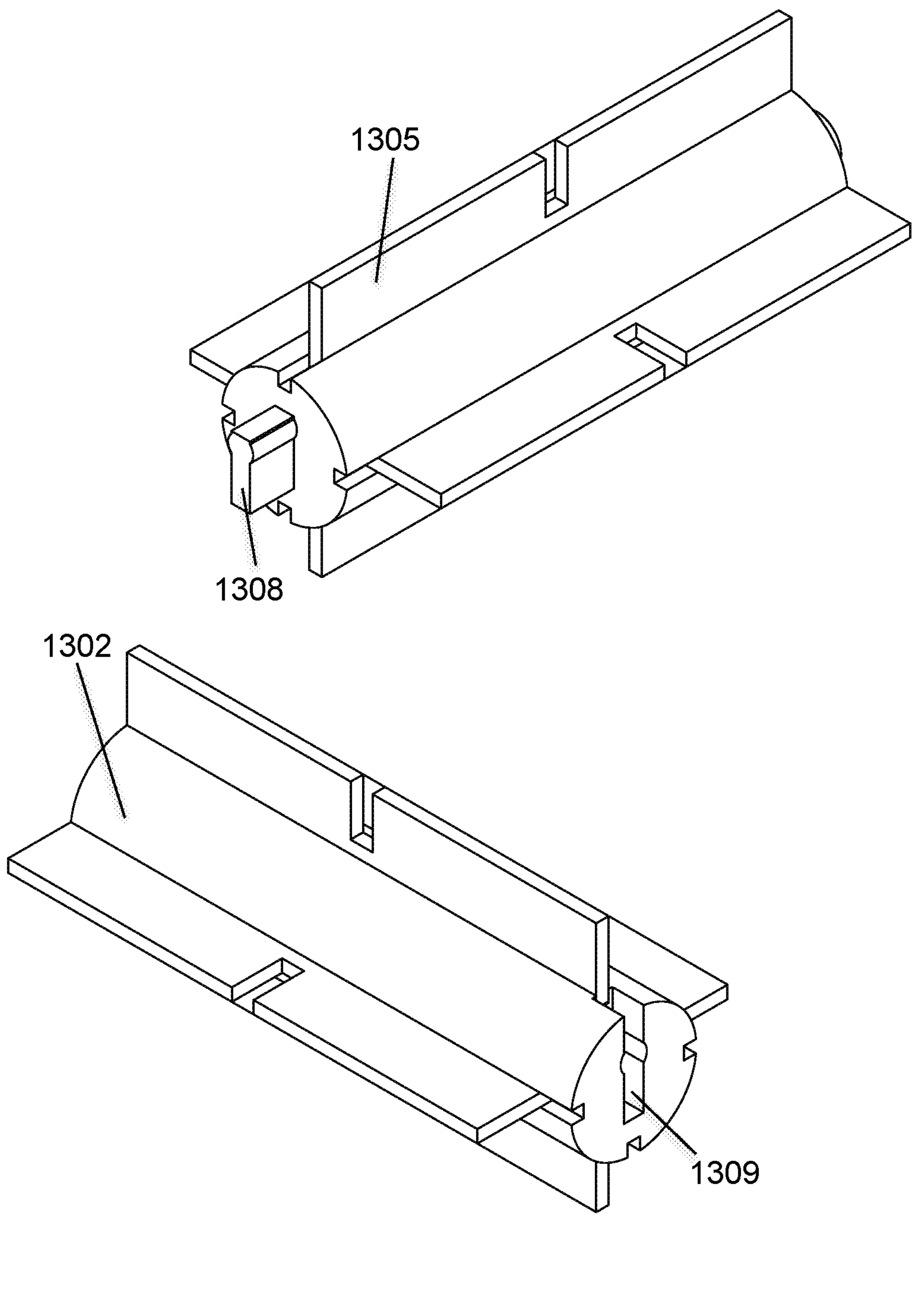

FIG. 13A illustrates an example of a brush compartment of a robotic cleaner including frame 1300, gear box 1301, and brushes 1302. The robotic cleaner includes a motor 1303 and gearbox 1304 that interfaces with gear box 1301 of the brush compartment when it is fully inserted into the underside of the robotic cleaner, as illustrated in FIG. 13B. In some embodiments, the motor is positioned above the brush compartment such that elements like hair and debris cannot become entangled at the point of connection between the power transmission and brushes. In some embodiments, the motor and gearbox of the robot is positioned adjacent to the brush compartment or in another position. In some embodiments, the power generating motion in the motor is normal to the axis of rotation the brushes. In some embodiments, the motor and gearbox of the robot and the gearbox of the brush compartment may be positioned on either end of the brush compartment. In some embodiments, more than one motor and gearbox interface with the brush compartment. In some embodiments, more than one motor and gearbox of the robot may each interface with a corresponding gearbox of the brush compartment. FIG. 13C illustrates brush 1302 comprised of two portions, one portion of which is rotatably coupled to frame 1300 on an end opposite the gear box 1301 of the brush compartment such that the rotatable portion of the brush may rotate about an axis parallel to the width of the frame. In some embodiments, the two portions of brush 1302 may be separated when the brushes are non-operable. In some embodiments, the two portions of brush 1302 are separated such that brush blade 1305 may be removed from brush 1302 by sliding brush blade 1305 in direction 1306. In some embodiments, brush blades may be replaced when worn out or may be removed for cleaning. In some instances, this eliminates the tedious task of realigning brushes when they are completely removed from the robot. In some embodiments, a brush may be a single piece that may be rotatably coupled to the frame on one end such that the brush may rotate about an axis parallel to the width of the frame. In some embodiments, the brush may be fixed to the module such there is no need for removal of the brush during cleaning and may be put back together by simply clicking the brush into place. In some embodiments, separation of the brush from the module may not be a necessity for fully cleaning the brush but separation may be possible. In some embodiments, either end of a brush may be rotatably coupled to either end of the frame of the brush compartment. In some embodiments, the brushes may be directly attached to the chassis of the robotic cleaner, without the use of the frame. In some embodiments, brushes of the brush compartment may be configured differently from one another. For example, one brush may only rotate about an axis of the brush during operation while the other may additionally rotate about an axis parallel to the width of the frame when the brush is non-operable for removal of brush blades. FIG. 13E illustrates brush blade 1305 completely removed from brush 1302. FIG. 13F illustrates motor 1303 and gearbox 1304 of the robotic cleaner that interfaces with gearbox 1301 of the brush compartment through insert 1307. FIG. 13G illustrates brushes 1302 of the brush compartment, each brush including two portions. To remove brush blades 1305 from brushes 1302, the portions of brushes 1302 opposite gearbox 1301 rotate about an axis perpendicular to rotation axes of brushes 1302 and brush blades 1305 may be slid off of the two portions of brushes 1302 as illustrated in FIGS. 13D and 13E. FIG. 13H illustrates an example of a locking mechanism that may be used to lock the two portions of each brush 1302 together including locking core 1308 coupled to one portion of each brush and lock cavity 1309 coupled to a second portion of each brush. Locking core 1308 and lock 1309 interface with another to lock the two portions of each brush 1302 together.

Figure 14A:
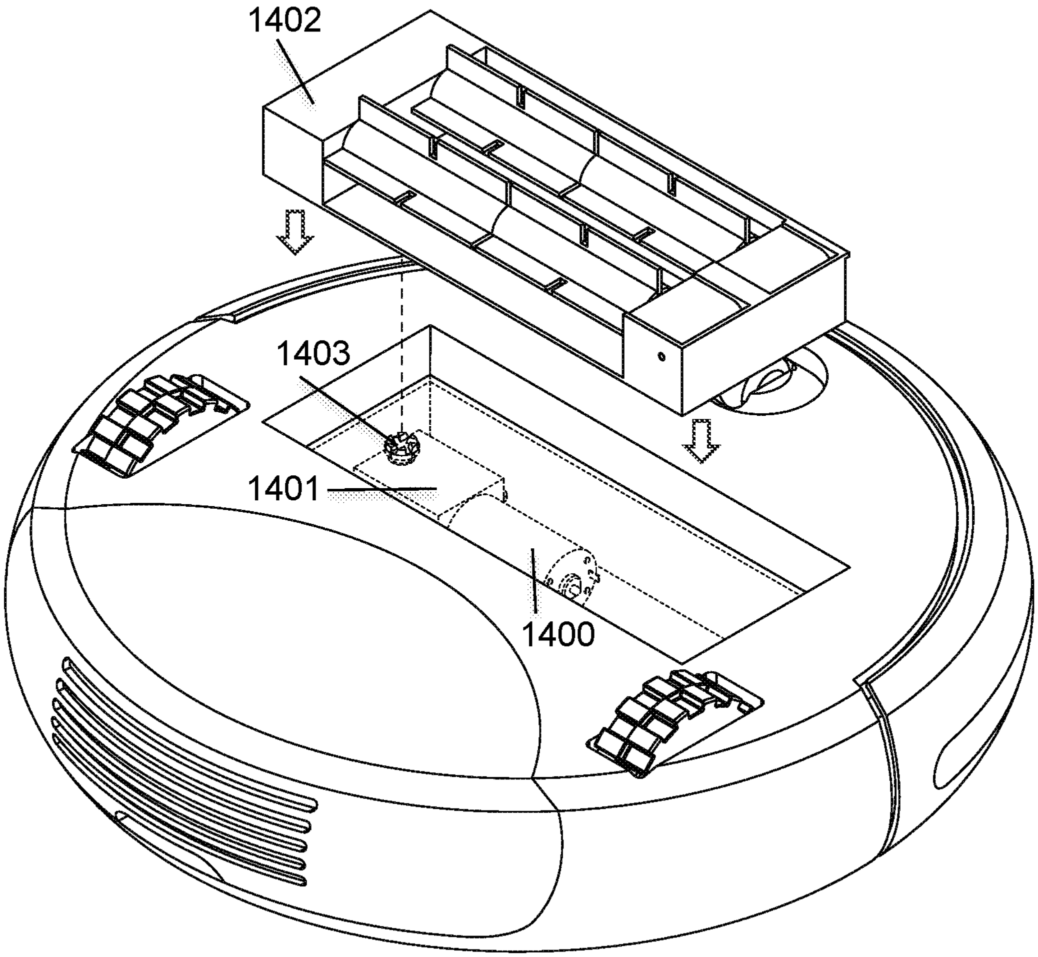
FIGS. 14A and 14B illustrate an example of a brush compartment, according to some embodiments.
Figure 14B:
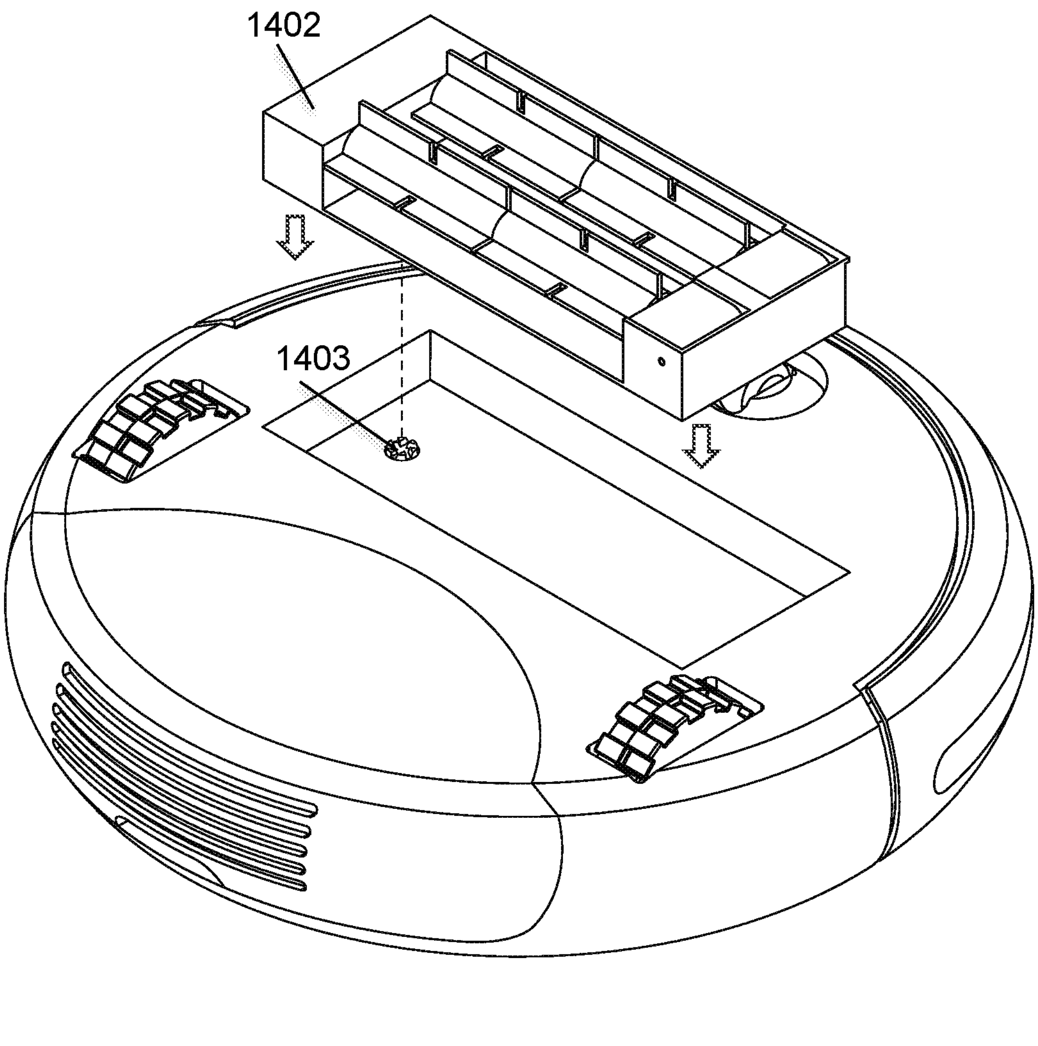

FIG. 14A illustrates another example of a brush compartment of a robotic cleaner with similar components as described above including motor 2400 and gearbox 1401 of the robotic cleaner interfacing with gearbox 1402 of the brush compartment. Component 1403 of gearbox 1401 of the robotic cleaner interfacing with gearbox 1402 of the brush compartment differs from that shown in FIG. 14A. FIG. 14B illustrates that component 1403 of gearbox 1401 of the robotic cleaner is accessible by the brush compartment when inserted into the underside of the robotic cleaner, while motor 1400 and gearbox 1401 of the robotic cleaner are hidden within a chassis of the robotic cleaner.

Figure 15A:
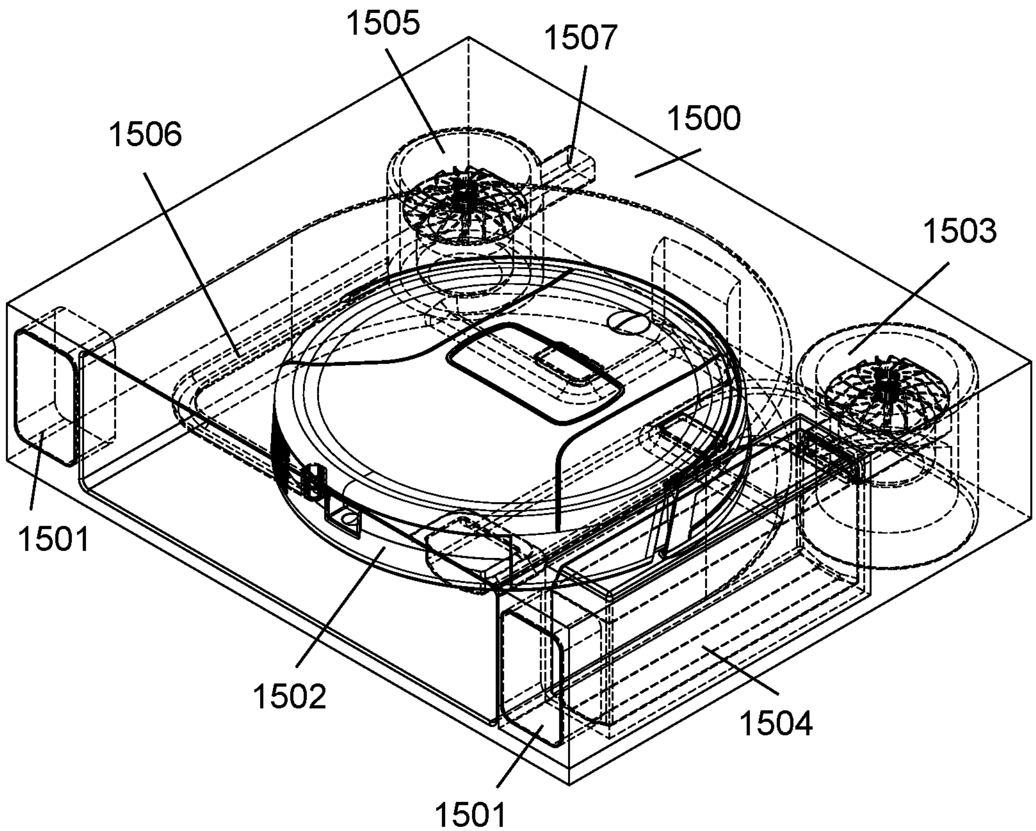
FIGS. 15A-15C illustrate an example of a robot and charging station, according to some embodiments.
Figure 15B:
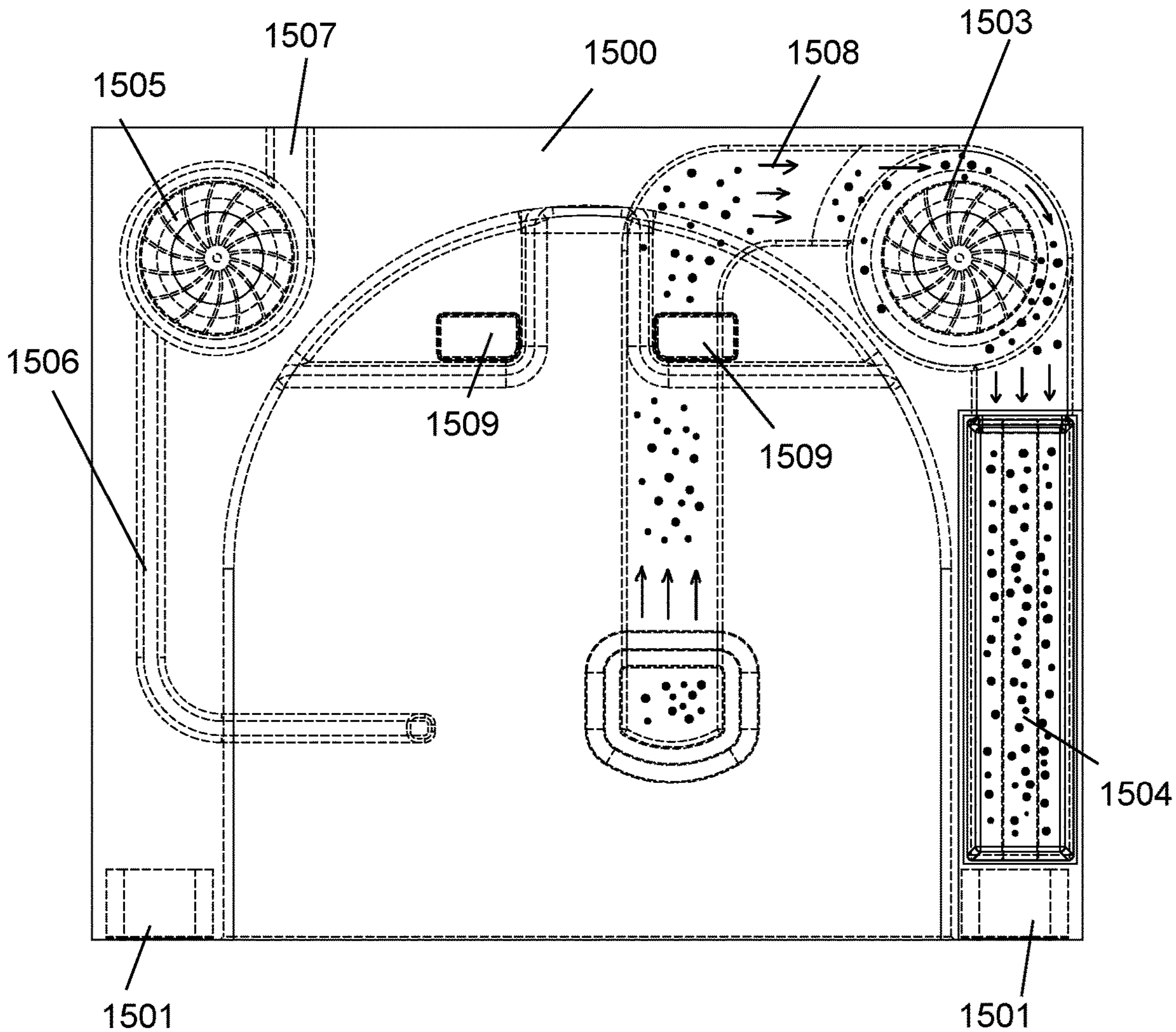
Figure 15C:
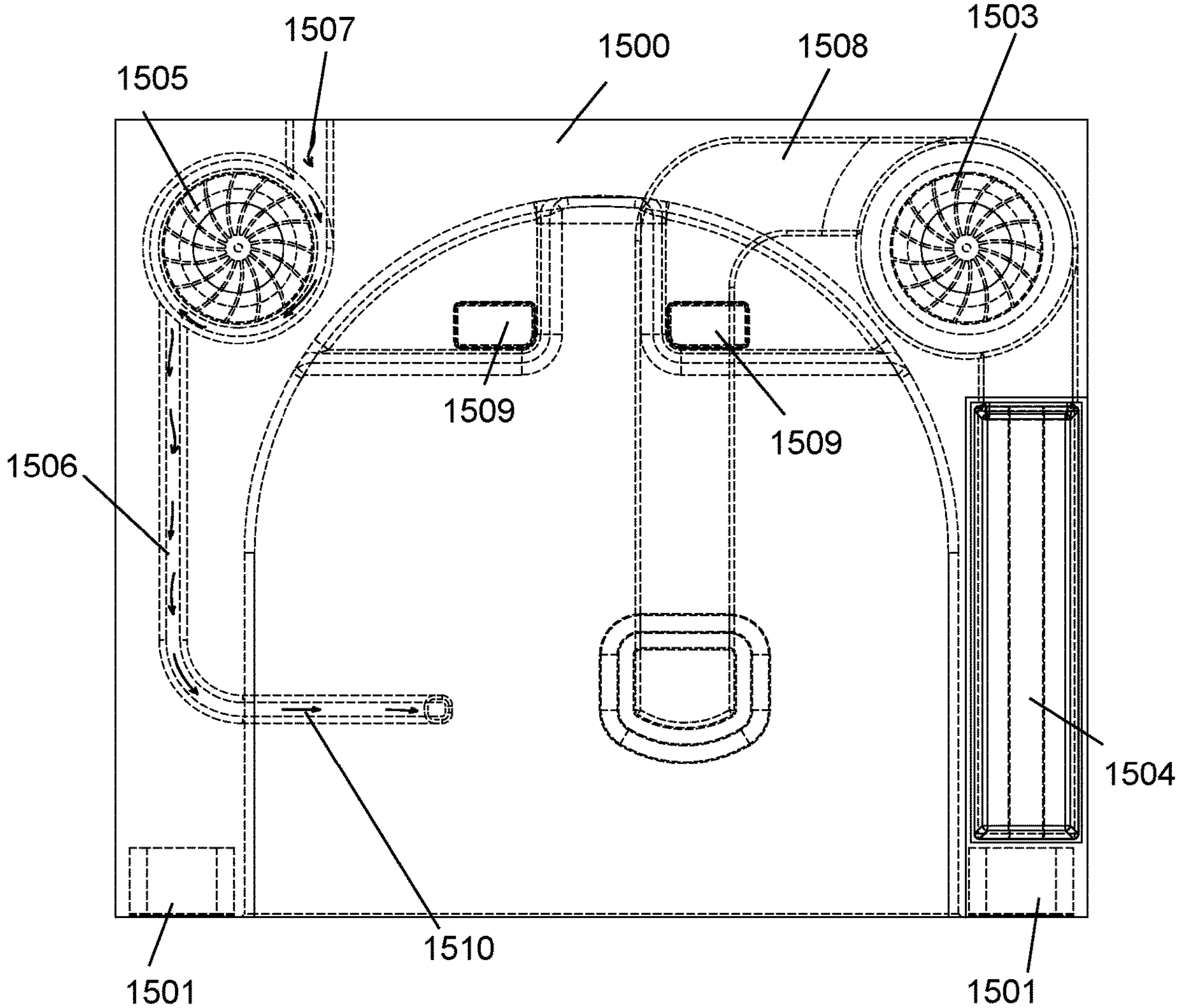

In some instances, the robotic cleaner may include a mopping module including at least a reservoir and a water pump driven by a motor for delivering water from the reservoir indirectly or directly to the driving surface. In some embodiments, the water pump may autonomously activate when the robotic cleaner is moving and deactivate when the robotic cleaner is stationary. In some embodiments, the water pump may include a tube through which fluid flows from the reservoir. In some embodiments, the tube may be connected to a drainage mechanism into which the pumped fluid from the reservoir flows. In some embodiments, the bottom of the drainage mechanism may include drainage apertures. In some embodiments, a mopping pad may be attached to a bottom surface of the drainage mechanism. In some embodiments, fluid may be pumped from the reservoir, into the drainage mechanism and fluid may flow through one or more drainage apertures of the drainage mechanism onto the mopping pad. In some embodiments, flow reduction valves may be positioned on the drainage apertures. In some embodiments, the tube may be connected to a branched component that delivers the fluid from the tube in various directions such that the fluid may be distributed in various areas of a mopping pad. In some embodiments, the release of fluid may be controlled by flow reduction valves positioned along one or more paths of the fluid prior to reaching the mopping pad. FIG. 15A illustrates an example of a charging station 1500 including signal transmitters 1501 that transmit signals that the robot 1502 may use to align itself with the charging station 1500 during docking, vacuum motor 1503 for emptying debris from the dustbin of the robot 1502 into disposable trash bag (or reusable trash container) 1504 via tube and water pump 1505 for refilling a water tank of robot 1502 via tube 1506 using water from the house supply coming through piping 1507 into water pump 1505. In some cases, the trash bag 1504 of charging station 1500 may be removed by pressing a button on the charging station 1500. FIG. 15B illustrates debris collection path 1508 and charging pads 1509 and FIG. 15C illustrates water flow path 1510 and charging pads 1509 (robot not shown for visualization of the debris path and water flow path). Charging pads of the robot interface with charging pads 1509 during charging. Charging station 1500 may be used for a robot with combined vacuuming and mopping capabilities. In some instances, the dustbin is emptied or the water tank is refilled when the dustbin or the water tank reaches a particular volume, after a certain amount of surface coverage by the robot, after a certain number of operational hours, after a predetermined amount of time, after a predetermined number of working sessions, or based on another metric. In some instances, the processor of the robot may communicate with the charging station to notify the charging station that the dustbin needs to be emptied or the water tank needs to be refilled. In some cases, a user may use an application paired with the robot to instruct the robot to empty its dustbin or refill its water tank. The application may communicate the instruction to the robot and/or the charging station. In some cases, the charging station may be separate from the dustbin emptying station or the water refill station. In some embodiments, the dustbin of the robot is washable. An example of a washable dustbin is described in U.S. Patent Application Ser. No. 16/186,499, the entire contents of which are hereby incorporated by reference.

Figure 16A:
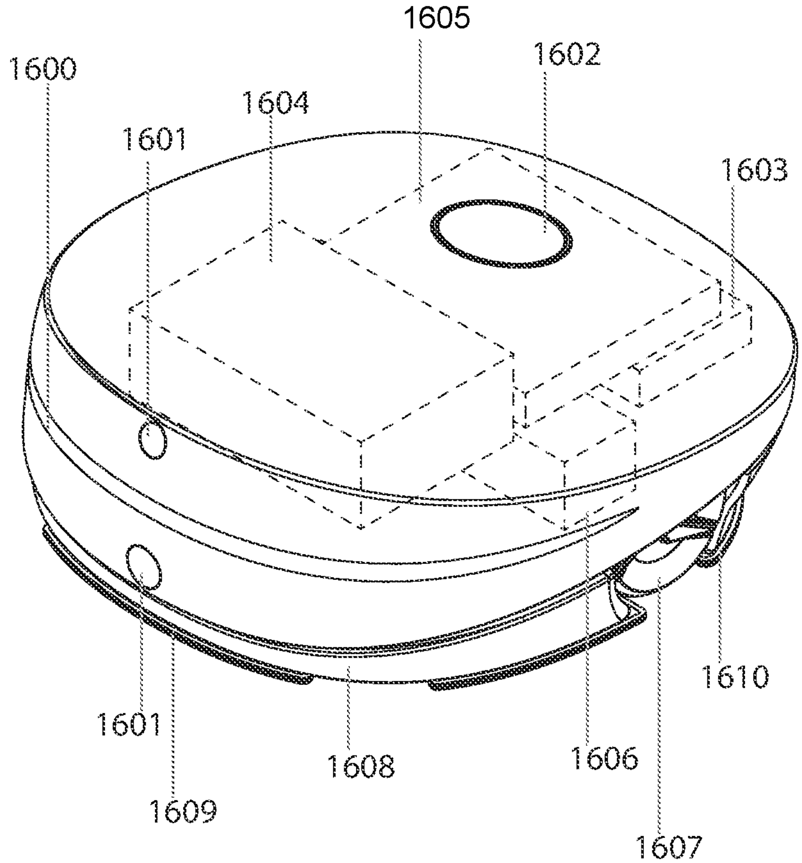
FIGS. 16A and 16B illustrate an example of a robotic mop, according to some embodiments.
Figure 16B:
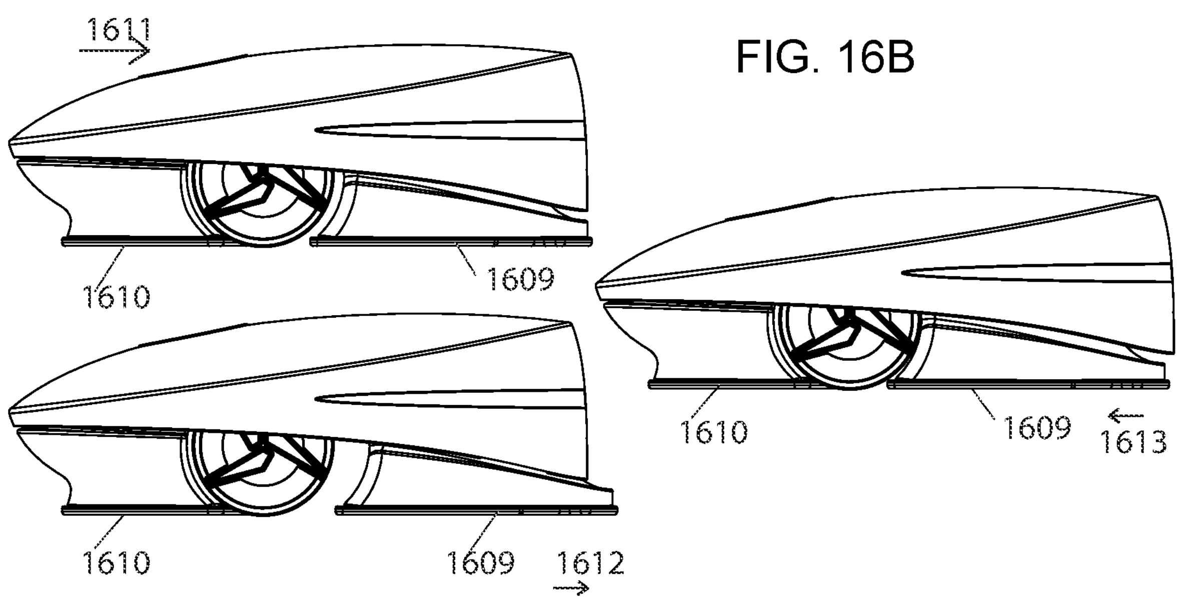

Some embodiments may provide a mopping extension unit for the robotic cleaner to enable simultaneous vacuuming and mopping of a driving surface and reduce (or eliminate) the need for a dedicated robotic mopping to run after a dedicated robotic vacuum. In some embodiments, a mopping extension may be installed in a dedicated compartment of or built into the chassis of the robotic cleaner. In some embodiments, the mopping extension may be detachable by, for example, activating a button or latch. In some embodiments, a cloth positioned on the mopping extension may contact the driving surface as the robotic cleaner drives through an area. In some embodiments, nozzles may direct fluid from a fluid reservoir to a mopping cloth. In some embodiments, the nozzles may continuously deliver a constant amount of cleaning fluid to the mopping cloth. In some embodiments, the nozzles may periodically deliver predetermined quantities of cleaning fluid to the cloth. In some embodiments, a water pump may deliver fluid from a reservoir to a mopping cloth, as described above. In some embodiments, the mopping extension may include a set of ultrasonic oscillators that vaporize fluid from the reservoir before it is delivered through the nozzles to the mopping cloth. In some embodiments, the ultrasonic oscillators may vaporize fluid continuously at a low rate to continuously deliver vapor to the mopping cloth. In some embodiments, the ultrasonic oscillators may turn on at predetermined intervals to deliver vapor periodically to the mopping cloth. In some embodiments, a heating system may alternatively be used to vaporize fluid. For example, an electric heating coil in direct contact with the fluid may be used to vaporize the fluid. The electric heating coil may indirectly heat the fluid through another medium. In other examples, radiant heat may be used to vaporize the fluid. In some embodiments, water may be heated to a predetermined temperature then mixed with a cleaning agent, wherein the heated water is used as the heating source for vaporization of the mixture. In some embodiments, water may be placed within the reservoir and the water may be reacted to produce hydrogen peroxide for cleaning and disinfecting the floor. In such embodiments, the process of water electrolysis may be used to generate hydrogen peroxide. In some embodiments, the process may include water oxidation over an electrocatalyst in an electrolyte, that results in hydrogen peroxide dissolved in the electrolyte which may be directly applied to the driving surface or mopping pad or may be further processed before applying it to the driving surface. In some embodiments, the robotic cleaner may include a means for moving the mopping cloth (and a component to which the mopping cloth may be attached) back and forth (e.g., forward and backwards or left and right) in a horizontal plane parallel to the driving surface during operation (e.g., providing a scrubbing action) such that the mopping cloth may pass over an area more than once as the robot drives. In some embodiments, the robot may pause for a predetermined amount of time while the mopping cloth moves back and forth in a horizontal plane, after which, in some embodiments, the robot may move a predetermined distance before pausing again while the mopping cloth moves back and forth in the horizontal plane again. In some embodiments, the mopping cloth may move back and forth continuously as the robot navigates within the environment. In some embodiments, the mopping cloth may be positioned on a front portion of the robotic cleaner. In some embodiments, a dry cloth may be positioned on a rear portion of the robotic cleaner. In some embodiments, as the robot navigates, the dry cloth may contact the driving surface and because of its position on the robot relative to the mopping cloth, dries the driving surface after the driving surface is mopped with the mopping cloth. For example, FIG. 16A illustrates a robot including sensor windows 1600 behind which sensors are positioned, sensors 1601 (e.g., camera, laser emitter, TOF sensor, etc.), user interface 1602, a battery 1603, a wet mop movement mechanism 1604, a PCB and processing unit 1605, a wheel motor and gearbox 1606, wheels 1607, a wet mop tank 1608, a wet mop cloth 1609, and a dry mop cloth 1610. FIG. 16B illustrates the robot driving in a direction 1611. While driving, or while pausing, wet mop cloth 1609 moves back and forth in a forward direction 1612 and backward direction 1613, respectively. As the robot drives forward, dry cloth 1610 dries the driving surface that has been cleaned by wet mop cloth 1609. In some embodiments, the mopping extension may include a means to vibrate the mopping extension during operation (e.g., eccentric rotating mass vibration motors). In some embodiments, the mopping extension may include a means to engage and disengage the mopping extension during operation by moving the mopping extension up and down in a vertical plane perpendicular to the work surface. In some embodiments, engagement and disengagement may be manually controlled by a user. In some embodiments, engagement and disengagement may be controlled automatically by the processor based on sensory input. For example, the processor may actuate the mopping extension to move in an upwards direction away from the driving surface upon detecting carpet using sensor data. In some embodiments, the robot may include a mopping mechanism as described in U.S. patent application Ser. Nos.

16/440,904, 15/673,176, 16/058,026, 14/970,791, 16/375,968, 15/432,722, 16/238,314, the entire contents of which are hereby incorporated by reference.

In some embodiments, the robot includes a touch-sensitive display or otherwise a touch screen. In some embodiments, the touch screen may include a separate MCU or CPU for the user interface may share the main MCU or CPU of the robot. In some embodiments, the touch screen may include an ARM Cortex M0 processor with one or more computer-readable storage mediums, a memory controller, one or more processing units, a peripherals interface, Radio Frequency (RF) circuitry, audio circuitry, a speaker, a microphone, an Input/Output (I/O) subsystem, other input control devices, and one or more external ports. In some embodiments, the touch screen may include one or more optical sensors or other capacitive sensors that may respond to a hand of a user approaching closely to the sensor. In some embodiments, the touch screen or the robot may include sensors that measure intensity of force or pressure on the touch screen. For example, one or more force sensors positioned underneath or adjacent to the touch sensitive surface of the touch screen may be used to measure force at various points on the touch screen. In some embodiments, physical displacement of a force applied to the surface of the touch screen by finger or hand may generate a noise (e.g., a "click" noise) or movement (e.g., vibration) that may be observed by the user to confirm that a particular button displayed on the touch screen is pushed. In some embodiments, the noise or movement is generated when the button is pushed or released.

In some embodiments, the touch screen may include one or more tactile output generators for generating tactile outputs on the touch screen. These components may communicate over one or more communication buses or signal lines. In some embodiments, the touch screen or the robot may include other input modes, such as physical and mechanical control using a knob, switch, mouse, or button). In some embodiments, peripherals may be used to couple input and output peripherals of the touch screen to the CPU and memory. The processor executes various software programs and/or sets of instructions stored in memory to perform various functions and process data. In some embodiments, the peripherals interface, CPU, and memory controller are implemented on a single chip or, in other embodiments, may be implemented on separate chips.

Figure 17:
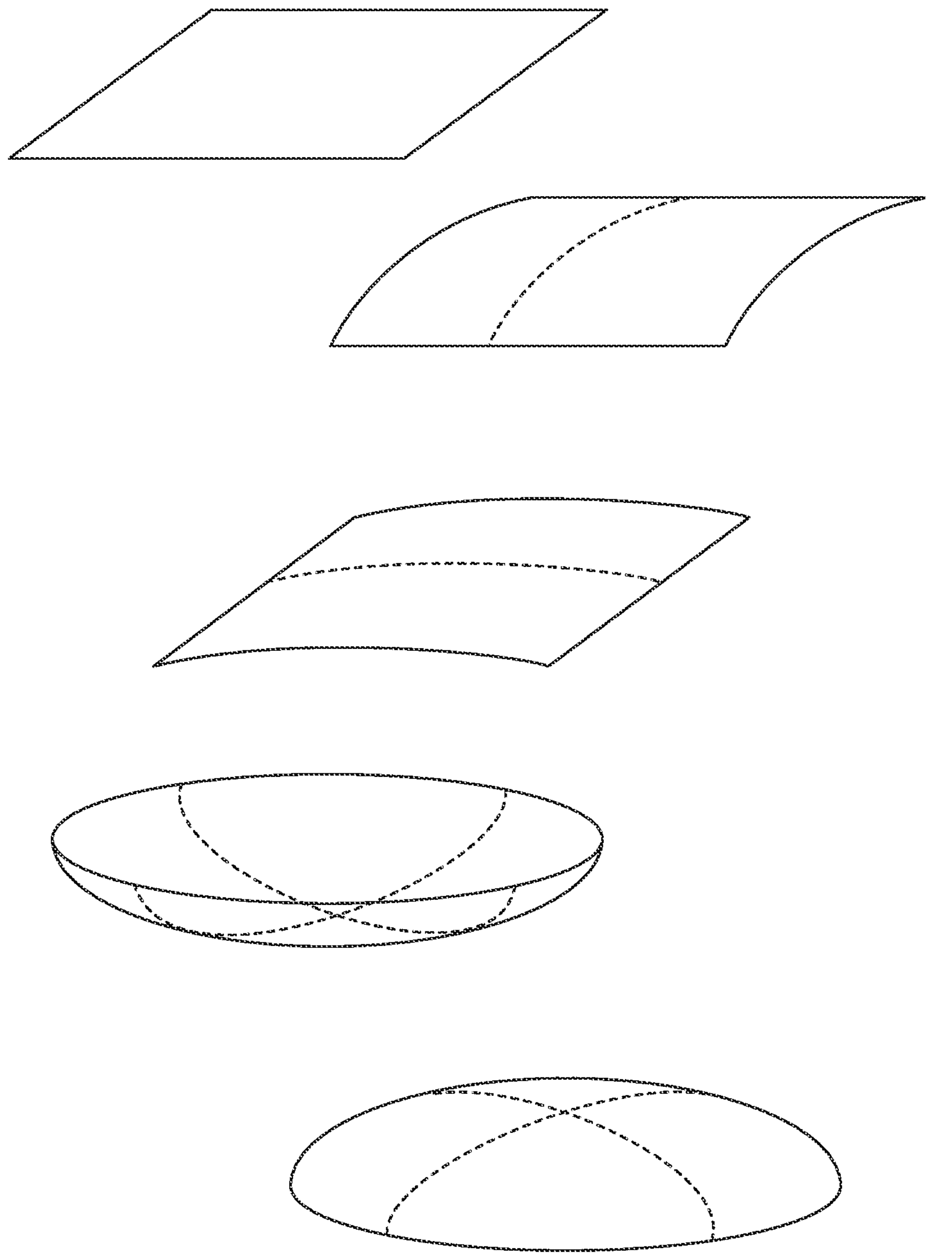
FIG. 17 illustrates an example of curved screens, according to some embodiments.

In some embodiments, the touch screen may display the frame of camera captured and transmitted and displayed to the others during a video conference call. In some embodiments, the touch screen may use liquid crystal display (LCD) technology, light emitting polymer display (LPD) technology, LED display technology with high or low resolution, capacitator touch screen display technology, or other older or newer display technologies. In some embodiments, the touch screen may be curved in one direction or two directions (e.g., a bowl shape). For example, the head of a humanoid robot may include a curved screen that is geared towards transmitting emotions. FIG. 17 includes examples of screens curved in one or more directions.

Figure 18A:
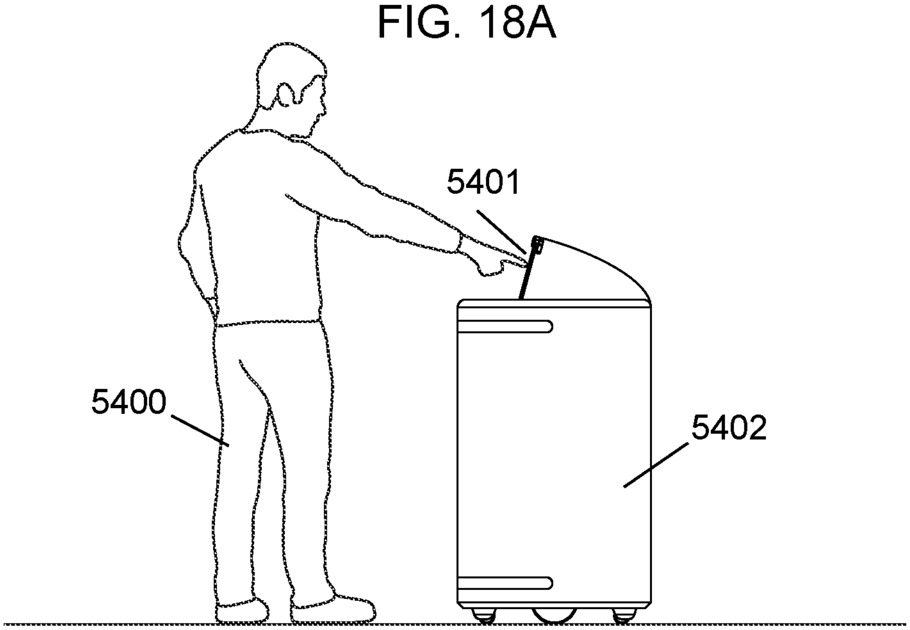
FIGS. 18A-18D illustrate an example of a user generating gestures, according to some embodiments.
Figure 18B:
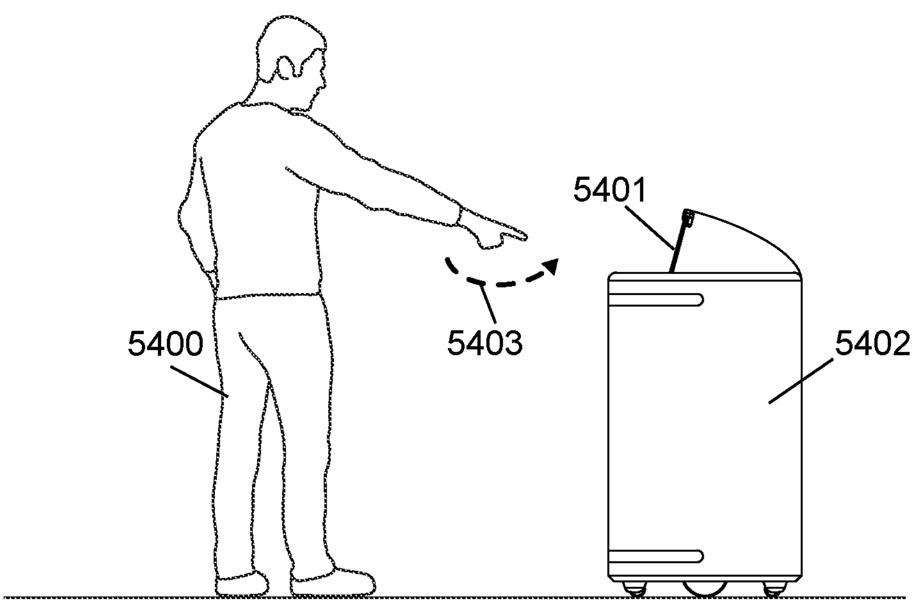
Figure 18C:
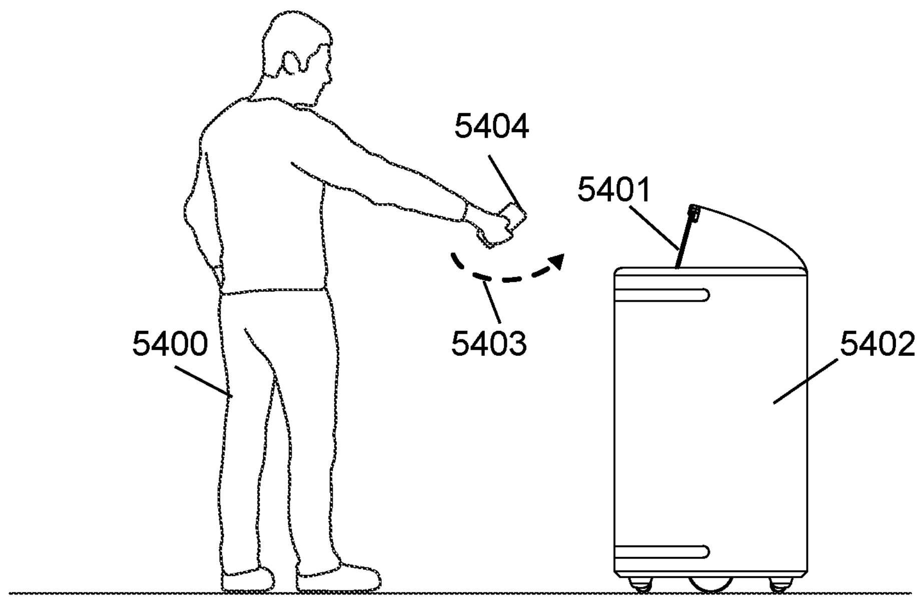
Figure 18D:
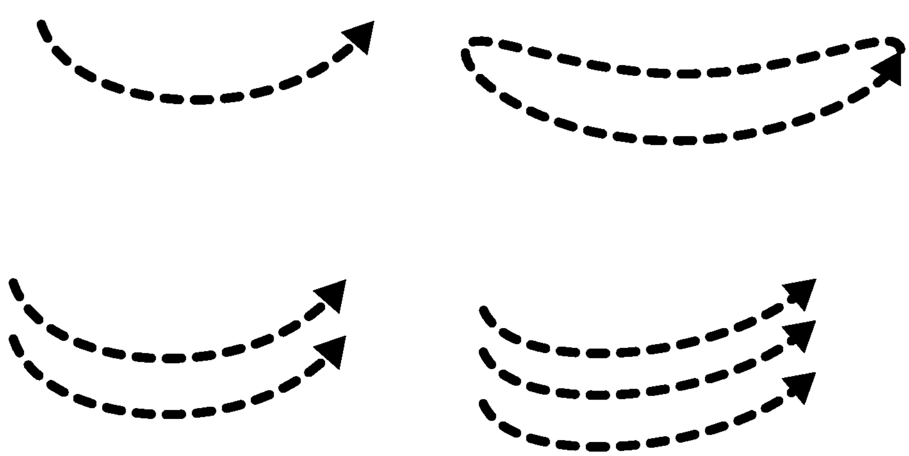

In some embodiments, the touch screen may include a touch-sensitive surface, sensor, or set of sensors that accept input from the user based on haptic and/or tactile contact. In some embodiments, detecting contact, a particular type of continuous movement, and the eventual lack of contact may be associated with a specific meaning. For example, a smiling gesture (or in other cases a different gesture) drawn on the touch screen by the user may have a specific meaning. For instance, drawing a smiling gesture on the touch screen to unlock the robot may avoid accidental triggering of a button of the robot. In embodiments, the gesture may be drawn with one finger, two fingers, or any other number of fingers. The gesture may be drawn in a back and forth motion, slow motion, or fast motion and using high or low pressure. In some embodiments, the gesture drawn on the touch screen may be sensed by a tactile sensor of the touch screen. In some embodiments, a gesture may be drawn in the air or a symbol may be shown in front of a camera of the robot by a finger, hand, or arm of the user or using another device. In some embodiments, gestures in front of the camera may be sensed by an accelerometer or indoor/outdoor GPS built into a device held by the user (e.g., a cell phone, a gaming controller, etc.). FIG. 18A illustrates a user 5400 drawing a gesture on a touch screen 5401 of the robot 5402. FIG. 18B illustrates the user 5400 drawing the gesture 5403 in the air. FIG. 18C illustrates the user 5400 drawing the gesture 5403 while holding a device 5404 that may include a built-in component used in detecting movement of the user. FIG. 18D illustrates various alternative smiling gestures.

In some embodiments, the robot may project an image or video onto a screen (e.g., like a projector). In some embodiments, a camera of the robot may be used to continuously capture images or video of the image or video projected. For example, a camera may capture a red pointer pointing to a particular spot on an image projected onto a screen and the processor of the robot may detect the red point by comparing the projected image with the captured image of the projection. In some embodiments, this technique may be used to capture gestures. For example, instead of a laser pointer, a person may point to a spot in the image using fingers, a stylus, or another device.

In some embodiments, the robot may communicate using visual outputs such as graphics, texts, icons, videos and/or by using acoustic outputs such as videos, music, different sounds (e.g., a clicking sound), speech, or by text to voice translation. In embodiments, both visual and acoustic outputs may be used to communicate. For example, the robot may play an upbeat sound while displaying a thumb up icon when a task is complete or may play a sad tone while displaying a text that reads 'error' when a task is aborted due to error.

In some embodiments, an avatar may be used to represent the visual identity of the robot. In some embodiments, the user may assign, design, or modify from template a visual identity of the robot. In some embodiments, the avatar may reflect the mood of the robot. For example, the avatar may smile when the robot is happy. In some embodiments, the robot may display the avatar or a face of the avatar on an LCD or other type of screen. In some embodiments, the screen may be curved (e.g., concave or convex). In some embodiments, the robot may identify with a name. For example, the user may call the robot a particular name and the robot may respond to the particular name. In some embodiments, the robot can have a generic name (e.g., Bob) or the user may choose or modify the name of the robot.

Figure 19A:
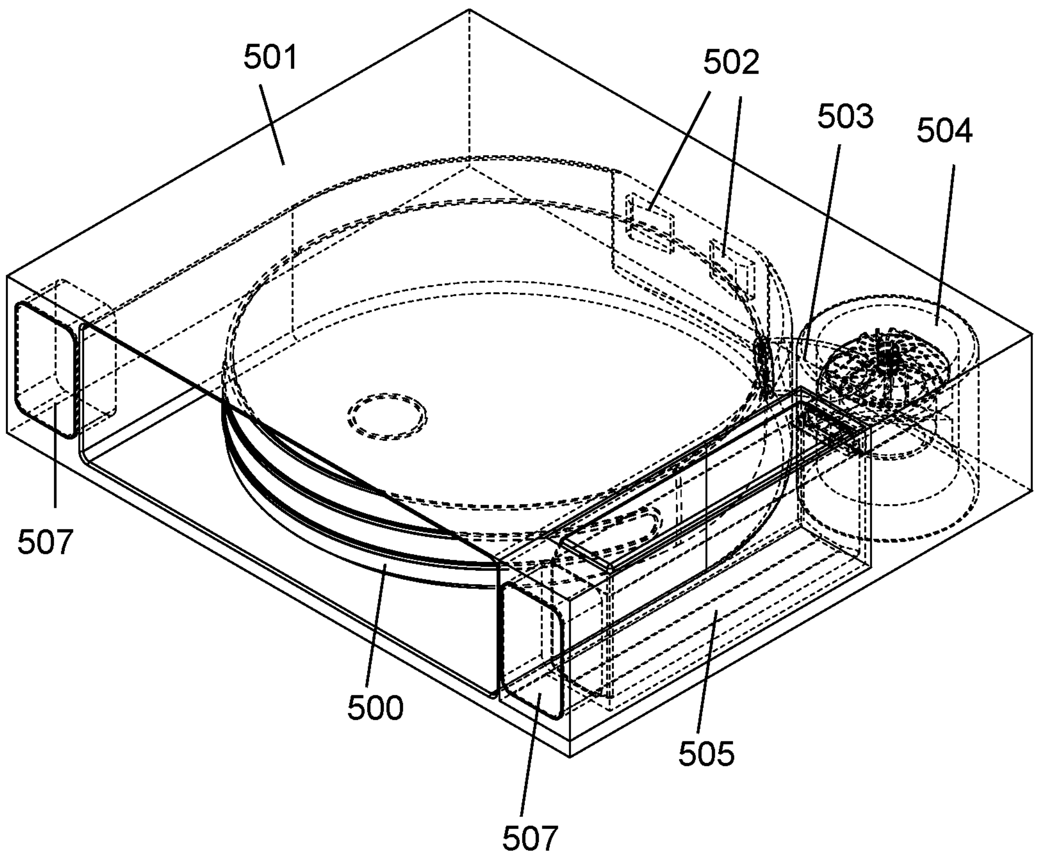
FIGS. 19A-19F illustrate an example of a robot and charging station, according to some embodiments.
Figure 19B:
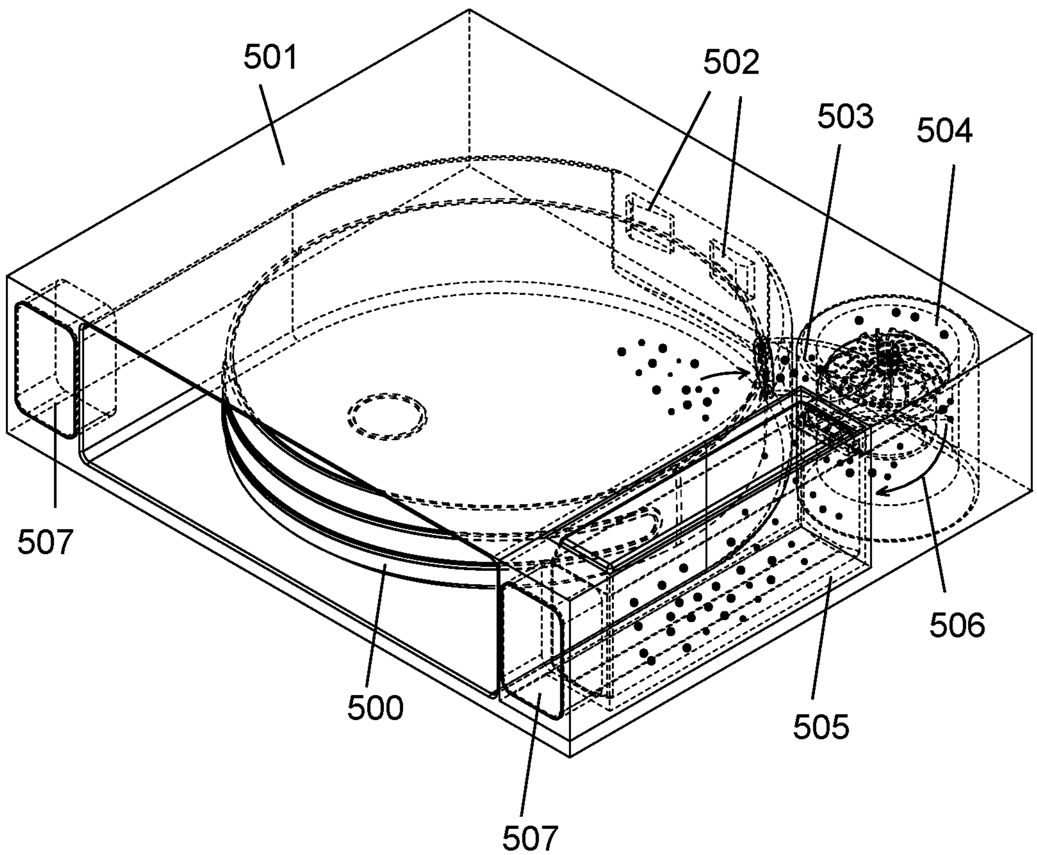
Figure 19C:
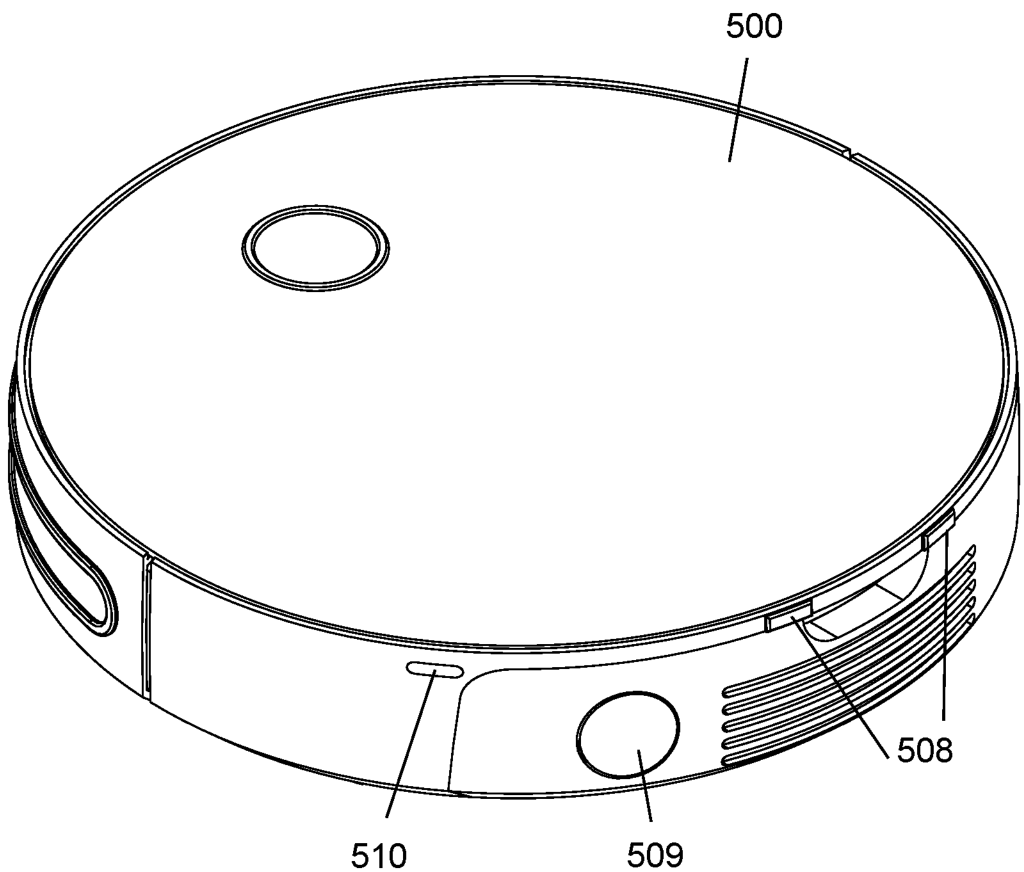
Figure 19D:
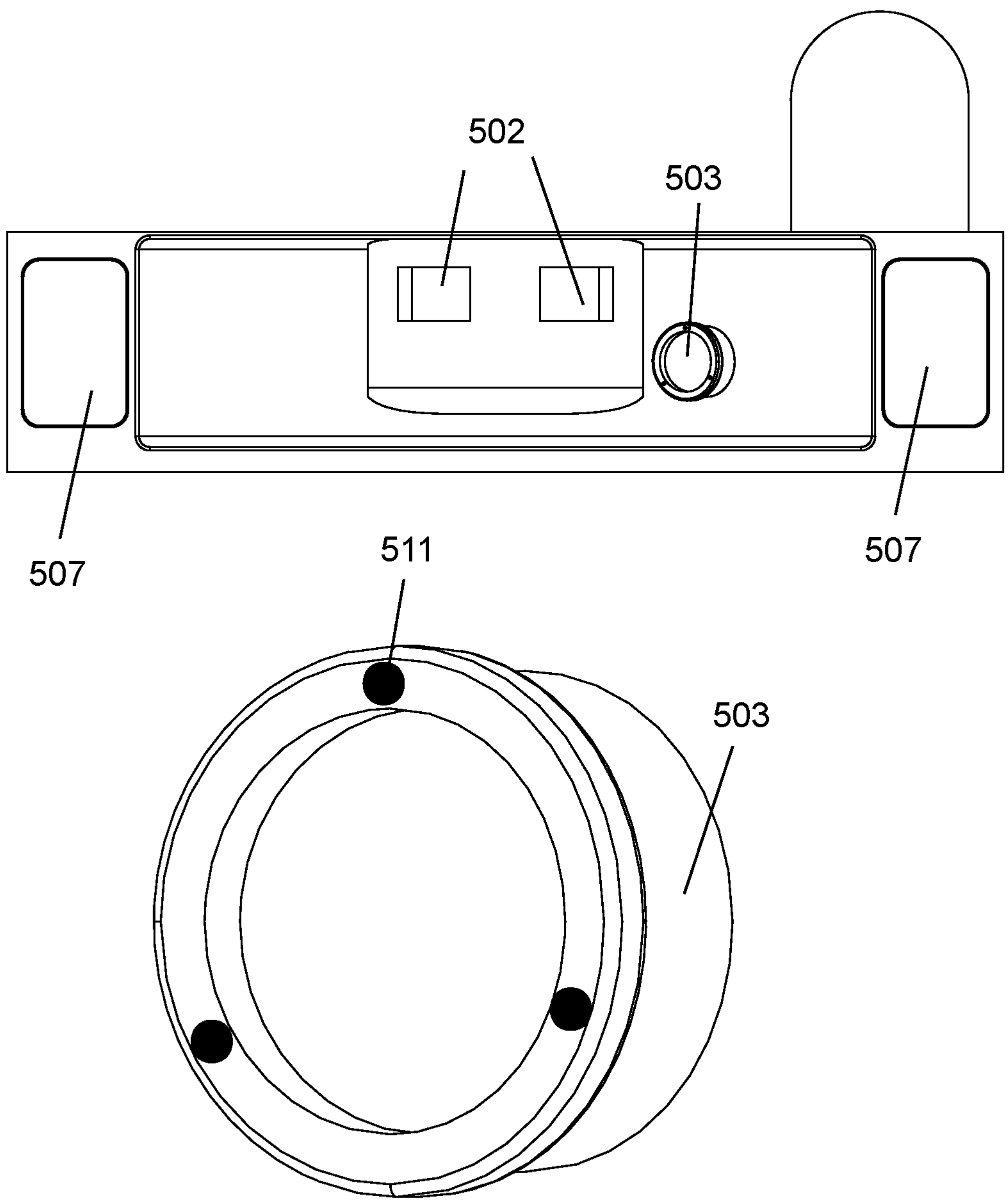
Figure 19E:
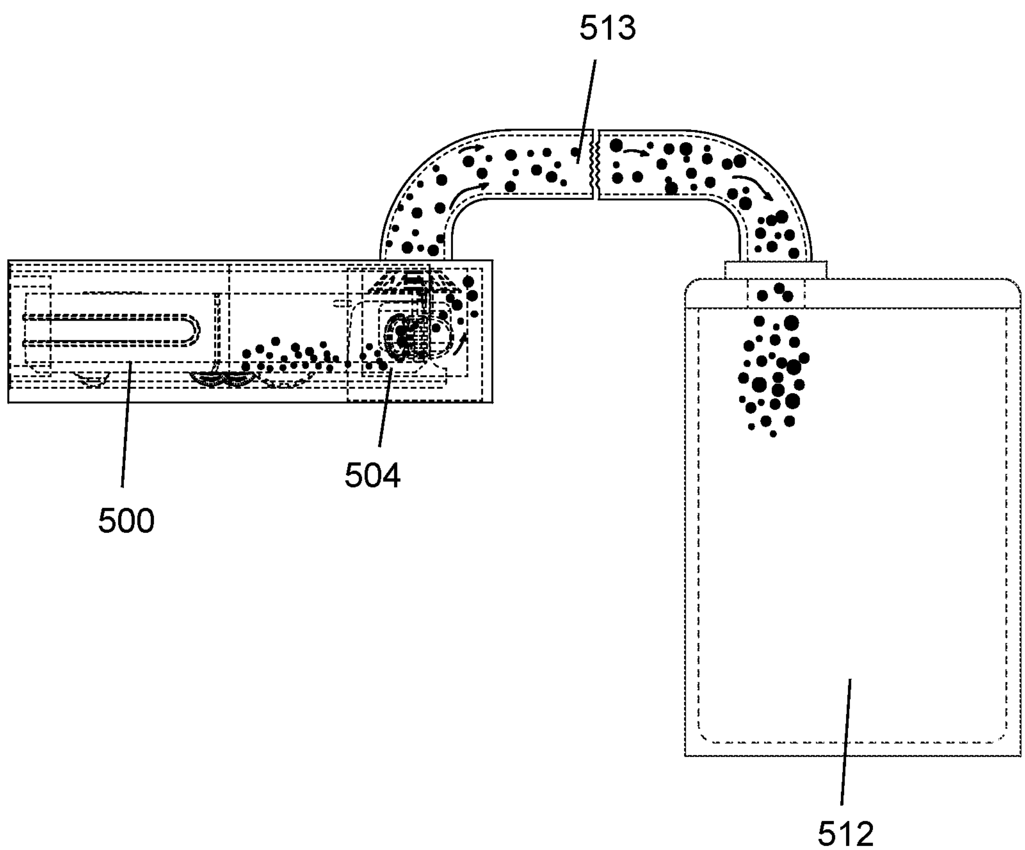
Figure 19F:
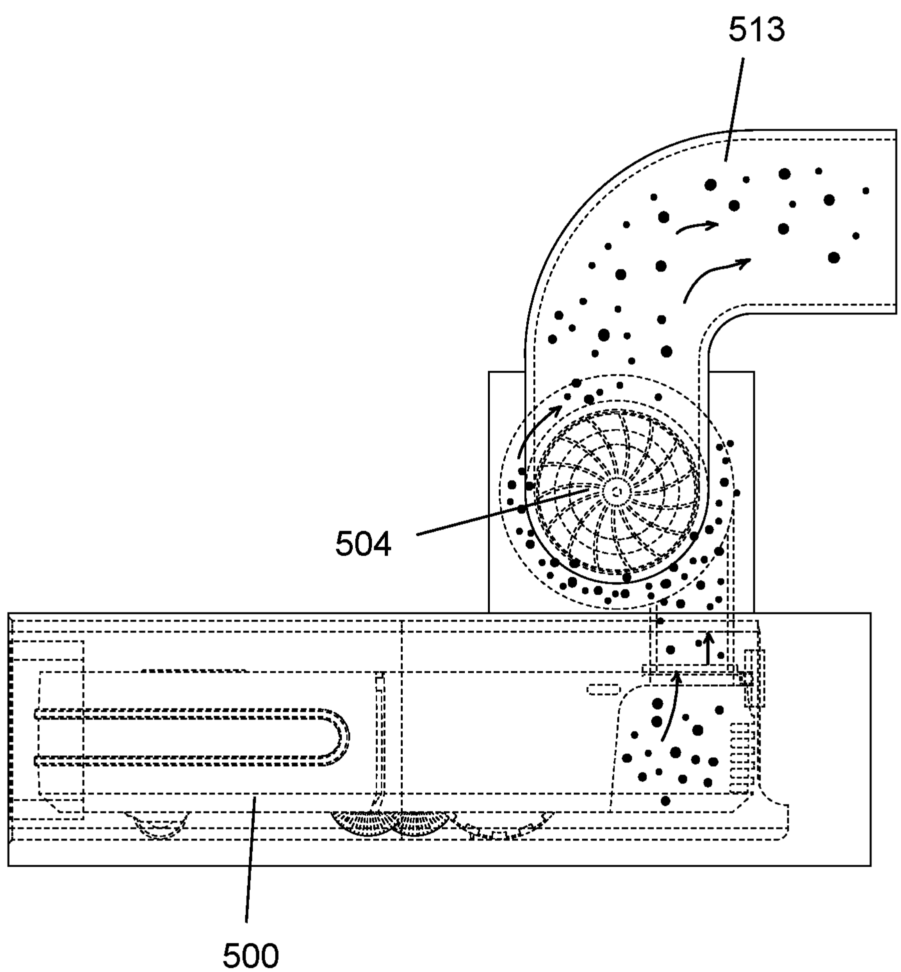

In some embodiments, the robot may charge at a charging station such as those described in U.S. patent application Ser. Nos. 15/071,069, 15/917,096, 15/706,523, 16/241,436, 15/377,674, and 16/883,327, the entire contents of which are hereby incorporated by reference. In some embodiments, the charging station of the robot may be built into an area of an environment (e.g., kitchen, living room, laundry room, mud room, etc.). In some embodiments, the bin of the surface cleaner may directly connect to and may be directly emptied into the central vacuum system of the environment. In some embodiments, the robot may be docked at a charging station while simultaneously connected to the central vacuum system. In some embodiments, the contents of a dustbin of a robot may be emptied at a charging station of the robot. For example, FIG. 19A illustrates robot 500 docked at charging station 501. Robot 500 charges by a connection between charging nodes (not shown) of robot 500 with charging pads 502 of charging station 501. When docked, a soft hose 503 may connect to a port of robot 500 with a vacuum motor 504 connected to a disposable trash bag (or detachable reusable container) 505. Vacuum motor 504 may suction debris 506 from a dustbin of robot 500 into disposable trash bag 505, as illustrated in FIG. 19B. Robot 500 may align itself during docking based on signals received from signal transmitters 507 positioned on the charging station 501. FIG. 19C illustrates components of rear-docking robot 500 including charging nodes 508, port 509 to which soft hose 503 may connect, and presence sensors 510 used during docking to achieve proper alignment. FIG. 19D illustrates magnets 511 that may be coupled to soft hose 503 and port 509. Magnets 511 may be used in aligning and securing a connection between soft hose 503 and port 509 of robot 500. FIG. 19E illustrates an alternative embodiment wherein the vacuum motor 504 is connected to an outdoor bin 512 via a soft plastic hose 513. FIG. 19F illustrates another embodiment, wherein the vacuum motor 504 and soft plastic hose 513 are placed on top of charging station 501. In some cases, the vacuum motor may be connected to a central vacuum system of a home or a garbage disposal system of a home. In embodiments, the vacuum motor may be placed on either side of the charging station. In some embodiments, the processor of the robot may determine and tracking area covered by the robot. In some embodiments, the processor of the robot may track a preset configuration for emptying the bin of the robot. In some embodiments, the robot may navigate to the charging station, empty its bin into the charging station bin, and resume cleaning uncovered areas of the environment after the bin of the robot is emptied into the station bin. The preset configuration may include at least one of a preset amount of coverage by the robot, a preset volume of debris within the bin of the robot, a preset amount of operational time, a preset amount of time, and a preset weight of debris within the bin of the robot.

Figure 20A:
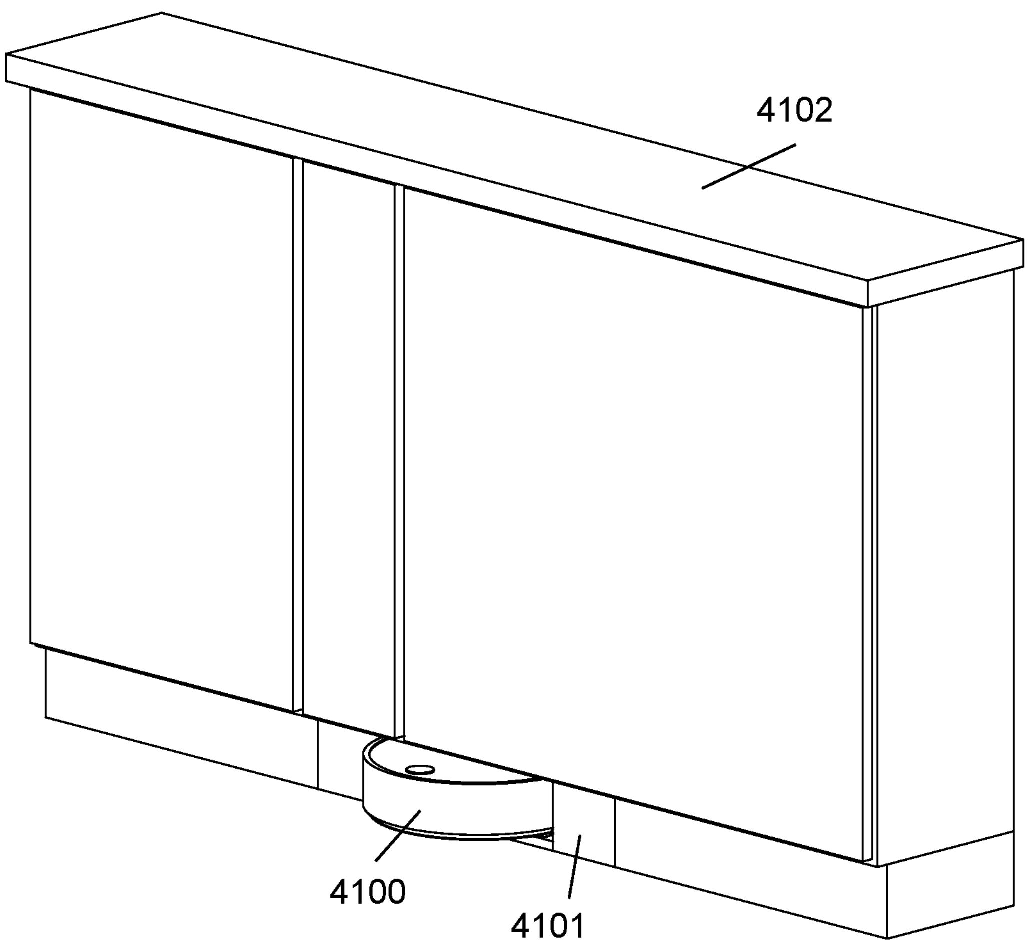
FIGS. 20A, 20B, 21, 22A, 22B and 23A-23F illustrate examples of a charging station of a robot, according to some embodiments.
Figure 20B:
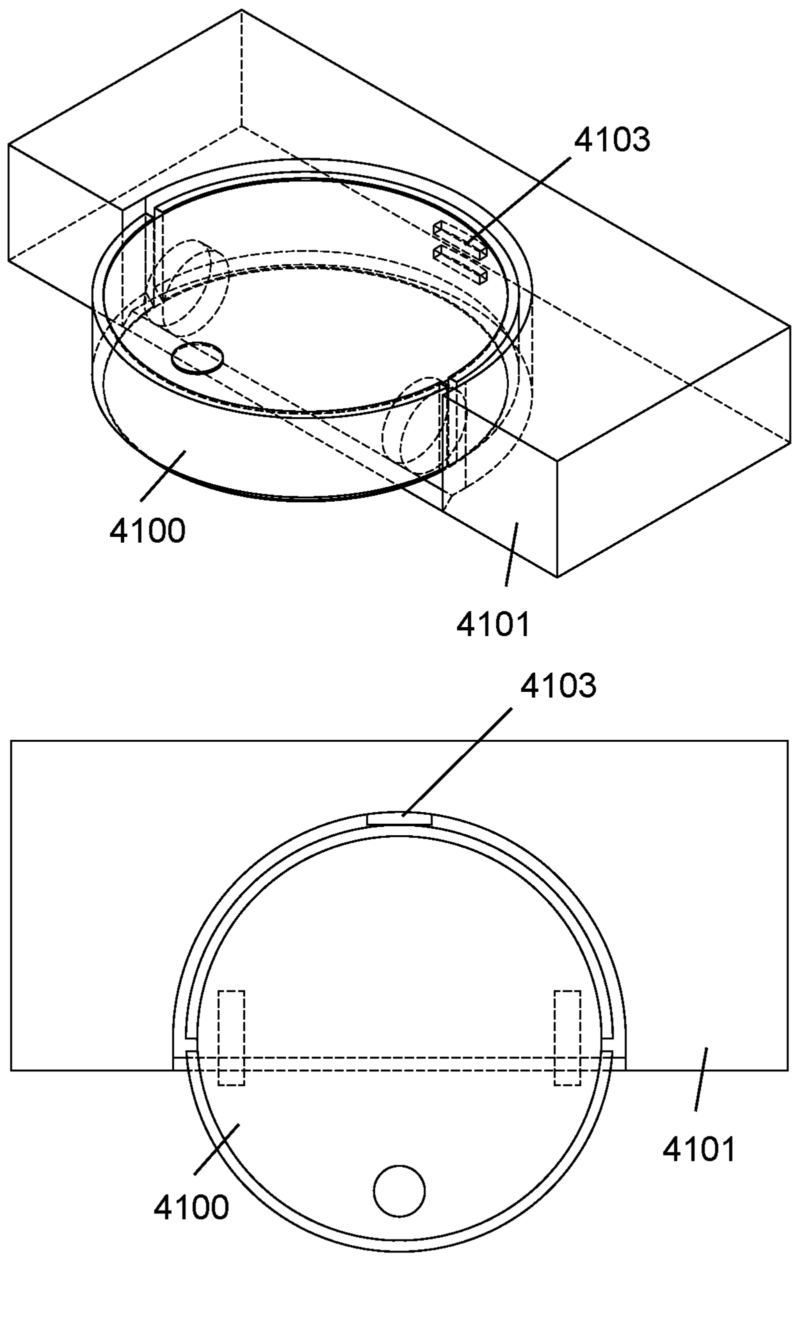
Figure 21:
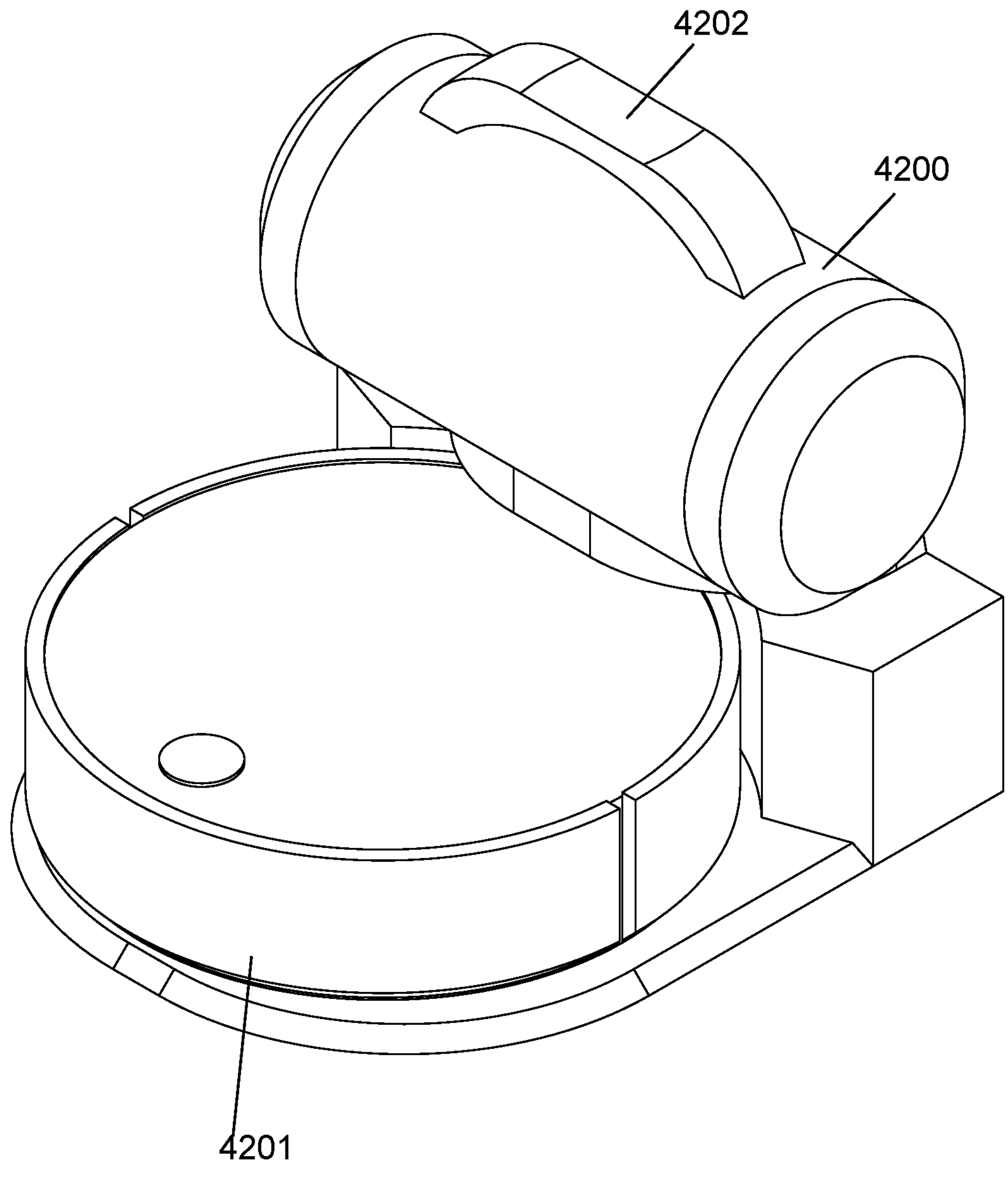
Figure 22A:
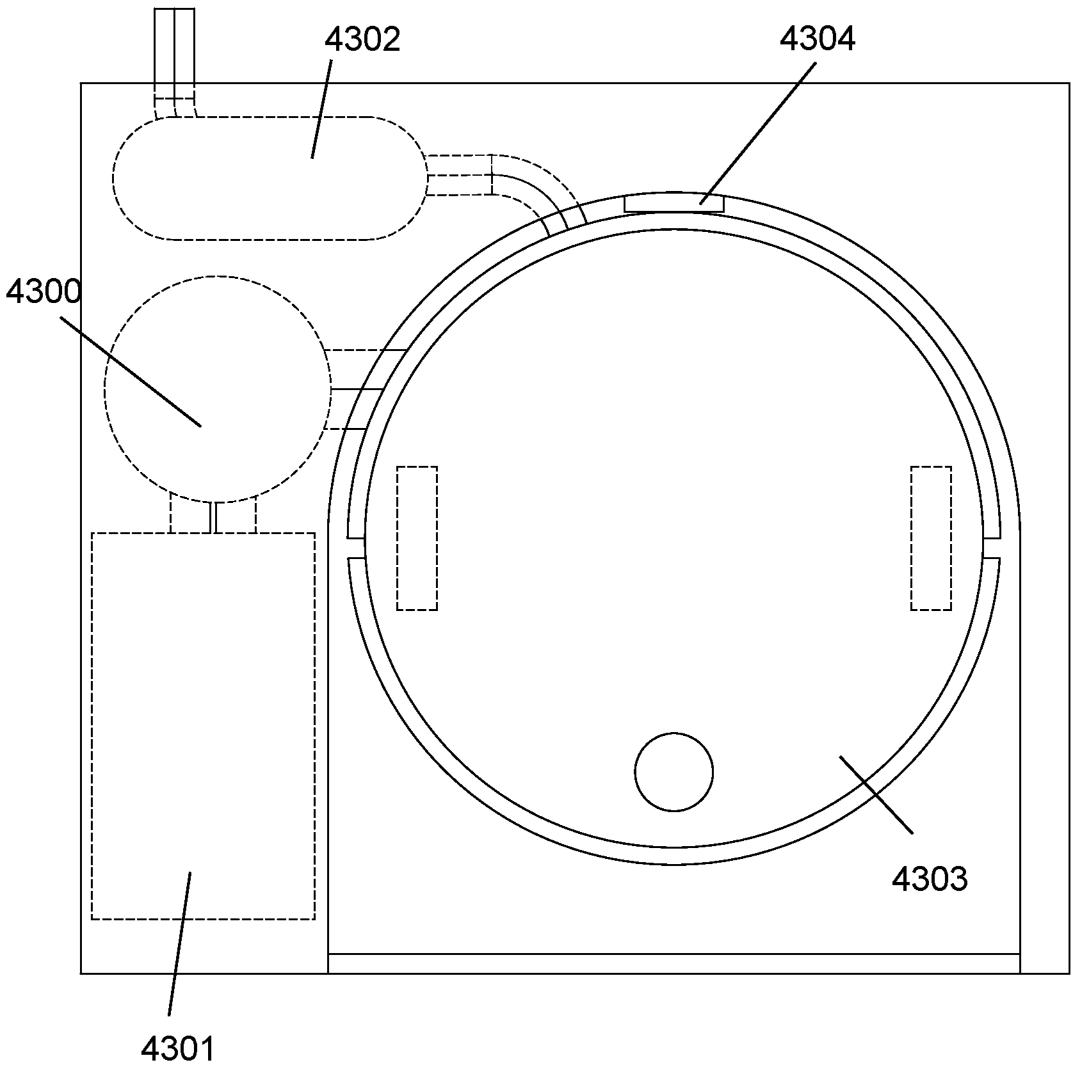
Figure 22B:
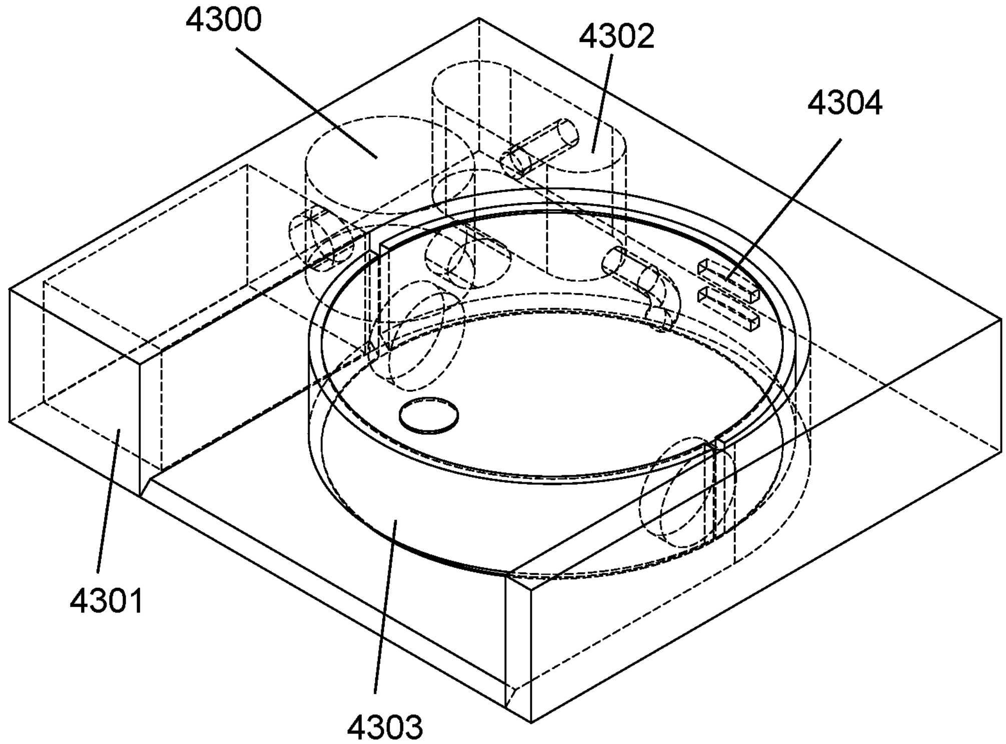
Figure 23A:
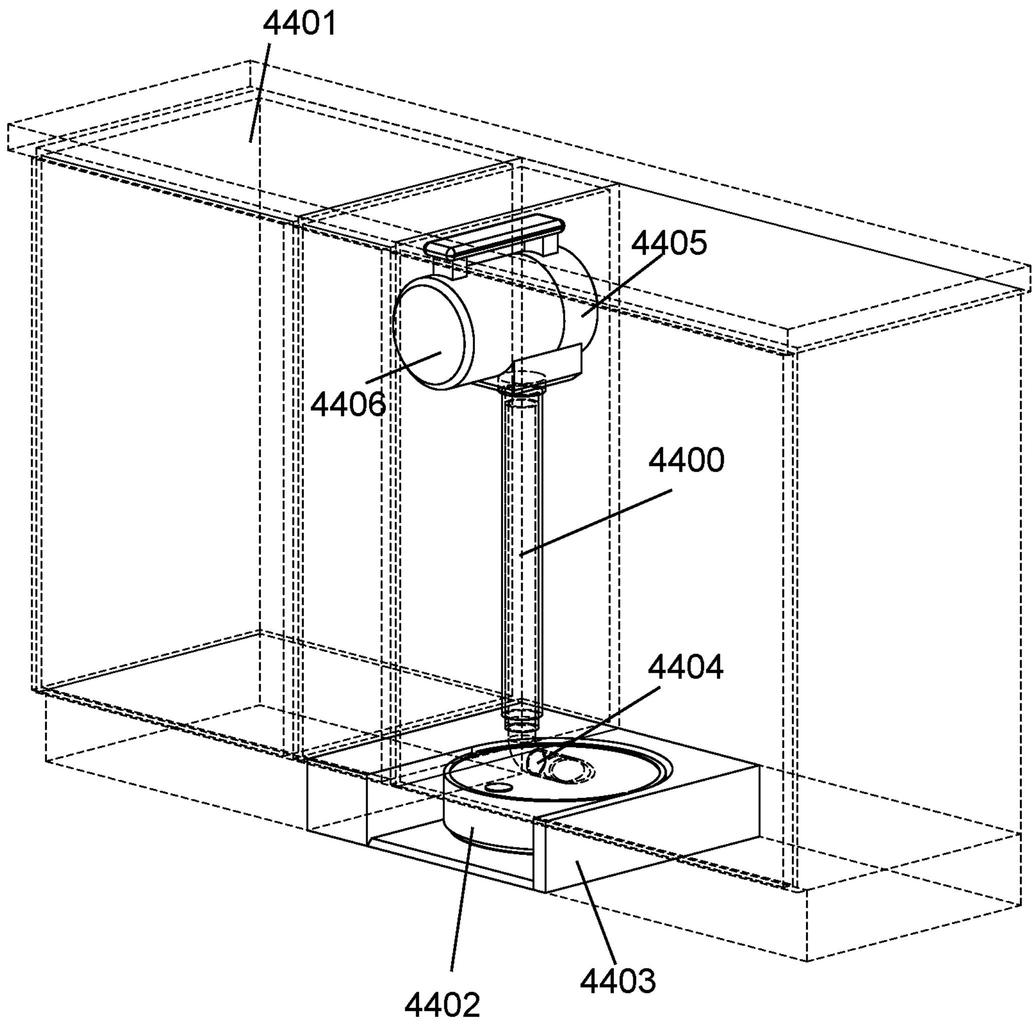
Figure 23B:
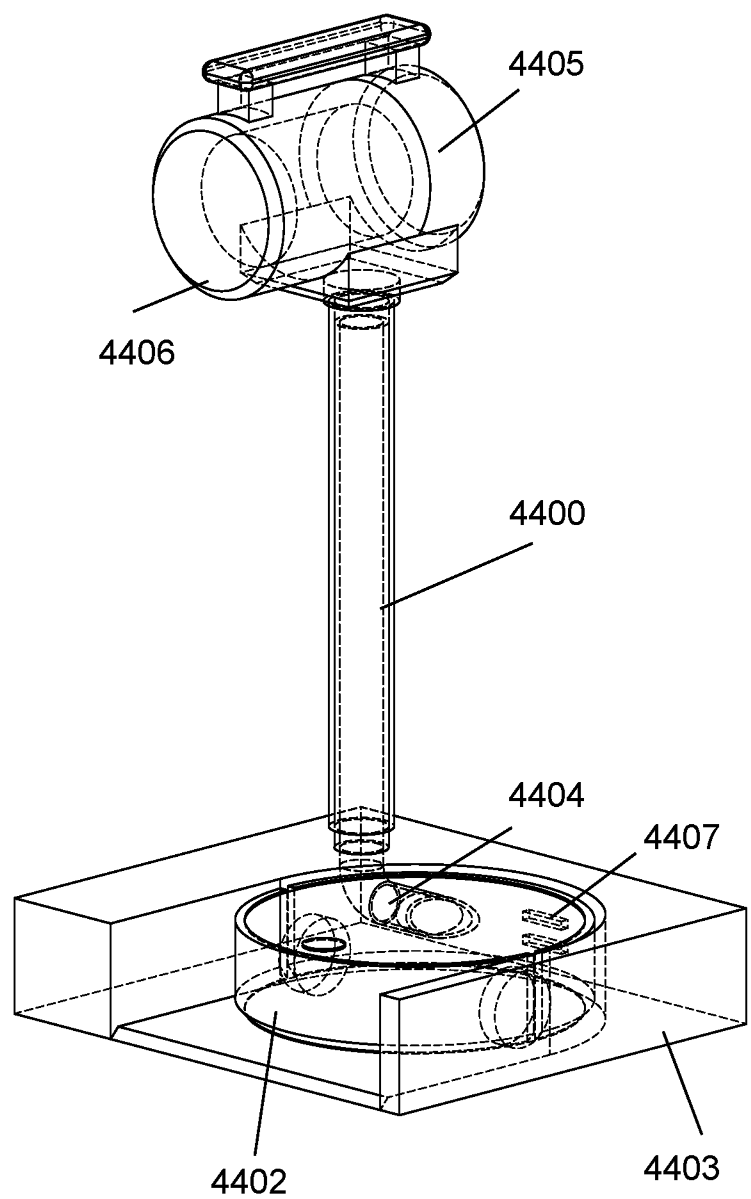
Figure 23C:
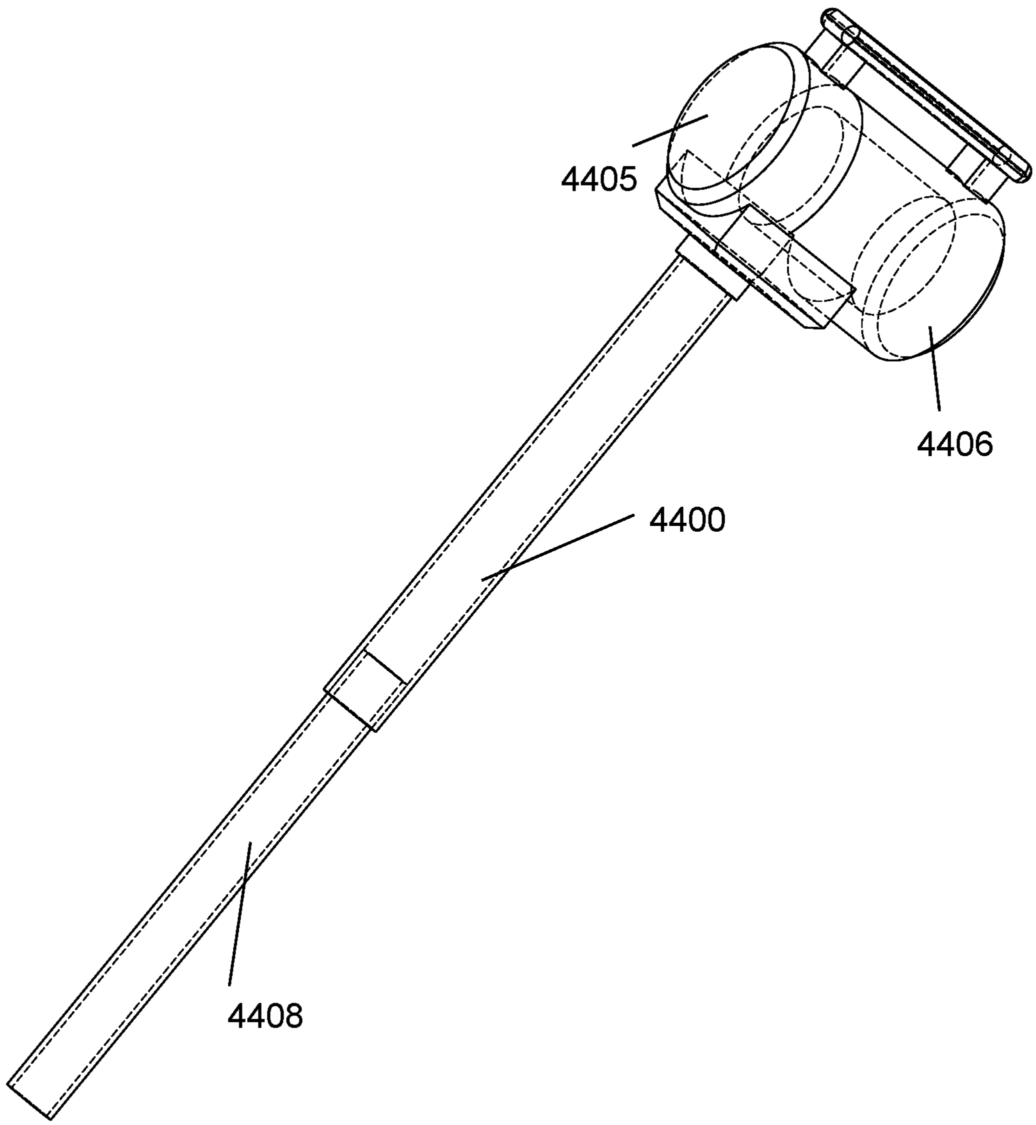
Figure 23D:
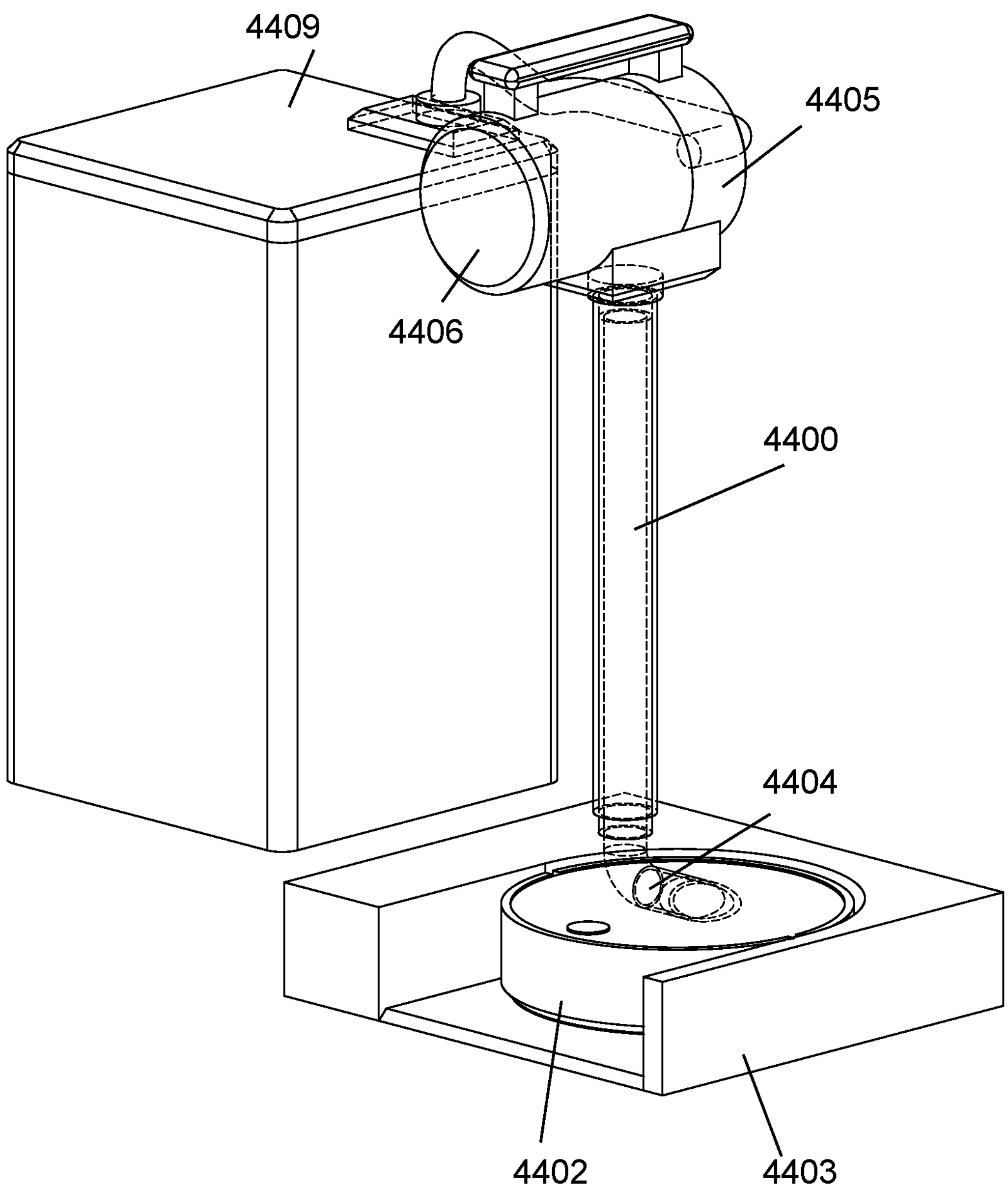
Figure 23E:
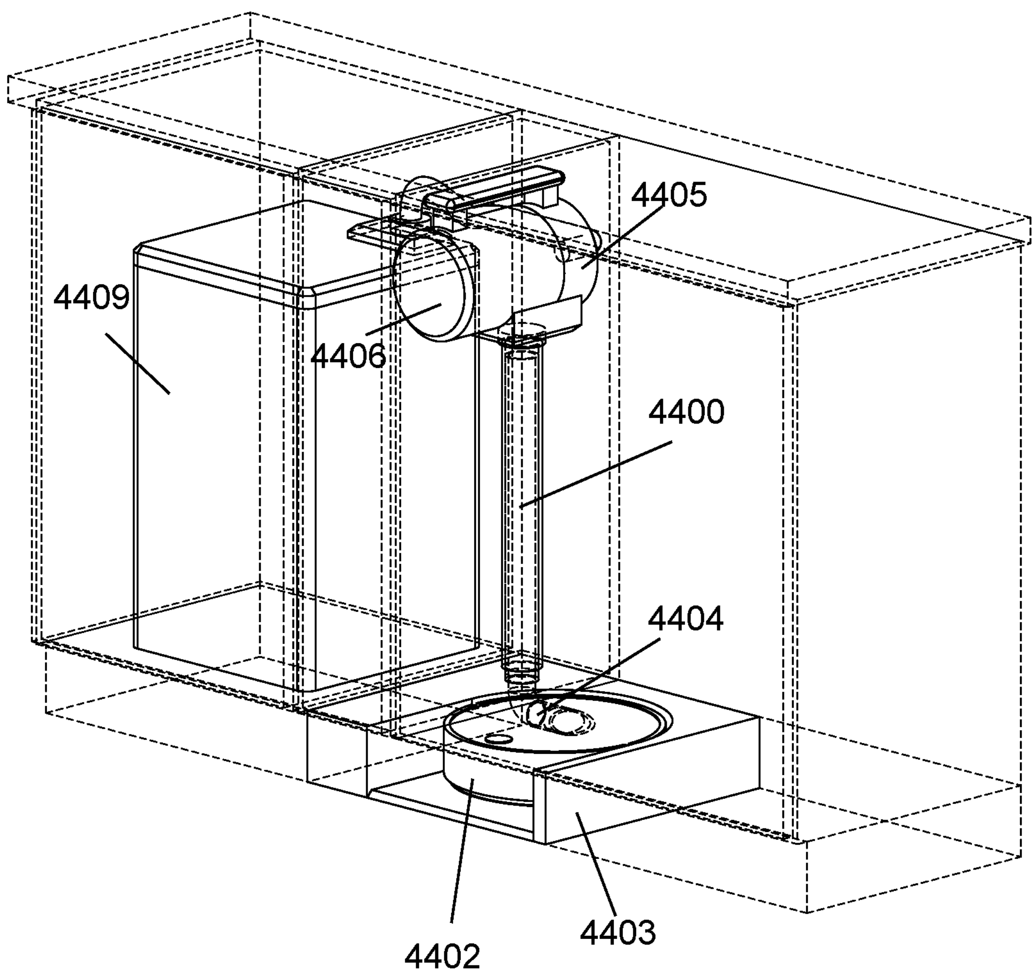
Figure 23F:
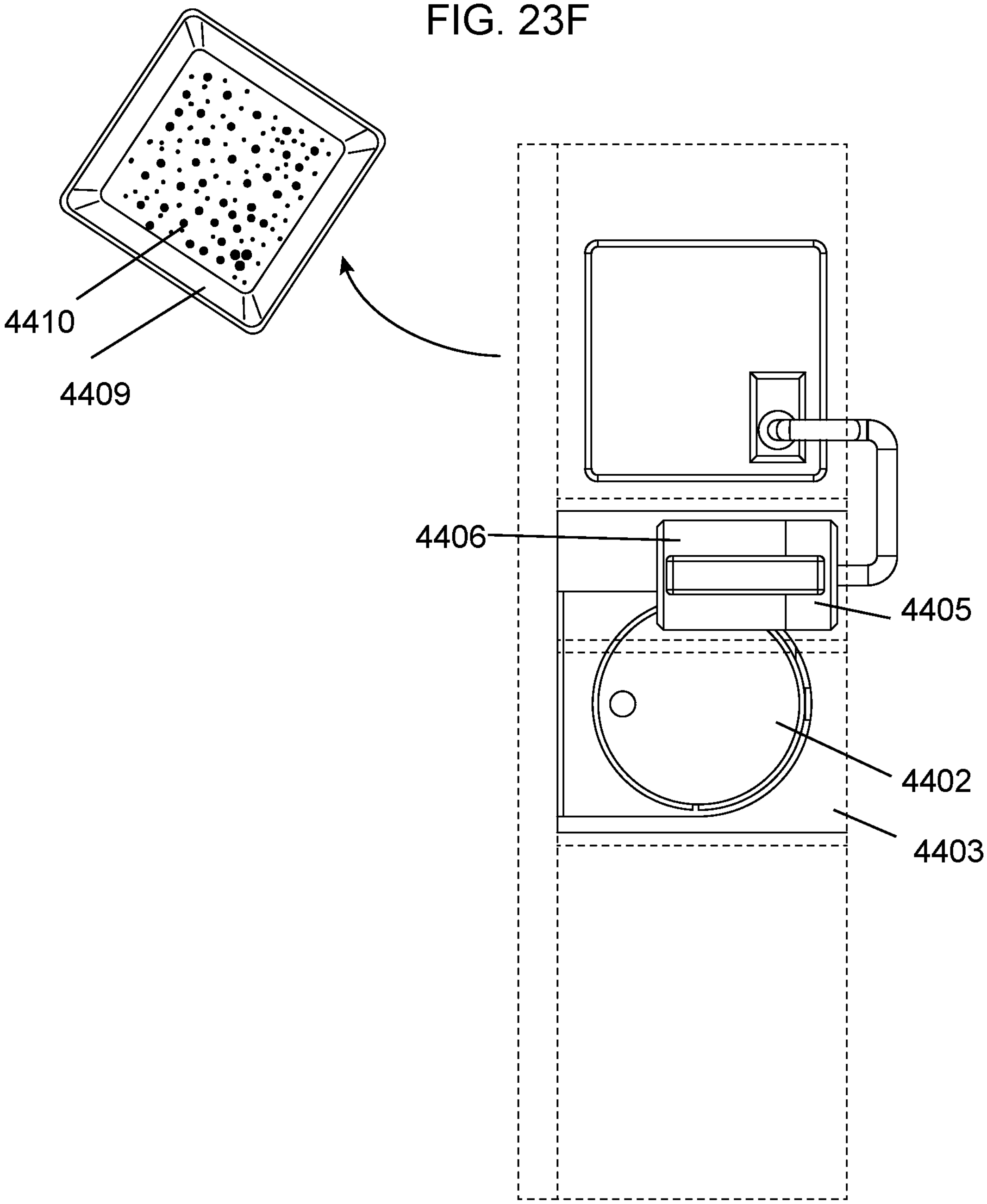

In some embodiments, the charging station may be installed beneath a structure, such as a cabinet or counters. In some embodiments, the charging station may be for charging and/or servicing a surface cleaning robot that may perform at least one of: vacuuming, mopping, scrubbing, sweeping, steaming, etc. FIG. 20A illustrates a robot 4100 docked at a charging station 4101 installed at a bottom of cabinet 4102. In this example, a portion of robot 4100 extends from underneath the cabinet when fully docked at charging station 4101. In some cases, the charging station may not be installed beneath a structure and may be used as a standalone charging station, as illustrated in FIG. 20B. Charging pads 4202 of charging station 4101 used in charging robot 4100 are shown in FIG. 20B. FIG. 21 illustrates an alternative charging station that includes a module 4200 for emptying a dustbin of a robot 4201 when docked at the charging station. The module 4200 may interface with an opening of the dustbin and may include a vacuum motor that is used to suction the dust out of the dustbin. The module 4200 may be held by handle 4202 and removable such that its contents may be emptied into a trashcan. FIGS. 22A and 22B illustrate a charging station that includes a vacuum motor 4300 connected to a container 4301 and a water pump 4302. When a robot 4303 is docked at the charging station the vacuum motor interfaces with an opening of a dustbin of the robot 4303 and suctions debris from the dustbin into the container 4301. The water pump 4302 interfaces with a fluid tank of the robot 4303 and can pump fluid (e.g., cleaning fluid) into the fluid tank (e.g., directly from the water system of the environment or from a fluid reservoir) once it is depleted. The robot 4303 charges by connecting to charging pads 4304. In some cases, a separate mechanism that may attach to a robot may be used for emptying a dustbin of the robot. For example, FIG. 23A illustrates a handheld mechanism 4400 positioned within cabinet 4401. When a robot 4402 is docked at a charging station 4403 installed beneath cabinet 4401, the mechanism 4400 interfaces with an opening of the dustbin 4404 and using a vacuum motor 4405 is capable of suctioning the debris from the dustbin into a container 4406. The robot 4402 also charges by connecting with charging contacts 4407. The container 4406 may be detachable such that its contents may be easily emptied into a trash can. The handheld mechanism may be used with a standalone charging station as well, as illustrated in FIG. 23B. The handheld mechanism 4400 may also be used as a standalone vacuum and may include components, such as rod 4408, that attaches to it, as illustrated in FIG. 23C. In one case, the mechanism 4400 may be directly connected to a garbage bin 4409, as illustrated in FIG. 23D. In this way, the debris suctioned from the dustbin of the robot is fed into garbage bin 4409 from container 4406. FIG. 23E illustrates another possibility, wherein the system shown in FIG. 23D is installed within cabinet 4401. In some cases, garbage bin 4409 may be a robotic garbage bin. FIG. 23F illustrates robotic garbage bin 4409 navigating to autonomously empty its contents 4410 by driving out of cabinet 4401 and to a disposal location.

Figure 24A:
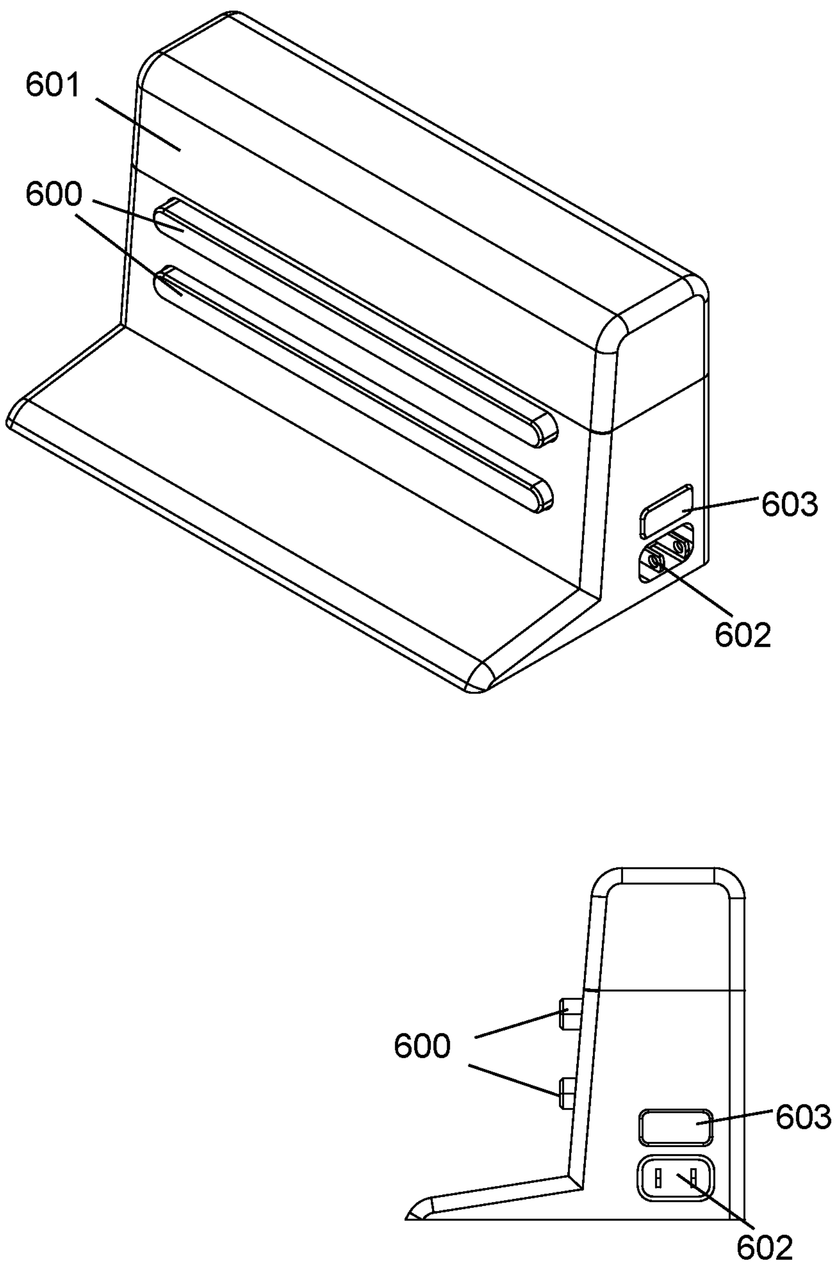
Figure 24B:
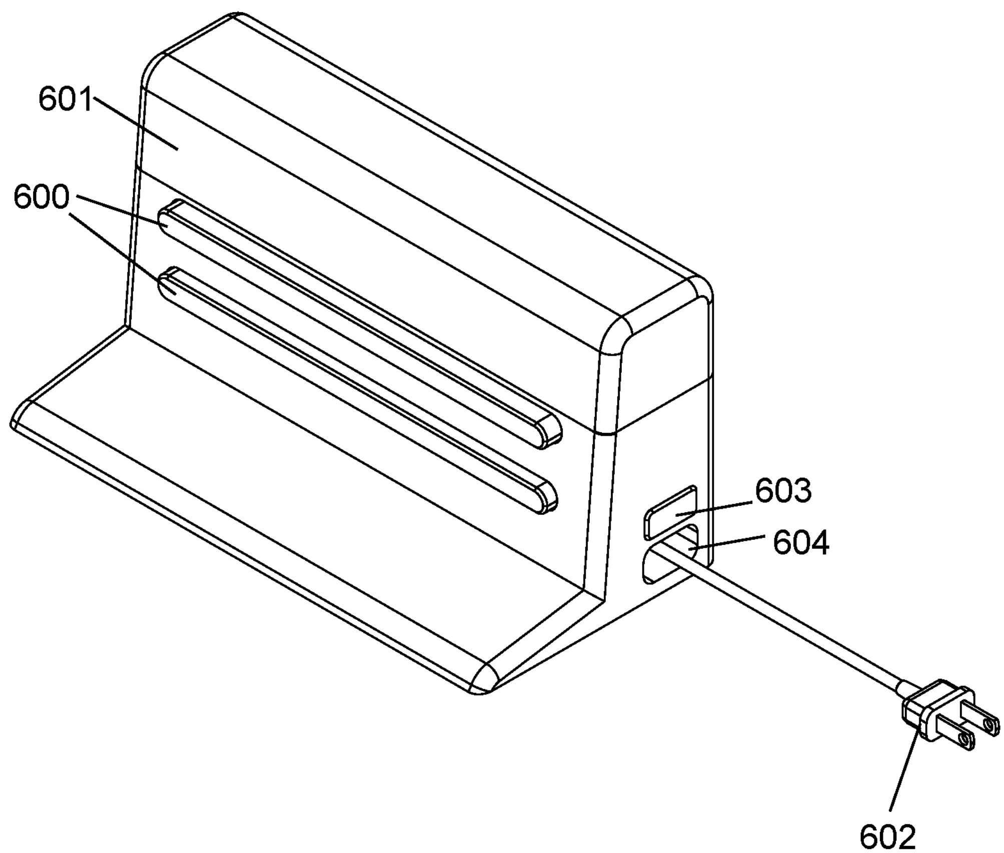
Figure 24C:
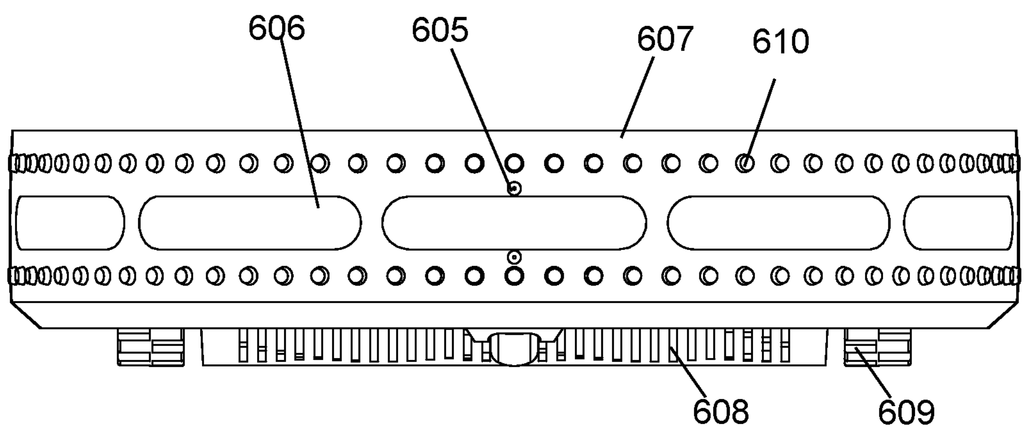
Figure 24D:
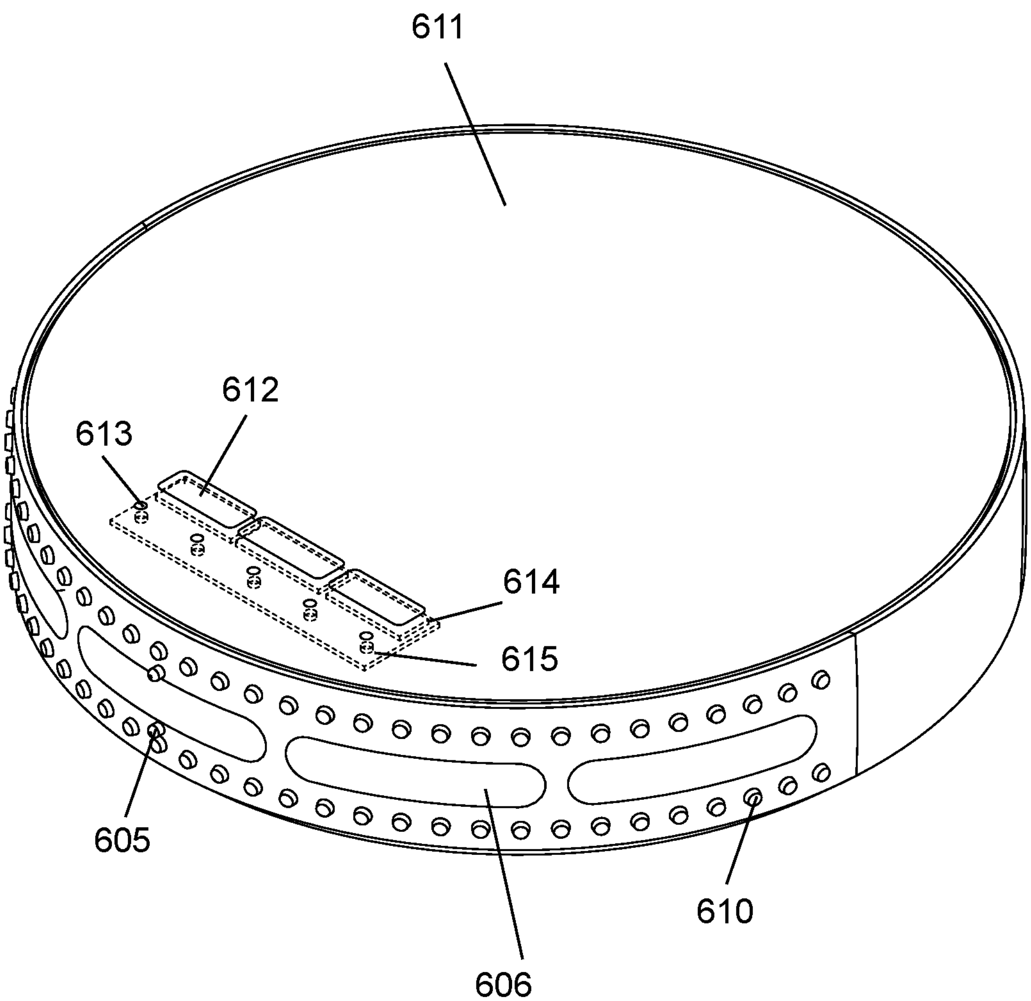
Figure 24E:
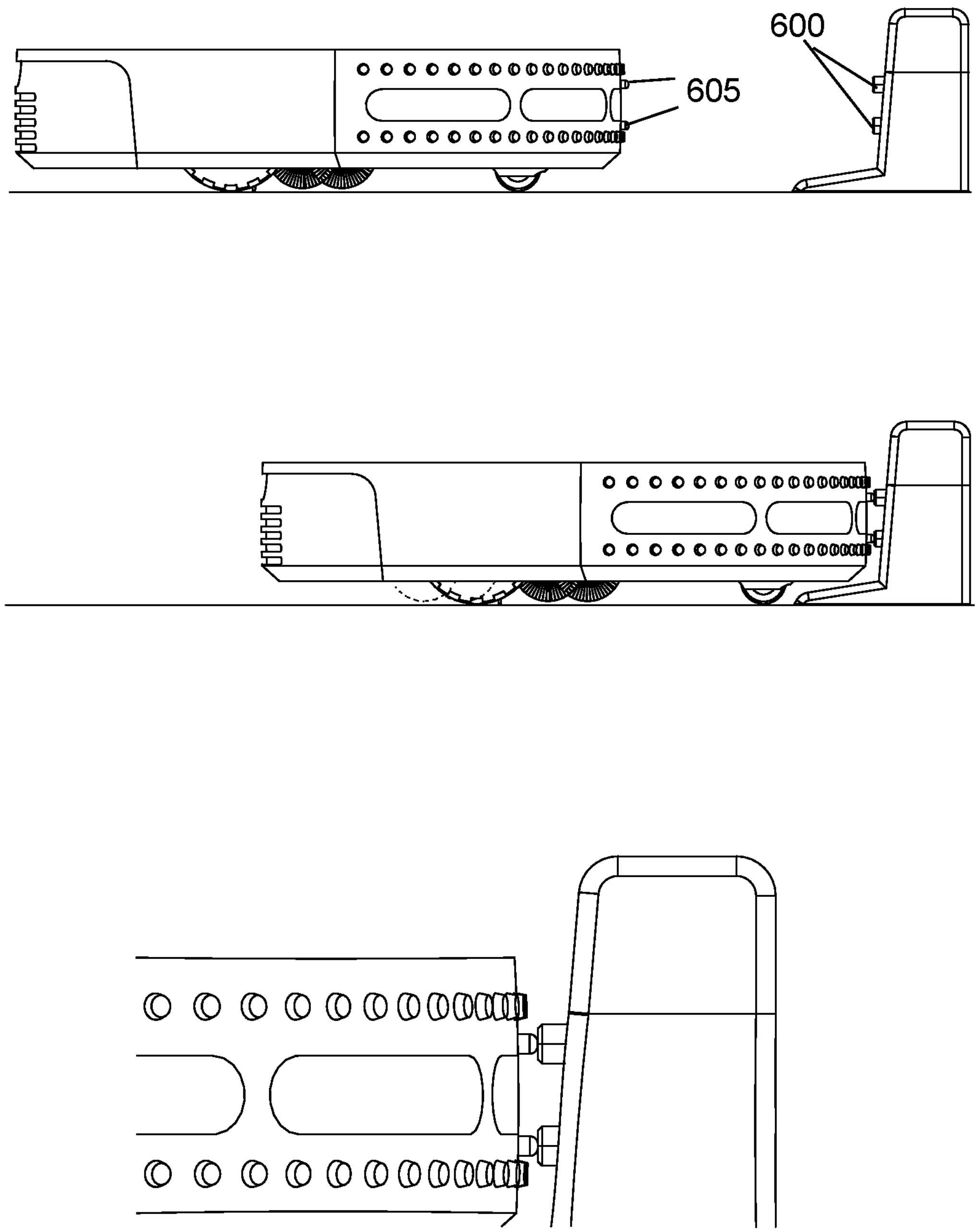
Figure 24G:
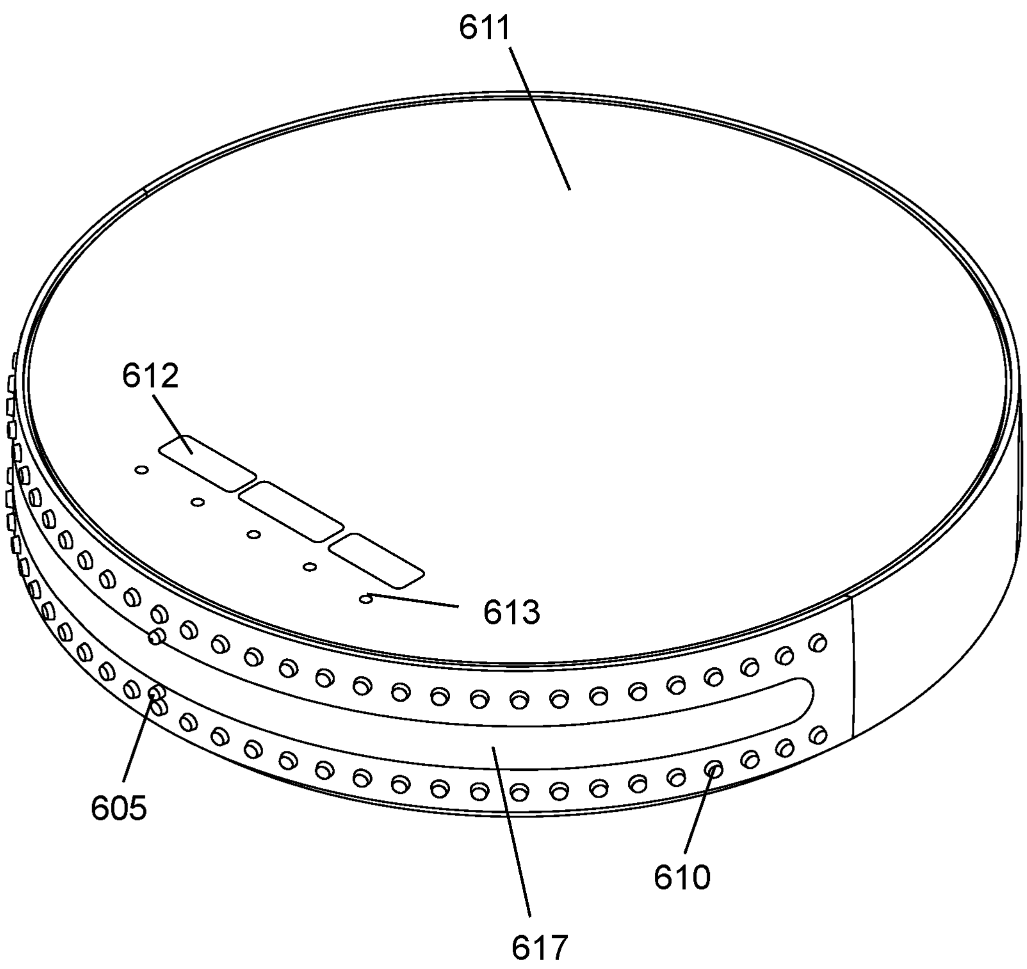
Figure 24H:
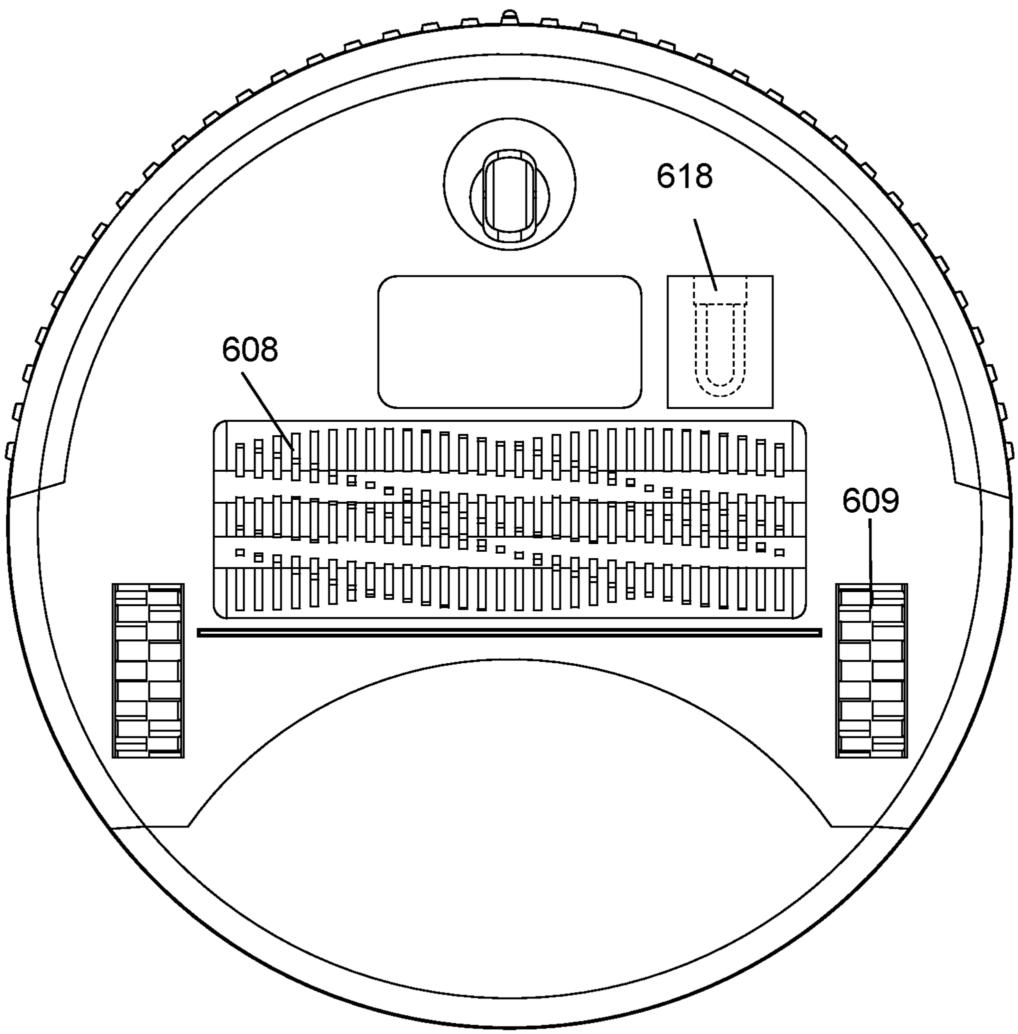
Figure 24I:
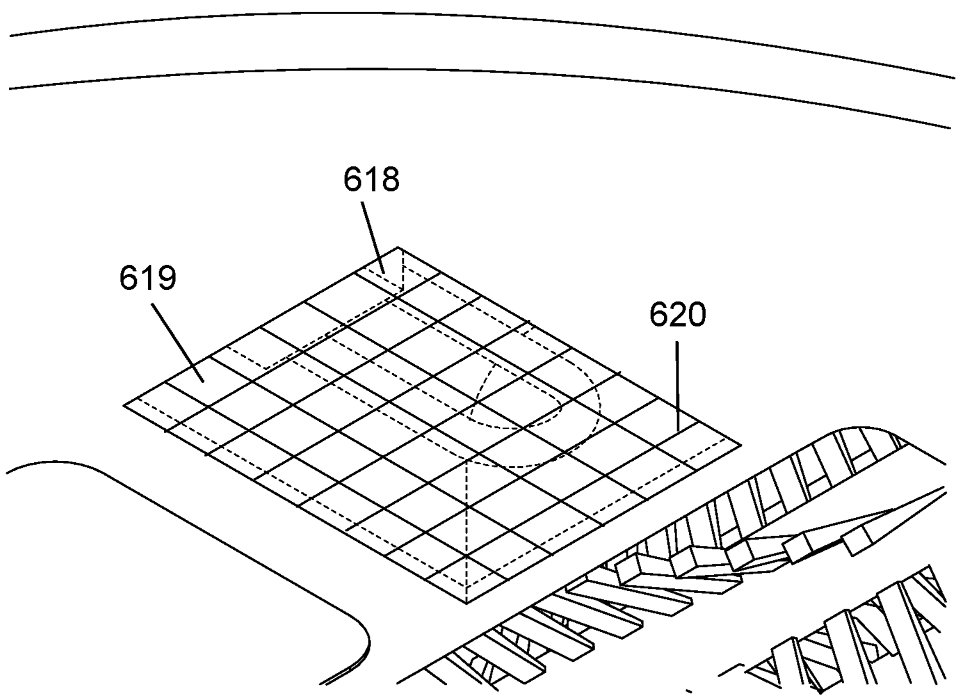

FIG. 24A illustrates another example of a charging station of a robot. The charging station includes charging pads 600, area 601 behind which signal transmitters are positioned, plug 602, and button 603 for retracting plug 602. Plug 602 may be pulled from hole 604 to a desired length and button 603 may be pushed to retract plug 602 back within hole 604. FIG. 24B illustrates plug 602 extended from hole 604. FIG. 24C illustrates a robot with charging nodes 605 that may interface with charging pads 600 to charge the robot. The robot includes sensor windows 606 behind which sensors (e.g., camera, time of flight sensor, LIDAR, etc.) are positioned, bumper 607, brush 608, wheels 609, and tactile sensors 610. Each tactile sensor may be triggered when pressed and may notify the robot of contact with an object. FIG. 24D illustrates panel 611, printed buttons 612 and indicators 613, and the actual buttons 614 and LED indicators 615 positioned within the robot that are aligned with the printed buttons 612 and indicators 613 on the panel 611. FIG. 24E illustrates the robot positioned on the charging station and a connection between charging nodes 605 of the robot and charging pads 600 of the charging station. The charging pads 600 may be spring loaded such that the robot does not mistake them as an obstacle. FIG. 24F illustrates an alternative embodiment of the charging station wherein the charging pads 616 are circular and positioned in a different location. FIG. 24G illustrates an alternative embodiment of the robot wherein sensors window 617 is continuous. FIG. 24H illustrates an example of an underside of the robot including UV lamp 618. FIG. 24I illustrates a close up of the UV lamp an internal reflective surface 619 to maximize lamp coverage and a bumpy glass cover 620 to scatter UV rays.

Various different types of charging stations may be used by the robot for charging. For example, one charging station may include retractable charging prongs. In some embodiments, the charging prongs are retracted within the main body of the charging station to protect the charging contacts from damage and dust collection which may affect efficiency of charging. In some embodiments, the charging station detects the robot approaching for docking and extends the charging prongs for the robot to dock and charge. The charging station may detect the robot by receiving a signal transmitted by the robot. In some embodiments, the docking station detects when the robot has departed from the charging station and retracts the charging prongs. The charging station may detect that the robot has departed by the lack of a signal transmitted from the robot. In some embodiments, a jammed state of a charging prong could be detected by the prototyped charging station monitoring the current drawn by the motor of the prong, wherein an increase in the current drawn would be indicative of a jam. The jam could be communicated to the prototyped robot via radio frequency communication which upon receipt could trigger the robot to stop docking.

In some embodiments, a receiver of the robot may be used to detect an IR signal emitted by an IR transmitter of the charging station. In some embodiments, the processor of the robot may instruct the robot to dock upon receiving the IR signal. In some embodiments, the processor of the robot may mark the pose of the robot when an IR signal is received within a map of the environment. In some embodiments, the processor may use the map to navigate the robot to a best-known pose to receive an IR signal from the charging station prior to terminating exploration and invoking an algorithm for docking. In some embodiments, the processor may search for concentrated IR areas in the map to find the best location to receive an IR signal from the charging station. In cases wherein only a large IR signal area is found, the processor may instruct the robot to execute a spiral movement to pinpoint a concentrated IR area, then navigate to the concentrated IR area and invoke the algorithm for docking. If no IR areas are found, the processor of the robot may instruct the robot to execute one or more 360-degree rotations and if still nothing is found, return to exploration. In some embodiments, the processor and charging station may use code words to improve alignment of the robot with the charging station during docking. In some embodiments, code words may be exchanged between the robot and the charging station that indicate the position of the robot relative to the charging station (e.g., code left and code right associated with observations by a front left and front right presence LED, respectively). In some embodiments, unique IR codes may be emitted by different presence LEDs to indicate a location and direction of the robot with respect to a charging station. In some embodiments, the charging station may perform a series of Boolean checks using a series of functions (e.g., a function 'isFront' with a Boolean return value to check if the robot is in front of and facing the charging station or 'isNearFront' to check if the robot is near to the front of and facing the charging station).

Some embodiments may include a fleet of robots with charging capabilities. In some embodiments, the robots may autonomously navigate to a charging station to recharge batteries or refuel. In some embodiments, charging stations with unique identifications, locations, availabilities, etc. may be paired with particular robots. In some embodiments, the processor of a robot or a control system of the fleet of robots may chose a charging station for charging. In some embodiments, the processor of a robot or the control system of the fleet of robots may keep track of one or more charging stations within a map of the environment. In some embodiments, the processor a robot or the control system of the fleet of robots may use the map within which the locations of charging stations are known to determine which charging station to use for a robot. In some embodiments, the processor of a robot or the control system of the fleet of robots may organize or determine robot tasks and/or robot routes (e.g., for delivering a pod or another item from a current location to a final location) such that charging stations achieve maximum throughput and the number of charged robots at any given time is maximized. In some embodiments, charging stations may achieve maximum throughput and the number of charged robots at any given time may be maximized by minimizing the number of robots waiting to be charged, minimizing the number of charging stations without a robot docked for charging, and minimizing transfers between charging stations during ongoing charging of a robot. In some embodiments, some robots may be given priority for charging. For example, a robot with 70% battery life may be quickly charged and ready to perform work, as such the robot may be given priority for charging if there are not enough robots available to complete a task (e.g., a minimum number of robots operating within a warehouse that are required to complete a task by a particular deadline).

Figure 25A:
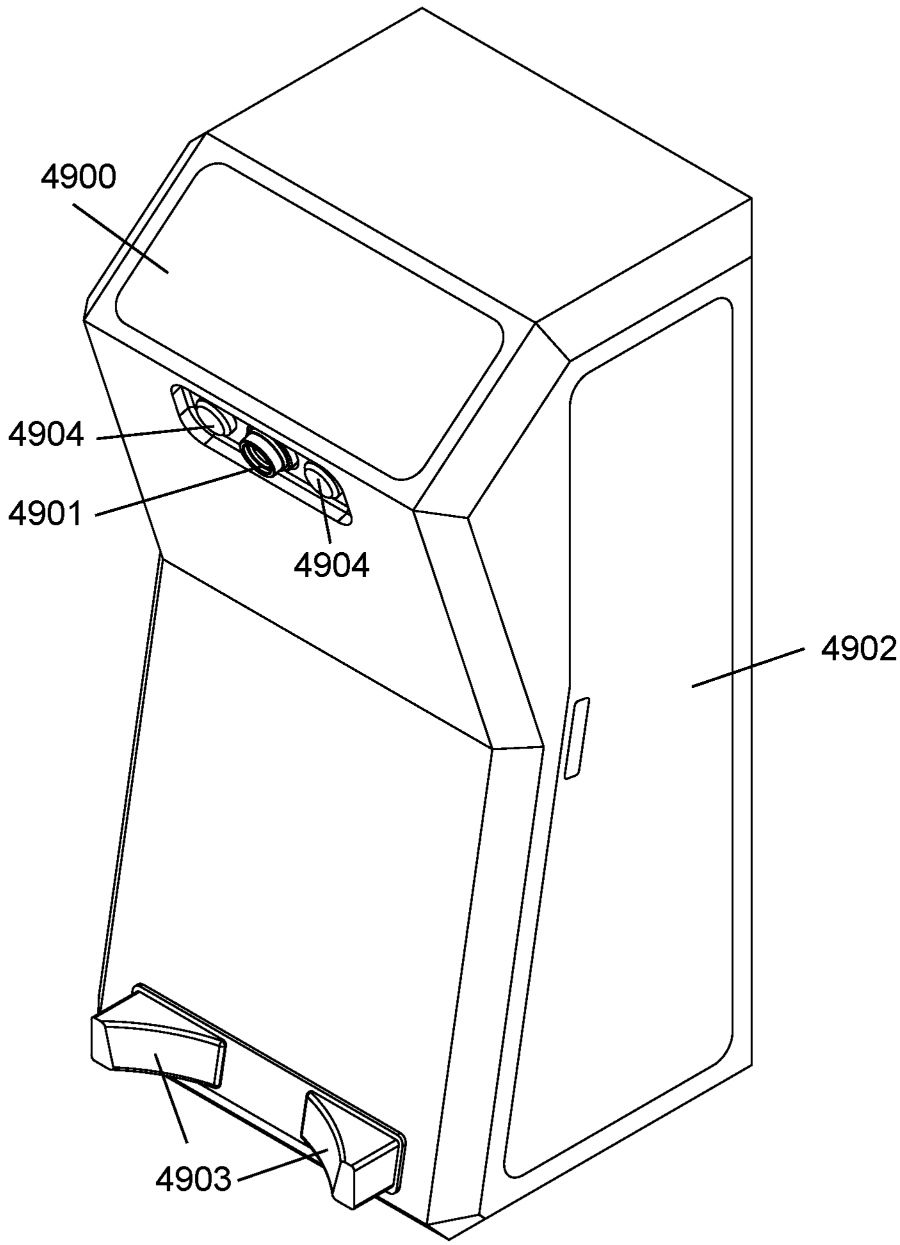
FIGS. 25A-25D, 26A, 26B, 27A-27C, and 28A-28L illustrate examples of charging stations of a robot, according to some embodiments.
Figure 25B:
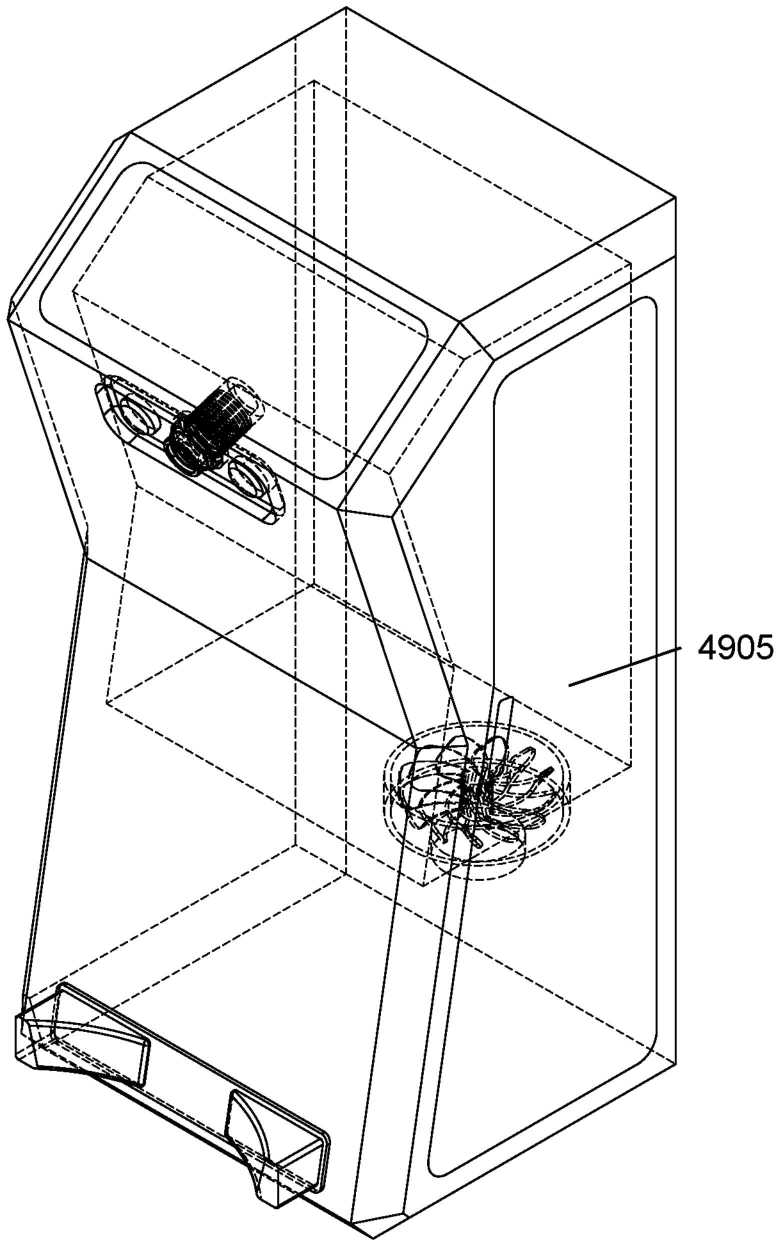
Figure 25C:
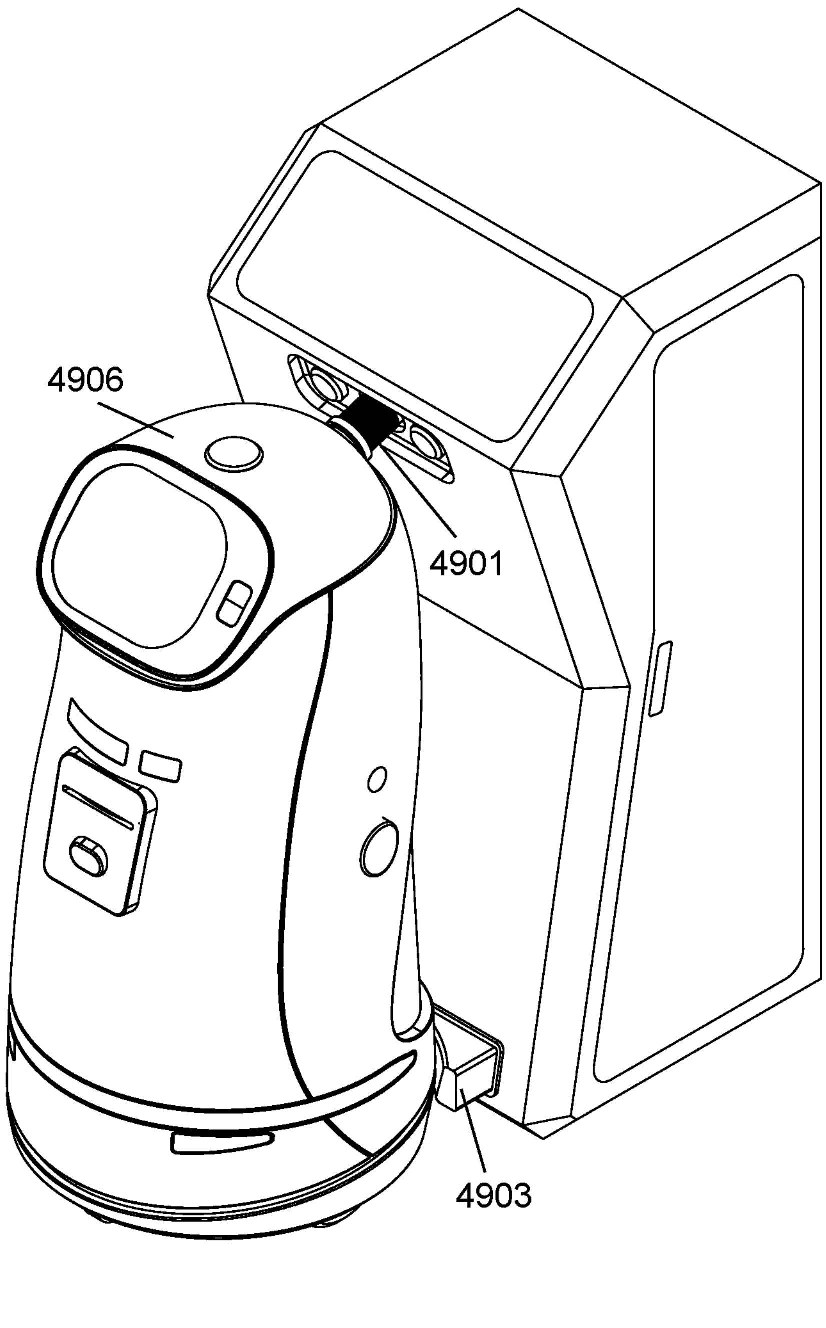
Figure 25D:
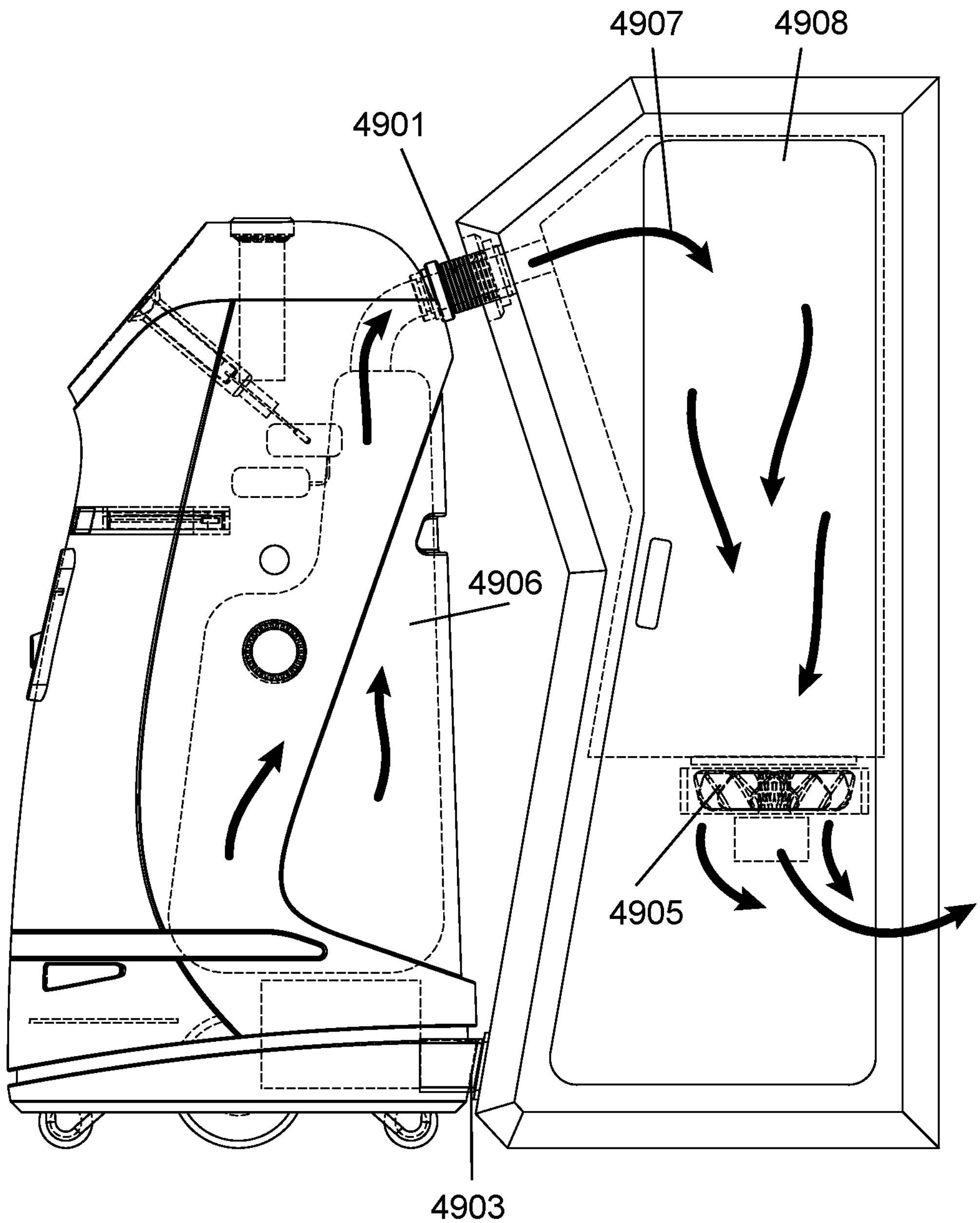
Figure 26A:
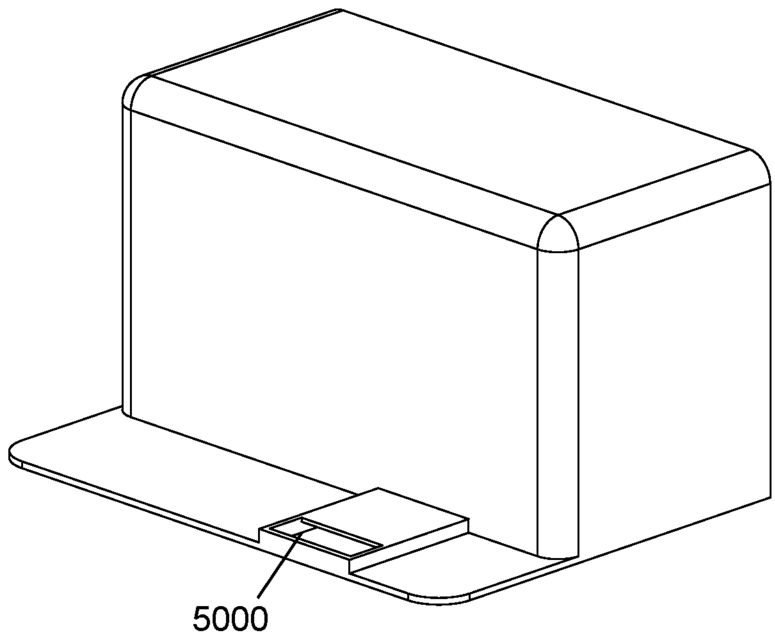
Figure 26B:
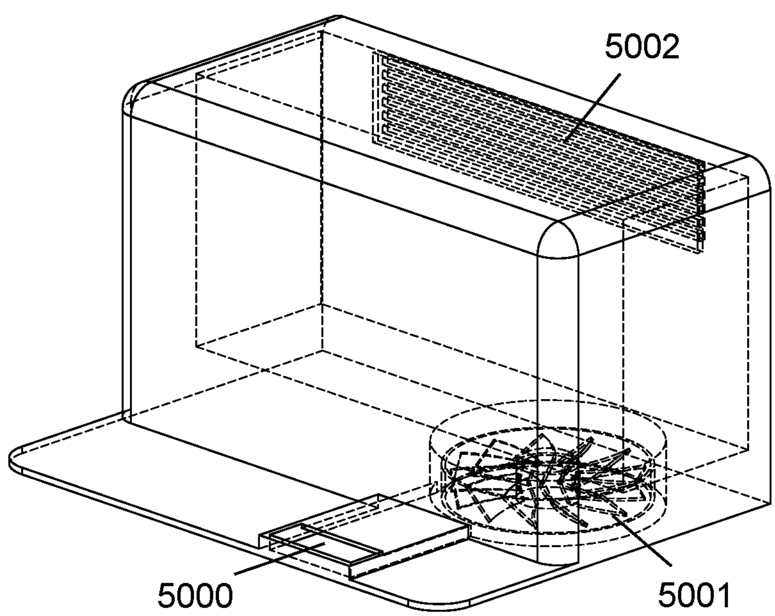
Figure 27A:
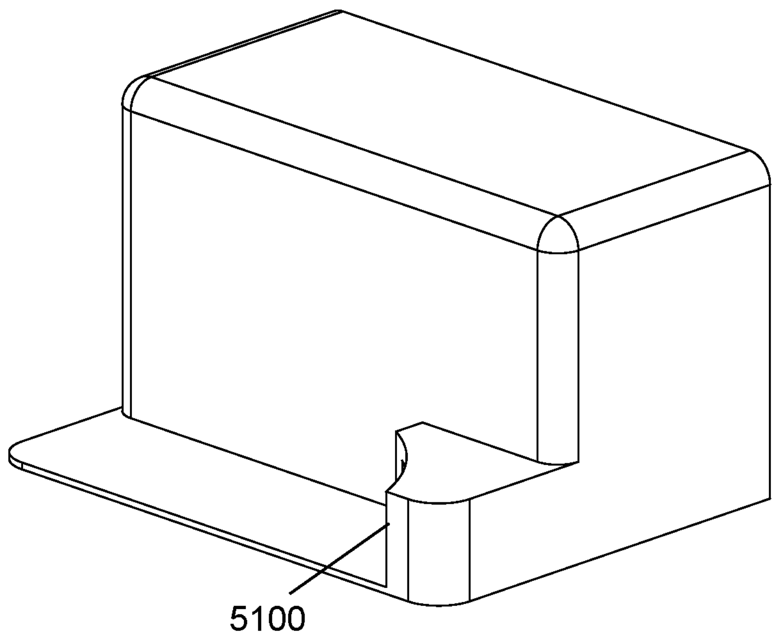
Figure 27B:
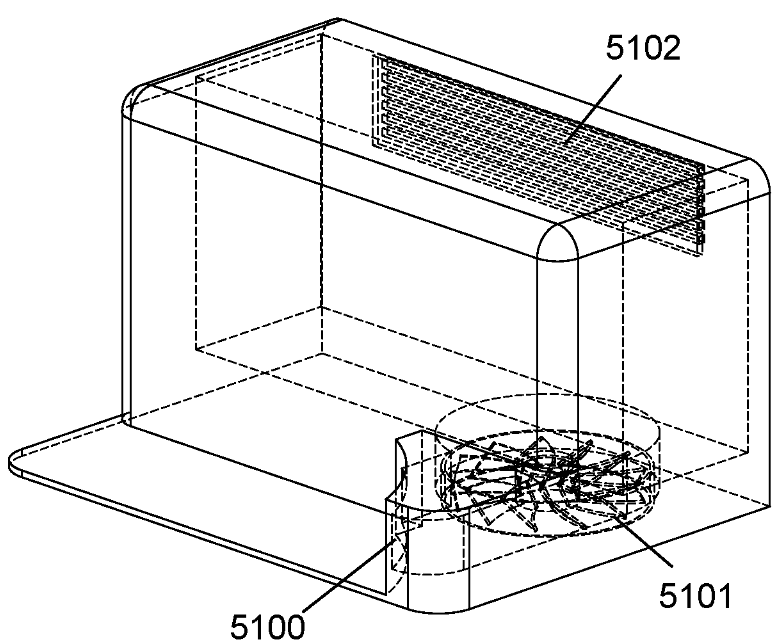
Figure 27C:
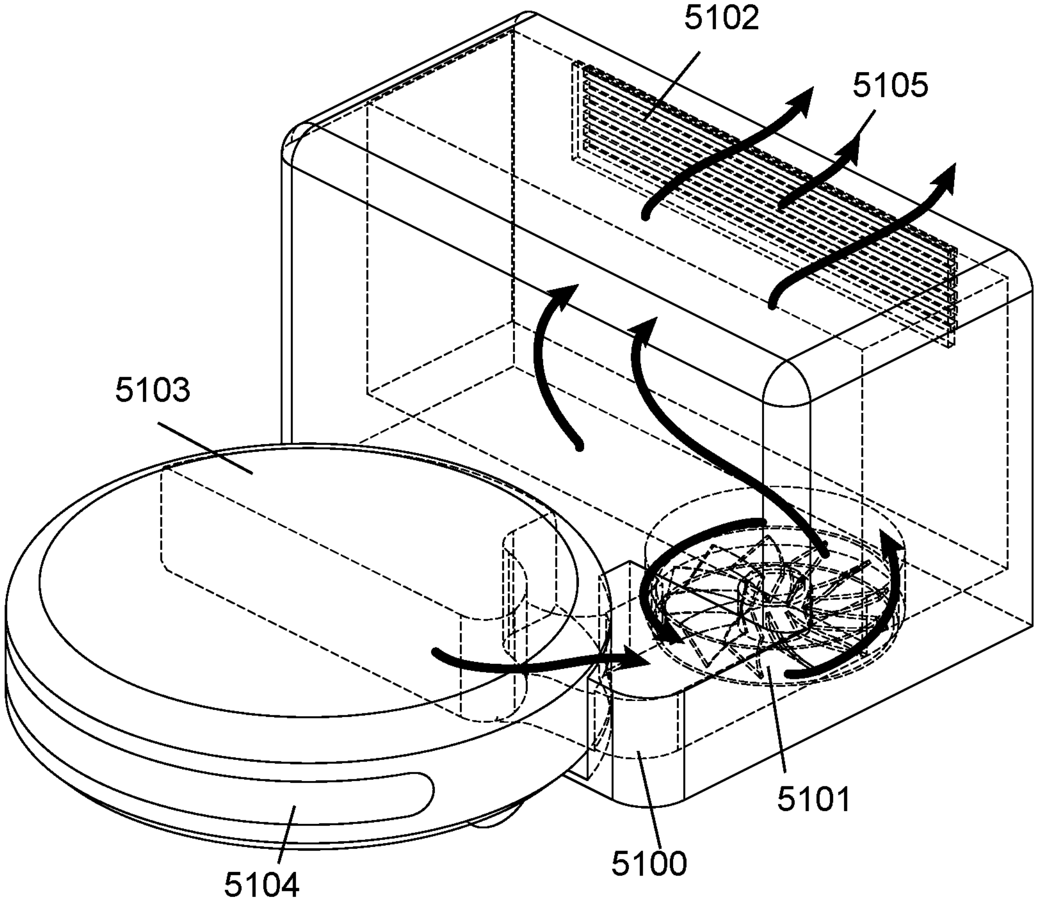
Figure 28A:
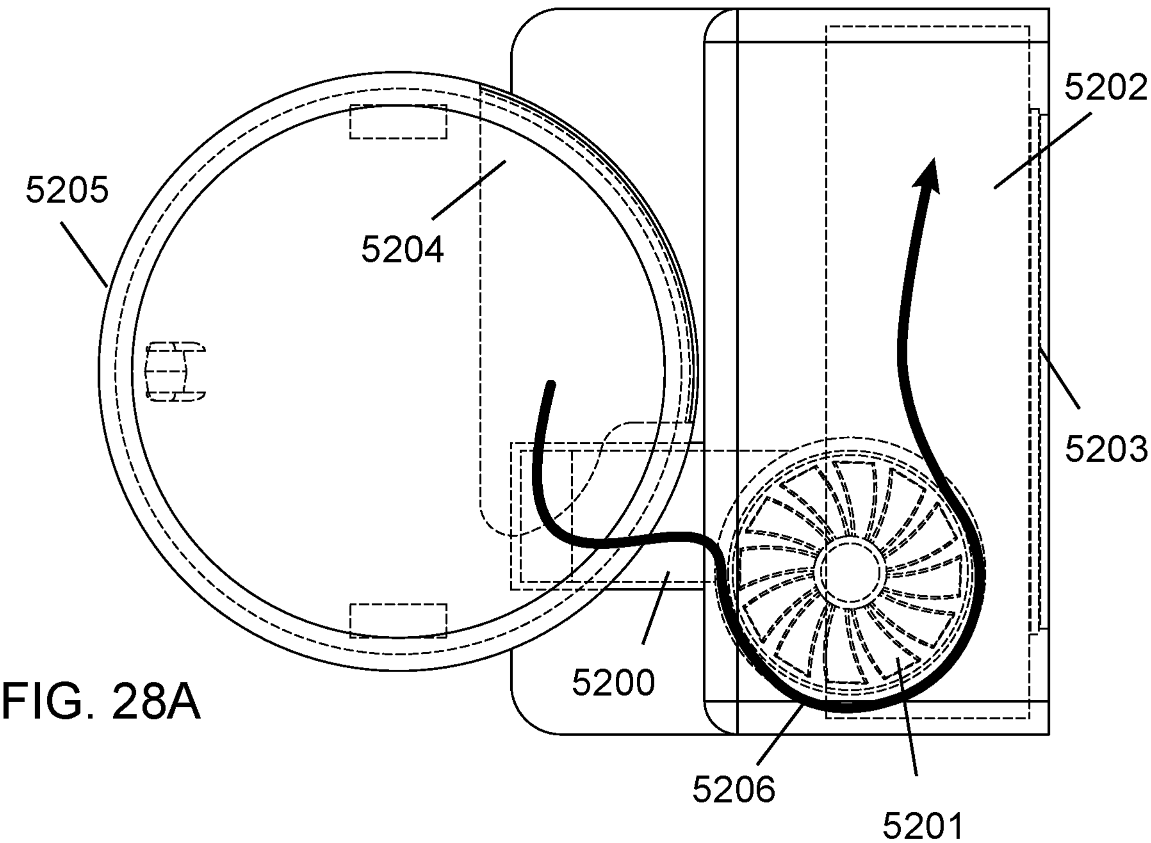
Figure 28B:
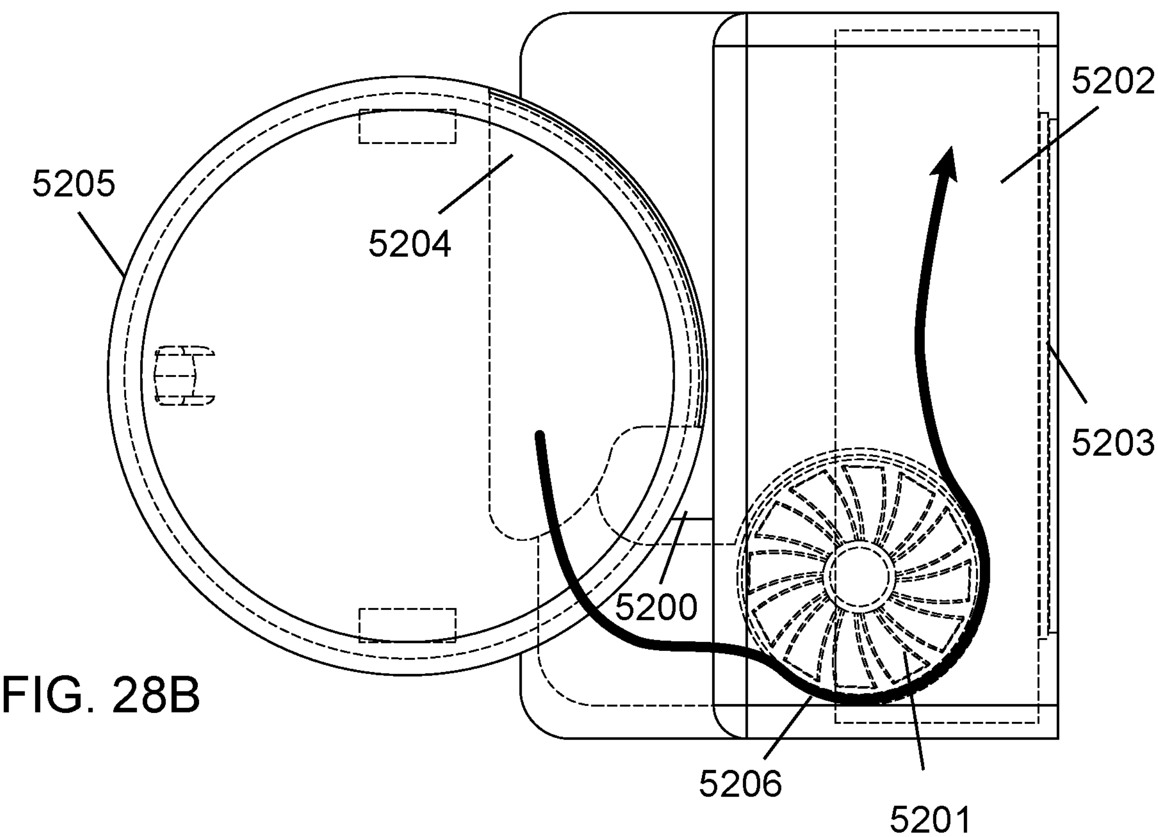
Figure 28C:
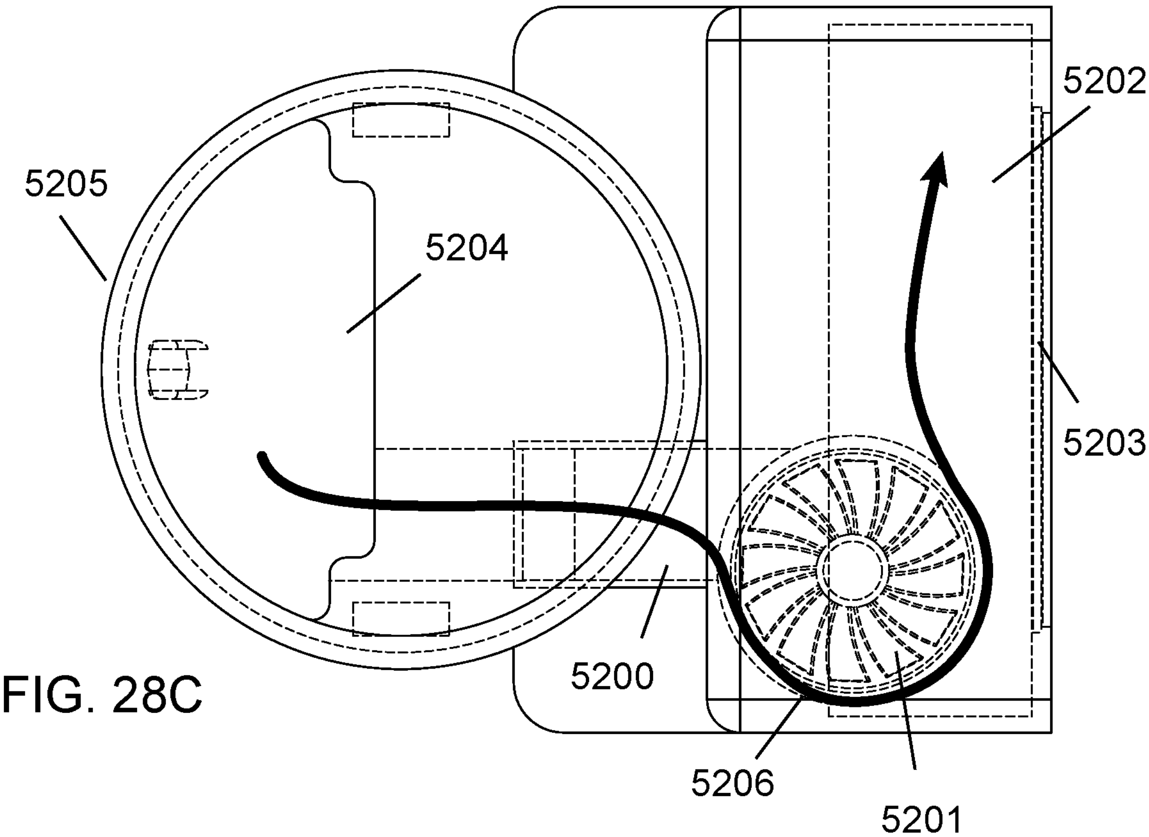
Figure 28D:
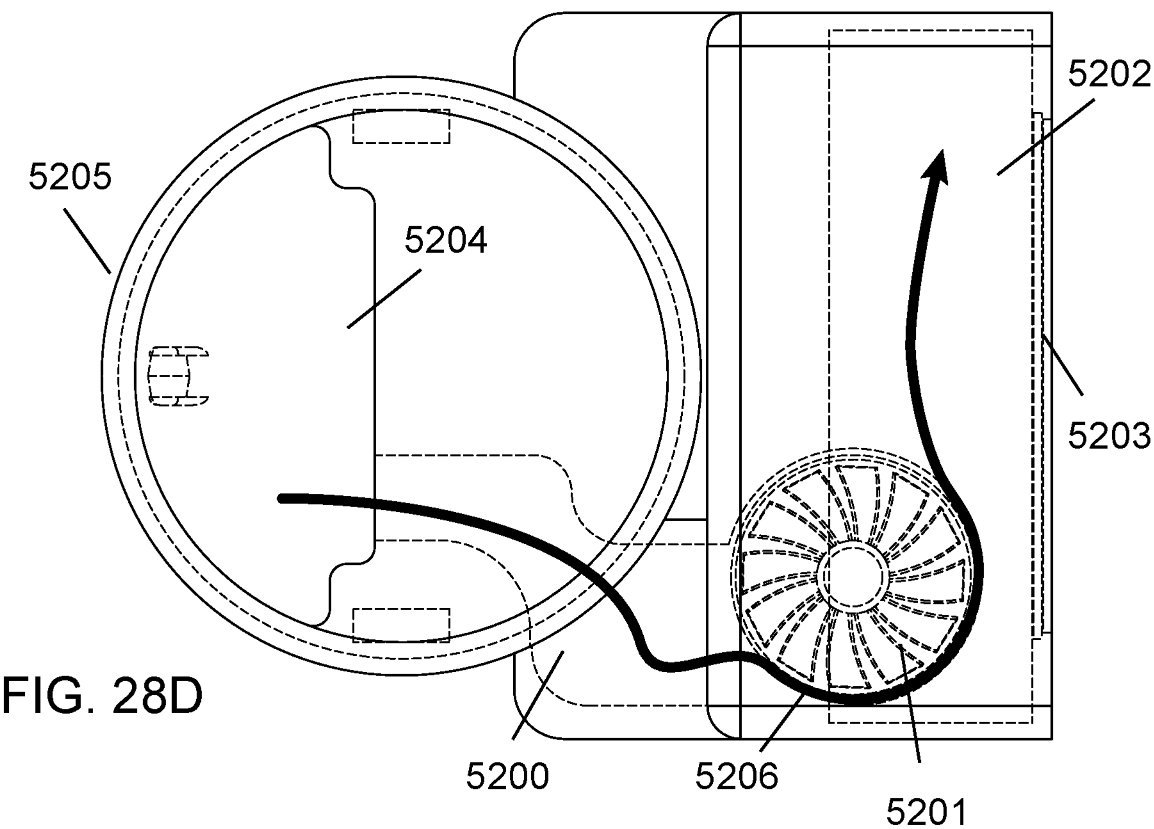
Figure 28E:
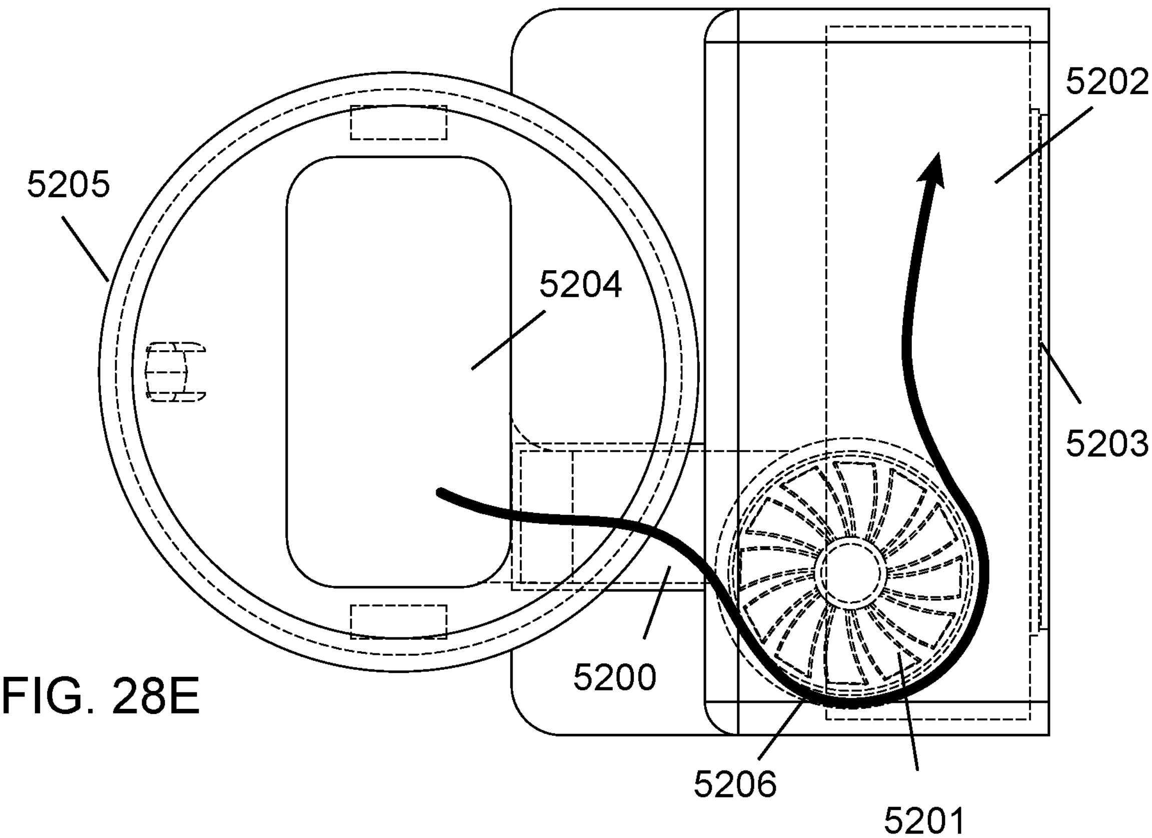
Figure 28F:
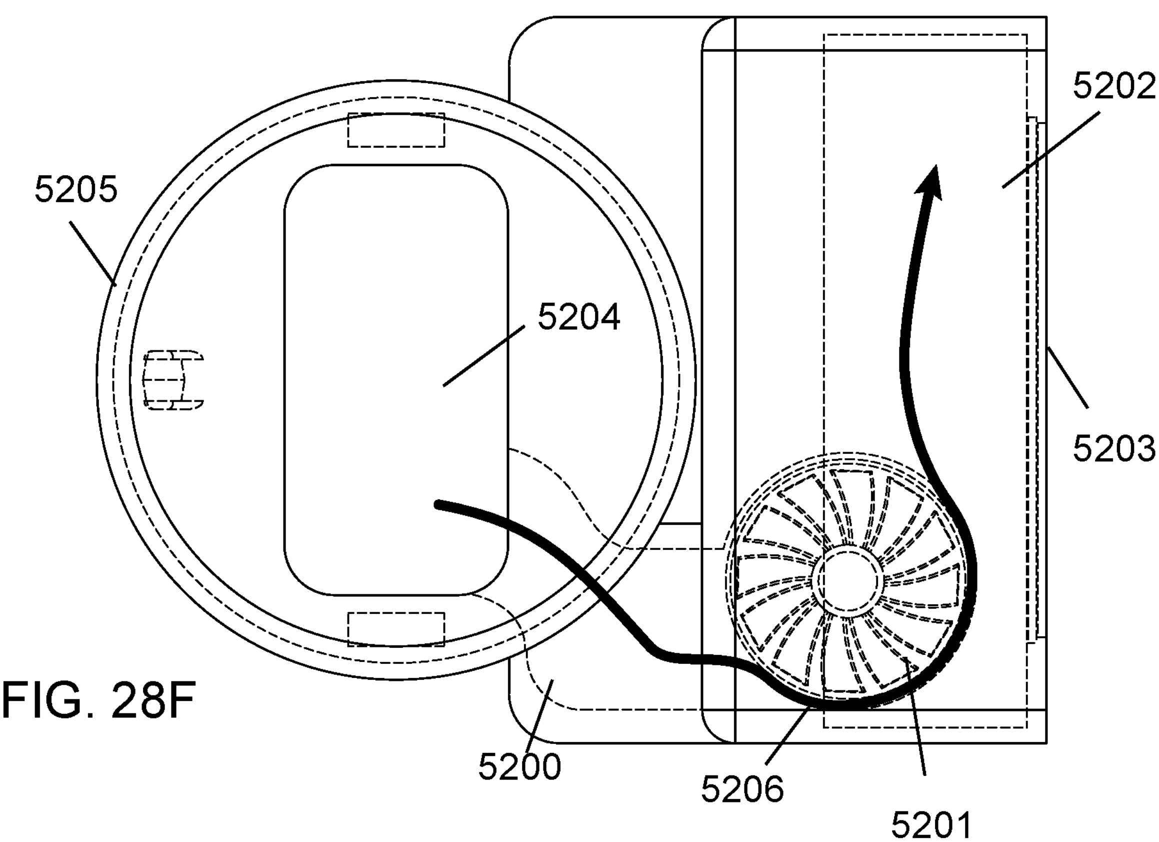
Figure 28G:
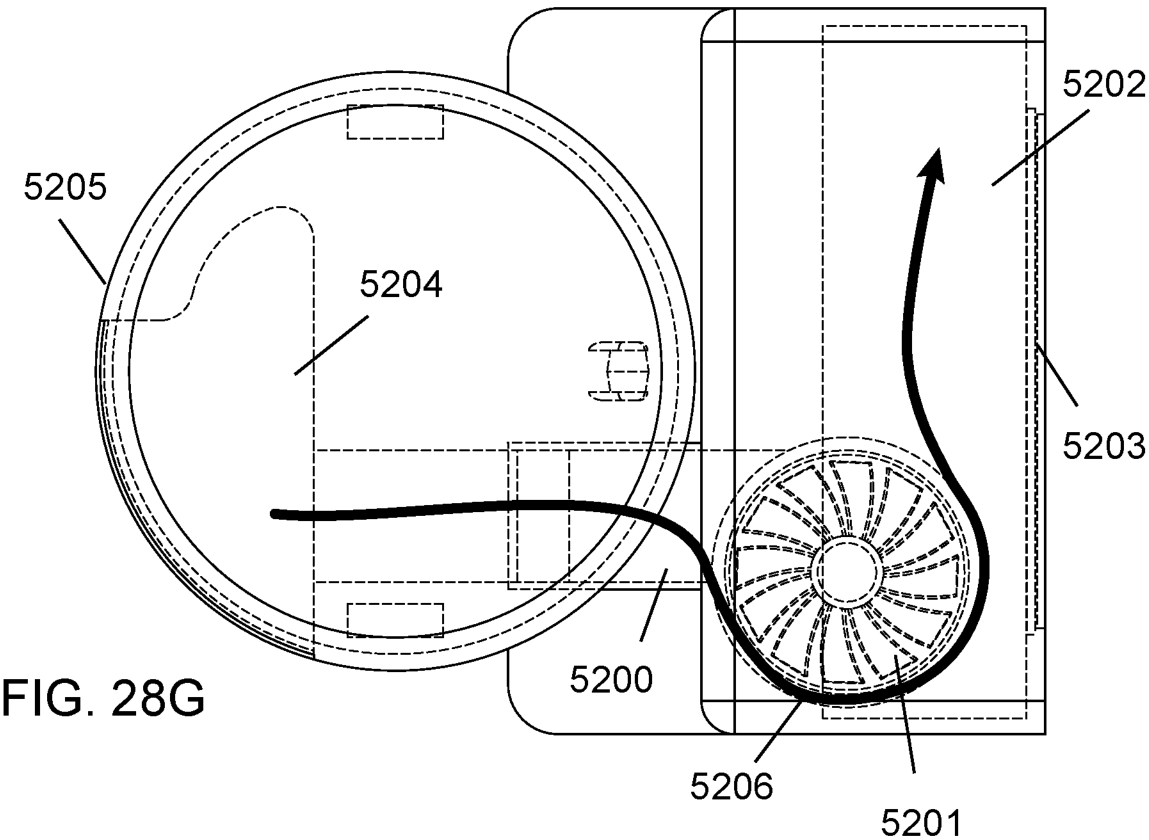
Figure 28H:
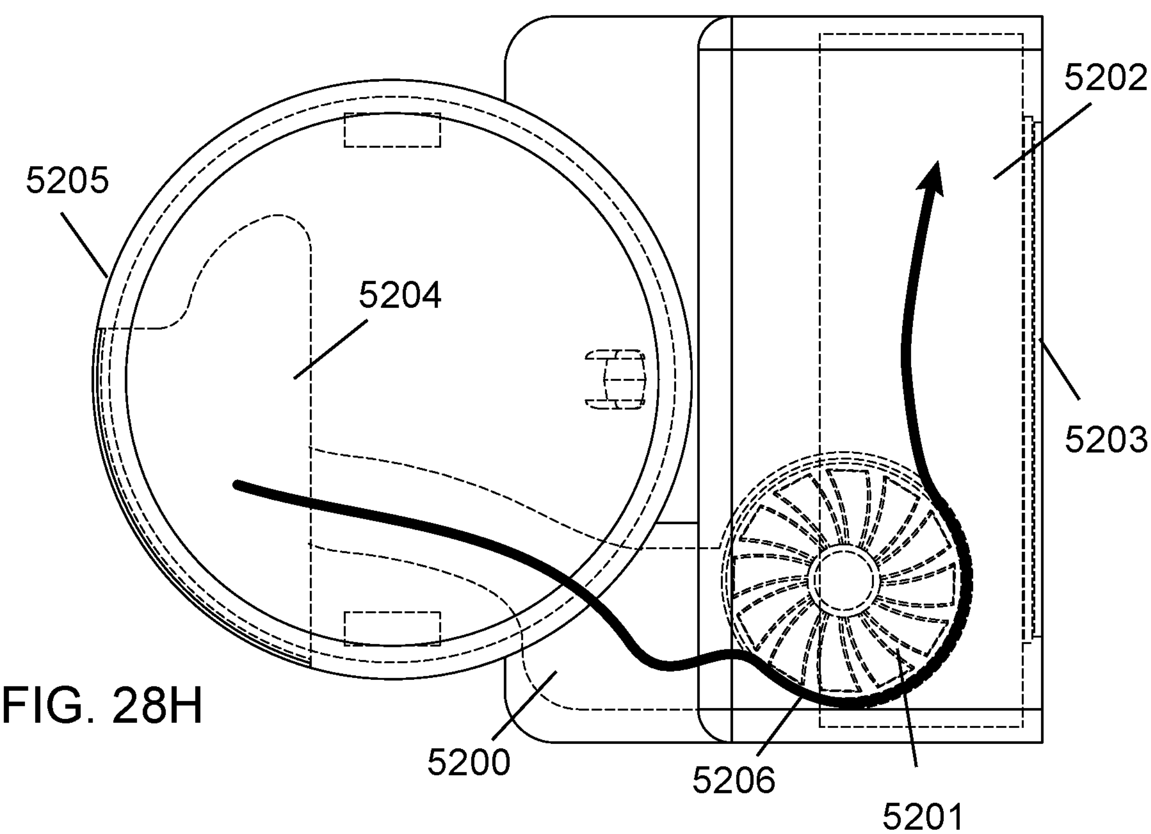
Figure 28I:
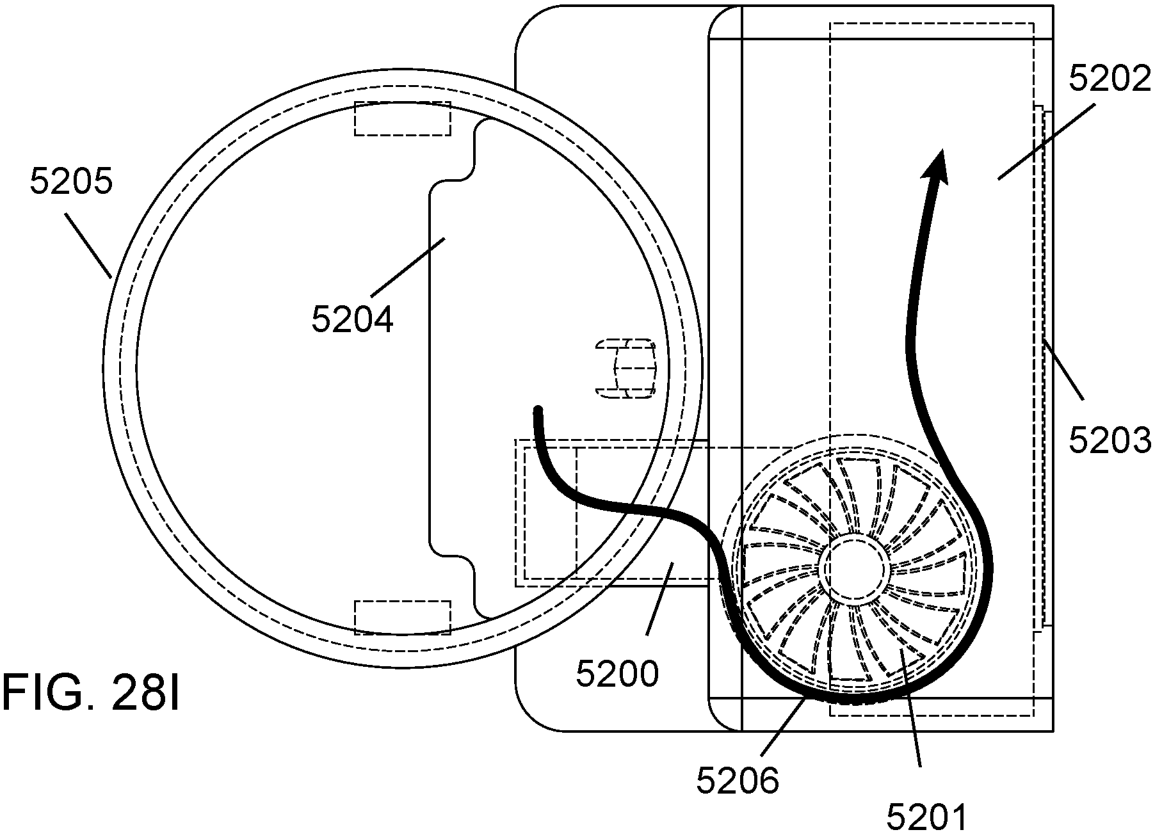
Figure 28J:
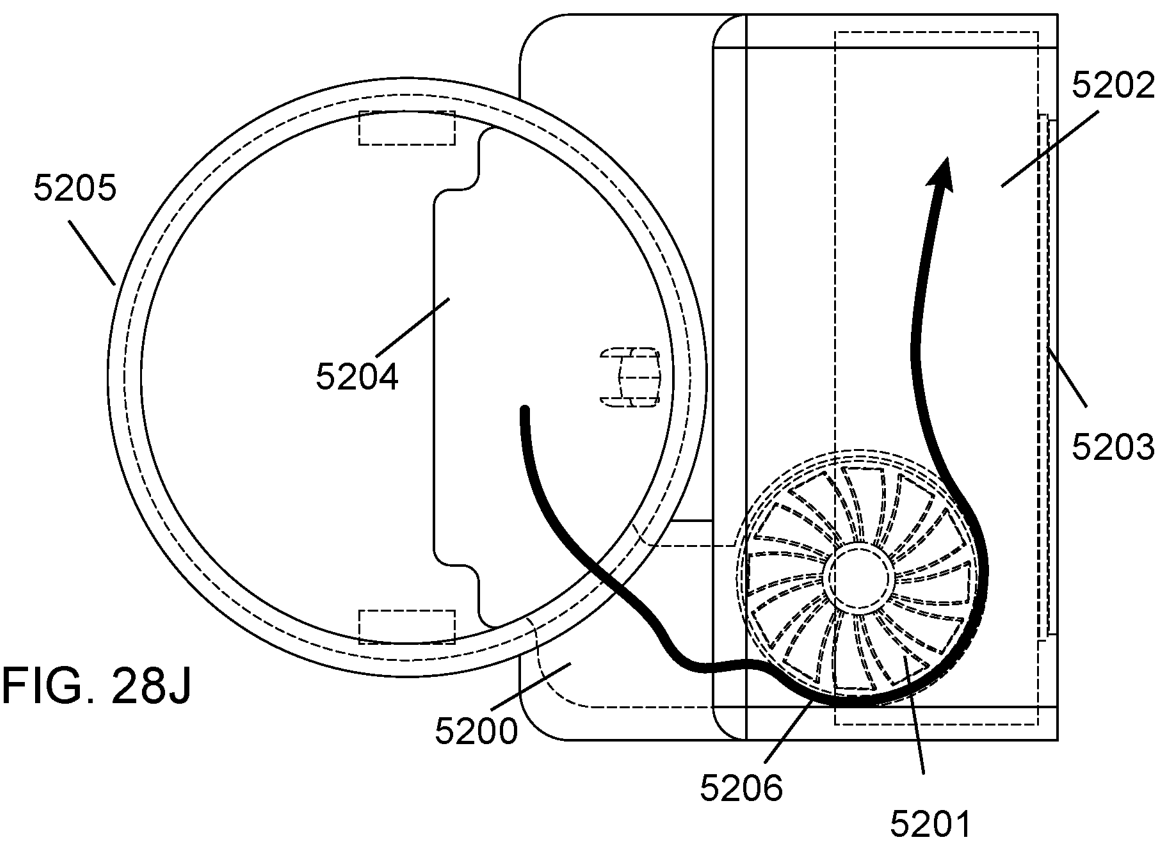
Figure 28K:
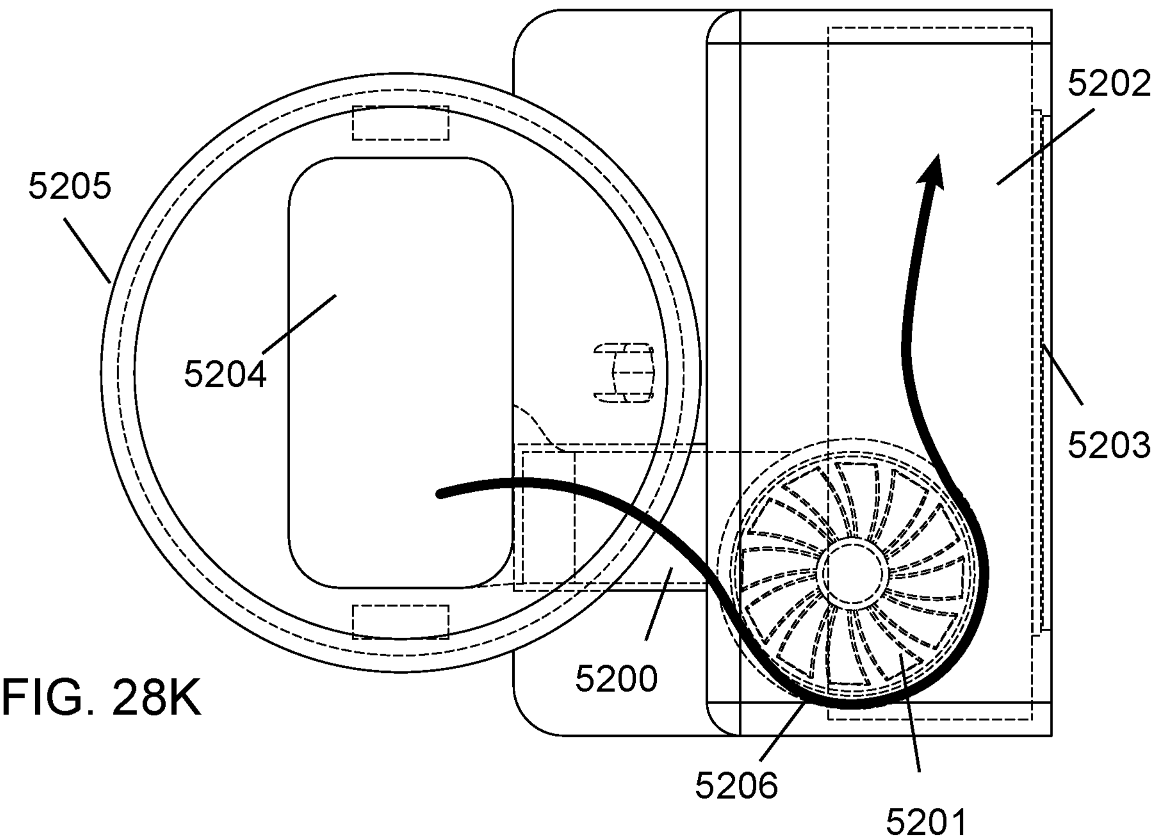
Figure 28L:
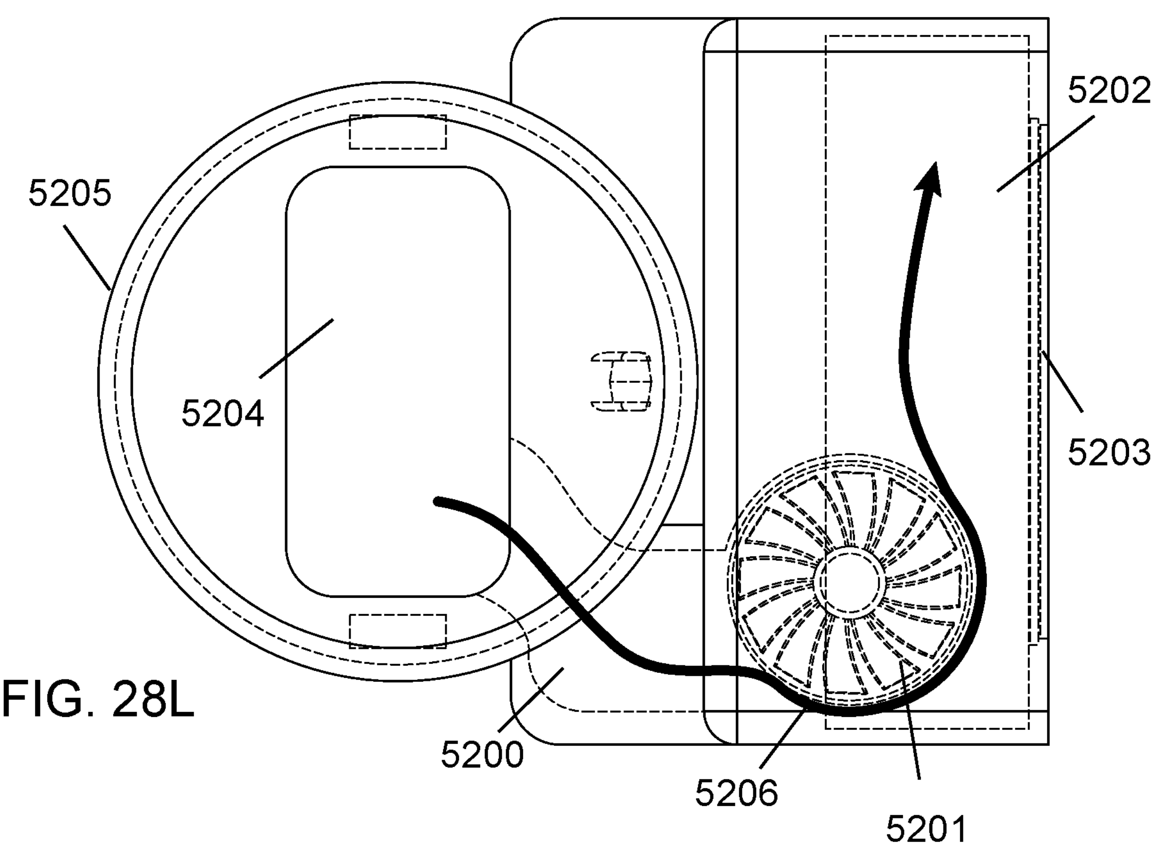

In some embodiments, different components of the robot may connect with the charging station (or another type of station in some cases). In some embodiments, a bin (e.g., dust bin) of the robot may connect with the charging station. In some embodiments, the contents of the bin may be emptied into the charging station. For example, FIG. 25A illustrates an example of a charging station including an interface 4900 (e.g., LCD touchscreen), a suction hose 4901, an access door 4902, and charging pads 4903. In some cases, sensors 4904 may be used to align a robot with the charging station. FIG. 25B illustrates internal components of the charging station including suction motor and impeller 4905 used to create suction needed to draw in the contents of a bin of a robot connected to charging station via the suction hose 4901. FIG. 25C illustrates a robot 4906 connected with the charging station via suction hose 4901. In some cases, the suction hose 4901 may extend from the charging station to connect with the robot 4906. Internal contents of the robot 4906 may be removed via suction hose 4901. Charging contacts of the robot 4906 are connected with charging pads 4903 for recharging batteries of the robot 4906. FIG. 25D illustrates arrows 4907 indicative of the flow path of the contents within the robot 4906, beginning from within the robot 4906, passing through the suction hose 4901, and into a container 4908 of the charging station. The suction motor and impeller 4905 are positioned on a bottom of the container 4908 and create a negative pressure, causing the contents of robot 4906 to be drawn into container 4908. The air drawn into the container 4908 may flow past the impeller and may be expelled through the rear of the charging station. Once container 4908 is full, it may be emptied by opening access door 4902. In other embodiments, the components of the charging station may be retrofitted to other charging station models. For instance, FIGS. 26A and 26B illustrate another variation of a charging station for smaller robots, including suction port 5000 through which contents stored within the robot may be removed, impeller and motor 5001 for generating suction, and exhaust 5002 for expelling air. FIGS. 27A and 27B illustrate yet another variation of a charging station for robots, including suction port 5100 through which contents stored within the robot may be removed, impeller and motor 5101 for generating suction, and exhaust 5102 for expelling air. FIG. 27C illustrates a bin 5103 of a robot 5104 connected with the charging station via suction port 5100. Arrows 5105 indicate the flow of air, eventually expelled through the exhaust 5102. Suction ports of charging stations may be configured differently based on the position of the bin within the robot. For example, FIGS. 28A-28L illustrate a top view of charging stations, each including a suction port 5200, an impeller and motor 5201, a container 5202, and an exhaust 5203. Each charging station is configured with a different suction port 5200, depending on the shape and position of a dustbin 5204 of a robot 5205 connected to the charging station via the suction port 5200. In each case, the flow path of air indicated by arrow 5206, also changes based on the position and shape of the dustbin 5204 of the robot and the suction port 5200 of the charging station.

In some embodiments, robots may require servicing. In some embodiments, robots may be serviced at a service station or at the charging station. In some cases, particularly when the fleet of robots is large, it may be more efficient for servicing to be provided at a station that is different from the charging station as servicing may require less time than charging. Examples of services include changing a tire or inflating the tire of a robot. In the case of a commercial cleaner, an example of a service may include emptying waste water from the commercial cleaner and adding new water into a fluid reservoir. For a robotic vacuum, an example of a service may include emptying the dustbin. For a disinfecting robot, an example of a service may include replenishment of supplies such as UV bulbs, scrubbing pad, or liquid disinfectant. In some embodiments, servicing received by the robots may be automated or may be manual. In some embodiments, robots may be serviced by stationary robots. In some embodiments, robots may be serviced by mobile robots. In some embodiments, a mobile robot may navigate to and service a robot while the robot is being charged at a charging station. In some embodiments, a history of services may be recorded in a database for future reference. For example, the history of services may be referenced to ensure that maintenance is provided at the required intervals. In some cases, maintenance is provided on an as-need basis. In some cases, the history of services may reducing redundant operations performed on the robots. For example, if a part of a robot was replaced due to failure of the part, the new due date of service is calculated from the date on which the part was replaced instead of the last service date of the part.

Figure 30:
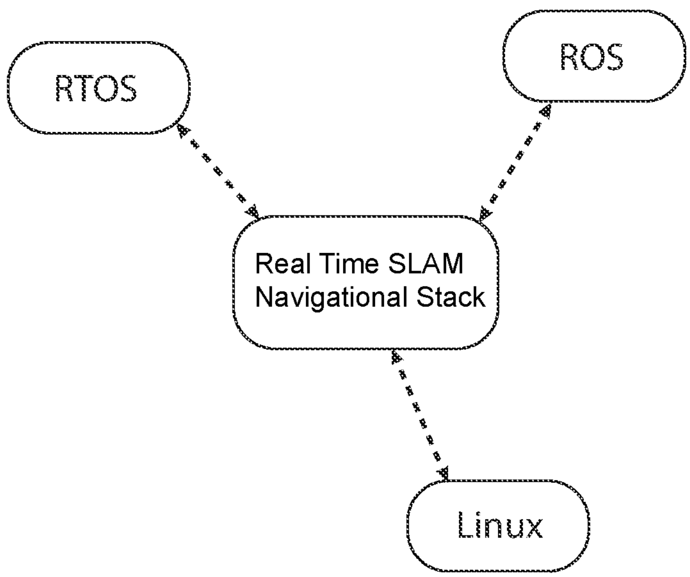
FIG. 30 illustrates examples of different types of systems that may be used with the Real Time Navigational Stack, according to some embodiments.

Some embodiments may provide a real time navigational stack configured to provide a variety of functions. In embodiments, the real time navigational stack may reduce computational burden, and consequently may free the hardware (HW) for functions such as object recognition, face recognition, voice recognition, and other AI applications. Additionally, the boot up time of a robot using the real time navigational stack may be faster than prior art methods. For instance, FIG. 29 illustrates the boot up time of a robotic vacuum using the real time navigational stack in comparison to popular brands of robotic vacuums using other technologies known in the art (e.g., ROS and Linux). In general, the real time navigational stack may allow more tasks and features to be packed into a single device while reducing battery consumption and environmental impact. The collection of the advantages of the real time navigational stack consequently improve performance and reduce costs, thereby paving the road forward for mass adoption of robots within homes, offices, small warehouses, and commercial spaces. In embodiments, the real time navigational stack may be used with various different types of systems, such as Real Time Operating System (RTOS), Robot Operating System (ROS), and Linux, as illustrated in FIG. 30.

Figure 31:
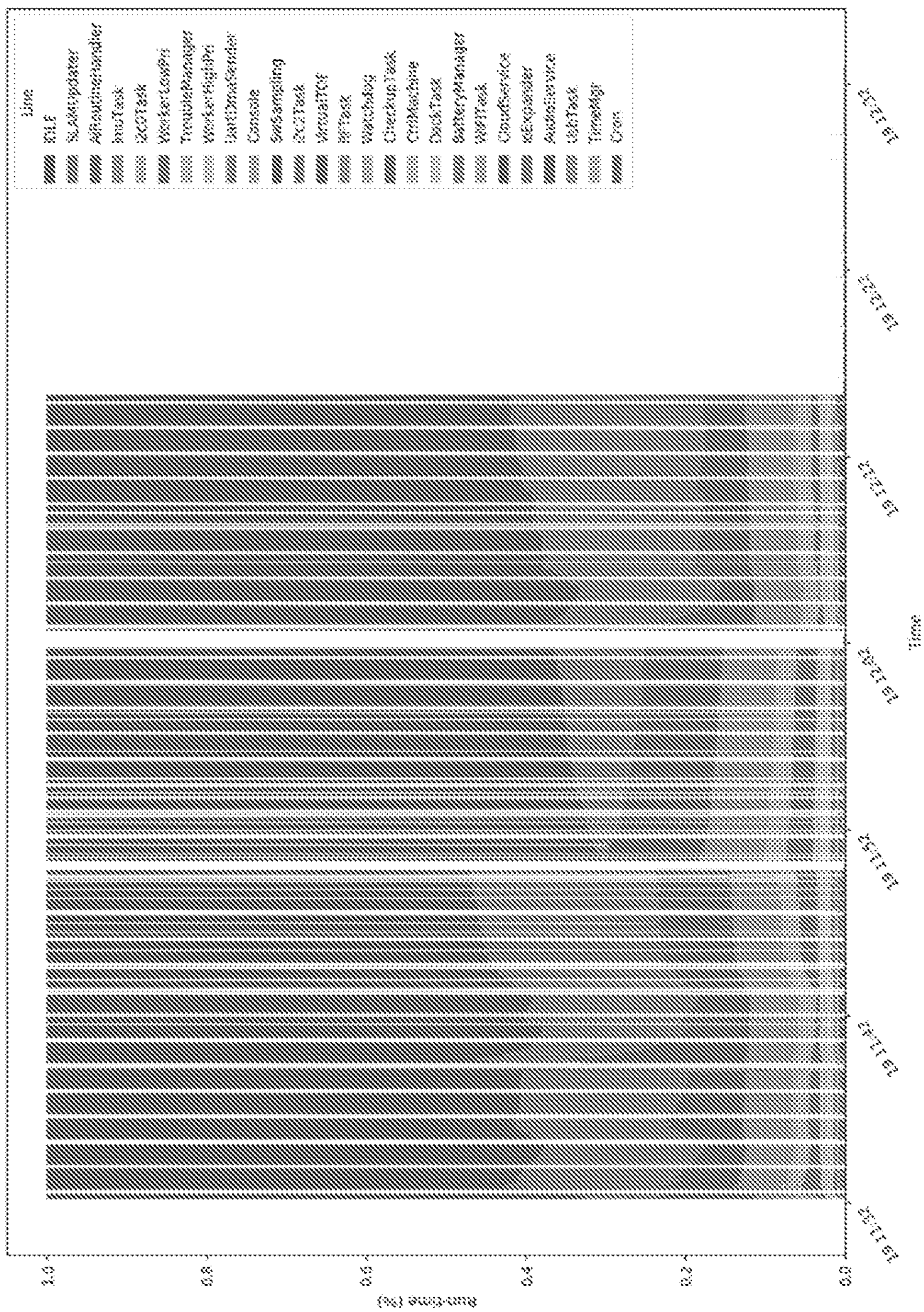
FIG. 31 illustrates an example of a visualization of multitasking in real time on an ARM Cortex M7 MCU.

Some embodiments may use a Microcontroller Unit (MCU) (e.g., SAM70S MC) including built in 300 MHz clock, 8 MB Random Access Memory (RAM), and 2 MB flash memory. In some embodiments, the internal flash memory may be split into two or more blocks. For example, a lower block may be used as default storage for program code and constant data. In some embodiments, the static RAM (SRAM) may be split into two or more blocks. FIG. 31 provides a visualization of multitasking in real time on an ARM Cortex M7 MCU, model SAM70 from Atmel. Each task is scheduled to run on the MCU. Information is received from sensors and is used in real time by AI algorithms. Decisions actuate the robot without buffer delays based on the real time information. Examples of sensors include, but are not limited to, inertial measurement unit (IMU), gyroscope, optical tracking sensor (OTS), depth camera, obstacle sensor, floor sensor, edge detection sensor, debris sensor, acoustic sensor, speech recognition, camera, image sensor, time of flight (TOF) sensor, TSOP sensor, laser sensor, light sensor, electric current sensor, optical encoder, accelerometer, compass, speedometer, proximity sensor, range finder, LIDAR, LADAR, radar sensor, ultrasonic sensor, piezoresistive strain gauge, capacitive force sensor, electric force sensor, piezoelectric force sensor, optical force sensor, capacitive touch-sensitive surface or other intensity sensors, global positioning system (GPS), etc. In embodiments, other types of MCUs or CPUs than that described in FIG. 31 may be used to achieve similar results. A person skilled in the art would understand the pros and cons of different available options and would be able to choose from available silicon chips to best take advantage of their manufactured capabilities for the intended application.

In embodiments, the core processing of the real time navigational stack occurs in real time. In some embodiments, a variation RTOS may be used (e.g., Free-RTOS). In some embodiments, a proprietary code may act as an interface to providing access to the HW of the CPU. In either case, AI algorithms such as SLAM and path planning, peripherals, actuators, and sensors communicate in real time and take maximum advantage of the HW capabilities that are available in advance computing silicon. In some embodiments, the real time navigation stack may take full advantage of thread mode and handler mode support provided by the silicon chip to achieve better stability of the system. In some embodiments, an interrupt may occur by a peripheral, and as a result, the interrupt may cause an exception vector to be fetched and the MCU (or in some cases CPU) may be converted to handler mode by taking the MCU to an entry point of the address space of the interrupt service routine (ISR). In some embodiments, a Microprocessor Unit (MPU) may control access to various regions of the address space depending on the operating mode.

In embodiments, the real time navigational system of the robot may be compatible with a 360 degrees LIDAR and a limited Field of View (FOV) depth camera. This is unlike robots in prior art that are only compatible with either the 360 degrees LIDAR or the limited FOV depth camera. In addition, navigation systems of robots described in prior art require calibration of the gyroscope and IMU and must be provided wheel parameters of the robot. In contrast, some embodiments of the real time navigational system described herein may autonomously learn calibration of the gyroscope and IMU and the wheel parameters.

In some cases, the real time navigational system may be compatible with systems that do not operate in real time for the purposes of testing, proof of concepts, or for use in alternative applications. In some embodiments, a mechanism may be used to create a modular architecture that keeps the stack intact and only requires modification of the interface code when the navigation stack needs to be ported. In some embodiments, an Application Programming Interface (API) may be used to interface between the navigational stack and customers to provide indirect secure access to modify some parameters in the stack.

Figure 32:
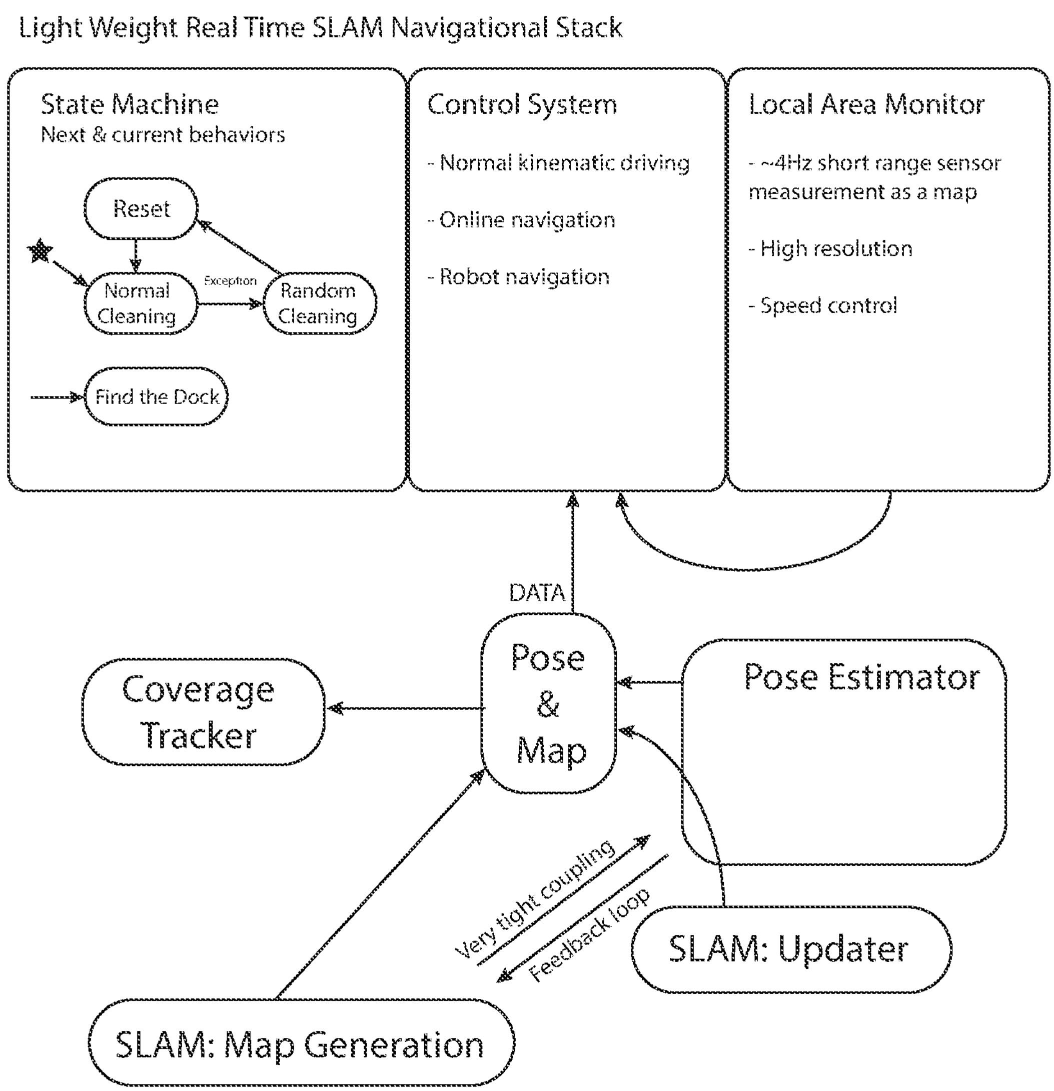
FIG. 32 illustrates an example of a visualization of a Light Weight Real Time SLAM Navigational Stack algorithm, according to some embodiments.

In some embodiments, the processor of the robot may use Light Weight Real Time SLAM Navigational stack to map the environment and localize the robot. In some embodiments, Light Weight Real Time SLAM Navigational Stack may include a state machine portion, a control system portion, a local area monitor portion, and a pose and maps portion. FIG. 32 provides a visualization of an example of a Light Weight Real Time SLAM Navigational Stack algorithm. The state machine 1100 may determine current and next behaviors. At a high level, the state machine 1100 may include the behaviors reset, normal cleaning, random cleaning, and find the dock. The control system 1101 may determine normal kinematic driving, online navigation (i.e., real time navigation), and robust navigation (i.e., navigation in high obstacle density areas). The local area monitor 1102 may generate a high resolution map based on short range sensor measurements and control speed of the robot. The control system 301 may receive information from the local area monitor 1102 that may be used in navigation decisions. The pose and maps portion 1103 may include a coverage tracker 1104, a pose estimator 1105, SLAM 1106, and a SLAM updater 1107. The pose estimator 1105 may include an Extended Kalman Filter (EKF) that uses odometry, IMU, and LIDAR data. SLAM 1106 may build a map based on scan matching. The pose estimator 1105 and SLAM 1106 may pass information to one another in a feedback loop. The SLAM updated 1107 may estimate the pose of the robot. The coverage tracker 1104 may track internal coverage and exported coverage. The coverage tracker 1104 may receive information from the pose estimator 1105, SLAM 1106, and SLAM updated 1107 that it may use in tracking coverage. In one embodiment, the coverage tracker 1104 may run at 2.4 Hz. In other indoor embodiments, the coverage tracker may run at between 1-50 Hz. For outdoor robots, the frequency may increase depending on the speed of the robot and the speed of data collection. A person in the art would be able to calculate the frequency of data collection, data usage, and data transmission to control system. The control system 1101 may receive information from the pose and maps portion 1103 that may be used for navigation decisions.

Figure 33:
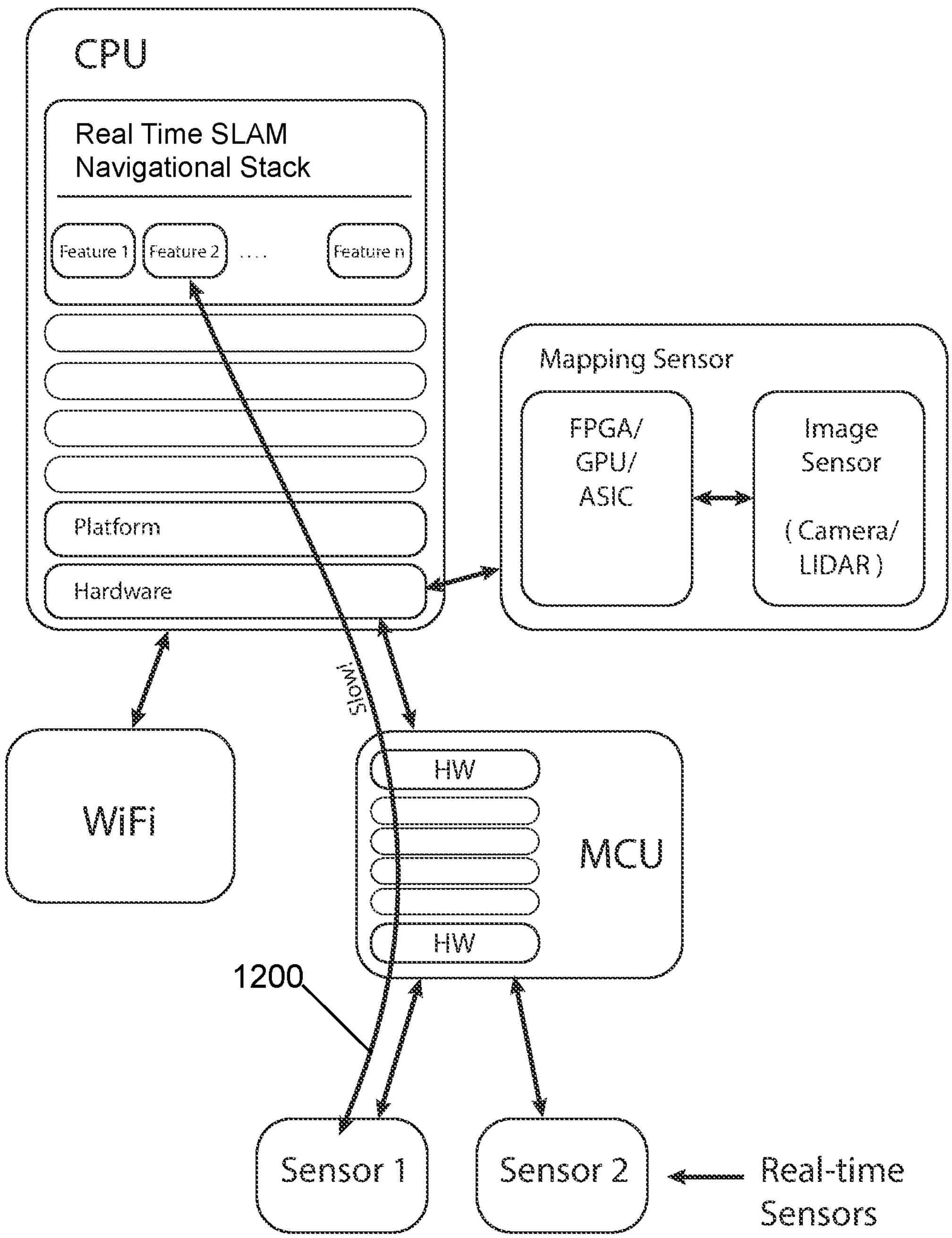
FIG. 33 illustrates an example of a mapping sensor, according to some embodiments.

In some embodiments, a mapping sensor (e.g., a sensor whose data is used in generating or updating a map) runs on a Field Programmable Gate Array (FPGA) and the sensor readings are accumulated in a data structure such as vector, array, list, etc. The data structure may be chosen based on how that data may need to be manipulated. For example, in one embodiment a point cloud may use a vector data structure. This allows simplification of data writing and reading. FIG. 33 illustrates a mapping sensor 1200 including an image sensor (e.g., camera, LIDAR, etc.) that runs on a FPGA or Graphics Processing Unit (GPU) or an Application Specific Integrated Circuit (ASIC). Data is passed between the mapping sensor and the CPU. FIG. 33 also illustrates the flow of data in Linux based SLAM, indicated by path 1200. In traditional SLAM 1200, data flows between real time sensors 1 and 2 and the MCU and then between the MCU and CPU which may be slower due to several levels of abstraction in each step (MCU, OS, CPU). These levels of abstractions are noticeably reduced in Light Weight Real Time SLAM Navigational Stack, wherein data flows between real time sensors 1 and 2 and the MCU. While, Light Weight Real Time SLAM Navigational Stack may be more efficient, both types of SLAM may be used with the methods and techniques described herein.

Figure 35:
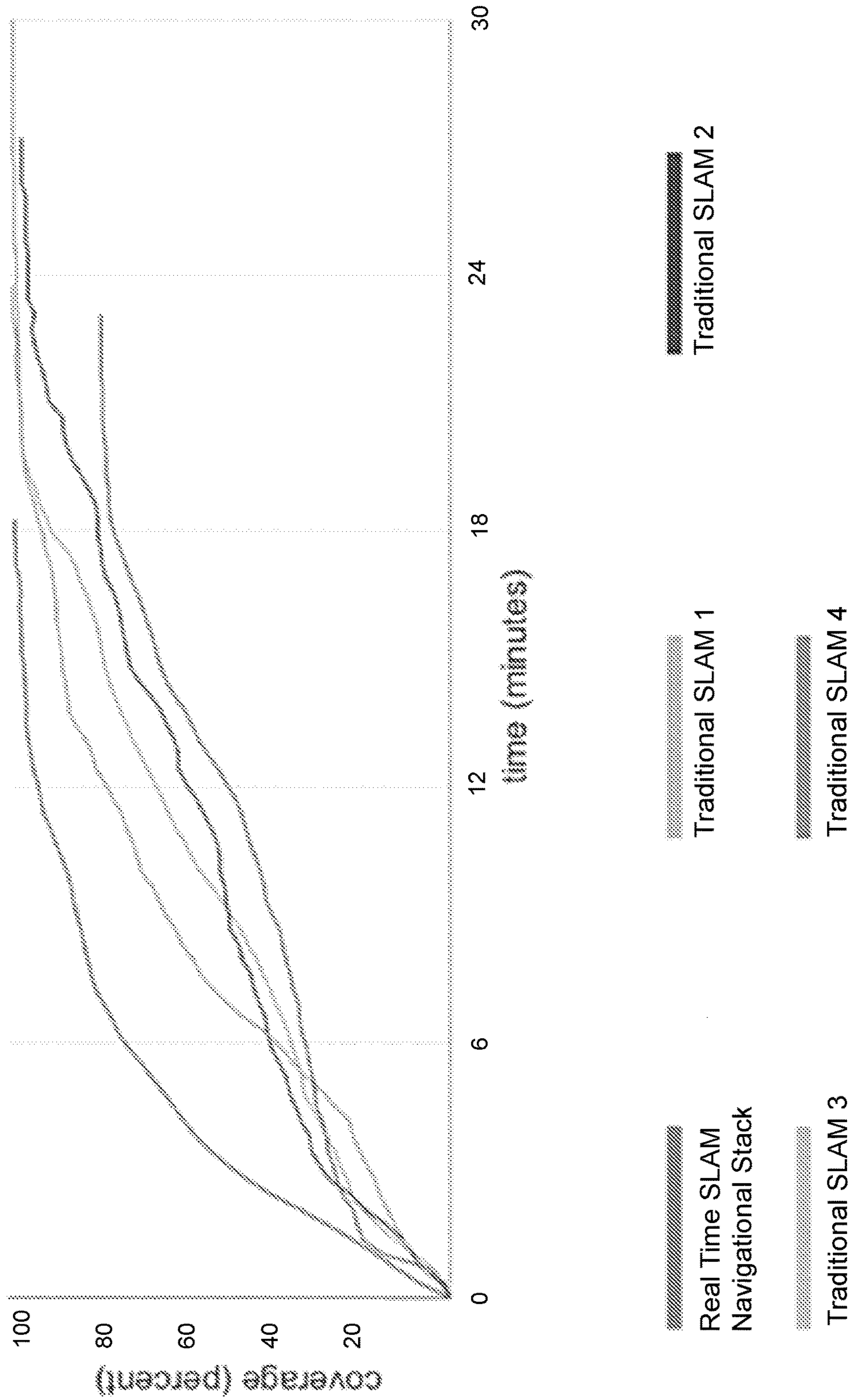
FIG. 35 illustrates an example of room coverage percentage over time.

In some embodiments, it may desirable for the processor of the robot (particularly a service robot) to map the environment as soon as possible without having to visit various parts of the environment redundantly. For instance, a map complete with a minimum percentage of coverage to entire coverable area may provide better performance. FIG. 34 illustrates a table comparing time to map an entire area and percentage of coverage to entire coverable area for a robot using Light Weight Real Time SLAM Navigational Stack and a robot using traditional SLAM for a complex and large space. The time to map the entire area and the percentage of area covered were much less with Light Weight Real Time SLAM Navigational Stack, requiring only minutes and a fraction of the space to be covered to generate a complete map. Traditional SLAM techniques require over an hour and some VSLAM solutions require the complete coverage of areas to generate a complete map. In addition, with traditional SLAM, robots may be required to perform perimeter tracing (or partial perimeter tracing) to discover or confirm an area within which the robot is to perform work in. Such SLAM solutions may be unideal for, for example, service oriented tasks, such as popular brands of robotic vacuums. It is more beneficial and elegant when the robot begins to work immediately without having to do perimeter tracing first. In some applications, the processor of the robot may not get a chance to build a complete map of an area before the robot is expected to perform a task. However, in such situations, it is useful to map as much of the area as possible in relation to the amount of the area covered by the robot as a more complete map may result in better decision making. In coverage applications, the robot may be expected to complete coverage of an entire area as soon as possible. For example, for a standard room setup based on International Electrotechnical Commission (IEC) standards, it is more desirable that a robot completes coverage of more than 70% of the room in under 6 minutes as compared to only 40% in under 6 minutes. FIG. 35 illustrates room coverage percentage over time for a robot using Light Weight Real Time SLAM Navigational Stack and four robots using traditional SLAM methods. As can be seen, the robot using Light Weight Real Time SLAM Navigational Stack completes coverage of the room much faster than robots using traditional SLAM methods.

In some embodiments, the positioning of components of the robot may change. For example, in one embodiment the distance between an IMU and a camera may be different than in a second embodiment. In another example, the distance between wheels may be different in two different robots manufactured by the same manufacturer or different manufacturers. The wheel diameter, the geometry between the side wheels and the front wheel, and the geometry between sensors and actuators, are other examples of distances and geometries that may vary in different embodiments. In some embodiments, the distances and geometries between components of the robot may be stored in one or more transformation matrices. In some embodiments, the values (i.e., distances and geometries between components of the robot) of the transformation matrices may be updated directly within the program code or through an API such that the licensees of the software may implement adjustments directly as per their specific needs and designs. Since different types of robots may use the Light Weight Real Time SLAM Navigational Stack describes herein, the diameter, shape, positioning, or geometry of various components of the robots may be different and may therefore require updated distances and geometries between components.

In some embodiments, the processor of the robot may generate and update a map (which may also be referred to as a spatial representation, a planar work surface, or another equivalent) of an environment. Some embodiments provide a computationally inexpensive mapping solution (or portion thereof) with minimal (or reduced) cost of implementation relative to traditional techniques. In some embodiments, mapping an environment may constitute mapping an entire environment, such that all areas of the environment are captured in the map. In other embodiments, mapping an environment may constitute mapping a portion of the environment where only some areas of the environment are captured in the map. For example, a portion of a wall within an environment captured in a single field of view of a camera and used in forming a map of a portion of the environment may constitute mapping the environment. Embodiments afford a method and apparatus for combining perceived depths to construct a map of an environment using cameras capable of perceiving depths (or capable of acquiring data by which perceived depths are inferred) to objects within the environment, such as but not limited to (which is not to suggest that any other list herein is limiting), depth cameras or stereo vision cameras or depth sensors comprising, for example, an image sensor and IR illuminator. A charge-coupled device (CCD) or complementary metal oxide semiconductor (CMOS) camera positioned at an angle relative to a horizontal plane combined with at least one IR point or line generator or any other structured form of light may also be used to perceive depths to obstacles within the environment. Objects may include, but are not limited to, articles, items, walls, boundary setting objects or lines, furniture, obstacles, etc. that are included in the map. A boundary of a working environment may be considered to be within the working environment. In some embodiments, a camera is moved within an environment while depths from the camera to objects are continuously (or periodically or intermittently) perceived within consecutively overlapping fields of view. Overlapping depths from separate fields of view may be combined to construct a map of the environment.

In some embodiments, a camera and at least one control system installed on the robot perceives depths from the camera to objects within a first field of view, e.g., such that a depth is perceived at each specified increment. Depending on the type of depth perceiving device used, depth may be perceived in various forms. The depth perceiving device may be a depth sensor, a camera, a camera coupled with IR illuminator, a stereovision camera, a depth camera, a time-of-flight camera or any other device which can infer depths from captured depth images. A depth image may be any image containing data which can be related to the distance from the depth perceiving device to objects captured in the image. For example, in one embodiment the depth perceiving device may capture depth images containing depth vectors to objects, from which the Euclidean norm of each vector may be calculated, representing the depth from the camera to objects within the field of view of the camera. In some instances, depth vectors may originate at the depth perceiving device and may be measured in a two-dimensional plane coinciding with the line of sight of the depth perceiving device. In other instances, a field of three-dimensional vectors originating at the depth perceiving device and arrayed over objects in the environment may be measured. In another embodiment, the depth perceiving device may infer depth of an object based on the time required for a light (e.g., broadcast by a depth-sensing time-of-flight camera) to reflect off of the object and return. In a further example, the depth perceiving device may comprise a laser light emitter and two image sensors positioned such that their fields of view overlap. Depth may be inferred by the displacement of the laser light projected from the image captured by the first image sensor to the image captured by the second image sensor (see, U.S. patent application Ser. No. 15/243,783, which is hereby incorporated by reference). The position of the laser light in each image may be determined by identifying pixels with high brightness (e.g., having greater than a threshold delta in intensity relative to a measure of central tendency of brightness of pixels within a threshold distance). The control system may include, but is not limited to, a system or device(s) that perform, for example, methods for receiving and storing data; methods for processing data, including depth data; methods for processing command responses to stored or processed data, to the observed environment, to internal observation, or to user input; methods for constructing a map or the boundary of an environment; and methods for navigation and other operation modes. For example, a processor of the control system may receive data from an obstacle sensor, and based on the data received, the processor may respond by commanding the robot to move in a specific direction. As a further example, the processor may receive image data of the observed environment, process the data, and use it to create a map of the environment. The processor of the control system may be a part of the robot, the camera, a navigation system, a mapping module or any other device or module. The processor may also include a separate component coupled to the robot, the navigation system, the mapping module, the camera, or other devices working in conjunction with the robot. More than one processor may be used.

The robot and attached camera may rotate to observe a second field of view partly overlapping the first field of view. In some embodiments, the robot and camera may move as a single unit, wherein the camera is fixed to the robot, the robot having three degrees of freedom (e.g., translating horizontally in two dimensions relative to a floor and rotating about an axis normal to the floor), or as separate units in other embodiments, with the camera and robot having a specified degree of freedom relative to the other, both horizontally and vertically. For example, but not as a limitation (which is not to imply that other descriptions are limiting), the specified degree of freedom of a camera with a 90 degrees field of view with respect to the robot may be within 0-180 degrees vertically and within 0-360 degrees horizontally. Depths may be perceived to objects within a second field of view (e.g., differing from the first field of view due to a difference in camera pose). The depths for the second field of view may be compared to those of the first field of view. An area of overlap may be identified when a number of consecutive depths from the first and second fields of view are similar, as determined with techniques like those described below. The area of overlap between two consecutive fields of view may correlate with the angular movement of the camera (relative to a static frame of reference of a room) from one field of view to the next field of view. By ensuring the frame rate of the camera is fast enough to capture more than one frame of measurements in the time it takes the robot to rotate the width of the frame, there is always overlap between the measurements taken within two consecutive fields of view. The amount of overlap between frames may vary depending on the angular (and in some cases, linear) displacement of the robot, where a larger area of overlap is expected to provide data by which some of the present techniques generate a more accurate segment of the map relative to operations on data with less overlap. In some embodiments, a processor of the robot may infer the angular disposition of the robot from the size of the area of overlap and use the angular disposition to adjust odometer information to overcome the inherent noise of the odometer.

Figure 36A:
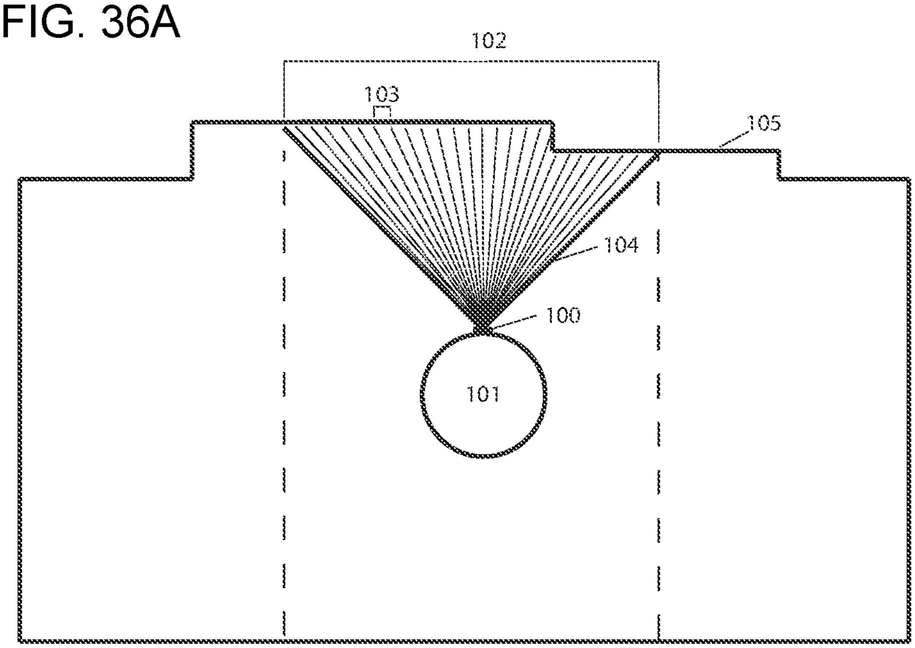
FIG. 36A illustrates depths perceived within a first field of view.
Figure 36B:
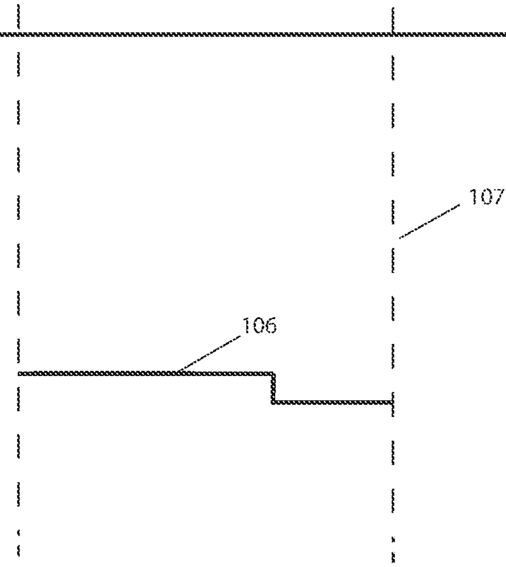
FIG. 36B illustrates a segment of a 2D floor plan constructed from depths perceived within a first field of view.

FIG. 36A illustrates an embodiment wherein camera 100, which may include a depth camera or a digital camera combined with an IR illuminator or a camera using natural light for illumination, mounted on robot 101 with at least one control system, is perceiving depths 102 at increments 103 within first field of view 104 to object 105, which in this case is a wall. Depths perceived may be in 2D or in 3D. FIG. 36B illustrates 2D map segment 106 resulting from plotted depth measurements 102 taken within first field of view 104. Dashed lines 107 demonstrate that resulting 2D floor plan segment 104 corresponds to plotted depths 102 taken within field of view 104.

Figure 37A:
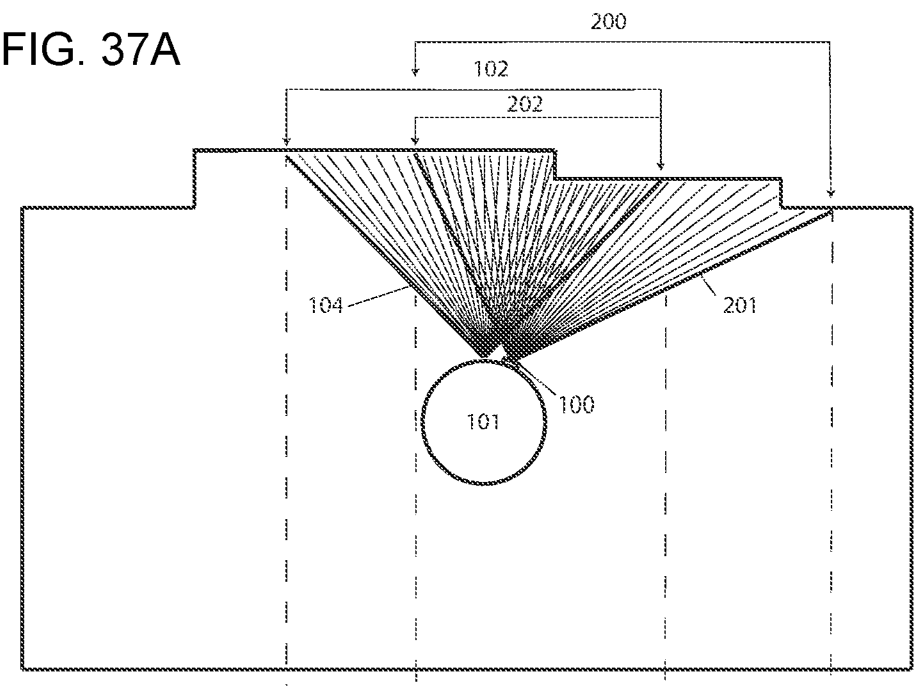
FIG. 37A illustrates depths perceived within a second field of view that partly overlaps a first field of view.

FIG. 37A illustrates camera 100 mounted on robot 101 perceiving depths 200 within second field of view 201 partly overlapping depths 102 within first field of view 104. After depths 102 within first field of view 104 are taken, as shown in FIG. 36A, robot 101 with mounted camera 100 rotates to observe second field of view 201 with overlapping depths 202 between first field of view 104 and second field of view 201. In another embodiment, camera 100 rotates independently of robot 101. As the robot rotates to observe the second field of view the values of depths 102 within first field of view 104 are adjusted to account for the angular movement of camera 100.

Figure 37B:
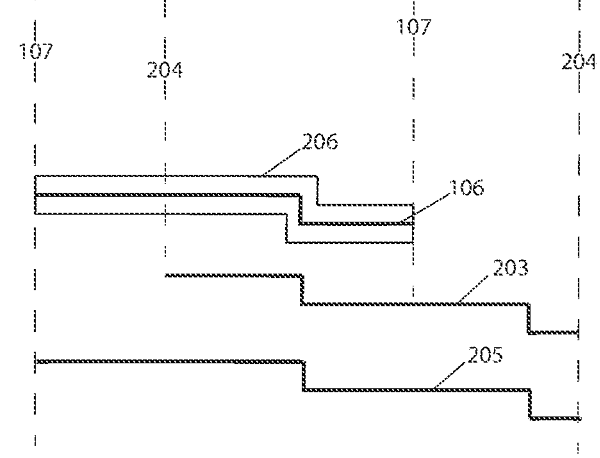
FIG. 37B illustrates how a segment of a 2D floor plan is constructed from depths perceived within two overlapping fields of view.

FIG. 37B illustrates 2D floor map segments 106 and 203 approximated from plotted depths 102 and 200, respectively. Segments 106 and 200 are bounded by dashed lines 107 and 204, respectively. 2D floor map segment 205 constructed from 2D floor map segments 106 and 203 and bounded by the outermost dashed lines of 107 and 204 is also illustrated. Depths 200 taken within second field of view 201 are compared to depths 102 taken within first field of view 104 to identify the area of overlap bounded by the innermost dashed lines of 204 and 107. An area of overlap is identified when a number of consecutive depths from first field of view 104 and second field of view 201 are similar. In one embodiment, the area of overlap, once identified, may be extended to include a number of depths immediately before and after the identified overlapping area. 2D floor plan segment 106 approximated from plotted depths 102 taken within first field of view 104 and 2D floor plan segment 203 approximated from plotted depths 200 taken within second field of view 201 are combined at the area of overlap to construct 2D floor plan segment 205. In some embodiments, matching patterns in the value of the depths recognized in depths 102 and 200 are used in identifying the area of overlap between the two. For example, the sudden decrease in the value of the depth observed in depths 102 and 200 can be used to estimate the overlap of the two sets of depths perceived. The method of using camera 100 to perceive depths within consecutively overlapping fields of view and the processor to combine them at identified areas of overlap is repeated until all areas of the environment are discovered and a map is constructed. In some embodiments, the constructed map is stored in memory for future use. In other embodiments, a map of the environment is constructed at each use. In some embodiments, once the map is constructed, the processor determines a path for the robot to follow, such as by using the entire constructed map, waypoints, or endpoints, etc.

In some embodiments, it is not necessary that the value of overlapping depths from the first and second fields of view be the exact same for the area of overlap to be identified. It is expected that measurements will be affected by noise, resolution of the equipment taking the measurement, and other inaccuracies inherent to measurement devices. Similarities in the value of depths from the first and second fields of view may be identified when the values of the depths are within a tolerance range of one another. The area of overlap may also be identified by recognizing matching patterns among the depths from the first and second fields of view, such as a pattern of increasing and decreasing values. Once an area of overlap is identified, in some embodiments, it may be used as the attachment point and the two fields of view may be attached to form a larger field of view. Since the overlapping depths from the first and second fields of view within the area of overlap do not necessarily have the exact same values and a range of tolerance between their values is allowed, the overlapping depths from the first and second fields of view may be used to calculate new depths for the overlapping area using a moving average or another suitable mathematical convolution. This is expected to improve the accuracy of the depths as they are calculated from the combination of two separate sets of measurements. The newly calculated depths may be used as the depths for the overlapping area, substituting for the depths from the first and second fields of view within the area of overlap. The new depths may then be used as ground truth values to adjust all other perceived depths outside the overlapping area. Once all depths are adjusted, a first segment of the map is complete. This method may be repeated such that the camera perceives depths (or pixel intensities indicative of depth) within consecutively overlapping fields of view as it moves, and the processor identifies the area of overlap and combines overlapping depths to construct a map of the environment.

In some embodiments, the amount of rotation between two consecutively observed fields of view may vary. In some cases, the amount of overlap between the two consecutive fields of view may depend on the angular displacement of the robot as it moves from taking measurements within one field of view to taking measurements within the next field of view, or a robot may have two or more cameras at different positions (and thus poses) on the robot to capture two fields of view, or a single camera may be moved on a static robot to capture two fields of view from different poses. In some embodiments, the mounted camera may rotate (or otherwise scans, e.g., horizontally and vertically) independently of the robot. In such cases, the rotation of the mounted camera in relation to the robot is measured. In another embodiment, the values of depths perceived within the first field of view may be adjusted based on the predetermined or measured angular (and in some cases, linear) movement of the depth perceiving device.

In some embodiments, the depths from the first field of view may be compared with the depths from the second field of view. An area of overlap between the two fields of view may be identified (e.g., determined) when (e.g., during evaluation a plurality of candidate overlaps) a number of consecutive (e.g., adjacent in pixel space) depths from the first and second fields of view are equal or close in value. Although the value of overlapping perceived depths from the first and second fields of view may not be exactly the same, depths with similar values, to within a tolerance range of one another, may be identified (e.g., determined to correspond based on similarity of the values). Furthermore, identifying matching patterns in the value of depths perceived within the first and second fields of view may also be used in identifying the area of overlap. For example, a sudden increase then decrease in the depth values observed in both sets of measurements may be used to identify the area of overlap. Examples include applying an edge detection algorithm (like Haar or Canny) to the fields of view and aligning edges in the resulting transformed outputs. Other patterns, such as increasing values followed by constant values or constant values followed by decreasing values or any other pattern in the values of the perceived depths, may also be used to estimate the area of overlap. A Jacobian and Hessian matrix may be used to identify such similarities. The processor may determine the Jacobian m×n matrix using $$J = \begin{bmatrix} \frac{\partial f_1}{\partial x_1} & \cdots & \frac{\partial f_1}{\partial x_n} \\ \vdots & \ddots & \vdots \\ \frac{\partial f_m}{\partial x_1} & \cdots & \frac{\partial f_m}{\partial x_n} \end{bmatrix},$$

wherein $f$ is a function with input vector $x=(x_1, \ldots, x_n)$. The Jacobian matrix generalizes the gradient of a function of multiple variables. If the function $f$ is differentiable at a point x, the Jacobian matrix provides a linear map of the best linear approximation of the function $f$ near point x. If the gradient of function $f$ is zero at point x, then x is a critical point. To identify if the critical point is a local maximum, local minimum or saddle point, the Hessian matrix may be determined, which when compared for the two sets of overlapping depths, may be used to identify overlapping points. This proves to be relatively computationally inexpensive. The Hessian matrix is related to Jacobian matrix by $H=J(\nabla f(x))$.

In some embodiments, thresholding may be used in identifying the area of overlap wherein areas or objects of interest within an image may be identified using thresholding as different areas or objects have different ranges of pixel intensity. For example, an object captured in an image, the object having high range of intensity, can be separated from a background having low range of intensity by thresholding wherein all pixel intensities below a certain threshold are discarded or segmented, leaving only the pixels of interest. In some embodiments, a metric can be used to indicate how good of an overlap there is between the two sets of perceived depths. For example, the Szymkiewicz-Simpson coefficient may be determine by the processor by dividing the number of overlapping readings between two overlapping sets of data, X and Y, by the number of readings of the smallest of the two data sets, i.e., overlap $$(X, Y) = \frac{|X \cap Y|}{\min(|X|, |Y|)}.$$

The data sets are a string of values, the values being the Euclidean norms in the context of some embodiments. A larger overlap coefficient indicates higher accuracy. In some embodiments lower coefficient readings are raised to the power of alpha, alpha being a number between 0 and 1 and are stored in a table with the Szymkiewicz-Simpson coefficient.

Or some embodiments may determine an overlap with a convolution. Some embodiments may implement a kernel function that determines an aggregate measure of differences (e.g., a root mean square value) between some or all of a collection of adjacent depth readings in one image relative to a portion of the other image to which the kernel function is applied. Some embodiments may then determine the convolution of this kernel function over the other image, e.g., in some cases with a stride of greater than one pixel value. Some embodiments may then select a minimum value of the convolution as an area of identified overlap that aligns the portion of the image from which the kernel function was formed with the image to which the convolution was applied.

To ensure an area of overlap exists between depths perceived within consecutive frames of the camera, the frame rate of the camera should be fast enough to capture more than one frame of measurements in the time it takes the robotic device to rotate the width of the frame. This is expected to guarantee that at least a minimum area of overlap exists if there is angular displacement, though embodiments may also operate without overlap in cases where stitching is performed between images captured in previous sessions or where images from larger displacements are combined. The amount of overlap between depths from consecutive fields of view may be dependent on the amount of angular displacement from one field of view to the next field of view. The larger the area of overlap, the more accurate the map segment constructed from the overlapping depths. If a larger portion of depths making up the map segment are the result of a combination of overlapping depths from at least two overlapping fields of view, accuracy of the map segment is improved as the combination of overlapping depths provides a more accurate reading. Furthermore, with a larger area of overlap, it is easier to find the area of overlap between depths from two consecutive fields of view as more similarities exists between the two sets of data. In some cases, a confidence score may be determined for overlap determinations, e.g., based on an amount of overlap and aggregate amount of disagreement between depth vectors in the area of overlap in the different fields of view, and the above Bayesian techniques down-weight updates to priors based on decreases in the amount of confidence. In some embodiments, the size of the area of overlap may be used to determine the angular movement and may be used to adjust odometer information to overcome inherent noise of the odometer (e.g., by determining an average movement vector for the robot based on both a vector from the odometer and a movement vector inferred from the fields of view). The angular movement of the robot from one field of view to the next may, for example, be determined based on the angular increment between vector measurements taken within a field of view, parallax changes between fields of view of matching objects or features thereof in areas of overlap, and the number of corresponding depths overlapping between the two fields of view.

Due to measurement noise, discrepancies between the value of depths within the area of overlap from the first field of view and the second field of view may exist and the values of the overlapping depths may not be the exact same. In such cases, new depths may be calculated, or some of the depths may be selected as more accurate than others. For example, the overlapping depths from the first field of view and the second field of view (or more fields of view where more images overlap, like more than three, more than five, or more than 10) may be combined using a moving average (or some other measure of central tendency may be applied, like a median or mode) and adopted as the new depths for the area of overlap. The minimum sum of errors may also be used to adjust and calculate new depths for the overlapping area to compensate for the lack of precision between overlapping depths perceived within the first and second fields of view. By way of further example, the minimum mean squared error may be used to provide a more precise estimate of depths within the overlapping area. Other mathematical methods may also be used to further process the depths within the area of overlap, such as split and merge algorithm, incremental algorithm, Hough Transform, line regression, Random Sample Consensus, Expectation-Maximization algorithm, or curve fitting, for example, to estimate more realistic depths given the overlapping depths perceived within the first and second fields of view. The calculated depths are used as the new depths for the overlapping area. In another embodiment, the k-nearest neighbors algorithm can be used where each new depth may be calculated as the average of the values of its k-nearest neighbors.

Figure 38A:
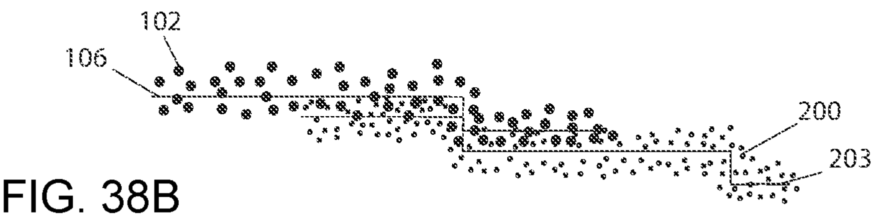
FIG. 38A illustrates overlapping depths from two overlapping fields of view with discrepancies.
Figure 38B:
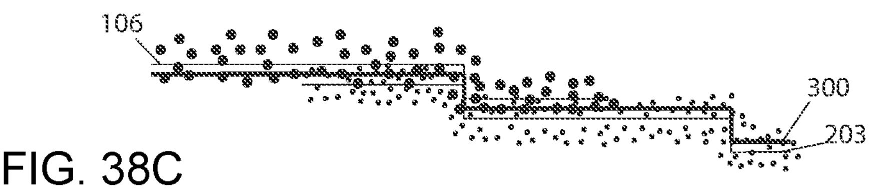
FIG. 38B illustrates overlapping depth from two overlapping fields of view combined using an averaging method.
Figure 38C:
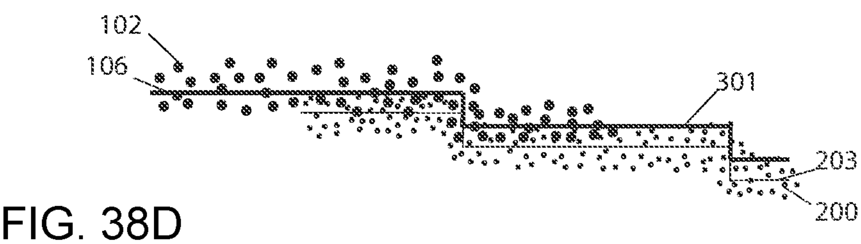
FIG. 38C illustrates overlapping depths from two overlapping fields of view combined using a transformation method.
Figure 38D:
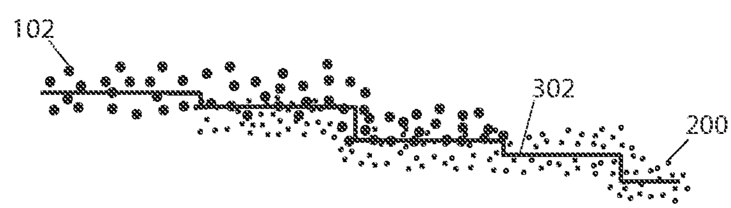
FIG. 38D illustrates overlapping depths from two overlapping fields of view combined using k-nearest neighbor algorithm.

For instance, due to measurement noise, discrepancies may exist between the value of overlapping depths 102 and 200 resulting in staggered floor plan segments 106 and 203, respectively, shown in FIG. 38A. If there were no discrepancies, segments 106 and 203 would perfectly align. When there are discrepancies, overlapping depths may be averaged and adopted as new depths within the overlapping area, resulting in segment 300 halfway between segment 106 and 203, shown in FIG. 38B. It can be seen that the mathematical adjustment applied to the overlapping depths is applied to depths beyond the area of overlap wherein the new depths for the overlapping area are considered ground truth. In other embodiments, new depths for the area of overlap may be calculated using other mathematical methods, such as the minimum sum of errors, minimum mean squared error, split and merge algorithm, incremental algorithm, Hough Transform, line regression, Random Sample Consensus, Expectation-Maximization algorithm, or curve fitting, for example, given overlapping depths perceived within consecutive fields of view. In another example, plotted depths 102 are fixed and used as a reference while second set of depths 200, overlapping with first set of depths 102, are transformed to match fixed reference 102 such that map segment 203 is aligned as best as possible with segment 106, resulting in segment 301 after combining the two in FIG. 38C. In some embodiments, the k-nearest neighbors algorithm may be used where new depths are calculated from k-nearest neighbors, wherein k is a specified integer value. FIG. 38D illustrates map segment 302 from using k-nearest neighbors approach with overlapping depths 102 and 200.

Some embodiments may implement DB-SCAN on depths and related values like pixel intensity, e.g., in a vector space that includes both depths and pixel intensities corresponding to those depths, to determine a plurality of clusters, each corresponding to depth measurements of the same feature of an object. Some embodiments may execute a density-based clustering algorithm, like DBSCAN, to establish groups corresponding to the resulting clusters and exclude outliers. To cluster according to depth vectors and related values like intensity, some embodiments may iterate through each of the depth vectors and designate a depth vector as a core depth vector if at least a threshold number of the other depth vectors are within a threshold distance in the vector space (which may be higher than three dimensional in cases where pixel intensity is included). Some embodiments may then iterate through each of the core depth vectors and create a graph of reachable depth vectors, where nodes on the graph are identified in response to non-core corresponding depth vectors being within a threshold distance of a core depth vector in the graph, and in response to core depth vectors in the graph being reachable by other core depth vectors in the graph, where to depth vectors are reachable from one another if there is a path from one depth vector to the other depth vector where every link and the path is a core depth vector and is it within a threshold distance of one another. The set of nodes in each resulting graph, in some embodiments, may be designated as a cluster, and points excluded from the graphs may be designated as outliers that do not correspond to clusters.

Some embodiments may then determine the centroid of each cluster in the spatial dimensions of an output depth vector for constructing maps. In some cases, all neighbors may have equal weight and in other cases the weight of each neighbor may depend on its distance from the depth considered or (i.e., and/or) similarity of pixel intensity values. In some embodiments, the k-nearest neighbors algorithm may only be applied to overlapping depths with discrepancies. In some embodiments, a first set of readings may be fixed and used as a reference while the second set of readings, overlapping with the first set of readings, may be transformed to match the fixed reference. In one embodiment, the transformed set of readings may be combined with the fixed reference and used as the new fixed reference. In another embodiment, only the previous set of readings may be used as the fixed reference. Initial estimation of a transformation function to align the newly read data to the fixed reference may be iteratively revised in order to produce minimized distances from the newly read data to the fixed reference. The transformation function may be the sum of squared differences between matched pairs from the newly read data and prior readings from the fixed reference. For example, in some embodiments, for each value in the newly read data, the closest value among the readings in the fixed reference may be found. In a next step, a point to point distance metric minimization technique may be used such that it may best align each value in the new readings to its match found in the prior readings of the fixed reference. One point to point distance metric minimization technique that may be used estimates the combination of rotation and translation using a root mean square. The process may be iterated to transform the newly read values using the obtained information. These methods may be used independently or may be combined to improve accuracy. In one embodiment, the adjustment applied to overlapping depths within the area of overlap may be applied to other depths beyond the identified area of overlap, wherein the new depths within the overlapping area may be considered ground truth when making the adjustment.

Figure 39A:
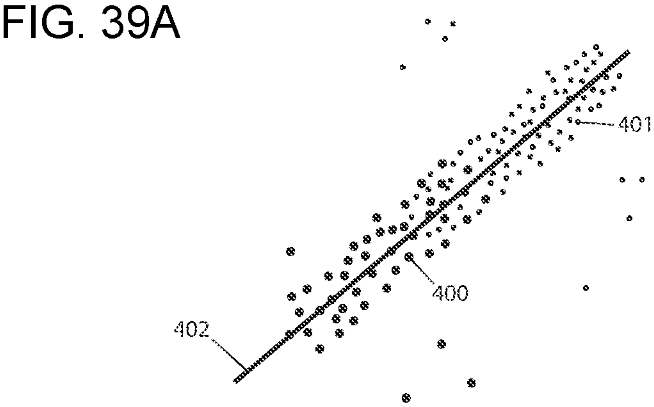
FIG. 39A illustrates aligned overlapping depths from two overlapping fields of view.
Figure 39B:
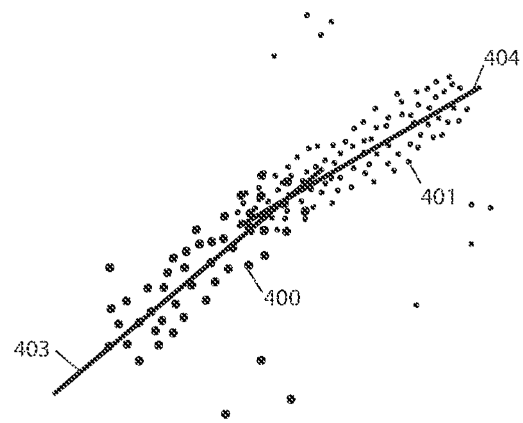
FIG. 39B illustrates misaligned overlapping depths from two overlapping fields of view.
Figure 39C:
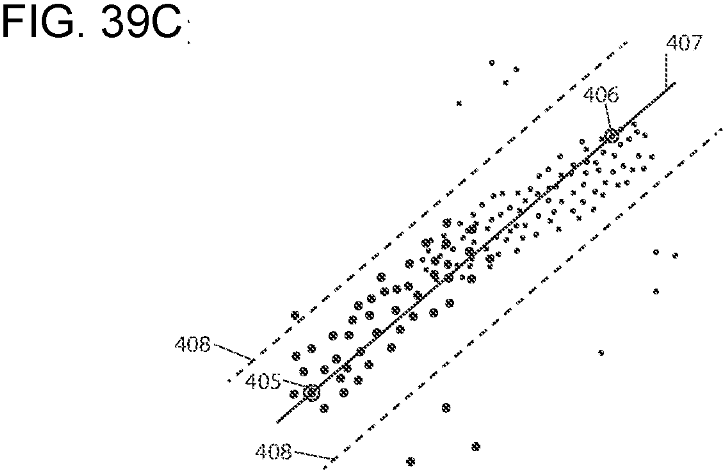
FIG. 39C illustrates a modified RANSAC approach to eliminate outliers.

In some embodiments, a modified RANSAC approach may be used where any two points, one from each data set, are connected by a line. A boundary may be defined with respect to either side of the line. Any points from either data set beyond the boundary are considered outliers and are excluded. The process may be repeated using another two points. The process is intended to remove outliers to achieve a higher probability of being the true distance to the perceived wall. Consider an extreme case where a moving object is captured in two frames overlapping with several frames captured without the moving object. The approach described or RANSAC method may be used to reject data points corresponding to the moving object. This method or a RANSAC method may be used independently or combined with other processing methods described above. As an example, consider two overlapping sets of plotted depths 400 and 401 of a wall in FIG. 39A. If overlap between depths 400 and 401 is ideal, the map segments used to approximate the wall for both sets of data align, resulting in combined map segment 402. However, in certain cases there are discrepancies in overlapping depths 400 and 401, resulting in FIG. 39B where segments 403 and 404 approximating the depth to the same wall do not align. To achieve better alignment of depths 400 and 401, any two points, one from each data set, such as points 405 and 406, are connected by line 407. Boundary 408 is defined with respect to either side of line 407. Any points from either data set beyond the boundary are considered outliers and are excluded. The process is repeated using another two points. The process is intended to remove outliers to achieve a higher probability of determining the true distance to the perceived wall.

In some embodiments, images may be preprocessed before determining overlap. For instance, some embodiments may infer an amount of displacement of the robot between images, e.g., by integrating readings from an inertial measurement unit or odometer (in some cases after applying a Kalman filter), and then transform the origin for vectors in one image to match an origin for vectors in the other image based on the measured displacement, e.g., by subtracting a displacement vector from each vector in the subsequent image. Further, some embodiments may down-res images to afford faster matching, e.g., by selecting every other, every fifth, or more or fewer vectors, or by averaging adjacent vectors to form two lower-resolution versions of the images to be aligned. The resulting alignment may then be applied to align the two higher resolution images.

In some embodiments, computations may be expedited based on a type of movement of the robot between images. For instance, some embodiments may determine if the robot's displacement vector between images has less than a threshold amount of vertical displacement (e.g., is zero). In response, some embodiments may apply the above described convolution in with a horizontal stride and less or zero vertical stride, e.g., in the same row of the second image from which vectors are taken in the first image to form the kernel function.

In some embodiments, the area of overlap may be expanded to include a number of depths perceived immediately before and after (or spatially adjacent) the perceived depths within the identified overlapping area. Once an area of overlap is identified (e.g., as a bounding box of pixel positions or threshold angle of a vertical plane at which overlap starts in each field of view), a larger field of view may be constructed by combining the two fields of view using the perceived depths within the area of overlap as the attachment points. Combining may include transforming vectors with different origins into a shared coordinate system with a shared origin, e.g., based on an amount of translation or rotation of a depth sensing device between frames, for instance, by adding a translation or rotation vector to depth vectors. The transformation may be performed before, during, or after combining.

Figure 40A:
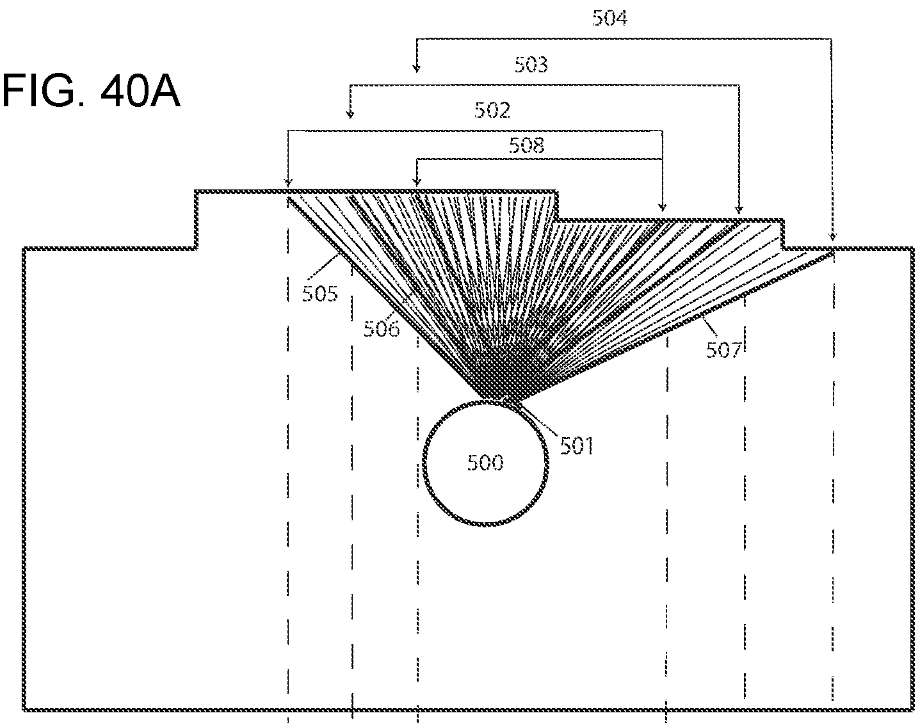
FIG. 40A illustrates depths perceived within three overlapping fields of view.
Figure 40B:
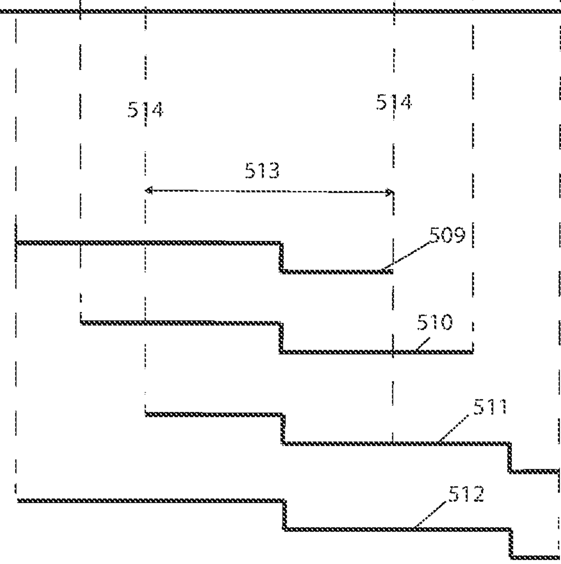
FIG. 40B illustrates a segment of a 2D floor plan constructed from depths perceived within three overlapping fields of view.

In some embodiments, more than two consecutive fields of view overlap, resulting in more than two sets of depths falling within an area of overlap. This may happen when the amount of angular movement between consecutive fields of view is small, especially if the frame rate of the camera is fast such that several frames within which vector measurements are taken are captured while the robot makes small movements, or when the field of view of the camera is large or when the robot has slow angular speed and the frame rate of the camera is fast. Higher weight may be given to depths within areas of overlap where more than two sets of depths overlap, as increased number of overlapping sets of depths provide a more accurate ground truth. In some embodiments, the amount of weight assigned to perceived depths may be proportional to the number of depths from other sets of data overlapping with it. Some embodiments may merge overlapping depths and establish a new set of depths for the overlapping area with a more accurate ground truth. The mathematical method used may be a moving average or a more complex method. FIG. 40A illustrates robot 500 with mounted camera 501 perceiving depths 502, 503, and 504 within consecutively overlapping fields of view 505, 506, and 507, respectively. In this case, depths 502, 503, and 504 have overlapping depths 508. FIG. 40B illustrates map segments 509, 510, and 511 approximated from plotted depths 502, 503, and 504, respectively. The map segments 509, 510, and 511 are combined at overlapping areas to construct larger map segment 512. In some embodiments, depths falling within overlapping area 513, bound by lines 514, have higher weight than depths beyond overlapping area 513 as three sets of depths overlap within area 513 and increased number of overlapping sets of perceived depths provide a more accurate ground truth.

In some embodiments, the processor of the robot may generate or update a map of the environment using data collected by at least one imaging sensor or camera. In one embodiment, an imaging sensor may measure vectors from the imaging sensor to objects in the environment and the processor may calculate the L2 norm of the vectors using $\|x\|_P=\Sigma_i|x_i|^P)^{1/P}$ with P=2 to estimate depths to objects. In some embodiments, each L2 norm of a vector may be replaced with an average of the L2 norms corresponding with neighboring vectors. In some embodiments, the processor may use more sophisticated methods to filter sudden spikes in the sensor readings. In some embodiments, sudden spikes may be deemed as outliers. In some embodiments, sudden spikes or drops in the sensor readings may be the result of a momentary environmental impact on the sensor. In some embodiments, the processor may adjust previous data to account for a measured movement of the robot as it moves from observing one field of view to the next (e.g., differing from one another due to a difference in sensor pose). In some embodiments, a movement measuring device such as an odometer, OTS, gyroscope, IMU, optical flow sensor, etc. may measure movement of the robot and hence the sensor (assuming the two move as a single unit). In some instances, the processor matches a new set of data with data previously captured. In some embodiments, the processor compares the new data to the previous data and identifies a match when a number of consecutive readings from the new data and the previous data are similar. In some embodiments, identifying matching patterns in the value of readings in the new data and the previous data may also be used in identifying a match. In some embodiments, thresholding may be used in identifying a match between the new and previous data wherein areas or objects of interest within an image may be identified using thresholding as different areas or objects have different ranges of pixel intensity. In some embodiments, the processor may determine a cost function and may minimize the cost function to find a match between the new and previous data. In some embodiments, the processor may create a transform and may merge the new data with the previous data and may determine if there is a convergence. In some embodiments, the processor may determine a match between the new data and the previous data based on translation and rotation of the sensor between consecutive frames measured by an IMU. For example, overlap of data may be deduced based on interoceptive sensor measurements. In some embodiments, the translation and rotation of the sensor between frames may be measured by two separate movement measurement devices (e.g., optical encoder and gyroscope) and the movement of the robot may be the average of the measurements from the two separate devices. In some embodiments, the data from one movement measurement device is the movement data used and the data from the second movement measurement device is used to confirm the data of the first movement measurement device. In some embodiments, the processor may use movement of the sensor between consecutive frames to validate the match identified between the new and previous data. Or, in some embodiments, comparison between the values of the new data and previous data may be used to validate the match determined based on measured movement of the sensor between consecutive frames. For example, the processor may use data from an exteroceptive sensor (e.g., image sensor) to determine an overlap in data from an IMU, encoder, or OTS. In some embodiments, the processor may stitch the new data with the previous data at overlapping points to generate or update the map. In some embodiments, the processor may infer the angular disposition of the robot based on a size of overlap of the matching data and may use the angular disposition to adjust odometer information to overcome inherent noise of an odometer.

In some embodiments, the processor may generate or update a spatial representation using data of captured images of the environment (e.g., depth data inferred from the image, pixel intensities from the image, etc.), as described above. In some embodiments, the processor combines image data at overlapping points to generate the spatial representation. In some embodiments, the processor may localize patches with gradients in two different orientations by using simple matching criterion to compare two image patches. Examples of simple matching criterion include the summed square difference or weighted summed square difference, $E_{WSSD}(u)=\Sigma_i\omega(x_i)[I_1(x_i+u)-I_0(x_i)]^2$, wherein $I_0$ and $I_1$ are the two images being compared, u=(u, v) is the displacement vector, w(x) is a spatially varying weighting (or window) function. The summation is over all the pixels in the patch. In embodiments, the processor may not know which other image locations the feature may end up being matched with. However, the processor may determine how stable the metric is with respect to small variations in position $\Delta u$ by comparing an image patch against itself. In some embodiments, the processor may need to account for scale changes, rotation, and/or affine invariance for image matching and object recognition. To account for such factors, the processor may design descriptors that are rotationally invariant or estimate a dominant orientation at each detected key point. In some embodiments, the processor may detect false negatives (failure to match) and false positives (incorrect match). Instead of finding all corresponding feature points and comparing all features against all other features in each pair of potentially matching images, which is quadratic in the number of extracted features, the processor may use indexes. In some embodiments, the processor may use multi-dimensional search trees or a hash table, vocabulary trees, K-Dimensional tree, and best bin first to help speed up the search for features near a given feature. In some embodiments, after finding some possible feasible matches, the processor may use geometric alignment and may verify which matches are inliers and which ones are outliers. In some embodiments, the processor may adopt a theory that a whole image is a translation or rotation of another matching image and may therefore fit a global geometric transform to the original image. The processor may then only keep the feature matches that fit the transform and discard the rest. In some embodiments, the processor may select a small set of seed matches and may use the small set of seed matches to verify a larger set of seed matches using random sampling or RANSAC. In some embodiments, after finding an initial set of correspondences, the processor may search for additional matches along epipolar lines or in the vicinity of locations estimated based on the global transform to increase the chances over random searches.

In some embodiments, the processor may execute a classification algorithm for baseline matching of key points, wherein each class may correspond to a set of all possible views of a key point. The algorithm may be provided various images of a particular object such that it may be trained to properly classify the particular object based on a large number of views of individual key points and a compact description of the view set derived from statistical classifications tools. At run-time, the algorithm may use the description to decide to which class the observed feature belongs. Such methods (or modified versions of such methods) may be used and are further described by V. Lepetit, J. Pilet and P. Fua, "Point matching as a classification problem for fast and robust object pose estimation," Proceedings of the 2004 IEEE Computer Society Conference on Computer Vision and Pattern Recognition, 2004, the entire contents of which are hereby incorporated by reference. In some embodiments, the processor may use an algorithm to detect and localize boundaries in scenes using local image measurements. The algorithm may generate features that respond to changes in brightness, color and texture. The algorithm may train a classifier using human labeled images as ground truth. In some embodiments, the darkness of boundaries may correspond with the number of human subjects that marked a boundary at that corresponding location. The classifier outputs a posterior probability of a boundary at each image location and orientation. Such methods (or modified versions of such methods) may be used and are further described by D. R. Martin, C. C. Fowlkes and J. Malik, "Learning to detect natural image boundaries using local brightness, color, and texture cues," in IEEE Transactions on Pattern Analysis and Machine Intelligence, vol. 26, no. 5, pp. 530-549, May 2004, the entire content of which is hereby incorporated by reference. In some embodiments, an edge in an image may correspond with a change in intensity. In some embodiments, the edge may be approximated using a piecewise straight curve composed of edgels (i.e., short, linear edge elements), each including a direction and position. The processor may perform edgel detection by fitting a series of one-dimensional surfaces to each window and accepting an adequate surface description based on least squares and fewest parameters. Such methods (or modified versions of such methods) may be used and are further described by V. S. Nalwa and T. O. Binford, "On Detecting Edges," in IEEE Transactions on Pattern Analysis and Machine Intelligence, vol. PAMI-8, no. 6, pp. 699-714, November 1986. In some embodiments, the processor may track features based on position, orientation, and behavior of the feature. The position and orientation may be parameterized using a shape model while the behavior is modeled using a three-tier hierarchical motion model. The first tier models local motions, the second tier is a Markov motion model, and the third tier is a Markov model that models switching between behaviors. Such methods (or modified versions of such methods) may be used and are further described by A. Veeraraghavan, R. Chellappa and M. Srinivasan, "Shape-and-Behavior Encoded Tracking of Bee Dances," in IEEE Transactions on Pattern Analysis and Machine Intelligence, vol. 30, no. 3, pp. 463-476, March 2008.

In some embodiments, the processor may detect sets of mutually orthogonal vanishing points within an image. In some embodiments, once sets of mutually orthogonal vanishing points have been detected, the processor may search for three dimensional rectangular structures within the image. In some embodiments, after detecting orthogonal vanishing directions, the processor may refine the fitted line equations, search for corners near line intersections, and then verify the rectangle hypotheses by rectifying the corresponding patches and looking for a preponderance of horizontal and vertical edges. In some embodiments, the processor may use a Markov Random Field (MRF) to disambiguate between potentially overlapping rectangle hypotheses. In some embodiments, the processor may use a plane sweep algorithm to match rectangles between different views. In some embodiments, the processor may use a grammar of potential rectangle shapes and nesting structures (between rectangles and vanishing points) to infer the most likely assignment of line segments to rectangles.

In some embodiments, the processor may locally align image data of neighbouring frames using methods (or a variation of the methods) described by Y. Matsushita, E. Ofek, Weina Ge, Xiaoou Tang and Heung-Yeung Shum, "Full-frame video stabilization with motion inpainting," in IEEE Transactions on Pattern Analysis and Machine Intelligence, vol. 28, no. 7, pp. 1150-1163, July 2006. In some embodiments, the processor may align images and dynamically construct an image mosaic using methods (or a variation of the methods) described by M. Hansen, P. Anandan, K. Dana, G. van der Wal and P. Burt, "Real-time scene stabilization and mosaic construction," Proceedings of 1994 IEEE Workshop on Applications of Computer Vision, Sarasota, FL, USA, 1994, pp. 54-62.

Figure 41A:
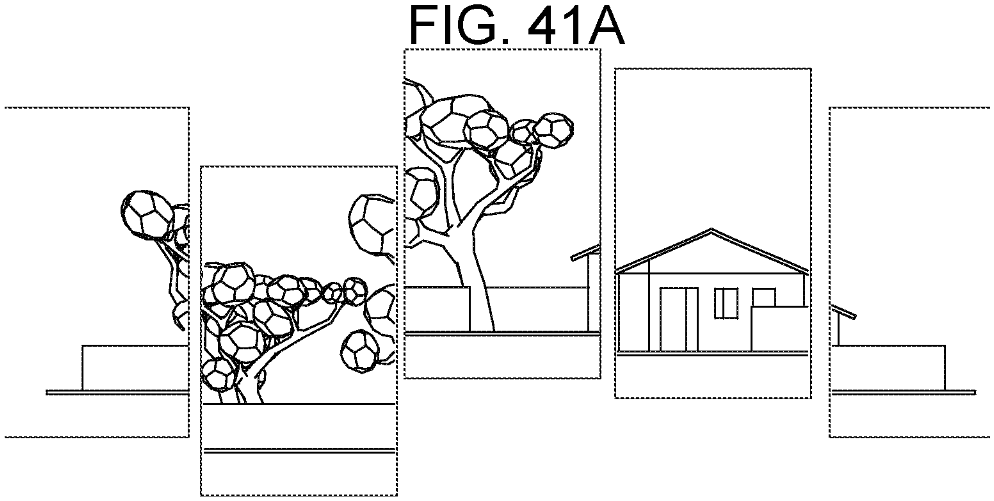
FIGS. 41A-41C illustrate an example of images stitched together, according to some embodiments.
Figure 41B:
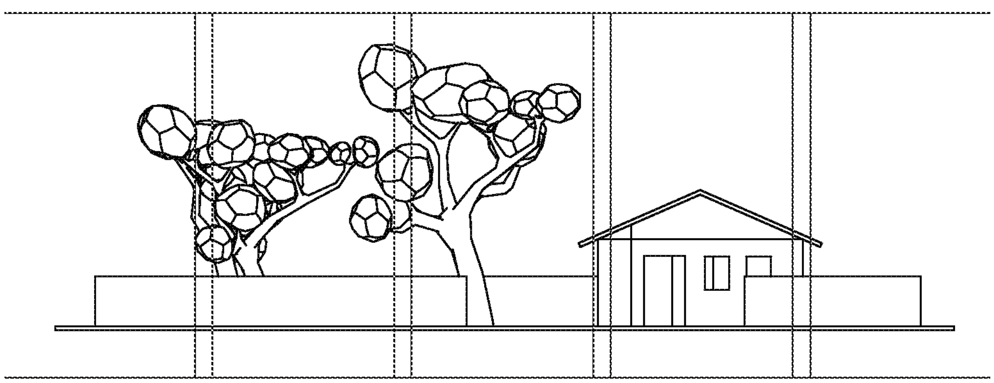
Figure 41C:
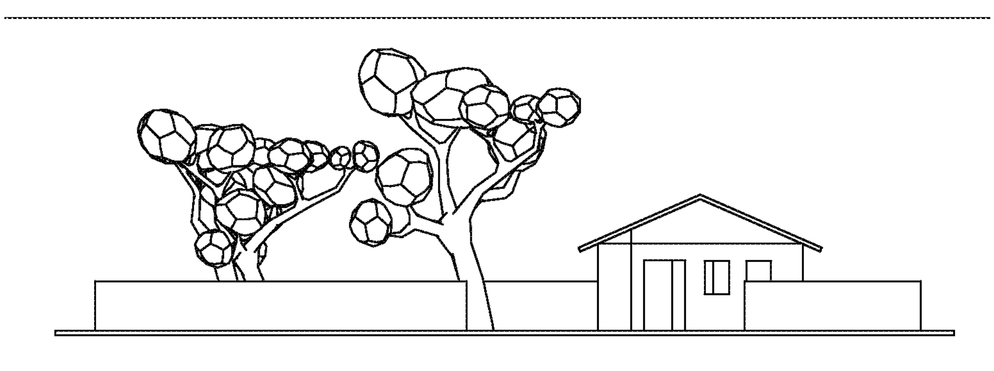

In some embodiments, the processor may use least squares, non-linear least squares, non-linear regression, preemptive RANSAC, etc. for two dimensional alignment of images, each method varying from the others. In some embodiments, the processor may identify a set of matched feature points $\{(x_i, x_i')\}$ for which the planar parametric transformation may be given by $x' = f(x; p)$, wherein p is best estimate of the motion parameters. In some embodiments, the processor minimizes the sum of squared residuals $E_{LS}(u) = \Sigma_i \|r_i\|^2 = \Sigma_i \|f(x_i; p) - x'_i\|^2$, wherein $r_i = f(x_i; p) - x_i' = x_i^{\frown\prime} - x_i$ [<]BEGINITALm' is the residual between the measured location $x_i^{\frown\prime}$ and the predicted location $x_i$[<]BEGINITALm'$= f(x_i; p)$. In some embodiments, the processor may minimize the sum of squared residuals by solving the Symmetric Positive Definite (SPD) system of normal equations and associating a scalar variance estimate $\sigma_i^2$ with each correspondence to achieve a weighted version of least squares that may account for uncertainty. FIG. 41A illustrates an example of four unaligned two dimensional images. FIG. 41B illustrates the alignment of the images achieved using methods such as those described herein, and FIG. 41C illustrates the four images stitched together after alignment. In some embodiments, the processor may use three dimensional linear or non-linear transformations to map translations, similarities, affine, by least square method or using other methods. In embodiments, there may be several parameters that are pure translation, a clean rotation, or affine. Therefore, a full search over the possible range of values may be impractical. In some embodiments, instead of using a single constant translation vector such as u, the processor may use a motion field or correspondence map $x'(x; p)$ that is spatially varying and parameterized by a low dimensional vector p, wherein x' may be any motion model. Since the Hessian and residual vectors for such parametric motion is more computationally demanding than a simple translation or rotation, the processor may use a sub block and approach the analysis of motion using parametric methods. Then, once a correspondence is found, the processor may analyze the entire image using non-parametric methods.

Figure 42A:
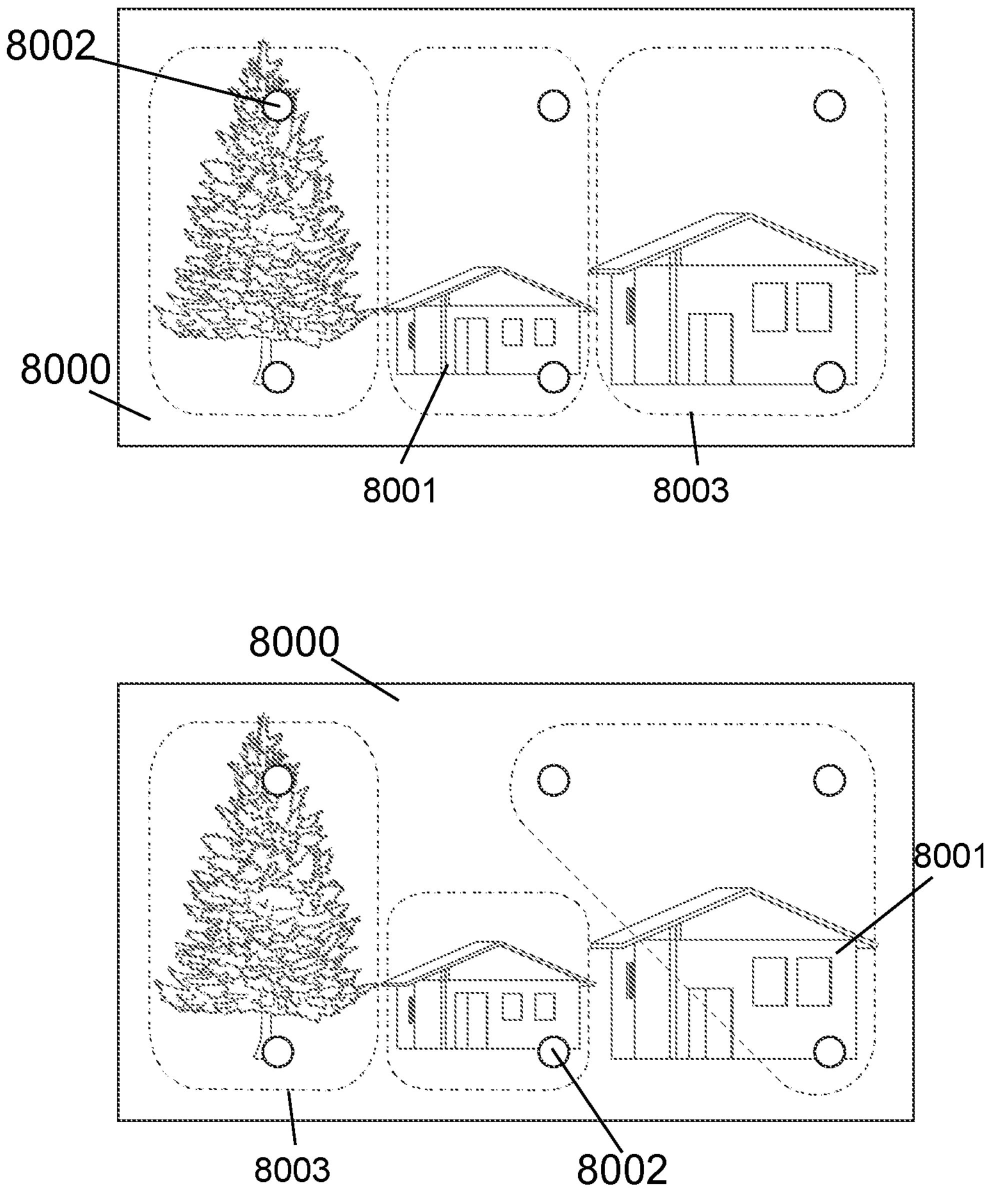
FIGS. 42A and 42B illustrate an example of association between light points and features in an image, according to some embodiments.
Figure 42B:
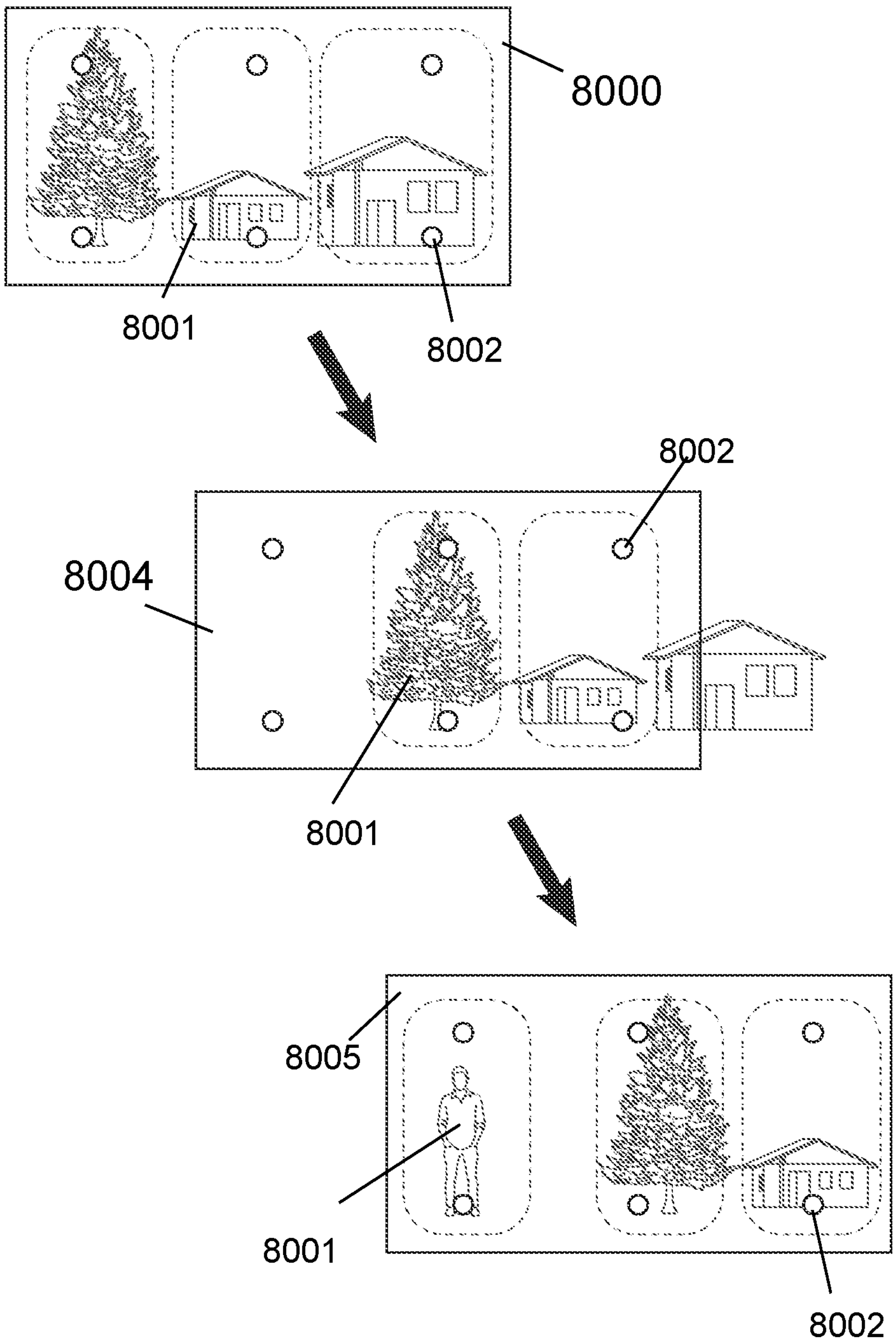

In some embodiments, the processor may associate a feature in a captured image with a light point in the captured image. In some embodiments, the processor may associate features with light points based on machine learning methods such as K nearest neighbors or clustering. In some embodiments, the processor may monitor the relationship between each of the light points and respective features as the robot moves in following time slots. The processor may disassociate some associations between light points and features and generate some new associations between light points and features. FIG. 42A illustrates an example of two captured images 8000 including three features 8001 (a tree, a small house, a large house) and light points 8002 associated with each of the features 8001. Associated features 8001 and light points 8002 are included within the same dotted shape 8003. FIG. 42B illustrates the captured image 8000 in FIG. 42A at a first time point, a captured image 8004 at a second time point, and a captured image 8005 at a third time point as the robot moves within the environment. As the robot moves, some features 8001 and light points 8802 associated at one time point become disassociated at another time point, such as in image 8004 wherein a feature (the large house) from image 8000 is no longer in the image 8004. Or some new associations between features 8001 and light points 8002 emerge at a next time point, such as in image 8005 wherein a new feature (a person) is captured in the image. In some embodiments, the robot may include an LED point generator that spins. FIG. 43A illustrates a robot 8100, a spinning LED light point generator 8101, light points 8102 that are emitted by light point generator 8101, and camera 8103 that captures images of light points 8102. In some embodiments, the camera of the robot captures images of the projected light point. In some embodiments, the light point generator is faster than the camera resulting in multiple light points being captured in an image fading from one side to another. This is illustrated in FIG. 43B, wherein light points 8104 fade from one side to the other. In some embodiments, the robot may include a full 360 degrees LIDAR. In some embodiments, the robot may include multiple cameras. This may improve accuracy of estimates based on image data. For example, FIG. 43C illustrates the robot 8100 with four cameras 8103.

In embodiments, the goal of extracting features of an image is to match the image against other images. However, it is not uncommon that matched features need some processing to compensate for feature displacements. Such feature displacements may be described with a two or three dimensional geometric or non-geometric transformation. In some embodiments, the processor may estimate motion between two or more sets of matched two dimensional or three dimensional points when superimposing virtual objects, such as predictions or measurements on a real live video feed. In some embodiments, the processor may determine a three dimensional camera motion. The processor may use a detected two dimensional motion between two frames to align corresponding image regions. The two dimensional registration removes all effects of camera rotation and the resulting residual parallax displacement field between the two region aligned images is an epipolar field centered at the Focus-of-Expansion. The processor may recover the three dimensional camera translation from the epipolar field and may compute the three dimensional camera rotation based on the three dimensional translation and detected two dimensional motion. Such methods (or modified versions of such methods) may be used and are further described by M. Irani, B. Rousso and S. Peleg, "Recovery of ego-motion using region alignment," in IEEE Transactions on Pattern Analysis and Machine Intelligence, vol. 19, no. 3, pp. 268-272, March 1997. In some embodiments, the processor may compensate for three dimensional rotation of the camera using an EKF to estimate the rotation between frames. Such methods (or modified versions of such methods) may be used and are further described by C. Morimoto and R. Chellappa, "Fast 3D stabilization and mosaic construction," Proceedings of IEEE Computer Society Conference on Computer Vision and Pattern Recognition, San Juan, Puerto Rico, USA, 1997, pp. 660-665. In some embodiments, the processor may execute an algorithm that learns parametrized models of optical flow from image sequences. A class of motions are represented by a set of orthogonal basis flow fields computed from a training set. Complex image motions are represented by a linear combination of a small number of the basis flows. Such methods (or modified versions of such methods) may be used and are further described by M. J. Black, Y. Yacoob, A. D. Jepson and D. J. Fleet, "Learning parameterized models of image motion," Proceedings of IEEE Computer Society Conference on Computer Vision and Pattern Recognition, San Juan, Puerto Rico, USA, 1997, pp. 561-567. In some embodiments, the processor may align images by recovering original three dimensional camera motion and a sparse set of three dimensional static scene points. The processor may then determine a desired camera path automatically (e.g., by fitting a linear or quadratic path) or interactively. Finally, the processor may perform a least squares optimization that determines a spatially-varying warp from a first frame into a second frame. Such methods (or modified versions of such methods) may be used and are further described by F. Liu, M. Gleicher, H. Jin and A. Agarwala, "Content-preserving warps for 3D video stabilization," in ACM Transactions on Graphics, vol. 28, no. 3, article 44, July 2009.

In some embodiments, the processor may use methods such as video stabilization used in camcorders and still cameras and software such as Final Cut Pro or imovie available for improving the quality of shaky hands to compensate for movement of the robot on imperfect surfaces. In some embodiments, the processor may estimate motion by computing an independent estimate of motion at each pixel by minimizing the brightness or color difference between corresponding pixels summed over the image. In continuous form, this may be determined using an integral. In some embodiments, the processor may perform the summation by using a patch-based or window-based approach. While several examples illustrate or describe two frames, wherein one image is taken and a second image is taken immediately after, the concepts described herein are not limited to being applied to two images and may be used for a series of images (e.g., video).

Figure 44:
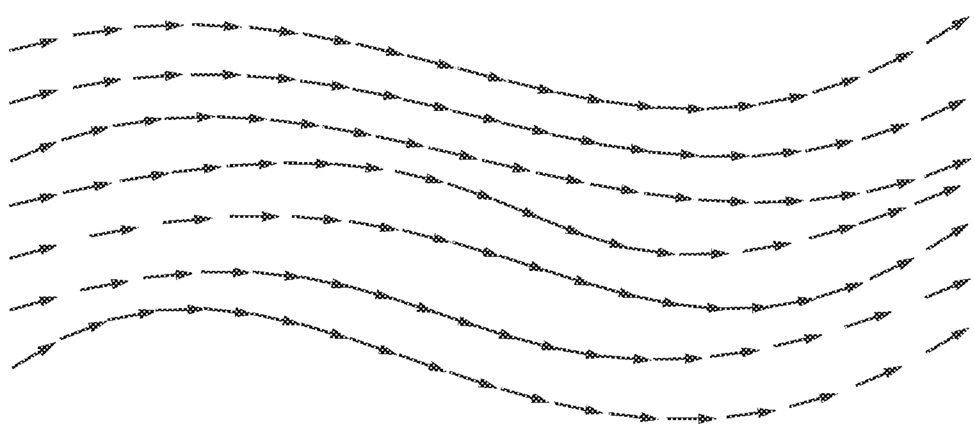
FIG. 44 illustrates an example of a velocity map, according to some embodiments.
Figure 45:
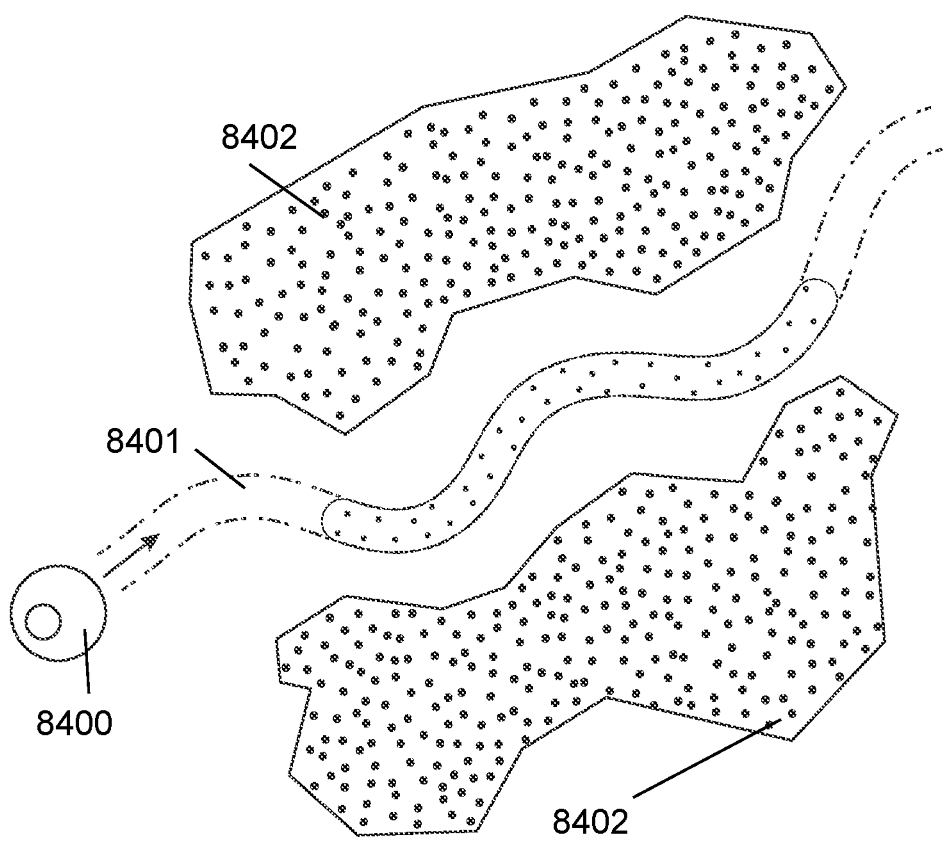
FIG. 45 illustrates an example of a robot navigating through a narrow path, according to some embodiments.

In some embodiments, the processor may generate a velocity map based on multiple images taken from multiple cameras at multiple time stamps, wherein objects do not move with the same speed in the velocity map. Speed of movement is different for different objects depending on how the objects are positioned in relation to the cameras. FIG. 44 illustrates an example of a velocity map, each line corresponding with a different object. In embodiments, tracking objects as a whole, rather than pixels, results in objects at different depths moving in the scene at different speeds. In some embodiments, the processor may detect objects based on features and objects grouped together based on shiny points of structured light emitted onto the object surfaces (as described above). In some embodiments, the processor may determine at which speed the shiny points in the images move. Since the shiny points of the emitted structured light move within the scene when the robot moves, each of the shiny points create a motion, such as Brownian Motion. According to Brownian motion, when speed of movement of the robot increases, the entropy increases. In some embodiments, the processor may categorize areas with higher entropy with different depths than areas with low entropy. In some embodiments, the processor may categorize areas with similar entropy as having the same depths from the robot. In some embodiments, the processor may determine areas the robot may traverse based on the entropy information. For example, FIG. 45 illustrates a robot 8400 tasked with passing through a narrow path 8401 with obstacles 8402 on both sides. The processor of the robot 8400 may know where to direct the robot 8400 based on the entropy information. Obstacles 8402 on the two sides of the path 8401 have similar entropies while the path 8401 has a different entropy than the obstacles as the path 8401 is open ended, resulting in the entropy presenting as far objects which is opposite than the entropy of obstacles 8402 presenting as near objects.

In some embodiments, the processor may not know the correspondence between data points a priori when merging images and may start by matching nearby points. The processor may then update the most likely correspondence and iterate on. In some embodiments, the processor of the robot may localize the robot against the environment based on feature detection and matching. This may be synonymous to pose estimation or determining the position of cameras and other sensors of the robot relative to a known three dimensional object in the scene. In some embodiments, the processor stitches images and creates a spatial representation of the scene after correcting images with preprocessing.

Figure 46:
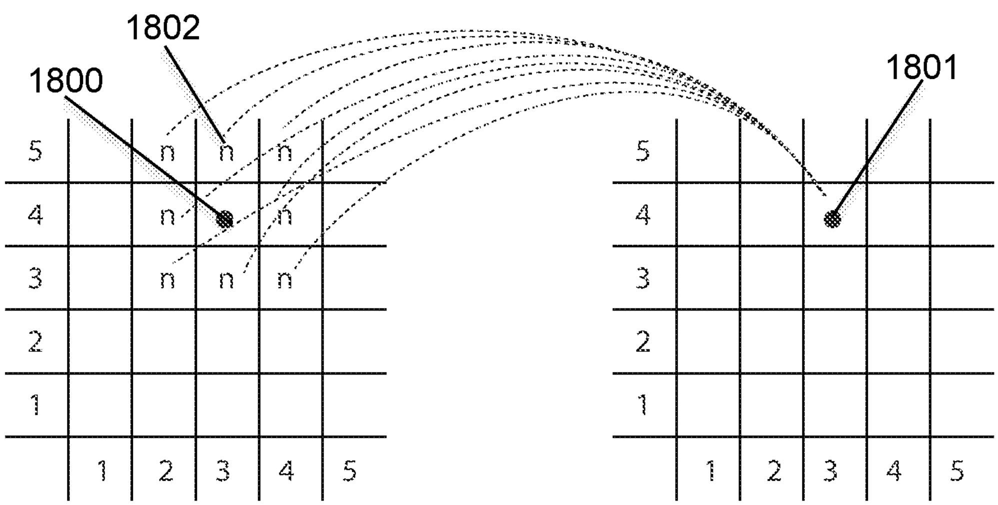
FIG. 46 illustrates replacing a value of a reading with an average of the values of neighboring readings, according to some embodiments.

In some embodiments, a captured image may be processed prior to using the image in generating or updating the map. In some embodiments, processing may include replacing readings corresponding to each pixel with averages of the readings corresponding to neighboring pixels. FIG. 46 illustrates an example of replacing a reading 1800 corresponding with a pixel with an average of the readings 1801 of corresponding neighboring pixels 1802. In some embodiments, pixel values of an image may be read into an array or any data structure or container capable of indexing elements of the pixel values. In some embodiments, the data structure may provide additional capabilities such as insertion or deletion in the middle, start, or end by swapping pointers in memory. In some embodiments, indices such as i, j, and k may be used to access each element of the pixel values. In some embodiments, negative indices count from the last element backwards. In some embodiments, the processor of the robot may transform the pixel values into grayscale. In some embodiments, the grayscale may range from black to white and may be divided into a number of possibilities. For example, numbers ranging from 0 to 256 may be used to describe 256 buckets of color intensities. Each element of the array may have a value that corresponds with one of buckets of color intensities. In some embodiments, the processor may create a chart showing the popularity of each color bucket within the image. For example, the processor may iterate through the array and may increase a popularity vote of the 0 color intensity bucket for each element of the array having a value of 0. This may be repeated for each of the 256 buckets of color intensities. In some embodiments, characteristics of the environment at the time the image is captured may affect the popularity of the 256 buckets of color intensities. For example, an image captured on a bright day may have increased popularity for color buckets corresponding with less intense colors. In some embodiments, principal component analysis may be used to reduce the dimensionality of an image as the number of pixels increases with resolution. For example, dimensions of a megapixel image are in the millions. In some embodiments, singular value decomposition may be used to find principal components.

In some embodiments, the processor of the robot may store a portion of the L2 norms, such as L2 norms to critical points within the environment. In some embodiments, critical points may be second or third derivatives of a function connecting the L2 norms. In some embodiments, critical points may be second or third derivatives of raw pixel values. In some embodiments, the simplification may be lossy. In some embodiments, the lost information may be retrieved and pruned in each tick of the processor as the robot collects more information. In some embodiments, the accuracy of information may increase as the robot moves within the environment. For example, a critical point may be discovered to include two or more critical points over time. In some embodiments, loss of information may not occur or may be negligible when critical points are extracted with high accuracy.

In some embodiments, information sensed by a depth perceiving sensor may be processed and translated into depth measurements, which, in some embodiments, may be reported in a standardized measurement unit, such as millimeter or inches, for visualization purposes, or may be reported in non-standard units. Depth may be inferred (or otherwise perceived) in various ways. For example, depths may be inferred based (e.g., exclusively based on or in combination with other inputs) on pixel intensities from a depth image captured by a depth camera. Depths may be inferred from the time it takes for an infrared light (or sound) transmitted by a sensor to reflect off of an object and return back to the depth perceiving device or by a variety of other techniques. For example, using a time-of-flight camera, depth may be estimated based on the time required for light transmitted from a robot to reflect off of an object and return to a camera on the robot, or using an ultrasonic sensor, depth may be estimated based on the time required for a sound pulse transmitted from a robot-mounted ultrasonic transducer to reflect off of an object and return to the sensor. In some embodiments, a one or more IR (or with other portions of the spectrum) illuminators (such as those mounted on a robot) may project light onto objects (e.g., with a spatial structured pattern (like with structured light), or by scanning a point-source of light), and the resulting projection may be sensed with one or more cameras (such as robot-mounted cameras offset from the projector in a horizontal direction). In resulting images from the one or more cameras, the position of pixels with high intensity may be used to infer depth (e.g., based on parallax, based on distortion of a projected pattern, or both in captured images). In some embodiments, raw data (e.g., sensed information from which depth has not been inferred), such as time required for a light or sound pulse to reflect off of an object or pixel intensity may be used directly (e.g., without first inferring depth) in creating a map of an environment, which is expected to reduce computational costs, as the raw data does not need to be first processed and translated into depth values, e.g., in metric or imperial units.

In embodiments, raw data may be provided in matrix form or in an ordered list (which is not to suggest that matrices cannot be encoded as ordered lists in program state). When the raw data of the sensor are directly used by an artificial intelligence (AI) algorithm, these extra steps may be bypassed and raw data may be directly used by the algorithm, wherein raw values and relations between the raw values may be used to perceive the environment and construct the map directly without converting raw values to depth measurements with metric or imperial units prior to inference of the map (which may include inferring or otherwise perceiving a subset of a map, like inferring a shape of a piece of furniture in a room that is otherwise mapped with other techniques). For example, in embodiments, where at least one camera coupled with at least one IR laser is used in perceiving the environment, depth may be inferred based on the position and/or geometry of the projected IR light in the image captured. For instance, some embodiments may infer map geometry (or features thereof) with a trained convolutional neural network configured to infer such geometries from raw data from a plurality of sensor poses. Some embodiments may apply a multi-stage convolutional neural network in which initial stages in a pipeline of models are trained on (and are configured to infer) a coarser-grained spatial map corresponding to raw sensor data of a two-or-three-dimensional scene and then later stages in the pipeline are trained on (and are configured to infer) finer-grained residual difference between the coarser-grained spatial map and the two-or-three-dimensional scene. Some embodiments may include three, five, ten, or more such stages trained on progressively finer-grained residual differences relative to outputs of earlier stages in the model pipeline. In some cases, objects may be detected and mapped with, for instance, a capsule network having pose invariant representations of three dimensional objects. In some cases, complexity of exploiting translational invariance may be reduced by leveraging constraints where the robot is confined to two dimensions of movement, and the output map is a two dimensional map, for instance, the capsules may only account for pose invariance within a plane. A digital image from the camera may be used to detect the position and/or geometry of IR light in the image by identifying pixels with high brightness (or outputs of transformations with high brightness, like outputs of edge detection algorithms). This may be used directly in perceiving the surroundings and constructing a map of the environment. The raw pixel intensity values may be used to determine the area of overlap between data captured within overlapping fields of view in order to combine data and construct a map of the environment. In the case of two overlapping images, the area in which the two images overlap contain similar arrangement of pixel intensities in at least a portion of the digital image. This similar arrangement of pixels may be detected and the two overlapping images may be stitched at overlapping points to create a segment of the map of the environment without processing the raw data into depth measurements.

As a further example, raw time-of-flight data measured for multiple points within overlapping fields of view may be compared and used to find overlapping points between captured data without translating the raw times into depth measurements, and in some cases, without first triangulating multiple depth measurements from different poses to the same object to map geometry of the object. The area of overlap may be identified by recognizing matching patterns among the raw data from the first and second fields of view, such as a pattern of increasing and decreasing values. Matching patterns may be detected by using similar methods as those discussed herein for detecting matching patterns in depth values perceived from two overlapping fields of views. This technique, combined with the movement readings from the gyroscope or odometer and/or the convolved function of the two sets of raw data may be used to infer a more accurate area of overlap in some embodiments. Overlapping raw data may then be combined in a similar manner as that described above for combing overlapping depth measurements. Accordingly, some embodiments do not require that raw data collected by the sensor be translated into depth measurements or other processed data (which is not to imply that "raw data" may not undergo at least some processing between when values are sensed by a sensor and when the raw data is subject to the above techniques, for instance, charges on charge-coupled image sensors may be serialized, normalized, filtered, and otherwise transformed without taking the result out of the ambit of "raw data").

In some embodiments, prior to perceiving depths within a next field of view, an adjustment range may be calculated based on expected noise, such as measurement noise, robot movement noise, and the like. The adjustment range may be applied with respect to depths perceived within a previous field of view and is the range within which overlapping depths from the next field of view are expected to fall within. In another embodiment, a weight may be assigned to each perceived depth. The value of the weight may be determined based on various factors, such as quality of the reading, the perceived depth's position with respect to the adjustment range, the degree of similarity between depths recorded from separate fields of view, the weight of neighboring depths, or the number of neighboring depths with high weight. In some embodiments, depths with weights less than an amount (such as a predetermined or dynamically determined threshold amount) may be ignored as depths, with higher weight considered to be more accurate. In some embodiments, increased weight may be given to overlapping depths with a larger area of overlap, and less weight may be given to overlapping depths with a smaller area of overlap. In some embodiments, the weight assigned to readings may be proportional to the size of the overlap area identified. For example, data points corresponding to a moving object captured in one or two frames overlapping with several other frames captured without the moving object may be assigned a low weight as they likely do not fall within the adjustment range and are not consistent with data points collected in other overlapping frames and would likely be rejected for having low assigned weight.

In embodiments, structure of data used in inferring depths may have various forms. For instance, several off-the-shelf depth perception devices express measurements as a matrix of angles and depths to the perimeter. Measurements may include, but are not limited to (which is not to suggest that any other description is limiting), various formats indicative of some quantified property, including binary classifications of a value being greater than or less than some threshold, quantized values that bin the quantified property into increments, or real number values indicative of a quantified property. For example, a matrix containing pixel position, color, brightness, and intensity or a finite ordered list containing x, y position and norm of vectors measured from the camera to objects in a two-dimensional plane or a list containing time-of-flight of light signals emitted in a two-dimensional plane between camera and objects in the environment. Some traditional techniques may use that data to create a computationally expensive occupancy map. In contrast, some embodiments implement a less computationally expensive approach for creating a map whereby, in some cases, the output matrix of depth cameras, any digital camera (e.g., a camera without depth sensing), or other depth perceiving devices (e.g., ultrasonic or laser range finders) may be used. In some embodiments, pixel intensity of captured images is not required. In some cases, the resulting map may be converted into an occupancy map.

For ease of visualization, data from which depth is inferred may be converted and reported in the format of millimeters or inches of depth, however, this is not a requirement, which is not to suggest that other described features are required. For example, pixel intensities from which depth may be inferred may be converted into meters of depth for ease of visualization, or they may be used directly given that the relation between pixel intensity and depth is known. To reduce computational expense, the extra step of converting data from which depth may be inferred into a specific format may be eliminated, which is not to suggest that any other feature here may not also be omitted in some embodiments. The methods of perceiving or otherwise inferring depths and the formats of reporting depths used herein are for illustrative purposes and are not intended to limit the invention, again which is not to suggest that other descriptions are limiting. Depths may be perceived (e.g., measured or otherwise inferred) in any form and be reported in any format. For example, a camera installed on a robot may perceive depths from the camera to objects within a first field of view. Depending on the type of depth perceiving device used, depth data may be perceived in various forms. In one embodiment, the depth perceiving device may measure a vector to the perceived object and calculate the Euclidean norm of each vector, representing the depth from the camera to objects within the first field of view. The $L^P$ norm is used to calculate the Euclidean norm from the vectors, mapping them to a positive scalar that represents the depth from the camera to the observed object. The $L^P$ norm is given by $\|x\|_P=(\Sigma_i|x_i|^P)^{1/P}$ whereby the Euclidean norm uses P=2. In some embodiments, this data structure maps the depth vector to a feature descriptor to improve frame stitching, as described, for example, in U.S. patent application Ser. No. 15/954,410, the entire contents of which are hereby incorporated by reference. In some embodiments, the depth perceiving device may infer depth of an object based on the time required for a light to reflect off of the object and return. In a further example, depth to objects may be inferred using the quality of pixels, such as brightness, intensity, and color, in captured images of the objects, and in some cases, parallax and scaling differences between images captured at different camera poses. It is noted that each step taken in the process of transforming a matrix of pixels, for example, each having a tensor of color, intensity and brightness, into a depth value in millimeters or inches is a loss and computationally expensive compression and further reduces the state space in each step when digitizing each quality. In order to reduce the loss and computational expenses, it is desired and useful to omit intermediary steps if the goal may be accomplished without them. Based on information theory principal, it may be beneficial to increase content for a given number of bits. For example, reporting depth in specific formats, such as metric units, is only necessary for human visualization. In implementation, such steps may be avoided to save computational expense and loss of information. The amount of compression and the amount of information captured and processed is a trade-off, which a person of ordinary skill in the art may balance to get the desired result with the benefit of this disclosure.

Some embodiments described afford a method and apparatus for combining perceived depths from cameras or any other depth perceiving device(s), such as a depth sensor comprising, for example, an image sensor and IR illuminator, to construct a map. Cameras may include depth cameras, such as but not limited to, stereo depth cameras or structured light depth cameras or a combination thereof. A CCD or CMOS camera positioned at an angle with respect to a horizontal plane combined with an IR illuminator, such as an IR point or line generator, projecting IR dots or lines or any other structured form of light (e.g., an IR gradient, a point matrix, a grid, etc.) onto objects within the environment sought to be mapped and positioned parallel to the horizontal plane may also be used to measure depths. Other configurations are contemplated. For example, the camera may be positioned parallel to a horizontal plane (upon which the robot translates) and the IR illuminator may be positioned at an angle with respect to the horizontal plane or both the camera and IR illuminator are positioned at angle with respect to the horizontal plane. Various configurations may be implemented to achieve the best performance when using a camera and IR illuminator for measuring depths. Examples of cameras which may be used are the OmniPixel3-HS camera series from OmniVision Technologies Inc. or the UCAM-II JPEG camera series by 4D Systems Pty Ltd. Any other depth perceiving device may also be used including but not limited to ultrasound and sonar depth perceiving devices. Off-the-shelf depth measurement devices, such as depth cameras, may be used as well. Different types of lasers may be used, including but not limited to edge emitting lasers and surface emitting lasers. In edge emitting lasers the light emitted is parallel to the wafer surface and propagates from a cleaved edge. With surface emitting lasers, light is emitted perpendicular to the wafer surface. This is advantageous as a large number of surface emitting lasers can be processed on a single wafer and an IR illuminator with a high density structured light pattern in the form of, for example, dots can improve the accuracy of the perceived depth. Several co-pending applications by the same inventors that describe methods for measuring depth may be referred to for illustrative purposes. For example, one method for measuring depth includes a laser light emitter, two image sensors and an image processor whereby the image sensors are positioned such that their fields of view overlap. The displacement of the laser light projected from the image captured by the first image sensor to the image captured by the second image sensor is extracted by the image processor and used to estimate the depth to the object onto which the laser light is projected (see, U.S. patent application Ser. No. 15/243,783). In another method two laser emitters, an image sensor and an image processor are used to measure depth. The laser emitters project light points onto an object which is captured by the image sensor. The image processor extracts the distance between the projected light points and compares the distance to a preconfigured table (or inputs the values into a formula with outputs approximating such a table) that relates distances between light points with depth to the object onto which the light points are projected (see, U.S. patent application Ser. No. 15/257,798). Some embodiments described in U.S. patent application Ser. No. 15/224,442 apply the depth measurement method to any number of light emitters, where for more than two emitters the projected light points are connected by lines and the area within the connected points is used to determine depth to the object. In a further example, a line laser positioned at a downward angle relative to a horizontal plane and coupled with an image sensor and processer are used to measure depth (see, U.S. patent application Ser. No. 15/674,310). The line laser projects a laser line onto objects and the image sensor captures images of the objects onto which the laser line is projected. The image processor determines distance to objects based on the position of the laser line as projected lines appear lower as the distance to the surface on which the laser line is projected increases.

The angular resolution of perceived depths may be varied in different implementations but generally depends on the camera resolution, the illuminating light, and the processing power for processing the output. For example, if the illuminating light generates distinctive dots very close to one another, the resolution of the device is improved. The algorithm used in generating the vector measurement from the illuminated pixels in the camera may also have an impact on the overall angular resolution of the measurements. In some embodiments, depths may be perceived in one-degree increments. In other embodiments, other incremental degrees may be used depending on the application and how much resolution is needed for the specific task or depending on the robot and the environment it is running in. For robots used within consumer homes, for example, a low-cost, low-resolution camera can generate enough measurement resolution. For different applications, cameras with different resolutions may be used. In some depth cameras, for example, a depth measurement from the camera to an obstacle in the surroundings is provided for each angular resolution in the field of view.

In some embodiments, the accuracy of the map may be confirmed when the locations at which contact between the robot and perimeter coincides with the locations of corresponding perimeters in the map. When the robot makes contact with a perimeter the processor of the robot checks the map to ensure that a perimeter is marked at the location at which the contact with the perimeter occurred. Where a boundary is predicted by the map but not detected, corresponding data points on the map may be assigned a lower confidence in the Bayesian approach above, and the area may be re-mapped. This method may also be used to establish ground truth of Euclidean norms. In some embodiments, a separate map may be used to keep track of the boundary discovered thereby creating another map. Two maps may be merged using different methods, such as the intersection or union of two maps. For example, in some embodiments, the union of two maps may be applied to create an extended map of the working environment with areas which may have been undiscovered in the first map and/or the second map. In some embodiments, a second map may be created on top of a previously created map in a layered fashion, resulting in additional areas of the work space which may have not been recognized in the original map. Such methods may be used, for example, in cases where areas are separated by movable obstacles that may have prevented the robot from determining the full map of the working environment and in some cases, completing an assigned task. For example, a soft curtain may act as a movable object that appears as a wall in a first map. In this case, a second map may be created on top of the previously created first map in a layered fashion to add areas to the original map which may have not been previously discovered. The processor of the robot may then recognize (e.g., determine) the area behind the curtain that may be important (e.g., warrant adjusting a route based on) in completing an assigned task.

Figure 47A:
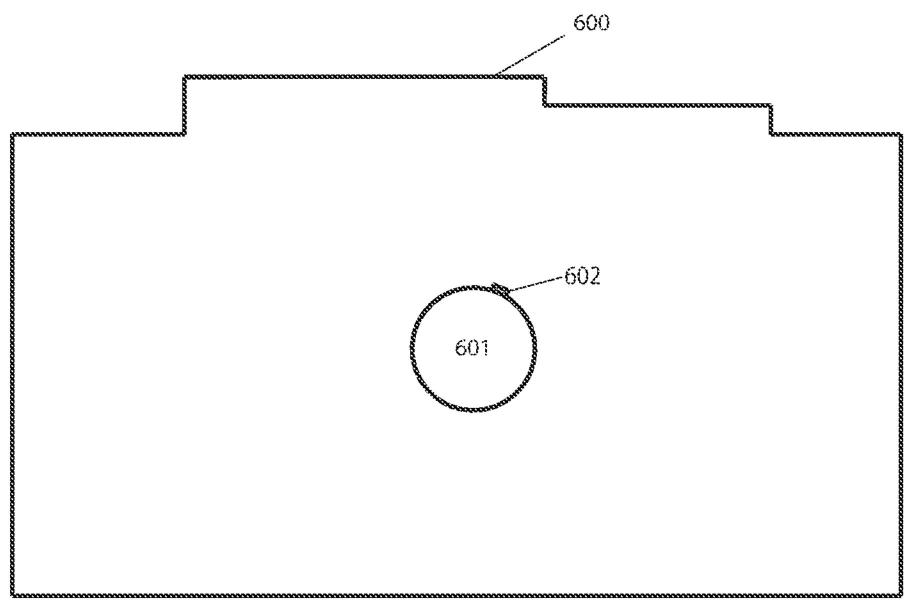
FIG. 47A illustrates a complete 2D floor plan constructed from depths perceived within consecutively overlapping fields of view.
Figure 47B:
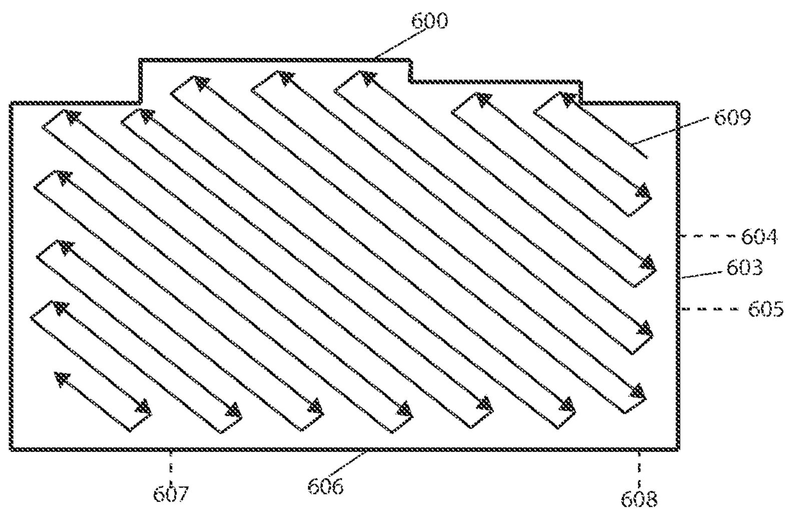
FIGS. 47B and 47C illustrate examples of updated 2D floor plans after discovery of new areas during verification of perimeters.
Figure 47C:
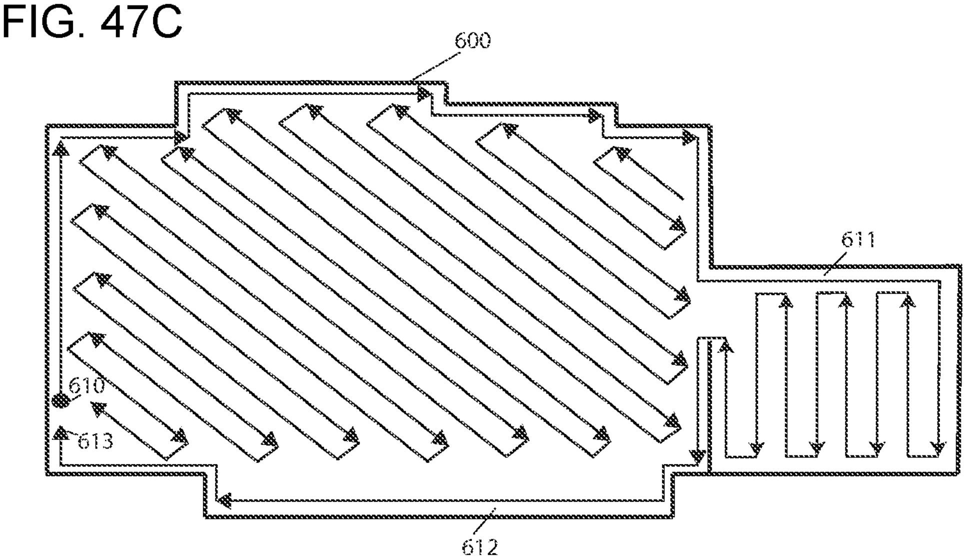

FIG. 47A illustrates a complete 2D map 600 constructed using depths perceived in 2D within consecutively overlapping fields of view. In another embodiment, 2D map 600 may be constructed using depths perceived in 3D. 2D map 600 may, for example, be used by robot 601 with mounted camera 602 to autonomously navigate throughout the working environment during operation. In FIG. 47B, initial map 600 includes perimeter segment 603 extending from dashed line 604 to dashed line 605 and perimeter segment 606 extending from dashed line 607 to 608, among the other segments combined to form the entire perimeter shown. Based on initial map 600 of the working environment, coverage path 609 covering central areas of the environment may be devised and executed for cleaning. Upon completion of coverage path 609, the robot may cover the perimeters for cleaning while simultaneously verifying the mapped perimeters using at least one depth sensor and/or tactile sensor of the robot, beginning at location 610 in FIG. 47C. As the robot follows along the perimeter, area 611 beyond previously mapped perimeter segment 603 is discovered. This may occur if, for example, a door in the location of perimeter segment 603 was closed during initial mapping of the working environment. Newly discovered area 611 may then be covered by the robot as is shown in FIG. 47C, after which the robot may return to following along the perimeter. As the robot continues to follow along the perimeter, area 612 beyond previously mapped perimeter segment 606 is discovered. This may occur if, for example, a soft curtain in the location of perimeter segment 606 is drawn shut during initial mapping of the working environment. Newly discovered area 612 may then be covered by the robot as is shown in FIG. 47C, after which the robot may return to following along the perimeter until reaching an end point 613. In some embodiments, the newly discovered areas may be stored in a second map separate from the initial map. In some embodiments, the two maps may be overlaid.

In one embodiment, construction of the map is complete after the robot has made contact with all perimeters and confirmed that the locations at which contact with each perimeter was made coincides with the locations of corresponding perimeters in the map. In some embodiments, a conservative coverage algorithm may be executed to cover the internal areas of the map before the robot checks if the observed perimeters in the map coincide with the true perimeters of the environment. This ensures more area is covered before the robot faces challenging areas such as perimeter points and obstacles.

Figure 48A:
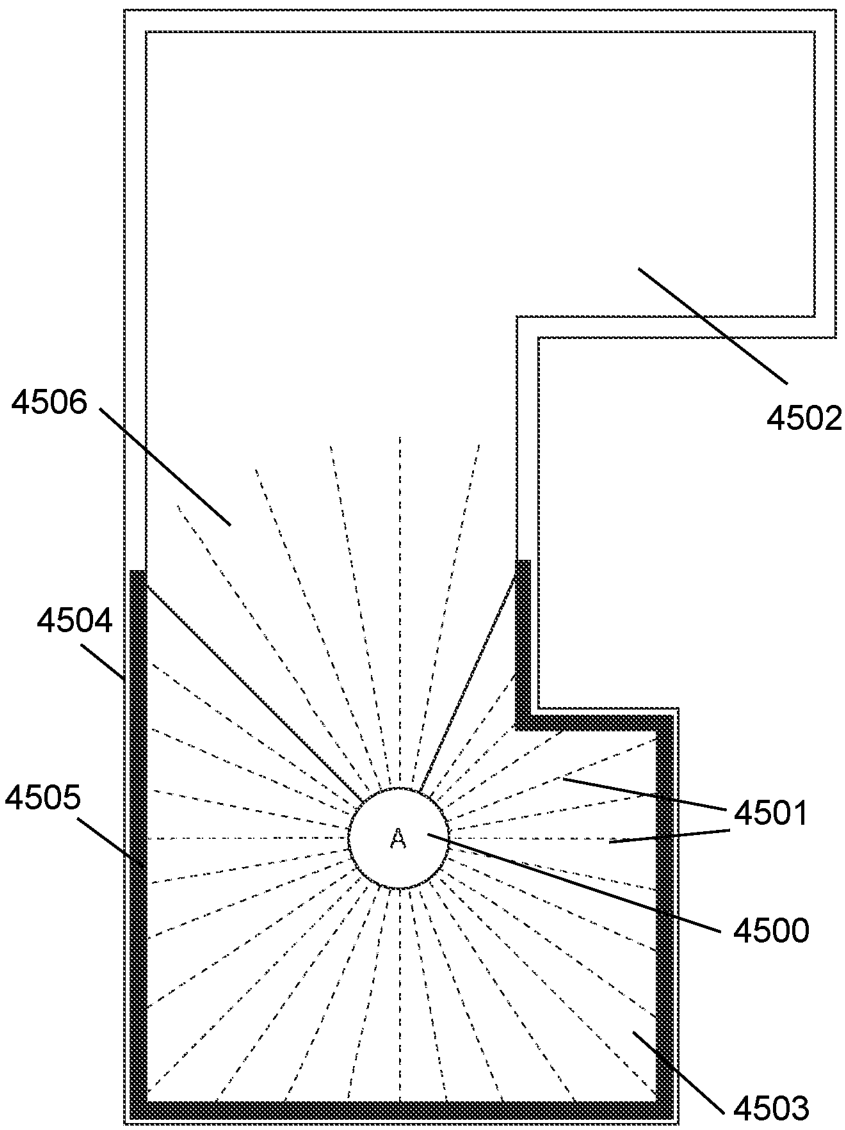
FIGS. 48A-48C illustrate an example of a method for generating a map, according to some embodiments.
Figure 48B:
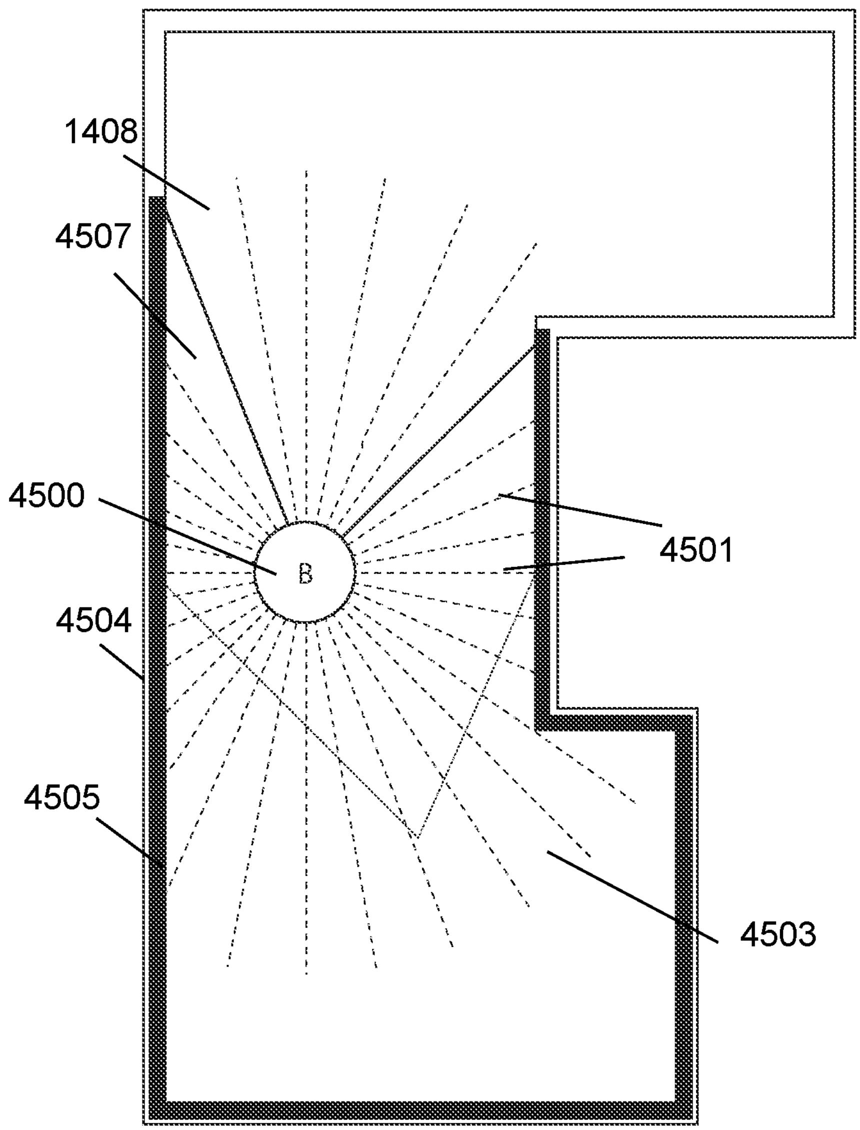
Figure 48C:
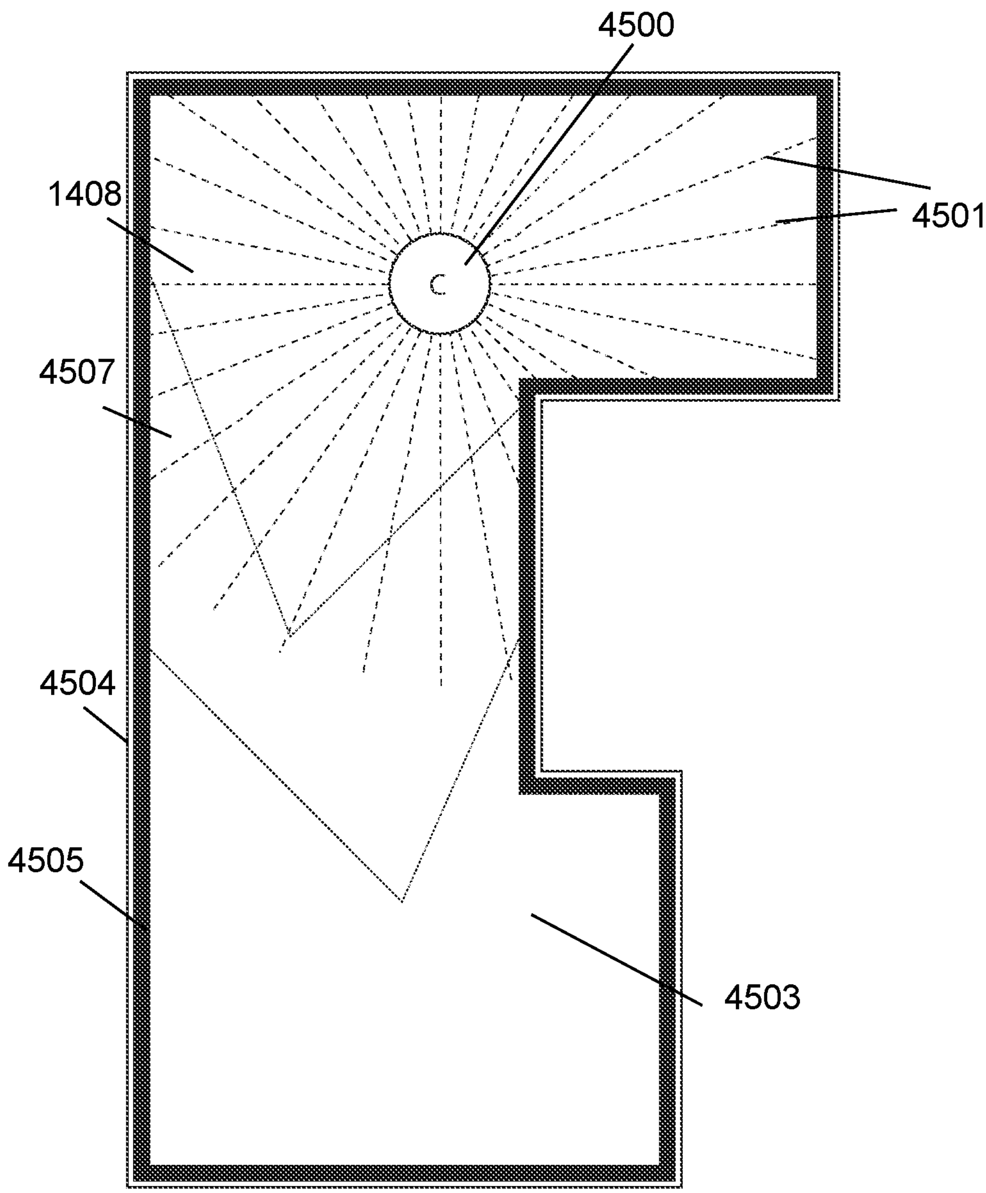

In some embodiments, the processor of the robot progressively generates the map as new sensor data is collected. For example, FIG. 48A illustrates robot 4500 at a position A and 360 degrees depth measurements 4501 (dashed lines emanating from robot 4500) taken by a sensor of the robot 4500 of environment 4502. Depth measurements 4501 within area 4503 measure depths to perimeter 4504 (thin black line) of the environment, from which the processor generates a partial map 4505 (thick black line) with known area 4503. Depth measurements 4501 within area 4506 return maximum or unknown distance as the maximum range of the sensor does not reach a perimeter 4504 off of which it may reflect to provide a depth measurement. Therefore, only partial map 4505 including known area 4503 is generated due limited observation of the surroundings. In some embodiments, the map is generated by stitching images together. In some cases, the processor may assume that area 4506, wherein depth measurements 4501 return maximum or unknown distance, is open but cannot be very sure. FIG. 48B illustrates the robot 4500 after moving to position B. Depth measurements 4501 within area 4507 measure depths to perimeter 4504, from which the processor updates partial map 4505 to also include perimeters 4504 within area 4507 and area 4507 itself. Some depth measurements 4501 to perimeter 4504 within area 4503 are also recorded and may be added to partial map 4505 as well. In some cases, the processor stitches the new images captured from positioned B together then stitches the stitched collection of images to partial map 4505. In some cases, a multi-scan approach that stitches together consecutive scans and then triggers a map fill may improve map building rather than considering only single scan metrics before filling the map with or discarding sensor data. As before, depth measurements 4501 within area 4508 and some within previously observed area 4503 return maximum or unknown distance as the range of the sensor is limited and does not reach perimeters 4501 within area 4508. In some cases, information gain is not linear, as illustrated in FIGS. 48A and 48B, wherein the robot first discovers larger area 4503 then smaller area 4507 after traveling from position A to B. FIG. 48C illustrates the robot 4500 at position C. Depth measurements 4501 within area 4508 measure depths to perimeter 4504, from which the processor updates partial map 4505 to also include perimeters 4504 within area 4508 and area 4508 itself. Some depth measurements 4501 to perimeter 4504 within area 4507 are also recorded and may be added to partial map 4505 as well. In some cases, the processor stitches the new images captured from position C together then stitches the stitched collection of images to partial map 4505. This results in a full map of the environment. As before, some depth measurements 4501 within previously observed area 4507 return maximum or unknown distance as the range of the sensor is limited and does not reach some perimeters 4501 within area 4507. In this example, the map of the environment is generated as the robot navigates within the environment. In some cases, real-time integration of sensor data may reduce accumulated error as there may be less impact from errors in estimated movement of the robot.

Figure 49A:
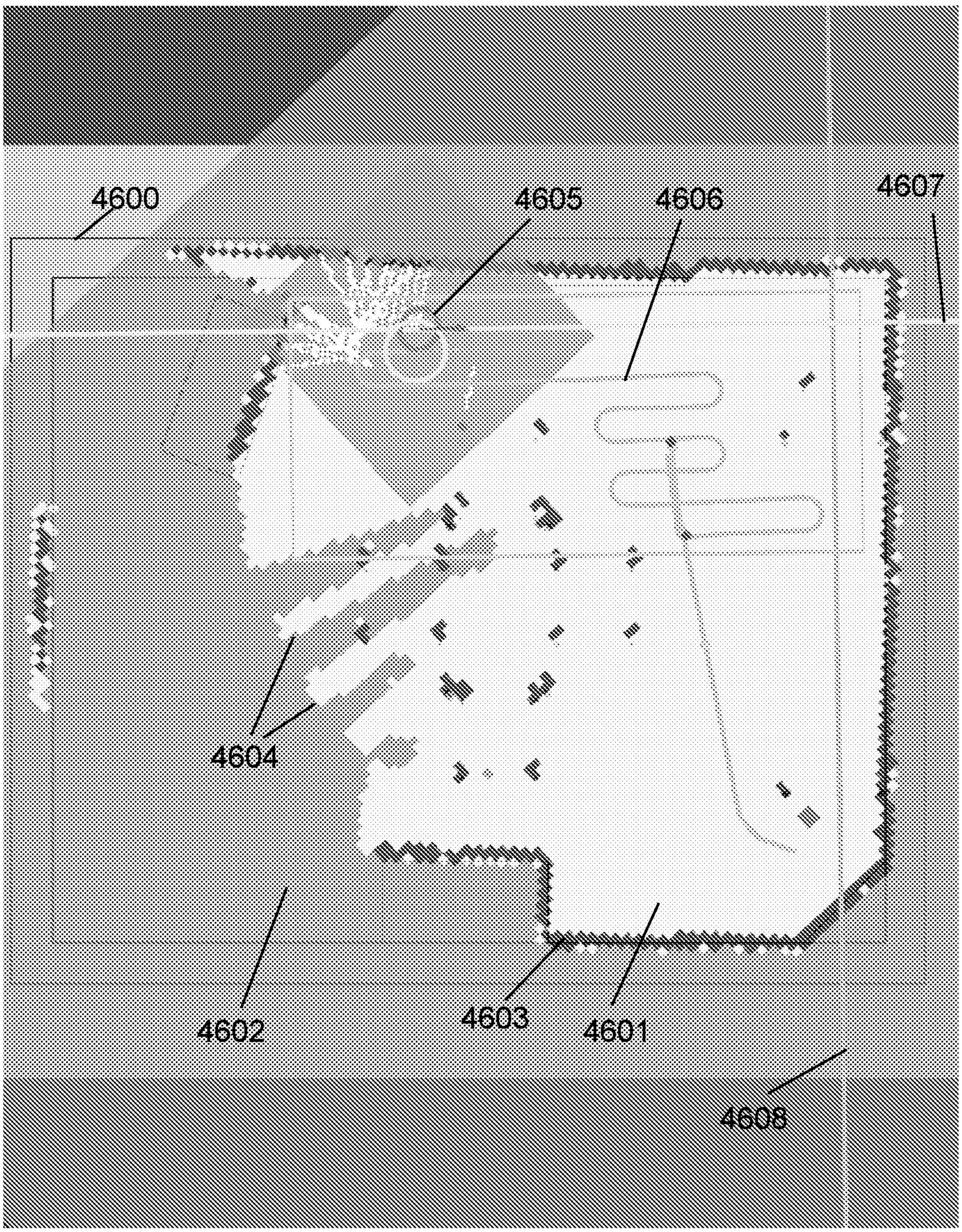
FIGS. 49A-49C illustrate an example of a global map and coverage by a robot, according to some embodiments.

In some embodiments, the processor generates a global map and at least one local map. FIG. 49A illustrates an example of a global map of environment 4600 generated by an algorithm in simulation. Grey areas 4601 are mapped areas that are estimated to be empty of obstacles, medium grey areas 4602 are unmapped and unknown areas, and black areas 4603 are obstacles. Grey areas 4601 start out small and progressively get bigger in discrete map building steps. The edge 4604 at which grey areas 4601 and medium grey areas 4602 meet form frontiers of exploration. Coverage box 4604 is the current area being covered by robot 4605 by execution of a boustrophedon pattern 4606 within coverage box 4604. In some cases, the smooth boustrophedon movement of the robot, particularly the smooth trajectory from a current to a next location while rotating 180 degrees by the time it reaches the next location, may improve efficiency as less time is wasted on multiple rotations (e.g., two separate 90 degree rotations to rotate 180 degrees). Perpendicular lines 4607 and 4608 are used during coverage within coverage box 4605. The algorithm uses the two lines 4607 and 4608 to help define the subtask for each of the control actions of the robot 4605. The robot drives parallel to the line 4607 until it hits the perpendicular line 4608, which it uses as a condition to know when its reached the edge of the coverage area or to tell the robot 4605 when to turn back. During the work session, the size and location of coverage box 4604 changes as the algorithm chooses the next area to be covered. The algorithm avoids coverage in unknown spaces (i.e. placement of a coverage box in such areas) until it has been mapped and explored. Additionally, small areas may not be large enough for dedicated coverage and wall follow in these small areas may be enough for their coverage. In some embodiments, the robot alternates between exploration and coverage. In some embodiments, the processor of the robot (i.e., an algorithm or computer code executed by the processor) first builds a global map of a first area (e.g., a bedroom) and covers that first area before moving to a next area to map and cover. In some embodiments, a user may use an application of a communication device paired with the physical robot to view a next zone for coverage or the path of the robot.

Figure 49B:
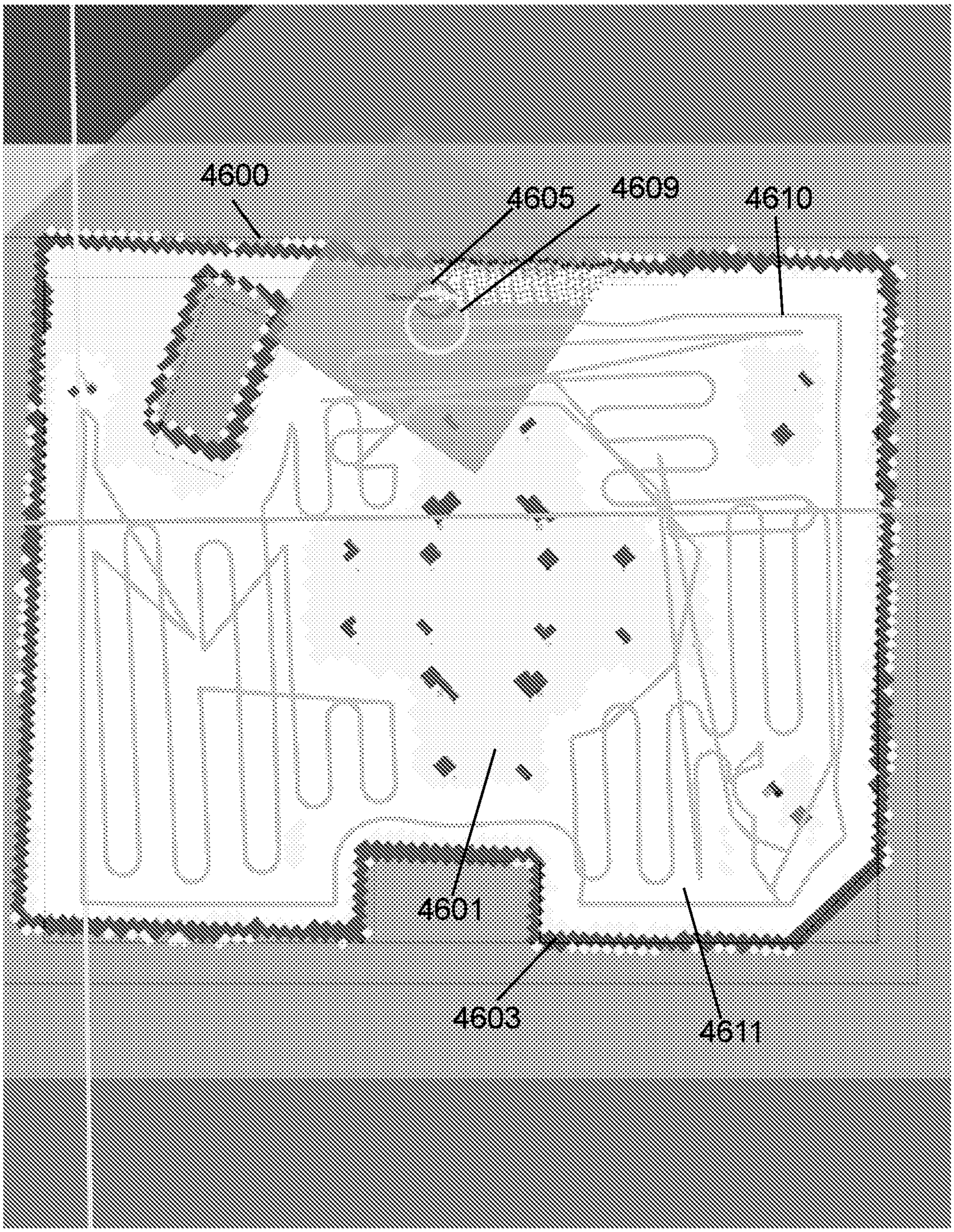
Figure 49C:
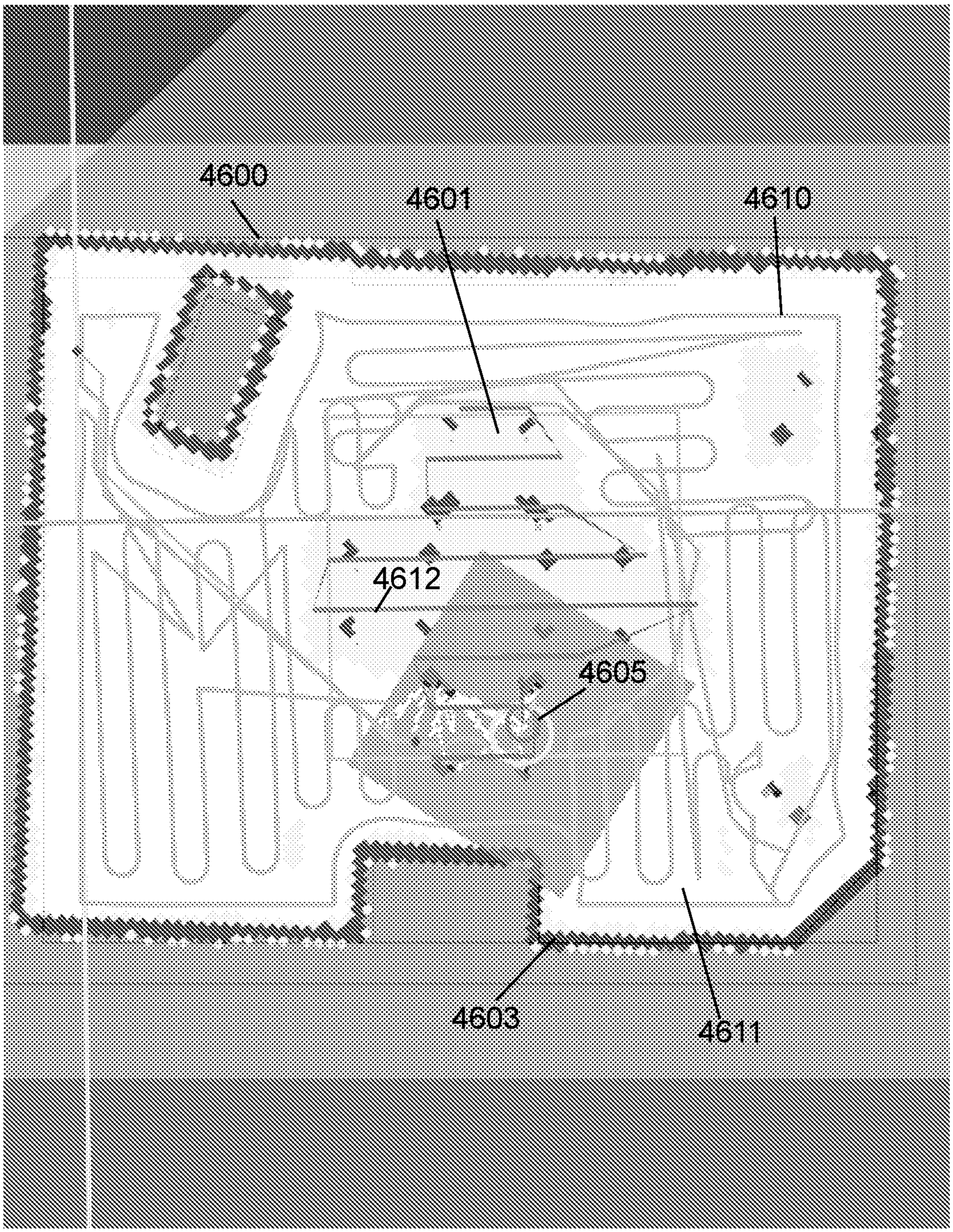

In FIG. 49B, the global map is complete as there are no medium grey areas 4602 remaining. Robot 4609 (shown as a perfect circle) is the ground truth position of the robot while robot 4605 (shown as an ellipse) is the position of the robot estimated by the algorithm. In this example, the algorithm estimates the position of the robot 4605 using wheel odometry, LIDAR sensor, and gyroscope data. The path 4610 (including boustrophedon path 4606 in FIG. 49A) is the ground truth path of the robot recorded by simulation, however, light grey areas 4611 are the areas the algorithm estimated as covered. The robot 4605 first covers low obstacle density areas (light grey areas in FIG. 49B), then performs wall follow, shown by path 4610 in FIG. 49B. At the end of the work session, the robot performs robust coverage, wherein high obstacle density areas (remaining grey areas 4601 in FIG. 49B) are selected for coverage, such as the grey area 4601 in the center of the environment, representing an area under a table. As robust coverage progresses, the robot 4605 tries to reach a new navigation goal each time by following along the darker path 4612 in FIG. 49C to the next navigation goal. In some cases, the robot may not reach its intended navigation goal as the algorithm may time out while attempting to reach the navigation goal. The darker paths 4612 used in navigating from one coverage box to the next and for robust coverage are planned offline, wherein the algorithm plans the navigation path ahead of time before the robot executes the path and the path planned is based on obstacles already known in the global map. While offline navigation may be considered static navigation, the algorithm does react to obstacles it might encounter along the way through a reactive pattern of recovery behaviors.

Figure 50:
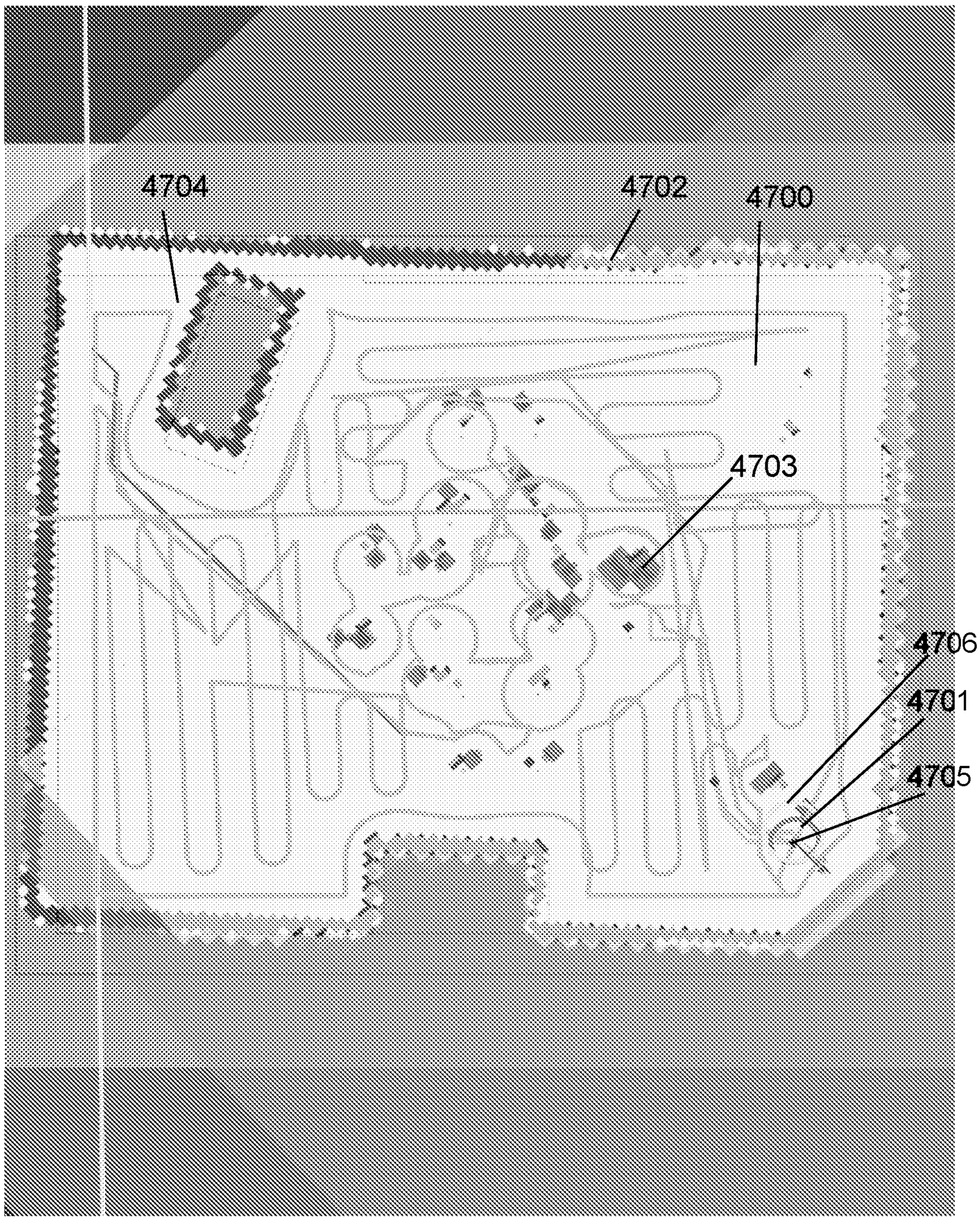
FIG. 50 illustrates an example of a LIDAR local map, according to some embodiments.

FIG. 50 illustrates an example of a LIDAR local map 4700 generated by an algorithm in simulation. The LIDAR local map 4700 follows a robot 4701, with the robot 4701 centered within the LIDAR local map 4700. The LIDAR local map 4700 is overlaid on the global map illustrated in FIGS. 49A-49C. Obstacles 4702, hidden obstacles 4703, and open areas (i.e., free space) 4704 are added into the LIDAR local map based on LIDAR scans. Hidden obstacles 4703 are added whenever there is a sensor event, such as a TSSP sensor event (i.e., proximity sensor), edge sensor event, and bumper event. Hidden obstacles are useful as the LIDAR does not always observed every obstacle. Some areas in LIDAR local map 4700 may not be mapped as the local map is limited size. In some cases, the LIDAR local map 4700 may be used for online navigation (i.e., real-time navigation), wherein a path is planned around obstacles in the LIDAR local map 4700 in real-time. For example, online navigation may be used during any of: navigating to a start point at the end of coverage, robust coverage, normal coverage, all the time, wall follow coverage, etc. In FIG. 50, the path executed by the robot 4701 to return to starting point 4705 after finishing robust coverage is planned using online navigation. During online navigation, the LIDAR local map may be updated based on LIDAR scans collected in real-time. Areas already observed by the LIDAR remain in the local map even when the LIDAR is no longer observing the area in its field of view until the areas are pushed out of the LIDAR local map due to the size of the LIDAR local map. Offset between actual location of obstacles and locations in the LIDAR local map may correspond with the offset between the position of the ground truth robot 4706 and the estimated position of the robot 4701.

In some embodiments, online navigation uses a real-time local map, such as the LIDAR local map, in conjunction with a global map of the environment for more intelligent path planning. In some cases, the global map may be used to plan a global movement path and while executing the global movement path, the processor may create a real-time local map using fresh LIDAR scans. In some embodiments, the processor may synchronize the local map with obstacle information from the global map to eliminate paths planned through obstacles. In some embodiments, the global and local map may be updated with sensor events, such as bumper events, TSSP sensor events, safety events, TOF sensor events, edge events, etc. For example, marking an edge event may prevent the robot from repeatedly visit the same edge after a first encounter. In some embodiments, the processor may check whether a next navigation goal (e.g., a path to a particular point) is safe using the local map. A next navigation goal may be considered safe if it is within the local map and at a safe distance from local obstacles, is in an area outside of the local map, or is in an area labelled as unknown. In some embodiments, wherein the next navigation goal is unsafe, the processor may perform a wave search from the current location of the robot to find a safe navigation goal that is inside of the local map and may plan a path to the new navigation goal.

Figure 51:
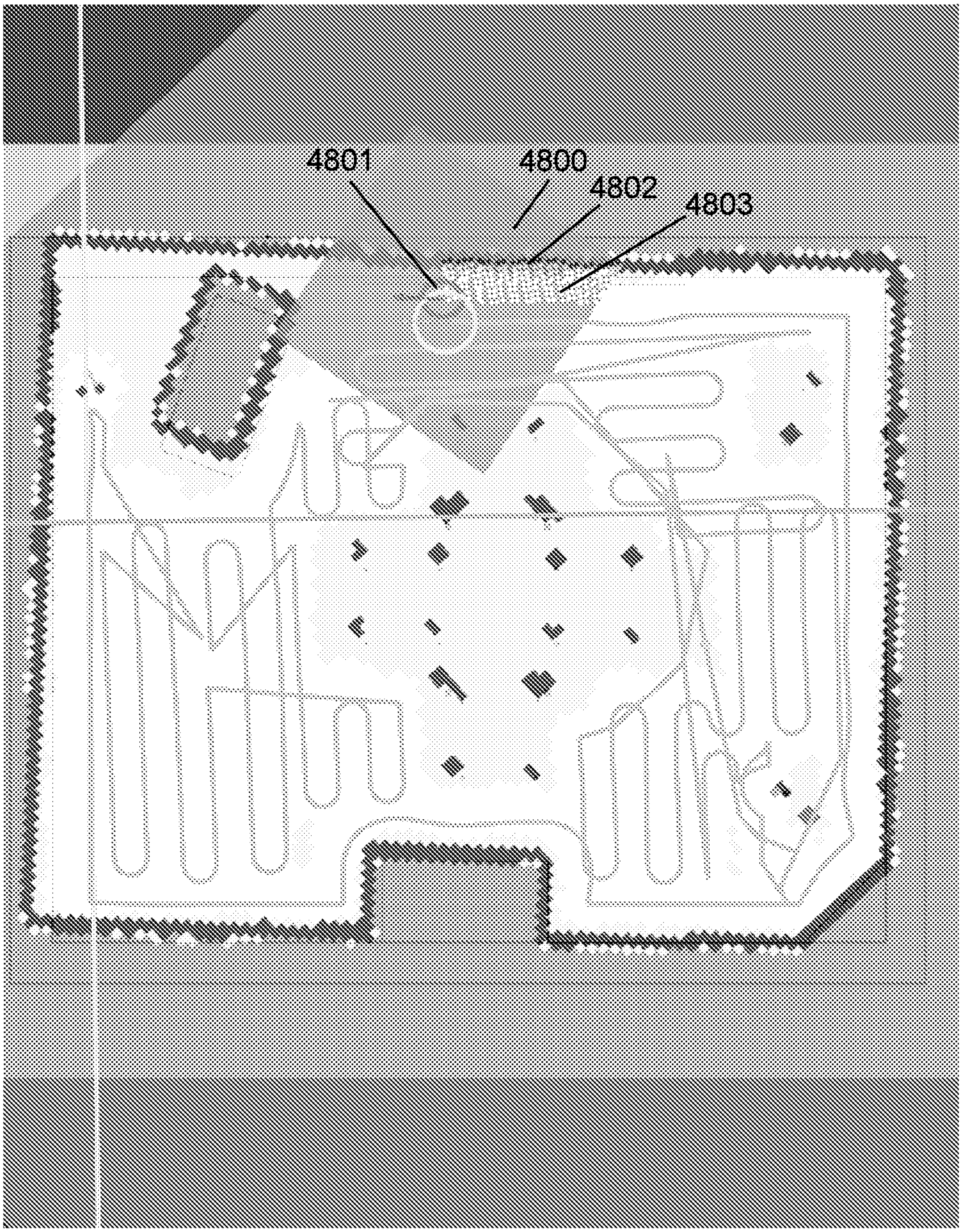
FIG. 51 illustrates an example of a local TOF map, according to some embodiments.

FIG. 51 illustrates an example of a local TOF map 4800 that is generated in simulation using data collected by TOF sensors located on robot 4801. The TOF local map is overlaid on the global map illustrated in FIGS. 49A-49C. The TOF sensors may be used to determine short range distances to obstacles. While the robot 4801 is near obstacles (e.g. the wall) the obstacles appear in the local TOF map 4800 as small black dots 4802. The white areas 4803 in the local TOF map 4800 are inferred free space within the local TOF map 4800. Given the position of TOF sensors on the robot 4801 and depending on which side of the robot a TOF sensor is triggered, a white line between the center of robot 4801 and the center of the obstacle that triggered the TOF is inferred free space. The white line is also the estimated TOF sensor distance from the center of robot 4801 to the obstacle. White areas 4803 come and go as obstacles move in and out of the fields of view of TOF sensors. In some embodiments, the local TOF map is used for wall following.

Figure 52:
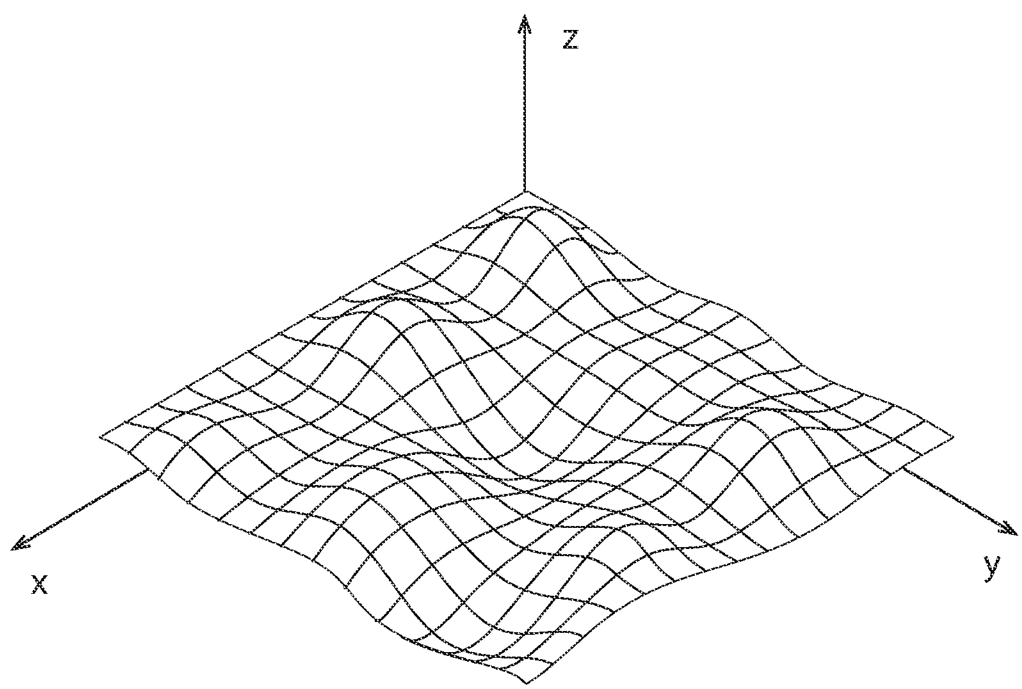
FIG. 52 illustrates an example of a multidimensional map, according to some embodiments.

In some embodiments, the map may be a state space with possible values for x, y, z. In some embodiments, a value of x and y may be a point on a Cartesian plane on which the robot drives and the value of z may be a height of obstacles or depth of cliffs. In some embodiments, the map may include additional dimensions (e.g., debris accumulation, floor type, obstacles, cliffs, stalls, etc.). For example, FIG. 52 illustrates an example of a map that represents a driving surface with vertical undulations (e.g., indicated by measurements in x-, y-, and z-directions). In some embodiments, a map filler may assign values to each cell in a map (e.g., Cartesian). In some embodiments, the value associated with each cell may be used to determine a location of the cell in a planar surface along with a height from a ground zero plane. In some embodiments, a plane of reference (e.g., x-y plane) may be positioned such that it includes a lowest point in the map. In this way, all vertical measurements (e.g., z values measured in a z-direction normal to the plane of reference) are always positive. In some embodiments, the processor of the robot may adjust the plane of reference each time a new lower point is discovered and all vertical measurements accordingly. In some embodiments, the plane of reference may be positioned at a height of the work surface at a location where the robot begins to perform work and data may be assigned a positive value when an area with an increased height relative to the plane of reference is discovered (e.g., an inclination or bump) and assigned a negative value when an area with a decreased height relative to the plane of reference is observed. In some embodiments, a map may include any number of dimensions. For example, a map may include dimensions that provide information indicating areas that were previously observed to have a high level of debris accumulation or areas that were previously difficult to traverse or areas that were previously identified by a user (e.g., using an application of a communication device), such as areas previously marked by a user as requiring a high frequency of cleaning. In some embodiments, the processor may identify a frontier (e.g., corner) and may include the frontier in the map.

Figure 53A:
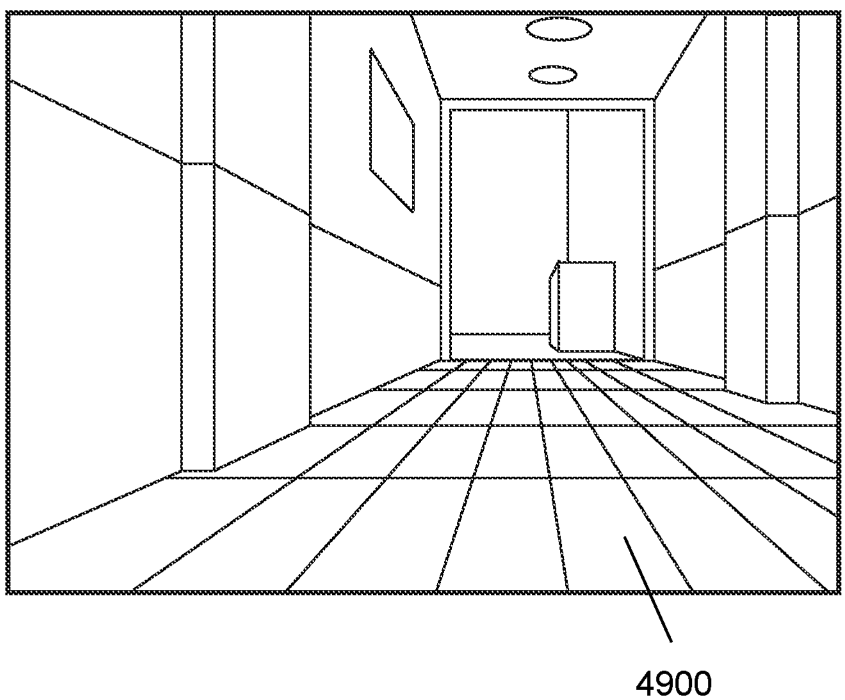
FIGS. 53A, 53B, 54A, 54B, 55A, 55B, 56A, and 56B illustrate examples of image based segmentation, according to some embodiments.
Figure 53B:
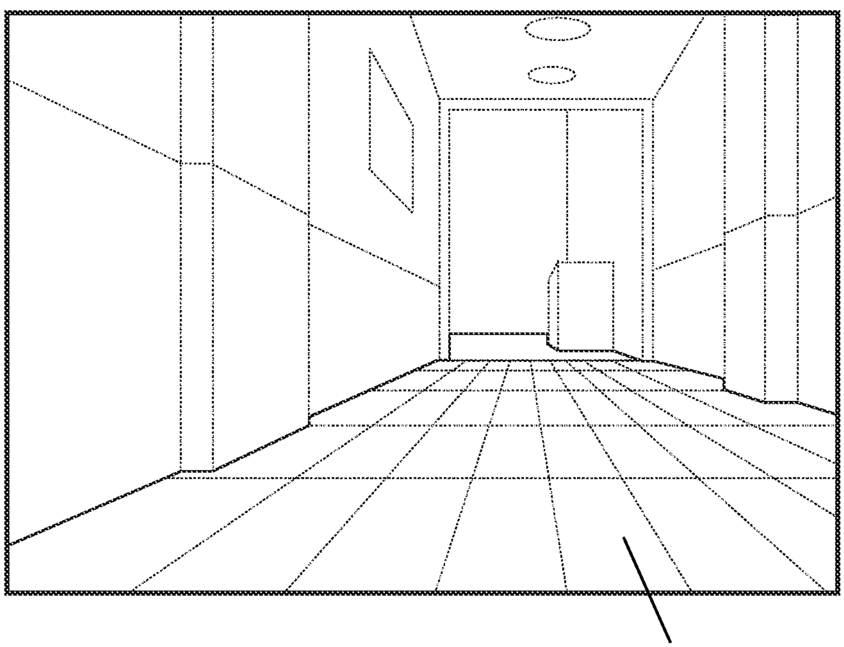
Figure 54A:
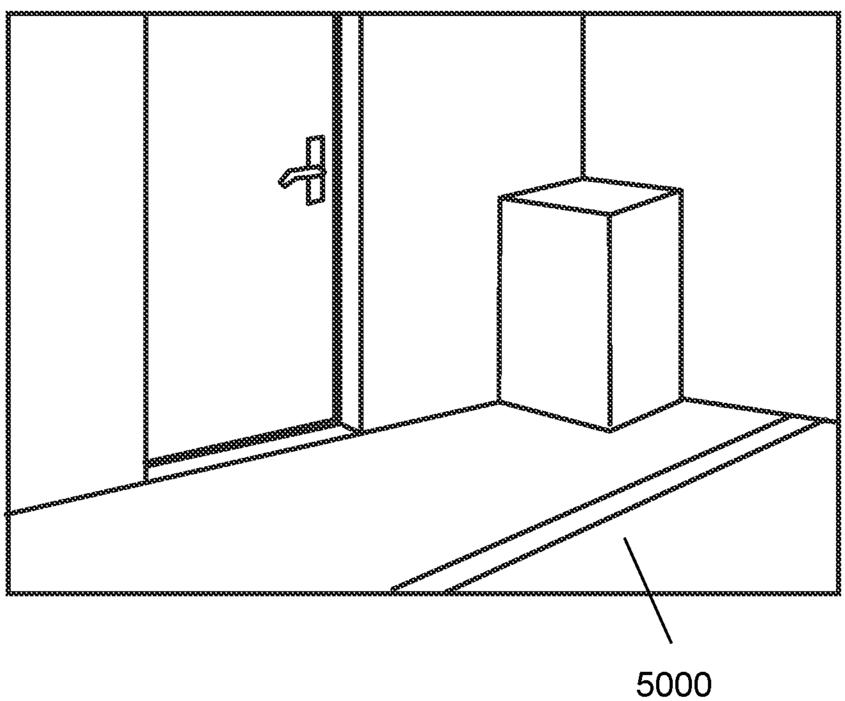
Figure 54B:
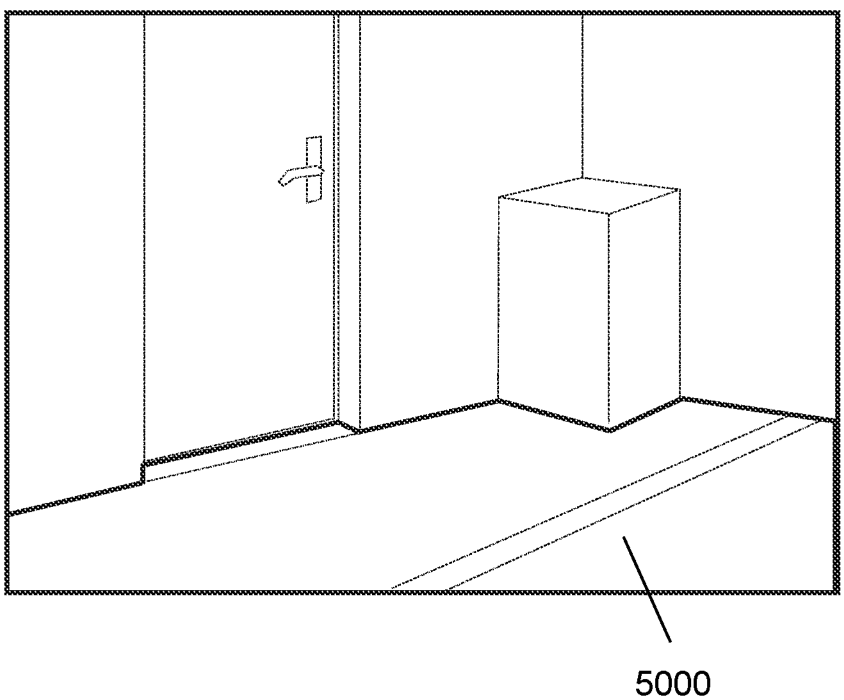
Figure 55A:
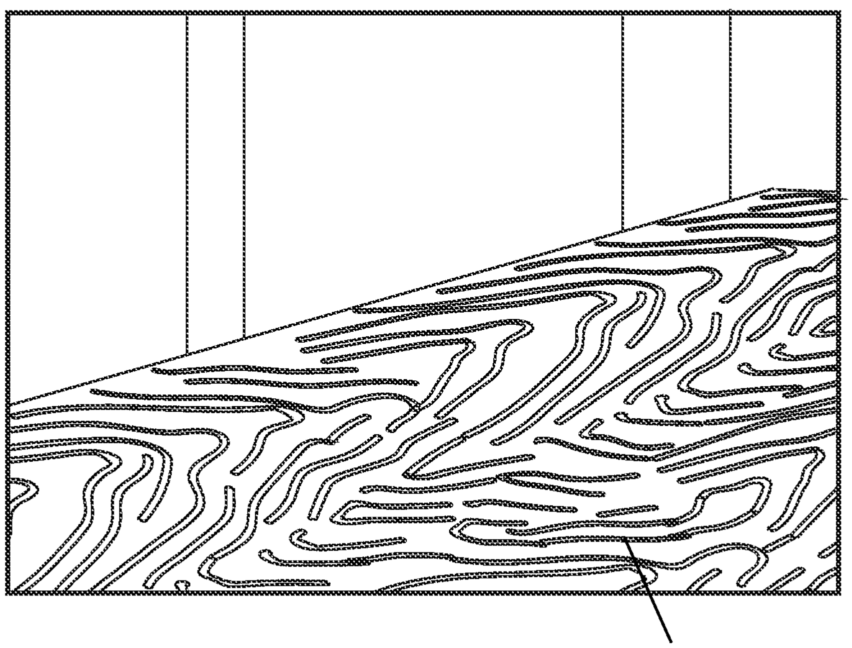
Figure 55B:
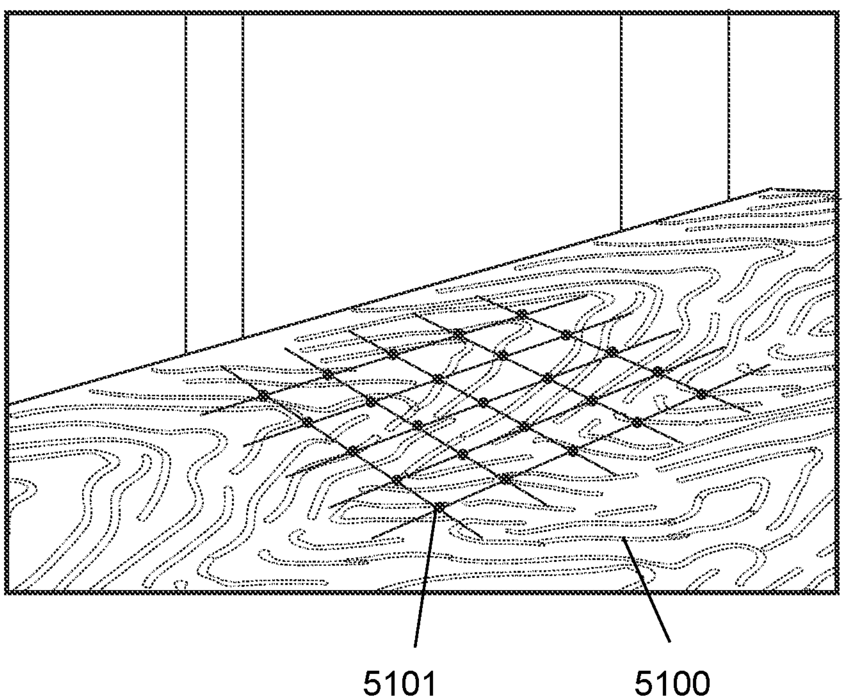
Figure 56A:
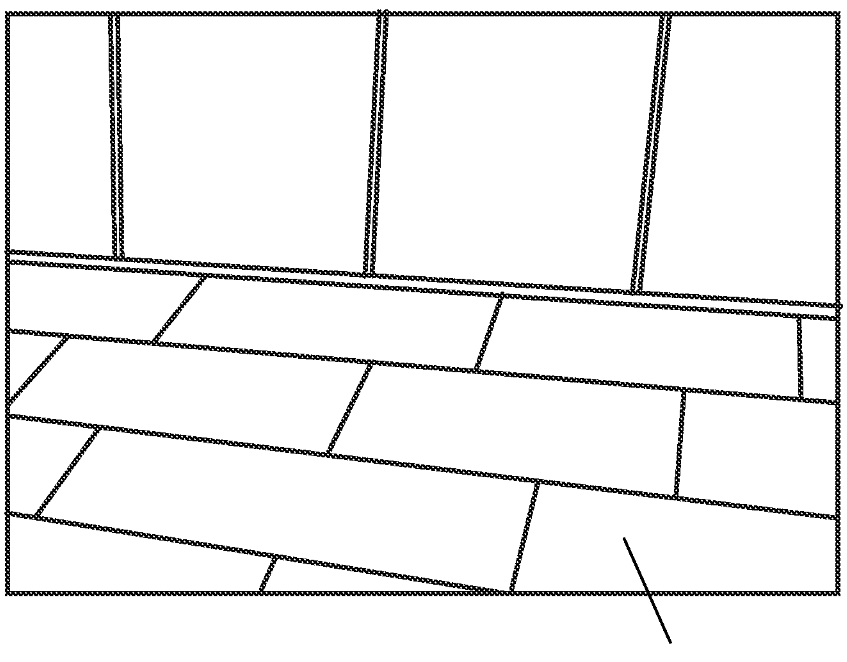
Figure 56B:
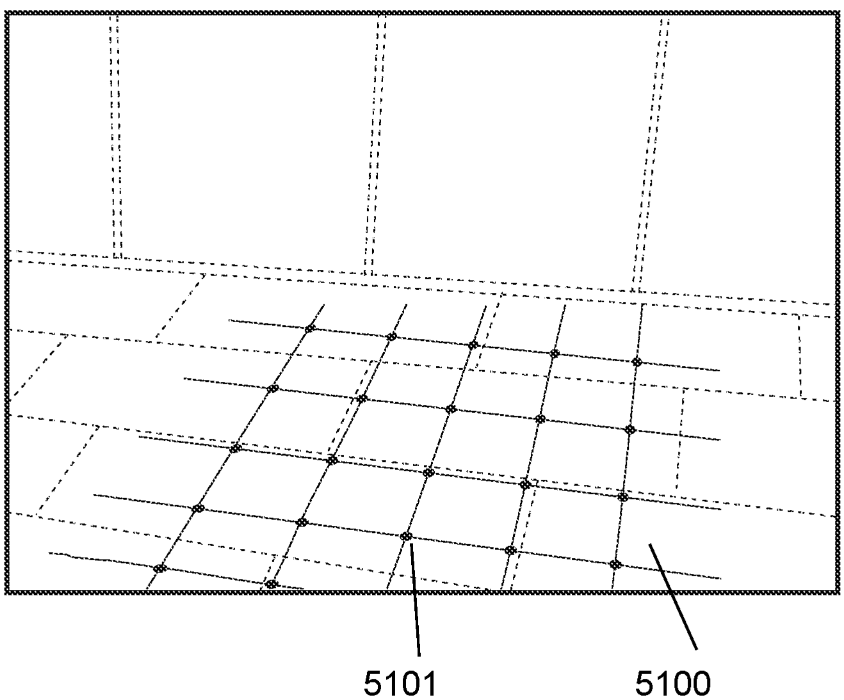

In embodiments, the map of the robot may include multiple dimensions. In some embodiments, a dimension of the map may include a type of flooring (e.g., cement, wood, carpet, etc.). The type of flooring is important as it may be used by the processor to determine actions, such as when to start or stop applying water or detergent to a surface, scrubbing, vacuuming, mopping, etc. In some embodiments, the type of flooring may be determined based on data collected by various different sensors. For example, a camera of the robot may capture an image and the processor perform a planar work surface extraction from the image, representing the floor of the environment. In some cases, the planar work surface may be divided into rooms and hallways based on arrangement of areas within the environment, visual features, or divisions chosen by a user. In some cases, the extraction may provide information about the type of flooring. In some embodiments, the processor may use image-based segmentation methods to separate objects from one another. For example, FIGS. 53A, 53B, 54A, and 54B illustrate the use of image-based segmentation for extraction of floors 4900 and 5000, respectively, from the rest of an environment. FIGS. 53A and 54A illustrate two different environments captured in an image. FIGS. 53B and 54B illustrate extractions of floors 4900 and 5000, respectively, from the rest of the environment. In some cases, the processor may detect a type of flooring (e.g., tile, marble, wood, carpet, etc.) based on patterns and other visual clues processed by the camera. For example, FIGS. 55A, 55B, 56A, and 56B illustrate examples of a grid pattern 5101 and 5201, respectively, used in helping to detect the floor type or characteristics of the corresponding floor 5100 and 5200. While the floor extraction alone may provide a guess about the type of flooring, the processor may also consider other sensing information such as data collected by floor-facing optical tracking sensors or floor distance sensors, IR sensors, electrical current sensors, etc.

Figure 57A:
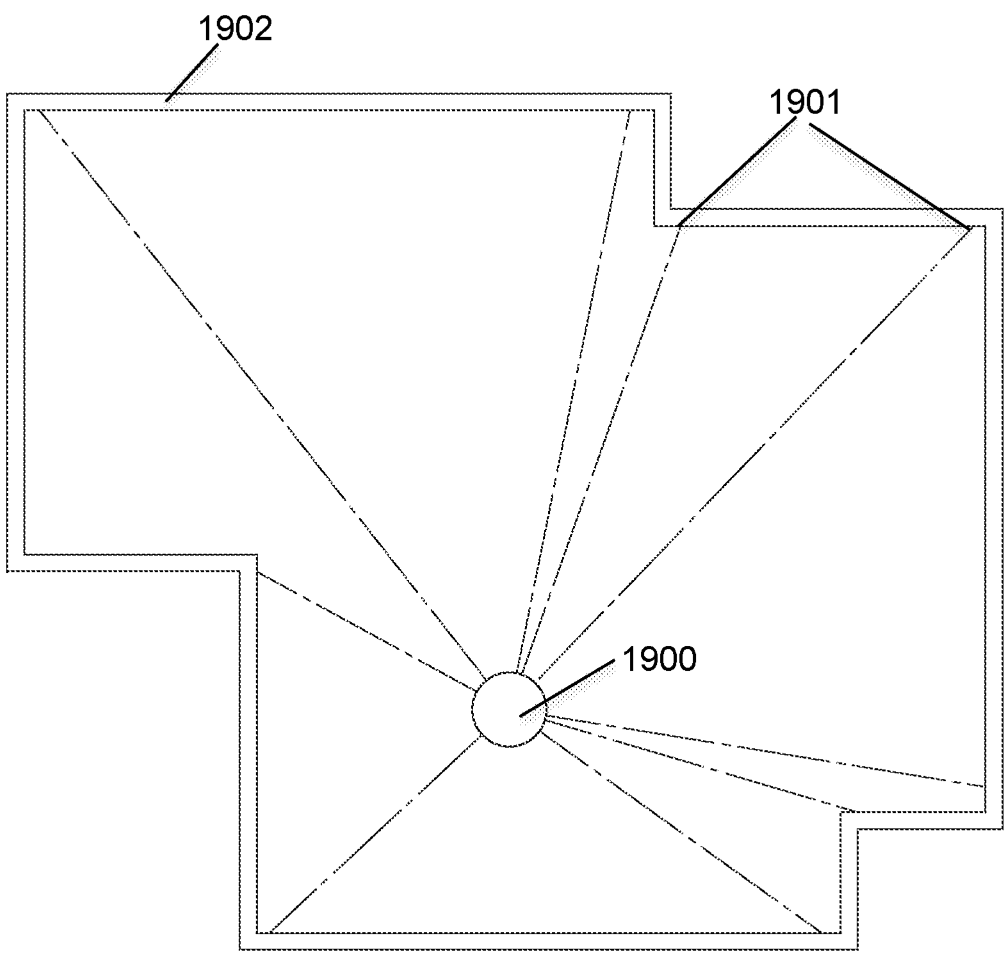
FIGS. 57A-57C illustrate generating a map from a subset of measured points, according to some embodiments.
Figure 57B:
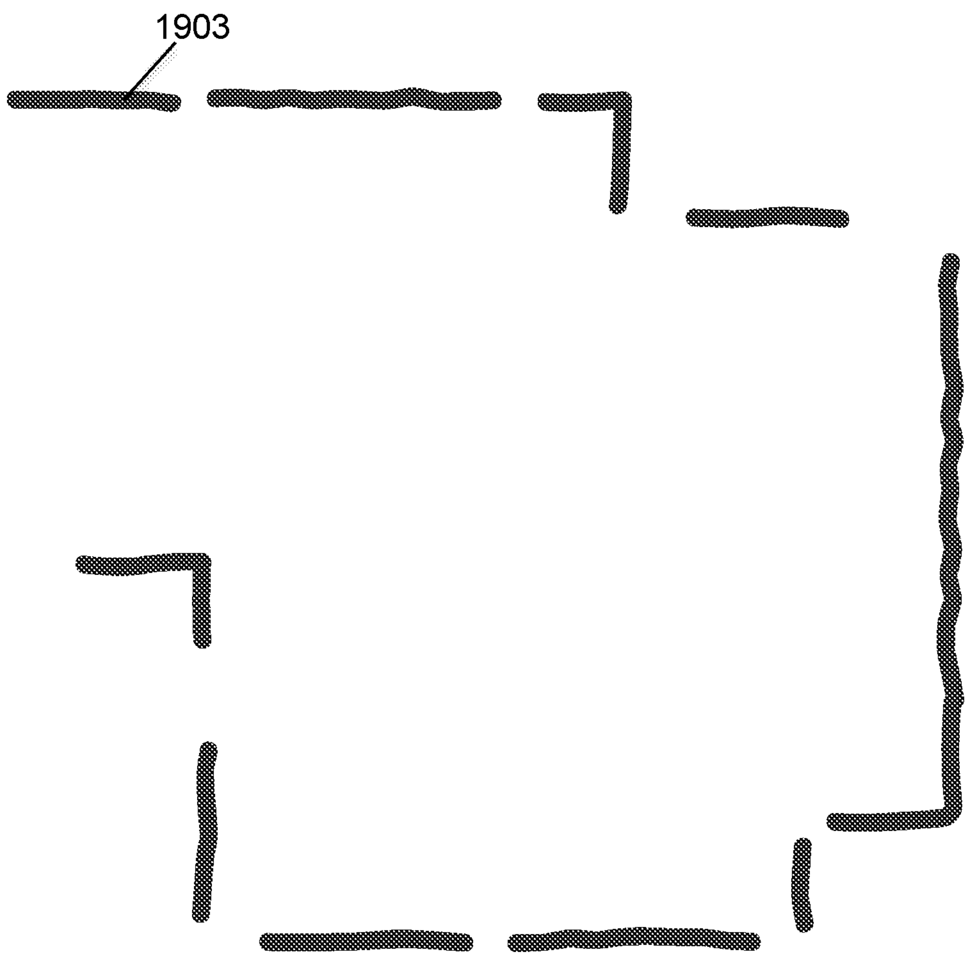
Figure 57C:
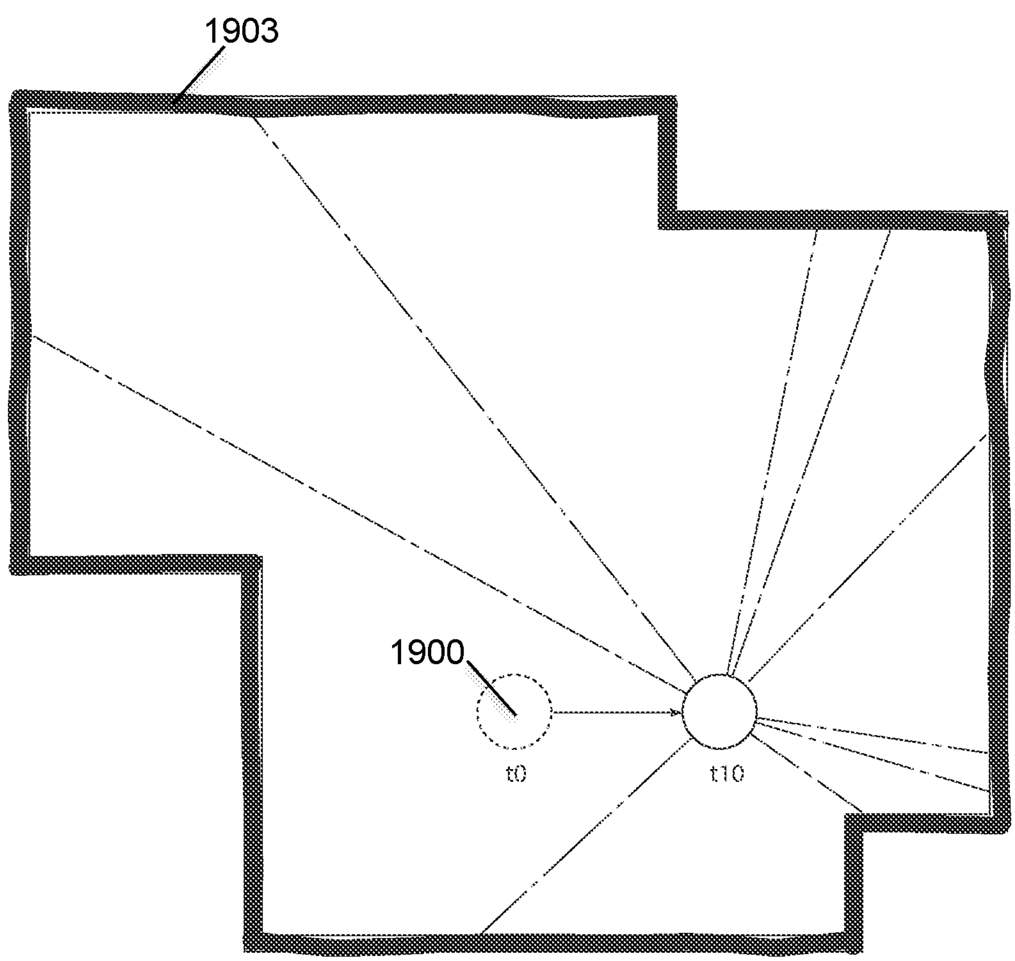

In some embodiments, depths may be measured to all objects within the environment. In some embodiments, depths may be measured to particular landmarks (e.g., some identified objects) or a portion of the objects within the environment (e.g., a subset of walls). In some embodiments, the processor may generate a map based on depths to a portion of objects within the environment. FIG. 57A illustrates an example of a robot 1900 with a sensor collecting data that is indicative of depth to a subset of points 1901 along the walls 1902 of the environment. FIG. 57B illustrates an example of a spatial model 1903 generated based on the depths to the subset of points 1901 of the environment shown in FIG. 57A, assuming the points are connected by lines. As robot 1900 moves from a first position at time $t_0$ to a second position at time $t_{10}$ within the environment and collects more data, the spatial model 1903 may be updated to more accurately represent the environment, as illustrated in FIG. 57C.

Figure 58A:
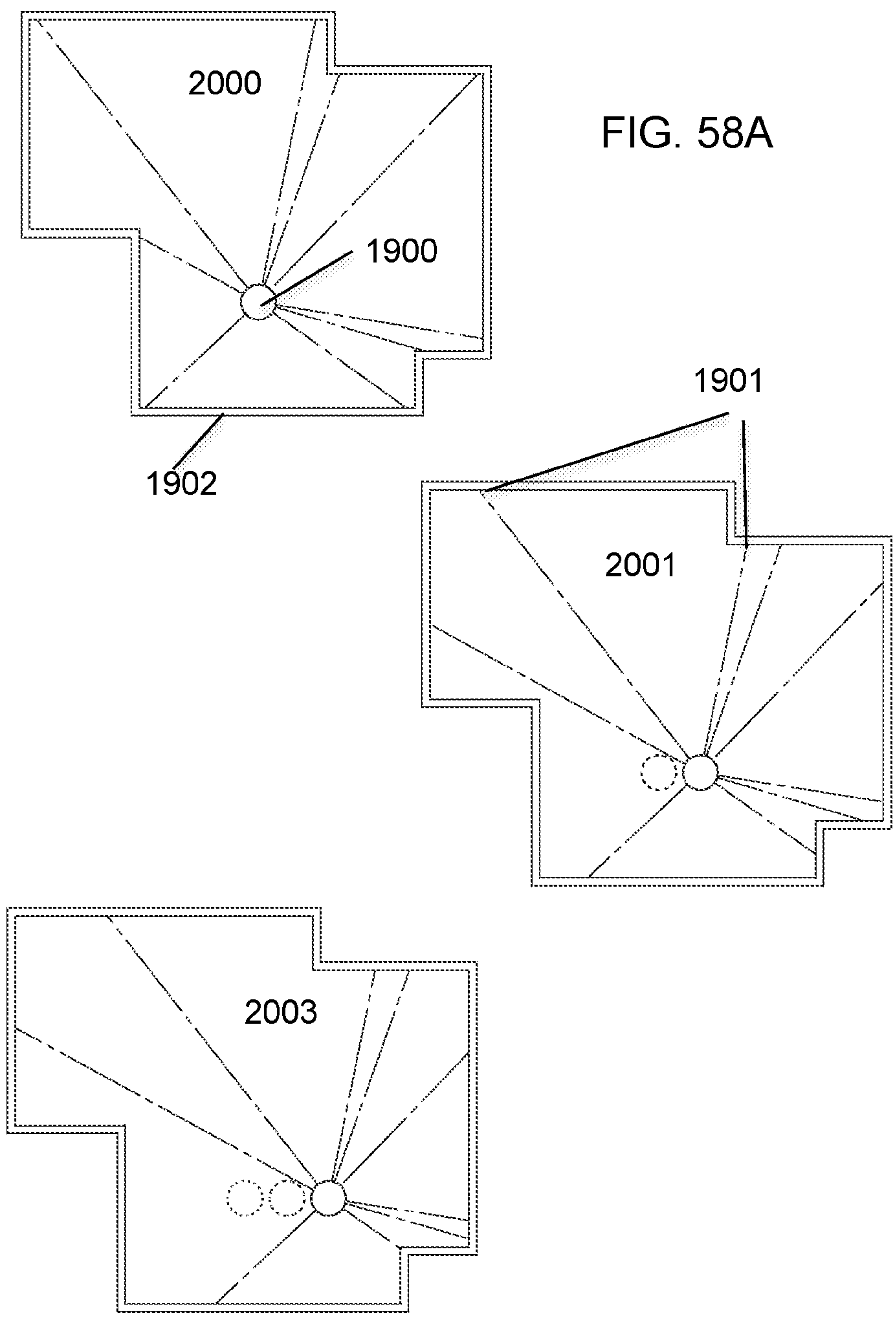
FIG. 58A illustrates the robot measuring the same subset of points over time, according to some embodiments.
Figure 58B:
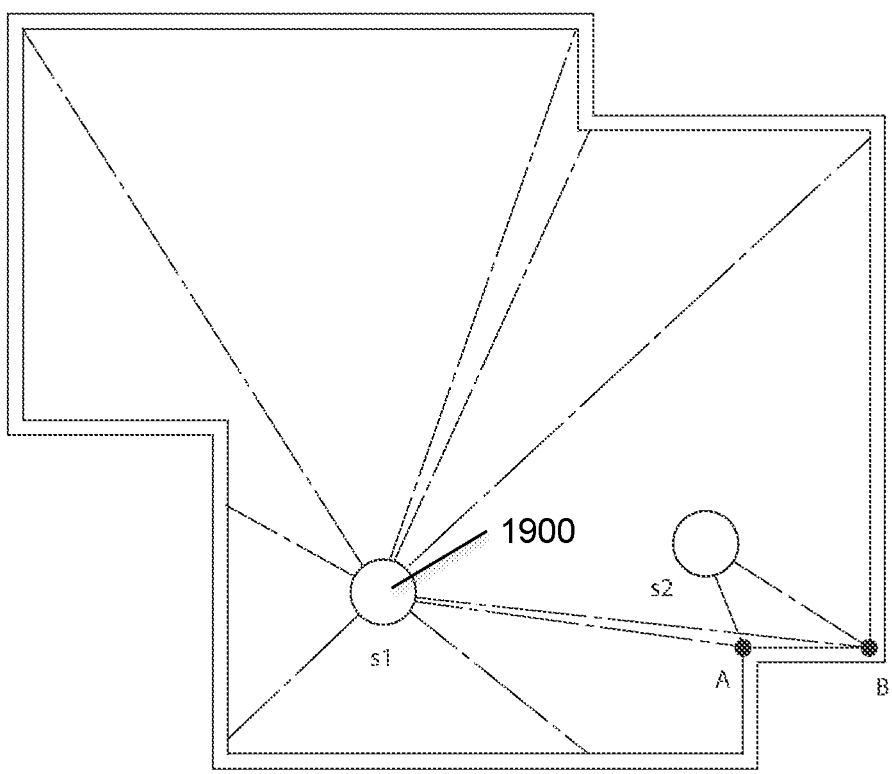
FIG. 58B illustrates the robot identifying a single particularity as two particularities, according to some embodiments.

In some embodiments, the sensor of the robot 1900 continues to collect data to the subset of points 1901 along the walls 1902 as the robot 1900 moves within the environment. For example, FIG. 58A illustrates the sensor of the robot 1900 collecting data to the same subset of points 1901 at three different times 2000, 2001, and 2002 as the robot moves within the environment. In some cases, depending on the position of the robot, two particularities may appear as a single feature (or characteristic). For example, FIG. 58B illustrates the robot 1900 at a position $s_1$ collecting data indicative of depths to points A and B. From position $s_1$ points A and B appear to be the same feature. As the robot 1900 travels to a position $s_2$ and observes the edge on which points A and B lie from a different angle, the processor of the robot 1900 may differentiate points A and B as separate features. In some embodiments, the processor of the robot gains clarity on features as it navigates within the environment and observes the features from different positions and may be able to determine if a single feature is actually two features combined.

Figure 59:
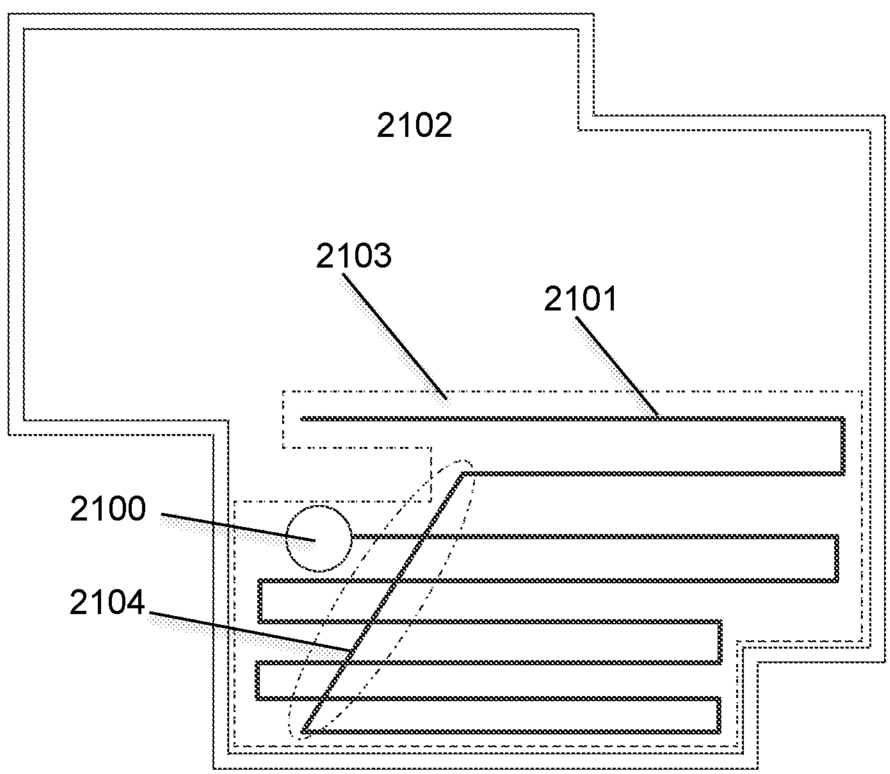
FIG. 59 illustrates a path of the robot, according to some embodiments.

In some embodiments, the path of the robot may overlap while mapping. For example, FIG. 59 illustrates a robot 2100, a path of the robot 2101, an environment 2102, and an initial area mapped 2103 while performing work. In some embodiments, the path of the robot may overlap resulting in duplicate coverage of areas of the environment. For instance, the path 2101 illustrated in FIG. 59 includes overlapping segment 2104. In some cases, the processor of the robot may discard some overlapping data from the map (or planar work surface). In some embodiments, the processor of the robot may determine overlap in the path based on images captured with a camera of the robot as the robot moves within the environment.

Figure 60A:
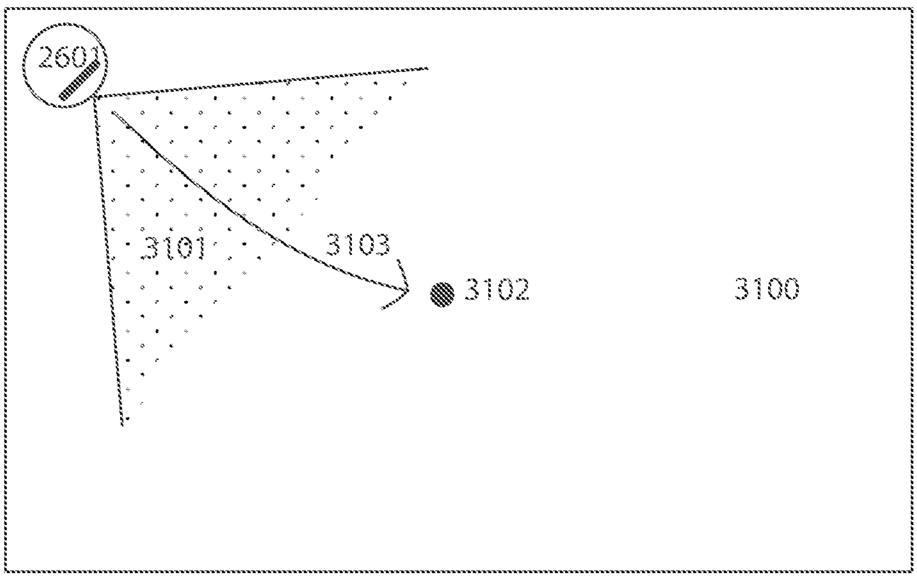
FIGS. 60A and 60B illustrate a robotic device repositioning itself for better observation of the environment, according to some embodiments.
Figure 60B:
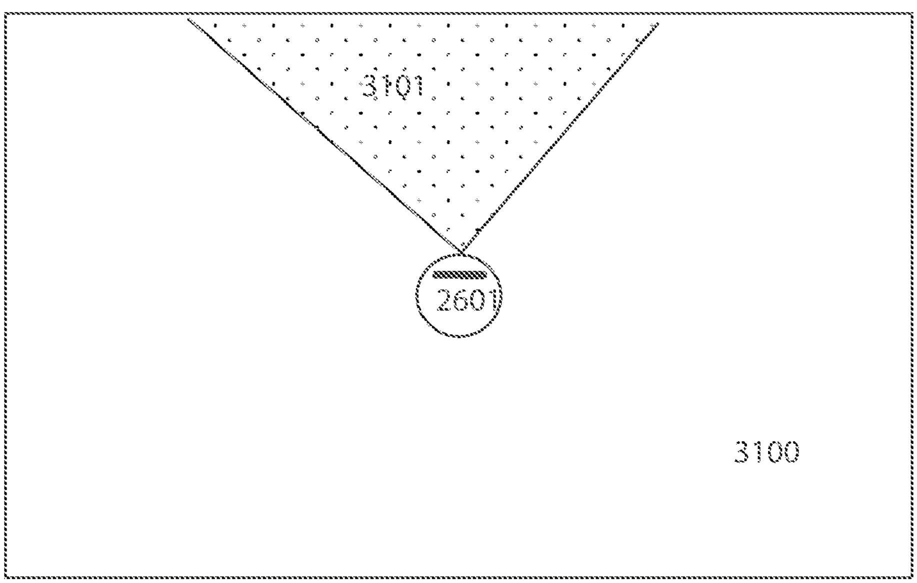

In some embodiments, the robot is in a position where observation of the environment by sensors is limited. This may occur when, for example, the robot is positioned at one end of an environment and the environment is very large. In such a case, the processor of the robot constructs a temporary partial map of its surroundings as it moves towards the center of the environment where its sensors are capable of observing the environment. This is illustrated in FIG. 60A, where robot 2601 is positioned at a corner of large room 3100, approximately 20 centimeters from each wall. Observation of the environment by sensors is limited due to the size of room 3100 wherein field of view 3101 of the sensor does not capture any features of environment 3100. A large room, such as room 3100, may be 8 meters long and 6 meters wide for example. The processor of robot 2601 creates a temporary partial map using sensor data as it moves towards center 3102 of room 3100 in direction 3103. In FIG. 60B robot 2601 is shown at the center of room 3100 where sensors are able to observe features of environment 3100.

In some embodiments, the processor may extract lines that may be used to construct the environment of the robot. In some cases, there may be uncertainty associated with each reading of a noisy sensor measurement and there may be no single line that passes through the measurement. In such cases, the processor may select the best possible match, given some optimization criterion. In some cases, sensor measurements may be provided in polar coordinates, wherein $x_i=(\rho_i, \theta_i)$. The processor may model uncertainty associated with each measurement with two random variables, $X_i=(P_i, Q_i)$. To satisfy the Markovian requirement, the uncertainty with respect to the actual value of P and Q must be independent, wherein $E[P_i \cdot P_j]=E[P_i]E[P_j]$, $E[Q_i \cdot Q_j]=E[Q_i]E[Q_j]$, and $E[P_i \cdot Q_j]=E[P_i]E[Q_j]$, $\forall i,j=1, \ldots, n$. In some embodiments, each random variable may be subject to a Gaussian probability, wherein $P_i \sim N(\rho_i, (\sigma^2)_{\rho_i})$ and $Q_i \sim N(\theta_i, (\sigma^2)_{\theta_i})$. In some embodiments, the processor may determine corresponding Euclidean coordinates $x=\rho \cos \theta$ and $y=\rho \sin \theta$ of a polar coordinate. In some embodiments, the processor may determine a line on which all measurements lie, i.e., $\rho \cos \theta \cos \alpha+\rho \sin \theta \sin \alpha-r=\rho \cos(\theta-\alpha)-r=0$. However, obtaining a value of zero represents an ideal situation wherein there is no error. In actuality, this is a measure of the error between a measurement point $(\rho, \theta)$ and the line, specifically in terms of the minimum orthogonal distance between the point and the line. In some embodiments, the processor may minimize the error. In some embodiments, the processor may minimize the sum of square of all the errors using $S=\Sigma_i d_i^2=\Sigma_i(\rho_i \cos(\theta_i-\alpha)-r)^2$, wherein $$\frac{\partial S}{\partial a}=0$$

and $$\frac{\partial S}{\partial r}=0.$$

Figure 61A:
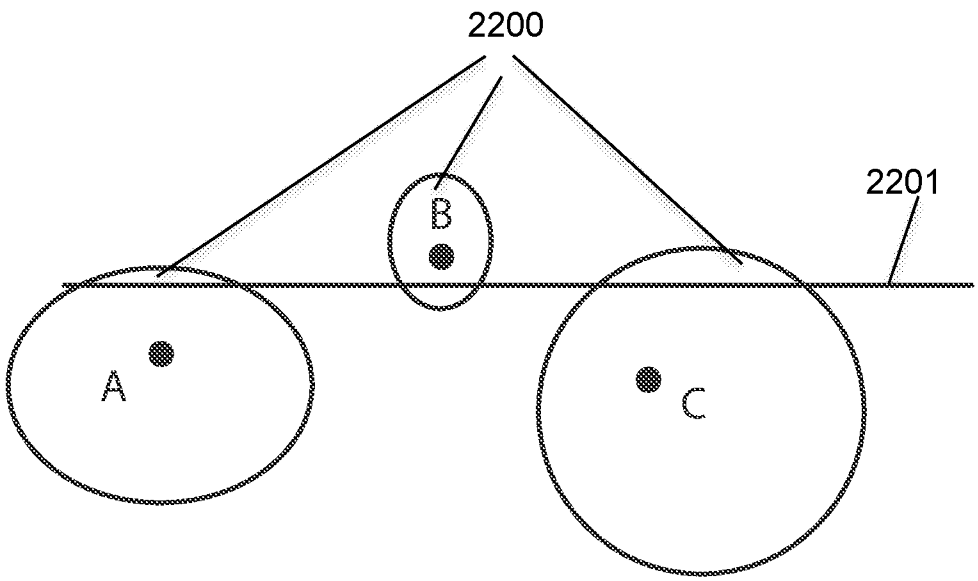
FIGS. 61A-61D illustrate an example of determining a perimeter according to some embodiments.
Figure 61B:
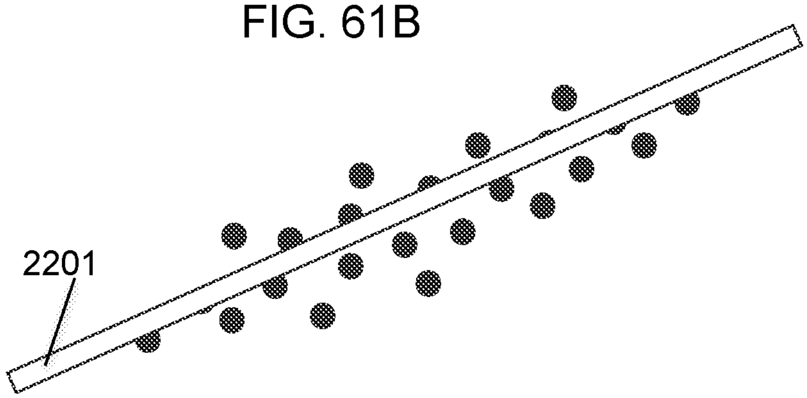
Figure 61C:
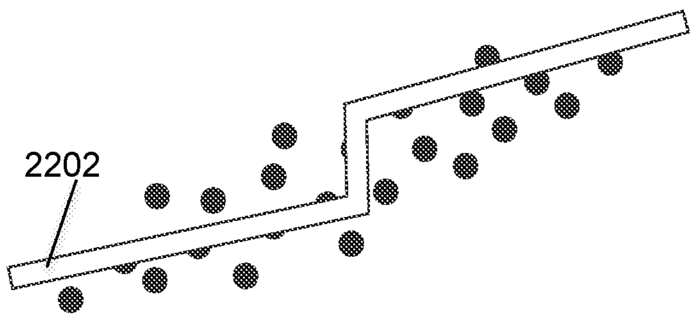
Figure 61D:
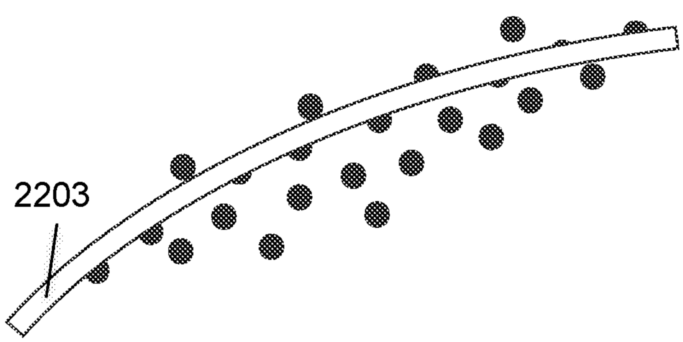
Figure 62:
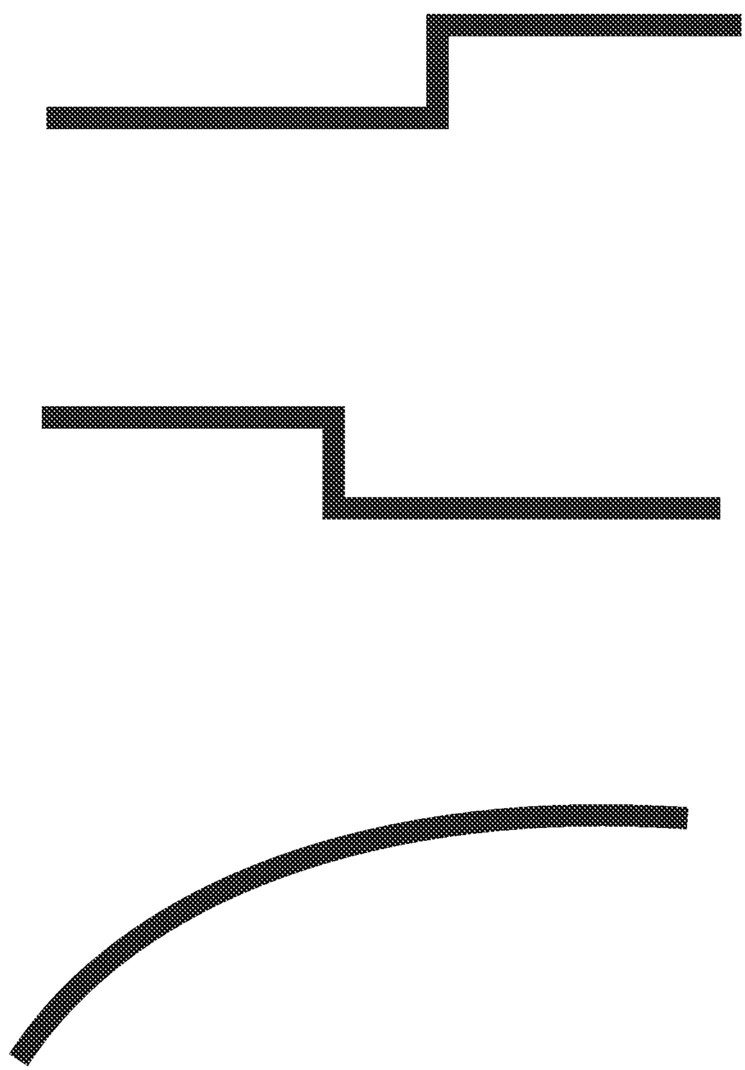
FIG. 62 illustrates example of perimeter patterns according to some embodiments.
Figure 63A:
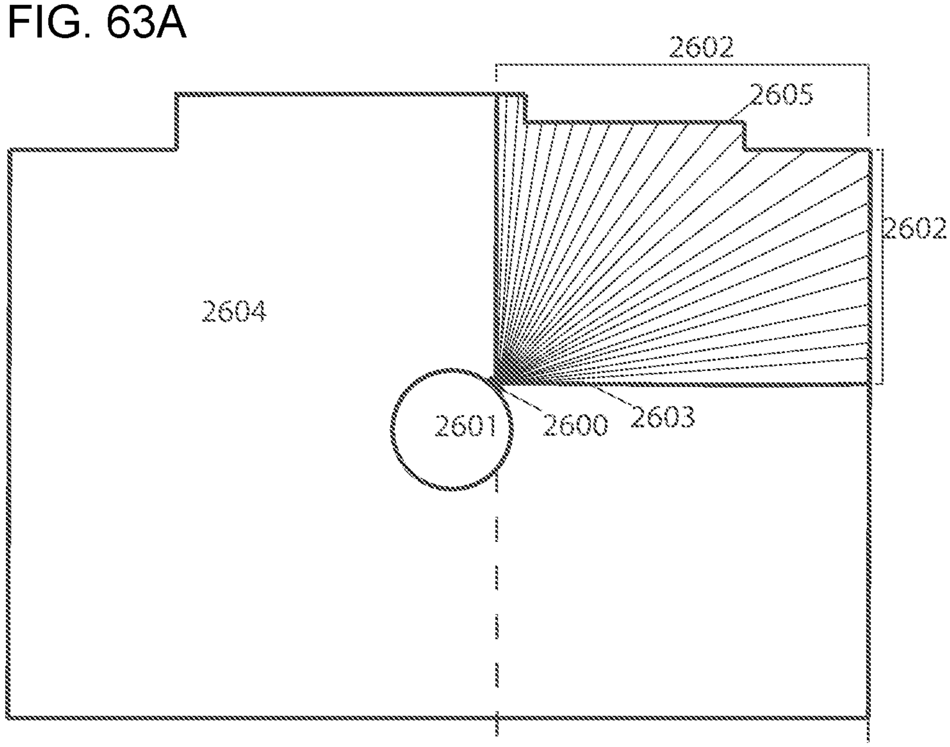
FIGS. 63A and 63B illustrate a 2D map segment constructed from depth measurements taken within a first field of view, according to some embodiments.
Figure 63B:
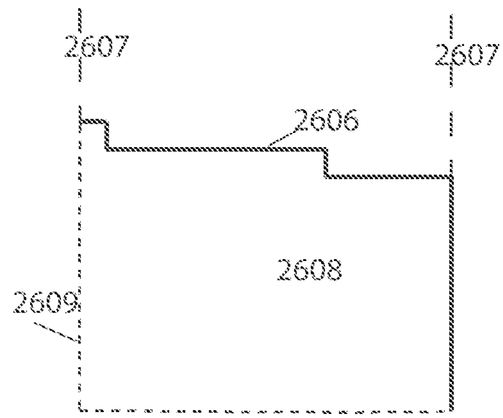

In some instances, measurements may not have the same errors. In some embodiments, a measurement point of the spatial representation of the environment may represent a mean of the measurement and a circle around the point may indicate the variance of the measurement. The size of circle may be different for different measurements and may be indicative of the amount of influence that each point may have in determining where the perimeter line fits. For example, in FIG. 61A, three measurements A, B, and C are shown, each with a circle 2200 indicating variance of the respective measurement. The perimeter line 2201 is closer to measurement B as it has a higher confidence and less variance. In some instances, the perimeter line may not be a straight line depending on the measurements and their variance. While this method of determining a position of a perimeter line may result in a perimeter line 2201 shown in FIG. 61B, the perimeter line of the environment may actually look like the perimeter line 2202 or 2203 illustrated in FIG. 61C or FIG. 61D. In some embodiments, the processor may search for particular patterns in the measurement points. For example, it may be desirable to find patterns that depict any of the combinations in FIG. 62. In some embodiments, the processor (or a SLAM algorithm executed by the processor) may obtain scan data collected by sensors of the robot during rotation of the robot. In some embodiments, a subset of the data may be chosen for building the map. For example, 49 scans of data may be obtained for map building and four of those may be identified as scans of data that are suitable for matching and building the map. In some embodiments, the processor may determine a matching pose of data and apply a correction accordingly. For example, a matching pose may be determined to be (−0.994693, 0.105234, −2.75821) and may be corrected to (−1.01251, −0.0702046, −2.73414) which represents a heading error of 1.3792 degrees and a total correction of (−0.0178176, 0.0350292, 0.0240715) having traveled (0.0110555, 0.0113022, 6.52475). In some embodiments, a multi map scan matcher may be used to match data. In some embodiments, the multi map scan matcher may fail if a matching threshold is not met. In some embodiments, a Chi-squared test may be used.

Some embodiments may afford the processor of the robot constructing a map of the environment using data from one or more cameras while the robot performs work within recognized areas of the environment. The working environment may include, but is not limited to (a phrase which is not here or anywhere else in this document to be read as implying other lists are limiting), furniture, obstacles, static objects, moving objects, walls, ceilings, fixtures, perimeters, items, components of any of the above, and/or other articles. The environment may be closed on all sides or have one or more openings, open sides, and/or open sections and may be of any shape. In some embodiments, the robot may include an on-board camera, such as one with zero-degrees of freedom of actuated movement relative to the robot (which may itself have three degrees of freedom relative to an environment), or some embodiments may have more or fewer degrees of freedom; e.g., in some cases, the camera may scan back and forth relative to the robot.

In some embodiments, a camera, installed on the robot, for example, measures the depth from the camera to objects within a first field of view. In some embodiments, a processor of the robot constructs a first segment of the map from the depth measurements taken within the first field of view. The processor may establish a first recognized area within the working environment, bound by the first segment of the map and the outer limits of the first field of view. In some embodiments, the robot begins to perform work within the first recognized area. As the robot with attached camera rotates and translates within the first recognized area, the camera continuously takes depth measurements to objects within the field of view of the camera. In some embodiments, the processor combines new depth measurements with previous depth measurements, increasing the size of the recognized area within which the robot may operate while continuing to collect depth data and build the map. Assuming the frame rate of the camera is fast enough to capture more than one frame of data in the time it takes the robot to rotate the width of the frame, a portion of data captured within each field of view overlaps with a portion of data captured within the preceding field of view. As the robot moves to observe a new field of view, in some embodiments, the processor adjusts measurements from previous fields of view to account for movement of the robot. The processor, in some embodiments, uses data from devices such as an odometer, gyroscope and/or optical encoder to determine movement of the robot with attached camera.

For example, FIG. 62A illustrates camera 2600 mounted on robot 2601 measuring depths 2602 at predetermined increments within a first field of view 2603 of working environment 2604. Depth measurements 2602 taken by camera 2600 measure the depth from camera 2600 to object 2605, which in this case is a wall. FIG. 62B illustrates a processor of the robot constructing 2D map segment 2606 from depth measurements 2602 taken within first field of view 2603. Dashed lines 2607 demonstrate that resulting 2D map segment 2606 corresponds to depth measurements 2602 taken within field of view 2603. The processor establishes first recognized area 2608 of working environment 2604 bounded by map segment 2606 and outer limits 2609 of first field of view 2603. Robot 2601 begins to perform work within first recognized area 2608 while camera 2600 continuously takes depth measurements.

Figure 64A:
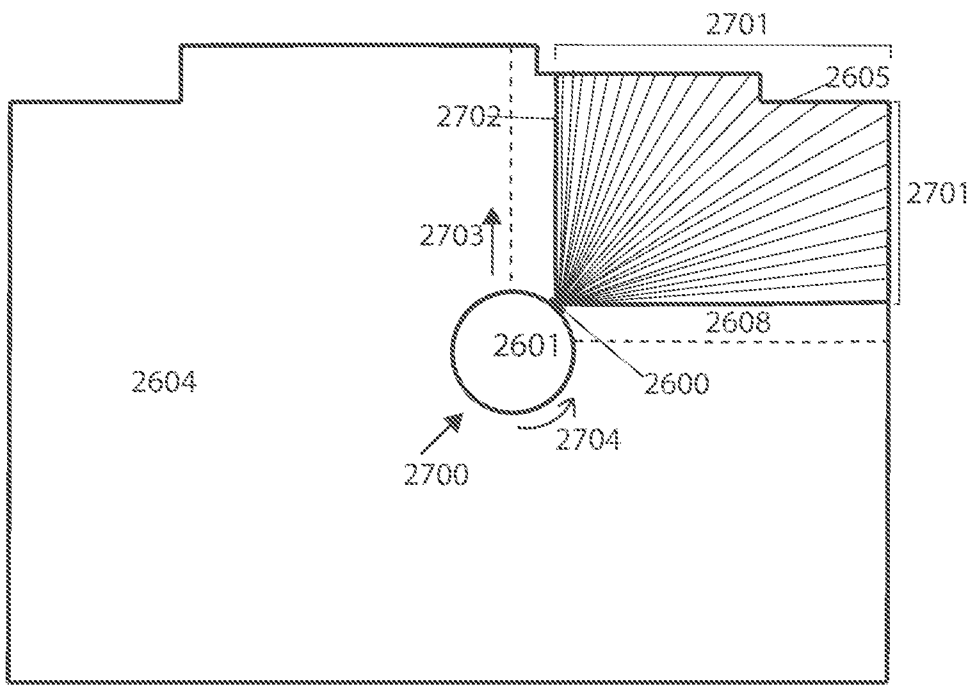
FIG. 64A illustrates a robotic device with mounted camera beginning to perform work within a first recognized area of the working environment, according to some embodiments.
Figure 64B:
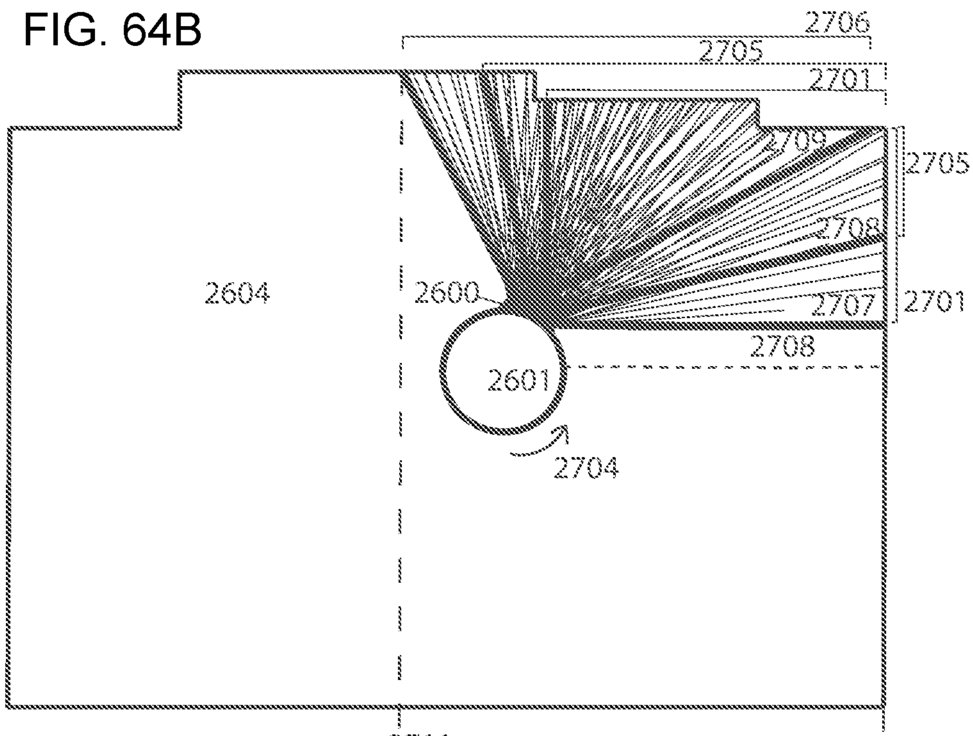
FIGS. 64B and 64C illustrate a 2D map segment constructed from depth measurements taken within multiple overlapping consecutive fields of view, according to some embodiments.
Figure 64C:
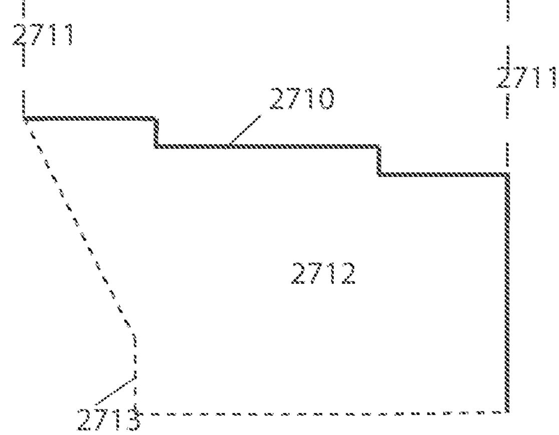

FIG. 64A illustrates robot 2601 translating forward in direction 2700 to move within recognized area 2608 of working environment 2604 while camera 2600 continuously takes depth measurements within the field of view of camera 2600. Since robot 2601 translates forward without rotating, no new areas of working environment 2604 are captured by camera 2600, however, the processor combines depth measurements 2701 taken within field of view 2702 with overlapping depth measurements previously taken within area 2608 to further improve accuracy of the map. As robot 2601 begins to perform work within recognized area 2608 it positions to move in vertical direction 2703 by first rotating in direction 2704. FIG. 64B illustrates robot 2601 rotating in direction 2704 while camera 2600 takes depth measurements 2701, 2705 and 2706 within fields of view 2707, 2708, and 2709, respectively. The processor combines depth measurements taken within these fields of view with one another and with previously taken depth measurements 2602 (FIG. 64A), using overlapping depth measurements as attachment points. The increment between fields of view 2707, 2708, and 2709 is trivial and for illustrative purposes. In FIG. 64C the processor constructs larger map segment 2710 from depth measurements 2602, 2701, 2705 and 2706 taken within fields of view 2603, 2707, 2708 and 209, respectively, combining them by using overlapping depth measurements as attachment points. Dashed lines 2711 demonstrate that resulting 2D map segment 2710 corresponds to combined depth measurements 2602, 2701, 2705, and 2706. Map segment 2710 has expanded from first map segment 2606 (FIG. 64B) as plotted depth measurements from multiple fields of view have been combined to construct larger map segment 2710. The processor also establishes larger recognized area 2712 of working environment 2604 (compared to first recognized area 2608 (FIG. 64B)) bound by map segment 2710 and outer limits of fields of view 2603 and 2710 represented by dashed line 2713.

Figures 65A, 65B:
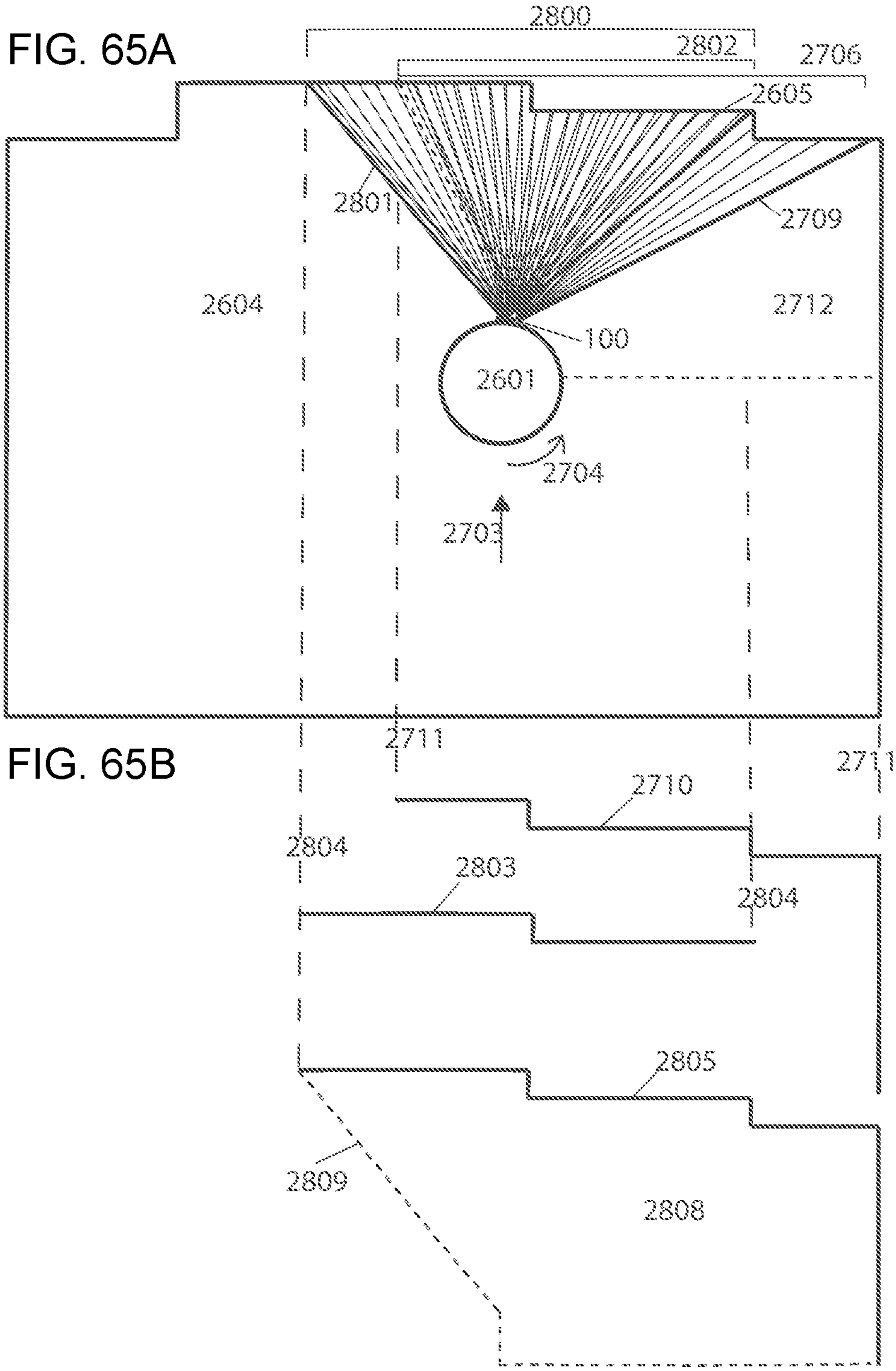
FIGS. 65A and 65B illustrate how a segment of a 2D map is constructed from depth measurements taken within two overlapping consecutive fields of view, according to some embodiments.

FIG. 65A illustrates robot 2601 continuing to rotate in direction 2704 before beginning to move vertically in direction 2703 within expanded recognized area 2712 of working environment 2604. Camera 2600 measures depths 2800 from camera 2600 to object 2605 within field of view 2801 overlapping with preceding depth measurements 2706 taken within field of view 2709 (FIG. 65B). Since the processor of robot 2601 is capable of tracking its position (using devices such as an odometer or gyroscope) the processor can estimate the approximate overlap with previously taken depth measurements 2706 within field of view 2709. Depth measurements 2802 represent the overlap between previously taken depth measurements 2706 and depth measurements 2800. FIG. 65B illustrates 2D map segment 2710 resulting from previously combined depth measurements 2602, 2701, 2705 and 2706 and map segment 2803 resulting from depth measurements 2800. Dashed lines 2711 and 2804 demonstrate that resulting 2D map segments 2710 and 2803 correspond to previously combined depth measurements 2602, 2701, 2705, 2706 and to depth measurements 2800, respectively. The processor constructs 2D map segment 2805 from the combination of 2D map segments 2710 and 2803 bounded by the outermost dashed lines of 2711 and 2804. The camera takes depth measurements 2800 within overlapping field of view 2801. The processor compares depth measurements 2800 to previously taken depth measurements 2706 to identify overlapping depth measurements bounded by the innermost dashed lines of 2711 and 2804. The processor uses one or more of the methods for comparing depth measurements and identifying an area of overlap described above. The processor estimates new depth measurements for the overlapping depth measurements using one or more of the combination methods described above. To construct larger map segment 2805, the processor combines previously constructed 2D map segment 2710 and 2D map segment 2803 by using overlapping depth measurements, bound by innermost dashed lines of 2711 and 2804, as attachment points. The processor also expands recognized area 2712 within which robot 2601 operates to recognized area 2808 of working environment 2604 bounded by map segment 2805 and dashed line 2809.

Figure 66A:
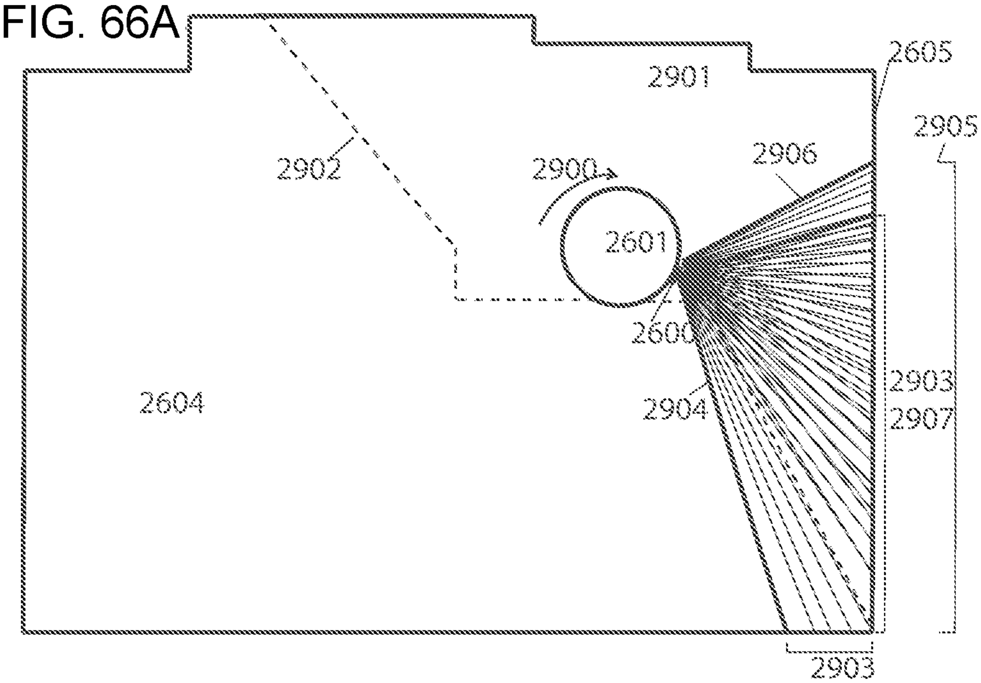
FIGS. 66A and 66B illustrate a 2D map segment constructed from depth measurements taken within two overlapping consecutive fields of view, according to some embodiments.
Figure 66B:
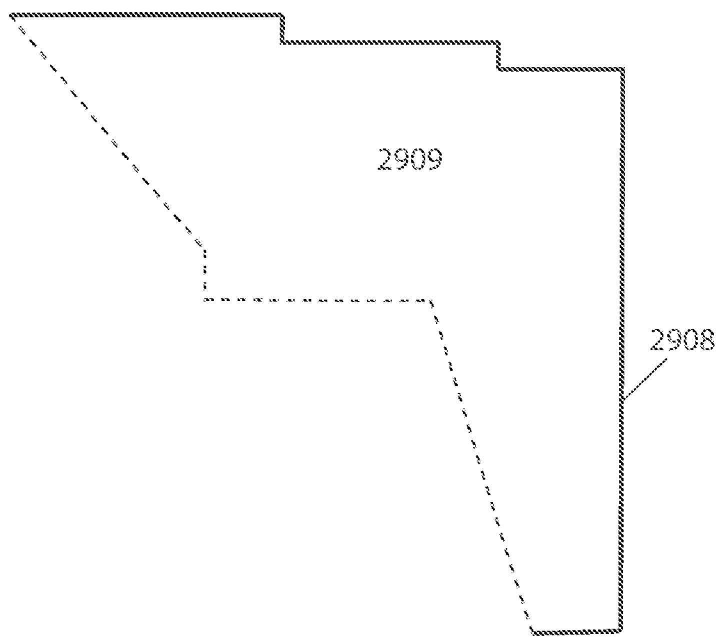
Figure 67:
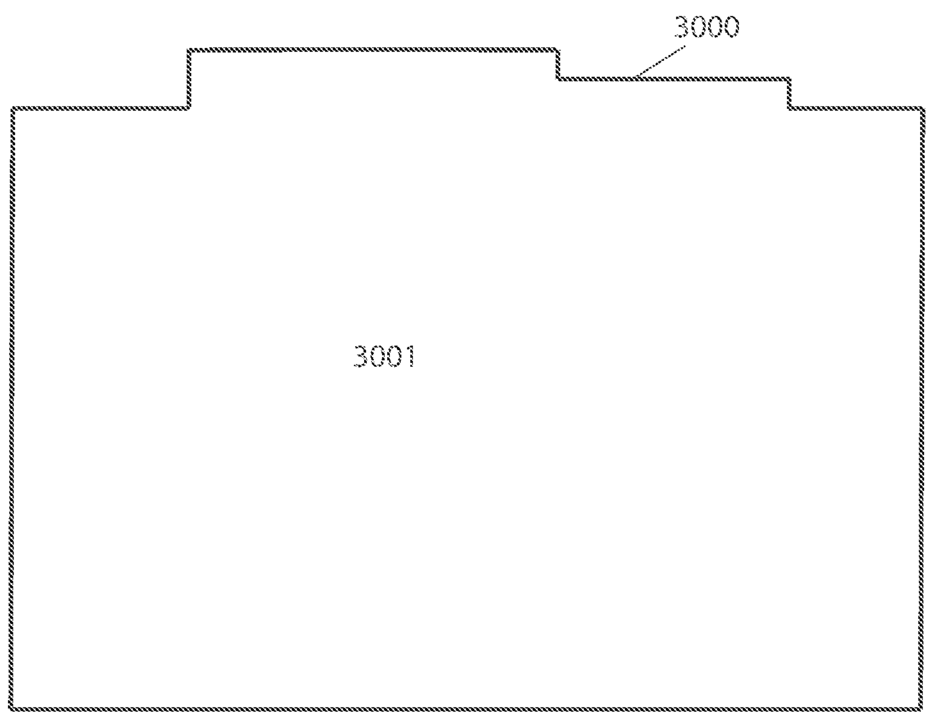
FIG. 67 illustrates a complete 2D map constructed from depth measurements taken within consecutively overlapping fields of view, according to some embodiments.

FIG. 66A illustrates robot 2601 rotating in direction 2900 as it continues to perform work within working environment 2604. The processor expanded recognized area 308 to area 2901 bound by wall 2605 and dashed line 2902. Camera 2600 takes depth measurements 2903 from camera 2600 to object 2605 within field of view 2904 overlapping with preceding depth measurements 2905 taken within field of view 2906. Depth measurements 2907 represent overlap between previously taken depth measurements 2905 and depth measurements 2903. FIG. 66B illustrates expanded map segment 2908 and expanded recognized area 2909 resulting from the processor combining depth measurements 2903 and 2905 at overlapping depth measurements 2907. This method is repeated as camera 2600 takes depth measurements within consecutively overlapping fields of view as robot 2601 moves within the environment and the processor combines the depth measurements at overlapping points until a 2D map of the environment is constructed. FIG. 67 illustrates an example of a complete 2D map 3000 with bound area 3001. The processor of robot 2601 constructs map 3000 by combining depth measurements taken within consecutively overlapping fields of view of camera 2600. 2D map 3000 can, for example, be used by the processor of robot 2601 to autonomously navigate the robot 2601 throughout the working environment during operation.

Figure 68A:
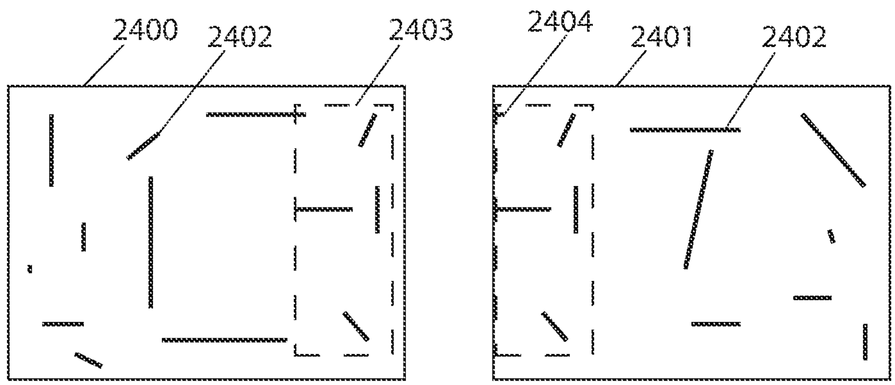
FIGS. 68A-68C illustrate how an overlapping area is detected in some embodiments using raw pixel intensity data and the combination of data at overlapping points.
Figure 68B:
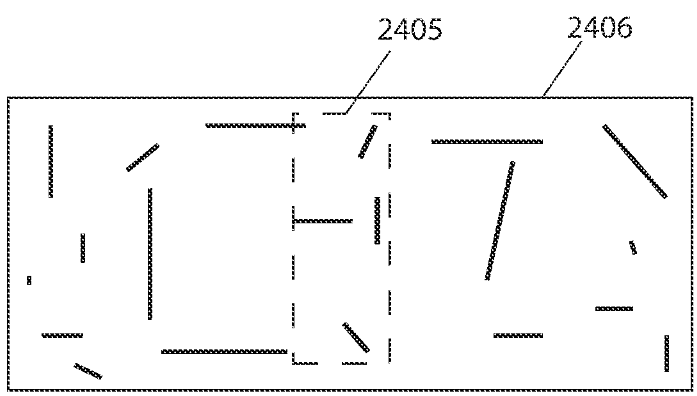
Figure 68C:
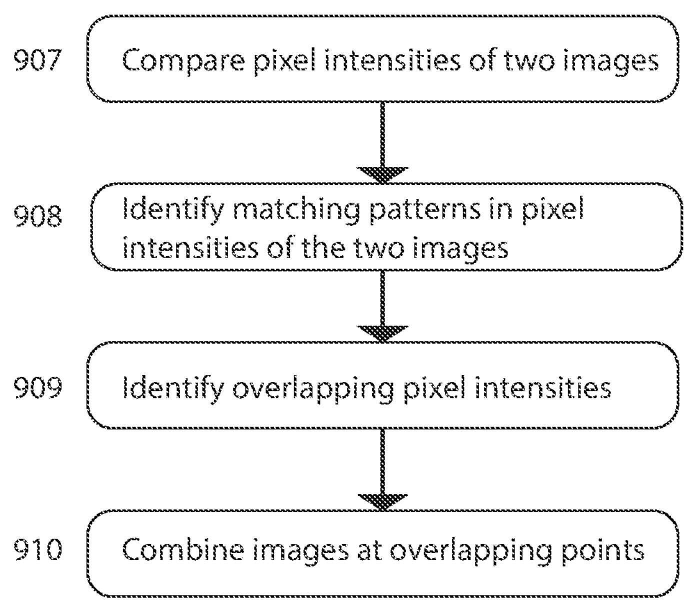

In some embodiments, the processor may identify overlap using raw pixel intensity values. FIGS. 68A and 68B illustrate an example of identifying an area of overlap using raw pixel intensity data and the combination of data at overlapping points. In FIG. 68A, the overlapping area between overlapping image 2400 captured in a first field of view and image 2401 captured in a second field of view may be determined by comparing pixel intensity values of each captured image (or transformation thereof, such as the output of a pipeline that includes normalizing pixel intensities, applying Gaussian blur to reduce the effect of noise, detecting edges in the blurred output (such as Canny or Haar edge detection), and thresholding the output of edge detection algorithms to produce a bitmap like that shown) and identifying matching patterns in the pixel intensity values of the two images, for instance by executing operations by which some embodiments determine an overlap with a convolution. Lines 2402 represent pixels with high pixel intensity value (such as those above a certain threshold) in each image. Area 2403 of image 2400 and area 2404 of image 2401 capture the same area of the environment and, as such, the same pattern for pixel intensity values is sensed in area 2403 of image 2400 and area 2404 of image 2401. After identifying matching patterns in pixel intensity values in image 2400 and 2401, a matching overlapping area between both images may be determined. In FIG. 68B, the images are combined at overlapping area 2405 to form a larger image 2406 of the environment. In some cases, data corresponding to the images may be combined. For instance, depth values may be aligned based on alignment determined with the image. FIG. 68C illustrates a flowchart describing the process illustrated in FIGS. 68A and 68B wherein a process of the robot at first stage 907 compares pixel intensities of two images captured by a sensor of the robot, at second stage 908 identifies matching patterns in pixel intensities of the two images, at third stage 909 identifies overlapping pixel intensities of the two images, and at fourth stage 910 combines the two images at overlapping points.

Figure 69A:
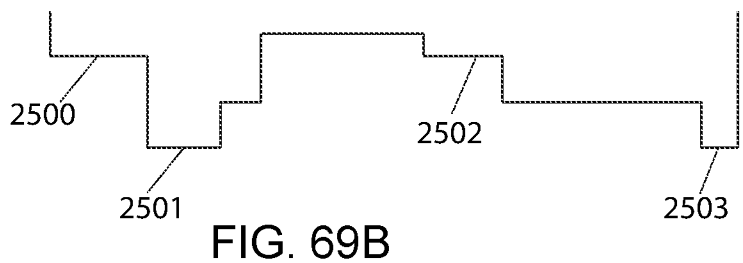
FIGS. 69A-69C illustrate how an overlapping area is detected in some embodiments using raw pixel intensity data and the combination of data at overlapping points.
Figure 69B:
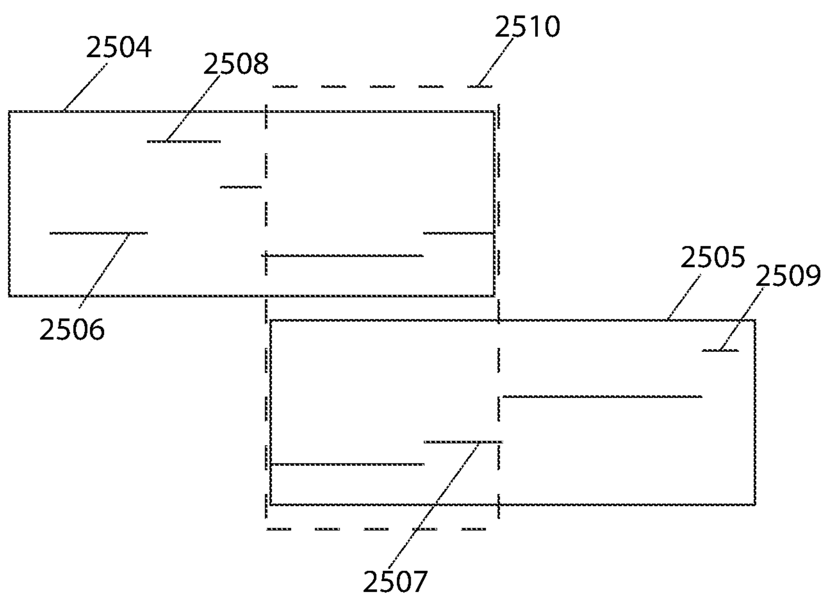
Figure 69C:
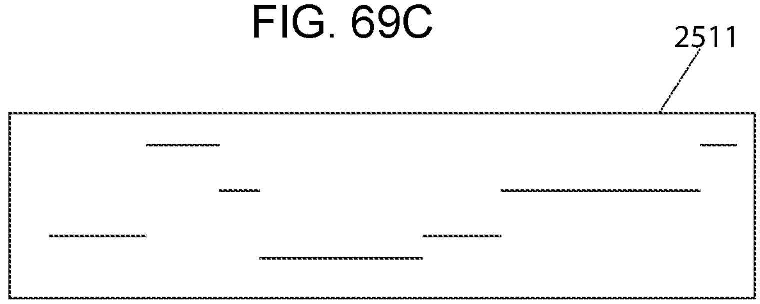

FIGS. 69A-69C illustrate another example of identifying an area of overlap using raw pixel intensity data and the combination of data at overlapping points. FIG. 69A illustrates a top (plan) view of an object, such as a wall, with uneven surfaces wherein, for example, surface 2500 is further away from an observer than surface 2501 or surface 2502 is further away from an observer than surface 2503. In some embodiments, at least one infrared line laser positioned at a downward angle relative to a horizontal plane coupled with at least one camera may be used to determine the depth of multiple points across the uneven surfaces from captured images of the line laser projected onto the uneven surfaces of the object. Since the line laser is positioned at a downward angle, the position of the line laser in the captured image will appear higher for closer surfaces and will appear lower for further surfaces. Similar approaches may be applied with lasers offset from a camera in the horizontal plane. The position of the laser line (or feature of a structured light pattern) in the image may be detected by finding pixels with intensity above a threshold. The position of the line laser in the captured image may be related to a distance from the surface upon which the line laser is projected. In FIG. 69B, captured images 2504 and 2505 of the laser line projected onto the object surface for two different fields of view are shown. Projected laser lines with lower position, such as laser lines 2506 and 2507 in images 2504 and 2505 respectively, correspond to object surfaces 2500 and 2502, respectively, further away from the infrared illuminator and camera. Projected laser lines with higher position, such as laser lines 2508 and 2509 in images 2504 and 2505 respectively, correspond to object surfaces 2501 and 2503, respectively, closer to the infrared illuminator and camera. Captured images 2504 and 2505 from two different fields of view may be combined into a larger image of the environment by finding an overlapping area between the two images and stitching them together at overlapping points. The overlapping area may be found by identifying similar arrangement of pixel intensities in both images, wherein pixels with high intensity may be the laser line. For example, areas of images 2504 and 2505 bound within dashed lines 2510 have similar arrangement of pixel intensities as both images captured a same portion of the object within their field of view. Therefore, images 2504 and 2505 may be combined at overlapping points to construct larger image 2511 of the environment shown in FIG. 69C. The position of the laser lines in image 2511, indicated by pixels with intensity value above a threshold intensity, may also be used to infer depth of surfaces of objects from the infrared illuminator and camera (see, U.S. Patent application. Ser. No. 15/674,310, the entire contents of which is hereby incorporated by reference).

In some embodiments, the processor uses measured movement of the robot with attached camera to find the overlap between depth measurements taken within the first field of view and the second field of view. In other embodiments, the measured movement is used to verify the identified overlap between depth measurements taken within overlapping fields of view. In some embodiments, the area of overlap identified is verified if the identified overlap is within a threshold angular distance of the overlap identified using at least one of the method described above. In some embodiments, the processor uses the measured movement to choose a starting point for the comparison between measurements from the first field of view and measurements from the second field of view. For example, the processor uses the measured movement to choose a starting point for the comparison between measurements from the first field of view and measurements from the second field of view. The processor iterates using a method such as that described above to determine the area of overlap. The processor verifies the area of overlap if it is within a threshold angular distance of the overlap estimated using measured movement.

In some cases, a confidence score is calculated for overlap determinations, e.g., based on an amount of overlap and aggregate amount of disagreement between depth vectors in the area of overlap in the different fields of view, and the above Bayesian techniques down-weight updates to priors based on decreases in the amount of confidence. In some embodiments, the size of the area of overlap is used to determine the angular movement and is used to adjust odometer information to overcome inherent noise of the odometer (e.g., by calculating an average movement vector for the robot based on both a vector from the odometer and a movement vector inferred from the fields of view). The angular movement of the robot from one field of view to the next may, for example, be determined based on the angular increment between vector measurements taken within a field of view, parallax changes between fields of view of matching objects or features thereof in areas of overlap, and the number of corresponding depths overlapping between the two fields of view.

In some embodiments, the processor expands the number of overlapping depth measurements to include a predetermined (or dynamically determined) number of depth measurements recorded immediately before and after (or spatially adjacent) the identified overlapping depth measurements. Once an area of overlap is identified (e.g., as a bounding box of pixel positions or threshold angle of a vertical plane at which overlap starts in each field of view), the processor constructs a larger field of view by combining the two fields of view using the overlapping depth measurements as attachment points. Combining may include transforming vectors with different origins into a shared coordinate system with a shared origin, e.g., based on an amount of translation or rotation of a depth sensing device between frames, for instance, by adding a translation or rotation vector to depth vectors. The transformation may be performed before, during, or after combining. The method of using the camera to perceive depths within consecutively overlapping fields of view and the processor to identify and combine overlapping depth measurements is repeated, e.g., until all areas of the environment are discovered and a map is constructed.

Figure 70A:
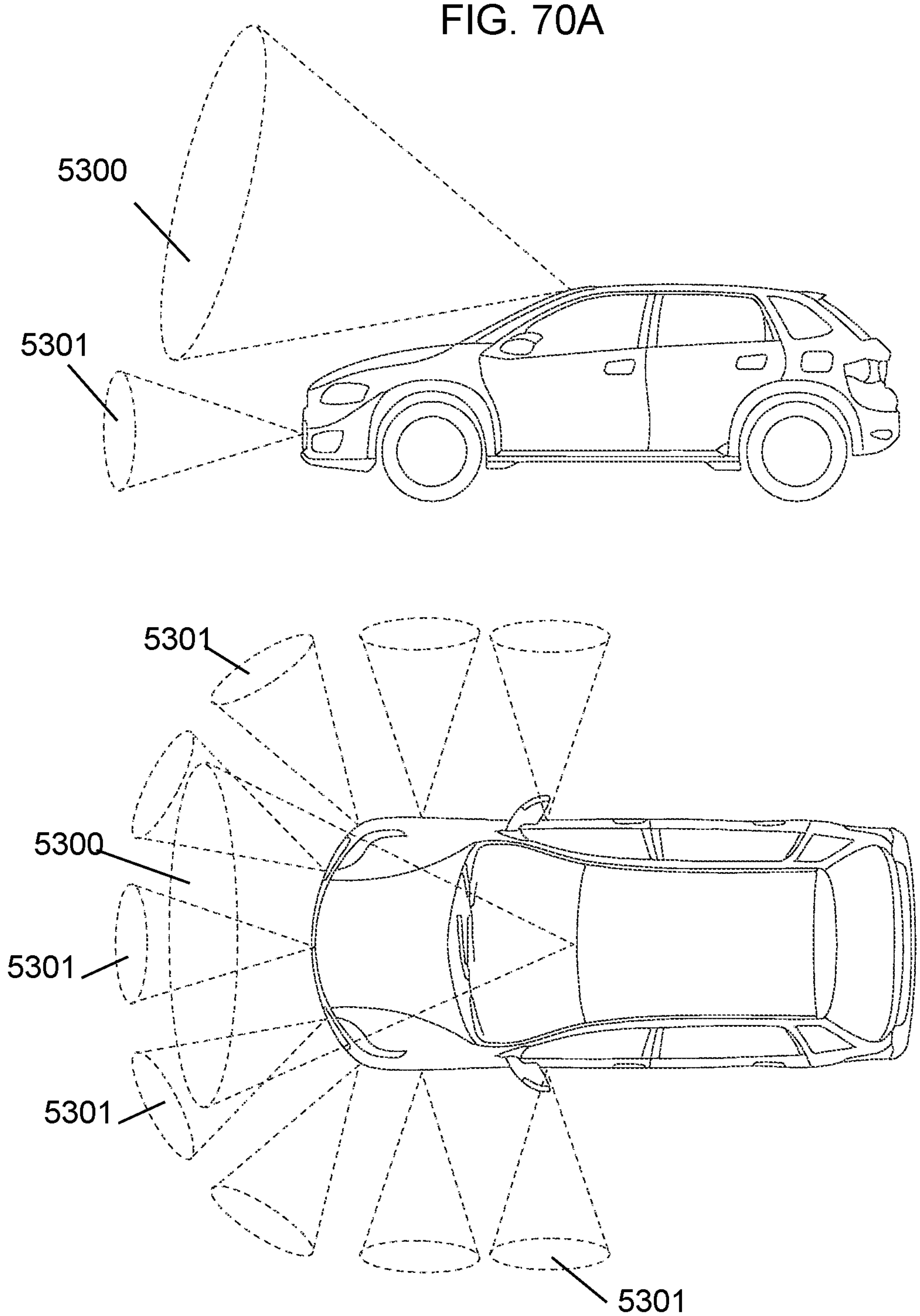
FIGS. 70A-70C illustrate examples of fields of view of sensors of an autonomous vehicle, according to some embodiments.
Figure 70B:
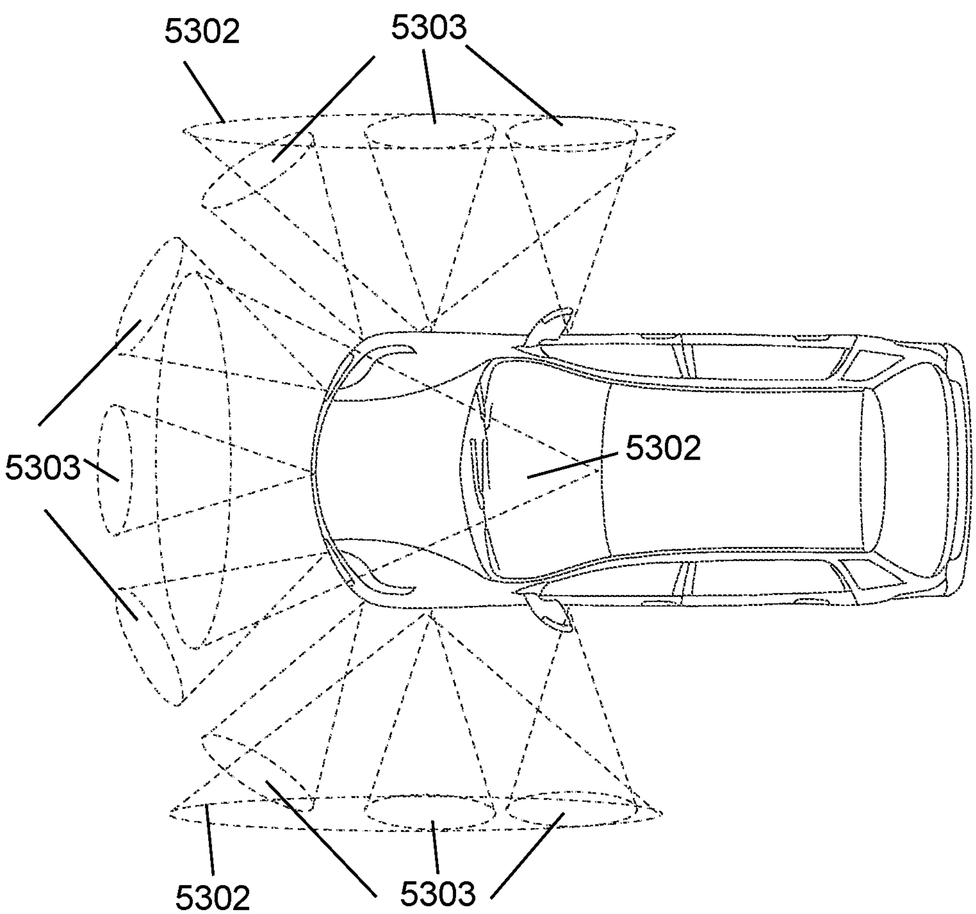
Figure 70C:
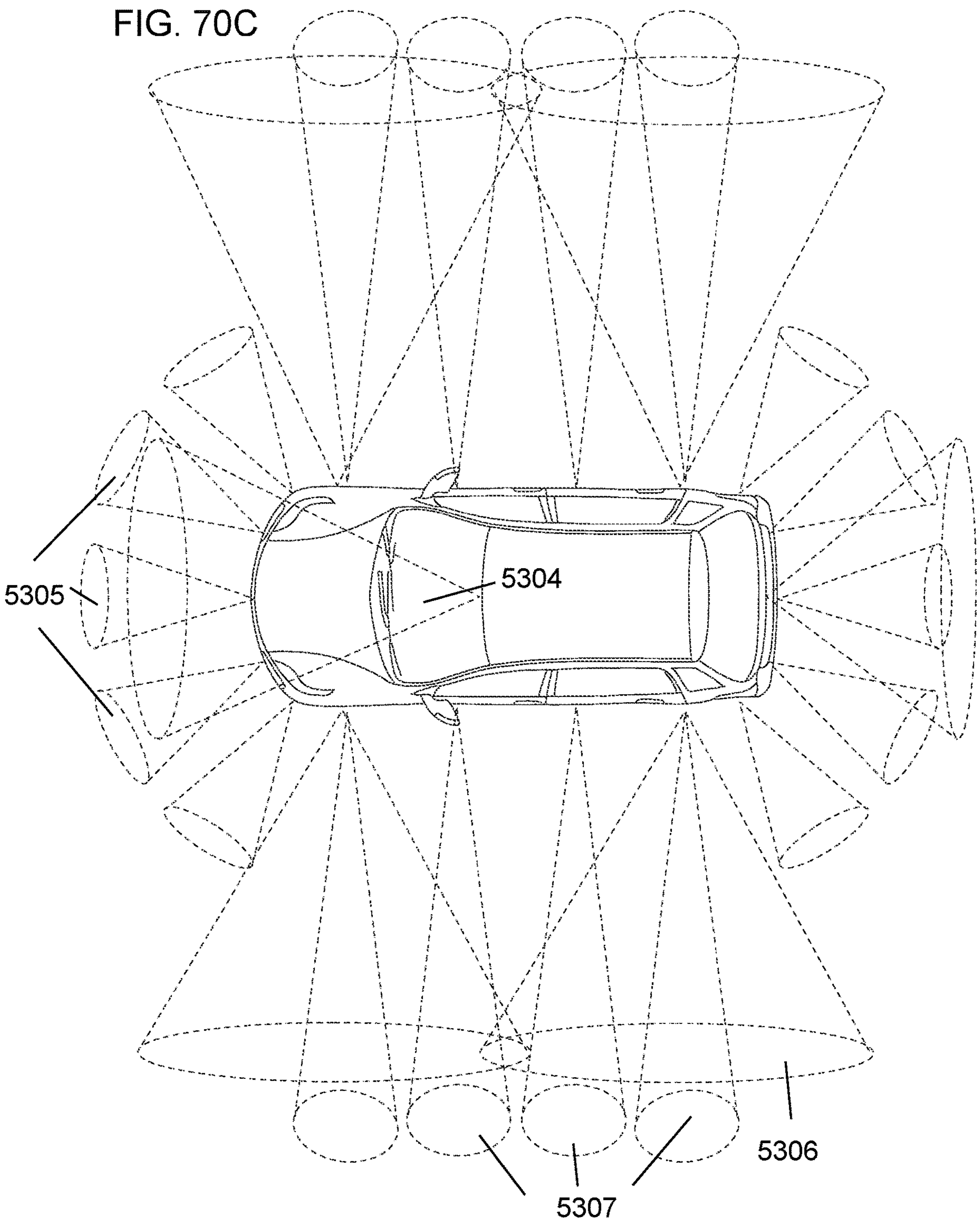

In some embodiments, more than one sensor providing various perceptions may be used to improve understanding of the environment and accuracy of the map. For example, a plurality of depth measuring devices (e.g., camera, TOF sensor, TSSP sensor, etc. carried by the robot) may be used simultaneously (or concurrently) where depth measurements from each device are used to more accurately map the environment. For example, FIGS. 70A-70C illustrate an autonomous vehicle with various sensors having different fields of view that are collectively used by its processor to improve understanding of the environment. FIG. 70A illustrates a side view of the autonomous vehicle with field of view 5300 of a first sensor and 5301 of a second sensor. The first sensor may be a camera used for localization as it has a large FOV and can observe many things within the surroundings that may be used by the processor to localize the robot against. The second sensor may be an obstacle sensor used for obstacle detection, including dynamic obstacles. The second sensor may also be used for mapping in front of the autonomous vehicle and observing the perimeter of the environment. Various other sensors may also be used, such as sonar, LIDAR, LADAR, depth camera, camera, optical sensor, TOF sensor, TSSP sensor, etc. In some cases, fields of view 5300 and 5301 may overlap vertically and/or horizontally. In some cases, the data collected by the first and second sensor may be complimentary to one another. In some cases, the fields of view 5300 and 5301 may collectively define a vertical field of view of the autonomous vehicle. There may be multiple second sensors 5301 arranged around a front half of the vehicle, as illustrated in the top view in FIG. 70A. FIG. 70B illustrates a top view of another example of an autonomous vehicle including a first set of sensors (e.g., cameras, LIDAR, etc.) with fields of view 5302 and second set of sensors (e.g., TOF, TSSP, etc.) with fields of view 5303. In some cases, the fields of view 5302 and 5303 may collectively define a vertical and/or horizontal fields of view of the autonomous vehicle. In some cases, overlap between fields of view may occur over the body of the autonomous vehicle. In some embodiments, overlap between fields of view may occur at a further distance than the physical body of the autonomous vehicle. In some embodiments, overlap between fields of view of sensors may occur at different distances. FIG. 70C illustrates the fields of view 5304 and 5305 of sensors at a front and back of an autonomous vehicle overlapping at closer distances (with respect to the autonomous vehicle) than the fields of view 5306 and 5307 of sensors at the sides of the autonomous vehicle. In cases wherein overlap of fields of view of sensors are at far distances, there may be overlap of data from the two sensors that is not in an image captured within the field of view of one of the sensors. The use of a plurality of depth measuring devices is expected to allow for the collection of depth measurements from different perspectives and angles, for example. Where more than one depth measuring device is used, triangulation or others suitable methods may be used for further data refinement and accuracy. In some embodiments, a 360-degree LIDAR is used to create a map of the environment. It should be emphasized, though, that embodiments are not limited to techniques that construct a map in this way, as the present techniques may also be used for plane finding in augmented reality, barrier detection in virtual reality applications, outdoor mapping with autonomous drones, and other similar applications, which is not to suggest that any other description is limiting.

In some embodiments, the processor (or set thereof) on the robot, a remote computing system in a data center, or both in coordination, may translate depth measurements from on-board sensors of the robot from the robot's (or the sensor's, if different) frame of reference, which may move relative to a room, to the room's frame of reference, which may be static. In some embodiments, vectors may be translated between the frames of reference with a Lorentz transformation or a Galilean transformation. In some cases, the translation may be expedited by engaging a basic linear algebra subsystem (BLAS) of a processor of the robot. In some instances where linear algebra is used, Basic Linear Algebra Subprograms (BLAS) are implemented to carry out operations such as vector addition, vector norms, scalar multiplication, matrix multiplication, matric transpose, matrix-vector multiplication, linear combinations, dot products, cross products, and the like.

In some embodiments, the robot's frame of reference may move with one, two, three, or more degrees of freedom relative to that of the room, e.g., some frames of reference for some types of sensors may both translate horizontally in two orthogonal directions as the robot moves across a floor and rotate about an axis normal to the floor as the robot turns. The "room's frame of reference" may be static with respect to the room, or as designation and similar designations are used herein, may be moving, as long as the room's frame of reference serves as a shared destination frame of reference to which depth vectors from the robot's frame of reference are translated from various locations and orientations (collectively, positions) of the robot. Depth vectors may be expressed in various formats for each frame of reference, such as with the various coordinate systems described above. (A data structure need not be labeled as a vector in program code to constitute a vector, as long as the data structure encodes the information that constitutes a vector.) In some cases, scalars of vectors may be quantized, e.g., in a grid, in some representations. Some embodiments may translate vectors from non-quantized or relatively granularly quantized representations into quantized or coarser quantizations, e.g., from a sensor's depth measurement to 16 significant digits to a cell in a bitmap that corresponds to 8 significant digits in a unit of distance. In some embodiments, a collection of depth vectors may correspond to a single location or pose of the robot in the room, e.g., a depth image, or in some cases, each depth vector may potentially correspond to a different pose of the robot relative to the room.

In embodiments, the constructed map may be encoded in various forms. For instance, some embodiments may construct a point cloud of two dimensional or three dimensional points by transforming each of the vectors into a vector space with a shared origin, e.g., based on the above-described displacement vectors, in some cases with displacement vectors refined based on measured depths. Or some embodiments may represent maps with a set of polygons that model detected surfaces, e.g., by calculating a convex hull over measured vectors within a threshold area, like a tiling polygon. Polygons are expected to afford faster interrogation of maps during navigation and consume less memory than point clouds at the expense of greater computational load when mapping. Vectors need not be labeled as "vectors" in program code to constitute vectors, which is not to suggest that other mathematical constructs are so limited. In some embodiments, vectors may be encoded as tuples of scalars, as entries in a relational database, as attributes of an object, etc. Similarly, it should be emphasized that images need not be displayed or explicitly labeled as such to constitute images. Moreover, sensors may undergo some movement while capturing a given image, and the pose of a sensor corresponding to a depth image may, in some cases, be a range of poses over which the depth image is captured.

Figure 71A:
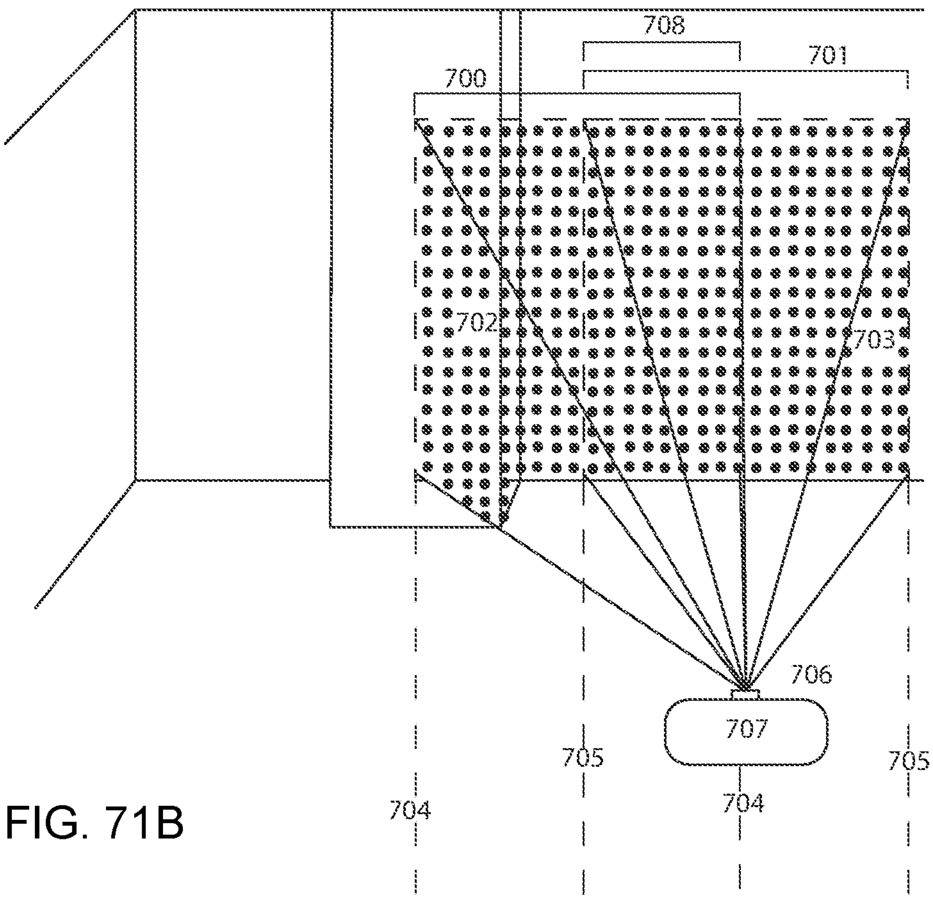
FIG. 71A illustrates depths perceived within two overlapping fields of view.
Figure 71B:
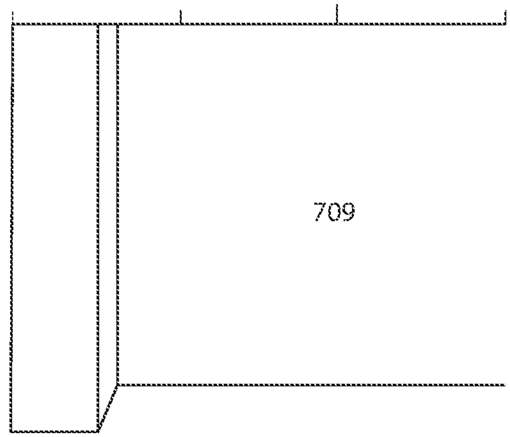
FIG. 71B illustrates a 3D floor plan segment constructed from depths perceived within two overlapping fields of view.

In some embodiments, maps may be three dimensional maps, e.g., indicating the position of walls, furniture, doors, and the like in a room being mapped. For example, FIG. 71A illustrates 3D depths 700 and 701 taken within consecutively overlapping fields of view 702 and 703 bound by lines 704 and 705, respectively, using 3D depth perceiving device 706 mounted on robot 707. FIG. 71B illustrates 3D floor plan segment 708 approximated from the combination of plotted depths 700 and 701 at area of overlap 709 bound by innermost dashed lines 704 and 705. This method is repeated where overlapping depths taken within consecutively overlapping fields of view are combined at the area of overlap to construct a 3D floor plan of the environment. In some embodiments, maps may be two dimensional maps, e.g., point clouds or polygons or finite ordered list indicating obstructions at a given height (or range of height, for instance from zero to 5 or 10 centimeters or less) above the floor. Two dimensional maps may be generated from two dimensional data or from three dimensional data where data at a given height above the floor is used and data pertaining to higher features are discarded. Maps may be encoded in vector graphic formats, bitmap formats, or other formats. In some embodiments, maps may include two or more floors of the environment.

The robot may, for example, use the map to autonomously navigate the environment during operation, e.g., accessing the map to determine that a candidate route is blocked by an obstacle denoted in the map, to select a route with a route-finding algorithm from a current point to a target point, or the like. In some embodiments, the map is stored in memory for future use. Storage of the map may be in temporary memory such that a stored map is only available during an operational session or in more permanent forms of memory such that the map is available at the next session or startup. In some embodiments, the map is further processed to identify rooms and other segments. In some embodiments, the processor of the robot detects a current room or floor within the map of the environment based on visual features recognized in sensor data. In some embodiments, the processor uses a map including the current room or floor to autonomously navigate the environment. In some embodiments, a new map is constructed at each use, or an extant map is updated based on newly acquired data.

Some embodiments may reference previous maps during subsequent mapping operations. For example, embodiments may apply Bayesian techniques to simultaneous localization and mapping and update priors in existing maps based on mapping measurements taken in subsequent sessions. Some embodiments may reference previous maps and classifying objects in a field of view as being moveable objects upon detecting a difference of greater than a threshold size.

Feature and location maps as described herein are understood to be the same. For example, in some embodiments a feature-based map includes multiple location maps, each location map corresponding with a feature and having a rigid coordinate system with origin at the feature. Two vectors X and X', correspond to rigid coordinate systems S and S' respectively, each describe a different feature in a map. The correspondences of each feature may be denoted by C and C', respectively. Correspondences may include, angle and distance, among other characteristics. If vector X is stationary or uniformly moving relative to vector X', the processor of the robot may assume that a linear function U(X') exists that may transform vector X' to vector X and vice versa, such that a linear function relating vectors measured in any two rigid coordinate systems exists.

In some embodiments, the processor determines transformation between the two vectors measured. In some embodiments, the processor uses Galilean Group Transformation to determine the transformations between the two vectors, each measured relative to a different coordinate system. Galilean transformation may be used to transform between coordinates of two coordinate systems that only differ by constant relative motion. These transformations combined with spatial rotations and translations in space and time form the inhomogeneous Galilean Group, for which the equations are only valid at speeds much less than the speed of light. In some embodiments, the processor uses the Galilean Group for transformation between two vectors X and X', measured relative to coordinate systems S and S', respectively, the coordinate systems with spatial origins coinciding at t=t'=0 and in uniform relative motion in their common directions.

In some embodiments, the processor determines the transformation $X'=RX+\alpha+vt$ between vector X' measured relative to coordinate system S' and vector X measured relative to coordinate system S to transform between coordinate systems, wherein R is a rotation matrix acting on vector X, X is a vector measured relative to coordinate system S, X' is a vector measured relative to coordinate system S', a is a vector describing displacement of coordinate system S' relative to coordinate system S, v is a vector describing uniform velocity of coordinate system S' and t is the time. After displacement, the time becomes t'=t+s where s is the time over which the displacement occurred. If $T_1=T_1(R_1; a_1; v_1; s_1)$ and $T_2=T_2(R_1; a_1; v_1; s_1)$ denote a first and second transformation, the processor of the robot may apply the first transformation to vector X at time t resulting in $T_1\{X, t\}=\{X', t'\}$ and apply the second transformation to resulting vector X' at time t' giving $T_2\{X', t'\}=\{X'', t''\}$. Assuming $T_3=T_2T_1$, wherein the transformations are applied in reverse order, is the only other transformation that yields the same result of $\{X'', t''\}$, then the processor may denote the transformations as $T_3\{X, t\}=\{X'', t''\}$. The transformation may be determined using $X''=R_2(R_1X+a_1v_1t)+\alpha_2+v_2(t+s_1)$ and $t''=t+s_1+s_2$, wherein $(R_1X+a_1+v_1t)$ represents the first transformation $T_1\{X, t\}=\{X', t'\}$. Further, $R_3=R_2R_1$, $\alpha_3=\alpha_2+R_2a_1+v_2s_1$, $v_3=v_2+R_2v_1$, and $s_3=s_2+s_1$ hold true.

In some embodiments, the Galilean Group transformation is three dimensional and there are ten parameters used in relating vectors X and X'. There are three rotation angles, three space displacements, three velocity components and one time component, with the three rotation matrices $$R_1(\theta)=\begin{bmatrix}1 & 0 & 0\\ 0 & \cos\theta & -\sin\theta\\ 0 & \sin\theta & \cos\theta\end{bmatrix},\ R_2(\theta)=\begin{bmatrix}\cos\theta & 0 & \sin\theta\\ 0 & 1 & 0\\ -\sin\theta & 0 & \cos\theta\end{bmatrix},$$

and $$R_3(\theta)=\begin{bmatrix}\cos\theta & -\sin\theta & 0\\ \sin\theta & \cos\theta & 0\\ 0 & 0 & 1\end{bmatrix}.$$

The vector X and X' may for example be position vectors with components (x, y, z) and (x', y', z') or (x, y, θ) and (x', y', θ'), respectively. The method of transformation described herein allows the processor to transform vectors measured relative to different coordinate systems and describing the environment to be transformed into a single coordinate system.

The mapping steps described herein may be performed in various settings, such as with a camera installed on a robotic floor cleaning device, robotic lawn mowers, and/or other autonomous and semi-autonomous robots. The methods and techniques described, in some embodiments, are expected to increase processing efficiency and reduce computational cost using principals of information theory. Information theory provides that if an event is more likely and the occurrence of the event is expressed in a message, the message has less information as compared to a message that expresses a less likely event. Information theory formalizes and quantifies the amount of information born in a message using entropy. This is true for all information that is digitally stored, processed, transmitted, calculated, etc. Independent events also have additive information. For example, a message may express, "An earthquake did not happen 15 minutes ago, an earthquake did not happen 30 minutes ago, an earthquake happened 45 minutes ago", another message may also express, "an earthquake happened 45 minutes ago". The information born in either message is the same however the second message can express the message with less bits and is therefore said to have more information than the first message. Also, by definition of information theory, the second message, which reports an earthquake, is an event less likely to occur and therefor has more information than the first message which reports the more likely event of no earthquake. The entropy is defined as number of bits per symbol in a message and provided by $-\Sigma_i p_i \log_2 (p_i)$, wherein $p_i$ is the probability of occurrence of the i-th possible value of the symbol. If there is a way to express, store, process or transfer a message with the same information but with fewer number of bits, it is said to have more information. In the context of an environment of a robot, the perimeters within the immediate vicinity of and objects closest to the robot are most important. Therefore, if only information of the perimeters within the immediate vicinity of and objects closest to the robot are processed, a lot of computational costs are saved as compared to processing empty spaces, the perimeters and all the spaces beyond the perimeters. Perimeters or objects closest to the robot may be, for example, 1 meter away or may be 4 meters away. Avoiding the processing of empty spaces between the robot and closest perimeters or objects and spaces beyond the closest perimeters or objects substantially reduces computational costs. For example, some traditional techniques construct occupancy grids that assign statuses to every possible point within an environment, such statuses including "unoccupied", "occupied" or "unknown". At least some of the methods described herein may be considered a lossless (or less lossy) compression as an occupancy grid may be constructed at any time as needed. This is expected to save a lot of computational cost as additional information is not unnecessarily processed while access to the information is possible if required. This computational advantage enables the proposed mapping methods to run on, for example, an ARM M7 microcontroller as compared to much faster CPUs used in the current state of the art, thereby reducing costs for robots used within consumer homes. When used with faster CPUs, computational costs are saved, allowing the CPU to process other computational needs. Some embodiments may include an application specific integrated circuit (e.g., an AI co-processor ASIC) that cooperates with a physically separate or integrated central processing unit to analyze frames of video (and depth-camera readings) in the manner described herein. In some cases, the ASIC may include a relatively large number (e.g., more than 500) arithmetic logic units (ALUs) configured to operate concurrently on data. In some cases, the ALUs may be configured to operate on relatively low-precision data (e.g., less than or equal to 16 bits, 8 bits, or 4 bits) to afford more parallel computing units per unit area of chip substrate. In some cases, the AI co-processor ASIC may have an independent memory interface (relative to the CPU) to memory, and in some cases, independent memory from that accessed by the CPU. In some cases, the interface may be to high bandwidth memory (HBM), e.g., as specified by the JEDEC HBM2 specification, that includes a 3-dimensional stack of dynamic random access memory. In some cases, the memory accessed by the AI co-processor ASIC may be packed in a multi-chip package with such a 3-dimensional stack of memory, e.g., on a shared package substrate that connects to the CPU via a system board.

Other aspects of some embodiments are expected to further reduce computational costs (or increase an amount of image data processed for a given amount of computational resources). For example, in one embodiment, Euclidean norm of vectors may be processed and stored, expressing the depth to perimeters in the environment with a distribution density. This approach may have less loss of information when compared to some traditional techniques using an occupancy grid, which expresses the perimeter as points with an occupied status. This is a lossy compression. Information is lost at each step of the process due to the error in, for example, the reading device, the hardware word size, 8-bit processer, 16-bit processor, 32-bit processor, software word size of the reading device (using integers versus float to express a value), the resolution of the reading device, the resolution of the occupancy grid itself, etc. In this exemplary embodiment, the data is processed giving a probability distribution over the Euclidean norm of the measurements. The initial measurements begin with a triangle or Gaussian distribution and, following measurements, narrow down the overlap area between two sets of data to two possibilities that can be formulated with a Bernoulli distribution, simplifying calculations drastically. Additionally, to further offload computational costs on the robot, in some embodiments, some data are processed on at least one separate device, such as a docking station of the robot or on the cloud.

In some embodiments, the processor of the robot uses sensor data to estimate its location within the environment prior to beginning and during the mapping process. In some embodiments, sensors of the robot capture data and the processor initially estimates the location of the robot based on the data and measured movement (e.g., using devices such as a gyroscope, optical encoder, etc.) of the robot. As more data is collected, the processor increases the confidence in the estimated location of the robot, and when movement occurs the processor decreases the confidence due to noise in measured movement.

In some embodiments, IMU measurements in a multichannel stream indicative of acceleration along three or six axes may be integrated over time to infer a change in pose of the robot, e.g., with a Kalman filter. In some cases, the change in pose may be expressed as a movement vector in the frame of reference of the room through which the robot moves. Some embodiments may localize the robot or map the room based on this movement vector (and contact sensors in some cases) even if the image sensor is inoperative or degraded. In some cases, IMU measurements may be combined with image-based (or other exteroceptive) mapping data in a map or localization determination, e.g., with techniques like those described in Chen et. al "Real-time 3D mapping using a 2D laser scanner and IMU-aided visual SLAM," 2017 IEEE International Conference on Real-time Computing and Robotics (RCAR), DOI: 10.1109/RCAR.2017.8311877, or in Ye et. al, LiDAR and Inertial Fusion for Pose Estimation by Non-linear Optimization, arXiv:1710.07104 [cs.RO], the contents of each of which are hereby incorporated by reference. Or in some cases, data from one active sensor may be used at a time for localization or mapping, and the other sensor may remain passive, e.g., sensing data, but that data may not be used for localization or mapping while the other sensor is active. Some embodiments may maintain a buffer of sensor data from the passive sensor (e.g., including measurements over a preceding duration, like one second or ten seconds), and upon failover from the active sensor to the passive sensor, which may then become active, some embodiments may access the buffer to infer a current position or map features based on both currently sensed data and buffered data. In some embodiments, the buffered data may be calibrated to the location or mapped features from the formerly active sensor, e.g., with the above-described sensor fusion techniques.

Figure 72:
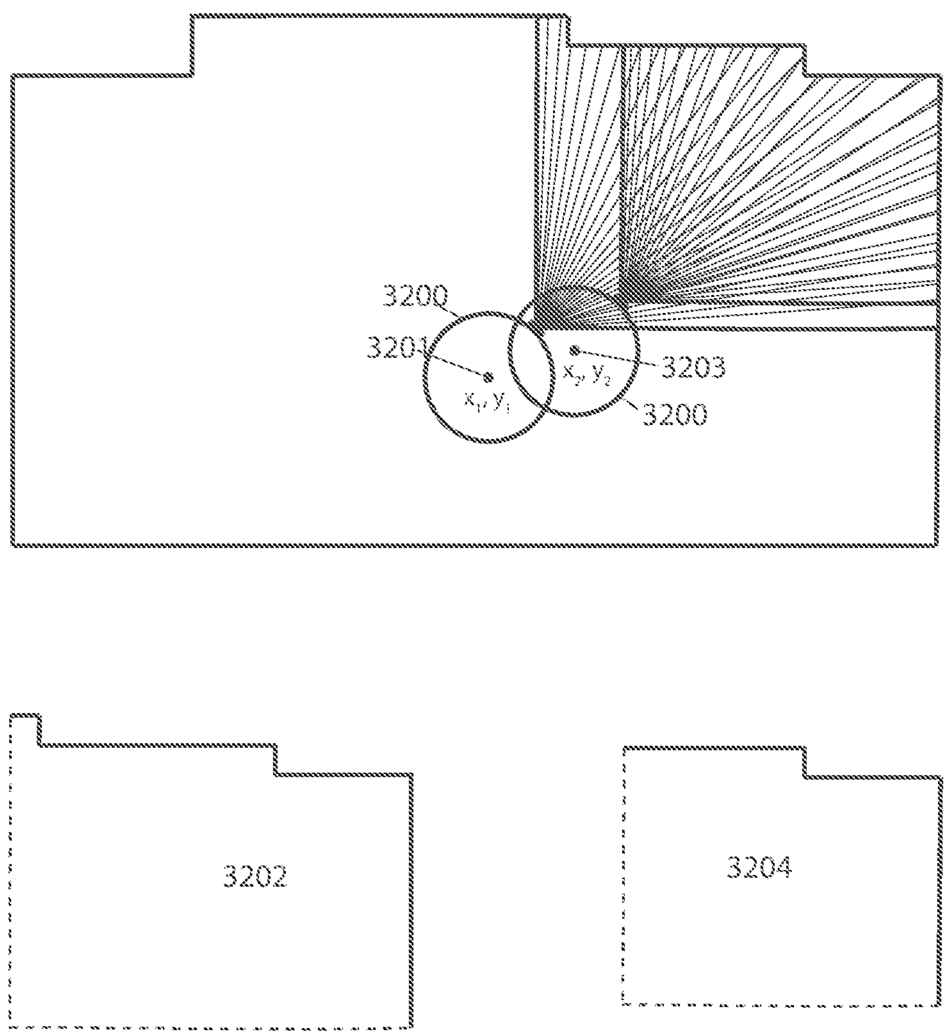
FIG. 72 illustrates a map of a robotic device for alternative localization scenarios, according to some embodiments.

In embodiments, the constructed map of the robot may only be valid with accurate localization of the robot. For example, in FIG. 72, accurate localization of robot 3200 at location 3201 with position $x_1$, $y_1$ may result in map 3202 while inaccurate localization of robot 3200 at location 3203 with position $x_2$, $y_2$ may result in inaccurate map 3204 wherein perimeters of the map incorrectly appearing closer to robot 3200 as robot 3200 is localized to incorrect location 3203. To eliminate or reduce such occurrences, in some embodiments, the processor constructs a map for each or a portion of possible locations of robot 3200 and evaluates the alternative scenarios of possible locations of robot 3200 and corresponding constructed maps of such locations. The processor determines the number of alternative scenarios to evaluate in real-time or it is predetermined. In some embodiments, each new scenario considered adds a new dimension to the environment of robot 3200. Over time, the processor discards less likely scenarios. For example, if the processor considers a scenario placing robot 3200 at the center of a room and yet robot 3200 is observed to make contact with a perimeter, the processor determines that the considered scenario is an incorrect interpretation of the environment and the corresponding map is discarded. In some embodiments, the processor substitutes discarded scenarios with more likely scenarios or any other possible scenarios. In some embodiments, the processor uses a Fitness Proportionate Selection technique wherein a fitness function is used to assign a fitness to possible alternative scenarios and the fittest locations and corresponding maps survive while those with low fitness are discarded. In some embodiments, the processor uses the fitness level of alternative scenarios to associate a probability of selection with each alternative scenario that may be determined using the fitness function p, $=f_i/\Sigma_{j=1}^{N}f_j$ wherein $f_i$ is the fitness of alternative scenario i of N possible scenarios and $p_i$ is the probability of selection of alternative scenario i. In some embodiments, the processor is less likely to eliminate alternative scenarios with higher fitness level from the alternative scenarios currently considered. In some embodiments, the processor interprets the environment using a combination of a collection of alternative scenarios with high fitness level.

In some embodiments, the movement pattern of the robot during the mapping process is a boustrophedon movement pattern. This can be advantageous for mapping the environment. For example, if the robot begins in close proximity to a wall of which it is facing and attempts to map the environment by rotating 360 degrees in its initial position, areas close to the robot and those far away may not be observed by the sensors as the areas surrounding the robot are too close and those far away are too far. Minimum and maximum detection distances may be, for example, 30 and 400 centimeters, respectively. Instead, in some embodiments, the robot moves backwards (i.e., opposite the forward direction as defined below) away from the wall by some distance and the sensors observe areas of the environment that were previously too close to the sensors to be observed. The distance of backwards movement is, in some embodiments, not particularly large, it may be 40, 50, or 60 centimeters for example. In some cases, the distance backward is larger than the minimal detection distance. In some embodiments, the distance backward is more than or equal to the minimal detection distance plus some percentage of a difference between the minimal and maximal detection distances of the robot's sensor, e.g., 5%, 10%, 50%, or 80%.

The robot, in some embodiments, (or sensor thereon if the sensor is configured to rotate independently of the robot) then rotates 180 degrees to face towards the open space of the environment. In doing so, the sensors observe areas in front of the robot and within the detection range. In some embodiments, the robot does not translate between the backward movement and completion of the 180 degree turn, or in some embodiments, the turn is executed while the robot translates backward. In some embodiments, the robot completes the 180 degree turn without pausing, or in some cases, the robot may rotate partially, e.g., degrees, move less than a threshold distance (like less than 10 cm), and then complete the other 90 degrees of the turn.

References to angles should be read as encompassing angles between plus or minus 20 degrees of the listed angle, unless another tolerance is specified, e.g., some embodiments may hold such tolerances within plus or minus 15 degrees, 10 degrees, 5 degrees, or 1 degree of rotation. References to rotation may refer to rotation about a vertical axis normal to a floor or other surface on which the robot is performing a task, like cleaning, mapping, or cleaning and mapping. In some embodiments, the robot's sensor by which a workspace is mapped, at least in part, and from which the forward direction is defined, may have a field of view that is less than 360 degrees in the horizontal plane normal to the axis about which the robot rotates, e.g., less than 270 degrees, less than 180 degrees, less than 90 degrees, or less than 45 degrees. In some embodiments, mapping may be performed in a session in which more than 10%, more than 50%, or all of a room is mapped, and the session may start from a starting position, is where the presently described routines start, and may correspond to a location of a base station or may be a location to which the robot travels before starting the routine.

The robot, in some embodiments, then moves in a forward direction (defined as the direction in which the sensor points, e.g., the centerline of the field of view of the sensor) by some first distance allowing the sensors to observe surroundings areas within the detection range as the robot moves. The processor, in some embodiments, determines the first forward distance of the robot by detection of an obstacle by a sensor, such as a wall or furniture, e.g., by making contact with a contact sensor or by bringing the obstacle closer than the maximum detection distance of the robot's sensor for mapping. In some embodiments, the first forward distance is predetermined or in some embodiments the first forward distance is dynamically determined, e.g., based on data from the sensor indicating an object is within the detection distance.

The robot, in some embodiments, then rotates another 180 degrees and moves by some second distance in a forward direction (from the perspective of the robot), returning back towards its initial area, and in some cases, retracing its path. In some embodiments, the processor may determine the second forward travel distance by detection of an obstacle by a sensor, such moving until a wall or furniture is within range of the sensor. In some embodiments, the second forward travel distance is predetermined or dynamically determined in the manner described above. In doing so, the sensors observe any remaining undiscovered areas from the first forward distance travelled across the environment as the robot returns back in the opposite direction. In some embodiments, this back and forth movement described is repeated (e.g., with some amount of orthogonal offset translation between iterations, like an amount corresponding to a width of coverage of a cleaning tool of the robot, for instance less than 100% of that width, 95% of that width, 90% of that width, 50% of that width, etc.) wherein the robot makes two 180 degree turns separated by some distance, such that movement of the robot is a boustrophedon pattern, travelling back and forth across the environment. In some embodiments, the robot may not be initially facing a wall of which it is in close proximity with. The robot may begin executing the boustrophedon movement pattern from any area within the environment. In some embodiments, the robot performs other movement patterns besides boustrophedon alone or in combination.

In other embodiments, the boustrophedon movement pattern (or other coverage path pattern) of the robot during the mapping process differs. For example, in some embodiments, the robot is at one end of the environment, facing towards the open space. From here, the robot moves in a first forward direction (from the perspective of the robot as defined above) by some distance then rotates 90 degrees in a clockwise direction. The processor determines the first forward distance by which the robot travels forward by detection of an obstacle by a sensor, such as a wall or furniture. In some embodiments, the first forward distance is predetermined (e.g., and measured by another sensor, like an odometer or by integrating signals from an inertial measurement unit). The robot then moves by some distance in a second forward direction (from the perspective of the room, and which may be the same forward direction from the perspective of the robot, e.g., the direction in which its sensor points after rotating); and rotates another 90 degrees in a clockwise direction. The distance travelled after the first 90-degree rotation may not be particularly large and may be dependent on the amount of desired overlap when cleaning the surface. For example, if the distance is small (e.g., less than the width of the main brush of a robotic vacuum), as the robot returns back towards the area it began from, the surface being cleaned overlaps with the surface that was already cleaned. In some cases, this may be desirable. If the distance is too large (e.g., greater than the width of the main brush) some areas of the surface may not be cleaned. For example, for small robots, like a robotic vacuum, the brush size typically ranges from 15-30 cm. If 50% overlap in coverage is desired using a brush with 15 cm width, the travel distance is 7.5 cm. If no overlap in coverage and no coverage of areas is missed, the travel distance is 15 cm and anything greater than 15 cm would result in coverage of area being missed. For larger commercial robots brush size can be between 50-60 cm. The robot then moves by some third distance in forward direction back towards the area of its initial starting position, the processor determining the third forward distance by detection of an obstacle by a sensor, such as wall or furniture. In some embodiments, the third forward distance is predetermined. In some embodiments, this back and forth movement described is repeated wherein the robot repeatedly makes two 90-degree turns separated by some distance before travelling in the opposite direction, such that movement of the robot is a boustrophedon pattern, travelling back and forth across the environment. In other embodiments, the directions of rotations are opposite to what is described in this exemplary embodiment. In some embodiments, the robot may not be initially facing a wall of which it is in close proximity. The robot may begin executing the boustrophedon movement pattern from any area within the environment. In some embodiments, the robot performs other movement patterns besides boustrophedon alone or in combination.

Figures 73A, 73B, 73C:
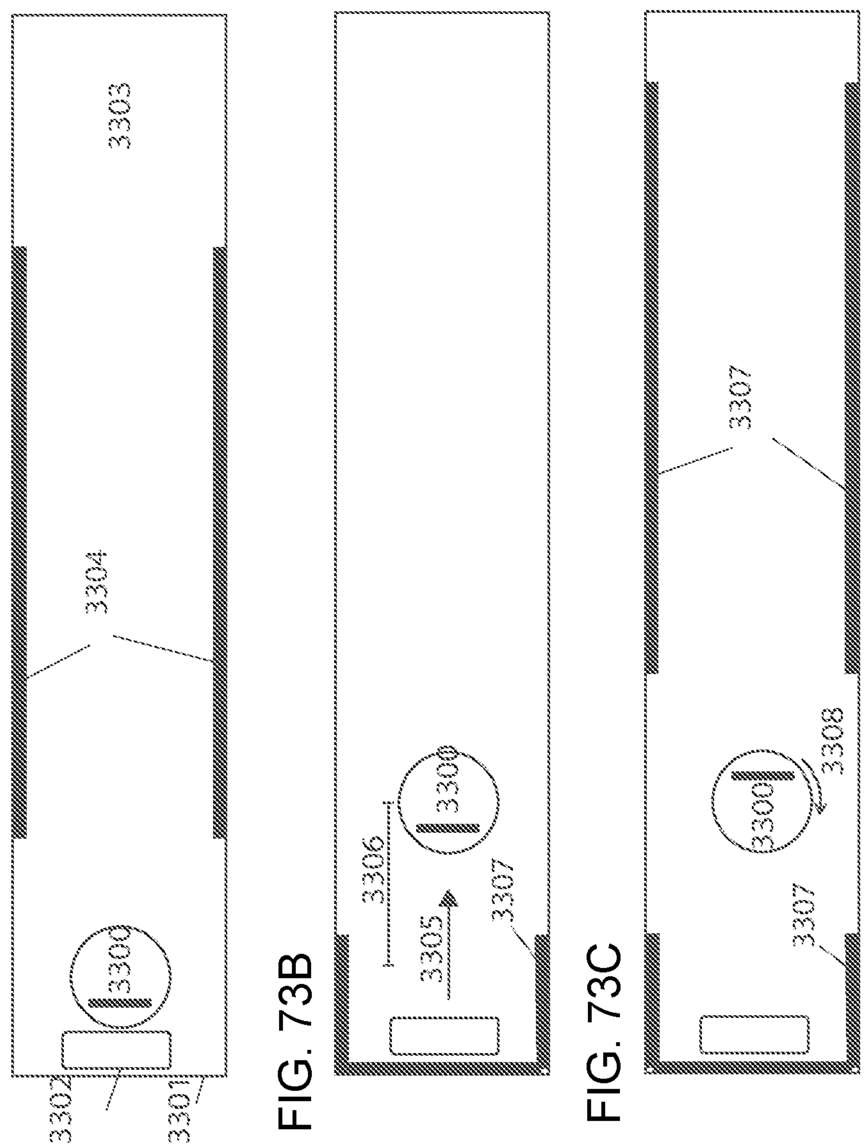
FIGS. 73A-73F and 74A-74D illustrate a boustrophedon movement pattern that may be executed by a robotic device while mapping the environment, according to some embodiments.
Figure 73D:
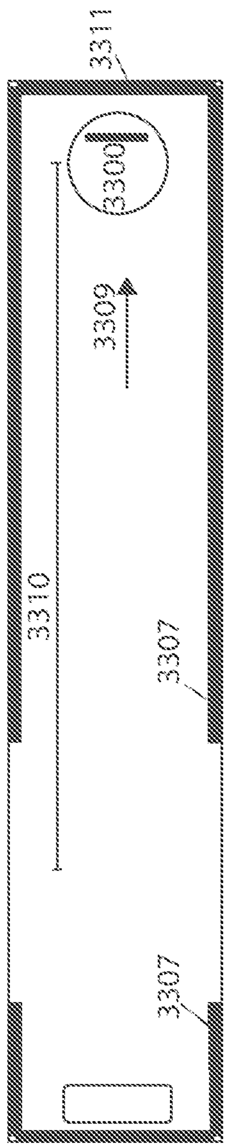
Figure 73E:
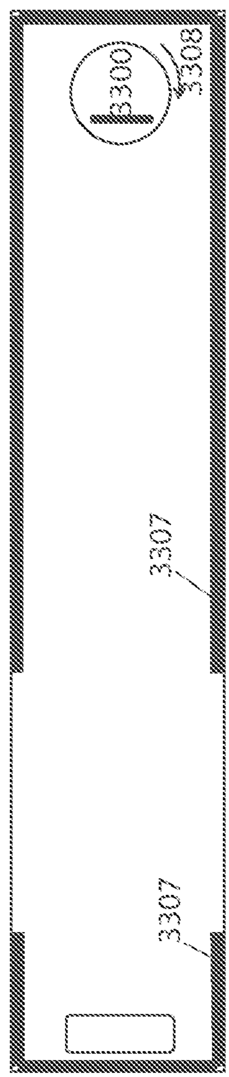
Figure 73F:
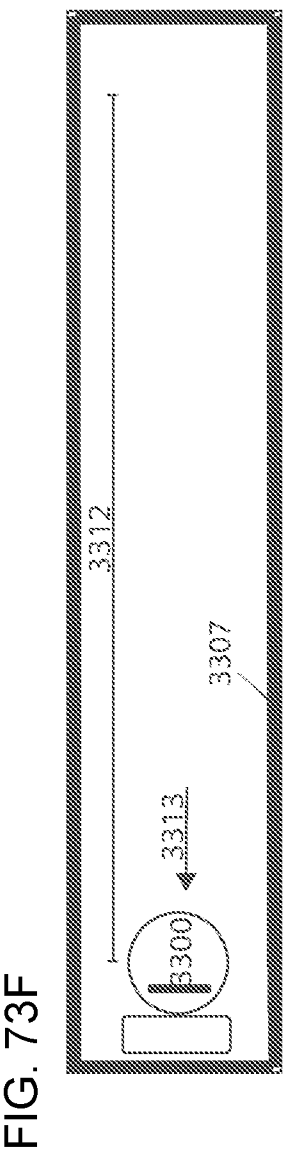

FIGS. 73A-73F illustrate an example of a boustrophedon movement pattern of the robot. In FIG. 73A robot 3300 begins near wall 3301, docked at its charging or base station 3302. Robot 3300 rotates 360 degrees in its initial position to attempt to map environment 3303, however, areas 3304 are not observed by the sensors of robot 3300 as the areas surrounding robot 3300 are too close, and the areas at the far end of environment 3303 are too far to be observed. Minimum and maximum detection distances may be, for example, 30 and 400 centimeters, respectively. Instead, in FIG. 73B, robot 3300 initially moves backwards in direction 3305 away from charging or base station 3302 by some distance 3306 where areas 3307 are observed. Distance 3306 is not particularly large, it may be 40 centimeters, for example. In FIG. 73C, robot 3300 then rotates 180 degrees in direction 3308 resulting in observed areas 3307 expanding. Areas immediately to either side of robot 3300 are too close to be observed by the sensors while one side is also unseen, the unseen side depending on the direction of rotation. In FIG. 73D, robot 3300 then moves in forward direction 3309 by some distance 3310, observed areas 3307 expanding further as robot 3300 explores undiscovered areas. The processor of robot 3300 determines distance 3310 by which robot 3300 travels forward by detection of an obstacle, such as wall 3311 or furniture or distance 3310 is predetermined. In FIG. 73E, robot 3300 then rotates another 180 degrees in direction 3308. In FIG. 73F, robot 3300 moves by some distance 3312 in forward direction 3313 observing remaining undiscovered areas. The processor determines distance 3312 by which the robot 3300 travels forward by detection of an obstacle, such as wall 3301 or furniture or distance 3312 is predetermined. The back and forth movement described is repeated wherein robot 3300 makes two 180 degree turns separated by some distance, such that movement of robot 3300 is a boustrophedon pattern, travelling back and forth across the environment while mapping. In other embodiments, the direction of rotations may be opposite to what is illustrated in this exemplary embodiment.

Figure 74A:
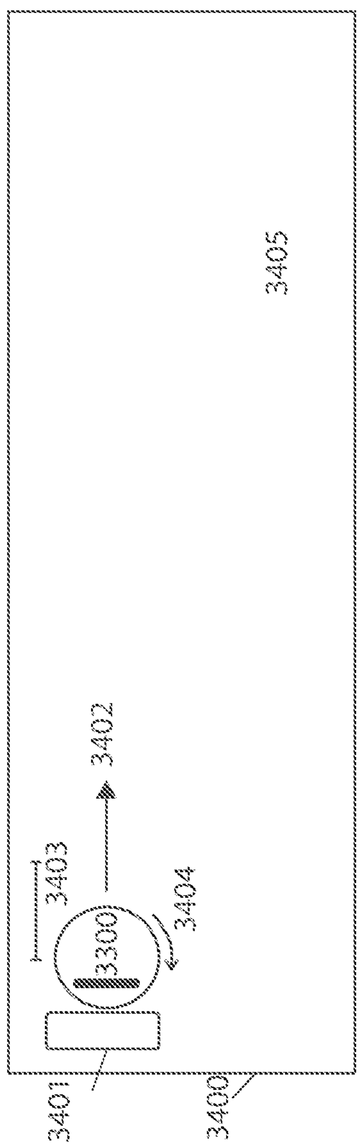
Figure 74B:
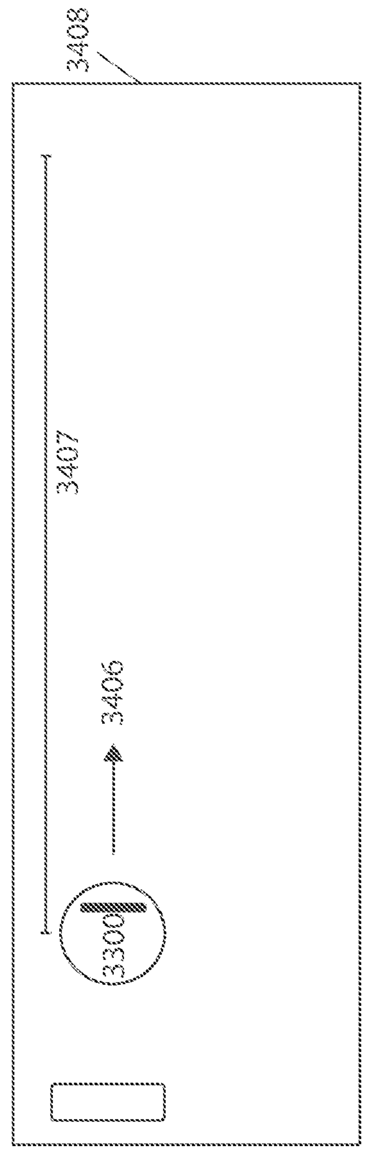
Figure 74C:
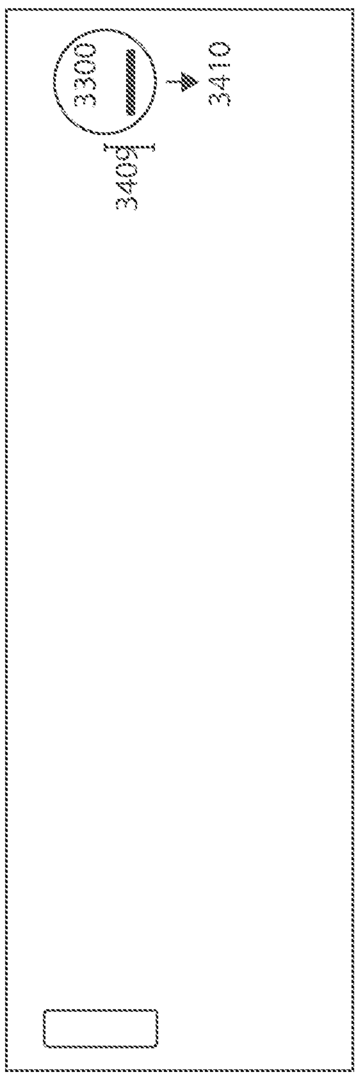
Figure 74D:
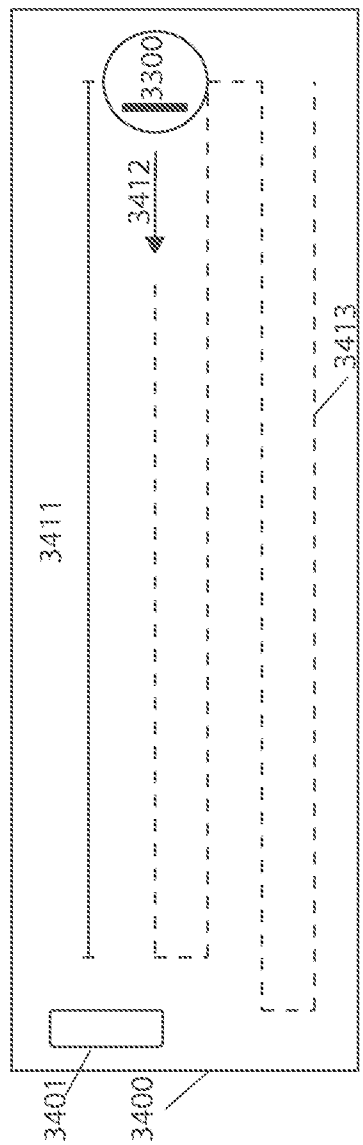

FIGS. 74A-74D illustrate another embodiment of a boustrophedon movement pattern of the robot during the mapping process. FIG. 74A illustrates robot 3300 beginning the mapping process facing wall 3400, when for example, it is docked at charging or base station 3401. In such a case, robot 3300 initially moves in backwards direction 3402 away from charging station 3401 by some distance 3403. Distance 3403 is not particularly large, it may be 40 centimeters for example. In FIG. 74B, robot 3300 rotates 180 degrees in direction 3404 such that robot 3300 is facing into the open space of environment 3405. In FIG. 74C, robot 3300 moves in forward direction 3406 by some distance 3407 then rotates 90 degrees in direction 3404. The processor determines distance 3407 by which robot 3300 travels forward by detection of an obstacle, such as wall 3408 or furniture or distance 3407 is predetermined. In FIG. 74D, robot 3300 then moves by some distance 3409 in forward direction 3410 and rotates another 90 degrees in direction 3404. Distance 3409 is not particularly large and depends on the amount of desired overlap when cleaning the surface. For example, if distance 3409 is small (e.g., less than the width of the main brush of a robotic vacuum), as robot 3300 returns in direction 3412, the surface being cleaned may overlap with the surface that was already cleaned when robot 3300 travelled in direction 3406. In some cases, this may be desirable. If distance 3409 is too large (e.g., greater than the width of the main brush) some areas of the surface may not be cleaned. For example, for small robots, like a robotic vacuum, the brush size typically ranges from 15-30 cm. If 50% overlap in coverage is desired using a brush with 15 cm width, the travel distance is 7.5 cm. If no overlap in coverage and no coverage of areas is missed, the travel distance is 15 cm and anything greater than 15 cm would result in coverage of area being missed. For larger commercial robots brush size can be between 50-60 cm. Finally, robot 3300 moves by some distance 3411 in forward direction 3412 towards charging station 3401. The processor determines distance 3411 by which robot 3300 travels forward may be determined by detection of an obstacle, such as wall 3400 or furniture or distance 3411 is predetermined. This back and forth movement described is repeated wherein robot 3300 repeatedly makes two 90-degree turns separated by some distance before travelling in the opposite direction, such that movement of robot 3300 is a boustrophedon pattern, travelling back and forth across the environment while mapping. Repeated movement 3413 is shown in FIG. 74D by dashed lines. In other embodiments, the direction of rotations may be opposite to what is illustrated in this exemplary embodiment.

Figure 75:
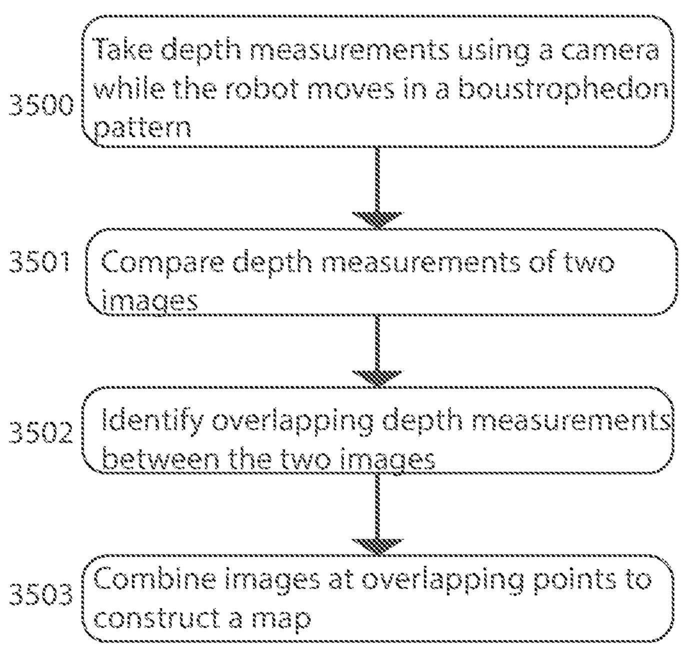
FIG. 75 illustrates a flowchart describing an example of a method for finding the boundary of an environment, according to some embodiments.

FIG. 75 illustrates a flowchart describing embodiments of a path planning method of a robot 3500, 3501, 3502 and 3503 corresponding with steps performed in some embodiments.

Figure 76A:
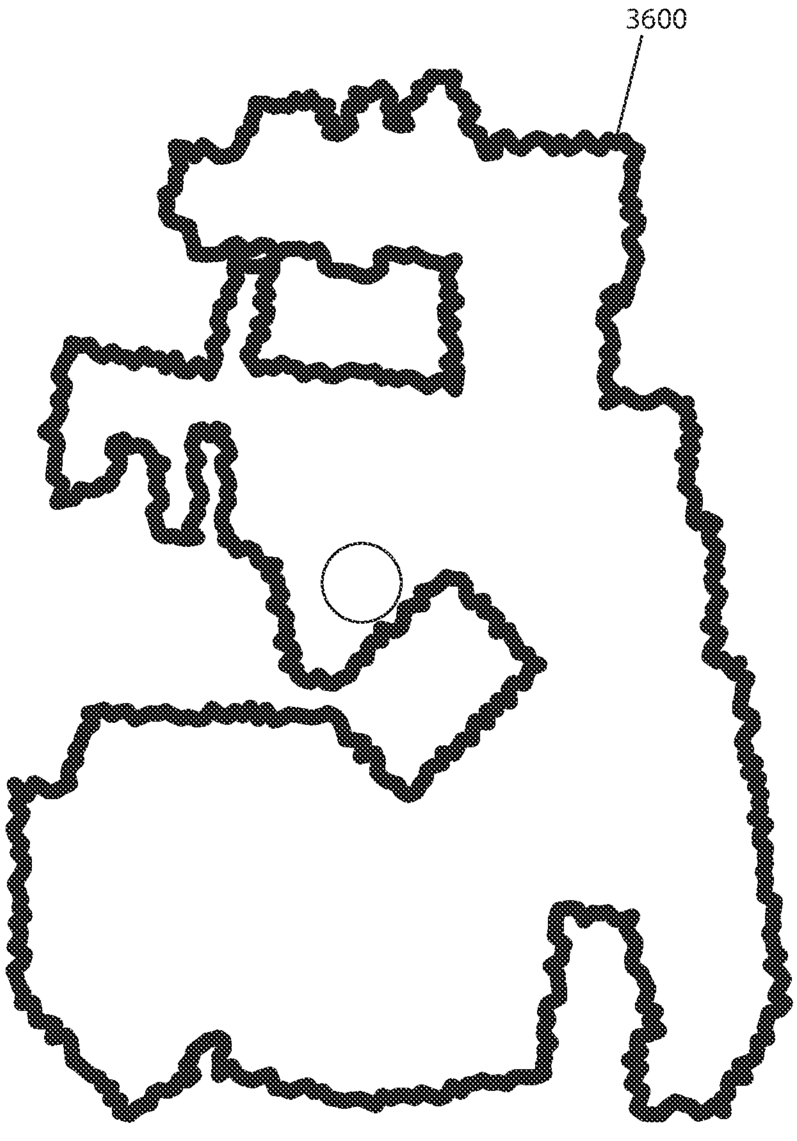
FIGS. 76A and 76B illustrate an example of a map of an environment, according to some embodiments.
Figure 76B:
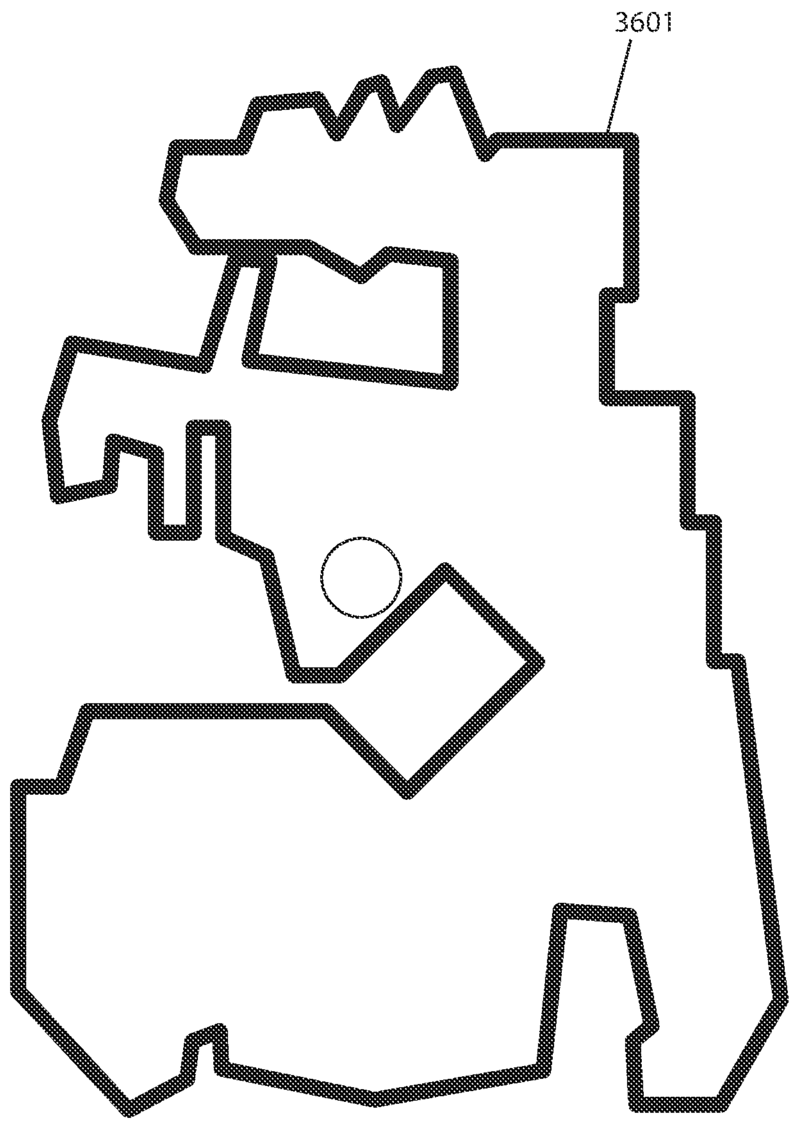
Figure 77A:
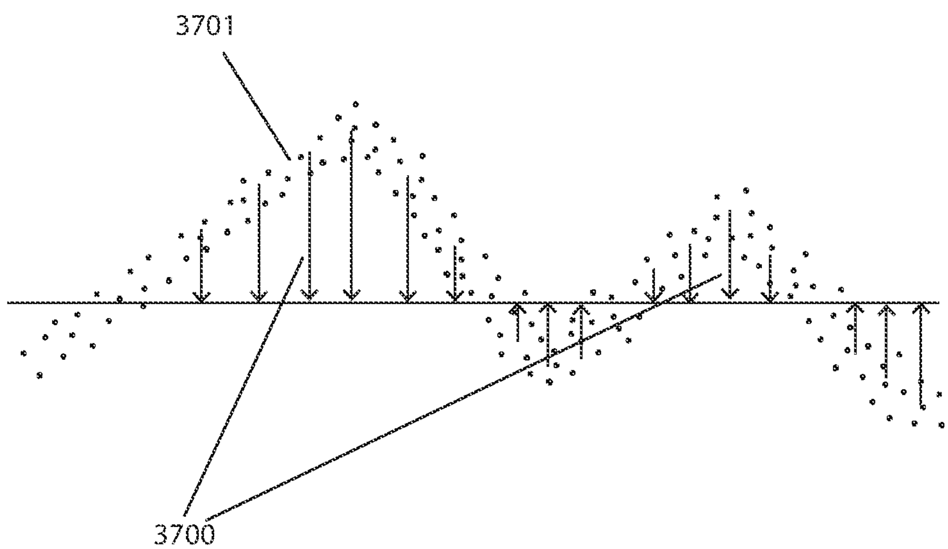
FIGS. 77A-77D, 78A-78C, and 79 illustrate an example of approximating a perimeter, according to some embodiments.
Figure 77B:
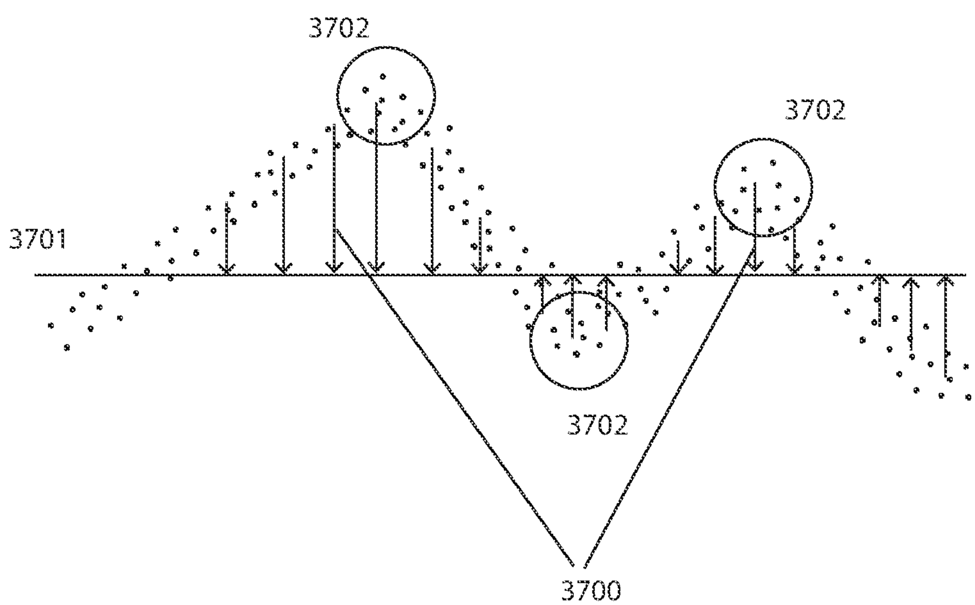
Figure 77C:
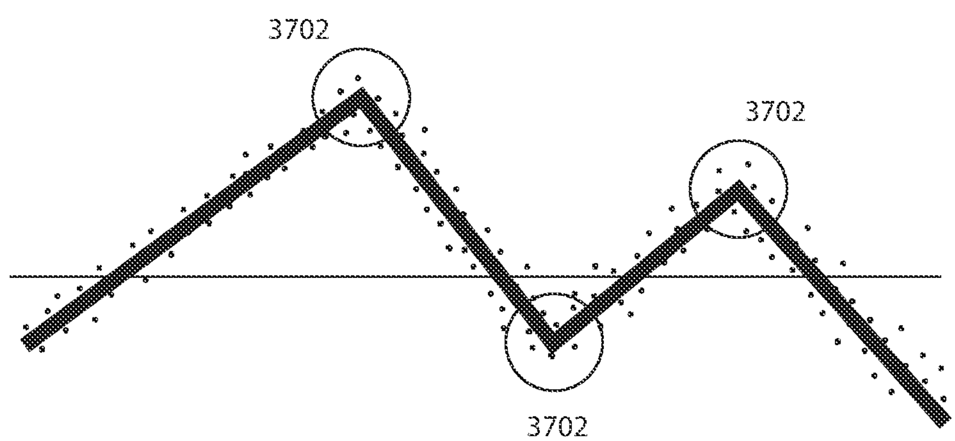
Figure 77D:
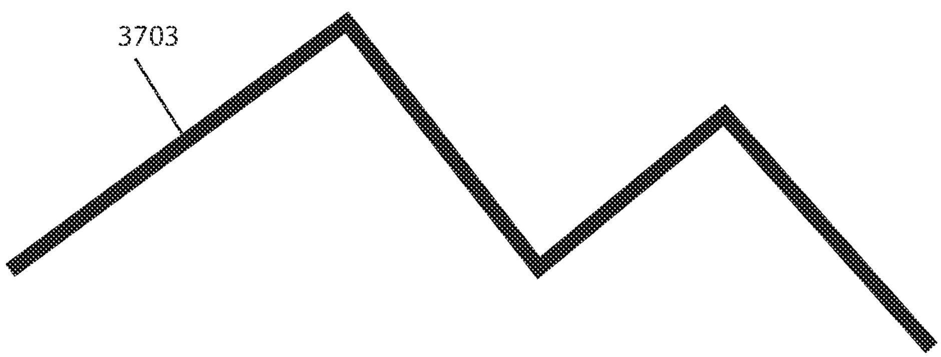

In some embodiments, the processor may manipulate the map by cleaning up the map for navigation purposes or aesthetics purposes (e.g., displaying the map to a user). For example, FIG. 76A illustrates a perimeter 3600 of an environment that may not be aesthetically pleasing to a user. FIG. 76B illustrates an alternative version of the map illustrated in FIG. 76A wherein the perimeter 3601 may be more aesthetically pleasing to the user. In some embodiments, the processor may use a series of techniques, a variation of each technique, and/or a variation in order of applying the techniques to reach the desired outcome in each case. For example, FIG. 77A illustrates a series of measurements 3700 to perimeter 3701 of an environment. In some cases, it may be desirable that the perimeter 3701 of the environment is depicted. In embodiments, different methods may be used in processing the data to generate a perimeter line. In some embodiments, the processor may generate a line from all the data points using least square estimation, such as in FIG. 77A. In some embodiments, the processor may determine the distances from each point to the line and may select local maximum and minimum L2 norm values. FIG. 77B illustrates the series of measurements 3700 to line 3701 generated based on least square estimation of all data points and selected local maximum and minimum L2 norm values 3702. In some embodiments, the processor may connect local maximum and minimum L2 norm values. For example, FIG. 77C illustrates local maximum and minimum L2 norm values 3702 connected to each other. In some embodiments, the connected local maximum and minimum L2 norm values may represent the perimeter of the environment. FIG. 77D illustrates a possible depiction of the perimeter 3703 of the environment.

Figure 78A:
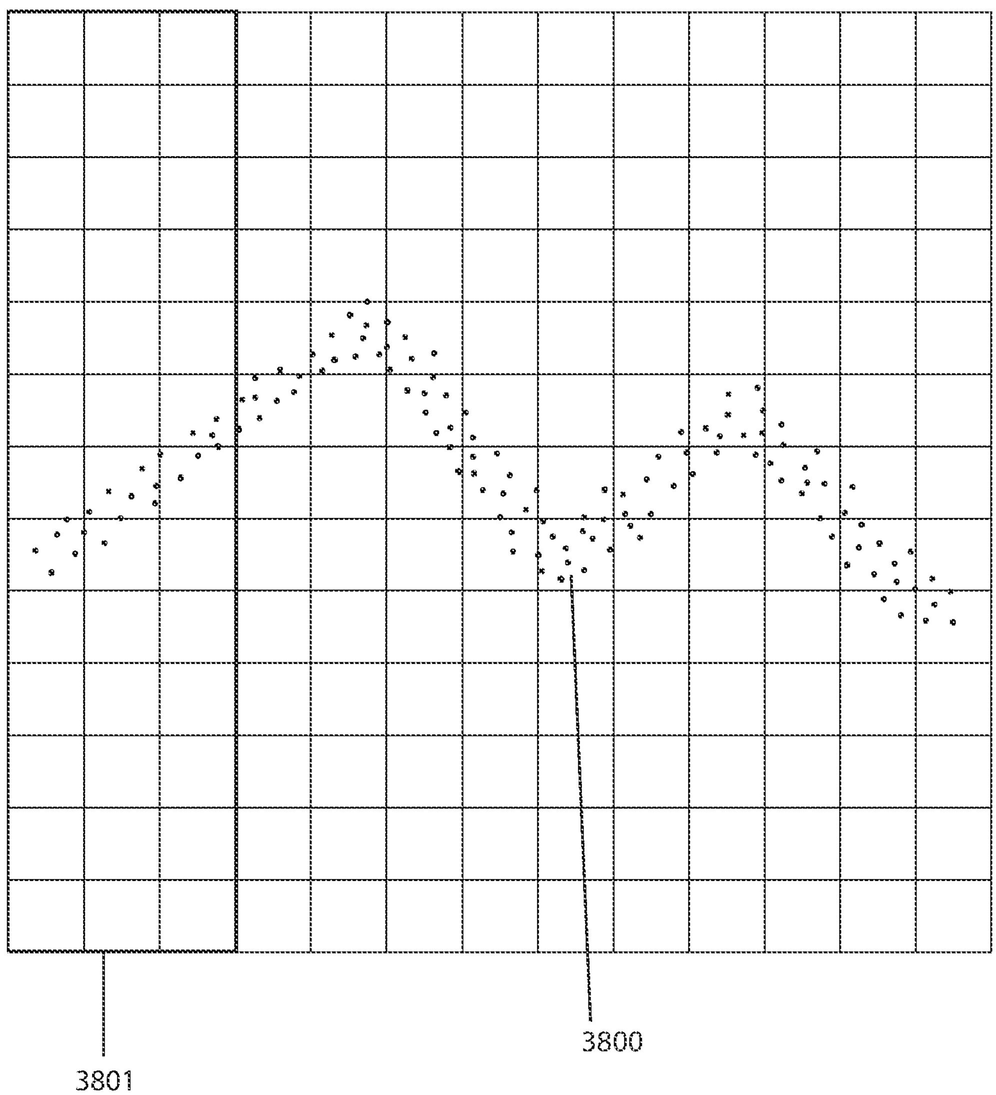
Figure 78B:
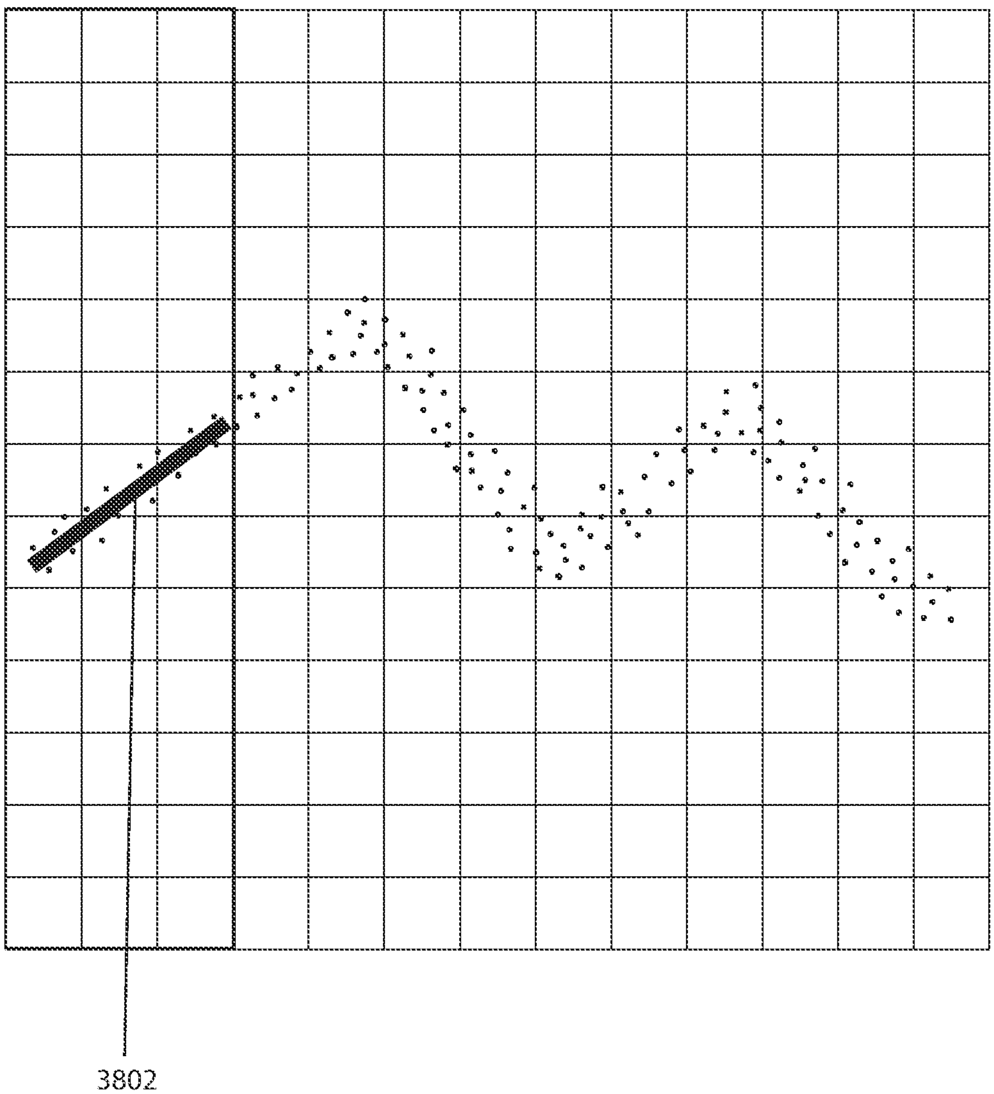
Figure 78C:
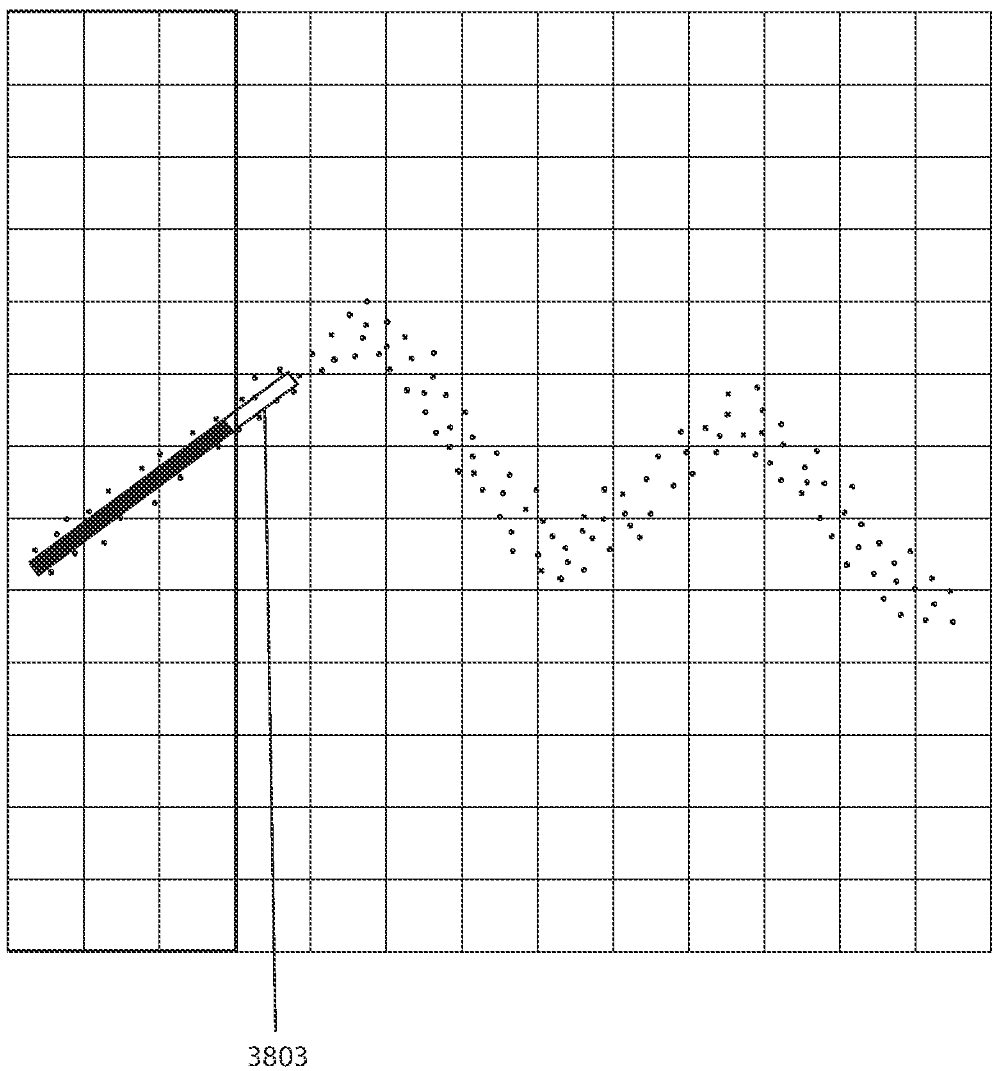
Figure 79:
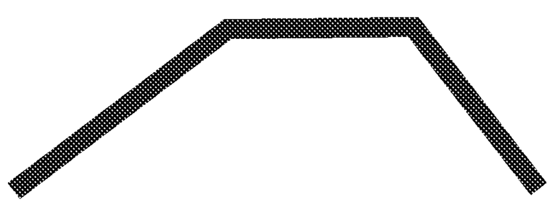

In another method, the processor may initially examine a subset of the data. For example, FIG. 78A illustrates data points 3800. Initially, the processor may examine data points falling within columns one to three or area 3801. In some embodiments, the processor may fit a line to the subset of data using, for example, least square method. FIG. 78B illustrates a line 3802 fit to data points falling within columns one to three. In some embodiments, the processor may examine data points adjacent to the subset of data and may determine whether the data points belong with the same line fitted to the subset of data. For example, in FIG. 78C, the processor may consider data points falling within column four 3803 and may determine if the data points belong with the line 3802 fitted to the data points falling with columns one to three. In some embodiments, the processor may repeat the process of examining data adjacent to the last set of data points examined. For example, after examining data points falling with column four in FIG. 78C, the processor may examine data points falling with column five. In some embodiments, other variations of this technique may be used. For example, the processor may initially examine data falling within the first three columns, then may examine the next three columns. The processor may compare a line fitted to the first three columns to a line fitted to the next three columns. This variation of the technique may result in a perimeter line such as that illustrated in FIG. 79. In another variation, the processor examines data points falling within the first three columns, then examines data points falling within another three columns, some of which overlap with the first three columns. For example, the first three columns may be columns one to three and the other three columns may be columns three to five or two to four. The processor may compare a line fitted to the first three columns to a line fitted to the other three columns. In other embodiments, other variations may be used.

Figure 80:
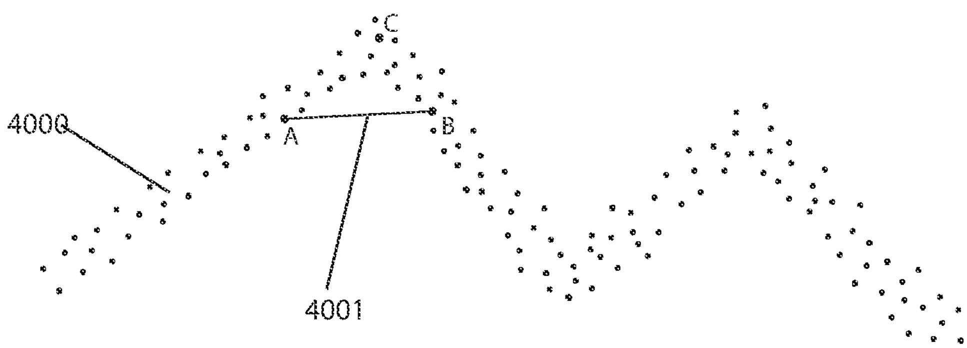
FIGS. 80, 81A, and 81B illustrate an example of fitting a line to data points, according to some embodiments.
Figure 81A:
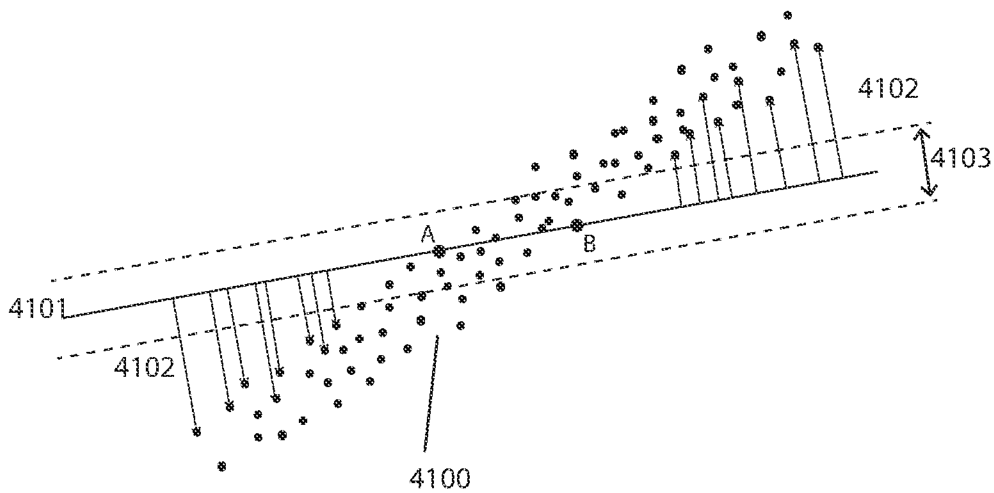
Figure 81B:
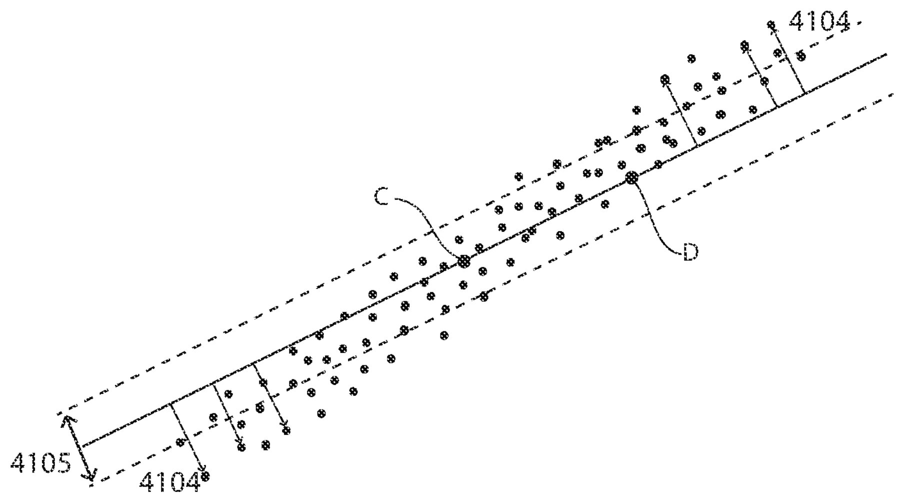

In another method, the processor may choose a first data point A and a second data point B from a set of data points. In some embodiments, data point A and data point B may be next to each other or close to one another. In some embodiments, the processor may choose a third data point C from the set of data points that is spatially positioned in between data point A and data point B. In some embodiments, the processor may connect data point A and data point B by a line. In some embodiments, the processor may determine if data point C fits the criteria of the line connecting data points A and B. In some embodiments, the processor determines that data points A and B within the set of data points are not along a same line. For example, FIG. 80 illustrates a set of data points 4000, chosen data points A, B, and C, and line 4001 connecting data point A and B. Since data point C does not fit criteria of lines 4001, it may be determined that data points A and B within the set of data point 4000 do not fall along a same line. In another variation, the processor may choose a first data point A and a second data point B from a set of data points and may connect data points A and B by a line. In some embodiments, the processor may determine a distance between each data point of the set of data points to the line connecting data points A and B. In some embodiments, the processor may determine the number of outliers and inliers. In some embodiments, the processor may determine if data points A and B fall along the same line based on the number of outliers and inliers. In some embodiments, the processor may choose another two data points C and D if the number of outliers or the ratio of outliers to inliers is greater than a predetermined threshold and may repeat the processor with data points C and D. FIG. 81A illustrates a set of data points 4100, data points A and B and line 4101 connecting data points A and B. The processor determines distances 4102 from each of the data points of the set of data points 4100 to line 4101. The processor determines the number of data points with distances falling within region 4103 as the number of inlier data points and the number of data points with distances falling outside of region 4103 as the number of outlier points. In this example, there are too many outliers. Therefore, FIG. 81B illustrates another two selected data points C and D. The process is repeated and less outliers are found in this case as there are less data points with distances 4104 falling outside of region 4105. In some embodiments, the processor may continue to choose another two data points and repeat the process until a minimum number of outliers is found or the number of outliers or the ratio of outliers to inliers is below a predetermined threshold. In some embodiments, there may be too may data points within the set of data points to select data points in sets of two. In some embodiments, the processor may probabilistically determine the number of data points to select and check based on the accuracy or minimum probability required. For example, the processor may iterate the method 20 times to achieve a 99% probability of success. Any of the methods and techniques described may be used independently or sequentially, one after another, or may be combined with other methods and may be applied in different orders.

In some embodiments, the processor may use image derivative techniques. Image derivative techniques may be used with data provided in various forms and are not restricted to being used with images. For example, image derivative techniques may be used with an array of distance readings (e.g., a map) or other types of readings just as well work well with a combination of these methods. In some embodiments, the processor may use a discrete derivative as an approximation of a derivative of an image I. In some embodiments, the processor determines a derivative in an x-direction for a pixel $x_1$ as the difference between the value of pixel $x_1$ and the values of the pixels to the left and right of the pixel $x_1$. In some embodiments, the processor determines a derivative in a y-direction for a pixel $y_1$ as the difference between the value of pixel $y_1$ and the values of the pixels above and below the pixel $y_1$. In some embodiments, the processor determines an intensity change $I_x$ and $I_y$ for a grey scale image as the pixel derivatives in the x- and y-directions, respectively. In some embodiments, the techniques described may be applied to color images. Each RGB of a color image may add an independent pixel value. In some embodiments, the processor may determine derivatives for each of the RGB or color channels of the color image. More colors and channels may be used for better quality. In some embodiments, the processor determines an image gradient $\nabla I$, a 2D vector, as the derivative in the x- and y-direction. In some embodiments, the processor may determine a gradient magnitude, $$|\nabla I| = \sqrt{\left(I_x^2 + I_y^2\right)},$$

which may indicate the strength of intensity change. In some embodiments, the processor may determine a gradient angle, $\alpha = \arctan 2\,(I_x, I_y)$, which may indicate the angle at which the image intensity change is more dominant. Since the derivatives of an image are discrete values, there is no mathematical derivative, therefore the processor may employ approximations for the derivatives of an image using discrete differentiation operators. For example, the processor may use the Prewitt operator which convolves the image with a small, separable, and integer valued filter in horizontal and vertical directions. The Prewitt operator may use two 3×3 kernels, $$\begin{bmatrix} -1 & 0 & 1 \\ -1 & 0 & 1 \\ -1 & 0 & 1 \end{bmatrix} \text{ and } \begin{bmatrix} -1 & -1 & -1 \\ 0 & 0 & 0 \\ 1 & 1 & 1 \end{bmatrix},$$

that may be convolved with the original image I to determine approximations of the derivatives in an x- and y-direction, i.e., $I_x = I*$ $$\begin{bmatrix} -1 & 0 & 1 \\ -1 & 0 & 1 \\ -1 & 0 & 1 \end{bmatrix} \text{ and } I_y = I * \begin{bmatrix} -1 & -1 & -1 \\ 0 & 0 & 0 \\ 1 & 1 & 1 \end{bmatrix}.$$

In another example, the processor may use the Sobel-Feldman operator, an isotropic 3×3 image gradient operator which at each point in the image returns either the corresponding gradient vector or the norm of the gradient vector, which convolves the image with a small, separable, and integer valued filter in horizontal and vertical directions. The Sobel-Feldman operator may use two 3×3 kernels, $$\begin{bmatrix} -1 & 0 & 1 \\ -2 & 0 & 2 \\ -1 & 0 & 1 \end{bmatrix} \text{ and } \begin{bmatrix} -1 & -2 & -1 \\ 0 & 0 & 0 \\ 1 & 2 & 1 \end{bmatrix}.$$

that may be convolved with the original image I to determine approximations of the derivatives in an x- and y-direction, i.e., $I_X = I*$ $$\begin{bmatrix} -1 & 0 & 1 \\ -2 & 0 & 2 \\ -1 & 0 & 1 \end{bmatrix} \text{ and } I_y = I * \begin{bmatrix} -1 & -2 & -1 \\ 0 & 0 & 0 \\ 1 & 2 & 1 \end{bmatrix}.$$

The processor may use other operators, such as Kayyali operator, Laplacian operator, and Robert Cross operator.

In some embodiments, the processor may use image denoising methods image in one or more processing steps to remove noise from an image while maintaining the integrity, detail, and structure of the. In some embodiments, the processor may determine the total variation of an image as the sum of the gradient norm, $J(I)=\int|\nabla I|dxdy$ or $J(I)=\Sigma_{xy}|\nabla I|$, wherein the integral is taken over all pixels of the image. In some embodiments, the processor may use Gaussian filters to determine derivatives of an image, $I_x = I*G_{\sigma x}$ and $I_y = I*G_{\sigma y}$, wherein $G_{\sigma x}$ and $G_{\sigma y}$ are the x and y derivatives of a Gaussian function $G_\sigma$ with standard deviation $\sigma$. In some embodiments, the processor may use total variation denoising or total variation regularization to remove noise while preserving edges. In some embodiments, the processor may determine a total variation norm of 2D signals y (e.g., images) using $$V(y) = \sum_{i,j} \sqrt{|y_{i+1,j} - y_{i,j}|^2 + |y_{i,j+1} - y_{i,j}|^2},$$

which is isotropic and not differentiable. In some embodiments, the processor may use an alternative anisotropic version, $$V(y) = \sum_{i,j} \sqrt{|y_{i+1,j} - y_{i,j}|^2} + \sqrt{|y_{i,j+1} - y_{i,j}|^2} = \sum_{i,j} |y_{i+1,j} - y_{i,j}| + |y_{i,j+1} - y_{i,j}|.$$

In some embodiments, the processor may solve the standard total variation denoising problem $$\min_y [E(x, y) + \lambda V(y)],$$

[E(x, y)+λV(y)], wherein E is the 2D L2 norm. In some embodiments, different algorithms may be used to solve the problem, such as prime dual method or split-Bergman method. In some embodiments, the processor may employ Rudin-Osher-Fatemi (ROF) denoising technique to a noisy image $f$ to determine a denoised image u over a 2D space. In some embodiments, the processor may solve the ROF minimization problem $$\min_{u \in BV(\Omega)} \|u\|_{TV(\Omega)} + \frac{\lambda}{2} \int_\Omega (f - u)^2 dx,$$

wherein BV (Ω) is the bounded variation over the domain Ω, TV(Ω) is the total variation over the domain, and λ is a penalty term. In some embodiments, u may be smooth and the processor may determine the total variation using $\|u\|_{TV(\Omega)} = \int_\Omega \|\nabla u\| dx$ and the minimization problem becomes $$\min_{u \in BV(\Omega)} \int_\Omega \left[ \|\nabla u\| + \frac{\lambda}{2} (f - u) \right]^2 dx.$$

Assuming no time dependence, the Euler-Lagrange equation for minimization may provide the nonlinear elliptic partial differential equation $$\begin{cases} \nabla \cdot \left( \frac{\nabla u}{\|\nabla u\|} \right) + \lambda(f - u) = 0, \; u \in \Omega \\ \frac{\partial u}{\partial n} = 0, \; u \in \partial \Omega \end{cases}.$$

In some embodiments, the processor may instead solve the time-dependent version of the ROF problem, $$\frac{\partial u}{\partial t} = \nabla \cdot \left( \frac{\nabla u}{\|\nabla u\|} \right) + \lambda(f - u).$$

In some embodiments, the processor may use other denoising techniques, such as chroma noise reduction, luminance noise reduction, anisotropic diffusion, Rudin-Osher-Fatemi, and Chambolle. Different noise processing techniques may provide different advantages and may be used in combination and in any order.

In some embodiments, the processor may determine correlation in x- and y-directions, $C_{(I_1 I_2)_{xy}} = \Sigma_{xy} f(I_1(xy), I_2(xy))$ between two neighborhoods, wherein points in a first image $I_1$ correspond with points in a second image $I_2$ and $f$ is a cross location function. In some embodiments, the processor takes the summation over all pixels in neighboring windows in x- and y-directions. In some embodiments, the size of neighboring windows may be a one-pixel radius, a two-pixel radius, or an n-pixels radius. In some embodiments, the window geometry may be a triangle, square, rectangle, or another geometrical shape. In some embodiments, the processor may use a transform to associate an image with another image by identifying points of similarities. Various transformation methods may be used (e.g., linear or more complex). For example, an affine map $f$: A→B between two affine spaces A and B may be a map on the points that acts linearly on the vectors, wherein $f$ determines a linear transformation φ such that for any pair of points P, Q∈A, $\overrightarrow{f(P)f(Q)} = \varphi(\overrightarrow{PQ})$ or $f(Q)-f(P)=\varphi(Q-P)$. Other interpretations may be used. For example, for an origin O∈A and when B denotes its image $f(O)\in B$, then for any vector $\vec{x}$, $f:(O+\vec{x}) \rightarrow (B+\varphi(\vec{x}))$. And a chosen origin O'∈B may be decomposed as an affine transformation g: A→B that sends O→O', i.e., g: $(O+\vec{x}) \rightarrow (O'+\varphi(\vec{x}))$ followed by the translation by a vector $\vec{b}=\overrightarrow{O'B}$. In this example, $f$ includes a translation and a linear map.

Figure 82:
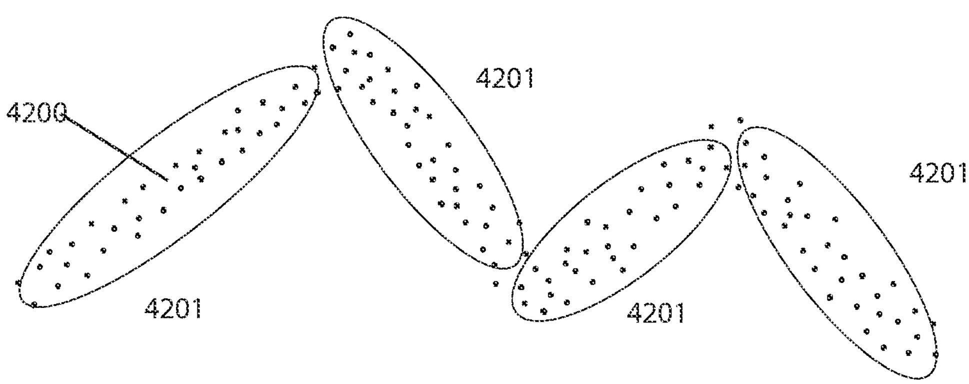
FIG. 82 illustrates an example of clusters, according to some embodiments.
Figure 83:
FIG. 83 illustrates an example of a similarity measure, according to some embodiments.
Figure 84:
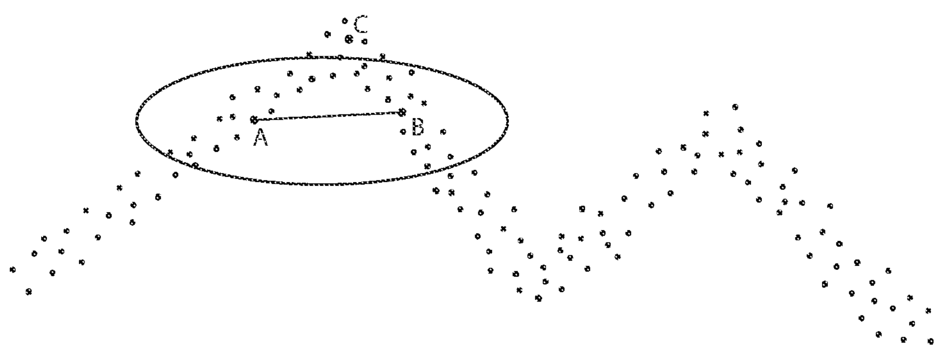
FIGS. 84, 85A-85C, 86A and 86B illustrate examples of clustering, according to some embodiments.

In some embodiments, the processor may employ unsupervised learning or clustering to organize unlabeled data into groups based on their similarities. Clustering may involve assigning data points to clusters wherein data points in the same cluster are as similar as possible. In some embodiments, clusters may be identified using similarity measures, such as distance. In some embodiments, the processor may divide a set of data points into clusters. For example, FIG. 82 illustrates a set of data points 4200 divided into four clusters 4201. In some embodiments, the processor may split or merge clusters. In some embodiments, the processor may use proximity or similarity measures. A similarity measure may be a real-valued function that may quantify similarity between two objects. In some embodiments, the similarity measure may be the inverse of distance metrics, wherein they are large in magnitude when the objects are similar and small in magnitude (or negative) when the objects are dissimilar. For example, the processor may use a similarity measure $s(x_i, x_j)$ which may be large in magnitude if $x_i$, $x_j$ are similar, or a dissimilarity (or distance) measure $d(x_i, x_j)$ which may be small in magnitude if $x_i$, $x_j$ are similar. This is visualized in FIG. 83. Examples of a dissimilarity measure include Euclidean distance, $$d(x_i, x_j) = \sqrt{\sum_{k=1}^{d} \left(x_i^{(k)} - x_j^{(k)}\right)^2},$$

which is translation invariant, Manhattan distance, $$d(x, x_j) = \sum_{k=1}^{d} \left|\left(x_i^{(k)} - x_j^{(k)}\right)\right|,$$

which is an approximation to the Euclidean distance, Minkowski distance, $d_p(x_i, x_j) = \Sigma_{k=1}^{m} (|(x_{ik} - x_{jk})|^p)^{1/p}$, wherein p is a positive integer. An example of a similarity measure includes Tanimoto similarity, $$T_S = \frac{\sum_{j=1}^{k} (a_j \times b_j)}{\sum_{j=1}^{k} a_j^2 + \sum_{j=1}^{k} b_j^2 - \sum_{j=1}^{k} a_j \times b_j},$$

between two points $\alpha_j$, $b_j$, with k dimensions. The Tanimoto similarity may only be applicable for a binary variable and ranges from zero to one, wherein one indicates a highest similarity. In some cases, Tanimoto similarity may be applied over a bit vector (where the value of each dimension is either zero or one) wherein the processor may use $$f(A, B) = \frac{A \cdot B}{|A|^2 + |B|^2 - A \cdot B}$$

to determine similarity. This representation relies on $A \cdot B = \Sigma_i A_i B_i = \Sigma_i A_i \wedge B_i$ and $|A|^2 = \Sigma_i A_i^2 = \Sigma_i A_i$. Note that the properties of $T_s$ do not necessarily apply to $f$. In some cases, other variations of the Tanimoto similarity may be used. For example, a similarity ratio $$T_s = \sum_i \frac{X_i \wedge Y_i}{\sum_i (X_i \vee Y_i)},$$

wherein X and Y are bitmaps and $X_i$ is bit i of X. A distance coefficient, $T_d(X, Y) = -\log_2(T_s(X, Y))$, based on the similarity ratio may also be used for bitmaps with non-zero similarity. Other similarity or dissimilarity measures may be used, such as RBF kernel in machine learning. In some embodiments, the processor may use a criterion for evaluating clustering, wherein a good clustering may be distinguished from a bad clustering. For example, FIG. 84 illustrates a bad clustering. In some embodiments, the processor may use a similarity measure that provides an n×n sized similarity matrix for a set of n data points, wherein the entry i, j may be the negative of the Euclidean distance between i and j or may me a more complex measure such as the Gaussian $$e^{-\frac{\|s_1 - s_2\|^2}{2\sigma^2}}.$$

In some embodiments, the processor may employ fuzzy clustering wherein each data point may belong to more than one cluster. In some embodiments, the processor may employ fuzzy c-means (FCM) clustering wherein a number of clusters are chosen, coefficients are randomly assigned to each data point for being in the clusters, and the process is repeated until the algorithm converges, wherein the change in the coefficients between two iterations is less than a sensitivity threshold. The process may further include determining a centroid for each cluster and determining the coefficient of each data point for being in the clusters. In some embodiments, the processor determines the centroid of a cluster using $$c_k = \frac{\sum_x \omega_k(x)^m x}{\sum_k \omega_k(x)^m},$$

wherein a point x has a set of coefficients $\omega_k(x)$ giving the degree of being in the cluster k, wherein m is the hyperparameter that controls how fuzzy the cluster will be. In some embodiments, the processor may use an FCM algorithm that partitions a finite collection of n elements $X=\{x_1, \ldots, x_n\}$ into a collection of c fuzzy clusters with respect to a given criterion. In some embodiments, given a finite set of data, the FCM algorithm may return a list of c cluster centers $C=\{c_1, \ldots, c_2\}$ and a partition matrix $W=\omega_{i,j} \in [0, 1]$ for $i=1, \ldots, n$ and $j=1, \ldots, c$, wherein each element $\omega_{ij}$ indicates the degree to which each element $x_i$ belongs to cluster $c_j$. In some embodiments, the FCM algorithm minimizes the objective functions argmin $$\sum_{i=1}^{n} \sum_{j=1}^{c} \omega_{ij}^m \|x_i - c_j\|^2,$$

wherein $$\omega_{ij} = \frac{1}{\sum_{k=1}^{c} \left( \frac{\|x_i - c_j\|}{\|x_i - c_k\|} \right)^{\frac{2}{m-1}}}.$$

Figure 85A:
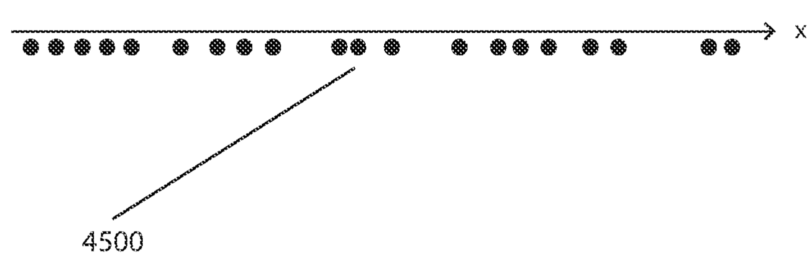
Figure 85B:
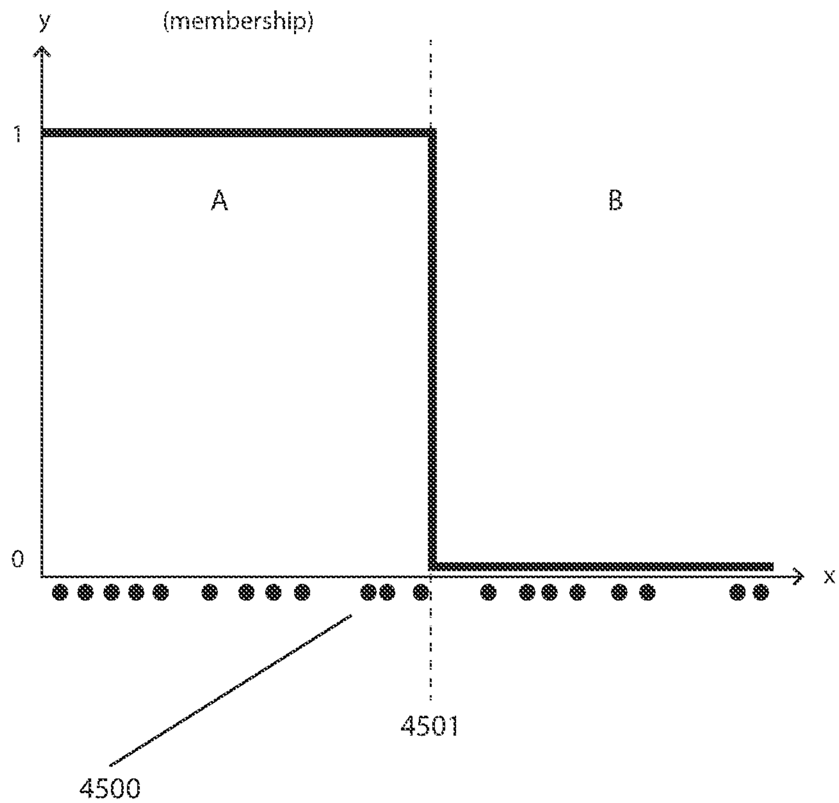
Figure 85C:
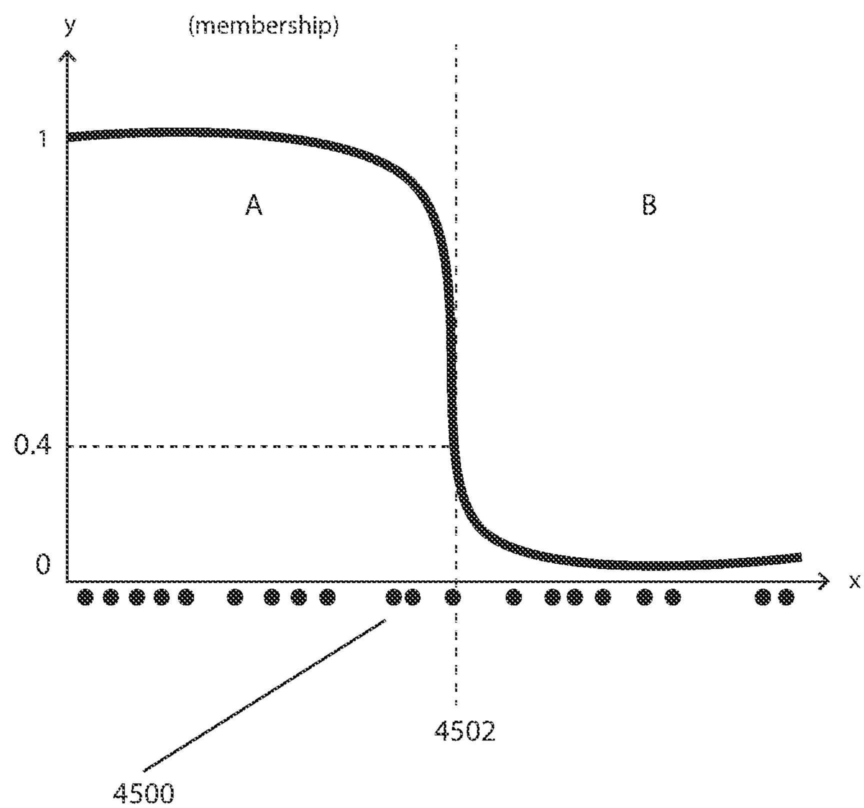

In some embodiments, the processor may use k-means clustering, which also minimizes the same objective function. The difference with c-means clustering is the additions of $\omega_{ij}$ and $m \in R$, for $m \geq 1$. A large m results in smaller $\omega_{ij}$ values as clusters are fuzzier, and when m=1, $\omega_{ij}$ converges to zero or one, implying crisp partitioning. For example, FIG. 85A illustrates one dimensional data points 4500 along an x-axis. The data may be grouped into two clusters. In FIG. 85B, a threshold 4501 along the x-axis may be chosen to group data points 4500 into clusters A and B. Each data point may have membership coefficient ω with a value of zero or one that may be represented along the y-axis. In fuzzy clustering, each data point may have may a membership to multiple clusters and the membership coefficient may be any value between zero and one. FIG. 85C illustrates fuzzy clustering of data points X00, wherein a new threshold 4502 and membership coefficients ω for each data point may be chosen based on the centroids of the clusters and a distance from each cluster centroid. The data point intersecting with the threshold 4502 belongs to both clusters A and B and has a membership coefficient of 0.4 for clusters A and B.

In some embodiments, the processor may use spectral clustering techniques. In some embodiments, the processor may use a spectrum (or eigenvalues) of a similarity matrix of data to reduce the dimensionality before clustering in fewer dimensions. In some embodiments, the similarity matrix may indicate the relative similarity of each pair of points in a set of data. For example, the similarity matrix for a set of data points may be a symmetric matrix A, wherein $A_{ij} \geq 0$ indicates a measure of similarity between data points with indices i and j. In some embodiments, the processor may use a general clustering method, such a k-means, on relevant eigenvectors of a Laplacian matrix of A. In some embodiments, the relevant eigenvectors are those corresponding to smallest several eigenvalues of the Laplacian except for the eigenvalue with a value of zero. In some embodiments, the processor determines the relevant eigenvectors as the eigenvectors corresponding to the largest several eigenvalues of a function of the Laplacian. In some embodiments, spectral clustering may be compared to partitioning a mass-spring system, wherein each mass may be associated with a data point and each spring stiffness may correspond to a weight of an edge describing a similarity of two related data points. In some embodiments, the eigenvalue problem of transversal vibration modes of a mass spring system may be the same as the eigenvalue problem of the graph Laplacian matric, $L \approx D-A$, wherein D is the diagonal matrix $D_{ii}=\Sigma_j A_{ij}$. The masses tightly connected by springs move together from the equilibrium position in low frequency vibration modes, such that components of the eigenvectors corresponding to the smallest eigenvalues of the graph Laplacian may be used for clustering of the masses. In some embodiments, the processor may use normalized cuts algorithm for spectral clustering, wherein points may be partitioned into two sets ($B_1$, $B_2$) based on an eigenvector v corresponding to the second smallest eigenvalue of the symmetric normalized Laplacian, $$L_{norm} := I - D^{-\frac{1}{2}} A D^{-\frac{1}{2}}.$$

Alternatively, the processor may determine the eigenvector corresponding to the largest eigenvalue of the random walk normalized adjacency matrix, $P=D^{-1}A$. In some embodiments, the processor may partition the data by determining a median m of the components of the smallest eigenvector v and placing all data points whose component in v is greater than m in $B_1$ and the rest in $B_2$. In some embodiments, the processor may use such an algorithm for hierarchical clustering by repeatedly partitioning subsets of data using the partitioning method described.

Figure 86A:
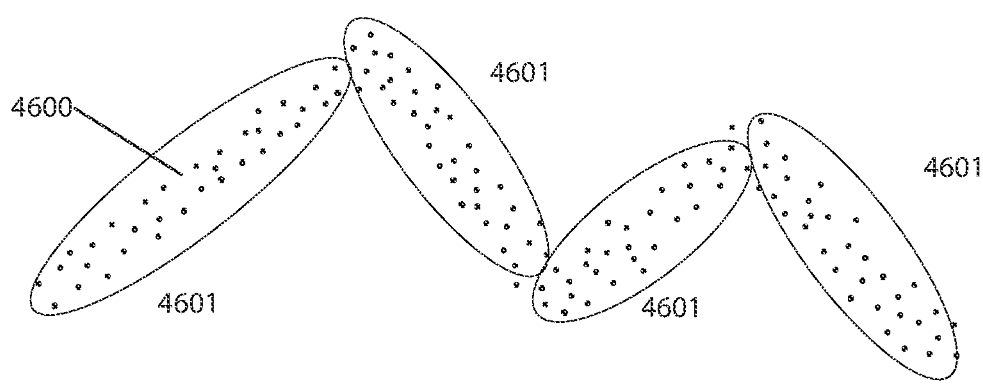
Figure 86B:
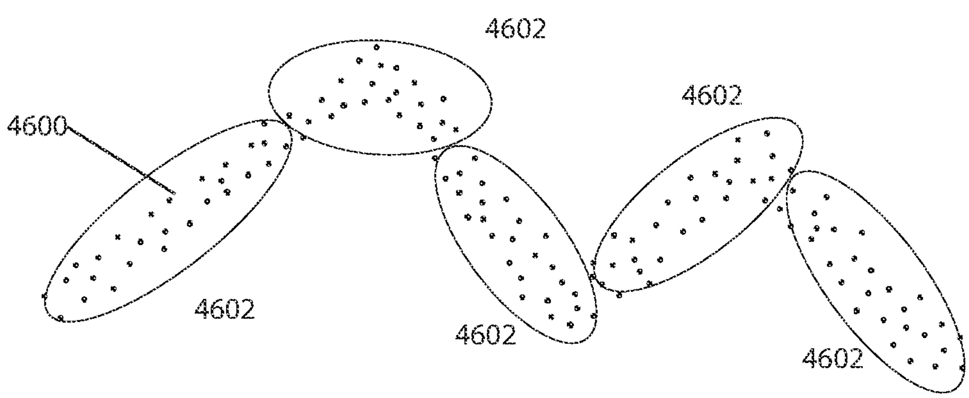

In some embodiments, the clustering techniques described may be used to obtain insight into data (which may be fine-tuned using other methods) with relatively low computational cost. However, in some cases, generic classification may be challenging as the initial number of classes may be unknown and a supervised learning algorithm may require the number of classes beforehand. In some embodiments, a classification algorithm may be provided with a fixed number of classes to which data may be grouped into, however, determining the fixed number of classes may be difficult. For example, upon examining FIG. 86A it may be determined that data points 4600 organized into four classes 4601 may result in a best outcome. Or that organizing data points 4600 into five classes 4602, as illustrated in FIG. 86B, may result in a good classification. However, for an unknown image or an unknown environment, determining the fixed number of classes beforehand is more challenging. Further, prior probabilities for each class $P(\omega_j)$ for j=1, 2, . . . may need to be known as well. In some embodiments, the processor may approximate how many of a total number of data points scanned belong to each class based on the angular resolution of sensors, the number of scans per second, and the angular displacement of the robot relative to the size of the environment. In some embodiments, the processor may assume class conditional probability densities $P(x|\omega_j, \theta_j)$ are known for j=1, . . . , c. In some embodiments, the values of c parameter vectors $\theta_1, \ldots, \theta_c$ and class labels may be unknown. In some embodiments, the processor may use the mixture density function $P(x|\theta)=\Sigma_{j=1}^{c} P(x|\omega_j, \theta_j)P(\omega_j)$, wherein $\theta=(\theta_1, \ldots, \theta_c)^t$, conditional density $P(x|\omega_j, \theta_j)$ is a component density, and priori $P(\omega_j)$ is a mixing parameter, to estimate the parameter vector θ. In some embodiments, the processor may draw samples from the mixture densities to estimate the parameter vector θ. In some embodiments, given that θ is known, the processor may decompose the mixture densities into components and may use a maximum a posteriori classifier on the derived densities. In some embodiments, for a set of data $D=\{x_1, \ldots, x_n\}$ with n unlabeled data points independently drawn from a mixture density $P(x|\theta)=\Sigma_{j=1}^{c} P(x|\omega_j, \theta_j)P(\omega_j)$, wherein the parameter vector θ is unknown but fixed, the processor may determine the likelihood of the observed sample as the joint density $P(D|\theta)=\Pi_{k=1} P(x_k|\theta)$. In some embodiments, the processor determines the maximum likelihood estimate $\hat{\theta}$ for θ as the value of θ that maximizes the probability of D given θ. In some embodiments, it may be assumed that the joint density $P(D|\theta)$ is differentiable from θ. In some embodiments, the processor may determine the logarithm of the likelihood, $l=\Sigma_{k=1}^{n} \ln P(x_k|B)$, and the gradient of l with respect to $\theta_i$, $$\nabla_{\theta_i} l = \sum_{k=1}^{n} \frac{1}{P(x_k|\theta)} \nabla_{\theta_i} \left[ \sum_{j=1}^{c} P(x_k|\omega_j, \theta_j) P(\omega_j) \right].$$

If $\theta_i$ and $\theta_j$ are independent and i≠j then $$P(\omega_i|x_k, \theta) = \frac{P(x_k|\omega_i, \theta_i)P(\omega_i)}{P(x_k|\theta)}$$

and the processor may determine the gradient of the log likelihood using $\nabla_{\theta_i} l=\Sigma_{k=1}^{n} P(\omega_i|x_k, \theta)\nabla_{\theta_i} \ln P(x_k|\omega_n, \theta_i)$. Since the gradient must vanish as the value of $\theta_i$ that maximizes l, the maximum likelihood estimate $\hat{\theta}_i$ must satisfy the conditions $\Sigma_{k=1}^{n} P(\omega_i|x_k, \theta)\nabla_{\theta_i} \ln P(x_k|\omega_i, \theta_i)=0$ for i=1, . . . , c. In some embodiments, the processor finds the maximum likelihood solution among the solutions the equations for $\hat{\theta}_i$. In some embodiments, the results may be generalized to include prior probabilities $P(\omega_i)$ among the unknown quantities. In such a case, the search for the maximum values of $P(D|\theta)$ extends over θ and $P(\omega_i)$, wherein $P(\omega_i) \geq 0$ for i=1, . . . , c and $\Sigma_{i=1}^{c} P(\omega_i)=1$. In some embodiments, $\hat{P}(\omega_i)$ may be the maximum likelihood estimate for $P(\omega_i)$ and $\hat{\theta}_i$ may be the maximum likelihood estimate for $\theta_i$. If the likelihood function is differentiable and if $\hat{P}(\omega_i) \neq 0$ for any i, then $\hat{P}(\omega_i)$ and $\hat{\theta}_i$ satisfy $\hat{P}(\omega_i)=1/n\Sigma_{k=1}^{n} \hat{P}(\omega_i|x_k, \hat{\theta})$ and $\Sigma_{k=1}^{n} \hat{P}(\omega_i|x_k, \hat{\theta}) \nabla_{\theta_i} \ln P(x_k|\omega_i, \hat{\theta}_i)=0$, wherein $$\hat{P}(\omega_i|x_k, \hat{\theta}) = \frac{P(x_k|\omega_i, \hat{\theta}_i)\hat{P}(\omega_i)}{\sum_{j=1}^{c} P(x_k|\omega_j, \hat{\theta}_j)\hat{P}(\omega_j)}.$$

This states that the maximum likelihood estimate of the probability of a category is the average over the entire data set of the estimate derived from each same, wherein each sample is weighted equally. The latter equation is related to Bayes Theorem, however the estimate for the probability for class $\omega_i$ depends on $\hat{\theta}_i$ and not the full $\hat{\theta}$ directly. Since $\hat{P} \neq 0$, and for the case wherein n=1, $\Sigma_{k=1}^{n} \hat{P}(\omega_i|x_k, \hat{\theta})\nabla_{\theta_i} \ln P(x_k|\omega_i, \hat{\theta}_i)=0$ states that the probability density is maximized as a function of $\theta_i$.

Figure 87A:
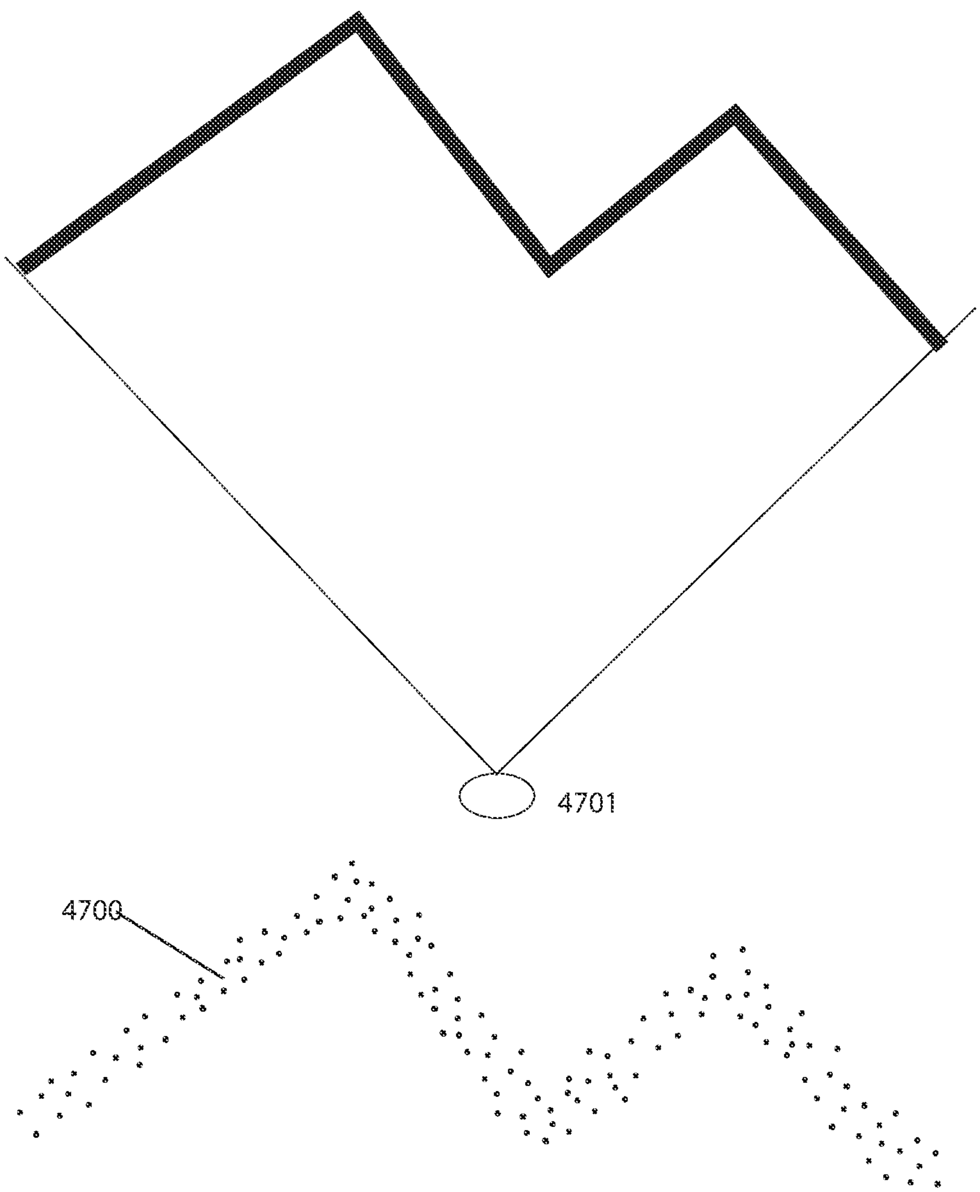
FIGS. 87A and 87B illustrate data points observed from two different fields of view, according to some embodiments.
Figure 87B:
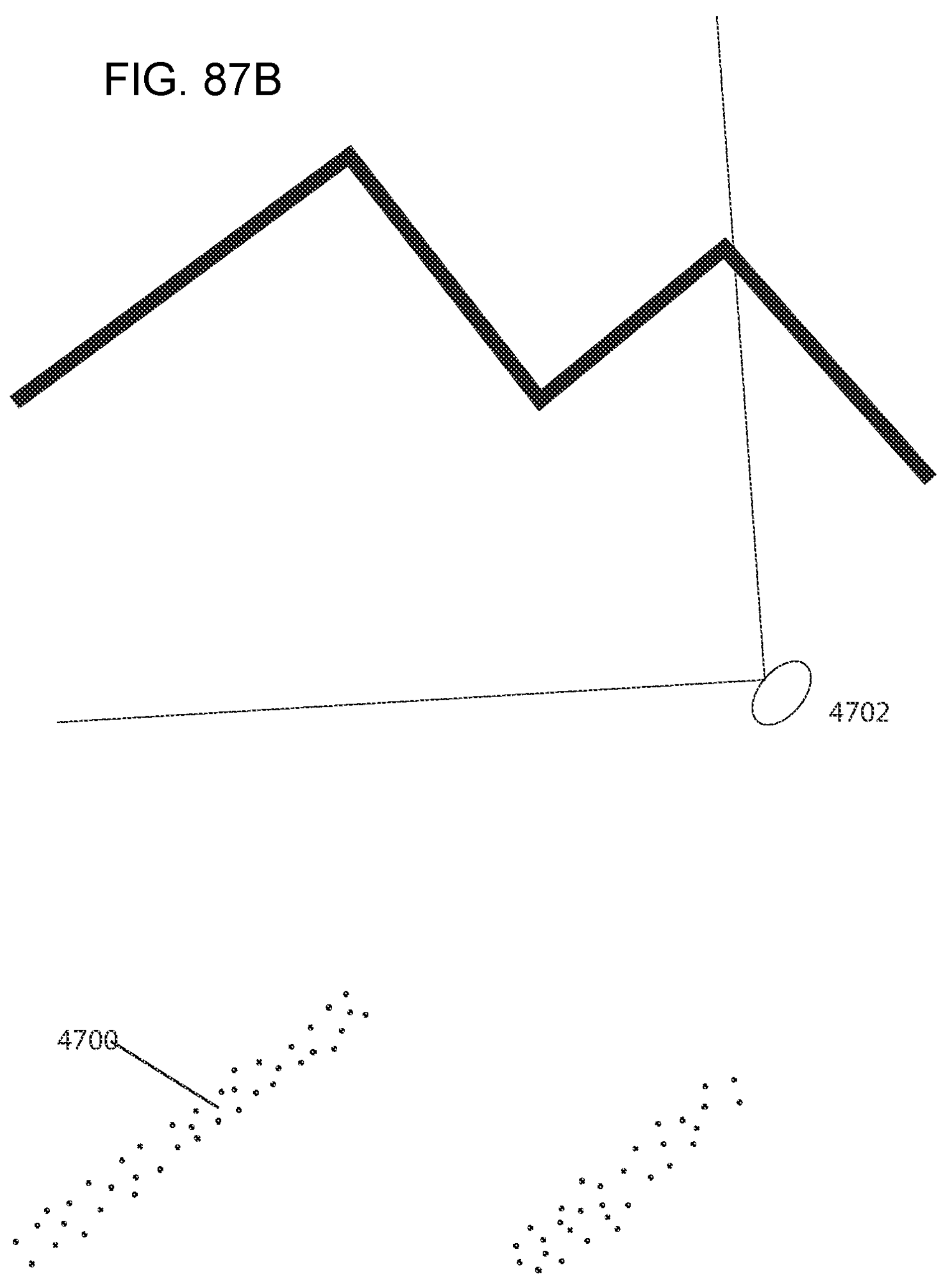

In some embodiments, clustering may be challenging due to the continuous collection data that may differ at different instances and changes in the location from which data is collected. For example, FIG. 87A illustrates data points 4700 observed from a point of view 4701 of a sensor and FIG. 87B illustrates data points 4700 observed from a different point of view 4702 of the sensor. This exemplifies that data points 4700 appear differently depending on the point of view of the sensor. In some embodiments, the processor may use stability-plasticity trade-off to help in solving such challenges. The stability-plasticity dilemma is a known constraint for artificial neural systems as a neural network must learn new inputs from the environment without being disrupted by them. The neural network may require plasticity for the integration of new knowledge, but also stability to prevent forgetting previous knowledge. In some embodiments, too much plasticity may result in catastrophic forgetting, wherein a neural network may completely forget previously learned information when exposed to new information. Neural networks, such as backpropagation networks, may be highly sensitive to catastrophic forgetting because of highly distributed internal representations of the network. In such cases, catastrophic forgetting may be minimized by reducing the overlap among internal representations stored in the neural network. Therefore, when learning input patterns, such networks may alternate between them and adjust corresponding weights by small increments to correctly associate each input vector with the related output vector. In some embodiments, a dual-memory system, i.e., a short-term and a long-term memory, may be used to avoid catastrophic forgetting, wherein information may be initially consolidated on a short-term memory within a long-term memory. In some embodiments, too much stability may result in the entrenchment effect which may contribute to age-limited learning effects. In some embodiments, the entrenchment effect may be minimized by varying the loss of plasticity as a function of the transfer function and the error. In some embodiments, the processor may use Fahlman offset to modulate the plasticity of neural networks by adding a constant number to the derivative of the sigmoid function such that it does not go to zero and avoids the flat spots in the sigmoid function where weights may become entrenched.

In some embodiments, distance measuring devices used in observing the environment may have different field of views (FOVs) and angular resolutions may be used. For example, a depth sensor may provide depth readings within a FOV ranging from zero to 90 degrees with a one degree angular resolution. Another distance sensor may provide distance readings within a FOV ranging from zero to 180 degrees, with a 0.5 degrees angular resolution. In another case, a LIDAR may provide a 270 or 360 degree FOV.

In some embodiments, the immunity of a distance measuring device may be related to an illumination power emitted by the device and a sensitivity of a receiver of the device. In some instances, an immunity to ambient light may be defined by lux. For example, a LIDAR may have a typical immunity of 500 lux and a maximum immunity of 1500 lux. Another LIDAR may have a typical immunity of 2000 lux and a maximum immunity of 4500 lux. In some embodiments, scan frequency, given in Hz, may also influence immunity of distance measuring devices. For example, a LIDAR may have a minimum scan frequency of 4 Hz, typical scan frequency of 5 Hz, and a maximum scan frequency of 10 Hz. In some instances, Class I laser safety standards may be used to cap the power emitted by a transmitter. In some embodiments, a laser and optical lens may be used for the transmission and reception of a laser signal to achieve high frequency ranging. In some cases, laser and optical lens cleanliness may have some adverse effects on immunity as well. In some embodiments, the processor may use particular techniques to distinguish the reflection of illumination light from ambient light, such as various software filters. For example, once depth data is received it may be processed to distinguish the reflection of illumination light from ambient light.

In some embodiments, the center of the rotating core of a LIDAR used to observe the environment may be different than the center of the robot. In such embodiments, the processor may use a transform function to map the readings of the LIDAR sensor to the physical dimension of the robot. In some embodiments, the LIDAR may rotate clockwise or counterclockwise. In some embodiments, the LIDAR readings may be different depending on the motion of the robot. For example, the readings of the LIDAR may be different when the robot is rotating in a same direction as a LIDAR motor than when the robot is moving straight or rotating in an opposite direction to the LIDAR motor. In some instances, a zero angle of the LIDAR may not be the same as a zero angle of the robot.

In some embodiments, data may be collected using a proprioceptive sensor and an exteroceptive sensor. In some embodiments, the processor may use data from one of the two types of sensors to generate or update the map and may use data from the other type of sensor to validate the data used in generating or updating the map. In some embodiments, the processor may enact both scenarios, wherein the data of the proprioceptive sensor is used to validate the data of the exteroceptive sensor and vice versa. In some embodiments, the data collected by both types of sensors may be used in generating or updating the map. In some embodiments, the data collected by one type of sensor may be used in generating or updating a local map while data from the other type of sensor may be used for generating or updating a global map. In some embodiments, data collected by either type of sensor may include depth data (e.g., depth to perimeters, obstacles, edges, corners, objects, etc.), raw image data, or a combination.

Figure 88:
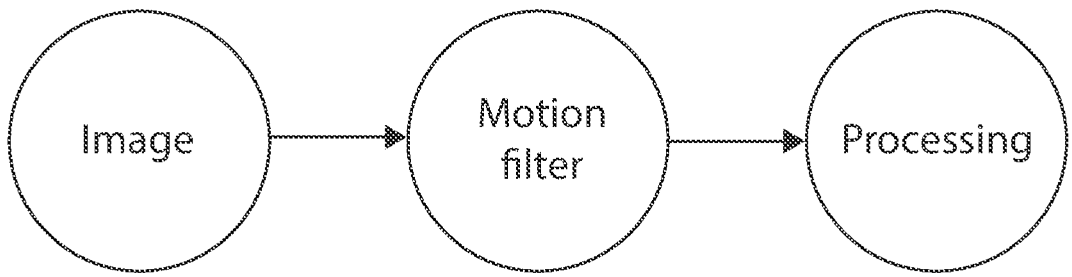
FIG. 88 illustrates the use of a motion filter, according to some embodiments.
Figure 89A:
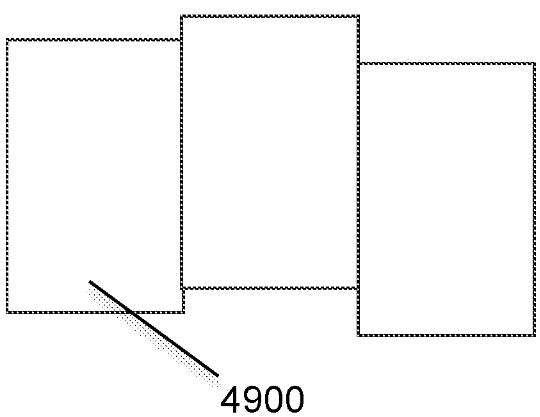
FIGS. 89A and 89B illustrate vertical alignment of images, according to some embodiments.
Figure 89B:
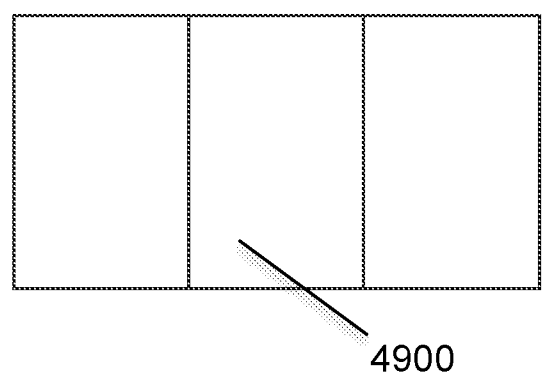
Figure 90:
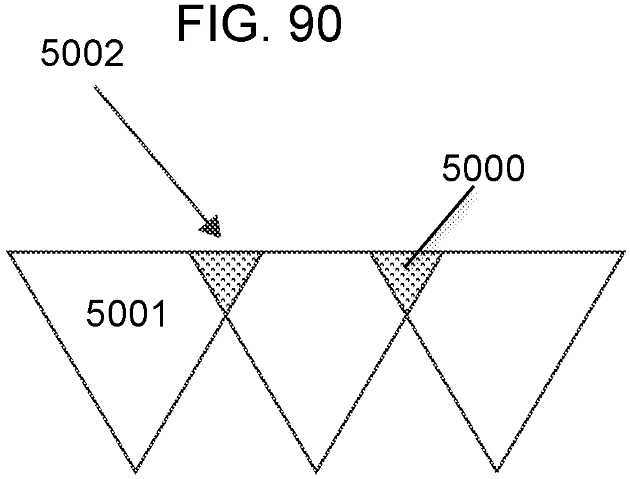
FIG. 90 illustrates overlap of data at perimeters, according to some embodiments.
Figure 91:
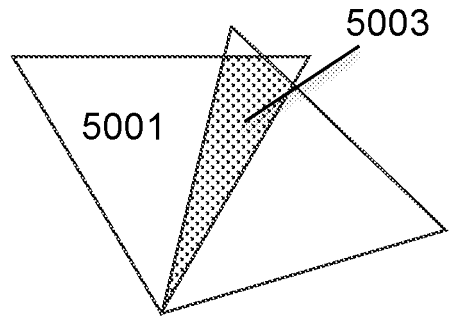
FIG. 91 illustrates overlap of data, according to some embodiments.
Figure 92:
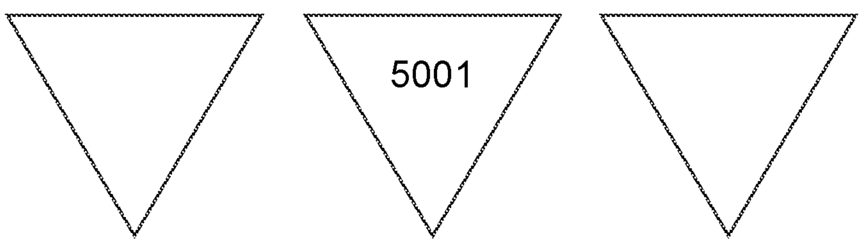
FIG. 92 illustrates the lack of overlap between data, according to some embodiments.

In some embodiments, there may be possible overlaps in data collected by an exteroceptive sensor. In some embodiments, a motion filter may be used to filter out small jitters the robot may experience while taking readings with an image sensor or other sensors. FIG. 88 illustrates a flow path of an image, wherein the image is passed through a motion filter before processing. In some embodiments, the processor may vertically align captured images in cases where images may not be captured at an exact same height. FIG. 89A illustrates unaligned images 4900 due to the images being captured at different heights. FIG. 89B illustrates the images 4900 after alignments. In some embodiments, the processor detects overlap between data at a perimeter of the data. Such an example is illustrated in FIG. 90, wherein an area of overlap 5000 at a perimeter of the data 5001 is indicated by the arrow 5002. In some embodiments, the processor may detect overlap between data in other ways. An example of an alternative area of overlap 3403 between data 5001 is illustrated in FIG. 91. In some embodiments, there may be no overlap between data 5001 and the processor may use a transpose function to create a virtual overlap based on an optical flow or an inertia measurement. FIG. 92 illustrates a lack of overlap between data.

Figure 93:
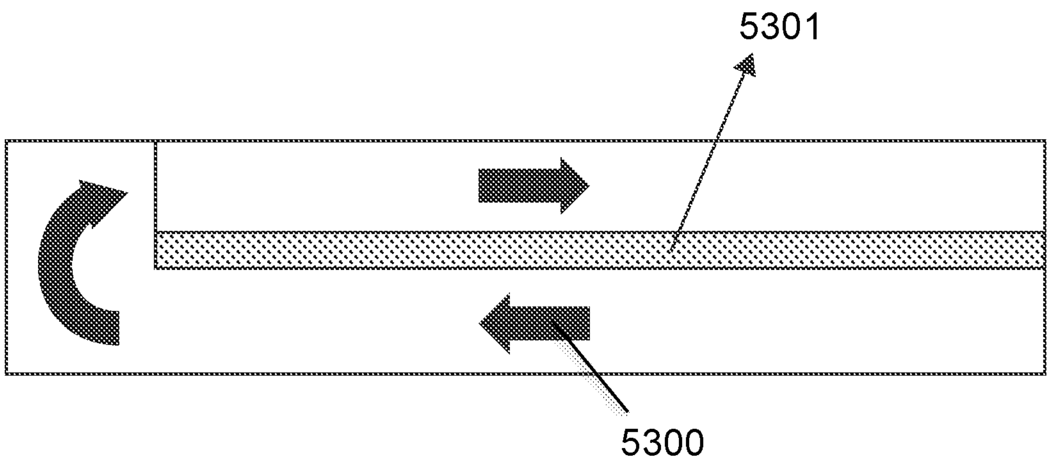
FIG. 93 illustrates a path of a robot and overlap that occurs, according to some embodiments.
Figure 94:
FIG. 94 illustrates the resulting spatial representation based on the path in FIG. 93, according to some embodiments.
Figure 95:
FIG. 95 illustrates the spatial representation that does not result based on the path in FIG. 93, according to some embodiments.
Figure 96:
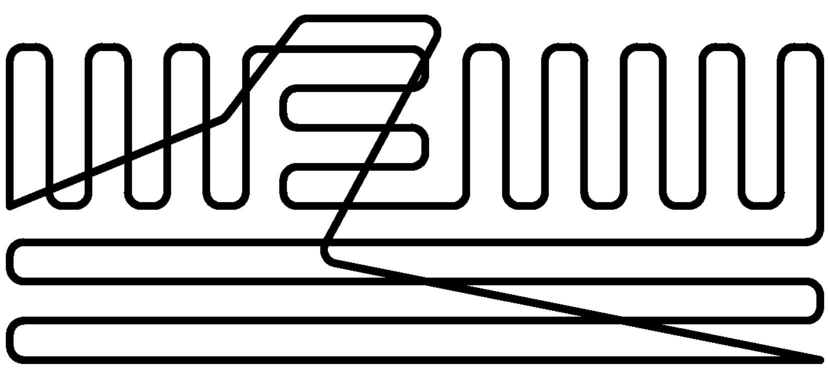
FIG. 96 illustrates a movement path of a robot, according to some embodiments.

In some embodiments, the movement of the robot may be measured and tracked by an encoder, IMU, and/or optical tracking sensor (OTS) and images captured by an image sensor may be combined together to form a spatial representation based on overlap of data and/or measured movement of the robot. In some embodiments, the processor determines a logical overlap between data and does not represent data twice in a spatial representation output. For example, FIG. 93 illustrates a path 5300 of the robot and an amount of overlap 5301. In some embodiments, overlapping parts may be used for combining images, however, the spatial representation may only include one set (or only some sets) of the overlapping data or in other cases may include all sets of the overlapping data. In some embodiments, the processor may employ a convolution to obtain a single set of data from the two overlapping sets of data. In such cases, the spatial representation after collecting data during execution of the path 5300 in FIG. 93 may appear as in FIG. 94, as opposed to the spatial representation in FIG. 95 wherein spatial data is represented twice. During discovery, a path of the robot may overlap frequently, as in the example of FIG. 96, however, the processor may not use each of the overlapping data collected during those overlapping paths when creating the spatial representation.

Figure 97:
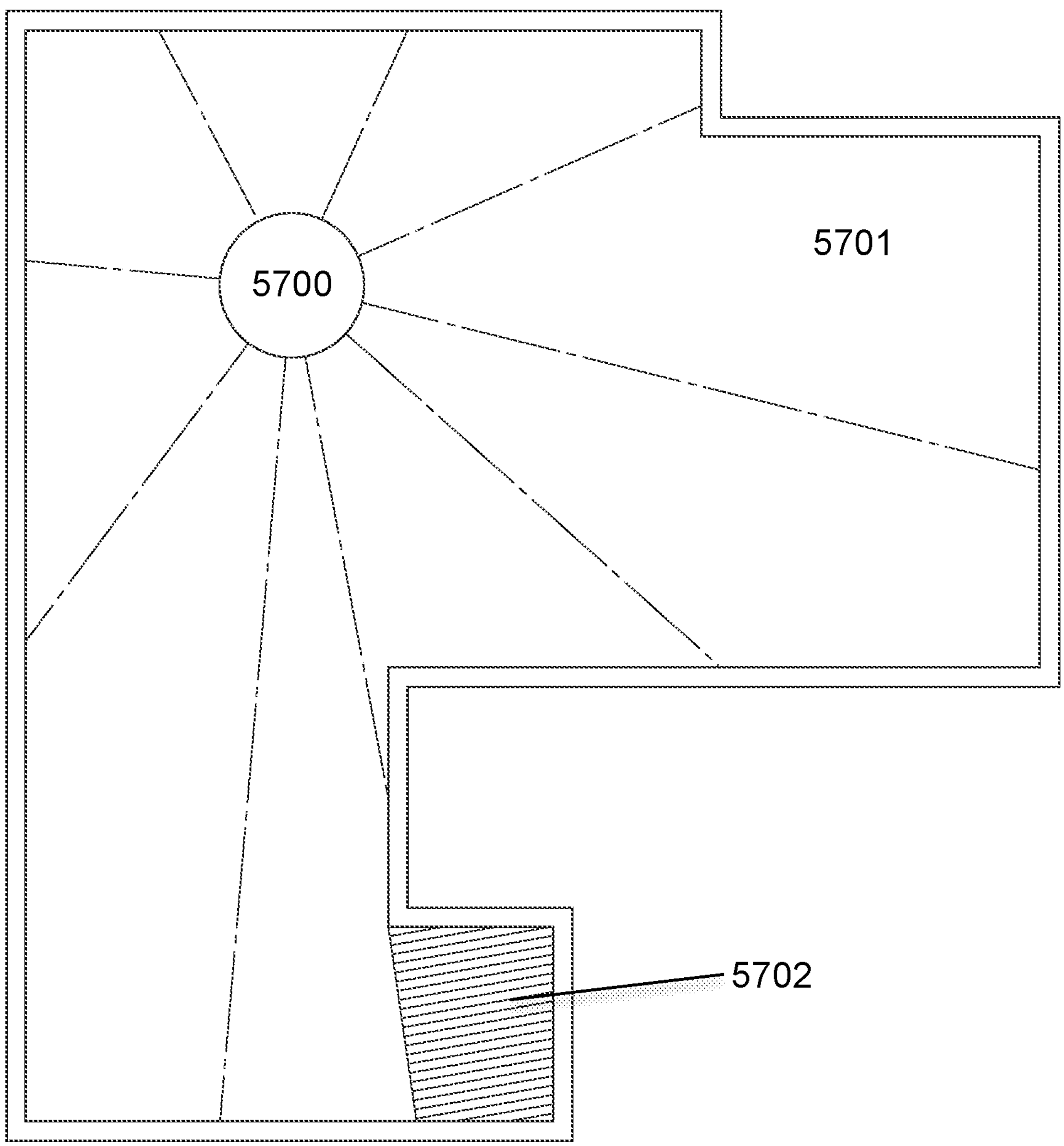
FIGS. 97-99 illustrate a sensor of a robot observing the environment, according to some embodiments.
Figure 98:
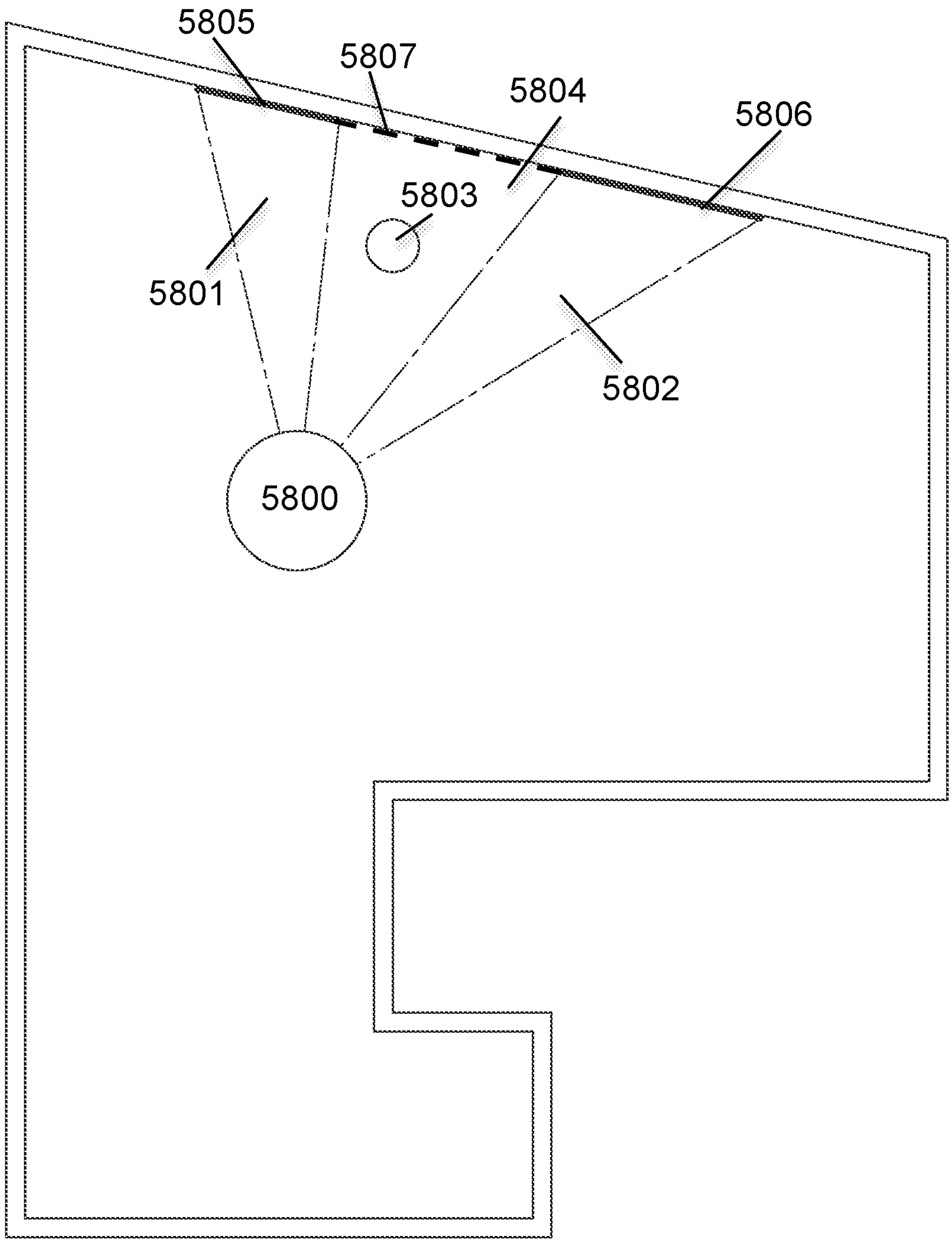
Figure 99:
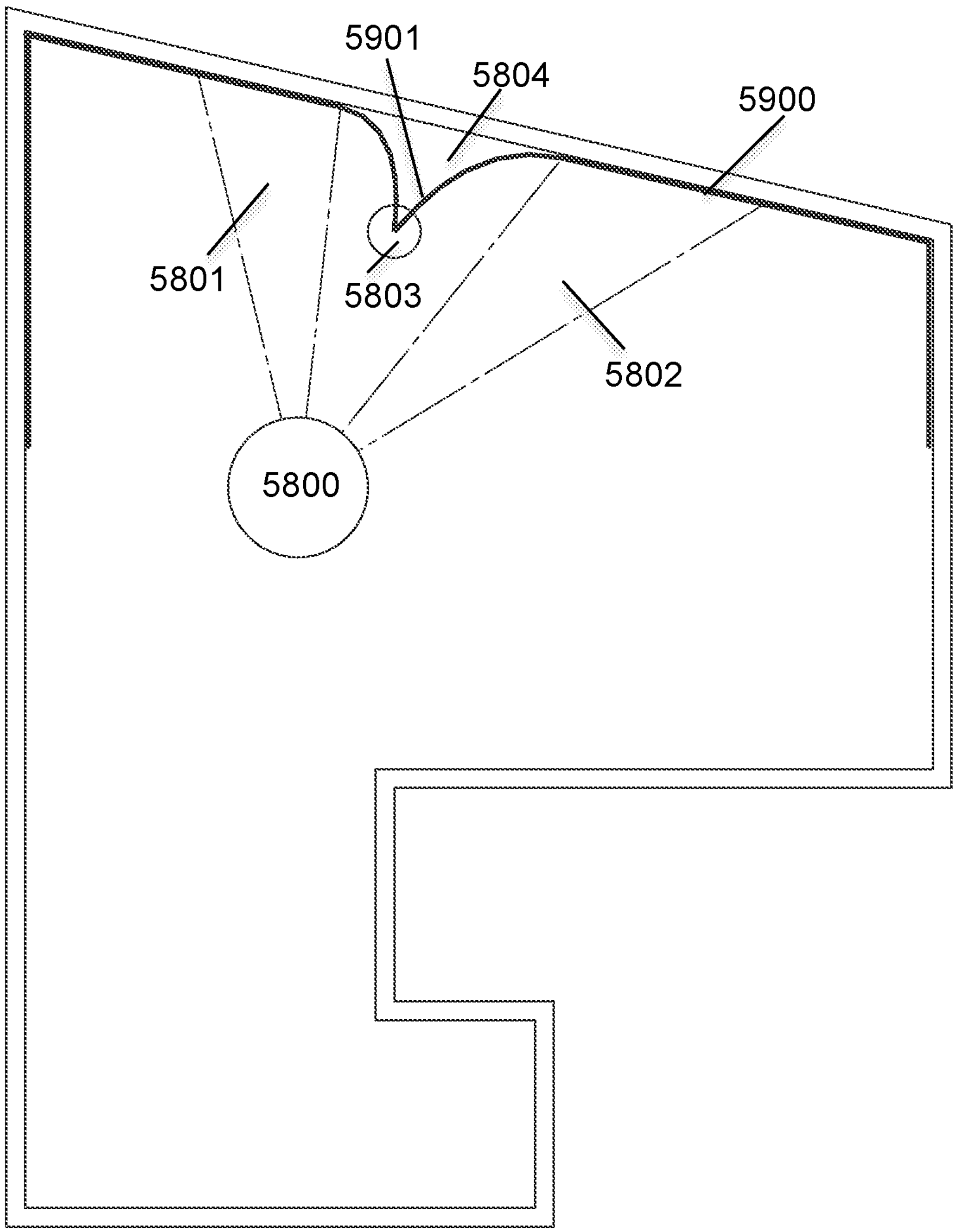

In some embodiments, sensors of the robot used in observing the environment may have a limited FOV. In some embodiments, the FOV is 360 or 180 degrees. In some embodiments, the FOV of the sensor may be limited vertically or horizontally or in another direction or manner. In some embodiments, sensors with larger FOVs may be blind to some areas. In some embodiments, blind spots of robots may be provided with complementary types of sensors that may overlap and may sometimes provide redundancy. For example, a sonar sensor may be better at detecting a presence or a lack of presence of an obstacle within a wider FOV whereas a camera may provide a location of the obstacle within the FOV. In one example, a sensor of a robot with a 360 degree linear FOV may observe an entire plane of an environment up to the nearest objects (e.g., perimeters or furniture) at a single moment, however some blind spots may exist. While a 360 degree linear FOV provides an adequate FOV in one plane, the FOV may have vertical limitations. FIG. 97 illustrates a robot 5700 observing an environment 5701, with blind spot 5702 that sensors of robot 5700 cannot observe. With a limited FOV, there may be areas that go unobserved as the robot moves. For example, FIG. 98 illustrates robot 5800 and fields of view 5801 and 5802 of a sensor of the robot as the robot moves from a first position to a second position, respectively. Because of the small FOV or blind spot, object 5803 within area 5804 goes unnoticed as the robot moves from observing FOV 5801 to 5802. In some cases, the processor of the robot fits a line 5805 and 5806 to the data captured in FOVs 5801 and 5802, respectively. In some embodiments, the processor fits a line 5807 to the data captured in FOVs 5801 and 5802 that aligns with lines 5805 and 5806, respectively. In some embodiments, the processor aligns the data observed in different FOVs to generate a map. In some embodiments, the processor connects lines 5805 and 5806 by a connecting line or by a line fitted to the data captured in FOVs 5801 and 5802. In some embodiments, the line connecting lines 5805 and 5806 has lower certainty as it corresponds to an unobserved area 5804. For example, FIG. 99 illustrates estimated perimeter 5900, wherein perimeter line 5900 is fitted to the data captured in FOVs 5801 and 5802. The portion of perimeter line 5900 falling within area 5804, to which sensors of the robot were blind, may be estimated based on a line that connects lines 5805 and 5806 as illustrated in FIG. 98. However, since area 5804 is unobserved by sensors of the robot, the processor is less certain of the portion of the perimeter 5900 falling within area 5804. For example, the processor is uncertain if the portion of perimeter 5900 falling within area 5804 is actually perimeter 5901. Such a perimeter estimation approach may be used when the speed of data acquisition is faster than the speed of the robot.

In some embodiments, layered maps may be used in avoiding blind spots. In some embodiments, the processor may generate a map including multiple layers. In some embodiments, one layer may include areas with high probability of being correct (e.g., areas based on observed data) while another may include areas with lower probability of being correct (e.g., areas unseen and predicted based on observed data). In some embodiments, a layer of the map or another map generated may only include areas unobserved and predicted by the processor of the robot. At any time, the processor may subtract maps from one another, add maps with one another (e.g., by layering maps), or may hide layers.

In some embodiments, a layer of a map may be a map generated based solely on the observations of a particular sensor type. For example, a map may include three layers and each layer may be a map generated based solely on the observations of a particular sensor type. In some embodiments, maps of various layers may be superimposed vertically or horizontally, deterministically or probabilistically, and locally or globally. In some embodiments, a map may be horizontally filled with data from one (or one class of) sensor and vertically filled using data from a different sensor (or class of sensor).

In some embodiments, different layers of the map may have different resolutions. For example, a long range limited FOV sensor of a robot may not observe a particular obstacle. As a result, the obstacle is excluded from a map generated based on data collected by the long range limited FOV sensor. However, as the robot approaches the obstacle, a short range obstacle sensor may observe the obstacle and add it to a map generated based on the data of the obstacle sensor. The processor may layer the two maps and the obstacle may therefore be observed. In some cases, the processor may add the obstacle to a map layer corresponding to the obstacle sensor or to a different map layer. In some embodiments, the resolution of the map (or layer of a map) depends on the sensor from which the data used to generate the map came from. In some embodiments, maps with different resolutions may be constructed for various purposes. In some embodiments, the processor chooses a particular resolution to use for navigation based on the action being executed or settings of the robot. For example, if the robot is travelling at a slow driving speed, a lower resolution map layer may be used. In another example, the robot is driving in an area with high obstacle density at an increased speed therefore a higher resolution map layer may be used. In some cases, the data of the map is stored in a memory of the robot. In some embodiments, data is used with less accuracy or some floating points may be excluded in some calculations for lower resolution maps. In some embodiments, maps with different resolutions may all use the same underlying raw data instead of having multiple copies of that raw information stored.

In some embodiments, the processor executes a series of procedures to generate layers of a map used to construct the map from stored values in memory. In some embodiments, the same series of procedures may be used construct the map at different resolutions. In some embodiments, there may be dedicated series of procedures to construct various different maps. In some embodiments, a separate layer of a map may be stored in a separate data structure. In some embodiments, various layers of a map or various different types of maps may be at least partially constructed from the same underlying data structures.

Figure 100:
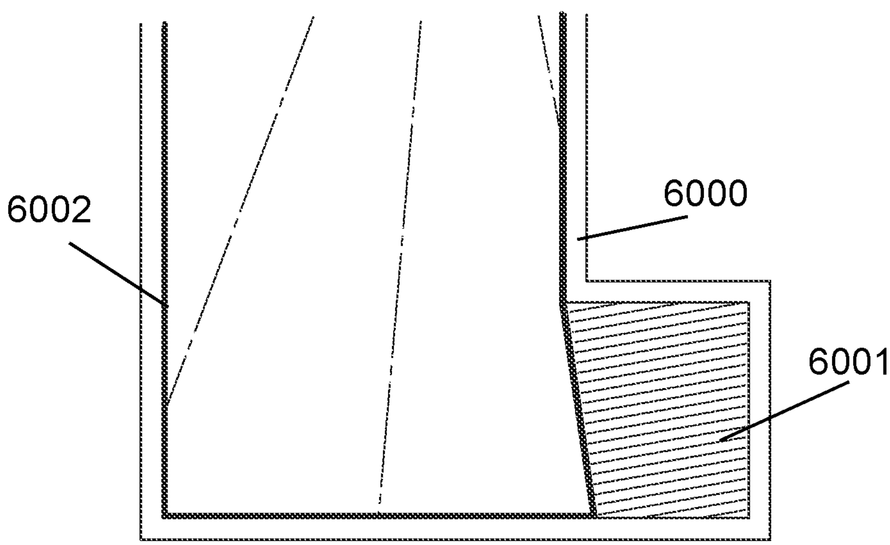
FIG. 100 illustrates an incorrectly predicted perimeter, according to some embodiments.

In some embodiments, the processor identifies gaps in the map (e.g., due to areas blind to a sensor or a range of a sensor). In some embodiments, the processor may actuate the robot to move towards and investigates the gap, collecting observations and mapping new areas by adding new observations to the map until the gap is closed. However, in some instances, the gap or an area blind to a sensor may not be detected. In some embodiments, a perimeter may be incorrectly predicted and may thus block off areas that were blind to the sensor of the robot. For example, FIG. 100 illustrates actual perimeter 6000, blind spot 6001, and incorrectly predicted perimeter 6002, blocking off blind spot 6001. A similar issue may arise when, for example, a bed cover or curtain initially appears to be a perimeter when in reality, the robot may navigate behind the bed cover or curtain.

Issues related to incorrect perimeter prediction may be eradicated with thorough inspection of the environment and training. For example, data from a second type of sensor may be used to validate a first map constructed based on data collected by a first type of sensor. In some embodiments, additional information discovered by multiple sensors may be included in multiple layers or different layers or in the same layer. In some embodiments, a training period of the robot may include the robot inspecting the environment various times with the same sensor or with a second (or more) type of sensor. In some embodiments, the training period may occur over one session (e.g., during an initial setup of the robot) or multiple sessions. In some embodiments, a user may instruct the robot to enter training at any point. In some embodiments, the processor of the robot may transmit the map to the cloud for validation and further machine learning processing. For example, the map may be processed on the cloud to identify rooms within the map. In some embodiments, the map including various information may be constructed into a graphic object and presented to the user (e.g., via an application of a communication device). In some embodiments, the map may not be presented to the user until it has been fully inspected multiple times and has high accuracy. In some embodiments, the processor disables a main brush and/or a side brush of the robot when in training mode or when searching and navigating to a charging station.

In some embodiments, a gap in the perimeters of the environment may be due to an opening in the wall (e.g., a doorway or an opening between two separate areas). In some embodiments, exploration of the undiscovered areas within which the gap is identified may lead to the discovery of a room, a hallway, or any other separate area. In some embodiments, identified gaps that are found to be, for example, an opening in the wall may be used in separating areas into smaller subareas. For example, the opening in the wall between two rooms may be used to segment the area into two subareas, where each room is a single subarea. This may be expanded to any number of rooms. In some embodiments, the processor of the robot may provide a unique tag to each subarea and may use the unique tag to order the subareas for coverage by the robot, choose different work functions for different subareas, add restrictions to subareas, set cleaning schedules for different subareas, and the like. In some embodiments, the processor may detect a second room beyond an opening in the wall detected within a first room being covered and may identify the opening in the wall between the two rooms as a doorway. Methods for identifying a doorway are described in U.S. patent application Ser. Nos. 16/163,541 and 15/614,284, the entire contents of which are hereby incorporated by reference. For example, in some embodiments, the processor may fit depth data points to a line model and any deviation from the line model may be identified as an opening in the wall by the processor. In some embodiments, the processor may use the range and light intensity recorded by the depth sensor for each reading to calculate an error associated with deviation of the range data from a line model. In some embodiments, the processor may relate the light intensity and range of a point captured by the depth sensor using $$I(n) = \frac{a}{r(n)^4},$$

wherein I(n) is the intensity of point n, r(n) is the distance of the particular point on an object and $a=E(I(n)r(n)^4)$ is a constant that is determined by the processor using a Gaussian assumption.

Given $d_{min}$, the minimum distance of all readings taken, the processor may calculate the distance $$r(n) = \frac{d_{min}}{\sin(-\theta(n))}$$

corresponding to a point n on an object at any angular resolution θ(n). In some embodiments, the processor may determine the horizon $$\alpha = a\sin\frac{d_{min}}{d_{max}}$$

of the depth sensor given $d_{min}$ and $d_{max}$, the minimum and maximum readings of all readings taken, respectively. The processor may use a combined error e=

$$\sum\left(I(n)r(n)^4 - a\right)^2 + \left(r(n) - \left(\frac{d_{min}}{\sin(-\theta(n))}\right)\right)^2$$

of the range and light intensity output by the depth sensor to identify deviation from the line model and hence detect an opening in the wall. The error e is minimal for walls and significantly higher for an opening in the wall, as the data will significantly deviate from the line model. In some embodiments, the processor may use a threshold to determine whether the data points considered indicate an opening in the wall when, for example, the error exceeds some threshold value. In some embodiments, the processor may use an adaptive threshold wherein the values below the threshold may be considered to be a wall.

In some embodiments, the processor may not consider openings with width below a specified threshold as an opening in the wall, such as openings with a width too small to be considered a door or too small for the robot to fit through. In some embodiments, the processor may estimate the width of the opening in the wall by identifying angles φ with a valid range value and with intensity greater than or equal to $$\frac{a}{d_{max}}.$$

The difference between the smallest and largest angle among all $$\varphi = \left\{\theta(n) \vee (\{r(n) \neq \infty\}) \wedge \left(I(n) \geq \left(\frac{a}{d_{max}}\right)^4\right)\right\}$$

angles may provide an estimate of the width of the opening. In some embodiments, the processor may also determine the width of an opening in the wall by identifying the angle at which the measured range noticeably increases and the angle at which the measured range noticeably decreases and taking the difference between the two angles.

In some embodiments, the processor may detect a wall or opening in the wall using recursive line fitting of the data. The processor may compare the error $(y-(\alpha x+b))^2$ of data points $n_1$ to $n_2$ to a threshold $T_1$ and summates the number of errors below the threshold. The processor may then compute the difference between the number of points considered $(n_2-n_1)$ and the number of data points with errors below threshold $T_1$. If the difference is below a threshold $T_2$, i.e., $$\left((n_2 - n_1) - \sum_{n_1}^{n_2} (y - (ax + b))^2 < T_1\right) < T_2,$$

then the processor assigns the data points to be a wall and otherwise assigns the data points to be an opening in the wall.

In another embodiment, the processor may use entropy to predict an opening in the wall, as an opening in the wall results in disordered measurement data and hence larger entropy value. In some embodiments, the processor may mark data with entropy above a certain threshold as an opening in the wall. In some embodiments, the processor determines entropy of data using $H(X)=-\Sigma_{i=1}^{n}P(x_i)\log P(x_i)$ wherein $X=(x_1, x_2, \ldots, x_n)$ is a collection of possible data, such as depth measurements. $P(x_i)$ is the probability of a data reading having value $x_i$. $P(x_i)$ may be determined by, for example, counting the number of measurements within a specified area of interest with value $x_i$ and dividing that number by the total number of measurements within the area considered. In some embodiments, the processor may compare entropy of collected data to entropy of data corresponding to a wall. For example, the entropy may be computed for the probability density function (PDF) of the data to predict if there is an opening in the wall in the region of interest. In the case of a wall, the PDF may show localization of readings around wall coordinates, thereby increasing certainty and reducing entropy.

In some embodiments, the processor may apply a probabilistic method by pre-training a classifier to provide a priori prediction. In some embodiments, the processor may use a supervised machine learning algorithm to identify features of openings and walls. A training set of, for example, depth data may be used by the processor to teach the classifier common features or patterns in the data corresponding with openings and walls such that the processor may identify walls and openings in walls with some probability distribution. In this way, a priori prediction from a classifier combined with real-time data measurement may be used together to provide a more accurate prediction of a wall or opening in the wall. In some embodiments, the processor may use Bayes theorem to provide probability of an opening in the wall given that the robot is located near an opening in the wall, $$P(A|B) = \frac{P(B|A)P(A)}{P(B)}.$$

$P(A|B)$ is the probability of an opening in the wall given that the robot is located $P(B)$ close to an opening in the wall, $P(A)$ is the probability of an opening in the wall, $P(B)$ is the probability of the robot being located close to an opening in the wall, and $P(B|A)$ is the probability of the robot being located close to an opening in the wall given that an opening in the wall is detected.

The different methods described for detecting an opening in the wall above may be combined in some embodiments and used independently in others. Examples of methods for detecting a doorway are described in, for example, U.S. patent application Ser. Nos. 15/615,284, 16/163,541, and 16/851,614 the entire contents of which are hereby incorporated by reference. In some embodiments, the processor may mark the location of doorways within a map of the environment. In some embodiments, the robot may be configured to avoid crossing an identified doorway for a predetermined amount of time or until the robot has encountered the doorway a predetermined number of times. In some embodiments, the robot may be configured to drive through the identified doorway into a second subarea for cleaning before driving back through the doorway in the opposite direction. In some embodiments, the robot may finish cleaning in the current area before crossing through the doorway and cleaning the adjacent area. In some embodiments, the robot may be configured to execute any number of actions upon identification of a doorway and different actions may be executed for different doorways. In some embodiments, the processor may use doorways to segment the environment into subareas. For example, the robot may execute a wall-follow coverage algorithm in a first subarea and rectangular-spiral coverage algorithm in a second subarea, or may only clean the first subarea, or may clean the first subarea and second subarea on particular days and times. In some embodiments, unique tags, such as a number or any label, may be assigned to each subarea. In some embodiments, the user may assign unique tags to each subarea, and embodiments may receive this input and associate the unique tag (such as a human-readable name of a room, like "kitchen") with the area in memory. Some embodiments may receive instructions that map tasks to areas by these unique tags, e.g., a user may input an instruction to the robot in the form of "vacuum kitchen," and the robot may respond by accessing the appropriate map in memory that is associated with this label to effectuate the command. In some embodiments, the robot may assign unique tags to each subarea. The unique tags may be used to set and control the operation and execution of tasks within each subarea and to set the order of coverage of each subarea. For example, the robot may cover a particular subarea first and another particular subarea last. In some embodiments, the order of coverage of the subareas is such that repeat coverage within the total area is minimized. In another embodiment, the order of coverage of the subareas is such that coverage time of the total area is minimized. The order of subareas may be changed depending on the task or desired outcome. The example provided only illustrates two subareas for simplicity but may be expanded to include multiple subareas, spaces, or environments, etc. In some embodiments, the processor may represent subareas using a stack structure, for example, for backtracking purposes wherein the path of the robot back to its starting position may be found using the stack structure.

In some embodiments, a map may be generated from data collected by sensors coupled to a wearable item. For example, sensors coupled to glasses or lenses of a user walking within a room may, for example, record a video, capture images, and map the room. For instance, the sensors may be used to capture measurements (e.g., depth measurements) of the walls of the room in two or three dimensions and the measurements may be combined at overlapping points to generate a map using SLAM techniques. In such a case, a step counter may be used instead of an odometer (as may be used with the robot during mapping, for example) to measure movement of the user. In some embodiments, the map may be generated in real-time. In some embodiments, the user may visualize a room using the glasses or lenses and may draw virtual objects within the visualized room. In some embodiments, the processor of the robot may be connected to the processor of the glasses or lenses. In some embodiments, the map is shared with the processor of the robot. In one example, the user may draw a virtual confinement line in the map for the robot. The processor of the glasses may transmit this information to the processor of the robot. Or, in another case, the user may draw a movement path of the robot or choose areas for the robot to operate within.

In some embodiments, the processor may determine an amount of time for building the map. In some embodiments, an Internet of Things (IoT) subsystem may create and/or send a binary map to the cloud and an application of a communication device. In some embodiments, the IoT subsystem may store unknown points within the map. In some embodiments, the binary maps may be an object with methods and characteristics such as capacity, raw size, etc. having data types such as a byte. In some embodiments, a binary map may include the number of obstacles. In some embodiments, the map may be analyzed to find doors within the room. In some embodiments, the time of analysis may be determined. In some embodiments, the global map may be provided in ASCII format. In some embodiments, a Wi-Fi command handler may push the map to the cloud after compression. In some embodiments, information may be divided into packet format. In some embodiments, compressions such as zlib may be used. In some embodiments, each packet may be in ASCII format and compressed with an algorithm such as zlib. In some embodiments, each packet may have a timestamp and checksum. In some embodiments, a handler such as a Wi-Fi command handler may gradually push the map to the cloud in intervals and increments. In some embodiments, the map may be pushed to the cloud after completion of coverage wherein the robot has examined every area within the map by visiting each area implementing any required corrections to the map. In some embodiments, the map may be provided after a few runs to provide an accurate representation of the environment. In some embodiments, some graphic processing may occur on the cloud or on the communication device presenting the map. In some embodiments, the map may be presented to a user after an initial training round. In some embodiments, a map handle may render an ASCII map. Rendering time may depend on resolution and dimension. In some embodiments, the map may have a tilt value in degrees.

Figure 101:
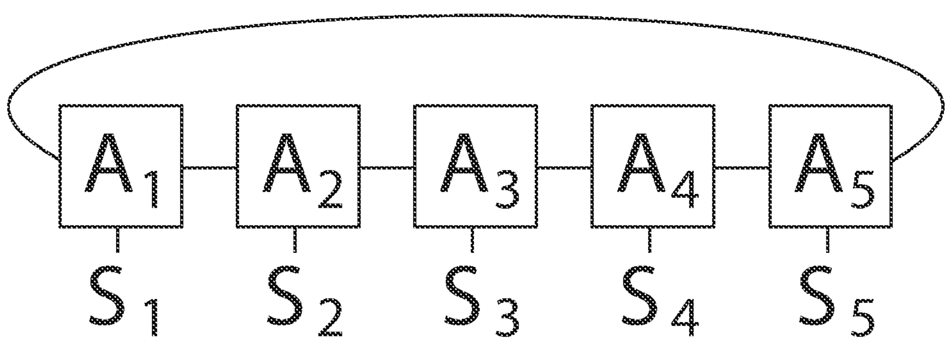
FIG. 101 illustrates an example of a connection between a beginning and end of a sequence, according to some embodiments.

In some embodiments, images or other sensor readings may be stitched and linked at both ends such that there is no end to the stitched images, such as in FIG. 101, wherein data $A_1$ to $A_5$ are stitched as are data $A_1$ and data $A_5$. For example, a user may use a finger to swipe in a leftwards direction across a screen of a mobile phone displaying a panorama image to view and pass past the right side of the panorama image and continue on to view the opposite side of the panorama image, in a continuous manner. In some embodiments, the images or other sensor readings may be two dimensional or three dimensional. For example, three dimensional readings may provide depth and hence spatial reality.

Figure 102A:
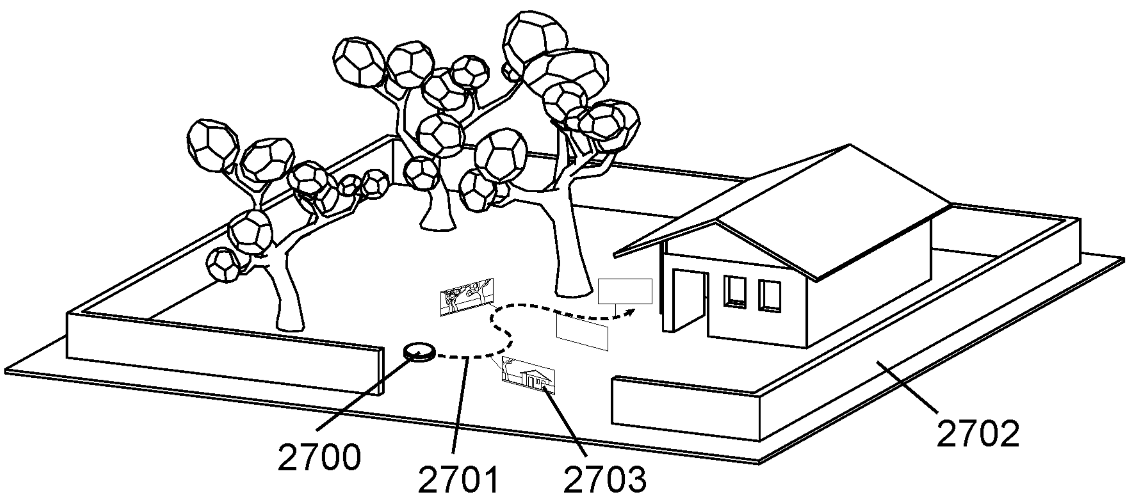
FIGS. 102A, 102B, 103, 104, 105A, 105B, 106, 107, and 108 illustrate examples of images captured by a sensor of the robot during navigation of the robot, according to some embodiments.
Figure 102B:
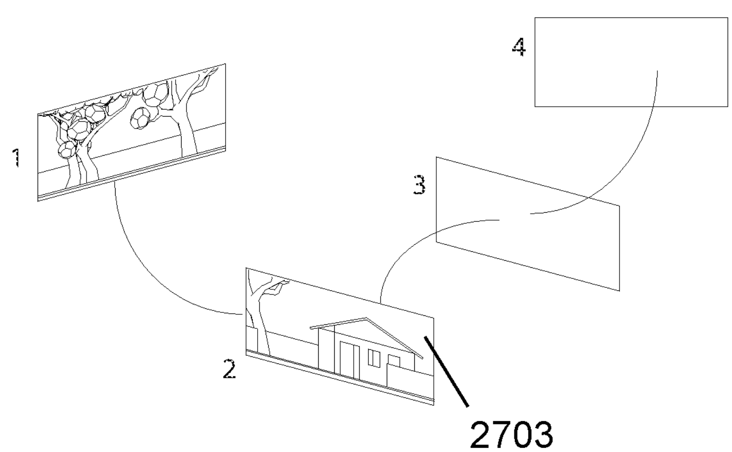
Figure 103:
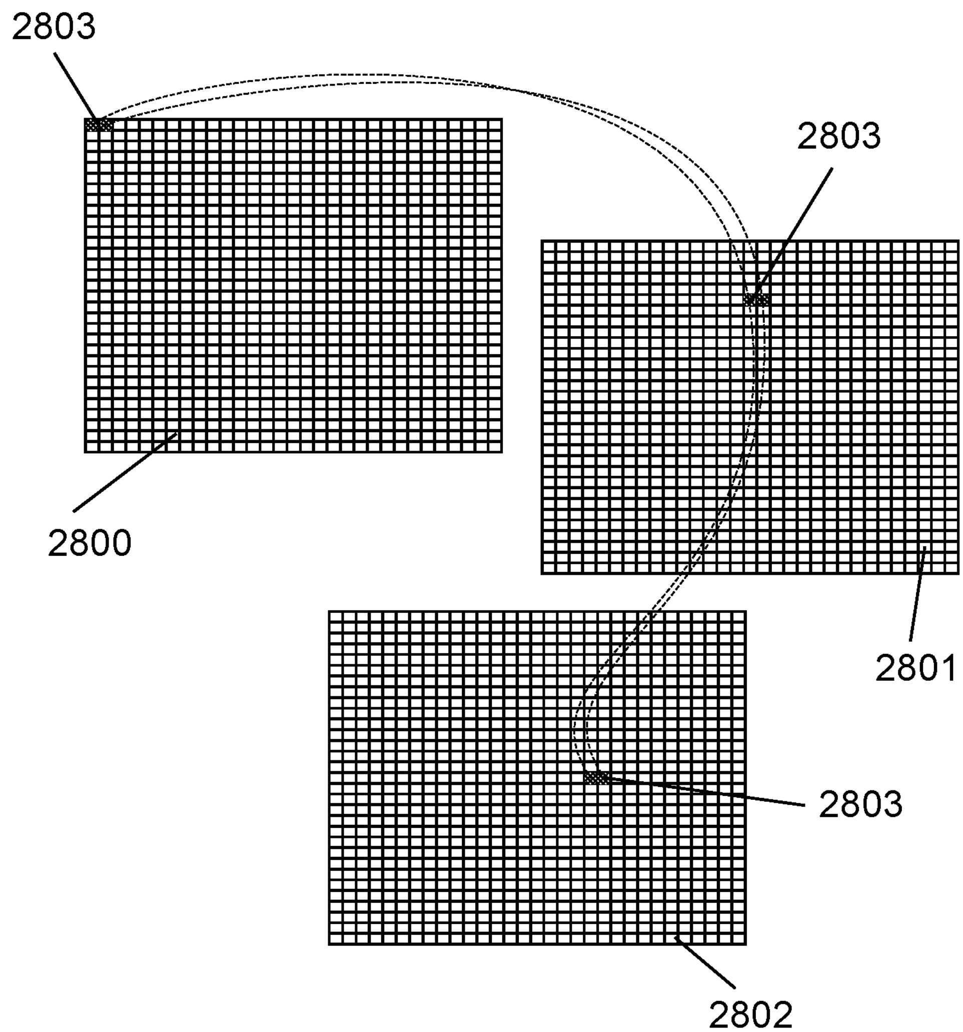
Figure 104:
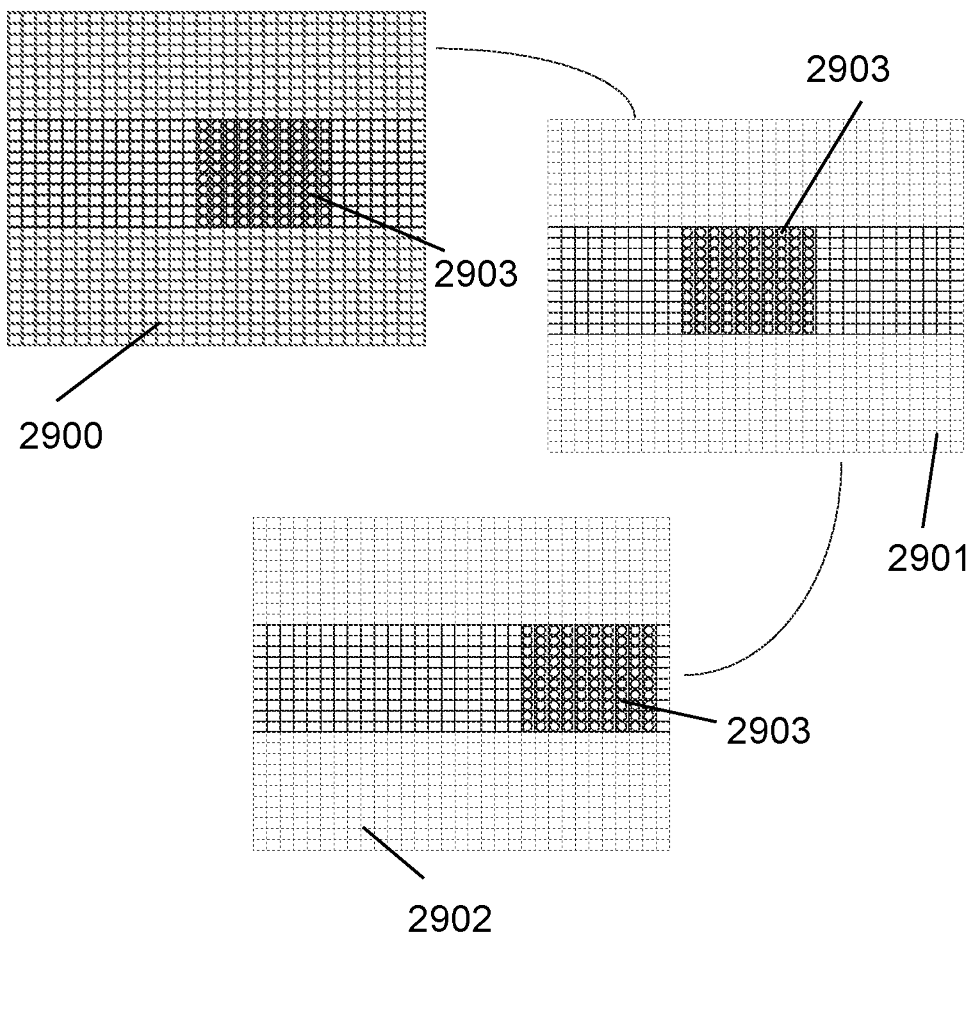

In some embodiments, an image sensor of the robot captures images as the robot navigates throughout the environment. For example, FIG. 102A illustrates a robot 2700 navigating along a path 2701 throughout environment 2702 while capturing images 2703 using an image sensor. FIG. 102B illustrates the images 2703 captured as the robot 2700 navigates along path 2701. In some embodiments, the processor of the robot connects the images 2703 to one another to generate a spatial representation of the environment. In some embodiments, the processor connects the images using similar methods as a graph G with vertices V connected by edges E. In some instances, images I may be connected with vertices V and edges E. In some embodiments, the processor connects images based on pixel densities and/or the path of the robot during which the images were captured (i.e., movement of the robot measured by odometry, gyroscope, etc.). FIG. 103 illustrates three images 2800, 2801, and 2802 captured during navigation of the robot and the position of the same pixels 2803 in each image. The processor of the robot may identify the same pixels 2803 in each image based on the pixel densities and/or the movement of the robot between each captured image or the position and orientation of the robot when each image was captured. The processor of the robot may connect images 2800, 2801, and 2802 based on the position of the same pixels 2803 in each image such that the same pixels 2803 overlap with one another when images 2800, 2801, and 2802 are connected. The processor may also connect images based on the measured movement of the robot between captured images 2800, 2801, and 2802 or the position and orientation of the robot within the environment when images 2800, 2801, and 2802 were captured. In some cases, images may be connected based on identifying similar distances to objects in the captured images. For example, FIG. 104 illustrates three images 2900, 2901, and 2902 captured during navigation of the robot and the same distances to objects 2903 in each image. The distances to objects 2903 always fall along the same height in each of the captured images as a two-and-a-half dimensional LIDAR measured the distances. The processor of the robot may connect images 2900, 2901, and 2902 based on the position of the same distances to objects 2903 in each image such that the same distances to objects 2903 overlap with one another when images 2900, 2901, and 2902 are connected. In some embodiments, the processor may use the minimum mean squared error to provide a more precise estimate of distances within the overlapping area. Other methods may also be used to verify or improve accuracy of connection of the captured images, such as matching similar pixel densities and/or measuring the movement of the robot between each captured image or the position and orientation of the robot when each image was captured.

Figure 105A:
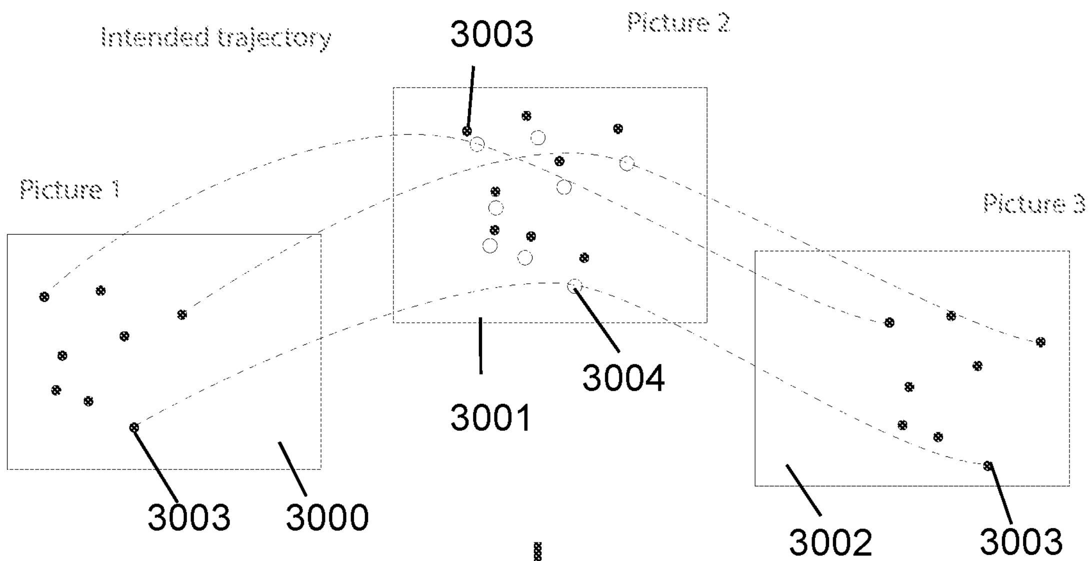
Figure 105B:
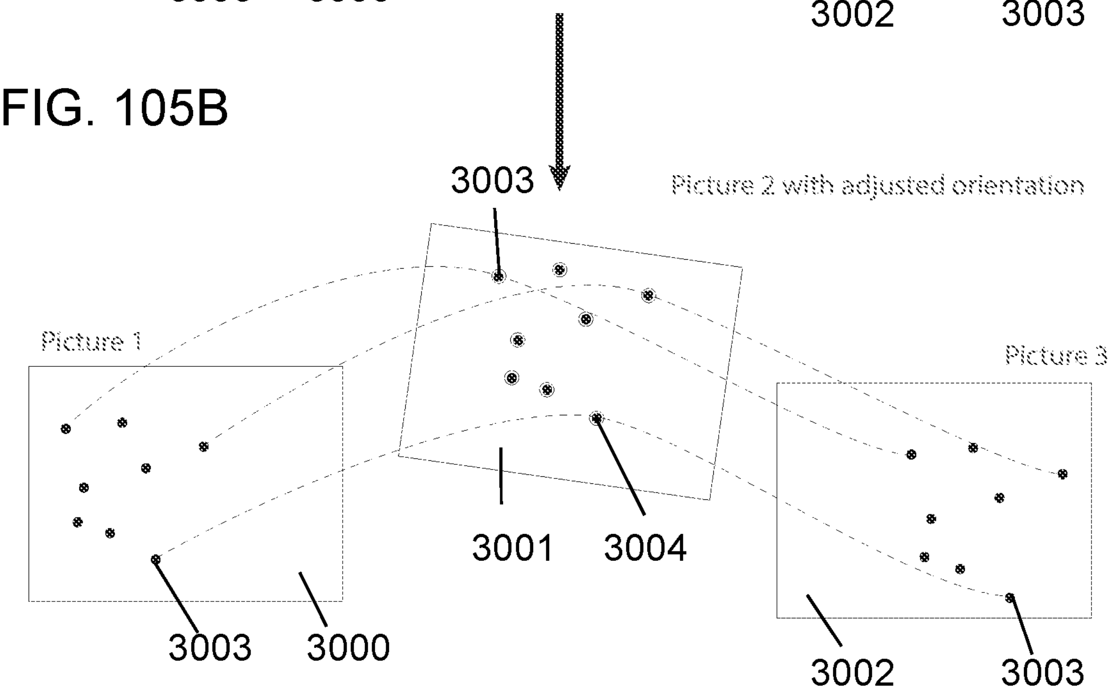
Figure 106:
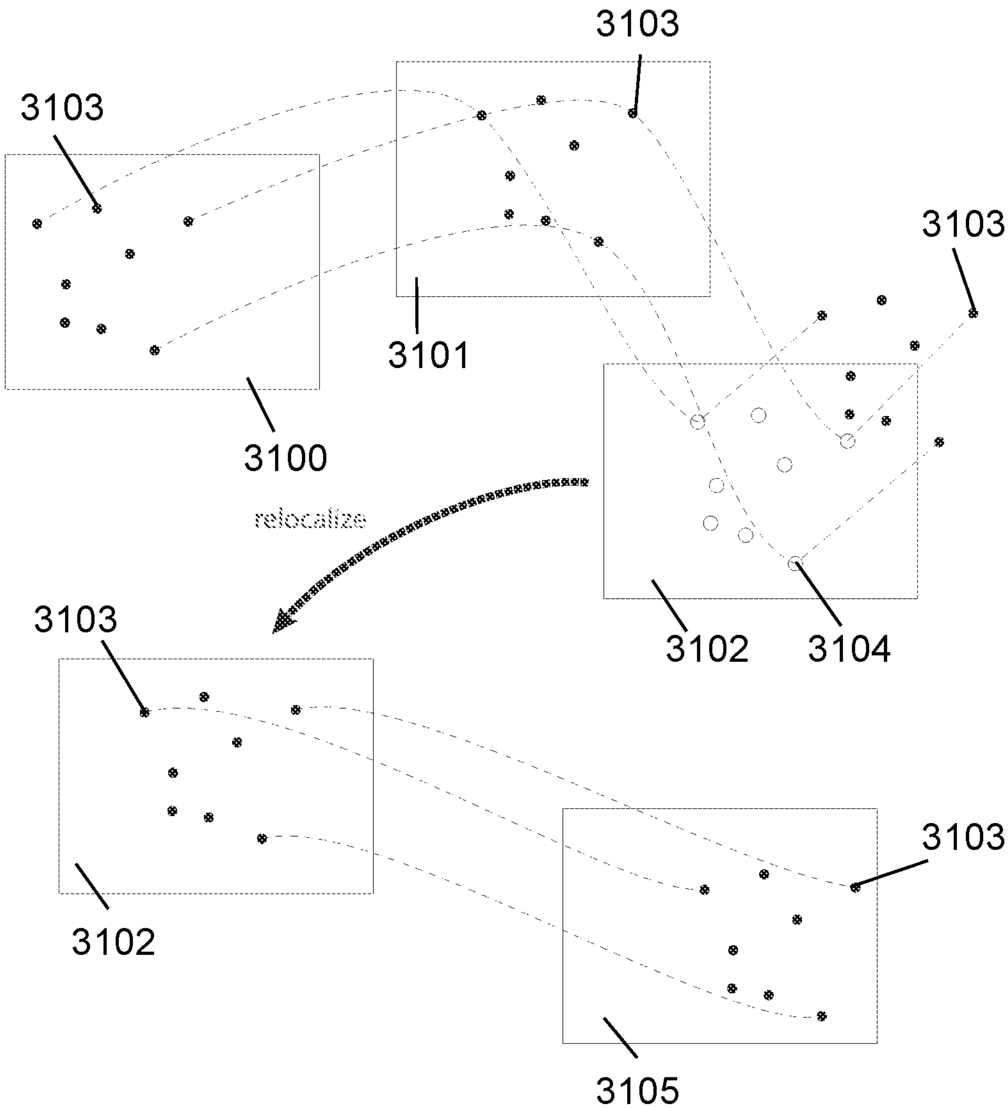

In some cases, images used to generate a spatial representation of the environment may not be accurately connected when connected based on the measured movement of the robot as the actual trajectory of the robot may not be the same as the intended trajectory of the robot. In some embodiments, the processor may localize the robot and correct the position and orientation of the robot. FIG. 105A illustrates three images 3000, 3001, and 3002 captured by an image sensor of the robot during navigation with same points 3003 in each image. Based on the intended trajectory of the robot, same points 3003 are expected to be positioned in locations 3004. However, the actual trajectory resulted in captured image 3001 with same points 3003 positioned in unexpected locations. Based on localization of the robot during navigation, the processor may correct the position and orientation of the robot, resulting in FIG. 105B of captured image 3001 with the locations of same points 3003 aligning with their expected locations 3004 given the correction in position and orientation of the robot. In some cases, the robot may lose localization during navigation due to, for example, a push or slippage. In some embodiments, the processor may relocalize the robot and as a result images may be accurately connected. FIG. 106 illustrates three images 3100, 3101, and 3102 captured by an image sensor of the robot during navigation with same points 3103 in each image. Based on the intended trajectory of the robot, same points 3103 are expected to be positioned at locations 3104 in image 3102, however, due to loss of localization, same points 3103 are located elsewhere. The processor of the robot may relocalize and readjust the locations of same points 3103 in image 3102 and continue along its intended trajectory while capturing image 3105 with same points 3103.

Figure 107:
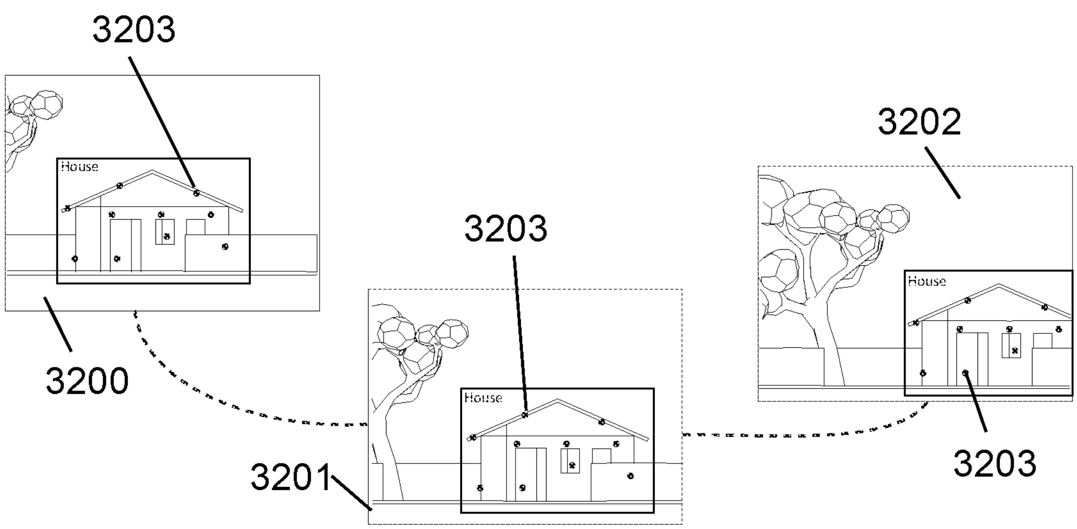

In some embodiments, the processor may connect images to generate a spatial representation based on the same objects identified in captured images. In some embodiments, the same objects in the captured images may be identified based on distances to objects in the captured images and the movement of the robot in between captured images and/or the position and orientation of the robot at the time the images were captured. FIG. 107 illustrates three images 3200, 3201, and 3202 captured by an image sensor and same points 3203 in each image. The processor may identify the same points 3203 in each image based on the distances to objects within each image and the movement of the robot in between each captured image. Based on the movement of the robot between a position from which image 3200 and image 3201 were captured, the distances of same points 3203 in captured image 3200 may be determined for captured image 3201. The processor may then identify the same points 3203 in captured image 3201 by identifying the pixels corresponding with the determined distances for same points 3203 in image 3201. The same may be done for captured image 3202.

Figure 108:
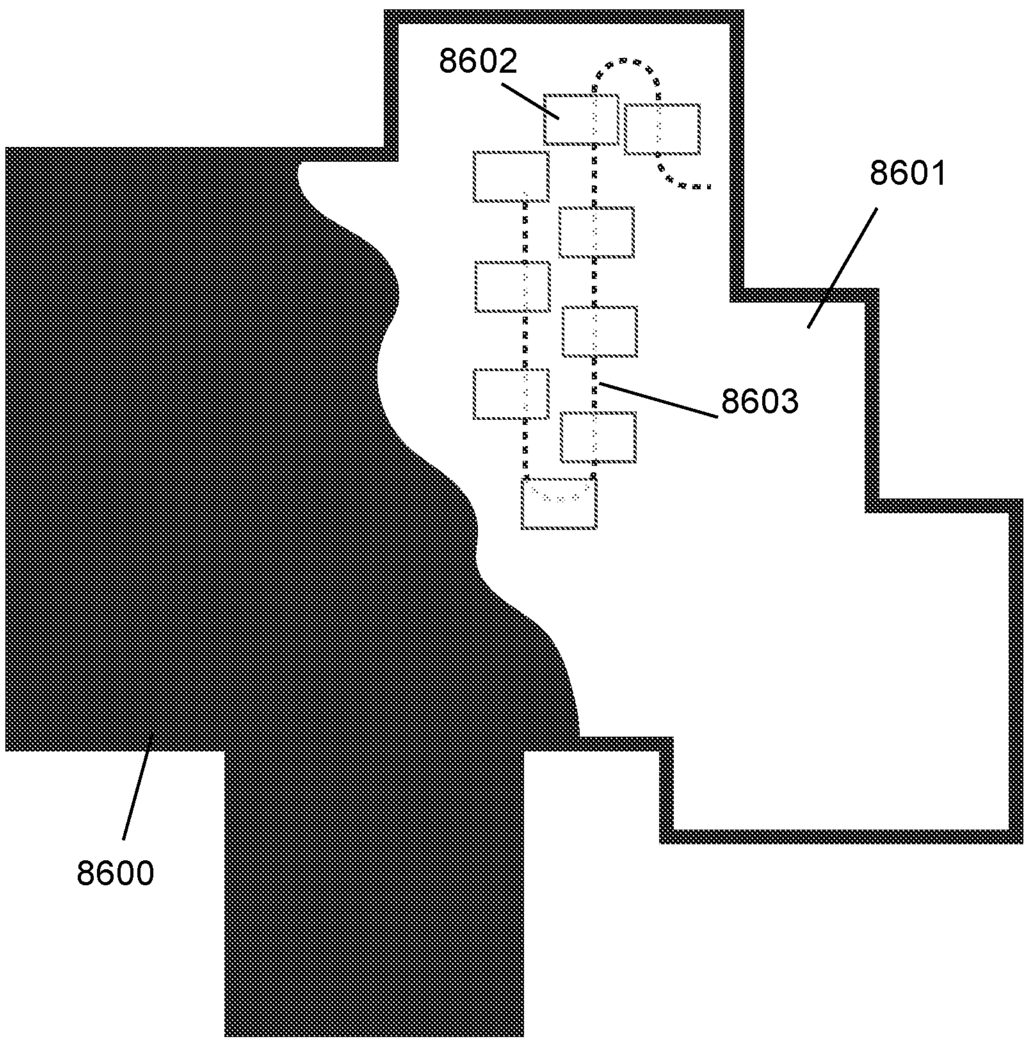

In some embodiments, the processor of the robot may insert image data information at locations within the map from which the image data was captured from. FIG. 108 illustrates an example of a map including undiscovered area 8600 and mapped area 8601. Images 8602 captured as the robot maps the environment while navigating along the path 8603 are placed within the map at a location from which each of the images were captured from. In some embodiments, images may be associated with a location from the images are captured from. In some embodiments, the processor stitches images of areas discovered by the robot together in a two dimensional grid map. In some embodiments, an image may be associated with information such as the location from which the image was captured from, the time and date on which the image was captured, and the people or objects captured within the image. In some embodiments, a user may access the images on an application of a communication device. In some embodiments, the processor or the application may sort the images according to a particular filter, such as by date, location, persons within the image, favorites, etc.

In embodiments, the SLAM algorithm described herein and executed by the processor of the robot provides consistent results. For example, a map of a same environment may be generated ten different times using the same SLAM algorithm and there is almost no difference in the maps that are generated. In embodiments, the SLAM algorithm is superior to SLAM methods described in prior art as it is less likely to lose localization of the robot. For example, using traditional SLAM methods, localization of the robot may be lost if the robot is randomly picked up and moved to a different room during a work session. However, using the SLAM algorithm described herein, localization is not lost.

It should be emphasized that embodiments are not limited to techniques that construct spatial representations in the ways described herein, as the present techniques may also be used for plane finding in augmented reality, barrier detection in virtual reality applications, outdoor mapping with autonomous drones, and other similar applications, which is not to suggest that any other description is limiting. Further details of methods and techniques for generating a spatial representation that may be used are described in U.S. patent application Ser. Nos. 16/048,179, 16/048,185, 16/163,541, 16/851,614, 16/163,562, 16/597,945, 16/724,328, 16/163,508, 16/185,000, and 16/418,988, the entire contents of which are hereby incorporated by reference.

In some embodiments, the processor localizes the robot during mapping or during operation. In some embodiments, methods of localization are inherently independent from mapping and path planning but may be used in tandem with any mapping or path planning method or may be used independently to localize the robot irrespective of the path or map of the environment. Localization may provide a pose of the robot and may be described using a mean and covariance formatted as an ordered pair or as an ordered list of state spaces given by x, y, z with a heading theta for a planar setting. In three dimensions, pitch, yaw, and roll may also be given. In some embodiments, the processor may provide the pose in an information matrix or information vector. In some embodiments, the processor may describe a transition from a current state (or pose) to a next state (or next pose) caused by an actuation using a translation vector or translation matrix. Examples of actuation include linear, angular, arched, or other possible trajectories that may be executed by the drive system of the robot. For instance, a drive system used by cars may not allow rotation in place, however, a two-wheel differential drive system including a caster wheel may allow rotation in place. The methods and techniques described herein may be used with various different drive systems. In embodiments, the processor of the robot may use data collected by various sensors, such as proprioceptive and exteroceptive sensors, to determine the actuation of the robot. For instance, odometry measurements may provide a rotation and a translation measurement that the processor may use to determine actuation or displacement of the robot. In other cases, the processor may use translational and angular velocities measured by an IMU and executed over a certain amount of time, in addition to a noise factor, to determine the actuation of the robot. Some IMUs may include up to a three axis gyroscope and up to a three axis accelerometer, the axes being normal to one another, in addition to a compass. Assuming the components of the IMU are perfectly mounted, only one of the axes of the accelerometer is subject to the force of gravity. However, misalignment often occurs (e.g., during manufacturing) resulting in the force of gravity acting on the two other axes of the accelerometer. In addition, imperfections are not limited to within the IMU, imperfections may also occur between two IMUs, between an IMU and the chassis or PCB of the robot, etc. In embodiments, such imperfections may be calibrated during manufacturing (e.g., alignment measurements during manufacturing) and/or by the processor of the robot (e.g., machine learning to fix errors) during one or more work sessions.

In some embodiments, the processor of the robot may track the position of the robot as the robot moves from a known state to a next discrete state. The next discrete state may be a state within one or more layers of superimposed Cartesian (or other type) coordinate system, wherein some ordered pairs may be marked as possible obstacles. In some embodiments, the processor may use an inverse measurement model when filling obstacle data into the coordinate system to indicate obstacle occupancy, free space, or probability of obstacle occupancy. In some embodiments, the processor of the robot may determine an uncertainty of the pose of the robot and the state space surrounding the robot. In some embodiments, the processor of the robot may use a Markov assumption, wherein each state is a complete summary of the past and used to determine the next state of the robot. In some embodiments, the processor may use a probability distribution to estimate a state of the robot since state transitions occur by actuations that are subject to uncertainties, such as slippage (e.g., slippage while driving on carpet, low-traction flooring, slopes, and over obstacles such as cords and cables). In some embodiments, the probability distribution may be determined based on readings collected by sensors of the robot. In some embodiments, the processor may use an Extended Kalman Filter for non-linear problems. In some embodiments, the processor of the robot may use an ensemble consisting of a large number of virtual copies of the robot, each virtual copy representing a possible state that the real robot is in. In embodiments, the processor may maintain, increase, or decrease the size of the ensemble as needed. In embodiments, the processor may renew, weaken, or strengthen the virtual copy members of the ensemble. In some embodiments, the processor may identify a most feasible member and one or more feasible successors of the most feasible member. In some embodiments, the processor may use maximum likelihood methods to determine the most likely member to correspond with the real robot at each point in time. In some embodiments, the processor determines and adjusts the ensemble based on sensor readings. In some embodiments, the processor may reject distance measurements and features that are surprisingly small or large, images that are warped or distorted and do not fit well with images captured immediately before and after, and other sensor data that appears to be an outlier. For instance, optical components or the limitation of manufacturing them or combing them with illumination assemblies may cause warped or curved images or warped or curved illumination within the images. For example, a line emitted by a line laser emitter captured by a CCD camera may appear curved or partially curved in the captured image. In some cases, the processor may use a lookup table, regression methods, or AI or ML methods to create a correlation and translate a warped line into a straight line. Such correction may be applied to the entire image or to particular features within the image.

In some embodiments, the processor may correct uncertainties as they accumulate during localization. In some embodiments, the processor may use second, third, fourth, etc. different type of measurements to make corrections at every state. For instance, measurements for a LIDAR, depth camera, or CCD camera may be used to correct for drift caused by errors in the reading stream of a first type of sensing. While the method by which corrections are made may be dependent on the type of sensing, the overall concept of correcting an uncertainty caused by actuation using at least one other type of sensing remains the same. For example, measurements collected by a distance sensor may indicate a change in distance measurement to a perimeter or obstacle, while measurements by a camera may indicate a change between two captured frames. While the two types of sensing differ, they may both be used to correct one another for movement. In some embodiments, some readings may be time multiplexed. For example, two or more IR or TOF sensors operating in the same light spectrum may be time multiplexed to avoid cross talk. In some embodiments, the processor may combine spatial data indicative of the position of the robot within the environment into a block and may processor the spatial data as a block. This may be similarly done with a stream of data indicative of movement of the robot. In some embodiments, the processor may use data binning to reduce the effects of minor observation errors and/or reduce the amount of data to be processed. The processor may replace original data values that fall into a given small interval, i.e. a bin, by a value representative of that bin (e.g., the central value). In image data processing, binning may entail combing a cluster of pixels into a single larger pixel, thereby reducing the number of pixels. This may reduce the amount data to be processor and may reduce the impact of noise.

In some embodiments, the processor may obtain a first stream of spatial data from a first sensor indicative of the position of the robot within the environment. In some embodiments, the processor may obtain a second stream of spatial data from a second sensor indicative of the position of the robot within the environment. In some embodiments, the processor may determine that the first sensor is impaired or inoperative. In response to determining the first sensor is impaired or inoperative, the processor may decrease, relative to prior to the determination that the first sensor is impaired or inoperative, influence of the first stream of spatial data on determinations of the position of the robot within the environment or mapping of dimensions of the environment. In response to determining the first sensor is impaired or inoperative, the processor may increase, relative to prior to the determination that the first sensor is impaired or inoperative, influence of the second stream of spatial data on determinations of the position of the robot within the environment or mapping of dimensions of the environment.

Figure 109A:
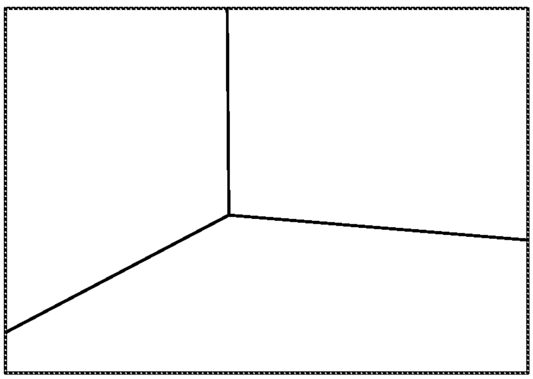
FIGS. 109A-109C and 110A-110C illustrates an example of a robot capturing depth measurements using a sensor, according to some embodiments.
Figure 109B:
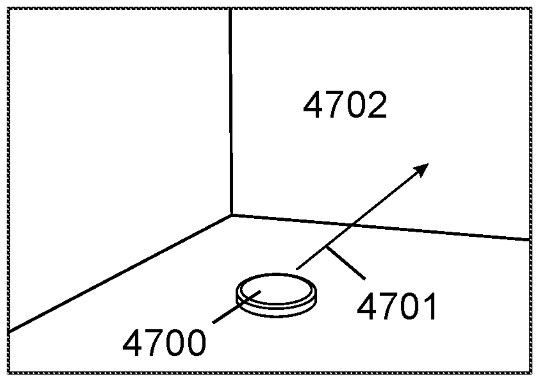
Figure 109C:
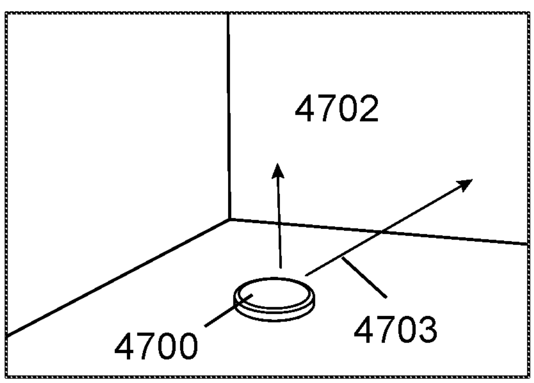
Figure 110A:
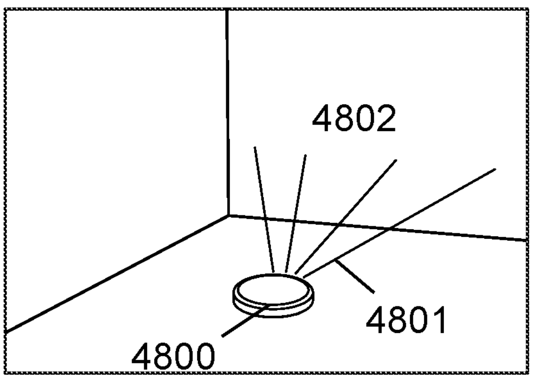
Figure 110B:
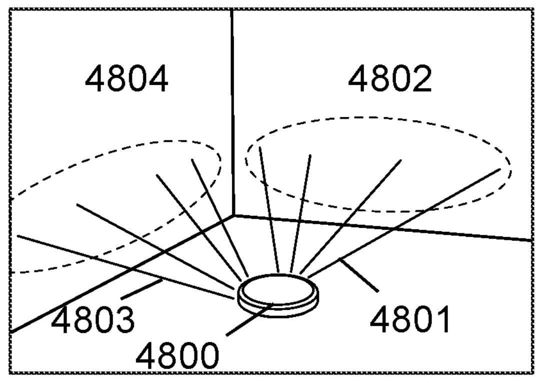
Figure 110C:
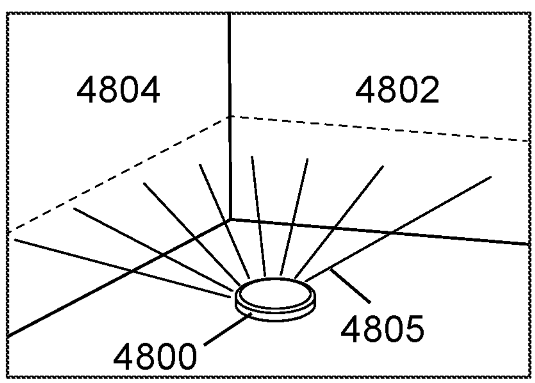

In some embodiments, the processor of the robot may use depth measurements and/or depth color measurements in identifying an area of an environment or in identifying its location within the environment. In some embodiments, depth color measurements include pixel values. The more depth measurements taken, the more accurate the estimation may be. For example, FIG. 109A illustrates an area of an environment. FIG. 109B illustrates the robot 4700 taking a single depth measurement 4701 to a wall 4702. FIG. 109C illustrates the robot 4700 taking two depth measurements 4703 to the wall 4702. Any estimation made by the processor based on the depth measurements may be more accurate with increasing depth measurements, as in the case shown in FIG. 109C as compared to FIG. 109B. To further increase the accuracy of estimation, both depth measurements and depth color measurements may be used. For example, FIG. 110A illustrates a robot 4800 taking depth measurements 4801 to a wall 4802 of an environment. An estimate based on depth measurements 4801 may be adequate, however, to improve accuracy depth color measurements 4803 of wall 4804 may also be taken, as illustrated in FIG. 110B. In some embodiments, the processor may take the derivative of depth measurements 4801 and the derivative of depth color measurements 4803. In some embodiments, the processor may use a Bayesian approach, wherein the processor may form a hypothesis based on a first observation (e.g., derivative of depth color measurements) and confirm the hypothesis by a second observation (e.g., derivative of depth measurements) before making any estimation or prediction. In some cases, measurements 4805 are taken in three dimensions, as illustrated in FIG. 110C.

In some embodiments, the processor may determine a transformation function for depth readings from a LIDAR, depth camera, or other depth sensing device. In some embodiments, the processor may determine a transformation function for various other types of data, such as images from a CCD camera, readings from an IMU, readings from a gyroscope, etc. The transformation function may demonstrate a current pose of the robot and a next pose of the robot in the next time slot. Various types of gathered data may be coupled in each time stamp and the processor may fuse them together using a transformation function that provides an initial pose and a next pose of the robot. In some embodiments, the processor may use minimum mean squared error to fuse newly collected data with the previously collected data. This may be done for transformations from previous readings collected by a single device or from fused readings or coupled data.

Figure 111:
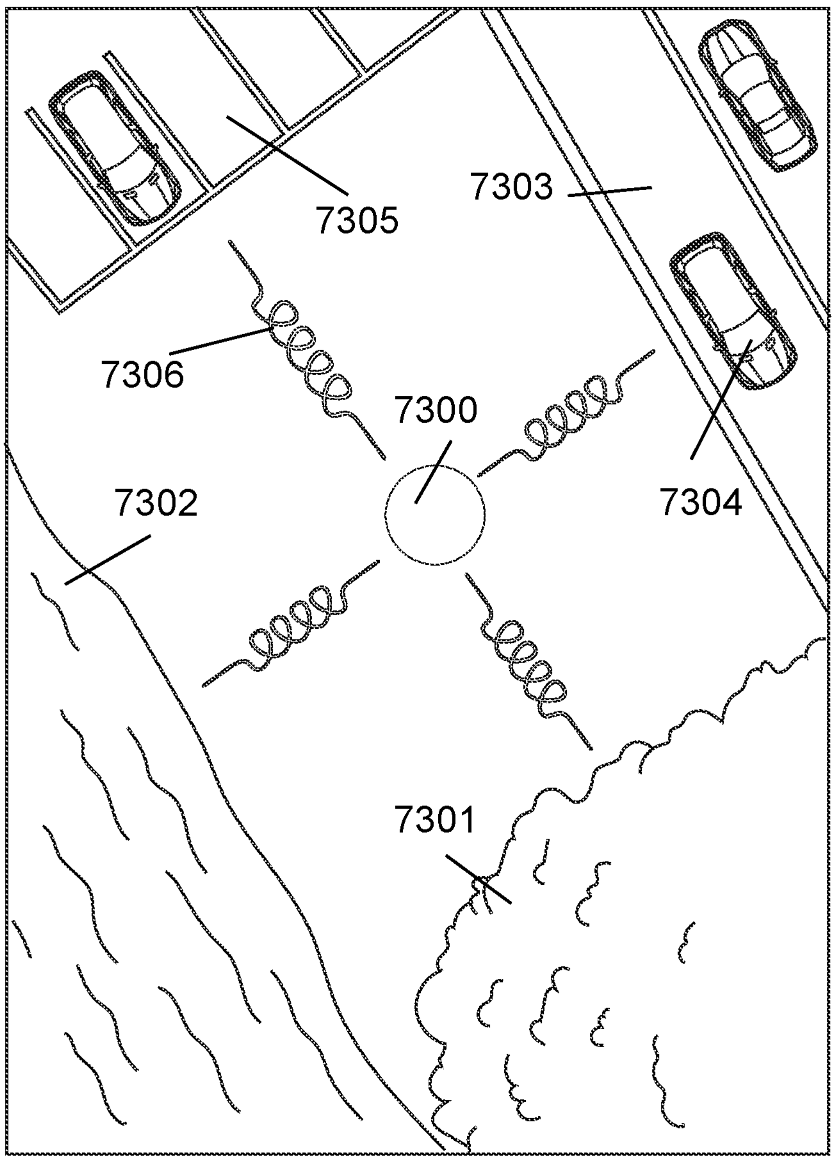
FIG. 111 illustrates an example of localization using color, according to some embodiments.

In some embodiments, the processor may localize the robot using color localization or color density localization. For example, the robot may be located at a park with a beachfront. The surroundings include a grassy area that is mostly green, the ocean that is blue, a street that is grey with colored cars, and a parking area. The processor of the robot may have an affinity to the distance to each of these areas within the surroundings. The processor may determine the location of the robot based on how far the robot is from each of these areas describes. FIG. 111 illustrates the robot 7300, the grassy area 7301, the ocean 7302, the street 7303 with cars 7304, and the parking area 7305. The springs 7306 represent an equation that best fits with each cost function corresponding to areas 7301, 7302, 7303, and 7305. The solution may factor in all constraints, adjust the springs 7306, and tweak the system resulting in each of the springs 7306 being extended or compressed.

In some embodiments, the processor may localize the robot by localizing against the dominant color in each area. In some embodiments, the processor may use region labeling or region coloring to identify parts of an image that have a logical connection to each other or belong to a certain object/scene. In some embodiments, sensitivity may be adjusted to be more inclusive or more exclusive. In some embodiments, the processor may use a recursive method, an iterative depth-first method, an iterative breadth-first search method, or another method to find an unmarked pixel. In some embodiments, the processor may compare surrounding pixel values with the value of the respective unmarked pixel. If the pixel values fall within a threshold of the value of the unmarked pixel, the processor may mark all the pixels as belonging to the same category and may assign a label to all the pixels. The processor may repeat this process, beginning by searching for an unmarked pixel again. In some embodiments, the processor may repeat the process until there are no unmarked areas.

Figure 112:
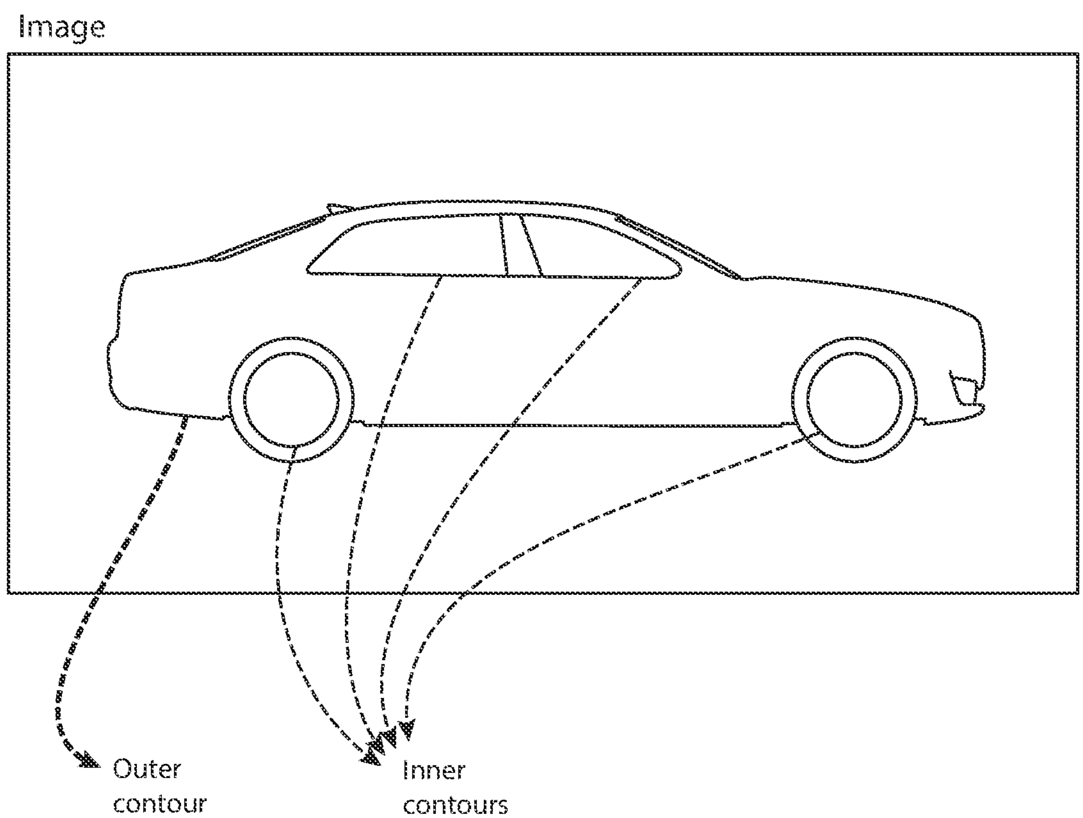
FIGS. 112 and 113A-113F illustrate examples of contour paths and encoding contour paths, according to some embodiments.
Figure 113A:
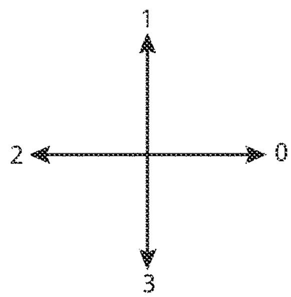
Figure 113B:
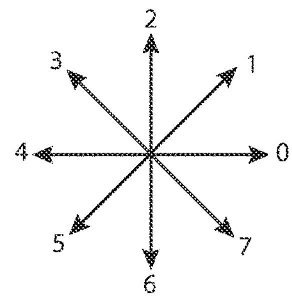
Figure 113C:
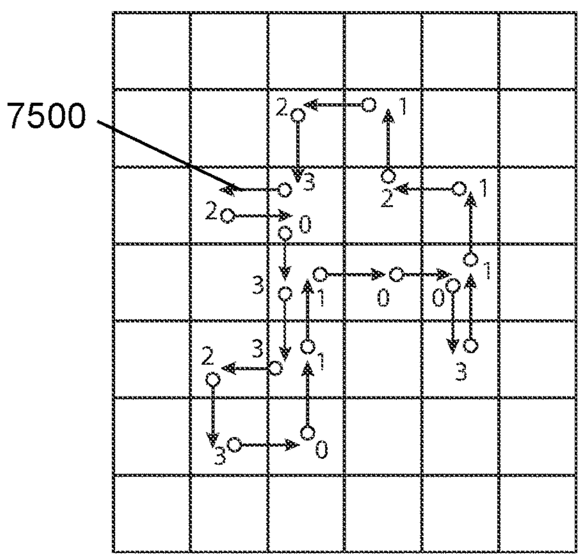
Figure 113D:
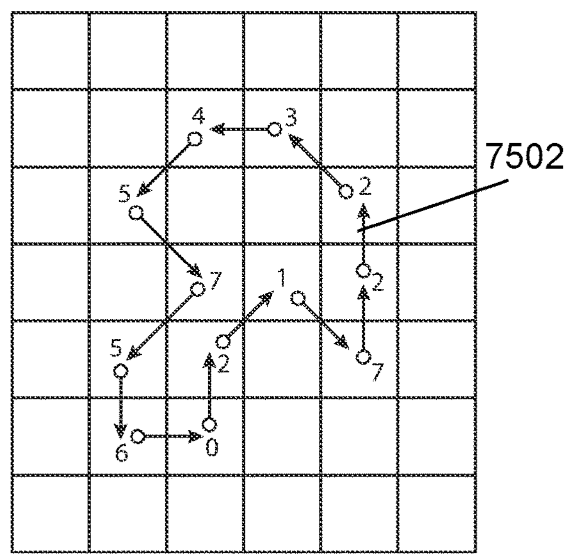
Figure 113E:
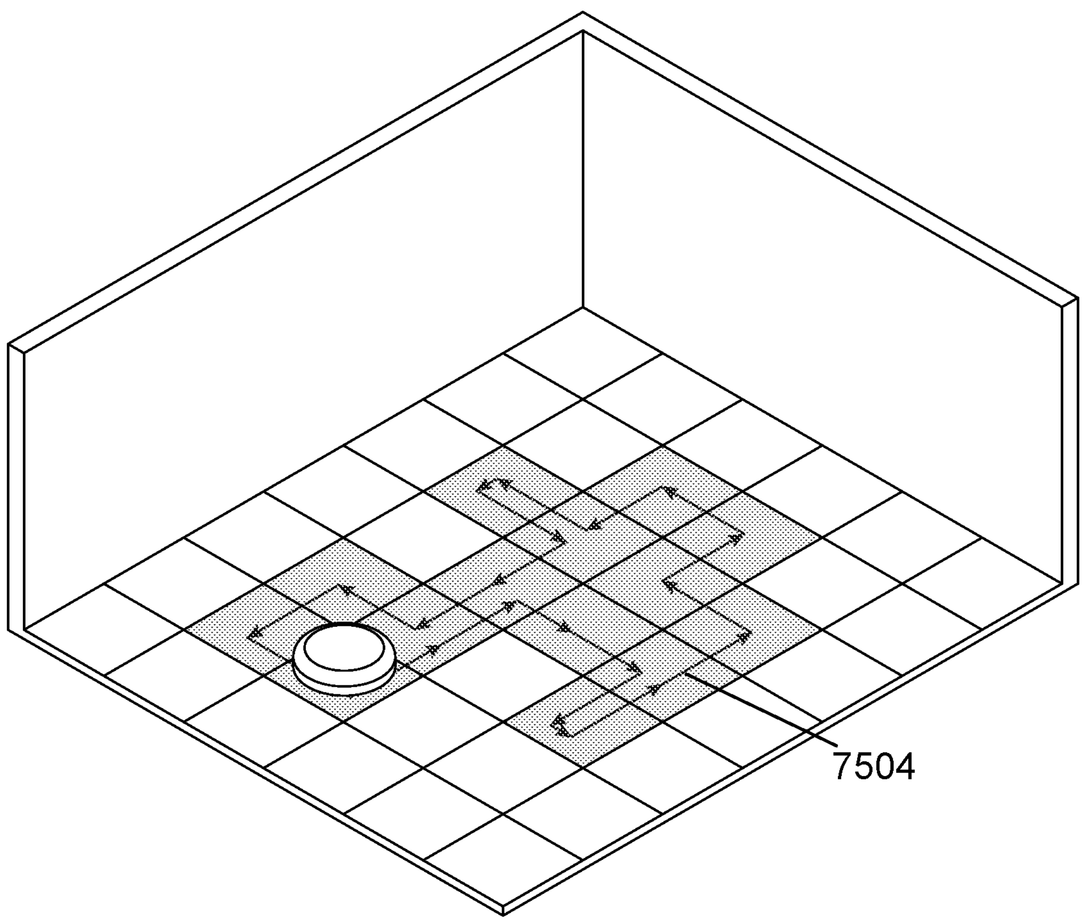
Figure 113F:
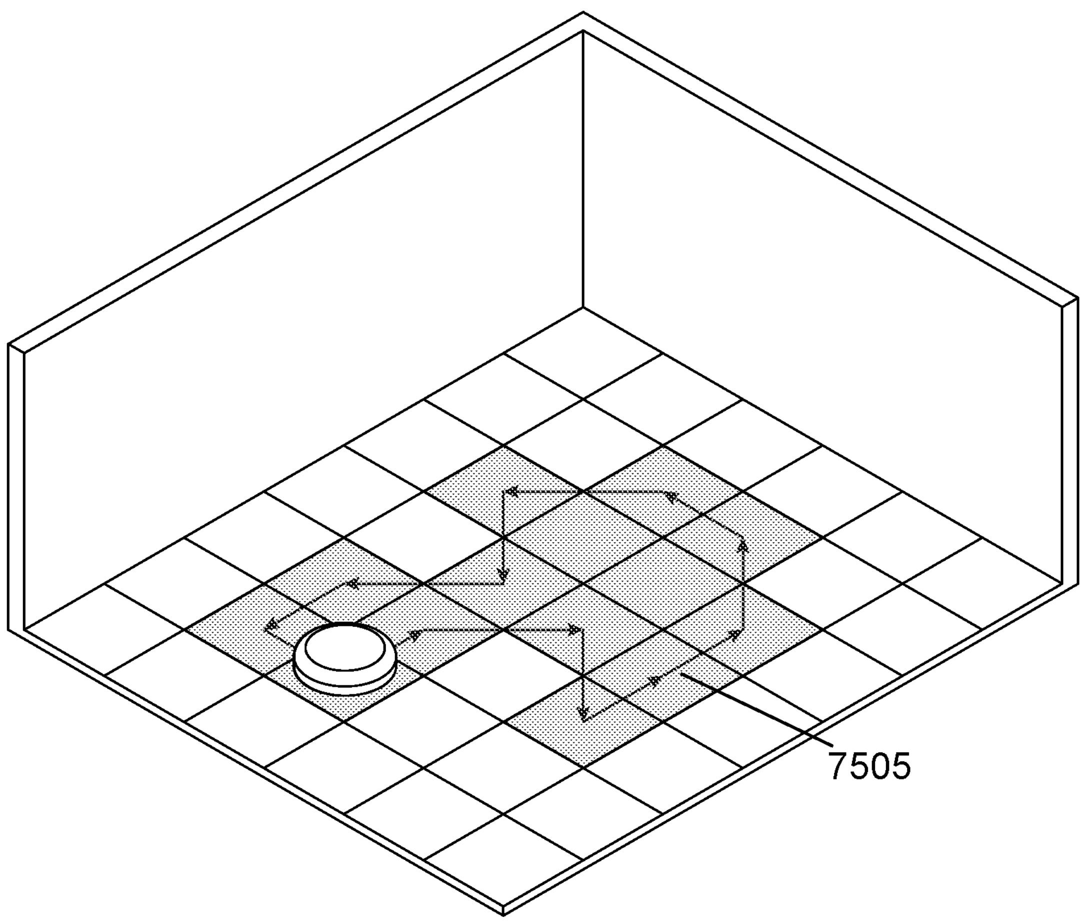

In some embodiments, a label collision may occur when two or more neighbors have labels belonging to different regions. When two labels a and b collide, they may be "equivalent", wherein they are contained within the same image region. For example, a binary image includes either black or white regions. Pixels along the edge of a binary region (i.e., border) may be identified by morphological operations and difference images. Marking the pixels along the contour may have some useful applications, however, an ordered sequence of border pixel coordinates for describing the contour of a region may also be determined. In some embodiments, an image may include only one outer contour and any number of inner contours. For example, FIG. 112 illustrates an image of a vehicle including an outer contour and multiple inner contours. In some embodiments, the processor may perform sequential region labeling, followed by contour tracing. In some embodiments, an image matrix may represent an image, wherein the value of each entry in the matrix may be the pixel intensity or color of a corresponding pixel within the image. In some embodiments, the processor may determine a length of a contour using chain codes and differential chain codes. In some embodiments, a chain code algorithm may begin by traversing a contour from a given starting point $x_s$ and may encode the relative position between adjacent contour points using a directional code for either 4-connected or 8-connected neighborhoods. In some embodiments, the processor may determine the length of the resulting path as the sum of the individual segments, which may be used as an approximation of the actual length of the contour. FIGS. 113A and 113B illustrate an example of a 4-chain code and 8-chain code, respectively. FIG. 113C illustrates an example of a contour path 7500 described using the 4-chain code in an array 7501. FIG. 113D illustrates an example of a contour path 7502 described using the 8-chain code in an array 7503. In some cases, directional code may alternatively be used in describing a path of the robot. For example, FIGS. 113E and 113F illustrate 4-chain and 8-chain contour paths 7504 and 7505 of the robot in three dimensions, respectively. In some embodiments, the processor may use Fourier shape descriptors to interpret two-dimensional contour $C=(x_0, x_1, \ldots, x_{M-1})$ with $x_i=(u_i, v_i)$ as a sequence of values in the complex plane, wherein $z_i=(u_i+i\cdot v_i)\in C$. In some embodiments, for an 8-chain connected contour, the processor may interpolate a discrete, one-dimensional periodic function $f(s)\in C$ with a constant sampling interval over s, the path along the contour. Coefficients of the one dimensional Fourier spectrum of the function $f(s)$ may provide a shape description of the contour in the frequency space, wherein the lower spectral coefficients deliver a gross description of the shape.

In some embodiments, the processor may localize the robot within the environment represented by a phase space or Hilbert space. In some embodiments, the space may include all possible states of the robot within the space. In some embodiments, a probability distribution may be used by the processor of the robot to approximate the likelihood of the state of the robot being within a specific region of the space. In some embodiments, the processor of the robot may determine a phase space probability distribution over all possible states of the robot within the phase space using a statistical ensemble including a large collection of virtual, independent copies of the robot in various states of the phase space. In some embodiments, the phase space may consist of all possible values of position and momentum variables. In some embodiments, the processor may represent the statistical ensemble by a phase space probability density function $\rho(p, q, t)$, q and p denoting position and velocity vectors. In some embodiments, the processor may use the phase space probability density function $\rho(p, q, t)$ to determine the probability $\rho(p, q, t)dq\,dp$ that the robot at time t will be found in the infinitesimal phase space volume dq dp. In some embodiments, the phase space probability density function $\rho(p, q, t)$ may have the properties $\rho(p, q, t)\geq 0$ and $\int\rho(p, q, t)d(p, q)=1, \forall t\geq 0$, and the probability of the position q lying within a position interval a, b is $P[a\leq q\leq b]=\int_a^b\int\rho(p, q, t)dpdq$. Similarly, the probability of the velocity p lying within a velocity interval c, d is $P[c\leq q\leq d]=\int_c^d\int\rho(p, q, t)dqdp$. In some embodiments, the processor may determine values by integration over the phase space. For example, the processor may determine the expectation value of the position q by $\langle q\rangle=\int q\rho(p, q, t)d(p, q)$.

In some embodiments, the processor may evolve each state within the ensemble over time t according to an equation of motion. In some embodiments, the processor may model the motion of the robot using a Hamiltonian dynamical system with generalized coordinates q, p wherein dynamical properties may be modeled by a Hamiltonian function H. In some embodiments, the function may represent the total energy of the system. In some embodiments, the processor may represent the time evolution of a single point in the phase space using Hamilton's equations $$\frac{dp}{dt} = -\frac{\partial H}{\partial q}, \frac{dq}{dt} = \frac{\partial H}{\partial p}.$$

In some embodiments, the processor may evolve the entire statistical ensemble of phase space density function ρ(p, q, t) under a Hamiltonian H using the Liouville equation $$\frac{\partial \rho}{\partial t} = -\{\rho, H\},$$

wherein {·,·} denotes the Poisson bracket and H is the Hamiltonian of the system. For two functions $f$, g on the phase space, the Poisson bracket may be given by $$\{f, g\} = \sum_{i=1}^{N}\left(\frac{\partial f}{\partial q_i}\frac{\partial g}{\partial p_i} - \frac{\partial f}{\partial p_i}\frac{\partial g}{\partial q_i}\right).$$

In this approach, the processor may evolve each possible state in the phase space over time instead of keeping the phase space density constant over time, which is particularly advantageous if sensor readings are sparse in time.

In some embodiments, the processor may evolve the phase space probability density function ρ(p, q, t) over time using the Fokker-Plank equation which describes the time evolution of a probability density function of a particle under drag and random forces. In comparison to the behavior of the robot modeled by both the Hamiltonian and Liouville equations, which are purely deterministic, the Fokker-Planck equation includes stochastic behaviour. Given a stochastic process with $dX_t=\mu(X_t, t)dt+\sigma(X_t, t)dW_t$, wherein $X_t$ and $\mu(X_t, t)$ are M-dimensional vectors, $\sigma(X_t, t)$ is a M×P matrix, and $W_t$ is a P-dimensional standard Wiener process, the probability density ρ(x, t) for $X_t$ satisfies the Fokker-Planck equation $$\frac{\partial \rho(x, t)}{\partial t} = -\sum_{i=1}^{M}\frac{\partial}{\partial x_i}[\mu_i(x, t)\rho(x, t)] + \sum_{i=1}^{M}\sum_{j=1}^{M}\frac{\partial^2}{\partial x_i \partial x_j}[D_{ij}(x, t)\rho(x, t)]$$

with drift vector $\mu=(\mu_1, \ldots, \mu_M)$ and diffusion tensor $$D = \frac{1}{2}\sigma\sigma^T.$$

In some embodiments, the processor may add stochastic forces to the motion of the robot governed by the Hamiltonian H and the motion of the robot may then be given by the stochastic differential equation $$dX_t = \begin{pmatrix} dq \\ dp \end{pmatrix} = \begin{pmatrix} +\frac{\partial H}{\partial p} \\ -\frac{\partial H}{\partial q} \end{pmatrix} dt = \begin{pmatrix} 0_N \\ \sigma_N(p, q, t) \end{pmatrix} dW_t,$$

wherein $\sigma_N$ is a N×N matrix and $dW_t$ is a N-dimensional Wiener process. This leads to the Fokker-Plank equation $$\frac{\partial \rho}{\partial t} = -\{\rho, H\} + \nabla_p \cdot (D\nabla_p \rho),$$

wherein $\nabla_p$ denotes the gradient with respect to position p, ∇· denotes divergence, and $$D = \frac{1}{2}\sigma_N\sigma_N^T$$

is the diffusion tensor.

In other embodiments, the processor may incorporate stochastic behaviour by modeling the dynamics of the robot using Langevin dynamics, which models friction forces and perturbation to the system, instead of Hamiltonian dynamics. The Langevian equations may be given by $$M\ddot{q} = -\nabla_q U(q) - \gamma p + \sqrt{2\gamma k_B T M}\,R(t),$$

wherein (−γp) are friction forces, R(t) are random forces with zero-mean and delta-correlated stationary Gaussian process, T is the temperature, $k_B$ is Boltzmann's constant, γ is a damping constant, and M is a diagonal mass matrix. In some embodiments, the Langevin equation may be reformulated as a Fokker-Planck equation $$\frac{\partial \rho}{\partial t} = -\{\rho, H\} + \nabla_p \cdot (\gamma p \rho) + k_B T \nabla_p \cdot (\gamma M \Delta_p \rho)$$

$(\gamma M\nabla_p\rho)$ that the processor may use to evolve the phase space probability density function over time. In some embodiments, the second order term $\nabla_p\cdot(\gamma M\nabla_p\rho)$ is a model of classical Brownian motion, modeling a diffusion process. In some embodiments, partial differential equations for evolving the probability density function over time may be solved by the processor of the robot using, for example, finite difference and/or finite element methods.

Figure 114A:
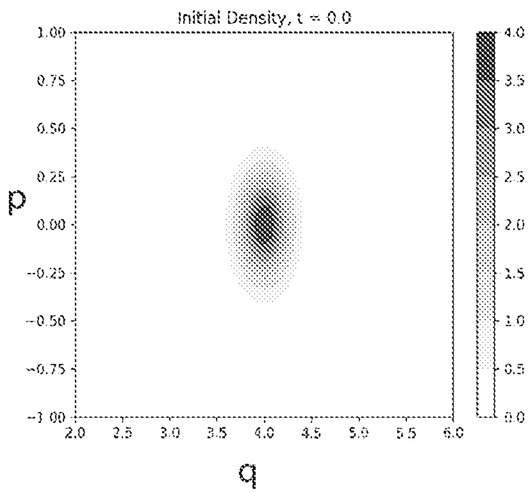
FIG. 114A illustrates an example of an initial phase space probability density of a robotic device, according to some embodiments.
Figure 114B:
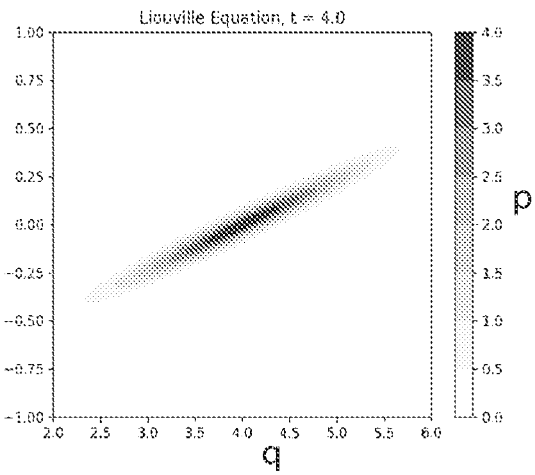
FIGS. 114B-114D illustrate examples of the time evolution of the phase space probability density, according to some embodiments.

FIG. 114A illustrates an example of an initial phase space probability density of a robot, a Gaussian in (q, p) space. FIG. 114B illustrates an example of the time evolution of the phase space probability density after four time units when evolved using the Liouville equation incorporating Hamiltonian dynamics, $$\frac{\partial \rho}{\partial t} = -\{\rho, H\}$$

with Hamiltonian $$H = \frac{1}{2}p^2.$$

Figure 114C:
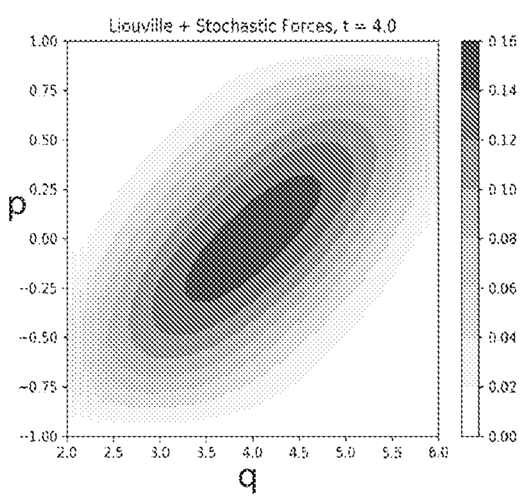
Figure 114D:
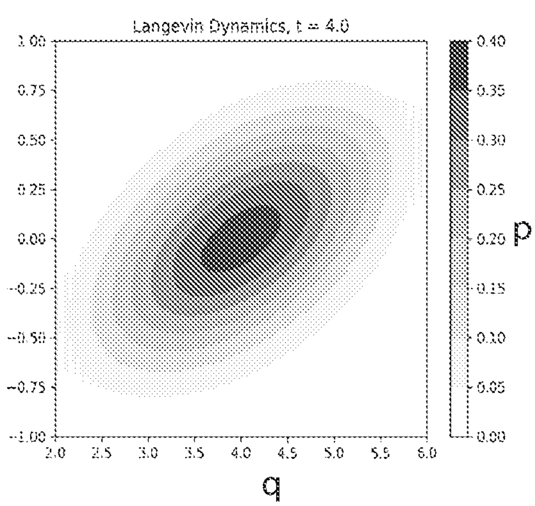

FIG. 114C illustrates an example of the time evolution of the phase space probability density after four time units when evolved using the Fokker-Planck equation incorporating Hamiltonian dynamics, $$\frac{\partial \rho}{\partial t} = -\{\rho, H\} + \nabla_p \cdot (D\nabla_p \rho)$$

with D=0.1. FIG. 114D illustrates an example of the time evolution of the phase space probability density after four time units when evolved using the Fokker-Planck equation incorporating Langevin dynamics, $$\frac{\partial \rho}{\partial t} = -\{\rho, H\} + \nabla_p \cdot (\gamma p \rho) + k_B T \nabla_p \cdot (\gamma M \nabla_p \rho)$$

with $\gamma$=0.5, T=0.2, and $k_B$=1. FIG. 114B illustrates that the Liouville equation incorporating Hamiltonian dynamics conserves momentum over time, as the initial density in FIG. 114A is only distorted in the q-axis (position). In comparison, FIGS. 114C and 14D illustrate diffusion along the p-axis (velocity) as well, as both evolution equations account for stochastic forces. With the Fokker-Planck equation incorporating Hamiltonian dynamics the density spreads more equally (FIG. 114C) as compared to the Fokker-Planck equation incorporating Langevin dynamics where the density remains more confined (FIG. 114D) due to the additional friction forces.

In some embodiments, the processor of the robot may update the phase space probability distribution when the processor receives readings (or measurements or observations). Any type of reading that may be represented as a probability distribution that describes the likelihood of the state of the robot being in a particular region of the phase space may be used. Readings may include measurements or observations acquired by sensors of the robot or external devices such as a Wi-Fi™ camera. Each reading may provide partial information on the likely region of the state of the robot within the phase space and/or may exclude the state of the robot from being within some region of the phase space. For example, a depth sensor of the robot may detect an obstacle in close proximity to the robot. Based on this measurement and using a map of the phase space, the processor of the robot may reduce the likelihood of the state of the robot being any state of the phase space at a great distance from an obstacle. In another example, a reading of a floor sensor of the robot and a floor map may be used by the processor of the robot to adjust the likelihood of the state of the robot being within the particular region of the phase space coinciding with the type of floor sensed. In an additional example, a measured Wi-Fi™ signal strength and a map of the expected Wi-Fi™ signal strength within the phase space may be used by the processor of the robot to adjust the phase space probability distribution. As a further example, a Wi-Fi™ camera may observe the absence of the robot within a particular room. Based on this observation the processor of the robot may reduce the likelihood of the state of the robot being any state of the phase space that places the robot within the particular room. In some embodiments, the processor generates a simulated representation of the environment for each hypothetical state of the robot. In some embodiments, the processor compares the measurement against each simulated representation of the environment (e.g., a floor map, a spatial map, a Wi-Fi map, etc.) corresponding with a perspective of each of the hypothetical states of the robot. In some embodiments, the processor chooses the state of the robot that makes the most sense as the most feasible state of the robot. In some embodiments, the processor selects additional hypothetical states of the robot as a backup to the most feasible state of the robot.

In some embodiments, the processor of the robot may update the current phase space probability distribution $\rho(p, q, t_i)$ by re-weighting the phase space probability distribution with an observation probability distribution $m(p, q, t_i)$ according to $$\bar{\rho}(p, q, t_i) = \frac{\rho(p, q, t_i) \cdot m(p, q, t_i)}{\int \rho(p, q, t_i) m(p, q, t_i) d(p, q)}.$$

In some embodiments, the observation probability distribution may be determined by the processor of the robot for a reading at time $t_i$ using an inverse sensor model. In some embodiments, wherein the observation probability distribution does not incorporate the confidence or uncertainty of the reading taken, the processor of the robot may incorporate the uncertainty into the observation probability distribution by determining an updated observation probability distribution $$\hat{m} = \frac{1-\alpha}{c} + \alpha m$$

$\alpha m$ that may be used in re-weighting the current phase space probability distribution, wherein $\alpha$ is the confidence in the reading with a value of $0 \le \alpha \le 1$ and $c = \iint dpdq$. At any given time, the processor of the robot may estimate a region of the phase space within which the state of the robot is likely to be given the phase space probability distribution at the particular time.

Figure 115A:
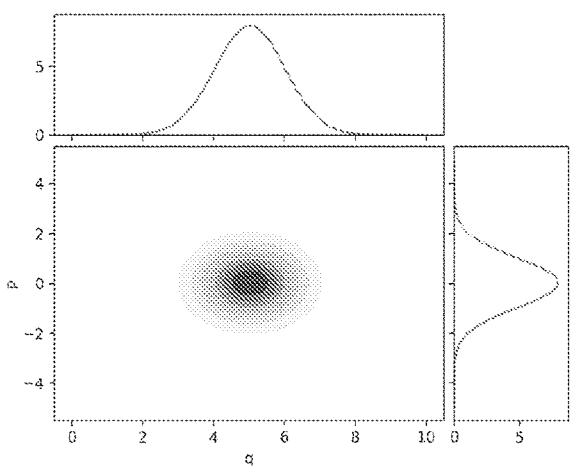
FIGS. 115A-115D illustrate examples of initial phase space probability distributions, according to some embodiments.
Figure 115B:
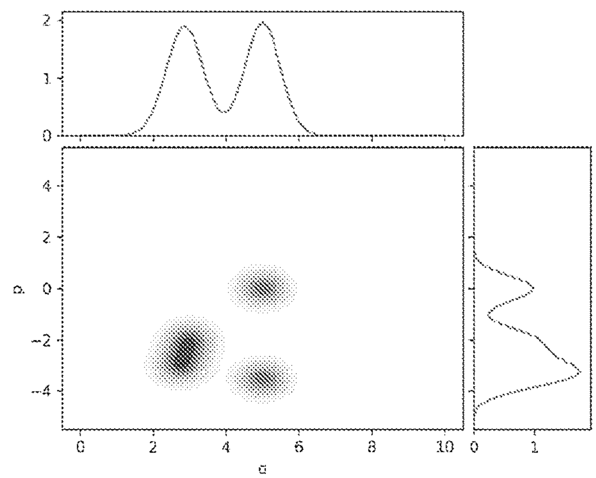
Figure 115C:
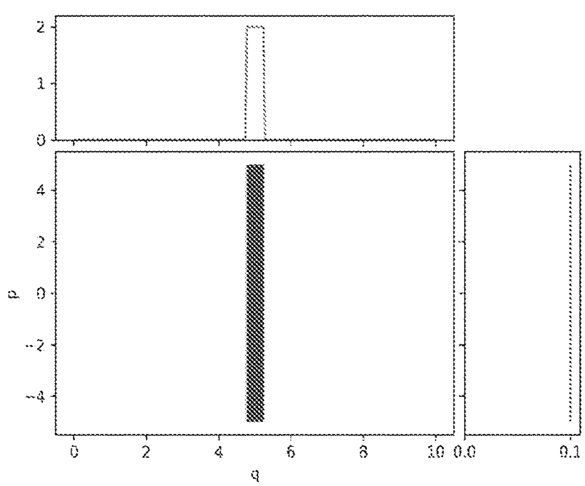
Figure 115D:
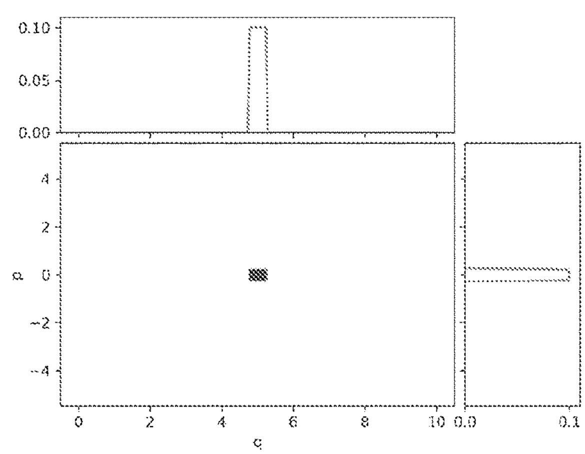

To further explain the localization methods described, examples are provided. In a first example, the processor uses a two-dimensional phase space of the robot, including position q and velocity p. The processor confines the position of the robot q to an interval [0, 10] and the velocity p to an interval [−5, +5], limited by the top speed of the robot, therefore the phase space (p, q) is the rectangle D=[−5, 5]×[0, 10]. The processor uses a Hamiltonian function $$H = \frac{p^2}{2m},$$

with mass m and resulting equations of motion $\dot{p}=0$ and $$\dot{q} = \frac{p}{m}$$

to delineate the motion of the robot. The processor adds Langevin-style stochastic forces to obtain motion equations $$\dot{p} = -\gamma p + \sqrt{2\gamma m k_B T}\, R(t)$$

and $$\dot{q} = \frac{p}{m},$$

wherein R(t) denotes random forces and m=1. The processor of the robot initially generates a uniform phase space probability distribution over the phase space D. FIGS. 115A-115D illustrate examples of initial phase space probability distributions the processor may use. FIG. 115A illustrates a Gaussian distribution over the phase space, centered at q=5, p=0. The robot is estimated to be in close proximity to the center point with high probability, the probability decreasing exponentially as the distance of the point from the center point increases. FIG. 115B illustrates uniform distribution for $q \in [4.75, 5.25]$, $p \in [-5, 5]$ over the phase space, wherein there is no assumption on p and q is equally likely to be in [4.75, 5.25]. FIG. 115C illustrates multiple Gaussian distributions and FIG. 115D illustrates a confined spike at q=5, p=0, indicating that the processor is certain of the state of the robot.

In this example, the processor of the robot evolves the phase space probability distribution over time according to Langevin equation $$\frac{\partial \rho}{\partial t} = -\{\rho, H\} + \left(\gamma \frac{\partial}{\partial p}\right) \cdot (p\rho) + \gamma k_B T \frac{\partial^2 \rho}{\partial p^2},$$

wherein $$\{\rho, H\} = p \frac{\partial \rho}{\partial q} \text{ and } m = 1.$$

Figure 116A:
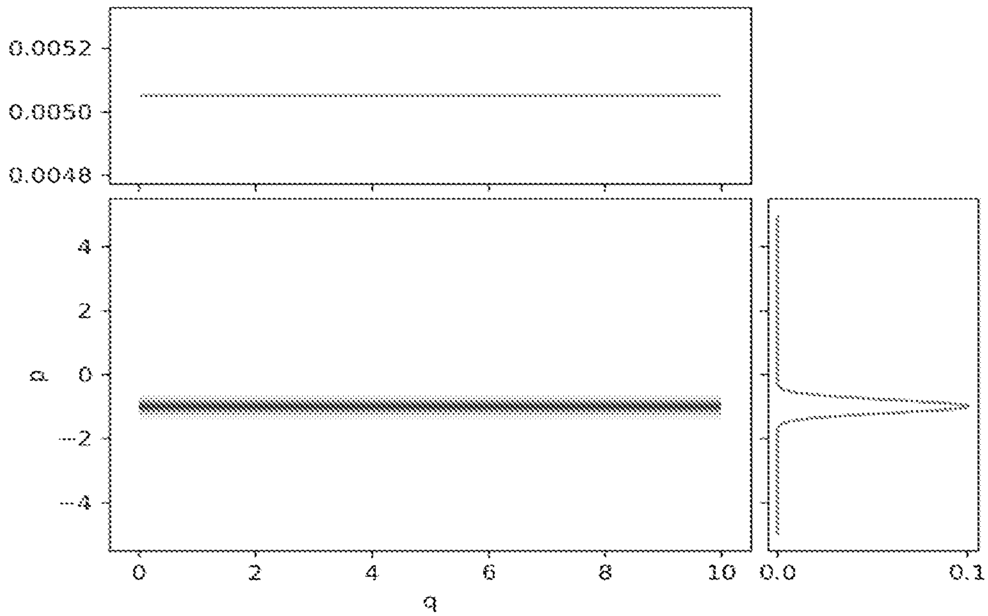
FIGS. 116A and 116B illustrate examples of observation probability distributions, according to some embodiments.
Figure 116B:
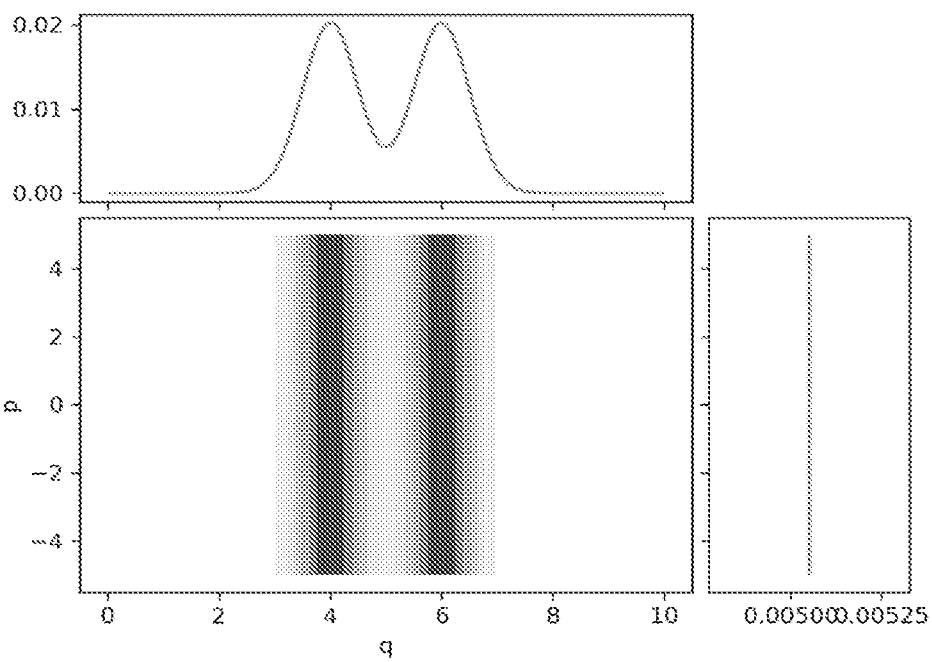

Thus, the processor solves $$\frac{\partial \rho}{\partial t} = -p \frac{\partial \rho}{\partial q} + \gamma \left(\rho + p \frac{\partial \rho}{\partial p}\right) + \gamma k_B T \frac{\partial^2 \rho}{\partial p^2}$$

for t>0 with initial condition $\rho(p, q, 0) = \rho_0$ and homogenous Neumann perimeters conditions. The perimeter conditions govern what happens when the robot reaches an extreme state. In the position state, this may correspond to the robot reaching a wall, and in the velocity state, it may correspond to the motor limit. The processor of the robot may update the phase space probability distribution each time a new reading is received by the processor. FIGS. 116A and 116B illustrate examples of observation probability distributions for odometry measurements and distance measurements, respectively. FIG. 116A illustrates a narrow Gaussian observation probability distribution for velocity p, reflecting an accurate odometry sensor. Position q is uniform as odometry data does not indicate position. FIG. 116B illustrates a bimodal observation probability distribution for position q including uncertainty for an environment with a wall at q=0 and q=10. Therefore, for a distance measurement of four, the robot is either at q=4 or q=6, resulting in the bi-modal distribution. Velocity p is uniform as distance data does not indicate velocity. In some embodiments, the processor may update the phase space at periodic intervals or at predetermined intervals or points in time. In some embodiments, the processor of the robot may determine an observation probability distribution of a reading using an inverse sensor model and the phase space probability distribution may be updated by the processor by re-weighting it with the observation probability distribution of the reading.

The example described may be extended to a four-dimensional phase space with position q=(x, y) and velocity $p=(p_x, p_y)$. The processor solves this four dimensional example using the Fokker-Planck equation $$\frac{\partial \rho}{\partial t} = -\{\rho, H\} + \nabla_p \cdot (\gamma p \rho) + k_B T \nabla_p \cdot (\gamma M \Delta_p \rho)$$

Figure 117:
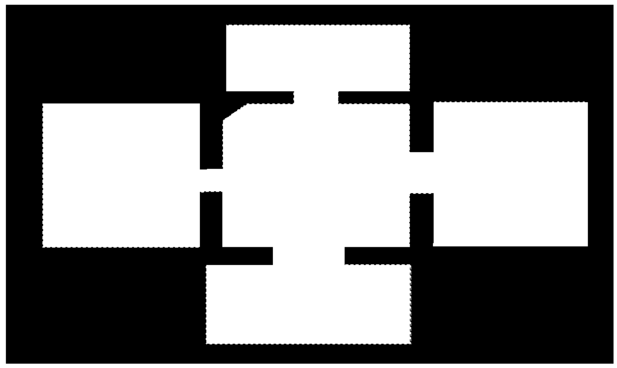
FIG. 117 illustrates an example of a map of an environment, according to some embodiments.
Figure 118A:
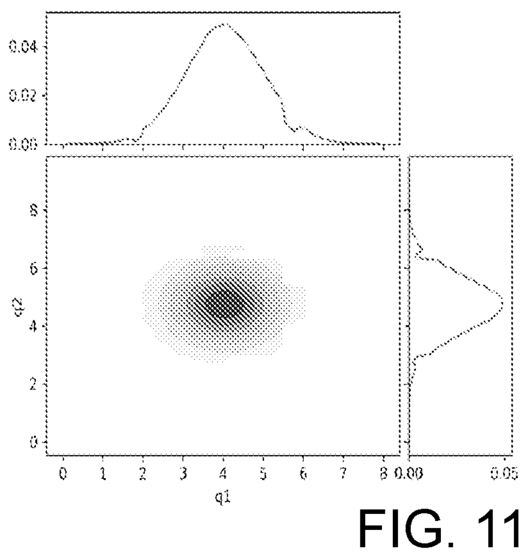
FIGS. 118A-118C illustrate an example of an evolution of a probability density reduced to the $q_1$, $q_2$ space at three different time points, according to some embodiments.
Figure 118B:
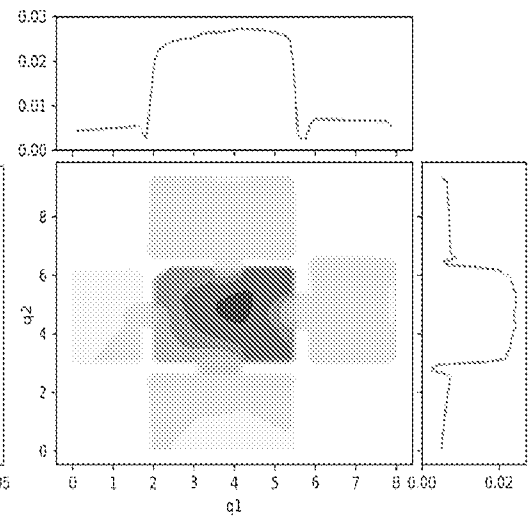
Figure 118C:
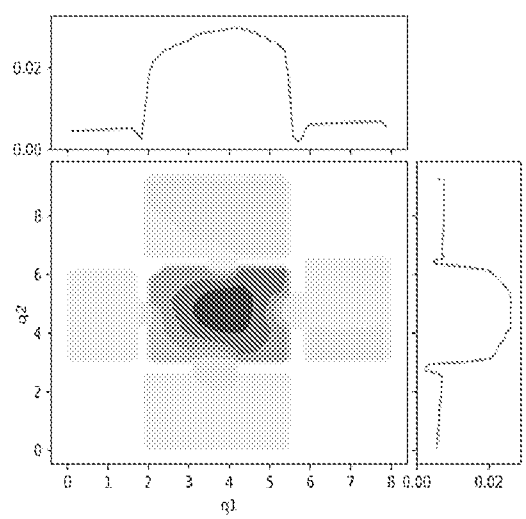
Figure 119A:
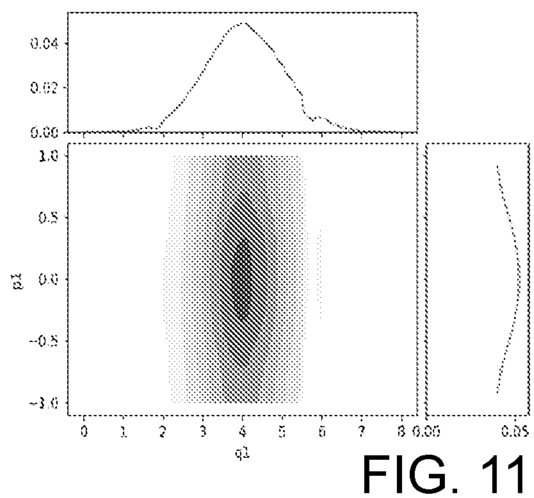
FIGS. 119A-119C illustrate an example of an evolution of a probability density reduced to the $p_1$, $q_1$ space at three different time points, according to some embodiments.
Figure 119B:
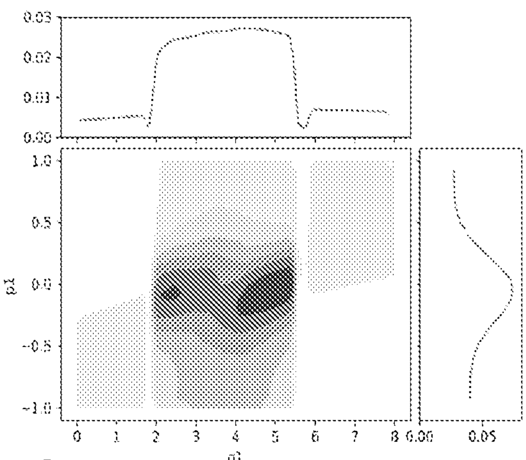
Figure 119C:
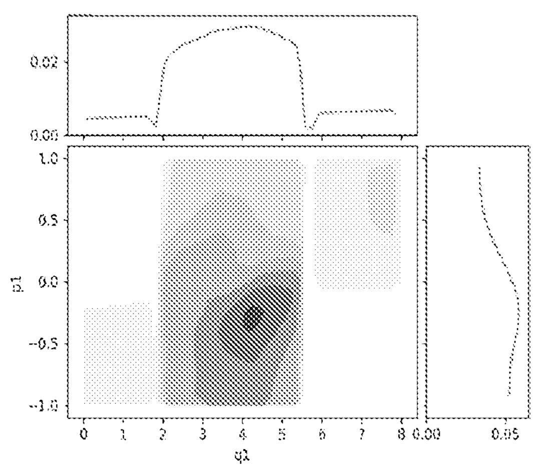
Figure 120A:
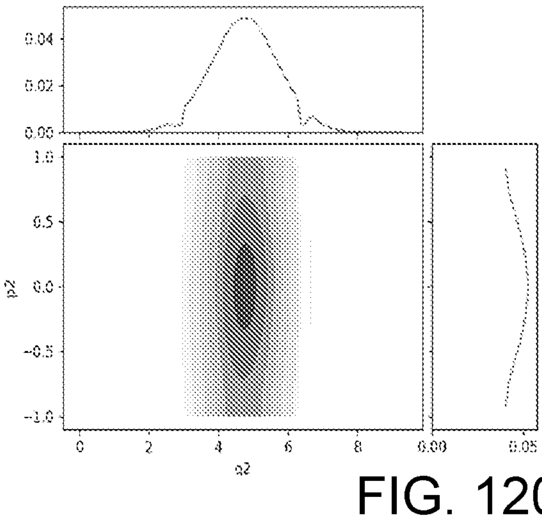
FIGS. 120A-120C illustrate an example of an evolution of a probability density reduced to the $p_2$, $q_2$ space at three different time points, according to some embodiments.
Figure 120B:
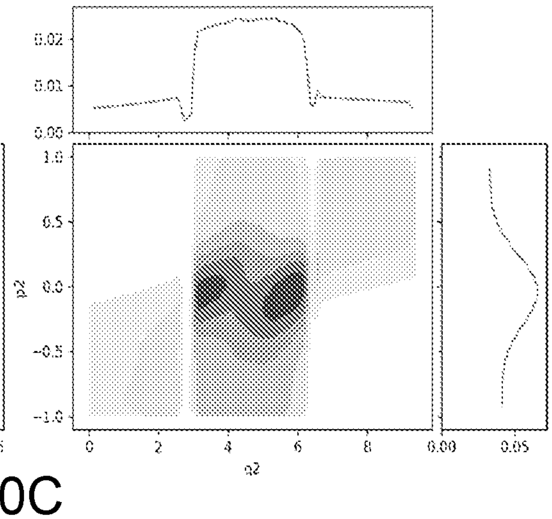
Figure 120C:
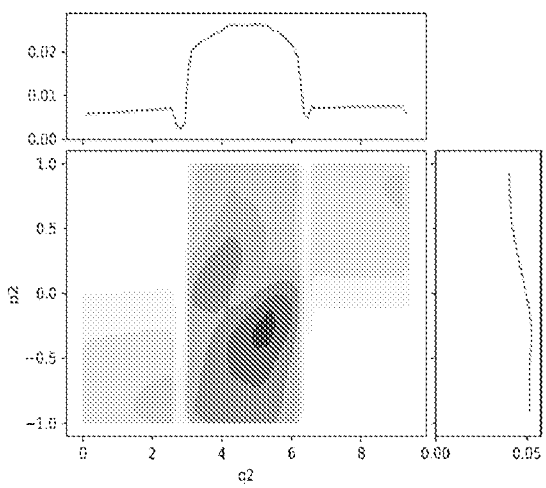
Figure 121:
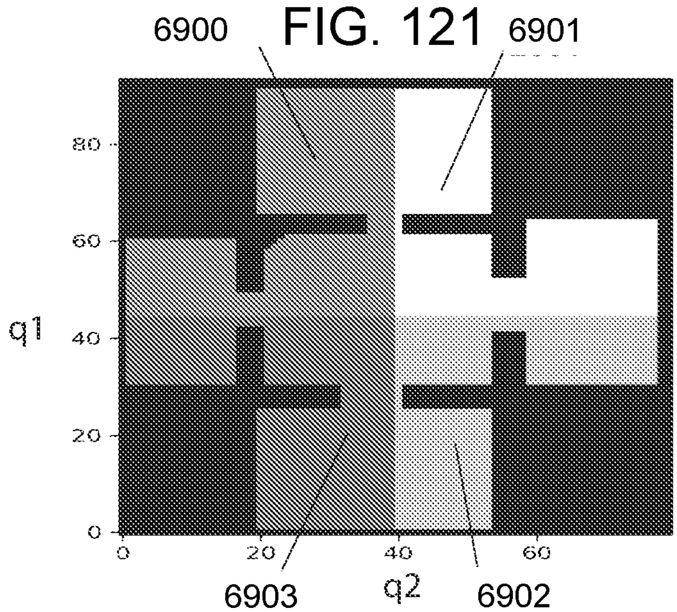
FIG. 121 illustrates an example of a map indicating floor types, according to some embodiments.

$(\gamma M \nabla_p \rho)$ with $M = I_2$ (2D identity matrix), T=0.1, γ=0.1, and $k_B=1$. In alternative embodiments, the processor uses the Fokker-Planck equation without Hamiltonian and velocity and applies velocity drift field directly through odometry which reduces the dimension by a factor of two. The map of the environment for this example is given in FIG. 117, wherein the white space is the area accessible to the robot. The map describes the domain for $q_1, q_2 \in D$. In this example, the velocity is limited to $p_1, p_2 \in [-1, 1]$. The processor models the initial probability density ρ(p, q, 0) as Gaussian, wherein ρ is a four-dimensional function. FIGS. 118A-118C illustrate the evolution of ρ reduced to the $q_1, q_2$ space at three different time points (i.e., the density integrated over $p_i$, $p_2$, $\rho_{red} = \iint \rho(p_1, p_2, q_1, q_2) dp_1 dp_2$). With increased time, the initial density focused in the middle of the map starts to flow into other rooms. FIGS. 119A-119C illustrate the evolution of ρ reduced to the $p_1, q_1$ space and 120A-120C illustrate the evolution of ρ reduced to the $p_2, q_2$ space at the same three different time points to show how velocity evolves over time with position. The four-dimensional example is repeated but with the addition of floor sensor data observations. FIG. 121 illustrates a map of the environment indicating different floor types 6900, 6901, 6902, and 6903 with respect to $q_1, q_2$. Given that the sensor has no error, the processor may strongly predict the area within which the robot is located based on the measured floor type, at which point all other hypothesized locations of the robot become invalid. For example, the processor may use the distribution $m(p_1, p_2, q_1, q_2)=$ $$\begin{cases} \text{const} > 0, & q_1, q_2 \text{ with the observed floor type} \\ 0, & \text{else} \end{cases}.$$

Figure 122:
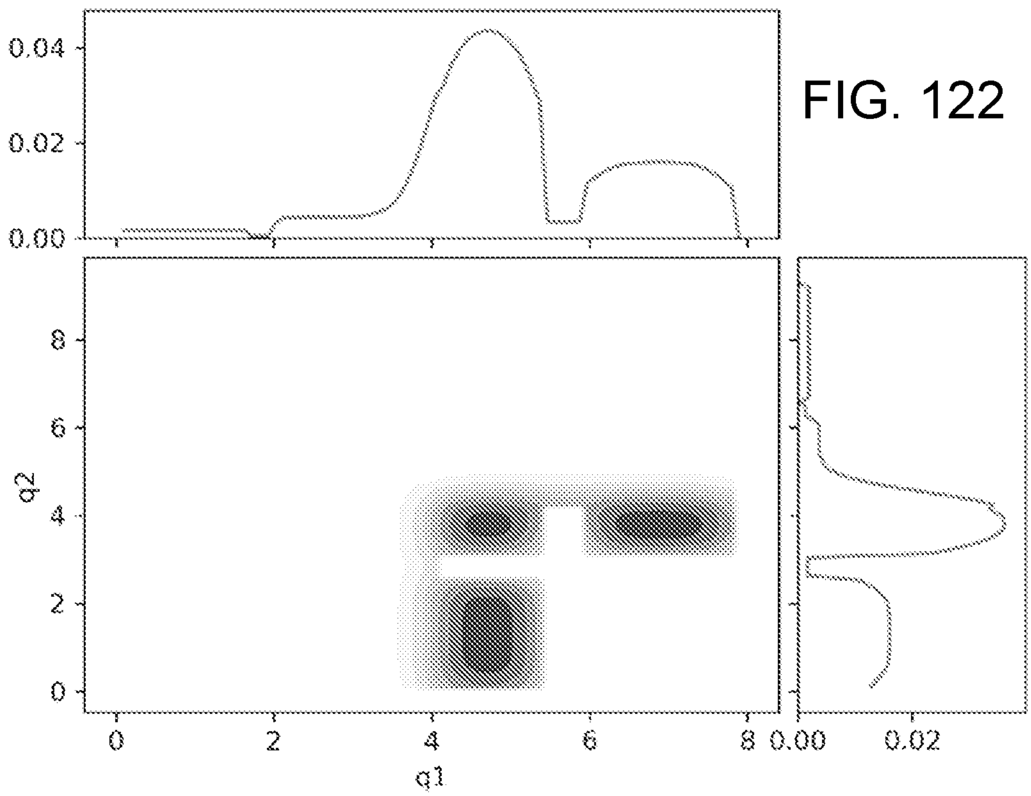
FIG. 122 illustrates an example of an updated probability density after observing floor type, according to some embodiments.
Figure 123:
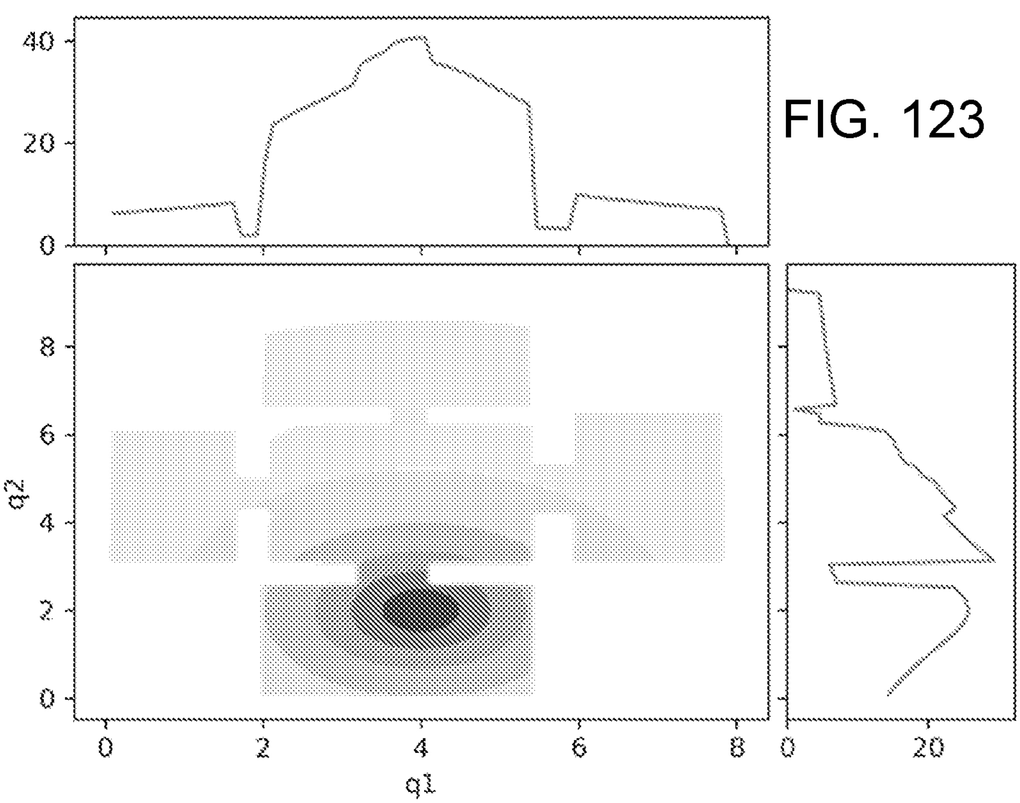
FIG. 123 illustrates an example of a Wi-Fi map, according to some embodiments.
Figure 124:
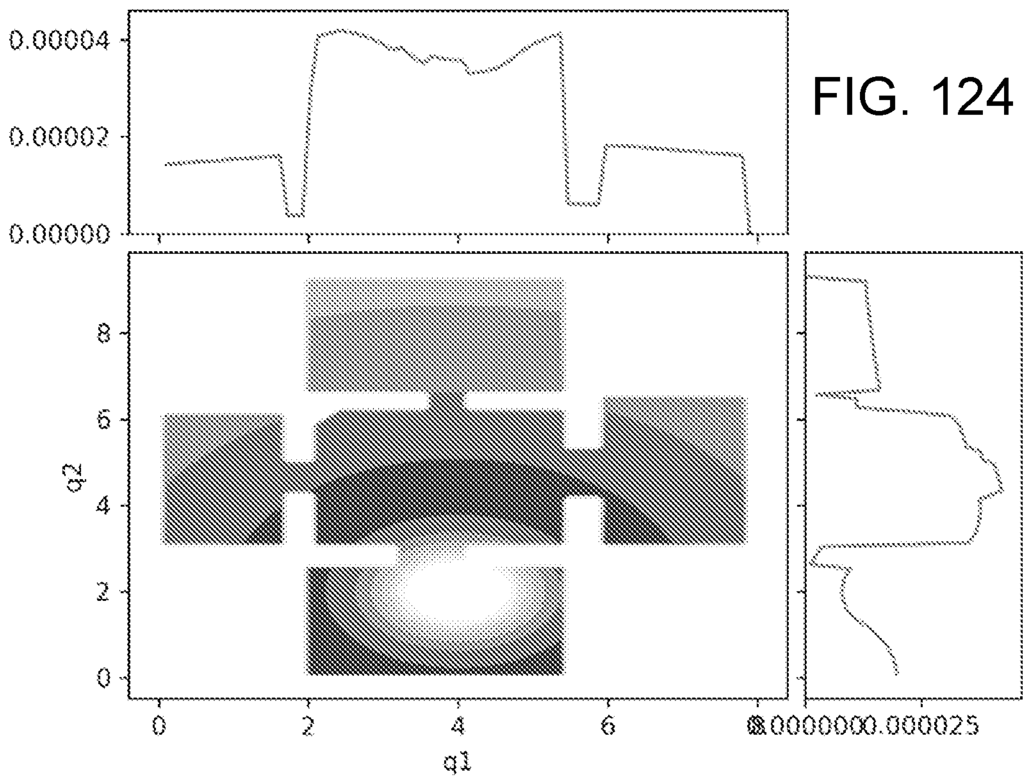
FIG. 124 illustrates an example of an updated probability density after observing Wi-Fi strength, according to some embodiments.
Figure 125:
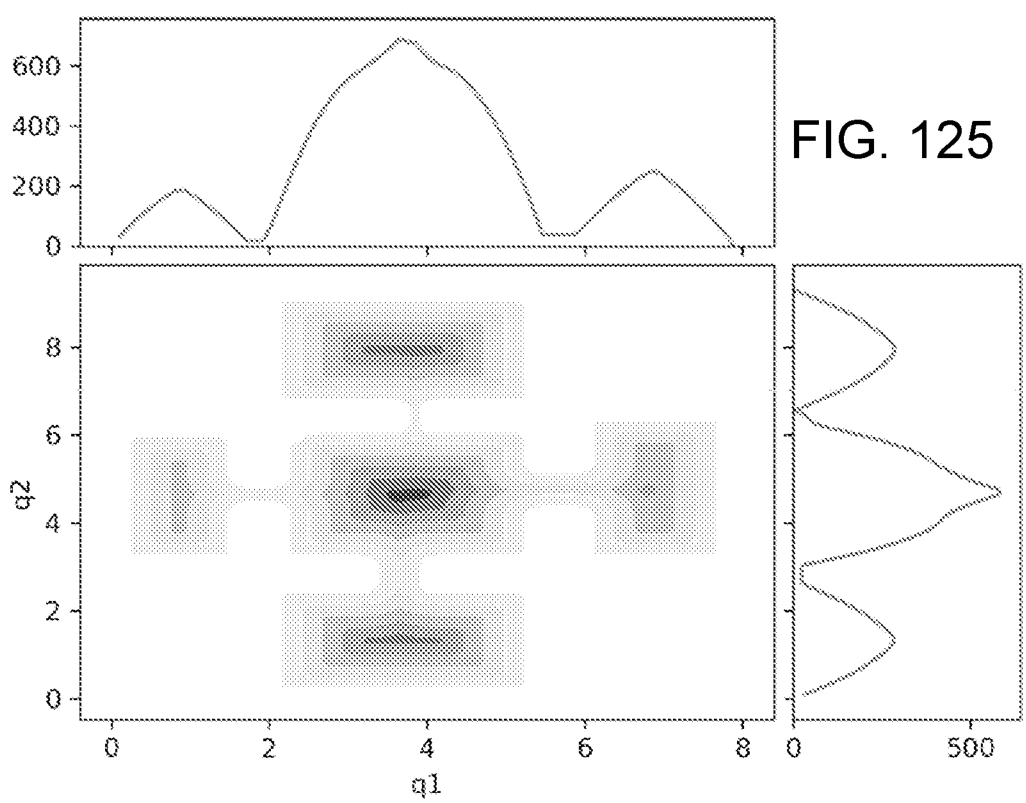
FIG. 125 illustrates an example of a wall distance map, according to some embodiments.
Figure 126:
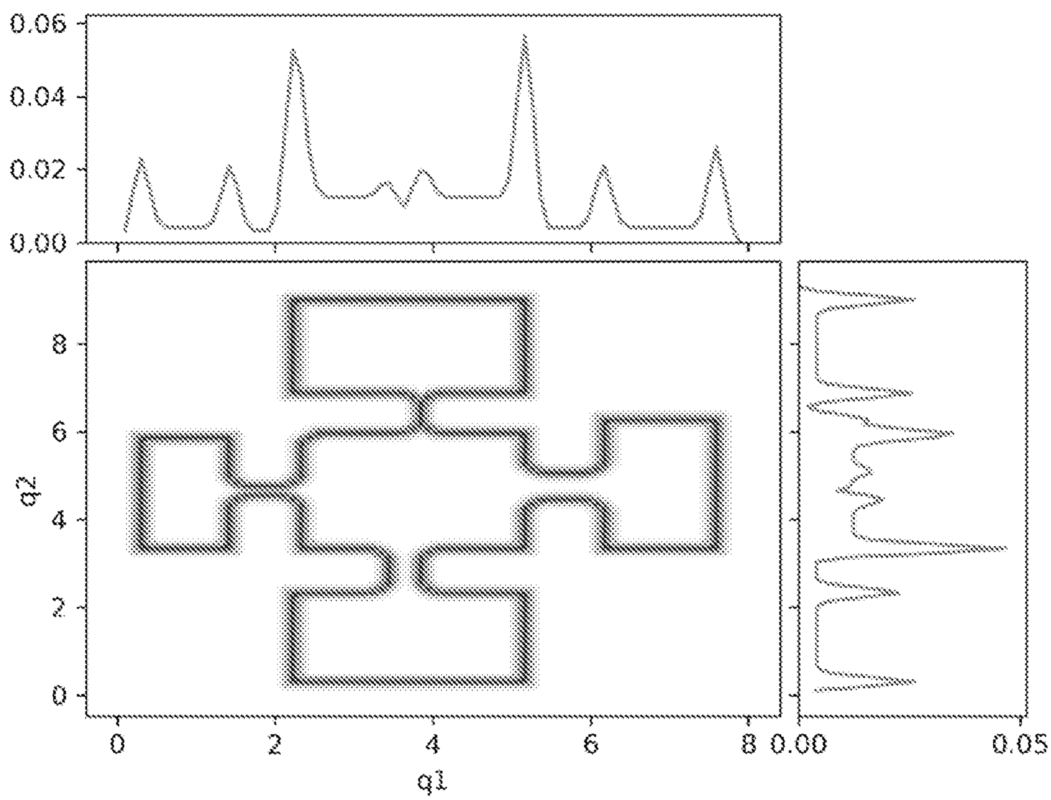
FIG. 126 illustrates an example of an updated probability density after observing distances to a wall, according to some embodiments.

If the sensor has an average error rate ∈, the processor may use the distribution $m(p_1, p_2, q_1, q_2)=$ $$\begin{cases} c_1 > 0, & q_1, q_2 \text{ with the observed floor type} \\ c_2 > 0, & \text{else} \end{cases}$$

with $c_1$, $c_2$ chosen such that $\int_p \int_{D_{obs}} md(q_1, q_2) d(p_1, p_2) = 1 - \epsilon$ and $\int_p \int_{D_{obs}^c} md(q_1, q_2) d(p_1, p_2) = \epsilon$. $D_{obs}$ is the $q_1, q_2$ with the observed floor type and $D_{obs}^c$ is its complement. By construction, the distribution m has a probability $1-\epsilon$ for $q_1, q_2 \in D_{obs}$ and probability ∈ for $q_1, q_2 \in D_{obs}^c$. Given that the floor sensor measures floor type 5302, the processor updates the probability distribution for position as shown in FIG. 122. Note that the corners of the distribution were smoothened by the processor using a Gaussian kernel, which corresponds to an increased error rate near the borders of an area. Next, Wi-Fi signal strength observations are considered. Given a map of the expected signal strength, such as that in FIG. 123, the processor may generate a density describing the possible location of the robot based on a measured Wi-Fi signal strength. The darker areas in FIG. 123 represent stronger Wi-Fi signal strength and the signal source is at $q_1$, $q_2$=4.0, 2.0. Given that the robot measures a Wi-Fi signal strength of 0.4, the processor generates the probability distribution for position shown in FIG. 124. The likely area of the robot is larger since the Wi-Fi signal does not vary much. A wall distance map, such as that shown in FIG. 125 may be used by the processor to approximate the area of the robot given a distance measured. Given that the robot measures a distance of three distance units, the processor generates the probability distribution for position shown in FIG. 126. For example, the processor evolves the Fokker-Planck equation over time and as observations are successively taken, the processor re-weights the density function with each observation wherein parts that do not match the observation are considered less likely and parts that highly match the observations relatively increase in probability. An example of observations over time may be, t=1: observe $p_2$=0.75; t=2: observe $p_2$=0.95 and Wi-Fi signal strength 0.56; t=3: observe wall distance 9.2; t=4: observe floor type 2; t=5: observe floor type 2 and Wi-Fi signal strength 0.28; t=6: observe wall distance 3.5; t=7: observe floor type 4, wall distance 2.5, and Wi-Fi signal strength 0.15; t=8: observe floor type 4, wall distance 4, and Wi-Fi signal strength 0.19; t=8.2: observe floor type 4, wall distance 4, and Wi-Fi signal strength 0.19.

Figure 127:
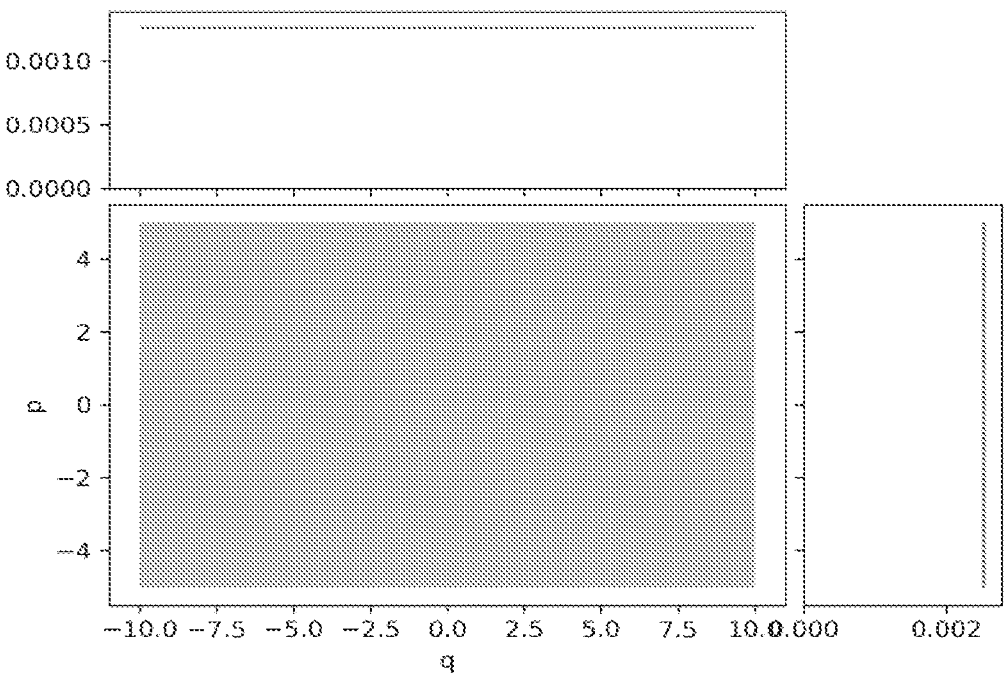
FIGS. 127-130 illustrate an example of an evolution of a probability density of a position of a robotic device as it moves and observes doors, according to some embodiments.
Figure 128:
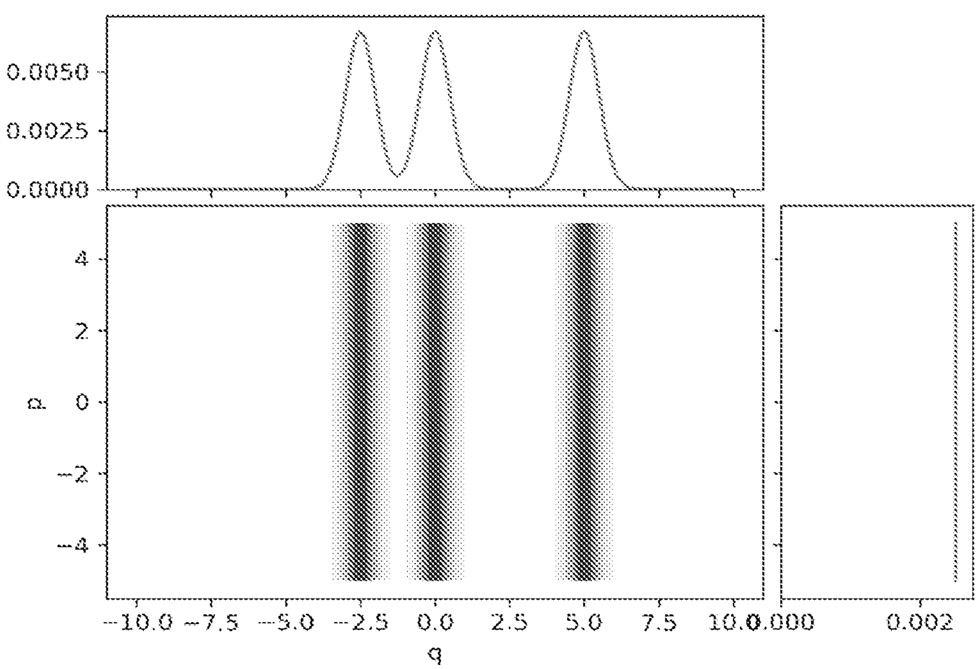
Figure 129:
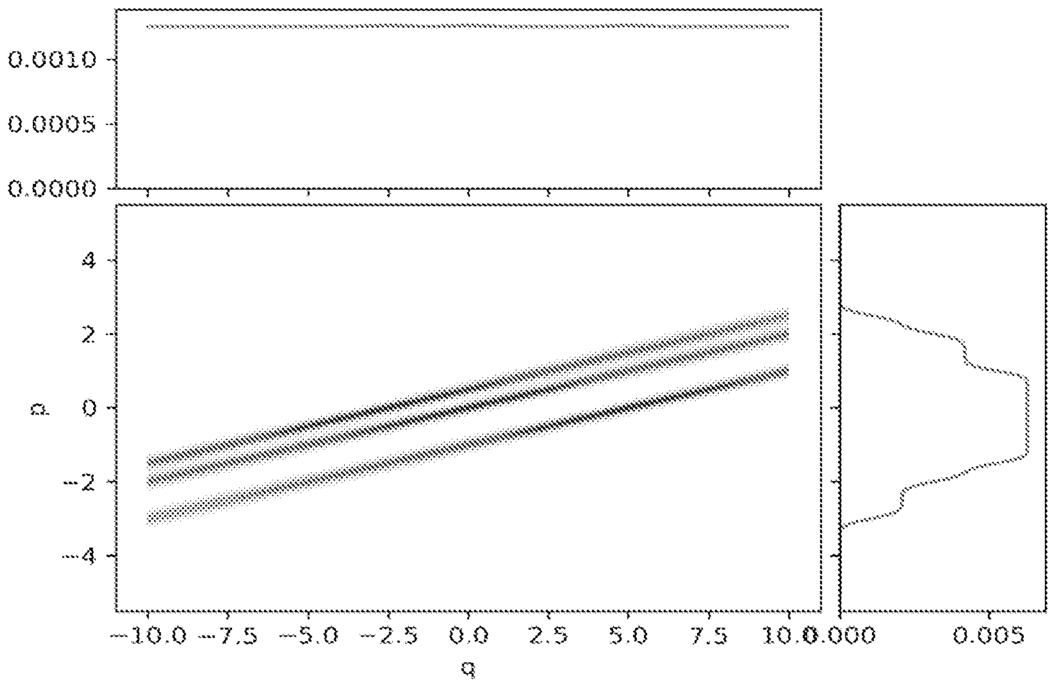
Figure 130:
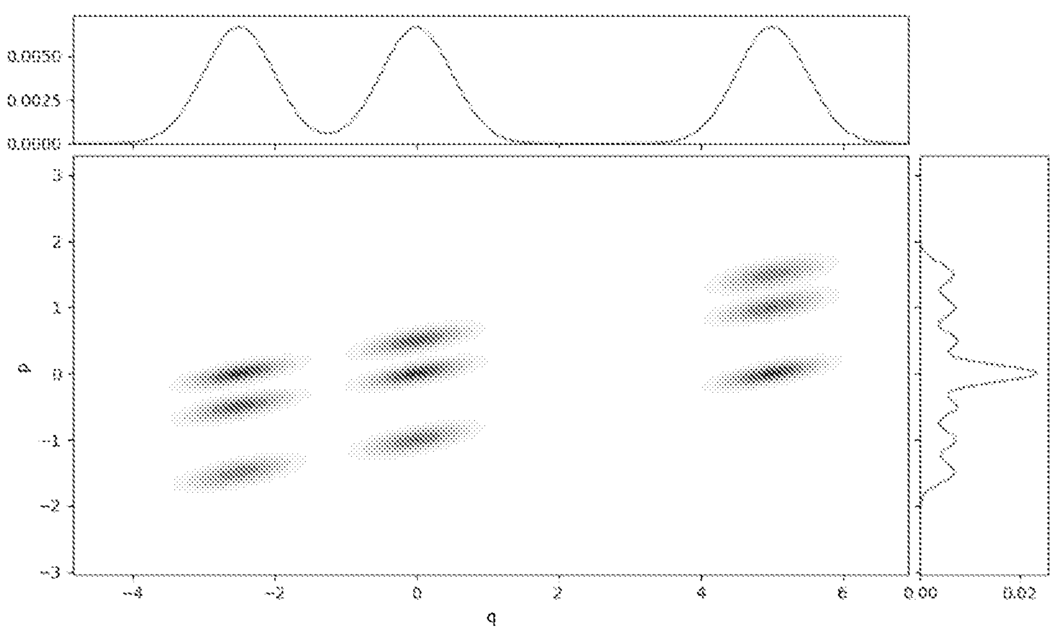

In another example, the robot navigates along a long floor (e.g., x-axis, one-dimensional). The processor models the floor using Liouville's equation $$\frac{\partial \rho}{\partial t} = -\{\rho, H\}$$

with Hamiltonian $$H = \frac{1}{2}p^2$$

wherein q∈[−10, 10] and p∈[−5, 5]. The floor has three doors at $q_0$=−2.5, $q_1$=0, and $q_2$=5.0 and the processor of the robot is capable of determining when it is located at a door based on sensor data observed and the momentum of the robot is constant, but unknown. Initially the location of the robot is unknown, therefore the processor generates an initial state density such as that in FIG. 127. When the processor determines the robot is in front of a door, the possible location of the robot is narrowed down, but not the momentum. Therefore, the processor may update the probability density to that shown in FIG. 128. The processor evolves the probability density, and after five seconds the probability is as shown in FIG. 129, wherein the uncertainty in the position space has spread out again given that the momentum is unknown. However, the evolved probability density keeps track of the correlation between position and momentum. When the processor determines the robot is in front of a door again, the probability density is updated to FIG. 130, wherein the density has significantly narrowed down, indicating a number of peaks representing possible location and momentum combinations of the robot. For the left door, there is equal likelihood for p=0, p=−0.5, and p=−1.5. These momentum values correspond with the robot travelling from one of the three doors in five seconds. This is seen for the other two doors as well.

In some embodiments, the processor may model motion of the robot using equations $\dot{x}$=v cos ω, $\dot{y}$=v sin ω, and $\dot{\theta}$=ω, wherein v and ω are translational and rotational velocities, respectively. In some embodiments, translational and rotational velocities of the robot may be computed using observed wheel angular velocities $\omega_l$ and $\omega_r$ using $$\begin{pmatrix} v \\ \omega \end{pmatrix} = J\begin{pmatrix} \omega_l \\ \omega_r \end{pmatrix} = \begin{pmatrix} r_l/2 & r_r/2 \\ -r_l/b & r_r/b \end{pmatrix},$$

wherein J is the Jacobian, $r_1$ and $r_r$ are the left and right wheel radii, respectively and b is the distance between the two wheels. Assuming there are stochastic forces on the wheel velocities, the processor of the robot may evolve the probability density $$\rho = (x,\ y,\ \theta,\ \omega_l,\ \omega_r) \text{ using } \frac{\partial \rho}{\partial t} = -\begin{pmatrix} v\cos\theta \\ v\cos\theta \\ \omega \end{pmatrix} \cdot \nabla_q \rho + \nabla_p \cdot (D \nabla_p \rho)$$

wherein $$D = \frac{1}{2}\sigma_N \sigma_N^T$$

is a 2-by-2 diffusion tensor, q=(x, y, θ) and p=($\omega_l$, $\omega_r$). In some embodiments, the domain may be obtained by choosing x, y in the map of the environment, θ∈[0, 2π), and $\omega_l$, $\omega_r$ as per the robot specifications. In some embodiments, solving the equation may be a challenge given it is five-dimensional. In some embodiments, the model may be reduced by replacing odometry by Gaussian density with mean and variance. This reduces the model to a three-dimensional density ρ=(x, y, θ). In some embodiments, independent equations may be formed for $\omega_l$, $\omega_r$ by using odometry and inertial measurement unit observations. For example, taking this approach may reduce the system to one three-dimensional partial differential equation and two ordinary differential equations. The processor may then evolve the probability density over time using $$\frac{\partial \rho}{\partial t} = -\begin{pmatrix} \overline{v}\cos\theta \\ \overline{v}\cos\theta \\ \overline{\omega} \end{pmatrix} \cdot \nabla \rho + \nabla \cdot (D \nabla \rho),\ t > 0$$

wherein $$D = \begin{pmatrix} dv^2\cos^2\theta & dv^2\sin\theta\cos\theta & 0 \\ dv^2\sin\theta\cos\theta & dv^2\sin^2\theta & 0 \\ 0 & 0 & d\omega^2 \end{pmatrix},$$

$\overline{v}$, $\overline{\omega}$ represent the current mean velocities, and dv, dω the current deviation. In some embodiments, the processor may determine $\overline{v}$, $\overline{\omega}$ from the mean and deviation of the left and right wheel velocities $\omega_L$ and $\omega_R$ using $$\begin{pmatrix} \overline{v} \\ \overline{\omega} \end{pmatrix} = J\begin{pmatrix} \overline{\omega}_L \\ \overline{\omega}_R \end{pmatrix}.$$

In some embodiments, the processor may use Neumann perimeters conditions for x, y and periodic perimeters conditions for θ.

Figure 131:
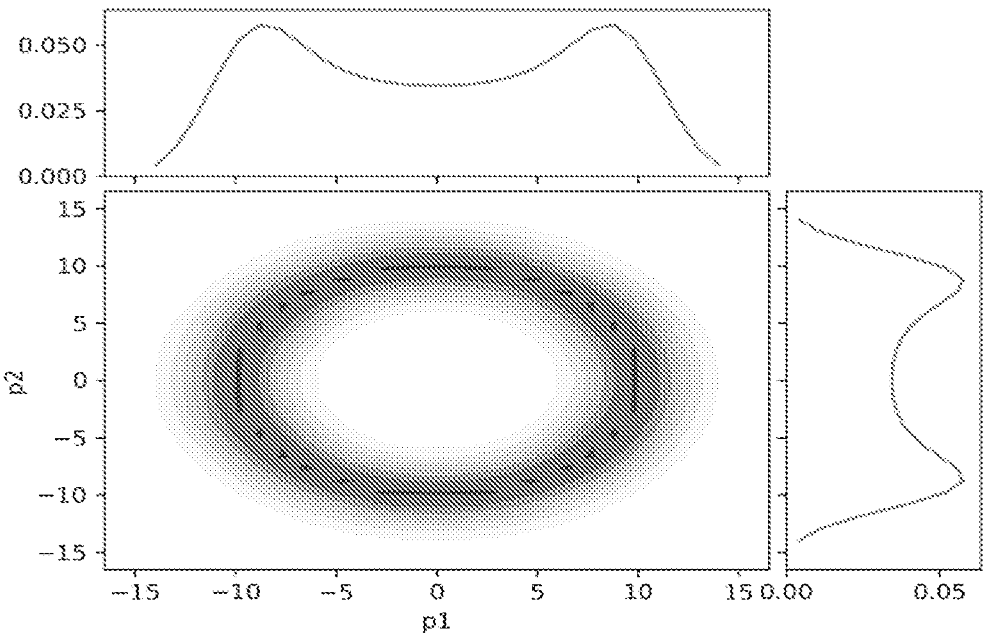
FIG. 131 illustrates an example of a velocity observation probability density, according to some embodiments.
Figure 132:
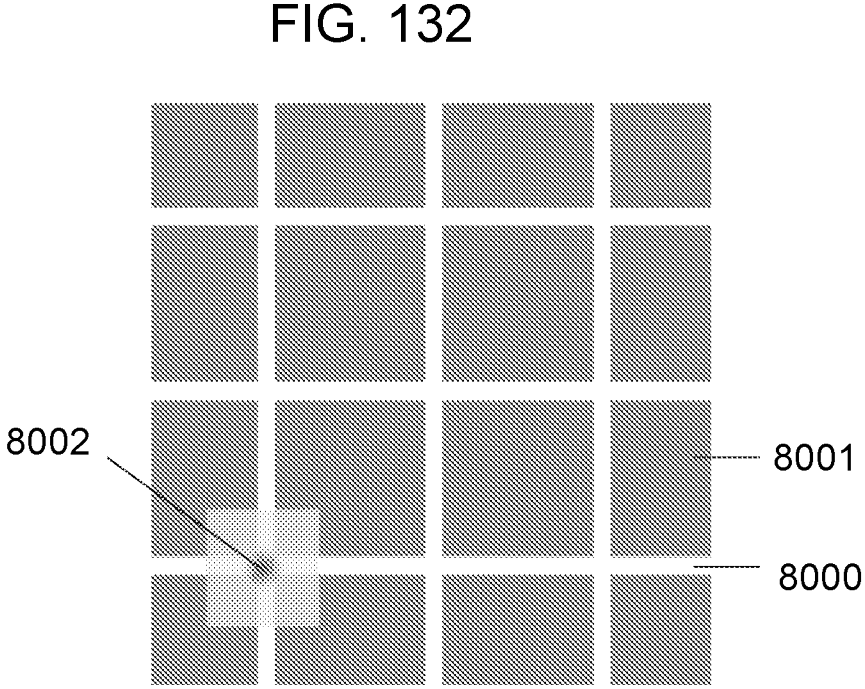
FIG. 132 illustrates an example of a road map, according to some embodiments.

In one example, the processor localizes the robot with position coordinate q=(x, y) and momentum coordinate $p=(p_x, p_y)$. For simplification, the mass of the robot is 1.0, the earth is assumed to be planar, and q is a position with reference to some arbitrary point and distance. Thus, the processor evolves the probability density ρ over time according to $$\frac{\partial \rho}{\partial t} = -p \cdot \nabla_q \rho + \nabla_p \cdot (D \nabla_p \rho),$$

wherein D is as defined above. The processor uses a moving grid, wherein the general location of the robot is only known up to a certain accuracy (e.g., 100 m) and the grid is only applied to the known area. The processor moves the grid along as the probability density evolves over time, centering the grid at the approximate center in the q space of the current probability density every couple time units. Given that momentum is constant over time, the processor uses an interval [−15, 15]×[−15, 15], corresponding to maximum speed of 15 m/s in each spatial direction. The processor uses velocity and GPS position observations to increase accuracy of approximated localization of the robot. Velocity measurements provide no information on position, but provide information on $p_x^2+p_y^2$, the circular probability distribution in the p space, as illustrated in FIG. 131 with |p|=10 and large uncertainty. GPS position measurements provide no direct momentum information but provide a position density. The processor further uses a map to exclude impossible states of the robot. For instance, it is impossible to drive through walls and if the velocity is high there is a higher likelihood that the robot is in specific areas. FIG. 132 illustrates a map used by the processor in this example, wherein white areas 8000 indicate low obstacle density areas and gray areas 8001 indicate high obstacle density areas and the maximum speed in high obstacle density areas is ±5 m/s. Position 8002 is the current probability density collapsed to the $q_1$, $q_2$ space. In combining the map information with the velocity observations, the processor determines that it is highly unlikely that with an odometry measurement of |p|=10 that the robot is in a position with high obstacle density. In some embodiments, other types of information may be used to improve accuracy of localization. For example, a map to correlate position and velocity, distance and probability density of other robots using similar technology, Wi-Fi map to extract position, and video footage to extract position.

In some embodiments, the processor may use finite differences methods (FDM) to numerically approximate partial differential equations of the form $$\frac{\partial \rho}{\partial t} = -\{\rho, H\} + \nabla_p .$$

$(D\nabla_p\rho)$. Numerical approximation may have two components, discretization in space and in time. The finite difference method may rely on discretizing a function on a uniform grid. Derivatives may then be approximated by difference equations. For example, a convection-diffusion equation in one dimension and u(x, t) with velocity v, diffusion coefficient α, $$\frac{\partial u}{\partial t} = a\frac{\partial^2 u}{\partial x^2} - v\frac{\partial u}{\partial x}$$

on a mesh $x_0, \ldots, x_1$, and times $t_0, \ldots, t_N$ may be approximated by a recurrence equation of the form $$\frac{u_j^{n+1} - u_j^n}{k} = a\frac{u_{j+1}^n - 2u_j^n + u_{j-1}^n}{h^2} - v\frac{u_{j+1}^n - u_{j-1}^n}{2h}$$

with space grid size h and time step k and $u_j^n \approx u(x_j, t_n)$. The left hand side of the recurrence equation is a forward difference at time $t_n$, and the right hand side is a second-order central difference and a first-order central difference for the space derivatives at $x_j$, wherein $$\frac{u_j^{n+1} - u_j^n}{k} \approx \frac{\partial u(x_j, t_n)}{\partial t}, \frac{u_{j+1}^n - 2u_j^n + u_{j-1}^n}{h^2} \approx \frac{\partial^2 u(x_j, t_n)}{\partial x^2}, \text{ and}$$

$$\frac{u_{j+1}^n - u_{j-1}^n}{2h} \approx \frac{\partial u(x_j, t_n)}{\partial x}.$$

This is an explicit method, since the processor may obtain the new approximation $u_j^{n+1}$ without solving any equations. This method is known to be stable for $$h < \frac{2a}{v} \text{ and } k < \frac{h^2}{2a}.$$

The stability conditions place limitations on the time step size k which may be a limitation of the explicit method scheme. If instead the processor uses a central difference at time $$t_{n+\frac{1}{2}},$$

the recurrence equation is $$\frac{u_j^{n+1} - u_j^n}{k} = \frac{1}{2}\left(a\frac{u_{j+1}^{n+1} - 2u_j^{n+1} + u_{j-1}^{n+1}}{h^2} - v\frac{u_{j+1}^{n+1} - u_{j-1}^{n+1}}{2h} + a\frac{u_{j+1}^n - 2u_j^n + u_{j-1}^n}{h^2} - v\frac{u_{j+1}^n - u_{j-1}^n}{2h}\right),$$

known as the Crank-Nicolson method. The processor may obtain the new approximation $u_j^{n+1}$ by solving a system of linear equations, thus, the method is implicit and is numerically stable if $$k < \frac{h^2}{a}.$$

In a similar manner, the processor may use a backward difference in time, obtaining a different implicit method $$\frac{u_j^{n+1}-u_j^n}{k}=a\frac{u_{j+1}^{n+1}-2u_j^{n+1}+u_{j-1}^{n+1}}{h^2}-v\frac{u_{j+1}^{n+1}-u_{j-1}^{n+1}}{2h},$$

which is unconditionally stable for a timestep, however, the truncation error may be large. While both implicit methods are less restrictive in terms of timestep size, they usually require more computational power as they require solving a system of linear equations at each timestep. Further, since the difference equations are based on a uniform grid, the FDM places limitations on the shape of the domain.

In some embodiments, the processor may use finite element methods (FEM) to numerically approximate partial differential equations of the form $$\frac{\partial \rho}{\partial t}=-\{\rho, H\}+\nabla_p\cdot$$

$(D\nabla_p\rho)$. In general, the finite element method formulation of the problem results in a system of algebraic equations. This yields approximate values of the unknowns at discrete number of points over the domain. To solve the problem, it subdivides a large problem into smaller, simpler parts that are called finite elements. The simple equations that model these finite elements are then assembled into a larger system of equations that model the entire problem. The method may involve constructing a mesh or triangulation of the domain, finding a weak formulation of the partial differential equation (i.e., integration by parts and Green's identity), and deciding for solution space (e.g., piecewise linear on mesh elements). This leads to a discretized version in form of a linear equation. Some advantages over FDM includes complicated geometries, more choice in approximation leads, and, in general, a higher quality of approximation. For example, the processor may use the partial differential equation $$\frac{\partial \rho}{\partial t}=L\rho,$$

with differential operator, e.g., $L=-\{(\cdot, H\}+\nabla_p\cdot(D\nabla_p)$. The processor may discretize the abstract equation in space (e.g., by FEM or FDM)

$$\frac{\partial \bar{\rho}}{\partial t}=\bar{L}\bar{\rho},$$

$\overline{L\rho}$, wherein $\bar{\rho}$, $\bar{L}$ are the projections of ρ, L on the discretized space. The processor may discretize the equation in time using a numerical time integrator (e.g., Crank-Nicolson)

$$\frac{\rho^{-n+1}-\rho^{-n}}{h}=\frac{1}{2}\left(\bar{L}\bar{\rho}^{-n+1}+\bar{L}\bar{\rho}^{-n}\right),$$

leading to the equation $$\left(I-\frac{h}{2}\bar{L}\right)\bar{\rho}^{-n+1}=\left(I+\frac{h}{2}\bar{L}\right)\bar{\rho}^{-n},$$

which the processor may solve. In a fully discretized system, this is a linear equation. Depending on the space and discretization, this will be a banded, sparse matrix. In some embodiments, the processor may employ alternating direction implicit (ADI) splitting to ease the solving process. In FEM, the processor may discretize the space using a mesh, construct a weak formulation involving a test space, and solve its variational form. In FDM, the processor may discretize the derivatives using differences on a lattice grid of the domain. In some instances, the processor may implement FEM/FDM with backward differential formulation (BDF)/Radau (Marlis recommendation), for example mesh generation then construct and solve variational problem with backwards Euler. In other instances, the processor may implement FDM with ADI, resulting in a banded, tri-diagonal, symmetric, linear system. The processor may use an upwind scheme if Peclet number (i.e., ratio advection to diffusion) is larger than 2 or smaller than −2.

Perimeter conditions may be essential in solving the partial differential equations. Perimeter conditions are a set of constraints that determine what happens at the perimeters of the domain while the partial differential equation describe the behaviour within the domain. In some embodiments, the processor may use one or more the following perimeters conditions: reflecting, zero-flux (i.e., homogenous Neumann perimeters conditions)

$$\frac{\partial \rho}{\partial \vec{n}}=0$$

for p, q∈∂D, $\vec{n}$ unit normal vector on perimeters; absorbing perimeter conditions (i.e., homogenous Dirichlet perimeters conditions) ρ=0 for p, q∈∂D; and constant concentration perimeter conditions (i.e., Dirichlet) $\rho=\rho_0$ for p, q∈∂D. To integrate the perimeter conditions into FDM, the processor modifies the difference equations on the perimeters, and when using FEM, they become part of the weak form (i.e., integration by parts) or are integrated in the solution space. In some embodiments, the processor may use Fenics for an efficient solution to partial differential equations.

In some embodiments, the processor may use quantum mechanics to localize the robot. In some embodiments, the processor of the robot may determine a probability density over all possible states of the robot using a complex-valued wave function for a single-particle system $\Psi(\vec{r}, t)$, wherein $\vec{r}$ may be a vector of space coordinates. In some embodiments, the wave function $\Psi(\vec{r}, t)$ may be proportional to the probability density that the particle will be found at a position $\vec{r}$, i.e. $\rho(\vec{r}, t)=|\Psi(\vec{r}, t)|^2$. In some embodiments, the processor of the robot may normalize the wave function which is equal to the total probability of finding the particle, or in this case the robot, somewhere. The total probability of finding the robot somewhere may add up to unity $\int|\Psi(\vec{r}, t)|^2 dr=1$. In some embodiments, the processor of the robot may apply Fourier transform to the wave function $\Psi(\vec{r}, t)$ to yield the wave function $\Phi(\vec{p}, t)$ in the momentum space, with associated momentum probability distribution $\sigma(\vec{p}, t)=\Phi|(\vec{p}, t)|^2$. In some embodiments, the processor may evolve the wave function $\Psi(\vec{r}, t)$ using Schrödinger equation $$i\hbar\frac{\partial}{\partial t}\Psi(\vec{r},t)=\left[-\frac{\hbar^2}{2m}\nabla^2+V(\vec{r})\right]\Psi(\vec{r},t),$$

wherein the bracketed object is the Hamilton operator $$\hat{H}=-\frac{\hbar^2}{2m}\nabla^2+V(\vec{r}),$$

i is the imaginary unit, $\hbar$ is the reduced Planck constant, $\nabla^2$ is the Laplacian, and $V(\vec{r})$ is the potential. An operator is a generalization of the concept of a function and transforms one function into another function. For example, the momentum operator $\hat{p}=-i\hbar\nabla$ explaining why $$-\frac{\hbar^2}{2m}\nabla^2$$

corresponds to kinetic energy. The Hamilton function $$H=\frac{p^2}{2m}+V(\vec{r})$$

has corresponding Hamilton operator $$\hat{H}=-\frac{\hbar^2}{2m}\nabla^2+V(\vec{r}).$$

For conservative systems (constant energy), the time-dependent factor may be separated from the wave function (e.g., $$\Psi(\vec{r},t)=\Phi(\vec{r})e^{-\frac{iEt}{\hbar}},$$

giving the time-independent Schrodinger equation $$\left[-\frac{\hbar^2}{2m}\nabla^2+V(\vec{r})\right]\Phi(\vec{r})=E\Phi(\vec{r}),$$

or otherwise $\hat{H}\Phi=E\Phi$, an eigenvalue equation with eigenfunctions and eigenvalues. The eigenvalue equation may provide a basis given by the eigenfunctions $\{\varphi\}$ of the Hamiltonian. Therefore, in some embodiments, the wave function may be given by $\Psi(\vec{r},t)=\Sigma_k c_k(t)\varphi_k(\vec{r})$, corresponding to expressing the wave function in the basis given by energy eigenfunctions. Substituting this equation into the Schrodinger equation $$c_k(t)=c_k(0)e^{-\frac{iE_k t}{\hbar}}$$

is obtained, wherein $E_k$ is the eigen-energy to the eigenfunction $\varphi_k$. For example, the probability of measuring a certain energy $E_k$ at time t may be given by the coefficient of the eigenfunction $$\varphi_k,\ |c_k(t)|^2=\left|c_k(0)e^{-\frac{iE_k t}{\hbar}}\right|^2=|c_k(0)|^2.$$

Thus, the probability for measuring the given energy is constant over time. However, this may only be true for the energy eigenvalues, not for other observables. Instead, the probability of finding the system at a certain position $\rho(\vec{r})=|\Psi(\vec{r},t)|^2$ may be used.

In some embodiments, the wave function may be an element of a complex Hilbert space H, which is a complete inner product space. Every physical property is associated with a linear, Hermitian operator acting on that Hilbert space. A wave function, or quantum state, may be regarded as an abstract vector in a Hilbert space. In some embodiments, $\psi$ may be denoted by the symbol $|\psi\rangle$ (i.e., ket), and correspondingly, the complex conjugate $\phi^*$ may be denoted by $\langle\phi|$ (i.e., bra). The integral over the product of two functions may be analogous to an inner product of abstract vectors, $\int\phi^*\psi d\tau=\langle\phi|\cdot|\psi\rangle\equiv\langle\phi|\psi\rangle$. In some embodiments, $\langle\phi|$ and $|\psi\rangle$ may be state vectors of a system and the processor may determine the probability of finding $\langle\phi|$ in state $|\psi\rangle$ using $p(\langle\phi|,|\psi\rangle)=|\langle\phi|\psi\rangle|^2$. For a Hermitian operator $\hat{A}$ eigenkets and eigenvalues may be denoted $A|n)=a_n|n)$, wherein $|n\rangle$ is the eigenket associated with the eigenvalue $a_n$. For a Hermitian operator, eigenvalues are real numbers, eigenkets corresponding to different eigenvalues are orthogonal, eigenvalues associated with eigenkets are the same as the eigenvalues associated with eigenbras, i.e. $\langle n|A=\langle n|a_n$. For every physical property (energy, position, momentum, angular momentum, etc.) there may exist an associated linear, Hermitian operator $\hat{A}$ (called am observable) which acts on the Hilbert space H. Given A has eigenvalues $a_n$ and eigenvectors $|n\rangle$, and a system in state $|\phi\rangle$, the processor may determine the probability of obtaining $a_n$ as an outcome of a measurement of A using $p(a_n)=|\langle n|\phi\rangle|^2$. In some embodiments, the processor may evolve the time-dependent Schrodinger equation using $$i\hbar\frac{\partial|\psi\rangle}{\partial t}=\hat{H}|\psi\rangle.$$

Given a state $|\phi\rangle$ and a measurement of the observable A, the processor may determine the expectation value of A using $\langle A\rangle=\langle\phi|A|\phi\rangle$, corresponding to $$\langle\rangle=\frac{\int\phi^*\hat{A}\phi d\tau}{\int\phi^*\phi d\tau}$$

for observation operator $\hat{A}$ and wave function $\phi$. In some embodiments, the processor may update the wave function when observing some observable by collapsing the wave function to the eigenfunctions, or eigenspace, corresponding to the observed eigenvalue.

As described above, for localization of the robot, the processor may evolve the wave function $\Psi(\vec{r},t)$ using the Schrödinger equation $$i\hbar\frac{\partial}{\partial t}\Psi(\vec{r},t)=\left[-\frac{\hbar^2}{2m}\nabla^2+V(\vec{r})\right]\Psi(\vec{r},t).$$

In some embodiments, a solution may be written in terms of eigenfunctions $\psi_n$. On with eigenvalues $E_n$ of the time-independent Schrodinger equation $H\psi_n=E_n\psi_n$, wherein $\Psi(\vec{r}, t)=\Sigma_{c_n} c_n e^{-iE_n t/h}\psi_n$ and $c_n=\int\Psi(\vec{r}, 0)\psi_n^* dr$. In some embodiments, the time evolution may be expressed as a time evolution via a unitary operator U(t), $\Psi(\vec{r}, t)=U(t)\Psi(\vec{r}, 0)$ wherein $U(t)=e^{-iHt/h}$ In some embodiments, the probability density of the Hilbert space may be updated by the processor of the robot each time an observation or measurement is received by the processor of the robot. For each observation with observation operator A the processor of the robot may perform an eigen-decomposition $A\omega_n=a_n\omega_n$, wherein the eigenvalue corresponds to the observed quantity. In some embodiments, the processor may observe a value a with probability $0\le p\le 1$. In some embodiments, wherein the operator has a finite spectrum or a single eigenvalue is observed, the processor of the robot may collapse to the eigenfunction(s) with corresponding probability $\Psi(\vec{r}, t)\to\gamma\Sigma_{n=1}^{N}p(a_n)d_n\omega_n$, wherein $d_n=\int\omega_n^*\Psi dr$, p(a) is the probability of observing value a, and $\gamma$ is a normalization constant. In some embodiments, wherein the operator has continuous spectrum, the summation may be replaced by an integration $\Psi(\vec{r}, t)\to\gamma\int p(a)d_n\omega_n da$, wherein $d_n=\int\omega_n^*\Psi dr$.

For example, consider a robot confined to move within an interval $$\left[-\frac{1}{2}, \frac{1}{2}\right].$$

For simplicity, the processor sets $\hbar=m=1$, and an infinite well potential and the regular kinetic energy term are assumed. The processor solves the time-independent Schrodinger equations, resulting in wave functions $$\psi_n = \begin{cases} \sqrt{2}\sin\left(k_n\left(x-\frac{1}{2}\right)\right)e^{i\omega_n t}, & -\frac{1}{2} < x < \frac{1}{2}, \\ 0, & \text{otherwise} \end{cases}$$

wherein $k_n=n\pi$ and $E_n=\omega_n=n^2\pi^2$. In the momentum space this corresponds to the wave functions $$\phi_n(p, t) = \frac{1}{\sqrt{2\pi}}\int_{-\infty}^{\infty}\psi_n(x, t)e^{-ipx}dx = \frac{1}{\sqrt{\pi}}\frac{n\pi}{n\pi+p}\operatorname{sinc}\left(\frac{1}{2}(n\pi-p)\right).$$

The processor takes suitable functions and computes an expansion in eigenfunctions. Given a vector of coefficients, the processor computes the time evolution of that wave function in eigenbasis. In another example, consider a robot free to move on an x-axis. For simplicity, the processor sets $\hbar=m=1$. The processor solves the time-independent Schrodinger equations, resulting in wave functions, $$\psi_E(x, t) = Ae^{\frac{i(px-Et)}{\hbar}},$$

wherein energy $$E = \frac{\hbar^2k^2}{2m}$$

and momentum $p=\hbar k$. For energy E there are two independent, valid functions with $\pm p$. Given the wave function in the position space, in the momentum space, the corresponding wave functions are $$\phi_E(p, t) = e^{\frac{i(px-Et)}{\hbar}},$$

which are the same as the energy eigenfunctions. For a given initial wave function $\psi(x, 0)$, the processor expands the wave function into momentum/energy eigenfunctions $$\phi(p) = \frac{1}{\sqrt{2\pi\hbar}}\int\psi(x, 0)e^{-\frac{ipx}{\hbar}}dx,$$

then the processor gets time dependence by taking the inverse Fourier resulting in $$\psi(x, t) = \frac{1}{\sqrt{2\pi\hbar}}\int\phi(p)e^{\frac{ipx}{\hbar}}e^{-\frac{iEt}{\hbar}}dp.$$

An example of a common type of initial wave function is a Gaussian wave packet, consisting of a momentum eigenfunctions multiplied by a Gaussian in position space $$\psi(x) = Ae^{-\left(\frac{x}{a}\right)^2}e^{\frac{ip_0x}{\hbar}},$$

wherein $p_0$ is the wave function's average momentum value and a is a rough measure of the width of the packet. In the momentum space, this wave function has the form $$\phi(p) = Be^{-\left(\frac{a(p-p_0)}{2\hbar}\right)^2},$$

which is a Gaussian function of momentum, centered on $p_0$ with approximate width $$\frac{2\hbar}{a}.$$

Figure 133A:
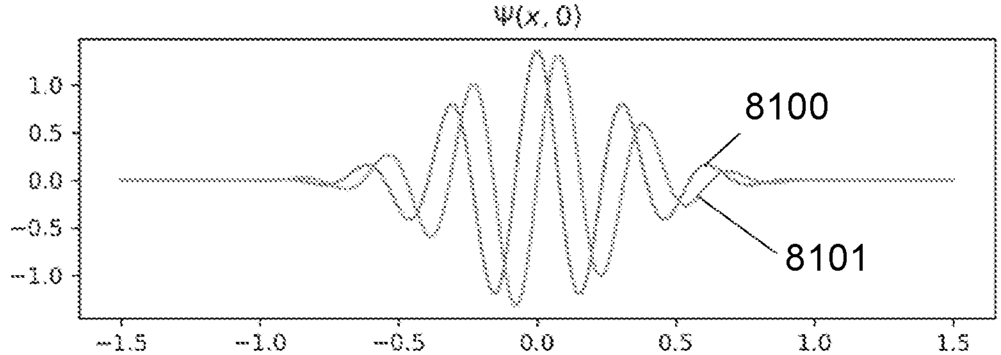
FIGS. 133A-133D illustrate an example of a wave packet, according to some embodiments.
Figure 133B:
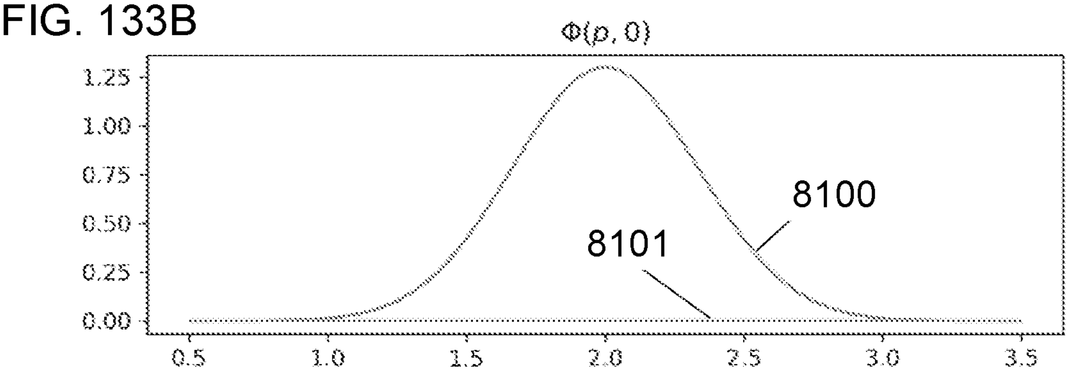
Figure 133C:
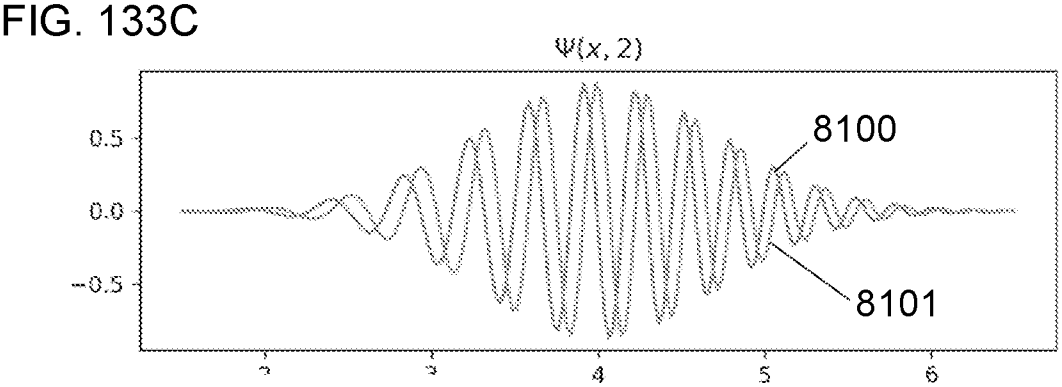
Figure 133D:
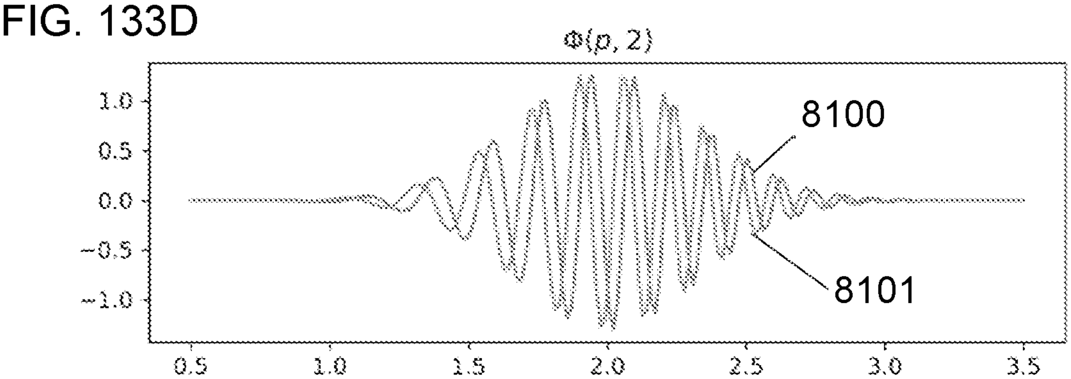

Note Heisenberg's uncertainty principle wherein in the position space width is ~a, and in the momentum space is ~1/a. FIGS. 133A and 133B illustrate an example of a wave packet at a first time point for $\psi(x)$ and $\phi(p)$, respectively, with $x_0$, $p_0=0$, 2, $\hbar=0.1$, m=1, and a=3, wherein 8100 are real parts and 8101 are imaginary parts. As time passes, the peak moves with constant velocity $$\frac{p_0}{m}$$

and the width of the wave packet in the position space increases. This happens because the different momentum components of the packet move with different velocities. In the momentum space, the probability density $|\phi(p, t)|^2$ stays constant over time. See FIGS. 133C and 133D for the same wave packet at time t=2.

Figure 134A:
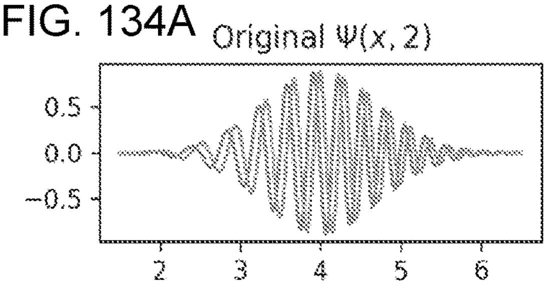
FIGS. 134A-134E illustrate an example of evolution of a wave function in a position and momentum space with observed momentum, according to some embodiments.
Figure 135A:
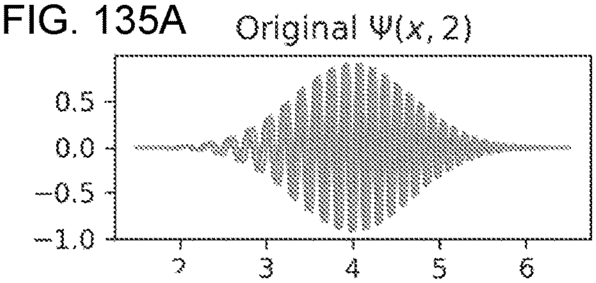
FIGS. 135A-135E illustrate an example of evolution of a wave function in a position and momentum space with observed momentum, according to some embodiments.
Figure 134B:
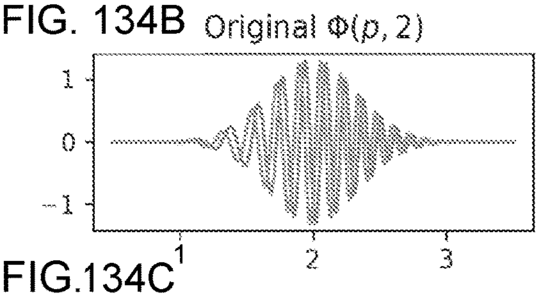
Figure 135B:
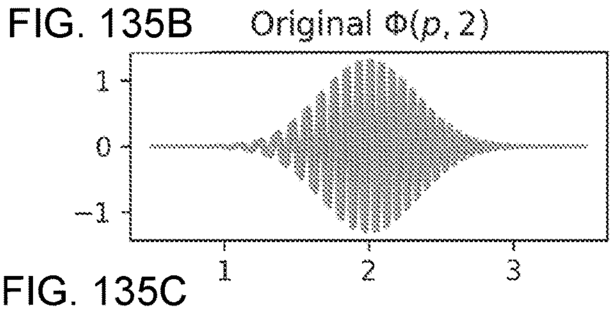
Figure 134C:
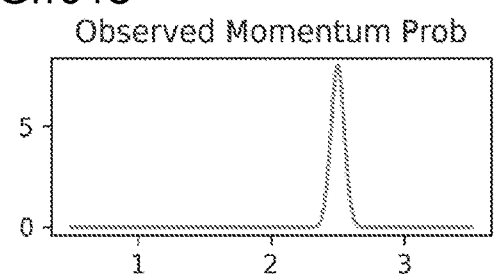
Figure 135C:
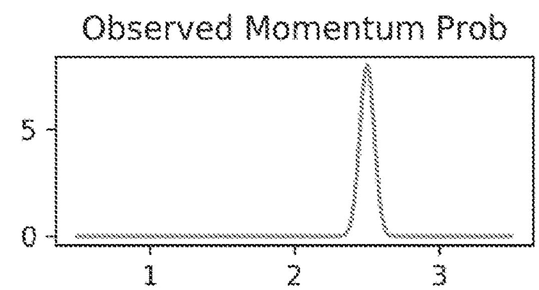
Figure 134D:
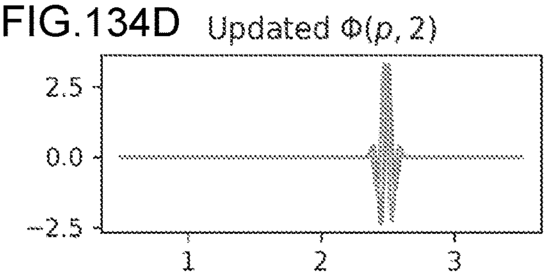
Figure 135D:
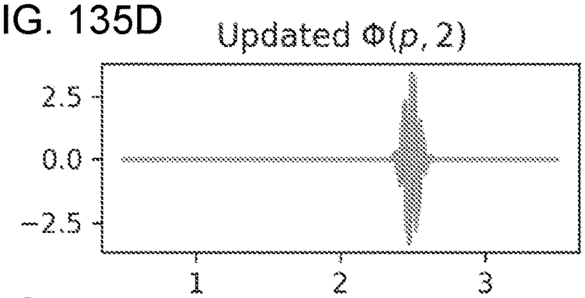
Figure 134E:
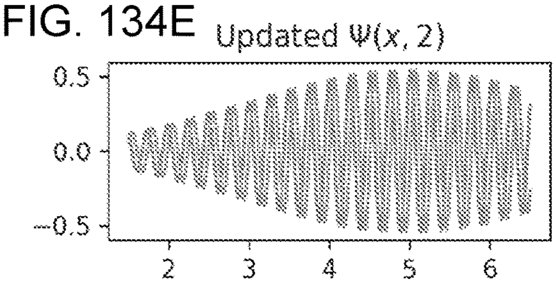
Figure 135E:
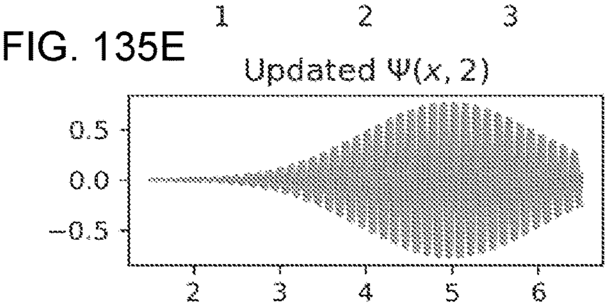
Figure 136A:
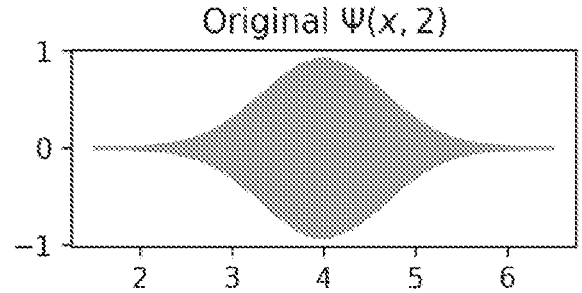
Figure 136B:
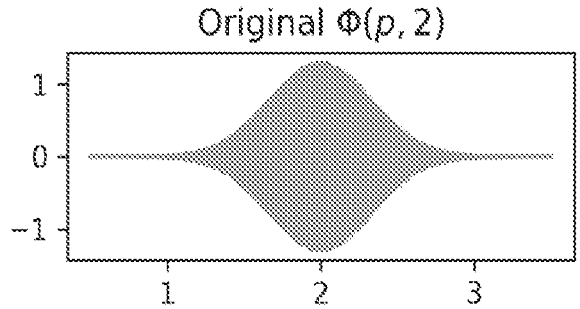
Figure 136C:
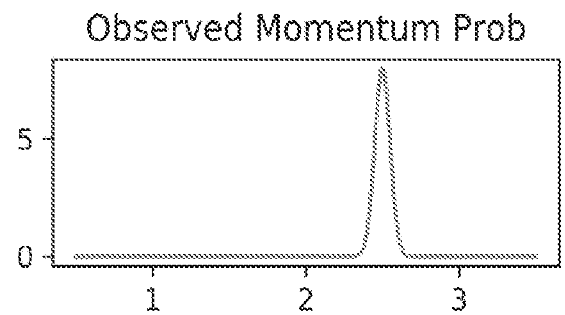
Figure 136D:
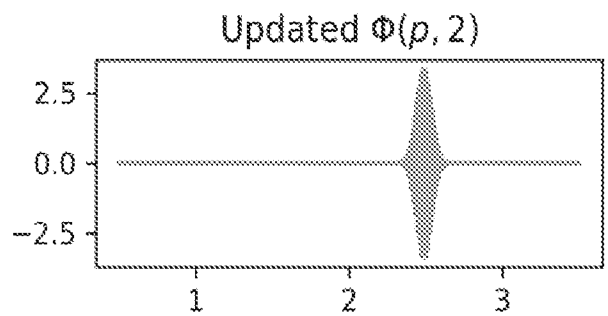
Figure 136E:
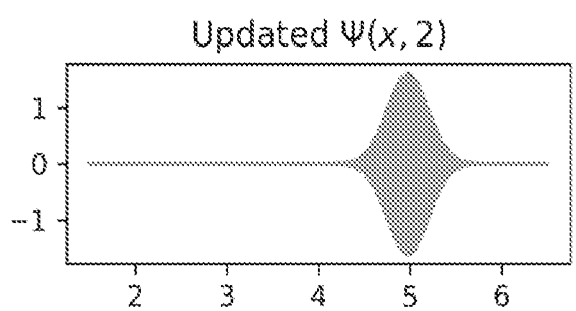
Figure 137A:
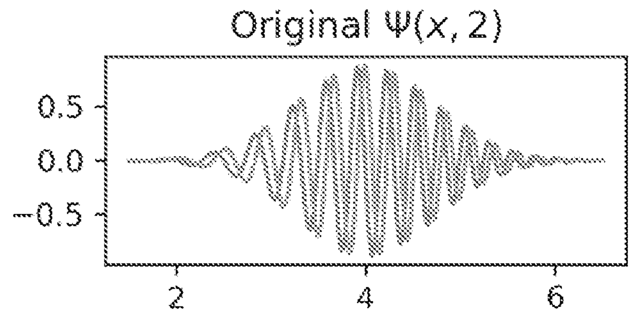
Figure 137B:
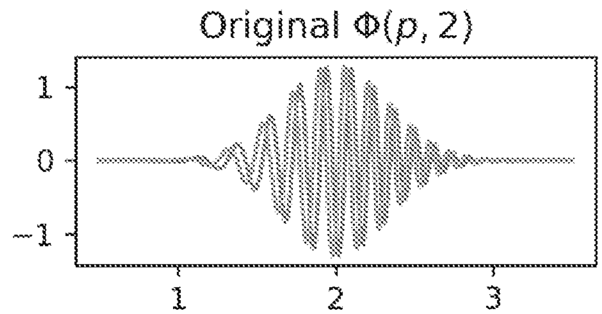
Figure 137C:
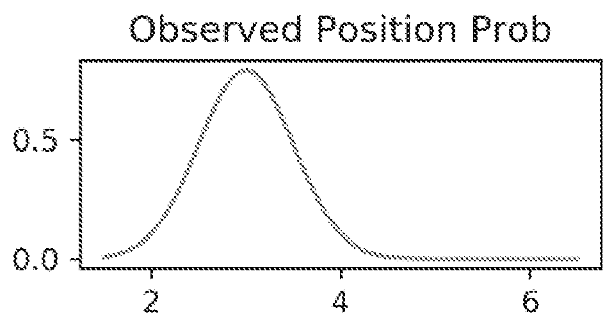
Figure 137D:
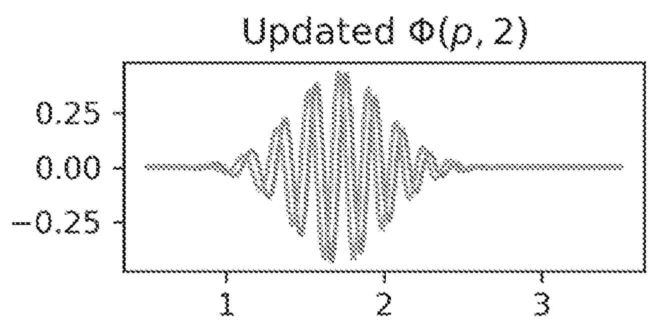
Figure 137E:
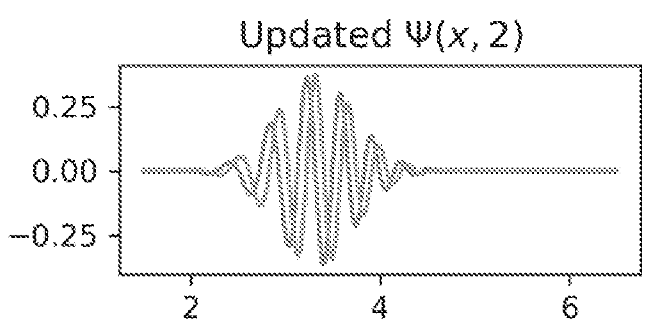

When modeling the robot using quantum physics, and the processor observes some observable, the processor may collapse the wave function to the subspace of the observation. For example, consider the case wherein the processor observes the momentum of a wave packet. The processor expresses the uncertainty of the measurement by a function $f(p)$ (i.e., the probability that the system has momentum p), wherein $f$ is normalized. The probability distribution of momentum in this example is given by a Gaussian distribution centered around $p=2.5$ with $\sigma=0.05$, a strong assumption that the momentum is 2.5. Since the observation operator is the momentum operator, the wave function expressed in terms of the eigenfunctions of the observation operator is $\phi(p, t)$. The processor projects $\phi(p, t)$ into the observation space with probability $f$ by determining $\tilde{\phi}(p, t)=f(p)\phi(p, t)$. The processor normalizes the updated $\tilde{\phi}$ and takes the inverse Fourier transform to obtain the wave function in the position space. FIGS. 134A, 134B, 134C, 134D, and 134E illustrate the initial wave function in the position space $\psi(x)$, the initial wave function in the momentum space $\phi(p)$, the observation density in the momentum space, the updated wave function in the momentum space $\tilde{\phi}(p, t)$ after the observation, and the wave function in the position space $\psi(x)$ after observing the momentum, respectively, at time $t=2$, with $x_0, p_0=0, 2, \hbar=0.1, m=1$, and $a=3$. Note that in each figure the darker plots are the real parts while the lighter plots are the imaginary parts. The resulting wave function in the position space (FIG. 134D) may be unexpected after observing a very narrow momentum density (FIG. 134C) as it concludes that the position must have spread further out from the original wave function in the position space (FIG. 134A). This effect may be due to Heisenberg's uncertainty principle. With decreasing $\hbar$ this effect diminishes, as can be seen in FIGS. 135A-135E and FIGS. 136A-136E, illustrating the same as FIGS. 134A-134E but with $\hbar=0.05$ and $\hbar=0.001$, respectively. Similar to observing momentum, position may also be observed and incorporated as illustrated in FIGS. 137A-137E which illustrate the initial wave function in the position space $\psi(x)$, the initial wave function in the momentum space $\psi(p)$, the observation density in the position space, the updated wave function in the momentum space $\tilde{\phi}(x, t)$ after the observation, and the wave function in the position space $\psi(p)$ after observing the position, respectively, at time $t=2$, with $x_0, p_0=0, 2, \hbar=0.1, m=1$, and $a=3$.

Figure 138A:
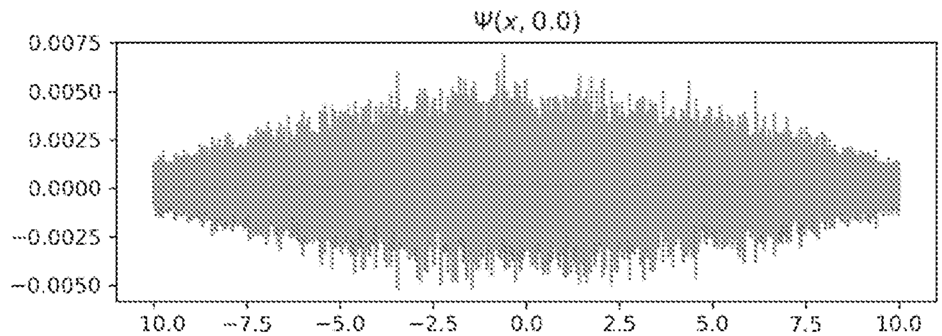
Figure 138B:
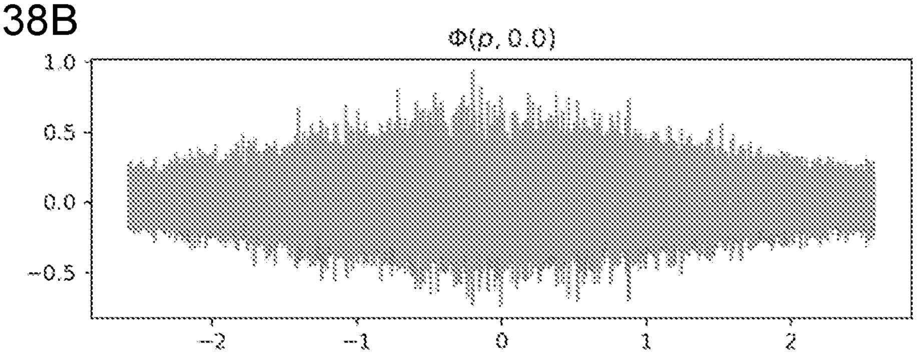
Figure 139A:
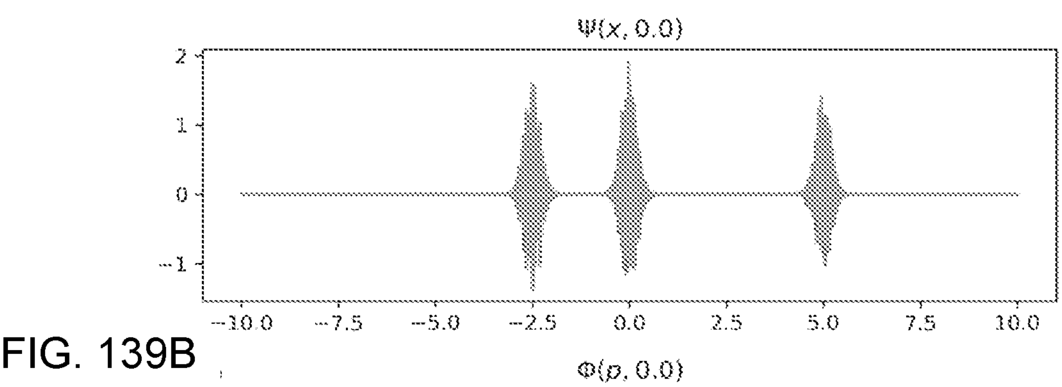
Figure 139B:
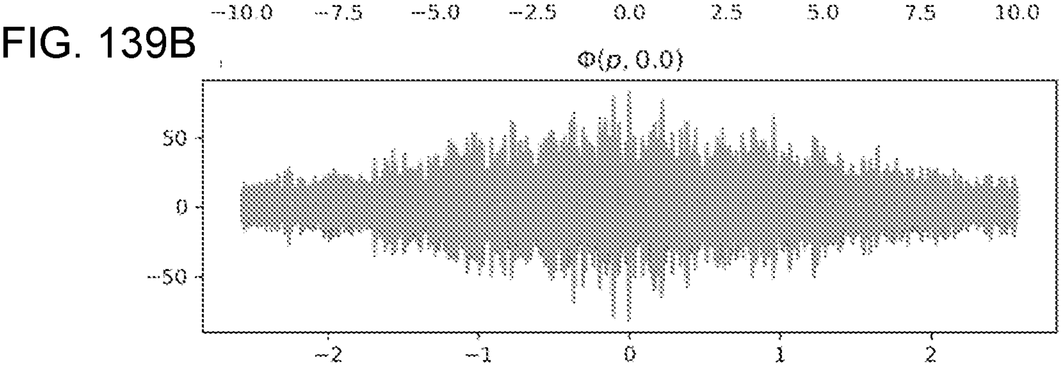
Figure 140A:
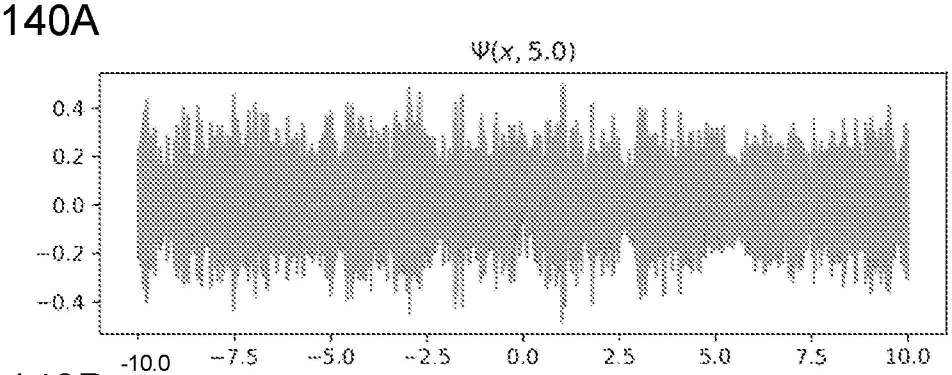
Figure 140B:
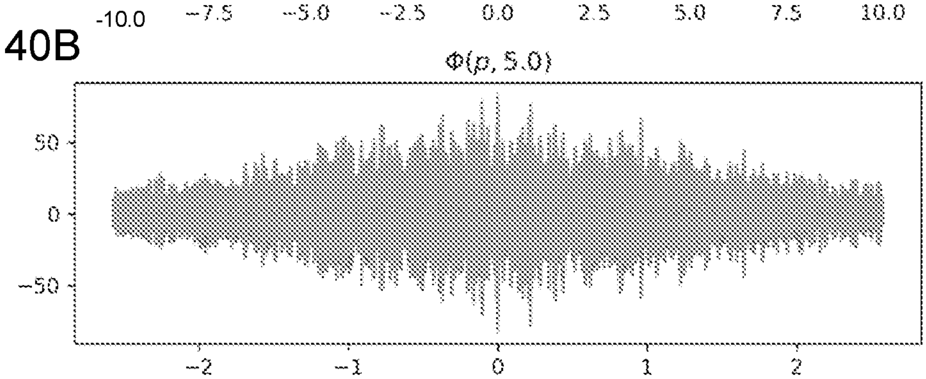
Figure 141A:
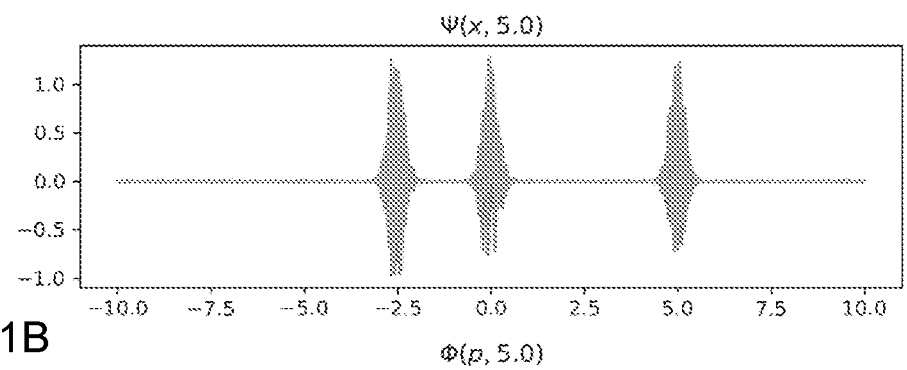
Figure 141B:
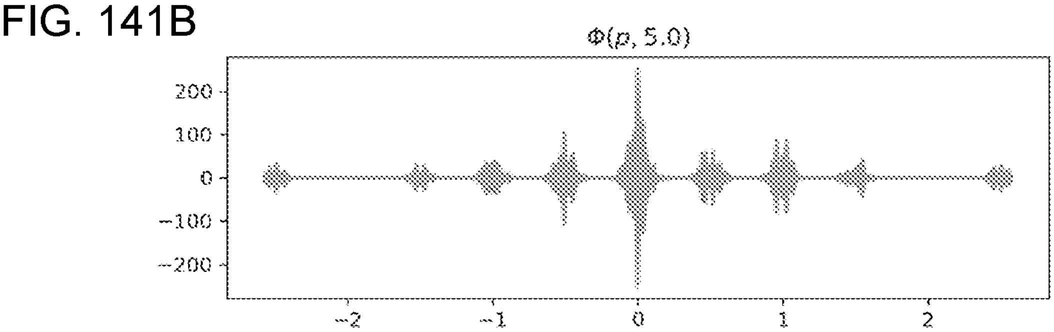
Figure 142A:
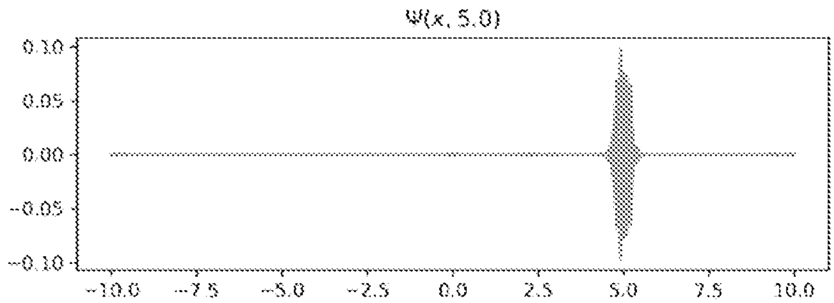
Figure 142B:
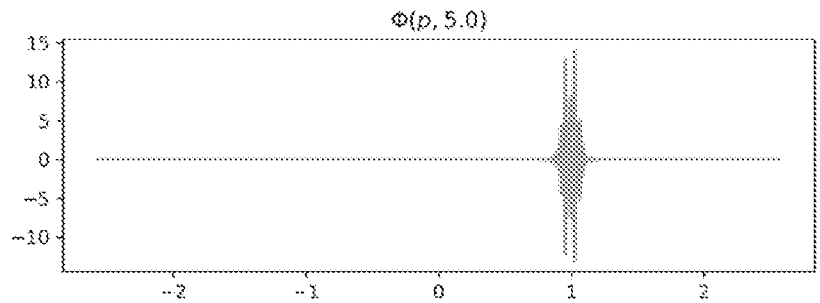
Figure 142C:
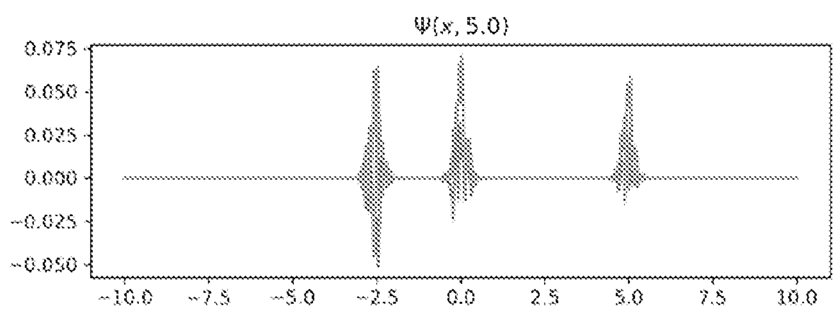
Figure 142D:
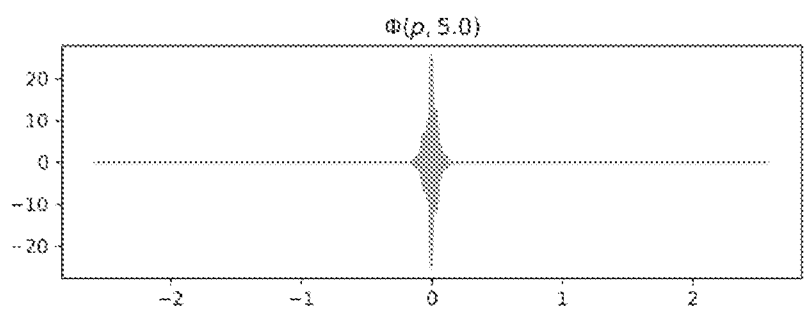
Figure 142E:
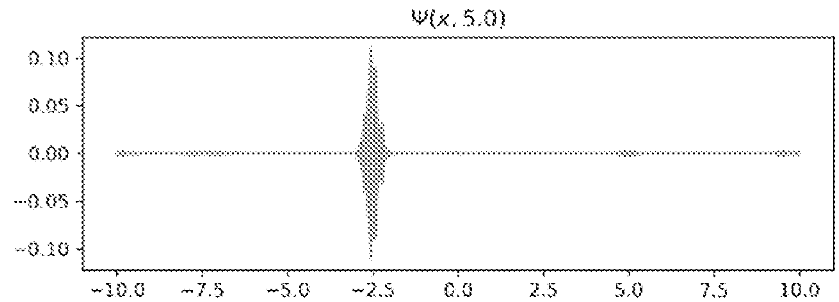
Figure 142F:
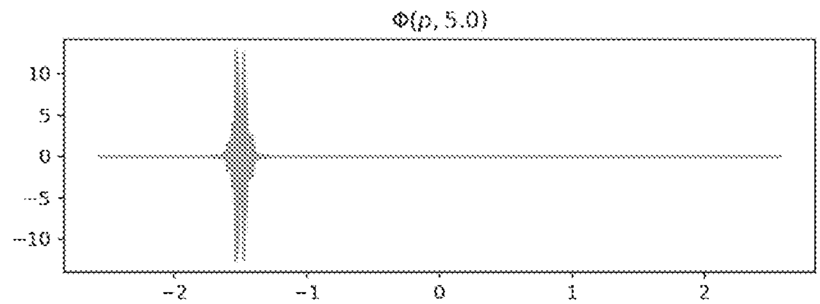
Figure 142G:
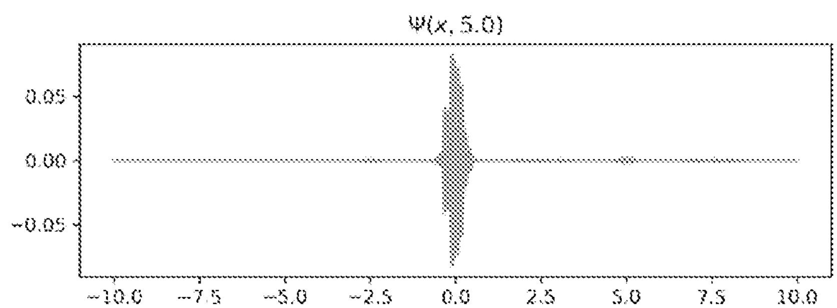
Figure 142H:
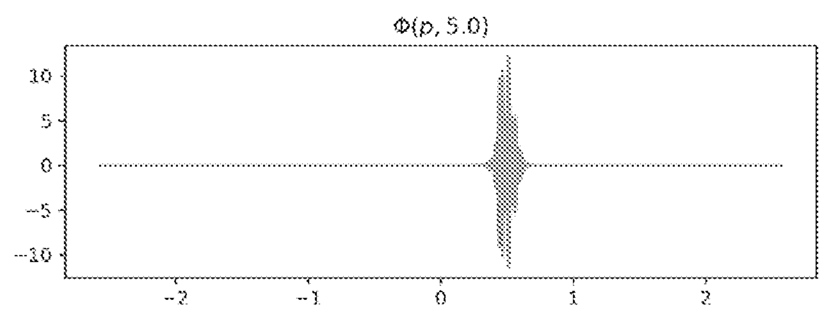
Figure 143A:
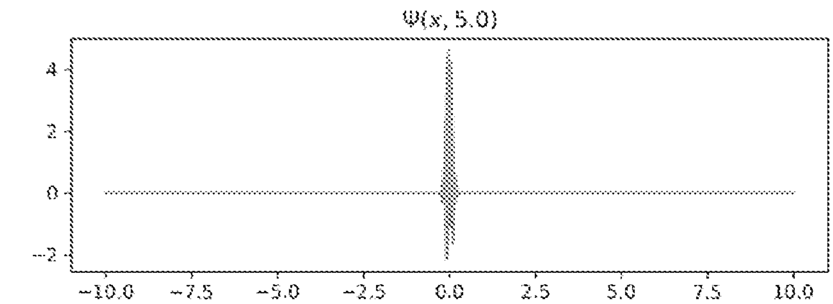
Figure 143B:
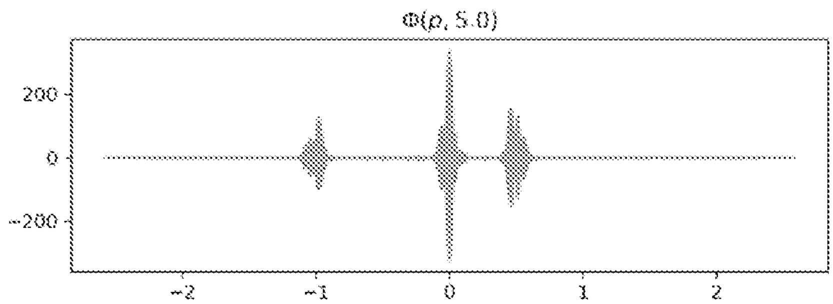
Figure 143C:
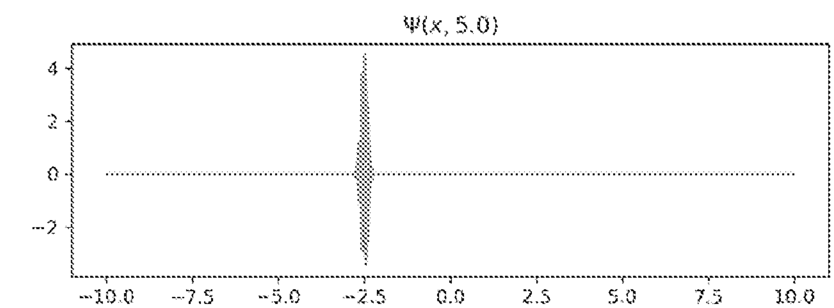
Figure 143D:
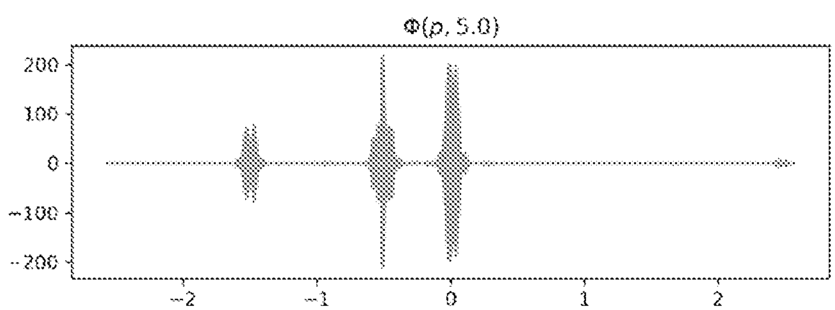
Figure 143E:
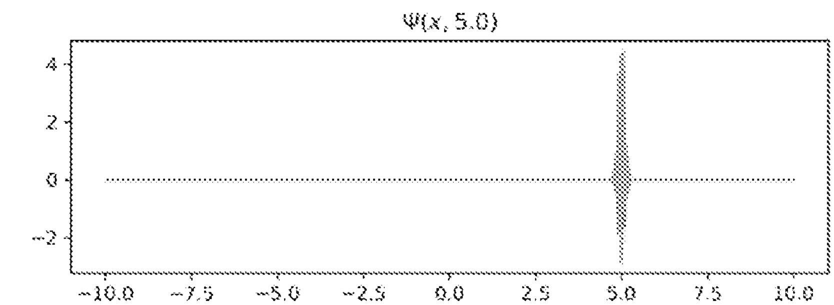
Figure 143F:
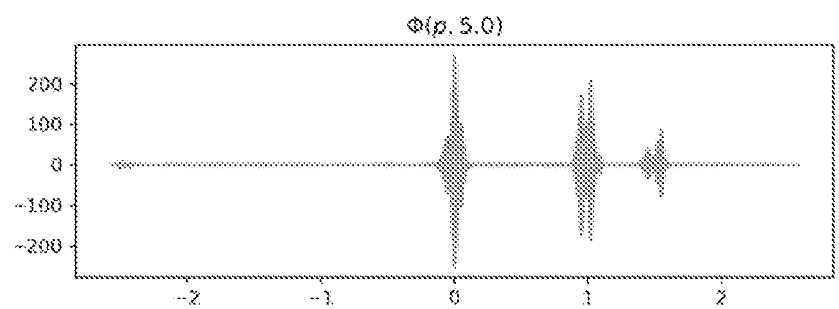

In quantum mechanics, wave functions represent probability amplitude of finding the system in some state. Physical pure states in quantum mechanics may be represented as unit-norm vectors in a special complex Hilbert space and time evolution in this vector space may be given by application of the evolution operator. Further, in quantum mechanics, any observable should be associated with a self-adjoint linear operator which must yield real eigenvalues, e.g. they must be Hermitian. The probability of each eigenvalue may be related to the projection of the physical state on the subspace related to that eigenvalue and observables may be differential operators. For example, a robot navigates along a one-dimensional floor that includes three doors at doors at $x_0=-2.5$, $x_1=0$, and $x_2=5.0$. The processor of the robot is capable of determining when it is located at a door based on sensor data observed and the momentum of the robot is constant, but unknown. Initially the location of the robot is unknown, therefore the processor generates initial wave functions of the state shown in FIGS. 138A and 138B. When the processor determines the robot is in front of a door, the possible position of the robot is narrowed down to three possible positions, but not the momentum, resulting in wave functions shown in FIGS. 139A and 139B. The processor evolves the wave functions with a Hamiltonian operator, and after five seconds the wave functions are as shown in FIGS. 140A and 140B, wherein the position space has spread out again given that the momentum is unknown. However, the evolved probability density keeps track of the correlation between position and momentum. When the processor determines the robot is in front of a door again, the wave functions are updated to FIGS. 141A and 141B, wherein the wave functions have significantly narrowed down, indicating a number of peaks representing possible position and momentum combinations of the robot. And in fact, if the processor observes another observation, such as momentum $p=1.0$ at $t=5.0$, the wave function in the position space also collapses to the only remaining possible combination, the location near $x=5.0$, as shown in FIGS. 142A and 142B. The processor collapses the momentum wave function accordingly. Also, the processor reduces the position wave function to a peak at $x=5.0$. Given constant momentum, the momentum observation of $p=1.0$, and that the two door observations were 5 seconds apart, the position $x=5.0$ is the only remaining valid position hypothesis. FIGS. 142C and 142D illustrate the resulting wave function for a momentum observation of $p=0.0$ at $t=5.0$ instead. FIGS. 142E and 142F illustrate the resulting wave function for a momentum observation of $p=-1.5$ at $t=5.0$ instead. FIGS. 142G and 142H illustrate the resulting wave function for a momentum observation of $p=0.5$ at $t=5.0$ instead. Similarly, the processor collapses the momentum wave function when position is observed instead of momentum. FIGS. 143A and 143B illustrate the resulting wave function for a position observation of $x=0.0$ at $t=5.0$ instead. FIGS. 143C and 143D illustrate the resulting wave function for a position observation of $x=-2.5$ at $t=5.0$ instead. FIGS. 143E and 143F illustrate the resulting wave function for a position observation of $x=5.0$ at $t=5.0$ instead.

In some embodiments, the processor may simulate multiple robots located in different possible locations within the environment. In some embodiments, the processor may view the environment from the perspective of each different simulated robot. In some embodiments, the collection of simulated robots may form an ensemble. In some embodiments, the processor may evolve the location of each simulated robot or the ensemble over time. In some embodiments, the range of movement of each simulated robot may be different. In some embodiments, the processor may view the environment from the FOV of each simulated robot, each simulated robot having a slightly different map of the environment based on their simulated location and FOV. In some embodiments, the collection of simulated robots may form an approximate region within which the robot is truly located. In some embodiments, the true location of the robot is one of the simulated robots. In some embodiments, when a measurement of the environment is taken, the processor may check the measurement of the environment against the map of the environment of each of the simulated robots. In some embodiments, the processor may predict the robot is truly located in the location of the simulated robot having a map that best matches the measurement of the environment. In some embodiments, the simulated robot which the processor believes to be the true robot may change or may remain the same as new measurements are taken and the ensemble evolves over time. In some embodiments, the ensemble of simulated robots may remain together as the ensemble evolves over time. In some embodiments, the overall energy of the collection of simulated robots may remain constant in each timestamp, however the distribution of energy to move each simulated robot forward during evolution may not be distributed evenly among the simulated robots. For example, in one instance a simulated robot may end up much further away than the remaining simulated robots or too far to the right or left, however in future instances and as the ensemble evolves may become close to the group of simulated robots again. In some embodiments, the ensemble may evolve to most closely match the sensor readings, such as a gyroscope or optical sensor. In some embodiments, the evolution of the location of simulated robots may be limited based on characteristics of the physical robot. For example, a robot may have limited speed and limited rotation of the wheels, therefor it would be impossible for the robot to move two meters, for example, in between time steps. In another example, the robot may only be located in certain areas of an environment, where it may be impossible for the robot to be located in areas where an obstacle is located for example. In some embodiments, this method may be used to hold back certain elements or modify the overall understanding of the environment. For example, when the processor examines a total of ten simulated robots one by one against a measurement, and selects one simulated robot as the true robot, the processor filters out nine simulated robots.

In some embodiments, the FOV of each simulated robot may not include the exact same features as one another. In some embodiments, the processor may save the FOV of each of the simulated robots in memory. In some embodiments, the processor may combine the FOVs of each simulated robot to create a FOV of the ensemble using methods such as least squares methods. In some embodiments, the processor may track the FOV of each of the simulated robots individually and the FOV of the entire ensemble. In some embodiments, other methods may be used to create the FOV of the ensemble (or a portion of the ensemble). For example, a classifier AI algorithm may be used, such as naive Bayes classifier, least squares support vector machines, k-nearest neighbor, decision trees, and neural networks. In some embodiments, more than one FOV of the ensemble (or a portion of the ensemble) may be generated and tracked by the processor, each FOV created using a different method. For example, the processor may track the FOV of ten simulated robots and ten differently generated FOVs of the ensemble. At each measurement timestamp, the processor may examine the measurement against the FOV of the ten simulated robots and/or the ten differently generated FOVs of the ensemble and may choose any of these 20 possible FOVs as the ground truth. In some embodiments, the processor may examine the 20 FOVs instead of the FOVs of the simulated robots and choose a derivative as the ground truth. The number of simulated robots and/or the number of generated FOVs may vary. During mapping for example, the processor may take a first field of view of the sensor and calculate a FOV for the ensemble or each individual observer (simulated robot) inside the ensemble and combine it with the second field of view captured by the sensor for the ensemble or each individual observer inside the ensemble. The may processor switch between the FOV of each observer (e.g., like multiple CCTV cameras in an environment that an operator may switch between) and/or one or more FOVs of the ensemble (or a portion of the ensemble) and chooses the FOVs that are more probable to be close to ground truth. At each time iteration, the FOV of each observer and/or ensemble may evolve into being closer to ground truth.

In some embodiments, simulated robots may be divided in two or more classes. For example, simulated robots may be classified based on their reliability, such as good reliability, bad reliability, or average reliability or based on their speed, such as fast and slow. Classes that move to a side a lot may be used. Any classification system may be created, such as linear classifiers like Fisher's linear discriminant, logistic regression, naive Bayes classifier and perceptron, support vector machines like least squares support vector machines, quadratic classifiers, kernel estimation like k-nearest neighbor, boosting (meta-algorithm), decision trees like random forests, neural networks, and learning vector quantization. In some embodiments, each of the classes may evolve differently. For example, for fast speed and slow speed classes, each of the classes may move differently wherein the simulated robots in the fast class will move very fast and will be ahead of the other simulated robots in the slow class that move slower and fall behind. The kind and time of evolution may have different impact on different simulated robots within the ensemble. The evolution of the ensemble as a whole may or may not remain the same. The ensemble may be homogenous or non-homogenous.

In some embodiments, samples may be taken from the phase space. In some embodiments, the intervals at which samples are taken may be fixed or dynamic or machine learned. In a fixed interval sampling system, a time may be preset. In a dynamic interval system, the sampling frequency may depend on factors such as speed or how smooth the floor is and other parameters. For example, as the speed of the robot increases, more samples may be taken. Or more samples may be taken when the robot is traveling on rough terrain. In a machine learned system, the frequency of sampling may depend on predicted drift. For example, if in previous timestamps the measurements taken indicate that the robot has reached the intended position fairly well, the frequency of sampling may be reduced. In some embodiments, the above explained dynamic system may be equally used to determine the size of the ensemble. If, for example, in previous timestamps the measurements taken indicate that the robot has reached the intended position fairly well, a smaller ensemble may be used to correct the knowledge of where the robot is. In some embodiments, the ensemble may be regenerated at each interval. In some embodiments, a portion of the ensemble may be regenerated. In some embodiments, a portion of the ensemble that is more likely to depict ground truth may be preserved and the other portion regenerated. In some embodiments, the ensemble may not be regenerated but one of the observers (simulated robots) in the ensemble that is more likely to be ground truth may be chosen as the most feasible representation of the true robot. In some embodiments, observers (simulated robots) in the ensemble may take part in becoming the most feasible representation of the true robot based on how their individual description of the surrounding fits with the measurement taken.

In some embodiments, the processor may generate an ensemble of hypothetical positions of various simulated robots within the environment. In some embodiments, the processor may generate a simulated representation of the environment for each hypothetical position of the robot from the perspective corresponding with each hypothetical position. In some embodiments, the processor may compare the measurement against each simulated representation of the environment (e.g., a floor type map, a spatial map, a Wi-Fi map, etc.) corresponding with a perspective of each of the hypothetical positions of the robot. In some embodiments, the processor may choose the hypothetical position of the robot that makes the most sense as the most feasible position of the robot. In some embodiments, the processor may select additional hypothetical positions of the robot as a backup to the most feasible position of the robot. In some embodiments, the processor may nominate one or more hypothetical positions as a possible leader or otherwise a feasible position of the robot. In some embodiments, the processor may nominates a hypothetical position of the robot as a possible leader when the measurement fits well with the simulated representation of the environment corresponding with the perspective of the hypothetical position. In some embodiments, the processor may defer a nomination of a hypothetical position to other hypothetical positions of the robot. In some embodiments, the hypothetical positions with the highest numbers of deferrals may be chosen as possible leaders. In some embodiments, the process of comparing measurements to simulated representations of the environment corresponding with the perspectives of different hypothetical positions of the robot, nominating hypothetical positions as possible leaders, and choosing the hypothetical position that is the most feasible position of the robot may be iterative. In some cases, the processor may select the hypothetical position with the lowest deviation between the measurement and the simulated representation of the environment corresponding with the perspective of the hypothetical position as the leader. In some embodiments, the processor may store one or more hypothetical positions that are not elected as leader for another round of iteration after another movement of the robot. In other cases, the processor may eliminate one or more hypothetical positions that are not elected as leader or eliminates a portion and stores a portion for the next round of iteration. In some cases, the processor may choose the portion of the one or more hypothetical positions that are stored based on one or more criteria. In some cases, the processor may choose the portion of hypothetical positions that are stored randomly and based on one or more criteria. In some cases, the processor may eliminate some of the hypothetical positions of the robot that pass the one or more criteria. In some embodiments, the processor may evolve the ensemble of hypothetical positions of the robot similar to a genetic algorithm. In some embodiments, the processor may use a MDP to reduce the error between the measurement and the representation of the environment corresponding with each hypothetical position over time, thereby improving the chances of each hypothetical position in becoming or remaining leader. In some cases, the processor may apply game theory to the hypothetical positions of the robots, such that hypothetical positions compete against one another in becoming or remaining leader. In some embodiments, hypothetical positions may compete against one another and the ensemble becomes an equilibrium wherein the leader following a policy ($\pi$) remains leader while the other hypothetical positions maintain their current positions the majority of the time.

In some embodiments, the robot undocks to execute a task. In some embodiments, the processor performs a seed localization while the robot perceives the surroundings. In some embodiments, the processor uses a Chi square test to select a subset of data points that may be useful in localizing the robot or generating the map. In some embodiments, the processor of the robot generates a map of the environment after performing a seed localization. In some embodiments, the localization of the robot is improved iteratively. In some embodiments, the processor aggregates data into the map as it is collected. In some embodiments, the processor transmits the map to an application of a communication device (e.g., for a user to access and view) after the task is complete.

Figure 144A:
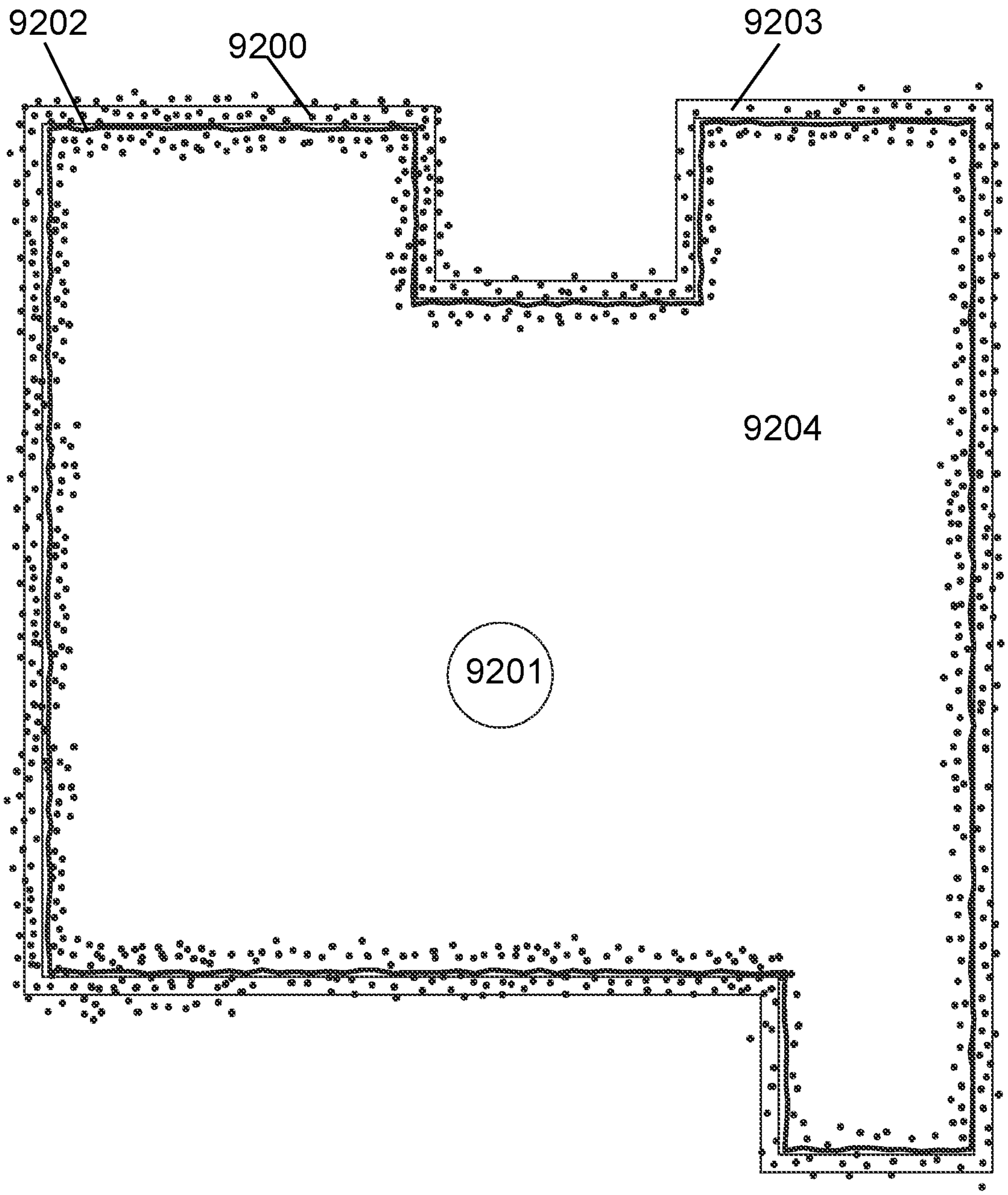
Figure 144B:
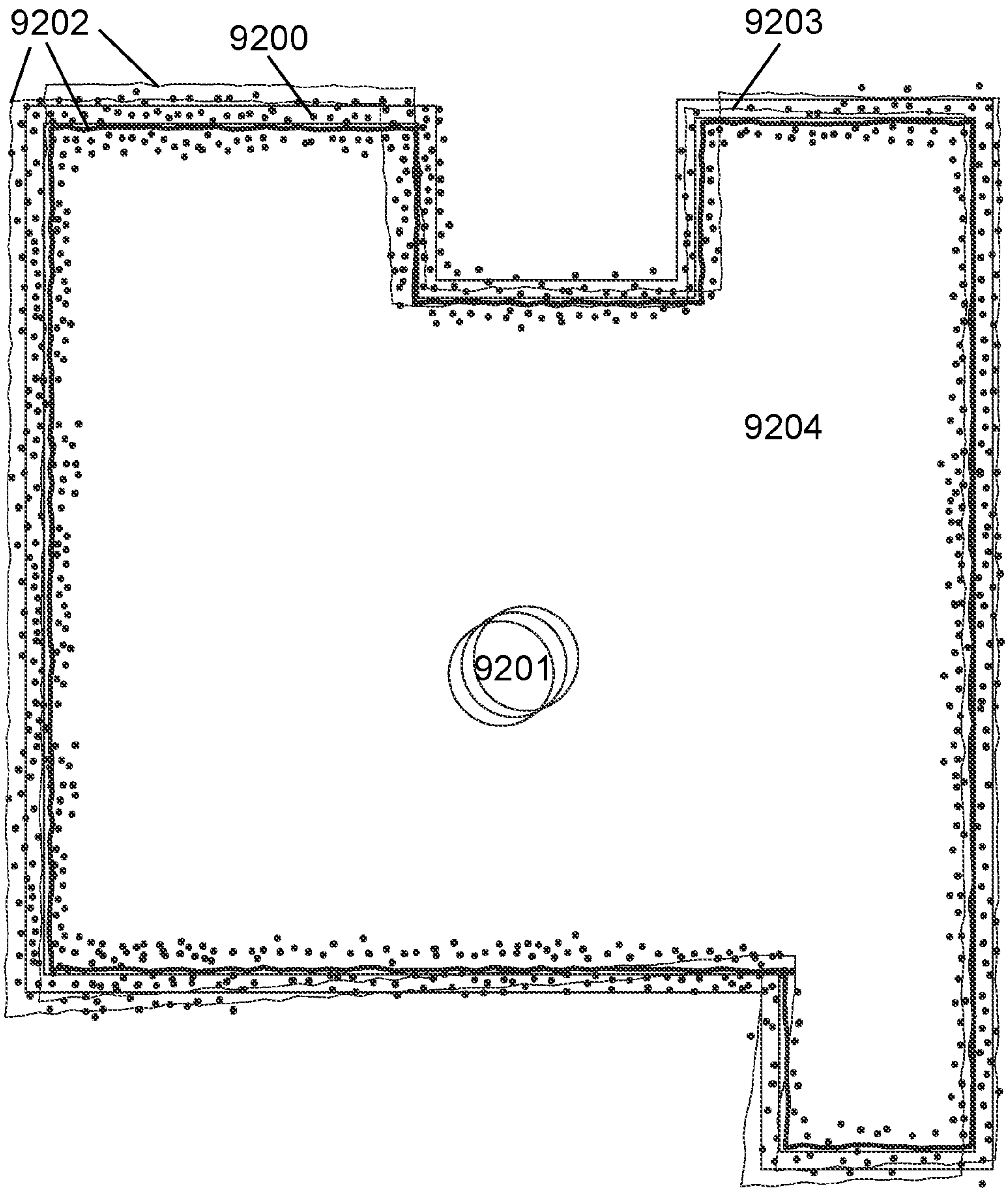
Figure 145A:
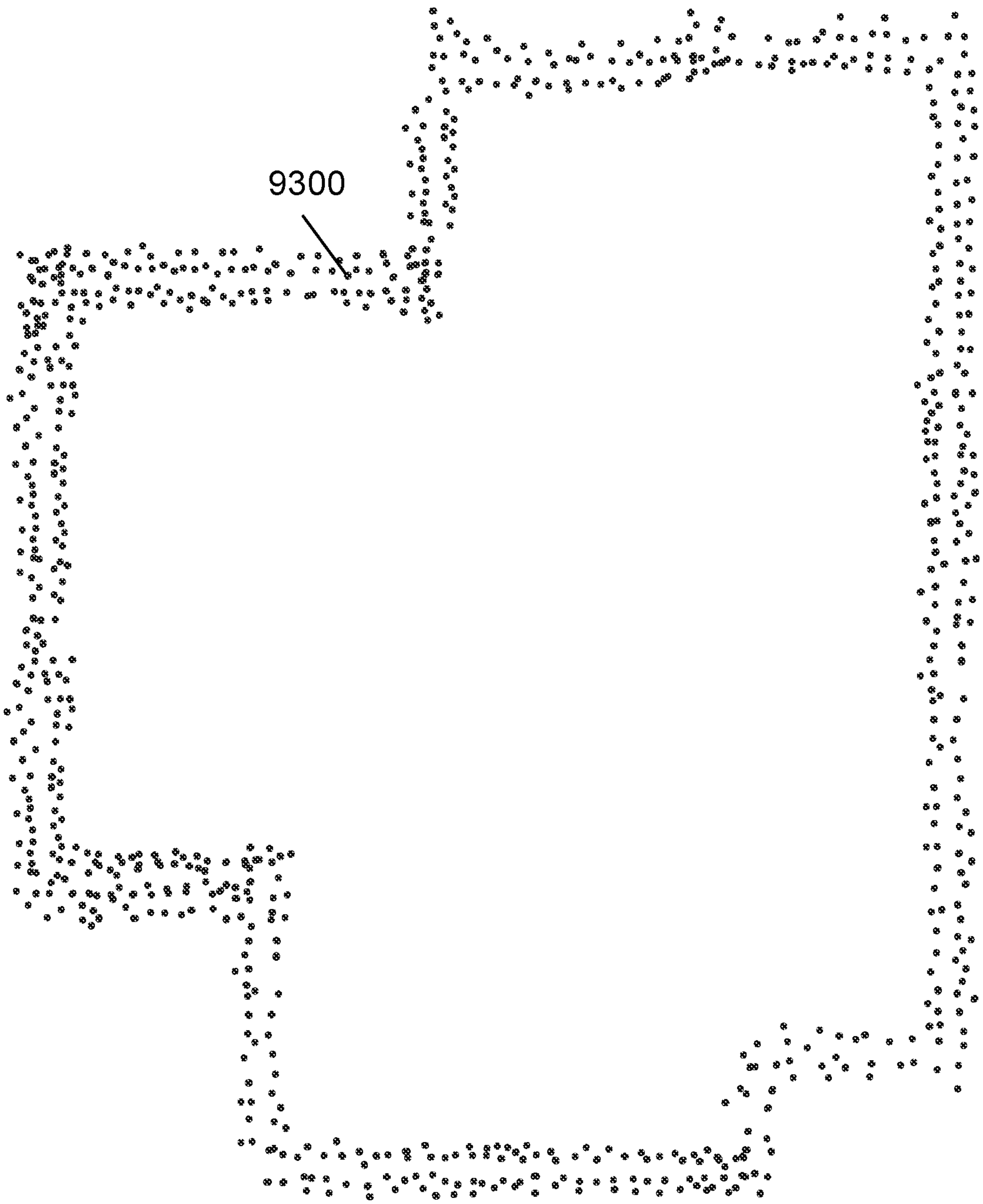
Figure 145B:
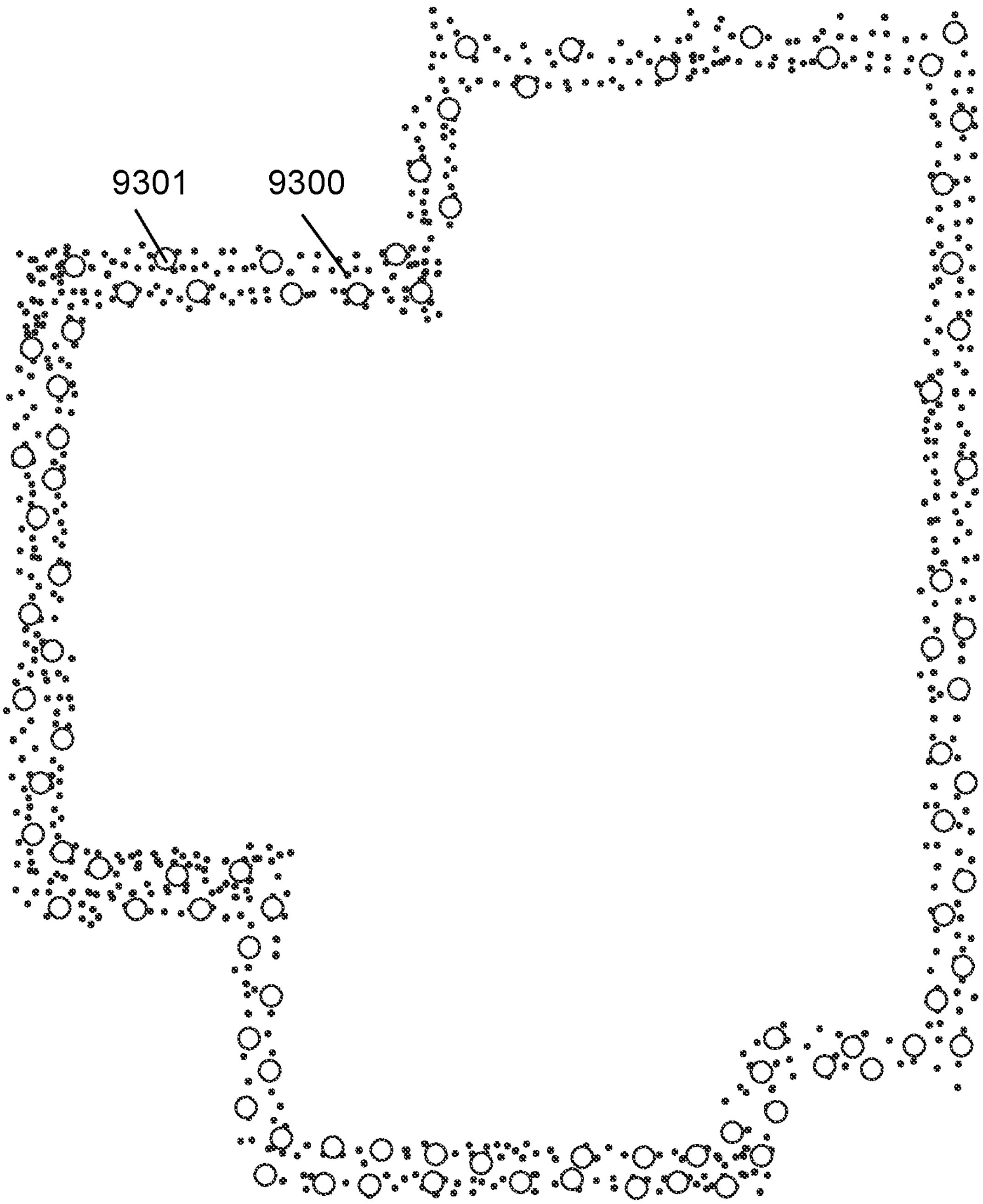

In some embodiments, the processor generates a spatial representation of the environment in the form of a point cloud of sensor data. In some embodiments, the processor of the robot may approximate perimeters of the environment by determining perimeters that fit all constraints. For example, FIG. 144A illustrates point cloud 9200 based on data from sensors of robot 9201 and approximated perimeter 9202 fitted to point cloud 9200 for walls 9203 of an environment 9204. In some embodiments, the processor of the robot may employ a Monte Carlo method. In some embodiments, more than one possible perimeter 9202 corresponding with more than one possible position of the robot 9201 may be considered as illustrated in FIG. 144B. This process may be computationally expensive. In some embodiments, the processor of the robot may use a statistical test to filter out points from the point cloud that do not provide statistically significant information. For example, FIG. 145A illustrates a point cloud 9300 and FIG. 145B illustrates points 9301 that may be filtered out after determining that they do not provide significant information. In some embodiments, some points may be statistically insignificant when overlapping data is merged together. In some embodiments, the processor of the robot localizes the robot against the subset of points remaining after filtering out points that may not provide significant information. In some embodiments, after localization, the processor creates the map using all points from the point cloud. Since the subset of points used in localizing the robot results in a lower resolution map the area within which the robot may be located is larger than the actual size of the robot. FIG. 146 illustrates a low resolution point cloud map 9400 with an area 9401 including possible locations of the robot, which collectively from an larger area than the actual size of the robot. In some embodiments, after seed localization, the processor creates a map including all points of the point cloud from each of the possible locations of the robot. In some embodiments, the precise location of the robot may be chosen as a location common to all possible locations of the robot. In some embodiments, the processor of the robot may determine the overlap of all the approximated locations of the robot and may approximate the precise location of the robot as a location corresponding with the overlap. FIG. 147A illustrates two possible locations (A and B) of the robot and the center of overlap 9500 between the two may be approximated as the precise location of the robot. FIG. 147B illustrates an example of three locations of the robot 9501, 9502, and 9503 approximated based on sensor data and overlap 9504 of the three locations 9501, 9502, and 9503. In some embodiments, after determining a precise location of the robot, the processor creates the map using all points from the point cloud based on the location of the robot relative to the subset of points. In some embodiments, the processor examines all points in the point cloud. In some embodiments, the processor chooses a subset of points from the point cloud to examine when there is high confidence that there are enough points to represent the ground truth and avoid any loss. In some embodiments, the processor of the robot may regenerate the exact original point cloud when loss free. In some embodiments, the processor accepts a loss as a trade-off. In some embodiments, this process may be repeated at a higher resolution.

In some embodiments, the processor of the robot loses the localization of the robot when facing difficult areas to navigate. For example, the processor may lose localization of the robot when the robot gets stuck on a floor transition or when the robot struggles to release itself from an object entangled with a brush or wheel of the robot. In some embodiments, the processor may expect a difficult climb and may increase the driving speed of the robot prior to approaching the climb in order to avoid becoming stuck and potentially losing localization. In some embodiments, the processor increases the driving speed of all the motors of the robot when an unsuccessful climb occurs. For example, if a robot gets stuck on a transition, the processor may increase the speed of all the motors of the robot to their respective maximum speeds. In some embodiments, motors of the robot may include at least one of a side brush motor and a main brush motor. In some embodiments, the processor may reverse a direction of rotation of at least one motor of the robot (e.g., clockwise or counterclockwise) or may alternate the direction of rotation of at least one motor of the robot. In some embodiments, adjusting the speed or direction of rotation of at least one motor of the robot may move the robot and/or items around the robot such that the robot may transition to an improved situation and regain localization.

In some embodiments, the processor of the robot may attempt to regain its localization after losing the localization of the robot. In some embodiments, the processor of the robot may attempt to regain localization multiple times using the same method or alternative methods consecutively. In some embodiments, the processor of the robot may attempt methods that are highly likely to yield a result before trying other, less successful methods. In some embodiments, the processor of the robot may restart mapping and localization if localization cannot be regained.

In some embodiments, the processor associates properties with each room as the robot discovers rooms one by one. In some embodiments, the properties are stored in a graph or a stack, such the processor of the robot may regain localization if the robot becomes lost within a room. For example, if the processor of the robot loses localization within a room, the robot may have to restart coverage within that room, however as soon as the robot exits the room, assuming it exits from the same door it entered, the processor may know the previous room based on the stack structure and thus regain localization. In some embodiments, the processor of the robot may lose localization within a room but still have knowledge of which room it is within. In some embodiments, the processor may execute a new re-localization with respect to the room without performing a new re-localization for the entire environment. In such scenarios, the robot may perform a new complete coverage within the room. Some overlap with previously covered areas within the room may occur, however, after coverage of the room is complete the robot may continue to cover other areas of the environment purposefully. In some embodiments, the processor of the robot may determine if a room is known or unknown. In some embodiments, the processor may compare characteristics of the room against characteristics of known rooms. For example, location of a door in relation to a room, size of a room, or other characteristics may be used to determine if the robot has been in an area or not. In some embodiments, the processor adjusts the orientation of the map prior to performing comparisons. In some embodiments, the processor may use various map resolutions of a room when performing comparisons. For example, possible candidates may be short listed using a low resolution map to allow for fast match finding then may be narrowed down further using higher resolution maps. In some embodiments, a full stack including a room identified by the processor as having been previously visited may be candidates of having been previously visited as well. In such a case, the processor may use a new stack to discover new areas. In some instances, graph theory allows for in depth analytics of these situations.

In some embodiments, the robot may be unexpectedly pushed while executing a movement path. In some embodiments, the robot senses the beginning of the push and moves towards the direction of the push as opposed to resisting the push. In this way, the robot reduces its resistance against the push. In some embodiments, as a result of the push, the processor may lose localization of the robot and the path of the robot may be linearly translated and rotated. In some embodiments, increasing the IMU noise in the localization algorithm such that large fluctuations in the IMU data are acceptable may prevent an incorrect heading after being pushed. Increasing the IMU noise may allow large fluctuations in angular velocity generated from a push to be accepted by the localization algorithm, thereby resulting in the robot resuming its same heading prior to the push. In some embodiments, determining slippage of the robot may prevent linear translation in the path after being pushed. In some embodiments, an algorithm executed by the processor may use optical tracking sensor data to determine slippage of the robot during the push by determining an offset between consecutively captured images of the driving surface. The localization algorithm may receive the slippage as input and account for the push when localizing the robot. In some embodiments, the processor of the robot may relocalize the robot after the push by matching currently observed features with features within a local or global map.

In some embodiments, the robot may not begin performing work from a last location saved in the stored map. Such scenarios may occur when, for example, the robot is not located within a previously stored map. For example, a robot may clean a first floor of a two-story home, and thus the stored map may only reflect the first floor of the home. A user may place the robot on a second floor of the home and the processor may not be able to locate the robot within the stored map. The robot may begin to perform work and the processor may build a new map. Or in another example, a user may lend the robot to another person. In such a case, the processor may not be able to locate the robot within the stored map as it is located within a different home than that of the user. Thus, the robot begins to perform work. In some cases, the processor of the robot may begin building a new map. In some embodiments, a new map may be stored as a separate entry when the difference between a stored map and the new map exceeds a certain threshold. In some embodiments, a cold-start operation includes fetching N maps from the cloud and localizing (or trying to localize) the robot using each of the N maps. In some embodiments, such operations are slow, particularly when performed serially. In some embodiments, the processor uses a localization regain method to localize the robot when cleaning starts. In some embodiments, the localization regain method may be modified to be a global localization regain method. In some embodiments, fast and robust localization regain method may be completed within seconds. In some embodiments, the processor loads a next map after regaining localization fails on a current map and repeats the process of attempting to regain localization. In some embodiments, the saved map may include a bare minimum amount of useful information and may have a lowest acceptable resolution. This may reduce the footprint of the map and may thus reduce computational, size (in terms of latency), and financial (e.g., for cloud services) costs.

In some embodiments, the processor may ignore at least some elements (e.g., confinement line) added to the map by a user when regaining localization in a new work session. In some embodiments, the processor may not consider all features within the environment to reduce confusion with the walls within the environment while regaining localization.

In some embodiments, the processor may use odometry, IMU, and OTS information to update an EKF. In some embodiments, arbitrators may be used. For example, a multiroom arbitrator state. In some embodiments, the robot may initialize the hardware and then other software. In some embodiments, a default parameter may be provided as a starting value when initialization occurs. In some embodiments, the default value may be replaced by readings from a sensor. In some embodiments, the robot may make an initial circulation of the environment. In some embodiments, the circulation may be 180 degrees, 360 degrees, or a different amount. In some embodiments, odometer readings may be scaled to the OTS readings. In some embodiments, an odometer/OTS corrector may create an adjusted value as its output. In some embodiments, heading rotation offset may be calculated.

In some embodiments, the processor may use various methods for measuring movement of the robot. In some embodiments, a first method for measuring movement may be a primary method of measuring movement of the robot and a second method for measuring movement may be used in correcting or validating movement measured using the first or primary method. For example, an IMU may be used in measuring a 180 degree of rotation of the robot while an optical tracking sensor may be used in measuring translation of the robot during the 180 degrees rotation that may have been a result of slippage during the rotation. The processor may then adjust sensor readings and the position of the robot within the map of the environment based on the translation. In some embodiments, distance measurements may be used in determining an offset resulting from slippage during a rotation of the robot. For example, a depth measuring device may measure the distances to objects, the robot may then rotate 360 degrees, and the depth measurement device may then measure distances to objects again after the robot completes the rotation. Since the robot rotates in spot 360 degrees, the distances to objects before and after the 360 degrees rotation are expected to be the same. The processor may determine a difference or an offset in the distances to objects after completion of the 360 degrees rotation and use the difference to adjust other sensor readings and the position of the robot by the offset.

Various devices may be used in measuring distances to objects within the environment. Some embodiments may include a distance estimation system including a laser light emitter disposed on a baseplate emitting a collimated laser beam creating an a projected light point (or other form such as a light line) on surfaces that are substantially opposite the emitter; two image sensors disposed on the baseplate, positioned at a slight inward angle towards the laser light emitter such that the fields of view of the two image sensors overlap and capture the projected light point within a predetermined range of distances, the image sensors simultaneously and iteratively capturing images; an image processor overlaying the images taken by the two image sensors to produce a superimposed image showing the light points from both images in a single image; extracting a distance between the light points in the superimposed image; and, comparing the distance to figures in a preconfigured table that relates distances between light points with distances between the baseplate and surfaces upon which the light point is projected (which may be referred to as 'projection surfaces' herein) to find an estimated distance between the baseplate and the projection surface at the time the images of the projected light point were captured. In some embodiments, the preconfigured table may be constructed from actual measurements of distances between the light points in superimposed images at increments of a predetermined range of distances between the baseplate and the projection surface.

In some embodiments, each image taken by the two image sensors shows the field of view including the light point created by the collimated laser beam. At each discrete time interval, the image pairs are overlaid by the processor of the robot or a dedicated image processor to create a superimposed image showing the light point as it is viewed by each image sensor. Because the image sensors are at different locations, the light point will appear at a different spot within the image frame in the two images. Thus, when the images are overlaid, the resulting superimposed image will show two light points until such a time as the light points coincide. The distance between the light points is extracted by the image processor using computer vision technology, or any other type of technology known in the art. The processor may then compare the distance to figures in a preconfigured table that relates distances between light points with distances between the baseplate and projection surfaces to find an estimated distance between the baseplate and the projection surface at the time that the images were captured. As the distance to the surface decreases the distance measured between the light point captured in each image when the images are superimposed decreases as well. In some embodiments, the emitted laser point captured in an image is detected by the image processor by identifying pixels with high brightness, as the area on which the laser light is emitted has increased brightness. After superimposing both images, the distance between the pixels with high brightness, corresponding to the emitted laser point captured in each image, is determined.

The image sensors may be positioned at an angle such that the light point captured in each image coincides at or before the maximum effective distance of the distance sensor, which is determined by the strength and type of the laser emitter and the specifications of the image sensor used. In some instances, a line laser is used in place of a point laser. In such instances, the images taken by each image sensor are superimposed and the distance between coinciding points along the length of the projected line in each image may be used to determine the distance from the surface using a preconfigured table relating the distance between points in the superimposed image to distance from the surface.

FIG. 148A illustrates a front elevation view of an embodiment of distance estimation system 100. Distance estimation system 100 includes baseplate 101, left image sensor 102, right image sensor 103, laser light emitter 104, and image processor 105. The image sensors are positioned with a slight inward angle with respect to the laser light emitter. This angle causes the fields of view of the image sensors to overlap. The positioning of the image sensors is also such that the fields of view of both image sensors will capture laser projections of the laser light emitter within a predetermined range of distances. FIG. 148B illustrates an overhead view of remote estimation device 100. Remote estimation device 100 includes baseplate 101, image sensors 102 and 103, laser light emitter 104, and image processor 105.

FIG. 149 illustrates an overhead view of an embodiment of the remote estimation device and fields of view of the image sensors. Laser light emitter 104 is disposed on baseplate 101 and emits collimated laser light beam 200. Image processor 105 is located within baseplate 101. Area 201 and 202 together represent the field of view of image sensor 102. Dashed line 205 represents the outer limit of the field of view of image sensor 102. (It should be noted that this outer limit would continue on linearly, but has been cropped to fit on the drawing page.) Area 203 and 202 together represent the field of view of image sensor 103. Dashed line 206 represents the outer limit of the field of view of image sensor 103 (it should be noted that this outer limit would continue on linearly, but has been cropped to fit on the drawing page). Area 202 is the area where the fields of view of both image sensors overlap. Line 204 represents the projection surface. That is, the surface onto which the laser light beam is projected.

In some embodiments, the image sensors simultaneously and iteratively capture images at discrete time intervals. FIG. 150A illustrates an embodiment of the image captured by left image sensor 102 (in FIG. 149). Rectangle 300 represents the field of view of image sensor 102. Point 301 represents the light point projected by laser beam emitter 104 as viewed by image sensor 102. FIG. 150B illustrates an embodiment of the image captured by right image sensor 103 (in FIG. 149). Rectangle 302 represents the field of view of image sensor 103. Point 303 represents the light point projected by laser beam emitter 104 as viewed by image sensor 102. As the distance of the baseplate to projection surfaces increases, light points 301 and 303 in each field of view will appear further and further toward the outer limits of each field of view, shown respectively in FIG. 149 as dashed lines 205 and 206. Thus, when two images captured at the same time are overlaid, the distance between the two points will increase as distance to the projection surface increases. FIG. 150C illustrates the two images from FIG. 150A and FIG. 150B overlaid. Point 301 is located a distance 304 from point 303. The image processor 105 (in FIG. 148A) extracts this distance. The distance 304 is then compared to figures in a preconfigured table that co-relates distances between light points in the superimposed image with distances between the baseplate and projection surfaces to find an estimate of the actual distance from the baseplate to the projection surface upon which the images of the laser light projection were captured.

Figure 151A:
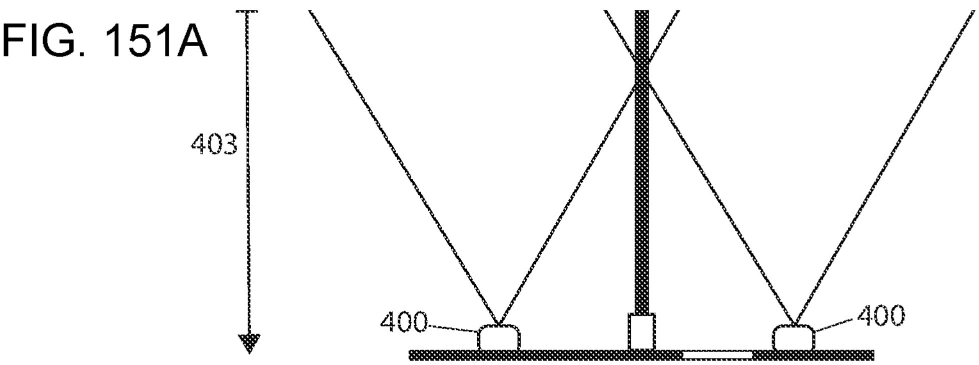
Figure 151B:
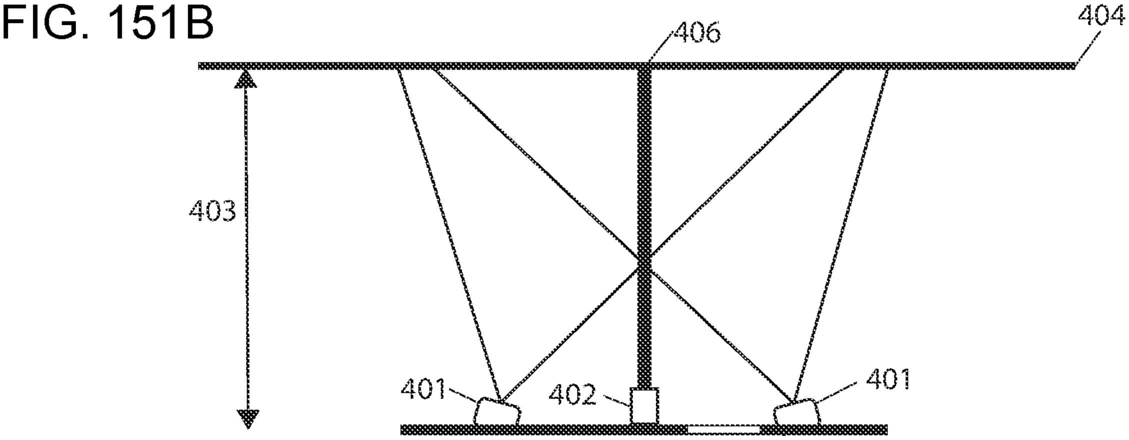
Figure 151C:
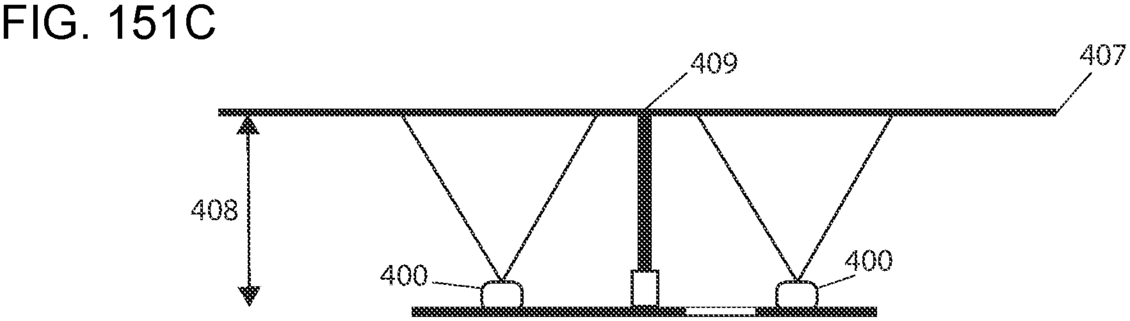
Figure 151D:
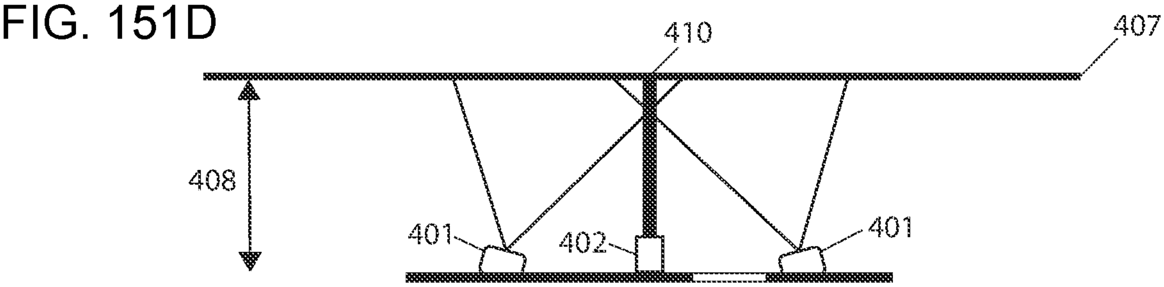

In some embodiments, the two image sensors are aimed directly forward without being angled towards or away from the laser light emitter. When image sensors are aimed directly forward without any angle, the range of distances for which the two fields of view may capture the projected laser point is reduced. In these cases, the minimum distance that may be measured is increased, reducing the range of distances that may be measured. In contrast, when image sensors are angled inwards towards the laser light emitter, the projected light point may be captured by both image sensors at smaller distances from the obstacle. FIG. 151A illustrates a top view of image sensors 400 positioned directly forward while FIG. 151B illustrates image sensors 401 angled inwards towards laser light emitter 402. It can be seen in FIGS. 151A and 151B, that at a distance 403 from same object 404, projected light points 405 and 406, respectively, are captured in both configurations and as such the distance may be estimated using both configurations. However, for object 407 at a distance 408, image sensors 400 aimed directly forward in FIG. 151C do not capture projected light point 409. In FIG. 151D, wherein image sensors 401 are angled inwards towards laser light emitter 402, projected light point 410 is captured by image sensors 401 at distance 408 from object 407. Accordingly, in embodiments, image sensors positioned directly forward have larger minimum distance that may be measured and, hence, a reduced range of distances may be measured.

In some embodiments, the distance estimation system may comprise a lens positioned in front of the laser light emitter that projects a horizontal laser line at an angle with respect to the line of emission of the laser light emitter. The images taken by each image sensor may be superimposed and the distance between coinciding points along the length of the projected line in each image may be used to determine the distance from the surface using a preconfigured table as described above. The position of the projected laser line relative to the top or bottom edge of the captured image may also be used to estimate the distance to the surface upon which the laser light is projected, with lines positioned higher relative to the bottom edge indicating a closer distance to the surface. In embodiments, the position of the laser line may be compared to a preconfigured table relating the position of the laser line to distance from the surface upon which the light is projected. In some embodiments, both the distance between coinciding points in the superimposed image and the position of the line are used in combination for estimating the distance to the obstacle. In combining more than one method, the accuracy, range, and resolution may be improved.

FIG. 152A demonstrates an embodiment of a side view of a distance estimation system comprising laser light emitter and lens 500, image sensors 501, and image processor (not shown). The lens is used to project a horizontal laser line at a downwards angle 502 with respect to line of emission of laser light emitter 503 onto object surface 504 located a distance 505 from the distance estimation system. The projected horizontal laser line appears at a height 506 from the bottom surface. As shown, the projected horizontal line appears at a height 507 on object surface 508, at a closer distance 509 to laser light emitter 500, as compared to obstacle 504 located a further distance away. Accordingly, in embodiments, in a captured image of the projected horizontal laser line, the position of the line from the bottom edge of the image would be higher for objects closer to the distance estimation system. Hence, the position of the project laser line relative to the bottom edge of a captured image may be related to the distance from the surface.

FIG. 152B illustrates an embodiment of a top view of the distance estimation system with laser light emitter and lens 500, image sensors 501, and image processor 510. Horizontal laser line 511 is projected onto object surface 506 located a distance 505 from the baseplate of the distance measuring system. FIG. 152C illustrates images of the projected laser line captured by image sensors 501. The horizontal laser line captured in image 512 by the left image sensor has endpoints 513 and 514 while the horizontal laser line captured in image 515 by the right image sensor has endpoints 516 and 517. FIG. 152C also illustrates the superimposed image 518 of images 512 and 515. On the superimposed image, distances 519 and 520 between coinciding endpoints 516 and 513 and 517 and 514, respectively, along the length of the laser line captured by each camera may be used to estimate distance from the baseplate to the object surface. In some embodiments, more than two points along the length of the horizontal line may be used to estimate the distance to the surface at more points along the length of the horizontal laser line. In some embodiments, the position of the horizontal line 521 from the bottom edge of the image may be simultaneously used to estimate the distance to the object surface as described above. In some embodiments, combining both methods results in improved accuracy of estimated distances to the object surface upon which the laser light is projected. In some configurations, the laser emitter and lens may be positioned below the image sensors, with the horizontal laser line projected at an upwards angle with respect to the line of emission of the laser light emitter. In one embodiment, a horizontal line laser is used rather than a laser beam with added lens. Other variations in the configuration are similarly possible.

In the illustrations provided, the image sensors are positioned on either side of the light emitter, however, configurations of the distance measuring system should not be limited to what is shown in the illustrated embodiments. For example, the image sensors may both be positioned to the right or left of the laser light emitter. Similarly, in some instances, a vertical laser line may be projected onto the surface of the object. The projected vertical line may be used to estimate distances along the length of the vertical line, up to a height determined by the length of the projected line. The distance between coinciding points along the length of the vertically projected laser line in each image, when images are superimposed, may be used to determine distance to the surface for points along the length of the line. As above, in embodiments, a preconfigured table relating horizontal distance between coinciding points and distance to the surface upon which the light is projected may be used to estimate distance to the object surface. The preconfigured table may be constructed by measuring horizontal distance between projected coinciding points along the length of the lines captured by the two image sensors when the images are superimposed at incremental distances from an object for a range of distances. With image sensors positioned at an inwards angle, towards one another, the position of the projected laser line relative to the right or left edge of the captured image may also be used to estimate the distance to the projection surface. In some embodiments, a vertical line laser may be used or a lens may be used to transform a laser beam to a vertical line laser. In other instances, both a vertical laser line and a horizontal laser line are projected onto the surface to improve accuracy, range, and resolution of distance estimations. The vertical and horizontal laser lines may form a cross when projected onto surfaces.

In some embodiments, a distance estimation system comprises two image sensors, a laser light emitter, and a plate positioned in front of the laser light emitter with two slits through which the emitted light may pass. In some instances, the two image sensors may be positioned on either side of the laser light emitter pointed directly forward or may be positioned at an inwards angle towards one another to have a smaller minimum distance to the obstacle that may be measured. The two slits through which the light may pass results in a pattern of spaced rectangles. In embodiments, the images captured by each image sensor may be superimposed and the distance between the rectangles captured in the two images may be used to estimate the distance to the surface using a preconfigured table relating distance between rectangles to distance from the surface upon which the rectangles are projected. The preconfigured table may be constructed by measuring the distance between rectangles captured in each image when superimposed at incremental distances from the surface upon which they are projected for a range of distances.

In embodiments, a distance estimation system includes at least one line laser positioned at a downward angle relative to a horizontal plane coupled with an image sensor and processer. The line laser projects a laser line onto objects and the image sensor captures images of the objects onto which the laser line is projected. The image processor extracts the laser line and determines distance to objects based on the position of the laser line relative to the bottom or top edge of the captured image. Since the line laser is angled downwards, the position of the projected line appears higher for surfaces closer to the line laser and lower for surfaces further away. Therefore, the position of the laser line relative to the bottom or top edge of a captured image may be used to determine the distance to the object onto which the light is projected. In embodiments, the position of the laser line may be extracted by the image processor using computer vision technology, or any other type of technology known in the art and may be compared to figures in a preconfigured table that relates laser line position with distances between the image sensor and projection surfaces to find an estimated distance between the image sensor and the projection surface at the time that the image was captured. FIGS. 152A-152C demonstrates an embodiment of this concept. Similarly, the line laser may be positioned at an upward angle where the position of the laser line appears higher as the distance to the surface on which the laser line is projected increases. This laser distance measuring system may also be used for virtual confinement of a robotic device as detailed in U.S. patent application Ser. No. 15/674,310, the entire contents of which is hereby incorporated by reference. In embodiments, the preconfigured table may be constructed from actual measurements of laser line positioned at increments in a predetermined range of distances between the image sensor and the object surface upon which the laser line is projected.

In some embodiments, noise, such as sunlight, may cause interference wherein the image processor may incorrectly identify light other than the laser as the projected laser line in the captured image. The expected width of the laser line at a particular distance may be used to eliminate sunlight noise. A preconfigured table of laser line width corresponding to a range of distances may be constructed, the width of the laser line increasing as the distance to the obstacle upon which the laser light is projected decreases. In cases where the image processor detects more than one laser line in an image, the corresponding distance of both laser lines is determined. To establish which of the two is the true laser line, the width of both laser lines is determined and compared to the expected laser line width corresponding to the distance to the obstacle determined based on position of the laser line. In embodiments, any hypothesized laser line that does not have correct corresponding laser line width, to within a threshold, is discarded, leaving only the true laser line. In some embodiments, the laser line width may be determined by the width of pixels with high brightness. The width may be based on the average of multiple measurements along the length of the laser line.

In some embodiments, noise, such as sunlight, which may be misconstrued as the projected laser line, may be eliminated by detecting discontinuities in the brightness of pixels corresponding to the hypothesized laser line. For example, if there are two hypothesized laser lines detected in an image, the hypothesized laser line with discontinuity in pixel brightness, where for instance pixels 1 to 10 have high brightness, pixels 11-15 have significantly lower brightness and pixels 16-25 have high brightness, is eliminated as the laser line projected is continuous and, as such, large change in pixel brightness along the length of the line are unexpected. These methods for eliminating sunlight noise may be used independently, in combination with each other, or in combination with other methods during processing.

In some embodiments, ambient light may be differentiated from illumination of a laser in captured images by using an illuminator which blinks at a set speed such that a known sequence of images with and without the illumination is produced. For example, if the illuminator is set to blink at half the speed of the frame rate of a camera to which it is synched, the images captured by the camera produce a sequence of images wherein only every other image contains the illumination. This technique allows the illumination to be identified as the ambient light would be present in each captured image or would not be contained in the images in a similar sequence as to that of the illumination. In some embodiments, more complex sequences may be used. For example, a sequence wherein two images contain the illumination, followed by three images without the illumination and then one image with the illumination may be used. A sequence with greater complexity reduces the likelihood of confusing ambient light with the illumination. This method of eliminating ambient light may be used independently, or in combination with other methods for eliminating sunlight noise.

In some embodiments, a distance measuring system includes an image sensor, an image processor, and at least two laser emitters positioned at an angle such that they converge. The laser emitters project light points onto an object, which is captured by the image sensor. The image processor may extract geometric measurements and compare the geometric measurement to a preconfigured table that relates the geometric measurements with depth to the object onto which the light points are projected (see, U.S. patent application Ser. No. 15/224,442, the entire contents of which is hereby incorporated by reference). In cases where only two light emitters are used, they may be positioned on a planar line and for three or more laser emitters, the emitters are positioned at the vertices of a geometrical shape. For example, three emitters may be positioned at vertices of a triangle or four emitters at the vertices of a quadrilateral. This may be extended to any number of emitters. In these cases, emitters are angled such that they converge at a particular distance. For example, for two emitters, the distance between the two points may be used as the geometric measurement. For three of more emitters, the image processer measures the distance between the laser points (vertices of the polygon) in the captured image and calculates the area of the projected polygon. The distance between laser points and/or area may be used as the geometric measurement. The preconfigured table may be constructed from actual geometric measurements taken at incremental distances from the object onto which the light is projected within a specified range of distances. Regardless of the number of laser emitters used, they shall be positioned such that the emissions coincide at or before the maximum effective distance of the distance measuring system, which is determined by the strength and type of laser emitters and the specifications of the image sensor used. Since the laser light emitters are angled toward one other such that they converge at some distance, the distance between projected laser points or the polygon area with projected laser points as vertices decrease as the distance from the surface onto which the light is projected increases. As the distance from the surface onto which the light is projected increases the collimated laser beams coincide and the distance between laser points or the area of the polygon becomes null.

In some embodiments, projected laser light in an image may be detected by identifying pixels with high brightness. The same methods for eliminating noise, such as sunlight, as described above may be applied when processing images in any of the depth measuring systems described herein. Furthermore, a set of predetermined parameters may be defined to ensure the projected laser lights are correctly identified. For example, parameters may include, but is not limited to, light points within a predetermined vertical range of one another, light points within a predetermined horizontal range of one another, a predetermined number of detected light points detected, and a vertex angle within a predetermine range of degrees.

Traditional spherical camera lenses are often affected by spherical aberration, an optical effect that causes light rays to focus at different points when forming an image, thereby degrading image quality. In cases where, for example, the distance is estimated based on the position of a projected laser point or line, image resolution is important. To compensate for this, in embodiments, a lens with uneven curvature may be used to focus the light rays at a single point. Further, with traditional spherical lens camera, the frame will have variant resolution across it, the resolution being different for near and far objects. To compensate for this uneven resolution, in embodiments, a lens with aspherical curvature may be positioned in front of the camera to achieve uniform focus and even resolution for near and far objects captured in the frame. In some embodiments, the distance estimation device further includes a band-pass filter to limit the allowable light. In some embodiments, the baseplate and components thereof are mounted on a rotatable base so that distances may be estimated in 360 degrees of a plane.

In some embodiments, two-dimensional imaging sensors may be used. In other embodiments, one-dimensional imaging sensors may be used. In some embodiments, one-dimensional imaging sensors may be combined to achieve readings in more dimensions. For example, to achieve similar results as two-dimensional imaging sensors, two one-dimensional imaging sensors may be positioned perpendicularly to one another. In some instances, one-dimensional and two-dimensional imaging sensors may be used together.

Figure 153A:
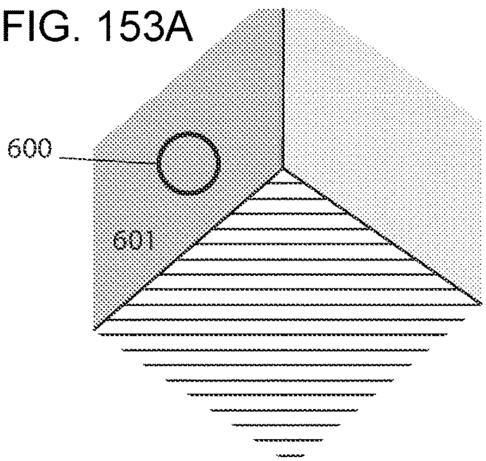
Figure 153B:
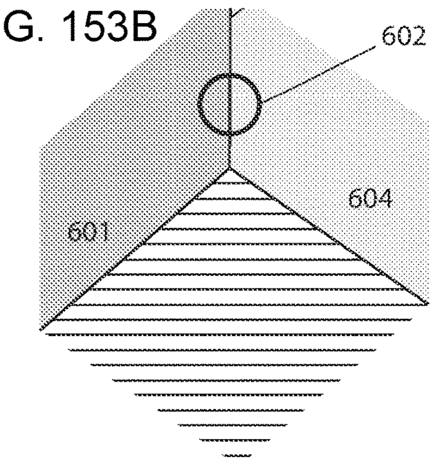
Figure 153C:
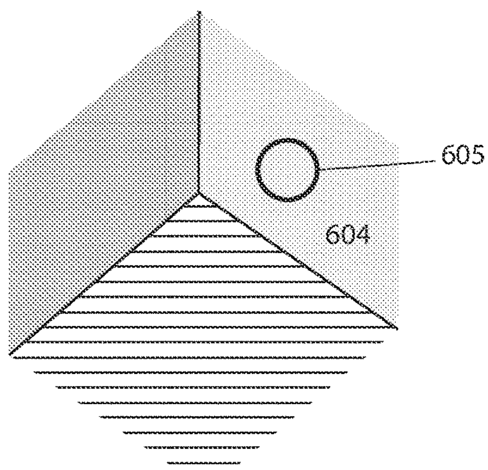
Figure 153D:
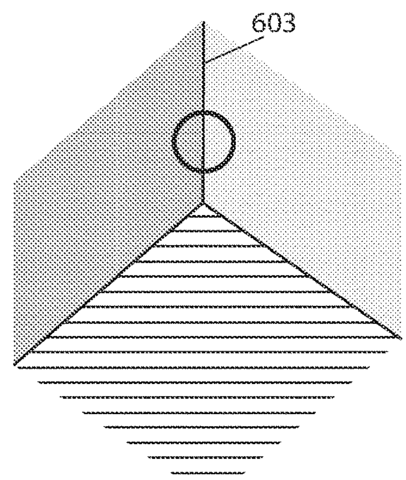
Figure 153E:
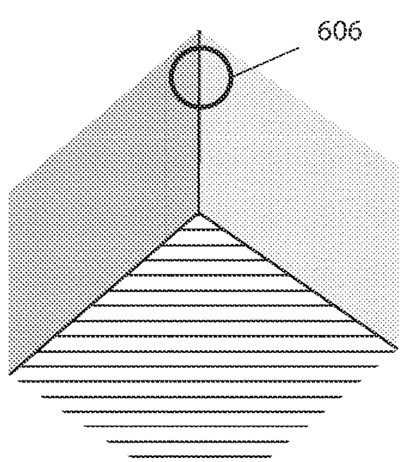
Figure 153F:
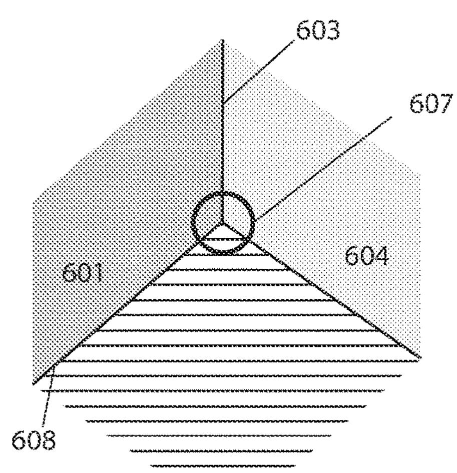

In some embodiments, the camera or image sensor used may provide additional features in addition to being used in the process of estimating distance to objects. For example, pixel intensity used in inferring distance may also be used for detecting corners as changes in intensity are usually observable at corners. FIGS. 153A-153F illustrates an example of how a corner may be detected by a camera. The process begins with the camera considering area 600 on wall 601 and observing the changes in color intensity as shown in FIG. 153A. After observing insignificant changes in color intensity, the camera moves on and considers area 602 with edge 603 joining walls 601 and 604 and observes large changes in color intensity along edge 603 as illustrated in FIG. 153B. In FIG. 153C the camera moves to the right to consider another area 605 on wall 604 and observes no changes in color intensity. In FIG. 153D it returns back to edge 603 then moves upward to consider area 606 as shown in FIG. 153E and observes changes in color intensity along edge 603. Finally, in FIG. 153F the camera moves down to consider area 607 with edges 603 and 608 joining walls 601 and 604 and floor 609. Changes in color intensity are observed along edge 603 and along edge 607. Upon discovering changes in color intensity in two directions by a processor of the camera, a corner is identified. In other instances, changes in pixel intensities may be identified by a processor of a robotic device or an image processor to which the camera is coupled or other similar processing devices. These large changes in intensity may be mathematically represented by entropy where high entropy signifies large changes in pixel intensity within a particular area. In some embodiments, the processor may determined entropy using $H(X)=-\sum_{i=1}^{n}P(x_i)\log P(x_i)$, wherein $X=(x_1, x_2, \ldots, x_n)$ is a collection of possible pixel intensities, each pixel intensity represented by a digital number. $P(x_i)$ is the probability of a pixel having pixel intensity value $x_i$. $P(x_i)$ may be determined by counting the number of pixels within a specified area of interest with pixel intensity value $x_i$ and dividing that number by the total number of pixels within the area considered. If there are no changes or very small changes in pixel intensity in an area then H(X) will be very close to a value of zero. Alternatively, the pixel values of one reading (such as those with 90 numbers) may be mapped to a continuous function and the derivative of that function considered to find areas with large changes in pixel values. With the derivative being the slope, a derivative of zero would be indicative of no change in pixel value while a derivative approaching 1 would be indicative of a large change in pixel values.

Figure 154A:
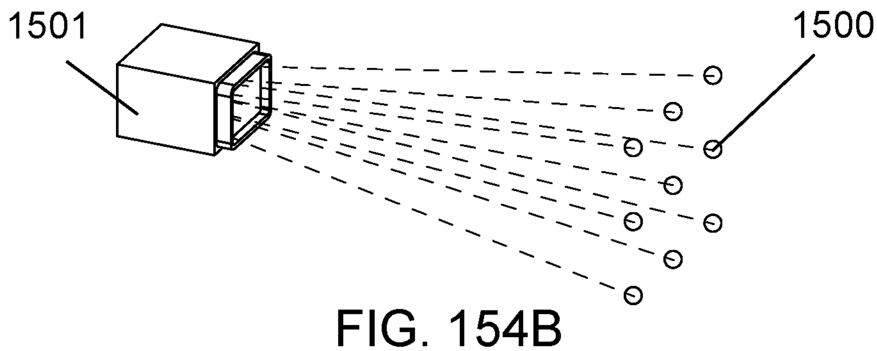
Figure 154B:
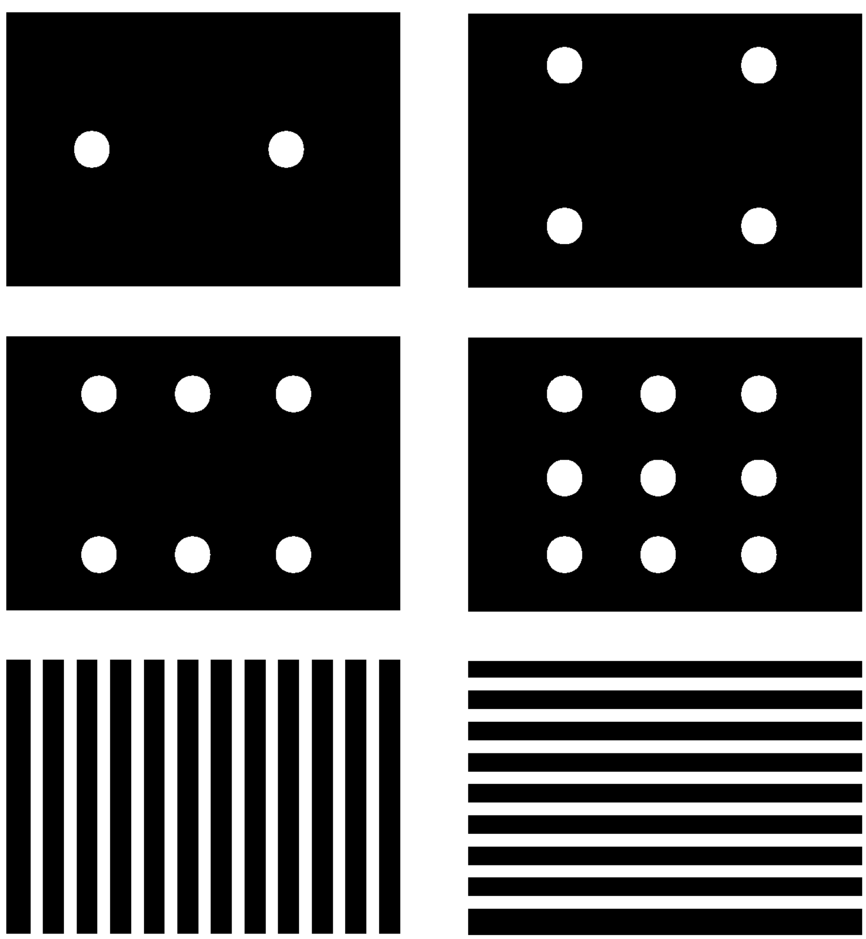
Figure 155A:
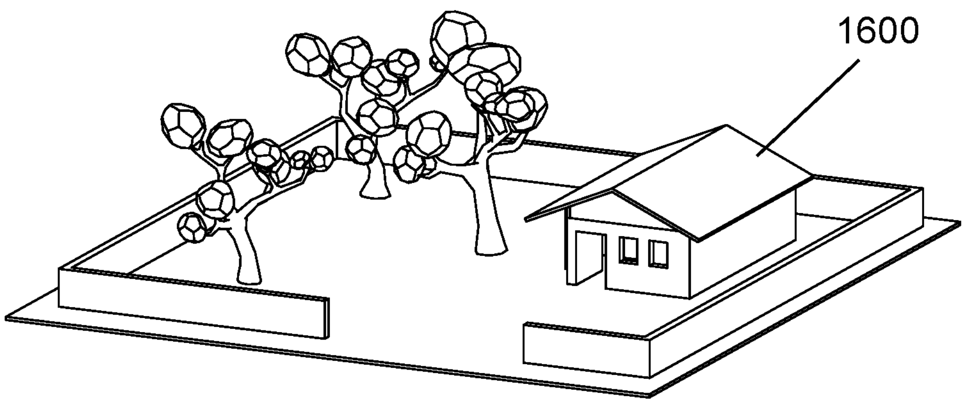
Figure 155B:
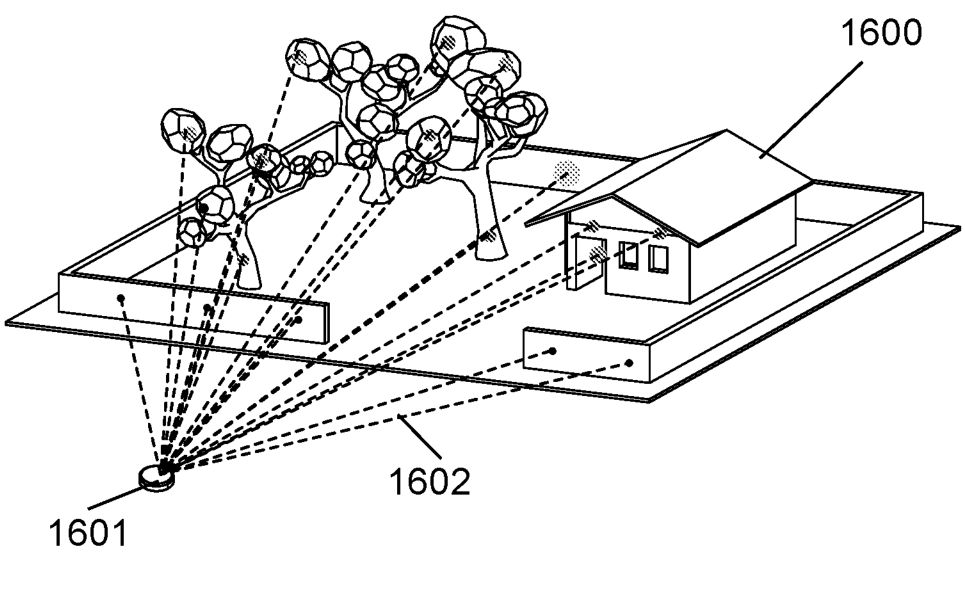
Figure 155C:
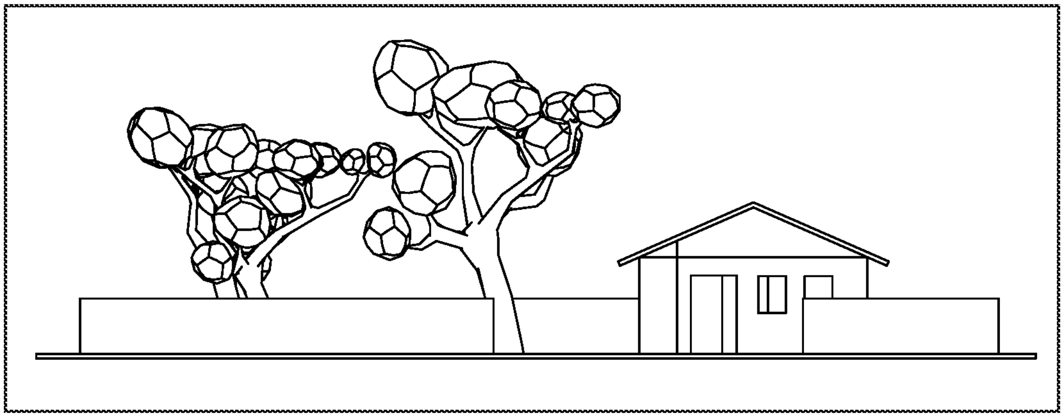
Figure 155D:
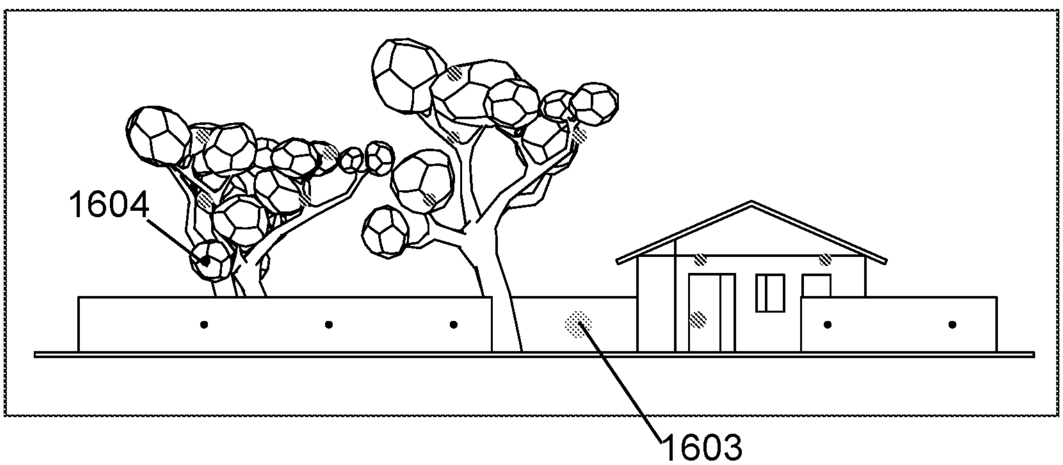
Figure 155E:
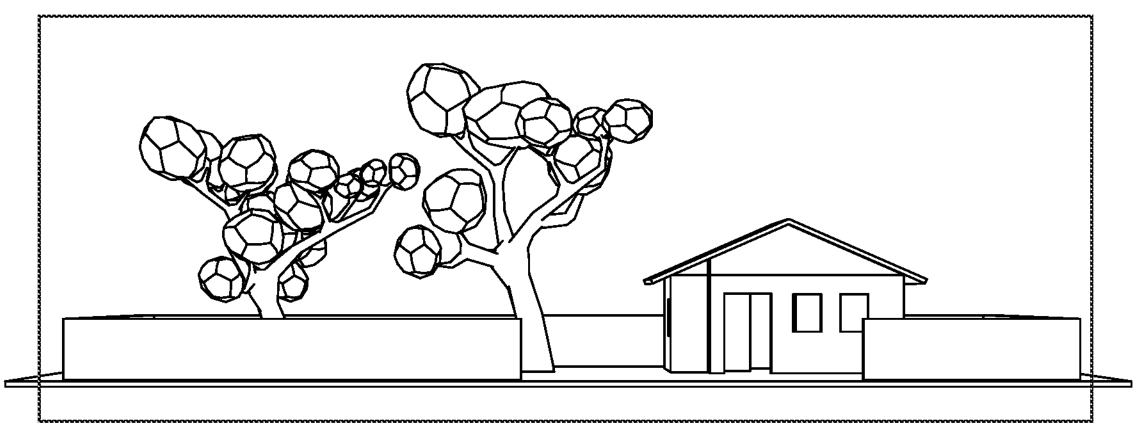

In some embodiments, structured light, such as a laser light, may be used to infer the distance to objects within the environment. FIG. 154A illustrates an example of a structured light pattern 1500 emitted by laser diode 1501. The light pattern 1500 includes three rows of three light points. FIG. 154B illustrates examples of different light patterns including light points and lines (shown in white). In some embodiments, time division multiplexing may be used for point generation. In some embodiments, a light pattern may be emitted onto objects surfaces within the environment. In some embodiments, an image sensor may capture images of the light pattern projected onto the object surfaces. In some embodiments, the processor of the robot may infer distances to the objects on which the light pattern is projected based on the distortion, sharpness, and size of light points in the light pattern and the distances between the light points in the light pattern in the captured images. In some embodiments, the processor may infer a distance for each pixel in the captured images. In some embodiments, the processor may label and distinguish items in the images (e.g., two dimensional images). In some embodiments, the processor may create a three dimensional image based on the inferred distances to objects in the captured images. FIG. 155A illustrates an environment 1600. FIG. 155B illustrates a robot 1601 with a laser diode emitting a light pattern 1602 onto surfaces of objects within the environment 1600. FIG. 155C illustrates a captured two dimensional image of the environment 1600. FIG. 155D illustrates a captured image of the environment 1600 including the light pattern 1602 projected onto surfaces of objects within the environment 1600. Some light points in the light pattern, such as light point 1603, appear larger and less concentrated, while other light points, such as light points 1604, appear smaller and sharper. Based on the size, sharpness, and distortion of the light points and the distances between the light points in the light pattern 1602, the processor of the robot 1601 may infer the distance to the surfaces on which the light points are projected. The processor may infer a distance for each pixel within the captured image and create a three dimensional image, such as that illustrated in FIG. 155E. In some embodiments, the images captured may be infrared images. Such images may capture live objects, such as humans and animals. In some embodiments, a spectrometer may be used to determine texture and material of objects.

Figure 156:
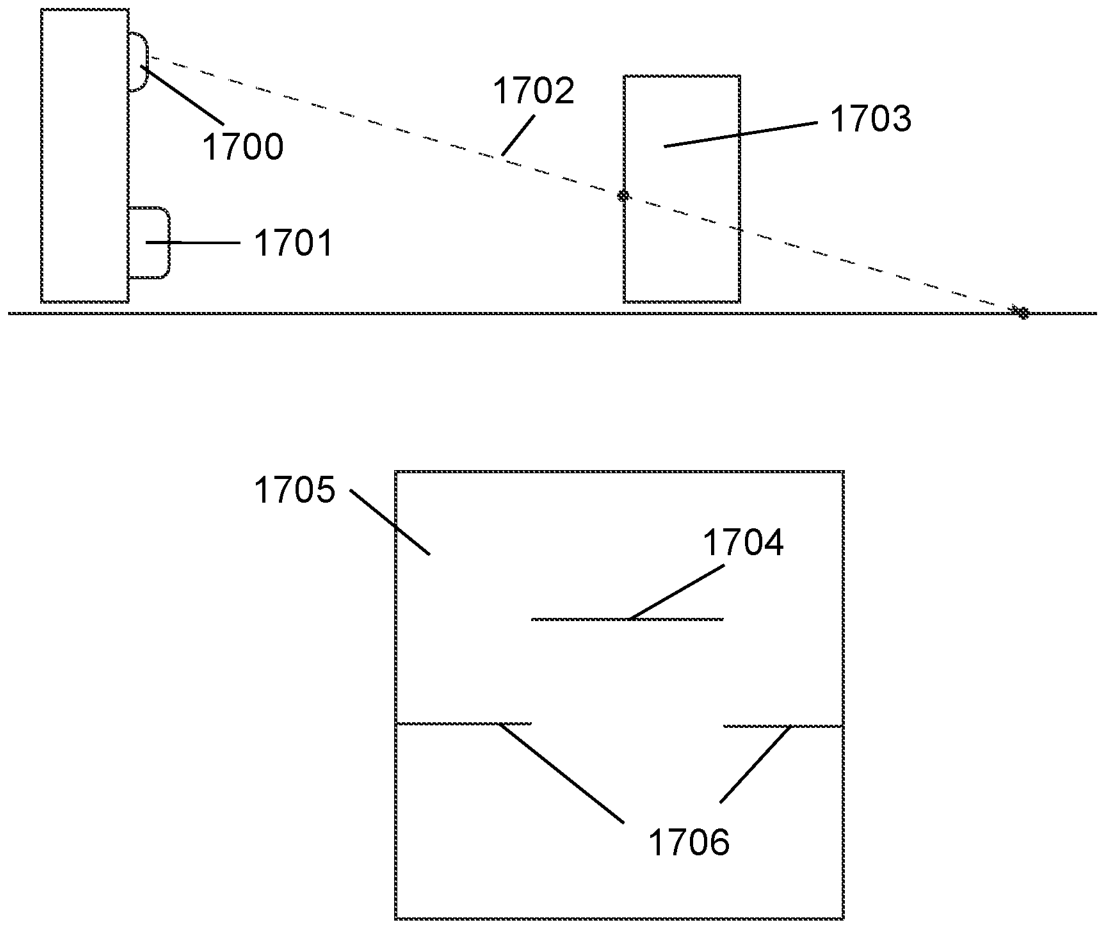
Figure 157:
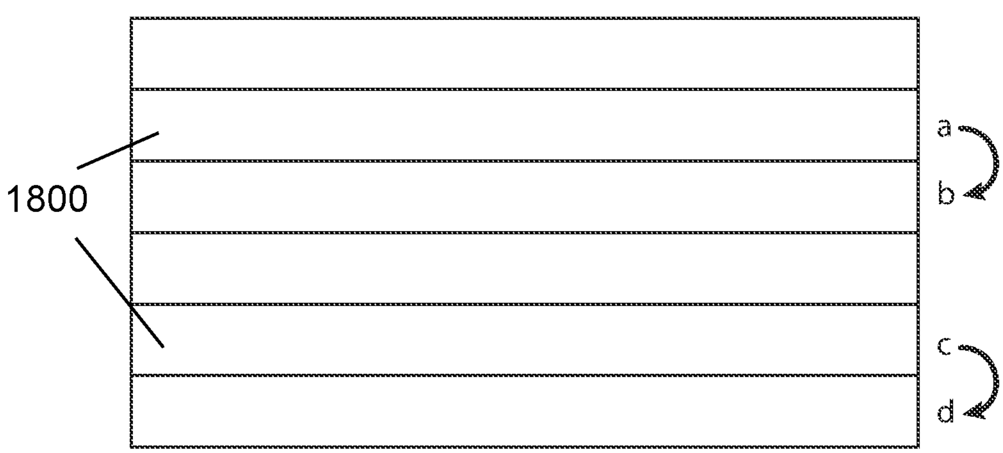
Figure 158:
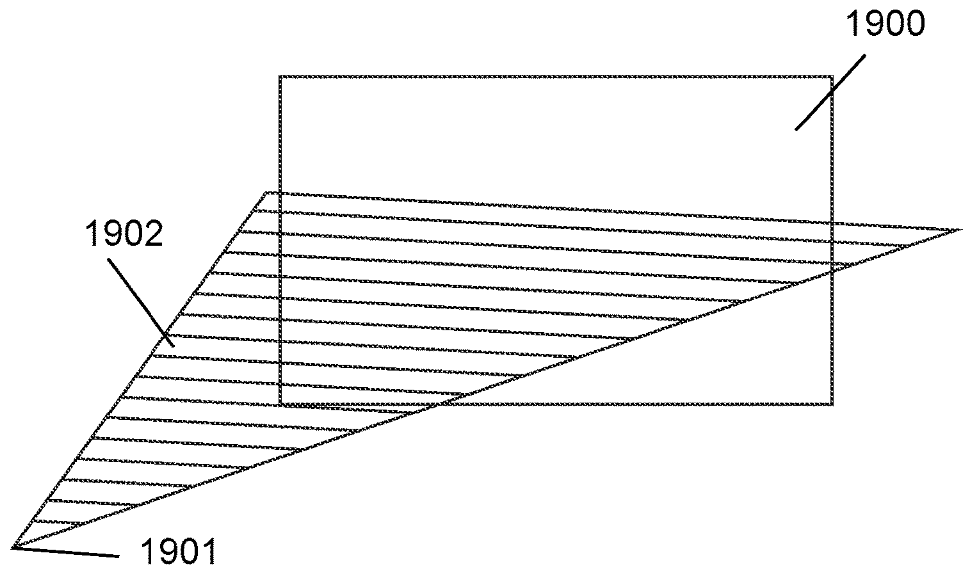
Figure 159A:
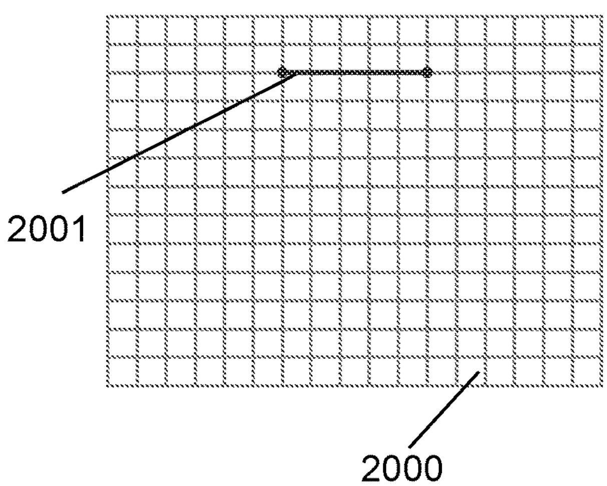
Figure 159B:
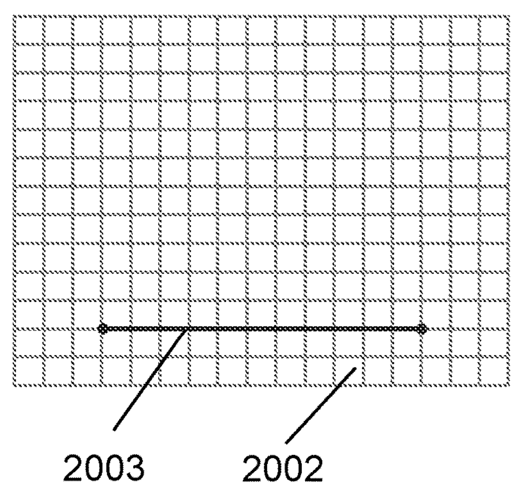
Figure 160A:
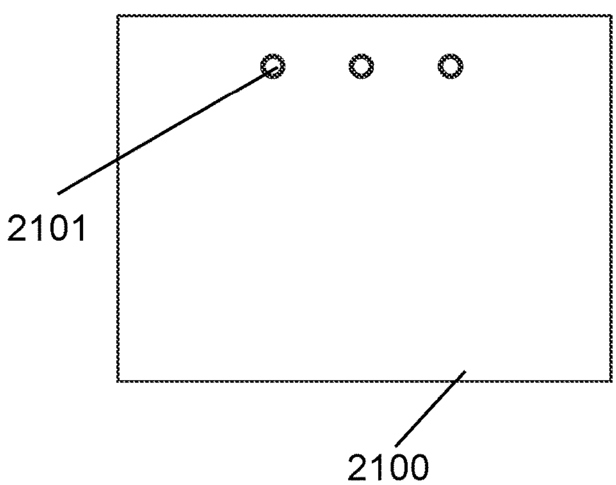
Figure 160B:
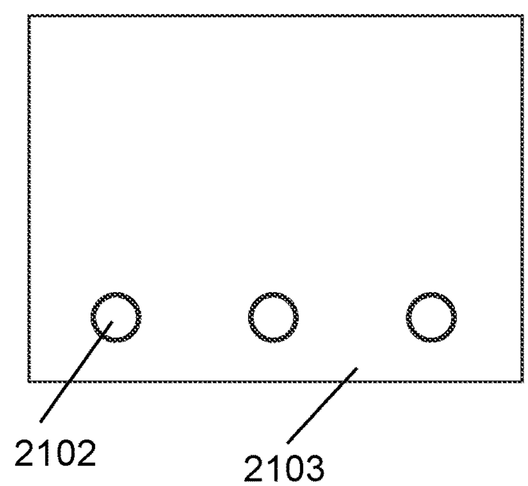

Some embodiments may include a light source, such as laser, positioned at an angle with respect to a horizontal plane and a camera. The light source may emit a light onto surfaces of objects within the environment and the camera may capture images of the light source projected onto the surfaces of objects. In some embodiments, the processor may estimate a distance to the objects based on the position of the light in the captured image. For example, for a light source angled downwards with respect to a horizontal plane, the position of the light in the captured image appears higher relative to the bottom edge of the image when the object is closer to the light source. FIG. 156 illustrates a light source 1700 and a camera 1701. The light source 1700 emits a laser light 1702 onto the surface of object 1703. The camera 1701 captures an image 1705 of the projected light. The processor may extract the laser light line 1704 from the captured image 1705 by identifying pixels with high brightness. The processor may estimate the distance to the object 1703 based on the position of the laser light line 1704 in the captured image 1705 relative to a bottom or top edge of the image 1705. Laser light lines 1706 may correspond with other objects further away from the robot than object 1703. In some cases, the resolution of the light captured in an image is not linearly related to the distance between the light source projecting the light and the object on which the light is projected. For example, FIG. 157 illustrates areas 1800 of a captured image which represent possible positions of the light within the captured image relative to a bottom edge of the image. The difference in the determined distance of the object between when the light is positioned in area a and moved to area b is not the same as when the light is positioned in area c and moved to area d. In some embodiments, the processor may determine the distance by using a table relating position of the light in a captured image to distance to the object on which the light is projected. In some embodiments, using the table comprises finding a match between the observed state and a set S of acceptable (or otherwise feasible) values. In embodiments, the size of the projected light on the surface of an object may also change with distance, wherein the projected light may appear smaller when the light source is closer to the object. FIG. 158 illustrates an object surface 1900, an origin 1901 of a light source emitting a laser line, and a visualization 1902 of the size of the projected laser line for various hypothetical object distances from the origin 1901 of the light source. As the hypothetical object distances decrease and the object becomes closer to the origin 1901 of the light source, the projected laser line appears smaller. Considering that both the position of the projected light and the size of the projected light change based on the distance of the light source from the object on which the light is projected, FIG. 159A illustrates a captured image 2000 of a projected laser line 2001 emitted from a laser positioned at a downward angle. The captured image 2000 is indicative of the light source being close to the object on which the light was projected as the line 2001 is positioned high relative to a bottom edge of the image 2000 and the size of the projected laser line 2001 is small. FIG. 159B illustrates a captured image 2002 of the projected laser line 2003 indicative of the light source being further from the object on which the light was projected as the line 2004 is positioned low relative to a bottom edge of the image 2002 and the size of the projected laser line 2003 is large. This same observation is made regardless of the structure of the light emitted. For instance, the same example as described in FIGS. 159A and 159B are shown for structured light points in FIGS. 160A and 160B. The light points 2100 in image 2101 appear smaller and are positioned higher relative to a bottom edge of the image 2100 as the object is positioned closer to the light source. The light points 2102 in image 2103 appear larger and are positioned lower relative to the bottom edge of the image 2102 as the object is positioned further away from the light source. In some cases, other features may be correlated with distance of the object. The examples provided herein are for the simple case of light project on a flat object surface, however, in reality object surfaces may be more complex and the projected light may scatter differently in response. To solve such complex situations, optimization may be used to provide a value that is most descriptive of the observation. In some embodiments, the optimization may be performed at the sensor level such that processed data is provided to the higher level AI algorithm. In some embodiments, the raw sensor data may be provided to the higher level AI algorithm and the optimization may be performed by the AI algorithm.

Figure 162A:
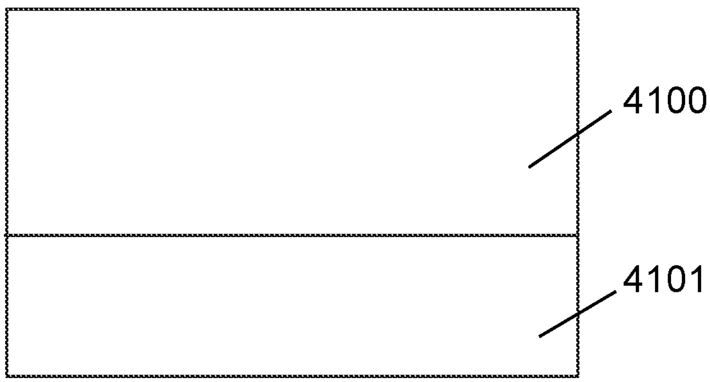
Figure 162B:
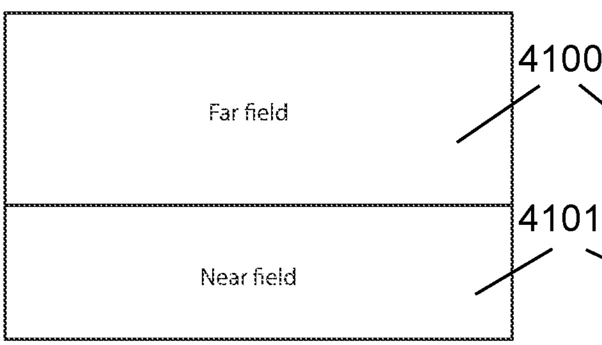
Figure 162C:
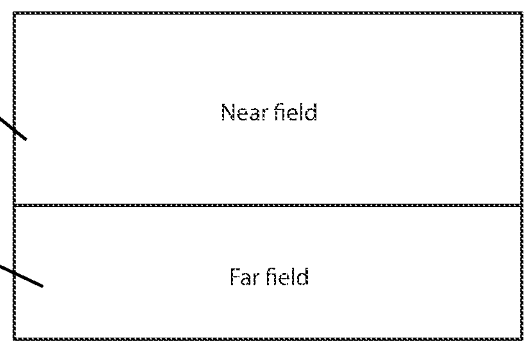
Figure 163A:
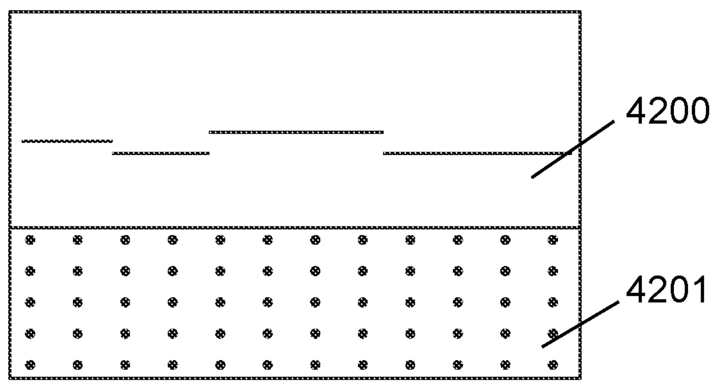
Figure 163B:
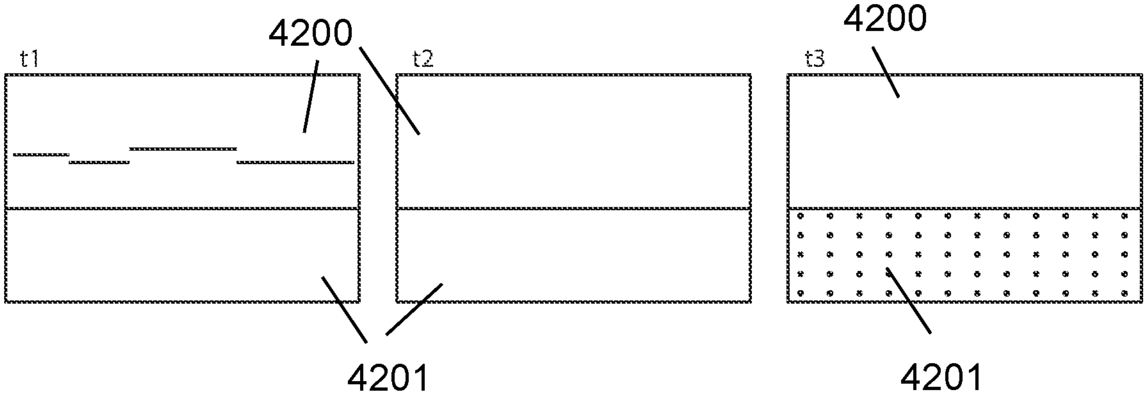
Figure 163C:
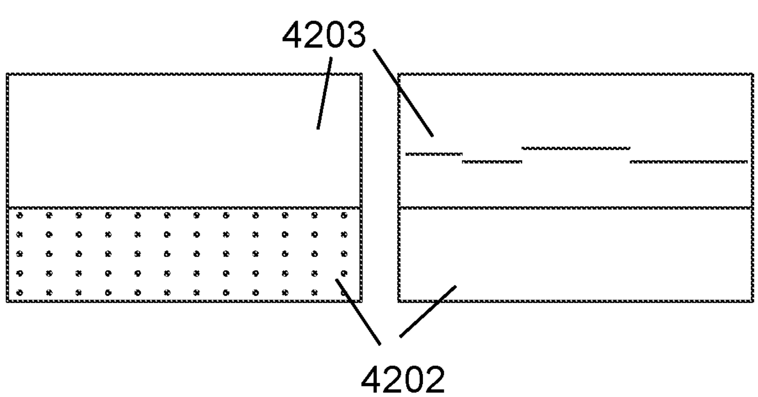

In some embodiments, an emitted structured light may have a particular color and particular color. In some embodiments, more than one structured light may be emitted. In embodiments, this may improve the accuracy of the predicted feature or face. For example, a red IR laser or LED and a green IR laser or LED may emit different structured light patterns onto surfaces of objects within the environment. The green sensor may not detect (or may less intensely detects) the reflected red light and vice versa. In a captured image of the different projected structured lights, the values of pixels corresponding with illuminated object surfaces may indicate the color of the structured light projected onto the object surfaces. For example, a pixel may have three or four values, such as R (red), G (green), B (blue), and I (intensity), that may indicate to which structured light pattern the pixel corresponds to. FIG. 161A illustrates an image 4000 with a pixel 4001 having values of R, G, B, and I. FIG. 161B illustrates a first structured light pattern 4002 emitted by a green IR or LED sensor. FIG. 161C illustrates a second structured light pattern 4003 emitted by a red IR or LED sensor. FIG. 161D illustrates an image 4004 of light patterns 4002 and 4003 projected onto an object surface. FIG. 161E illustrates the structured light pattern 4002 that is observed by the green IR or LED sensor despite the red structured light pattern 4003 emitted on the same object surface. FIG. 161F illustrates the structured light pattern 4003 that is observed by the red IR or LED sensor despite the green structured light pattern 4002 emitted on the same object surface. In some embodiments, the processor divides an image into two or more sections. In some embodiments, the processor may use the different sections for different purposes. For example, FIG. 162A illustrates an image divided into two sections 4100 and 4101. FIG. 162B illustrates section 4100 used as a far field of view and 4101 as a near field of view. FIG. 162C illustrates the opposite. FIG. 163A illustrates another example, wherein a top section 4200 of an image captures a first structured light pattern projected onto object surfaces and bottom section 4201 captures a second structured light pattern projected onto object surfaces. Structured light patterns may be the same or different color and may be emitted by the same or different light sources. In some cases, sections of the image may capture different structured light patterns at different times. For instance, FIG. 163B illustrates three images captured at three different times. At each time point different patterns are captured in the top section 4200 and bottom section 4201. In embodiments, the same or different types of light sources (e.g., LED, laser, etc.) may be used to emit the different structure light patterns. For example, FIG. 163C illustrates a bottom section 4202 of an image capturing a structured light pattern emitted by an IR LED and a top section 4203 of an image capturing a structured light pattern emitted by a laser. In some cases, the same light source mechanically or electronically generates different structured light patterns at different time slots. In embodiments, images may be divided into any number of sections. In embodiments, the sections of the images may be various different shapes (e.g., diamond, triangle, rectangle, irregular shape, etc.). In embodiments, the sections of the images may be the same or different shapes.

Figure 164A:
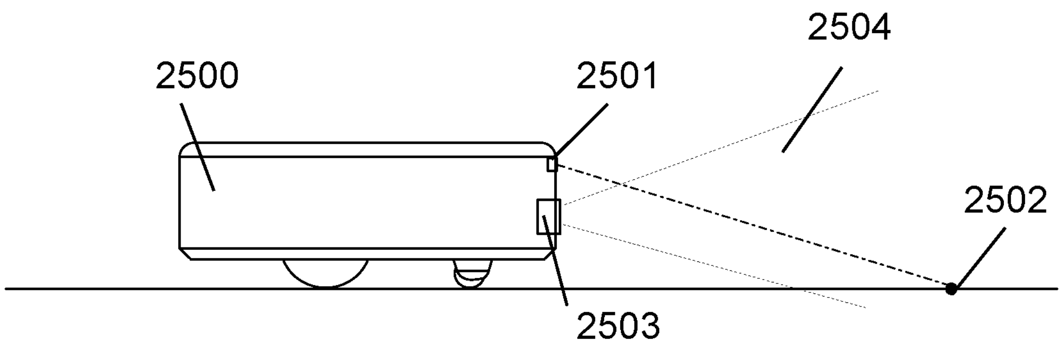
Figure 164B:
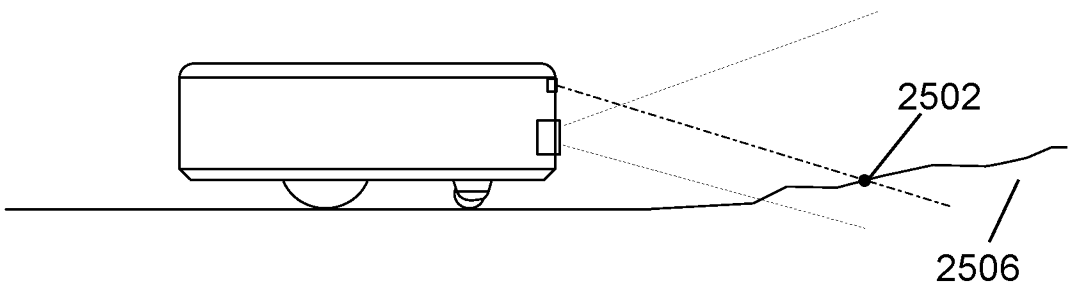
Figure 164C:
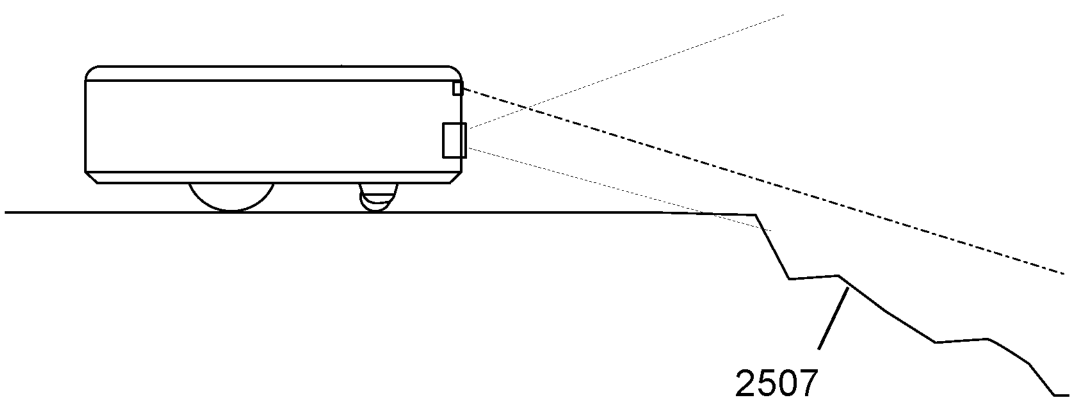
Figure 165A:
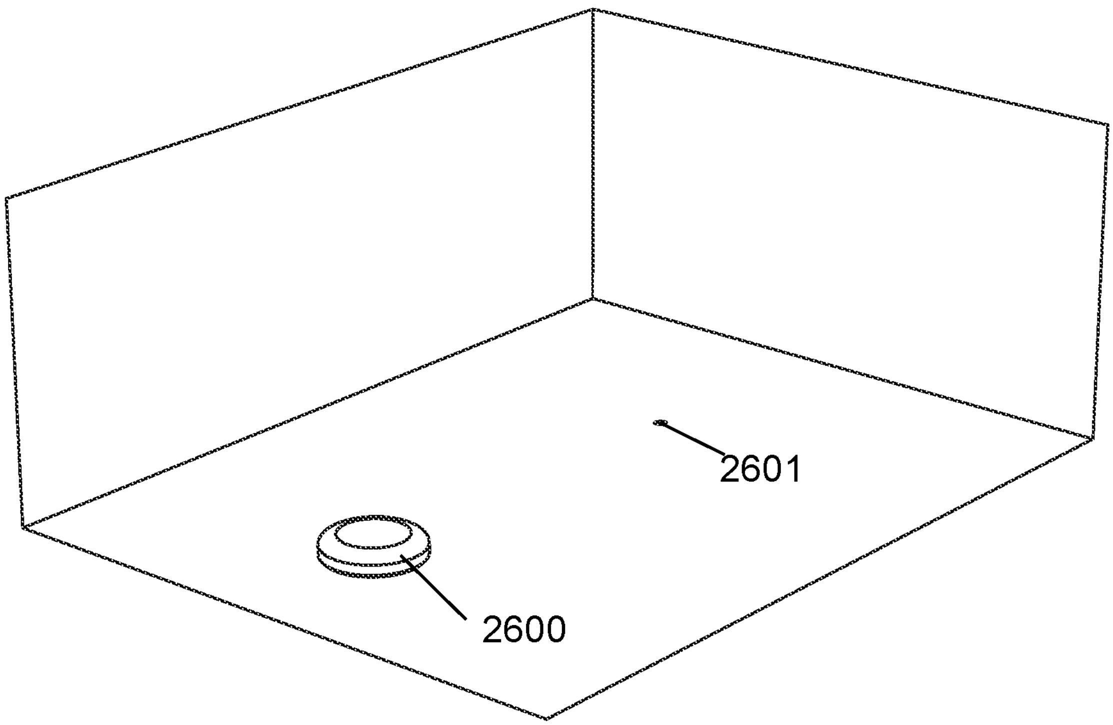
Figure 165B:
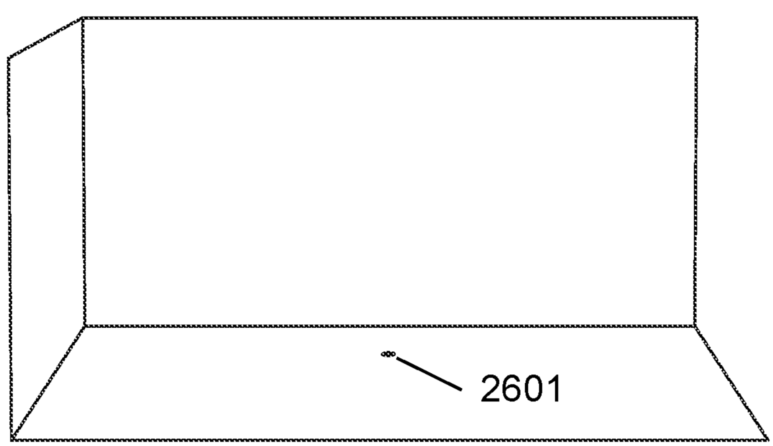
Figure 165C:
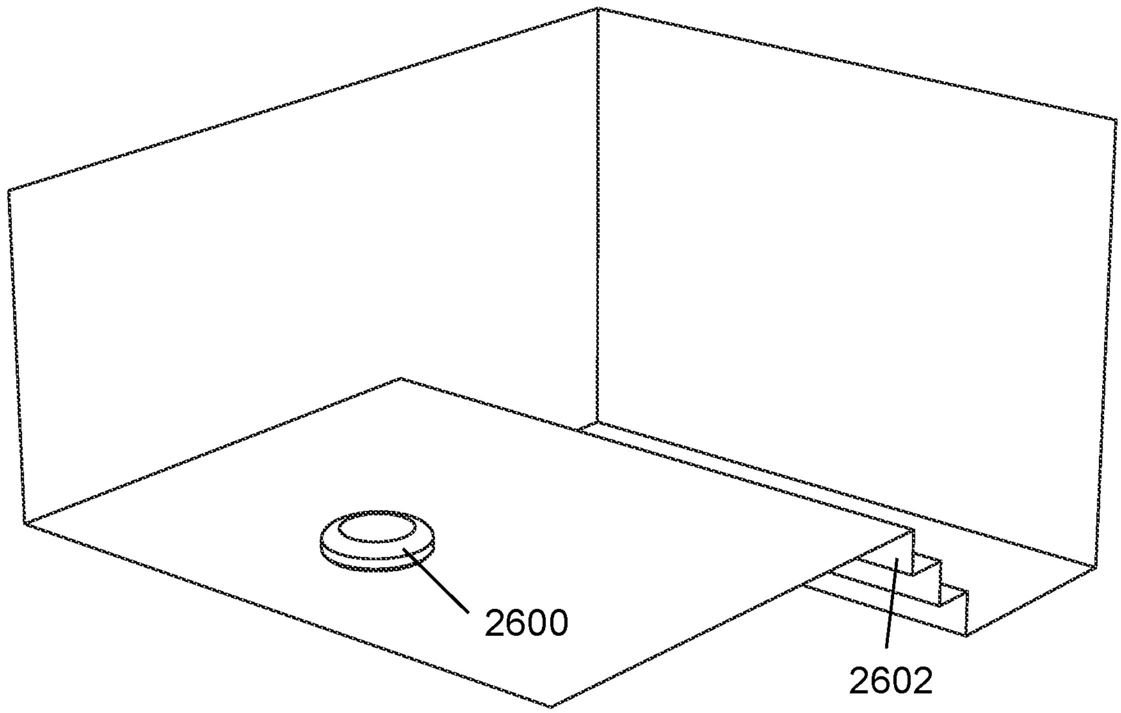
Figure 165D:
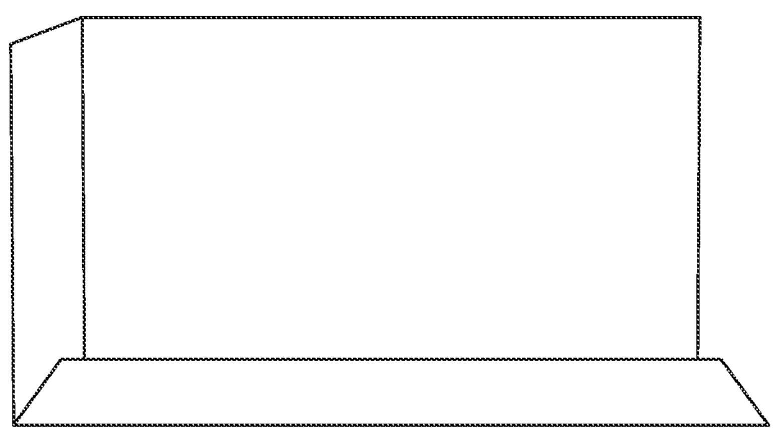
Figure 165E:
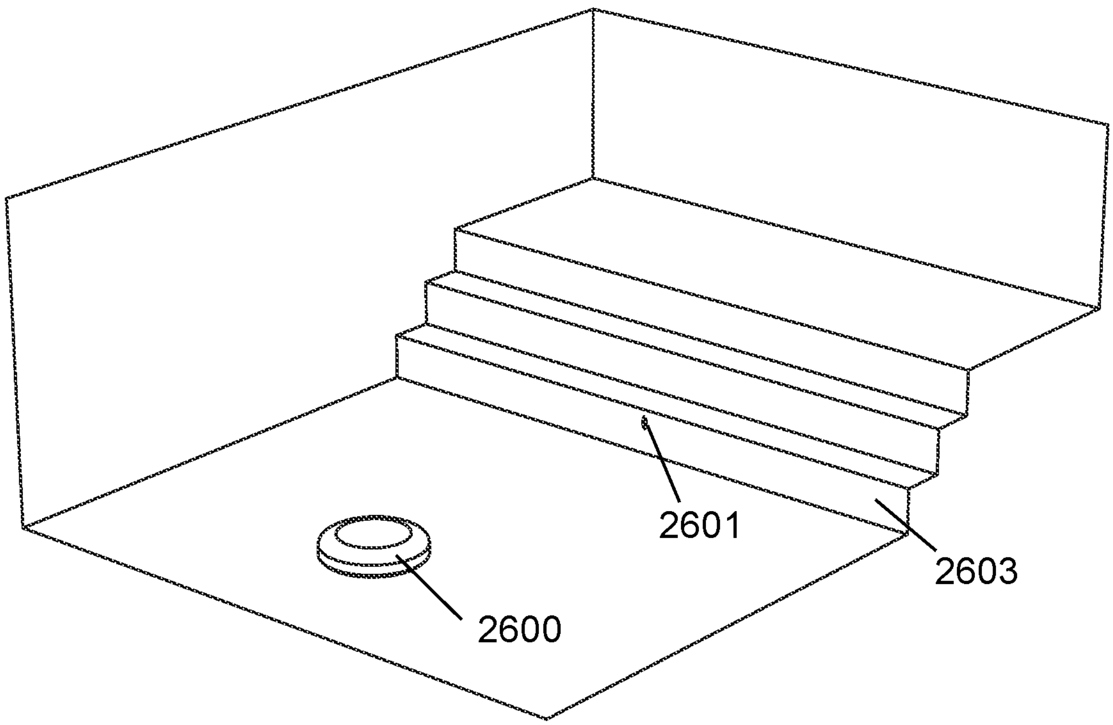
Figure 165F:
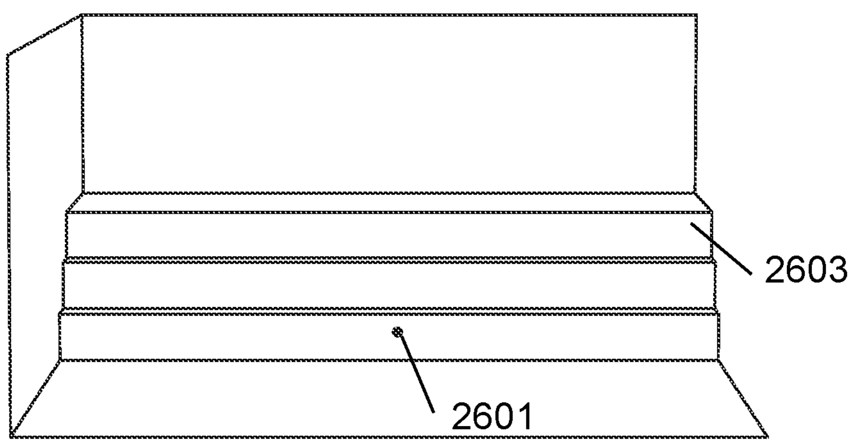

In some embodiments, the robot may include an LED or flight sensor to measure distance to an obstacle. In some embodiments, the angle of the sensor is such that the emitted point reaches the driving surface at a particular distance in front of the robot (e.g., one meter). In some embodiments, the sensor may emit a point. In some embodiments, the point may be emitted on an obstacle. In some embodiments, there may be no obstacle to intercept the emitted point and the point may be emitted on the driving surface, appearing as a shiny point on the driving surface. In some embodiments, the point may not appear on the ground when the floor is discontinued. In some embodiments, the measurement returned by the sensor may be greater than the maximum range of the sensor when no obstacle is present. In some embodiments, a cliff may be present when the sensor returns a distance greater than a threshold amount from one meter. FIG. 164A illustrates a robot 2500 with an LED sensor 2501 emitting a light point 2502 and a camera 2503 with a FOV 2504. The LED sensor 2501 may be configured to emit the light point 2502 at a downward angle such that the light point 2502 strikes the driving surface at a predetermined distance in front of the robot 2500. The camera 2503 may capture an image within its FOV 2504. The light point 2502 is emitted on the driving surface 2505. The distance returned may be the predetermined distance in front of the robot 2500 as there are no obstacles in sight to intercept the light point 2502. In FIG. 164B the light point 2502 is emitted on an obstacle 2506 and the distance returned may be a distance smaller than the predetermined distance. In FIG. 164C the robot 2500 approaches a cliff 2507 and the emitted light is not intercepted by an obstacle or the driving surface. The distance returned may be a distance greater than a threshold amount from the predetermined distance in front of the robot 2500. FIG. 165A illustrates another example of a robot 2600 emitting a light point 2601 on the driving surface a predetermined distance in front of the robot 2600. FIG. 165B illustrates a FOV of a camera of the robot 2600. In FIG. 165C the light point 2601 is not visible as a cliff 2602 is positioned in front of the robot 2600 and in a location on which the light point 2601 would have been projected had there been no cliff 2602. FIG. 165D illustrates the FOV of the camera, wherein the light point 2601 is not visible. In FIG. 165E the light point 2601 is intercepted by an obstacle 2603. FIG. 165F illustrates the FOV of the camera. In some embodiments, the processor of the robot may use Bayesian inference to predict the presence of an obstacle or a cliff. For example, the processor of the robot may infer that an obstacle is present when the light point in a captured image of the projected light point is not emitted on the driving surface as is intercepted by another object. Before reacting, the processor may require a second observation confirming that an obstacle is in fact present. The second observation may be the distance returned by the sensor being less than a predetermined distance. After the second observation, the processor of the robot may instruct the robot to slow down. In some embodiments, the processor may continue to search for additional validation of the presence of the obstacle or lack thereof or the presence of a cliff. In some embodiments, the processor of the robot may add an obstacle or cliff to the map of the environment. In some embodiments, the processor of the robot may inflate the area occupied by an obstacle when a bumper of the robot is activated as a result of a collision.

In some embodiments depth from de-focus technique may be used to estimate the depths of objects captured in images. FIGS. 166A and 166B illustrates an embodiment using this technique. In FIG. 166A, light rays 700, 701, and 702 are radiated by object point 703. As light rays 700, 701 and 702 pass aperture 704, they are refracted by lens 705 and converge at point 706 on image plane 707. Since image sensor plane 708 coincides with image plane 707, a clear focused image is formed on image plane 707 as each point on the object is clearly projected onto image plane 707. However, if image sensor plane 708 does not coincide with image plane 707 as is shown in FIG. 166B, the radiated energy from object point 703 is not concentrated at a single point, as is shown at point 706 in FIG. 166A, but is rather distributed over area 709 thereby creating a blur of object point 703 with radius 710 on displaced image sensor plane 708. In embodiments, two de-focused image sensors may use the generated blur to estimate depth of an object, known as depth from de-focus technique. For example, with two image sensor planes 708 and 711 separated by known physical distance 712 and with blurred areas 709 having radii 710 and 713 having radii 714, distances 715 and 716 from image sensor planes 708 and 711, respectively, to image plane 707 may be determined by the processor using $$R_1 = \frac{L\delta_1}{2v},\ R_2 = \frac{L\delta_2}{2v},\ \text{and}\ \beta = \delta_1 + \delta_2,$$

wherein $R_1$ and $R_2$ are blur radii 710 and 714 determined from formed images on sensor planes 708 and 711, respectively. $\delta_1$ and $\delta_2$ are distances 715 and 716 from image sensor planes 708 and 711, respectively, to image plane 707. L is the known diameter of aperture 704, v is distance 717 from lens 705 to image plane 707 and $\beta$ is known physical distance 712 separating image sensor planes 708 and 711. Since the value of v is the same in both radii equations ($R_1$ and $R_2$), the two equations may be rearranged and equated and using $\beta=\delta_1+\delta_2$, both $\delta_1$ and $\delta_2$ may be determined. Given $\gamma$, known distance 718 from image sensor plane 708 to lens 705, v may be determined by the processor using $v=\gamma-\delta_1$. For a thin lens, v may be related to $f$, focal length 719 of lens 705 and u, distance 720 from lens 705 to object point 703 using $$\frac{1}{f} = \frac{1}{v} + \frac{1}{u}.$$

Given that $f$ and v are known, the depth of the object u may be determined.

Figure 167A:
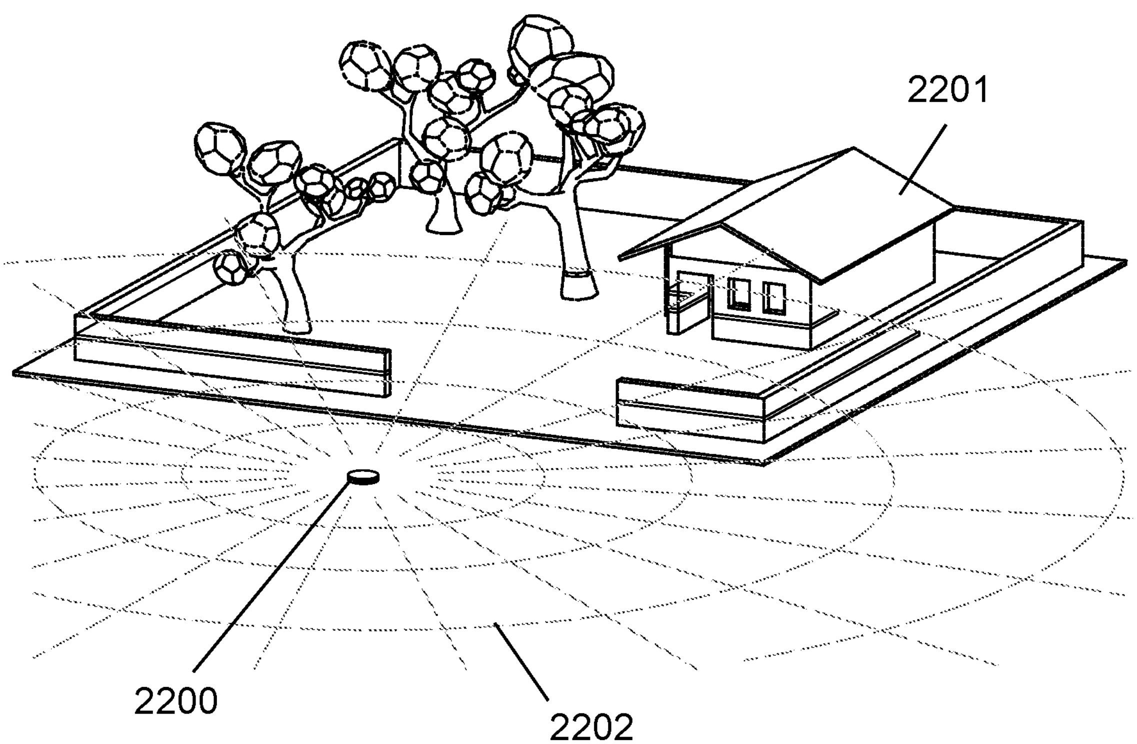
Figure 167B:
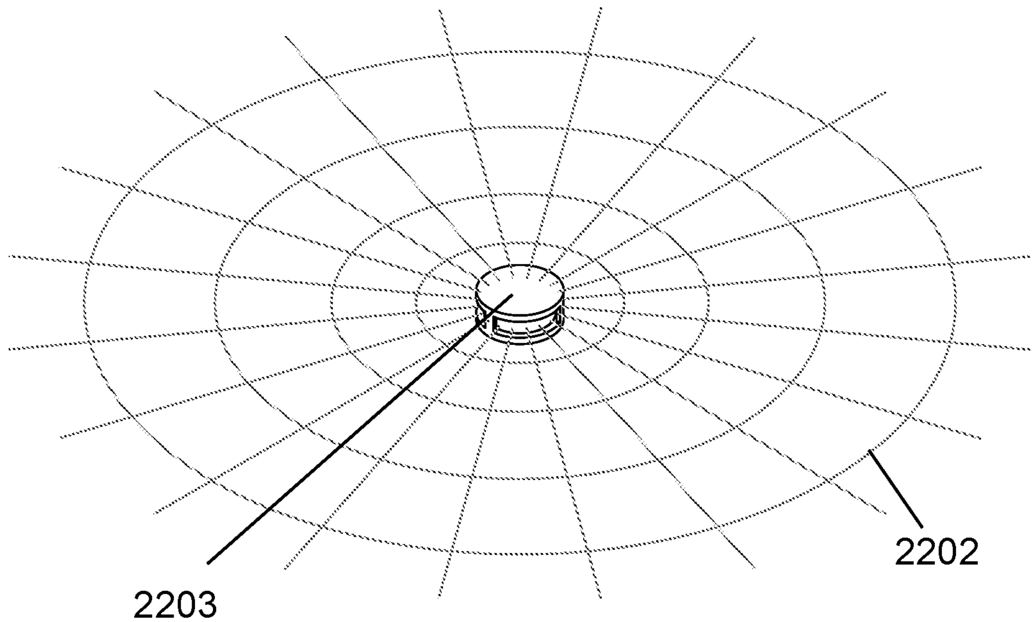
Figure 167C:
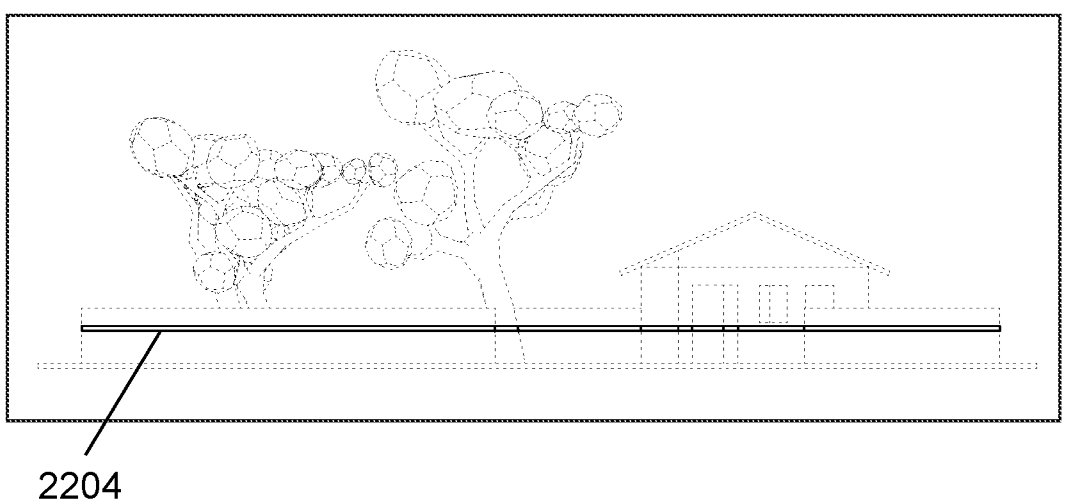
Figure 168A:
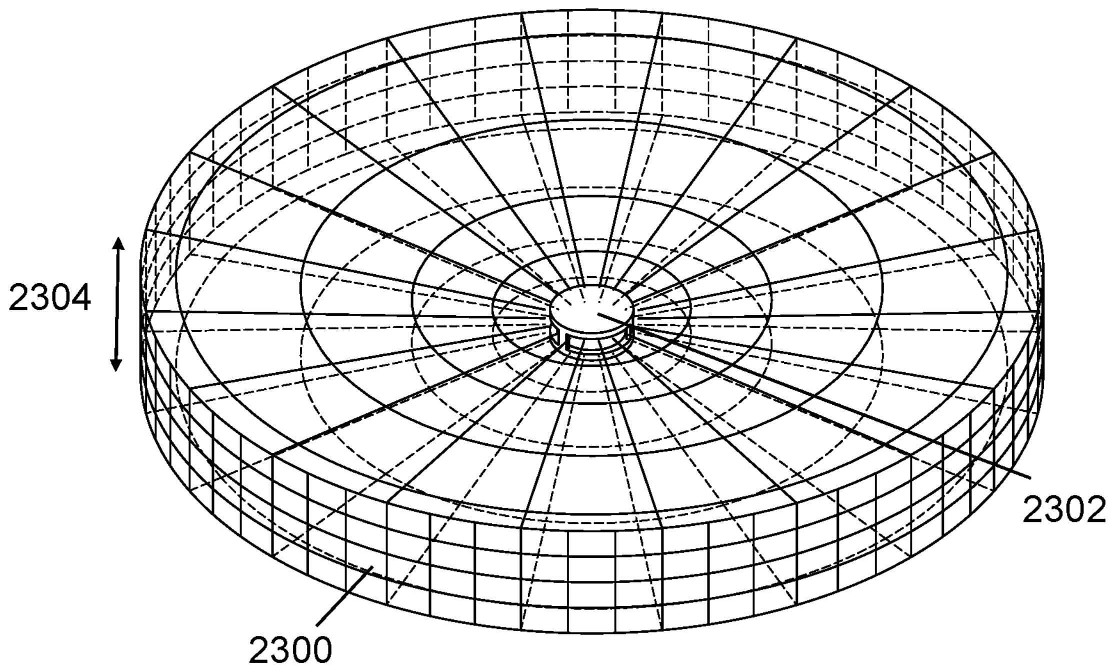
Figure 168B:
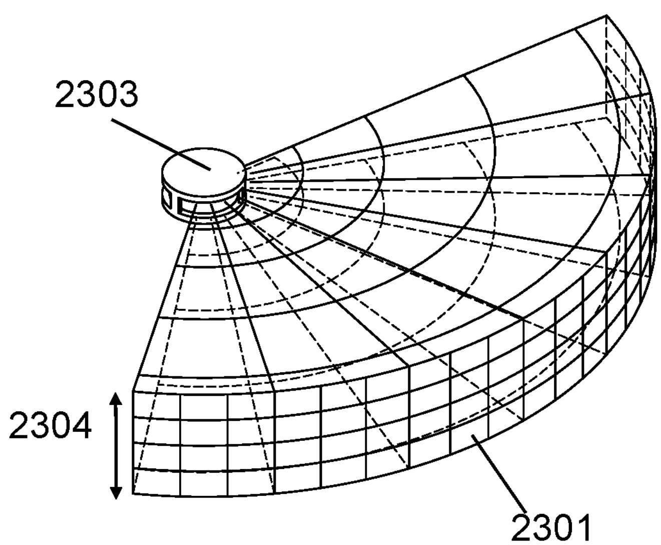
Figure 169A:
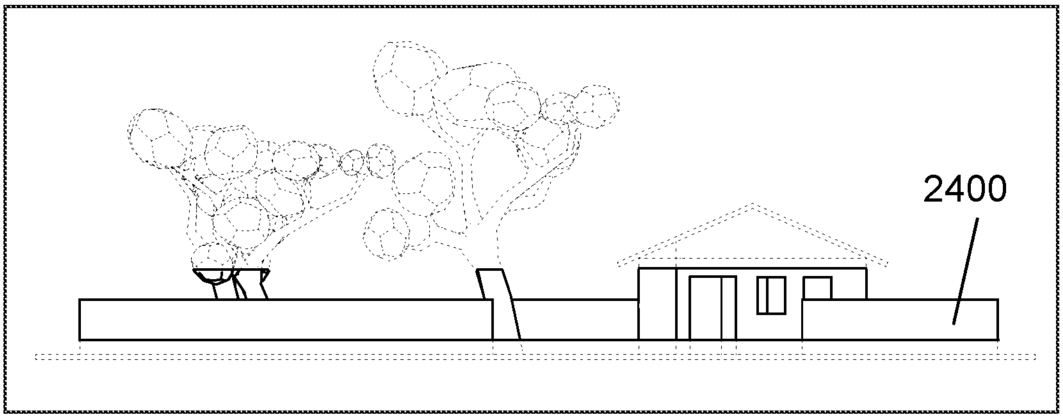
Figure 169B:
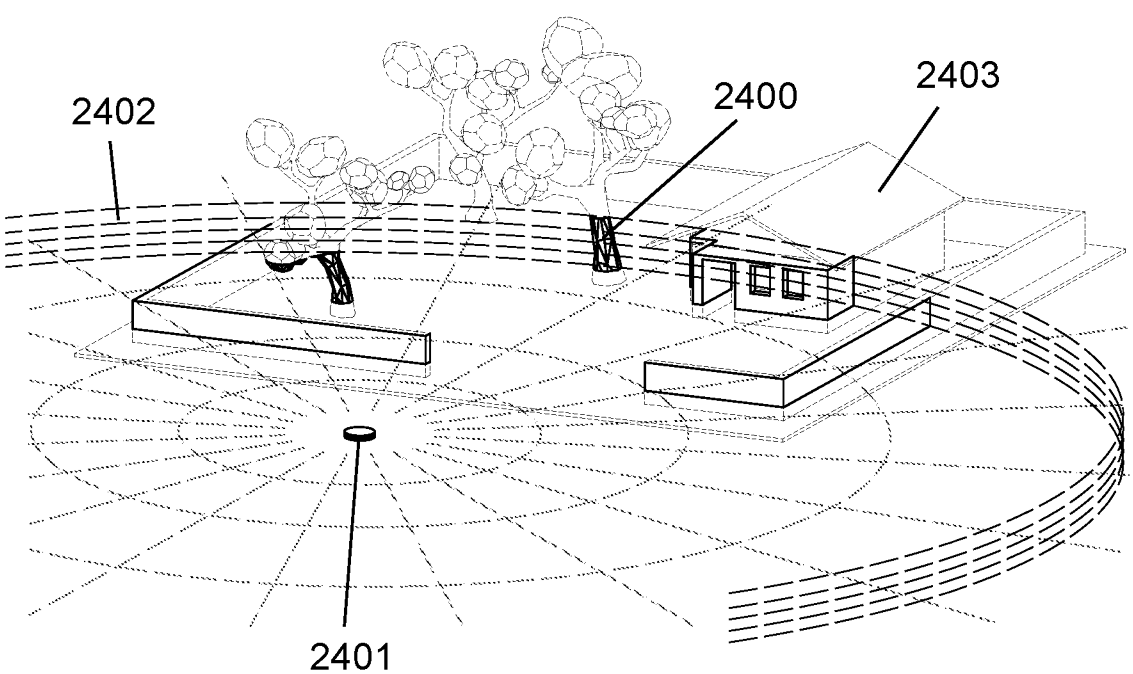

In some embodiments, the robot may use a LIDAR (e.g., 360 degrees LIDAR) to measure distances to objects along a two dimensional plane. For example, FIG. 167A illustrates a robot 2200 using a LIDAR to measure distances to objects within environment 2201 along a 360 degrees plane 2202. FIG. 167B illustrates the LIDAR 2203 and the 360 degrees plane 2202 along which distances to objects are measured. FIG. 167C illustrates a front view of the robot 2200 when measuring distances to objects in FIG. 167A, the line 2204 representing the distances to objects measured along the 360 degrees plane 2202. In some embodiments, the robot may use a two-and-a-half dimensional LIDAR. For example, the two-and-a-half dimensional LIDAR may measure distances along multiple planes at different heights corresponding with the total height of illumination provided by the LIDAR. FIGS. 168A and 168B illustrate examples of the field of views (FOV) 2300 and 2301 of two-and-a-half dimensional LIDARS 2302 and 2303, respectively. LIDAR 2302 has a 360 degrees field of view 2300 while LIDAR 2303 has a more limited FOV 2301, however, both FOVs 2300 and 2301 extend over a height 2304. FIG. 169A illustrates a front view of a robot while measuring distances using a LIDAR. Areas 2400 within solid lines are the areas falling within the FOV of the LIDAR. FIG. 169B illustrates the robot 2401 measuring distances 2402 to objects within environment 2403 using a two-and-a-half dimensional LIDAR. Areas 2400 within solid lines are the areas falling within the FOV of the LIDAR.

In some embodiments, all or some of the tasks of the image processor of the different variations of remote distance estimation systems described herein may be performed by the processer of the robot or any other processor coupled to the imaging sensor or via the cloud. Further details of embodiments of variations of a remote distance estimation system are described in U.S. patent application Ser. Nos. 15/243,783, 15/954,335, 15/954,410, 16/832,221, 15/257,798, 16/525,137, 15/674,310, 15/224,442, 15/683,255, 16/880,644, 15/447,122, and 16/393,921, the entire contents of which are hereby incorporated by reference. Each variation may be used independently or may be combined to further improve accuracy, range, and resolution of distances to the object surface. Furthermore, methods for eliminating or reducing noise, such as sunlight noise, may be applied to each variation of a remote distance estimation system described herein.

In some embodiments, the processor may determine movement of the robot (e.g., linear translation or rotation) using images captured by at least one image sensor. In some embodiments, the processor may use the movement determined using the captured images to correct the positioning of the robot (e.g., by a heading rotation offset) after a movement as some movement measurement sensors, such as an IMU, gyroscope, or odometer may be inaccurate due to slippage and other factors. In some embodiments, the movement determined using the captured images may be used to correct the movement measured by an IMU, odometer, gyroscope, or other movement measurement device. In some embodiments, the at least one image sensor may be positioned on an underside, front, back, top, or side of the robot. In some embodiments, two image sensors, positioned at some distance from one another, may be used. For example, two image sensors may be positioned at a distance from one another along a line passing through the center of the robot, each on opposite sides and at an equal distance from the center of the robot. In some embodiments, a light source (e.g., LED or laser) may be used with the at least one image sensor to illuminate surfaces within the field of view of the at least one image sensor. In some embodiments, an optical tracking sensor including a light source and at least one image sensor may be used. In some embodiments, the at least one image sensor captures images of surfaces within its field of view as the robot moves within the environment. In some embodiments, the processor may obtain the images and determine a change (e.g., a translation and/or rotation) between images that is indicative of movement (e.g., linear movement in the x, y, or z directions and/or rotational movement). In some embodiments, the processor may use digital image correlation (DIC) to determine the linear movement of the at least one image sensor in at least the x and y directions. In embodiments, the initial starting location of the at least one image sensor may be identified with a pair of x and y coordinates and using DIC a second location of the at least one image sensor may be identified by a second pair of x and y coordinates. In some embodiments, the processor detects patterns in images and is able to determine by how much the patterns have moved from one image to another, thereby providing the movement of each optoelectronic sensor in the x and y directions over a time from a first image being captured to a second image being captured. To detect these patterns and movement of the at least one image sensor in the x and y directions the processor mat mathematically process the images using a technique such as cross correlation to determine how much each successive image is offset from the previous one. In embodiments, finding the maximum of the correlation array between pixel intensities of two images may be used to determine the translational shift in the x-y plane. Cross correlation may be defined in various ways. For example, two-dimensional discrete cross correlation $r_{ij}$ may be defined as $$r_{ij} = \frac{\sum_k \sum_l [s(k+i, l+j) - \bar{s}][q(k, l) - \bar{q}]}{\sqrt{\sum_k \sum_l [s(k, l) - \bar{s}]^2 \sum_k \sum_l [q(k, l) - \bar{q}]^2}},$$

wherein s(k, l) is the pixel intensity at a point (k, l) in a first image and q(k, l) is the pixel intensity of a corresponding point in the translated image. $\bar{s}$ and $\bar{q}$ are the mean values of respective pixel intensity matrices s and q. The coordinates of the maximum $r_{ij}$ gives the pixel integer shift, $$(\Delta x, \Delta y) = \underset{(i,j)}{\operatorname{argmax}}\{r\}.$$

In some embodiments, the processor may determine the correlation array faster by using Fourier Transform techniques or other mathematical methods. In some embodiments, the processor may detect patterns in images based on pixel intensities and determine by how much the patterns have moved from one image to another, thereby providing the movement of the at least one image sensor in the at least x and y directions and/or rotation over a time from a first image being captured to a second image being captured. Examples of patterns that may be used to determine an offset between two captured images may include a pattern of increasing pixel intensities, a particular arrangement of pixels with high and/or low pixel intensities, a change in pixel intensity (i.e., derivative), entropy of pixel intensities, etc.

Given the movement of the at least one image sensor in the x and y directions, the linear and rotational movement of the robot may be known. For example, if the robot is only moving linearly without any rotation, the translation of the at least one image sensor (Δx, Δy) over a time Δt is assumed to be the translation of the robot. If the robot rotates, the linear translation of the at least one image sensor may be used to determine the rotation angle of the robot. For example, when the robot rotates in place about an instantaneous center of rotation (ICR) located at its center, the magnitude of the translations in the x and y directions of the at least one image sensor may be used to determine the rotation angle of the robot about the ICR by applying Pythagorean theorem as the distance of the at least one image sensor to the ICR is known. This may occur when the velocity of one wheel is equal and opposite to the other wheel (i.e. $v_r = -v_l$, wherein r denotes right wheel and l left wheel).

FIG. 170A illustrates a top view of robotic device 100 with a first optical tracking sensor initially positioned at 101 and a second optical tracking sensor initially positioned at 102, both of equal distance from the center of robotic device 100. The initial and end position of robotic device 100 is shown, wherein the initial position is denoted by the dashed lines. Robotic device 100 rotates in place about ICR 103, moving first optical tracking sensor to position 104 and second optical tracking sensor to position 105. As robotic device 100 rotates from its initial position to a new position optical tracking sensors capture images of the surface illuminated by an LED (not shown) and send the images to a processor for DIC. After DIC of the images is complete, translation 106 in the x direction (Δx) and 107 in the y direction (Δy) are determined for the first optical tracking sensor and translation 108 in the x direction and 109 in the y direction for the second optical tracking sensor. Since rotation is in place and the optical tracking sensors are positioned symmetrically about the center of robotic device 100 the translations for both optical tracking sensors are of equal magnitude. The translations (Δx, Δy) corresponding to either optical tracking sensor together with the respective distance 110 of either sensor from ICR 103 of robotic device 100 may be used to calculate rotation angle 111 of robotic device 100 by forming a right-angle triangle as shown in FIG. 170A and applying Pythagorean theorem $$\sin\theta = \frac{\text{opposite}}{\text{hypotneuse}} = \frac{\Delta y}{d},$$

wherein θ is rotation angle 111 and d is known distance 110 of the optical tracking sensor from ICR 103 of robotic device 100.

In embodiments, the rotation of the robot may not be about its center but about an ICR located elsewhere, such as the right or left wheel of the robot. For example, if the velocity of one wheel is zero while the other is spinning then rotation of the robot is about the wheel with zero velocity and is the location of the ICR. The translations determined by images from each of the optical tracking sensors may be used to estimate the rotation angle about the ICR. For example, FIG. 170B illustrates rotation of robotic device 100 about ICR 112. The initial and end position of robotic device 100 is shown, wherein the initial position is denoted by the dashed lines. Initially first optical tracking sensor is positioned at 113 and second optical tracking sensor is positioned at 114. Robotic device 100 rotates about ICR 112, moving first optical tracking sensor to position 115 and second optical tracking sensor to position 116. As robotic device 100 rotates from its initial position to a new position optical tracking sensors capture images of the surface illuminated by an LED (not shown) and send the images to a processor for DIC. After DIC of the images is complete, translation 117 in the x direction (Δx) and 118 in the y direction (Δy) are determined for the first optical tracking sensor and translation 119 in the x direction and 120 in the y direction for the second optical tracking sensor. The translations (Δx, Δy) corresponding to either optical tracking sensor together with the respective distance of the sensor to the ICR, which in this case is the left wheel, may be used to calculate rotation angle 121 of robotic device 100 by forming a right-angle triangle, such as that shown in FIG. 170B. Translation 118 of the first optical tracking sensor in the y direction and its distance 122 from ICR 112 of robotic device 100 may be used to calculate rotation angle 121 of robotic device 100 by Pythagorean theorem $$\sin\theta = \frac{\text{opposite}}{\text{hypotneuse}} = \frac{\Delta y}{d},$$

wherein θ is rotation angle 121 and d is known distance 122 of the first sensor from ICR 112 located at the left wheel of robotic device 100. Rotation angle 121 may also be determined by forming a right-angled triangle with the second sensor and ICR 112 and using its respective translation in the y direction.

In another example, the initial position of robotic device 100 with two optical tracking sensors 123 and 124 is shown by the dashed line 125 in FIG. 170C. A secondary position of the robotic device 100 with two optical tracking sensors 126 and 127 after having moved slightly is shown by solid line 128. Because the second position of optical tracking sensor 126 is substantially in the same position 123 as before the move, no difference in position of this optical tracking sensor is shown. In real time, analyses of movement may occur so rapidly that the robot may only move a small distance in between analyses and only one of the two optical tracking sensors may have moved substantially. The rotation angle of robotic device 100 may be represented by the angle α within triangle 129. Triangle 129 is formed by the straight line 130 between the secondary positions of the two optoelectronic sensors 126 and 127, the line 131 from the second position 127 of the optical tracking sensor with the greatest change in coordinates from its initial position to its second position to the line 132 between the initial positions of the two optical tracking sensors that forms a right angle therewith, and the line 133 from the vertex 134 formed by the intersection of line 131 with line 132 to the initial position 123 of the optical tracking sensor with the least amount of (or no) change in coordinates from its initial position to its second position. The length of side 130 is fixed because it is simply the distance between the two optical tracking sensors, which does not change. The length of side 131 may be calculated by finding the difference of the y coordinates between the position of the optical tracking sensor at position 127 and at position 124. It should be noted that the length of side 133 does not need to be known in order to find the angle α. The trigonometric function $$\sin\alpha = \frac{\text{opposite}}{\text{hypotneuse}}$$

only requires that we know the length of sides 131 (opposite) and 130 (hypotenuse) to obtain the angle α, which is the turning angle of the robotic device.

In a further example, wherein the location of the ICR relative to each of the optical tracking sensors is unknown, translations in the x and y directions of each optical tracking sensor may be used together to determine rotation angle about the ICR. For example, in FIG. 171 ICR 200 is located to the left of center 201 and is the point about which rotation occurs. The initial and end position of robotic device 202 is shown, wherein the initial position is denoted by the dashed lines. While the distance of each optical tracking sensor to center 201 or a wheel of robotic device 202 may be known, the distance between each optical tracking sensor and an ICR, such as ICR 200, may be unknown. In these instances, translation 203 in the y direction of first optical tracking sensor initially positioned at 204 and translated to position 205 and translation 206 in the y direction of second optical tracking sensor initially position at 207 and translated to position 208, along with distance 209 between the two sensors may be used to determine rotation angle 210 about ICR 200 using $$\sin\theta = \frac{\Delta y_1 + \Delta y_2}{b},$$

wherein θ is rotation angle 210, $\Delta y_1$ is translation 203 in the y direction of first optical tracking sensor, $\Delta y_2$ is translation 206 in the y direction of second optical tracking sensor and b is distance 209 between the two sensors.

In embodiments, given that the time Δt between captured images is known, the linear velocities in the x ($v_x$) and y ($v_y$) directions and angular velocity (ω) of the robot may be estimated using $$v_x = \frac{\Delta x}{\Delta t},\ v_y = \frac{\Delta y}{\Delta t},\text{ and }\omega = \frac{\Delta\theta}{\Delta t},$$

wherein Δx and Δy are the translations in the x and y directions, respectively, that occur over time Δt and Δθ is the rotation that occurs over time Δt.

As described above, one image sensor or optical tracking sensor may be used to determine linear and rotational movement of the robot. The use of at least two image sensors or optical tracking sensors is particularly useful when the location of ICR is unknown or the distance between each sensor and the ICR is unknown. However, rotational movement of the robot may be determined using one image sensor or optical tracking sensor when the distance between the sensor and ICR is known, such as in the case when the ICR is at the center of the robot and the robot rotates in place (illustrated in FIG. 170A) or the ICR is at a wheel of the robot and the robot rotates about the wheel (illustrated in FIGS. 170B and 170C).

In some embodiments, the linear and/or rotational displacement determined from the images captured by the at least one image sensor or optical tracking sensor may be useful in correcting movement measurements affected by slippage (e.g., IMU or gyroscope) or distance measurements. For example, if the robot rotates in position a gyroscope may provide angular displacement while the images captured may be used by the processor to determine any linear displacement that occurred during the rotation due to slippage. In some embodiments, the processor adjusts other types sensor readings, such as depth readings of a sensor, based on the linear and/or rotational displacement determined by the image data collected by the optical tracking sensor. In some embodiments, the processor adjusts sensor readings after the desired rotation or other movement is complete. In some embodiments, the processor adjusts sensor readings incrementally throughout a movement. For example, the processor may adjust sensor readings based on the displacement determined after every degree, two degrees, or five degrees of rotation.

In some embodiments, displacement determined from the output data of the at least one image sensor or optical tracking sensor may be useful when the robot has a narrow field of view and there is minimal or no overlap between consecutive readings captured during mapping and localization. For example, the processor may use displacement determined from images captured by an image sensor and rotation from a gyroscope to help localize the robot. In some embodiments, the displacement determined may be used by the processor in choosing the most likely possible locations of the robot from an ensemble of simulated possible positions of the robot within the environment. For example, if the displacement determined is a one meter displacement in a forward direction the processor may choose the most likely possible locations of the robot in the ensemble as those being close to one meter from the current location of the robot.

In some embodiments, the image output from the at least one image sensor or optical tracking sensor may be in the form of a traditional image or may be an image of another form, such as an image from a CMOS imaging sensor. In some embodiments, the output data from the at least one image sensor or optical tracking sensor are provided to a Kalman filter and the Kalman filter determines how to integrate the output data with other information, such as odometry data, gyroscope data, IMU data, compass data, accelerometer data, etc.

In some embodiments, the at least one image sensor or optical tracking sensor (with or without a light source) may include an embedded processor or may be connected to any other separate processor, such as that of the robot. In some embodiments, the at least one image sensor or optical tracking sensor has its own light source or may a share light source with other sensors. In some embodiments, a dedicated image processor may be used to process images and in other embodiments a separate processor coupled to the at least one image sensor or optical tracking sensor may be used, such as a processor of the robot. In some embodiments, the at least one image sensor or optical tracking sensor, light source, and processor may be installed as separate units.

In some embodiments, different light sources may be used to illuminate surfaces depending on the type of surface. For example, for flooring, different light sources result in different image quality (IQ). For instance, an LED light source may result in better IQ on thin carpet, thick carpet, dark wood, and shiny white surfaces while laser light source may result in better IQ on transparent, brown and beige tile, black rubber, white wood, mirror, black metal, and concrete surfaces. In some embodiments, the processor may detect the type of surface and may autonomously toggle between an LED and laser light source depending on the type of surface identified. In some embodiments, the processor may switch light sources upon detecting an IQ below a predetermined threshold. In some embodiments, sensor readings during the time when the sensors are switching from LED to laser light source and vice versa may be ignored.

In some embodiments, data from the image sensor or optical tracking sensor with a light source may be used to detect floor types based on, for example, the reflection of light. For example, the reflection of light from a hard surface type, such as hardwood, is sharp and concentrated while the reflection of light from a soft surface type, such as carpet, is dispersed due to the texture of the surface. In some embodiments, the floor type may be used by the processor to identify rooms or zones created as different rooms or zones may be associated with a particular type of flooring. In some embodiments, the image sensor or an optical tracking sensor with light source may simultaneously be used as a cliff sensor when positioned along the sides of the robot. For example, the light reflected when a cliff is present is much weaker than the light reflected off of the driving surface. In some embodiments, the image sensor or optical tracking sensor with light source may be used as a debris sensor as well. For example, the patterns in the light reflected in the captured images may be indicative of debris accumulation, a level of debris accumulation (e.g., high or low), a type of debris (e.g., dust, hair, solid particles), state of the debris (e.g., solid or liquid) and a size of debris (e.g., small or large). In some embodiments, Bayesian techniques are applied. In some embodiments, the processor may use data output from the image sensor or optical tracking sensor to make a priori measurement (e.g., level of debris accumulation or type of debris or type of floor) and may use data output from another sensor to make a posterior measurement to improve the probability of being correct. For example, the processor may select possible rooms or zones within which the robot is located a priori based on floor type detected using data output from the image sensor or optical tracking sensor, then may refine the selection of rooms or zones posterior based on door detection determined from depth sensor data. In some embodiments, the output data from the image sensor or optical tracking sensor may be used in methods described above for the division of the environment into two or more zones.

In some embodiments, two dimensional optical tracking sensors may be used. In other embodiments, one dimensional optical tracking sensors may be used. In some embodiments, one dimensional optical tracking sensors may be combined to achieve readings in more dimensions. For example, to achieve similar results as two dimensional optical tracking sensors, two one dimensional optical tracking sensors may be positioned perpendicularly to one another. In some instances, one dimensional and two dimensional optical tracking sensors may be used together.

Further details of and additional localization methods and/or methods for measuring movement that may be used are described in U.S. patent application Ser. Nos. 16/297,508, 16/418,988, 16/554,040, 15/955,480, 15/425,130, 15/955,344, 16/509,099, 15/410,624, 16/353,019, and 16/504,012, the entire contents of which are hereby incorporated by reference. In embodiments, the mapping and localization methods described herein may be performed in dark areas of the environment based on the type of sensors used that allow accurate data collection in the dark.

In some embodiments, localization of the robot may be affected by various factors, resulting in inaccurate localization estimates or complete loss of localization. For example, localization of the robot may be affected by wheel slippage. In some cases, driving speed, driving angle, wheel material properties, and fine dust may affect wheel slippage. In some cases, particular driving speed and angle and removal of fine dust may reduce wheel slippage. In some embodiments, the processor of the robot may detect an object (e.g., using TSSP sensors) that the robot may become stuck on or that may cause wheel slippage and in response instruct the robot to re-approach the object at a particular angle and/or driving speed. In some cases, the robot may become stuck on an object and the processor may instruct the robot to re-approach the object at a particular angle and/or driving speed. For example, the processor may instruct the robot to increase its speed upon detecting a bump as the increased speed may provide enough momentum for the robot to clear the bump without becoming stuck. In some embodiments, timeout thresholds for different possible control actions of the robot may be used to promptly detect and react to a stuck condition. In some embodiments, the processor of the robot may trigger a response to a stuck condition upon exceeding the timeout threshold of a particular control action. In some embodiments, the response to a stuck condition may include driving the robot forward, and if the timeout threshold of the control action of driving the robot forward is exceeded, driving the robot backwards in an attempt to become unstuck.

In some embodiments, detecting a bump on which the robot may become stuck ahead of time may be effective in reducing the error in localization by completely avoiding stuck conditions. Additionally, promptly detecting a stuck condition of the robot may reduce error in localization as the robot is made aware of its situation and may immediately respond and recover. In some embodiments, a LSM6DSL ST-Micro IMU may be used to detect a bump on which a robot may become stuck prior to encountering the bump. For example, a sensitivity level of 4 for fast speed maneuvers and 3 for slow speed maneuvers may be used to detect a bump of ~1.5 cm height without detecting smaller bumps the robot may overcome. In some embodiments, another sensor event (e.g., bumper, TSSP, TOF sensors) may be correlated with the IMU bump event such that false positives may be detected when the IMU detects a bump but the other sensor does not. In some cases, data of the bumper, TSSP sensors, and TOF sensors may be correlated with the IMU data and used to eliminate false positives.

In some embodiments, localization of the robot may be affected when the robot is unexpectedly pushed, causing the localization of the robot to be lost and the path of the robot to be linearly translated and rotated. In some embodiments, increasing the IMU noise in the localization algorithm such that large fluctuations in the IMU data were acceptable may prevent an incorrect heading after being pushed. Increasing the IMU noise may allow large fluctuations in angular velocity generated from a push to be accepted by the localization algorithm, thereby resulting in the robot resuming its same heading prior to the push. In some embodiments, determining slippage of the robot may prevent linear translation in the path after being pushed. In some embodiments, an algorithm executed by the processor may use optical tracking sensor data to determine slippage of the robot by determining an offset between consecutively captured images of the driving surface. The localization algorithm may receive the slippage as input and account for it when localizing the robot.

In embodiments, wherein the processor of the robot loses localization of the robot, the processor may re-localize (e.g., globally or locally) using stored maps (e.g., on the cloud, SDRAM, etc.). In some embodiments, maps may be stored on and loaded from an SDRAM as long as the robot has not undergone a cold start or hard reset. In some embodiments, all or a portion of maps may be uploaded to the cloud, such that when the robot has undergone a cold start or hard reset, the maps may be downloaded from the cloud for the robot to re-localize. In some embodiments, the processor executes algorithms for locally storing and loading maps to and from the SDRAM and uploading and downloading maps to and from the cloud. In some embodiments, maps may be compressed for storage and decompressed after loading maps from storage. In some embodiments, storing and loading maps on and from the SDRAM may involve the use of a map handler to manage particular contents of the maps and provide an interface with the SDRAM and cloud and a partition manager for storing and loading map data. In some embodiments, compressing and decompressing a map may involve flattening the map into serialized raw data to save space and reconstructing the map from the raw data. In some embodiments, protocols such as AWS S3 SDK or https may be used in uploading and downloading the map to and from the cloud. In some embodiments, a filename rule may be used to distinguish which map file belongs to each client. In some embodiments, the processor may print the map after loss of localization with the pose estimate at the time of loss of localization and save the confidence of position just before loss of localization to help with re-localization of the robot.

In some embodiments, upon losing localization, the robot may drive to a good spot for re-localization and attempt to re-localize. This may be iterated a few times. If re-localization fails and the processor determines that the robot is in unknown terrain, then the processor may instruct the robot to attempt to return to a known area, map build, and switch back to coverage and exploration. If the re-localization fails and the processor determines the robot is in known terrain, the processor may locally find a good spot for localization, instruct the robot to drive there, attempt to re-localize, and continue with the previous state if re-localization is successful. In some embodiments, the re-localization process may be three-fold: first a scan match attempt using a current best guess from the EKF may be employed to regain localization, if it fails, then local re-localization may be employed to regain localization, and if it fails, then global re-localization may be employed to regain localization. In some embodiments, the local and global re-localization methods may include one or more of: generating a temporary map, navigating the robot to a point equidistant from all obstacles, generating a real map, coarsely matching (e.g., within approximately 1 m) the temporary or real map with a previously stored map (e.g., local or global map stored on the cloud or SDRAM), finely matching the temporary or real map with the previously stored map for re-localization, and resuming the task. In some embodiments, the global or local re-localization methods may include one or more of: building a temporary map, using the temporary map as the new map, attempting to match the temporary map with a previously stored map (e.g., global or local map stored on the cloud or SDRAM) for re-localization, and if unsuccessful, continuing exploration. In some cases, a hidden exploration may be executed (e.g., some coverage and some exploration). In some embodiments, the local and global re-localization methods may determine the best matches within the local or global map with respect to the temporary map and pass them to a full scan matcher algorithm. If the full scan matcher algorithm determines a match is successful then the observed data corresponding with the successful match may be provided to the EKF and localization may thus be recovered.

In some embodiments, a matching algorithm may down sample the previously stored map and temporary map and sample over the state space until confident enough. In some embodiments, the matching algorithm may match structures of free space and obstacles (e.g., Voronoi nodes, structure from room detection and main coverage angle, etc.). In some embodiments, the matching algorithm may use a direct feature detector from computer vision (e.g., FAST, SURF, Eigen, Harris, MSER, etc.). In some embodiments, the matching algorithm may include a hybrid approach. The first prong of the hybrid approach may include feature extraction from both the previously saved map and the temporary map. Features may be corners in a low resolution map (e.g., detected using any corner detector) or walls as they have a location and an orientation and features used must have both. The second prong of the hybrid approach may include matching features from both the previously stored map and the temporary map and using features from both maps to exclude large portions of the state space (e.g., using RMS score to further select and match). In some cases, the matching algorithm may include using a coarser map resolution to reduce the state space, and then adaptively refining the maps for only those comparisons resulting in good matches (e.g., down sample to map resolutions of 1 m or greater). Good matches may be kept and the process may be repeated with a finer map resolution. In some embodiments, the matching algorithm may leverage the tendency of walls to be at right angles to one other. In some cases, the matching algorithm may determine one of the angles that best orients the major lines in the map along parallel and perpendicular lines to reduce the rotation space. For example, the processor may identify long walls and their angle in the global or local map and use them to align the temporary map. In some embodiments, the matching algorithm may employ this strategy by convolving each map (i.e., previously stored global or local map and temporary) with a pair of perpendicular edge-sensing kernels and a brute search through an angle of 90 degrees using the total intensity of the sum of the convolved images. The processor may then search the translation space independently. In some embodiments, a magnetometer may be used to reduce the number of rotations that need to be tested for matching for faster or more successful results. In some embodiments, the matching algorithm may include three steps. The first step may be a feature extraction step including using a previously stored map (e.g., global or local map stored on the cloud or SDRAM) and a partial map at a particular resolution (e.g., 0.2 m resolution), pre-cleaning the previously stored map, and using tryToOrder and Ramer-Douglas-Puecker simplifications (or other simplifications) to identify straight walls and corners as features. The second step may include coarse matching and a refinement step including brute force matching features in the previously stored map and the partial map starting at a particular resolution (e.g., 0.2 m or 0.4 m resolution), and then adaptively refining. Precomputed, low-resolution, obstacle-only matching may be used for this step. The third step may include the transition into a full scan matcher algorithm.

In some embodiments, the processor may re-localize the robot (e.g., globally or locally) by generating a temporary map from a current position of the robot, generating seeds for a seed set by matching corner and wall features of the temporary map and a stored map (e.g., global or local maps stored in SDRAM or cloud), choosing the seeds that result in the best matches with the features of the temporary map using a refining sample matcher, and choosing the seed that results in the best match using a full scan matcher algorithm. In some embodiments, the refining sample matcher algorithm may generate seeds for a seed set by identifying all places in the stored map that may match a feature (e.g., walls and corners) of the temporary map at a low resolution (i.e., down sampled seeds). For example, the processor may generate a temporary partial map from a current position of the robot. If the processor observes a corner at 2 m and 30 degrees in the temporary map, then the processor may add seeds for all corners in the stored map with the same distance and angle. In some embodiments, the seeds in local and global re-localization (i.e., re-localization against a local map versus against a global map) are chosen differently. For instance, in local re-localization, all points within a certain radius at a reasonable resolution may be chosen as seed. While for global re-localization, seeds may be chosen by matching corners and walls (e.g., to reduce computational complexity) as described above. In some embodiments, the refining sample matcher algorithm may iterate through the seed set and keep seeds that result in good matches and discard those that result in bad matches. In some embodiments, the refined matching algorithm determines a match between two maps (e.g., a feature in the temporary map and a feature of the stored map) by identifying a number of matching obstacle locations. In some embodiments, the algorithm assigns a score for each seed that reflects how well the seed matches the feature in the temporary map. In some embodiments, the algorithm saves the scores into a score sorted bin. In some embodiments, the algorithm may choose a predetermined percentage of the seeds providing the best matches (e.g., top 5%) to adaptively refine by resampling in the same vicinity at a higher resolution. In some embodiments, the seeds providing the best matches are chosen from different regions of the map. For instance, the seeds providing the best matches may be chosen as the local maximum from clustered seeds instead of choosing a predetermined percentage of the best matches. In some embodiments, the algorithm may locally identify clusters that seem promising, and then only refine the center of those clusters. In some embodiments, the refining sample matcher algorithm may increase the resolution and resample in the same vicinity of the seeds that resulted in good matches at a higher resolution. In some embodiments, the resolution of the temporary map may be different than the resolution of the stored map to which it is compared to (e.g., a point cloud at a certain resolution is matched to a down sampled map at double the resolution of the point cloud). In some embodiments, the resolution of the temporary map may be the same as the resolution of the stored map to which it is compared. In some embodiments, the walls of the stored map may be slightly inflated prior to comparing 1:1 resolution to help with separating seeds that provide good and bad matches earlier in the process. In some embodiments, the initial resolution of maps may be different for local and global re-localization. In some embodiments, local re-localization may start at a higher resolution as the processor may be more confident about the location of the robot while global re-localization may start at a very low resolution (e.g., 0.8 m). In some embodiments, each time map resolution is increased, some more seeds are locally added for each successful seed from the previous resolution. For example, for a map at resolution of 1 m per pixel with successful seed at (0 m, 0 m, 0 degrees) switching to a map with resolution 0.5 m per pixel will add more seeds, for example (0m, 0 m, 0 degrees), (0.25 m, 0 m, 0 degrees), (0 m, 0.25 m, 0 degrees), (−0.25 m, 0 m, 0 degrees), etc. In some embodiments, the refining scan matcher algorithm may continue to increase the resolution until some limit and there are only very few possible matching locations between the temporary map and the stored map (e.g., global or local maps).

In some embodiments, the refining sample matcher algorithm may pass the few possible matching locations as a seed set to a full scan matcher algorithm. In some embodiments, the full scan matcher algorithm may choose a first seed as a match if the match score or probability of matching is above a predetermined threshold. In some embodiments, the full scan matcher determines a match between two maps using a gauss-newton method on a point cloud. In an example, the refining scan matcher algorithm may identify a wall in a first map (e.g., a map of a current location of the robot), then may match this wall with every wall in a second map (e.g., a stored global map), and compute a translation/angular offset for each of those matches. The algorithm may collect each of those offsets, called a seed, in a seed set. The algorithm may then iterate and reduce the seed set by identifying better matches and discarding worse matches among those seeds at increasingly higher resolutions. The algorithm may pass the reduced seed set to a full scan matcher algorithm that finds the best match among the seed set using gauss-newton method.

In some embodiments, the processor (or algorithm executed by the processor) may use features within maps, such as walls and corners, for re-localization, as described above. In some embodiments, the processor may identify wall segments as straight stretches of data readings. In some embodiments, the processor may identify corners as data readings corresponding with locations in between two wall segments. FIGS. 172A-172C illustrate an example of wall segments 6600 and corners 6601 extracted from a map 6602 constructed from, for example, camera readings. Wall segments 6600 are shown as lines while corners 6601 are shown as circles with a directional arrow. In some cases, a map may be constructed from the wall segments and corners. In some cases, the wall segments and corners may be superimposed on the map. In some embodiments, corners are only identified between wall segments if at least one wall segment has a length greater than a predetermined amount. In some embodiments, corners are identified regardless of the length of the wall segments. In some embodiments, the processor may ignore a wall segment smaller than a predetermined length. In some embodiments, an outward facing wall in the map may be two cells thick. In such cases, the processor may create a wall segment for only the single layer with direct contact with the interior space. In some embodiments, a wall within the interior space may be two cells thick. In such cases, the processor may generate two wall segment lines. In some cases, having two wall segment features for thicker walls may be helpful in feature matching during global re-localization.

In embodiments, the Light Weight Real Time SLAM Navigational Stack described herein may provide improved performance compared to traditional SLAM techniques. For example, FIG. 173 illustrates the flow of data in traditional SLAM 6900 and Light Weight Real Time SLAM Navigational Stack 6901, respectively. In traditional SLAM, data flows between sensors/motors and the MCU and between the MCU and CPU which is slow due to several levels of abstraction in each step (MCU, OS, CPU).

In embodiments, the robot may include various coverage functionalities. For example, FIGS. 174A-174C illustrate examples of coverage functionalities of the robot. FIG. 174A illustrates a first coverage functionality including coverage of an area 5500. FIG. 174B illustrates a second coverage functionality including point-to-point and multipoint navigation 5501. FIG. 174C illustrates a third coverage functionality including patrolling 5502, wherein the robot navigates to different areas 5503 of the environment and rotates in each area 5503 for observation.

Figure 175A:
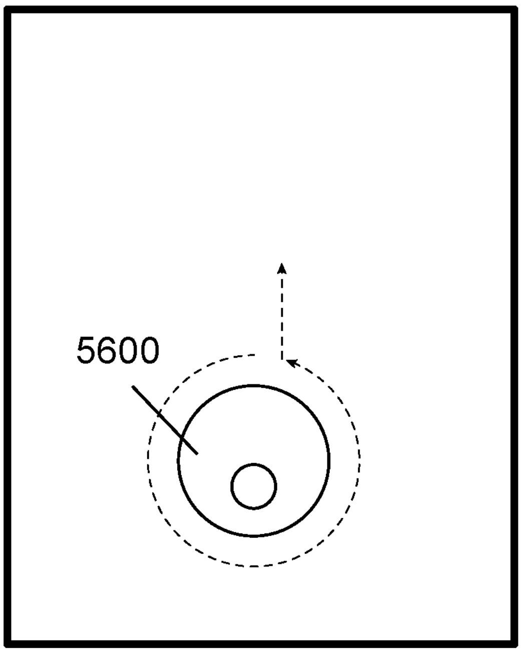
Figure 175C:
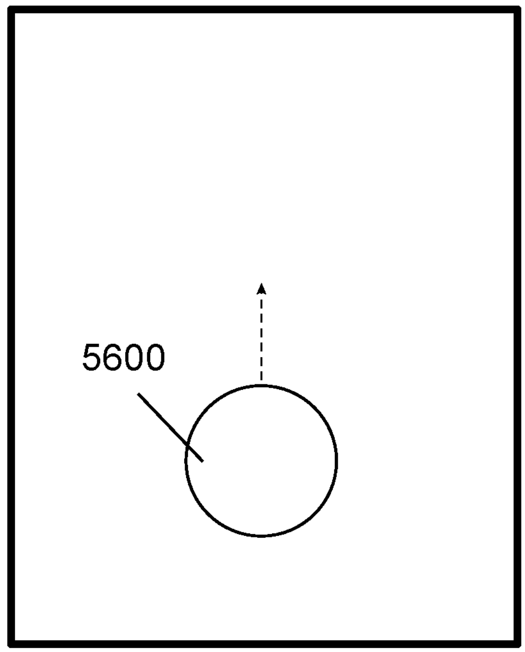
Figure 175B:
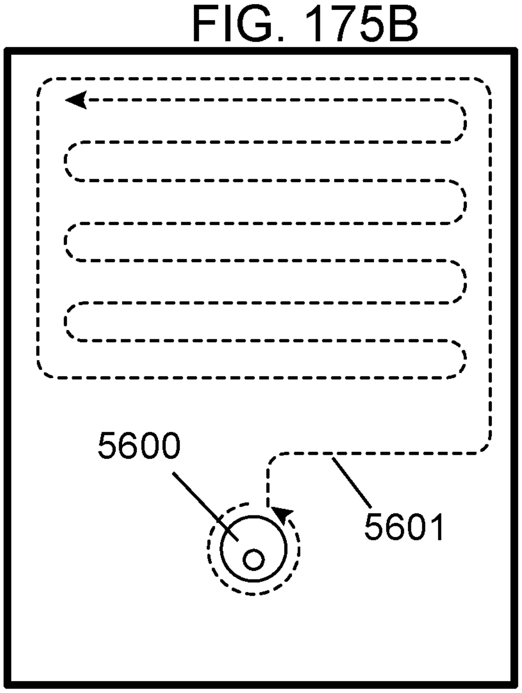
Figure 175D:
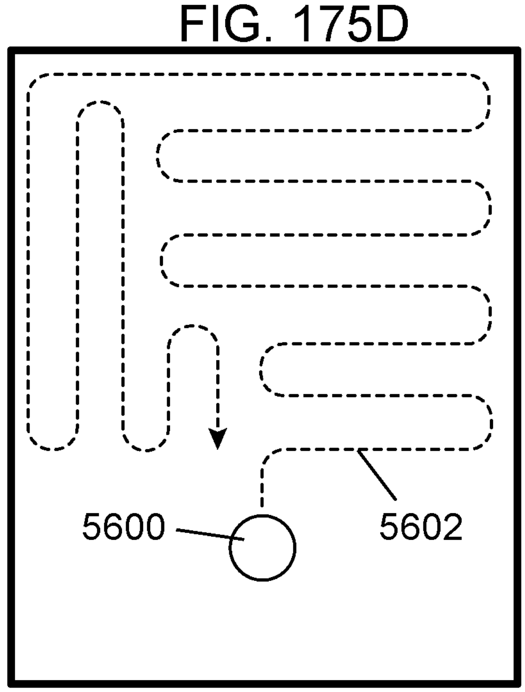

Traditionally, robots may initially execute a 360 degrees rotation and a wall follow during a first run or subsequent runs prior to performing work to build a map of the environment. However, some embodiments of the robot described herein begin performing work immediately during the first run and subsequent runs. FIGS. 175A and 175B illustrate traditional methods used in prior art, wherein the robot 5600 executes a 360 degrees rotation and a wall follow prior to performing work in a boustrophedon pattern, the entire path plan indicated by 5601. FIGS. 175C and 175D illustrate methods used by the robot described herein, wherein the robot 5600 immediately begins performing work by navigating along path 5602 without an initial 360 degrees rotation or wall follow.

Figure 176A:
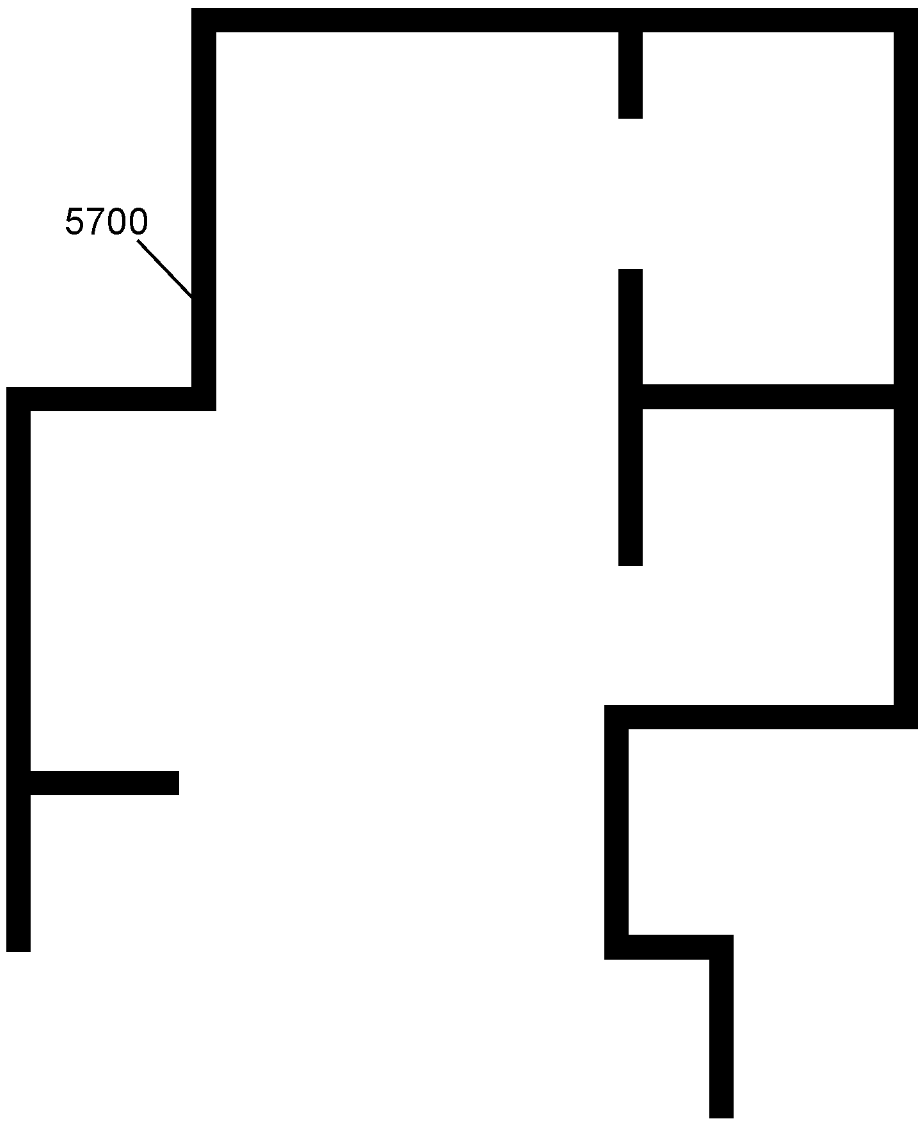
Figure 176B:
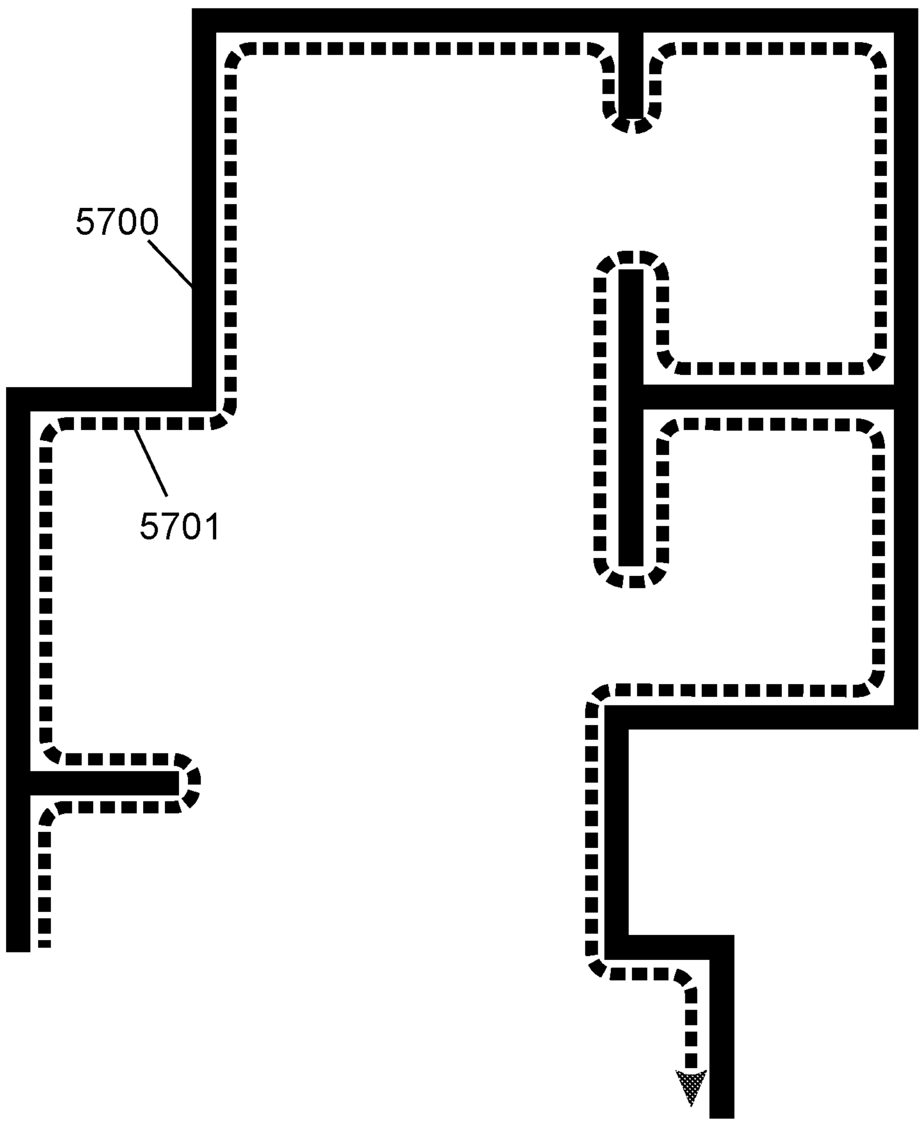
Figure 177A:
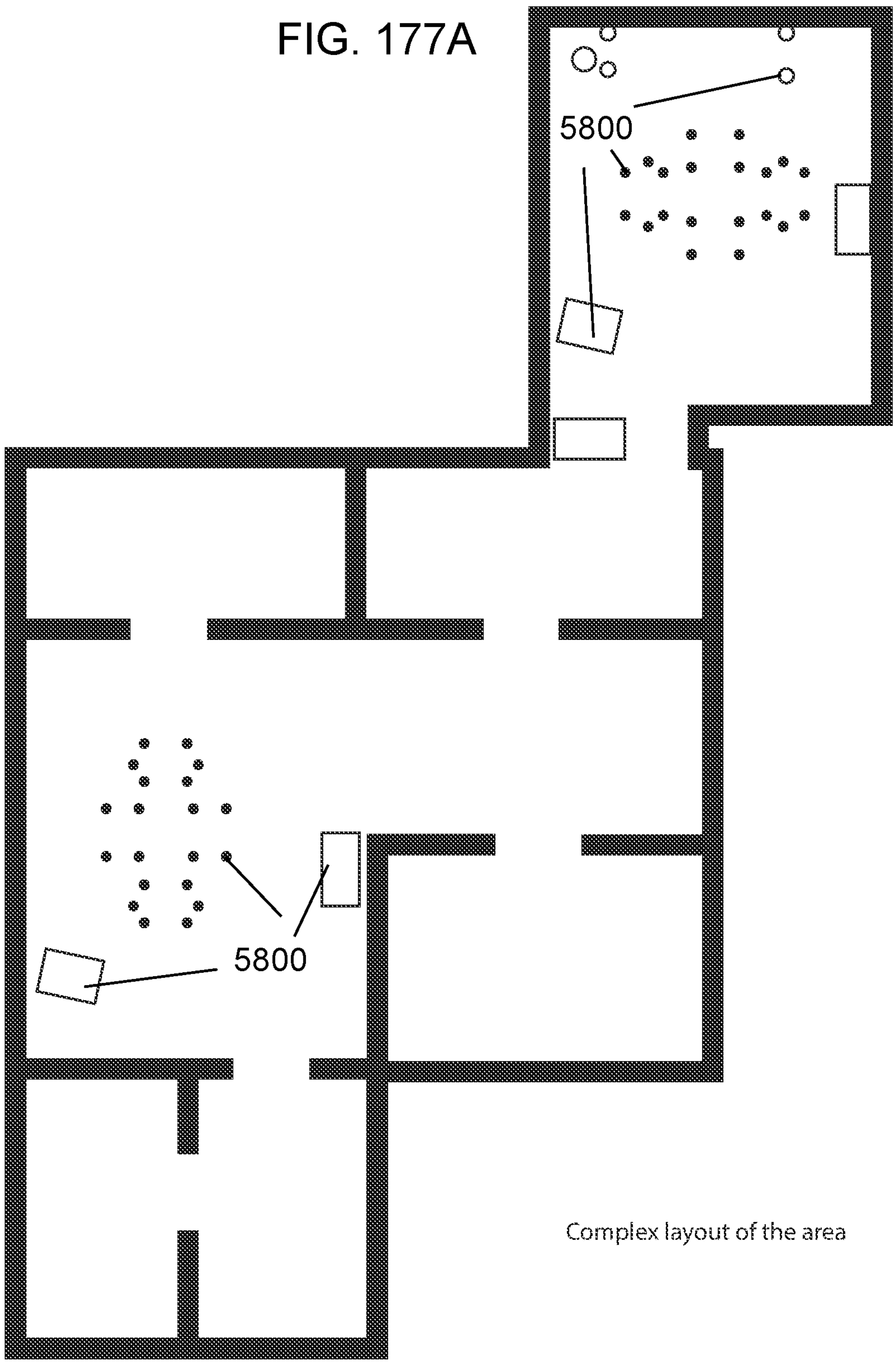
Figure 177B:
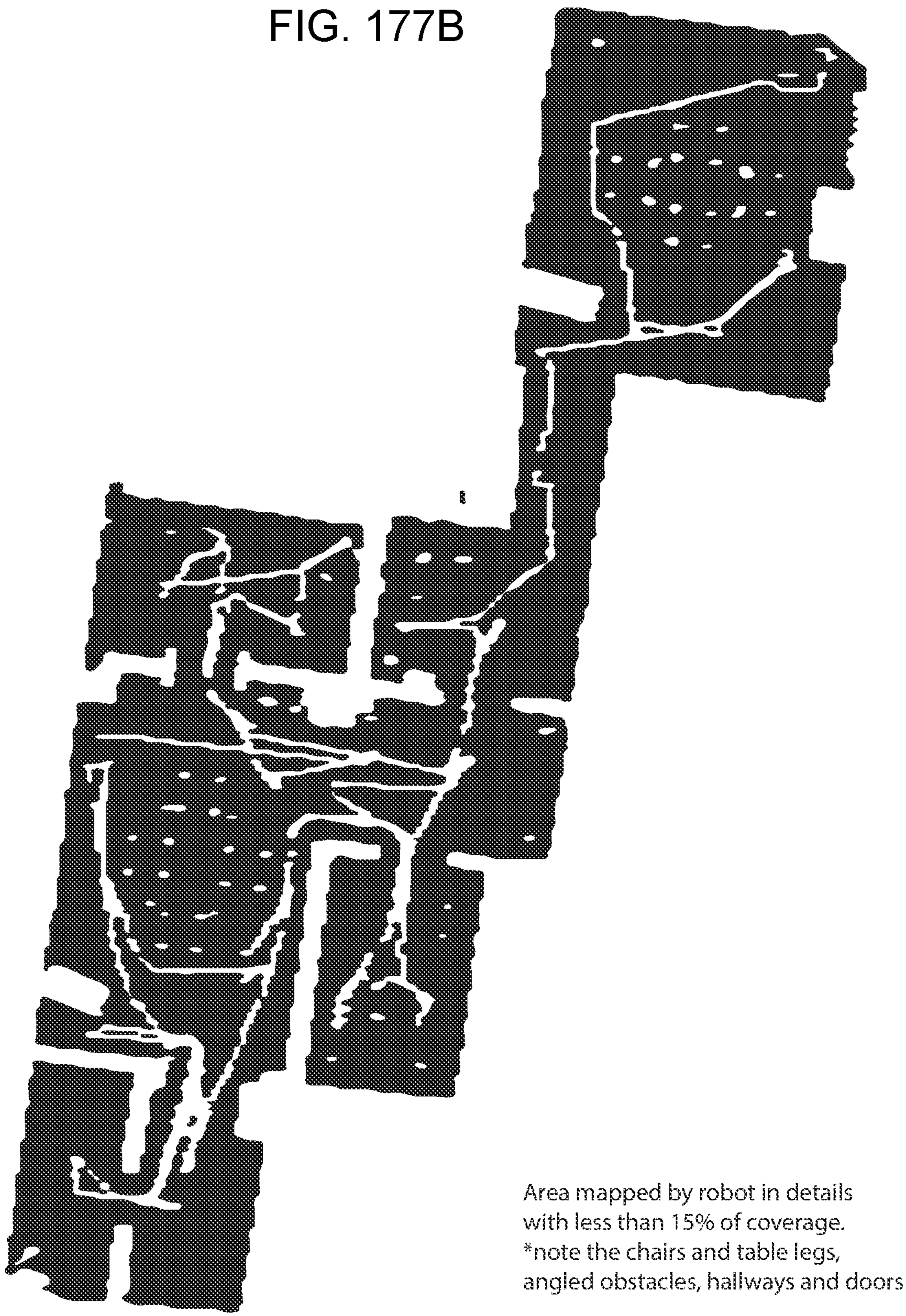

In some embodiments, the robot executes a wall follow. However, the wall follow differs from traditional wall follow methods. In some embodiments, the robot may enter a patrol mode during an initial run and the processor of the robot may build a spatial representation of the environment while visiting perimeters. In traditional methods, the robot executes a wall follow by detecting the wall and maintaining a predetermined distance from a wall using a reactive approach that requires continuous sensor data monitoring for detection of the wall and maintain a particular distance from the wall. In the wall follow method described herein, the robot follows along perimeters in the spatial representation created by the processor of the robot by only using the spatial representation to navigate the path along the perimeters (i.e., without using sensors). This approach reduces the length of the path, and hence the time, required to map the environment. For example, FIG. 176A illustrates a spatial representation 5700 of an environment built by the processor of the robot during patrol mode. FIG. 176B illustrates a wall follow path 5701 of the robot generated by the processor based on the perimeters in the spatial representation 5700. FIG. 177A illustrates an example of a complex environment including obstacles 5800. FIG. 177B illustrates a map of the environment created with less than 15% coverage of the environment when using the techniques described herein. In some embodiments, the robot may execute a wall follow to disinfect walls using a disinfectant spray and/or UV light. In some embodiments, the robot may include at least one vertical pillar of UV light to disinfect surfaces such as walls and shopping isles in stores. In some embodiments, the robot may include wings with UV light aimed towards the driving surface and may drive along isles to disinfect the driving surface. In some embodiments, the robot may include UV light positioned underneath the robot and aimed at the driving surface. In some embodiments, there may be various different wall follow modes depending on the application. For example, there may be a mapping wall follow mode and a disinfecting wall follow mode. In some embodiments, the robot may travel at a slower speed when executing the disinfecting wall follow mode.

Figure 178A:
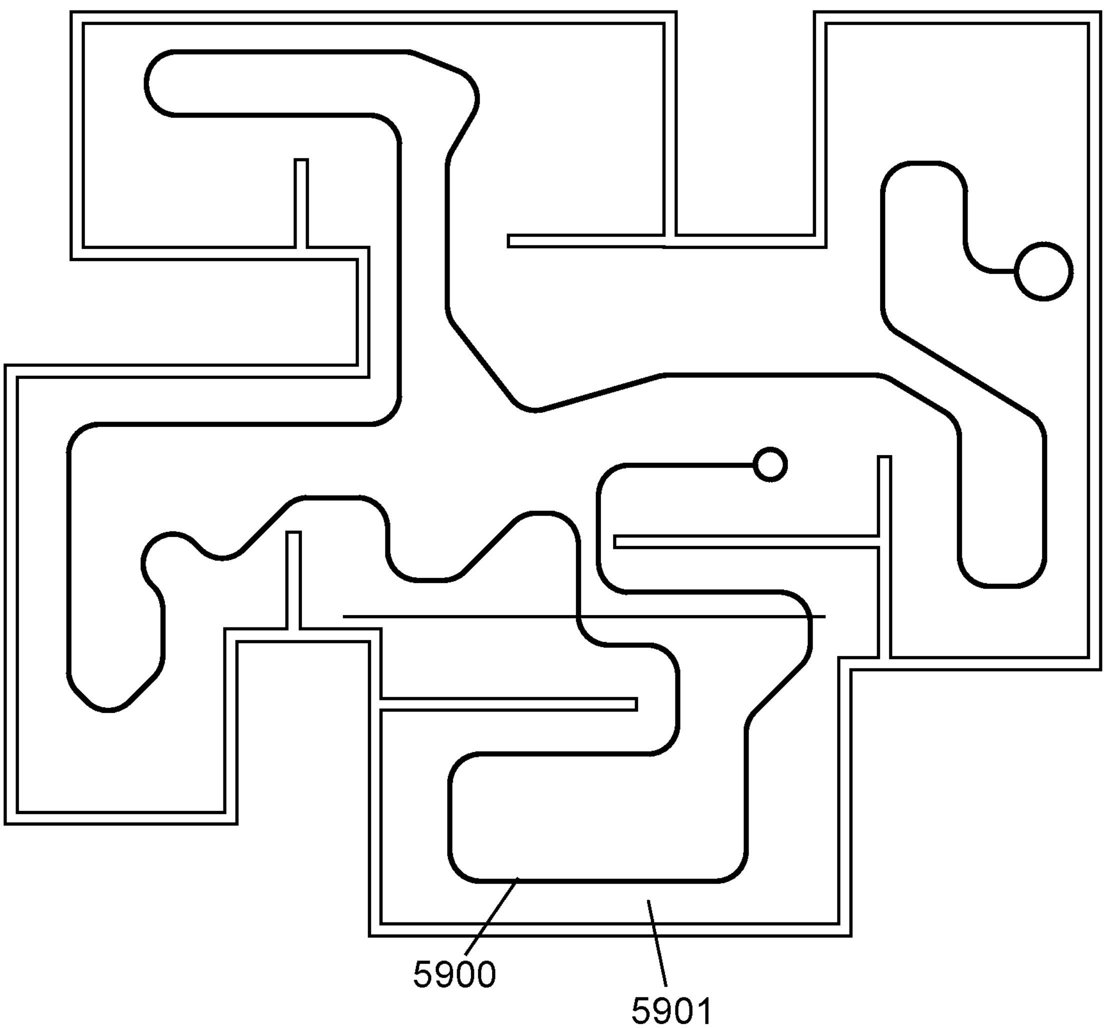
Figure 178B:
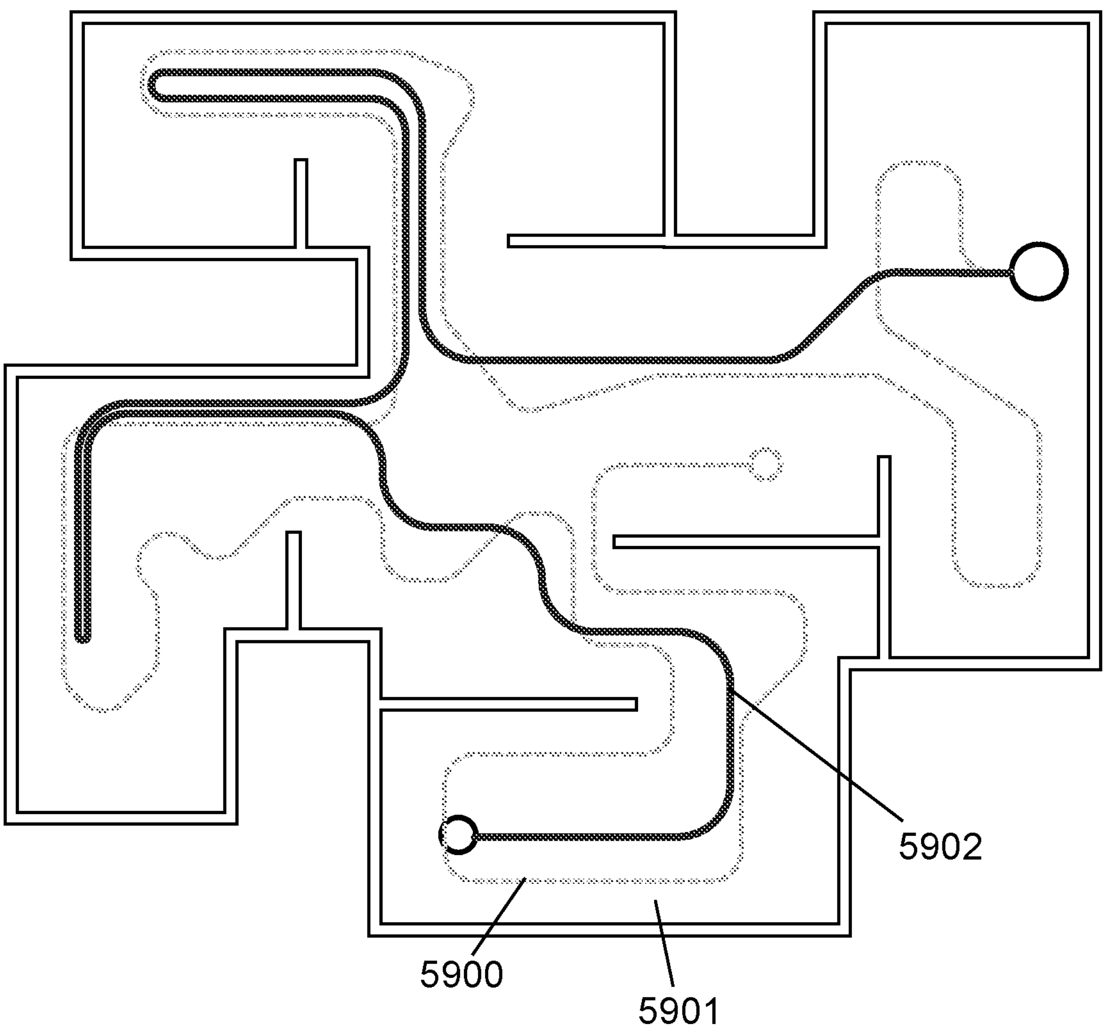
Figure 179A:
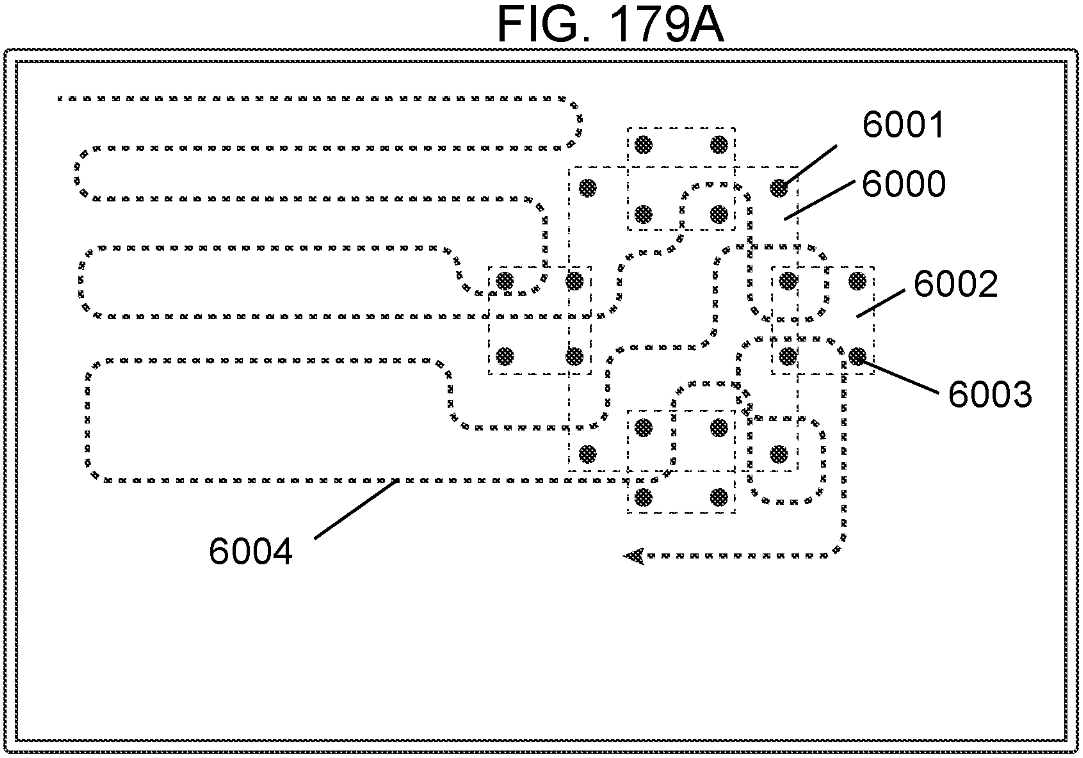
Figure 179B:
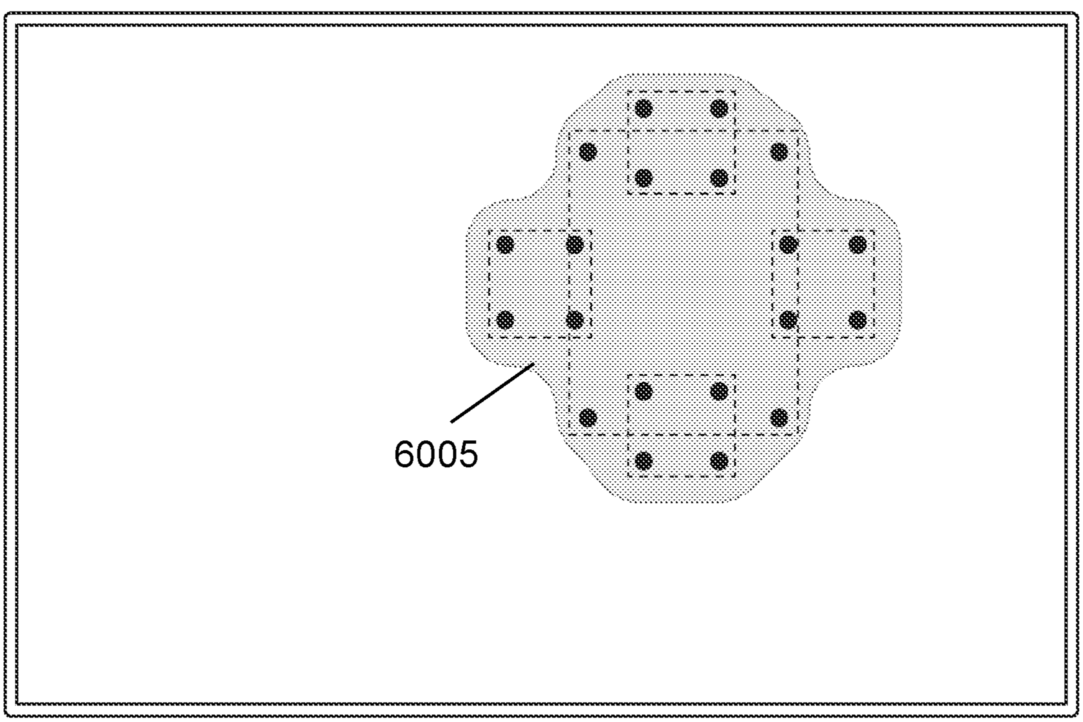
Figure 179C:
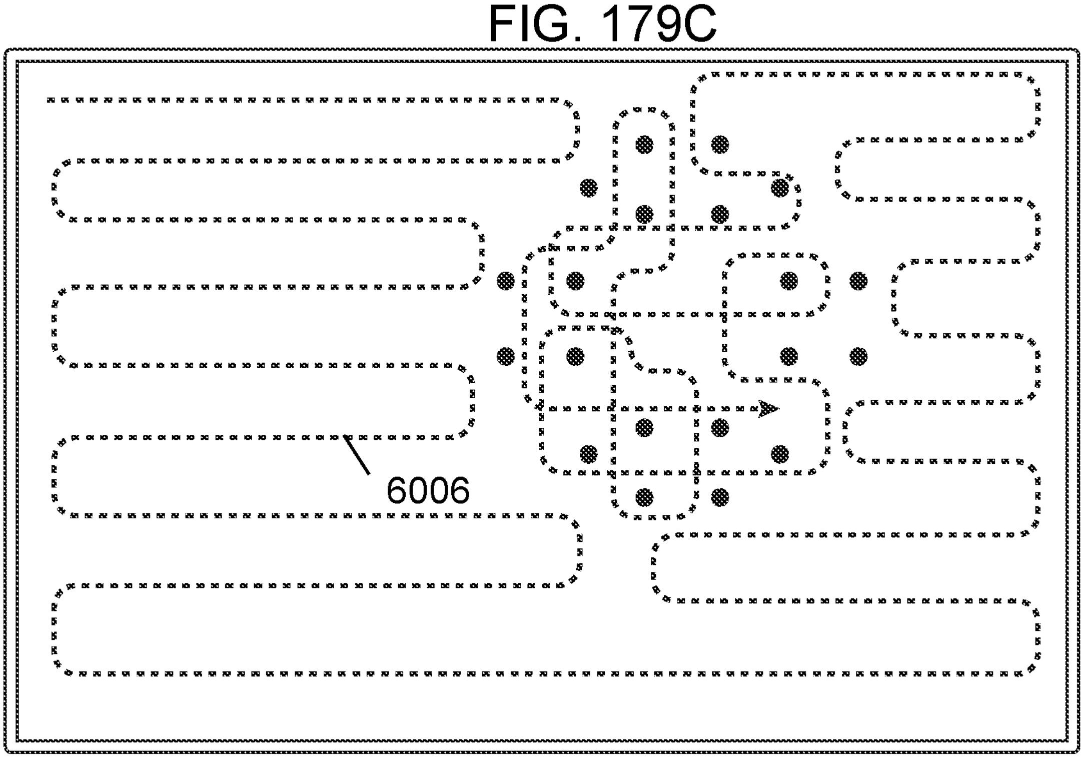
Figure 179D:
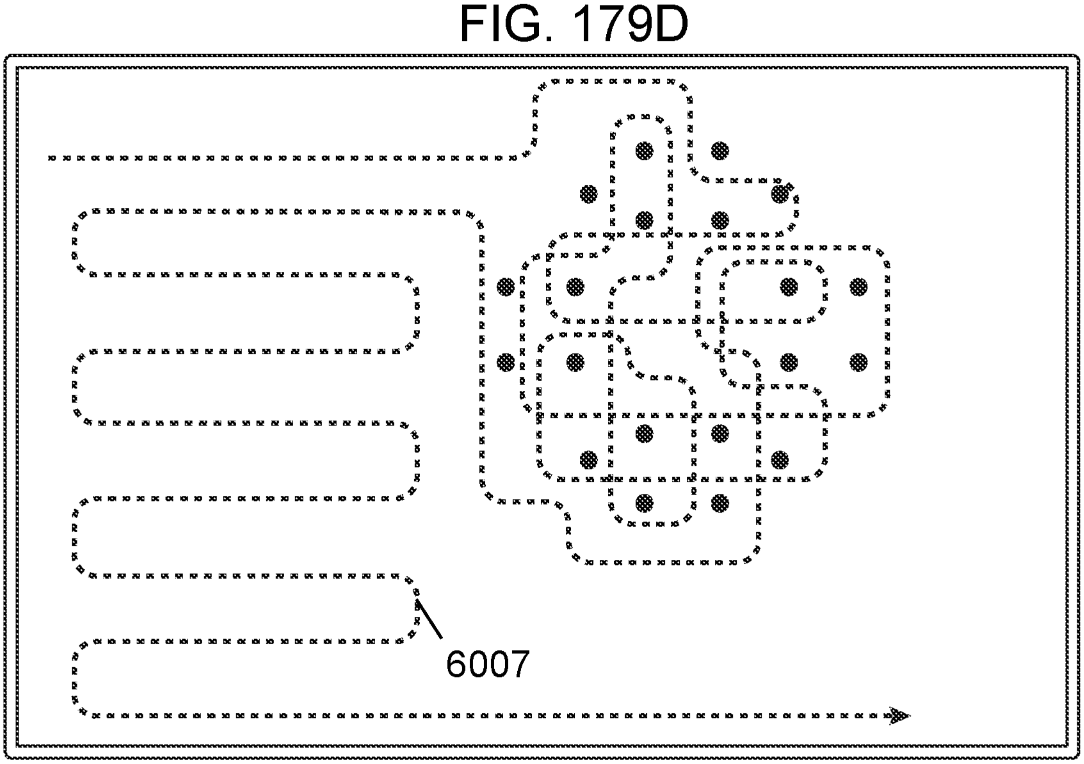
Figure 179E:
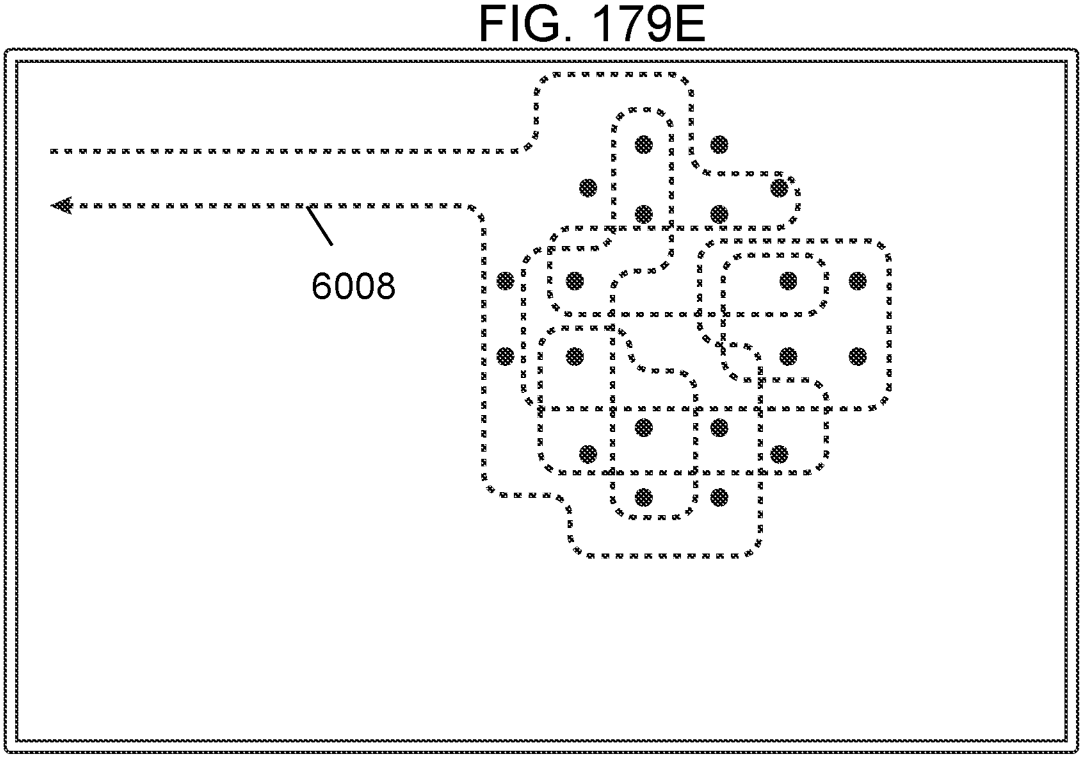
Figure 179F:
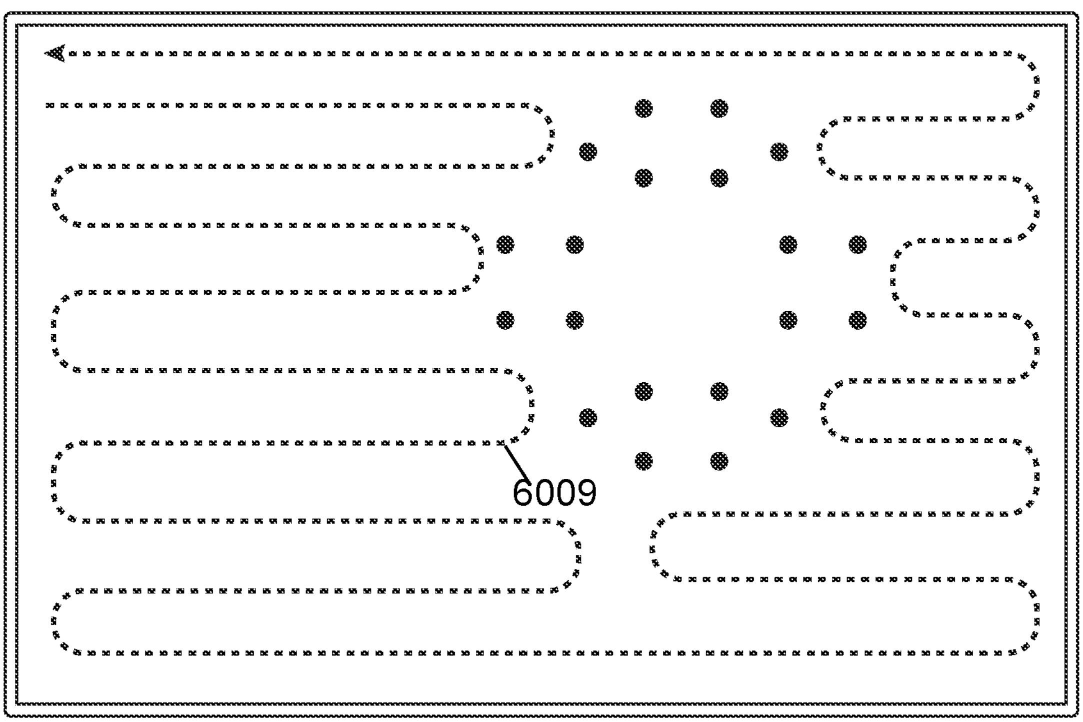
Figure 180A:
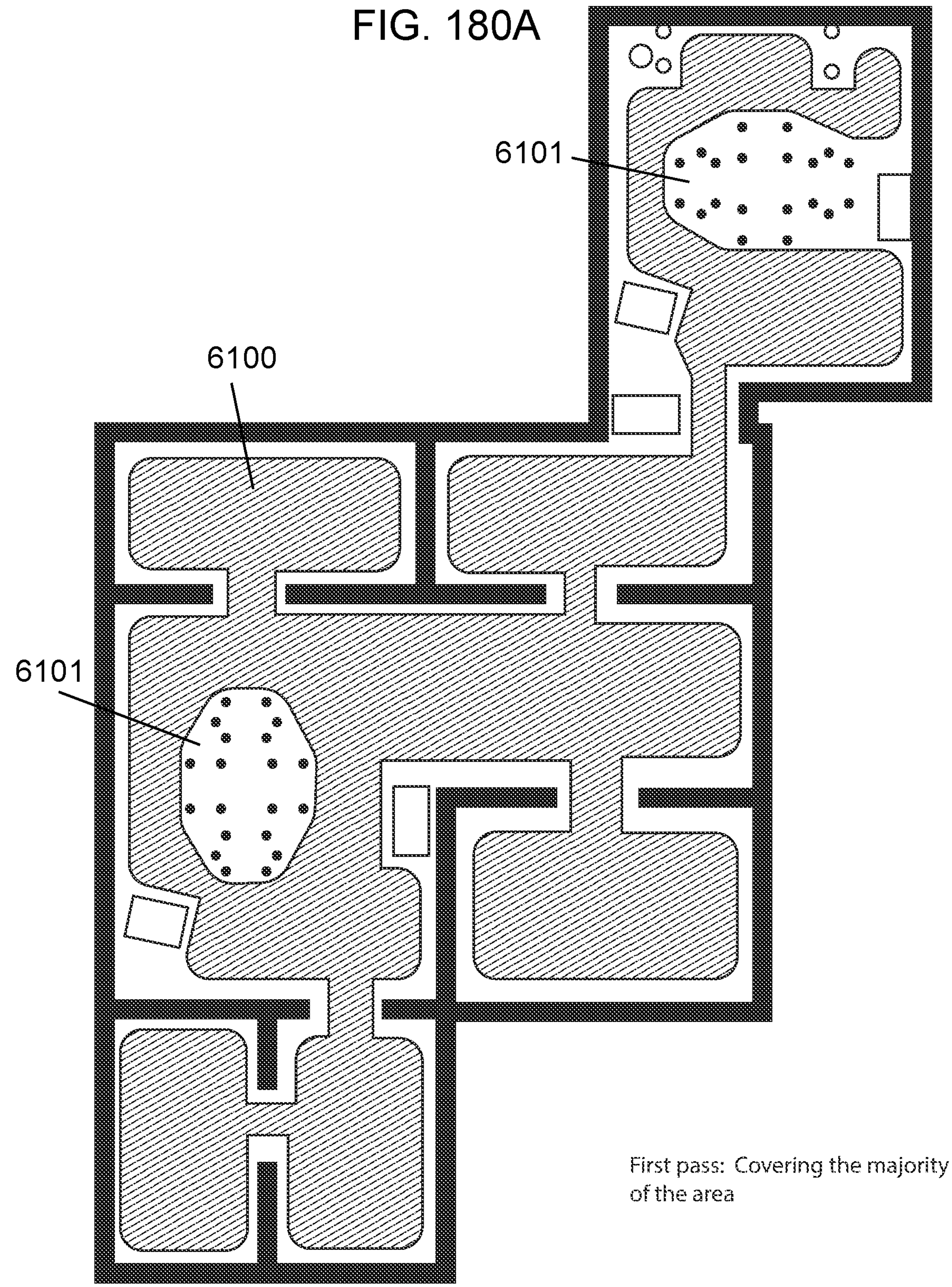
Figure 180B:
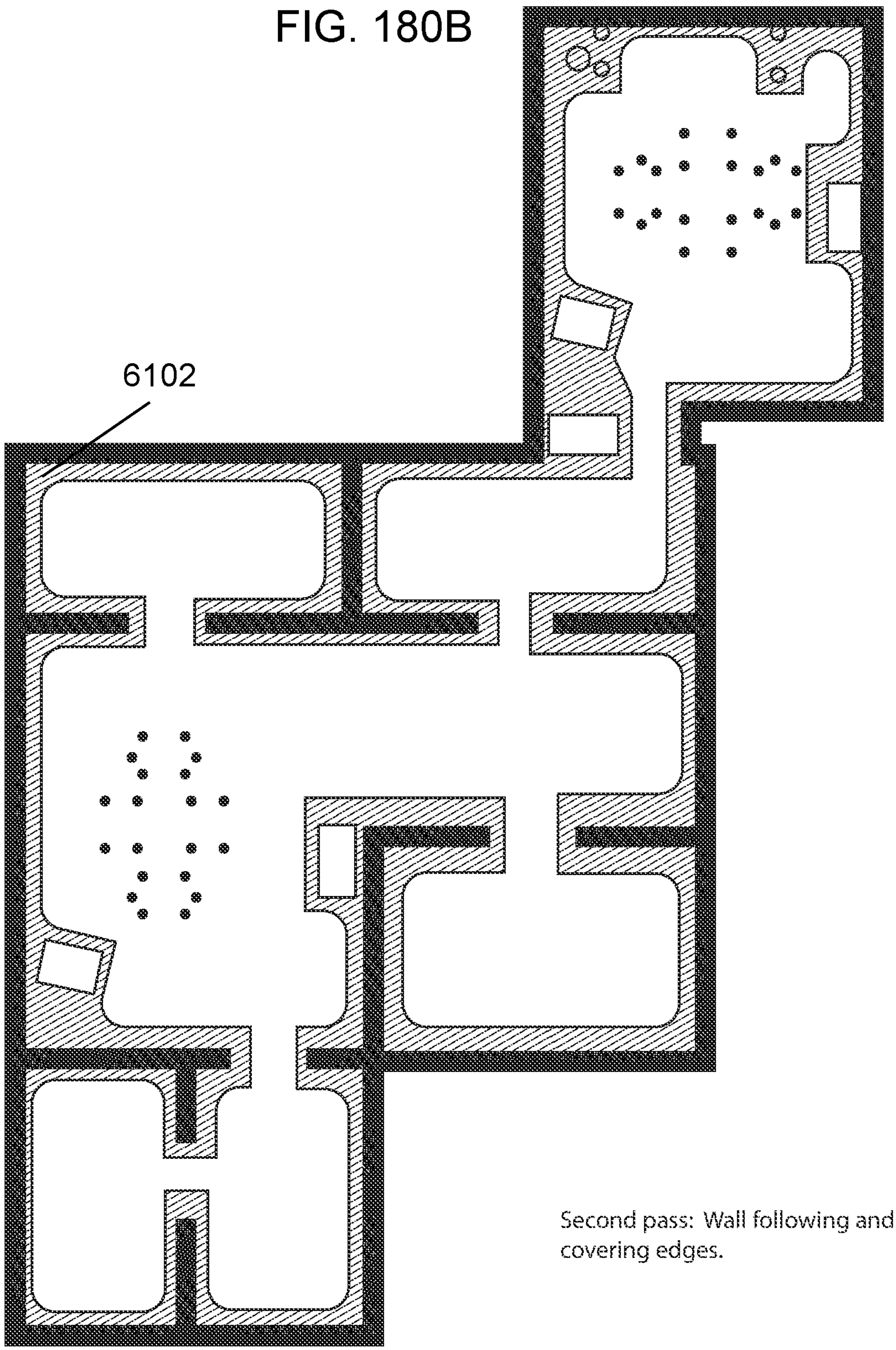
Figure 180C:
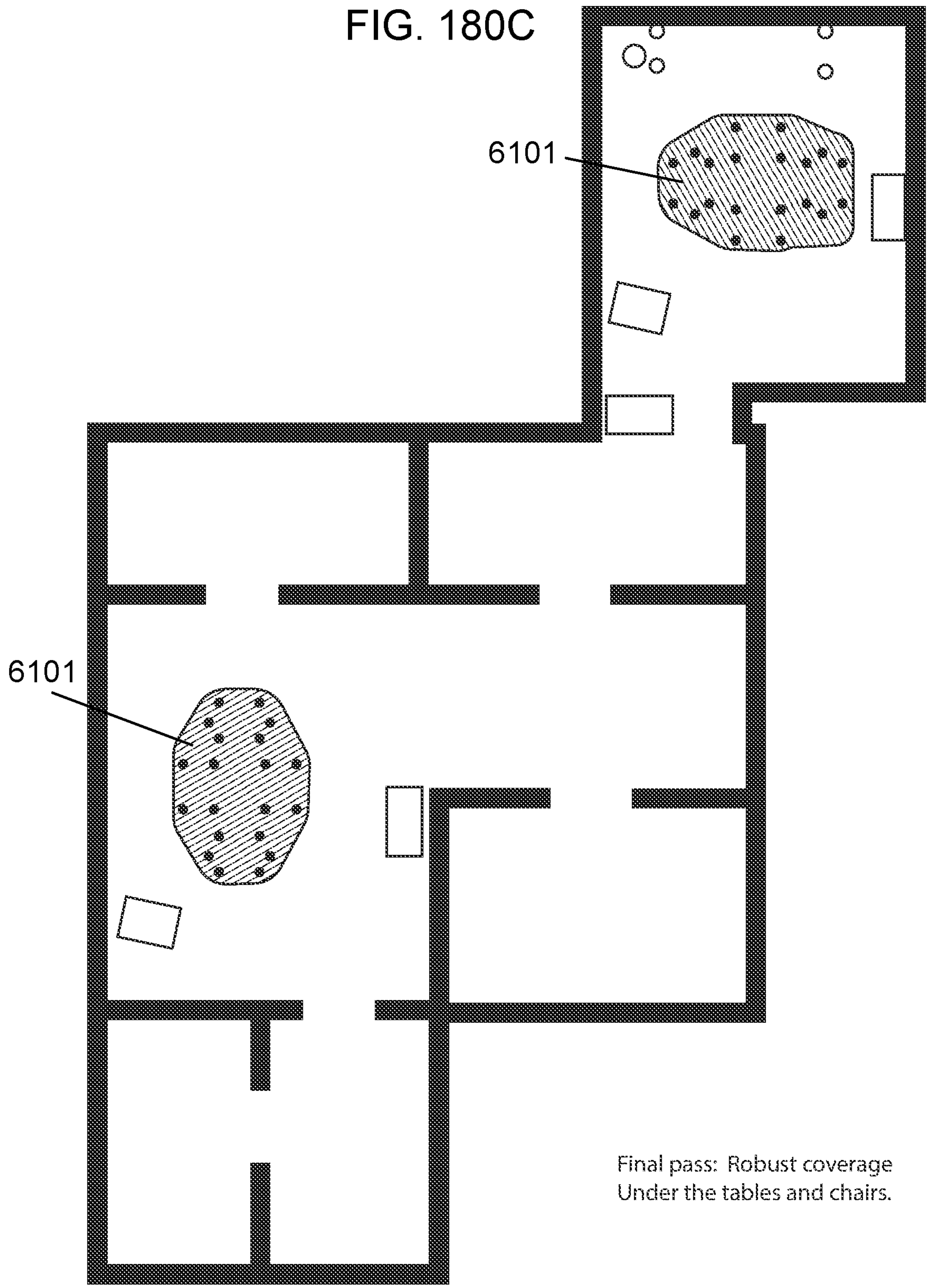
Figure 180D:
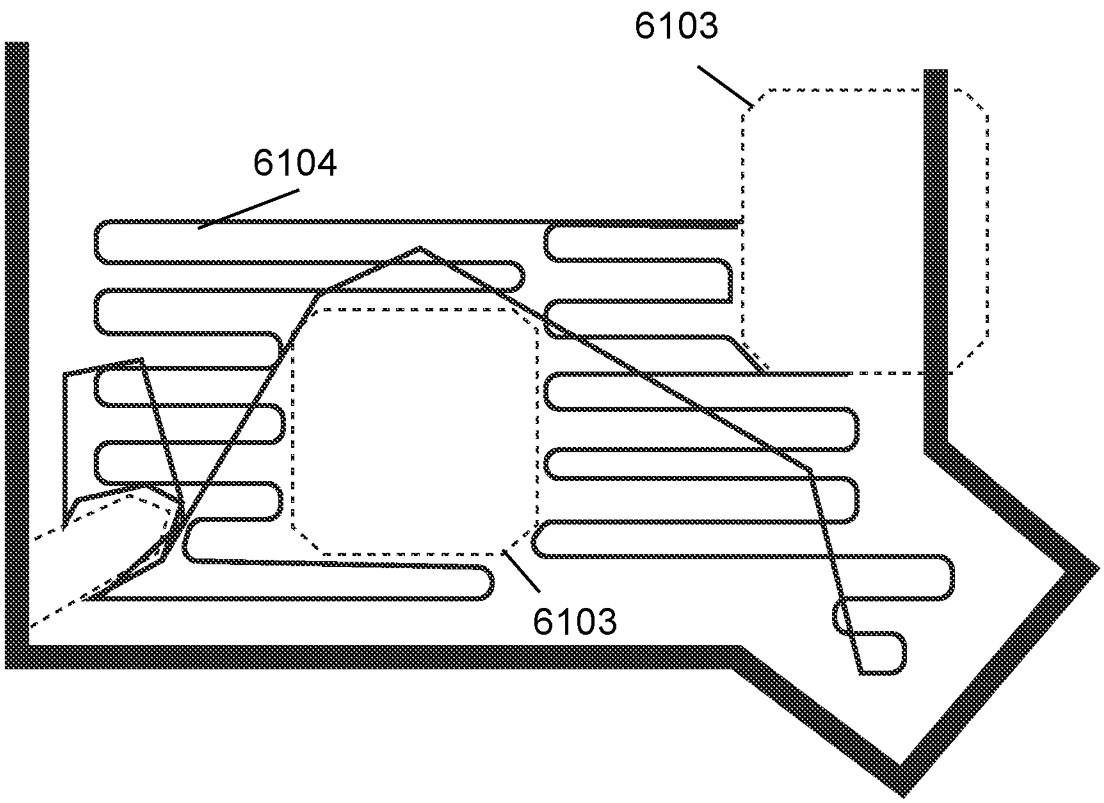

In some embodiments, the robot may initially enter a patrol mode wherein the robot observes the environment and generates a spatial representation of the environment. In some embodiments, the processor of the robot may use a cost function to minimize the length of the path of the robot required to generate the complete spatial representation of the environment. FIG. 178A illustrates an example of a path 5900 of a robot using traditional methods to create a spatial representation of the environment 5901. FIG. 178B illustrates an example of a path 5902 of the robot using a cost function to minimize the length of the path of the robot required to generate the complete spatial representation. The path 5902 is much shorter in length than the path 5900 generated using traditional path planning methods described in prior art. In some cases, path planning methods described in prior art cover open areas and high obstacle density areas simultaneously without distinguishing the two. However, this may result in inefficient coverage as different tactics may be required for covering open areas and high obstacle density areas and the robot may become stuck in the high obstacle density areas, leaving other parts of the environment uncovered. For example, FIG. 179A illustrates an example of an environment including a table 6000 with table legs 6001, four chairs 6002 with chair legs 6003, and a path 6004 generated using traditional path planning methods, wherein the arrowhead indicates a current or end location of the path. The path 6004 covers open areas and high obstacle density areas at the same time. This may result with a large portion of the open areas of the environment uncovered by the time the battery of the robot depletes as covering high obstacle density areas can be time consuming due to all the maneuvers required to move around the obstacles or the robot may become stuck in the high obstacle density areas. In some embodiments, the processor of the robot described herein may identify high obstacle density areas. FIG. 179B illustrates an example of a high obstacle density area 6005 identified by the processor of the robot. In some embodiments, the robot may cover open or low obstacle density areas first then cover high obstacle density areas or vice versa. FIG. 179C illustrates an example of a path 6006 of the robot that covers open or low obstacle density areas first then high obstacle density areas. FIG. 179D illustrates an example of a path 6007 of the robot that covers high obstacle density areas first then open or low obstacle density areas. In some embodiments, the robot may only cover high obstacle density areas. FIG. 179E illustrates an example of a path 6008 of the robot that only covers high obstacle density areas. In some embodiments, the robot may only cover open or low obstacle density areas. FIG. 179F illustrates an example of a path 6009 of the robot that only covers open or low obstacle density areas. FIG. 180A illustrates another example wherein the robot covers the majority of areas 6100 initially, particularly open or low obstacle density areas, leaving high obstacle density areas 6101 uncovered. In FIG. 180B, the robot then executes a wall follow to cover all edges 6102. In FIG. 180C, the robot finally covers high obstacle density areas 6101 (e.g., under tables and chairs). During initial coverage of open or low obstacle density areas, the robot avoids map fences (e.g., fences fencing in high obstacle density areas) but wall follows their perimeter. For example, FIG. 180D illustrates an example of a map including map fences 6103 and a path 6104 of the robot that avoids entering map fences 6103 but wall follows the perimeters of map fences 6103.

In some embodiments, the processor of the robot may determine a next coverage area. In some embodiments, the processor may determine the next coverage based on alignment with one or more walls of a room such that the parallel lines of a boustrophedon path of the robot are aligned with the length of the room, resulting in long parallel lines and a minimum the number of turns. In some embodiments, the size and location of coverage area may change as the next area to be covered is chosen. In some embodiments, the processor may avoid coverage in unknown spaces until they have been mapped and explored. In some embodiments, the robot may alternate between exploration and coverage. In some embodiments, the processor of the robot may first build a global map of a first area (e.g., a bedroom) and cover that first area before moving to a next area to map and cover. In some embodiments, a user may use an application of a communication device paired with the robot to view a next zone for coverage or the path of the robot.

In some embodiments, the processor of the robot may identify areas that may be easily covered by the robot (e.g., areas without or with minimal obstacles). For example, FIG. 181 illustrates an area 9600 that may be easily covered by the robot 9601 by following along boustrophedon path 9602. In some embodiments, the path of the robot may be a boustrophedon path. In some embodiments, boustrophedon paths may be slightly modified to allow for a more pleasant path planning structure. For example, FIGS. 182A and 182B illustrate examples of a boustrophedon path 9700. Assuming the robot travels in direction 9701, the robot moves in a straight line, and at the end of the straight line, denoted by circles 9703, follows along a curved path to rotate 180 degrees and move along a straight line in the opposite direction. In some instances, the robot follows along a smoother path plan to rotate 180 degrees, denoted by circle 9704. In some embodiments, the processor of the robot increases the speed of the robot as it approaches the end of a straight right line prior to rotating as the processor is highly certain there are no obstacles to overcome in such a region. In some embodiments, the path of the robot includes driving along a rectangular path (e.g., by wall following) and cleaning within the rectangle. In some embodiments, the robot may begin by wall following and after the processor identifies two or three perimeters, for example, the processor may then actuate the robot to cover the area inside the perimeters before repeating the process.

Figure 183A:
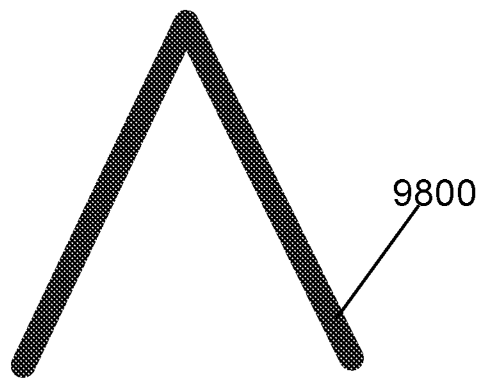
Figure 183B:
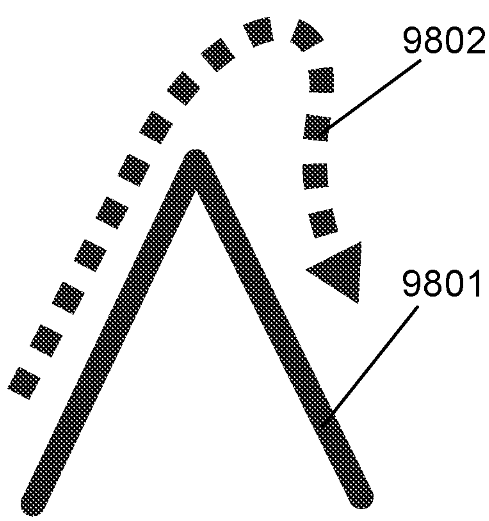
Figure 183C:
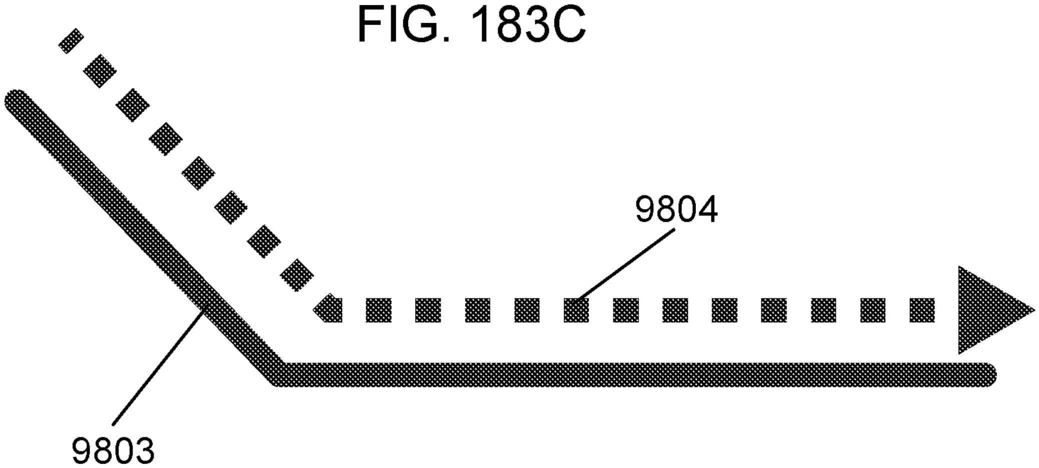
Figure 183D:
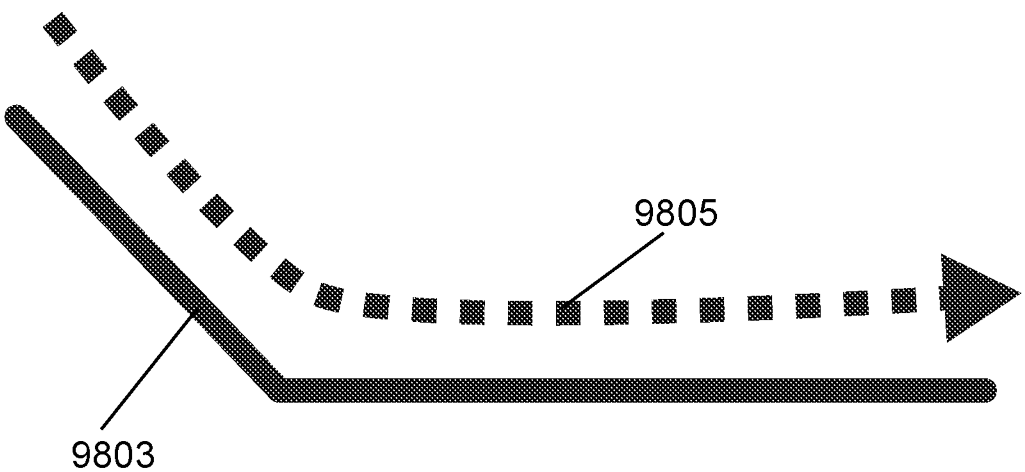
Figure 183E:
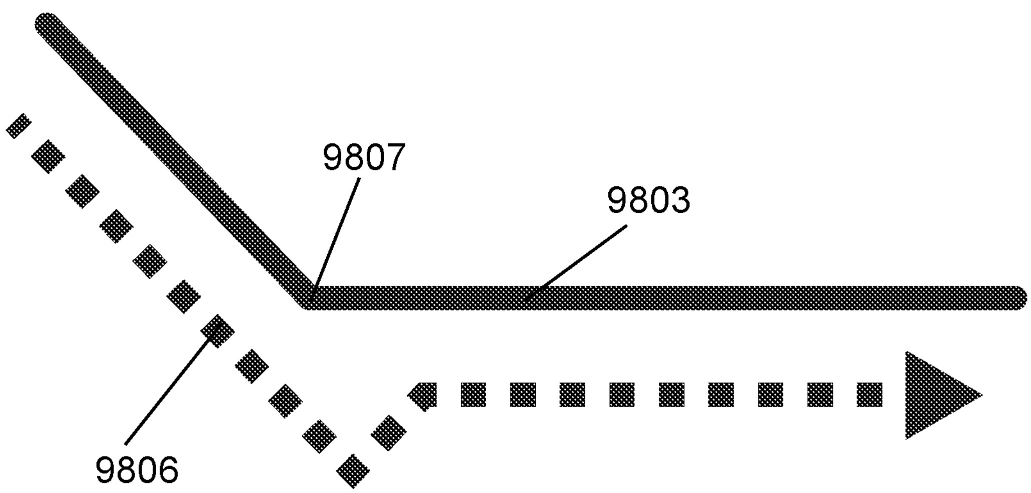

In some embodiments, the robot may drive along the perimeter or surface of an object 9800 with an angle such as that illustrated in FIG. 183A. In some embodiments, the robot may be driving with a certain speed and as the robot drives around the sharp angle the distance of the robot from the object may increase, as illustrated in FIG. 183B with object 9801 and path 9802 of the robot. In some embodiments, the processor may readjust the distance of the robot from the object. In some embodiments, the robot may drive along the perimeter or surface of an object with an angle such as that illustrated in FIG. 183C with object 9803 and path 9804 of the robot. In some embodiments, the processor of the robot may smoothen the path of the robot, as illustrated in FIG. 183D with object 9803 and smoothened path 9805 of the robot. In some cases, such as in FIG. 183E, the robot may drive along a path 9806 adjacent to the perimeter or surface of the object 9803 and suddenly miss the perimeter or surface of the object at a point 9807 where the direction of the perimeter or surface changes. In such cases, the robot may have momentum and a sudden correction may not be desired. Smoothening the path may avoid such situations. In some embodiments, the processor may smoothen a path with systematic discrepancies between odometry (Odom) and an OTS due to momentum of the robot (e.g., when the robot stops rotating). FIGS. 184A-184C illustrate an example of an output of an EKF (Odom: $v_x$, $v_w$, timestamp; OTS: $v_x$, $v_w$, timestamp (in OTS coordinates); and IMU: $v_w$, timestamp) for three phases. In phase one, shown in FIG. 184A, the odometer, OTS, and IMU agree that the robot is rotating. In phase two, shown in FIG. 184B, the odometer reports 0, 0 without ramping down and with ~150 ms delay while the OTS and IMU agree that the robot is moving. The EKF rejects the odometer. Such discrepancies may be resolved by smoothening the slowing down phase of the robot to compensate for the momentum of the robot. FIG. 184C illustrates phase three wherein the odometer, OTS, and IMU report low (or no) movement of the robot.

In some embodiments, a TSSP or LED IR event may be detected as the robot traverses along a path within the environment. For example, a TSSP event may be detected when an obstacle is observed on a right side of the robot and may be passed to a control module as (L: 0 R: 1). In some embodiments, the processor may add newly discovered obstacles (e.g., static and dynamic obstacles) and/or cliffs to the map when unexpectedly (or expectedly) encountered during coverage. In some embodiments, the processor may adjust the path of the robot upon detecting an obstacle.

In some embodiments, a path executor may command the robot to follow a straight or curved path for a consecutive number of seconds. In some cases, the path executor may exit for various reasons, such as having reached the goal. In some embodiments, a curve to point path may be planned to drive the robot from a current location to a desired location while completing a larger path. In some embodiments, traveling along a planned path may be infeasible. For example, traversing a next planned curved or straight path by the robot may be infeasible. In some embodiments, the processor may use various feasibility conditions to determine if a path is traversable by the robot. In some embodiments, feasibility may be determined for the particular dimensions of the robot.

In some embodiments, the processor of the robot may use the map (e.g., locations of rooms, layout of areas, etc.) to determine efficient coverage of the environment. In some embodiments, the processor may choose to operate in closer rooms first as traveling to distant rooms may be burdensome and/or may require more time and battery life. For example, the processor of a robot may choose to clean a first bedroom of a home upon determining that there is a high probability of a dynamic obstacle within the home office and a very low likelihood of a dynamic obstacle within the first bedroom. However, in a map layout of the home, the first bedroom is several rooms away from the robot. Therefore, in the interest of operating at peak efficiency, the processor may choose to clean the hallway, a washroom, and a second bedroom, each on the way to the first bedroom. In an alternative scenario, the processor may determine that the hallway and the washroom have a low probability of a dynamic obstacle and that second bedroom has a higher probability of a dynamic obstacle and may therefore choose to clean the hallway and the washroom before checking if there is a dynamic obstacle within the second bedroom. Alternatively, the processor may skip the second bedroom after cleaning the hallway and washroom, and after cleaning the first bedroom, may check if second bedroom should be cleaned.

In some embodiments, the processor may use obstacle sensor readings to help in determining coverage of an environment. In some embodiments, obstacles may be discovered using data of a depth sensor as the depth sensor approaches the obstacles from various points of view and distances. In some embodiments, the depth sensor may use active or passive depth sensing methods, such as focusing and defocusing, IR reflection intensity (i.e., power), IR (or close to IR or visible) structured light, IR (or close to IR or visible) time of flight (e.g., 2D measurement and depth), IR time of flight single pixel sensor, or any combination thereof. In some embodiments, the depth sensor may use passive methods, such as those used in motion detectors and IR thermal imaging (e.g., in 2D). In some embodiments, stereo vision, polarization techniques, a combination of structured light and stereo vision and other methods may be used. In some embodiments, the robot covers areas with low obstacle density first and then performs a robust coverage. In some embodiments, a robust coverage includes covering areas with high obstacle density. In some embodiments, the robot may perform a robust coverage before performing a low density coverage. In some embodiments, the robot covers open areas (or areas with low obstacle density) one by one, executes a wall follow, covers areas with high obstacle density, and then navigates back to its charging station. In some embodiments, the processor of the robot may notify a user (e.g., via an application of a communication device) if an area is too complex for coverage and may suggest the user skip that area or manually operate navigation of the robot (e.g., manually drive an autonomous vehicle or manually operate a robotic surface cleaner using a remote).

In some embodiments, the processor may use an observed level of activity within areas of the environment when determining coverage. For example, a processor of a surface cleaning robot may prioritize consistent cleaning of a living room when a high level of human activity is observed within the living room as it is more likely to become dirty as compared to an area with lower human activity. In some embodiments, the processor of the robot may detect when a house or room is occupied by a human (or animal). In some embodiments, the processor may identify a particular person occupying an area. In some embodiments, the processor may identify the number of people occupying an area. In some embodiments, the processor may detect an area as occupied or identify a particular person based on activity of lights within the area (e.g., whether lights are turned on), facial recognition, voice recognition, and user pattern recognition determined using data collected by a sensor or a combination of sensors. In some embodiments, the robot may detect a human (or other objects having different material and texture) using diffraction. In some cases, the robot may use a spectrometer, a device that harnesses the concept of diffraction, to detect objects, such as humans and animals. A spectrometer uses diffraction (and the subsequent interference) of light from slits to separate wavelengths, such that faint peaks of energy at specific wavelengths may be detected and recorded. Therefore, the results provided by a spectrometer may be used to distinguish a material or texture and hence a type of object. For example, output of a spectrometer may be used to identify liquids, animals, or dog incidents. In some embodiments, detection of a particular event by various sensors of the robot or other smart devices within the area in a particular pattern or order may increase the confidence of detection of the particular event. For example, detecting an opening or closing of doors may indicate a person entering or leaving a house while detecting wireless signals from a particular smartphone attempting to join a wireless network may indicate a particular person of the household or a stranger entering the house. In some embodiments, detecting a pattern of events within a time window or a lack thereof may trigger an action of the robot. For example, detection of a smartphone MAC address unknown to a home network may prompt the robot to position itself at an entrance of the home to take pictures of a person entering the home. The picture may be compared to a set of features of owners or people previously met by the robot, and in some cases, may lead to identification of a particular person. If a user is not identified, features may be further analyzed for commonalities with the owners to identify a sibling or a parent or a sibling of a frequent visitor. In some cases, the image may be compared to features of local criminals stored in a database.

In some embodiments, the processor may use an amount of debris historically collected or observed within various locations of the environment when determining a prioritization of rooms for cleaning. In some embodiments, the amount of debris collected or observed within the environment may be catalogued and made available to a user. In some embodiments, the user may select areas for cleaning based on debris data provided to the user.

In some embodiments, the processor may use a traversability algorithm to determine different areas that may be safely traversed by the robot, from which a coverage plan of the robot may be taken. In some embodiments, the traversability algorithm obtains a portion of data from the map corresponding to areas around the robot at a particular moment in time. In some embodiments, the multidimensional and dynamic map includes a global and local map of the environment, constantly changing in real-time as new data is sensed. In some embodiments, the global map includes all global sensor data (e.g., LIDAR data, depth sensor data) and the local map includes all local sensor data (e.g., obstacle data, cliff data, debris data, previous stalls, floor transition data, floor type data, etc.). In some embodiments, the traversability algorithm may determine a best two-dimensional coverage area based on the portion of data taken from the map. The size, shape, orientation, position, etc. of the two-dimensional coverage area may change at each interval depending on the portion of data taken from the map. In some embodiments, the two-dimensional coverage area may be a rectangle or another shape. In some embodiments, a rectangular coverage area is chosen such that it aligns with the walls of the environment. FIG. 185 illustrates an example of a coverage area 10000 for robot 10001 within environment 10002. In some embodiments, coverage areas chosen may be of different shapes and sizes. For example, FIG. 186 illustrates a coverage area 10100 for robot 10001 with a different shape within environment 10002.

In some embodiments, the traversability algorithm employs simulated annealing technique to evaluate possible two-dimensional coverage areas (e.g., different positions, orientations, shapes, sizes, etc. of two-dimensional coverage areas) and choose a best two-dimensional coverage area (e.g., the two-dimensional coverage area that allows for easiest coverage by the robot). In embodiments, simulated annealing may model the process of heating a system and slowly cooling the system down in a controlled manner. When a system is heated during annealing, the heat may provide a randomness to each component of energy of each molecule. As a result, each component of energy of a molecule may temporarily assume a value that is energetically unfavorable and the full system may explore configurations that have high energy. When the temperature of the system is gradually lowered the entropy of the system may be gradually reduced as molecules become more organized and take on a low-energy arrangement. Also, as the temperature is lowered, the system may have an increased probability of finding an optimum configuration. Eventually the entropy of the system may move towards zero wherein the randomness of the molecules is minimized and an optimum configuration may be found.

In simulated annealing, a goal may be to bring the system from an initial state to a state with minimum possible energy. Ultimately, the simulation of annealing, may be used to find an approximation of a global minimum for a function with many variables, wherein the function may be analogous to the internal energy of the system in a particular state. Annealing may be effective because even at moderately high temperatures, the system slightly favors regions in the configuration space that are overall lower in energy, and hence are more likely to contain the global minimum. At each time step of the annealing simulation, a neighboring state of a current state may be selected and the processor may probabilistically determine to move to the neighboring state or to stay at the current state. Eventually, the simulated annealing algorithm moves towards states with lower energy and the annealing simulation may be complete once an adequate state (or energy) is reached.

In some embodiments, the traversability algorithm classifies the map into areas that the robot may navigate to, traverse, and perform work. In some embodiments, the traversability algorithm may use stochastic or other methods for to classify an X, Y, Z, K, L, etc. location of the map into a class of a traversability map. For lower dimension maps, the processor of the robot may use analytic methods, such as derivatives and solving equations, in finding optimal model parameters. However, as models become more complicated, the processor of the robot may use local derivatives and gradient methods, such as in neural networks and maximum likelihood methods. In some embodiments, there may be multiple maxima, therefore the processor may perform multiple searches from different starting conditions. Generally, the confidence of a decision increases as the number of searches or simulations increases. In some embodiments, the processor may use naïve approaches. In some embodiments, the processor may bias a search towards regions within which the solution is expected to fall and may implement a level of randomness to find a best or near to best parameter. In some embodiments, the processor may use Boltzman learning or genetic algorithms, independently or in combination.

In some embodiments, the processor may model the system as a network of nodes with bi-directional links. In some embodiments, bi-directional links may have corresponding weights $w_{ij}=w_{ji}$. In some embodiments, the processor may model the system as a collection of cells wherein a value assigned to a cell indicates traversability to a particular adjacent cell. In some embodiments, values indicating traversability from the cell to each adjacent cell may be provided. The value indicating traversability may be binary or may be a weight indicating a level (or probability) of traversability. In some embodiments, the processor may model each node as a magnet, the network of N nodes modeled as N magnets and each magnet having a north pole and a south pole. In some embodiments, the weights $w_{ij}$ are functions of the separation between the magnets. In some embodiments, a magnet i pointing upwards, in the same direction as the magnetic field, contributes a small positive energy to the total system and has a state value $s_i=+1$ and a magnet i pointing downwards contributes a small negative energy to the total system and has a state value $s_i=-1$. Therefore, the total energy of the collection of N magnets is proportional to the total number of magnets pointing upwards. The probability of the system having a particular total energy may be related to the number of configurations of the system that result in the same positive energy or the same number of magnets pointing upwards. The highest level of energy has only a single possible configuration, i.e., $$\binom{N}{N_i} = \binom{N}{0} = 1$$

wherein $N_i$ is the number of magnets pointing downwards. In the second highest level of energy, a single magnet is pointing downwards. Any single magnet of the collection of magnets may be the one magnet pointing downwards. In the third highest level of energy, two magnets are pointing downwards. The probability of the system having the third highest level of energy is related to the number of system configurations having only two magnets pointing downwards, i.e.

$$\binom{N}{2} = \frac{N(N-1)}{2}.$$

The number of possible configurations declines exponentially as the number of magnets pointing downwards increases, as does the Boltzman factor.

In some embodiments, the system modeled has a large number of magnets N, each having a state $s_i$ for i=1, . . . , N. In some embodiments, the value of each state may be one of two Boolean values, such as ±1 as described above. In some embodiments, the processor determines the values of the states $s_i$ that minimize a cost or energy function. In some embodiments, the energy function may be $$E = -\frac{1}{2}\sum_{i,j=1}^{N} w_{ij}s_is_j,$$

wherein the weight $w_{ij}$ may be positive or negative. In some embodiments, the processor eliminates self-feedback terms (i.e., $w_{ii}=0$) as non-zero values for $w_{ii}$ add a constant to the function E which has no significance, independent of $s_i$. In some embodiments, the processor determines an interaction energy $$E_{ij} = -\frac{1}{2}w_{ij}s_is_j$$

between neighboring magnets based on their states, separation, and other physical properties. In some embodiments, the processor determines an energy of an entire system by the integral of all the energies that interact within the system. In some embodiments, the processor determines the configuration of the states of the magnets that has the lowest level of energy and thus the most stable configuration. In some embodiments, the space has $2^N$ possible configurations. Given the high number of possible configuration, determining the configuration with the lowest level of energy may be computationally expensive. In some cases, employing a greedy algorithm may result in becoming stuck in a local energy minima or never converging. In some embodiments, the processor determines a probability $$P(\gamma) = \frac{e^{-E_\gamma/T}}{Z(T)}$$

of the system having a (discrete) configuration γ with energy Eγ at temperature T, wherein Z(T) is a normalization constant. The numerator of the probability P(γ) is the Boltzmann factor and the denominator Z(T) is given by the partition function $\Sigma e^{-E\gamma/T}$. The sum of the Boltzmann constant for all possible configurations $Z(T)=\Sigma e^{-E\gamma/T}$ guarantees the equation represents a true probability. Given the large number of possible configurations, $2^N$, Z(T) may only be determined for simple cases.

In some embodiments, the processor may fit a boustrophedon path to the two-dimensional coverage area chosen by shortening or lengthening the longer segments of the boustrophedon path that cross from one side of the coverage area to the other and by adding or removing some of the longer segments of the boustrophedon path while maintaining a same distance between the longer segments regardless of the two-dimensional coverage area chosen (e.g., or by adjusting parameters defining the boustrophedon path). Since the map is dynamic and constantly changing based on real-time observations, the two-dimensional coverage area is polymorphic and constantly changing as well (e.g., shape, size, position, orientation, etc.). Hence, the boustrophedon movement path is polymorphic and constantly changing as well (e.g., orientation, segment length, number of segments, etc.). In some embodiments, a coverage area may be chosen and a boustrophedon path may be fitted thereto in real-time based on real-time observations. As the robot executes the path plan (i.e., coverage of the coverage area via boustrophedon path) and discovers additional areas, the path plan may be polymorphized wherein the processor overrides the initial path plan with an adjusted path plan (e.g., adjusted coverage area and boustrophedon path). For example, FIG. 187 illustrates a path plan that is polymorphized three times. Initially, a small rectangle 10200 is chosen as the coverage area and a boustrophedon path 10201 is fitted to the small rectangle 10200. However, after obtaining more information, an override of the initial path plan (e.g., coverage area and path) is executed and thus polymorphized, resulting in the coverage area 10200 increasing in size to rectangle 10202. Hence, the second boustrophedon row 10203 is adjusted to fit larger coverage area 10202. This occurs another time, resulting in larger coverage area 10204 and larger boustrophedon path 10205 executed by robot 10206.

In some embodiments, the processor may use a traversability algorithm (e.g., a probabilistic method such as a feasibility function) to evaluate possible coverage areas to determine areas in which the robot may have a reasonable chance of encountering a successful traverse (or climb). In some embodiments, the traversability algorithm may include a feasibility function unique to the particular wheel dimensions and other mechanical characteristics of the robot. In some embodiments, the mechanical characteristics may be configurable. For example, FIG. 188 illustrates a path 10300 traversable by the robot as all the values of z (indicative of height) within the cells are five and the particular wheel dimensions and mechanical characteristics of the robot allow the robot to overcome areas with a z value of five. FIG. 189 illustrates another example of a traversable path 10400. In this case, the path is traversable as the values of z increase gradually, making the area climbable (or traversable) by the robot. FIG. 190 illustrates an example of a path 10500 that is not traversable by the robot because of the sudden increase in the value of z between two adjacent cells. FIG. 191 illustrates an adjustment to the path 10500 illustrated in FIG. 140 that is traversable by the robot. FIG. 192 illustrates examples of areas traversable by the robot 10700 because of gradual incline/decline or the size of the wheel 10701 of the robot 10700 relative to the area in which a change in height is observed. FIG. 193 illustrates examples of areas that are not traversable by the robot 10700 because of gradual incline/decline or the size of the wheel 10701 of the robot 10700 relative to the area in which a change in height is observed. In some embodiments, the z value of each cell may be positive or negative and represent a distance relative to a ground zero plane.

In some embodiments, the processor may use a traversability algorithm to determine a next movement of the robot. Although everything in the environment is constantly changing, the traversability algorithm freezes a moment in time and plans a movement of the robot that is safe at that immediate second based on the details of the environment at that particular frozen moment. The traversability algorithm allows the robot to securely work around dynamic and static obstacles (e.g., people, pets, hazards, etc.). In some embodiments, the traversability algorithm may identify dynamic obstacles (e.g., people, bikes, pets, etc.). In some embodiments, the traversability algorithm may identify dynamic obstacles (e.g., a person) in an image of the environment and determine their average distance and velocity and direction of their movement. In some embodiments, an algorithm may be trained in advance through a neural network to identify areas with high chances of being traversable and areas with low chances of being traversable. In some embodiments, the processor may use a real-time classifier to identify the chance of traversing an area. In some embodiments, bias and variance may be adjusted to allow the processor of the robot to learn on the go or use previous teachings. In some embodiments, the machine learned algorithm may be used to learn from mistakes and enhance the information used in path planning for a current and future work sessions. In some embodiments, traversable areas may initially be determined in a training work sessions and a path plan may be devised at the end of training and followed in following work sessions. In some embodiments, traversable areas may be adjusted and built upon in consecutive work sessions. In some embodiments, bias and variance may be adjusted to determine how reliant the algorithm is on the training and how reliant the algorithm is on new findings. A low bias-variance ratio value may be used to determine no reliance on the newly learned data, however, this may lead to the loss of some valuable information learned in real time. A high bias-variance ration may indicate total reliance on the new data, however, this may lead to new learning corrupting the initial classification training. In some embodiments, a monitoring algorithm constantly receiving data from the cloud and/or from robots in a fleet (e.g., real-time experiences) may dynamically determine a bias-variance ratio.

In some embodiments, data from multiple classes of sensors may be used in determining traversability of an area. In some embodiments, an image captured by a camera may be used in determining traversability of an area. In some embodiments, a single camera that may use different filters and illuminations in different timestamps may be used. For example, one image may be captured without active illumination and may use atmospheric illumination. This image may be used to provide some observations of the surroundings. Many algorithms may be used to extract usable information from an image captured of the surroundings. In a next timestamp, the image of the environment captured may be illuminated. In some embodiments, the processor may use a difference between the two images to extract additional information. In some embodiments, structured illumination may be used and the processor may extract depth information using different methods. In some embodiments, the processor may use an image captured (e.g., with or without illumination or with structured light illumination) at a first timestamp as a priori in a Baysian system. Any of the above mentioned methods may be used as a posterior. In some embodiments, the processor may extract a driving surface plane from an image without illumination. In some embodiments, the driving surface plane may be highly weighted in the determination of the traversability of an area. In some embodiments, a flat driving surface may appear as a uniform color in captured images. In some embodiments, obstacles, cliffs, holes, walls, etc. may appear as different textures in captured images. In some embodiments, the processor may distinguish the driving surface from other objects, such as walls, ceilings, and other flat and smooth surfaces, given the expected angle of the driving surface with respect to the camera. Similarly, ceilings and walls may be distinguished from other surfaces as well. In some embodiments, the processor may use depth information to confirm information or provide further granular information once a surface is distinguished. In some embodiments, this may be done by illuminating the FOV of the camera with a set of preset light emitting devices. In some embodiments, the set of preset light emitting devices may include a single source of light turned into a pattern (e.g., a line light emitter with an optical device, such as a lens), a line created with multiple sources of lights (such as LEDs) organized in an arrangement of dots that appear as a line, or a single source of light manipulated optically with one or more lenses and an obstruction to create a series of points in a line, in a grid, or any desired pattern.

In some embodiments, data from an IMU (or gyroscope) may also be used to determine traversability of an area. In some embodiments, an IMU may be used to measure the steepness of a ramp and a timer synchronized with the IMU may measure the duration of the steepness measured. Based on this data, a classifier may determine the presence of a ramp (or a bump, a cliff, etc. in other cases). Other classes of sensors that may be used in determining traversability of an area may include depth sensors, range finders, or distance measurement sensors. In one example, one measurement indicating a negative height (e.g., cliff) may slightly decreases the probability of traversability of an area. However, after a single measurement, the probability of traversability may not be low enough for the processor to mark the coverage area as untraversable. A second sensor may measure a small negative height for the same area that may increase the probability of traversability of the area and the area may be marked as traversable. However, another sensor reading indicating a high negative height at the same area decreases the probability of traversability of the area. When a probability of traversability of an area reaches below a threshold the area may be marked as a high risk coverage area. In some embodiments, there may be different thresholds for indicating different risk levels. In some embodiments, a value may be assigned to coverage areas to indicate a risk severity.

Figure 194A:
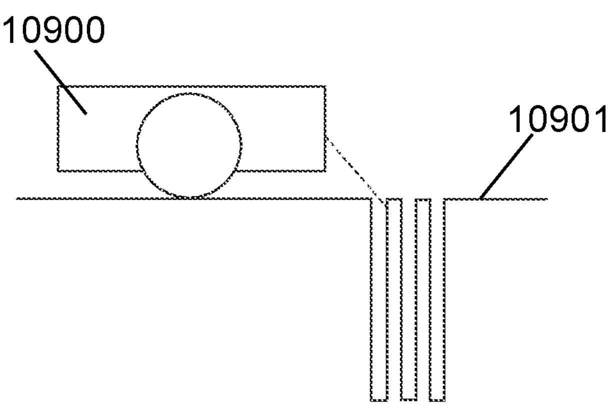
Figure 194B:
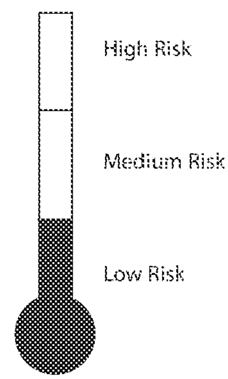
Figure 194C:
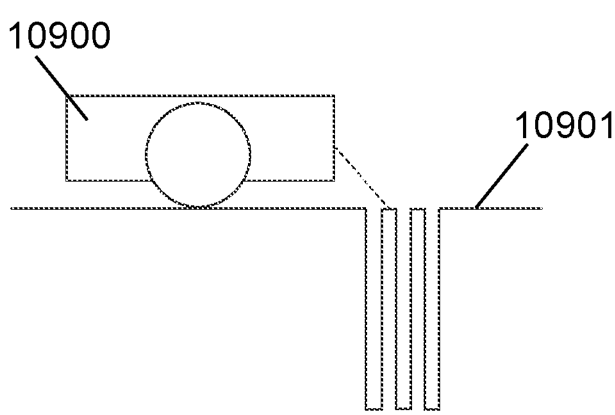
Figure 194D:
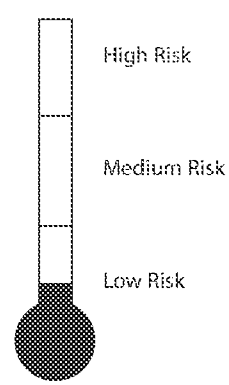
Figure 195A:
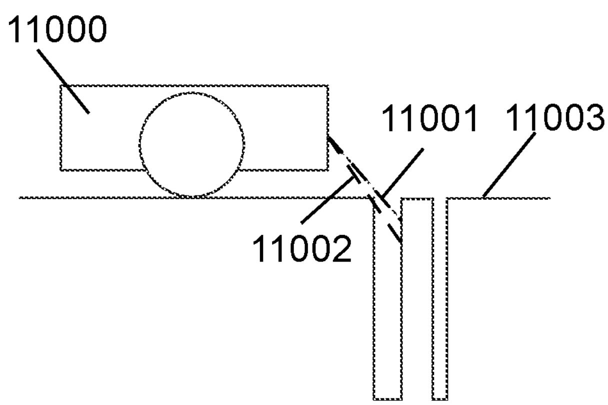
Figure 195B:
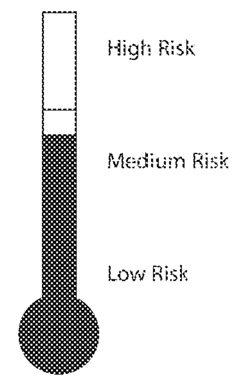
Figure 196A:
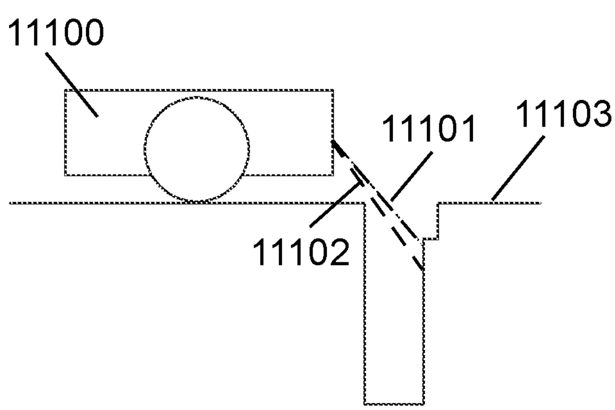
Figure 196B:
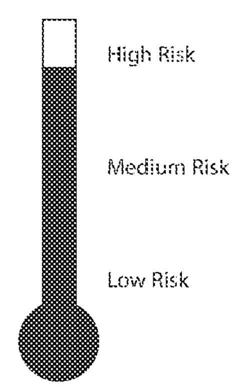

FIG. 194A illustrates a sensor of the robot 10900 measuring a first height relative to a driving plane 10901 of the robot 10900. FIG. 194B illustrates a low risk level at this instant due to only a single measurement indicating a high height. The probability of traversability decreases slightly and the area is marked as higher risk but not enough for it to be marked as an untraversable area. FIG. 194C illustrates the sensor of the robot 10900 measuring a second height relative to the driving plane 10901 of the robot 10900. FIG. 194D illustrates a reduction in the risk level at this instant due to the second measurement indicating a small or no height difference. In some embodiments, the risk level may reduce gradually. In some embodiments, a dampening value may be used to reduce the risk gradually. FIG. 195A illustrates sensors of robot 11000 taking a first 11001 and second 11002 measurement to driving plane 11003. FIG. 195B illustrates an increase in the risk level to a medium risk level after taking the second measurement as both measurements indicate a high height. Depending on the physical characteristics of the robot and parameters set, the area may be untraversable by the robot. FIG. 196A illustrates sensors of robot 11100 taking a first 11101 and second 11102 measurement to driving plane 11103. FIG. 196B illustrates an increase in the risk level to a high risk level after taking the second measurement as both measurements indicate a very high height. The area may be untraversable by the robot due to the high risk level.

In some embodiments, in addition to raw distance information, a second derivative of a sequence of distance measurements may be used to monitor the rate of change in the z values (i.e., height) of connected cells in a Cartesian plane. In some embodiments, second and third derivatives indicating a sudden change in height may increase the risk level of an area (in terms of traversability). FIG. 197A illustrates a Cartesian plane, with each cell having a coordinate with value (x, y, T), wherein T is indicative of traversability. FIG. 197B illustrates a visual representation of a traversability map, wherein different patterns indicate the traversability of the cell by the robot. In this example, cells with higher density of black areas correspond with a lower probability of traversability by the robot. In some embodiments, traversability T may be a numerical value or a label (e.g., low, medium, high) based on real-time and prior measurements. For example, an area in which an entanglement with a brush of the robot previously occurred or an area in which a liquid was previously detected or an area in which the robot was previously stuck or an area in which a side brush of the robot was previously entangled with tassels of a rug may increase the risk level and reduce the probability of traversability of the area. In another example, the presence of a hidden obstacle or a sudden discovery of a dynamic obstacle (e.g., a person walking) in an area may also increase the risk level and reduce the probability of traversability of the area. In one example, a sudden change in a type of driving surface in an area or a sudden discovery of a cliff in an area may impact the probability of traversability of the area. In some embodiments, traversability may be determined for each path from a cell to each of its neighboring cells. In some embodiments, it may be possible for the robot to traverse from a current cell to more than one neighboring cell. In some embodiments, a probability of traversability from a cell to each one or a portion of its neighboring cells may be determined. In some embodiments, the processor of the robot chooses to actuate the robot to move from a current cell to a neighboring cell based on the highest probability of traversability from the current cell to each one of its neighboring cells.

Figure 198A:
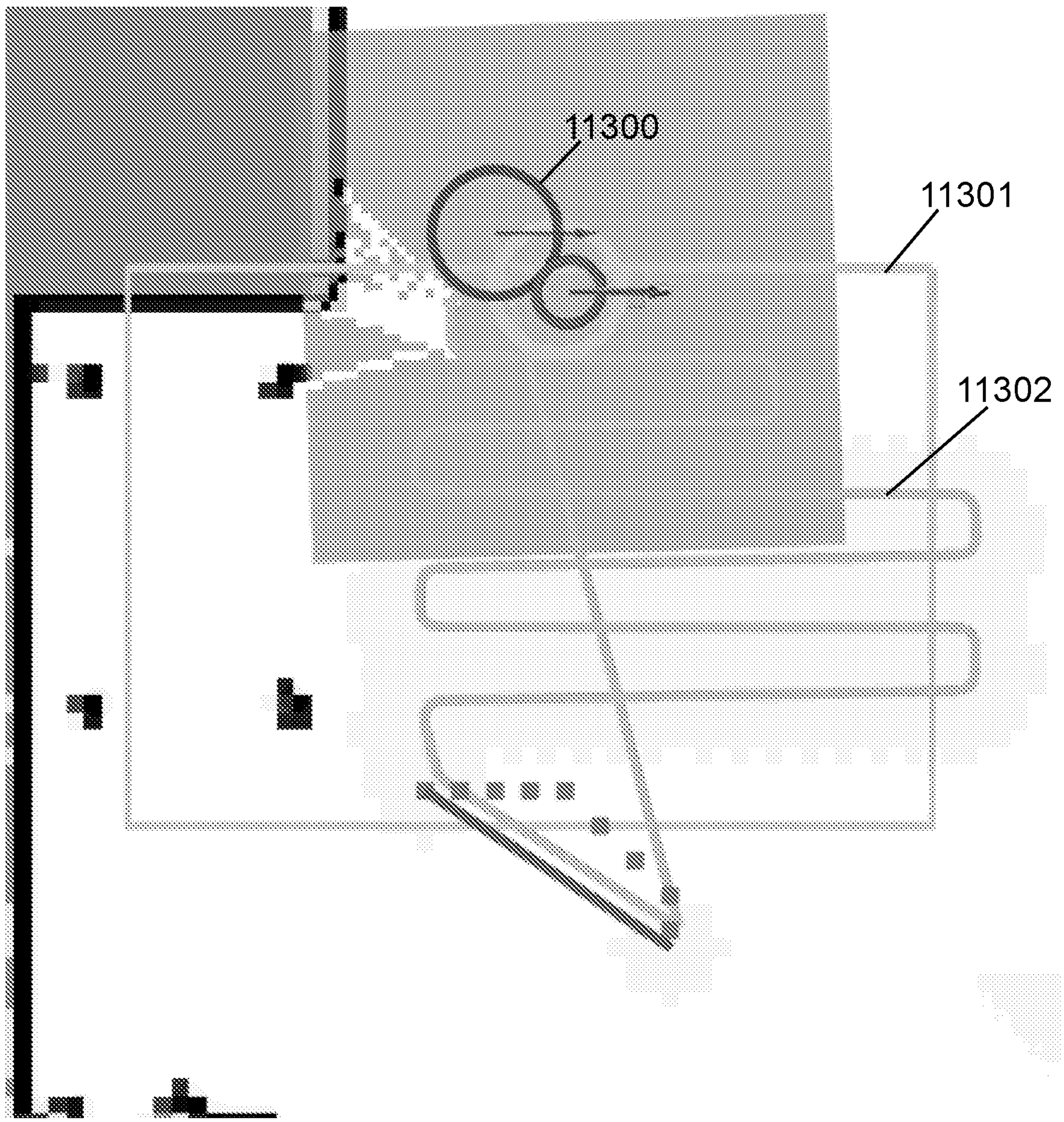
Figure 198B:
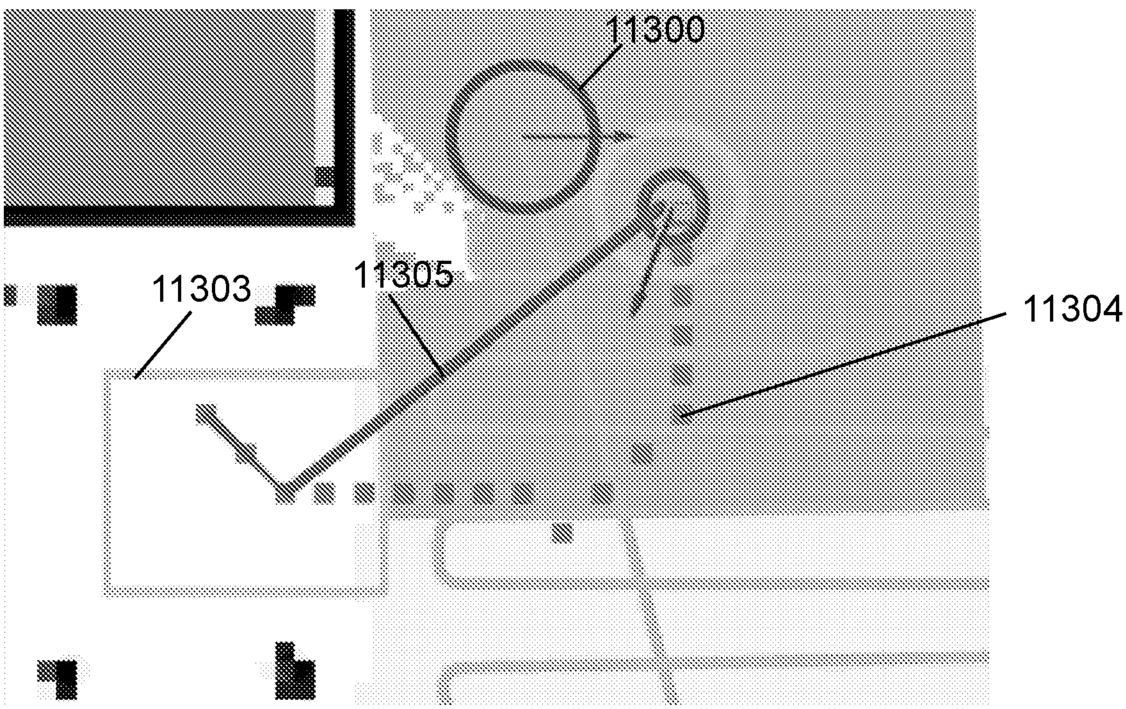
Figure 198C:
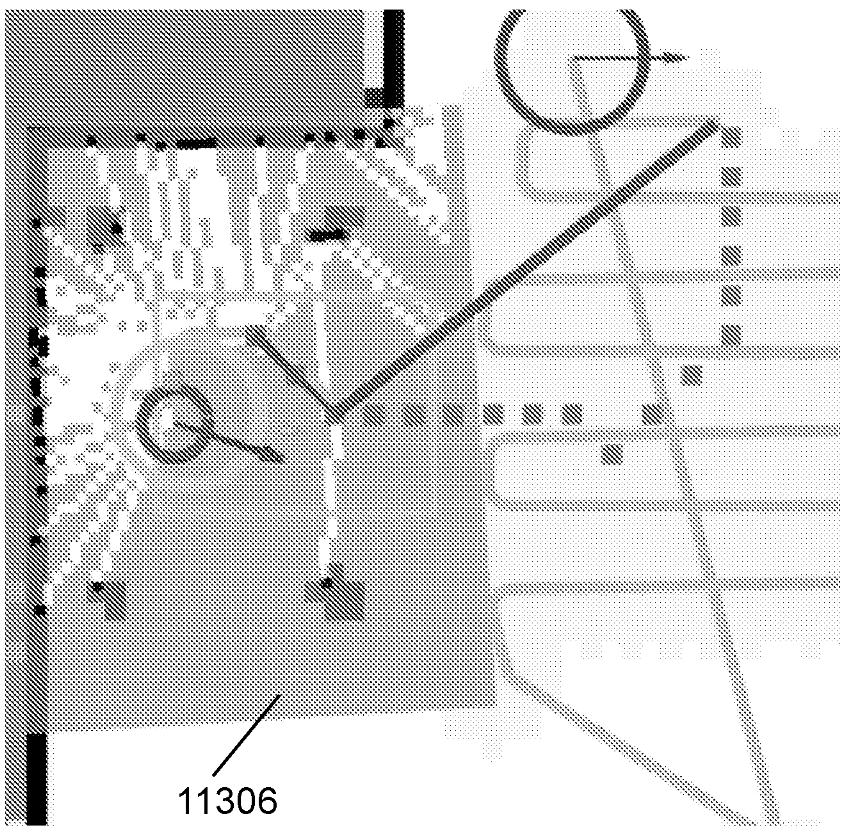
Figure 198D:
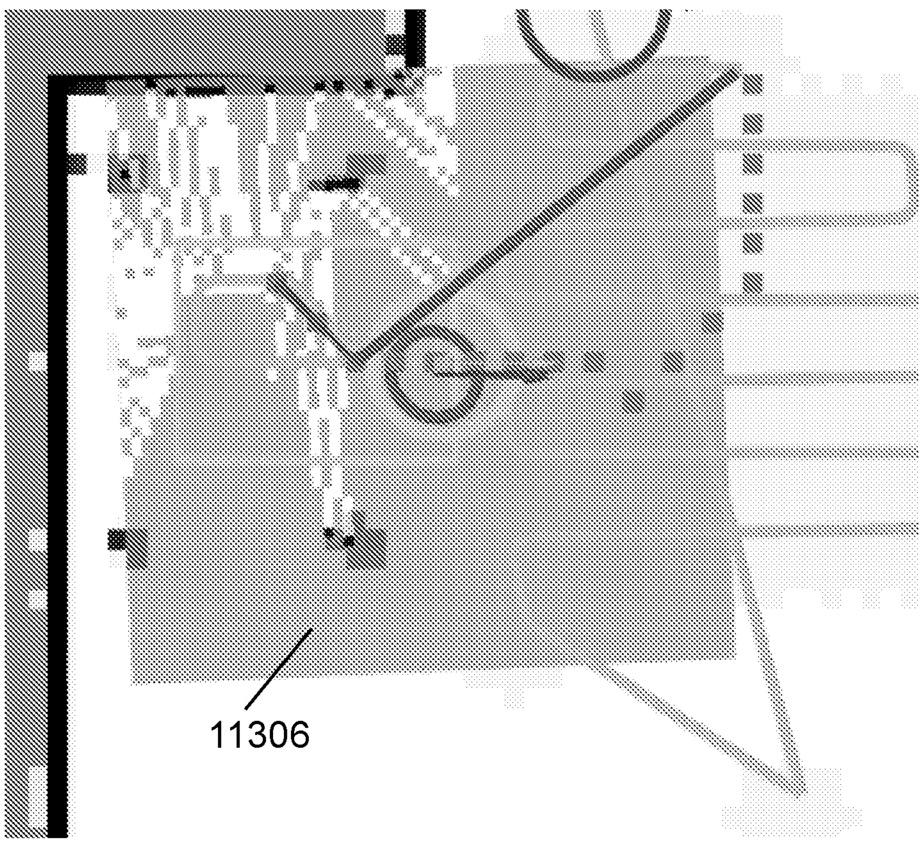
Figure 198E:
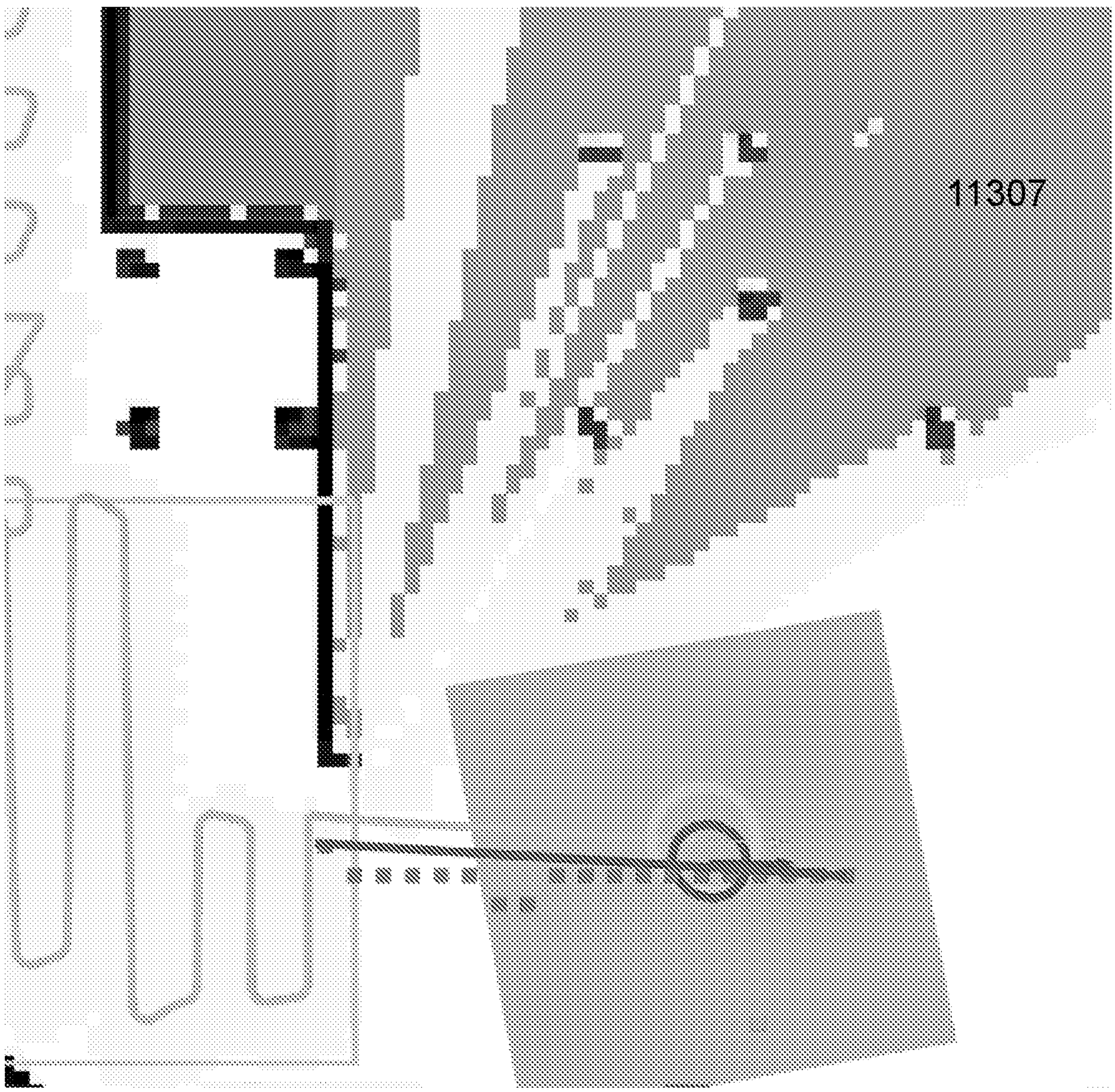

In some embodiments, the processor of the robot (or the path planner, for example) may instruct the robot to return to a center of a first two-dimensional coverage area when the robot reaches an end point in a current path plan before driving to a center of a next path plan. FIG. 198A illustrates the robot 11300 at an end point of one polymorphic path plan with coverage area 11301 and boustrophedon path 11302. FIG. 198B illustrates a subsequent moment wherein the processor decides a next polymorphic rectangular coverage area 11303. The dotted line 11304 indicates a suggested L-shape path back to a central point of a first polymorphic rectangular coverage area 11301 and then to a central point of the next polymorphic rectangular coverage area 11303. Because of the polymorphic nature of these path planning methods, the path may be overridden by a better path, illustrated by the solid line 11305. The path defined by the solid line 11305 may override the path defined by the dotted line 11304. The act of overriding may be a characteristic that may be defined in the realm of polymorphism. FIG. 198C illustrates a local planner 11306 (i.e., the grey rectangle) with a partially filled map. FIG. 198D illustrates that over time more readings are filled within the local map 11306. In some embodiments, local sensing may be superimposed over the global map and may create a dynamic and constantly evolving map. In some embodiments, the processor updates the global map as the global sensors provide additional information throughout operation. For example, FIG. 198E illustrates that data sensed by global sensors are integrated into the global map 11307. As the robot approaches obstacles, they may fall within the range of range sensor and the processor may gradually add the obstacles to the map.

In embodiments, the path planning methods described herein are dynamic and constantly changing. In some embodiments, the processor determines, during operation, areas within which the robot operates and operations the robot partakes in using machine learning. In some embodiments, information such as driving surface type and presence or absence of dynamic obstacles, may be used in forming decisions. In some embodiments, the processor uses data from prior work sessions in determining a navigational plan and a task plan for conducting tasks. In some embodiments, the processor may use various types of information to determine a most efficient navigational and task plan. In some embodiments, sensors of the robot collect new data while the robot executes the navigational and task plan. The processor may alter the navigational and task plan of the robot based on the new data and may store the new data for future use.

Other path planning methods that may be used are described in U.S. patent application Ser. Nos. 16/041,286, 16/422,234, 15/406,890, 16/796,719, 14/673,633, 15/676,888, 16/558,047, 15/449,531, 16/446,574, and 15/006,434, the entire contents of which are hereby incorporated by reference. For example, in some embodiments, the processor of the robot may generate a movement path in real-time based on the observed environment. In some embodiments, a topological graph may represent the movement path and may be described with a set of vertices and edges, the vertices being linked by edges. Vertices may be represented as distinct points while edges may be lines, arcs or curves. The properties of each vertex and edge may be provided as arguments at run-time based on real-time sensory input of the environment. The topological graph may define the next actions of the robot as it follows along edges linked at vertices. While executing the movement path, in some embodiments, rewards may be assigned by the processor as the robot takes actions to transition between states and uses the net cumulative reward to evaluate a particular movement path comprised of actions and states. A state-action value function may be iteratively calculated during execution of the movement path based on the current reward and maximum future reward at the next state. One goal may be to find optimal state-action value function and optimal policy by identifying the highest valued action for each state. As different topological graphs including vertices and edges with different properties are executed over time, the number of states experienced, actions taken from each state, and transitions increase. The path devised by the processor of the robot may iteratively evolve to become more efficient by choosing transitions that result in most favorable outcomes and by avoiding situations that previously resulted in low net reward. After convergence, the evolved movement path may be determined to be more efficient than alternate paths that may be devised using real-time sensory input of the environment. In some embodiments, a MDP may be used.

In some embodiments, data from a sensor may be used to provide a distance to a nearest obstacle in a field of view of the sensor during execution of a movement path. The accuracy of such observation may be limited to the resolution or application of the sensor or may be intrinsic to the atmosphere. In some embodiments, intrinsic limitations may be overcome by training the processor to provide better estimation from the observations based on a specific context of the application of the receiver. In some embodiments, a variation of gradient descent may be used to improve the observations. In some embodiments, the problem may be further processed to transform from an intensity to a classification problem wherein the processor may map a current observation to one or more of a set of possible labels. For example, an observation may be mapped to 12 millimeters and another observation may be mapped to 13 millimeters. In some embodiments, the processor may use a table look up technique to improve performance. In some embodiments, the processor may map each observation to an anticipated possible state determined through a table lookup. In some embodiments, a triangle or Gaussian methods may be used to map the state to an optimized nearest possibility instead of rounding up or down to a next state defined by a resolution. In some embodiments, a short reading may occur when the space between the receiver (or transmitter) and the intended surface (or object) to be measured is interfered with by an undesired presence. For example, when agitated particles and debris are present between a receiver and a floor, short readings may occur. In another example, presence of a person or pet walking in front of a robot may trigger short readings. Such noises may also be modelled and optimized with statistical methods. For example, presence of an undesirable object decreases as the range of a sensor decreases.

In some embodiments, a short reading may occur when the space between the receiver (or transmitter) and the intended surface (or object) to be measured is interfered with by an undesired presence. For example, when agitated particles and debris are present between a receiver and a floor, short readings may occur. In another example, presence of a person or pet walking in front of a robot may trigger short readings. Such noises may also be modelled and optimized with statistical methods. For example, presence of an undesirable object decreases as the range of a sensor decreases.

In some embodiments, the processor of the robot may determine optimal (e.g., locally or globally) division and coverage of the environment by minimizing a cost function or by maximizing a reward function. In some embodiments, the overall cost function C of a zone or an environment may be calculated by the processor of the robot based on a travel and cleaning cost K and coverage L. In some embodiments, other factors may be inputs to the cost function. The processor may attempt to minimize the travel and cleaning cost K and maximize coverage L. In some embodiments, the processor may determine the travel and cleaning cost K by computing individual cost for each zone and adding the required driving cost between zones. The driving cost between zones may depend on where the robot ended coverage in one zone, and where it begins coverage in a following zone. The cleaning cost may be dependent on factors such as the path of the robot, coverage time, etc. In some embodiments, the processor may determine the coverage based on the square meters of area covered (or otherwise area operated on) by the robot. In some embodiments, the processor of the robot may minimize the total cost function by modifying zones of the environment by, for example, removing, adding, shrinking, expanding, moving and switching the order of coverage of zones. For example, in some embodiments the processor may restrict zones to having rectangular shape, allow the robot to enter or leave a zone at any surface point and permit overlap between rectangular zones to determine optimal zones of an environment. In some embodiments, the processor may include or exclude additional conditions. In some embodiments, the cost accounts for additional features other than or in addition to travel and operating cost and coverage. Examples of features that may be inputs to the cost function may include, coverage, size, and area of the zone, zone overlap with perimeters (e.g., walls, buildings, or other areas the robot cannot travel), location of zones, overlap between zones, location of zones, and shared boundaries between zones. In some embodiments, a hierarchy may be used by the processor to prioritize importance of features (e.g., different weights may be mapped to such features in a differentiable weighted, normalized sum). For example, tier one of a hierarchy may be location of the zones such that traveling distance between sequential zones is minimized and boundaries of sequential zones are shared, tier two may be to avoid perimeters, tier three may be to avoid overlap with other zones and tier four may be to increase coverage.

In some embodiments, the processor may use various functions to further improve optimization of coverage of the environment. These functions may include, a discover function wherein a new small zone may be added to large and uncovered areas, a delete function wherein any zone with size below a certain threshold may be deleted, a step size control function wherein decay of step size in gradient descent may be controlled, a pessimism function wherein any zone with individual operating cost below a certain threshold may be deleted, and a fast grow function wherein any space adjacent to a zone that is predominantly unclaimed by any other zone may be quickly incorporated into the zone.

In some embodiments, to optimize division of zones of an environment, the processor may proceed through the following iteration for each zone of a sequence of zones, beginning with the first zone: expansion of the zone if neighbor cells are empty, movement of the robot to a point in the zone closest to the current position of the robot, addition of a new zone coinciding with the travel path of the robot from its current position to a point in the zone closest to the robot if the length of travel from its current position is significant, execution of a coverage pattern (e.g. boustrophedon) within the zone, and removal of any uncovered cells from the zone.

In some embodiments, the processor may determine optimal division of zones of an environment by modeling zones as emulsions of liquid, such as bubbles. In some embodiments, the processor may create zones of arbitrary shape but of similar size, avoid overlap of zones with static structures of the environment, and minimize surface area and travel distance between zones. In some embodiments, behaviors of emulsions of liquid, such as minimization of surface tension and surface area and expansion and contraction of the emulsion driven by an internal pressure may be used in modeling the zones of the environment. To do so, in some embodiments, the environment may be represented by a grid map and divided into zones by the processor. In some embodiments, the processor may convert the grid map into a routing graph G consisting of nodes N connected by edges E. The processor may represent a zone A using a set of nodes of the routing graph wherein A c N. The nodes may be connected and represent an area on the grid map. In some embodiments, the processor may assign a zone A a set of perimeters edges E wherein a perimeters edge $e=(n_1, n_2)$ connects a node $n_1 \in A$ with a node $n_2 \notin A$. Thus, the set of perimeters edges clearly defines the set of perimeters nodes $\partial A$, and gives information about the nodes, which are just inside zone A as well as the nodes just outside zone A. Perimeters nodes in zone A may be denoted by $\partial A^{in}$ and perimeters nodes outside zone A by $\partial A^{out}$. The collection of $\partial A^{in}$ and $\partial A^{out}$ together are all the nodes in $\partial A$. In some embodiments, the processor may expand a zone A in size by adding nodes from $\partial A^{out}$ to zone A and reduce the zone in size by removing nodes in $\partial A^{in}$ from zone A, allowing for fluid contraction and expansion. In some embodiments, the processor may determine a numerical value to assign to each node in $\partial A$, wherein the value of each node indicates whether to add or remove the node from zone A.

In some embodiments, the processor may determine the best division of an environment by minimizing a cost function defined as the difference between theoretical (e.g., modeled with uncertainty) area of the environment and the actual area covered. The theoretical area of the environment may be determined by the processor using a map of the environment. The actual area covered may be determined by the processor by recorded movement of the robot using, for example, an odometer or gyroscope. In some embodiments, the processor may determine the best division of the environment by minimizing a cost function dependent on a path taken by the robot comprising the paths taken within each zone and in between zones. The processor may restrict zones to being rectangular (or having some other defined number of vertices or sides) and may restrict the robot to entering a zone at a corner and to driving a serpentine routine (or other driving routine) in either x- or y-direction such that the trajectory ends at another corner of the zone. The cost associated with a particular division of an environment and order of zone coverage may be computed as the sum of the distances of the serpentine path travelled for coverage within each zone and the sum of the distances travelled in between zones (corner to corner). To minimize cost function and improve coverage efficiency zones may be further divided, merged, reordered for coverage and entry/exit points of zones may be adjusted. In some embodiments, the processor of the robot may initiate these actions at random or may target them. In some embodiments, wherein actions are initiated at random (e.g., based on a pseudorandom value) by the processor, the processor may choose a random action such as, dividing, merging or reordering zones, and perform the action. The processor may then optimize entry/exit points for the chosen zones and order of zones. A difference between the new cost and old cost may be computed as $\Delta$=new cost−old cost by the processor wherein an action resulting in a difference $<0$ is accepted while a difference $>0$ is accepted with probability $\exp(-\Delta/T)$ wherein T is a scaling constant. Since cost, in some embodiments, strongly depends on randomly determined actions the processor of the robot, embodiments may evolve ten different instances and after a specified number of iterations may discard a percentage of the worst instances.

In some embodiments, the processor may actuate the robot to execute the best or a number of the best instances and calculate actual cost. In embodiments, wherein actions are targeted, the processor may find the greatest cost contributor, such as the largest travel cost, and initiate a targeted action to reduce the greatest cost contributor. In embodiments, random and targeted action approaches to minimizing the cost function may be applied to environments comprising multiple rooms by the processor of the robot. In embodiments, the processor may directly actuate the robot to execute coverage for a specific division of the environment and order of zone coverage without first evaluating different possible divisions and orders of zone coverage by simulation. In embodiments, the processor may determine the best division of the environment by minimizing a cost function comprising some measure of the theoretical area of the environment, the actual area covered, and the path taken by the robot within each zone and in between zones.

In some embodiments, the processor may determine a reward and assigns it to a policy based on performance of coverage of the environment by the robot. In some embodiments, the policy may include the zones created, the order in which they were covered, and the coverage path (i.e., it may include data describing these things). In some embodiments, the policy may include a collection of states and actions experienced by the robot during coverage of the environment as a result of the zones created, the order in which they were covered, and coverage path. In some embodiments, the reward may be based on actual coverage, repeat coverage, total coverage time, travel distance between zones, etc. In some embodiments, the process may be iteratively repeated to determine the policy that maximizes the reward. In some embodiments, the processor determines the policy that maximizes the reward using a MDP as described above. In some embodiments, a processor of a robot may evaluate different divisions of an environment while offline.

Other examples of methods for dividing an environment into zones for coverage are described in U.S. patent application Ser. Nos. 14/817,952, 15/619,449, 16/198,393, and 16/599,169, the entire contents of which are hereby incorporated by reference.

In some embodiments, successive coverage areas determined by the processor may be connected to improve surface coverage efficiency by avoiding driving between distant coverage areas and reducing repeat coverage that occurs during such distant drives. In some embodiments, the processor chooses orientation of coverage areas such that their edges align with the walls of the environment to improve total surface coverage as coverage areas having various orientations with respect to the walls of the environment may result in small areas (e.g., corners) being left uncovered. In some embodiments, the processor chooses a next coverage area as the largest possible rectangle whose edge is aligned with a wall of the environment.

In some cases, surface coverage efficiency may be impacted when high obstacle density areas are covered first as the robot may drain a significant portion of its battery attempting to navigate around these areas, thereby leaving a significant portion of area uncovered. Surface coverage efficiency may be improved by covering low obstacle density areas before high obstacle density areas. In this way, if the robot becomes stuck in the high obstacle density areas at least the majority of areas are covered already. Additionally, more coverage may be executed during a certain amount time as situations wherein the robot becomes immediately stuck in a high obstacle density area are avoided. In cases wherein the robot becomes stuck, the robot may only cover a small amount of area in a certain amount of time as areas with highly obstacle density are harder to navigate through. In some embodiments, the processor of the robot may instruct the robot to first cover areas that are easier to cover (e.g., open or low obstacle density areas) then harder areas to cover (e.g., high obstacle density). In some embodiments, the processor may instruct the robot to perform a wall follow to confirm that all perimeters of the area have been discovered after covering areas with low obstacle density. In some embodiments, the processor may identify areas that are harder to cover and mark them for coverage at the end of a work session. In some embodiments, coverage of a high obstacle density areas is known as robust coverage. FIG. 199A illustrates an example of an environment of a robot including obstacles 5400 and starting point 5401 of the robot. The processor of the robot may identify area 5402 as an open and easy area for coverage and area 5403 as an area for robust coverage. The processor may cover area 5402 first and mark area 5403 for coverage at the end of a cleaning session. FIG. 199B illustrates a coverage path 5404 executed by the robot within area 5402 and FIG. 199C illustrates coverage path 5405 executed by the robot in high obstacle density area 5403. Initially the processor may not want to incur cost and may therefore instruct the robot to cover easier areas. However, as more areas within the environment are covered and only few uncovered spots remain, the processor becomes more willing to incur costs to cover those areas. In some cases, the robot may need to repeat coverage within high obstacle density areas in order to ensure coverage of all areas. In some cases, the processor may not be willing to the incur cost associated with the robot traveling to a far distance for coverage of a small uncovered area.

In some embodiments, the processor maintains an index of frontiers and a priority of exploration of the frontiers. In some embodiments, the processor may use particular frontier characteristics to determine optimal order of frontier exploration such that efficiency may be maximized. Factors such as proximity, size, and alignment of the frontier, may be important in determining the most optimal order of exploration of frontiers. Considering such factors may prevent the robot from wasting time by driving between successively explored areas that are far apart from one another and exploring smaller areas. In some embodiments, the robot may explore a frontier with low priority as a side effect of exploring a first frontier with high priority. In such cases, the processor may remove the frontier with lower priority from the list of frontiers for exploration. In some embodiments, the processor of the robot evaluates both exploration and coverage when deciding a next action of the robot to reduce overall run time as the processor may have the ability to decide to cover distant areas after exploring nearby frontiers.

In some embodiments, the processor may attempt to gain information needed to have a full picture of its environment by the expenditure of certain actions. In some embodiments, the processor may divide a runtime into steps. In some embodiments, the processor may identify a horizon T and optimize cost of information versus gain of information within horizon T. In some embodiments, the processor may use a payoff function to minimize the cost of gaining information within horizon T. In some embodiments, the expenditure may be related to coverage of grid cells. In some embodiments, the amount of information gain that a cell may offer may be related to the visible areas of the surroundings from the cell, the areas the robot has already seen, and the field of view and maximum observation distance of sensors of the robot. In some cases, the robot may attempt to navigate to a cell in which a high level of information gain is expected, but while navigating there may observe all or most of the information the cell is expected to offer, resulting in the value of the cell diminishing to zero or close to zero by the time the robot reaches the cell. In some embodiments, for a surface cleaning robot, expenditure may be related to collection or expected collection of dirt per square meter of coverage. This may prevent the robot from collecting dust more than reducing the rate of dust collection. It may be preferable for the robot to go empty its dustbin and return to resume its cleaning task. In some cases, expenditure of actions may play an important role when considering power supply or fuel. For example, an algorithm of a drone used for collection of videos and information may maintain curiousness of the drone while ensuring the drone is capable of returning back to its base.

In some embodiments, the processor may predict a maximum surface coverage of an environment based on historical experiences of the robot. In some embodiments, the processor may select coverage of particular areas or rooms given the predicted maximum surface coverage. In some embodiments, the areas or rooms selected by the processor for coverage by the robot may be presented to a user using an application of a communication device (e.g., smart phone, tablet, laptop, remote control, etc.) paired with the robot. In some embodiments, the user may use the application to choose or modify the areas or rooms for coverage by selecting or unselecting areas or rooms. In some embodiments, the processor may choose an order of coverage of areas. In some embodiments, the user may view the order of coverage of areas using the application. In some embodiments, the user overrides the proposed order of coverage of areas and selects a new order of coverage of areas using the application.

In embodiments, Bayesian or probabilistic methods may provide several practical advantages. For instance, a robot that functions behaviorally by reacting to everything sensed by the sensors of the robot may result in the robot reacting to many false positive observations. For example, a sensor of the robot may sense the presence of a person quickly walking past the robot and the processor may instruct the robot to immediately stop even though it may not be necessary as the presence of the person is short and momentary. Further, the processor may falsely mark this location as a untraversable area. In another example, brushes and scrubbers may lead to false positive sensor observations due to the occlusion of the sensor positioned on an underside of the robot and adjacent to a brush coupled to the underside of the robot. In some cases, compromises may be made in the shape of the brushes. In some cases, brushes are required to include gaps between sets of bristles such that there are time sequences where sensors positioned on the underside of the robot are not occluded. With a probabilistic method, a single occlusion of a sensor may not amount to a false positive.

In some embodiments, probabilistic methods may employ Bayesian methods wherein probability may represent a degree of belief in an event. In some embodiments, the degree of belief may be based on prior knowledge of the event or on assumptions about the event. In some embodiments, Bayes' theorem may be used to update probabilities after obtaining new data. Bayes' theorem may describe the conditional probability of an event based on data as well as prior information or beliefs about the event or conditions related to the event. In some embodiments, the processor may determine the conditional probability $$P(A \mid B) = \frac{P(B \mid A)P(A)}{P(B)}$$

of an event A given that B is true, wherein $P(B) \neq 0$. In Bayesian statistics, A may represent a proposition and B may represent new data or prior information. P(A), the prior probability of A, may be taken the probability of A being true prior to considering B. P(B|A), the likelihood function, may be taken as the probability of the information B being true given that A is true. P(A|B), the posterior probability, may be taken as the probability of the proposition A being true after taking information B into account. In embodiments, Bayes' theorem may update prior probability P(A) after considering information B. In some embodiments, the processor may determine the probability of the evidence $P(B) = \Sigma_i P(B|A_i)P(A_i)$ using the law of total probability, wherein $\{A_1, A_2, \ldots, A_n\}$ is the set of all possible outcomes. In some embodiments, P(B) may be difficult to determine as it may involve determining sums and integrals that may be time consuming and computationally expensive. Therefore, in some embodiments, the processor may determine the posterior probability as $P(A|B) \propto P(B|A)P(A)$. In some embodiments, the processor may approximate the posterior probability without computing P(B) using methods such as Markov Chain Monte Carlo or variational Bayesian methods.

In some embodiments, the processor may use Bayesian inference wherein uncertainty in inferences may be quantified using probability. For instance, in a Baysian approach, an action may be executed based on an inference for which there is a prior and a posterior. For example, a first reading from a sensor of a robot indicating an obstacle or a untraversable area may be considered a priori information. The processor of the robot may not instruct the robot to execute an action solely based on a priori information. However, when a second observation occurs, the inference of the second observation may confirm a hypothesis based on the a priori information and the processor may then instruct the robot to execute an action. In some embodiments, statistical models that specify a set of statistical assumptions and processes that represent how the sample data is generated may be used. For example, for a situation modeled with a Bernoulli distribution, only two possibilities may be modeled. In Bayesian inference, probabilities may be assigned to model parameters. In some embodiments, the processor may use Bayes' theorem to update the probabilities after more information is obtained. Statistical models employing Bayesian statistics require that prior distributions for any unknown parameters are known. In some cases, parameters of prior distributions may have prior distributions, resulting in Bayesian hierarchical modeling, or may be interrelated, resulting in Bayesian networks.

In employing Bayesian methods, a false positive sensor reading does not cause harm in functionality of the robot as the processor uses an initial sensor reading to only form a prior belief. In some embodiments, the processor may require a second or third observation to form a conclusion and influence of prior belief. If a second observation does not occur within a timely manner (or after a number of counts) the second observation may not be considered a posterior and may not influence a prior belief. In some embodiments, other statistical interpretations may be used. For example, the processor may use a frequentist interpretation wherein a certain frequency of an observation may be required to form a belief. In some embodiments, other simpler implementations for formulating beliefs may be used. In some embodiments, a probability may be associated with each instance of an observation. For example, each observation may count as a 50% probability of the observation being true. In this implementation, a probability of more than 50% may be required for the robot to take action.

In some embodiments, the processor converts Partial Differential Equations (PDEs) to conditional expectations based on Feynman-Kac theorem. For example, for a PDE $$\frac{\partial u}{\partial t}(x, t) + \mu(x, t)\frac{\partial u}{\partial x}(x, t) + \frac{1}{2}\sigma^2(x, t)\frac{\partial^2 u}{\partial x^2}(x, t) - V(x, t)u(x, t) + f(x, t) = 0,$$

for all $x \in \mathbb{R}$ and $t \in [0, T]$, and subject to terminal condition $u(x, t)=\psi(x)$, wherein μ, σ, ψ, V, $f$ are known functions, T is a parameter, and $u: \mathbb{R}\times[0, T]\rightarrow\mathbb{R}$ is the unknown, the Feyman-Kac formula provides a solution that may be written as a conditional expectation $u(x, t)=E^Q[\int_t^T e^{-\int_t^r v(X_\tau,\tau)d\tau} f(X_r, r)dr + e^{-\int_t^T V(X_\tau, \tau)d\tau}\psi(X_T)|X_t=x]$ under a probability measure Q such that X is an Ito process driven by $dX=\mu(x, t)dt+\sigma(x, t)dW^Q$, wherein $W^Q(t)$ is a Weiner process or Brownian motion under Q and initial condition $X(t)=x$. In some embodiments, the processor may use mean field interpretation of Feynman-Kac models or Diffusion Monte Carlo methods.

In some embodiments, the processor may use a mean field selection process or other branching or evolutionary algorithms in modeling mutation or selection transitions to predict the transition of the robot from one state to the next. In some embodiments, during a mutation transition, walkers evolve randomly and independently in a landscape. Each walker may be seen as a simulation of a possible trajectory of a robot. In some embodiments, the processor may use quantum teleportation or population reconfiguration to address a common problem of weight disparity leading to weight collapse. In some embodiments, the processor may control extinction or absorption probabilities of some Markov processes. In some embodiments, the processor may use a fitness function. In some embodiments, the processor may use different mechanisms to avoid extinction before weights become too uneven. In some embodiments, the processor may use adaptive resampling criteria, including variance of the weights and relative entropy with respect to a uniform distribution. In some embodiments, the processor may use spatial branching processes combined with competitive selection.

In some embodiments, the processor may use a prediction step given by the Chapman-Kolmogrov transport equation, an identity relating the joint probability distribution of different sets of coordinates on a stochastic process. For example, for a stochastic process given by an indexed collection of random variables $\{f_i\}$, $p_{i_1}, \ldots, i_n(f_1, \ldots, f_n)$ may be the joint probability density function of the values of random variables $f_1$ to $f_n$. In some embodiments, the processor may use the Chapman-Kolmogrov equation given by $p_i, \ldots, i_{n-1}(f_1, \ldots, f_{n-1})=\int_{-\infty}^{\infty} p_{i_1}, \ldots, i_n(f_1, \ldots, f_n)\, df_n$, a marginalization over the nuisance variable. If the stochastic process is Markovian, the Chapman-Kolmogrov equation may be equivalent to an identity on transition densities wherein $i_1 < \ldots < i_n$ for a Markov chain. Given the Markov property, $p_{i_1}, \ldots, i_n(f_1, \ldots, f_n)=p_{i_1}(f_1)p_{i_2 \cdot i_1}(f_2|f_1) \ldots p_{i_n \cdot i_{n-1}}(f_n|f_{n-1})$, wherein the conditional probability $p_{ij}(f_i|f_j)$ is a transition probability between the times i>j. Therefore, the Chapman-Kolmogrov equation may be given by $p_{i_3;i_1}(f_3|f_1)=\int_{-\infty}^{\infty} p_{i_3;i_2}(f_3|f_2)p_{i_2;i_1}(f_2|f_1)df_2$, wherein the probability of transitioning from state one to state three may be determined by summating the probabilities of transitioning from state one to intermediate state two and intermediate state two to state three. If the probability distribution on the state space of a Markov chain is discrete and the Markov chain is homogenous, the processor may use the Chapman-Kolmogrov equation given by $P(t+s)=P(t)P(s)$, wherein P(t) is the transition matrix of jump t, such that entry (i, j) of the matrix includes the probability of the chain transitioning from state i to j in t steps. To determine the transition matrix of jump t the transition matrix of jump one may be raised to the power of t, i.e., $P(t)=P^t$. In some instances, the differential form of the Chapman-Kolmogrov equation may be known as the master equation.

In some embodiments, the processor may use a subset simulation method. In some embodiments, the processor may assign a small probability to slightly failed or slightly diverted scenarios. In some embodiments, the processor of the robot may monitor a small failure probability over a series of events and introduce new possible failures and prune recovered failures. For example, a wheel intended to rotate at a certain speed for 20 ms may be expected to move the robot by a certain amount. However, if the wheel is on carpet, grass, or hard surface, the amount of movement of the robot resulting from the wheel rotating at a certain speed for 20 ms may not be the same. In some embodiments subset simulation methods may be used to achieve high reliability systems. In some embodiments, the processor may adaptively generate samples conditional on failure instances to slowly populate ranges from the frequent to more occasional event region.

In some embodiments, the processor may use a complementary cumulative distribution function (CCDF) of the quantity of interest governing the failure in question to cover the high and low probability regions. In some embodiments, the processor may use stochastic search algorithms to propagate a population of feasible candidate solutions using mutation and selection mechanisms with introduction of routine failures and recoveries.

In multi-agent interacting systems, the processor may monitor the collective behavior of complex systems with interacting individuals. In some embodiments, the processor may monitor a continuum model of agents with multiple players over multiple dimensions. In some embodiments, the above methods may also be used for investigating the cause, the exact time of occurrence, and consequence of failure.

In some embodiments, dynamic obstacles and floor type may be detected by the processor during operation of the robot. As the robot operates within the environment, sensors arranged on the robot may collect information such as a type of driving surface. In some instances, the type of driving surface may be important, such as in the case of a surface cleaning robot. For example, information indicating that a room has a thick pile rug and wood flooring may be important for the operation of a surface cleaning robot as the presence of the two different driving surfaces may require the robot to adjust settings when transitioning from operating on the thick pile rug, with higher elevation, to the wood flooring with lower elevation, or vice versa. Settings may include cleaning type (e.g., vacuuming, mopping, steam cleaning, UV sterilization, etc.) and settings of robot (e.g., driving speed, elevation of the robot or components thereof from the driving surface, etc.) and components thereof (e.g., main brush motor speed, side brush motor speed, impeller motor speed, etc.). For example, the surface cleaning robot may perform vacuuming on the thick pile rug and may perform vacuuming and mopping on the wood flooring. In another example, a higher suctioning power may be used when the surface cleaning robot operates on the thick pile rug as debris may be easily lodged within the fibers of the rug and a higher suctioning power may be necessary to collect the debris from the rug. In one example, a faster main brush speed may be used when the robot operates on thick pile rug as compared to wood flooring. In another example, information indicating types of flooring within an environment may be used by the processor to operate the robot on particular flooring types indicated by a user. For instance, a user may prefer that a package delivering robot only operates on tiled surfaces to avoid tracking dirt on carpeted surfaces.

In some embodiments, a user may use an application of a communication device paired with the robot to indicate driving surface types (or other information such as floor type transitions, obstacles, etc.) within a diagram of the environment to assist the processor with detecting driving surface types. In such instances, the processor may anticipate a driving surface type at a particular location prior to encountering the driving surface at the particular location. In some embodiments, the processor may autonomously learn the location of boundaries between varying driving surface types.

In some cases, traditional obstacle detection may be a reactive method and prone to false positives and false negatives. For example, in a traditional method, a single sensor reading may result in a reactive behavior of the robot without validation of the sensor reading which may lead to a reaction to a false positive. In some embodiments, probabilistic and Bayesian methods may be used for obstacle detection, allowing obstacle detection to be treated as a classification problem. In some embodiments, the processor may use a machined learned classification algorithm that may use all evidence available to reach a conclusion based on the likelihood of each element considered suggesting a possibility. In some embodiments, the classification algorithm may use a logistical classifier or a linear classifier $Wx+b=y$, wherein W is weight and b is bias. In some embodiments, the processor may use a neural network to evaluate various cost functions before deciding on a classification. In some embodiments, the neural network may use a softmax activation function $$S(y_i) = \frac{e^{y_i}}{\sum_j e^{y_j}}.$$

In some embodiments, the softmax function may receive numbers (e.g., logits) as input and output probabilities that sum to one. In some embodiments, the softmax function may output a vector that represents the probability distributions of a list of potential outcomes. In some embodiments, the softmax function may be equivalent to the gradient of the LogSumExp function $LSE(x_1, \ldots, x_n)=\log(e^{x_1}+\ldots+e^{x_n}$. In some embodiments, the LogSumExp, with the first argument set to zero, may be equivalent to the multivariable generalization of a single-variable softplus function. In some instances, the softplus function $f(x)=\log(1+e^x)$ may be used as a smooth approximation to a rectifier. In some embodiments, the derivative of the softplus function $$f'(x) = \frac{e^x}{1+e^x} = \frac{1}{1+e^{-x}}$$

may be equivalent to the logistic function and the logistic sigmoid function may be used as a smooth approximation of the derivative of the rectifier, the Heaviside step function. In some embodiments, the softmax function, with the first argument set to zero, may be equivalent to the multivariable generalization of the logistic function. In some embodiments, the neural network may use a rectifier activation function. In some embodiments, the rectifier may be the positive of its argument $f(x)=x^+=\max(0, x)$, wherein x is the input to a neuron. In embodiments, different ReLU variants may be used. For example, ReLUs may incorporate Gaussian noise, wherein $f(x)=\max(0, x+Y)$ with $Y\sim N(0, \sigma(x))$, known as Noisy ReLU. In one example, ReLUs may incorporate a small, positive gradient when the unit is inactive, wherein $f(x)=$ $$f(x) = \begin{cases} x \text{ if } x > 0, \\ 0.01x \text{ otherwise} \end{cases},$$

known as Leaky ReLU. In some instances, Parametric ReLUs may be used, wherein the coefficient of leakage is a parameter that is learned along with other neural network parameters, i.e.

$$f(x)=\begin{cases} x \text{ if } x>0, \\ ax \text{ otherwise} \end{cases}.$$

For a≤1, $f(x)=\max(x, ax)$. In another example, Exponential Linear Units may be used to attempt to reduce the mean activations to zero, and hence increase the speed of learning, wherein $f(x)=$ $$f(x)=\begin{cases} x \text{ if } x>0, \\ a(e^x-1) \text{ otherwise} \end{cases},$$

a is a hyperparameter, and a≥0 is a constraint. In some embodiments, linear variations may be used. In some embodiments, linear functions may be processed in parallel. In some embodiments, the task of classification may be divided into several subtasks that may be computed in parallel. In some embodiments, algorithms may be developed such that they take advantage of parallel processing built into some hardware.

In some embodiments, the classification algorithm (described above and other classification algorithms described herein) may be pre-trained or pre-labeled by a human observer. In some embodiments, the classification algorithm may be tested and/or validated after training. In some embodiments, training, testing, validation, and/or classification may continue as more sensor data is collected. In some embodiments, sensor data may be sent to the cloud. In some embodiments, training, testing, validation, and/or classification may be executed on the cloud. In some embodiments, labeled data may be used to establish ground truth. In some embodiments, ground truth may be optimized and may evolve to be more accurate as more data is collected. In some embodiments, labeled data may be divided into a training set and a testing set. In some embodiments, the labeled data may be used for training and/or testing the classification algorithm by a third party. In some embodiments, labeling may be used for determining the nature of objects within an environment. For example, data sets may include data labeled as objects within a home, such as a TV and a fridge. In some embodiments, a user may choose to allow their data to be used for various purposes. For example, a user may consent for their data to be used for troubleshooting purposes but not for classification. In some embodiments, a set of questions or settings (e.g., accessible through an application of a communication device) may allow the user to specifically define the nature of their consent.

In some embodiments, the processor may mark the locations of obstacles (e.g., static and dynamic) encountered in the map. For example, images of socks may be associated with the location at which the socks were found in each time stamp. Over time, the processor may know that socks are more likely to be found in the bedroom as compared to the kitchen. In some embodiments, the location of different types of objects and/or object density may be included in the map of the environment that may be viewed using an application of a communication device. For example, FIG. 200A illustrates an example of a map of an environment 8700 including the location of object 8701 and high obstacle density area 8702. FIG. 200B illustrates the map 8700 viewed using an application of a communication device 8703. A user may use the application to confirm that the object type of the object 8701 is a sock by choosing yes or no in the dialogue box 8704 and to determine if the high density obstacle area 8702 should be avoided by choosing yes or no in dialogue box 8705. In this example, the user may choose to not avoid the sock, however, the user may choose to avoid other object types, such as cables. In another example, FIG. 201 illustrates four different types of information that may be added to the map, including an identified object such as a sock 8500, an identified obstacle such as a glass wall 8501, an identified cliff such as a staircase 8502, and a charging station of the robot 8503. The processor may identify an object by using a camera to capture an image of the object and matching the captured image of the object against a library of different types of objects. The processor may detect an obstacle, such as the glass wall 8501, using data from a TOF sensor or bumper. The processor may detect a cliff, such as staircase 8502, by using data from a camera, TOF, or other sensor positioned underneath the robot in a downwards facing orientation. The processor may identify the charging station 8503 by detecting IR signals emitted from the charging station 8503. In one example, the processor may add people or animals observed in particular locations and any associated attributes (e.g., clothing, mood, etc.) to the map of the environment. In another example, the processor may add different cars observed in particular locations to the map of the environment. In some embodiments, the map may be a dedicated obstacle map. In some embodiments, the processor may mark a location and nature of an obstacle on the map each time an obstacle is encountered. In some embodiments, the obstacles marked may be hidden. In some embodiments, the processor may assign each obstacle a decay factor and obstacles may fade away if they are not continuously observed over time. In some embodiments, the processor may mark an obstacle as a permanent obstacle if the obstacle repeatedly appears over time. This may be controlled through various parameters. In some embodiments, the processor may mark an obstacle as a dynamic obstacle if the obstacle is repeatedly not present in an expected location. Alternatively, the processor may mark a dynamic obstacle in a location wherein an unexpected obstacle is repeatedly observed at the location. In some embodiments, the processor may mark a dynamic obstacle at a location if such an obstacle appears on some occasions but not others at the location. In some embodiments, the processor may mark a dynamic obstacle at a location where an obstacle is unexpectedly observed, has disappeared, or has unexpectedly appeared. In some embodiments, the processor implements the above methods of identifying dynamic obstacles in a single work session. In some embodiments, the processor applies a dampening time to observed obstacles, wherein an observed obstacle is removed from the map or memory after some time. In some embodiments, the robot slows down and inspects a location of an observed obstacle another time.

In some embodiments, the processor may determine probabilities of existence of obstacles within a grid map as numbers between zero and one and may describe such numbers in 8 bits, thus having values between zero to 255 (discussed in further detail above). This may be synonymous to a grayscale image with color depth or intensity between zero to 255. Therefore, a probabilistic occupancy grid map may be represented using a grayscale image and vice versa. In embodiments, the processor of the robot may create a traversability map using a grayscale image, wherein the processor may not risk traversing areas with low probabilities of having an obstacle. In some embodiments, the processor may reduce the grayscale image to a binary bitmap. In some embodiments, the processor may extract a binary image by performing some form of thresholding to convert the grayscale image into an upper side of a threshold or a lower side of the threshold.

In some embodiments, the processor of the robot may detect a type of object (e.g., static or dynamic, liquid or solid, etc.). Examples of types of objects may include, for example, a remote control, a bicycle, a car, a table, a chair, a cat, a dog, a robot, a cord, a cell phone, a laptop, a tablet, a pillow, a sock, a shirt, a shoe, a fridge, an oven, a sandwich, milk, water, cereal, rice, etc. In some embodiments, the processor may access an object database including sensor data associated with different types of objects (e.g., sensor data including particular pattern indicative of a feature associated with a specific type of object). In some embodiments, the object database may be saved on a local memory of the robot or may be saved on an external memory or on the cloud. In some embodiments, the processor may identify a type of object within the environment using data of the environment collected by various sensors. In some embodiments, the processor may detect features of an object using sensor data and may determine the type of object by comparing features of the object with features of objects saved in the object database (e.g., locally or on the cloud). For example, images of the environment captured by a camera of the robot may be used by the processor to identify objects observed, extract features of the objects observed (e.g., shapes, colors, size, angles, etc.), and determine the type of objects observed based on the extracted features. In another example, data collected by an acoustic sensor may be used by the processor to identify types of objects based on features extracted from the data. For instance, the type of different objects collected by a robotic cleaner (e.g., dust, cereal, rocks, etc.) or types of objects surrounding a robot (e.g., television, home assistant, radio, coffee grinder, vacuum cleaner, treadmill, cat, dog, etc.) may be determined based on features extracted from the acoustic sensor data. In some embodiments, the processor may locally or via the cloud compare an image of an object with images of different objects in the object database. In other embodiments, other types of sensor data may be compared. In some embodiments, the processor determines the type of object based on the image in the database that most closely matches the image of the object. In some embodiments, the processor determines probabilities of the object being different types of objects and chooses the object to be the type of object having the highest probability. In some embodiments, a machine learning algorithm may be used to learn the features of different types of objects extracted from sensor data such that the machine learning algorithm may identify the most likely type of object observed given an input of sensor data. In some embodiments, the processor may determine an object type of an object using a convolutional neural network trained using real world images of different objects under different environmental conditions. In some embodiments, the system of the robot may periodically download an update that includes new object types that are recognizable.

In some embodiments, the processor may mark a location in which a type of object was encountered or observed within a map of the environment. In some embodiments, the processor may determine or adjust the likelihood of encountering or observing a type of object in different regions of the environment based on historical data of encountering or observing different types of objects. In embodiments, the process of determining the type of object and/or marking the type of object within the map of the environment may be executed locally on the robot or may be executed on the cloud. In some embodiments, the processor of the robot may instruct the robot to execute a particular action based on the particular type of object encountered. For example, the processor of the robot may determine that a detected object is a remote control and in response to the type of object may alter its movement to drive around the object and continue along its path. In another example, the processor may determine that a detected object is milk or a type of cereal and in response to the type of object may use a cleaning tool to clean the milk or cereal from the floor. In some embodiments, the processor may determine if an object encountered by the robot may be overcome by the robot. If so, the robot may attempt to drive over the object. If, however, the robot encounters a large object, such as a chair or table, the processor may determine that it cannot overcome the object and may attempt to maneuver around the object and continue along its path. In some embodiments, regions wherein object are consistently encountered or observed may be classified by the processor as high object density areas and may be marked as such in the map of the environment. In some embodiments, the processor may attempt to alter its path to avoid high object density areas or to cover high object density areas at the end of a work session. In some embodiments, the processor may alert a user when an unanticipated object blocking the path of the robot is encountered or observed, particularly when the robot may not overcome the object by maneuvering around or driving over the object. The robot may alert the user by generating a noise, sending a message to an application of a communication device paired with the robot, displaying a message on a screen of the robot, illuminating lights, and the like.

Figure 202A:
Figure 202B:
Figure 203A:
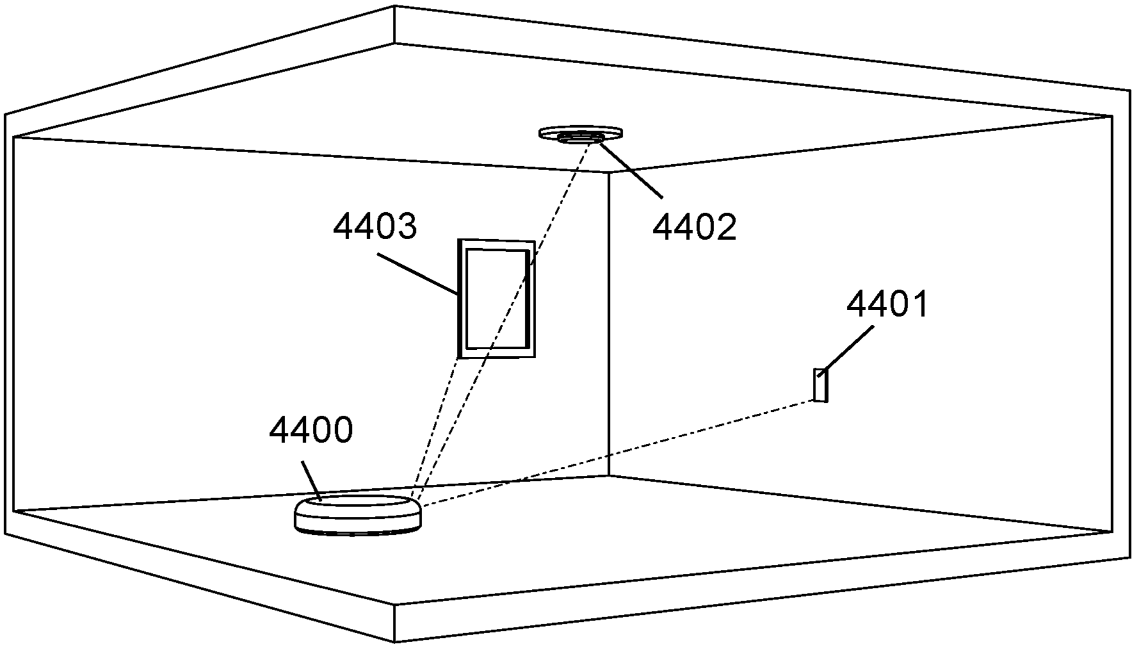
Figure 203B:
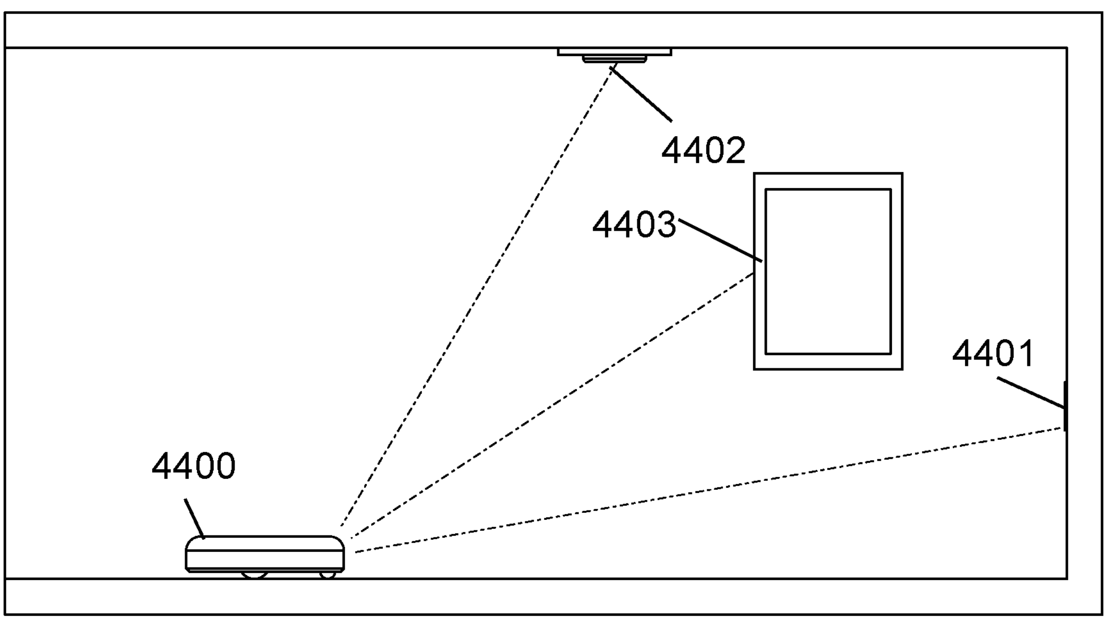
Figure 204A:
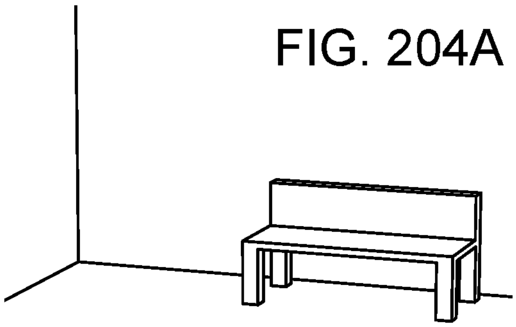
Figure 204B:
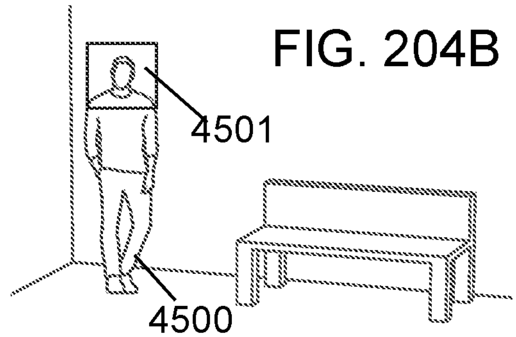
Figure 204C:
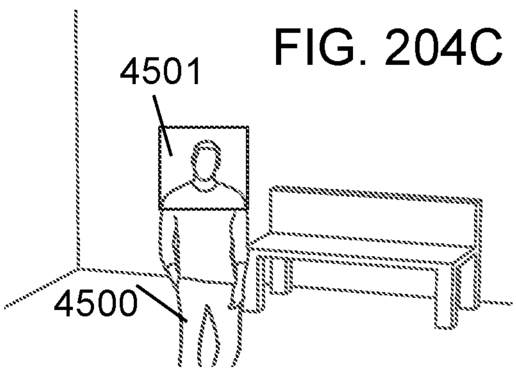
Figure 204D:
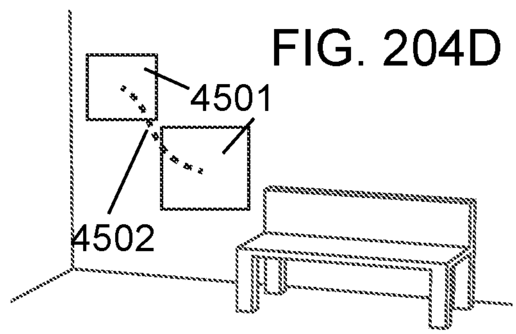
Figure 205A:
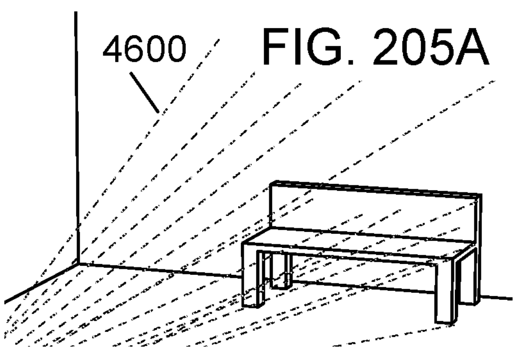
Figure 205C:
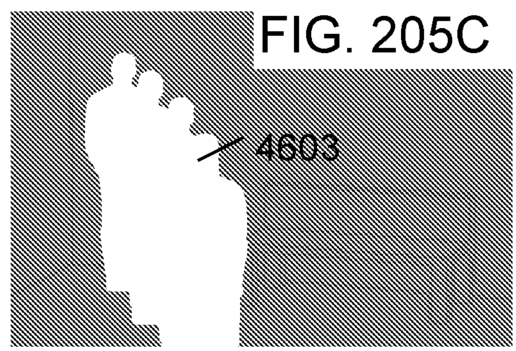
Figure 205B:
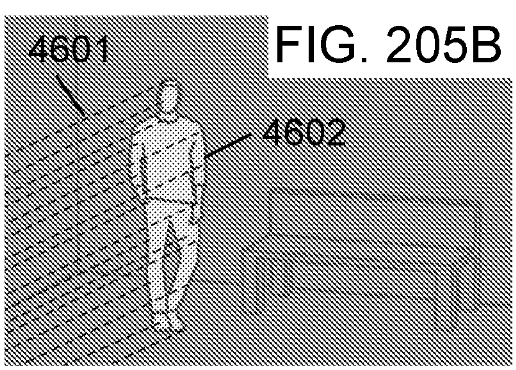
Figure 205D:
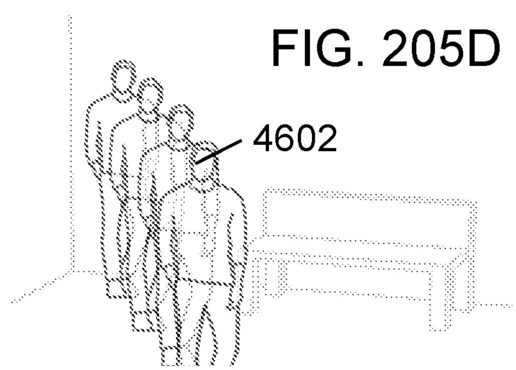

In some embodiments, the processor may identify static or dynamic obstacles within a captured image. In some embodiments, the processor may use different characteristics to identify a static or dynamic obstacle. For example, FIG. 202A illustrates the robot 4300 approaching an object 4301. The processor may detect the object 4301 based on data from an obstacle sensor and may identify the object 4301 as a sock based on features of the object 4301. FIG. 202B illustrates the robot 4300 approaching an object 4302. The processor may detect the object 4302 based on data from an obstacle sensor and may identify the object 4302 as a glass of liquid based on features of the object 4302. In some embodiments, the processor may translate three dimensional obstacle information into two dimensional representation. For example, FIG. 203A illustrates the processor of the robot 4400 identifying objects 4401 (wall socket), 4402 (ceiling light), and 4403 (frame) and their respective distances from the robot in three dimensions. FIG. 203B illustrates the object information from FIG. 203A shrunken into a two dimensional representation. This may be more efficient for data storage and/or processing. In some embodiments, the processor may use speed of movement of an object or an amount of movement of an object in captured images to determine if an object is dynamic. Examples of some objects within a house and their corresponding characteristics include a chair with characteristics including very little movement and located within a predetermined radius, a human with characteristic including ability to be located anywhere within the house, and a running child with characteristics of fast movement and small volume. In some embodiments, the processor compares captured images to extract such characteristics of different objects. In some embodiments, the processor identifies the object based on features. For example, FIG. 204A illustrates an image of an environment. FIG. 204B illustrates an image of a person 4500 within the environment. The processor may identify an object 4501 (in this case the face of the person 4500) within the image. FIG. 204C illustrates another image of the person 4500 within the environment at a later time. The processor may identify the same object 4501 within the image based on identifying similar features as those identified in the image of FIG. 204B. FIG. 204D illustrates the movement 4502 of the object 4501. The processor may determine that the object 4501 is a person based on trajectory and/or the speed of movement of the object 4501 (e.g., by determining total movement of the object between the images captured in FIGS. 204B and 204C and the time between when the images in FIGS. 204B and 204C where taken). In some embodiments, the processor may identify movement of a volume to determine if an object is dynamic. FIG. 205A illustrates depth measurements 4600 to a static background of an environment. Depth measurements 4600 to the background are substantially constant. FIG. 205B illustrates depth measurements 4601 to an object 4602. Based on the depth measurements 4600 of the background of the environment and depth measurements 4601 of the object 4602, the processor may identify a volume 4603 captured in several images, illustrated in FIG. 205C, corresponding with movement of the object 4602 over time, illustrated in FIG. 205D. The processor may determine an amount of movement of the object over a predetermined amount of time or a speed of the object and may determine whether the object is dynamic or not based on its movement or speed. In some cases, the processor may infer the type of object.

Figure 206A:
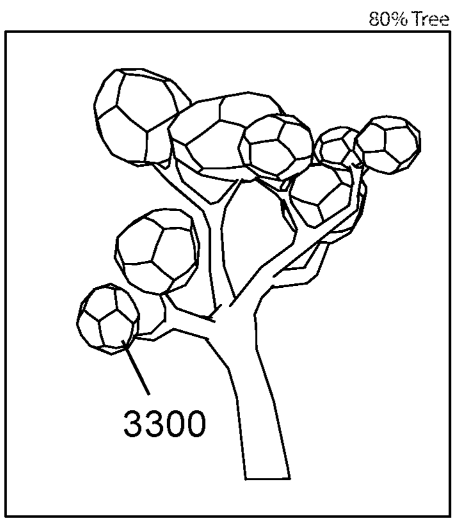
Figure 206B:
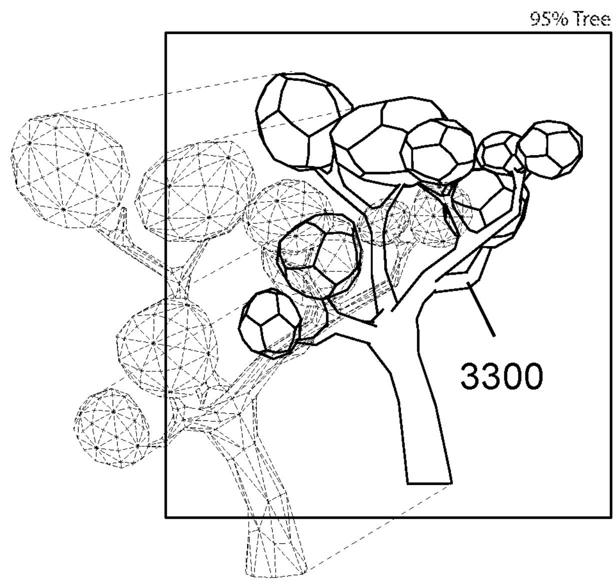
Figure 207A:
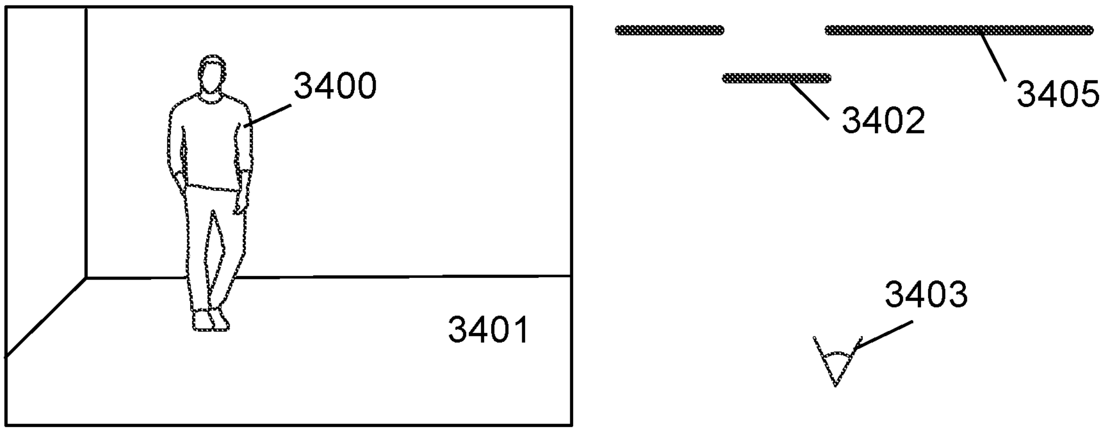
Figure 207B:
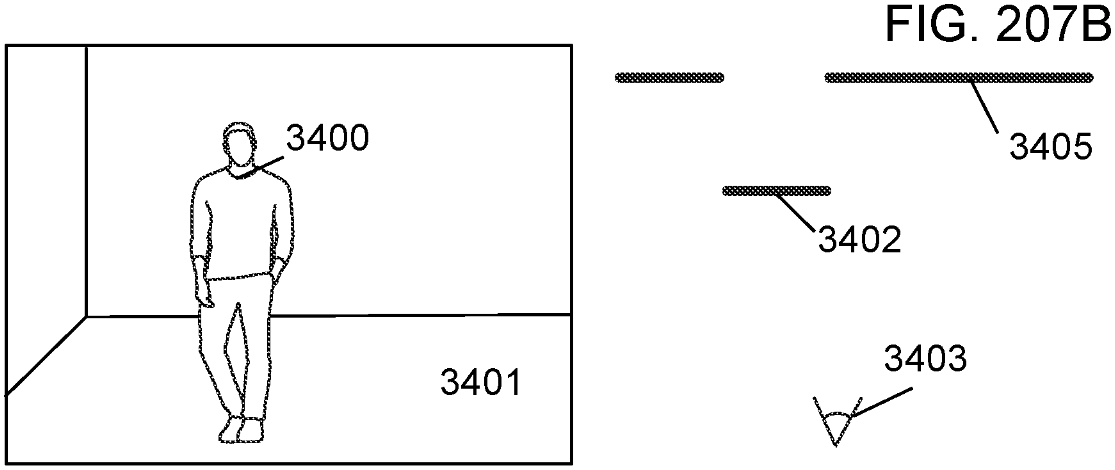
Figure 207C:
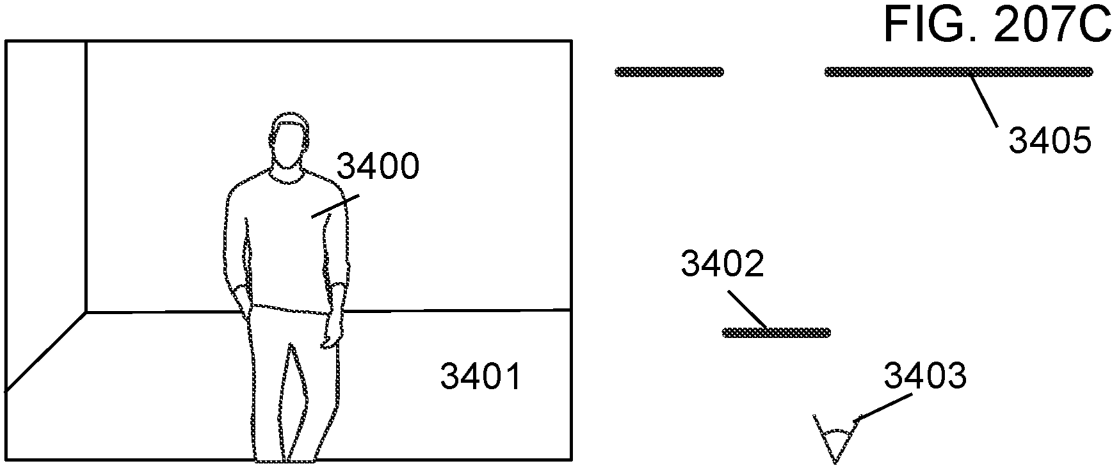
Figure 208A:
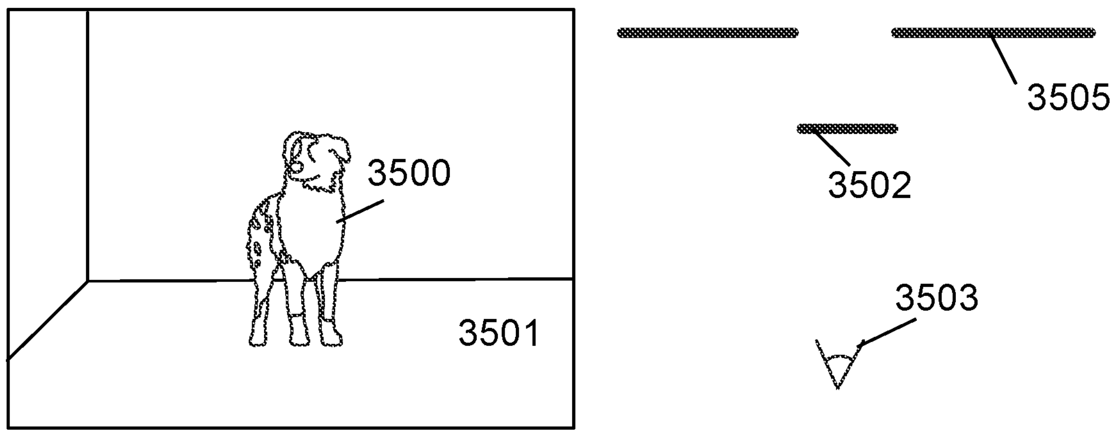
Figure 208B:
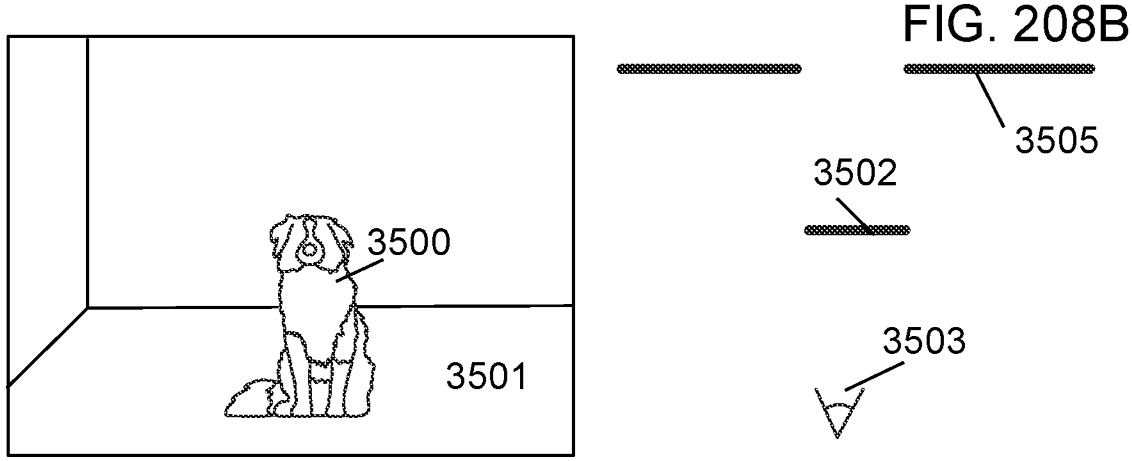
Figure 208C:
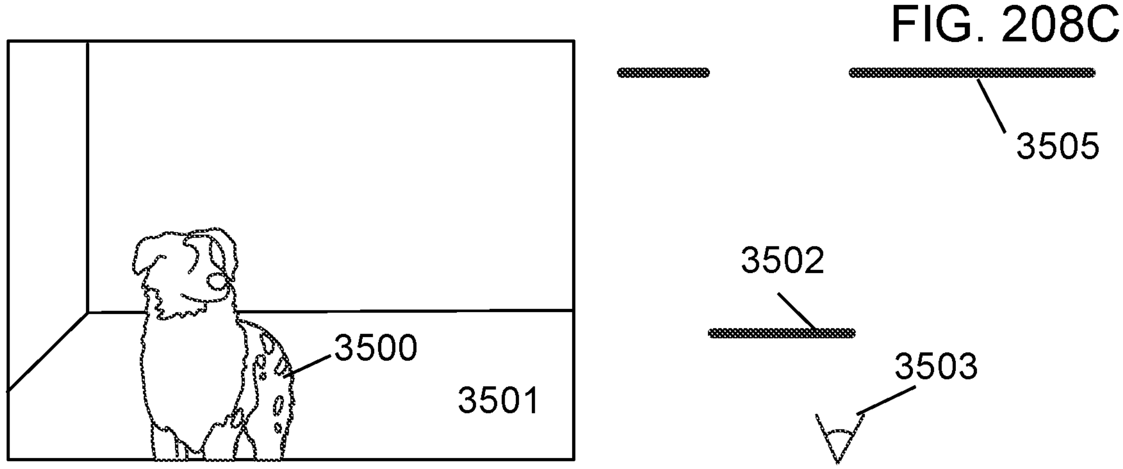

In some embodiments, the processor may determine a location, a height, a width, and a depth of an object based on sensor data. In some embodiments, the processor may adjust the path of the robot to avoid the object. In some cases, distance measurements and image data may be used to extract features used to identify different objects. For instance, FIG. 206A illustrates a two dimensional image of a feature 3300. The processor may use image data to determine the feature 3300. In FIG. 206A the processor may be 80% confident that the feature 3300 is a tree. In some cases, the processor may use distance measurements in addition to image data to extract additional information. In FIG. 206B the processor determines that it is 95% confident that the feature 3300 is a tree based on particular points in the feature 3300 having similar distances. In some embodiments, distances to objects may be two dimensional or three dimensional and objects may be static or dynamic. For instance, with two dimensional depth sensing, depth readings of a person moving within a volume may appear as a line moving with respect to a background line. For example, FIGS. 207A-207C illustrate a person 3400 moving within an environment 3401 and corresponding depth readings 3402 from perspective 3403 appearing as a line. Depth readings 3404 appearing as a line and corresponding with background 3405 of environment 3401 are also shown. As the person 3400 moves closer in FIGS. 207B and 207C, depth readings 3402 move further relative to background depth readings 3404. In other cases, different types of patterns may be identified. For example, a dog moving within a volume may result in a different pattern with respect to the background. This is illustrated in FIGS. 208A-208C, wherein a dog 3500 is moving within an environment 3501. Depth readings 3502 from perspective 3503 appearing as a line correspond with dog 3500 and depth readings 3504 appearing as a line correspond with background 3505 of environment 3501. With many samples of movements in many different environments, a deep neural network may be used to set signature patterns which may be searched for by the target system. The signature patterns may three dimensional as well, wherein a volume moves within a stationary background volume.

In some embodiments, the processor of the robot may recognize and avoid driving over objects. Some embodiments provide an image sensor and image processor coupled to the robot and use deep learning to analyze images captured by the image sensor and identify objects in the images, either locally or via the cloud. In some embodiments, images of a work environment are captured by the image sensor positioned on the robot. In some embodiments, the image sensor, positioned on the body of the robot, captures images of the environment around the robot at predetermined angles. In some embodiments, the image sensor may be positioned and programmed to capture images of an area below the robot. Captured images may be transmitted to an image processor or the cloud that processes the images to perform feature analysis and generate feature vectors and identify objects within the images by comparison to objects in an object dictionary. In some embodiments, the object dictionary may include images of objects and their corresponding features and characteristics. In some embodiments, the processor may compare objects in the images with objects in the object dictionary for similar features and characteristics. Upon identifying an object in an image as an object from the object dictionary different responses may be enacted (e.g., altering a movement path to avoid colliding with or driving over the object). For example, once the processor identifies objects, the processor may alter the navigation path of the robot to drive around the objects and continue back on its path. Some embodiments include a method for the processor of the robot to identify objects (or otherwise obstacles) in the environment and react to the identified objects according to instructions provided by the processor. In some embodiments, the robot includes an image sensor (e.g., camera) to provide an input image and an object identification and data processing unit, which includes a feature extraction, feature selection and object classifier unit configured to identify a class to which the object belongs. In some embodiments, the identification of the object that is included in the image data input by the camera is based on provided data for identifying the object and the image training data set. In some embodiments, training of the classifier is accomplished through a deep learning method, such as supervised or semi-supervised learning. In some embodiments, a trained neural network identifies and classifies objects in captured images.

In some embodiments, central to the object identification system is a classification unit that is previously trained by a method of deep learning in order to recognize predefined objects under different conditions, such as different lighting conditions, camera poses, colors, etc. In some embodiments, to recognize an object with high accuracy, feature amounts that characterize the recognition target object need to be configured in advance. Therefore, to prepare the object classification component of the data processing unit, different images of the desired objects are introduced to the data processing unit in a training set. After processing the images layer by layer, different characteristics and features of the objects in the training image set including edge characteristic combinations, basic shape characteristic combinations and the color characteristic combinations are determined by the deep learning algorithm(s) and the classifier component classifies the images by using those key feature combinations. When an image is received via the image sensor, in some embodiments, the characteristics can be quickly and accurately extracted layer by layer until the concept of the object is formed and the classifier can classify the object. When the object in the received image is correctly identified, the robot can execute corresponding instructions. In some embodiments, a robot may be programmed to avoid some or all of the predefined objects by adjusting its movement path upon recognition of one of the predefined objects. U.S. Non-Provisional patent application Ser. Nos. 15/976,853, 15/442,992, 16/570,242, 16/219,647 and 16/832,180 describe additional object recognition methods that may be used, the entire contents of which is hereby incorporated by reference.

FIG. 209 illustrates an example of an object recognition process 100. In a first step 102, the system acquires image data from the sensor. In a second step 104, the image is trimmed down to the region of interest (ROI). In a third step 106, image processing begins: features are extracted for object classification. In a next step 108, the system checks whether processing is complete by verifying that all parts of the ROI have been processed. If processing is not complete, the system returns to step 106. When processing is complete, the system proceeds to step 110 to determine whether any predefined objects have been found in the image. If no predefined objects were found in the image, the system proceeds to step 102 to begin the process anew with a next image. If one or more predefined objects were found in the image, the system proceeds to step 112 to execute preprogrammed instructions corresponding to the object or objects found. In some embodiments, instructions may include altering the robot's movement path to avoid the object. In some embodiments, instructions may include adding the found object characteristics to a database as part of an unsupervised learning in order to train the system's dictionary and/or classifier capabilities to better recognize objects in the future. After completing the instructions, the system then proceeds to step 102 to begin the process again.

In some embodiments, the processor may use sensor data to identify people and/or pets based on features of the people and/or animals extracted from the sensor data (e.g., features of a person extracted from images of the person captured by a camera of the robot). For example, the processor may identify a face in an image and perform an image search in a database stored locally or on the cloud to identify an image in the database that closely matches the features of the face in the image of interest. In some cases, other features of a person or animal may be used in identifying the type of animal or the particular person, such as shape, size, color, etc. In some embodiments, the processor may access a database including sensor data associated with particular persons or pets or types of animals (e.g., image data of a face of a particular person). In some embodiments, the database may be saved on a local memory of the robot or may be saved on an external memory or on the cloud. In some embodiments, the processor may identify a particular person or pet or type of animal within the environment using data collected by various sensors. In some embodiments, the processor may detect features of a person or pet (e.g., facial, body, vocal, etc. features) using sensor data and may determine the particular person or pet by comparing the features with features of different persons or pets saved in the database (e.g., locally or on the cloud). For example, images of the environment captured by a camera of the robot may be used by the processor to identify persons or pets observed, extract features of the persons or pets observed (e.g., shapes, colors, size, angles, voice or noise, etc.), and determine the particular person or pet observed based on the extracted features. In another example, data collected by an acoustic sensor may be used by the processor to identify persons or pets based on vocal features extracted from the data (i.e., voice recognition). In some embodiments, the processor may locally or via the cloud compare an image of a person or pet with images of different persons or pets in the database. In other embodiments, other types of sensor data may be compared. In some embodiments, the processor determines the particular person or pet based on the image in the database that most closely matches the image of the person or pet.

Figure 210A:
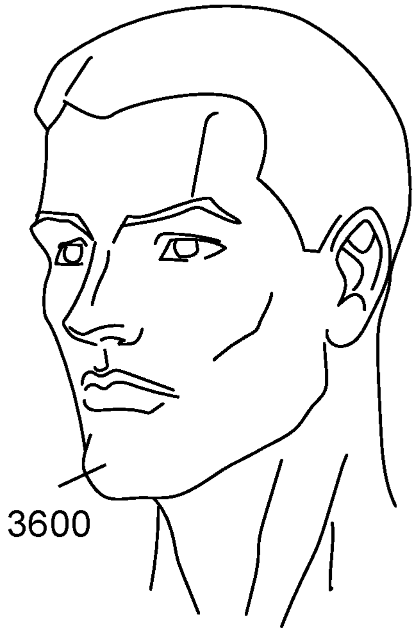
Figure 210B:
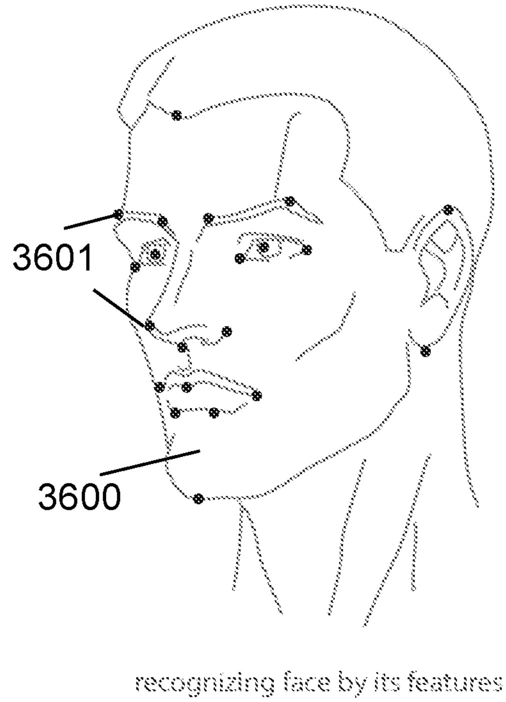
Figure 210C:
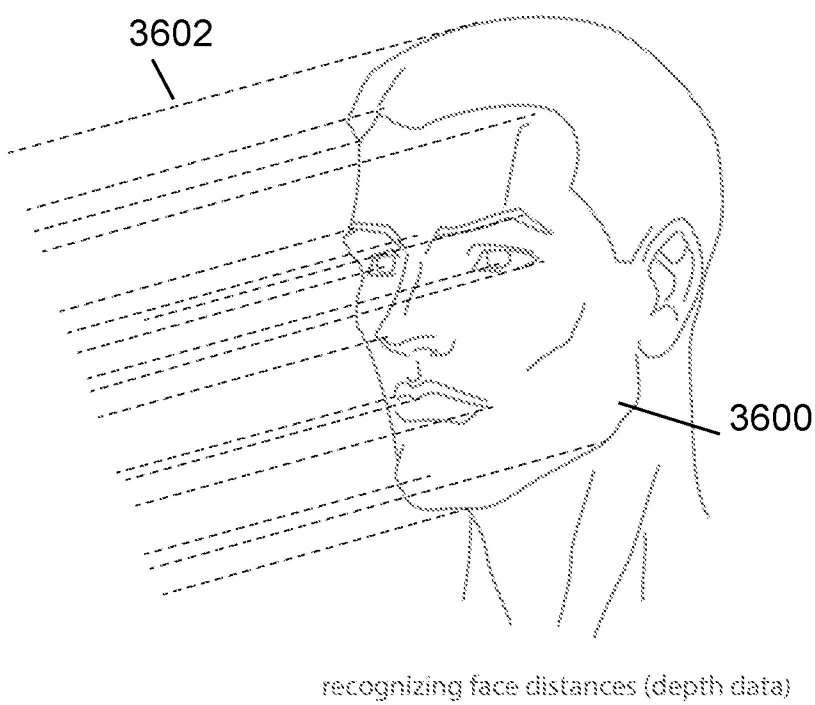
Figure 210D:
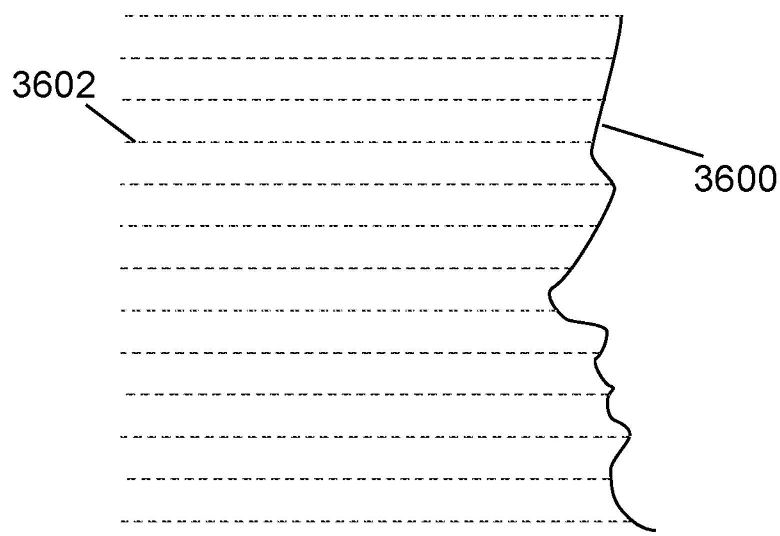
Figure 210E:
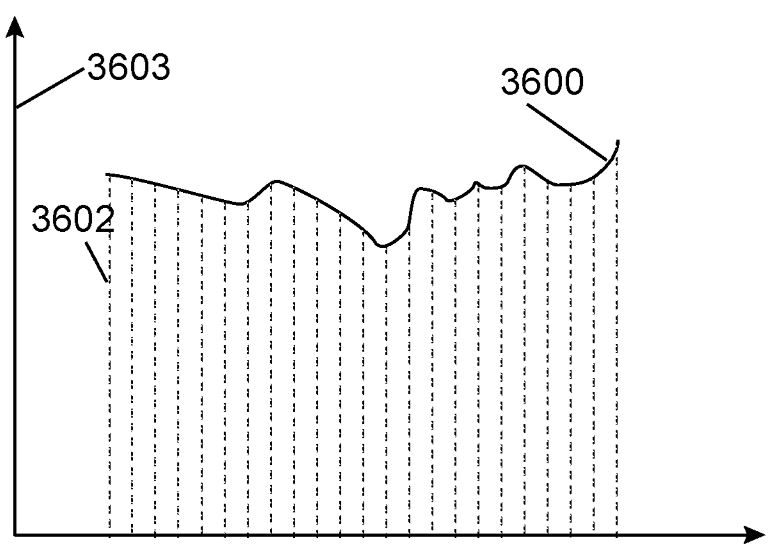
Figure 211A:
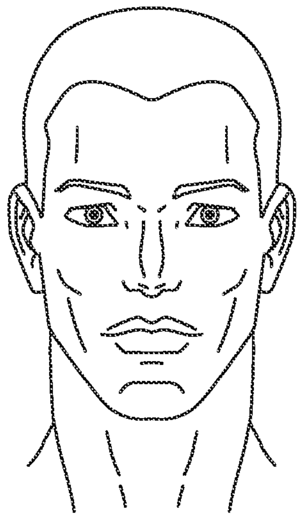
Figure 211B:
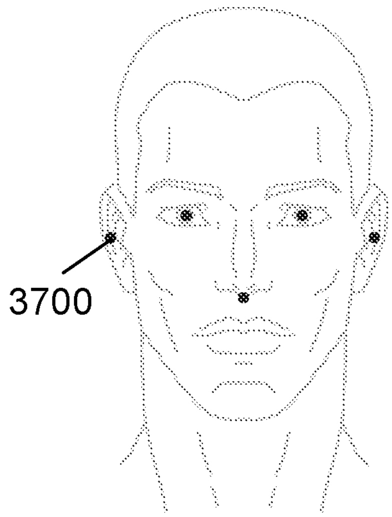
Figure 211C:
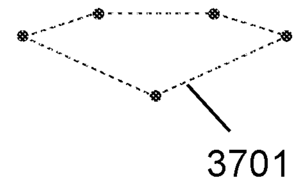
Figure 211D:
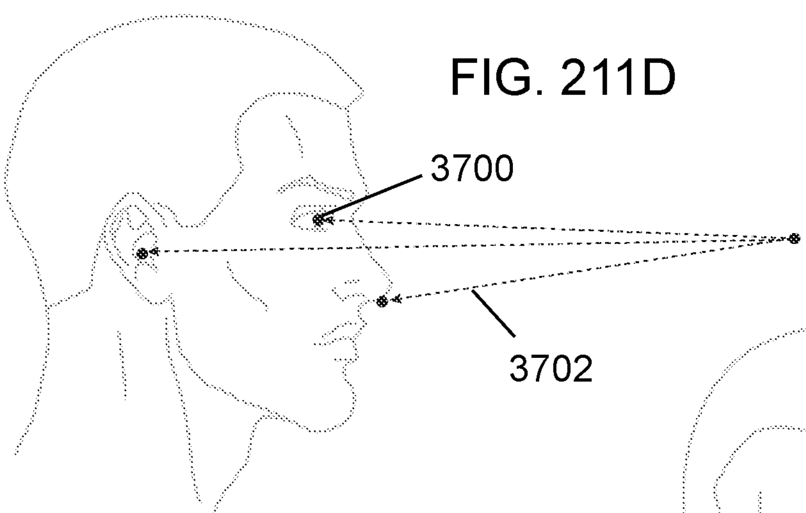
Figure 211E:
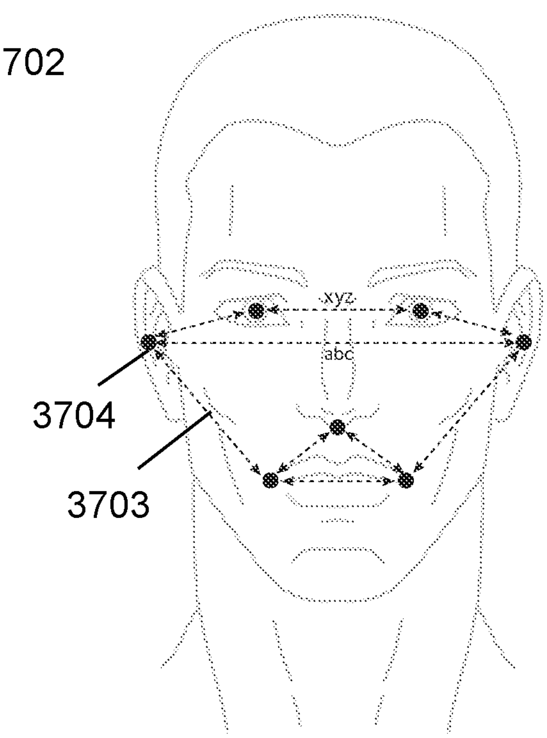
Figure 212A:
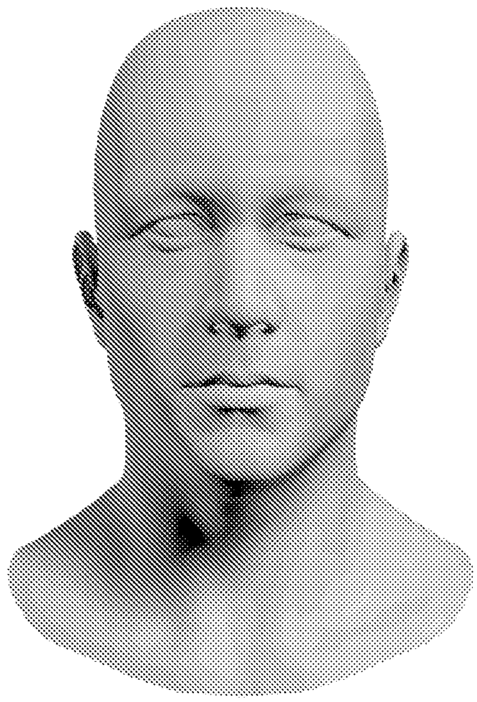
Figure 212B:
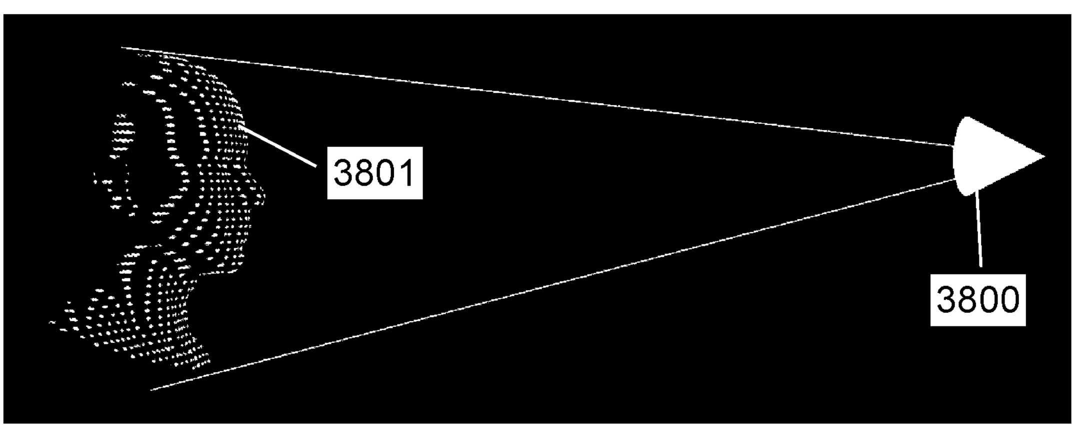
Figure 212C:
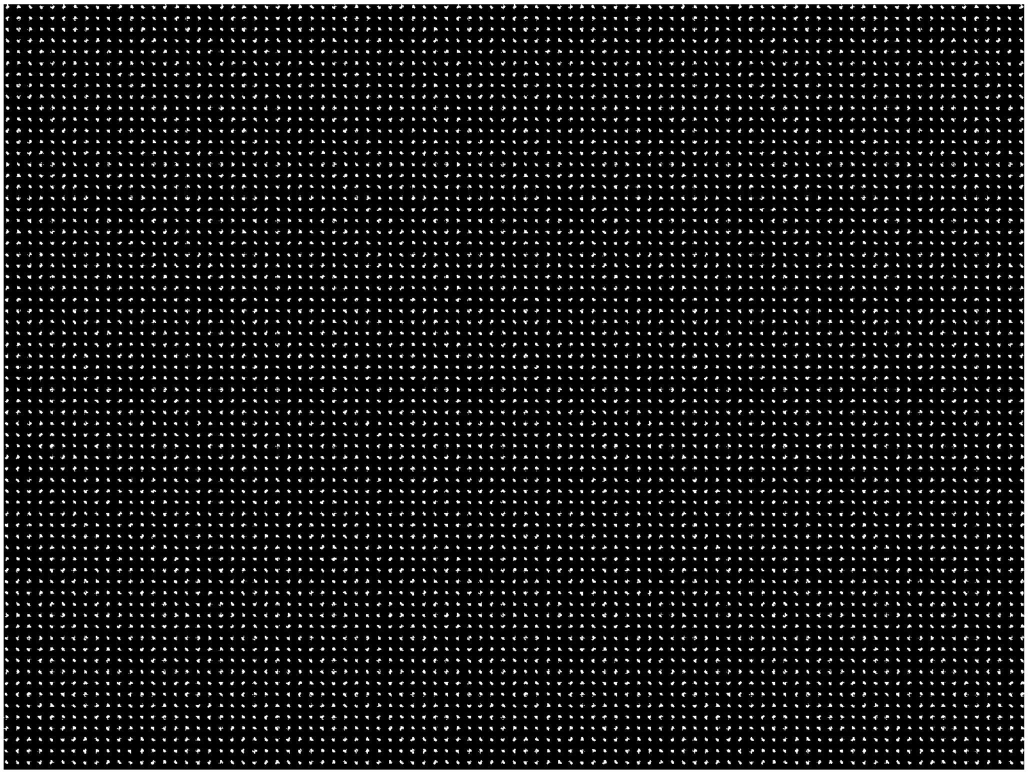
Figure 212D:
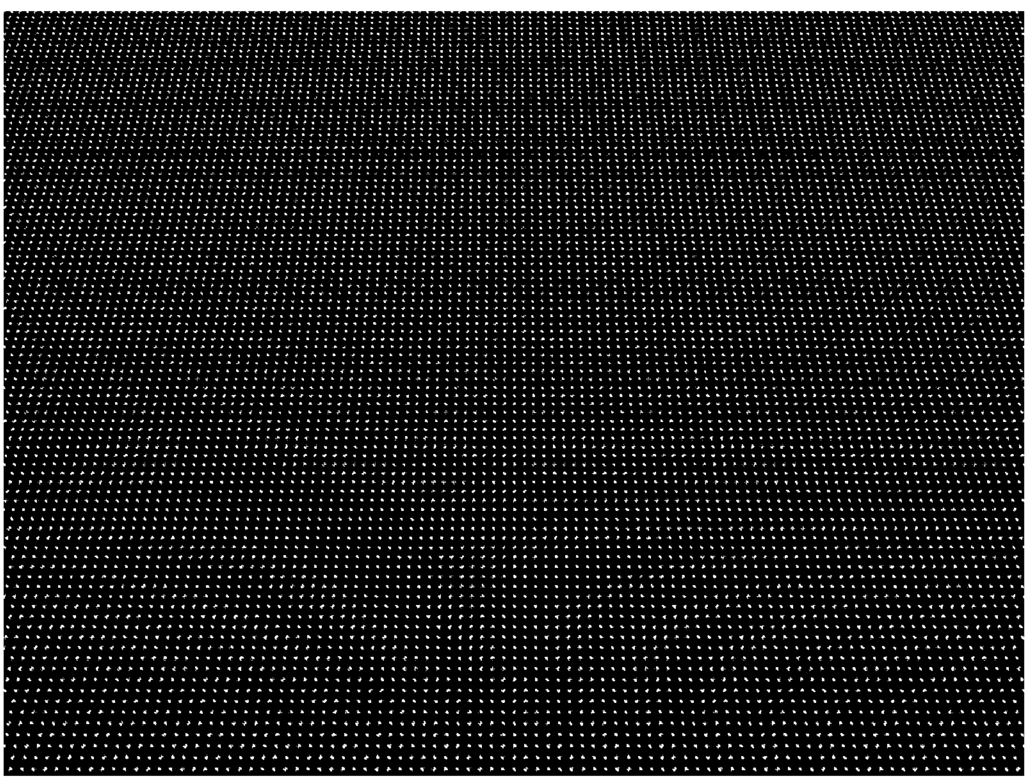
Figure 212E:
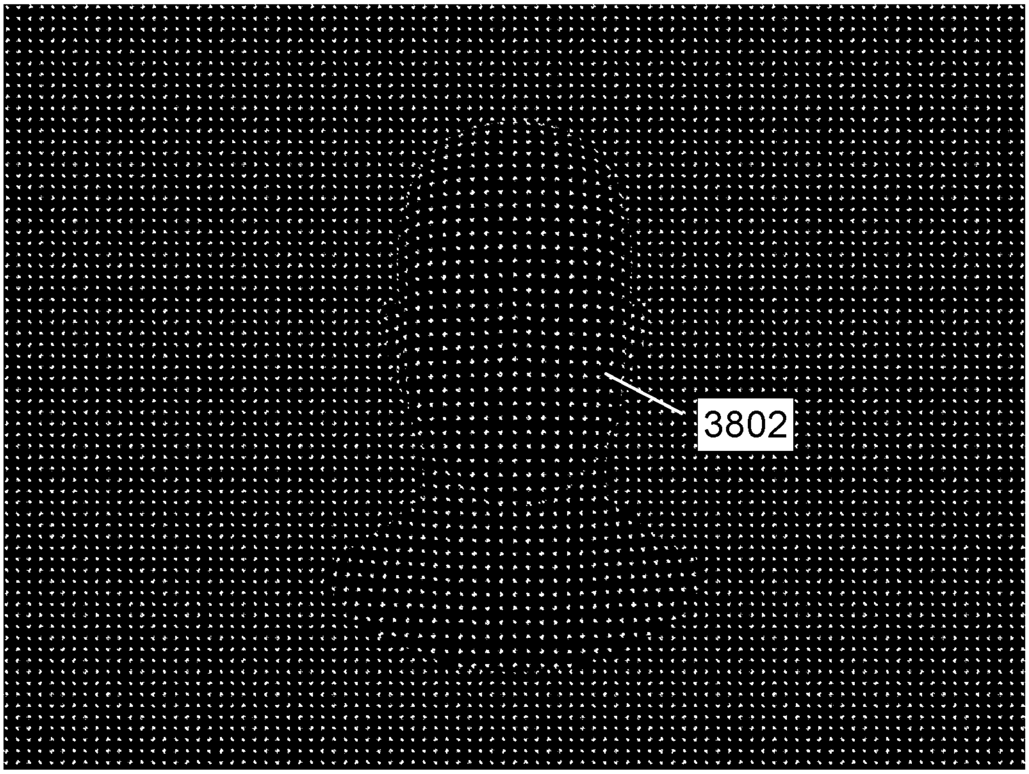
Figure 212F:
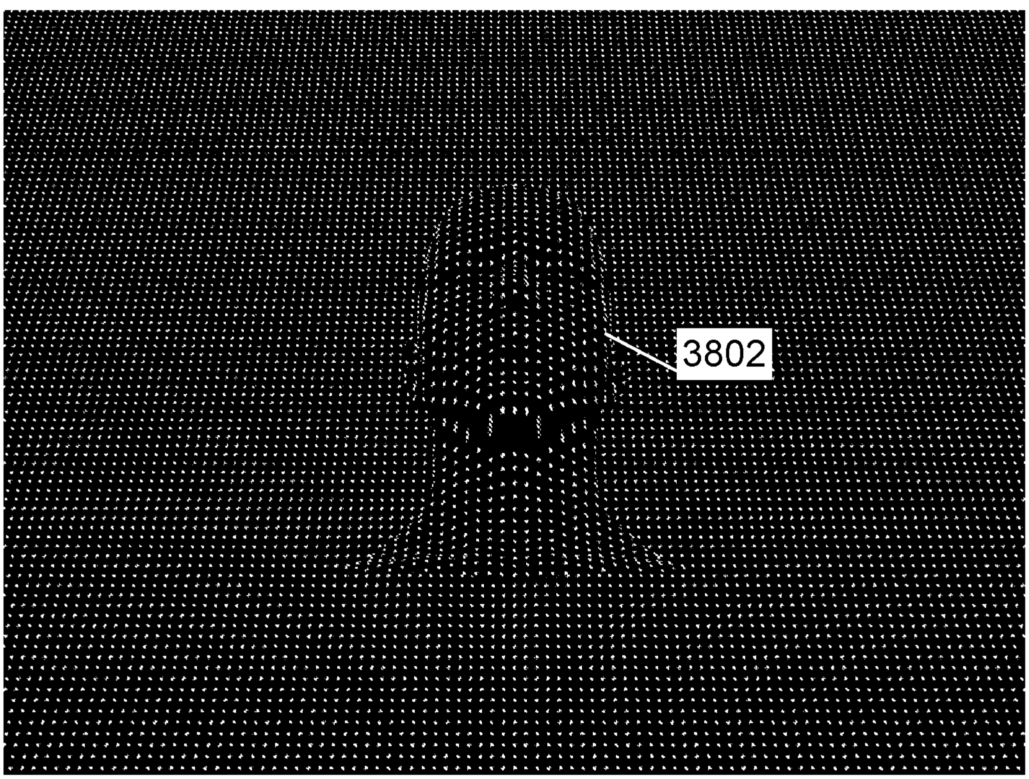

In some embodiments, the processor executes facial recognition based on unique depth patterns of a face. For instance, a face of a person may have a unique depth pattern when observed. FIG. 210A illustrates a face of a person 3600. FIG. 210B illustrates unique features 3601 identified by the processor that may be used in identifying the person 3600. FIGS. 210C and 210D illustrate depth measurements 3602 to different points on the face of the person 3600 from a frontal and side view, respectively. FIG. 210E illustrates a unique depth histogram 3603 corresponding with depth measurements 3602 of the face of person 3600. The processor may identify person 3600 based on their features and unique depth histogram 3603. In some embodiments, the processor applies Bayesian techniques. In some embodiments, the processor may first form a hypothesis of who a person is based on a first observation (e.g., physical facial features of the person (e.g., eyebrows, lips, eyes, etc.)). Upon forming the hypothesis, the processor may confirm the hypothesis by a second observation (e.g., the depth pattern of the face of the person). After confirming the hypothesis, the processor may infer who the person is. In some embodiments, the processor may identify a user based on the shape of a face and how features of the face (e.g., eyes, ears, mouth, nose, etc.) relate to one another. For example, FIG. 211A illustrates a front view of a face of a user and FIG. 211B illustrates features 3700 identified by the processor. FIG. 211C illustrates the geometrical relation 3701 of the features 3700. The processor may identify the face based on geometry 3701 of the connected features 3700. FIG. 211D illustrates a side view of a face of a user and features 3700 identified by the processor. The processor may use the geometrical relation 3702 to identify the user from a side view. FIG. 211E illustrates examples of different geometrical relations 3703 between features 3704 that may be used to identify a face. Examples of geometrical relations may include distance between any two features of the face, such as distance between the eyes, distance between the ears, distance between an eye and an ear, distance between ends of lips, and distance from the tip of the nose to an eye or ear or lip. Another example of geometrical relations may include the geometrical shape formed by connecting three or more features of the face. In some embodiments, the processor of the robot may identify the eyes of the user and may use real time SLAM to continuously track the eyes of the user. For example, the processor of the robot may track the eyes of a user such that virtual eyes of the robot displayed on a screen of the robot may maintain eye contact with the user during interaction with the user. In some embodiments, a structured light pattern may be emitted within the environment and the processor may recognize a face based on the pattern of the emitted light. For example, FIG. 212A illustrates a face of a user and FIG. 212B illustrates structured light emitted by a light emitter 3800 and the pattern of the emitted light 3801 when projected on the face of the user. The processor may recognize a face based on the pattern of the emitted light. FIG. 212C illustrates the pattern of emitted light on a wall when the structured light is emitted in a direction perpendicular to the wall. FIG. 212D illustrates the pattern of emitted light on a wall when the structured light is emitted onto the wall at an upwards angle relative to a horizontal plane. FIG. 212E illustrates the pattern of emitted light on the face of the user 3802 positioned in front of a wall when the structured light is emitted in a direction perpendicular to the wall. FIG. 212F illustrates the pattern of emitted light on the face of the user 3802 positioned in front of a wall when the structured light is emitted at an upwards angle relative to a horizontal plane.

In some embodiments, the processor may determine probabilities of the person or pet being different persons or pets and chooses the person or pet having the highest probability. In some embodiments, a machine learning algorithm may be used to learn the features of different persons or pets (e.g., facial or vocal features) extracted from sensor data such that the machine learning algorithm may identify the most likely person observed given an input of sensor data. In some embodiments, the processor may mark a location in which a particular person or pet was encountered or observed within a map of the environment. In some embodiments, the processor may determine or adjust the likelihood of encountering or observing a particular person or pet in different regions of the environment based on historical data of encountering or observing persons or pets. In embodiments, the process of determining the person or pet encountered or observed and/or marking the person or pet within the map of the environment may be executed locally on the robot or may be executed on the cloud. In some embodiments, the processor of the robot may instruct the robot to execute a particular action based on the particular person or pet observed. For example, the processor of the robot may detect a pet cat and in response may alter its movement to drive around the cat and continue along its path. In another example, the processor may detect a person identified as its owner and in response may execute the commands provided by the person. In contrast, the processor may detect a person that is not identified as its owner and in response may ignore commands provided by the person to the robot. In some embodiments, regions wherein a particular person or pet are consistently encountered or observed may be classified by the processor as heavily occupied or trafficked areas and may be marked as such in the map of the environment. In some embodiments, the particular times during which the particular person or pet was observed in regions may be recorded. In some embodiments, the processor may attempt to alter its path to avoid areas during times that they are heavily occupied or trafficked. In some embodiments, the processor may use a loyalty system wherein users that are more frequently recognized by the processor of the robot are given more precedence over persons less recognized. In such cases, the processor may increase a loyalty index of a person each time the person is recognized by the processor of the robot. In some embodiments, the processor of the robot may give precedence to persons that more frequently interact with the robot. In such cases, the processor may increase a loyalty index of a person each time the person interacts with the robot. In some embodiments, the processor of the robot may give precedence to particular users specified by a user of the robot. For example, a user may input images of one or more persons to which the robot is to respond to or provide precedence to using an application of a communication device paired with the robot. In some embodiments, the user may provide an order of precedence of multiple persons with which the robot may interact. For example, the loyalty index of an owner of a robot may be higher than the loyalty index of a spouse of the owner. Upon receiving conflicting commands from the owner of the robot and the spouse of the owner, the processor of the robot may use facial or voice recognition to identify both persons and may execute the command provided by the owner as the owner has a higher loyalty index.

In some embodiments, the processor may identify features, such as obstacles, of the environment based on the pattern of the emitted light projected onto the surfaces of objects within the environment. For example, FIG. 213A illustrates the pattern of emitted light resulting from the structured light projected onto a corner of two meeting walls when the structured light is emitted in a direction perpendicular to the front facing wall. The corner may be identified as the point of transition between the two different light patterns. For example, FIG. 213B illustrates the pattern of emitted light resulting from the structured light projected onto a corner of two meeting walls when the structured light is emitted at an upwards angle relative to a horizontal plane.

In some embodiments, the processor may identify objects by identifying particular geometric features associated with different objects. In some embodiments, the processor may describe a geometric feature by defining a region R of a binary image as a two-dimensional distribution of foreground points $p_i=(u_i, v_i)$ on the discrete plane $Z^2$ as a set $R=\{x_0, \ldots, x_{N-1}\}=\{(u_0, v_0), (u_1, v_1), \ldots, (u_{N-1}, v_{(N-1)})\}$. In some embodiments, the processor may describe a perimeter P of the region R by defining the region as the length of its outer contour, wherein R is connected. In some embodiments, the processor may describe compactness of the region R using a relationship between an area A of the region and the perimeter P of the region. In embodiments, the perimeter P of the region may increase linearly with the enlargement factor, while the area A may increase quadratically. Therefore, the ratio $$\frac{A}{P^2}$$

remains constant while scaling up or down and may thus be used as a point of comparison in translation, rotation, and scaling. In embodiments, the ratio $$\frac{A}{P^2}$$

may be approximated as $$\frac{1}{4\pi}$$

when the shape of the region resembles a circle. In some embodiments, the processor may normalize the ratio $$\frac{A}{P^2}$$

against a circle to show circularity of a shape.

In some embodiments, the processor may use Fourier descriptors as global shape representations, wherein each component may represent a particular characteristic of the entire shape (of an object, for example). In some embodiments, the processor may define a continuous curve C in the two dimensional plane can using $f: R \rightarrow R^2$. In some embodiments, the processor may use the function $$f(t) = \begin{pmatrix} x_t \\ y_t \end{pmatrix} = \begin{pmatrix} f_x(t) \\ f_y(t) \end{pmatrix},$$

wherein $f_x(t)$, $f_y(t)$ are independent, real-valued functions and t is the length along the curve path and a continuous parameter varied over the range of $[0, t_{max}]$. If the curve is closed, then $f(0)=f(t_{max})$ and $f(t)=f(t+t_{max})$. For a discrete space, the processor may sample the curve C, considered to be a closed curve, at regularly spaced positions M times, resulting in $t_0, t_1, \ldots, t_{M-1}$ and determine the length using $$t_i - t_{i-1} = \Delta_t = \frac{\text{length}(C)}{M}.$$

This may result in a sequence (i.e., vector) of discrete two dimensional coordinates $V=(v_0, v_1, \ldots, \nabla_{M-1})$, wherein $v_k=(x_k, y_k)=f(t_k)$. Since the curve is closed, the vector V represents a discrete function $v_k=v_k+pM$ that is infinite and periodic when $0 \le k \le M$ and $p \in Z$.

In some embodiments, the processor may execute a Fourier analysis to extract, identify, and use repeated patterns or frequencies that are incurred in the content of an image which may be used identifying objects. In some embodiments, the processor may use a Fast Fourier Transform (FFT) for large-kernel convolutions. In embodiments, the impact of a filter varies for different frequencies, such as high, medium, and low frequencies. In some embodiments, the processor may pass a sinusoid $s(x)=\sin(2\pi fx+\varphi_i)=\sin(\omega x+\varphi_i)$ of known frequency f through a filter and may measure attenuation, wherein $\omega=2\pi f$ is the angular frequency and $\varphi_i$ is the phase. In some embodiments, the processor may convolve the sinusoidal signal s(x) with a filter including an impulse response h(x), resulting in a sinusoid of the same frequency but different magnitude A and phase $\varphi_0$. In embodiments, the new magnitude A is the gain or magnitude of the filter and the phase difference $\Delta\varphi=\varphi o-\varphi i$ is the shift or phase. A more general notation of the sinusoid including complex numbers may be given by $s(x)=ej\omega x=\cos \omega x+j \sin \omega x$ while the convolution of the sinusoid s(x) with the filter h(x) may be given by $o(x)=h(x)*s(x)=Ae^{j\omega x+\varphi}$.

The Fourier transform is the response to a complex sinusoid of frequency ω passed through the filter h(x) or a tabulation of the magnitude and phase response at each frequency, H(ω)=F, wherein {h(x)}=Aejφ. The original transform pair may be given by F(ω)=F{f(x)}. In some embodiments, the processor may perform a superposition of $f_1(x)+f_2(x)$ for which the Fourier transform may be given by $F_1(\omega)+F_2(\omega)$. The superposition is a linear operator as the Fourier transform of the sum of the signals is the sum of their Fourier transforms. In some embodiments, the processor may perform a signal shift $f(x-x_0)$ for which the Fourier transform may be given by $F(\omega)e^{-j\omega x_0}$. The shift is a linear phase shift as the Fourier transform of the signal is the transform of the original signal multiplied by $e^{-j\omega x_0}$. In some embodiments, the processor may reverse a signal $f(-x)$ for which the Fourier Transform may be given by $F^*(\omega)$. The reversed signal that is Fourier transformed is given by the complex conjugate of the Fourier transform of the signal. In some embodiments, the processor may convolve two signals $f(x)*h(x)$ for which the Fourier transform may be given by $F(\omega)H(\omega)$. In some embodiments, the processor may perform the correlation of two functions $f(x) \circledast h(x)$ for which the Fourier transform may be given by $F(\omega)H^*(\omega)$. In some embodiments, the processor may multiply two functions $f(x)h(x)$ for which the Fourier transform may be given by $F(\omega)*H(\omega)$. In some embodiments, the processor may take the derivative of a signal $f'(x)$ for which the Fourier transform may be given by $j\omega F(\omega)$. In some embodiments, the processor may scale a signal $f(ax)$ for which the Fourier transform may be given by $$\frac{1}{a}F\left(\frac{\omega}{a}\right).$$

In some embodiments, the transform of a stretched signal may be the equivalently compressed (and scaled) version of the original transform. In some embodiments, real images may be given by $f(x)=f^*(x)$ for which the Fourier transform may be given by $F(\omega)=F(-\omega)$ and vice versa. In some embodiments, the transform of a real-valued signal may be symmetric around the origin. Some common Fourier transform pairs include impulse, shifted impulse, box filter, tent, Gaussian, Laplacian of Gaussian, Gabor, unsharp mask, etc. In embodiments, the Fourier transform may be a useful tool for analyzing the frequency spectrum of a whole class of images in addition to the frequency characteristics of a filter kernel or image. A variant of the Fourier Transform is the discrete cosine transform (DCT) which may be advantageous for compressing images by taking the dot product of each N-wide block of pixels with a set of cosines of different frequencies.

In some embodiments, the processor may use Shannon's Sampling Theorem which provides that to reconstruct a signal the minimum sampling rate is at least twice the highest frequency, $f_s \ge 2f_{max}$, known as Nyquist frequency, while the inverse of the minimum sampling frequency $$r_s = \frac{1}{f_s}$$

is the Nyquist rate. In some embodiments, the processor may localize patches with gradients in two different orientations by using simple matching criterion to compare two image patches. Examples of simple matching criterion include the summed square difference or weighted summed square difference, $E_{WSSD}(u)=\Sigma_i \omega(x_i)[I_1(x_i+u)-I_0(x_i)]^2$, wherein $I_0$ and $I_1$ are the two images being compared, u=(u, v) is the displacement vector, w(x) is a spatially varying weighting (or window) function. The summation is over all the pixels in the patch. In embodiments, the processor may not know which other image locations the feature may end up being matched with. However, the processor may determine how stable the metric is with respect to small variations in position Δu by comparing an image patch against itself. In some embodiments, the processor may need to account for scale changes, rotation, and/or affine invariance for image matching and object recognition. To account for such factors, the processor may design descriptors that are rotationally invariant or estimate a dominant orientation at each detected key point. In some embodiments, the processor may detect false negatives (failure to match) and false positives (incorrect match). Instead of finding all corresponding feature points and comparing all features against all other features in each pair of potentially matching images, which is quadratic in the number of extracted features, the processor may use indexes. In some embodiments, the processor may use multi-dimensional search trees or a hash table, vocabulary trees, K-Dimensional tree, and best bin first to help speed up the search for features near a given feature. In some embodiments, after finding some possible feasible matches, the processor may use geometric alignment and may verify which matches are inliers and which ones are outliers. In some embodiments, the processor may adopt a theory that a whole image is a translation or rotation of another matching image and may therefore fit a global geometric transform to the original image. The processor may then only keep the feature matches that fit the transform and discard the rest. In some embodiments, the processor may select a small set of seed matches and may use the small set of seed matches to verify a larger set of seed matches using random sampling or RANSAC. In some embodiments, after finding an initial set of correspondences, the processor may search for additional matches along epipolar lines or in the vicinity of locations estimated based on the global transform to increase the chances over random searches.

In some embodiments, the processor may execute a classification algorithm for baseline matching of key points, wherein each class may correspond to a set of all possible views of a key point. The algorithm may be provided various images of a particular object such that it may be trained to properly classify the particular object based on a large number of views of individual key points and a compact description of the view set derived from statistical classifications tools. At run-time, the algorithm may use the description to decide to which class the observed feature belongs. Such methods (or modified versions of such methods) may be used and are further described by V. Lepetit, J. Pilet and P. Fua, "Point matching as a classification problem for fast and robust object pose estimation," Proceedings of the 2004 IEEE Computer Society Conference on Computer Vision and Pattern Recognition, 2004, the entire contents of which are hereby incorporated by reference. In some embodiments, the processor may use an algorithm to detect and localize boundaries in scenes using local image measurements. The algorithm may generate features that respond to changes in brightness, color and texture. The algorithm may train a classifier using human labeled images as ground truth. In some embodiments, the darkness of boundaries may correspond with the number of human subjects that marked a boundary at that corresponding location. The classifier outputs a posterior probability of a boundary at each image location and orientation. Such methods (or modified versions of such methods) may be used and are further described by D. R. Martin, C. C. Fowlkes and J. Malik, "Learning to detect natural image boundaries using local brightness, color, and texture cues," in IEEE Transactions on Pattern Analysis and Machine Intelligence, vol. 26, no. 5, pp. 530-549, May 2004, the entire content of which is hereby incorporated by reference. In some embodiments, an edge in an image may correspond with a change in intensity. In some embodiments, the edge may be approximated using a piecewise straight curve composed of edgels (i.e., short, linear edge elements), each including a direction and position. The processor may perform edgel detection by fitting a series of one-dimensional surfaces to each window and accepting an adequate surface description based on least squares and fewest parameters. Such methods (or modified versions of such methods) may be used and are further described by V. S. Nalwa and T. O. Binford, "On Detecting Edges," in IEEE Transactions on Pattern Analysis and Machine Intelligence, vol. PAMI-8, no. 6, pp. 699-714, November 1986. In some embodiments, the processor may track features based on position, orientation, and behavior of the feature. The position and orientation may be parameterized using a shape model while the behavior is modeled using a three-tier hierarchical motion model. The first tier models local motions, the second tier is a Markov motion model, and the third tier is a Markov model that models switching between behaviors. Such methods (or modified versions of such methods) may be used and are further described by A. Veeraraghavan, R. Chellappa and M. Srinivasan, "Shape-and-Behavior Encoded Tracking of Bee Dances," in IEEE Transactions on Pattern Analysis and Machine Intelligence, vol. 30, no. 3, pp. 463-476, March 2008.

In some embodiments, the processor may detect sets of mutually orthogonal vanishing points within an image. In some embodiments, once sets of mutually orthogonal vanishing points have been detected, the processor may search for three dimensional rectangular structures within the image. In some embodiments, after detecting orthogonal vanishing directions, the processor may refine the fitted line equations, search for corners near line intersections, and then verify the rectangle hypotheses by rectifying the corresponding patches and looking for a preponderance of horizontal and vertical edges. In some embodiments, the processor may use a Markov Random Field (MRF) to disambiguate between potentially overlapping rectangle hypotheses. In some embodiments, the processor may use a plane sweep algorithm to match rectangles between different views. In some embodiments, the processor may use a grammar of potential rectangle shapes and nesting structures (between rectangles and vanishing points) to infer the most likely assignment of line segments to rectangles.

In some embodiments, some data, such as environmental properties or object properties, may be labelled or some parts of a data set may be labelled. In some embodiments, only a portion of data, or no data, may be labelled as not all users may allow labelling of their private spaces. In some embodiments, only a portion of data, or no data, may be labelled as users may not allow labelling of particular or all objects. In some embodiments, consent may be obtained from the user to label different properties of the environment or of objects or the user may provide different privacy settings using an application of a communication device. In some embodiments, labelling may be a slow process in comparison to data collection as it manual, often resulting in a collection of data waiting to be labelled. However, this does not pose an issue. Based on the chain law of probability, the processor may determine the probability of a vector x occurring using $p(x)=\Pi_{i-1}^{n}p(x_i|x_1, \ldots, x_{i-1})$. In some embodiments, the processor may solve the unsupervised task of modeling p(x) by splitting it into n supervised problems. Similarly, the processor may solve the supervised learning problem of p(y|x) using unsupervised methods. The processor may learn the distribution and obtain $$p(y \mid x) = \frac{p(x, y)}{\sum_{y}' p(x, y')}.$$

In some embodiments, the processor may approximate a function $f^*$. In some embodiments, a classifier $y=f^*(x)$ may map an image array x to a category y (e.g., cat, human, refrigerator, or other objects), wherein $x \in$ {set of images} and $y \in$ {set of objects}. In some embodiments, the processor may determine a mapping function $y=f(x; \theta)$, wherein $\theta$ may be the value of parameters that return a best approximation. In some cases, an accurate approximation requires several stages. For instance, $f(x)=f(f(x))$ is a chain of two functions, wherein the result of one function is the input into the other. A visualization of a chain of functions is illustrated in FIG. 214. Given two or more functions, the rules of calculus apply, wherein if $f(x)=h(g(x))$, then $f'(x)=h'(g(x))\times g'(x)$ and $$\frac{dy}{dx}=\frac{dy}{du}\times\frac{du}{dx}.$$

For linear functions, accurate approximations may be easily made as interpolation and extrapolation of linear functions is straight forward. Unfortunately, many problems are not linear. To solve a non-linear problem, the processor may convert the non-linear function into linear models. This means that instead of trying to find x, the processor may use a transformed function such as $\phi(x)$. The function $\phi(x)$ may be a non-linear transformation that may be thought of as describing some features of x that may be used to represent x, resulting in $y=f(x;\theta,\omega)=\phi(x;\theta)^T\omega$. The processor may use the parameters $\theta$ to learn about $\phi$ and the parameters $\omega$ that map $\phi(x)$ to the desired output. In some cases, human input may be required to generate a creative family of functions $\phi(x;\theta)$ for the feed forward model to converge for real practical matters. Optimizers and cost functions operate in a similar manner, except that the hidden layer $\phi(x)$ is hidden and a mechanism or knob to compute hidden values is required. These may be known as activation functions. In embodiments, the output of one activation function may be fed forward to the next activation function. In embodiments, the function $f(x)$ may be adjusted to match the approximation function $f^*(x)$. In some embodiments, the processor may use training data to obtain some approximate examples of $f^*(x)$ evaluated for different values of x. In some embodiments, the processor may label each example $y\approx f^*(x)$. Based on the example obtained from the training data, the processor may learn what the function $f(x)$ is to do with each value of x provided. In embodiments, the processor may use obtained examples to generate a series of adjustments for a new unlabeled example that may follow the same rules as the previously obtained examples. In embodiments, the goal may be to generalize from known examples such that a new input may be provided to the function $f(x)$ and an output matching the logic of previously obtained examples is generated. In embodiments, only the input and output are known, the operations occurring in between of providing the input and obtaining the output are unknown. This may be analogous to FIG. 215 wherein a fabric 6600 of a particular pattern is provided to a seamstress and a tie or suit 6602 is the output delivered to the customer. The customer only knows the input and the received output but has no knowledge of the operations that took place in between of providing the fabric and obtaining the tie or suit.

In some embodiments, a neural network algorithm of a feed forward system may include a composite of multiple logistic regression. In such embodiments, the feed forward system may be a network in a graph including nodes and links connecting the nodes organized in a hierarchy of layers. In some embodiments, nodes in the same layer may not be connected to one other. In embodiments, there may be a high number of layers in the network (i.e., deep network) or there may be a low number of layers (i.e., shallow network). In embodiments, the output layer may be the final logistic regression that receives a set of previous logistic regression outputs as an input and combines them into a result. In embodiments, every logistic regression may be connected to other logistic regressions with a weight. In embodiments, every connection between node j in layer k and node m in layer n may have a weight denoted by $w^{kn}$. In embodiments, the weight may determine the amount of influence the output from a logistic regression has on the next connected logistic regression and ultimately on the final logistic regression in the final output layer.

In some embodiments, the processor of the robot may use a neural network to identify objects and features in images. In some embodiments, the network may be represented by a matrix, such as an m×n matrix $$\begin{bmatrix} a_{11} & \cdots & a_{1n} \\ \vdots & \ddots & \vdots \\ a_{m1} & \cdots & a_{mn} \end{bmatrix}.$$

In some embodiments, the weights of the network may be represented by a weight matrix. For instance, a weight matrix connecting two layers may be given by $$\begin{bmatrix} w_{11}(=0.1) & w_{12}(=0.2) & w_{13}(=0.3) \\ w_{21}(=1) & w_{22}(=2) & w_{23}(=3) \end{bmatrix}.$$

In embodiments, inputs into the network may be represented as a set $x=(x_1, x_2, \ldots, x_n)$ organized in a row vector or a column vector $x=(x_1, x_2, \ldots, x_n)^T$. In some embodiments, the vector x may be fed into the network as an input resulting in an output vector y, wherein $f_i$, $f_h$, $f_o$ may be functions calculated at each layer. In some embodiments, the output vector may be given by $y=f_o(f_h(f_i(x)))$. In some embodiments, the knobs of weights and biases of the network may be tweaked through training using backpropagation. In some embodiments, training data may be fed into the network and the error of the output may be measured while classifying. Based on the error, the weight knobs may be continuously modified to reduce the error until the error is acceptable or below some amount. In some embodiments, backpropagation of errors may be determined using gradient descent, wherein $w_{updated}=w_{old}-\eta\nabla E$, w is the weight, $\eta$ is the learning rate, and E is the cost function. In some embodiments, the $L_2$ norm of the vector $x=(x_1, x_2, \ldots, x_n)$ may be determined using $$L_2(x)=\sqrt{(x_1+x_2, \ldots +x_n)}=\|x\|_2.$$

In some embodiments, the $L_2$ norm of weights may be provided by $\|w\|_2$. In some embodiments, an improved error function $E_{improved}=E_{original}+\|w\|_2$ may be used to determine the error of the network. In some embodiments, the additional term added to the error function may be an $L_2$ regularization. In some embodiments, $L_1$ regularization may be used in addition to $L_2$ regularization. In some embodiments, $L_2$ regularization may be useful in reducing the square of the weights while $L_1$ focuses on absolute values.

In some embodiments, the processor may flatten images (i.e., two dimensional arrays) into image vectors. In some embodiments, the processor may provide an image vector to a logistic regression (e.g., of a neural network). FIG. 216 illustrates an example of flattening a two dimensional image array 6700 into an image vector 6701 to obtain a stream of pixels. In some embodiments, the elements of the image vector may be provided to the network of nodes that perform logistic regression at each different network layer. For example, FIG. 217 illustrates the values of elements of vector array 6800 provided as inputs A, B, C, D, . . . into the first layer of the network 6801 of nodes that perform logistic regression. The first layer of the network 6801 may output updated values for A, B, C, D, . . . which may then be fed to the second layer of the network 6802 of nodes that perform logistic regression. The same processor continues, until A, B, C, D, . . . are fed into the last layer of the network 6803 of nodes that perform the final logistic regression and provide the final result 6804.

In some embodiments, the logistic regression may be performed by activation functions of nodes (in a neural network, for example). In some embodiments, the activation function of a node may be denoted by S and may define the output of the node given a set of inputs. In embodiments, the activation function may be a sigmoid, logistic, or a Rectified Linear Unit (ReLU) function. For example, a ReLU of x is the maximal value of 0 and x, p(x)=max(0, x), wherein 0 is returned if the input is negative, otherwise the raw input is returned. In some embodiments, multiple layers of the network may perform different actions. For example, the network may include a convolutional layer, a max-pooling layer, a flattening layer, and a fully connected layer. FIG. 218 illustrates a three layer network, wherein each layer may perform different functions. The input may be provided to the first layer, which may perform functions and pass the outputs of the first layer as inputs into the second layer. The second layer may perform different functions and pass the output as inputs into the second and the third (i.e., final) layer. The third layer may perform different functions, pass an output as input into the first layer, and provide the final output.

In some embodiments, the processor may convolve two functions g(x) and h(x). In some embodiments, the Fourier spectra of g(x) and h(x) may be G(ω) and H(ω), respectively. In some embodiments, the Fourier transform of the linear convolution g(x)*h(x) may be the pointwise product of the individual Fourier transforms G(ω) and H(ω), wherein $g(x)*h(x)\rightarrow G(\omega)\cdot H(\omega)$ and $g(x)\cdot h(x)\rightarrow G(\omega)*H(\omega)$. In some embodiments, sampling a continuous function may affect the frequency spectrum of the resulting discretized signal. In some embodiments, the original continuous signal g (x) may be multiplied by the comb function III(x). In some embodiments, the function value g(x) may only be transferred to the resulting function $\bar{g}(x)$ at integral positions $x=x_i\in Z$ and ignored for all non-integer positions. FIG. 219A illustrates an example of a continuous complex function g(x). FIG. 219B illustrates the comb function III(x). FIG. 219C illustrates the result of multiplying the function g(x) with the comb function III(x). In some embodiments, the original wave illustrated in FIG. 219A may be found from the result in FIG. 219C. Both waves in FIGS. 219A and 219C are identical. In some embodiments, the matrix Z may represent a feature of an image, such as illumination of pixels of the image. FIG. 220 illustrates illumination of a point 7100 on an object 7101, the light passes through the lens 7102, resulting in image 7103. A matrix 7104 may be used to represent the illumination of each pixel in the image 7103, wherein each entry corresponds to a pixel in the image 7103. For instance, point 7100 corresponds with pixel 7105 of image 7103 which corresponds with entry 7106 of the matrix 7104.

In some embodiments, the processor may represent color images by using an array of pixels in which different models may be used to order the individual color components. In embodiments, a pixel in a true color image may take any color value in its color space and may fall within the discrete range of its individual color components. In some embodiments, the processor may execute planar ordering, wherein color components are stored in separate arrays. For example, a color image array I may be represented by three arrays, $I=(I_R, I_G, I_B)$, and each element in the array may be given by a single color $$\begin{bmatrix} I_R(u, v) \\ I_G(u, v) \\ I_B(u, v) \end{bmatrix}.$$

For example, FIG. 221 illustrates the three arrays $I_R$, $I_G$, $I_B$ of the color image array I and an element 7600 of the array I for a particular position (u, $v_i$) given as $$\begin{bmatrix} I_R(u, v) \\ I_G(u, v) \\ I_B(u, v) \end{bmatrix}.$$

In some embodiments, the processor may execute packed ordering, wherein the component values that represent the color of each pixel are combined inside each element of the array. In some embodiments, each element of a single array may contain information about each color. For instance, FIG. 222 illustrates the array $I_{R,G,B}$ and the components 7700 of a pixel at some position (u, v). In some instances, the combined components may be 32 bits. In some embodiments, the processor may use a color palette including a subset of true color. The subset of true color may be an index of colors that are allowed to be within the domain. In some embodiments, the processor may convert R, G, B values into grayscale or luminance values. In some embodiments, the processor may determine luminance using $$Y = \frac{w_R + w_G + w_B}{3},$$

the weighted combination of the three colors.

In some embodiments, the size of an image may be the number of columns M (i.e., width of the image) and the number of rows N (i.e., height of the image) of the image matrix. In some embodiments, the resolution of an image may specify the spatial dimensions of the image in the real world and may be given as the number of image elements per measurement (e.g., dots per inch (dpi) or lines per inch (lpi)), which may be encoded in a number of bits. In some embodiments, image data of a grayscale image may include a single channel that represents the intensity, brightness, or density of the image. In some embodiments, images may be colored and may include the primary colors of red, green, and blue (RGB) or cyan, magenta, yellow, black (CYMK). In some embodiments, colored images may include more than one channel. For example, one channel for color in addition to a channel for the intensity gray scale data. In embodiments, each channel may provide information. In some embodiments, it may be beneficial to combine or separate elements of an image to construct new representations. For example, a color space transformation may be used for compression of a JPEG representation of an RGB image, wherein the color components Cb, Cr are separated from the luminance component Y and are compressed separately as the luminance component Y may achieve higher compression. At the decompression stage, the color components and luminance component may be merged into a single JPEG data stream in reverse order.

In some embodiments, Portable Bitmap Format (PBM) may be saved in a human-readable text format that may be easily read in a program or simply edited using a text editor. For example, the image in FIG. 223A may be stored in a file with editable text, such as that shown in FIG. 223B. P2 in the first line may indicate that the image is plain PBM in human readable text, 10 and 6 in the second line may indicate the number of columns and the number of rows (i.e., image dimensions), respectively, 255 in the third line may indicate the maximum pixel value for the color depth, and the # in the last line may indicate the start of a comment. Lines 4-9 are a 6×10 matrix corresponding with the image dimensions, wherein the value of each entry of the matrix is the pixel value. In some embodiments, the image shown in FIG. 223A may have intensity values $I(u, v) \in [0, K-1]$, wherein I is the image matrix and K is the maximum number of colors that may be displayed at one time. For a typical 8-bit grayscale image $K=2^8=256$. FIG. 223C illustrates a histogram corresponding with the image in FIG. 223A, wherein the x-axis is the entry number, beginning at the top left hand corner and reading towards the right of the matrix in FIG. 223B and the y-axis is the number of color. In some embodiments, a text file may include a simple sequence of 8-bit bytes, wherein a byte is the smallest entry that may be read or written to a file. In some embodiments, a cumulative histogram may be derived from an ordinary histogram and may be useful for some operations, such as histogram equalization. In some embodiments, the sum H(i) of all histogram values h(j) may be determined using $H(i)=\Sigma_{j=0}^{i} h(j)$, wherein $0 \le i < K$. In some embodiments, H(i) may be defined recursively as $$H(i) = \begin{cases} h(0) \text{ for } i = 0 \\ H(i-1) + h(i) \text{ for } 0 < i < K \end{cases}.$$

In some embodiments, the mean value μ of an image I of size M×N may be determined using pixel values I(u, v) or indirectly using a histogram h with a size of K. In some embodiments, the total number of pixels MN may be determined using $MN=\Sigma_i h(i)$. In some embodiments, the mean value of an image may be determined using $$\mu = \frac{1}{MN} \cdot \sum_{u=0}^{M-1} \sum_{v=0}^{N-1} I(u, v) = \frac{1}{MN} \cdot \sum_{i=0}^{K-1} h(i) \cdot i.$$

Similarly, the variance $\sigma^2$ of an image I of size M×N may be determined using pixel values I(u, v) or indirectly using a histogram h with a size of K. In some embodiments, the variance $\sigma^2$ may be determined using $$\sigma^2 = \frac{1}{MN} \cdot \sum_{u=0}^{M-1} \sum_{v=0}^{N-1} [I(u, v) - \mu]^2 = \frac{1}{MN} \cdot \sum_{i=0}^{K-1} (i-\mu)^2 \cdot h(i).$$

In some embodiments, the processor may use integral images (or summed area tables) to determine statistics for any arbitrary rectangular sub-images. This may be used for several of the applications used in the robot, such as fast filtering, adaptive thresholding, image matching, local feature extraction, face detection, and stereo reconstruction. For a scalar-valued grayscale image I: M×N→R, the processor may determine the first-order integral of an image using $\Sigma_1(u, v)=\Sigma_{i=0}^{u}\Sigma_{j=0}^{v} I(i, j)$. In some embodiments, $\Sigma_1(u, v)$ may be the sum of all pixel values in the original image I located to the left and above the given position (u, v), wherein $\Sigma_1(u, v)=$ $$\sum\nolimits_1 (u, v) = \begin{cases} 0 \text{ for } u < 0 \text{ or } v < 0 \\ \sum_1 (u-1, v) + \sum_1 (u, v-1) - \sum_1 (u-1, v-1) + I(u, v) \text{ for } u, v \ge 0 \end{cases}.$$

For positions u=0, . . . , M−1 and V=0, . . . , N−1, the processor may determine the sum of the pixel values in a given rectangular region R, defined by the corner positions $a=(u_a, v_a)$, $b=(u_b, v_b)$ using the first-order block sum $S_1(R) = \Sigma_{i=u_a}^{u_b}\Sigma_{j=v_a}^{v_b} I(i, j)$. In embodiments, the quantity $\Sigma_1(u_a-1, v_a-1)$ may correspond to the pixel sum within rectangle A, and $\Sigma_1(u_b, v_b)$ may correspond to the pixel sum over all four rectangles A, B, C and R. In some embodiments, the processor may apply a filter by smoothening an image by replacing the value of every pixel by the average of the values of its neighboring pixels, wherein a smoothened pixel value I'(u, v) may be determined using I'(u, v)←

$$\frac{p_0 + p_1 + p_2 + p_3 + p_4 + p_5 + p_6 + p_7 + p_8}{9}.$$

Examples of non-linear filters that the processor may use include median and weighted median filters.

Figure 224N:
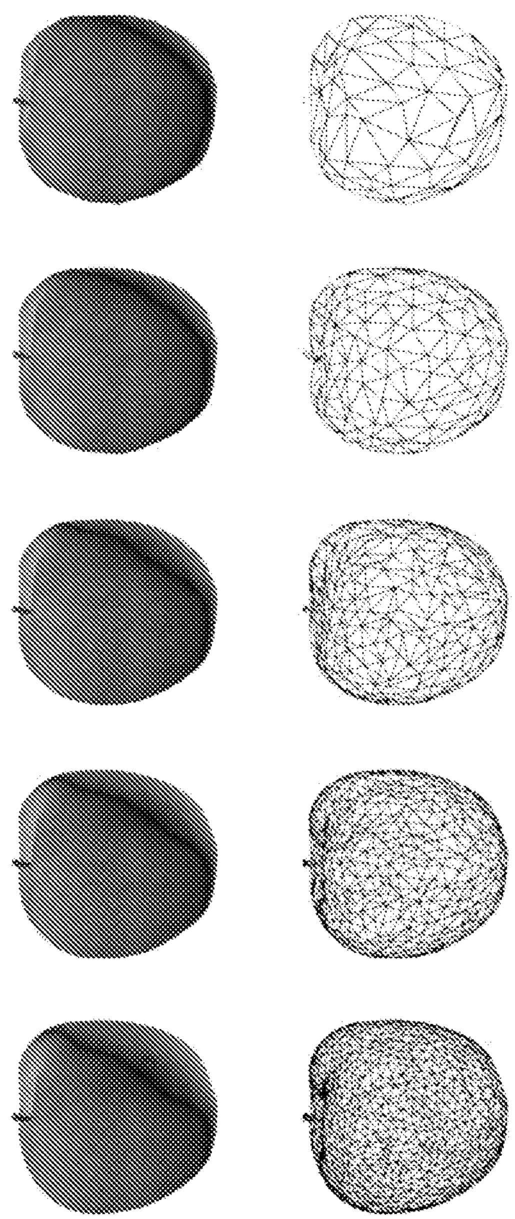

In some embodiments, the processor may user interpolation or decimation wherein the image is up-sampled to a higher resolution or down-sampled to reduce the resolution, respectively. In embodiments, this may be used to accelerate coarse-to-fine search algorithms. particularly when searching for an object or pattern. In some embodiments, the processor may use multi-resolution pyramids. An example of a multi-resolution pyramid includes the Laplacian pyramid of Burt and Adelson which first interpolates a low resolution version of an image to obtain a reconstructed low-pass of the original image and then subtracts the resulting low-pass version from the original image to obtain the band-pass Laplacian. This may be particularly useful when creating multilayered maps in three dimensions. For example, FIG. 224A illustrates a representation of a living room as it is perceived by the robot. FIG. 224B illustrates a mesh layered on top of the image perceived by the robot in FIG. 224A which is generated by connecting depth distances to each other. FIGS. 224C-224F illustrate different levels of mesh density that may be used. FIG. 224G illustrates a comparison of meshes with different resolutions. Although the different resolutions vary in number of faces they more or less represent the same volume. This may be used in a three dimensional map including multiple layers of different resolutions. The different resolutions of the layers of the map may be useful for searching the map and relocalizing, as processing a lower resolution map is faster. For example, if the robot is lifted from a current place and is placed in a new place, the robot may use sensors to collect new observations. The new observations may not correlate with the environment perceived prior to being moved. However, the processor of the robot has previously observed the new place before within the complete map. Therefore, the processor may use a portion or all of its new observations and search the map to determine the location of the robot. The processor may use a low resolution map to search or may begin with a low resolution map and progressively increase the resolution to find a match with the new observations. FIGS. 224H-224J illustrate structured light with various levels of resolution. FIG. 224K illustrates a comparison of various density levels of structured light for the same environment. FIG. 224L illustrates the same environment with distances represented by different shades varying from white to black, wherein white represents the closest distances and black the farthest distances. FIG. 224M illustrates FIG. 224L represented in a histogram which may be useful for searching a three dimensional map. FIG. 224N illustrates an apple shown in different resolutions.

Figure 225A:
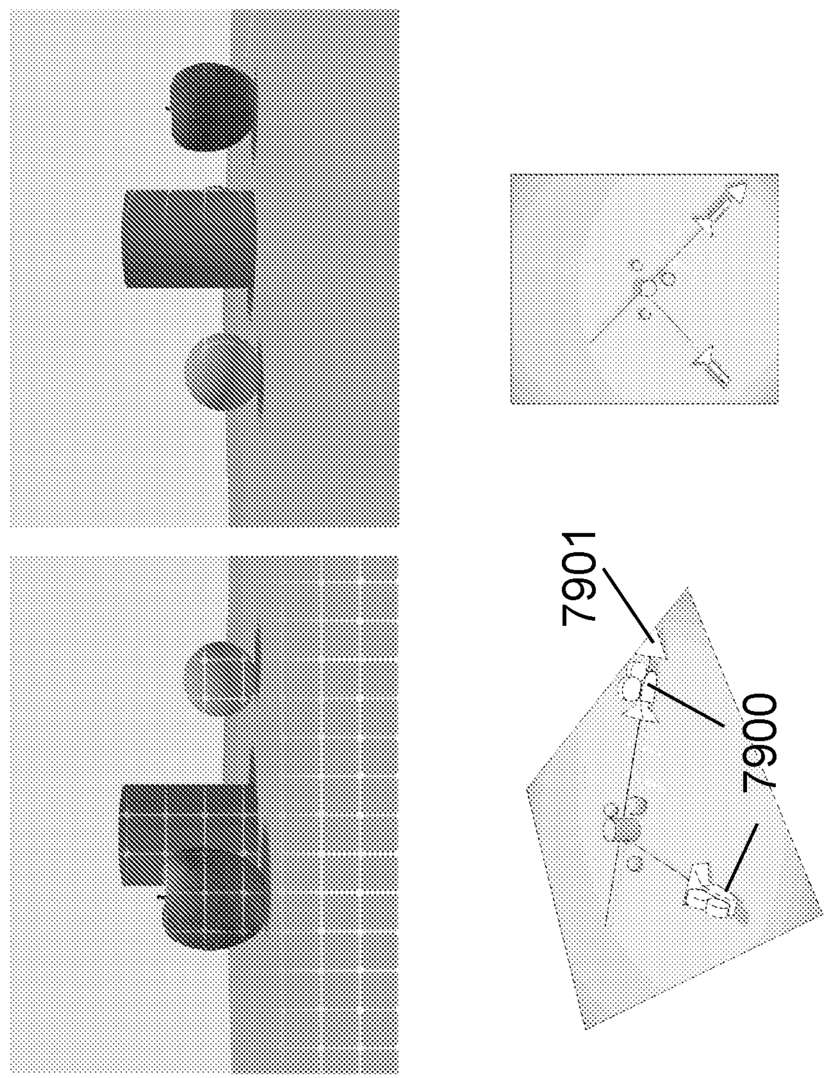
Figure 225B:
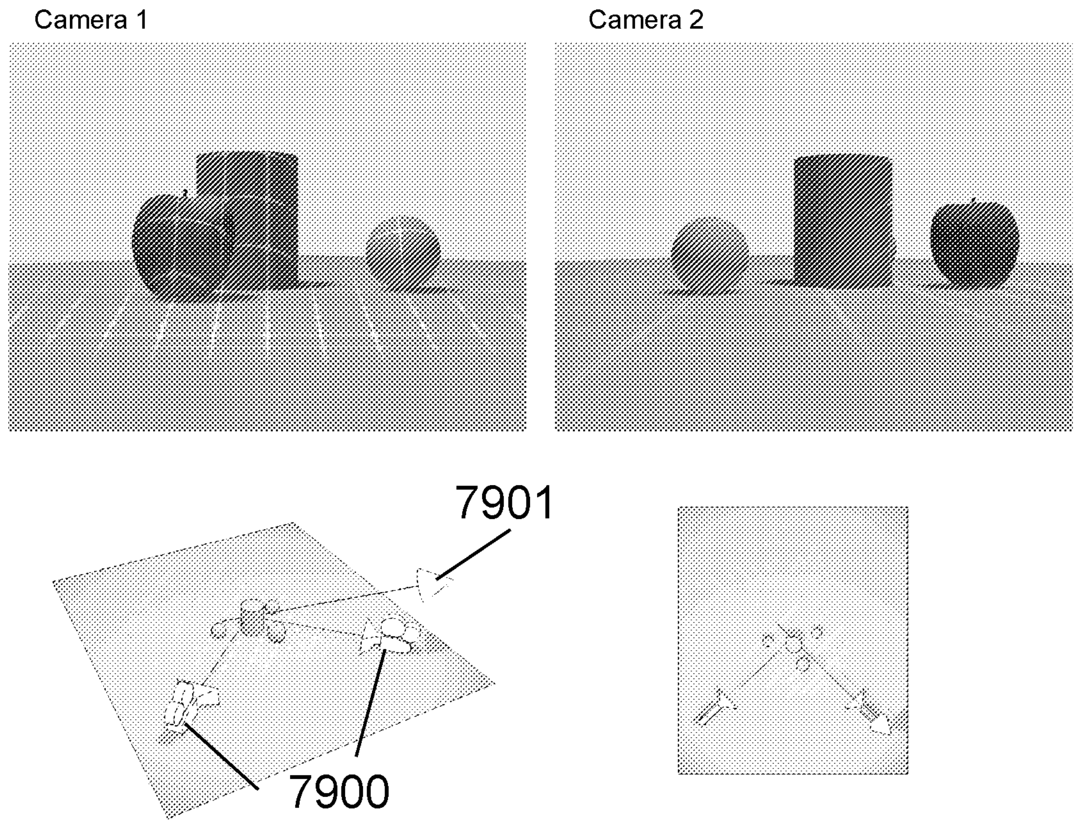
Figure 225C:
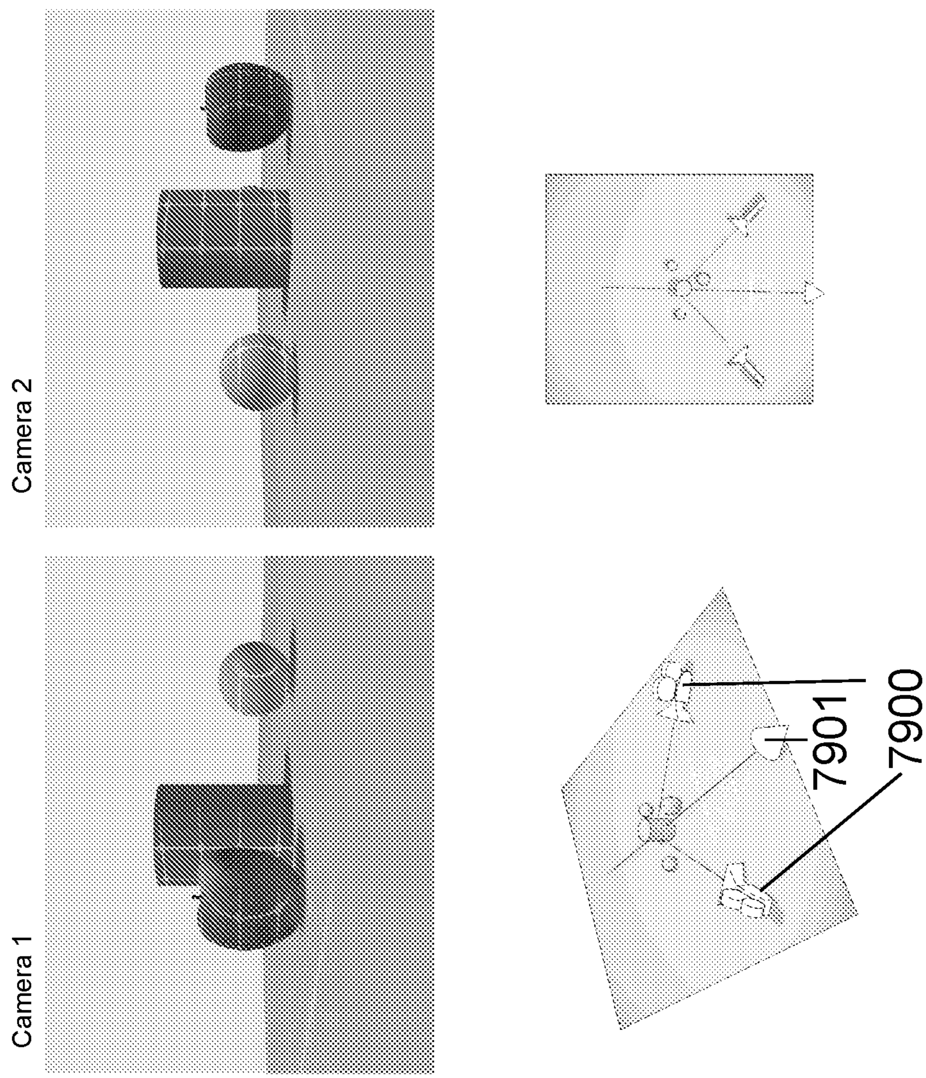
Figure 225D:
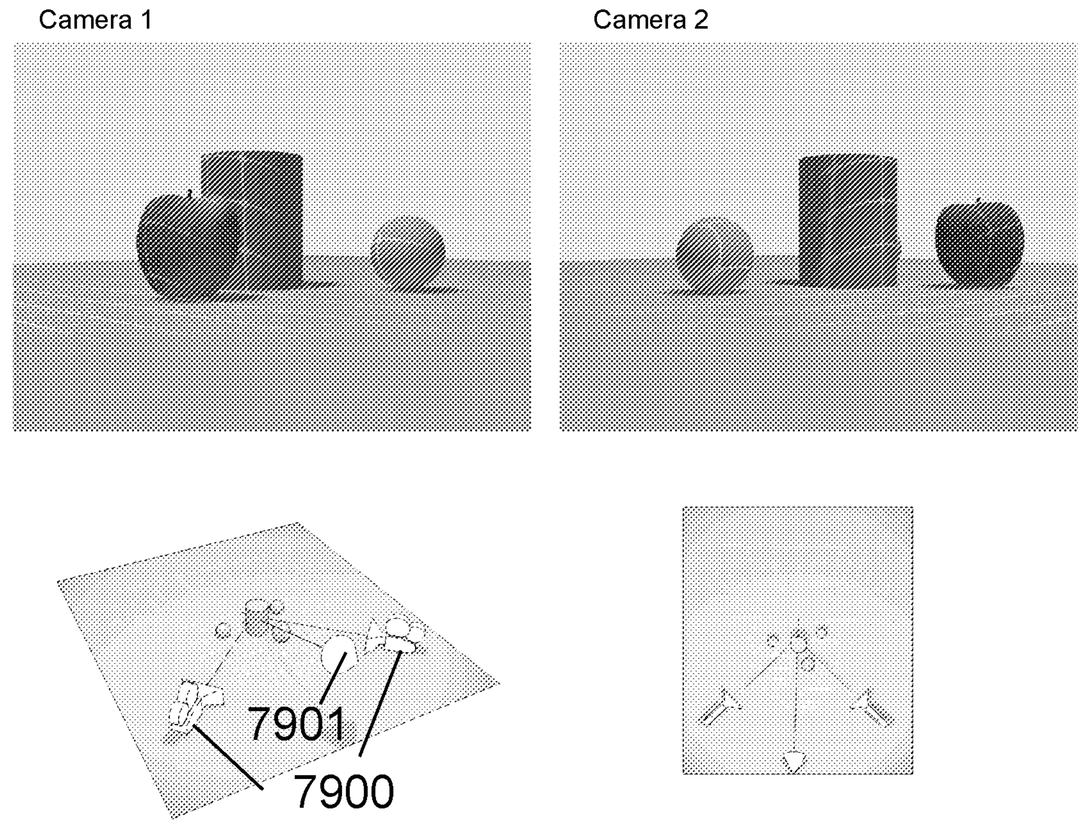
Figure 225E:
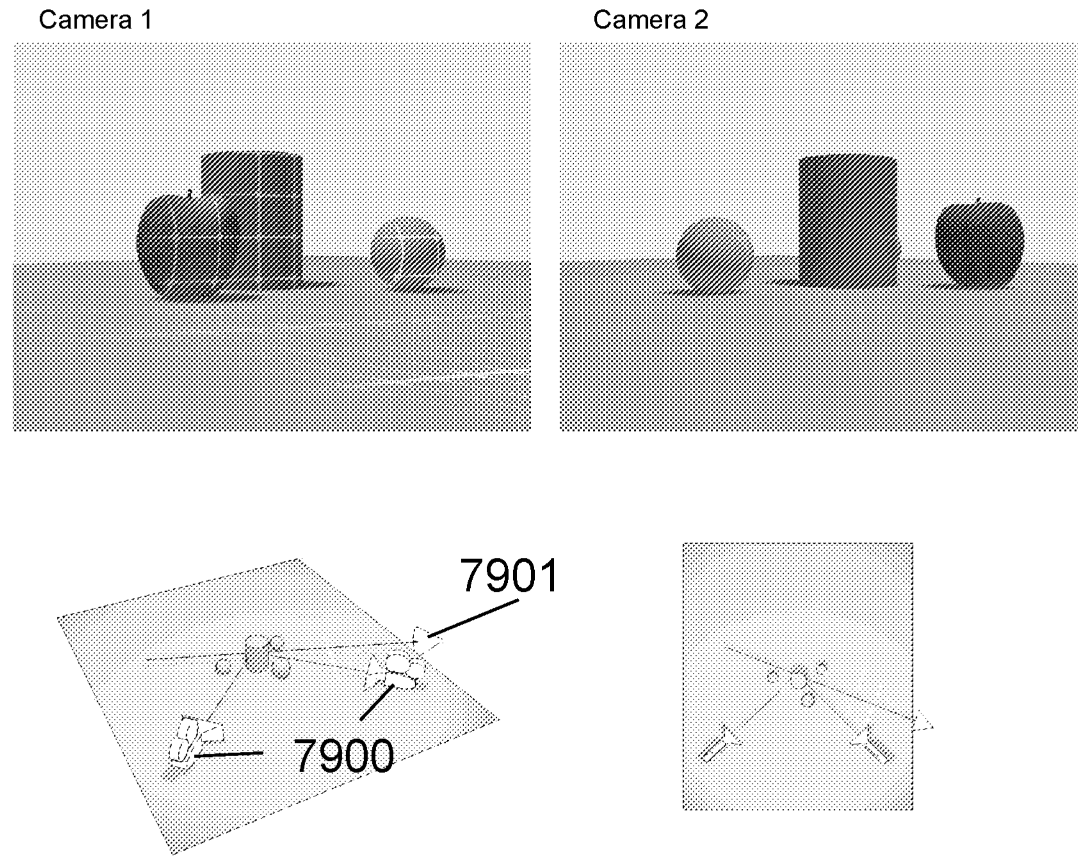
Figure 225F:
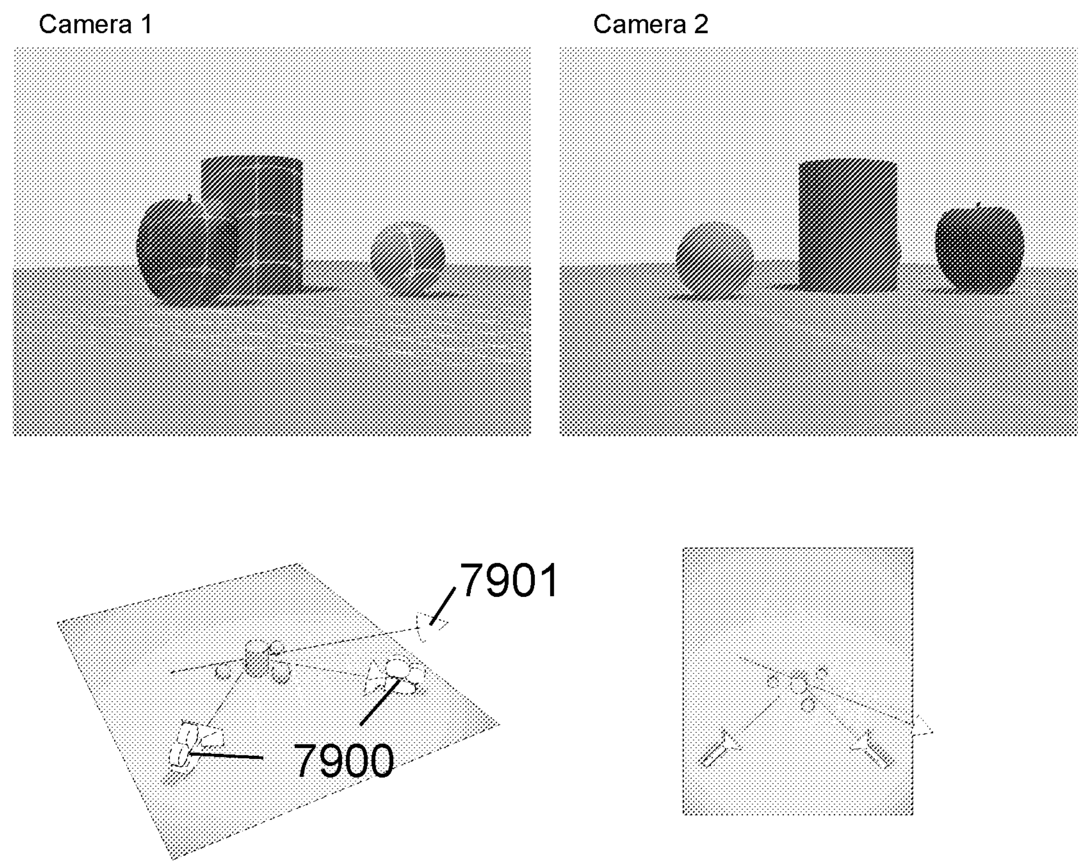
Figure 225G:
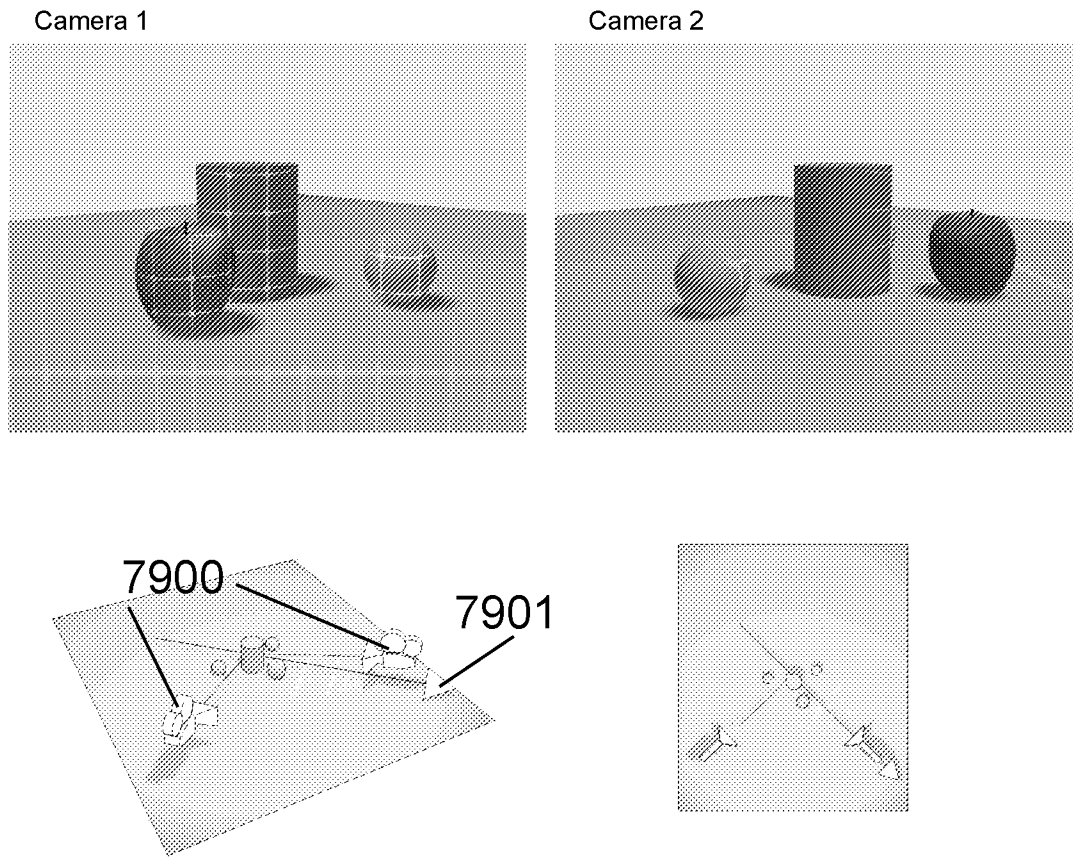
Figure 225I:
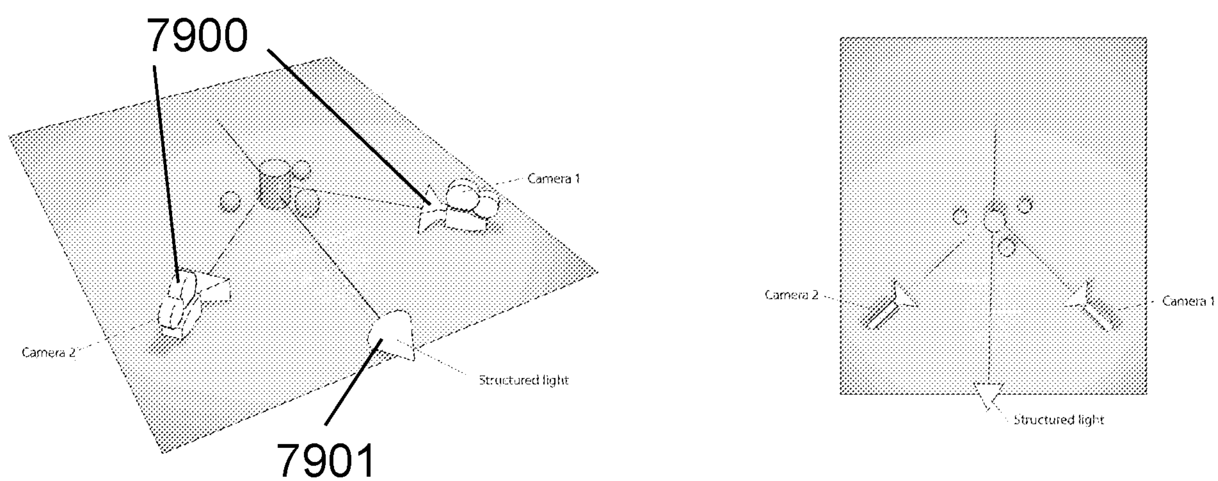

In some embodiments, at least two cameras and a structured light source may be used in reconstructing objects in three dimensions. The light source may emit a structured light pattern onto objects within the environment and the cameras may capture images of the light patterns projected onto objects. In embodiments, the light pattern in images captured by each camera may be different and the processor may use the difference in the light patterns to construct objects in three dimensions. FIGS. 225A-225H illustrate light patterns (projected onto objects (apple, ball, and can) from a structured light source) captured by each of two cameras 7900 (camera 1 and camera 2) for different configurations of the two cameras 7900 and the light source 7901. In each case, a perspective and top view of the configuration of the two cameras 7900 and light source 7901 are shown below the images captured by each of the two cameras 7900. In the perspective and top views of the configuration, camera 1 is always positioned on the right while camera 2 is always positioned on the left. This is shown in FIG. 225I.

In some embodiments, the processor of the robot may mark areas in which issues were encountered within the map, and in some cases, may determine future decisions relating to those areas based on the issues encountered. In some embodiments, the processor aggregates debris data and generates a new map that marks areas with a higher chance of being dirty. In some embodiments, the processor of the robot may mark areas with high debris density within the current map. In some embodiments, the processor may mark unexpected events within the map. For example, the processor of the robot marks an unexpected event within the map when a TSSP sensor detects an unexpected event on the right side or left side of the robot, such as an unexpected climb.

In some cases, the processor may use concurrency control which defines the rules that provide consistency of data. In some embodiments, the processor may ignore data a sensor reads when it is not consistent with the preceding data read. For example, when a robot driving towards a wall drives over a bump the pitch angle of the robot temporarily increases with respect to the horizon. At that particular moment, the spatial data may indicate a sudden increase in the distance readings to the wall, however, since the processor knows the robot has a positive velocity and the magnitude of the velocity, the processor marks the spatial data indicating the sudden increase as an outlier.

In some embodiments, the processor may determine decisions based on data from more than one sensor. For example, the processor may determine a choice or state or behavior based on agreement or disagreement between more than one sensor. For example, an agreement between some number of those sensors may result in a more reliable decision (e.g. there is high certainty of an edge existing at a location when data of N of M floor sensors indicate so). In some embodiments, the sensors may be different types of sensors (e.g. initial observation may be by a fast sensor, and final decision may be based on observation of a slower, more reliable sensor). In some embodiments, various sensors may be used and a trained AI algorithm may be used to detect certain patterns that may indicate further details, such as, a type of an edge (e.g., corner versus straight edge).

In some embodiments, the processor of the robot autonomously adjusts settings based on environmental characteristics observed using one or more environmental sensors (e.g., sensors that sense attributes of a driving surface, a wall, or a surface of an obstacle in an environment). Examples of methods for adjusting settings of a robot based on environmental characteristics observed are described in U.S. Patent Application No. 62/735,137 and Ser. No. 16/239,410. For example, processor may increase the power provided to the wheels when driving over carpet as compared to hardwood such that a particular speed may be maintained despite the added friction from the carpet. The processor may determine driving surface type using sensor data, wherein, for example, distance measurements for hard surface types are more consistent over time as compared to soft surface types due to the texture of grass. In some embodiments, the environmental sensor is communicatively coupled to the processor of the robot and the processor of the robot processes the sensor data (a term which is used broadly to refer to information based on sensed information at various stages of a processing pipeline). In some embodiments, the sensor includes its own processor for processing the sensor data. Examples of sensors include, but are not limited to (which is not to suggest that any other described component of the robotic cleaning device is required in all embodiments), floor sensors, debris sensors, obstacle sensors, cliff sensors, acoustic sensors, cameras, optical sensors, distance sensors, motion sensors, tactile sensors, electrical current sensors, and the like. In some embodiments, the optoelectronic system described above may be used to detect floor types based on, for example, the reflection of light. For example, the reflection of light from a hard surface type, such as hardwood flooring, is sharp and concentrated while the reflection of light from a soft surface type, such as carpet, is dispersed due to the texture of the surface. In some embodiments, the floor type may be used by the processor to identify the rooms or zones created as different rooms or zones include a particular type of flooring. In some embodiments, the optoelectronic system may simultaneously be used as a cliff sensor when positioned along the sides of the robot. For example, the light reflected when a cliff is present is much weaker than the light reflected off of the driving surface. In some embodiments, the optoelectronic system may be used as a debris sensor as well. For example, the patterns in the light reflected in the captured images may be indicative of debris accumulation, a level of debris accumulation (e.g., high or low), a type of debris (e.g., dust, hair, solid particles), state of the debris (e.g., solid or liquid) and a size of debris (e.g., small or large). In some embodiments, Bayesian techniques are applied. In some embodiments, the processor may use data output from the optoelectronic system to make a priori measurement (e.g., level of debris accumulation or type of debris or type of floor) and may use data output from another sensor to make a posterior measurement to improve the probability of being correct. For example, the processor may select possible rooms or zones within which the robot is located a priori based on floor type detected using data output from the optoelectronic sensor, then may refine the selection of rooms or zones posterior based on door detection determined from depth sensor data. In some embodiments, the output data from the optoelectronic system is used in methods described above for the division of the environment into two or more zones.

The one or more environmental sensors may sense various attributes of one or more of these features of an environment, e.g., particulate density, rolling resistance experienced by robot wheels, hardness, location, carpet depth, sliding friction experienced by robot brushes, hardness, color, acoustic reflectivity, optical reflectivity, planarity, acoustic response of a surface to a brush, and the like. In some embodiments, the sensor takes readings of the environment (e.g., periodically, like more often than once every 5 seconds, every second, every 500 ms, every 100 ms, or the like) and the processor obtains the sensor data. In some embodiments, the sensed data is associated with location data of the robot indicating the location of the robot at the time the sensor data was obtained. In some embodiments, the processor infers environmental characteristics from the sensory data (e.g., classifying the local environment of the sensed location within some threshold distance or over some polygon like a rectangle as being with a type of environment within a ontology, like a hierarchical ontology). In some embodiments, the processor infers characteristics of the environment in real-time (e.g., during a cleaning or mapping session, with 10 seconds of sensing, within 1 second of sensing, or faster) from real-time sensory data. In some embodiments, the processor adjusts various operating parameters of actuators, like speed, torque, duty cycle, frequency, slew rate, flow rate, pressure drop, temperature, brush height above the floor, or second or third order time derivatives of the same. For instance, some embodiments adjust the speed of components (e.g., main brush, peripheral brush, wheel, impeller, lawn mower blade, etc.) based on the environmental characteristics inferred (in some cases in real-time according to the preceding sliding windows of time). In some embodiments, the processor activates or deactivates (or modulates intensity of) functions (e.g., vacuuming, mopping, UV sterilization, digging, mowing, salt distribution, etc.) based on the environmental characteristics inferred (a term used broadly and that includes classification and scoring). In other instances, the processor adjusts a movement path, operational schedule (e.g., time when various designated areas are operated on or operations are executed), and the like based on sensory data. Examples of environmental characteristics include driving surface type, obstacle density, room type, level of debris accumulation, level of user activity, time of user activity, etc.

In some embodiments, the processor of the robot marks inferred environmental characteristics of different locations of the environment within a map of the environment based on observations from all or a portion of current and/or historical sensory data. In some embodiments, the processor modifies the environmental characteristics of different locations within the map of the environment as new sensory data is collected and aggregated with sensory data previously collected or based on actions of the robot (e.g., operation history). For example, in some embodiments, the processor of a street sweeping robot determines the probability of a location having different levels of debris accumulation (e.g., the probability of a particular location having low, medium and high debris accumulation) based on the sensory data. If the location has a high probability of having a high level of debris accumulation and was just cleaned, the processor reduces the probability of the location having a high level of debris accumulation and increases the probability of having a low level of debris accumulation. Based on sensed data, some embodiments may classify or score different areas of a working environment according to various dimensions, e.g., classifying by driving surface type in a hierarchical driving surface type ontology or according to a dirt-accumulation score by debris density or rate of accumulation.

In some embodiments, the map of the environment is a grid map wherein the map is divided into cells (e.g., unit tiles in a regular or irregular tiling), each cell representing a different location within the environment. In some embodiments, the processor divides the map to form a grid map. In some embodiments, the map is a Cartesian coordinate map while in other embodiments the map is of another type, such as a polar, homogenous, or spherical coordinate map. In some embodiments, the environmental sensor collects data as the robot navigates throughout the environment or operates within the environment as the processor maps the environment. In some embodiments, the processor associates each or a portion of the environmental sensor readings with the particular cell of the grid map within which the robot was located when the particular sensor readings were taken. In some embodiments, the processor associates environmental characteristics directly measured or inferred from sensor readings with the particular cell within which the robot was located when the particular sensor readings were taken. In some embodiments, the processor associates environmental sensor data obtained from a fixed sensing device and/or another robot with cells of the grid map. In some embodiments, the robot continues to operate within the environment until data from the environmental sensor is collected for each or a select number of cells of the grid map. In some embodiments, the environmental characteristics (predicted or measured or inferred) associated with cells of the grid map include, but are not limited to (which is not to suggest that any other described characteristic is required in all embodiments), a driving surface type, a room or area type, a type of driving surface transition, a level of debris accumulation, a type of debris, a size of debris, a frequency of encountering debris accumulation, day and time of encountering debris accumulation, a level of user activity, a time of user activity, an obstacle density, an obstacle type, an obstacle size, a frequency of encountering a particular obstacle, a day and time of encountering a particular obstacle, a level of traffic, a driving surface quality, a hazard, etc. In some embodiments, the environmental characteristics associated with cells of the grid map are based on sensor data collected during multiple working sessions wherein characteristics are assigned a probability of being true based on observations of the environment over time.

In some embodiments, the processor associates (e.g., in memory of the robot) information such as date, time, and location with each sensor reading or other environmental characteristic based thereon. In some embodiments, the processor associates information to only a portion of the sensor readings. In some embodiments, the processor stores all or a portion of the environmental sensor data and all or a portion of any other data associated with the environmental sensor data in a memory of the robot. In some embodiments, the processor uses the aggregated stored data for optimizing (a term which is used herein to refer to improving relative to previous configurations and does not require a global optimum) operations within the environment by adjusting settings of components such that they are ideal (or otherwise improved) for the particular environmental characteristics of the location being serviced or to be serviced.

In some embodiments, the processor generates a new grid map with new characteristics associated with each or a portion of the cells of the grid map at each work session. For instance, each unit tile may have associated therewith a plurality of environmental characteristics, like classifications in an ontology or scores in various dimensions like those discussed above. In some embodiments, the processor compiles the map generated at the end of a work session with an aggregate map based on a combination of maps generated during each or a portion of prior work sessions. In some embodiments, the processor directly integrates data collected during a work session into the aggregate map either after the work session or in real-time as data is collected. In some embodiments, the processor aggregates (e.g., consolidates a plurality of values into a single value based on the plurality of values) current sensor data collected with all or a portion of sensor data previously collected during prior working sessions of the robot. In some embodiments, the processor also aggregates all or a portion of sensor data collected by sensors of other robots or fixed sensing devices monitoring the environment.

In some embodiments, the processor (e.g., of a robot or a remote server system, either one of which (or a combination of which) may implement the various logical operations described herein) determines probabilities of environmental characteristics (e.g., an obstacle, a driving surface type, a type of driving surface transition, a room or area type, a level of debris accumulation, a type or size of debris, obstacle density, level of traffic, driving surface quality, etc.) existing in a particular location of the environment based on current sensor data and sensor data collected during prior work sessions. For example, in some embodiments, the processor updates probabilities of different driving surface types existing in a particular location of the environment based on the currently inferred driving surface type of the particular location and the previously inferred driving surface types of the particular location during prior working sessions of the robot and/or of other robots or fixed sensing devices monitoring the environment. In some embodiments, the processor updates the aggregate map after each work session. In some embodiments, the processor adjusts speed of components and/or activates/deactivates functions based on environmental characteristics with highest probability of existing in the particular location of the robot such that they are ideal for the environmental characteristics predicted. For example, based on aggregate sensory data there is an 85% probability that the type of driving surface in a particular location is hardwood, a 5% probability it is carpet, and a 10% probability it is tile. The processor adjusts the speed of components to ideal speed for hardwood flooring given the high probability of the location having hardwood flooring. Some embodiments may classify unit tiles into a flooring ontology, and entries in that ontology may be mapped in memory to various operational characteristics of actuators of the robot that are to be applied.

In some embodiments, the processor uses the aggregate map to predict areas with high risk of stalling, colliding with obstacles and/or becoming entangled with an obstruction. In some embodiments, the processor records the location of each such occurrence and marks the corresponding grid cell(s) in which the occurrence took place. For example, the processor uses aggregated obstacle sensor data collected over multiple work sessions to determine areas with high probability of collisions or aggregated electrical current sensor of a peripheral brush motor or motor of another device to determine areas with high probability of increased electrical current due to entanglement with an obstruction. In some embodiments, the processor causes the robot to avoid or reduce visitation to such areas.

In some embodiments, the processor uses the aggregate map to determine a navigational path within the environment, which in some cases, may include a coverage path in various areas (e.g., areas including collections of adjacent unit tiles, like rooms in a multi-room work environment). Various navigation paths may be implemented based on the environmental characteristics of different locations within the aggregate map. For example, the processor may generate a movement path that covers areas only requiring low impeller motor speed (e.g., areas with low debris accumulation, areas with hardwood floor, etc.) when individuals are detected as being or predicted to be present within the environment to reduce noise disturbances. In another example, the processor generates (e.g., forms a new instance or selects an extant instance) a movement path that covers areas with high probability of having high levels of debris accumulation, e.g., a movement path may be selected that covers a first area with a first historical rate of debris accumulation and does not cover a second area with a second, lower, historical rate of debris accumulation.

In some embodiments, the processor of the robot uses real-time environmental sensor data (or environmental characteristics inferred therefrom) or environmental sensor data aggregated from different working sessions or information from the aggregate map of the environment to dynamically adjust the speed of components and/or activate/deactivate functions of the robot during operation in an environment. For example, an electrical current sensor may be used to measure the amount of current drawn by a motor of a main brush in real-time. The processor may infer the type of driving surface based on the amount current drawn and in response adjusts the speed of components such that they are ideal for the particular driving surface type. For instance, if the current drawn by the motor of the main brush is high, the processor may infer that a robotic vacuum is on carpet, as more power is required to rotate the main brush at a particular speed on carpet as compared to hard flooring (e.g., wood or tile). In response to inferring carpet, the processor may increase the speed of the main brush and impeller (or increase applied torque without changing speed, or increase speed and torque) and reduce the speed of the wheels for a deeper cleaning. Some embodiments may raise or lower a brush in response to a similar inference, e.g., lowering a brush to achieve a deeper clean. In a similar manner, an electrical current sensor that measures the current drawn by a motor of a wheel may be used to predict the type of driving surface, as carpet or grass, for example, requires more current to be drawn by the motor to maintain a particular speed as compared to hard driving surface. In some embodiments, the processor aggregates motor current measured during different working sessions and determines adjustments to speed of components using the aggregated data. In another example, a distance sensor takes distance measurements and the processor infers the type of driving surface using the distance measurements. For instance, the processor infers the type of driving surface from distance measurements of a time-of-flight ("TOF") sensor positioned on, for example, the bottom surface of the robot as a hard driving surface when, for example, when consistent distance measurements are observed over time (to within a threshold) and soft driving surface when irregularity in readings are observed due to the texture of for example, carpet or grass. In a further example, the processor uses sensor readings of an image sensor with at least one IR illuminator or any other structured light positioned on the bottom side of the robot to infer type of driving surface. The processor observes the signals to infer type of driving surface. For example, driving surfaces such as carpet or grass produce more distorted and scattered signals as compared with hard driving surfaces due to their texture. The processor may use this information to infer the type of driving surface.

In some embodiments, the processor infers presence of users from sensory data of a motion sensor (e.g., while the robot is static, or with a sensor configured to reject signals from motion of the robot itself). In response to inferring the presence of users, the processor may reduce motor speed of components (e.g., impeller motor speed) to decrease noise disturbance. In some embodiments, the processor infers a level of debris accumulation from sensory data of an audio sensor. For example, the processor infers a particular level of debris accumulation and/or type of debris based on the level of noise recorded. For example, the processor differentiates between the acoustic signal of large solid particles, small solid particles or air to determine the type of debris and based on the duration of different acoustic signals identifies areas with greater amount of debris accumulation. In response to observing high level of debris accumulation, the processor of a surface cleaning robot, for example, increases the impeller speed for stronger suction and reduces the wheel speeds to provide more time to collect the debris. In some embodiments, the processor infers level of debris accumulation using an IR transmitter and receiver positioned along the debris flow path, with a reduced density of signals indicating increased debris accumulation. In some embodiments, the processor infers level of debris accumulation using data captured by an imaging device positioned along the debris flow path. In other cases, the processor uses data from an IR proximity sensor aimed at the surface as different surfaces (e.g. clean hardwood floor, dirty hardwood floor with thick layer of dust, etc.) have different reflectance thereby producing different signal output. In some instances, the processor uses data from a weight sensor of a dustbin to detect debris and estimate the amount of debris collected. In some instances, a piezoelectric sensor is placed within a debris intake area of the robot such that debris may make contact with the sensor. The processor uses the piezoelectric sensor data to detect the amount of debris collected and type of debris based on the magnitude and duration of force measured by the sensor. In some embodiments, a camera captures images of a debris intake area and the processor analyzes the images to detect debris, approximate the amount of debris collected (e.g. over time or over an area) and determine the type of debris collected. In some embodiments, an IR illuminator projects a pattern of dots or lines onto an object within the field of view of the camera. The camera captures images of the projected pattern, the pattern being distorted in different ways depending the amount and type of debris collected. The processor analyzes the images to detect when debris is collected and to estimate the amount and type of debris collected. In some embodiments, the processor infers a level of obstacle density from sensory data of an obstacle sensor. For example, in response to inferring high level of obstacle density, the processor reduces the wheel speeds to avoid collisions. In some instances, the processor adjusts a frame rate (or speed) of an imaging device and/or a rate (or speed) of data collection of a sensor based on sensory data.

In some embodiments, a memory of the robot includes a database of types of debris that may be encountered within the environment. In some embodiments, the database may be stored on the cloud. In some embodiments, the processor identifies the type of debris collected in the environment by using the data of various sensors capturing the features of the debris (e.g., camera, pressure sensor, acoustic sensor, etc.) and comparing those features with features of different types of debris stored in the database. In some embodiments, determining the type of debris may be executed on the cloud. In some embodiments, the processor determines the likelihood of collecting a particular type of debris in different areas of the environment based on, for example, current and historical data. For example, a robot encounters accumulated dog hair on the surface. Image sensors of the robot capture images of the debris and the processor analyzes the images to determine features of the debris. The processor compares the features to those of different types of debris within the database and matches them to dog hair. The processor marks the region in which the dog hair was encountered within a map of the environment as a region with increased likelihood of encountering dog hair. The processor increases the likelihood of encountering dog hair in that particular region with increasing number of occurrences. In some embodiments, the processor further determines if the type of debris encountered may be cleaned by a cleaning function of the robot. For example, a processor of a robotic vacuum determines that the debris encountered is a liquid and that the robot does not have the capabilities of cleaning the debris. In some embodiments, the processor of the robot incapable of cleaning the particular type of debris identified communicates with, for example, a processor of another robot capable of cleaning the debris from the environment. In some embodiments, the processor of the robot avoids navigation in areas with particular type of debris detected.

In some embodiments, the processor may adjust speed of components, select actions of the robot, and adjusts settings of the robot, each in response to real-time or aggregated (i.e., historical) sensor data (or data inferred therefrom). For example, the processor may adjust the speed or torque of a main brush motor, an impeller motor, a peripheral brush motor or a wheel motor, activate or deactivate (or change luminosity or frequency of) UV treatment from a UV light configured to emit below a robot, steam mopping, liquid mopping (e.g., modulating flow rate of soap or water), sweeping, or vacuuming (e.g., modulating pressure drop or flow rate), set a schedule, adjust a path, etc. in response to real-time or aggregated sensor data (or environmental characteristics inferred therefrom). In one instance, the processor of the robot may determine a path based on aggregated debris accumulation such that the path first covers areas with high likelihood of high levels of debris accumulation (relative to other areas of the environment), then covers areas with high likelihood of low levels of debris accumulation. Or the processor may determine a path based on cleaning all areas having a first type of flooring before cleaning all areas having a second type of flooring. In another instance, the processor of the robot may determine the speed of an impeller motor based on most likely debris size or floor type in an area historically such that higher speeds are used in areas with high likelihood of large sized debris or carpet and lower speeds are used in areas with high likelihood of small sized debris or hard flooring. In another example, the processor of the robot may determine when to use UV treatment based on historical data indicating debris type in a particular area such that areas with high likelihood of having debris that can cause sanitary issues, such as food, receive UV or other type of specialized treatment. In a further example, the processor reduces the speed of noisy components when operating within a particular area or avoids the particular area if a user is likely to be present based on historical data to reduce noise disturbances to the user. In some embodiments, the processor controls operation of one or more components of the robot based on environmental characteristics inferred from sensory data. For example, the processor deactivates one or more peripheral brushes of a surface cleaning device when passing over locations with high obstacle density to avoid entanglement with obstacles. In another example, the processor activates one or more peripheral brushes when passing over locations with high level of debris accumulation. In some instances, the processor adjusts the speed of the one or more peripheral brushes according to the level of debris accumulation.

In some embodiments, the processor of the robot may determine speed of components and actions of the robot at a location based on different environmental characteristics of the location. In some embodiments, the processor may assign certain environmental characteristics a higher weight (e.g., importance or confidence) when determining speed of components and actions of the robot. In some embodiments, input into an application of the communication device (e.g., by a user) specifies or modifies environmental characteristics of different locations within the map of the environment. For example, driving surface type of locations, locations likely to have high and low levels of debris accumulation, locations likely to have a specific type or size of debris, locations with large obstacles, etc. may be specified or modified using the application of the communication device.

In some embodiments, the processor may use machine learning techniques to predict environmental characteristics using sensor data such that adjustments to speed of components of the robot may be made autonomously and in real-time to accommodate the current environment. In some embodiments, Bayesian methods may be used in predicting environmental characteristics. For example, to increase confidence in predictions (or measurements or inferences) of environmental characteristics in different locations of the environment, the processor may use a first set of sensor data collected by a first sensor to predict (or measure or infer) an environmental characteristic of a particular location a priori to using a second set of sensor data collected by a second sensor to predict an environmental characteristic of the particular location. Examples of adjustments may include, but are not limited to, adjustments to the speed of components (e.g., a cleaning tool such a main brush or side brush, wheels, impeller, cutting blade, digger, salt or fertilizer distributor, or other component depending on the type of robot), activating/deactivating functions (e.g., UV treatment, sweeping, steam or liquid mopping, vacuuming, mowing, ploughing, salt distribution, fertilizer distribution, digging, and other functions depending on the type of robot), adjustments to movement path, adjustments to the division of the environment into subareas, and operation schedule, etc. In some embodiments, the processor may use a classifier such as a convolutional neural network to classify real-time sensor data of a location within the environment into different environmental characteristic classes such as driving surface types, room or area types, levels of debris accumulation, debris types, debris sizes, traffic level, obstacle density, human activity level, driving surface quality, and the like. In some embodiments, the processor may dynamically and in real-time adjust the speed of components of the robot based on the current environmental characteristics. Initially, the classifier may be trained such that it may properly classify sensor data to different environmental characteristic classes. In some embodiments, training may be executed remotely and trained model parameters may be downloaded to the robot, which is not to suggest that any other operation herein must be performed on the robot. The classifier may be trained by, for example, providing the classifier with training and target data that contains the correct environmental characteristic classifications of the sensor readings within the training data. For example, the classifier may be trained to classify electric current sensor data of a wheel motor into different driving surface types. For instance, if the magnitude of the current drawn by the wheel motor is greater than a particular threshold for a predetermined amount of time, the classifier may classify the current sensor data to a carpet driving surface type class (or other soft driving surface depending on the environment of the robot) with some certainty. In other embodiments, the processor may classify sensor data based on the change in value of the sensor data over a predetermined amount of time or using entropy. For example, the processor may classify current sensor data of a wheel motor into a driving surface type class based on the change in electrical current over a predetermined amount of time or entropy value. In response to predicting an environmental characteristic, such as a driving type, the processor may adjust the speed of components such that they are optimal for operating in an environment with the particular characteristics predicted, such as a predicted driving surface type. In some embodiments, adjusting the speed of components may include adjusting the speed of the motors driving the components. In some embodiments, the processor may also choose actions and/or settings of the robot in response to predicted (or measured or inferred) environmental characteristics of a location. In other examples, the classifier may classify distance sensor data, audio sensor data, or optical sensor data into different environmental characteristic classes (e.g., different driving surface types, room or area types, levels of debris accumulation, debris types, debris sizes, traffic level, obstacle density, human activity level, driving surface quality, etc.).

In some embodiments, the processor may use environmental sensor data from more than one type of sensor to improve predictions of environmental characteristics. Different types of sensors may include, but are not limited to, obstacle sensors, audio sensors, image sensors, TOF sensors, and/or current sensors. In some embodiments, the classifier may be provided with different types of sensor data and over time the weight of each type of sensor data in determining the predicted output may be optimized by the classifier. For example, a classifier may use both electrical current sensor data of a wheel motor and distance sensor data to predict driving type, thereby increasing the confidence in the predicted type of driving surface. In some embodiments, the processor may use thresholds, change in sensor data over time, distortion of sensor data, and/or entropy to predict environmental characteristics. In other instances, the processor may use other approaches for predicting (or measuring or inferring) environmental characteristics of locations within the environment.

In some instances, different settings may be set by a user using an application of a communication device (as described above) or an interface of the robot for different areas within the environment. For example, a user may prefer reduced impeller speed in bedrooms to reduce noise or high impeller speed in areas with soft floor types (e.g., carpet) or with high levels of dust and debris. As the robot navigates throughout the environment and sensors collect data, the processor may use the classifier to predict real-time environmental characteristics of the current location of the robot such as driving surface type, room or area type, debris accumulation, debris type, debris size, traffic level, human activity level, obstacle density, etc. In some embodiments, the processor assigns the environmental characteristics to a corresponding location of the map of the environment. In some embodiments, the processor may adjust the default speed of components to best suit the environmental characteristics of the location predicted.

In some embodiments, the processor may adjust the speed of components by providing more or less power to the motor driving the components. For example, for grass, the processor decreases the power supplied to the wheel motors to decrease the speed of the wheels and the robot and increases the power supplied to the cutting blade motor to rotate the cutting blade at an increased speed for thorough grass trimming.

In some embodiments, the processor may record all or a portion of the real-time decisions corresponding to a particular location within the environment in a memory of the robot. In some embodiments, the processor may mark all or a portion of the real-time decisions corresponding to a particular location within the map of the environment. For example, a processor marks the particular location within the map corresponding with the location of the robot when increasing the speed of wheel motors because it predicts a particular driving surface type. In some embodiments, data may be saved in ASCII or other formats to occupy minimal memory space.

In some embodiments, the processor may represent and distinguish environmental characteristics using ordinal, cardinal, or nominal values, like numerical scores in various dimensions or descriptive categories that serve as nominal values. For example, the processor may denote different driving surface types, such as carpet, grass, rubber, hardwood, cement, and tile by numerical categories, such as 1, 2, 3, 4, 5 and 6, respectively. In some embodiments, numerical or descriptive categories may be a range of values. For example, the processor may denote different levels of debris accumulation by categorical ranges such as 1-2, 2-3, and 3-4, wherein 1-2 denotes no debris accumulation to a low level of debris accumulation, 2-3 denotes a low to medium level of debris accumulation, and 3-4 denotes a medium to high level of debris accumulation. In some embodiments, the processor may combine the numerical values with a map of the environment forming a multidimensional map describing environmental characteristics of different locations within the environment, e.g., in a multi-channel bitmap. In some embodiments, the processor may update the map with new sensor data collected and/or information inferred from the new sensor data in real-time or after a work session. In some embodiments, the processor may generates an aggregate map of all or a portion of the maps generated during each work session wherein the processor uses the environmental characteristics of the same location predicted in each map to determine probabilities of each environmental characteristic existing at the particular location.

In some embodiments, the processor may use environmental characteristics of the environment to infer additional information such as boundaries between rooms or areas, transitions between different types of driving surfaces, and types of areas. For example, the processor may infer that a transition between different types of driving surfaces exists in a location of the environment where two adjacent cells have different predicted type of driving surface. In another example, the processor may infer with some degree of certainty that a collection of adjacent locations within the map with combined surface area below some threshold and all having hard driving surface are associated with a particular environment, such as a bathroom as bathrooms are generally smaller than all other rooms in an environment and generally have hard flooring. In some embodiments, the processor labels areas or rooms of the environment based on such inferred information.

In some embodiments, the processor may command the robot to complete operation on one type of driving surface before moving on to another type of driving surface. In some embodiments, the processor may command the robot to prioritize operating on locations with a particular environmental characteristic first (e.g., locations with high level of debris accumulation, locations with carpet, locations with minimal obstacles, etc.). In some embodiments, the processor may generate a path that connects locations with a particular environmental characteristic and the processor may command the robot to operate along the path. In some embodiments, the processor may command the robot to drive over locations with a particular environmental characteristic more slowly or quickly for a predetermined amount of time and/or at a predetermined frequency over a period of time. For example, a processor may command a robot to operate on locations with a particular driving surface type, such as hardwood flooring, five times per week. In some embodiments, a user may provide the above-mentioned commands and/or other commands to the robot using an application of a communication device paired with the robot or an interface of the robot.

In some embodiments, the processor of the robot determines an amount of coverage that it may perform in one work session based on previous experiences prior to beginning a task. In some embodiments, this determination may be hard coded. In some embodiments, a user may be presented (e.g., via an application of a communication device) with an option to divide a task between more than one work session if the required task cannot be completed in one work session. In some embodiments, the robot may divide the task between more than one work session if it cannot complete it within a single work session. In some embodiments, the decision of the processor may be random or may be based on previous user selections, previous selections of other users stored in the cloud, a location of the robot, historical cleanliness of areas within which the task is to be performed, historical human activity level of areas within which the task is to be performed, etc. For example, the processor of the robot may decide to perform the portion of the task that falls within its current vicinity in a first work session and then the remaining portion of the task in one or more other work sessions.

In some embodiments, the processor of the robot may determine to empty a bin of the robot into a larger bin after completing a certain square footage of coverage. In some embodiments, a user may select a square footage of coverage after which the robot is to empty its bin into the larger bin. In some cases, the square footage of coverage, after which the robot is to empty its bin, may be determined during manufacturing and built into the robot. In some embodiments, the processor may determine when to empty the bin in real-time based on at least one of: the amount of coverage completed by the robot or a volume of debris within the bin of the robot. In some embodiments, the processor may use Bayesian methods in determining when to empty the bin of the robot, wherein the amount of coverage may be used as a priori information and the volume of debris within the bin as posterior information or vice versa. In other cases, other information may be used. In some embodiments, the processor may predict the square footage that may be covered by the robot before the robot needs to empty the bin based on historical data. In some embodiments, a user may be asked to choose the rooms to be cleaned in a first work session and the rooms to be cleaned in a second work session after the bin is emptied.

A goal of some embodiments may be to reduce power consumption of the robot (or any other device). Reducing power consumption may lead to an increase in possible applications of the robot. For example, certain types of robots, such as robotic steam mops, were previously inapplicable for residential use as the robots were too small to carry the number of battery cells required to satisfy the power consumption needs of the robots. Spending less battery power on processes such as localization, path planning, mapping, control, and communication with other computing devices may allow more energy to be allocated to other processes or actions, such as increased suction power or heating or ultrasound to vaporize water or other fluids. In some embodiments, reducing power consumption of the robot increases the run time of the robot. In some embodiments, a goal may be to minimize the ratio of a time required to recharge the robot to a run time of the robot as it allows tasks to be performed more efficiently. For example, the number of robots required to clean an airport 24 hours a day may decrease as the run time of each robot increases and the time required to recharge each robot decreases as robots may spend more time cleaning and less time on standby while recharging. In some embodiments, the robot may be equipped with a power saving mode to reduce power consumption when a user is not using the robot. In some embodiments, the power saving mode may be implemented using a timer that counts down a set amount of time from when the user last provided an input to the robot. For example, a robot may be configured to enter a sleep mode or another mode that consumes less power than fully operational mode, when a user has not provided an input for five minutes. In some embodiments, a subset of circuitry may enter power saving mode. For example, a wireless module of a device may enter power saving mode when the wireless network is not being used while other modules may still be operational. In some embodiments, the robot may enter power saving mode while the user is using the robot. For example, a robot may enter power saving mode because while reading content on the robot, viewing a movie, or listening to music the user failed to provide an input within a particular time period. In some cases, recovery from the power saving mode may take time and may require the user to enter credentials.

Reducing power consumption may also increase the viability of solar powered robots. Since robots have a limited surface area on which solar panels may be fixed (proportional to the size of the robot), the limited number of solar panels installed may only collect a small amount of energy. In some embodiments, the energy may be saved in a battery cell of the robot and used for performing tasks. While solar panels have improved to provide much larger gain per surface area, economical use of the power gained may lead to better performance. For example, a robot may be efficient enough to run in real time as solar energy is absorbed thereby preventing the robot from having to be remain standby while batteries charge. Solar energy may also be stored for use during times when solar energy is unavailable or during times when solar energy is insufficient. In some cases, the energy may be stored on a smaller battery for later use. To accommodate scenarios wherein minimal solar energy is absorbed or available, it may be important that the robot carry less load and be more efficient. For example, the robot may operate efficiently by positioning itself in an area with increased light when minimal energy is available to the robot. In some embodiments, energy may be transferred wirelessly using a variety of radiative or far-field and non-radiative or near-field techniques. In some embodiments, the robot may use radiofrequencies available in ambiance in addition to solar panels. In some embodiments, the robot may position itself intelligently such that its receiver is optimally positioned in the direction of and to overlap with radiated power. In some embodiments, the robot may be wirelessly charged when parked or while performing a task if processes such as localization, mapping, and path planning require less energy.

In some embodiments, the robot may share its energy wirelessly (or by wire in some cases). For example, the robot may provide wireless charging for smart phones. In another example, there robot may provide wireless charging on the fly for devices of users attending an exhibition with limited number of outlets. In some embodiments, the robot may position itself based on the location of outlets within an environment (e.g., location with lowest density of outlets) or location of devices of users (e.g., location with highest density of electronic devices). In some embodiments, coupled electromagnetic resonators combined with long-lived oscillatory resonant modes may be used to transfer power from a power supply to a power drain.

In embodiments, there may be a trade-off between performance and power consumption. In some embodiments, a large CPU may need a cooling fan for cooling the CPU. In some embodiments, the cooling fan may be used for short durations when really needed. In some embodiments, the processor may autonomously actuate the fan to turn on and turn off (e.g., by executing computer code that effectuates such operations). In some instances, the cooling fan may be undesirable as it requires power to run and extra space and may create an unwanted humming noise. In some embodiments, computer code may be efficient enough to be executed on compact processors of controllers such that there is no need for a cooling fan, thus reducing power consumption.

In some embodiments, the processor may predict energy usage of the robot. In some embodiments, the predicted energy usage of the robot may include estimates of functions that may be performed by the robot over a distance traveled or an area covered by the robot. For example, if a robot is set to perform a steam mop for only a portion of an area, the predicted energy usage may allow for more coverage than the portion covered by the robot. In some embodiments, a predicted need for refueling may be derived from previous work sessions of the robot or from previous work sessions of other robots gathered over time in the cloud. In a point to point application, a user may be presented with a predicted battery charge for distances traveled prior to the robot traveling to a destination. In some embodiments, the user may be presented with possible fueling stations along the path of the robot and may alter the path of the robot by choosing a station for refueling (e.g., using an application or a graphical user interface on the robot). In a coverage application, a user may be presented with a predicted battery charge for different amounts of surface coverage prior to the robot beginning a coverage task. In some embodiments, the user may choose to divide the coverage task into smaller tasks with smaller surface coverage. The user input may be received at the beginning of the session, during the session, or not at all. In some embodiments, inputs provided by a user may change the behavior of the robot for the remaining of a work session or subsequent work sessions. In some embodiments, the user may identify whether a setting is to be applied one-time or permanently. In some embodiments, the processor may choose to allow a modification to take affect during a current work session, for a period of time, a number of work sessions, or permanently. In some embodiments, the processor may divide the coverage task into smaller tasks based on a set of cost functions.

In embodiments, the path plan in a point to point application may include a starting point and an ending point. In embodiments, the path plan in a coverage application may include a starting surface and an ending surface, such as rooms, or parts of rooms, or parts of areas defined by a user or by the processor of the robot. In some embodiments, the path plan may include addition information. For example, for a garden watering robot, the path plan may additionally consider the amount of water in a tank of the robot. The user may be prompted to divide the path plan into two or more path plans with a water refilling session planned in between. The user may also need to divide the path plan based on battery consumption and may need to designate a recharging session. In another example, the path plan of a robot that charges other robots (e.g., robots depleted of charge in the middle of an operation) may consider the amount of battery charge the robot may provide to other robots after deducting the power needed to travel to the destination and the closest charging points for itself. The robot may provide battery charge to other robots through a connection or wirelessly. In another example, the path plan of a fruit picking robot may consider the number of trees the robot may service before a fruit container is full and battery charge. In one example, the path plan of a fertilizer dispensing robot may consider the amount of surface area a particular amount of fertilizer may cover and fuel levels. A fertilizing task may be divided into multiple work sessions with one or more fertilizer refilling sessions and one or more refueling sessions in between.

In some embodiments, the processor of the robot may transmit information that may be used to identify problems the robot has faced or is currently facing. In some embodiments, the information may be used by customer service to troubleshoot problems and to improve the robot. In some embodiments, the information may be sent to the cloud and processed further. In some embodiments, the information may be categorized as a type of issue and processed after being sent the cloud. In some embodiments, fixes may be prioritized based on a rate of occurrence of the particular issue. In some embodiments, transmission of the information may allow for over the air updates and solutions. In some embodiments, an automatic customer support ticket may be opened when the robot faces an issue. In some embodiments, a proactive action may be taken to resolve the issue. For example, if a consumable part of the robot is facing an issue before the anticipated life time of the part, detection of the issue may trigger an automatic shipment request of the part to the customer. In some embodiments, a notification to the customer may be triggered and the part may be shipped at a later time.

In some embodiments, a subsystem of the robot may manage issues the robot faces. In some embodiments, the subsystem may be a trouble manager. For example, a trouble manager may report issues such as a disconnected RF communication channel or cloud. This information may be used for further troubleshooting, while in some embodiments, continuous attempts may be made to reconnect with the expected service. In some embodiments, the trouble manager may report when the connection is restored. In some embodiments, such actions may be logged by the trouble manager. In some embodiments, the trouble manager may report when a hardware component is broken. For example, a trouble manager may report when a charger integrated circuit is broken.

In some embodiments, a battery monitoring subsystem may continuously monitor a voltage of a battery of the robot. In some embodiments, a voltage drops triggers an event that instructs the robot to go back to a charging station to recharge. In some embodiments, a last location of the robot and areas covered by the robot are saved such that the robot may continue to work from where it left off. In some embodiments, the processor of the robot may determine a remaining amount of area to be cleaned by the robot when the battery power is below a predetermined amount. In some embodiments, the processor of the robot or the battery monitoring subsystem may determine a required amount of battery power needed to finish cleaning the remaining amount of area to be cleaned. In some embodiments, the robot may navigate to the charging station, charge its batteries up to the required amount of battery power needed to finish cleaning the remaining amount of area to be cleaned, and then, resume cleaning. In some embodiments, back to back cleaning many be implemented. In some embodiments, back to back cleaning may occur during a special time. In some embodiments, the robot may charge its batteries up to a particular battery charge level that is required to finish an incomplete task instead of waiting for a full charge. In some embodiments, the second derivative of sequential battery voltage measurements may be monitored to discover if the battery is losing power faster than ordinary. In some embodiments, further processing may occur on the cloud to determine if there are certain production batches of batteries or other hardware that show fault. In such cases, fixes may be proactively announced or implemented.

In some embodiments, the processor of the robot may determine a location and direction of the robot with respect to a charging station of the robot by emitting two or more different IR codes using different presence LEDs. In some embodiments, a processor of the charging station may be able to recognize the different codes and may report the receiving codes to the processor of the robot using RF communication. In some embodiments, the codes may be emitted by Time Division Multiple Access (i.e., different IR emits codes one by one). In some embodiments, the codes may be emitted based on the concept of pulse distance modulation. In some embodiments, various protocols, such as NEC IR protocol, used in transmitting IR codes in remote controls, may be used. Standard protocols such as NEC IR protocol may not be optimal for all applications. For example, each code may contain an 8 bits command and an 8 bits address giving a total of 16 bits, which may provide 65536 different combinations. This may require 108 ms and if all codes are transmitted at once 324 ms may be required. In some embodiments, each code length may be 18 pulses of 0 or 1. In some embodiments, two extra pulses may be used for the charging station MCU to handle the code and transfer the code to the robot using RF communication. In some embodiments, each code may have 4 header high pulses and each code length may be 18 pulses (e.g., each with a value of 0 or 1) and two stop pulses (e.g., with a value of 0). In some embodiments, a proprietary protocol may be used, including a frequency of 56 KHz, a duty cycle of 1/3, 2 code bits, and the following code format: Header High: 4 high pulses, i.e., {1, 1, 1, 1}; Header Low: 2 low pulses, i.e., {0, 0}; Data: logic'0' is 1 high pulse followed by 1 low pulse; logic '1' is 1 high pulse followed by 3 low pulses; After data, follow by Logic inverse(2'scomplementary); End: 2 low pulses, i.e., {0, 0}, to let the charging station have enough time to handle the code. An example using a code 00 includes: {/Header High/1, 1, 1, 1; /Header Low/0, 0; /Logic'0'/1, 0; /Logic'0'/1, 0; /Logic'1','1',2's complementary/1, 0, 0, 0, 1, 0, 0, 0; /End/0, 0}. In some embodiments, the pulse time may be a fixed value. For example, in a NEC protocol, each pulse duration may be 560 us. In some embodiments, the pulse time may be dynamic. For example, a function may provide the pulse time (e.g., cBitPulseLengthUs).

In some embodiments, permutations of possible code words may be organized in an 'enum' data structure. In one implementation, there may be eight code words in the enum data structure arranged in the following order: No Code, Code Left, Code Right, Code Front, Code Side, Code Side Left, Code Side Right, Code All. Other number of code words may be defined as needed in other implementations. Code Left may be associated with observations by a front left presence LED, Code Right may be associated with observations by a front right presence LED, Code Front may be associated with observations by front left and front right presence LEDs, Code Side may be associated with observations by any, some, or all side LEDs, and Code Side Left may be associated with observations by front left and side presence LEDs. In some embodiments, there may be four receiver LEDs on the dock that may be referred to as Middle Left, Middle Right, Side Left, and Side Right. In other embodiments, one or more receivers may be used.

In some embodiments, the processor of the robot may define a default constructor, a constructor given initial values, and a copy constructor for proper initialization and a de-constructor. In some embodiments, the processor may execute a series of Boolean checks using a series of functions. For example, the processor may execute a function 'isFront' with a Boolean return value to check if the robot is in front of and facing the charging station, regardless of distance. In another example, the processor may execute a function 'isNearFront' to check if the robot is near to the front of and facing the charging station. In another example, the processor may execute a function 'isFarFront' to check if the robot is far from the front of and facing the charging station. In another example, the processor may execute a function 'isInSight' to check if any signal may be observed. In other embodiments, other protocols may be used. A person of the art will know how to advantageously implement other possibilities. In some embodiments, inline functions may be used to increase performance.

In some embodiments, data may be transmitted in a medium such as bits, each comprised of a zero or one. In some embodiments, the processor of the robot may use entropy to quantify the average amount of information or surprise (or unpredictability) associated with the transmitted data. For example, if compression of data is lossless, wherein the entire original message transmitted can be recovered entirely by decompression, the compressed data has the same quantity of information but is communicated in fewer characters. In such cases, there is more information per character, and hence higher entropy. In some embodiments, the processor may use Shannon's entropy to quantify an amount of information in a medium. In some embodiments, the processor may use Shannon's entropy in processing, storage, transmission of data, or manipulation of the data. For example, the processor may use Shannon's entropy to quantify the absolute minimum amount of storage and transmission needed for transmitting, computing, or storing any information and to compare and identify different possible ways of representing the information in fewer number of bits. In some embodiments, the processor may determine entropy using $H(X)=E[-\log_2 p(x_i)]$, $H(X)=-\int p(x_i) \log_2 p(x_i) dx$ in a continuous form, or $H(X)=-\Sigma_i p(x_i) \log_2 p(x_i)$ in a discrete form, wherein $H(X)$ is Shannon's entropy of random variable X with possible outcomes $x_i$ and $p(x_i)$ is the probability of $x_i$ occurring. In the discrete case, $-\log_2 p(x)$ is the number of bits required to encode $x_i$.

Considering that information may be correlated with probability and a quantum state is described in terms of probabilities, a quantum state may be used as carrier of information. Just as in Shannon's entropy, a bit may carry two states, zero and one. A bit is a physical variable that stores or carries information, but in an abstract definition may be used to describe information itself. In a device consisting of N independent two-state memory units (e.g., a bit that can take on a value of zero or one), N bits of information may be stored and $2^N$ possible configurations of the bits exist. Additionally, the maximum information content is $\log_2(2^N)$. Maximum entropy occurs when all possible states (or outcomes) have an equal chance of occurring as there is no state with higher probability of occurring and hence more uncertainty and disorder. In some embodiments, the processor may determine the entropy using $H(X)=-\Sigma_{i=1}^{w} p_i \log_2 p_i$, wherein $p_i$ is the probability of occurrence of the $i^{th}$ state of a total of w states. If a second source is indicative of which state (or states) i is more probable, then the overall uncertainty and hence entropy reduces. The processor may then determine the conditional entropy H(X|second source). For example, if the entropy is determined based on possible states of the robot and the probability of each state is equivalent, then the entropy is high as is the uncertainty. However, if new observations and motion of the robot are indicative of which state is more probable, then the uncertainty and entropy are reduced. In such as example, the processor may determine conditional entropy H(X|new observation and motion). In some embodiments, information gain may be the outcome and/or purpose of the process.

Depending on the application, information gain may be the goal of the robot. In some embodiments, the processor may determine the information gain using $IG=H(X)-H(X|Y)$, wherein $H(X)$ is the entropy of X and $H(X|Y)$ is the entropy of X given the additional information Y about X. In some embodiments, the processor may determine which second source of information about X provides the most information gain. For example, in a cleaning task, the robot may be required to do an initial mapping of all of the environment or as much of the environment as possible in a first run. In subsequent runs the processor may use that the initial mapping as a frame of reference while still executing mapping for information gain. In some embodiments, the processor may compute a cost r of navigation control u taking the robot from a state x to x'. In some embodiments, the processor may employ a greedy information system using argmax $a=(H_p(x)-E_z[H_b(x'|z, u))+\int r(x, u)b(x)dx$, wherein $\alpha$ is the cost the processor is willing to pay to gain information, $(H_p(x)-E_z[H_b(x'|z, u))$ is the expected information gain and $\int r(x, u)b(x)dx$ is the cost of information. In some cases, it may not be ideal to maximize this function. For example, the processor of a robot exploring as it performs works may only pay a cost for information when the robot is running in known areas. In some cases, the processor may never need to run an exploration operation as the processor gains information as the robot works (e.g., mapping while performing work). However, it may be beneficial for the processor to initiate an exploration operation at the end of a session to find what is beyond some gaps.

In some embodiments, the processor may store a bit of information in any two-level quantum system as basis states in a Hilbert space given by space vectors $|0\rangle$ and $|1\rangle$. For a physical interpretation of the Hilbert space, the Hilbert space may be reduced to a subset that may be defined and modified as necessary. In some embodiments, the superposition of the two basis vectors may allow a continuum of pure states, $|\Psi\rangle = c_0|0\rangle + c_1|1\rangle$, wherein $c_0$ and $c_1$ are complex coefficients satisfying the condition $|c_0|^2+|c_1|^2=1$. In embodiments, a two dimensional Hilbert space is isomorphic and may be understood as a state of a spin $$\text{spin} - \frac{1}{2}$$

system, $$o = \frac{1}{2}(1 + \lambda \cdot \sigma).$$

In embodiments, the processor may define the basis vectors $|0\rangle$ and $|1\rangle$ as spin up and spin own eigenvectors of $\sigma_z$ and $\sigma$ matrices, which are defined by the same underlying mathematics as spin up and spin down eigenvectors. Measuring the component a in any chosen direction results in exactly one bit of information with the value of either zero or one. Consequently, the processor may formalize all information gains using the quantum method and the quantum method may in turn be reduced to classical entropy.

In embodiments, it may be advantageous to avoid processing empty bits without much information or that hold information that is obvious or redundant. In embodiments, the bits carrying information that are unobvious or are not highly probable within a particular context may be the most important bits. In addition to data processing, this also pertains to data storage and data transmission. For example, a flash memory may store information as zeroes and ones and may have N memory spaces, each space capable of registering two states. The flash memory may store $W=2^N$ distinct states, and therefore, the flash memory may store W possible messages. Given the probability of occurrence $P_i$ of the state i, the processor may determine the Shannon entropy $H=-\Sigma_{i+1}{}^{W} P_i \log_2 P_i$. The Shannon entropy may indicate the amount of uncertainty in which of the states in W may occur. Subsequent observation may reduce the level of uncertainty and subsequent measurements may not have equal probability of occurrence. The final entropy may be smaller than the initial entropy as more measurements were taken. In some embodiments, the processor may determine the average information gain I as the difference between the initial entropy and the final entropy $I=H_{initial}-H_{final}$. For the final state, wherein measurement reveals a message that is fully predictable, because all but one of the last message possibilities are ruled out, the probability of the state is one and the probability of all other states is zero. This may be synonymous to a card game with two decks, the first deck being dealt out to players and the second deck used to choose and eliminate cards one by one. Players may bet on one of their cards matching the next chosen card from the second deck. As more cards are eliminated, players may increase their bets as there is a higher chance that they hold a card matching the next chosen card from the second deck. The next chosen card may be unexpected and improbable and therefore correlates to a small probability $P_i$. The next chosen card determines the winner of the current round and is therefore considered to carry a lot of information. In another example, a bit of information may store the state of an on/off light switch or may store a value indicating the presence/lack of electricity, wherein on and off or presence of electricity and lack of electricity may be represented by a logical value of zero and one, respectively. In reality, the logical value of zero and one may actually indicate +5V and 0V or +5V and −5V or +3V and +5V or +12V and +5V, etc.

Figure 226A:
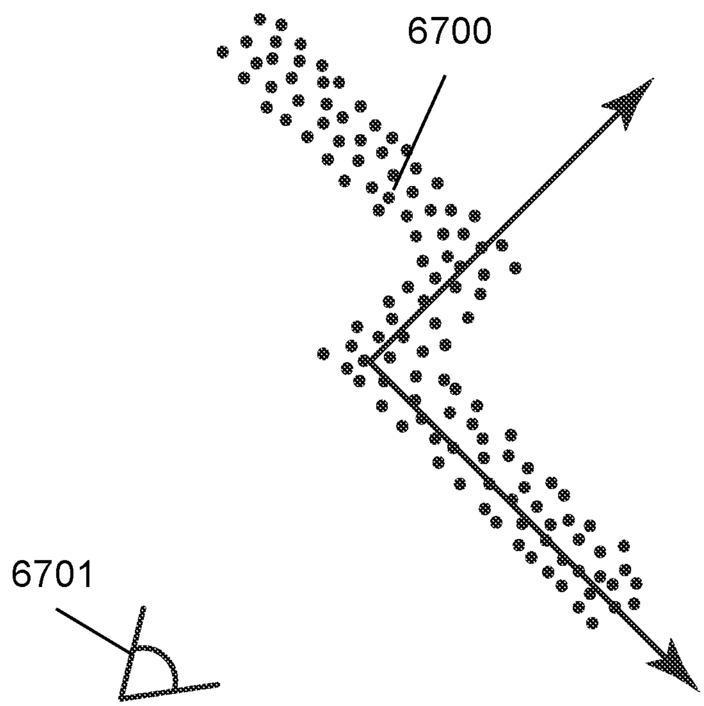
Figure 226B:
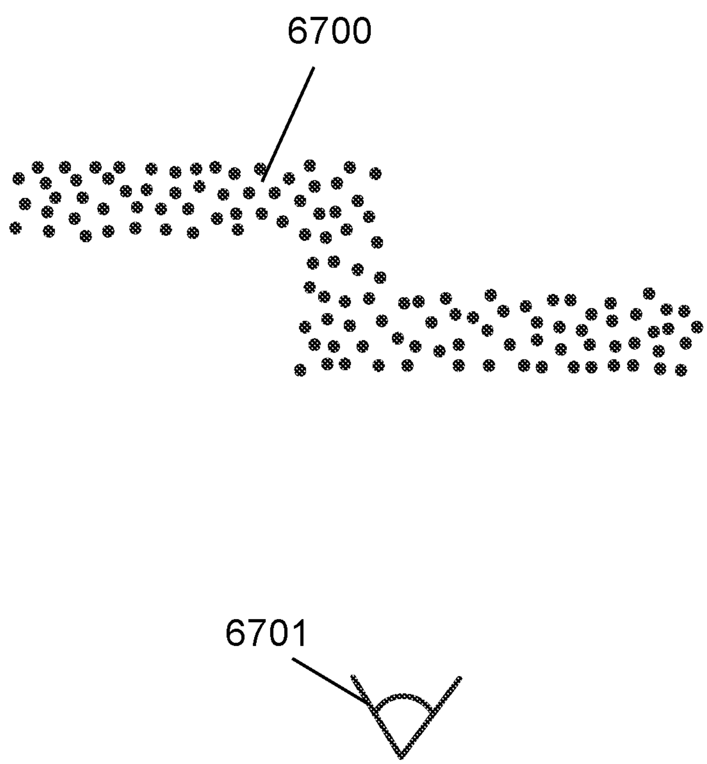
Figure 226C:
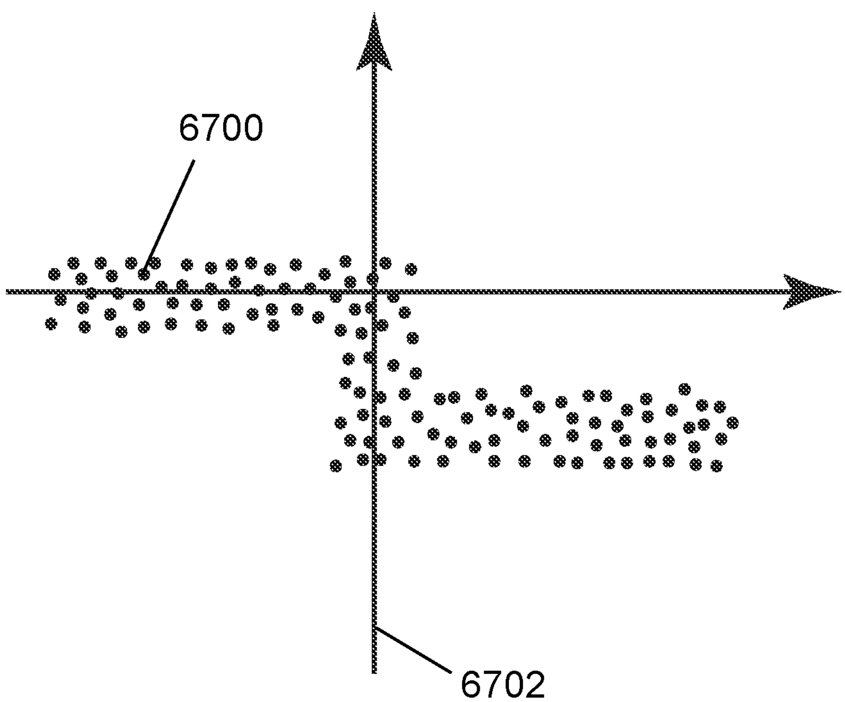
Figure 226D:
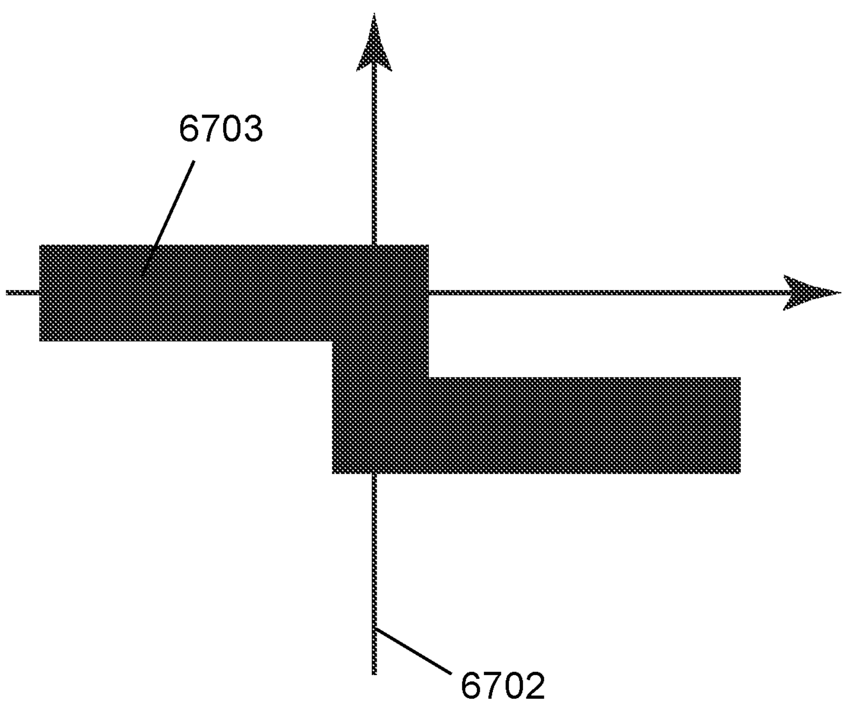

In some embodiments, the processor may increase information by using unsupervised transformations of datasets to create a new representation of data. These methods are usually used to make data more presentable to a human listener. For example, it may be easier for a human to visualize two-dimensional data instead of three- or four-dimensional data. These methods may also be used by processors of robots to help in inferring information, increasing their information gain by dimensionality reduction, or saving computational power. For example, FIG. 226A illustrates two-dimensional data 6700 observed in a field of view 6701 of a robot. FIG. 226B illustrates rotation of the data 6700. FIG. 226C illustrates the data 6700 in Cartesian coordinate system 6702. FIG. 226D illustrates the building blocks 6703 extracted from the data 6700 and plotted to represent the data 6700 in Cartesian coordinate system 6702. In FIGS. 226A-226D, the data 6700 was decomposed into a weighted sum of its building blocks 6702. This may similarly be applied to an image. One example of this process is principle of component analysis, wherein the extracted components are orthogonal. Another example of the process is non-negative matric factorization, wherein the components and coefficient are desired to be non-negative. Other possibilities are manifold learning algorithms. For example, t-distributed stochastic neighbor embedding finds a two-dimensional representation of the data that preserves the distances between points as best as possible.

Avoiding bits without much information or with useless information is also important in data transmission (e.g., over a network) and data processing. For example, during relocalization a camera of the robot may capture local images and the processor may attempt to locate the robot within the state-space by searching the known map to find a pattern similar to its current observation. As the processor tries to match various possibilities within the state space, and as possibilities are ruled out from matching with the current observation, the information value of the remaining states increases. In another example, a linear search may be executed using an algorithm to search from a given element within an array of n elements. Each state space containing a series of observations may be labeled with a number, resulting in array={100001, 101001, 110001, 101000, 100010, 10001, 10001001, 10001001, 100001010, 100001011}. The algorithm may search for the observation 100001010, which in this case is the ninth element in the array, denoted as index 8 in most software languages such as C or C++. The algorithm may begin from the leftmost element of the array and compare the observation with each element of the array. When the observation matches with an element, the algorithm may return the index. If the observation doesn't match with any elements of the array the algorithm may return a value of −1. As the algorithm iterates through indexes of the array, that value of each iteration progressively increases as there is a higher probability that the iteration will yield a search result. For the last index of the array, the search may be deterministic and return the result of the observed state not being existent within the array. In various searches the value of information may decrease and increase differently. For example, in a binary search, an algorithm may search a sorted array by repeatedly dividing the search interval in half. The algorithm may begin with an interval including the entire array. If the value of the search key is less than the element in the middle of the interval, the algorithm may narrow the interval to the lower half. Otherwise, the algorithm may narrow the interval to the upper half. The algorithm may continue to iterate until the value is found or the interval is empty. In some cases, an exponential search may be used, wherein an algorithm may find a range of the array within which the element may be present and execute a binary search within the found range. In one example, an interpolation search may be used, as in some instances it may be an improvement over a binary search. In an interpolation search the values in a sorted array are uniformly distributed. In binary search the search is always directed to the middle element of the array whereas in an interpolation search the search may be directed to different sections of the array based on the value of the search key. For instance, if the value of the search key is close to the value of the last element of the array, the interpolation search may be likely to start searching the elements contained within the end section of the array. In some cases, a Fibonacci search may be used, wherein the comparison-based technique may use Fibonacci numbers to search an element within a sorted array. In a Fibonacci search an array may be divided in unequal parts, whereas in a binary search the division operator may be used to divide the range of the array within which the search is performed. A Fibonacci search may be advantageous as the division operator is not used, but rather addition and subtraction operators, and the division operator may be costly on some CPUs. A Fibonacci search may also be useful when a large array cannot fit within the CPU cache or RAM as the search examines elements positioned relatively close to one another in subsequent steps. An algorithm may execute a Fibonacci search by finding the smallest Fibonacci number m that is greater than or equal to the length of the array. The algorithm may then use m−2 Fibonacci number as the index i and compare the value of the index i of the array with the search key. If the value of the search key matches the value of the index i, the algorithm may return i. If the value of the search key is greater than the value of the index i, the algorithm may repeat the search for the subarray after the index i. If the value of the search key is less than the value of the index i, the algorithm may repeat the search for the subarray before the index i.

The rate at which the value of a subsequent search iteration increases or decreases may be different for different types of search techniques. For example, a search that may eliminate half of the possibilities that may match the search key in a current iteration may increases the value of the next search iteration much more than if the current iteration only eliminated one possibility that may match the search key. In some embodiments, the processor may use combinatorial optimization to find an optimal object from a finite set of objects as in some cases exhaustive search algorithms may not be tractable. A combinatorial optimization problem may be a quadruple including a set of instances I, a finite set of feasible solutions $f(x)$ given an instance $x \in I$, a measure $m(x, y)$ of a feasible solution y of x given the instance x, and a goal function g (either a min or max). The processor may find an optimal feasible solution y for some instance x using $m(x, y)=g\{m(x, y') | y' \in f(x)\}$. There may be a corresponding decision problem for each combinatorial optimization problem that may determine if there is a feasible solution from some particular measure $m_0$. For example, a combinatorial optimization problem may find a path with the fewest edges from vertex u to vertex v of a graph G. The answer may be six edges. A corresponding decision problem may inquire if there is a path from u to v that uses fewer than either edges and the answer may be given by yes or no. In some embodiments, the processor may use nondeterministic polynomial time optimization (NP-optimization), similar to combinatorial optimization but with additional conditions, wherein the size of every feasible solution $y \in f(x)$ is polynomially bounded in the size of the given instance x, the languages $\{x | x \in I\}$ and $\{(x, y) | y \in f(x)\}$ are recognized in polynomial time, and m is polynomial-time computed. In embodiments, the polynomials are functions of the size of the respective functions' inputs and the corresponding decision problem is in NP. In embodiments, NP may be the class of decision problems that may be solved in polynomial time by a non-deterministic Turing machine. With NP-optimization, optimization problems for which the decision problem is NP-complete may be desirable. In embodiments, NP-complete may be the intersection of NP and NP-hard, wherein NP-hard may be the class of decision problems to which all problem in NP may be reduced to in polynomial time by a deterministic Turing machine. In embodiments, hardness relations may be with respect to some reduction. In some cases, reductions that preserve approximation in some respect, such as L-reduction, may be preferred over usual Turing and Karp reductions.

In some embodiments, the processor may increase the value of information by eliminating blank spaces. In some embodiments, the processor may use coordinate compression to eliminate gaps or blank spaces. This may be important when using coordinates as indices into an array as entries may be wasted space when blank or empty. For example, a grid of squares may include H horizontal rows and V vertical columns and each square may be given by the index (i, j) representing row and column, respectively. A corresponding H×W matrix may provide the color of each square, wherein a value of zero indicates the square is white and a value of one indicates the square is black. To eliminate all rows and columns that only consist of white squares, assuming they provide no valuable information, the processor may iteratively choose any row or column consisting of only white squares, remove the row or column and delete the space between the rows or columns. In another example, a large N×N grid of squares can each either be traversed or is blocked. The N×N grid includes M obstacles, each shaped as a 1×k or k×1 strip of grid squares and each obstacle is specified by two endpoints $(a_i, b_i)$ and $(c_i, d_i)$, wherein $a_i=c_i$ or $b_i=d_i$. A square that is traversable may have a value of zero while a square blocked by an obstacle may have a value of one. Assuming that $N=10^9$ and M=100, the processor may determine how many squares are reachable from a starting square (x, y) without traversing obstacles by compressing the grid. Most rows are duplicates and the only time a row R differs from a next row R+1 is if an obstacle starts or ends on the row R or R+1. This only occurs ~100 times as there are only 100 obstacles. The processor may therefore identify the rows in which an obstacle starts or ends and given that all other rows are duplicates of these rows, the processor may compress the grid down to ~100 rows. The processor may apply the same approach for columns C, such that the grid may be compressed down to ~100×100. The processor may then run a breadth-first search (BFS) and expand the grid again to obtain the answer. In the case where the rows of interest are 0 (top), R−1 (bottom), $a_i-1$, $a_i$, $a_i+1$ (rows around obstacle start), and $c_i-1$, $c_i$, $c_i+1$ (rows around obstacle end), there may be at most 602 identified rows. The processor may sort the identified rows from low to high and remove the gaps to compress the grid. For each of the identified rows the processor may record the size of the gap below the row, as it is the number of rows it represents, which is needed to later expand the grid again and obtain an answer. The same process may be repeated for columns C to achieve a compressed grid with maximum size of 602×602. The processor may execute a BFS on the compressed grid. Each visited square (R, C) counts R x C times. The processor may determine the number of squares that are reachable by adding up the value for each cell reached. In another example, the processor may find the volume of the union of N axis-aligned boxes in three dimensions ($1 \leq N \leq 100$). Coordinates may be arbitrary real numbers between 0 and $10^9$. The processor may compress the coordinates, resulting in all coordinates lying between 0 and 199 as each box has two coordinated along each dimension. In the compressed coordinate system, the unit cube [x, x+1]×[y, y+1]×[z, z+1] may be either completely full or empty as the coordinates of each box are integers. Therefore, the processor may determine a 200×200×200 array, wherein an entry is one if the corresponding unit cube is full and zero if the unit cube is empty. The processor may determine the array by forming the difference array then integrating. The processor may then iterate through each filled cube, map it back to the original coordinates, and add its volume to the total volume. Other methods than those provided in the examples herein may be used to remove gaps or blank spaces.

In some embodiments, the processor may use run-length encoding (RLE), a form of lossless data compression, to store runs of data (consecutive data elements with the same data value) as a single data value and count instead of the original run. For example, an image containing only black and white may have many long runs of white pixels and many short runs of black pixels. A single row in the image may include 67 characters, each of the characters having a value of 0 or 1 to represent either a white or black pixel. However, using RLE the single row of 67 characters may be represented by 12W1B12W3B24W1B14W, only 18 characters which may be interpreted as a sequence of 12 white pixels, 1 black pixel, 12 white pixels, 3 black pixels, 24 white pixels, 1 black pixel, and 14 white pixels. In embodiments, RLE may be expressed in various ways depending on the data properties and compression algorithms used. For instance, elements used in representing images that are stored in memory or processed are usually larger than a byte. An element representing an RGB color pixel may be a 32 bit integer value (=4 bytes) or a 32 bit word. In embodiments, the 32 bit elements forming an image may be stored or transmitted in different ways and in different orders. To correctly recreate the original color pixel, the processor must assemble the 32 bit elements back in the correct order. When the arrangement is in order of most significant byte to least significant byte, the ordering is known as big endian, and when ordered in the opposite direction, the ordering is known as little endian. In some embodiments, the processor may use run length encoding (RLE), wherein sequences of adjacent pixels may be represented compactly as a run. A run, or contiguous block, is a maximal length sequence of adjacent pixels of the same type within either a row or a column. In embodiments, the processor may encode runs of arbitrary length compactly using three integers, wherein Run_i=(row_i,column_i,length_i). When representing a sequence of runs within the same row, the number of the row is redundant and may be left out. Also, in some applications, it may be more useful to record the coordinate of the end column instead of the length of the run. For example, the image in FIG. 227A may be stored in a file with editable text, such as that shown in FIG. 227B. P2 in the first line may indicate that the image is plain PBM in human readable text, 10 and 6 in the second line may indicate the number of columns and the number of rows (i.e., image dimensions), respectively, 255 in the third line may indicate the maximum pixel value for the color depth, and the # in the last line may indicate the start of a comment. Lines 4-9 are a 6×10 matrix corresponding with the image dimensions in FIG. 227A, wherein the value of each entry of the matrix is the pixel value. In some cases, the image in FIG. 227A may be represented with only possible values for color depth as 0 and 1, as illustrated in FIG. 227C. Then, the matrix in FIG. 227C may be represented using runs <4, 8, 3>, <5, 9, 1>, and <6, 10, 3>. According to information theory, representing the image in this way increases the value of each bit.

In some instances, the environment includes multiple robots, humans, and items that are freely moving around. As robots, humans, and items move around the environment, the spatial representation of the environment (e.g., a point cloud version of reality) as seen by the robot changes. In some embodiments, the change in the spatial representation (i.e., the current reality corresponding with the state of now) may be communicated to processors of other robots. In some embodiments, the camera of the wearable device may capture images (e.g., a stream of images) or videos as the user moves within the environment. In some embodiments, the processor of the wearable device or another processor may overlay the current observations of the camera with the latest state of the spatial representation as seen by the robot to localize. In some embodiments, the processor of the wearable device may contribute to the state of the spatial representation upon observing changes in environment. In some cases, with directional and non-directional microphones on all or some robots, humans, items, and/or electronic devices (e.g., cell phones, smart watches, etc.) localization against the source of voice may be more realistic and may add confidence to a Bayesian inference architecture.

Figure 228A:
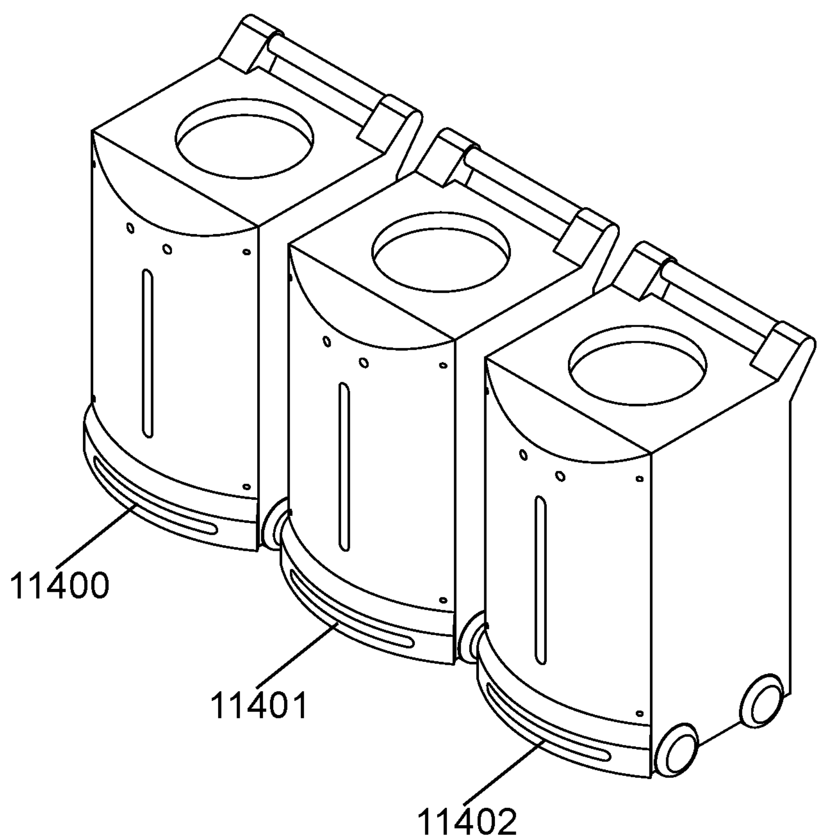
Figure 228B:
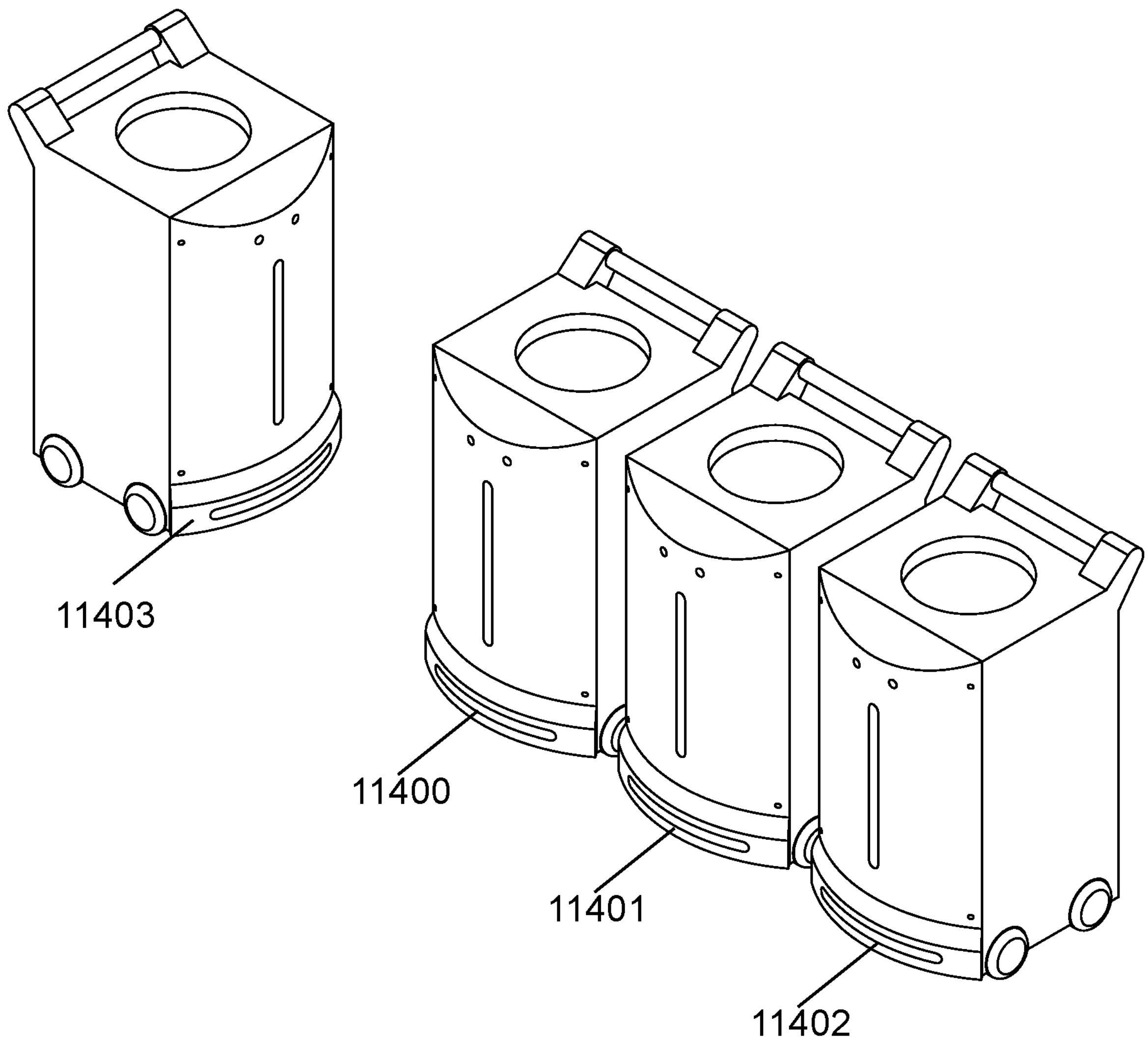
Figure 228C:
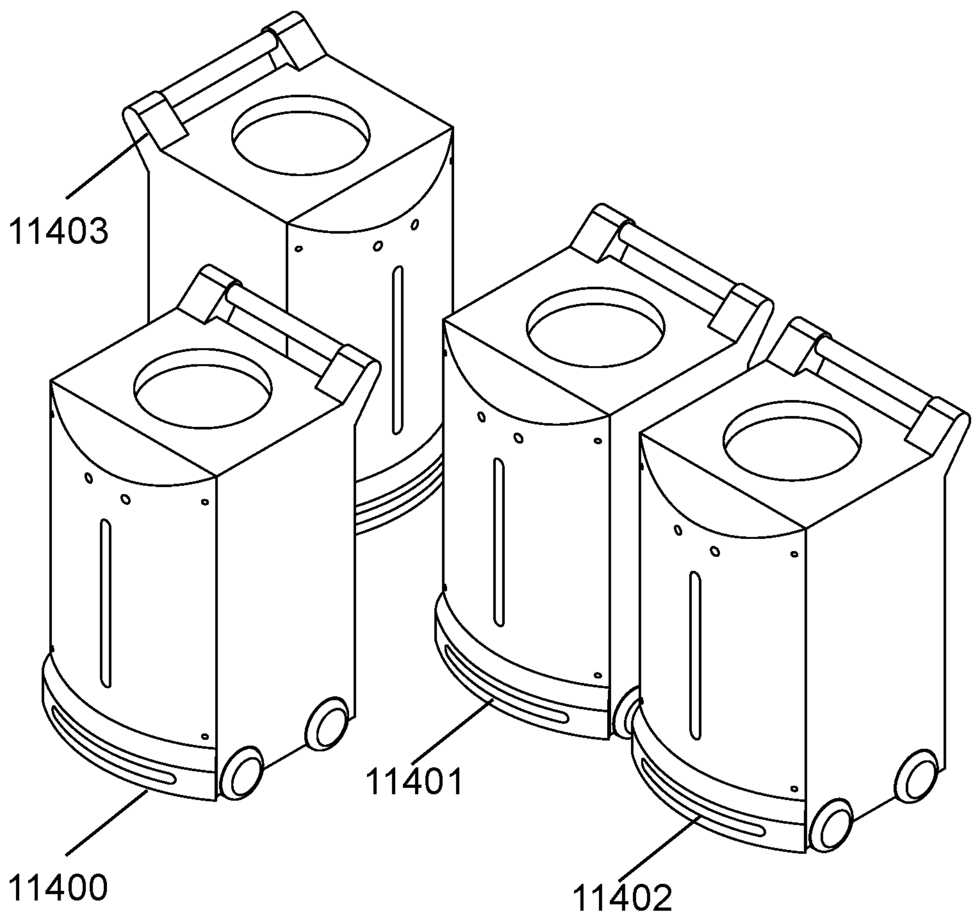
Figure 228D:
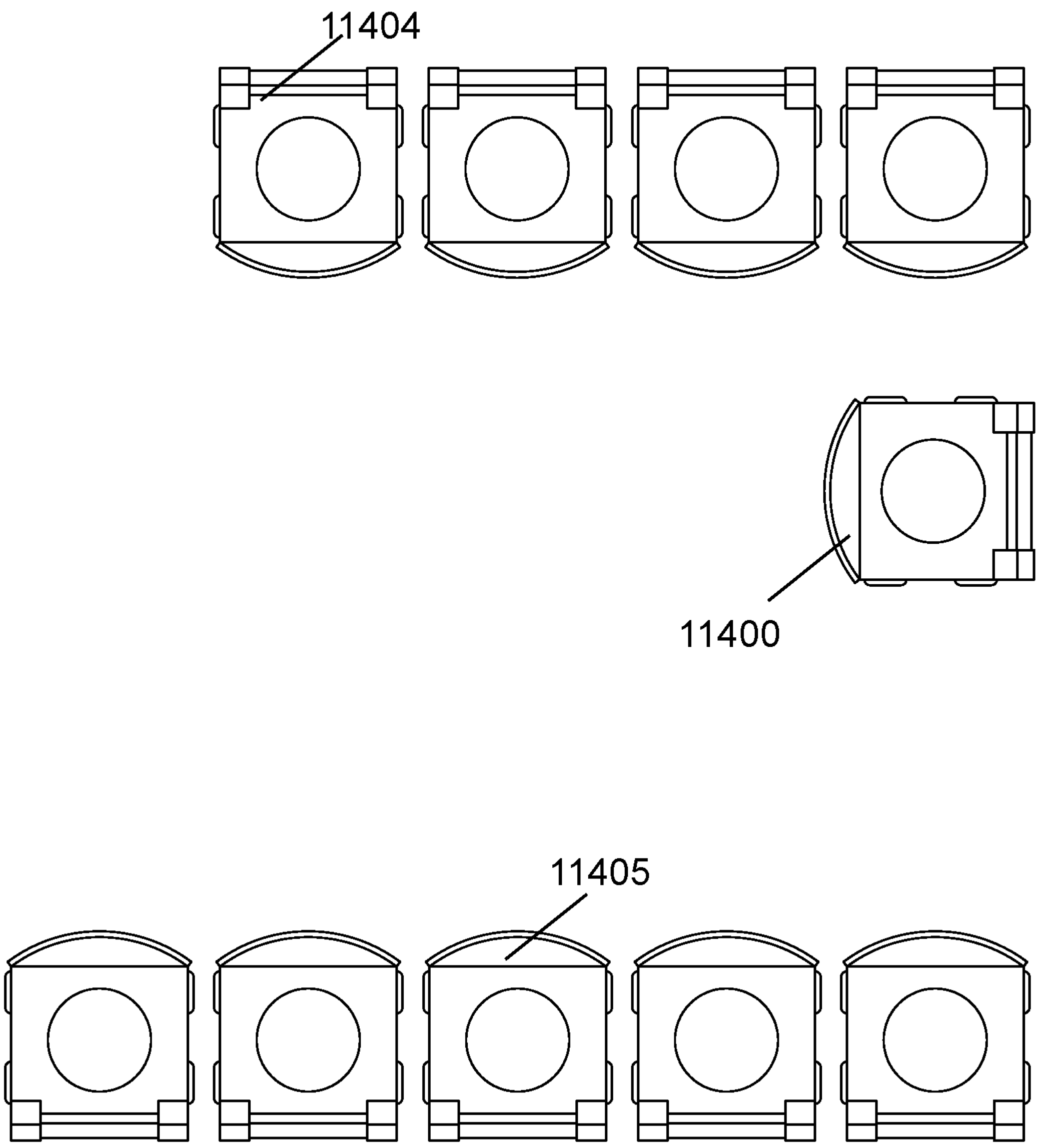

In some embodiments, the robot may collaborate with the other intelligent devices within the environment. In some embodiments, data acquired by other intelligent devices may be shared with the robot and vice versa. For example, a user may verbally command a robot positioned in a different room than the user to bring the user a phone charger. A home assistant device located within the same room as the user may identify a location of the user using artificial intelligence methods and may share this information with the robot. The robot may obtain the information and devise a path to perform the requested task. In some embodiments, the robot may collaborate with one or more other robot to complete a task. For example, two robots, such as a robotic vacuum and a robotic mop collaborate to clean an area simultaneously or one after the other. In some embodiments, the processors of collaborating robots may share information and devise a plan for completing the task. In some embodiments, the processors of robots collaborate by exchanging intelligence with one other, the information relating to, for example, current and upcoming tasks, completion or progress of tasks (particularly in cases where a task is shared), delegation of duties, preferences of a user, environmental conditions (e.g., road conditions, traffic conditions, weather conditions, obstacle density, debris accumulation, etc.), battery power, maps of the environment, and the like. For example, a processor of a robot may transmit obstacle density information to processors of nearby robots with whom a connection has been established such that the nearby robots can avoid the high obstacle density area. In another example, a processor of a robot unable to complete garbage pickup of an area due to low battery level communicates with a processor of another nearby robot capable of performing garbage pickup, providing the robot with current progress of the task and a map of the area such that it may complete the task. In some embodiments, processors of robots may exchange intelligence relating to the environment (e.g., environmental sensor data) or results of historical actions such that individual processors can optimize actions at a faster rate. In some embodiments, processors of robots collaborate to complete a task. In some embodiments, robots collaborate using methods such as those described in U.S. patent application Ser. Nos. 15/981,643, 16/747,334, 15/986,670, 16/568,367, 16/418,988, 14/948,620, 15/048,827, and 16/402,122, the entire contents of which are hereby incorporated by reference. In some embodiments, a control system may manage the robot or a group of collaborating robots. For example, FIG. 228A illustrates a collaborating trash bin robots 11400, 11401, and 11402. Trash bin robot 11400 transmits a signal to a control system indicating that its bin is full and requesting another bin to replace its position. The control system may deploy an empty trash bin robot to replace the position of full trash bin robot 11400. In other instances, processors of robots may collaborate to determine replacement of trash bin robots. FIG. 228B illustrates empty trash bin robot 11403 approaching full trash bin robot 11400. Processors of trash bin robot 11403 and 11400 may communicate to coordinate the swapping of their positions, as illustrated in FIG. 228C, wherein trash bin robot 11400 drives forward while trash bin robot 11403 takes its place. FIG. 228D illustrates full trash bin robot 11400 driving into a storage area for full trash bin robots 11404 ready for emptying and cleaning and empty trash bin robots 11405 ready for deployment to a particular position. Full trash bin robot 11400 parks itself with other full trash bin robots 11404. Details of a control system that may be used for managing robots is disclosed in U.S. patent application Ser. Nos. 16/130,880 and 16/245,998, the entire contents of which is hereby incorporated by reference.

In some embodiments, processors of robots may transmit maps, trajectories, and commands to one another. In some embodiments, a processor of a first robot may transmit a planned trajectory to be executed within a map previously sent to a processor of a second robot. In some embodiments, processors of robot may transmit a command, before or after executing a trajectory, to one another. For example, a first robot vehicle may inform an approaching second robot vehicle that it is planning to back out and leave a parallel parking space. It may be up to the second robot vehicle to decide what action to take. The second robot vehicle may decide to wait, drive around the first robot vehicle, accelerate, or instruct the first robot vehicle to stop. In some embodiments, a processor of a first robot may inform a processor of a second robot that it has completed a task and may command the second robot to begin a task. In some embodiments, a processor of a first robot may instruct a processor of a second robot to perform a task while following a trajectory of the first robot or may inform the processor of the first robot of a trajectory which may trigger the second robot to follow the trajectory of the first robot while performing a task. For example, a processor of a first robot may inform a processor of a second robot of a trajectory for execution while pouring asphalt and in response the second robot may follow the trajectory. In some embodiments, processors of robots may transmit current, upcoming, or completed tasks to one another, which, in some cases, may trigger an action upon receipt of a task update of another robot. For example, a processor of a first robot may inform a processor of a second robot of an upcoming task of cleaning an area of a first type of airline counter and the processor of the second robot may decide to clean an area of another type of airline counter, such that the cleaning job of all airline counters may be divided. In some embodiments, processors of robot may inform one another after completing a trajectory or task, which, in some cases, may trigger another robot to begin a task. For example, a first robot may inform a home assistant that it has completed a cleaning task. The home assistant may transmit the information to another robot, which may begin a task upon receiving the information, or to an application of a user which may then use the application to instruct another robot to begin a task.

In some instances, the robot and other intelligent devices may interact with each other such that events detected by a first intelligent device influences actions of a second intelligent device. In some embodiments, processor of intelligent devices may use Bayesian probabilistic methods to infer conclusions. For example, a first intelligent device may detect a user entering into a garage by identifying a face of the user with a camera, detecting a motion, detecting a change of lighting, detecting a pattern of lighting, or detecting opening of the garage door. The processor of the first intelligent device may communicate the detection of the user entering the house to processors of other intelligent devices connected through a network. The detection of the user entering the house may lead a processor of a second intelligent device to trigger an actuation or deduct more observation. An actuation may include adjusting a light setting, a music setting, a microwave setting, a security-alarm setting, a temperature setting, a window shading setting, or playing the continuum of the music the user is currently listening to in his/her car. In another example, an intelligent carbon monoxide and fire detector may detect carbon monoxide or a fire and may share this information with a processor of a robot. In response, the processor of the robot may actuate the robot to approach the source of the fire to use or bring a fire extinguisher to the source of the fire. The processor of the robot may also respond by alarming a user or an agency of the incident. In some cases, further information may be required by the processor of the robot prior to making a decision. The robot may navigate to particular areas to capture further data of the environment prior to making a decision.

In some embodiments, all or a portion of artificial intelligence devices within an environment, such as a smart home, may interact and share intelligence such that collective intelligence may be used in making decisions. For example, FIG. 229 illustrates the collection of collaborative artificial intelligence that may be used in making decisions related to the lighting within a smart home. The devices that may contribute to sensing and actuation within the smart home may include a Wi-Fi router connecting to gateway (e.g., WAN), Wi-Fi repeater devices, control points (e.g., applications, user interfaces, wall switches or control points such as turn on or off and dim, set heat temporarily or permanently, and fan settings), sensors for sensing inside light, outside light, and sunlight. In some cases, a sensor of the robot may be used to sense inside and outside light and sunlight and the location of the light sensed by the robot may be determined based on localization of the robot. In some cases, the exact location of the house may be determined using location services on the Wi-Fi router or the IP address or a GPS of the robot. Actuations of the smart house may include variable controllable air valves of the HVAC system, HVAC system fan speed, controllable air conditioning or heaters, and controllable window tinting. In some embodiments, a smart home (or other smart environment) may include a video surveillance camera for streaming data and power over Ethernet LED fixtures.

Some embodiments may include a collaborative artificial intelligence technology (CAIT) system wherein connections and shared intelligence between devices span across one or more environments. CAIT may be employed in making smart decisions based on collective artificial intelligence of its environment. CAIT may use a complex network of AI systems and devices to derive conclusions. In some cases, there may be manual settings and the manual settings may influence decisions made (e.g., the level of likelihood of saving at least a predetermined amount of money that should trigger providing a suggestion to the user). In embodiments, collective artificial intelligence technology (CAIT) may be applied to various types of robots, such as robot vacuums, personal passenger pods with or without a chassis, and an autonomous car. For example, an autonomous battery-operated car may save power based on optimal charging times, learning patterns in historical travel times and distances, expected travels, battery level, and cost of charging. In one case, the autonomous car may arrive at home 7 PM with an empty battery and given that the user is not likely to leave home after 7 PM, may determine how much charge to provide the car with using expensive electricity in the evening (evening) and cheaper electricity (daytime) during the following day and how much charge to attempt to obtain from sunlight the following morning. The autonomous vehicle may consider factors such as what time the user is likely to need the autonomous car (e.g., 8, 10, or 12 PM or after 2 PM since it is the weekend and the user is not likely to use the car until late afternoon). CAIT may be employed in making decisions and may save power consumption by deciding to obtain a small amount of charge using expensive electricity given that there is a small chance of an emergency occurring at 10 PM. In some cases, the autonomous car may always have enough battery charge to reach an emergency room. Or the autonomous car may know that the user needs to run out around 8:30 PM to buy something from a nearby convenience store and may consider that in determining how and when to charge the autonomous car. In another example, CAIT may be used in hybrid or fuel-powered cars. CAIT may be used in determining and suggesting that a user of the car fill up gas at the gas station approaching at it has cheaper gas than the gas station the user usually fuels up at. For instance, CAIT may determine that the user normally buys gas somewhere close to work, that the user is now passing a gas station that is cheaper than the gas the user usually buys, that the car currently has a quarter tank of fuel, that the user is two minutes from home, that the user currently has 15 minutes of free time in their calendar, and that the lineup at the cheaper gas station is 5 minutes which is not more than the average wait time the user is used to. Based on these determinations CAIT may be used in determining if the user should be notified or provided with the suggestion to stop at the cheaper gas station for fueling.

In some embodiments, transportation sharing services, food delivery services, online shopping delivery services, and other types of services may employ CAIT. For example, delivery services may employ CAIT in making decisions related to temperature within the delivery box such that the temperature is suitable based on the known or detected item within the box (e.g., cold for groceries, warm for pizza, turn off temperature control for a book), opening the box (e.g., by the delivery person or robot), and authentication (e.g., using previously set public key infrastructure system, the face of the person standing at the door, standard identification including name and/or picture). In some embodiment, CAIT may be used by storage devices, such as fridge. For example, the fridge (or control system of a home for example) may determine if there is milk or not, and if there is no milk and the house is detected to have children (e.g., based on sensor data from the fridge or another collaborating device), the fridge may conclude that travel to a nearby market is likely. In one case, the fridge may determine whether it is fill or empty and may conclude that a grocery shop may occur soon. The fridge may interface with a calendar of the owner stored on a communication device to determine possible times the owner may grocery shop within the next few days. If both Saturday and Sunday have availability, the fridge may determine on which day the user has historically gone grocery shopping and at what time? In some cases, the user may be reminded to go grocery shopping. In some cases, CAIT may be used in determining whether the owner would prefer to postpone bulk purchases and buy from a local super market during the current week based on determining how much would the user may lose by postponing the trip to a bulk grocery store, what and how much food supplies the owner has and needs and how much it costs to purchase the required food supplies from the bulk grocery store, an online grocery store, a local grocery store, or a convenience store. In some cases, CAIT may be used in determining if the owner should be notified that their groceries would cost $45 if purchased at the bulk grocery store today, and that they have a two hour window of time within which they may go to the bulk grocery store today. In one case, CAIT may be used in determining if it should display the notification on a screen of a device of the owner or if it should only provide a notification if the owner can save above a predetermined threshold or if the confidence of the savings is above a predetermined threshold.

In another example, CAIT may be used in determining the chances of a user arriving at home at 8 PM and if the user would prefer the rice cooker to cook the rice by 8:10 PM or if the user is likely to take a shower and would prefer to have the rice cooked 8:30 PM which may be based on further determining how much energy would be spent to keep the rice warm, how much preference the user has for freshly cooked food (e.g., 10 or 20 minutes), and how mad the user may be if they were expecting to eat immediately and the food was not prepared until 8:20 PM as a result of assuming that the user was going to take a shower. In one example, CAIT may be used in monitoring activity of devices. For example, CAIT may be used in determining that a user did not respond to a few missed calls from their parents throughout the week. If the user and their parents each have 15 minute time window in their schedule, and the user is not working or typing (e.g., determines based on observing key strokes on a device), and the user is in a good mood (as attention and emotions may be determined by CAIT) a suggestion may be provided to the user to call their parents. If the user continuously postpones calling their parents and their parents have health issues, continues suggestions to call their parents may be provided. In another example, CAIT may be employed to autonomously make decisions for users based on (e.g., inferred from) logged information of the users. In embodiments, users may control which information may be logged and which decisions the CAIT system may make on their behalf. For example, a database may store, for a user, voice data usage, total data usage, data usage on a cell phone, data usage on a home LAN, wireless repeating usage, cleaning preferences for a cleaning robot, cleaning frequency of a cleaning robot, cleaning schedules of a cleaning robot, frequency of robot taking the garbage out, total kilometers of usage of a passenger pod during a particular time period, weekly frequency of using a passenger pod and chassis, data usage while using the pod, monthly frequency of grocery shopping, monthly frequency of filling gas at a particular gas station, etc. In this example, all devices are connected in an integrated system and all intelligence of devices in the integrated system is collaboratively used to make decisions. For example, CAIT may be used to decide when to operate a cleaning robot of a user or to provide the user with a notification to grocery shop based on inferences made using the information stored in the database for the user. In some embodiments, devices of user and devices available to the public (e.g., smart gas pump, robotic lawn mower, or service robot) may be connected in an integrated system. In some embodiments, the user may request usage or service of an unowned device and, in some cases, the user may pay for the usage or service. In some cases, payment is pay as you go. For example, a user may request a robotic lawn mower to mow their lawn every Saturday. The CAIT system may manage the request, deployment of a robotic lawn mower to the home of the user, and payment for the service.

In some embodiments, a device within the CAIT may rely on their internally learned information more than information learned from others devices within the system or vice versa. In some embodiments, the weight of information learned from different devices within the system may be dependent on the type of device, previous interactions with the device, etc. In some embodiments, a device within the CAIT system may use the position of other devices as a data association point. For example, a processor of a first robot within the CAIT system may receive location and surroundings information from another robot within the CAIT system that has a good understanding of its location and surroundings. Given that the processor of the first robot knows its position with respect to the other robot, the processor may use the received information as a data point.

In some embodiments, the backend of multiple companies may be accessed using a mobile application to obtain the services of the different companies. For example, FIG. 230 illustrates company A backend and other backends of companies that participate in an end to end connectivity with one another. For example, in FIG. 230 a user may input information into a mobile application of a communication device that may be stored in a company A backend. The information stored in the company A backend database may be used to subscribe services offered by other companies, such as service companies 1 and 2 backend. Each subscription may need a username and password. In some embodiments, company A generates the username and password for different companies and sends it to the user. For example, a user ID and password for service company 1 may be returned to the mobile application. The user may then use the user ID and password to sign into service company 1 using the mobile application. In some embodiments, company A prompts the user to set up a username and password for a new subscription. In embodiments, each separate company may provide their own functionalities to the user. For example, the user may open a home assistant application and enable a product skill from service company 1 by inputting service company 1 username and password to access service company 1 backend. In some embodiments, the user may use the single application to access subscriptions to different companies. In some embodiments, the user may use different applications to access subscriptions to different companies. In FIG. 230, service company 2 backend checks service company 1 username and password and service company 1 backend returns an authorization token, which service company 2 backend saves. The user may ask service company 2 speaker control robot to start cleaning. Service company 2 speaker may check the user command and user account token. Service company 2 backend may then send the control command with the user token to service company 1 voice backend which may send start, stop, or change to service company 1 backend.

In embodiments, robots may communicate using various types of networks. In some embodiments, the robot may include a RF module that receives and sends RF signals, also known as electromagnetic signals. In some embodiments, the RF module converts electrical signals to and from electromagnetic signals to communicate. In some embodiments, the robot may include an antenna system, an RF transceiver, one or more amplifiers, memory, a tuner, one or more oscillators, and a digital signal processor. In some embodiments, a Subscriber Identity Module (SIM) card may be used to identify a subscriber. In some embodiments, the robot includes wireless modules that provide mechanisms for communicating with networks. For example, the Internet provides connectivity through a cellular telephone network, a wireless Local Area Network (LAN), a wireless Metropolitan Area Network (MAN), a wireless Wide Area Network (WAN), and a wireless personal-area network (PAN) and other devices by wireless communication. In embodiments, a MAN may covers a large geographic area and may be used as backbone services, point-to-point, or point-to-multipoint links. In embodiments, a WAN may cover a large geography such as a cellular service and may be provided by a wireless service provider. In some embodiments, the wireless modules may detect Near Field Communication (NFC) fields, such as by a short-range communication radio. In some embodiments, the system of the robot may abide to communication standards and protocols. Examples of communication standards and protocols that may be used include Global System for Mobile Communications (GSM), Enhanced Data GSM Environment (EDGE), High-Speed Downlink Packet Access (HSDPA), High-Speed Uplink Packet Access (HSUPA), Evolution Data Optimized (EV-DO), High Speed Packet Access (HSPA), HSPA+, Dual-Cell HSPA (DC-HSPDA), Long Term Evolution (LTE), Near Field Communication (NFC), Wideband Code Division Multiple Access (W-CDMA), Code Division Multiple Access (CDMA), Time Division Multiple Access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), and Wi-MAX. In some embodiments, the wireless modules may include other internet functionalities such as connecting to the web, Internet Message Access Protocol (IMAP), Post Office Protocol (POP), instant messaging, Session Initiation Protocol for Instant Messaging and Presence Leveraging Extensions (SIMPLE), Instant Messaging and Presence Service (IMPS), Short Message Service (SMS), etc. In embodiments, a LAN may operate in the 2.4 or 5 GHz spectrum and may have a range up to 100 m. In a LAN, a dual-band wireless router may be used to connect laptops, desktops, smart home assistants, robots, thermostats, security systems, and other devices. In some embodiments, a LAN may provide mobile clients access to network resources, such as wireless print servers, presentation servers, and storage devices. In embodiments, a WPAN may operate in the 2.4 GHz spectrum. An example of a PAN may include Bluetooth. In some embodiments, Bluetooth devices, such as headsets and mice, may use Frequency Hopping Spread Spectrum (FHSS). In some embodiments, Bluetooth piconets may consist of up to eight active devices but may have several inactive devices. In some embodiments, Bluetooth devices may be standardized by the 802.15 IEEE standard.

In some embodiments, the wireless networks used by collaborating robots for wireless communication may rely on the use of a wireless router. In some embodiments, the wireless router (or the robot or any other network device) may be half duplex or full duplex, wherein full duplex allows both parties to communicate with each other simultaneously and half duplex allows both parties to communicate with each other, but not simultaneously. In some embodiments, the wireless router may have the capacity to act as a network switch and create multiple subnets or virtual LANs (VLAN), perform network address translation (NAT), or learn MAC addresses and create MAC tables. In some embodiments, a robot may act as a wireless router and may include similar abilities as described above. In some embodiments, a Basic Service Area (BSA) of the wireless router may be a coverage area of the wireless router. In some embodiments, the wireless router may include an Ethernet connection. For example, the Ethernet connection may bridge the wireless traffic from the wireless clients of a network standardized by the 802.11 IEEE standard to the wired network on the Ethernet side, standardized by the 802.3 IEEE standard, or to the WAN through a telecommunication device. In some embodiments, the wireless router may be the telecommunication device.

In some embodiments, the wireless router may have a Service Set Identifier (SSID), or otherwise a network name. In some embodiments, the SSID of a wireless router may be associated with a MAC address of the wireless router. In some cases, the SSID may be a combination of the MAC address and a network name. When the wireless router offers service for only one network, the SSID may be referred to as a basic SSID (BSSID) and when the wireless router allows multiple networks through the same hardware, the SSID may be referred to as a Multiple BSSID (MB SSID).

In some embodiments, the environment of the robots and other network devices may include more than one wireless router. In some embodiments, robots may be able to roam and move from one wireless router to another. This may useful in larger areas, such as an airport, or in a home when cost is not an issue. In some embodiments, the processor of a robot may use roaming information, such as the wireless router with which it may be connected, in combination with other information to localize the robot. In some embodiments, robots may be able to roam from a wireless router with a weak signal to a wireless router with a strong signal. In some embodiments, there may be threshold that must be met prior to roaming from one wireless router to another or a constant monitoring may be used. In some embodiments, the processor of a robot may know the availability of wireless routers based on the location of the robot determined using SLAM. In some embodiments, the robots may intelligently arrange themselves to provide coverage when one or more of the wireless routers are down. In embodiments, the BSA of each wireless router must overlap and the wireless routers must have the same SSID for roaming to function. For example, as a robot moves it may observe the same SSID while the MAC address changes. In some embodiments, the wireless routers may operate on different channels or frequency ranges that do not overlap with one another to prevent co-channel interference. In some cases, this may be challenging as the 2.4 GHz spectrum on which the network devices may operate includes only three non-overlapping channels. In some embodiments, an Extended Service Set (ESS) may be used, wherein multiple wireless networks may be used to connect clients.

In some embodiments, robots (and other network devices) may communicate through two or more linked LANs. In some embodiments, a wireless bridge may be used to link two or more LANs located within some distance from one other. In embodiments, bridging operates at layer 2 as the LANs do not route traffic and do not have a routing table. In embodiments, bridges be useful in connecting remote sites, however, for a point-to-multipoint topology, the central wireless device may experience congestion as each device on an end must communicate with other devices through the central wireless device. In some embodiments, a mesh may alternatively be used, particularly when connectivity is important, as multiple paths may be used for communication. Some embodiments may employ the 802.11s IEEE mesh standard. In some embodiments, a mesh network may include some nodes (such as network devices) connected to a wired network, some nodes acting as repeaters, some nodes operating in layer 2 and layer 3, some stationary nodes, some mobile nodes, some roaming and mobile nodes, some nodes with long distance antennas, and some nodes with short distance antennas and cellular capability. In some embodiments, a mesh node may transmit data to nearby nodes or may prune data intelligently. In some embodiments, a mesh may include more than one path for data transmission. In some embodiments, a special algorithm may be used to determine the best path for transmitting data from one point to another. In some embodiments, alternative paths may be used when there is congestion or when a mesh node goes down. In some embodiments, graph theory may be used to manage the paths. In some embodiments, special protocols may be used to control loops when they occur. For example, at layer 2 a spanning tree protocol may be used and at layer 3 IP header TTL may be used.

In some embodiments, robots (and other network devices) may communicate by broadcasting packets. For example, a robot in a fleet of robot may broadcast packets and everyone in the fleet of robots may receive the packets. In some embodiments, robots (and other network devices) may communicate using multicast transmission. A unicast transmission may include sending packets to a single recipient on a network, whereas multicast transmission may include sending packets to a group of devices on a network. For example, a unicast may be started for a source to stream data to a single destination and if the stream needs to reach multiple destinations concurrently, the stream may be sent to a valid multicast IP address ranging between 224.0.0.0 and 239.255.255.255. In embodiments, the first octet (224.xxx.xxx.xxx) of the multicast IP address range may be reserved for administration. In some embodiments, multicast IP addresses may be identified by the prefix bit pattern of 1110 in the first four bits of the first octet, and belong to a group of addresses designated as Class D. The multicast IP addresses ranging between 224.0.0.0 and 239.255.255.255 are divided into blocks, each assigned a specific purpose or behavior. For example, the range of 224.0.0.0 through 224.0.0.255, known to be the Local Network Control Block is used by network protocols on a local subnet segment. Packets with an address in this range are local in scope and are transmitted with a Time To Live (TTL) of 1 so that they go no farther than the local subnet. Or the range of 224.0.1.0 through 224.0.1.255 is the Inter-Network Control Block. These addresses are similar to the Local Network Control Block except that they are used by network protocols when control messages need to be multicast beyond the local network segment. Other blocks may be found on IANA.

Some embodiments may employ 802.2 IEEE standards on transmission of broadcast and multicast packets. For example, bit 0 of octet 0 of a MAC address may indicate whether the destination address is a broadcast/multicast address or a unicast address. Based on the value of bit 0 of octet 0 of the MAC address, the MAC frame may be destined for either a group of hosts or all hosts on the network. In embodiments, the MAC destination address may be the broadcast address 0xFFFF.FFFF.FFFF.

In some embodiments, layer 2 multicasting may be used to transmit IP multicast packets to a group of hosts on a LAN. In some embodiments, 23 bits of MAC address space may be available for mapping a layer 3 multicast IP address into a layer 2 MAC address. Since the first four bits of a total of 32 bits of all layer 3 multicast IP addresses are set to 0x1110, 28 bits of meaningful multicast IP address information is left. Since all 28 bits of the layer 3 IP multicast address information may not be mapped into the available 23 bits of the layer 2 MAC address, five bits of address information are lost in the process of mapping, resulting in a 32:1 address ambiguity. In embodiments, a 32:1 address ambiguity indicates that each multicast MAC address can represent 32 multicast IP addresses, which may cause potential problems. For example, devices subscribing to the multicast group 224.1.1.1 may program their hardware to interrupt the CPU when a frame with a destination multicast MAC address of 0x0100.5E00.0101 is received. However, this multicast MAC address may be concurrently used for 31 other multicast IP groups. If any of these 31 other IP groups are also active on the same LAN, the CPU of the device may receive interrupts when a frame is received for any of these other IP groups. In such cases, the CPU must examine the IP portion up to layer 3 of each received frame to determine if the frame is from the subscribed group 224.1.1.1. This may affect the CPU power available to the device if the number of false positives from unsubscribed group traffic is high enough.

In some embodiments, rendezvous points may be used to manage multicast, wherein unicast packets may be sent up to the point of subscribers. In some embodiments, controlling IP multicast traffic on WAN links may be important in avoiding saturation of low speed links by high rate groups. In some embodiments, control may be implemented by deciding who can send and receive IP multicast. In some embodiments, any multicast source may send to any group address and any multicast client may receive from any group despite geography. In some embodiments, administrative or private address space may be used within an enterprise unless multicast traffic is sourced to the Internet.

In some embodiments, the robot may be coupled with other smart devices (such as robots, home assistants, cell phones, tablets, etc.) via one or more networks (e.g., wireless or wired). For example, the robot and other smart devices may be in communication with each other over a local area network or other types of private networks, such as a Bluetooth connected workgroup or a public network (e.g., the internet or cloud). In some embodiments, the robot may be in communication with other devices, such as servers, via the internet. In some embodiments, the robot may capture information about its surrounding environment, such as data relating to spatial information, people, objects, obstacles, etc. In some embodiments, the robot may receive a set of data or commands from another robot, a computing device, a content server, a control server, or any combination thereof located locally or remotely with respect to the robot. In some embodiments, storage within the robot may be provisioned for storing the set of data or commands. In some embodiments, the processor of the robot may determine if the set of data relates to other robots, people, network objects, or some combination thereof and may select at least one data or command from the set of data or commands. In some embodiments, the robot may receive the set of data or commands from a device external to a private network. In some embodiments, the robot may receive the set of data or commands from a device external to the private network although the device is physically adjacent to the robot. For example, a smart phone may be connected to a Wi-Fi local network or a cellular network. Information may be sent from the smart phone to the robot through an external network although the smart phone is in the same Wi-Fi local network as the robot. In some embodiments, the processor of the robot may offload some of the more process or power intensive tasks to other devices in a network (e.g., local network) or on the cloud or to its own additional processors (if any).

In some embodiments, each network device may be assigned an IP or device ID from a local gateway. In some embodiments, the local gateway may have a pool of IP addresses configured. In some cases, the local gateway may exclude a few IP addresses from that range as they may be assigned to other pools, some devices may need a permanent IP, or some IP addresses in the continuous address space may have been previously statically assigned. When an IP is assigned (or otherwise leased), additional information may also be assigned. For example, default gateway, domain name, a TFTP server, an FTP server, an NTP server, DNS sever, or a server from which the device may download most updates for its firmware, etc. For example, a robot may download its clock from an NTP server or have the clock manually adjusted by the user. The robot may detect its own time zone, detect daylight time savings based on the geography, and other information. Any of this information may be manually set as well. In some cases, there may be one or more of each server and the robot may try each one. For example, assigned information of an IP lease may include network 192.168.101.0/24, default router 192.168.101.1, domain name aiincorporated.com, DNS server 192.168.110.50, TFTP server 192.168.110.19, and lease time 6 hours. In some embodiments, language support may be included in the IP lease or may be downloaded from a server (e.g., TFTP server). Examples of languages supported may include English, French, German, Russian, Spanish, Italian, Dutch, Norwegian, Portuguese, Danish, Swedish, and Japanese. In some embodiments, a language may be detected and in response the associated language support may be downloaded and stored locally. If the language support is not used from a predetermined amount of time it may be automatically removed. In some embodiments, a TFTP server may store a configuration file for each robot that each robot may download to obtain the information they need. In some cases, there may be files with common settings and files with individual settings. In some embodiments, the individual settings may be defined based on location, MAC address, etc. In some embodiments, a dynamic host configuration protocol (DHCP), such as DHCP option 150, may be used to assign IP addresses and other network parameters to each device on the network. In some cases, a hacker may spoof the DHCP server to set up a rogue DHCP server and respond to DHCP requests from the robot. This may be simultaneously performed with a DHCP starvation attack wherein the victim server does not have any new IP addresses to give out, thereby raising the chance of the robot using the rouge DHCP server. Such cases may lead to the robot downloading bad firmware and may be compromised. In order to alleviate these problems, a digital signature may be used. In some embodiments, the robot refrains from installing firmware that is not confirmed to have come from a safe source.

FIG. 231 illustrates an example of a network of electronic devices including robots, cell phones, home assistant device, computer, tablet, smart appliance (i.e., fridge), and robot control units (e.g., charging station) within an environment, at least some which may be connected to a cellular or Wi-Fi network. Other examples of devices that may be part of a wireless network (or a wired LAN or other network) may include Internet, file servers, printers, and other devices. In some embodiments, the communication device prefers to connect to a Wi-Fi network when available and uses a cellular network when a Wi-Fi network is unavailable. In one case, the communication device may not be connected to a home Wi-Fi network and a cellular network may be used. In another case, the communication device may be connected to a home Wi-Fi, however, some communication devices may have a cellular network preference. In some embodiments, preference may be by design. In some embodiments, a user may set a preference in an application of the communication device or within the settings of the communication device. In FIG. 231, the robots are not directly connected to the LAN while the charging stations are. In one case, the processor of the robot does not receive an IP address and uses an RF communication protocol. In a second case, the processor of the robot receives an IP address but from a different pool than the wireless router distributes. The IP address may not be in a same subnet as the rest of the LAN. In some cases, the charging station may act as a wireless router and provide an IP address to the processor of the robot. FIGS. 232A and 232B illustrate examples of a connection path 11700 for devices via the cloud. In FIG. 232A the robot control unit 1 is connected to cell phone 1 via the cloud. In this case, cell phone 1 is connected to the cloud via the cellular network while the robot control unit 1 is connected to the cloud via the Wi-Fi network. In FIG. 232B the robot control unit 1 is connected to cell phone 2 via the cloud. In this case, cell phone 2 and robot control unit 1 are connected to the cloud via the Wi-Fi network. FIG. 233 illustrates an example of a LAN connection path 11800 between cell phone 2 and robot control unit 1 via the wireless router. For a LAN connection path, costs may be reduced as payment to an internet service provider is not required. However, some services, such as services of a home assistant (e.g., Alexa) or cloud enhancements that may be used with mapping, may not be available. FIG. 234 illustrates a direct connection path 11900 between cell phone 2 and robot control unit 1. In some instances, a direct connection path between devices may be undesirable as the devices may be unable to communicate with other devices in the LAN during the direct connection. For example, a smart phone may not be able to browse the internet during a direct connection with another device. In some instances, a direct connection between devices may be temporarily used. For example, a direct connection between devices may be used during set up of the robot to create an initial communication between a communication device or a charging station and the robot such that the processor of the robot may be provided an SSID that may be used to initially join the LAN. In some embodiments, each device may have its own IP address and communication between devices may be via a wireless router positioned between the devices. FIG. 235 illustrates a connection path 12000 between robot 3 and cell phone 2 via the router. In such cases, there may be no method of communication if the wireless router becomes unavailable. Furthermore, there may be too many IP addresses used. In some embodiments, a variation of this example may be employed, wherein the robot may connect to the LAN while the charging station may connect to the internet through an RF communication method.

In some embodiments, the processor of a robot may transmit an initial radio broadcast message to discover other robots (or electronic devices) capable of communication within the area. In some embodiments, the processor of the robot may discover the existence of another robot capable of communication based on a configuration the processor of the robot performs on the other robot or a command input provided to a graphical user interface. In some embodiments, robots may use TCP/IP for communication. In some embodiments, communication between robots may occur over a layer two protocol. In some embodiments, the robot possesses a MAC address and in some embodiments the processor of the robot transmits the MAC address to other robots or a wireless router. In some embodiments, the processor of a charging station of the robot may broadcast a message to discover other Wi-Fi enabled devices, such as other robots or charging stations capable of communication within the area. In some embodiments, a robot endpoint device may operate within a local area network. In some embodiments, the robot may include a network interface card or other network interface device. In some embodiments, the robot may be configured to dynamically receive a network address or a static network address may be assigned. In some embodiments, the option may be provided to the user through an application of a communication device. In some embodiments, in dynamic mode, the robot may request a network address through a broadcast. In some embodiments, a nearby device may assign a network address from a pre-configured pool of addresses. In some embodiments, a nearby device may translate the network address to a global network address or may translate the network address to another local network address. In some embodiments, network address translation methods may be used to manage the way a local network communicates with other networks. In some embodiments, a DNS name may be used to assign a host name to the robot.

In some embodiments, each wireless client within a range of a wireless router may advertise one or more SSID (e.g., each smart device and robot of a smart home). In some embodiments, two or more networks may be configured to be on different subnets and devices may associate with different SSIDs, however, a wireless router that advertises multiple SSIDs uses the same wireless radio. In some embodiments, different SSIDs may be used for different purposes. For example, one SSID may be used for a network with a different subnet than other networks and that may be offered to guest devices. Another SSID may be used for a network with additional security for authenticated devices of a home or office and that places the devices in a subnet. In some embodiments, the robot may include an interface which may be used to select a desired SSID. In some embodiments, an SSID may be provided to the robot by entering the SSID into an application of a communication device (e.g., smart phone during a pairing process with the communication device). In some embodiments, the robot may have a preferred network configured or a preferred network may be chosen through an application of a communication device after a pairing process. In some embodiments, configuration of a wireless network connection may be provided to the robot using a paired device such as a smart phone or through an interface of the robot. In some embodiments, the pairing process between the robot and an application of a communication device may require the communication device, the robot, and a wireless router to be within a same vicinity. In some embodiments, a button of the robot may be pressed to initiate the pairing process. In some embodiments, holding the button of the robot for a few seconds may be required to avoid accidental changes in robot settings. In some embodiments, an indicator (e.g., a light, a noise, vibration, etc.) may be used to indicate the robot is in pairing mode. For example, LEDs positioned on the robot may blink to indicate the robot is in pairing mode. In some embodiments, the application of the communication device may display a button that may be pressed to initiate the pairing process. In some embodiments, the application may display a list of available SSIDs. In some embodiments, a user may use the application to manually enter an SSID. In some embodiments, the pairing process may require that the communication device activate location services such that available SSIDs within the vicinity may be displayed. In some embodiments, the application may display an instruction to activate location services when a global setting on the OS of the communication device has location services deactivated. In cases wherein location services is deactivated, the SSID may be manually entered using the application. In some embodiments, the robot may include a Bluetooth wireless device that may help the communication device in finding available SSIDs regardless of activation or deactivation of location services. This may be used as a user-friendly solution in cases wherein the user may not want to activate location services. In some embodiments, the pairing process may require the communication device and the robot to be connected to the same network or SSID. Such a restriction may create confusion in cases wherein the communication device is connected to a cellular network when at home and close to the robot or the communication device is connected to a 5 Ghz network and the robot is connected to a 2.4 Ghz network, which at times may have the same SSID name and password. In some embodiments, it may be preferable for the robot to use a 2.4 Ghz network as it may roam around the house and may end up on places where a signal strength of a 5 Ghz network is weak. In some embodiments, a 5 Ghz network may be preferred within an environment having multiple wireless repeaters and a signal with good strength. In some embodiments, the robot may automatically switch between networks as the data rate increases or decreases. In some embodiments, pairing methods such as those described in U.S. patent application Ser. No. 16/109,617 may be used, the entire contents of which is hereby incorporated by reference.

In some embodiments, a robot device, communication device or another smart device may wirelessly join a local network by passively scanning for networks and listening on each frequency for beacons being sent by a wireless router. Alternatively, the device may use an active scan process wherein a probe request may be transmitted in search of a specific wireless router. In some embodiments, the client may associate with the SSID received in a probe response or in a heard beacon. In some embodiments, the device may send a probe request with a blank SSID field during active scanning. In some embodiments, wireless routers that receive the probe request may respond with a list of available SSIDs. In some embodiments, the device may connect with one of the SSIDs received from the wireless router if one of the SSIDs exists on a preferred networks list of the device. If connection fails, the device may try an SSID existing on the preferred networks list that was shown to available during a scan.

In some embodiments, a device may send an authentication request after choosing an SSID. In some embodiments, the wireless router may reply with an authentication response. In some embodiments, the device may send an association request, including the data rates and capabilities of the device after receiving a successful authentication response from the wireless router. In some embodiments, the wireless router may send an association response, including the data rates that the wireless router is capable of and other capabilities, and an identification number for the association. In some embodiments, a speed of transfer may be determined by a Received Signal Strength Indicator (RSSI) and signal-to-noise ratio (SNR). In some embodiments, the device may choose the best speed for transmitting information based on various factors. For example, management frames may be sent at a slower rate to prevent them from becoming lost, data headers may be sent at a faster rate than management frames, and actual data frames may be sent at the fastest possible rate. In some embodiments, the device may send data to other devices on the network after becoming associated with the SSID. In embodiments, the device may communicate with devices within the same subnet or other subnets. Based on normal IP rules, the device may first determine if the other device is on the same subnet and then may decide to use a default gateway to relay the information. In some embodiments, a data frame may be received by a layer 3 device, such as the default gateway. In some embodiments, the frame may then be encapsulated in IPV4 or IPV6 and routed through the wide area network to reach a desired destination. Data traveling in layer 3 allows the device to be controllable via a local network, the cloud, an application connected to wireless LAN, or cellular data. In some embodiments, upon receiving the data at a cellular tower, devices such as Node B, a telecommunications node in mobile communication networks applying the UMTS standard, may provide a connection between the device from which data is sent and the wider telephone network. Node B devices may be connected to the mobile phone network and may communicate directly with mobile devices. In such types of cellular networks, mobile devices do not communicate directly with one another but rather through the Node B device using RF transmitters and receivers to communicate with mobile devices.

In some embodiments, a client that has never communicated with a default gateway may use Address Resolution Protocol (ARP) to resolve its MAC address. In some embodiments, the client may examine an ARP table for mapping to the gateway, however if the gateway is not there the device may create an ARP request and transmit the ARP request to the wireless router. For example, an 802.11 frame including four addresses: the source address (SA), destination address (DA), transmitter address (TA), and receiving address (RA) may be used. In this example, the SA is the MAC of the device sending the ARP request, the DA is the broadcast (for the ARP), and the RA is the wireless router. In some embodiments, the wireless router may receive the ARP request and may obtain the MAC address of the device. In some embodiments, the wireless router may verify the frame check sequence (FCS) in the frame and may wait the short interframe space (SIFS) time. When the SIFS time expires, the wireless router may send an acknowledgement (ACK) back to the device that sent the ARP request. The ACK is not an ARP response but rather an ACK for the wireless frame transmission. In embodiments wherein the number of wireless routers are more than one, a Lightweight Access Point Protocol (LWAPP) may be used wherein each wireless router adds its own headers on the frames. In some embodiments, a switch may be present on the path of the device and wireless router. In some embodiments, upon receiving the ARP request, the switch may read the destination MAC address and flood the frame out to all ports, except the one it came in on. In some embodiments, the ARP response may be sent back as a unicast message such that the switch in the path forwards the ARP response directly to the port leading to the device. At such a point, the ARP process of the client may have a mapping to the gateway MAC address and may dispatch the awaiting frame using the process described above, a back off timer, a contention window, and eventually transmitting the frame following the ARP response.

Some embodiments may employ virtual local area networks (VLANs). In such embodiments, upon receiving the ARP request, the frame may be flooded to all ports that are members of the same VLAN. A VLAN may be used with network switches for segmentation of hosts at a logical level. By using VLANs on the wired side of the wireless router, the subnet may be logically segmented, just as it is on the wireless space. For example, the result may be SSID=Logical Subnet=Logical VLAN or Logical Broadcast Domain. After the wireless frames move from the wireless connection to the wired network, they must share a single physical wire. In some embodiments, the 802.1Q protocol may be used to place a 4-byte tag in each 802.3 frame to indicate the VLAN.

In some embodiments, a hacker may attempt to transmit an ARP response from a host with a MAC address that does not match the MAC address of the host from which the ARP request was broadcasted. In some embodiments, device to device bonds may be implemented using a block chain to prevent any attacks to a network of devices. In some embodiments, the devices in the network may be connected together in a chain and for a new device to join the network it must first establish a bond. In some embodiments, the new device must register in a ledger and an amount of time must pass, over which trust between the new device and the devices of the network is built, before the new device may perform certain actions or receive certain data.

Examples of data that a frame or packet may carry includes control data, payload data, digitized voice, digitized video, voice control data, video control data, and the like.

In some embodiments, the device may search for an ad hoc network in the list of available networks when none of the SSIDs that were learned from the active scan or from the preferred networks list result in a successful connection. An ad hoc connection may be used for communication between two devices without the need for a wireless router in between the two devices. In some cases, ad hoc connections may not scale well for multiple device but may be possible. In some embodiments, a combination of ad hoc and wired router connections may be possible. In some embodiments, a device may connect to an existing ad hoc network. In some embodiments, a device may be configured to advertise an ad hoc connection. However, in some cases, this may be a potential security risk, such as in the case of robots. In some embodiments, a device may be configured to refrain from connecting to ad hoc networks. In some embodiments, a first device may set up a radio work group, including a name and radio parameters, and a second device may use the radio work group to connect to the first device. This may be known as a Basic Service Set or Independent Basic Service Set, which may define an area within which a device may be reachable. In some embodiments, each device may have one radio and may communicate in a half-duplex at a lower data rate as information may not be sent simultaneously. In some embodiments, each device may have two radios and may communicate in a full duplex.

In embodiments, authentication and security of the robot are important and may be configured based on the type of service the robot provides. In some embodiments, the robot may establish an unbreakable bond or a bond that may only be broken over time with users or operators to prevent intruders from taking control of the robot. For example, WPA-802.1X protocol may be used to authenticate a device before joining a network. Other examples of protocols for authentication may include Lightweight Extensible Authentication Protocol (LEAP), Extensible Authentication Protocol Transport Layer Security (EAP-TLS), Protected Extensible Authentication Protocol (PEAP), Extensible Authentication Protocol Generic Token Card (EAP-GTC), PEAP with EAP Microsoft Challenge Handshake Authentication Protocol Version 2 (EAP MS-CHAP V2), EAP Flexible Authentication via Secure Tunneling (EAP-FAST), and Host-Based EAP. In some embodiments, a pre-shared key or static Wired Equivalent Privacy (WEP) may be used for encryption. In other embodiments, more advanced methods, such as WPA/WPA2/CCKM, may be used. In some embodiments, WPA/WPA2 may allow encryption with a rotated encryption key and a common authentication key (i.e., a passphrase). Encryption keys may have various sizes in different protocols, however, for more secure results, a larger key size may be used. Examples of key size include a 40 bit key, 56 bit key, 64 bit key, 104 bit key, 128 bit key, 256 bit key, 512 bit key, 1024 bit key, and 2048 bit key. In embodiments, encryption may be applied to any wireless communication using a variation of encryption standards.

In some embodiments, EAP-TLS, a commonly used EAP method for wireless networks, may be used. EAP-TLS encryption is similar to SSL encryption with respect to communication method, however EAP-TLS is one generation than SSL. EAP-TLS establishes an encrypted tunnel and the user certificate is sent inside the tunnel. In EAP-TLS, a certificate is needed and is installed on an authentication server and the supplicant and both client and server key pairs are first generated then signed by the CA server. In some embodiments, the process may begin with an EAP start message and the wireless router requesting an identity of the device. In some embodiments, the device may respond via EAP over RADIUS to the authentication server, the authentication server may send its certificate, and the client may send its certificate, thereby revealing their identity in a trusted way. In some embodiments, a master session key or symmetric session keys may then be created. In some embodiments, the authentication server may send the master session key to the wireless router to be used for either WEP or WPA/WPA2 encryption between the wireless router and the device.

WPA was introduced as a replacement for WEP and is based on the IEEE 802.11i standard. More specifically, WPA includes support for Advanced Encryption Standard (AES) and Cipher Block Chaining Message Authentication Code Protocol (CMMP) and the Temporal Key Integrity Protocol (TKIP), which may use RC4 stream cipher to dynamically generate a new key for each packet. (AES/CCMP) still uses the IV and MIC, but the IV increases after each block of cipher. In embodiments, different variations of WPA (e.g., WPA2 or WPA3) may be used. In some embodiments, WPA may mandate using TKIP, with AES being optional. In some embodiments, WPA2 may be used wherein AES is mandated and TKIP is not used. In some embodiments, WPA may allow AES in its general form. In some embodiments, WPA2 may only allow an AES/CCMP variant.

WPA may use one of two authentication modes. One mode includes an enterprise mode (or otherwise 802.1X mode) wherein authentication against a server such as a RADIUS server is required for authentication and key distribution and TKIP is used with the option of AES. The second mode includes a personal mode (e.g., popular in homes) wherein an authentication server is not used and each network device encrypts data by deriving its encryption key from a pre-shared key. In some embodiments, a network device and wireless router may agree on security capabilities at the beginning of negotiations, after which the WPA-802.1X process may begin. In some embodiments, the network device and wireless router may use a Pairwise Master Key (PMK) during a session. After this, a four-way handshake may occur. In some embodiments, the network device and an authenticator may communicate and a Pairwise Transient Key (PTK) may be derived which may confirm the PMK between the network device and the wireless router, establish a temporal key (TK) that may be used for message encryption, authenticate the negotiated parameters, and create keying material for the next phase (known as the two-way group key handshake). When the two-way group key handshake occurs, a network device and authenticator may negotiate the Group Transient Key (GTK), which may be used to decrypt broadcast and multicast transmissions. A first network device may generate a random or pseudo-random number using a random generator algorithm and may sends it to a second network device. The second network device may then use a common passphrase along with the random number to derive a key that may be used to encrypt data being sent back to the first network device. The second network device may then send its own random number to the first network device, along with a Message Integrity Code (MIC), which may be used to prevent the data from being tampered with. The first network device may then generate a key that may be used to encrypt unicast traffic to the client. To validate, the first network device may send the random number again, but encrypted using the derived key. A final message may be sent, indicating that the TK is in place on both sides. The two-way handshake that exchanges the group key may include generating a Group Master Key (GMK), usually by way of a random number. After a first network device generates the GMK, it may generate a group random number. This may be used to generate a Group Temporal Key (GTK). The GTK may provide a group key and a MIC. The GTK may change when it times out or when one of the network devices on one side leaves the network. In some embodiments, WPA2 may include key management which may allow keys to be cached, resulting in faster connections. In some embodiments, WPA may include Public Key Infrastructure to achieve higher security.

In some embodiments, vendor protocols such as EAP-FAST or LEAP may be used when the wireless router supports the protocols. In some protocols, only a server side certificate may be used to create a tunnel within which the actual authentication takes place. An example of this method includes the PEAP protocol that uses EAP MS-CHAP V2 or EAP GTC to authenticate the user inside an encrypted tunnel. In some embodiments, authentication may allow the robot to be centrally authenticated and may be used to determine if the robot belongs to a fleet or if it safe for the robot to join a fleet or interact with other robots. In some embodiments, a decentralized network may be used. In some embodiments, block chain may be used to add new robots to a fleet of robots wherein new robots may be recorded in a leger as they join. Block chain may be used to prevent new robots from enacting any unexpected or unwanted actions.

In some embodiments, a wireless router may be compromised. In some embodiments, as a result of the wireless router being compromised, the flash file system and NVRAM may be deleted. In such instances, there may be significant downtime as the files are put back in place prior to restoring normal wireless router functionality. In some embodiments, a Cisco Resilient Configuration feature may be used to improve recovery time by generating a secure working copy of the IOS image and startup configuration files (i.e., the primary boot set) that cannot be deleted by a remote user.

In some embodiments, a Simple Network Management Protocol (SNMP) may be used to manage each device (e.g., network servers, wireless routers, switches, etc.), including robots, within a network. SNMP may be utilized to manage robot devices. In some embodiments, SNMP messages may be encrypted with a hash to provide integrity of the packset. In some embodiments, hashing may also be used to validate the source of an SNMP message. In some embodiments, encryptions such as CBC-DES (DES-56) may be used to make the messages unreadable by an unauthorized party.

In some embodiments, the robot may be used as a site survey device. In some embodiments, the robot may cover an environment (e.g., a commercial space such as an airport) and a sensor may be used to monitor the signal strength in different areas of the environment. In some embodiments, the signal strength in different areas may be shared with a facility designer or IT manager of the environment. In some embodiments, the processor of the robot may passively listen to signals in each area of the environment multiple times and may aggregate the results for each area. In some embodiments, the aggregated results may be shared with facility designer or IT manager of the environment. In some embodiments, the processor of the robot may actively transmit probes to understand the layout of the environment prior to designing a wireless architecture. In some embodiments, the processor of the robot may predict coverage of the environment and may suggest where access points may be installed. Examples of access points may include wireless routers, wireless switches, and wireless repeaters that may be used in an environment. Alternatively, machine learned methods may be used to validate and produce a wireless coverage prediction map for a particular designed wireless architecture. In some embodiments, previous data from existing facilities and probes by the robot may be used to reduce blind spots.

In some embodiments, the robot may be unable to connect to a network. In such cases, the robot may act as or may be a wireless router. In some embodiments, the robot includes similar abilities as described above for a wireless router. In some embodiments, the robot may act as or may be a wireless repeater to extend coverage. In some embodiments, the robot enacts other actions while acting as a wireless router or repeater. In some embodiments, the robot may follow a user to provide a good signal in areas where there may be weak signals when acting as a wireless repeater. In some embodiments, each robot in a group of robots operating in a large area may become or be a wireless repeater. A robot acting as a wireless router or wireless repeater may be particularly useful in areas where a cable for installation of a wireless router or repeater may not be easily accessible or where wireless router or repeater is only needed on special occasion. In some embodiments, the charging station of the robot or another base station may be a wireless router, that in some cases, may connect to Ethernet.

In some embodiments, the robot may take on responsibilities of a wireless router or switches and routers that may be beyond the accessible network (such as inside a service provider) when acting as a wireless router. In some embodiments, one of those responsibilities may include traffic queuing based on the classifications and markings of packets, or otherwise the ordering of different types of traffic to be sent to LAN or WAN. Examples of queuing may include Low Latency Queuing (LLQ) which may be effective in eliminating variable delay, jitter, and packet loss on a network by creating a strict-priority queue for preferred traffic. Other techniques that may be used include first in first out (FIFO), first in last out (FILO), etc. Some embodiments may employ link fragmentation interleaving (LFI) wherein larger data packets may be segmented into smaller fragments and some highly critical and urgent packets may be sent in between newly fragmented data packets. This may prevent large packets from occupying a link for a long time, thereby causing urgent data to expire. In some cases, classification, marking, and enforcing queuing strategies may be executed at several points along the network. In embodiments, wherein the robot may enforce markings or the network respects the markings, it may be useful for the robot to set the markings. However, in situations wherein the service provider may not honor the markings, it may be better for the service provider to set the markings.

In some embodiments, the robot may have workgroup bridge (WGB) capabilities. In some embodiments, a WGB is an isolated network that requires access to the rest of the network for access to a server farm or internet, such as in the case where a cell phone is used as a wireless router. In some embodiments, the robot may have cellular access which may be harnessed such that the robot may act as a wireless router. In some embodiments, the robot may become a first node in an ad hoc work group that listens for other robots joining. In some embodiments, connection of other robots or devices may be prevented or settings and preferences may be configured to avoid an unwanted robot or device from taking control of the robot.

In some embodiments, the robot may include voice and video capability. For example, the robot may be a pod or an autonomous car with voice and video capability. A user may be able to instruct (verbally or using an application paired with the autonomous car) the autonomous car to turn on, drive faster or at a particular speed, take a next or particular exit, go shopping or to a particular store, turn left, go to the nearest gas station, follow the red car in the front of it, read the plate number of the yellow car in the front it out loud, or store the plate number of the car in the front in database. In another example, a user may verbally instruct a pod to be ready for shopping in ten minutes. In some embodiments, a user may provide an instruction directly to the robot or to a home assistant or an application paired with the pod, which may then relay the instruction to the robot. In another example, a policeman sitting within a police car may verbally instruct the car to send the plate number of a particular model of car positioned in front of the police car for a history check. In one example, a policeman may remotely verbally command a fleet of autonomous police cars to find and follow a particular model of car with a particular plate number or portion of a plate number (e.g., a plate number including the numbers 3 and 5). The fleet of police cars may run searches on surrounding cars to narrow down a list of cars to follow. In some cases, the search for the particular car may be executed by other police cars outside of the fleet or a remote device. In some cases, the search for the particular car may executed by closed circuit cameras throughout a city that may flag suspect cars including the particular plate number of portion of the plate number. Some embodiments may determine the police car that may reach a suspect car the fastest based on the nearest police car in the fleet relative to the location of the camera that flagged the suspect car and the location of the suspect car. In some cases, the suspect car may be followed by a police car or by another device within the fleet. For example, a suspect car may pass a first mechanically rotatable camera. The first camera may predict the path of the suspect car and may command a next camera to adjust its FOV to capture an expected position of the suspect car and such there is no a blind spot in between the two cameras. In some embodiments, the cameras may be attached to a wall, a wheeled autonomous car, a drone, a helicopter, a fighter jet, a passenger jet, etc.

In some embodiments, instructions to the robot may be provided verbally, through user inputs using a user interface of the robot or an application paired with the robot, a gesture captured by a sensor of the robot, a physical interaction with the robot or communication device paired with the robot (e.g., double tapping the robot), etc. In some embodiments, the user may set up gestures via an application paired with the robot or a user interface of the robot. In some embodiments, the robot may include a home assistant, an application, or smart phone capabilities in combination or individually.

In some embodiments, the robot may include mobility, screen, voice, and video capabilities. In some embodiments, the robot may be able to call or communicate with emergency services (e.g., 911) upon receiving an instruction from the user (using methods described above) or upon detecting an emergency using sensors, such as image, acoustic, or temperature sensors. In some embodiments, the robot may include a list of contacts, similar to a list of contacts stored in a cell phone or video conferencing application. In some embodiments, each contact may have a status (e.g., available, busy, away, idle, active, online, offline, last activity some number of minutes ago, a user defined status, etc.). In some embodiments, the robot may include cellular connectivity that it may use for contacting a contact, accessing the internet, etc. In some embodiments, the robot may pair with a smart device or a virtual assistant for contacting a contact and accessing the internet and other features of the smart device or virtual assistant. In some embodiments, each contact and their respective status may be displayed by a graphical user interface of the robot or an application paired with the robot. In some embodiments, contacts may be contacted with a phone call, video call, chat, group chat, or another means. A video call or group chat may include communication between a group of participants. In some embodiments, a history of communication may be configured to be accessible after participants have left a communication session or erased. In some embodiments, chat, voice, or video messages may be sent to contacts currently offline. In some embodiments, voice call protocols, such as G.711 a-law, mu-law, G.722 Wideband, G.729A, G.729B, iLBC (Internet Low Bandwidth Codec), and iSAC (Internet Speech Audio Codec), may be used.

In some embodiments, the robot (or an AI system) may initiate selections upon encountering an Interactive Voice Response (IVR) system during a call. For example, a robot may initiate a selection of English upon encountering an IVR system prompting a selection of a particular number for each different language prior to putting the user on the line, given that the robot knows the user prefers English. In other cases, the robot may perform other actions such as entering a credit card number, authentication for the user, and asking a question saved by the user and recording the answer. In one example, the user may verbally instruct the robot to call their bank and ask them to update their address. The robot may execute the instruction using the IVR system of the bank without any intervention from the user. In another example, the user may instruct the robot to call their bank and connect them to a representative. The robot may call the bank, complete authentication of the user, and IVR selection phase, and then put the user through to the representative such that the user has minimal effort.

In some embodiments, the robot may be a mobile virtual assistant or may integrate with other virtual voice assistants (e.g., Siri, Google home, or Amazon Alexa). Alternatively, the robot may carry an external virtual voice assistant. In some embodiments, the robot may be a visual assistant and may respond to gestures. In some embodiments, the robot may respond to a set of predefined gestures. In some embodiments, gestures may be processed locally or may be sent to the cloud for processing.

In some embodiments, the robot may include speakers and a microphone. In some embodiments, audio data from the peripherals interface may be received and converted to an electrical signal that may be transmitted to the speakers. In some embodiments, the speakers may convert the electrical signals to audible sound waves. In some embodiments, audio sound waves received by the microphone may be converted to electrical pulses. In some embodiments, audio data may be retrieved from or stored in or transmitted to memory and/or RF signals.

In some embodiments, an audio signal may be a waveform received through a microphone. In some embodiments, the microphone may convert the audio signal into digital form. In some embodiments, a set of key words may be stored in digital form. In some embodiments, the waveform information may include information that may be stored or conveyed. For example, the waveform information may be used to determine which person is being addressed in the audio input. The processor of the robot may use such information to ensure the robot only responds to the correct people for the correct reasons. For instance, the robot may execute a command to order sugar when the command is provided by any member of a family living within a household but may ignore the command when provided by anyone else.

In some embodiments, a voice authentication system may be used for voice recognition. In some embodiments, voice recognition may be performed after recognitions of a keyword. In some embodiments, the voice authentication system may be remote, such as on the cloud, wherein the audio signal may travel via wireless, wired network, or internet to a remote host. In some embodiments, the voice authentication system may compare the audio signal with a previously recorded voice pattern, voice print, or voice model. In alternative embodiments, a signature may be extracted from the audio signal and the signature may be sent to the voice authentication system and the voice authentication system may compare the signature against a signature previously extracted from a recorded voice sample. Some signatures may be stored locally for high speed while others may be offloaded. In some embodiments, low resolution signatures may first be compared, and if the comparison fails, then high resolution signatures may be compared, and if the comparison fails again, then the actual voices may be compared. In some cases, it may be necessary that the comparison is executed in more than one remote host. For example, one host with insufficient information may recursively ask another remote host to execute the comparison. In some embodiments, the voice authentication system may associate a user identification (ID) with a voice pattern when the audio signal or signature matches a stored voice pattern, voice print, voice model, or signature. In embodiments, wherein the voice authentication system is executed remotely, the user ID may be sent to the robot or to another host (e.g., to order a product). The host may be any kind of server set up on a Local Area Network (LAN), a Wide Area Network (WAN), the internet, or cloud. For example, the host may be a File Transfer Protocol (FTP) server communicating on Internet Protocol (IP) port 21, a web server communicating on IP port 80, or any server communicating on any IP port. In some embodiments, the information may be transferred through Transmission Control Protocol (TCP) for connection oriented communication or User Datagram Protocol (UDP) for best effort based communication. In some embodiments, the voice authentication system may execute locally on the robot or may be included in another computing device located within the vicinity. In some embodiments, the robot may include sufficient processing power for executing the voice authentication system or may include an additional MCU/CPU (e.g., dedicated MCU/CPU) to perform the authentication. In some embodiments, session between the robot and a computing device may be established. In some embodiments, a protocol, such as Signal Initiation Protocol (SIP) or Real-time Transport Protocol (RTP), may govern the session. In some embodiments, there may be a request to send a recorded voice message to another computing device. For example, a user may say "John, don't forget to buy the lemon" and the processor of the robot may detect the audio input and automatically send the information to a computing device (e.g., mobile device) of John.

In some embodiments, a speech-to-text system may be used to transform a voice to text. In some embodiments, the keyword search and voice authentication may be executed after the speech-to-text conversion. In some embodiments, speech-to-text may be performed locally or remotely. In some embodiments, a remotely hosted speech-to-text system may include a server on a LAN, WAN, the cloud, the internet, an application, etc. In some embodiments, the remote host may send the generated text corresponding to the recorded speech back to the robot. In some embodiments, the generated text may be converted back to the recorded speech. For example, a user and the robot may interact during a single session using a combination of both text and speech. In some embodiments, the generated text may be further processed using natural language processing to select and initiate one or more local or remote robot services. In some embodiments, the natural language processing may invoke the service needed by the user by examining a set of availabilities in a lookup table stored locally or remotely. In some embodiments, a subset of availabilities may be stored locally (e.g., if they are simpler or more used or if they are basic and can be combined to have a more complex meaning) while more sophisticated requests or unlikely commands may need to be looked up in the lookup table stored on the cloud. In some embodiments, the item identified in the lookup table may be stored locally for future use (e.g., similar to websites cached on a computer or Domain Name System (DNS) lookups cached in a geographic region). In some embodiments, a timeout based on time or on storage space may be used and when storage is filled up a re-write may occur. In some embodiments, a concept similar to cookies may be used to enhance the performance. For instance, in cases wherein the local lookup table may not understand a user command, the command may be transmitted via wireless or wired network to its uplink and a remotely hosted lookup table. The remotely hosted lookup table may be used to convert the generated text to a suitable set of commands such that the appropriate service requested may be performed. In some embodiments, a local/remote hybrid text conversion may provide the best results.

In some embodiments, when the robot hears its name, the voice input into the microphone array may be transmitted to the CPU. In some embodiments, the processor may estimate the distance of the user based on various information and may localize the robot against the user or the user against the robot and intelligently adjust the gains of the microphones. In some embodiments, the processor may use machine learning techniques to de-noise the voice input such that it may reach a quality desired for speech-to-text conversion. In some embodiments, the robot may constantly listen and monitor for audio input triggers that may instruct or initiate the robot to perform one or more actions. For example, the robot may turn towards the direction from which a voice input originated for a better user-friendly interaction, as humans generally face each other when interacting. In some embodiments, there may be multiple devices including a microphone within a same environment. In some embodiments, the processor may continuously monitor microphones (local or remote) for audio inputs that may have originated from the vicinity of the robot. For example, a house may include one or more robots with different functionalities, a home assistant such as an Alexa or Google home, a computer, a telepresence device such as the Facebook portal which may all be configured to include sensitivity to audio input corresponding with the name of the robot, in addition to their own respective names. This may be useful as the robot may be summoned from different rooms and from areas different than the current vicinity of the robot. Other devices may detect the name of the robot and transmit information to the processor of the robot including the direction and location from which the audio input originated or was detected or an instruction. For example, a home assistant, such as an Alexa, may receive an audio input of "Bob come here" for a user in close proximity. The home assistant may perceive the information and transmit the information to the processor of Bob (the robot) and since the processor of Bob knows where the home assistant is located, Bob may navigate to the home assistant as it may be the closest "here" that the processor is aware of. From there, other localization techniques may be used or more information may be provided. For instance, the home assistant may also provide the direction from which the audio input originated.

In some embodiments, the processor of the robot may monitor audio inputs, environmental conditions, or communications signals, and a particular observation may trigger the robot to initiate stationary services, movement services, local services, or remotely hosted services. In some embodiments, audio input triggers may include single words or phrases. In some embodiments, the processor may search an audio input against a predefined set of trigger words or phrases stored locally on the robot to determine if there is a match. In some embodiments, the search may be optimized to evaluate more probable options. In some embodiments, stationary services may include a service the robot may provide while remaining stationary. For example, the user may ask the robot to turn the lights off and the robot may perform the instruction without moving. This may also be considered a local service as it does not require the processor to send or obtain information to or from the cloud or internet. An example of a stationary and remote service may include the user asking the robot to translate a word to a particular language as the robot may execute the instruction while remaining stationary. The service may be considered remote as it requires the processor to connect with the internet and obtain the answer from Google translate. In some embodiments, movement services may include services that require the robot to move. For example, the user may ask the robot to bring them a coke and the robot may drive to the kitchen to obtain the coke and deliver it to a location of the user. This may also be considered a local service as it does not require the processor to send or obtain information to or from the cloud or internet.

In some embodiments, the processor of the robot may intelligently determine when the robot is being spoken to. This may include the processor recognizing when the robot is being spoken to without having to use a particular trigger, such as a name. For example, having to speak the name Amanda before asking the robot to turn off the light in the kitchen may be bothersome. It may be easier and more efficient for a user to say "lights off" while pointing to the kitchen. Sensors of the robot may collect data that the processor may use to understand the pointing gesture of the user and the command "lights off". The processor may respond to the instruction if the processor has determined that the kitchen is free of other occupants based on local or remote sensor data. In some embodiments, the processor may recognize audio input as being directed towards the robot based on phrase construction. For instance, a human is not likely to ask another human to turn the lights off by saying "lights off", but would rather say something like "could you please turn the lights off?" In another example, a human is not likely to ask another human to order sugar by saying "order sugar", but would rather say something like "could you please buy some more sugar?" Based on the phrase construction the processor of the robot recognizes that the audio input is directed toward the robot. In some embodiments, the processor may recognize audio input as being directed towards the robot based on particular words, such as names. For example, an audio input detected by a sensor of the robot may include a name, such as John, at the beginning of the audio input. For instance, the audio input may be "John, could you please turn the light off?" By recognizing the name John, the processor may determine that the audio input is not directed towards the robot. In some embodiments, the processor may recognize audio input as being directed towards the robot based on the content of the audio input, such as the type of action requested, and the capabilities of the robot. For example, an audio input detected by a sensor of the robot may include an instruction to turn the television on. However, given that the robot is not configured to turn on the television, the processor may conclude that the audio input is not directed towards the robot as the robot is incapable of turning on the television and will therefore not respond. In some embodiments, the processor of the robot may be certain audio inputs are directed towards the robot when there is only a single person living within a house. Even if a visitor is within the house, the processor of the robot may recognize that the visitor does not live at the house and that it is unlikely that they are being asked to do a chore. Such tactics described above may be used by the processor to eliminate the need for a user to add the name of the robot at the beginning of every interaction with the robot.

In some embodiments, different users may have different authority levels that limit the commands they may provide to the robot. In some embodiments, the processor of the robot may determine loyalty index or bond corresponding to different users to determine the order of command and when one command may override another based on the loyalty index or bond. Such methods are further described in U.S. patent application Ser. Nos. 15/986,670, 14/820,505, and 16/221,425, the entire contents of which are hereby incorporated by reference.

In some embodiments, a user may instruct the robot to navigate to a location of the user or to another location by verbally providing an instruction to the robot. For instance, the user may say “come here” or “go there” or “got to a specific location”. For example, a person may verbally provide the instruction “come here” to a robotic shopping cart to place bananas within the cart and may then verbally provide the instruction “go there” to place a next item, such as grapes, in the cart. In other applications, similar instructions may be provided to robots to, for example, help carry suitcases in an airport, medical equipment in a hospital, fast food in a restaurant, or boxes in a warehouse. In some embodiments, a directional microphone of the robot may detect from which direction the command is received from and the processor of the robot may recognize key words such as “here” and have some understanding of how strong the voice of the user is. In some embodiments, electroacoustic devices such as speakers or other audio components and/or electromechanical devices that convert energy into linear motion such as a motor, solenoid, electroactive polymer, piezoelectric actuator, electrostatic actuator, or other tactile output generating component may be used. In some cases, a directional microphone may be insufficient or inaccurate if the user is in a different room than the robot. Therefore, in some embodiments, different or additional methods may be used by the processor to localize the robot relative to the verbal command of “here”. In one method, the user may wear a tracker that may be tracked at all times. For more than one user, each tracker may be associated with a unique user ID. In some embodiments, the processor may search a database of voices to identify a voice, and subsequently the user, providing the command. In some embodiments, the processor may use the unique tracker ID of the identified user to locate the tracker, and hence the user that provided the verbal command, within the environment. In some embodiments, the robot may navigate to the location of the tracker. In another method, cameras may be installed in all rooms within an environment. The cameras may monitor users and the processor of the robot or another processor may identify users using facial recognition or other features. In some embodiments, the processor may search a database of voices to identify a voice, and subsequently the user, providing the command. Based on the camera feed and using facial recognition, the processor may identify the location of the user that provided the command. In some embodiments, the robot may navigate to the location of the user that provided the command. In one method, the user may wear a wearable device (e.g., a headset or watch) with a camera. In some embodiments, the processor of the wearable device or the robot may recognize what the user sees from the position of “here” by extracting features from the images or video captured by the camera. In some embodiments, the processor of the robot may search its database or maps of the environment for similar features to determine the location surrounding the camera, and hence the user that provided the command. The robot may then navigate to the location of the user. In another method, the camera of the wearable device may constantly localize itself in a map or spatial representation of the environment as understood by the robot. The processor of the wearable device or another processor may use images or videos captured by the camera and overlays them on the spatial representation of the environment as seen by the robot to localize the camera. Upon receiving a command from the user, the processor of the robot may then navigate to the location of the camera, and hence the user, given the localization of the camera. Other methods that may be used in localizing the robot against the user include radio localization using radio waves, such as the location of the robot in relation to various radio frequencies, a Wi-Fi signal, or a sim card of a device (e.g., apple watch). In another example, the robot may localize against a user using heat sensing. A robot may follow a user based on readings from a heat camera as data from a heat camera may be used to distinguish the living (e.g., humans, animals, etc.) from the non-living (e.g., desks, chairs, and pillars in an airport). In embodiments, privacy practices and standards may be employed with such methods of localizing the robot against the verbal command of “here” or the user.

In some embodiments, the robot may include a voice command center. In some embodiments, a voice command received by a microphone of the robot may be locally translated to a text command or may be sent to the cloud for analysis and translation into text. In some embodiments, a command from a set of previously known commands (or previously used commands) may processed locally. In some embodiments, the voice command may be sent to the cloud if not understood locally. In some embodiments, the robot may receive voice commands intended for the robot or for other devices within an environment. In some embodiments, speech-to-text functionality may be performed and/or validated by the backend on the cloud or locally on the robot. In some embodiments, the backend component may be responsible for interpreting intent from a speech input and/or operationalizing the intent into a task. In some embodiments, a limited number of well known commands may be stored and interpreted locally. In some embodiments, a limited number of previously used commands may be stored and interpreted locally based on the previous interpretations that were executed on the cloud. In digitized audio, digital signals use numbers to represent levels of voice instead of a combination of electrical signals. For example, the process of digitizing a voice includes changing analog voice signals into a series of numbers that may be used to reassemble the voice at the receiving end. In some embodiments, the robot and other devices (mobile or static) may use a numbering plan, such as the North American Numbering Plan (NANP) which uses the E.164 standard to break numbers down into country code, area code, central office or exchange code, and station code. Other methods may be used. For example, the NANP may be combined with the International Numbering Plan, which all countries abide by for worldwide communication.

In some embodiments, the robot may carry voice and/or video data. In embodiments, the average human ear may hear frequencies from 20-20,000 Hz while human speech may use frequencies from 200-9,000 Hz. Some embodiments may employ the G.711 standard, an International Telecommunications Union (ITU) standard using pulse code modulation (PCM) to sample voice signals at a frequency of 8,000 samples per second. Two common types of binary conversion techniques employed in the G.711 standard include u-law (used in the United States, Canada, and Japan) and a-law (used in other locations). Some embodiments may employ the G.729 standard, an ITU standard that samples voice signals at 8,000 samples per second with bit rate fixed at 8 bits per sample and is based on Nyquist rate theorem. In embodiments, the G.729 standard uses compression to achieve more throughput, wherein the compressed voice signal only needs 8 Kbps per call as opposed to 64 Kbps per call in the G.711 standard. The G.729 codec standard allows eight voice calls in same bandwidth required for just one voice call in the G.711 codec standard. In embodiments, the G.729 standard uses a conjugative-structure algebraic-code-excided liner prediction (CS-ACELP) and alternates sampling methods and algebraic expressions as a codebook to predict the actual numeric representation. Therefore, smaller algebraic expressions sent are decoded on the remote site and the audio is synthesized to resemble the original audio tones. In some cases, there may be degradation of quality associated with audio waveform prediction and synthetization. Some embodiments may employ the G.729a standard, another ITU standard that is a less complicated variation of G.729 standard as it uses a different type of algorithm to encode the voice. The G.729 and G.729a codecs are particularly optimized for human speech. In embodiments, data may be compressed down to 8 Kbps stream and the compressed codecs may be used for transmission of voice over low speed WAN links. Since codecs are optimized for speech, they often do not provide adequate quality for music streams. A better quality codec may be used for playing music or sending music or video information. In some cases, multiple codecs may be used for sending different types of data. Some embodiments may use H.323 protocol suite created by ITU for multimedia communication over network based environments. Some embodiments may employ H.450.2 standard for transferring calls and H.450.3 standard for forwarding calls. Some embodiments may employ Internet Low Bitrate Codec (ILBC), which uses either 20 ms or 30 ms voice samples that consume 15.2 Kbps or 13.3 Kbps, respectively. The ILBC may moderate packet loss such that a communication may carry on with little notice of the loss by the user. Some embodiments may employ internet speech audio codec which uses a sampling frequency of 16 kHz or 32 kHz, an adaptive and variable bit rate of 10-32 Kbps or 10-52 Kbps, an adaptive packet size 30-60 ms, and an algorithmic delay of frame size plus 3 ms. Several other codecs (including voice, music, and video codecs) may be used, such as Linear Pulse Code Modulation, Pulse-density Modulation, Pulse-amplitude Modulation, Free Lossless Audio Codec, Apple Lossless Audio Codec, monkey's audio, OptimFROG, WavPak, True Audio, Windows Media Audio Lossless, Adaptive differential pulse-code modulation, Adaptive Transform Acoustic Coding, MPEG-4 Audio, Linear predictive coding, Xvid, FFmpeg MPEG-4, and DivX Pro Codec. In some embodiments, a Mean Opinion Score (MOS) may be used to measure the quality of voice streams for each particular codec and rank the voice quality on a scale of 1 (worst quality) to 5 (excellent quality).

In some embodiments, a packet traveling from the default gateway through layer 3 may be treated differently depending on the underlying frame. For example, voice data may need to be treated with more urgency than a file transfer. Similarly, voice control data such as frames to establish and keep a voice call open may need to be treated urgently. In some embodiments, a voice may be digitized and encapsulated into Internet Protocol (IP) packets to be able to travel in a data network. In some embodiments, to digitize a voice, analog voice frequencies may be sampled, turned into binary, compressed, and sent across an IP network. In the process, bandwidth may be saved in comparison to sending the analog waveform over the wire. In some embodiments, distances of voice travel may be scaled as repeaters on the way may reconstruct the attenuated signals, as opposed to analog signals that are purely electrical on the wire and may become degraded. In analog transmission of voice, the noise may build up quickly and may be retransmitted by the repeater along with the actual voice signals. After the signal is repeated several times, a considerable amount of electrical noise may accumulate and mix with the original voice signal carried. In some embodiments, after digitization, multiple voice streams may be sent in more compact form.

In some embodiment, three steps may be used to transform an analog signal (e.g., a voice command) into a compressed digital signal. In some embodiments, a first step may include sampling the analog signal. In some embodiments, the sample size and the sample frequency may depend the desired quality, wherein a larger sample size and greater sampling frequency may be used for increased quality. For example, a higher sound quality may be required for music. In some embodiments, a sample may fit into 8 bits, 16 bits, 32 bits, 64 bits, and so forth. In some cases, standard analogue telephones may distinguish sound waves from 0-4000 Hz. To mimic this this frequency range, the human voice may be sampled 8000 times per second using Harry Nyquist concept, wherein the max data rate (in bits/sec) may be determined using $2 \times B \times \log_2 V$, wherein B is bandwidth and V is the number of voltage levels. Given that 4000 Hz may approximately be the highest theoretical frequency of the human voice, and that the average human voice may approximately be within the range of 200-2800 Hz, sampling a human voice 8000 times per second may reconstruct an analogue voice equivalent fairly well while using sound waves within the range of 0-299 Hz and 3301-4000 Hz for out-of-band signaling. In some embodiments, Pulse Amplitude Modulation (PAM) may be performed on a waveform to obtain a slice of the wavelength at a constant number of 8000 intervals per second. In some embodiments, a second step of converting an analog signal into a compressed digital signal may include digitization. In some embodiments, Pulse Code Modulation (PCM) may be used to digitize a voice by using quantization to encode the analog waveform into digital data for transport and decode the digital data to play it back by applying voltage pulses to a speaker mimicking the original analog voice. In some embodiments, after completing quantization, the digital data may be converted into a binary format that may be sent across a wire as a series of zeroes and ones (i.e., bits), wherein different series represent different numeric values. For example, 8000 samples per second sampling rate may be converted into an 8-bit binary number and sent via a 64 Kbps of bandwidth (i.e., 8000 samples×8 bits per sample=64000 bits). In some embodiments, a codec algorithm may be used for encoding an analog signal into digital data and decoding digital data to reproduce the analog signal. In embodiments, the quality of the encoded waveforms and the size of the encoded data stream may be different depending on the codec being used. For example, a smaller size of an encoded data stream may be preferable for a voice. Examples of codecs that may be used include u-law (used in the United States, Canada, and Japan) and a-law. In some embodiments, transcoding may be used to translate one codec into another codec. In some cases, codecs may not be compatible. In some embodiments, some resolution of the voice may be naturally lost when an analogue signal is digitized. For example, fewer bits may be used to save on the data size, however this may result in less quality. In some embodiments, a third step of converting an analog signal into a compressed digital signal may include compression. In some embodiments, compression may be used to eliminate some redundancy in the digital data and save bandwidth and computational cost. While most compression algorithms are lossy, some compression algorithms may be lossless. For example, with smaller data streams more individual data streams may be sent across the same bandwidth. In some embodiments, the compressed digital signal may be encapsulated into Internet Protocol (IP) packets that may be sent in an IP network.

In some embodiments, several factors may affect transmission of voice packets. Examples of such factors may include packet count, packet delay, packet loss, and jitter (delay variations). In some embodiments, echo may be created in instances wherein digital voice streams and packets travelling from various network paths arrive out of order. In some embodiments, echo may be the repetition of sound that arrives to the listener a period of time after the original sound is heard.

In some embodiments, Session Initiation Protocol (SIP), an IETF RFC 3261 standard signaling protocol designed for management of multimedia sessions over the internet, may be used. The SIP architecture is a peer-to-peer model in theory. In some embodiments, Real-time Transport Protocol (RTP), an IETF RFC 1889 and 3050 standard for the delivery of unicast and multicast voice/video streams over an IP network using UDP for transport, may be used. UDP, unlike TCP, may be an unreliable service and may be best for voice packets as it does not have a retransmit or reorder mechanism and there is no reason to resend a missing voice signal out of order. Also, UDP does not provide any flow control or error correction. With RTP, the header information alone may include 40 bytes as the RTP header may be 12 bytes, the IP header may be 20 bytes, and the UDP header may be 8 bytes. In some embodiments, Compressed RTP (cRTP) may be used, which uses between 2-5 bytes. In some embodiments, Real-time Transport Control Protocol (RTCP) may be used with RTP to provide out-of-band monitoring for streams that are encapsulated by RTP. For example, if RTP runs on UDP port 22864, then the corresponding RTCP packets run on the next UDP port 22865. In some embodiments, RTCP may provide information about the quality of the RTP transmissions. For example, upon detecting a congestion on the remote end of the data stream, the receiver may inform the sender to use a lower-quality codec.

In some embodiments, a Voice Activity Detection (VAD) may be used to save bandwidth when voice commands are given. In some embodiments, VAD may monitor a voice conversation and may stop transmitting RTP packets across the wire upon detecting silence on the RTP stream (e.g., 35-40% of the length of the voice conversation). In some embodiments, VAD may communicate with the other end of the connection and may play a prerecorded silence packet instead of carrying silence data.

Similar to voice data, an image may be sent over the network. In some instances, images may not be as sensitive as voice data as the loss of a few images on their way through network may not cause a drastic issue. However, images used to transfer maps of the environment or special images forming the map of the environment may be more sensitive. In some embodiments, images may not be the only form of data carrying a map. For example, an occupancy grid map may be represented as an image or may use a different form of data to represent the occupancy grid map, wherein the grid map may be a Cartesian division of the floor plane of the robot. In some embodiments, each pixel of an image may correspond to a cell of the grid map. In some embodiments, each pixel of the image may represent a particular square size on the floor plane, the particular square size depending on the resolution. In some embodiments, the color depth value of each pixel may correspond to a height of the floor plane relative to a ground zero plane. In some embodiments, derivative of pixel values of two neighboring pixels of the image (e.g., the change in pixel value between two neighboring pixels) may correspond to traversability from one cell to the neighboring cell. For example, a hard floor of a basement of a building may have a value of zero for height, a carpet of the basement may have a value of one for height, a ceiling of the basement may have a value of 18 for height, and a ground floor of the building may have a value of 20 for height. The transition from the hard floor with a height of zero and the carpet with a height of one may be deemed a traversable path. Given the height of the ceiling is 18 and the height of the ground floor is 20, the thickness of the ceiling of the basement may be known. Further, these heights may allow multiple floors of a same building to be represented, wherein multiple floor planes may be distinguished from one another based on their height (e.g., floor planes of a high rise). In embodiments describing a map using an image, more than gray scale may be used in representing heights of the floor plane in different areas. Similarly, any of RGB may be used to represent other dimensions of each point of the floor plane. For example, another dimension may be a clean or dirty status, thus providing probability of an area needing cleaning. In other examples, another dimension may be previous entanglements or previous encounters with a liquid or previous dog accidents.

Given the many tools available for processing an image, many algorithms and choices may exist for processing the map. In some embodiments, maps may be processed in coarse to fine resolution to obtain a rough hypothesis. In some embodiments, the rough hypothesis may be refined and/or tested for the correctness of the rough hypothesis by increasing the resolution. In some embodiments, fine to coarse resolution may maintain a high resolution perception and localization that may be used as ground truth. In some embodiments, image data may be sampled at different resolutions to represent the real image.

Similar concerns as those previously discussed for carrying voice packets exist for carrying images. Map control packets may have drastically less developed protocols. In some embodiments, protocols may be used to help control packet count, packet delay, packet loss, and jitter (delay variations). In some embodiments, there may be a delay in the time it takes a packet to arrive to final destination from a source. This may be caused by lack of bandwidth or length of physical distance between locations. In some cases, multiple streams of voice and data traffic competing for a limited amount of bandwidth may cause various kinds of delays. In some embodiments, there may be a fixed delay in the time it takes the packet to arrive to the final destination. For example, it may take a certain amount of time for a packet to travel a specific geographical distance. In some embodiments, QoS may be used to request preferred treatment from the service provider for traffic that is sensitive. In some embodiments, this may reduce other kinds of delay. One of these delays may include a variable delay which is a delay that may be influenced by various factors. In some embodiments, the request may be related to how data is queued in various devices throughout a journey as it impacts the wait time in interface queues of various devices. In some embodiments, changing queuing strategies may help lower variable delays, such as jitter or other variations of delay, such as packets that have different amounts of delay traveling the cloud or network. For example, a first packet of a conversation might take 120 ms to reach a destination while the second packet may take 110 ms to reach the destination.

In some embodiments, packets may be lost because of a congested or unreliable network connection. In some embodiments, particular network requirements for voice and video data may be employed. In addition to bandwidth requirements, voice and video traffic may need an end-to-end one way delay of 150 ms or less, a jitter of 30 ms or less, and a packet loss of 1% or less. In some embodiments, the bandwidth requirements depend on the type of traffic, the codec on the voice and video, etc. For example, video traffic consumes a lot more bandwidth than voice traffic. Or in another example, the bandwidth required for SLAM or mapping data, especially when the robot is moving, is more than a video needs, as continuous updates need to go through the network. In another example, in a video call without much movement, lost packets may be filled using intelligent algorithms whereas in a stream of SLAM packets this cannot be the case. In some embodiments, maps may be compressed by employing similar techniques as those used for image compression.

In some embodiments, classification and marking of a packet may be used such network devices may easily identify the packet as it crosses the network. In some embodiments, a first network device that receives the packet may classify or mark the packet. In some embodiments, tools such as access controls, the source of the traffic, or inspection of data up to the application layer in the OSI model may be used to classify or mark the packet. In some cases, inspections in upper layers of the OSI model may be more computationally intensive and may add more delay to the packet. In some embodiments, packets may be labeled or marked after classification. In some embodiments, marking may occur in layer 2 of the OSI model (data link) header (thus allowing switches to read it) and/or layer 3 of the OSI model (network) header (thus allowing routers to read it). In some embodiments, after the packet is marked and as it travels through the network, network devices may read the mark of the packet to classify the packet instead of examining deep into the higher layers of the OSI model. In some embodiments, advanced machine learning algorithms may be used for traffic classification or identifying time-sensitive packets instead of manual classification or identification. In some embodiments, marking of a packet may flag the packet as a critical packet such that the rest of the network may identify the packet and provide priority to the packet over all other traffic. In some embodiments, a packet may be marked by setting a Class of Service (CoS) value in the layer 2 Ethernet frame header, the value ranging from zero to seven. The higher the CoS value, the higher priority of the packet. In some embodiments, a packet may receive a default mark when different applications are running on the robot. For example, when the robot is navigating and collaborating with another robot, or if a video or voice call is in progress, data may be marked with a higher value than when other traffic is being sent. In some embodiments, a mark of a value of zero may indicate no marking. In some embodiments, marking patterns may emerge over time as the robot is used over time.

In some embodiments, additional hardware may be implemented to avoid congestion. In some embodiments, preemptive measures, such as dropping packets that may be non-essential (or not as essential) traffic to the network, may be implemented to avoid heavy congestion. In some embodiments, a packet that may be dropped may be determined when there is congestion and bandwidth available. In some embodiments, the dropping excess traffic may be known as policing. In some embodiments, shaping queues excess traffic may be employed wherein packets may be sent at a later time or slowly.

In some embodiments, metadata (e.g., keywords, tags, descriptions) associated with a digital image may be used to search for an image within a large database. In some embodiments, content-based image retrieval (CBIR) may be used wherein computer vision techniques may be used to search for a digital image in a large database. In some embodiments, CBIR may analyze the contents of the image, such as colors, shapes, textures, or any other information that may be derived from the image. In some embodiments, CBIR may be desirable as searches that rely on metadata may be dependent on annotation quality and completeness. Further, manually annotating images may be time consuming, keywords may not properly describe the image, and keywords may limit the scope of queries to a set of predetermined criteria.

In some embodiments, a vector space model used for representing and searching text documents may be applied to images. In some embodiments, text documents may be represented with vectors that are histograms of word frequencies within the text. In some embodiments, a histogram vector of a text document may include the number of occurrences of every word within the document. In some embodiments, common words (e.g., the, is, a, etc.) may be ignored. In some embodiments, histogram vectors may be normalized to unit length by dividing the histogram vector by the total histogram sum since documents may be of different lengths. In some embodiments, the individual components of the histogram vector may be weighted based on the importance of each word. In some embodiments, the importance of the word may be proportional to the number of times it appears in the document, or otherwise the term frequency of the word. In some embodiments, the term frequency ($tf_{w,d}$) of a word (w) in a document (d) may be determined using $$tf_{w,d} = \frac{n_w}{\sum_j n_j},$$

wherein $n_w$ is the raw count of a word and $\Sigma_j n_j$ is the number of words in the document. In some embodiments, the inverse document frequency ($idf_{w,d}$) may be determined using $$idf_{w,d} = \log\frac{|D|}{|\{d : w \in d\}|},$$

wherein |D| is the number of documents in the corpus D and $|\{d: w \in d\}|$ is the number of documents in the corpus that include the particular word. In some embodiments, the term frequency and the inverse document frequency may be multiplied to obtain one of the elements of the histogram vector. In some embodiments, the vector space model may be applied to image by generating words that may be equivalent to a visual representation. For example, local descriptors such as a SIFT descriptor may be used. In some embodiments, a set of words may be used as a visual vocabulary. In some embodiments, a database may be set up and images may be indexed by extracting descriptors, converting them to visual words using the visual vocabulary, and storing the visual words and word histograms with the corresponding information to which they belong. In some embodiments, a query of an image sent to a database of images may return an image result after searching the database. In some embodiments, SQL query language may be used to execute a query. In some embodiments, larger databases may provide better results. In some embodiments, the database may be stored on the cloud.

In one example, the robot may send an image to a database on which a search is required. The search within the database may be performed on the cloud and an image result may be sent to the robot. In some embodiments, different robots may have different databases. In some embodiments, a query of an image may be sent to different robots and a search in each of their databases may be performed. In some embodiments, processing may be executed on the cloud or on the robot. In some embodiments, there may not be a database, and instead an image may be obtained by a robot and the robot may search its surroundings for something similar to contents of the image. In some embodiments, the search may be executed in real time within the FOV of the robot, a fleet of robots, cameras, cameras of drones, or cameras of self-driving cars. For example, an image of a wanted person may be uploaded to the cloud by the police and each security robot in a fleet may obtain the image and search their surroundings to for something similar to the contents of the image. In some embodiments, data stored and labeled in a trained database may be used to enhance the results.

In some embodiments, a similar system may be used for searching indoor maps. For example, police may upload an image of a scene from which a partial map was derived and may send a query to a database of maps to determine which house the image may be associated with. In some cases, the database may be a database of previously uploaded maps. In some embodiments, robots in a fleet may create a map in real time (or a partial map within their FOV) to determine which house the image may be associated with. In one example, a feature in video captured within a house may be searched within a database of previously uploaded maps to determine the house within which the video was captured.

In some embodiments, similar searching techniques as described above may be used for voice data, wherein, for example, voice data may be converted into text data and searching techniques such as the vector space model may be used. In some embodiments, pre-existing applications that may convert voice data into text data may be used. In some embodiments, such applications may use neural networks in transcribing voice data to text data and may transcribe voice data in real-time or voice data saved in a file. In some embodiments, similar searching techniques as described above may be used for music audio data.

In some embodiments, a video or specially developed codec may be used to send SLAM packets within a network. In some embodiments, the codec may be used to encode a spatial map into a series of image like. In some embodiments, 8 bits may be used to describe each pixel and 256 statuses may be available for each cell representing the environment. In some cases, pixel color may not necessarily be important. In some embodiments, depending on the resolution, a spatial map may include a large amount of information, and in such cases, representing the spatial map as video stream may not be the best approach. Some examples of video codecs may include AOM Video 1, Libtheora, Dirac-Research, FFmpeg, Blackbird, DivX, VP3, VP5, Cinepak, and RealVideo.

In some embodiments, a first image may be sent and as the robot is moving the image may be changed as a result of the movement instead of the scene changing to save on bandwidth for sending data. In such a scenario, images predicted as a result of the movement of the robot do not need to be sent in full. In some embodiments, the speed of the robot may be sent along with some differential points of interest within the image in between of sending full images. In some embodiments, depending on the speed of transmission, the size of information sent, and the speed of robot, some compression may be safely employed in this way. For example, a Direct Linear Transformation Algorithm may be used to find a correspondence or similarity between two images or planes. In some embodiments, a full perspective transformation may have eight degrees of freedom. In embodiments, each correspondence point may provide two equations, one for x coordinates and one for y coordinates. In embodiments, four correspondence points may be required to compute a homography (H) or a 2D projective transformation that maps one plane x to another plane x', i.e. x'=Hx. Once an initial image and H are sent, the second image may be reconstructed at the receiving end if required. In embodiments, not all transmitted images may be needed on the receiving end. In other instances, other transformations may be used, such as an affine transformation with 6 degrees of freedom.

In some embodiments, motion and the relationship between two consecutive images may be considered when transferring maps. In some embodiments, two consecutive images may be captured by a camera of a moving robot. In some embodiments, the surroundings may be mostly stationary or movement within the surroundings may be considerably slower than the speed at which images may be captured, wherein the brightness of objects may be mostly consistent. In some embodiments, an object pixel may be represented by I(x, y, t), wherein I is an image, t is time, and x, y is a position of a pixel within the image at time $t_2=t_1+\Delta t$. In some embodiments, there may be a small difference in x and y after a small movement (or between to images captured consecutively), wherein $x_2=x_1+\Delta x$, $y_2=y_1+\Delta y$, and $I(x, y, t)\rightarrow I(x+\Delta x, y+\Delta y, t+\Delta t)$. In some embodiments, the movement vector V=[u, v] may be used in determining the time derivative of an image $\nabla I^T V=-I_t$, wherein $I_t$ is the time derivative of the image. The expanded form may be given by the Lucas-Kanade method, wherein $$\begin{bmatrix} \nabla I^T(x_1) \\ \nabla I^T(x_2) \\ \nabla I^T(x_n) \end{bmatrix} V = \begin{bmatrix} I_x(x_1) & I_y(x_1) \\ I_x(x_2) & I_x(x_2) \\ \vdots & \vdots \\ I_x(x_n) & I_y(x_n) \end{bmatrix} \begin{bmatrix} u \\ v \end{bmatrix} = -\begin{bmatrix} I_t(x_1) \\ I_t(x_1) \\ \vdots \\ I_t(x_n) \end{bmatrix}.$$

The Lucas-Kanade method assumes that the displacement of the image contents between two consecutive images is small and approximately constant within a neighborhood of the pixel under consideration. In some embodiments, the series of equations may be solved using least squares optimization. In some embodiments, this may be possible by identifying corners when points meet the quality threshold, as provided by the Shi-Tomsi good-to-track criteria. In some embodiments, transmitting an active illuminator light may help with this.

In some embodiments, the processor may determine the first derivative $$f'(x) = \frac{df}{dx}(x)$$

of an image function $f$. Positions resulting in a positive change may indicate a rise in intensity and positions resulting in a negative change may indicate a drop in intensity. In some embodiments, the processor may determine a derivative of a multi-dimensional function along one of its coordinate axes, known as a partial derivative. In some embodiments, the processor may use first derivative methods such as Prewitt and Sobel, differing only marginally in the derivative filters each method uses. In some embodiments, the processor may use linear filters over three adjacent lines and columns, respectively, to counteract the noise sensitivity of the simple (i.e., single line/column) gradient operators. In some embodiments, the processor may determine the second derivative of an image function to measures its local curvature. In some embodiments, edges may be identified at positions corresponding with a second derivative of zero in a single direction or at positions corresponding with a second derivative of zero in two crossing directions. In some embodiments, the processor may use Laplacian-of-Gaussian method for Gaussian smoothening and determining the second derivatives of the image. In some embodiments, the processor may use a selection of edge points and a binary edge map to indicate whether an image pixel is an edge point or not. In some embodiments, the processor may apply a threshold operation to the edge to classify it as edge or not. In some embodiments, the processor may use Canny Edge Operator including the steps of applying a Gaussian filter to smooth the image and remove noise, finding intensity gradients within the image, applying a non-maximum suppression to remove spurious response to edge detection, applying a double threshold to determine potential edges, and tracking edges by hysteresis, wherein detection of edges is finalize by suppressing other edges that are weak and not connected to strong edges. In some embodiments, the processor may identify an edge as a location in the image at which the gradient is especially high in a first direction and low in a second direction normal to the first direction. In some embodiments, the processor may identify a corner as a location in the image which exhibits a strong gradient value in multiple directions at the same time. In some embodiments, the processor may examine the first or second derivative of the image in the x and y directions to find corners. In some embodiments, the processor may use the Harris corner detector to detect corners based on the first partial derivatives (i.e., gradient) of the image function $$I(u,v),\ I_x(u,v)=\frac{\partial I}{\partial x}(u,v)$$

and $$I_y(u,v)=\frac{\partial I}{\partial y}(u,v).$$

In some embodiments, the processor may use Shi-Tomasi corner detector to detect corners (i.e., a junction of two edges) which detects corners by identifying significant changes in intensity in all directions. A small window on the image may be used to scan the image bit by bit while looking for corners. When the small window is positioned over a corner in the image, shifting the small window in any direction results in a large change in intensity. However, when the small window is positioned over a flat wall in the image there are no changes in intensity when shifting the small window in any direction.

While gray scale images provide a lot of information, color images provide a lot of additional information that may help in identifying objects. For instance, an advantage of color images are the independent channels corresponding to each of the colors that may be use in a Bayesian network to increase accuracy (i.e., information concluded given the gray scale | given the red channel | given the green channel | given the blue channel). In some embodiments, the processor may determine the gradient direction from the color channel of maximum edge strength using $$\Phi_{col}(u)=\tan^{-1}\left(\frac{I_{m,y}(u)}{I_{m,x}(u)}\right),$$

wherein m=argmax $E_k(u)$. In some embodiments, the processor may determine the gradient of a scalar image I at a specific position u using $$\nabla I(u)=\begin{pmatrix}\frac{\partial I}{\partial x}(u)\\ \frac{\partial I}{\partial y}(u)\end{pmatrix}.$$

In embodiments, for multiple channels, the vector of the partial derivatives of the function I in the x and y directions and the gradient of a scalar image may be a two dimensional vector field. In some embodiments, the processor may treat each color channel separately, wherein, $I=(I_R, I_G, I_B)$, and may use each separate scalar image to extract the gradients $$\nabla I_R(u)=\begin{pmatrix}\frac{\partial I_R}{\partial x}(u)\\ \frac{\partial I_R}{\partial y}(u)\end{pmatrix},\ \nabla I_G(u)=\begin{pmatrix}\frac{\partial I_G}{\partial x}(u)\\ \frac{\partial I_G}{\partial y}(u)\end{pmatrix},$$

and $$\nabla I_B(u)=\begin{pmatrix}\frac{\partial I_B}{\partial x}(u)\\ \frac{\partial I_B}{\partial y}(u)\end{pmatrix}.$$

In some embodiments, the processor may determine the Jacobian matrix using $$J_I(u)=\begin{pmatrix}(\partial I_R)^T(u)\\ (\partial I_G)^T(u)\\ (\partial I_B)^T(u)\end{pmatrix}=\begin{pmatrix}\frac{\partial I_R}{\partial x}(u) & \frac{\partial I_R}{\partial y}(u)\\ \frac{\partial I_G}{\partial x}(u) & \frac{\partial I_G}{\partial y}(u)\\ \frac{\partial I_B}{\partial x}(u) & \frac{\partial I_B}{\partial y}(u)\end{pmatrix}=(I_x(u),I_y(u)).$$

In some embodiments, the processor may determine positions u at which intensity change along the horizontal and vertical axes occurs. In some embodiments, the processor may then determine the direction of the maximum intensity change to determine the angle of the edge normal. In some embodiments, the processor may use the angle of the edge normal to derive the local edge strength. In other embodiments, the processor may use the difference between the eigenvalues, $\lambda_1-\lambda_2$, to quantify edge strength.

In some embodiments, readings taken using local sensing methods may be implemented into a local submap or a local occupancy grid submap. In some embodiments, similarities between local submaps or between a local submap and a global map may be determined. In some embodiments, matching the local submap with another local submap or with the global map may be a problem of solving probabilistic constraints that may exist between relative poses of the two maps. In some embodiments, adjacent local submaps may be stitched based on motion constraints or observation constraints. In some embodiments, the global map may serve as a reference when stitching two adjacent local submaps. For example, a single scan including two similar edge patterns confirms that two similar edge patterns exist and disqualifies the possibility that the same edge pattern was observed twice. FIG. 236A illustrates a first edge pattern 12100 and a second edge pattern 12101 that appear to be the same. If the first edge pattern 12100 and the second edge pattern 12101 are detected in a single scan, it may be concluded that both the first edge pattern Y00 and the second edge pattern 12101 exist. FIG. 236B illustrates a sensor of a robot 12102 observing the first edge pattern 12100 at time $t_1$ while at location $x_1$ and the second edge pattern 12101 at time $t_2$ while at location $x_2$. After observing the second edge pattern, the processor of the robot 12102 may determine whether the robot is back at location $x_1$ and the second edge pattern 12101 is just the first edge pattern 12100 observed or if the second edge pattern 12101 exists. If a single scan including both the first edge pattern 12100 and the second edge pattern 12101 exists, such as illustrated in FIG. 236C, the processor may conclude that the second edge pattern 12101 exists. In some embodiments, distinguishing similar patterns within the environment may be problematic as the range of sensors in local sensing may not be able to detect both patterns in a single scan, as illustrated in FIG. 236B. However, the global map may be used to observe the existence of similar patterns, such as in FIG. 236C, and disqualify a forming theory. This may be particularly important when the robot is suddenly pushed one or more map resolution cells away during operation. For example, FIG. 237 illustrates a movement path 12200 of robot 12201. If robot 12201 is suddenly pushed towards the left direction indicated by arrow 12202, the portion 12203 of movement path 12200 may shift towards the left. To prevent this from occurring, the processor of robot 12201 may readjust based on the association between features observed and features of data included the global or local map. In some embodiments, association of features may be determined using least square minimization. Examples may include gradient descent, Levenberg-Marquardt, and conjugate gradient.

In some embodiments, processors of robots may share their maps with one another. In some embodiments, the processor of a robot or a charging station (or other device) may upload the map to the cloud. In some embodiments, the processor of a robot or the charging station (or other device) may download a map (or other data file) from the cloud. FIG. 238A illustrates an example of a process of saving a map and FIG. 238B illustrates two examples of a process of obtaining the map upon a cold start of the robot. In some embodiments, maps may be stored on the cloud by creating a bucket on the cloud for storing maps from all robots. In some embodiments, http, https, or curl may be used to download and upload maps or other data files. In some embodiments, http put method or http post method may be used. In some embodiments, http post method may be preferable as it determines if a robot is a valid client by checking id, password, or role. In some embodiments, http and mqtt may use the same TCP/IP layers. In some embodiments, TCP may run different sockets for mqtt and http. In some embodiments, a filename may be used to distinguish which map file belongs to each client.

In some embodiments, processors of robots may transmit maps to one another. In some embodiments, maps generated by different robots may be combined using similar methods to those described above for combining local submaps (as described in paragraph 306), such that the perceptions of two robots may be combined into a monolithic interpretation of the environment, given that the localized position of each robot is known. For example, a combined interpretation of the environment may be useful for autonomous race cars performing dangerous maneuvers, as maneuvers performed with information limited to the immediate surroundings of an autonomous race car may be unsafe. In some embodiments, similarities between maps of different robots may be determined. In some embodiments, matching the maps of different robots may be a problem of solving probabilistic constraints that may exist between relative poses of the two maps. In some embodiments, maps may be stitched based on motion constraints or observation constraints. In some embodiments, a global map may serve as a reference when stitching two maps. In some embodiments, maps may be re-matched after each movement (e.g., linear or angular) of the robot. In some embodiments, processors of robots transmit their coordinates and movements to one another such that processors of other robots may compare their own perception of the movement against the movement of the robot received. In some embodiments, two maps may have a linear distance and a relative angular distance. In some embodiments, two maps may be spun to determine if there is a match between the data of the two maps. In some embodiments, maps may be matched in coarse to fine resolution. Coarse resolution may be used to rule out possibilities quickly and fine resolution may be used to test a hypothesis determine with coarse resolution.

In some embodiments, the map of a robot may be in a local coordinate system and may not perfectly align with maps of other robots in their own respective local coordinate system and/or the global coordinate system (or ground truth). In some embodiments, the ground truth may be influenced and changed as maps are matched and re-matched. In some embodiments, the degree of the overlap between maps of different robots may be variable as each robot may see a different perspective. In some embodiments, each robot may have a different resolution of their map, use a different technique to create their map, or have different update intervals of their map. For example, one robot may rely more on odometry than another robot or may perceive the environment using a different method than another robot or may use different algorithms to process observations of the environment and create a map. In another example, a robot with sparse sensing and an effective mapping algorithm may create a better map after a small amount of movement as compared to a robot with a 360 degrees LIDAR. However, if the maps are compared before any movement, the robot with sparse sensing may have a much more limited map.

In some embodiments, data may travel through a wired network or a wireless network. For example, data may travel through a wireless network for a collaborative fleet of artificial intelligence robots. In some embodiments, the transmission of data may begin by an AC signal generated by a transmitter. In some embodiments, the AC signal may be transmitted to an antenna of a device, wherein the AC signal may be radiated as a sine wave. During this process, current may change the electromagnetic field around the antenna such that it may transmit electromagnetic waves or signals. In embodiments, the electric field may be generated by stationary charges or current and magnetic field is perpendicular to the electric field. In embodiments, the magnetic field may be generated at the same time as the electric field, however, the magnetic field is generated by moving charges. In embodiments, electromagnetic waves may be created as a result of oscillation between an electric field and a magnetic field, forming when the electric field comes into contact with the magnetic field. In embodiments, the electric field and magnetic field are perpendicular to the direction of the electromagnetic wave. In embodiments, the highest point of a wave is a crest while the lowest point is a trough.

In some embodiments, the polarization of an electromagnetic wave describes the way the electromagnetic wave moves. In embodiments, there are three types of polarization, vertical, horizontal, and circular. With vertical polarization waves move up and down in a linear way. With horizontal polarization waves move left and right in a linear way. With circular polarization waves circle as they move forward. For example, some antennas may be vertically polarized in a wireless network and therefore their electric field is vertical. In embodiments, determining the direction of the propagation of signals from an antenna is important as malalignment may result in degraded signals. In some embodiments, an antenna may adjust its orientation mechanically by a motor or set of motors or a user may adjust the orientation of the antenna.

In some embodiments, two or more antennas on a wireless device may be used to avoid or reduce multipath issues. In some embodiments, two antennas may be placed one wavelength apart. In some embodiments, when the wireless device hears the preamble of a frame, it may compare the signal of the two antennas and use an algorithm to determine which antenna has the better signal. In some embodiments, both signal streams may be used and combined into one signal using advanced signal processing systems. In some embodiments, the antenna chosen may be used to receive the actual data. Since there is no real data during the preamble, switching the antennas does not impact the data if the system does not have the ability to interpret two streams of incoming data.

In embodiments, there are two main types of antennas, directional and omnidirectional, the two antennas differing based on how the beam is focused. In embodiments, the angles of coverage are fixed with each antenna. For example, signals of an omnidirectional antenna from the perspective of the top plane (H-plane) may be observed to propagate evenly in a 360-degree pattern, whereas the signals do not propagate evenly from the perspective of the elevation plane (E-plane). In some embodiments, signals may be related to each plane. In some embodiments, a high-gain antenna may be used to focus a beam.

In embodiments, different waveforms may have different wavelengths, wherein the wavelength is the distance between successive crests of a wave or from one point in a cycle to a next point in the cycle. For example, the wavelength of AM radio waveforms may be 400-500 m, wireless LAN waveforms may be a few centimeters, and satellite waveforms may be approximately 1 mm. In embodiments, different waveforms may have different amplitudes, wherein the amplitude is the vertical distance between two crests in the wave (i.e., the peak and trough) and represents the strength of energy put into the signal. In some cases, different amplitudes may exist for the same wavelength and frequency. In some embodiments, some of the energy sent to an antenna for radiation may be lost in a cable existing between the location in which modulation of the energy occurs and the antenna. In some embodiments, the antenna may add a gain by increasing the level of energy to compensate for the loss. In some embodiments, the amount of gain depends on the type of antenna and regulations set by FCC and ETSI for power radiation by antennas. In some embodiments, a radiated signal may naturally weaken as it travels away from the source. In some embodiments, positioning a receiving device closer to a transmitting device may result in a better and more powerful received signal. For example, receivers placed outside of a range of an access point may not receive wireless signals from the access point, thereby preventing the network from functioning. In some embodiments, increasing the amplitude of the signal may increase the distance a wave may travel. In some embodiments, an antenna of the robot may be designed to have more horizontal coverage than vertical coverage. For example, it may be more useful for the robot to be able transmit signals to other robots 15 m away from a side of the robot as compared 15 m above or below the robot.

In some embodiments, as data travels over the air, some influences may stop the wireless signal from propagating or may shorten the distance the data may travel before becoming unusable. In some cases, absorption may affect a wireless signal transmission. For instance, obstacles, walls, humans, ceiling, carpet, etc. may all absorb signals. Absorption of a wave may create heat and reduce the distance the wave may travel, however is unlikely to have significant effect on the wavelength or frequency of the wave. To avoid or reduce the effect of absorption, wireless repeaters may be placed within an empty area, however, because of absorbers such as carpet and people, there may be a need for more amplitude or a reduction in distance between repeaters. In some cases, reflection may affect a wireless signal transmission. Reflection may occur when a signal bounces off of an object and travels in a different direction. In some embodiments, reflection may be correlated with frequency, wherein some frequencies may be more tolerant to reflection. In some embodiments, a challenge may occur when portions of signals are reflected, resulting in the signals arriving out of order at the receiver or the receiver receiving the same portion of a signal several times. In some cases, reflections may cause signals to become out of phase and the signals may cancel each other out. In some embodiments, diffraction may affect a wireless signal transmission. Diffraction may occur when the signal bends and spreads around an obstacle. It may be most pronounced when a wave strikes an object with a size comparable to its own wavelength. In some embodiments, refraction may affect a wireless signal transmission. Refraction may occur when the signal changes direction (i.e., bends) as the signal passes through matter with different density. In some cases, this may occur when wireless signals encounter dust particles in the air or water.

In some embodiments, obstructions may affect a wireless signal transmission. As a signal travels to a receiver it may encounter various obstructions, as wireless signals travelling further distances widen near the midpoint and slim down closer to the receiver. Even in a visual line of sight (LOS), earth curvature, mountains, trees, grass, and pollution, may interfere with the signal when the distance is long. This may also occur for multiple wireless communicating robots positioned within a home or in a city. The robot may use the wireless network or may create an ad hoc connection when in the visual LOS. Some embodiments may use Fresnel zone, a confocal prolate ellipsoidal shaped region of space between and around a transmitter and receiver. In some embodiments, the size of the Fresnel zone at any particular distance from the transmitter and receiver may help in predicting whether obstructions or discontinuities along the path of the transmission may cause significant interference. In some embodiments, a lack of bandwidth may affect a wireless signal transmission. In some cases, there may be difficulty in transmitting an amount of data required in a timely fashion when there is a lack of bandwidth. In some embodiments, header compression may be used to save on bandwidth. Some traffic (such as voice over IP) may have a small amount of application data in each packet but may send many packets overall. In this case, the amount of header information may consume more bandwidth than the data itself. Header compression may be used to eliminate redundant fields in the header of packets and hence save on bandwidth. In some embodiments, link speeds may affect a wireless signal transmission. For example, slower link speeds may have a significant impact on end-to-end delay due to the serialization process (the amount of time it takes the router to put the packet from its memory buffers onto the wire), wherein the larger the packet, the longer the serialization delay. In some embodiments, payload compression may be used to compress application data transmitted over the network such the router transmits less data across a slow WAN link.

In some embodiments, the processor may monitor the strength of a communication channel based on a strength value given by Received Signal Strength Indicator (RSSI). In embodiments, the communication channel between a server and any device (e.g., mobile phone, robot, etc.) may kept open through keep alive signals, hello beacons, or any simple data packet including basic information that may be sent at a previously defined frequency (e.g., 10, 30, 60, or 300 seconds). In some embodiments, the terminal on the service provider may provide prompts such that the user may tap, click, or approach their communication device to create a connection. In some embodiments, additional prompts may be provided to guide a robot to approach its terminal to where the service provider terminal desires. In some embodiments, the service provider terminal may include a robotic arm (for movement and actuation) such that it may bring its terminal close to the robot and the two can form a connection. In embodiments, the server may be a cloud based server, a backend server of an internet application such as an SNS application or an instant messaging application, or a server based on a publicly available transaction service such as Shopify. In some embodiments, received signal strength indicator (RSSI) may be used to determine the power in a received radio signal or received channel power indicator (RCPI) may be used to determine the received RF power in a channel covering the entire received frame, with defined absolute levels of accuracy and resolution. For example, the 802.11 IEEE standard employs RSSI or RCPI. In some embodiments, signal-to-noise ratio (SNR) may be used to determine the strength of the signal compared to the surrounding noise corrupting the signal. In some embodiments, link budget may be used to determine the power required to transmit a signal that when reached at the receiving end may still be understood. In embodiments, link budget may account for all the gains and losses between a sender and a receiver, including attenuation, antenna gain, and other miscellaneous losses that may occur. For example, link budget may be determined using Received Power (dBm)=Transmitted Power (dBm)+Gains (dB)−Losses (dB).

In some embodiments, data may undergo a process prior to leaving an antenna of a robot. In some embodiments, a modulation technique, such as Frequency Modulation (FM) or Amplitude Modulation (AM), used in encoding data, may be used to place data on RF carrier signals. In some cases, frequency bands may be reserved for particular purposes. For example, ISM (Industry, Scientific, and Medical) frequency bands are radio bands from the RF spectrum that are reserved for purposes other than telecommunications.

In embodiments, different applications may use different bandwidths, wherein a bandwidth in a wireless network may be a number of cycles per second (e.g., in Hertz or Hz). For example, a low quality radio station may use a 3 kHz frequency range, a high quality FM radio station may use 175 kHz frequency range, and a television signal, which sends both voice and video data over the air, may use 4500 kHz frequency range. In some embodiments, Extremely Low Frequency (ELF) may be a frequency range between 3-30 Hz, Extremely High Frequency (EHF) may be a frequency range between 30-300 GHz, and WLANs operating in an Ultra High Frequency (UHF) or Super High Frequency (SHF) may have a frequency range of 900 MHz, 2.4 GHz, or 5 GHz. In embodiments, different standards may use different bandwidths. For example, the 802.11, 802.11b, 802.11g, and 802.11n IEEE standards use 2.4 GHz frequency range. In some embodiments, wireless LANs may use and divide the 2.4 GHz frequency range into channels ranging from 2.4000-2.4835 GHz. In the United States, the United States standard allows 11 channels, with each channel being 22 MHz wide. In some embodiments, a channel may overlap with another channel and cause interference. For this reason, channels 1, 6, and 11 are most commonly used as they do not overlap. In some embodiments, the processor of the robot may be configured to choose one of channel 1, 6, or 11. In some embodiments, the 5 GHz frequency range may be divided into channels, with each channel being 20 MHz wide. Based on the 802.11a and 802.11n IEEE standards, a total of 23 non-overlapping channels exist in the 5 GHz frequency.

In embodiments, different frequency ranges may use different modulation techniques that may provide different data rates. A modulated waveform may consist of amplitude, phase, and frequency which may correspond to volume of the signal, the timing of the signal between peaks, and the pitch of the signal. Examples of modulation techniques may include direct sequence spread spectrum (DSSS), Orthogonal Frequency Division Multiplexing (OFDM), and Multiple-Input Multiple-Output (MIMO). For example, 2.4 GHz frequency range may use DSSS modulation which may provide data rates of 1, 2, 5.5, and 11 Mbps and 5 GHz frequency range may use OFDM which may provide data rates of 6, 9, 12, 18, 24, 36, 48, and 54 Mbps. Devices operating within the 2.5 GHz range may use DSSS modulation technique to transmit data. In some embodiments, the transmitted data may be spread across the entire frequency spectrum being used. For example, an access point transmitting on channel 1 may spread the carrier signal across the 22 MHz-wide channel ranging from 2.401-2.423 GHz. In some embodiments, DSSS modulation technique may encode data (i.e., transform data from one format to another) using a chip sequence because of the possible noise interference with wireless transmission. In some embodiments, DSSS modulation technique may transmit a single data bit as a string of chips or a chip stream spread across the frequency range. With redundant data being transmitted, it is likely that the transmitted data is understood despite some of the signal being lost to noise. In some embodiments, transmitted signals may be modulated over the airwaves and the receiving end may decode this chip sequence back to the originally transmitted data. Because of interference, it is possible that some of the bits in the chip sequence may be lost or inverted (e.g., 1 may become 0 or 0 may become 1). However, with DSSS modulation technique, more than five bits need to be inverted to change the value of a bit from 1 to 0. Because of this, using a chipping sequence may provide networks with added resilience against interference.

In some embodiments, DSSS modulation technique may use Barker code. For example, the 802.11 IEEE standard uses an 11 chip Barker code 10110111000 to achieve rates of 1 and 2 Mbps. In embodiments, a Barker code may be a finite sequence of N values a of +1 and −1. In some embodiments, values $a_j$ for j=1, 2, . . . , N may have off-peak autocorrelation coefficients $c_v=\Sigma_{j=1}^{N-v}a_j a_{j+v}$. In some embodiments, the autocorrelation coefficients are as small as possible, wherein $|c_v|\leq 1$ for all $1\leq v<N$. In embodiments, sequences may be chosen for their spectral properties and low cross correlation with other sequences that may interfere. The value of the autocorrelation coefficient for the Barker sequence may be 0 or −1 at all offsets except zero, where it is +11. The Barker code may be used for lower data rates, such as 1, 2, 5.5, and 11 Mbps. In some embodiments, the DSSS modulation technique may use a different coding method to achieve higher data rates, such as 5.5 and 11 Mbps. In some embodiments, DSSS modulation technique may use Complementary Code Keying (CCK). In embodiments, CCK uses a series of codes, or otherwise complementary sequences. In some embodiments, CCK may use 64 unique code words, wherein up to 6 bits may be represented by a code word. In some embodiments, CCK may transmit data in symbols of eight chips, wherein each chip is a complex quadrature phase-shift keying bit-pair at a chip rate of 11 Mchips/s. In 5.5 Mbit/s and 11 Mbit/s, 4 and 8 bits, respectively, may be modulated onto the eight chips $c_0$, . . . , $c_7$, wherein $c=(c_0, \ldots, c_7)=(e^{j(\phi_1+\phi_2+\phi_3+\phi_4)}, e^{j(\phi_1+\phi_3+\phi_4)}, e^{j(\phi_1+\phi_2+\phi_4)}, -e^{j(\phi_1+\phi_4)}, e^{j(\phi_1+\phi_2+\phi_3)}e^{j(\phi_1+\phi_3)}, -e^{j(\phi_1+\phi_2)}, e^{j(\phi_1}$ and phase change $\phi_1, \ldots, \phi_4$ may be determined by the bits being modulated. Since 01 is applied to every chip, $\phi_2$ is applied to even chips, $\phi_3$ is applied the first two of every four chips, and $\phi_4$ is applied to the first four of eight chips, CCK may be generalized Hadamard transform encoding. In some embodiments, DSSS modulation technique may use Mary Orthogonal Keying which uses polyphase complementary codes or other encoding methods.

In some embodiments, after encoding the data (e.g., transforming an RF signal to a sequence of ones and zeroes), the data may be transmitted or modulated out of a radio antenna of a device. In embodiments, modulation may include manipulation of the RF signal, such as amplitude modulation, frequency modulation, and phase-shift keying (PSK). In some embodiments, the data transmitted may be based on the amplitude of the signal. For example, in amplitude modulation, +3V may be represented by a value of 1 and −3V may be represented by a value of 0. In some embodiments, the amplitude of a signal may be altered during transmission due to noise or other factors which may influence the data transmitted. For this reason, AM may not be a reliable solution for transmitting data. Factors such as frequency and phase are less likely to be altered due to external factors. In some embodiments, PSK may be used to convey data by changing the phase of the signal. In embodiments, a phase shift is the difference between two waveforms at the same frequency. For example, two waveforms that peak at the same time are in phase and peak at different times are out of phase. In some embodiments, binary phase-shift keying (BPSK) and quadrature phase-shift keying (QPSK) modulation may be used, as in 802.11b IEEE standard. In BPSK, two phases separated by 180 degrees may be used, wherein a phase shift of 180 degrees may be represented by a value of 1 and a phase shift of 0 degrees may be represented by a value of 0. In some embodiments, BPSK may encode one bit per symbol, which is a slower rate compared to QPSK. QPSK may encode 2 bits per symbol which doubles the rate while staying within the same bandwidth. In some embodiments, QPSK may be used with Barker encoding at a 2 Mbps data rate. In some embodiments, QPSK may be used with CCK-16 encoding at a 5.5 Mbps rate. In some embodiments, QPSK may be used with CCK-128 encoding at a 11 Mbps rate.

As an alternative to DSSS, OFDM modulation technique may be used in wireless networks. In embodiments, OFDM modulation technique may be used to achieve very high data rates with reliable resistance to interference. In some embodiments, a number of channels within a frequency range may be defined, each channel being 20 MHz wide. In some embodiments, each channel may be further divided into a larger number of small-bandwidth subcarriers, each being 300 kHz wide, resulting in 52 subcarriers per channel. While the subcarriers may have a low data rate in embodiments, the data may be sent simultaneously over the subcarriers in parallel. In some embodiments, coded OFDM (COFDM) may be used, wherein forward error correction (i.e., convolutional coding) and time and frequency interleaving may be applied to the signal being transmitted. In some embodiments, this may overcome errors in mobile communication channels affected by multipath propagation and Doppler effects. In some embodiments, numerous closely spaced orthogonal subcarrier signals with overlapping spectra may be transmitted to carry data. In some embodiments, demodulation (i.e., the process of extracting the original signal prior to modulation) may be based on fast Fourier transform (FFT) algorithms. For complex numbers $x_0, \ldots, x_{N-1}$, the discrete Fourier transform (DFM) may be $$X_k = \sum_{n=0}^{N-1} x_n e^{-\frac{i2\pi kn}{N}}$$

for k=0, . . . , N−1, wherein $$e^{-\frac{i2\pi}{N}}$$

is a primitive nth root of 1. In some embodiments, the DFM may be determined using $O(N^2)$ operations, wherein there are N outputs $X_k$, and each output has a sum of N terms. In embodiments, a FFT may be any method that may determine the DFM using O(N log N) operations, thereby providing a more efficient method. For example, for complex multiplications and additions for N=4096 data points, evaluating the DFT sum directly involves $N^2$ complex multiplications and N(N−1) complex additions (after eliminating trivial operations (e.g., multiplications by 1)). In contrast, the Cooley-Tukey FFT algorithm may reach the same result with only $(N/2) \log_2 N$ complex multiplications and $N \log_2 N$ complex additions. Other examples of FFT algorithms that may be used include Prime-factor FFT algorithm, Bruun's FFT algorithm, Rader's FFT algorithm, Bluestein's FFT algorithm, and Hexagonal FFT.

In some embodiments, MIMO modulation technique may be used. In some embodiments, the advanced signal processing allows data to be recovered after being transmitted on two or more spatial streams with more than 100 Mbps by multiplexing data streams simultaneously in one channel. For example, MIMO modulation technique may use two, three, or more antennas for receiving signals for advanced signal processing.

Some embodiments may employ dynamic rate shifting (DRS) (e.g., 802.11b, 802.11g, and 802.11a IEEE standards). In some embodiments, devices operating in the 2.4 GHz range may rate-shift from 11 Mbps to 5.5 Mbps and, in some circumstances, to 2 and 1 Mbps. In some embodiments, rate shifting occurs without dropping the connection and on a transmission-by-transmission basis. For example, a shift from 11 Mbps to 5.5 Mbps may shift back up to 11 Mbps for the next transmission. In all deployments, DRS may support multiple clients operating at multiple data rates.

In some embodiments, data collisions may occur, such as in the case of a work group of wireless robots. In some embodiments, two antennas may be used to listen for a jammed signal when a collision occurs, wherein one antenna may be used for transmitted data while the other antenna may be used for listening for a jammed signal.

In some embodiments, carrier sense multiple access collision avoidance (CSMA/CA) may be used to avoid data collisions. In such embodiments, a device may use an antenna to first listen prior to transmitting data to avoid data collision. If the channel is idle, the device may transmit a signal informing other devices to refrain from transmitting data as the device is going to transmit data. The device may use the antenna to listen again for a period of time prior to transmitting the data. Alternatively, request to send (RTS) and clear to send (CTS) packets may be used to avoid data collisions. The device transmitting data may transmit an RTS packet prior to transmitting the data and the intended receiver may transmit a CTS packet to the device. This may alert other devices to refrain from transmitting data for a period of time. In some embodiments, a RTS frame may include five fields: frame control, duration, receiver address (RA), transmitter address (TA), and Frame Check Sequence (FCS). In some embodiments, a CTS frame may include four fields: frame control, duration, RA, and FCS. In some embodiments, the RA may indicate the MAC address of the device receiving the frame and TA may indicate the MAC address of the device that transmitted the frame. In some embodiments, FCS may use the cyclic redundancy check (CRC) algorithm.

In some embodiments, Effective Isotropic Radiated Power (EIRP) may be used to measure the amount of energy radiated from, or output power of, an antenna in a specific direction. In some embodiments, the EIRP may be dependent on the total power output (quantified by the antenna gain) and the radiation pattern of the antenna. In some embodiments, the antenna gain may be the ratio of the signal strength radiated by an antenna to that radiated by a standard antenna. In some embodiments, the antenna may be compared to different standard antennas, such as an isotropic antenna and a half-wave dipole antenna, and hence different gains may be determined based on the standard antenna. For example, isotropic gain, $$G_i = \frac{s_{max}}{s_{max,isotropic}}$$

or $$G_i = 10\log\frac{s_{max}}{s_{max,isotropic}}$$

in decibels, may be determined as the ratio of the power density $S_{max}$ received at a point from the antenna in the direction of its maximum radiation to the power density $S_{max,isotropic}$ received at the same point from a theoretically lossless isotropic antenna which radiates equal power in all direction. The dipole gain, $$G_d = \frac{s_{max}}{s_{max,dipole}}$$

or $$G_d = 10\log\frac{s_{max}}{s_{max,dipole}}$$

in decibels, may be determined as the ratio of the power density $S_{max}$ received in the direction of its maximum radiation to the power density $S_{max,isotropic}$ received from a theoretically lossless half-wave dipole antenna in the direction of its maximum radiation. In some embodiments, EIRP may account for the losses in a transmission line and connectors. In some embodiments, the EIRP may be determined as EIRP=transmitter output power−cable loss+antenna gain. In some embodiments, a maximum 36 dBm EIRP, a maximum 30 dBm transmitter power with a 6 dBm gain of the antenna and cable combined, and a 1:1 ratio of power to gain may be used in a point-to-point connection. In some embodiments, a 3:1 ratio of power to gain may be used in multipoint scenarios.

In some embodiments, a CPU, MPU, or MCU may be used for processing. In some embodiments, floats may be processed in hardware. In some embodiments, the MPU may be implemented in hardware. In some embodiments, a GPU may be used in a built-in architecture or in a separate unit in the main electronic board. In some embodiments, an intermediary object code may be created and linked and combined into a final code on a target robot.

In some embodiments, a robot boot loader may load a first block of code that may be executed within a memory. In some embodiments, a hash and a checksum of a file chosen for loading may be checked. In some embodiments, the hash and checksum may be printed in a real-time log. In some embodiments, the log may be stored in a memory. In some embodiments, the log may be transmitted over a Wi-Fi network on a computer acting as a terminal. In some embodiments, the transfer protocol may be SSH or telnet. In some embodiments, a security bit may be set in a release build to prohibit tampering of the code. In some embodiments, over the air updates may be possible.

In some embodiments, a customized non-volatile configuration may be read from an NVRAM or flash after the robot boot loader loads the code on the memory. For example, the RF channel may be stored and read as a NVRAM parameter and stored in the flash memory. In some embodiments, two copies of computer code may be stored in an NVRAM of the robot. In embodiments, wherein the robot may not boot (e.g., after an upgrade), a second executive computer code may be used for booting up the robot. In some embodiments, the content of memory of the robot may be dumped into a specific memory that may be later viewed or cleared when a hard fault crash occurs. In some embodiments, the amount of memory may be set to a maximum and the new information may rewrite old information.

In some embodiments, a boot up process of the robot may be interrupted by the user for troubleshooting purposes. In some embodiments, a sequence of characters may be pressed within a particular time frame during the boot up process to interrupt the boot up process. In some embodiments, further controls may be implemented by pressing other sequences of characters which may prompt the robot to perform a certain task. Some examples include ctrl+c to clear entered characters; ctrl+d to start docking; ctrl+g to start cleaning; ctrl+j to display scheduled jobs; ctrl+n to print the map; ctrl+q to show help/list commands; ctrl+r to software reset; ctrl+s to display statistics; ctrl+t to display current trouble; ctrl+v to toggle vacuum; and ctrl+z to stop cleaning/docking.

In some embodiments, the robot may be in various states and each state may have a substrate. For example, the robot may enter a Leave Dock Mode or a Cleaning Mode after boot up. In some embodiments, one or more routine handlers may be used. For example, a routine handler may include an instruction to perform undock, single sweep, and return to origin.

In some embodiments, hardware components of the robot may be initialized one by one. In some embodiments, hardware components may be categorized based on the functions they provide. For example, a motor for a suction fan of a robot with motors for moving and a motor for a suction fan may belong to a cleaning hardware subgroup.

In some embodiments, the latest version of a map may be saved on a non-volatile memory space of the robot or the base station or on the cloud after a first mapping session is complete. In some embodiments, the non-volatile memory space may be an NV RAM available on the MCU. Other locations may include a flash memory, another NVRAM on the main PCB of the robot or the charging station, or on the cloud. Depending on design preference, the map may be stored locally until the next cold reset of the robot. This may be an advantageous embodiment as a cold-reset may indicate the robot is experiencing a change. In some embodiments, this may be the default setting, however other settings may be possible. For example, a user may choose to permanently store the map in the NVRAM or flash. In some embodiments, a map may be stored on the robot as long as the robot is not cold-started or hard-reset. On cold-start or hard-reset, the processor of the robot may pull the map from the cloud. In some embodiments, the processor reuses the map. In some embodiments, wherein the processor may not be able to reuse the map, the processor of the robot may restart mapping from the beginning. Some embodiments statically allocate a fixed area in an SD-RAM of the robot or charging station as SD-RAMs are large and may thus store a large map if needed. In some embodiments, the fixed area in the SD-RAM may be marked as persistent (i.e., the fixed area is not zeroed upon MCU reset). Alternatively, the map may be stored in SRAM, however, inputs provided by a user (e.g., virtual boundaries, scheduling, floor types, zones, perimeter lines, robot settings, etc.) may be lost in the event that the map is lost during a cold-start or hard-reset. In another embodiment, the map may be even more persistent (i.e., stored in a flash memory) by storing a user request in NVRAM (e.g., as a Boolean). If the map is lost and internet access is down, the user request may be checked in the NVRAM. In some embodiments, the processor may conditionally report an error and may not perform work (e.g., sweep) when the user request cannot be honored. In embodiments, various options for storing the map are possible.

In some embodiments, boot up time of the robot may be reduced or performance may be improved by using a higher frequency CPU. In some instances, an increase in frequency of the processor may decrease runtime for all programs. In some instances, power consumption, $P=C\times V^2\times F$, by a chip may be determined, wherein C is the capacitance switched per clock cycle (in proportion to the number of transistors with changing inputs), V is the voltage, and F is the processor frequency (e.g., cycles per second). In some instances, higher frequency processing hardware consumes more power. In some cases, increase of frequency may be limited by technological constraints. Moore's law predicts faster and more powerful computers are built over time. However, to execute a number of sophisticated algorithms using current hardware, there may be a need for a combination of software enhancements, algorithm creativity, and parallel and concurrent processing.

In some cases, processing in parallel may not provide its full advantages or may be less advantageous for situations where some calculations may depend on prior calculations or data. For example, displacement of a robot may only be identified when the robot moves and sensors of the robot record the movement and other sensors of the robot confirm the movement. At which point, the processor may use the data to update the location of the robot. Theoretically, an increase in speed from parallelization is linear as doubling the number of processing elements reduces the runtime to half. However, in some cases, parallel algorithms may not double the runtime. While some processes may be processed faster linearly, in general, the gain in performance reduces with complexity. In some embodiments, the potential speedup of an algorithm on a parallel computing platform may be determined used Amdahl's law, $$S(s) = \frac{1}{1 - p + \frac{p}{s}},$$

wherein S is the potential speedup in latency of the execution of the whole task, s is the speedup in latency of the execution of the parallelizable part of the task, and p is the percentage of the execution time of the whole task concerning the parallelizable part of the task before parallelization. In some embodiments, parallelization techniques may be advantageously used in situations where they may produce the most results, such as rectified linear unit functions (ReLU) and image processing. In some probabilistic methods, computational cost may increase in quadruples or more. This may be known as a dimensionality curse. In some instances, linear speed up may not be enough in execution of complex tasks if the algorithms and the low level code are written carelessly. As complexity of components increase, the increase in computational cost may become out of control.

In some embodiments, concurrent computations may be executed during overlapping time periods. In some embodiments, the output of a computation may be required to be used as input of another computation. For example, a processor may receive and convolve various sensor data and the output may be used by the processor to generate a map. In some embodiments, the processor of the robot may share contents of a memory space dedicated to a process to another process to save on messaging time. In some embodiments, processes and threads may be executed in parallel on multiple cores. In some embodiments, each process may be assigned to a separate processor or processor core, or a computation may be distributed across multiple devices in a connected network of robotic devices. For example, a host processor executing a 'for loop' required to run 1000 iterations on the host processing unit one after another may delegate the task to a secondary processing device by launching a kernel on the secondary processing device. A block of 1000 individual threads may be launched on the secondary processing device in parallel to achieve a higher throughput. Or the host processor may delegate two blocks of 500 threads each.

In some embodiments, a high power processor and a low power processor may be used in conjunction with or separate from one other to enable one or more of a variety of different functionalities. In one embodiment, the high power processor and the low power processor may each be dedicated to different tasks or may both include general purpose processing. For example, the high power processor may execute computationally intensive operations and the low power processor may manage less complex operations. In one embodiment, the low power processor may wake or initialize the high power processor for computationally intensive processes. In some embodiments, data and control tasks may be processed on separate processors. In some embodiments, a data path may be separated from a control path. In some embodiments, the control path are bits and instructions that control the data. In some embodiments, data packets may be separated from control packets. In some embodiments, the data packets may include some control information. In some embodiments, in-band communication may be employed. In some embodiments, out of band communication may be employed.

In some embodiments, virtual machines may be executed. In some embodiments, instructions may be divided and may be partly executed at the same time using pipelining techniques wherein individual instructions may be dispatched to be executed independently in different parts of the processor. Some instructions that may be pipelined within a clock cycle may include fetch, decode, execute, memory access, and write back. In some embodiments, an out-of-order execution may be allowed, justifying the computational and energy cost of this technique. In some embodiments, in-order execution including very long instruction word techniques may be used. In some embodiments, interdependencies of instructions may be carefully examined and managed. Minimizing dependencies techniques such as branch prediction (i.e., predicting which branch might be taken), predication (i.e., use of conditional moves), or register renaming (i.e., avoiding WAW and WAR dependencies) may be employed.

In some embodiments, latency may be reduced by optimizing the amount of time required for completion of a task. In some embodiments, latency may be sacrificed to instruct a secondary processing device to run multiple threads in an attempt to optimize throughput. In some cases, sophisticated handling of memory space is essential to refrain from memory spaces being shared or leaked between different processes when components that operate concurrently interact by accessing data in real-time as opposed to sending data in a form of messages to one another.

In some embodiments, multiple devices may communicate on a data bus. In some embodiments, RAM, ROM, or other memory types may be designed to connect to the data bus. In some embodiments, memory devices may have chip select and output enable pins. In some embodiments, either option may be selected and optimized to save electricity consumption or reduce latency. In some embodiments, a tri-state logic circuit may exist, wherein one state may be high impedance to remove the impact of a device from other parts of a system. In other embodiments, open collector input/output method may be used as an alternative to tri-state logic. In such implementations, devices may release communication lines when they are inactive. In other embodiments, a multiplexer may be used.

In some embodiments, processes may be further divided to threads and fibers. For example, thread A may update a memory spot with a variable and thread B may read that variable at the next clock interval. This may be helpful in saving resources when multiple threads need access to the same data and may provide better performance compared to that resulting from thread A being passed into thread B.

In some cases, memory management may be implemented from the lowest level of design to improve performance of the robot system. In some instances, intelligent use of registers may save on overhead. In some cases, use of cache memory may enhance performance. In some instances, to achieve a well designed system, quantities such as hit ratio may be properly monitored and optimized. In some embodiments, various memory mapping techniques may be used, such as direct mapping, associative mapping, and set-associative mapping. In some embodiments, a Memory Management Unit (MMU) or Memory Protection Unit (MPU) may be implemented in hardware or software. In some embodiments, cache memory may be used to enhance performance. FIG. 239 illustrates an example of flow of information between CPU, cache memory, primary memory, and secondary memory.

In some embodiments, a Light Weight SLAM algorithm may process spatial data in real-time, generally without buffering or any delay caused by a multi-purpose operating system (OS) such as, Linux, Windows, or Mac OS, acting as an interface between the SLAM algorithm, sensors, and hardware. In some embodiments, a real-time OS may be used. In some embodiments, a Kernel may be used. In some cases, a scheduler may define a time bound system with well defined fixed time constraints. In some embodiments, the scheduler temporarily interrupts low priority tasks and schedules them for resumption at a later time when a high priority or privileged tasks require attention. In some embodiments, a real-time OS handles scheduling, control of the processor, allocation of memory, and input/output devices. In some embodiments, a scheduler block of code may be included in the architecture of the robot system which may also be responsible for controlling the memory, registers, input/output and cleanup of the memory after completion of each task. In some embodiments, the architecture may consist of a kernel which has direct access to privileged underlying hardware. In some embodiments, a Kernel may abstract the hardware and control mechanisms such as create, schedule, open, write, and allocate. In some embodiments, a Kernel may also control, process, thread, socket, and page memory. In some embodiments, a Kernel may enforce policies such as random access, least recently used, or earliest deadline first. In some embodiments, system calls may be implemented to provide access to underlying hardware for high-up processes. In some embodiments, a bit may be set and unset (or vise versa) when a process moves from a kernel mode to a higher level and back. In some embodiments, arguments and parameters may be passed directly between a higher level code and a kernel, or through a register. In some embodiments, a Kernel may trap an illegitimate instruction of memory access request. In some embodiments, a Kernel may send a signal to a process. In some embodiments, a Kernel may assign an ID to a task or process or a group of tasks or processes. In some embodiments, additional software modules or blocks may be installed in the robot system for future needs. In some embodiments, sensor readings may be passed (e.g., as an output) to a Kernel. In some embodiments, a sensor reading may be kept in a memory space and a Kernel may read that memory space in turns. In some embodiments, a Kernel may read a sensor reading from another location. In some embodiments, a Kernel obtains sensor readings without any passing or transferring or reading. All approaches of obtaining sensor readings may be used in an implementation.

In some embodiments, a scheduler may allot a certain amount of time to execution of each thread, task, tasklet, etc. For example, a first thread may run for 10 consecutive milliseconds then may be unscheduled by the scheduler to allow a second thread to run for the next 10 consecutive seconds. Similarly, a third thread may follow the second thread. This may continue until the last thread passes the control to the first thread again. In some embodiments, these slices of time may be allocated to threads with a same level of priority on a round robin basis. In some embodiments, each thread may be seen as an object which performs a specific function. In some embodiments, each thread may be assigned a thread ID. In some embodiments, a state of a running thread variable may be stored in a thread stack each time threads are switched. In some embodiments, each thread that is not in a running state (i.e., is in control of a processor or microcontroller) may be in a ready state or a wait state. In a ready state the thread may be ready to run after the current running thread is unscheduled. All other threads may be in a wait state. In some embodiments, priorities may be assigned to threads. A thread with higher priority may preempt threads with lower priorities. In some embodiments, the number of concurrently running threads may be decided in conjunction with thread stack size and other parameters, such as running in default stack or having additional memory space to run in.

In some embodiments, locking methods may be used. In other embodiments, multi-versioning may be used. In some embodiments, multi-versioning may converge to uni-versioning in later time slots. In some embodiments, multi-versioning may be used by design. For example, if transaction $T_i$ wants to write to object P, and there is another transaction $T_k$ occurring to the same object, the read timestamp $RTS(T_i)$ must precede the read timestamp $RTS(T_k)$ for the object write operation to succeed. In other words, a write cannot complete if there are other outstanding transactions with an earlier read timestamp RTS to the same object. Every object P has a timestamp TS, however if transaction $T_i$ wants to write to an object, and the transaction has a timestamp TS that is earlier than the object's current read timestamp, then the transaction is aborted and restarted, as a later transaction already depends on the old value. Otherwise, $T_i$ creates a new version of object P and sets the read/write timestamp TS of the new version to the timestamp of the transaction $TS=TS(T_i)$.

In some embodiments, a behavior tree may be used to abstract the complexities of lower level implementations. In some embodiments, a behavior tree may be a mathematical model of plan execution wherein very complex tasks may be composed of simple tasks. In some embodiments, a behavior tree may be graphically represented as a directed tree. In implementation, nodes may be classified as root, control flow nodes, or execution nodes (i.e., tasks). For a pair of connected nodes, the outgoing node may be referred to as a parent and the incoming node as a child. A root node may have no parents and only one child, a control flow node may have one parent and at least one child and an execution node may have one parent and no children. The behavior tree may begin from the root which transmits ticks (i.e., enabling signal) at some frequency to its child to allow execution of the child. In some embodiments, when the execution of a node is allowed, the node may return a status of running, success, or failure to the parent. A control flow node may be used to control the subtasks from which it is composed. The control flow node may either be a fallback or sequence node, which run each of their subtasks in turns. When a subtask is completed and returns a status, the control flow node may decide if the next subtask is to be executed. Fallback nodes may find and execute the first child that does not fail, wherein children may be ticked in order of importance. Sequence nodes may find and execute the first child that has not yet succeeded. In some embodiments, the processor of the robot may define a behavior tree as a three-tuple, $T_i=\{f_i, r_i, \Delta t\}$, wherein $i\in\mathbb{N}$ is the index of the tree, $f_i$: $\mathbb{R}_n\rightarrow\mathbb{R}_n$ is a vector field representing the right has side of an ordinary difference equation, $\Delta t$ is a time step, and $r_i$: $\mathbb{R}^n\rightarrow\{R_i, S_i, F_i\}$ is the return status, that can be equal to either running $R_i$, success $S_i$, or failure $F_i$. In some embodiments, the processor may implement ordinary difference equations $x_{k+i}(t_{k+1})=f_i(x_k(t_k))$ with $t_{k+1}=t_k+\Delta t$, wherein $k\in\mathbb{N}$ represents the discrete time and $x\in\mathbb{R}^n$ is the state space of the system modelled, to execute the behavior tree. In some embodiments, the processor uses a fallback operator to compose a more complex behavior tree $T_0$ from two behavior trees $T_i$ and $T_j$, wherein $T_0$=fallback$(T_i, T_j)$. The return status $r_0$ and the vector field $f_0$ associated with $T_0$ may be defined by $$r_0(x_k)=\begin{cases} r_j(x_k) \text{ if } x_k\in\mathcal{F}_1 \\ r_i(x_k) \text{ otherwise} \end{cases}$$

and $$f_0(x_k)=\begin{cases} f_j(x_k) \text{ if } x_k\in\mathcal{F}_1 \\ f_i(x_k) \text{ otherwise} \end{cases}.$$

In some embodiments, the processor uses a sequence operator to compose a more complex behavior tree $T_0$ from two behavior trees $T_i$ and $T_j$, wherein $T_0$=sequence$(T_i, T_j)$. The return status $r_0$ and the vector field $f_0$ associated with $T_0$ may be defined by $$r_0(x_k)=\begin{cases} r_j(x_k) \text{ if } x_k\in\mathcal{S}_1 \\ r_i(x_k) \text{ otherwise} \end{cases}$$

and $$f_0(x_k)=\begin{cases} f_j(x_k) \text{ if } x_k\in\mathcal{S}_1 \\ f_i(x_k) \text{ otherwise} \end{cases}.$$

In some embodiments, a thread, task, or interrupt may be configured to control a GPIO pin, PIO pin, PWM pin, and timer pin connected to an IR LED transmitter that may provide illumination for a receiver expecting a single IR multi-path reflection of the IR LED off of a surface (e.g., floor). In some embodiments, a TSOP or TSSP sensor may be used. In some embodiments, the output of the sensor may be digital. In some embodiments, the detection range of the sensor may be controlled by changing the frequency within the sensitive bandwidth region or the duty cycle. In some embodiments, a TSOP sensor may be beneficial in terms of power efficiency. For example, FIG. 240 includes three tables with the voltage measured for a TSOP sensor and a generic IR sensor under three different test conditions. In some embodiments, a while loop or other types of loops may be configured to iterate with each clock as a continuous thread. In some embodiments, a lack of presence of a reflection may set a counter to increase a last value by unity. In some embodiments, the counter may be reset upon receipt of a next reflection. In some embodiments, a new thread with a higher priority may preempt the running thread when a value of the counter reaches a certain threshold. In some embodiments, a thread may control other pins and may provide PWM capabilities to operate the IR transmitter at a 50% duty cycle (or at 10%, 70%, 100% or other percentage duty cycle) to control the average intensity or the IR emission. In some embodiments, the receiver may be responsive to only a certain frequency (e.g., TSOP sensors most commonly respond to 38 Khz frequency). In some embodiments, the receiver may be able to count the number of pulses (or lack thereof) in addition to a presence or lack of presence of light. In some embodiments, other methods of modulating code words or signals over different mediums may be used. In some instances, code words need to be transmitted directionally and quickly, which, with current technologies, may be cost prohibitive. Examples of mediums that may be used other than IR include other spectrums of light, RF using directional and non-directional antennas, acoustic using directional, highly directional, and non-directional antennas, microphones, ultra-sonic, etc. In some embodiments, in addition or in combination or in place of PWM, other modulation methods such as Amplitude Modulation (AM) or Frequency Modulation (FM) may be used.

In some embodiments, specular reflection, surface material, angle of the surface normal, ambience light decomposition and intensity, the saturation point of the silicon chip on the receiver, etc. may play a role in how and if a receiver receives a light reflection. In some embodiments, cross talk between sensors may also have an influence. In some embodiments, dedicated allocation of a time slot to each receiver may serve as a solution. In some embodiments, the intensity of the transmitter may be increased with the speed of the robot to observe further at higher speeds. In various environments, a different sensor or sensor settings may be used. In some behavioral robots, a decision may be made based on a mere lack of reflection or presence of a reflection. In some embodiments, counting a counter to a certain value may change the state of a state machine or a behavior tree or may break an iteration loop. In some embodiments, this may be described as a deterministic function wherein state transition=$f$(~receipt of reflection). In other embodiments, state transition=$f$(counter+1>x). In some embodiments, a probabilistic method may be used wherein state transition=P (observation X|observation Y), wherein X and Y may be observations independent of noise impact by one or more sensors observed at the same or different time stamps.

In some embodiments, IR sensors may use different wavelengths to avoid cross talk. In some embodiments, the processor may determine an object based on the reflection of light off of a particular surface texture or material as light reflects differently off of different textures or materials for different wavelengths. In some embodiments, the processor may use this to detect pets, humans, pet refuse, liquid, plants, gases (e.g., carbon monoxide), etc.

In some embodiments, information from the memory of the robot may be sent to the cloud. In some embodiments, user permission may be requested prior to sending information to the cloud. In some embodiments, information may be compressed prior to being sent. In some embodiments, information may be encrypted prior to being sent.

In some embodiments, memory protection for hardware may be used. For example, secure mechanisms are essential when sending and obtaining spatial data to and from the cloud as privacy and confidentiality are of highest importance. In embodiments, information is not disclosed to unauthorized individuals, groups, processes, or devices. In embodiments, highly confidential data is encrypted such third parties may not easily decrypt the data. In embodiments, impersonation is impossible. For example, a third party is unable to insert an unauthentic map or data in replacement of the real map or data. In embodiments, security begins at the data collection level. In some embodiments, all images (or data from which a user or a location of a user may be identified) captured by a sensor of the robot are immediately deleted and are not stored, transmitted, or copied. In embodiments, information processed is inaccessible by a third party. In embodiments, executable code (e.g., SLAM code, coverage code, etc.) and the map (and any related information) are not retrievable from a stored location (e.g., flash or NVRAM or other storage) and are sealed and secured. In some embodiments, encryption mechanisms may be used. In embodiments, permission from the user is required when all or part of map is sent to the cloud. In embodiments, permission from the user is recorded and stored for future references. In embodiments, the method of obtaining permission from the user is such a third party, including the manufacturer, cannot fabricate a permission on behalf of the user. In some embodiments, a transmission channel may be encrypted to prohibit a third party from eavesdropping and translating the plain text communication into a spatial representation of a home of the user. For example, software such as Wireshark may be able to read clear text when connected to a home router and other software may be used to present the data payload into spatial formats. In embodiments, data must remain secure in the cloud. In some embodiments, only an authorized party may decrypt the encrypted information. In some embodiments, data may be encrypted with either symmetric or asymmetric methods, or hashing. Some embodiments may use a secret key or public-private key. In some embodiments, the robot may use data link protocols to connect within a LAN or user IP layer protocols with IPV4 or IPV6 addresses for communication purposes. In some embodiments, communication may be connection based (e.g., TCP) or connectionless (e.g., UDP). For time-sensitive information, UDP may be used. For communication that requires receipt at the other side, TCP may be used. In some embodiments, other encryption frameworks such as IPsec and L2TP may be used.

In some embodiments, information may be marked as acceptable and set as protected by the user. In some embodiments, the user may change a protection setting of the information to unprotected. In some embodiments, the processor of the robot does not have the capacity to change the protection setting of the information. In order to avoid situations wherein the map becomes corrupt or localization is compromised, the Atomicity, Consistency, Isolation, and Durability (ACID) rules may be observed. In some cases, atomicity may occur when a data point is inconsistent with a previous data point and corrupts the map. In some cases, a set of constraints or rules may be used to provide consistency of the map. For example, after executing an action or control from a consistent initial state a next state must be guaranteed to reach a consistent state. However, this does not negate the kidnapped robot issue. In such a case, a control defined as picking the robot up may be considered to produce a consistent action. Similarly, an accelerometer may detect a sudden push. This itself may be an action to define a rule that may keep information consistent. These observations may be included at all levels of implementation and may be used in data sensing subsystems, data aggregation subsystems, schedulers, or algorithm level subsystems. In some embodiments, mutual exclusion techniques may be used to provide consistency of data. In some embodiments, inlining small functions may be used to optimize performance.

FIG. 241 illustrates an example of the subsystems of the robot described herein, wherein global and local mapping may be used in localization of the robot and vice versa, global and local mapping may be used in map filling, map filling may be used in determining cell properties of the map, cell properties may be used in establishing zones, creating subzones, and evaluating traversability, and subzones and traversability may be used for polymorphic path planning.

The methods and techniques described herein may be used with various types of robots such as a surface cleaning robot (e.g., mop, vacuum, sweeper, pressure cleaner, steam cleaner, etc.), a robotic router, a robot for item or food delivery, a restaurant server robot, a first aid robot, a robot for transporting passengers, a robotic charger, an image and video recording robot, an outdoor robotic sweeper, a robotic mower, a robotic snow plough, a salt or sand spreading robot, a multimedia robot, a robotic cooking device, a car washing robot, a robotic hospital bed, and the like.

FIG. 242 illustrates an example of a robot 12700 with processor 12701, memory 12702, a first set of sensors 12703, second set of sensors 12704, network communication 12705, movement driver 12706, signal receiver 12707, and one or more tools 12708. In some embodiments, the robot may include the features of a robot described herein. In some embodiments, program code stored in the memory 12702 and executed by the processor 12701 may effectuate the operations described herein. Some embodiments additionally include user communication device 12709 having a touchscreen 12710 with a software application coupled to the robot 12700, such as that described in U.S. patent application Ser. Nos. 15/272,752, 15/949,708, 16/667,461, and 16/277,991, the entire contents of which is hereby incorporated by reference. For example, the application may be used to provide instructions to the robot, such as days and times to execute particular functions and which areas to execute particular functions within. Examples of scheduling methods are described in U.S. patent application Ser. Nos. 16/051,328, 15/449,660, and 16/667,206, the entire contents of which are hereby incorporated by reference. In other cases, the application may be used by a user to modify the map of the environment by, for example, adjusting perimeters and obstacles and creating subareas within the map. Some embodiments include a charging or docking station 112711.

In some embodiments, data may be sent between the processor of the robot and an application of the communication device using one or more wireless communication channels such as Wi-Fi or Bluetooth wireless connections. In some cases, communications may be relayed via a remote cloud-hosted application that mediates between the robot and the communication device, e.g., by exposing an application program interface by which the communication device accesses previous maps from the robot. In some embodiments, the processor of the robot and the application of the communication device may be paired prior to sending data back and forth between one another. In some cases, pairing may include exchanging a private key in a symmetric encryption protocol, and exchanges may be encrypted with the key.

In some embodiments, the processor of the robot may transmit the map of the environment to the application of a communication device (e.g., for a user to access and view). In some embodiments, the map of the environment may be accessed through the application of a communication device and displayed on a screen of the communication device, e.g., on a touchscreen. In some embodiments, the processor of the robot may send the map of the environment to the application at various stages of completion of the map or after completion. In some embodiments, the application may receive a variety of inputs indicating commands using a user interface of the application (e.g., a native application) displayed on the screen of the communication device. Examples of graphical user interfaces are described in U.S. patent application Ser. Nos. 15/272,752, 15/949,708, 16/667,461, and 16/277,991, the entire contents of each of which are hereby incorporated by reference. Some embodiments may present the map to the user in special-purpose software, a web application, or the like. In some embodiments, the user interface may include inputs by which the user adjusts or corrects the map perimeters displayed on the screen or applies one or more of the various options to the perimeter line using their finger or by providing verbal instructions, or in some embodiments, an input device, such as a cursor, pointer, stylus, mouse, button or buttons, or other input methods may serve as a user-interface element by which input is received. In some embodiments, after selecting all or a portion of a perimeter line, the user may be provided by embodiments with various options, such as deleting, trimming, rotating, elongating, shortening, redrawing, moving (in four or more directions), flipping, or curving, the selected perimeter line. In some embodiments, the user interface presents drawing tools available through the application of the communication device. In some embodiments, a user interface may receive commands to make adjustments to settings of the robot and any of its structures or components. In some embodiments, the application of the communication device sends the updated map and settings to the processor of the robot using a wireless communication channel, such as Wi-Fi or Bluetooth.

In some embodiments, the system of the robot may communicate with an application of a communication device via the cloud. In some embodiments, the system of the robot and the application may each communicate with the cloud. FIG. 243 illustrates an example of communication between the system of the robot and the application via the cloud. In some cases, the cloud service may act as a real time switch. For instance, the system of the robot may push its status to the cloud and the application may pull the status from the cloud. The application may also push a command to the cloud which may be pulled by system of the robot, and in response, enacted. The cloud may also store and forward data. For instance, the system of the robot may constantly or incrementally push or pull map, trajectory, and historical data. In some cases, the application may push a data request. The data request may be retrieved by the system of the robot, and in response, the system of the robot may push the requested data to the cloud. The application may then pull the requested data from the cloud. The cloud may also act as a clock. For instance, the application may transmit a schedule to the cloud and the system of the robot may obtain the schedule from the cloud. In embodiments, the methods of data transmission described herein may be advantageous as they require very low bandwidth.

Figure 244:
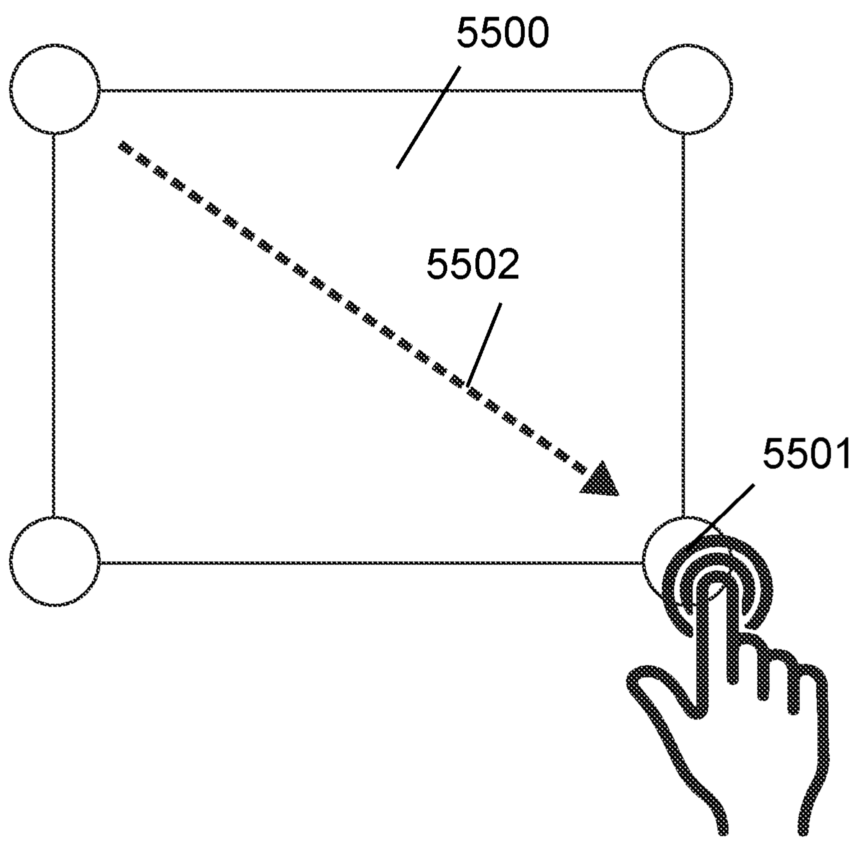
Figure 245:
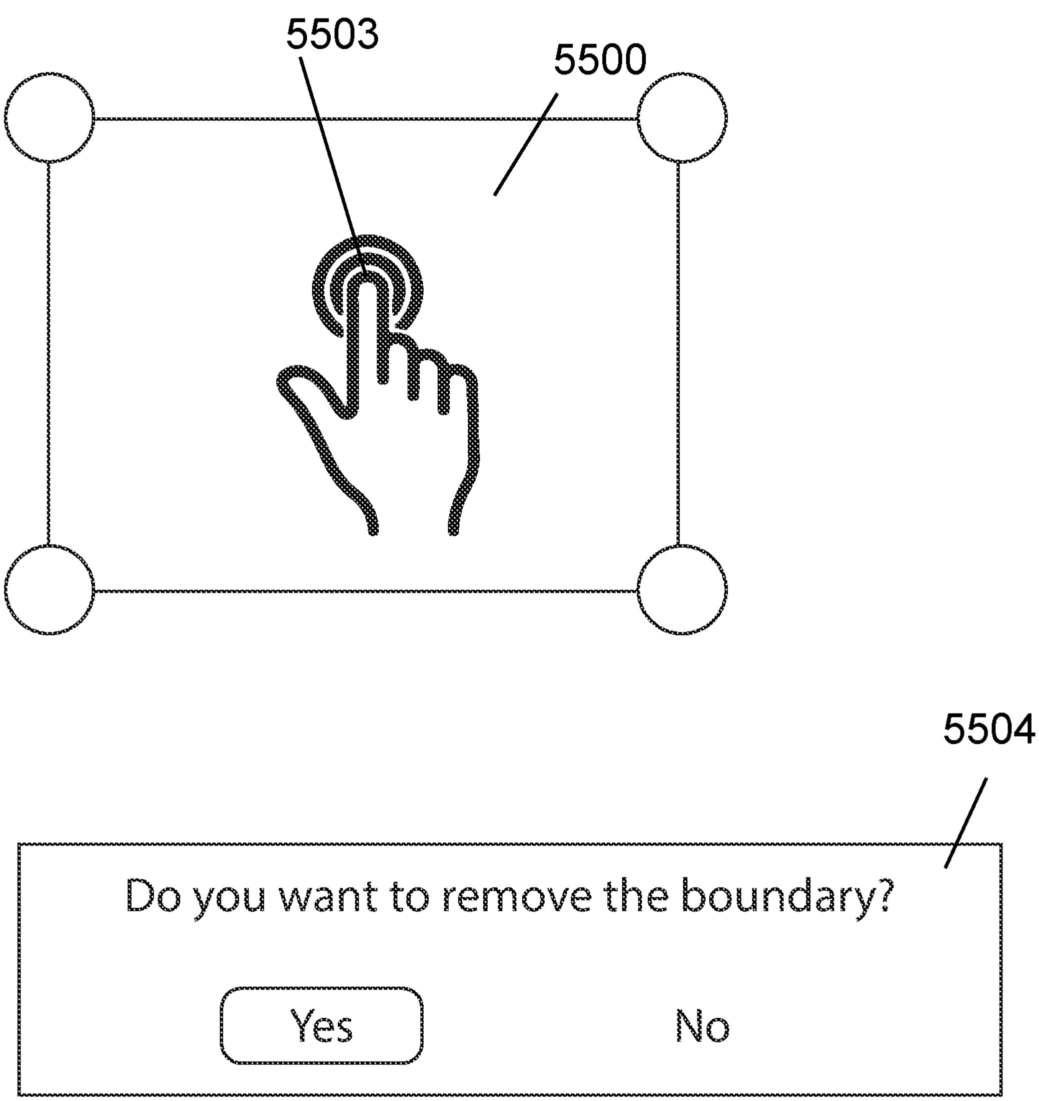
Figure 246:
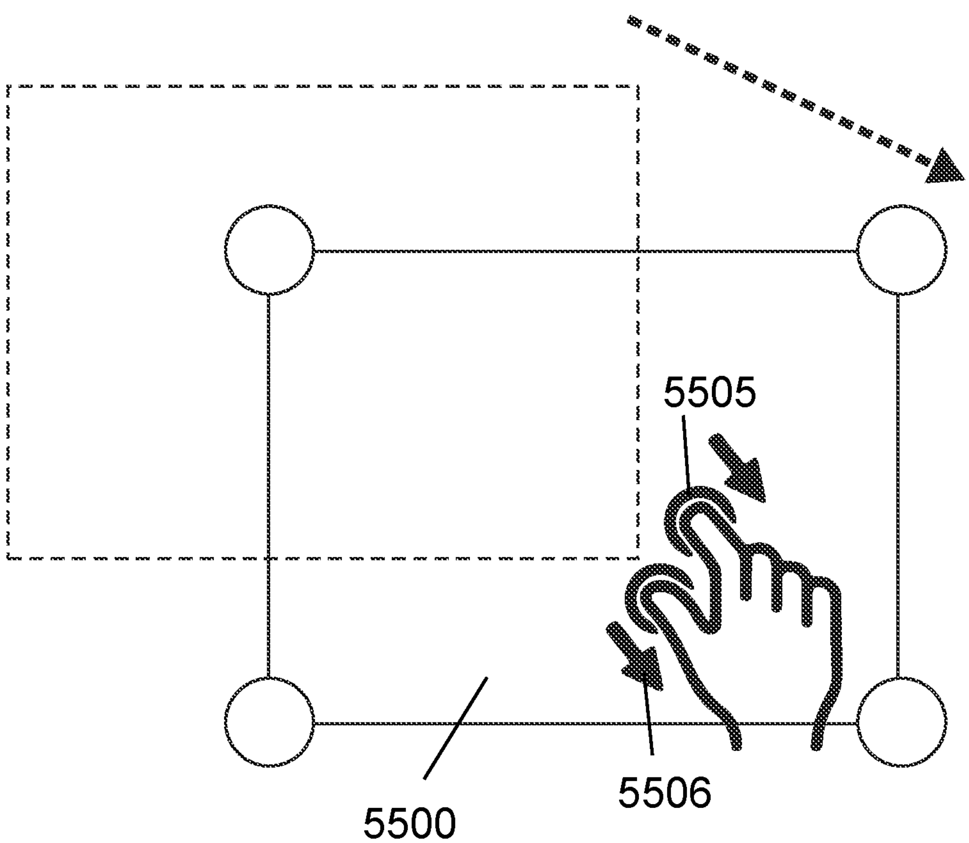
Figure 247:
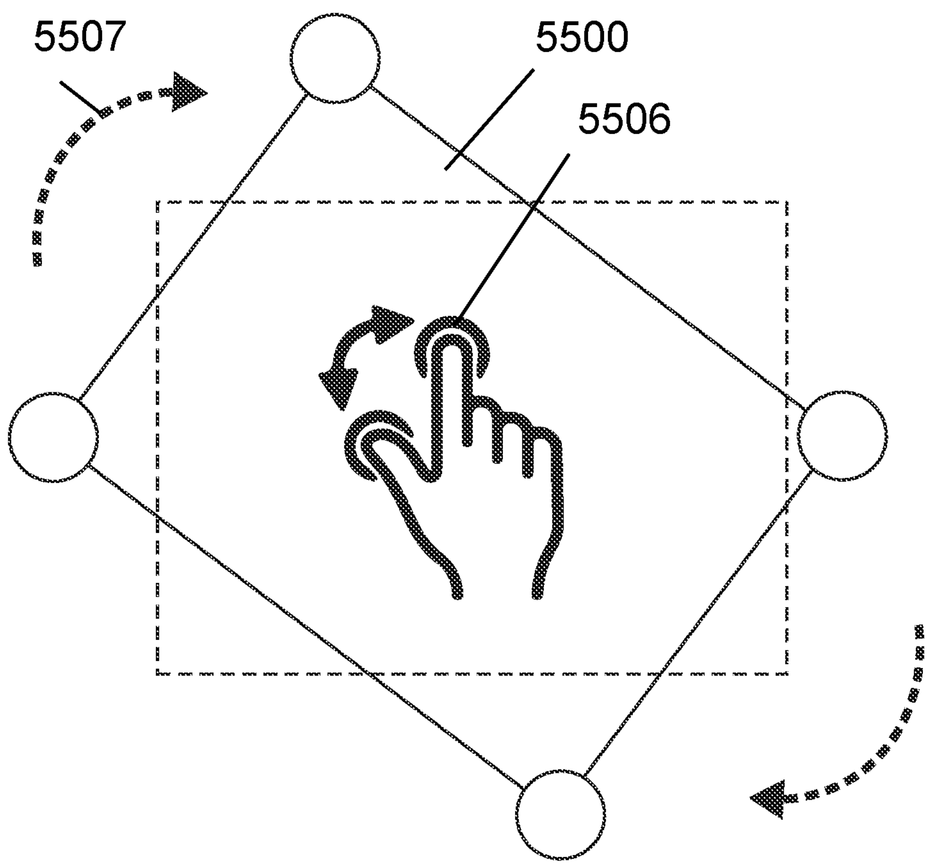
Figure 249:
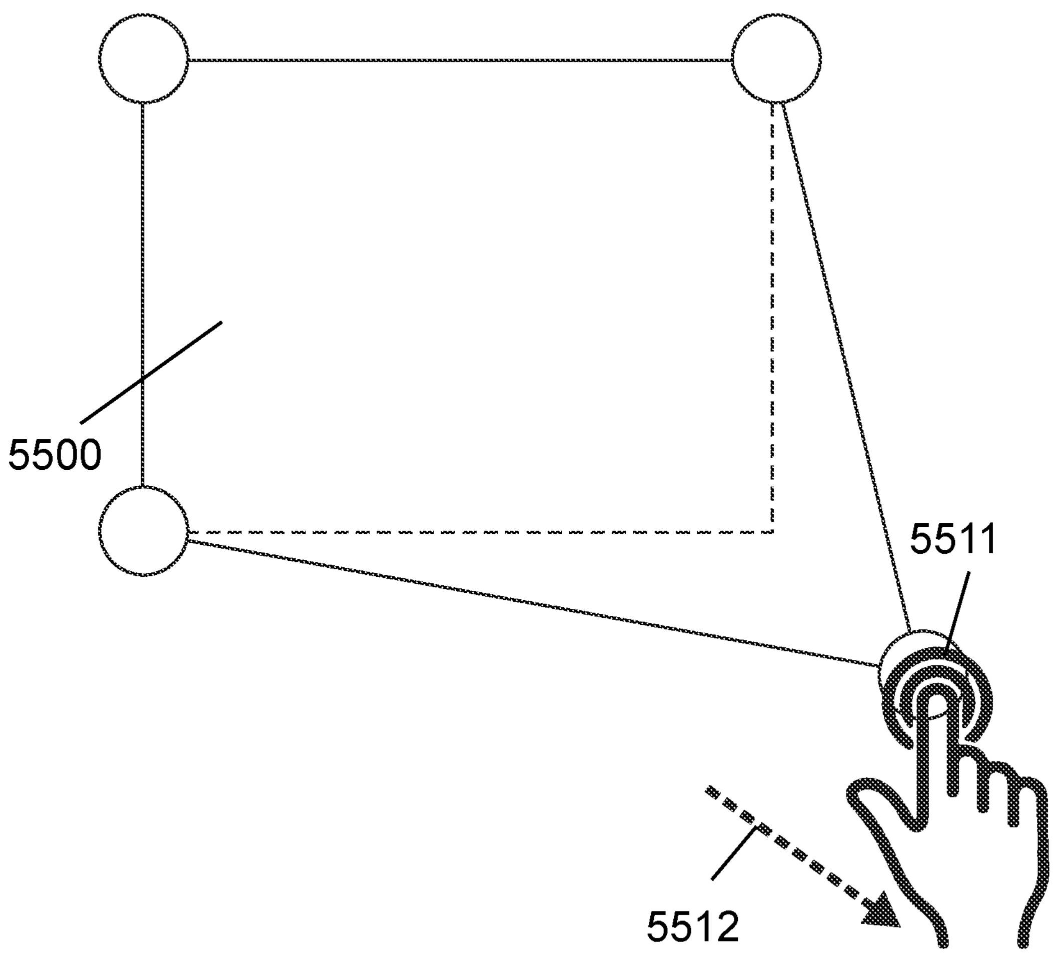
Figure 250:
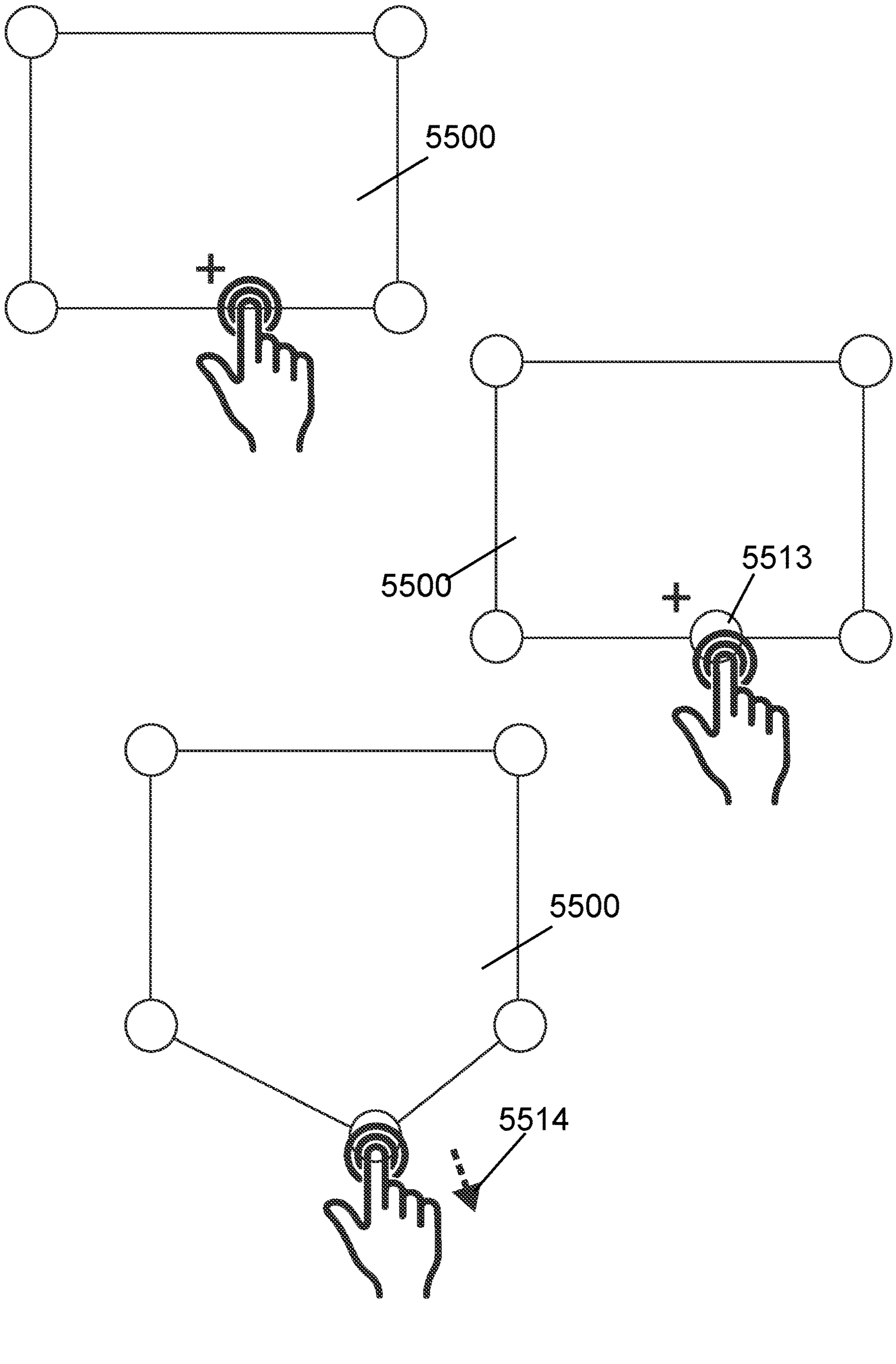
Figure 251:
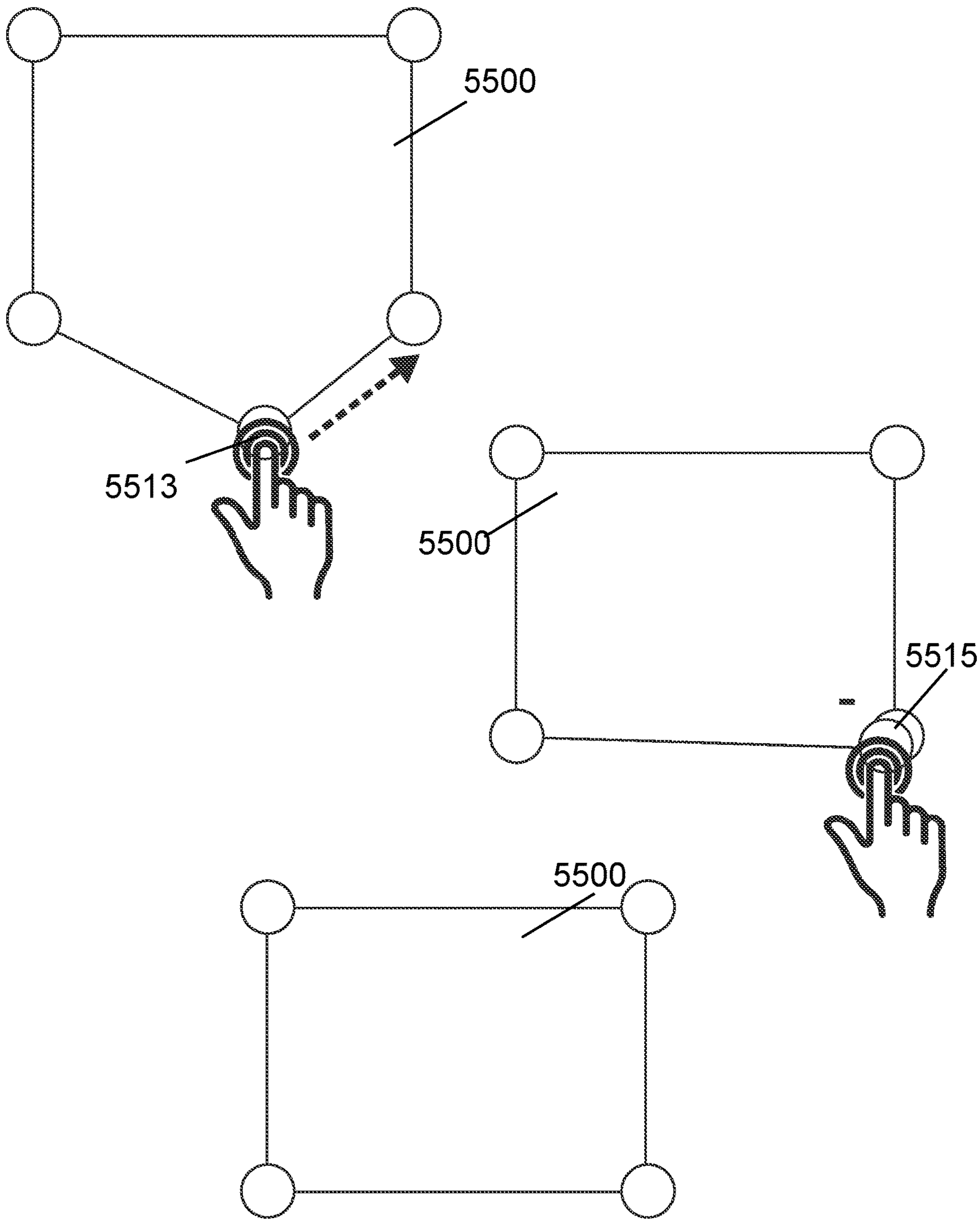
Figure 252:
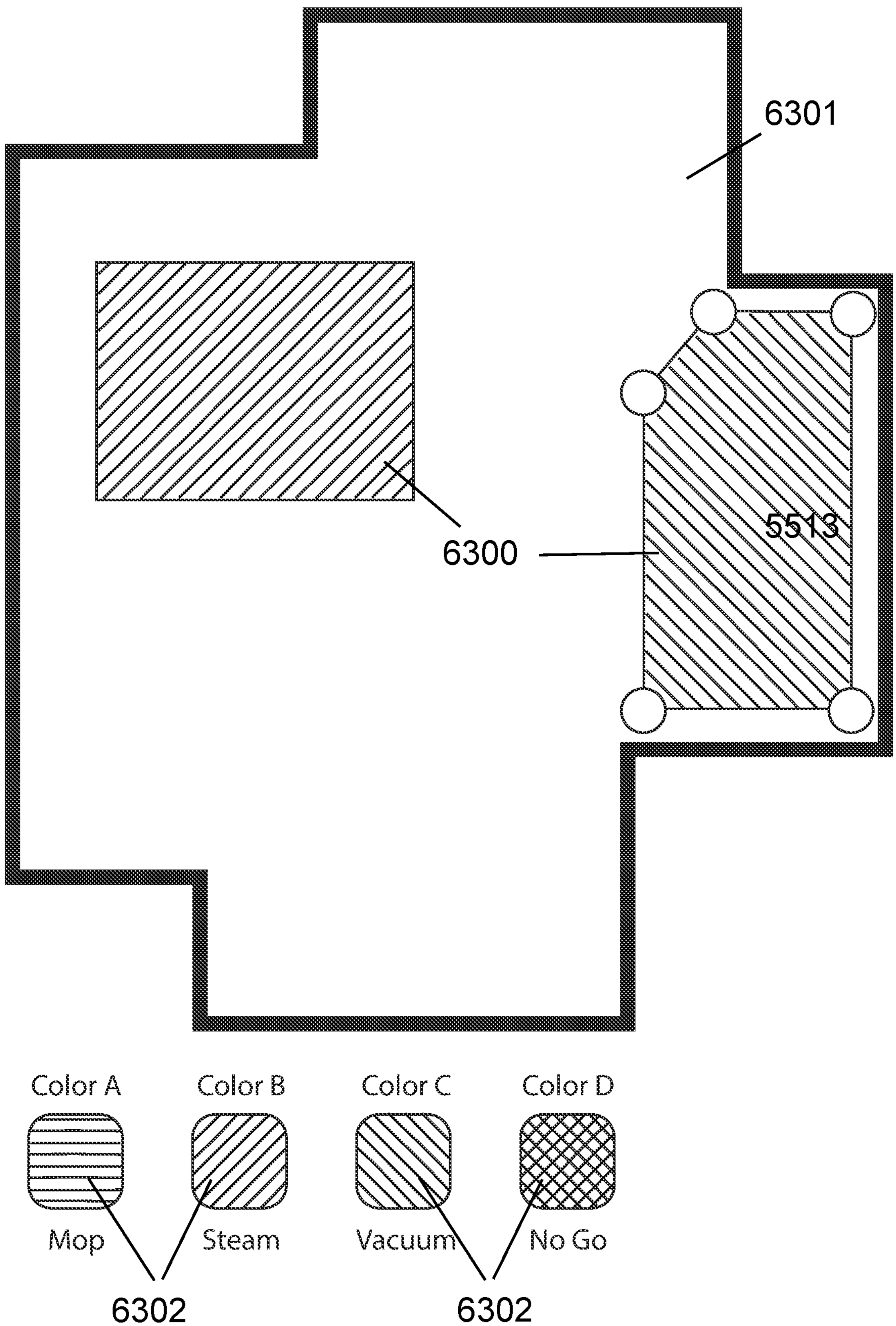

In some embodiments, the map of the area, including but not limited to doorways, sub areas, perimeter openings, and information such as coverage pattern, room tags, order of rooms, etc. is available to the user through a graphical user interface (GUI) of the application of a communication device, such as a smartphone, computer, tablet, dedicated remote control, or any device that may display output data from the robot and receive inputs from a user. Through the GUI, a user may review, accept, decline, or make changes to, for example, the map of the environment and settings, functions and operations of the robot within the environment, which may include, but are not limited to, type of coverage algorithm of the entire area or each subarea, correcting or adjusting map boundaries and the location of doorways, creating or adjusting subareas, order of cleaning subareas, scheduled cleaning of the entire area or each subarea, and activating or deactivating tools such as UV light, suction and mopping. User inputs are sent from the GUI to the robot for implementation. For example, the user may use the application to create boundary zones or virtual barriers and cleaning areas. FIG. 244 illustrates an example of a user using an application of a communication device to create a rectangular boundary zone 5500 (or a cleaning area, for example) by touching the screen and dragging a corner 5501 of the rectangle 5500 in a particular direction to change the size of the boundary zone 5500. In this example, the rectangle is being expanded in direction 5502. FIG. 245 illustrates an example of the user using the application to remove boundary zone 5500 by touching and holding an area 5503 within boundary zone 5500 until a dialog box 5504 pops up and asks the user if they would like to remove the boundary zone 5500. FIG. 246 illustrates an example of the user using the application to move boundary 5500 by touching an area 5505 within the boundary zone 5500 with two fingers and dragging the boundary zone 5500 to a desired location. In this example, boundary zone 5500 is moved in direction 5506. FIG. 247 illustrates an example of the user using the application to rotate the boundary zone 5500 by touching an area 5506 within the boundary zone 5500 with two fingers and moving one finger around the other. In this example, boundary zone 5500 is rotated in direction 5507. FIG. 248 illustrates an example of the user using the application to scale the boundary zone 5500 by touching an area 5508 within the boundary zone 5500 with two fingers and moving the two fingers towards or away from one another. In this example, boundary zone 5500 is reduced in size by moving two fingers towards each other in direction 5509 and expanded by moving two fingers away from one another in direction 5510. FIGS. 249-251 illustrate changing the shape of a zone (e.g., boundary zone, cleaning zone, etc.). FIG. 249 illustrates a user changing the shape of zone 5500 by placing their finger on a control point 5511 and dragging it in direction 5512 to change the shape. FIG. 250 illustrates the user adding a control point 5513 to the zone 5500 by placing and holding their finger at the location at which the control point 5513 is desired. The user may move control point 5513 to change the shape of the zone 5500 by dragging control point 5513, such as in direction 5514. FIG. 251 illustrates the user removing the control point 5513 from the zone 5500 by placing and holding their finger on the control point 5513 and dragging it to the nearest control point 5515. This also changes the shape of zone 5500. For example, to make a triangle from a rectangle, two control points may be merged. In some embodiments, the user may use the application to also define a task associated with each zone (e.g., no entry, mopping, vacuuming, steam cleaning. In some cases, the task within each zone may be scheduled using the application (e.g., vacuuming on Tuesdays at 10:00 AM or mopping on Friday at 8:00 PM). FIG. 252 illustrates an example of different zones 6300 created within a map 6301 using an application of a communication device. Different zones may be associated with different tasks 6302. Zones 6300 in particular are zones within which vacuuming is to be executed by the robot.

Figure 253A:
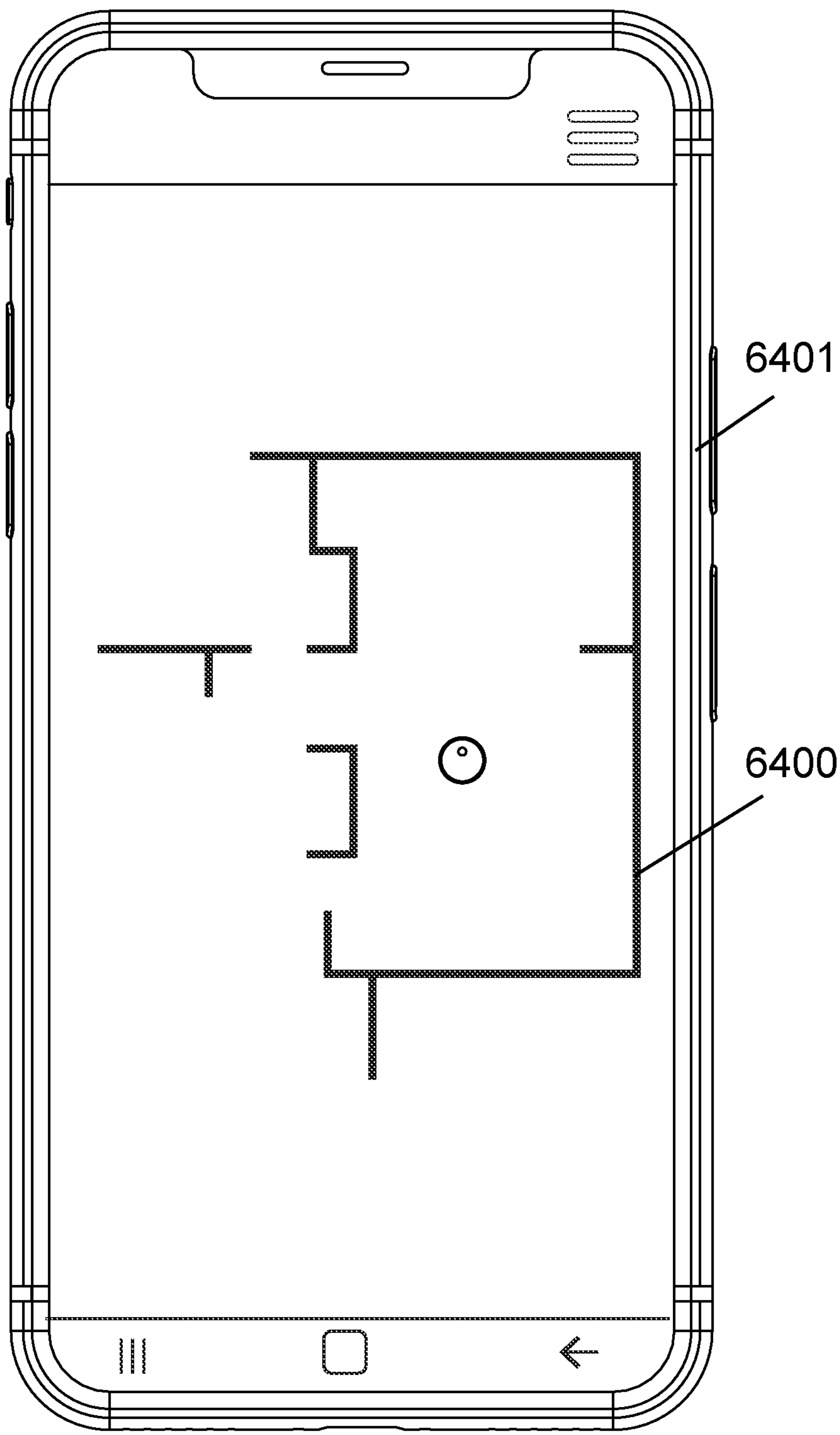
Figure 253B:
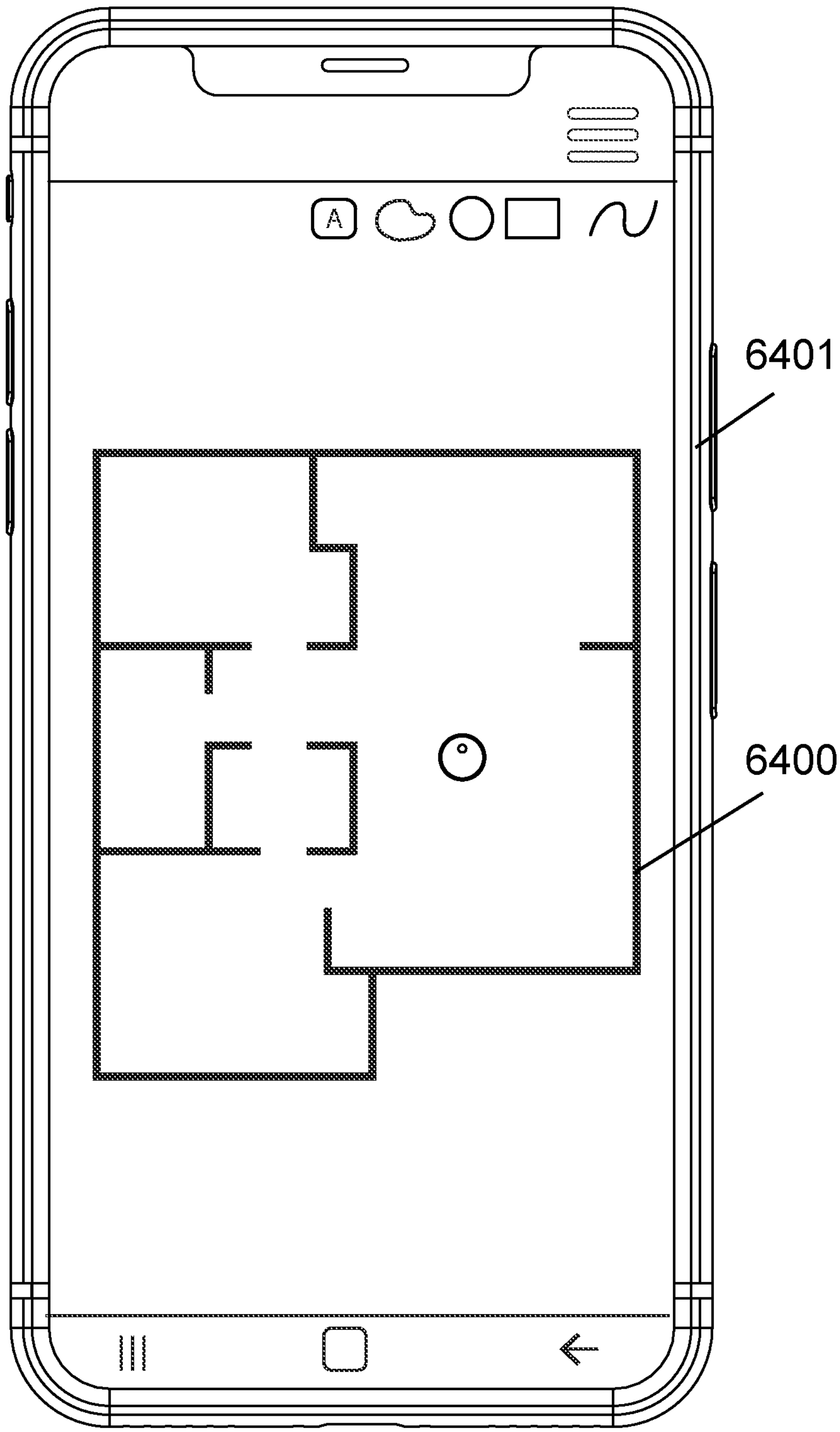
Figure 253C:
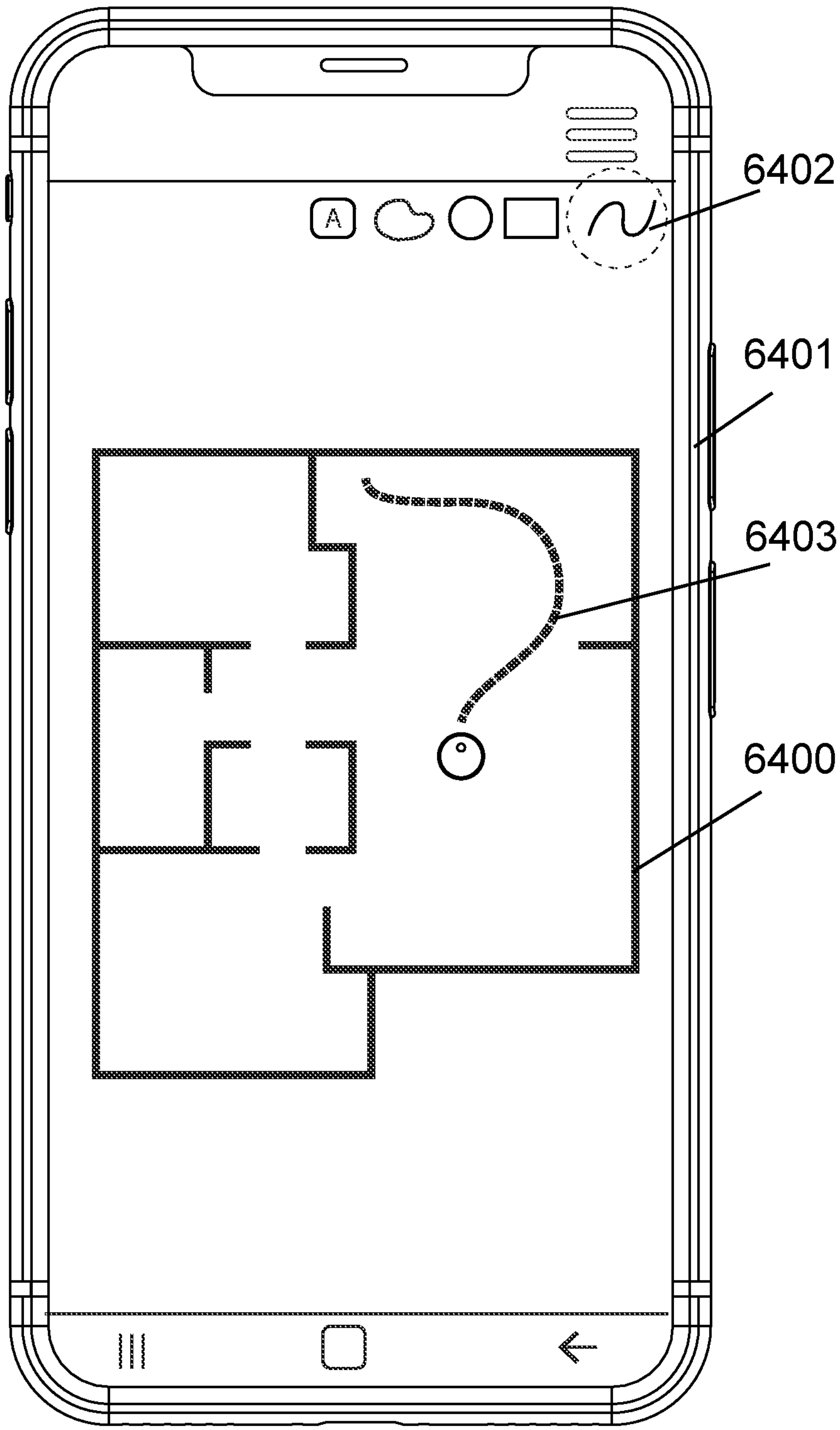
Figure 253D:
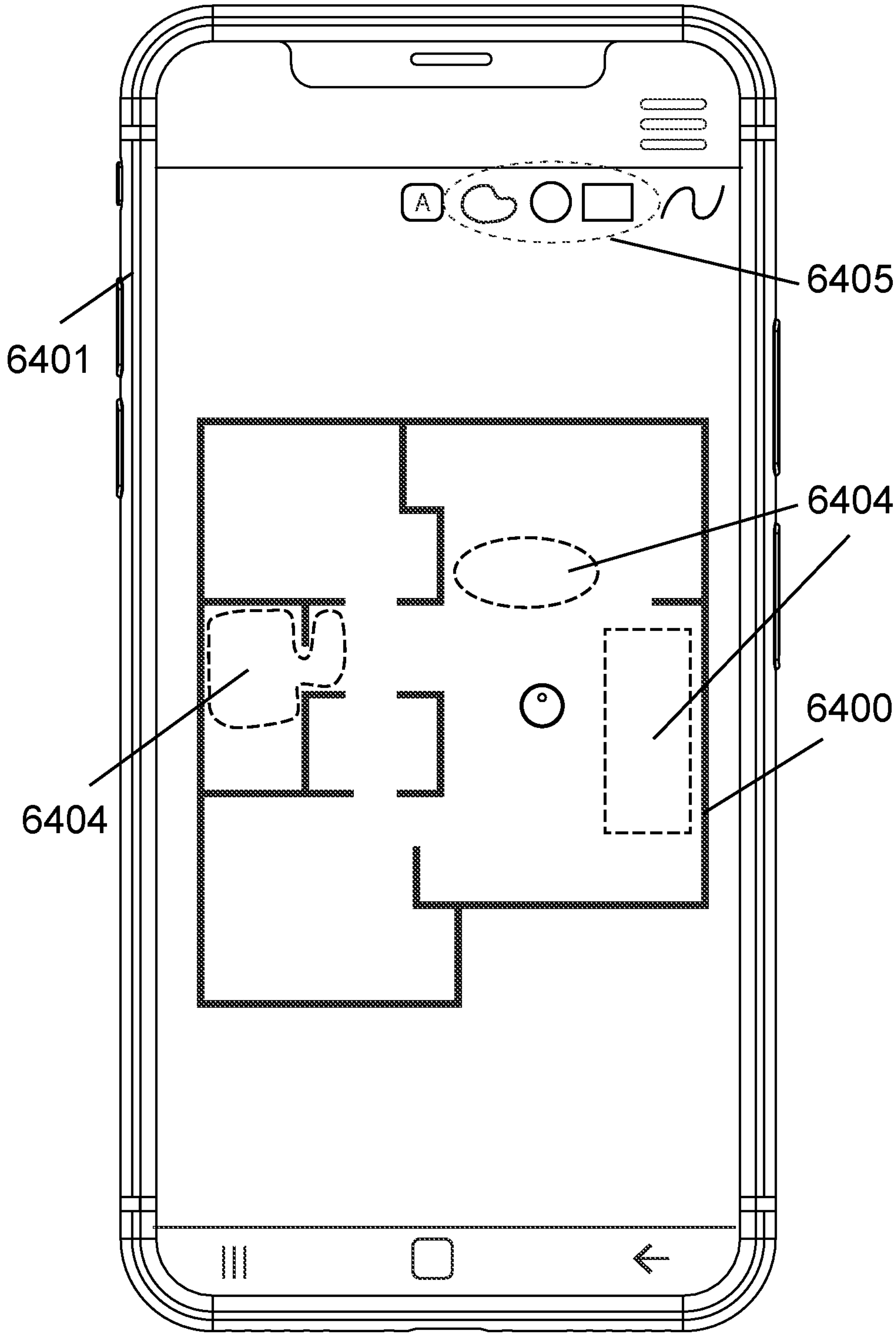
Figure 253E:
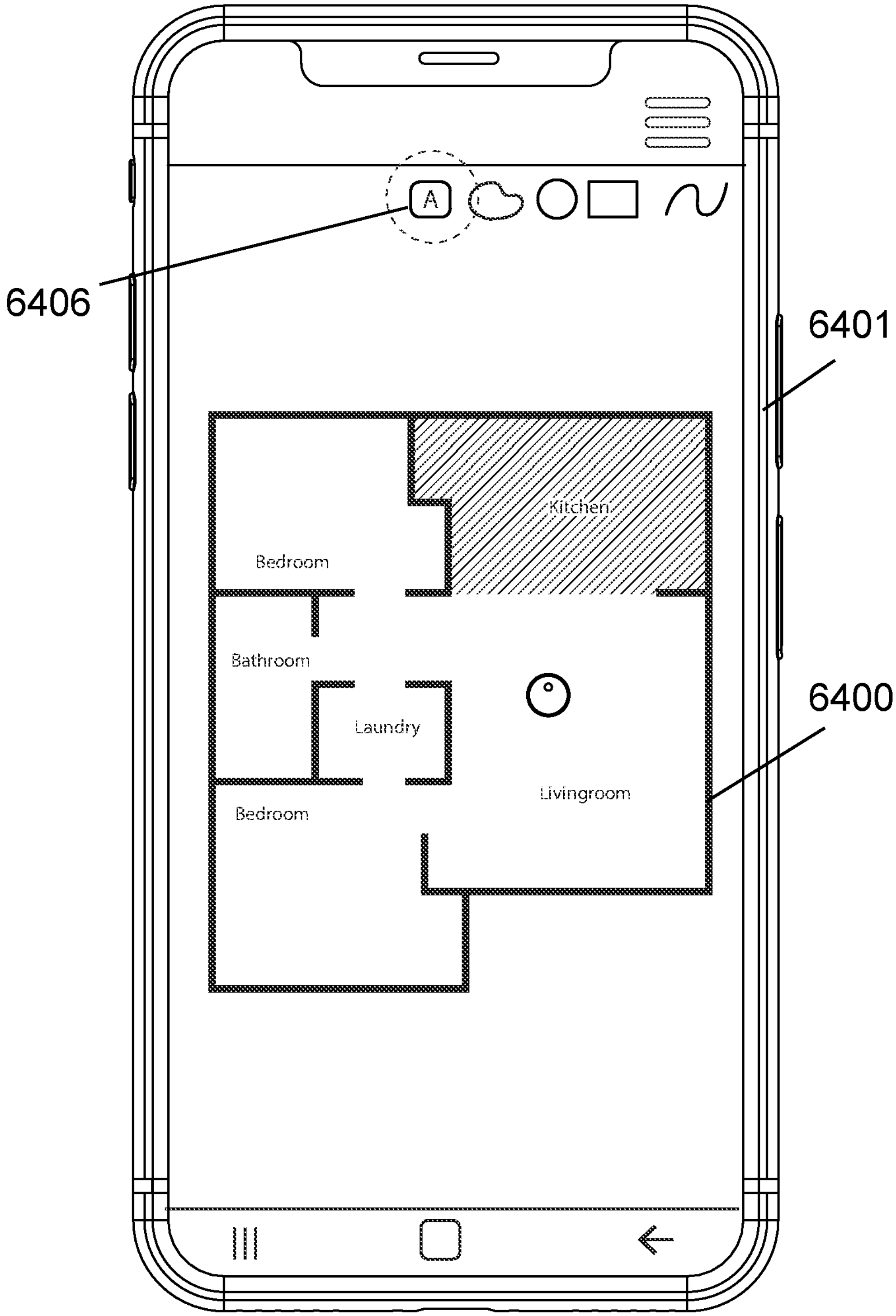
Figure 253F:
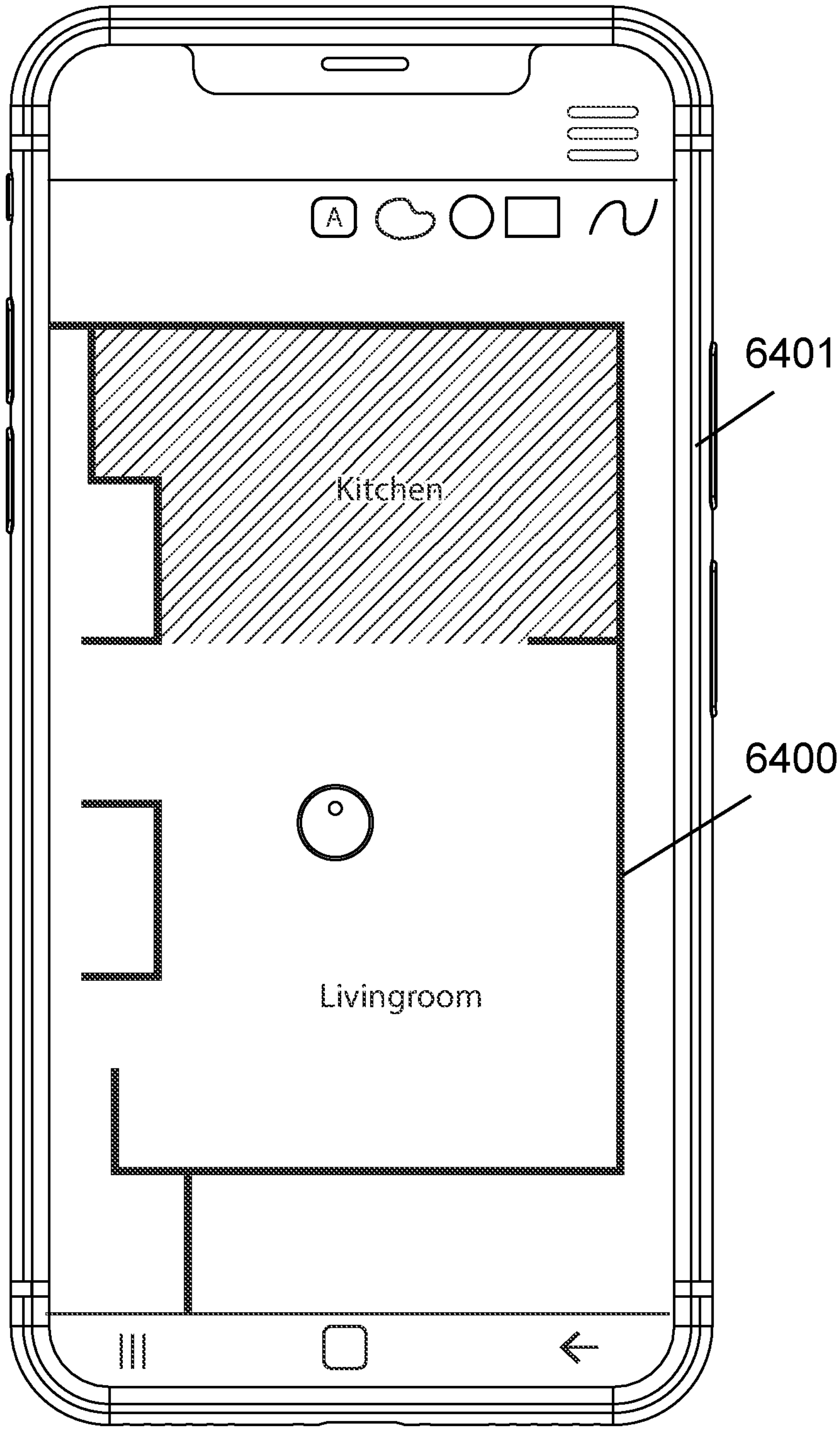
Figure 253G:
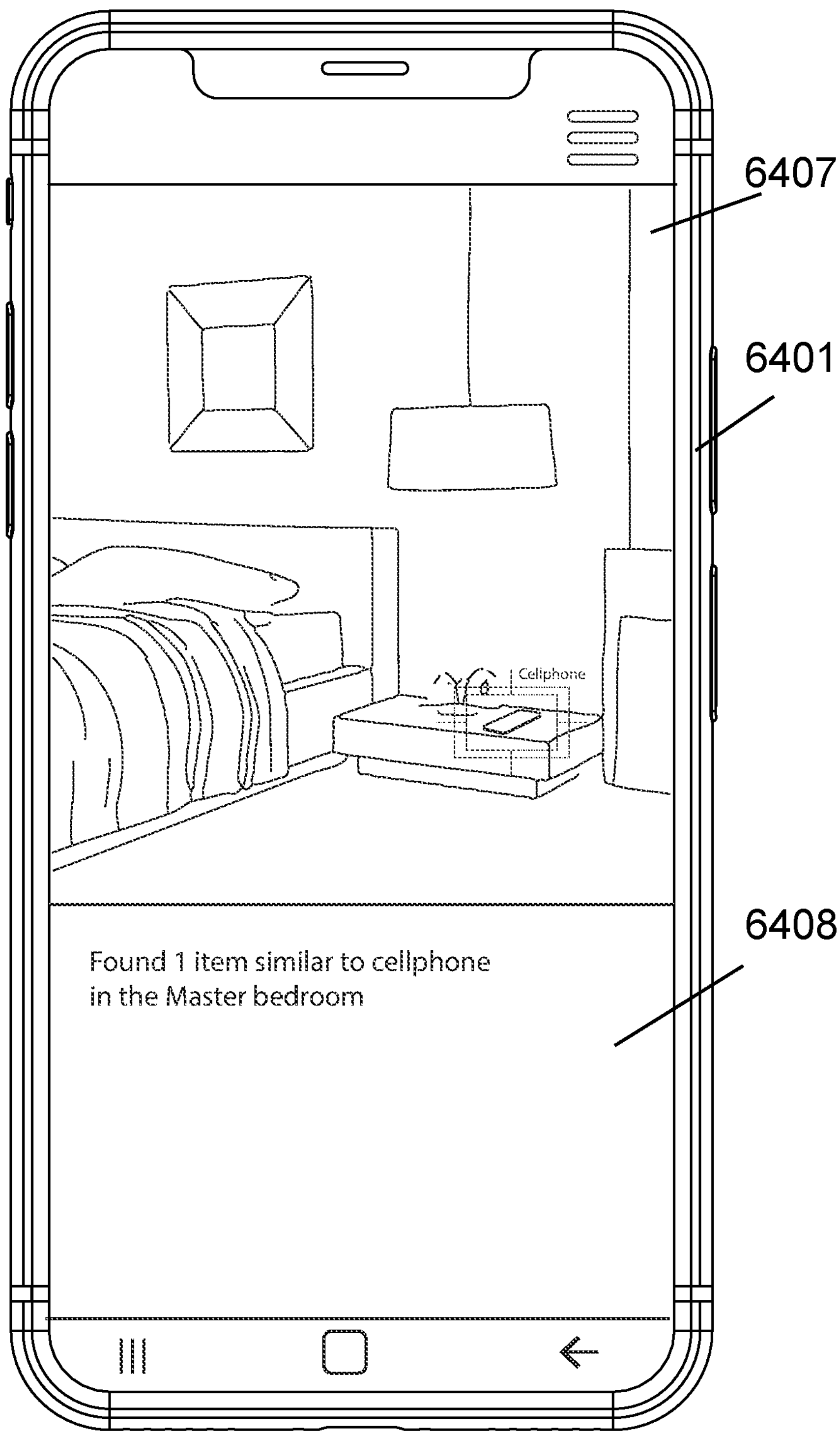
Figure 253H:
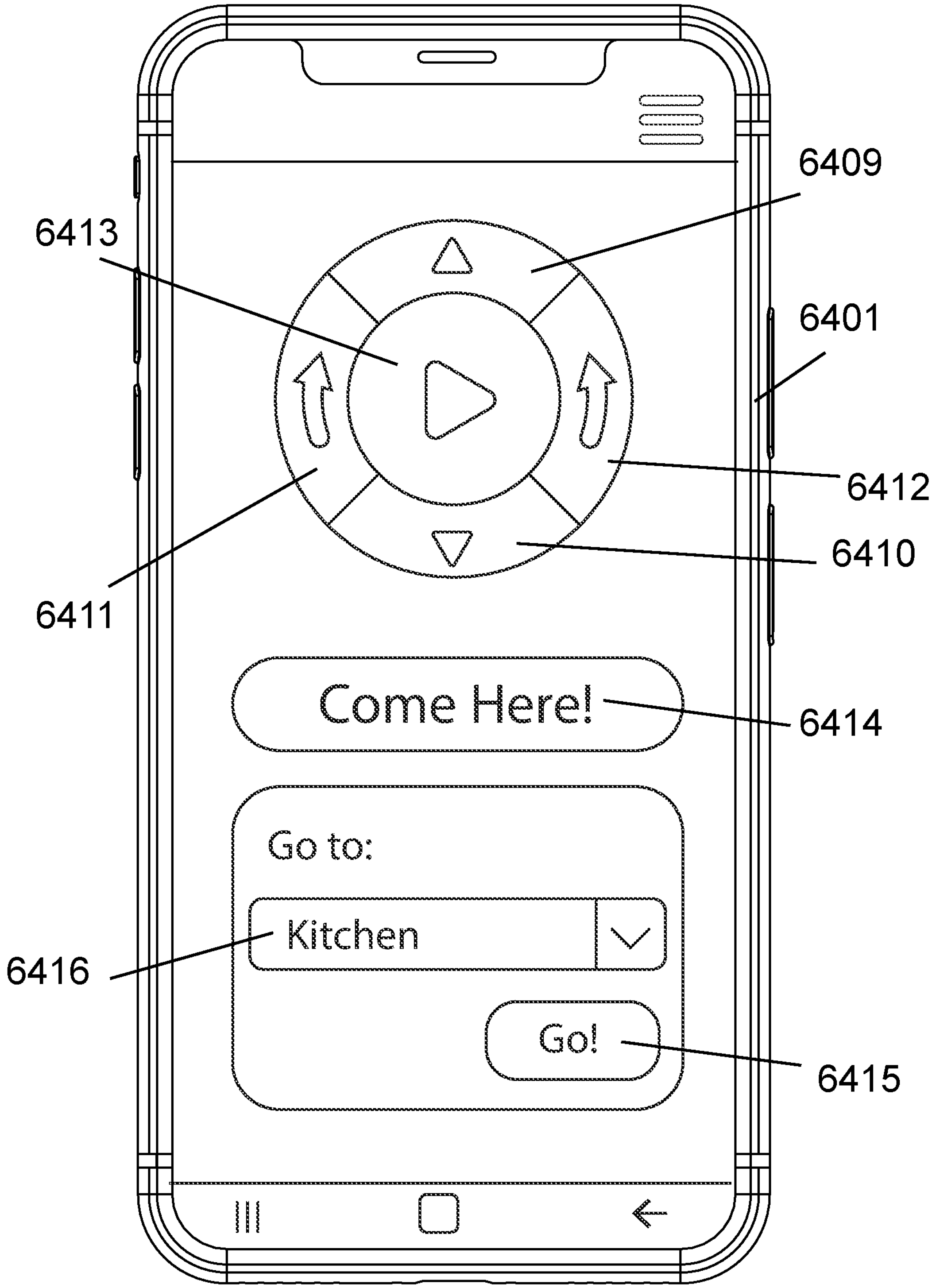

In some embodiments, the application may display the map of the environment as it is being built and updated. The application may also be used to define a path of the robot and zones and label areas. For example, FIG. 253A illustrates a map 6400 partially built on a screen of communication device 6401. FIG. 253B illustrates the completed map 6400 at a later time. In FIG. 253C, the user uses the application to define a path of the robot using path tool 6402 to draw path 6403. In some cases, the processor of the robot may adjust the path defined by the user based on observations of the environment or the use may adjust the path defined by the processor. In FIG. 253D, the user uses the application to define zones 6404 (e.g., boundary zones, vacuuming zones, mopping zones, etc.) using boundary tools 6405. In FIG. 253E, the user uses labelling tool 6406 to add labels such as bedroom, laundry, living room, and kitchen to the map 6400. In FIG. 253F, the kitchen and living room are shown. The kitchen may be shown with a particular hatching pattern to represent a particular task in that area such as no entry or vacuuming. In some cases, the application displays the camera view of the robot. This may be useful for patrolling and searching for an item. For example, in FIG. 253G the camera view 6407 of the robot is shown and a notification 6408 to the user that a cell phone has been found in the master bedroom. In some embodiments, the user may use the application to manually control the robot. For example, FIG. 253H illustrates buttons 6409 for moving the robot forward, 6410 for moving the robot backwards, 6411 for rotating the robot clockwise, 6412 for rotating the robot counterclockwise, 6413 for toggling robot between autonomous and manual mode (when in autonomous mode play symbol turns into pause symbol), 6414 for summoning the robot to the user based on, for example, GPS location of the user's phone, and 6415 for instructing the robot to go to a particular area of the environment. The particular area may be chosen from a dropdown list 6416 of different areas of the environment.

Data may be sent between the robot and the application through one or more network communication connections. Any type of wireless network signals may be used, including, but not limited to, Wi-Fi signals, or Bluetooth signals. These techniques are further described in U.S. patent application Ser. Nos. 15/949,708 and 15/272,752, the entirety of each of which is incorporated herein by reference.

In some embodiments, the map generated by the processor of the robot (or one or remote processors) may contain errors, may be incomplete, or may not reflect the areas of the environment that the user wishes the robot to service. By providing an interface by which the user may adjust the map, some embodiments obtain additional or more accurate information about the environment, thereby improving the ability of the robot to navigate through the environment or otherwise operate in a way that better accords with the user's intent. For example, via such an interface, the user may extend the boundaries of the map in areas where the actual boundaries are further than those identified by sensors of the robot, trim boundaries where sensors identified boundaries further than the actual boundaries, or adjusts the location of doorways. Or the user may create virtual boundaries that segment a room for different treatment or across which the robot will not traverse. In some cases where the processor creates an accurate map of the environment, the user may adjust the map boundaries to keep the robot from entering some areas.

FIG. 254A illustrates an overhead view of an environment 22300. This view shows the actual obstacles of the environment with outer line 22301 representing the walls of the environment 22300 and the rectangle 22302 representing a piece of furniture. FIG. 254B illustrates an overhead view of a two-dimensional map 22303 of the environment 22300 created by a processor of the robot using environmental data collected by sensors. Because the methods for generating the map are not 100% accurate, the two-dimensional map 22303 is approximate and thus performance of the robot may suffer as its navigation and operations within the environment are in reference to the map 22303. To improve the accuracy of the map 22303, a user may correct the perimeter lines of the map to match the actual obstacles via a user interface of, for example, an application of a communication device. FIG. 254C illustrates an overhead view of a user-adjusted two-dimensional map 22304. By changing the perimeter lines of the map 22303 (shown in FIG. 254B) created by the processor of the robot, a user is enabled to create a two-dimensional map 22304 of the environment 22300 (shown in FIG. 254A) that accurately identifies obstacles and boundaries in the environment. In this example, the user also creates areas 22305, 22306, and 22307 within the two-dimensional map 22304 and applies particular settings to them using the user interface. By delineating a portion 22305 of the map 22304, the user can select settings for area 22305 independent from all other areas. For example, for a surface cleaning robot the user chooses area 22305 and selects weekly cleaning, as opposed to daily or standard cleaning, for that area. In a like manner, the user selects area 22306 and turns on a mopping function for that area. The remaining area 22307 is treated in a default manner. Additional to adjusting the perimeter lines of the two-dimensional map 22304, the user can create boundaries anywhere, regardless of whether an actual perimeter exists in the environment. In the example shown, the perimeter line in the corner 22308 has been redrawn to exclude the area near the corner. The robot will thus avoid entering this area. This may be useful for keeping the robot out of certain areas, such as areas with fragile objects, pets, cables or wires, etc.

FIGS. 255A and 255B illustrate an example of changing perimeter lines of a map based on user inputs via a graphical user interface, like on a touchscreen. FIG. 255A depicts an overhead view of an environment 22400. This view shows the actual obstacles of environment 22400. The outer line 22401 represents the walls of the environment 22400 and the rectangle 22402 represents a piece of furniture. Commercial use cases are expected to be substantially more complex, e.g., with more than 2, 5, or 10 obstacles, in some cases that vary in position over time. FIG. 255B illustrates an overhead view of a two-dimensional map 22410 of the environment 22400 created by a processor of a robot using environmental sensor data. Because the methods for generating the map are often not 100% accurate, the two-dimensional map 22410 may be approximate. In some instances, performance of the robot may suffer as a result of imperfections in the generated map 22410. In some embodiments, a user corrects the perimeter lines of map 22410 to match the actual obstacles and boundaries of environment 22400. In some embodiments, the user is presented with a user interface displaying the map 22410 of the environment 22400 on which the user may add, delete, and/or otherwise adjust perimeter lines of the map 22410. For example, the processor of the robot may send the map 22410 to an application of a communication device wherein user input indicating adjustments to the map are received through a user interface of the application. The input triggers an event handler that launches a routine by which a perimeter line of the map is added, deleted, and/or otherwise adjusted in response to the user input, and an updated version of the map may be stored in memory before being transmitted back to the processor of the robot. For instance, in map 22410, the user manually corrects perimeter line 22416 by drawing line 22418 and deleting perimeter line 22416 in the user interface. In some cases, user input to add a line may specify endpoints of the added line or a single point and a slope. Some embodiments may modify the line specified by inputs to "snap" to likely intended locations. For instance, inputs of line endpoints may be adjusted by the processor to equal a closest existing line of the map. Or a line specified by a slope and point may have endpoints added by determining a closest intersection relative to the point of the line with the existing map. In some cases, the user may also manually indicate with portion of the map to remove in place of the added line, e.g., separately specifying line 22418 and designating curvilinear segment 22416 for removal. Or some embodiments may programmatically select segment 22416 for removal in response to the user inputs designating line 22418, e.g., in response to determining that areas 22416 and 22418 bound areas of less than a threshold size, or by determining that line 22416 is bounded on both sides by areas of the map designated as part of the environment.

In some embodiments, the application suggests a correcting perimeter. For example, embodiments may determine a best-fit polygon of a perimeter of the (as measured) map through a brute force search or some embodiments may suggest a correcting perimeter with a Hough Transform, the Ramer-Douglas-Peucker algorithm, the Visvalingam algorithm, or other line-simplification algorithm. Some embodiments may determine candidate suggestions that do not replace an extant line but rather connect extant segments that are currently unconnected, e.g., some embodiments may execute a pairwise comparison of distances between endpoints of extant line segments and suggest connecting those having distances less than a threshold distance apart. Some embodiments may select, from a set of candidate line simplifications, those with a length above a threshold or those with above a threshold ranking according to line length for presentation. In some embodiments, presented candidates may be associated with event handlers in the user interface that cause the selected candidates to be applied to the map. In some cases, such candidates may be associated in memory with the line segments they simplify, and the associated line segments that are simplified may be automatically removed responsive to the event handler receive a touch input event corresponding to the candidate. For instance, in map 22410, in some embodiments, the application suggests correcting perimeter line 22412 by displaying suggested correction 22414. The user accepts the corrected perimeter line 22414 that will replace and delete perimeter line 22412 by supplying inputs to the user interface. In some cases, where perimeter lines are incomplete or contain gaps, the application suggests their completion. For example, the application suggests closing the gap 22420 in perimeter line 22422. Suggestions may be determined by the robot, the application executing on the communication device, or other services, like a cloud-based service or computing device in a base station.

In embodiments, perimeter lines may be edited in a variety of ways such as, for example, adding, deleting, trimming, rotating, elongating, redrawing, moving (e.g., upward, downward, leftward, or rightward), suggesting a correction, and suggesting a completion to all or part of the perimeter line. In some embodiments, the application may suggest an addition, deletion or modification of a perimeter line and in other embodiments the user may manually adjust perimeter lines by, for example, elongating, shortening, curving, trimming, rotating, translating, flipping, etc. the perimeter line selected with their finger or buttons or a cursor of the communication device or by other input methods. In some embodiments, the user may delete all or a portion of the perimeter line and redraw all or a portion of the perimeter line using drawing tools, e.g., a straight-line drawing tool, a Bezier tool, a freehand drawing tool, and the like. In some embodiments, the user may add perimeter lines by drawing new perimeter lines. In some embodiments, the application may identify unlikely boundaries created (newly added or by modification of a previous perimeter) by the user using the user interface. In some embodiments, the application may identify one or more unlikely perimeter segments by detecting one or more perimeter segments oriented at an unusual angle (e.g., less than 25 degrees relative to a neighboring segment or some other threshold) or one or more perimeter segments comprising an unlikely contour of a perimeter (e.g., short perimeter segments connected in a zig-zag form). In some embodiments, the application may identify an unlikely perimeter segment by determining the surface area enclosed by three or more connected perimeter segments, one being the newly created perimeter segment and may identify the perimeter segment as an unlikely perimeter segment if the surface area is less than a predetermined (or dynamically determined) threshold. In some embodiments, other methods may be used in identifying unlikely perimeter segments within the map. In some embodiments, the user interface may present a warning message using the user interface, indicating that a perimeter segment is likely incorrect. In some embodiments, the user may ignore the warning message or responds by correcting the perimeter segment using the user interface.

In some embodiments, the application may autonomously suggest a correction to perimeter lines by, for example, identifying a deviation in a straight perimeter line and suggesting a line that best fits with regions of the perimeter line on either side of the deviation (e.g. by fitting a line to the regions of perimeter line on either side of the deviation). In other embodiments, the application may suggest a correction to perimeter lines by, for example, identifying a gap in a perimeter line and suggesting a line that best fits with regions of the perimeter line on either side of the gap. In some embodiments, the application may identify an end point of a line and the next nearest end point of a line and suggests connecting them to complete a perimeter line. In some embodiments, the application may only suggest connecting two end points of two different lines when the distance between the two is below a particular threshold distance. In some embodiments, the application may suggest correcting a perimeter line by rotating or translating a portion of the perimeter line that has been identified as deviating such that the adjusted portion of the perimeter line is adjacent and in line with portions of the perimeter line on either side. For example, a portion of a perimeter line is moved upwards or downward or rotated such that it is in line with the portions of the perimeter line on either side. In some embodiments, the user may manually accept suggestions provided by the application using the user interface by, for example, touching the screen, pressing a button or clicking a cursor. In some embodiments, the application may automatically make some or all of the suggested changes.

In some embodiments, maps may be represented in vector graphic form or with unit tiles, like in a bitmap. In some cases, changes may take the form of designating unit tiles via a user interface to add to the map or remove from the map. In some embodiments, bitmap representations may be modified (or candidate changes may be determined) with, for example, a two-dimensional convolution configured to smooth edges of mapped environment areas (e.g., by applying a Gaussian convolution to a bitmap with tiles having values of 1 where the environment is present and 0 where the environment is absent and suggesting adding unit tiles with a resulting score above a threshold). In some cases, the bitmap may be rotated to align the coordinate system with walls of a generally rectangular room, e.g., to an angle at which a diagonal edge segments are at an aggregate minimum. Some embodiments may then apply a similar one-dimensional convolution and thresholding along the directions of axes of the tiling, but applying a longer stride than the two-dimensional convolution to suggest completing likely remaining wall segments.

In some embodiments, the user may create different areas within the environment via the user interface (which may be a single screen, or a sequence of displays that unfold over time). In some embodiments, the user may select areas within the map of the environment displayed on the screen using their finger or providing verbal instructions, or in some embodiments, an input device, such as a cursor, pointer, stylus, mouse, button or buttons, or other input methods. Some embodiments may receive audio input, convert the audio to text with a speech-to-text model, and then map the text to recognized commands. In some embodiments, the user may label different areas of the environment using the user interface of the application. In some embodiments, the user may use the user interface to select any size area (e.g., the selected area may be comprised of a small portion of the environment or could encompass the entire environment) or zone within a map displayed on a screen of the communication device and the desired settings for the selected area. For example, in some embodiments, a user selects any of: cleaning modes, frequency of cleaning, intensity of cleaning, power level, navigation methods, driving speed, etc. The selections made by the user are sent to a processor of the robot and the processor of the robot processes the received data and applies the user changes.

In some embodiments, the user may select different settings, such as tool, cleaning and scheduling settings, for different areas of the environment using the user interface. In some embodiments, the processor autonomously divides the environment into different areas and in some instances, the user may adjust the areas of the environment created by the processor using the user interface. Examples of methods for dividing an environment into different areas and choosing settings for different areas are described in U.S. patent application Ser. Nos. 14/817,952, 16/198,393, 16/599,169, and 15/619,449, the entire contents of each of which are hereby incorporated by reference. In some embodiments, the user may adjust or choose tool settings of the robot using the user interface of the application and may designate areas in which the tool is to be applied with the adjustment. Examples of tools of a surface cleaning robot include a suction tool (e.g., a vacuum), a mopping tool (e.g., a mop), a sweeping tool (e.g., a rotating brush), a main brush tool, a side brush tool, and an ultraviolet (UV) light capable of killing bacteria. Tool settings that the user may adjust using the user interface may include activating or deactivating various tools, impeller motor speed or power for suction control, fluid release speed for mopping control, brush motor speed for vacuuming control, and sweeper motor speed for sweeping control. In some embodiments, the user may choose different tool settings for different areas within the environment or may schedule particular tool settings at specific times using the user interface. For example, the user selects activating the suction tool in only the kitchen and bathroom on Wednesdays at noon. In some embodiments, the user may adjust or choose robot cleaning settings using the user interface. Robot cleaning settings may include, but are not limited to, robot speed settings, movement pattern settings, cleaning frequency settings, cleaning schedule settings, etc. In some embodiments, the user may choose different robot cleaning settings for different areas within the environment or may schedule particular robot cleaning settings at specific times using the user interface. For example, the user chooses areas A and B of the environment to be cleaned with the robot at high speed, in a boustrophedon pattern, on Wednesday at noon every week, and areas C and D of the environment to be cleaned with the robot at low speed, in a spiral pattern, on Monday and Friday at nine in the morning, every other week. In addition to the robot settings of areas A, B, C, and D of the environment the user selects tool settings using the user interface as well. In some embodiments, the user may choose the order of covering or operating in the areas of the environment using the user interface. In some embodiments, the user may choose areas to be excluded using the user interface. In some embodiments, the user may adjust or create a coverage path of the robot using the user interface. For example, the user adds, deletes, trims, rotates, elongates, redraws, moves (in all four directions), flips, or curves a selected portion of the coverage path. In some embodiments, the user may adjust the path created by the processor using the user interface. In some embodiments, the user may choose an area of the map using the user interface and may apply particular tool and/or operational settings to the area. In other embodiments, the user may choose an area of the environment from a drop-down list or some other method of displaying different areas of the environment.

Reference to operations performed on "a map" may include operations performed on various representations of the map. For instance, the robot may store in memory a relatively high-resolution representation of a map, and a lower-resolution representation of the map may be sent to a communication device for editing. In this scenario, the edits are still to "the map," notwithstanding changes in format, resolution, or encoding. Similarly, a map stored in memory of the robot, while only a portion of the map may be sent to the communication device, and edits to that portion of the map are still properly understood as being edits to "the map" and obtaining that portion is properly understood as obtaining "the map." Maps may be said to be obtained from a robot regardless of whether the maps are obtained via direct wireless connection between the robot and a communication device or obtained indirectly via a cloud service. Similarly, a modified map may be said to have been sent to the robot even if only a portion of the modified map, like a delta from a previous version currently stored on the robot, is sent.

In some embodiments, the user interface may present a map, e.g., on a touchscreen, and areas of the map (e.g., corresponding to rooms or other sub-divisions of the environment, e.g., collections of contiguous unit tiles in a bitmap representation) in pixel-space of the display may be mapped to event handlers that launch various routines responsive to events like an on-touch event, a touch release event, or the like. In some cases, before or after receiving such a touch event, the user interface may present the user with a set of user-interface elements by which the user may instruct embodiments to apply various commands to the area. Or in some cases, the areas of a working environment may be depicted in the user interface without also depicting their spatial properties, e.g., as a grid of options without conveying their relative size or position. Examples of commands specified via the user interface may include assigning an operating mode to an area, e.g., a cleaning mode or a mowing mode. Modes may take various forms. Examples may include modes that specify how a robot performs a function, like modes that select which tools to apply and settings of those tools. Other examples may include modes that specify target results, e.g., a "heavy clean" mode versus a "light clean" mode, a quite vs loud mode, or a slow versus fast mode. In some cases, such modes may be further associated with scheduled times in which operation subject to the mode is to be performed in the associated area. In some embodiments, a given area may be designated with multiple modes, e.g., a vacuuming mode and a quite mode. In some cases, modes may be nominal properties, ordinal properties, or cardinal properties, e.g., a vacuuming mode, a heaviest-clean mode, a 10/seconds/linear-foot vacuuming mode, respectively. Other examples of commands specified via the user interface may include commands that schedule when modes of operations are to be applied to areas. Such scheduling may include scheduling when cleaning is to occur or when cleaning using a designed mode is to occur. Scheduling may include designating a frequency, phase, and duty cycle of cleaning, e.g., weekly, on Monday at 4, for 45 minutes. Scheduling, in some cases, may include specifying conditional scheduling, e.g., specifying criteria upon which modes of operation are to be applied. Examples may include events in which no motion is detected by a motion sensor of the robot or a base station for more than a threshold duration of time, or events in which a third-party API (that is polled or that pushes out events) indicates certain weather events have occurred, like rain. In some cases, the user interface may expose inputs by which such criteria may be composed by the user, e.g., with Boolean connectors, for instance "If no-motion-for-45-minutes, and raining, then apply vacuum mode in area labeled "kitchen."

In some embodiments, the user interface may display information about a current state of the robot or previous states of the robot or its environment. Examples may include a heat map of dirt or debris sensed over an area, visual indications of classifications of floor surfaces in different areas of the map, visual indications of a path that the robot has taken during a current cleaning session or other type of work session, visual indications of a path that the robot is currently following and has computed to plan further movement in the future, and visual indications of a path that the robot has taken between two points in the environment, like between a point A and a point B on different sides of a room or a house in a point-to-point traversal mode. In some embodiments, while or after a robot attains these various states, the robot may report information about the states to the application via a wireless network, and the application may update the user interface on the communication device to display the updated information. For example, in some cases, a processor of a robot may report which areas of the working environment have been covered during a current working session, for instance, in a stream of data to the application executing on the communication device formed via a WebRTC Data connection, or with periodic polling by the application, and the application executing on the computing device may update the user interface to depict which areas of the working environment have been covered. In some cases, this may include depicting a line of a path traced by the robot or adjusting a visual attribute of areas or portions of areas that have been covered, like color or shade or areas or boundaries. In some embodiments, the visual attributes may be varied based upon attributes of the environment sensed by the robot, like an amount of dirt or a classification of a flooring type since by the robot. In some embodiments, a visual odometer implemented with a downward facing camera may capture images of the floor, and those images of the floor, or a segment thereof, may be transmitted to the application to apply as a texture in the visual representation of the working environment in the map, for instance, with a map depicting the appropriate color of carpet, wood floor texture, tile, or the like to scale in the different areas of the working environment.

In some embodiments, the user interface may indicate in the map a path the robot is about to take or has taken (e.g., according to a routing algorithm) between two points, to cover an area, or to perform some other task. For example, a route may be depicted as a set of line segments or curves overlaid on the map, and some embodiments may indicate a current location of the robot with an icon overlaid on one of the line segments with an animated sequence that depicts the robot moving along the line segments. In some embodiments, the future movements of the robot or other activities of the robot may be depicted in the user interface. For example, the user interface may indicate which room or other area the robot is currently covering and which room or other area the robot is going to cover next in a current work sequence. The state of such areas may be indicated with a distinct visual attribute of the area, its text label, or its perimeters, like color, shade, blinking outlines, and the like. In some embodiments, a sequence with which the robot is currently programmed to cover various areas may be visually indicated with a continuum of such visual attributes, for instance, ranging across the spectrum from red to blue (or dark grey to light) indicating sequence with which subsequent areas are to be covered.

In some embodiments, via the user interface or automatically without user input, a starting and an ending point for a path to be traversed by the robot may be indicated on the user interface of the application executing on the communication device. Some embodiments may depict these points and propose various routes therebetween, for example, with various routing algorithms like those described in the applications incorporated by reference herein. Examples include A*, Dijkstra's algorithm, and the like. In some embodiments, a plurality of alternate candidate routes may be displayed (and various metrics thereof, like travel time or distance), and the user interface may include inputs (like event handlers mapped to regions of pixels) by which a user may select among these candidate routes by touching or otherwise selecting a segment of one of the candidate routes, which may cause the application to send instructions to the robot that cause the robot to traverse the selected candidate route.

In some embodiments, the map may include information such as debris or bacteria accumulation in different areas, stalls encountered in different areas, obstacles, driving surface type, driving surface transitions, coverage area, robot path, etc. In some embodiments, the user may use user interface of the application to adjust the map by adding, deleting, or modifying information (e.g., obstacles) within the map. For example, the user may add information to the map using the user interface such as debris or bacteria accumulation in different areas, stalls encountered in different areas, obstacles, driving surface type, driving surface transitions, etc.

In some embodiments, the application of the communication device may display the spatial representation of the environment as its being built and after completion; a movement path of the robot; a current position of the robot; a current position of a charging station of the robot; robot status; a current quantity of total area cleaned; a total area cleaned after completion of a task; a battery level; a current cleaning duration; an estimated total cleaning duration required to complete a task; an estimated total battery power required to complete a task, a time of completion of a task; obstacles within the spatial representation including object type of the obstacle and percent confidence of the object type; obstacles within the spatial representation including obstacles with unidentified object type; issues requiring user attention within the spatial representation; a fluid flow rate for different areas within the spatial representation; a notification that the robot has reached a particular location; cleaning history; user manual; maintenance information; and firmware information.

In some embodiments, the application of the communication device may receive an input designating an object type of an obstacle with unidentified object type; a schedule for cleaning different areas within the spatial representation; vacuuming or mopping or vacuuming and mopping for cleaning different areas within the spatial representation; a suction level for cleaning different areas within the spatial representation; a no-entry zone; a no-mopping zone; a virtual wall; a modification to the spatial representation; a fluid flow rate level for mopping different areas within the spatial representation; an order of cleaning different areas of the environment; deletion or addition of a robot paired with the application; an instruction to find the robot; an instruction to contact customer service; an instruction to update firmware; a driving speed of the robot; a volume of the robot; a voice type of the robot; pet details; deletion of an obstacle within the spatial representation; an instruction for a charging station of the robot; an instruction for the charging station of the robot to empty a bin of the robot into a bin of the charging station; and an instruction for the charging station of the robot to fill a fluid reservoir of the robot. In some embodiments, the application may receive an input enacting an instruction for the robot to pause a current task; start mopping or vacuuming; dock at the charging station; start cleaning; spot clean; navigate to a particular location; and move or rotate in a particular direction.

In some embodiments, the map formed by the processor of the robot during traversal of the working environment may have various artifacts like those described herein. Using techniques like the line simplification algorithms and convolution will smoothing and filtering, some embodiments may remove clutter from the map, like artifacts from reflections or small objects like chair legs to simplify the map, or a version thereof in lower resolution to be depicted on a user interface of the application executed by the communication device. In some cases, this may include removing duplicate borders, for instance, by detecting border segments surrounded on two sides by areas of the working environment and removing those segments.

Some embodiments may rotate and scale the map for display in the user interface. In some embodiments, the map may be scaled based on a window size such that a largest dimension of the map in a given horizontal or vertical direction is less than a largest dimension in pixel space of the window size of the communication device or a window thereof in which the user interfaces displayed. Or in some embodiments, the map may be scaled to a minimum or maximum size, e.g., in terms of a ratio of meters of physical space to pixels in display space. Some embodiments may include zoom and panning inputs in the user interface by which a user may zoom the map in and out, adjusting scaling, and pan to shifts which portion of the map is displayed in the user interface.

In some embodiments, rotation of the map or portions thereof (like perimeter lines) may be determined with techniques like those described above by which an orientation that minimizes an amount of aliasing, or diagonal lines of pixels on borders, is minimized. Or borders may be stretched or rotated to connect endpoints determined to be within a threshold distance. In some embodiments, an optimal orientation may be determined over a range of candidate rotations that is constrained to place a longest dimension of the map aligned with a longest dimension of the window of the application in the communication device. Or in some embodiments, the application may query a compass of the communication device to determine an orientation of the communication device relative to magnetic north and orient the map in the user interface such that magnetic north on the map as displayed is aligned with magnetic north as sensed by the communication device. In some embodiments, the robot may include a compass and annotate locations on the map according to which direction is magnetic north.

In some embodiments, the map may include information such as debris accumulation in different areas, stalls encountered in different areas, obstacles, driving surface type, driving surface transitions, coverage area, robot path, etc. In some embodiments, the user may use user interface of the application to adjust the map by adding, deleting, or modifying information (e.g., obstacles) within the map. For example, the user may add information to the map using the user interface such as debris accumulation in different areas, stalls encountered in different areas, obstacles, driving surface type, driving surface transitions, etc.

In some embodiments, the user may choose areas within which the robot is to operate and actions of the robot using the user interface of the application. In some embodiments, the user may use the user interface to choose a schedule for performing an action within a chosen area. In some embodiments, the user may choose settings of the robot and components thereof using the application. Some embodiments may include using the user interface to set a cleaning mode of the robot. In some embodiments, setting a cleaning mode may include, for example, setting a service condition, a service type, a service parameter, a service schedule, or a service frequency for all or different areas of the environment. A service condition may indicate whether an area is to be serviced or not, and embodiments may determine whether to service an area based on a specified service condition in memory. Thus, a regular service condition indicates that the area is to be serviced in accordance with service parameters like those described below. In contrast, a no service condition may indicate that the area is to be excluded from service (e.g., cleaning). A service type may indicate what kind of cleaning is to occur. For example, a hard (e.g. non-absorbent) surface may receive a mopping service (or vacuuming service followed by a mopping service in a service sequence), while a carpeted service may receive a vacuuming service. Other services may include a UV light application service and a sweeping service. A service parameter may indicate various settings for the robot. In some embodiments, service parameters may include, but are not limited to, an impeller speed or power parameter, a wheel speed parameter, a brush speed parameter, a sweeper speed parameter, a liquid dispensing speed parameter, a driving speed parameter, a driving direction parameter, a movement pattern parameter, a cleaning intensity parameter, and a timer parameter. Any number of other parameters may be used without departing from embodiments disclosed herein, which is not to suggest that other descriptions are limiting. A service schedule may indicate the day and, in some cases, the time to service an area. For example, the robot may be set to service a particular area on Wednesday at noon. In some instances, the schedule may be set to repeat. A service frequency may indicate how often an area is to be serviced. In embodiments, service frequency parameters may include hourly frequency, daily frequency, weekly frequency, and default frequency. A service frequency parameter may be useful when an area is frequently used or, conversely, when an area is lightly used. By setting the frequency, more efficient overage of environments may be achieved. In some embodiments, the robot may clean areas of the environment according to the cleaning mode settings.

In some embodiments, the processor of the robot may determine or change the cleaning mode settings based on collected sensor data. For example, the processor may change a service type of an area from mopping to vacuuming upon detecting carpeted flooring from sensor data (e.g., in response to detecting an increase in current drawn by a motor driving wheels of the robot, or in response to a visual odometry sensor indicating a different flooring type). In a further example, the processor may change service condition of an area from no service to service after detecting accumulation of debris in the area above a threshold. Examples of methods for a processor to autonomously adjust settings (e.g., speed) of components of a robot (e.g., impeller motor, wheel motor, etc.) based on environmental characteristics (e.g., floor type, room type, debris accumulation, etc.) are described in U.S. patent application Ser. Nos. 16/163,530 and 16/239,410, the entire contents of which are hereby incorporated by reference. In some embodiments, the user may adjust the settings chosen by the processor using the user interface. In some embodiments, the processor may change the cleaning mode settings and/or cleaning path such that resources required for cleaning are not depleted during the cleaning session. In some instances, the processor may use a bin packing algorithm or an equivalent algorithm to maximize the area cleaned given the limited amount of resources remaining. In some embodiments, the processor may analyze sensor data of the environment before executing a service type to confirm environmental conditions are acceptable for the service type to be executed. For example, the processor analyzes floor sensor data to confirm floor type prior to providing a particular service type. In some instances, wherein the processor detects an issue in the settings chosen by the user, the processor may send a message that the user retrieves using the user interface. The message in other instances may be related to cleaning or the map. For example, the message may indicate that an area with no service condition has high (e.g., measured as being above a predetermined or dynamically determined threshold) debris accumulation and should therefore have service or that an area with a mopping service type was found to be carpeted and therefore mopping was not performed. In some embodiments, the user may override a warning message prior to the robot executing an action. In some embodiments, conditional cleaning mode settings may be set using a user interface and are provided to the processor of the robot using a wireless communication channel. Upon detecting a condition being met, the processor may implement particular cleaning mode settings (e.g., increasing impeller motor speed upon detecting dust accumulation beyond a specified threshold or activating mopping upon detecting a lack of motion). In some embodiments, conditional cleaning mode settings may be preset or chosen autonomously by the processor of the robot.

In some embodiments, the processor of the robot may acquire information from external sources, such as other smart devices within the home. For example, the processor may acquire data from an external source that is indicative of the times of the day that a user is unlikely to be home and may clean the home during these times. Information may be obtained from, for example, other sensors within the home, smart home devices, location services on a smart phone of the user, or sensed activity within the home.

In some embodiments, the user may answer a questionnaire using the application to determine general preferences of the user. In some embodiments, the user may answer the questionnaire before providing other information.

In some embodiments, a user interface component (e.g., virtual user interface component such as slider displayed by an application on a touch screen of a smart phone or mechanical user interface component such as a physical button) may receive an input (e.g., a setting, an adjustment to the map, a schedule, etc.) from the user. In some embodiments, the user interface component may display information to the user. In some embodiments, the user interface component may include a mechanical or virtual user interface component that responds to a motion (e.g., along a touchpad to adjust a setting which may be determined based on an absolute position of the user interface component or displacement of the user interface component) or gesture of the user. For example, the user interface component may respond to a sliding motion of a finger, a physical nudge to a vertical, horizontal, or arch of the user interface component, drawing a smile (e.g., to unlock the user interface of the robot), rotating a rotatable ring, and spiral motion of fingers.

In some embodiments, the user may use the user interface component (e.g., physically, virtually, or by gesture) to set a setting along a continuum or to choose between discrete settings (e.g., low or high). For example, the user may choose the speed of the robot from a continuum of possible speeds or may select a fast, slow, or medium speed using a virtual user interface component. In another example, the user may choose a slow speed for the robot during UV sterilization treatment such that the UV light may have more time for sterilization per surface area. In some embodiments, the user may zoom in or out or may use a different mechanism to adjust the response of a user interface component. For example, the user may zoom in on a screen displayed by an application of a communication device to fine tune a setting of the robot with a large movement on the screen. Or the user may zoom out of the screen to make a large adjustment to a setting with a small movement on the screen or a small gesture.

In some embodiments, the user interface component may include a button, a keypad, a number pad, a switch, a microphone, a camera, a touch sensor, or other sensors that may detect gestures. In some embodiments, the user interface component may include a rotatable circle, a rotatable ring, a click-and-rotate ring, or another component that may be used to adjust a setting. For example, a ring may be rotated clockwise or anti-clockwise, or pushed in or pulled out, or clicked and turned to adjust a setting. In some embodiments, the user interface component may include a light that is used to indicate the user interface is responsive to user inputs (e.g., a light surrounding a user interface ring component). In some embodiments, the light may dim, increase in intensity, or change in color to indicate a speed of the robot, a power of an impeller fan of the robot, a power of the robot, voice output, and such. For example, a virtual user interface ring component may be used to adjust settings using an application of a communication device and a light intensity or light color or other means may be used to indicate the responsiveness of the user interface component to the user input.

In some embodiments, a historical report of prior work sessions may be accessed by a user using the application of the communication device. In some embodiments, the historical report may include a total number of operation hours per work session or historically, total number of charging hours per charging session or historically, total coverage per work session or historically, a surface coverage map per work session, issues encountered (e.g., stuck, entanglement, etc.) per work session or historically, location of issues encountered (e.g., displayed in a map) per work session or historically, collisions encountered per work session or historically, software or structural issues recorded historically, and components replaced historically.

In some embodiments, the robot may perform work in or navigate to or transport an item to a location specified by the user. In some embodiments, the user may instruct the robot to perform work in a specific location using the user interface of the application of a communication device communicatively paired with the processor of the robot. For example, a user may instruct a robotic mop to clean an area in front of a fridge where coffee has been spilled or a robotic vacuum to vacuum an area in front of a TV where debris often accumulates or an area under a dining table where cheerios have been spilled. In another example, a robot may be instructed to transport a drink to a location in front of a couch on which a user is positioned while watching TV in the living room. In some embodiments, the robot may use direction of sound to navigate to a location of the user. For example, a user may verbally instruct a robot to bring the user medicine and the robot may navigate to the user by following a direction of the voice of the user. In some embodiments, the robot includes multiple microphones and the processor determines the direction of a voice by comparing the signal strength in each of the microphones. In some embodiments, the processor may use artificial intelligence methods and Bayesian methods to identify the source of a voice.

In some embodiments, the user may use the user interface of the application to instruct the robot to begin performing work (e.g., vacuuming or mopping) immediately. In some embodiments, the application displays a battery level or charging status of the robot. In some embodiments, the amount of time left until full charge or a charge required to complete the remaining of a work session may be displayed to the user using the application. In some embodiments, the amount of work by the robot a remaining battery level can provide may be displayed. In some embodiments, the amount of time remaining to finish a task may be displayed. In some embodiments, the user interface of the application may be used to drive the robot. In some embodiments, the user may use the user interface of the application to instruct the robot to clean all areas of the map. In some embodiments, the user may use the user interface of the application to instruct the robot to clean particular areas within the map, either immediately or at a particular day and time. In some embodiments, the user may choose a schedule of the robot, including a time, a day, a frequency (e.g., daily, weekly, bi-weekly, monthly, or other customization), and areas within which to perform a task. In some embodiments, the user may choose the type of task. In some embodiments, the user may use the user interface of the application to choose cleaning preferences, such as detailed or quiet clean, a suction power, light or deep cleaning, and the number of passes. The cleaning preferences may be set for different areas or may be chosen for a particular work session during scheduling. In some embodiments, the user may use the user interface of the application to instruct the robot to return to a charging station for recharging if the battery level is low during a work session, then to continue the task. In some embodiments, the user may view history reports using the application, including total time of cleaning and total area covered (per work session or historically), total charging time per session or historically, number of bin empties, and total number of work sessions. In some embodiments, the user may use the application to view areas covered in the map during a work session. In some embodiments, the user may use the user interface of the application to add information such as floor type, debris accumulation, room name, etc. to the map. In some embodiments, the user may use the application to view a current, previous, or planned path of the robot. In some embodiments, the user may use the user interface of the application to create zones by adding dividers to the map that divide the map into two or more zones. In some embodiments, the application may be used to display a status of the robot (e.g., idle, performing task, charging, etc.). In some embodiments, a central control interface may collect data of all robots in a fleet and may display a status of each robot in the fleet. In some embodiments, the user may use the application to change a status of the robot to do not disturb, wherein the robot is prevented from cleaning or enacting other actions that may disturb the user.

In some embodiments, the application may display the map of the environment and allow zooming-in or zooming-out of the map. In some embodiments, a user may add flags to the map using the user interface of the application that may instruct the robot to perform a particular action. For example, a flag may be inserted into the map indicates a valuable rug. When the flag is dropped a list of robot actions may be displayed to the user, from which they may choose. to be chosen from. Actions may include stay away, start from here, start from here only on a particular day (e.g., Tuesday). In some embodiments, the flag may inform the robot of characteristics of an area, such as a size of an area. In some embodiments, flags may be labelled with a name. For example, a first flag may be labelled front of TV and a characteristic, such size of the area, may be added to the flag. This may allow granular control of the robot. For example, the robot may be instructed to clean the area front of TV through verbal instruction to a home assistant or may be scheduled to clean in front of the TV every morning using the application.

In some embodiments, the user interface of the application (or interface of the robot or other means) may be used to customize the music played when a call is on hold, ring tones, message tones, and error tones. In some embodiments, the application or the robot may include audio-editing applications that may convert MP3 files a required size and format, given that the user has a license to the music. In some embodiments, the application of a communication device (or web, TV, robot interface, etc.) may be used to play a tutorial video for setting up a new robot. Each new robot may be provided with a mailbox, data storage space, etc. In some embodiments, there may be voice prompts that lead the user through the setup process. In some embodiments, the user may choose a language during setup. In some embodiments, the user may set up a recording of the name of the robot. In some embodiments, the user may choose to connect the robot to the internet for in the moment assistance when required. In some embodiments, the user may use the application to select a particular type of indicator be used to inform the user of new calls, emails, and video chat requests or the indicators may be set by default. For example, a message waiting indicator may be an LED indicator, a tone, a gesture, or a video played on the screen of the robot. In some cases, the indicator may be a visual notification set or selected by the user. For example, the user may be notified of a call from a particular family member by a displayed picture or avatar of that family member on the screen of the robot. In other instances, other visual notifications may be set, such as flashing icons on an LCD screen (e.g., envelope or other pictures or icons set by user). In some cases, pressing or tapping the visual icon or a button on/or next to the indicator may activate an action (e.g., calling a particular person and reading a text message or an email). In some embodiments, a voice assistant (e.g., integrated into the robot or an external assistant paired with the robot) may ask the user if they want to reply to a message and may listen to the user message, then send the message to the intended recipient. In some cases, indicators may be set on multiple devices or applications of the user (e.g., cell phone, phone applications, Face Time, Skype, or anything the user has set up) such that the user may receive notification regardless of their proximity to the robot. In some embodiments, the application may be used to setup message forwarding, such that notifications provided to the user by the robot may be forwarded to a telephone number (e.g., home, cellular, etc.), text pager, e-mail account, chat message, etc.

In some embodiments, more than one robot and device (e.g., autonomous car, robot vacuum, service robot with voice and video capability, and other devices such as a passenger pod, smart appliances, TV, home controls such as lighting, temperature, etc., tablet, computer, and home assistants) may be connected to the application and the user may use the application to choose settings for each robot and device. In some embodiments, the user may use the application to display all connected robots and other devices. For example, the application may display all robots and smart devices in a map of a home or in a logical representation such as a list with icons and names for each robot and smart device. The user may select each robot and smart device to provide commands and change settings of the selected device. For instance, a user may select a smart fridge and may change settings such as temperature and notification settings or may instruct the fridge to bring a food item to the user. In some embodiments, the user may choose that one robot perform a task after another robot completes a task. In some embodiments, the user may choose schedules of both robots using the application. In some embodiments, the schedule of both robots may overlap (e.g., same time and day). In some embodiments, a home assistant may be connected to the application. In some embodiments, the user may provide commands to the robot via a home assistant by verbally providing commands to the home assistant which may then be transmitted to the robot. Examples of commands include commanding the robot to clean a particular area or to navigate to a particular area or to turn on and start cleaning. In some embodiments, the application may connect with other smart devices (e.g., smart appliances such as smart fridge or smart TV) within the environment and the user may communicate with the robot via the smart devices. In some embodiments, the application may connect with public robots or devices. For example, the application may connect with a public vending machine in an airport and the user may use the application to purchase a food item and instruct the vending machine or a robot to deliver the food item to a particular location within the airport.

In some embodiments, the user may be logged into multiple robots and other devices at the same time. In some embodiments, the user receives notifications, alerts, phone calls, text messages, etc. on at least a portion of all robots and other devices that the user is logged into. For example, a mobile phone, a computer, and a service robot of a user may ring when a phone call is received. In some embodiments, the user may select a status of do not disturb for any number of robots (or devices). For example, the user may use the application on a smart phone to set all robots and devices to a do not disturb status. The application may transmit a synchronization message to all robots and devices indicating a status change to do not disturb, wherein all robots and devices refrain from pushing notifications to the user.

In some embodiments, the application may display the map of the environment and the map may include all connected robots and devices such as TV, fridge, washing machine, dishwasher, heater control panel, lighting controls, etc. In some embodiments, the user may use the application to choose a view to display. For example, the user may choose that only a debris map generated based on historic cleaning, an air quality map for each room, or a map indicating status of lights as determined based on CAIT is displayed. Or in another example, a user may select to view the FOV of various different cameras within the house to search for an item, such as keys or a wallet. Or the user may choose to run an item search wherein the application may autonomously search for the item within images captured in the FOV of cameras (e.g., on robots moving within the area, static cameras, etc.) within the environment. Or the user may choose that the search focus on searching for the item in images captured by a particular camera. Or the user may choose that the robot navigates to all areas or a particular area (e.g., the master bedroom) of the environment in search of the item. Or the user may choose that the robot checks places the robot believes the item is likely to be in an order that the robot believes will result in finding the item as soon as possible.

In some embodiments, the processor of the robot may communicate its spatial situation to a remote user (e.g., via an application of a communication device) and the remote user may issue commands to a control subsystem of the robot to control a path of the robot. In some cases, the trajectory followed by the robot may not be exactly the same as the command issued by the user and the actions actuated by the control subsystem. This may be due to noise in motion and observations. For example, FIG. 256 illustrates a path of a robot provided by the user and the actual trajectory of the robot. The new location of the robot may be communicated to the user and the user may provide incremental adjustments. In some embodiments, the adjustments and spatial updates are in real time. In some embodiments, the adjustments are so minute that a user may not distinguish a difference between the path provided by the user and the actual trajectory of the robot. In some embodiments, the robot may include a camera for streaming a video accessible by the user to aid in controlling movement of the robot. In some embodiments, the same camera used for SLAM may be used. In some embodiments, real time SLAM allows for real time adjustments and real time interoperation between multiple devices. The is also true for a robot remotely monitored and driven outdoors wherein a driver of the robot in a remote location is able to see the environment as sensors of the robot do. For example, a food delivery robot may be manually steered remotely by a joystick or other control device to move along a pedestrian side of a street. SLAM, GPS, and a camera capturing visual information may be used in real time and may be synched to provide optimal performance.

In some embodiments, a map, traversability, a path plan (e.g., coverage area and boustrophedon path), and a trajectory of the robot may be displayed to the user (e.g., using an application of a communication device). In some instances, there may be no need or desire by a user to view spatial information for a surface cleaning device that cleans on a daily basis. However, this may be different in other cases. For example, in the case of augmented reality or virtual reality experienced by a user (e.g., via a headset or glasses), a layer of a map may be superimposed on a FOV of the user. In some instances, the user may want to view the environment without particular objects. For example, for a virtual home, a user may want to view a room without various furniture and decoration. In another example, a path plan may be superimposed on the windshield of an autonomous car driven by a user. The path plan may be shown to the user in real-time prior to its execution such that the user may adjust the path plan. FIG. 257 illustrates a user is sitting behind a steering wheel 13100 of an autonomous car (which may not be necessary in an autonomous car but is shown to demonstrate the user with respect to the surroundings) and a path plan 13101 shown to the user, indicating with an arrow a plan for the autonomous car to overtake the car 13102 in front. The user may have a chance to accept or deny or alter the path plan. The user may intervene initially or when the lane change is complete or at another point. The path plan may be superimposed on the windshield using a built-in capability of the windshield that may superimpose images, icons, or writing on the windshield glass (or plastic or other material). In other cases, images, icons, or writing may be projected onto the transparent windshield (or other transparent surfaces, e.g., window) by a device fixed onto the vehicle or a device the user is wearing. In some cases, superimposition of images, icons, writing, etc. may take place on a surface of a wearable device of the user, such as glasses or headsets. In some embodiments, the surface on which superimposition occurs may not be transparent. In some embodiments, cameras may capture real-time images of the surroundings and the images may be shown to the user on a screen or by another means. In some embodiments, the user may have or be presented with options of objects they wish to be superimposed on a screen or a transparent surface or their FOV. In cases of superimposition of reality with augmenting information, icons, or the like, simultaneous localization and mapping in real-time may be necessary, and thus the SLAM techniques used must to be able to make real-time adjustments.

In some embodiments, an application of a communication device paired with the robot may be used to execute an over the air firmware update (or software or other type of update). In other embodiments, the firmware may be updated using another means, such as USB, Ethernet, RS232 interface, custom interface, a flasher, etc. In some embodiments, the application may display a notification that a firmware update is available and the user may choose to update the firmware immediately, at a particular time, or not at all. In some embodiments, the firmware update is forced and the user may not postpone the update. In some embodiments, the user may not be informed that an update is currently executing or has been executed. In some embodiments, the firmware update may require the robot to restart. In some embodiments, the robot may or may not be able to perform routine work during a firmware update. In some embodiments, the older firmware may be not replaced or modified until the new firmware is completely downloaded and tested. In some embodiments, the processor of the robot may perform the download in the background and may use the new firmware version at a next boot up. In some embodiments, the firmware update may be silent (e.g., forcefully pushed) but there may be audible prompt in the robot.

In some embodiments, the process of using the application to update the firmware includes using the application to call the API and the cloud sending the firmware to the robot directly. In some embodiments, a pop up on the application may indicate a firmware upgrade available (e.g., when entering the control page of the application). In some embodiments, a separate page on the application may display firmware info information, such as current firmware version number. In some embodiments, available firmware version numbers may be displayed on the application. In some embodiments, changes that each of the available firmware versions impose may be displayed on the application. For example, one new version may improve the mapping feature or another new version may enhance security, etc. In some embodiments, the application may display that the current version is up to date already if the version is already up to date. In some embodiments, a progress page (or icon) of the application may display when a firmware upgrade is in progress. In some embodiments, a user may choose to upgrade the firmware using a settings page of the application. In some embodiments, the setting page may have subpages such as general, cleaning preferences, firmware update (e.g., which may lead to firmware information). In some embodiments, the application may display how long the update may take or the time remaining for the update to finish. In some embodiments, an indicator on the robot may indicate that the robot is updating in addition to or instead of the application. In some embodiments, the application may display a description of what is changed after the update. In some embodiments, a set of instructions may be provided to the user via the application prior to updating the firmware. In embodiments wherein a sudden disruption occurs during a firmware update, a pop-up may be displayed on the application to explain why the update failed and what needs to be done next. In some embodiments, there may be multiple versions of updates available for different versions of the firmware or application. For example, some robots may have voice indicators such as "wheel is blocked" or "turning off" in different languages. In some embodiments, some updates may be marked as beta updates. In some embodiments, the cloud application may communicate with the robot during an update and update information, such as in FIG. 258, may be available on the control center or on the application. In some embodiments, progress of the update may be displayed in the application using a status bar, circle, etc. In some embodiments, the user may choose to finish or pause a firmware update using the application. In some embodiments, the robot may need to be connected to a charger during a firmware update. In some embodiments, a pop up message may appear on the application if the user chooses to update the robot using the application and the robot is not connected to the charger. FIG. 259A-259C illustrate examples of different pages of an application paired with the robot. FIG. 259A, from left to right, illustrates a control screen of the application which the user may use to instruct the robot to clean or to schedule a cleaning and to access settings, a pop up message indicating a software update is available, and a settings page of the application wherein cleaning preferences and software update information may be accessed. FIG. 259B illustrates a variation of pages that may be displayed to the user using the application update firmware. One page indicates that that the robot firmware is up to date, another page indicates that a new firmware version is available and describes the importance of the update and aspects that will be changed with the update, and one page notifies the user that the robot must be connected to a charger to update the firmware. FIG. 259C illustrates, from top left corner and moving clockwise, a page notifying the user of a new firmware version, from which the user may choose to start the update, a page indicating the progress of the update, a page notifying the user that the update has timed out, and a page notifying the user that the firmware have been successfully updated.

In some embodiments, the user may use the application to register the warranty of the robot. If the user attempts to register the warranty more than once, the information may be checked against a database on the cloud and the user be informed they have already done so. In some embodiments, the application may be used to collect possible issues of the robot and may send the information to the cloud. In some embodiments, the robot may send possible issues to the cloud and the application may retrieve the information from the cloud or the robot may send possible issues directly to the application. In some embodiments, the application or a cloud application may directly open a customer service ticket based on the information collected on issues of the robot. For example, the application may automatically open a ticket if a consumable part is detected to wear off soon and customer service may automatically send a new replacement to the user without the user having to call customer service. In another example, a detected jammed wheel may be sent to the cloud and a possible solution may pop up on the application from an auto diagnose machine learned system. In some embodiments, a human may supervise and enhance the process or merely perform the diagnosis. In some embodiments, the diagnosed issue may be saved and used as a data for future diagnoses.

In some embodiments, previous maps and work sessions may be displayed to the user using the application. In some embodiments, data of previous work sessions may be used to perform better work sessions in the future. In some embodiments, previous maps and work sessions displayed may be converted into thumbnail images to save space on the local device. In some embodiments, there may be a setting (or default) that saves the images in original form for a predetermined amount of time (e.g., a week) and then converts the images to thumbnails or pushes the original images to the cloud. All of these options may be configurable or a default be chosen by the manufacturer.

In some embodiments, a user may have any of a registered email, a username, or a password which may be used to log into the application. If a user cannot remember their email, username, or password, an option to reset any of the three may be available. In some embodiments, a form of verification may be required to reset an email, password, or username. In some embodiments, a user may be notified that they have already signed up when attempting to sign up with a username and name that already exists and may be asked if they forgot their password and/or would like to reset their password.

In some embodiments, the application of the communication device may be used to manage subscription services. In embodiments, the subscription services may be paid for or free of charge. In some embodiments, subscription services may be installed and executed on the robot but may be controlled through the communication device of the user. The subscription services may include, but are not limited to, Social Networking Services (SNS) and instant messaging services (e.g., Facebook, LinkedIn, WhatsApp, WeChat, Instagram, etc.). In some embodiments, the robot may use the subscription services to communicate with the user (e.g., about completion of a job or an error occurring) or contacts of the user. For example, a nursing robot may send an alert to particular social media contacts (e.g., family members) of the user if an emergency involving the user occurs. In some embodiments, subscription services may be installed on the robot to take advantage of services, terminals, features, etc. provided by a third party service provider. For example, a robot may go shopping and may use the payment terminal installed at the supermarket to make a payment. Similarly, a delivery robot may include a local terminal such that a user may make a payment upon delivery of an item. The user may choose to pay using an application of a communication device without interacting with the delivery robot or may choose to use the terminal of the robot. In some embodiments, a terminal may be provided by the company operating the robot or may be leased and installed by a third party company such as Visa, Amex, or a bank.

In embodiments, various payment methods may be accepted by the robot or an application paired with the robot. For example, coupons, miles, cash, credit cards, reward points, debit cards, etc. For payments, or other communications between multiple devices, near-field wireless communication signals, such as Bluetooth Low Energy (BLE), Near Field Communication (NFC), IBeacon, Bluetooth, etc., may be emitted. In embodiments, the communication may be a broadcast, multicast, or unicast. In embodiments, the communication may take place at layer 2 of the OSI model with MAC address to MAC address communication or at layer 3 with involvement of TCP/IP or using another communication protocol. In some embodiments, the service provider may provide its services to clients who use a communication device to send their subscription or registration request to the service provider, which may be intercepted by the server at the service provider. In some embodiments, the server may register the user, create a database entry with a primary key, and may allocate additional unique identification tokens or data to recognize queries coming in from that particular user. For example, there may be additional identifiers such as services associated with the user that may be assigned. Such information may be created in a first communication and may be used in following service interactions. In embodiments, the service may be provided or used at any location such a restaurant, a shopping mall, or a metro station.

In some embodiments, the processor may monitor the strength of a communication channel based on a strength value given by Received Signal Strength Indicator (RSSI). In embodiments, the communication channel between a server and any device (e.g., mobile phone, robot, etc.) may kept open through keep alive signals, hello beacons, or any simple data packet including basic information that may be sent at a previously defined frequency (e.g., 10, 30, 60, or 300 seconds). In some embodiments, the terminal on the service provider may provide prompts such that the user may tap, click, or approach their communication device to create a connection. In some embodiments, additional prompts may be provided to guide a robot to approach its terminal to where the service provider terminal desires. In some embodiments, the service provider terminal may include a robotic arm (for movement and actuation) such that it may bring its terminal close to the robot and the two can form a connection. In embodiments, the server may be a cloud based server, a backend server of an internet application such as an SNS application or an instant messaging application, or a server based on a publicly available transaction service such as Shopify.

FIG. 260A illustrates an example of a vending machine robot including an antenna 700, a payment terminal 701, pods 702 within which different items for purchase are stored, sensor windows 703 behind which sensors used for mapping and navigation are positioned, and wheels 704 (side drive wheels and front and rear caster wheels). The payment terminal may accept credit and debit cards and payment may be transacted by tapping a payment card or a communication device of a user. In embodiments, various different items may be purchased, such as food (e.g., gum, snickers, burger, etc.). In embodiments, various services may be purchased. For example, FIG. 260B illustrates the purchase of a mobile device charger rental from the vending machine robot. A user may select the service using an application of a communication device, a user interface on the robot, or by verbal command. The robot may respond by opening pod 705 to provide a mobile device charger 706 for the user to use. The user may leave their device within the secure pod 705 until charging is complete. For instance, a user may summon a robot using an application of a mobile device upon entering a restaurant for dining. The user may use the application to select mobile device charging and the robot may open a pod including a charging cable for the mobile device. The user may plug their mobile device into the charging cable and leave the mobile device within the pod for charging while dining. When finished, the user may unlock the pod using an authentication method to retried their mobile device. In another example illustrated in FIG. 260C, the user may pay to replace a depleted battery pack in their possession with a fully charged battery pack 707 or may rent a fully charged battery pack 707 from pod 708 of the vending machine robot. For instance, a laptop of a user working in a coffee shop may need to be charged. The user may rent a charging adaptor from the vending machine robot and may return the charging adapter when finished. In some cases, the user may pay for the rental or may leave a deposit to obtain the item which may be refunded after returning the item. In some embodiments, the robot may issue a slip including information regarding the item purchased or service received. For example, the robot may issue a slip including details of the service received, such as the type of service, the start and end time of the service, the cost of the service, the identification of the robot that provided the service, the location at which the service was provided, etc. Similar details may be included for items purchased.

In some embodiments, there may be a control system that manages or keeps track of all robots (and other device) in a fleet. In some embodiments, the control system may be a database. For example, an autonomous car manufacturer may keep track of all cars in a fleet. Some examples of information that may be stored for an autonomous vehicle may include car failed to logon, car failed to connect, car failed to start, car ran out of battery, car lost contact with network, car activity, car mailbox (or message) storage size and how full the mailbox is, number of unread messages, date and time of last read message, last location (e.g., home, coffee shop, work), date and time of last dialed number, date and time of last sent voice message or text, user message activity, battery and charge information, last full charge, last incremental charge, date and time of last charge, amount of incremental charge, location of charges, billing invoice if applicable (e.g., data, mechanical services, etc.), previously opened customer service tickets, history of services, system configuration. In some embodiments, a user may opt out of sending information to the control system or database. In some embodiments, the user may request a private facility store all sent information and may release information to any party by approval.

The private facility may create databases and privately store the information. In some embodiments, the private facility may share information for functionality purposes upon request from the user to share particular information with a specific party. For example, if history of a repair of an autonomous case is needed by a manufacturer, the manufacturer may not be able to access the information without sending a request to the private facility storing the information. The private facility may request permission from the user. The user may receive the request via an application, email, or the web and may approve the request, at which point the private facility may release the information to the manufacturer. Multiple options for levels of approval may be used in different embodiments. For example, the user may choose to allow the information to be available to the manufacturer for a day, a week, a year, or indefinitely. Many different settings may be applied to various types of information. The user may set and change setting in their profile at any time (e.g., via an application or the web). For example, a user may retract permission previously approved by the user.

In some embodiments, there may be a default setting specifying where information is stored (e.g., a manufacturer, a database owned and controlled by the user, a third party, etc.). The default settings may be change by the user at any time. In some embodiments, the log of information stored may have various parameters set by default or by the user. Examples of parameters may include maximum events allowed in the log which limits the number of entries in the log and when the defined number is exceeded, the oldest entries are overwritten; maximum life of a log which limits the number of days and hours of entries life in the log and when the defined number is exceeded, the oldest entries are overwritten; various levels of logging which may include functionality matters, verbose for troubleshooting, security investigation (i.e., the user has gone missing), security and privacy of the user, etc.; minutes between data collection cycles which controls how frequently report data is gathered from logs (e.g., 30 minutes); days to keep data in reports database which determines when to archive the data or keep thumbnails of data; reports database size (e.g., as a percentage of capacity) which sets the maximum percentage of disk space the reports database may take up; maximum records in report output which limits the number of records presented in the report output; and maximum number of places that the reports can be logged to. The user may change default settings of parameters for the log of information at any time.

Owning and having control of where information is logged and stored may be important for users. In some cases, an application of a smart phone may keep track of places a user has visited and may combine this information with location information collected by other applications of the smartphone, which may be unwanted by a user. Or in some cases, websites used for online purchases may store a detailed history of purchases which may later be used for analyzing a user. For example, a 2018 online purchase of a vape may affect results of a health insurance claim submitted in 2050 by the same person, given that the online purchase information of the vape was stored and shared with the health insurer. Situations such as these highlight the increasing importance of providing the user with a choice for recording and/or storing their activity. Whether the logging activity is handled by the manufacturer, the user, or a third party, many interfaces may exist and many types of reports may be executed. For example, a report may be executed for a device, a logically set group of devices, a chosen list of devices, the owners of the devices, a phone number associated with the user, a NANP associated with the device, the type of service the device provides, the type of service the user purchases, the licenses the user paid for to obtain certain features, a last name, a first name, an alias, a location, a home mail address, a work mail address, a device location, a billing ID, an account lockout status, a latest activity, etc.

In some embodiments, a robot may be diagnosed using the control interface of the robot. In some embodiments, the robot may be pinged or connected via telnet or SSH and diagnostic commands may be executed. In some embodiments, a verbose log may be activated. In some embodiments, a particular event may be defined and the robot may operate and report the particular event when it occurs. This may help with troubleshooting. In some embodiments, memory dumps and logs may be automatically sent to the cloud and/or kept locally on the robot. The user may choose to save on the cloud, locally or both. In some cases, a combination of sending information to the cloud and saving locally may be preset as a default. In some embodiments, an error log may be generated upon occurrence of an error. An example of a computer code for generating an error log is shown in FIG. 261. In some embodiments, the error may initiate a diagnostic procedure. For example, FIG. 262 provides an example of a diagnostic procedure that may be followed for testing the brushes of a robot if an error with the brushes is detected. Other diagnostic procedures may be used depending on the error detected. For example, detection of a low tire pressure of an autonomous car may initiate a message to be sent to the user via an application and may trigger illumination of light indicator on a panel of the car. In some cases, detection of a low tire pressure may also trigger the car to set an appointment at a service facility based on the calendar of the user, car usage, and time required for the service. Alternatively, the autonomous car may transmit a message to a control center of a type of service required and the control center may dispatch a service car or robot to a location of the car (e.g., a grocery store parking lot while the user shops) to inflate the tire. A service robot may have an air pump, approach the tire, align its arm with the aperture on the tire within which air may be pumped using computer vision, measure the air pressure of the tire, and then inflate the tire to the required air pressure. The air pressure of the tire may be measured several times to provide accuracy. Other car services such as repairs and oil change may be executed by a service car or robot as well. In other cases, a service robot may provide remote resets and remote upgrades. In some embodiments, the service robot (or any other robot) may log information on the local memory temporarily. In some embodiments, syslog servers may be used to offload and store computer and network hardware log information for long periods of time. In many cases, syslog servers are easy to set up and maintain. Once set up, the robot may be pointed to the syslog server. Different embodiments may use different types of syslog servers. In some cases, the syslog server may use a file format of .au or .wav and G.711 codec format with 8 bit rate at 8 kHz.

In some embodiments, the robot or a control system managing robots may access system status, troubleshooting tools, and a system dashboard for quick review of system configurations of the robot. In some embodiments, the backend control system of the robot may be used by the robot or a control system managing robots to obtain hardware resource utilization (CPU, storage space), obtain and update software versions, verify and change IP address information, manage Network Time Protocol (NTP) server IP addresses, manage server security including IPSec and digital certificates, ping other IP devices from the device in question (e.g., initiate the robot to ping its default gateway, a file server, a control center, etc.), configure device pool to categorize devices based on some logical criteria (i.e. model number, year number, geography, OS version, activity, functionality, or customized), obtain and update region, location, and date/time group, obtain NTP reference, obtain and update device defaults, obtain and update templates used, obtain and update settings, obtain and update language, obtain and update security profile or configuration. For example, details of the softkey template may be obtained or updated. In embodiments, the softkey Template may control which key button functions are assigned to a desired function. Short cuts may be defined and used, such as tapping twice on the robot screen to call emergency services.

In some embodiments, a quick deployment tool may be used to deploy many robots concurrently at deployment time. In some embodiments, a spreadsheet (e.g., Excel template, Google spread sheet, comma delimited text files, or any kind of spread sheets) may be used to deploy and manage many robots concurrently. In some embodiments, there may be fields within the spreadsheet that are the same for all robot and fields that are unique. In some embodiments, a web page may be used by to access the spreadsheet and modify parameters. In some embodiments, database inserts, modifications, or deletions may be executed by bundling robots together and managing them automatically and unattended or on set schedules. In some embodiments, selected records from the database may be pulled, exported, modified, and re-imported into the database.

In some embodiments, an end user may license a robot for use. In some embodiments, an end user may be billed for various types of robot licensing, a product (e.g., the robot or another product), services (e.g., provided by the robot), a particular usage or an amount of usage of the robot, or a combination thereof. In some embodiments, such information may be entered manually, semi-autonomously, or autonomously for an account when a sale takes place. In some embodiments, lightweight directory access protocol (LDAP) may be used to store all or a part of the user data. In some cases, other types of databases may be used to store different kinds of information. In some embodiments, the database may include fields for comprehensive user information, such as user ID, last name, location, device ID, and group. In some cases, some fields may be populated by default. In some embodiments, a naming convention may be used to accommodate many users with similar names, wherein the user name may have some descriptive meaning. In some embodiments, at least one parameter must be unique such that it may be used a primary key in the database. In different embodiments, different amounts of data may be replicated and different data may be synchronized. In embodiments, data may be stored for different amounts of time and different types of data may be automatically destroyed. For example, data pulled from database A by database B may include a flag as one of the columns to set the life time of the information. Database B may then destroy the data and, in some cases, the existence of such transfer, after the elapsed time specified. Database B may sweep through the entries of the database at certain time intervals and may purge entries having a time to live that is about to expire. In some cases, database A may send a query to database B at the time of expiry of entries instructing database B to destroy the entries. In some cases, database A may send another query to determine if anything returns in order to confirm that the entries have been destroyed. Such methods may be employed in social media, wherein a user may post an event and may be provided with an option of how long that post is to be displayed for and how long the post is to be kept by the social media company. The information may be automatically deleted from the user profile based on the times chosen by the user, without the user having to do it manually. In some embodiments, the database may perform a full synchronization of all entries each time new information is added to the database. In cases where there is a large amount of data being synchronized, network congestion and server performance issues may occur. In some embodiments, synchronization intervals and scheduling may be chosen to minimize the effect on performance. In some embodiments, synchronization may be incremental (e.g., only the new or changed information is replicated) to reduce the amount of data being replicated, thereby reducing the impact on the network and servers. In some embodiments, database attribute mapping may be used when the names of attribute fields that one database uses are different from the names of equivalent attribute fields. For example, some attributes from an LDAP database may be mapped to the corresponding attributes in a different database using database attribute mapping. In some embodiments, an LDAP synchronization agreement may be created by identifying the attribute of another database to which an attribute from the LDAP database maps to. In some cases, user ID attribute may be mapped first. In some cases, LDAP database attribute fields may be manually mapped to other database attribute fields.

In some embodiments, the robot includes a theft detection mechanism. In some embodiments, the robot includes a strict security mechanism and legacy network protection. In some embodiments, the system of the robot may include a mechanism to protect the robot from being compromised. In some embodiments, the system of the robot may include a firewall and organize various functions according to different security levels and zones. In some embodiments, the system of the robot may prohibit a particular flow of traffic in a specific direction. In some embodiments, the system of the robot may prohibit a particular flow of information in a specific order. In some embodiments, the system of the robot may examine the application layer of the Open Systems Interconnection (OSI) model to search for signatures or anomalies. In some embodiments, the system of the robot may filter based on source address and destination address. In some embodiments, the system of the robot may use a simpler approach, such as packet filtering, state filtering, and such.

In some embodiments, the system of the robot may be included in a Virtual Private Network (VPN) or may be a VPN endpoint. In some embodiments, the system of the robot may include an antivirus software to detect any potential malicious data. In some embodiments, the system of the robot may include an intrusion prevention or detection mechanism for monitoring anomalies or signatures. In some embodiments, the system of the robot may include content filtering. Such protection mechanisms may be important in various applications. For example, safety is essential for a robot used in educating children through audio-visual (e.g., online videos) and verbal interactions. In some embodiments, the system of the robot may include a mechanism for preventing data leakage. In some embodiments, the system of the robot may be capable of distinguishing between spam emails, messages, commands, contacts, etc. In some embodiments, the system of the robot may include antispyware mechanisms for detecting, stopping, and reporting, suspicious activities. In some embodiments, the system of the robot may log suspicious occurrences such that they may be played back and analyzed. In some embodiments, the system of the robot may employ reputation-based mechanisms. In some embodiments, the system of the robot may create correlations between types of events, locations of events, and order and timing of events. In some embodiments, the system of the robot may include access control. In some embodiments, the system of the robot may include Authentication, Authorization, and Accounting (AAA) protocols such that only authorized persons may access the system. In some embodiments, vulnerabilities may be patched where needed. In some embodiments, traffic may be load balanced and traffic shaping may be used to avoid congestion of data. In some embodiments, the system of the robot may include rule based access control, biometric recognition, visual recognition, etc.

Other methods and techniques (e.g., mapping, localization, path planning, zone division, application of a communication device, virtual reality, augmented reality, etc.) that may be used are described in U.S. patent application Ser. Nos. 16/127,038, 16/230,805, 16/389,797, 16/427,317, 16/509,099, 16/832,180, 16/832,221, and 16/850,269, the entire contents of which are hereby incorporated by reference.

Figure 263A:
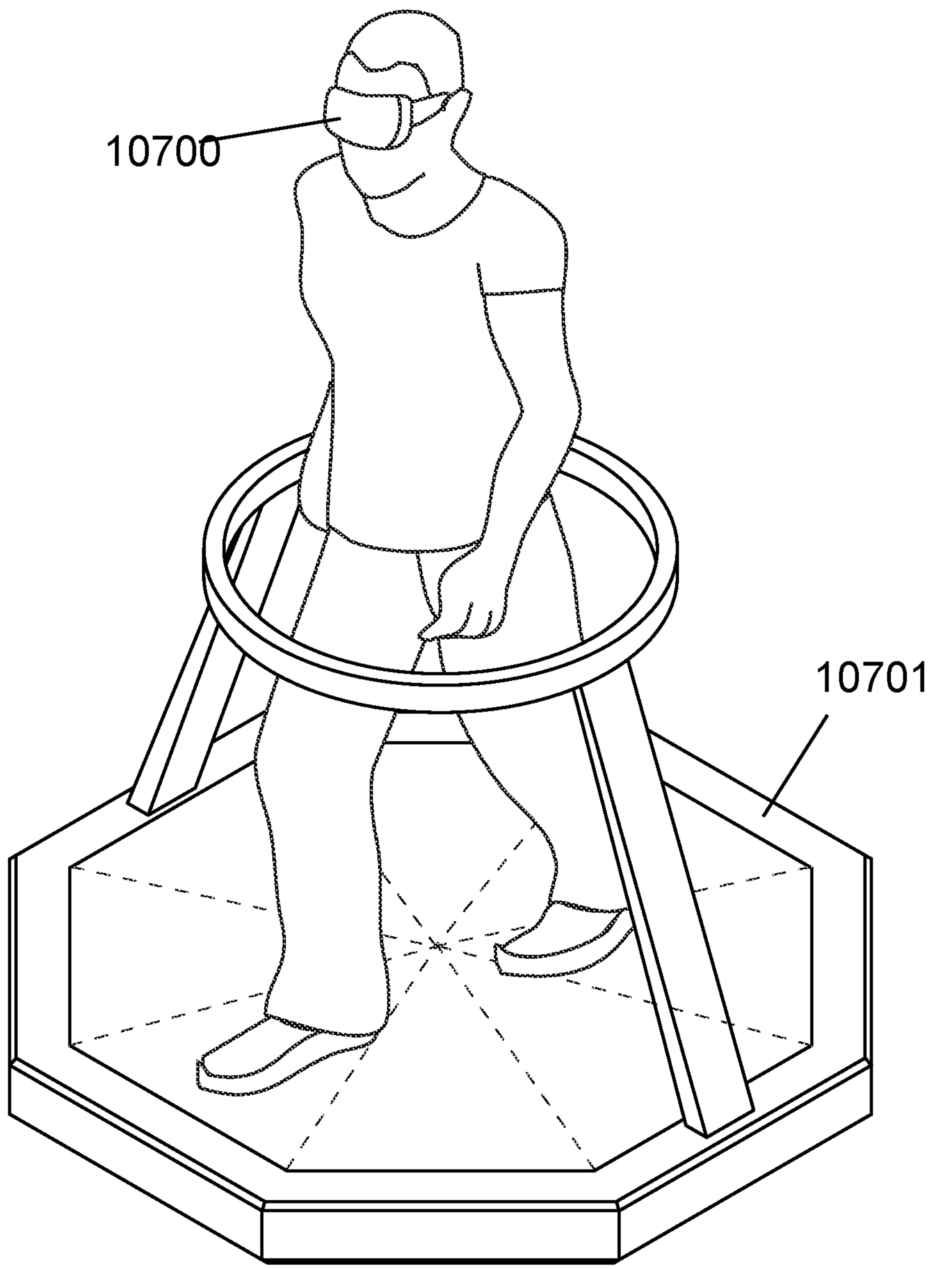
Figure 263B:
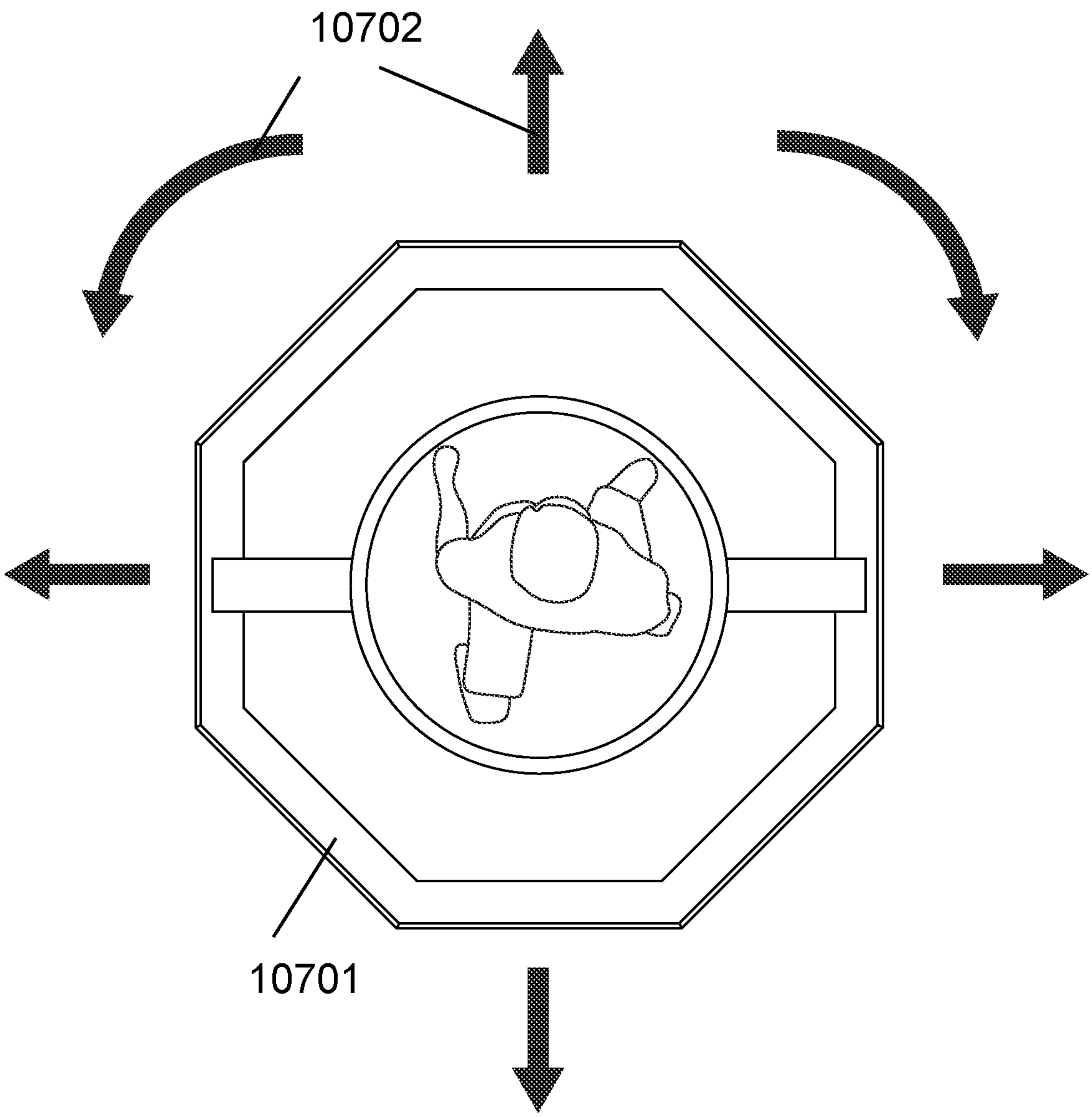
Figure 263C:
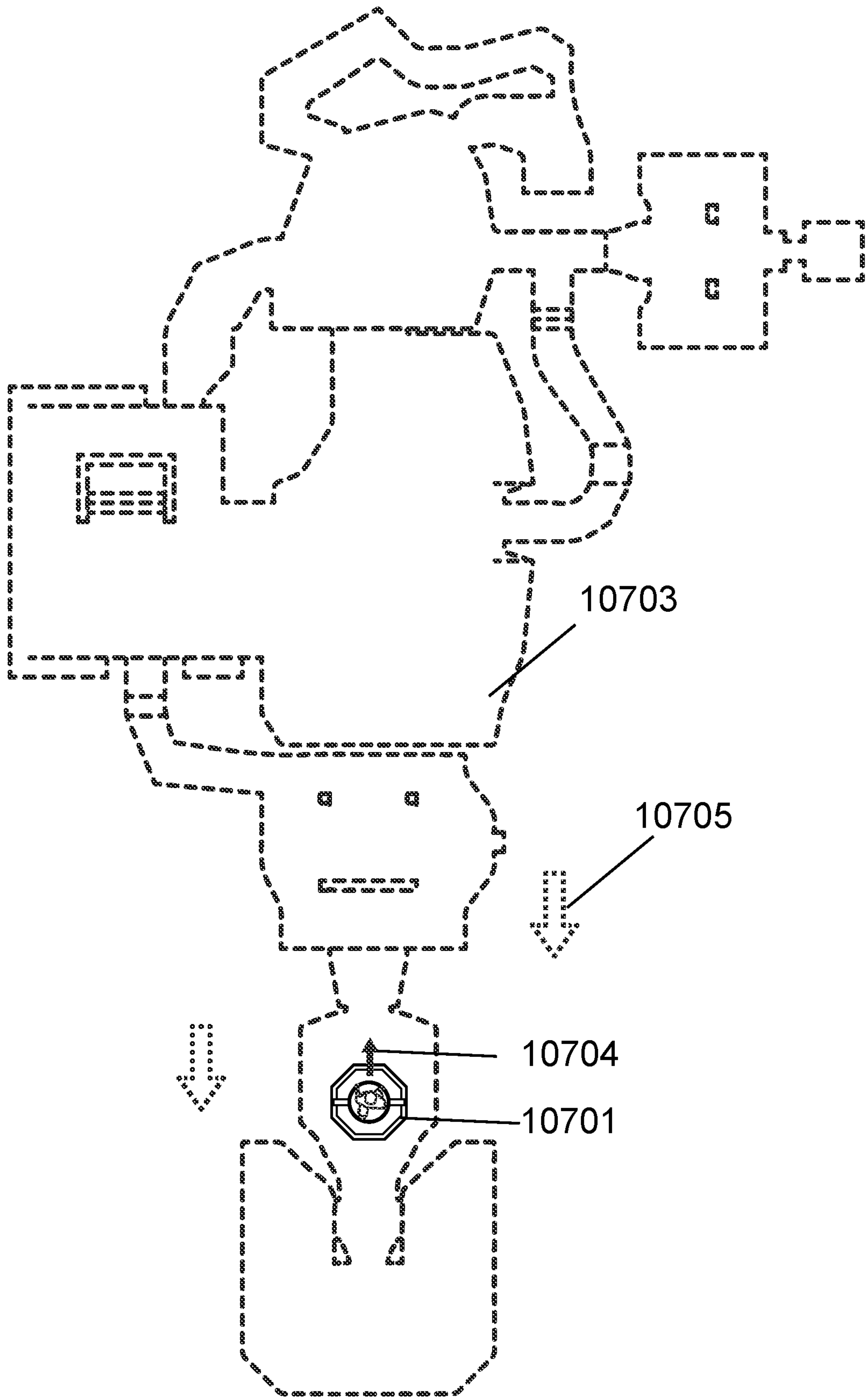
Figure 264A:
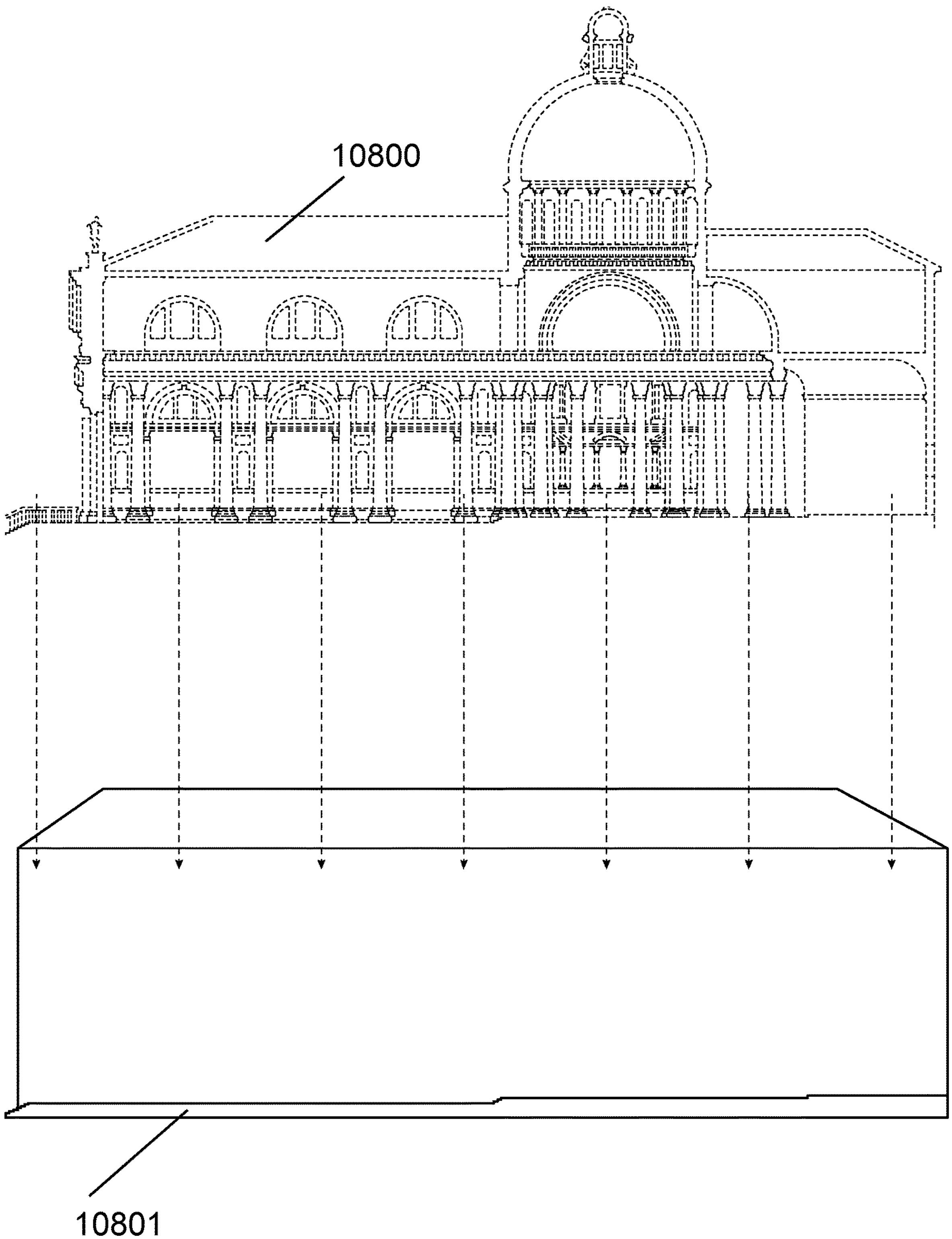
Figure 264B:
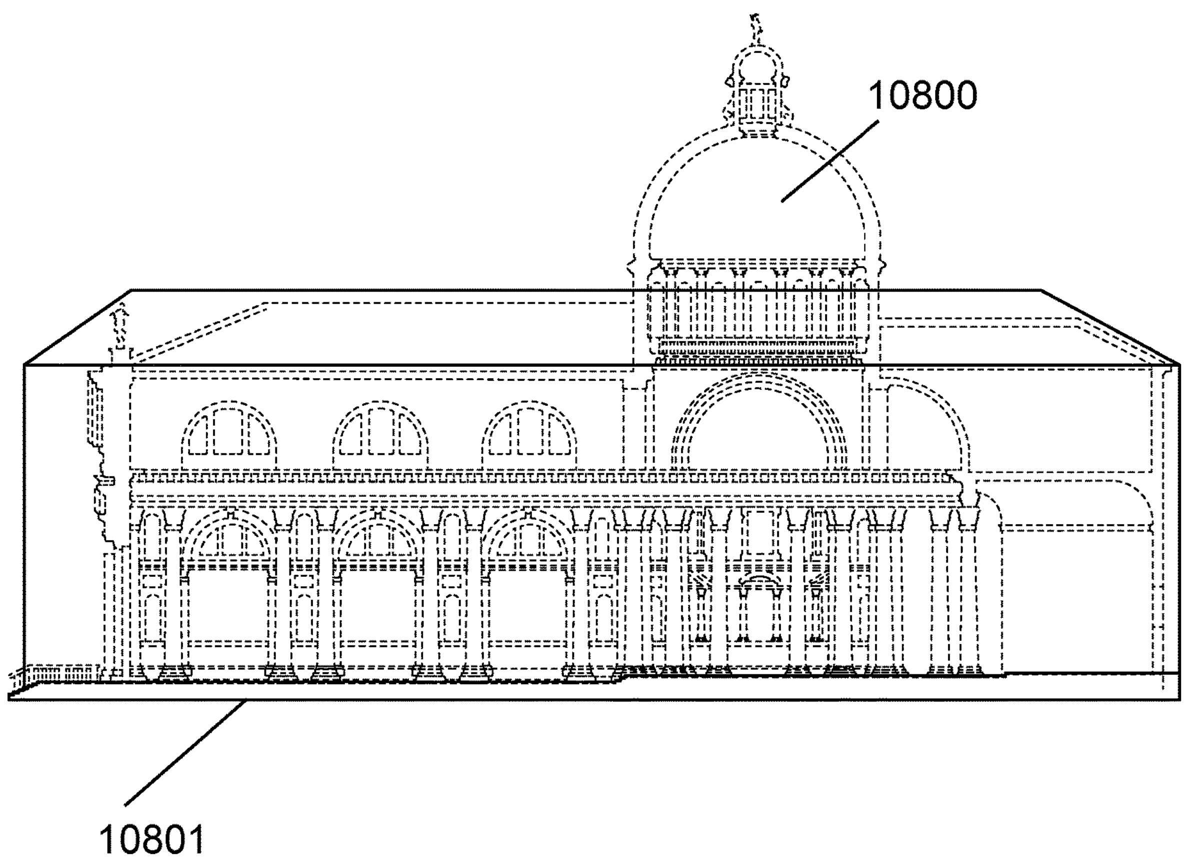
Figure 264C:
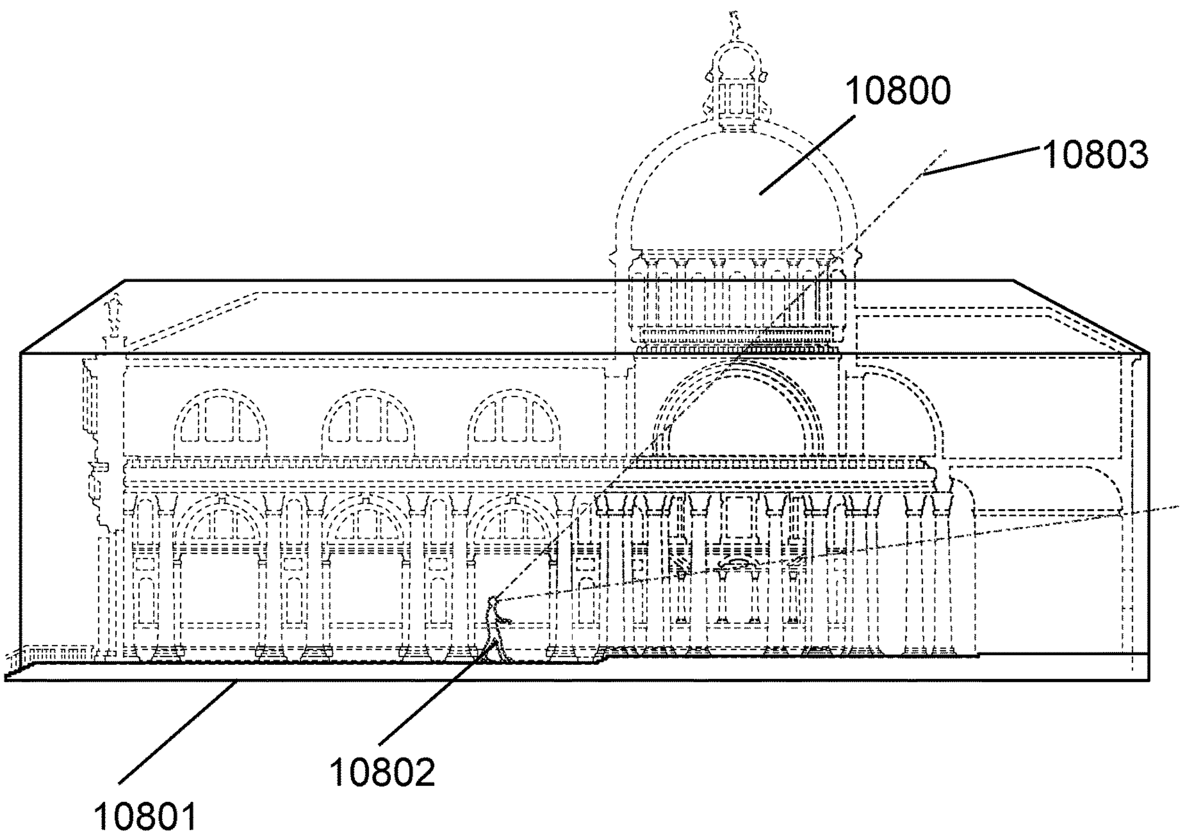
Figure 264D:
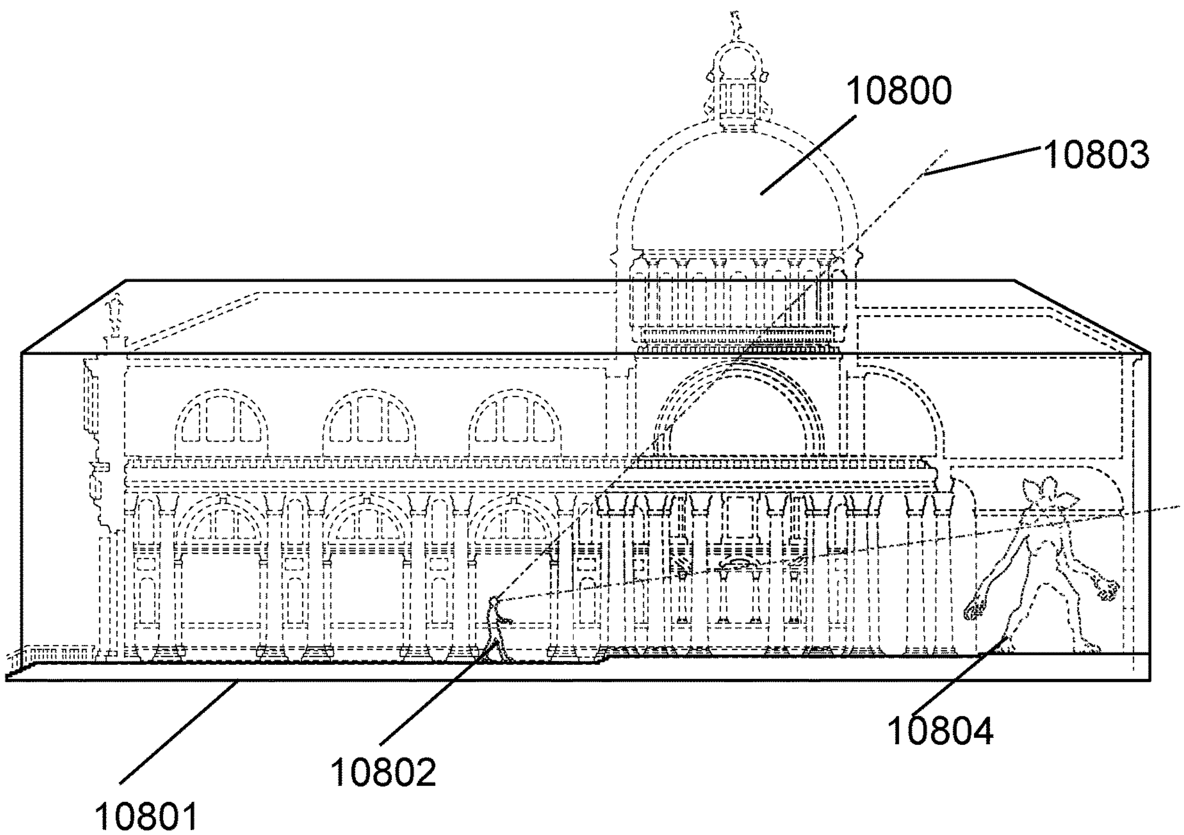

In some embodiments, SLAM methods described herein may be used for recreating a virtual spatial reality (VR). In some embodiments, a 360 degree capture of the environment may be used to create a virtual spatial reality of the environment within which a user may move. In some embodiments, SLAM methods may be integrated with virtual reality. In some embodiments, a virtual spatial reality may be used for games. For example, a virtual or augmented spatial reality of a room moves at a walking speed of a user experiencing the virtual spatial reality. In some embodiments, the walking speed of the user may be determined using a pedometer worn by the user. In some embodiments, a spatial virtual reality may be created and later implemented in a game wherein the spatial virtual reality moves based on a displacement of a user measured using a SLAM device worn by the user. In some instances, a SLAM device may be more accurate than a pedometer as pedometer errors are adjusted with scans. In some current virtual reality games a user may need to use an additional component, such as a chair synchronized with the game (e.g., moving to imitate the feeling of riding a roller coaster), to have a more realistic experience. In the spatial virtual reality described herein, a user may control where they go within the virtual spatial reality (e.g., left, right, up, down, remain still). In some embodiments, the movement of the user measured using a SLAM device worn by the user may determine the response of a virtual spatial reality video seen by the user. For example, if a user runs, a video of the virtual spatial reality may play faster. If the user turns right, the video of the virtual spatial reality shows the areas to the right of the user. FIGS. 263A-263C illustrate an example of virtual reality and SLAM integration. FIGS. 263A and 263B illustrate a user with a virtual reality headset 10700 on an omnidirectional treadmill 10701 that allows movement in directions 10702 indicated by the arrows. The user may move freely in place while the speed and direction of movement of the user is translated into the virtual reality view by the user through the virtual reality headset 10700. Using the virtual reality headset 10700, the user may observe their surroundings within the virtual space, which changes based on the speed and direction of movement of the user on the omnidirectional treadmill 10701. This is possible as the system continuously localizes a virtual avatar of the user within the virtual map according to their speed and direction. For instance, FIG. 263C illustrates the adjustment of the virtual space 10703, wherein with forward movement 10704 of the user at a particular speed, the virtual space 10703 moves backwards 10705 at the same particular speed to create the illusion of moving forward within the virtual space. This concept may be useful for video games, architectural visualization, or the exploration of any virtual space. FIGS. 264A-264D illustrate another example of virtual reality and SLAM integration. In this example, a user may have complete freedom of movement within a confined space (e.g., a warehouse) but as the user moves, augmented virtual reality data may be projected to a virtual reality headset based on the location of the user and the direction in which the user is looking. For instance, this concept may be useful for digital tourism. FIGS. 264A and 264B illustrate overlaying 3D scanned data of a remote site 10800 on top of physical location data of a warehouse 10801. FIG. 264C illustrates a user 10802 wandering within the warehouse 10801. Using a virtual reality headset, the user 10802 may see the portion of the remote site 10800 that falls within the field of view 10803 of the virtual reality headset. In some cases, in addition to 3D scanned data of the remote site, other elements (e.g., objects, persons, fantasy animals, etc.) may be added to the virtual reality space. The elements may be modeled or animated. FIG. 264D illustrates a fantasy monster 10804 added to the immersive virtual reality experience.

Figure 265A:
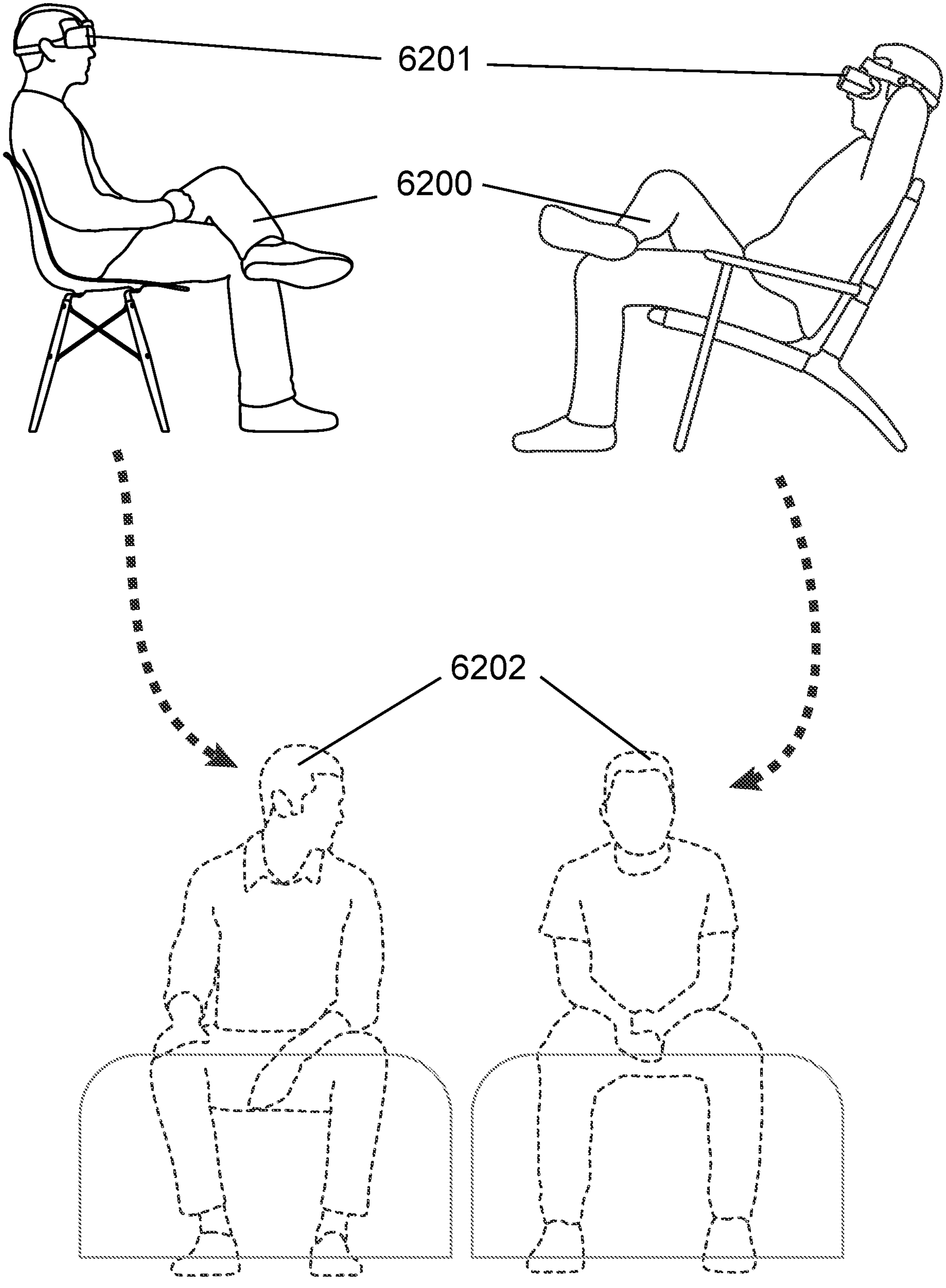
Figure 265B:
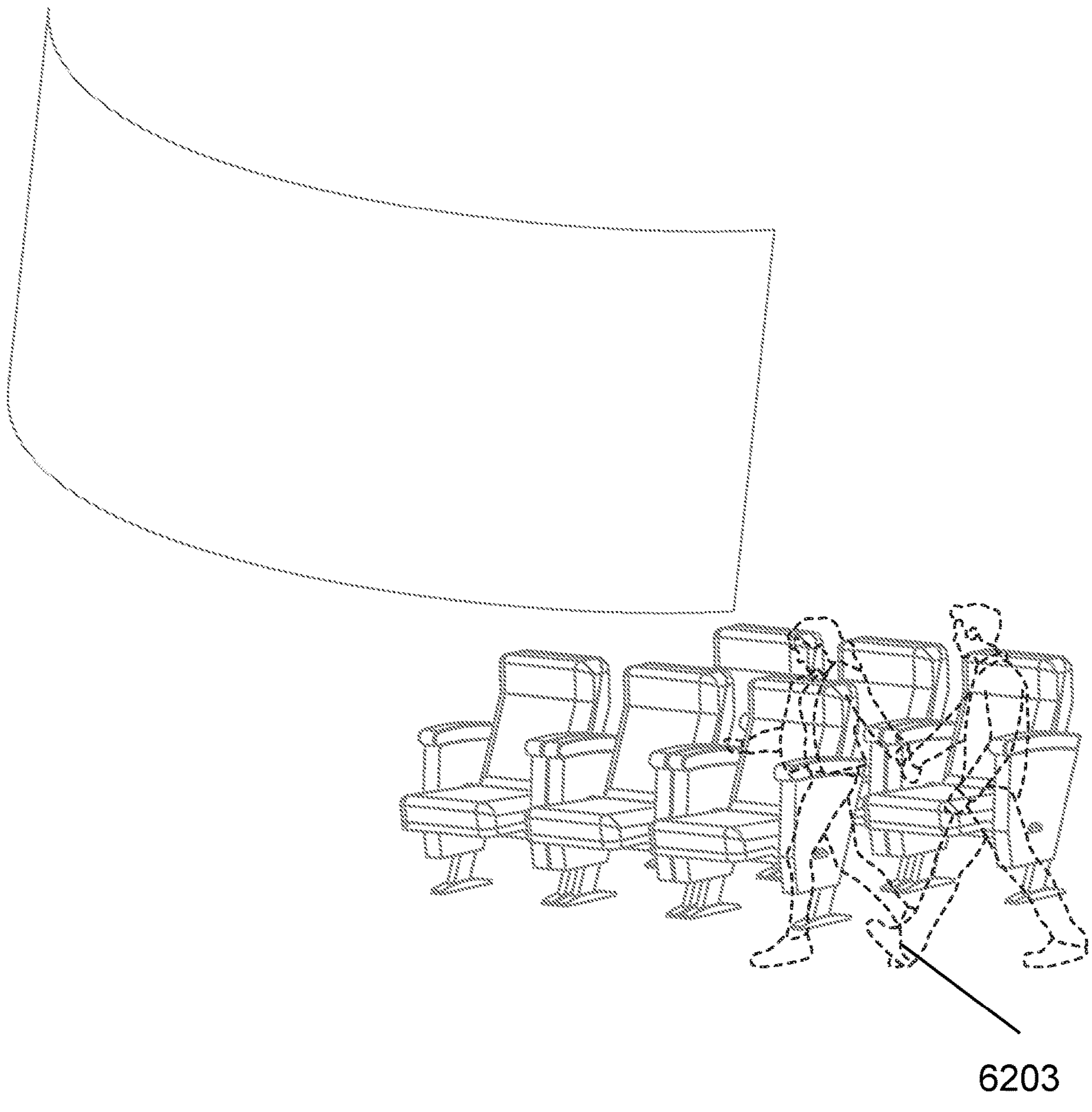
Figure 265C:
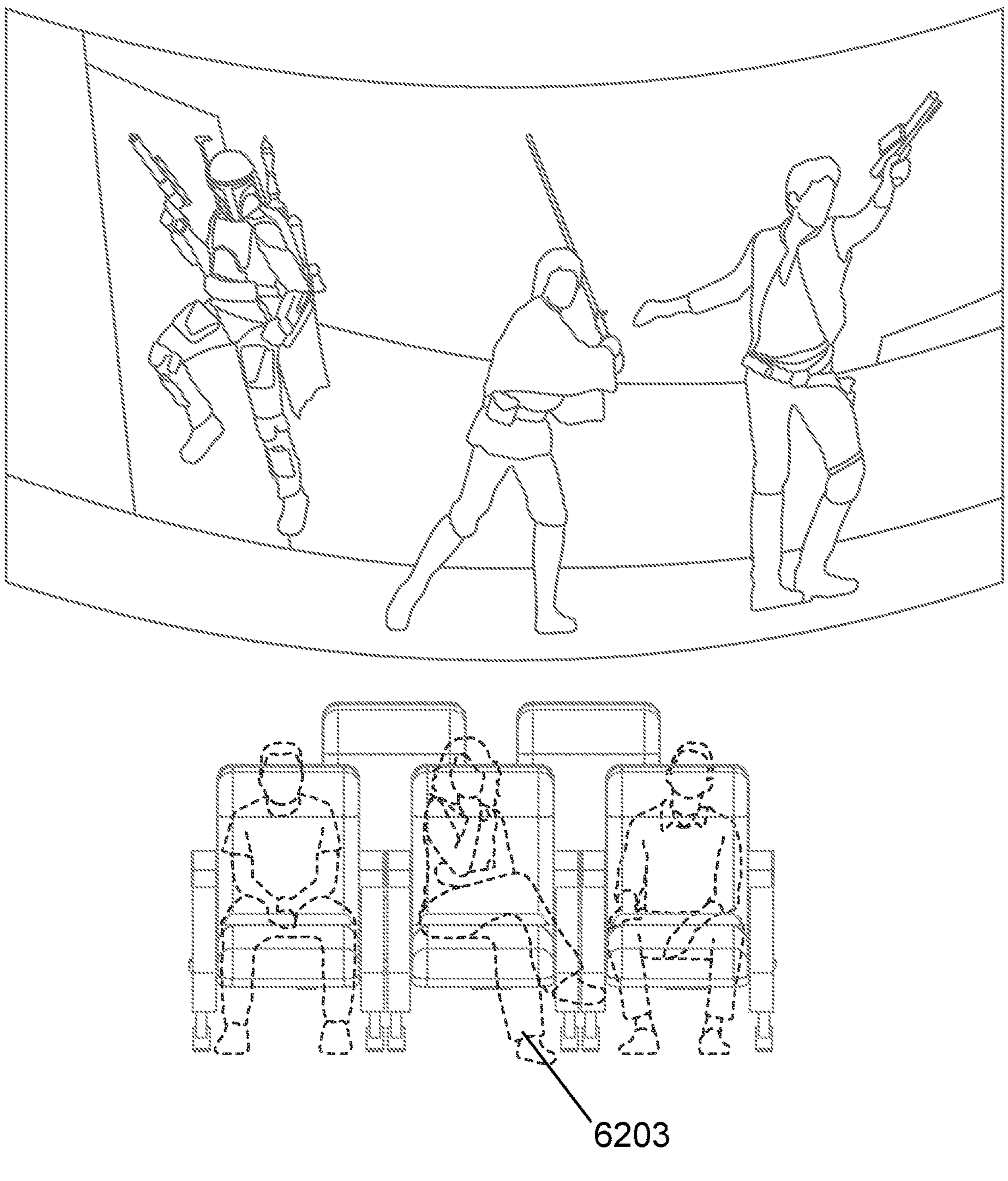
Figure 265D:
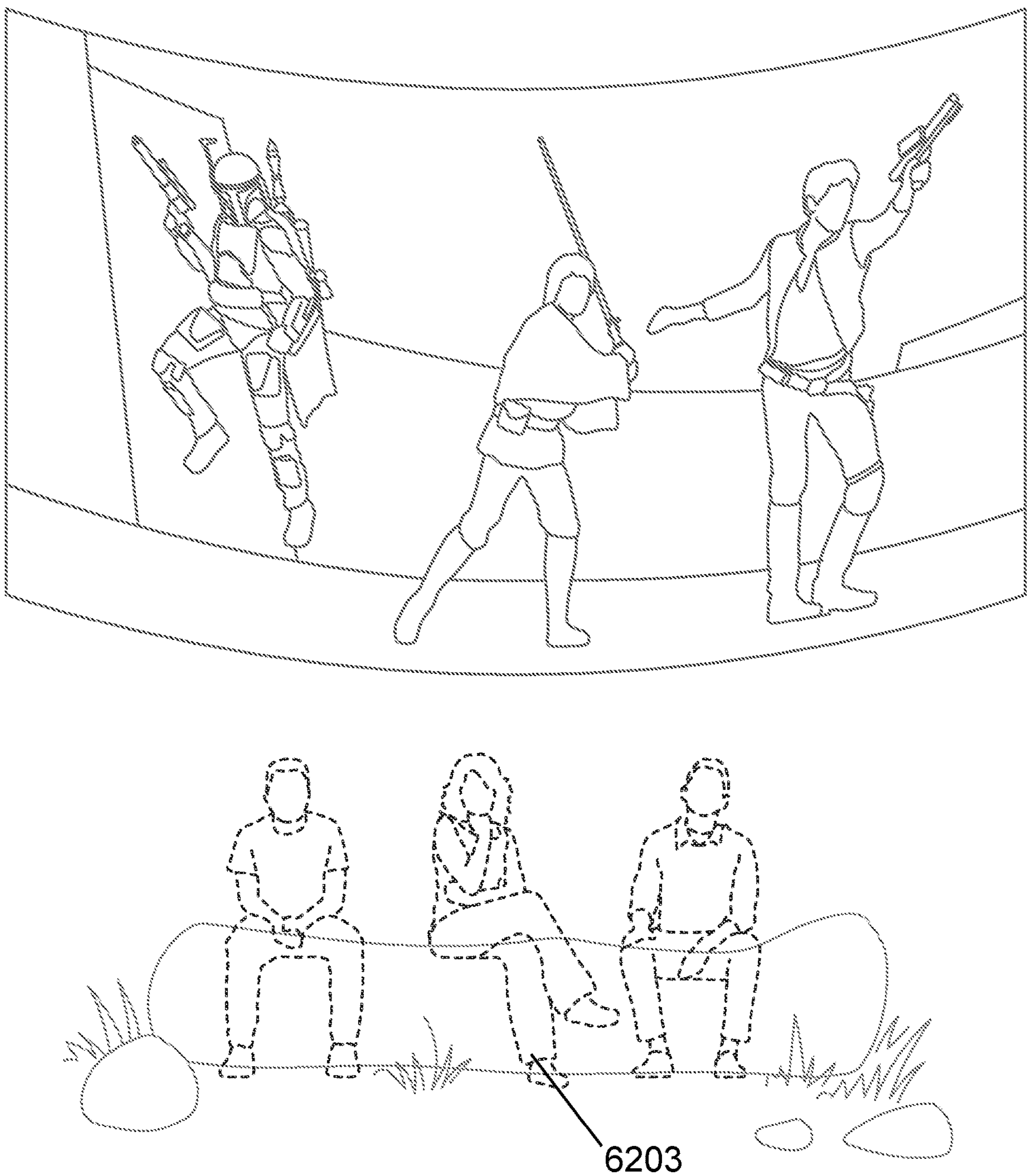
Figure 265E:
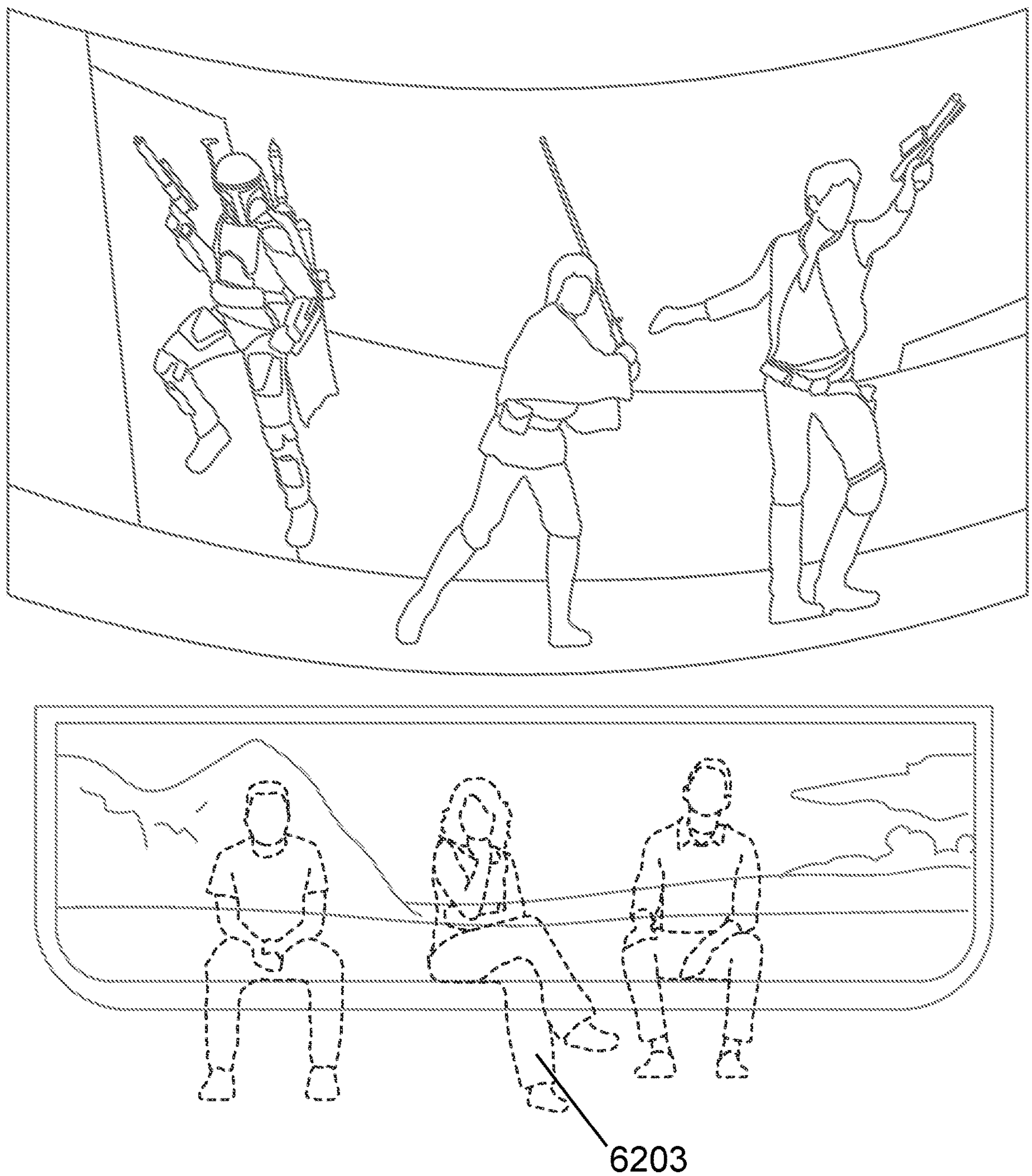
Figure 265F:
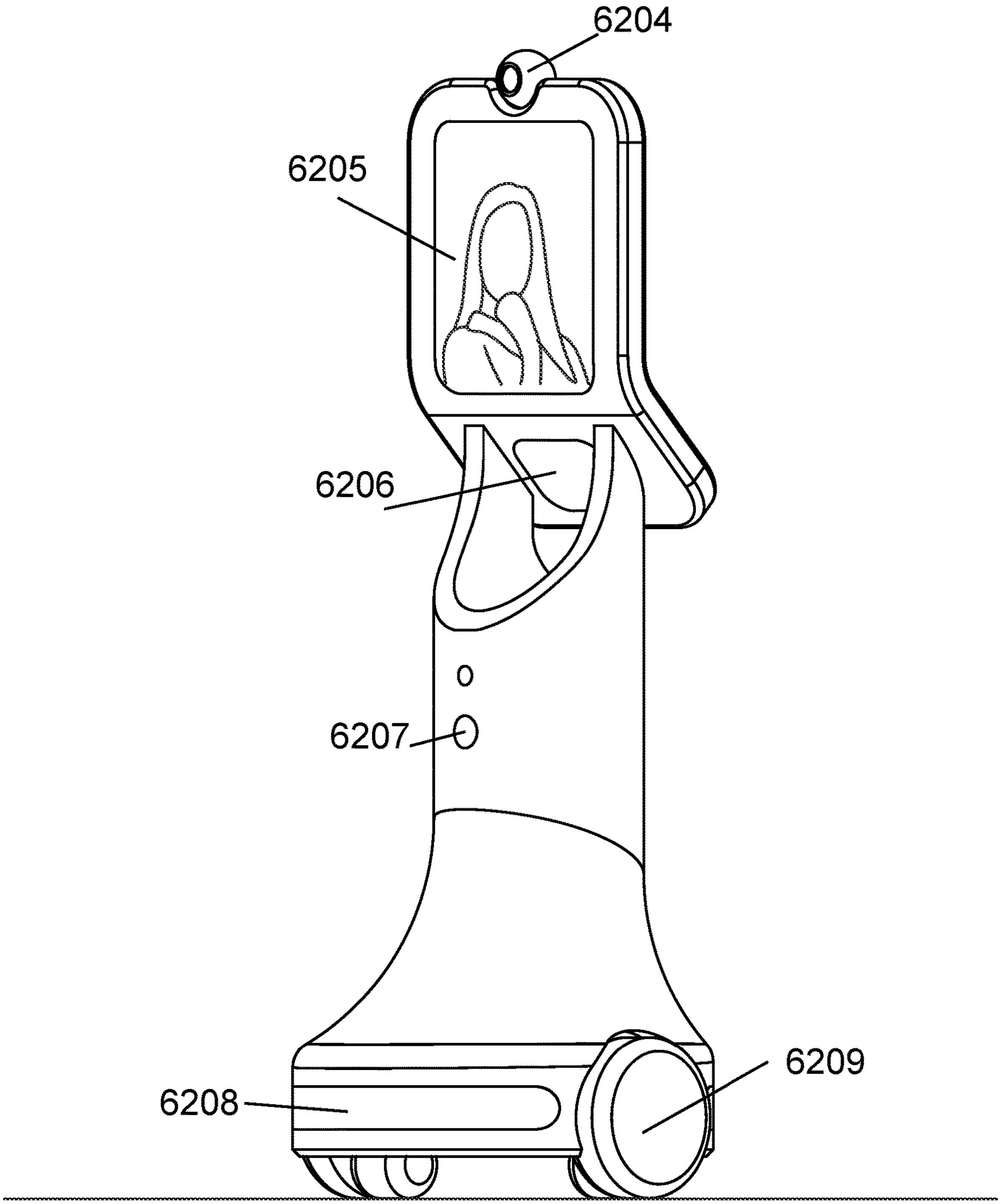
Figure 265G:
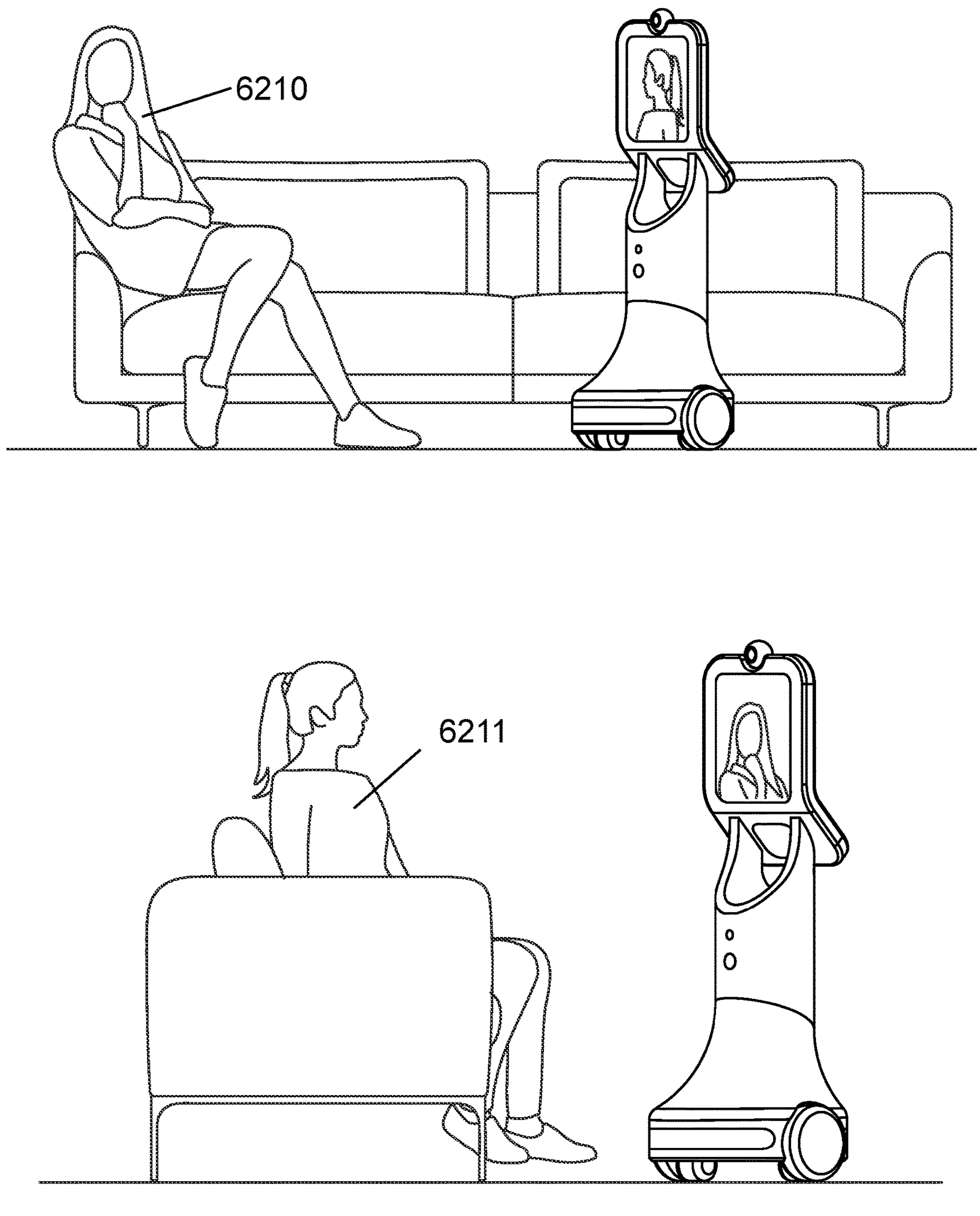
Figure 265H:
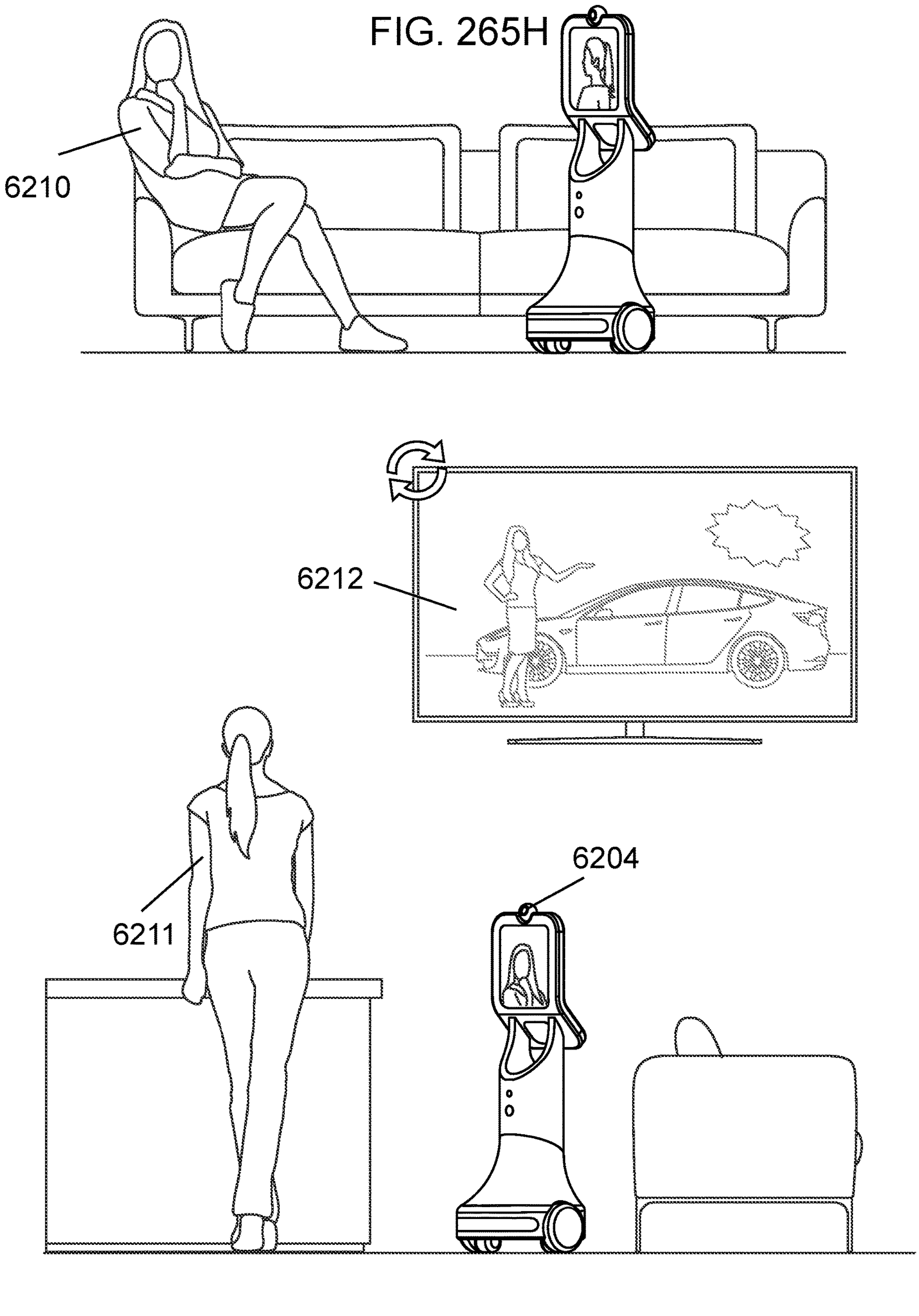
Figure 265I:
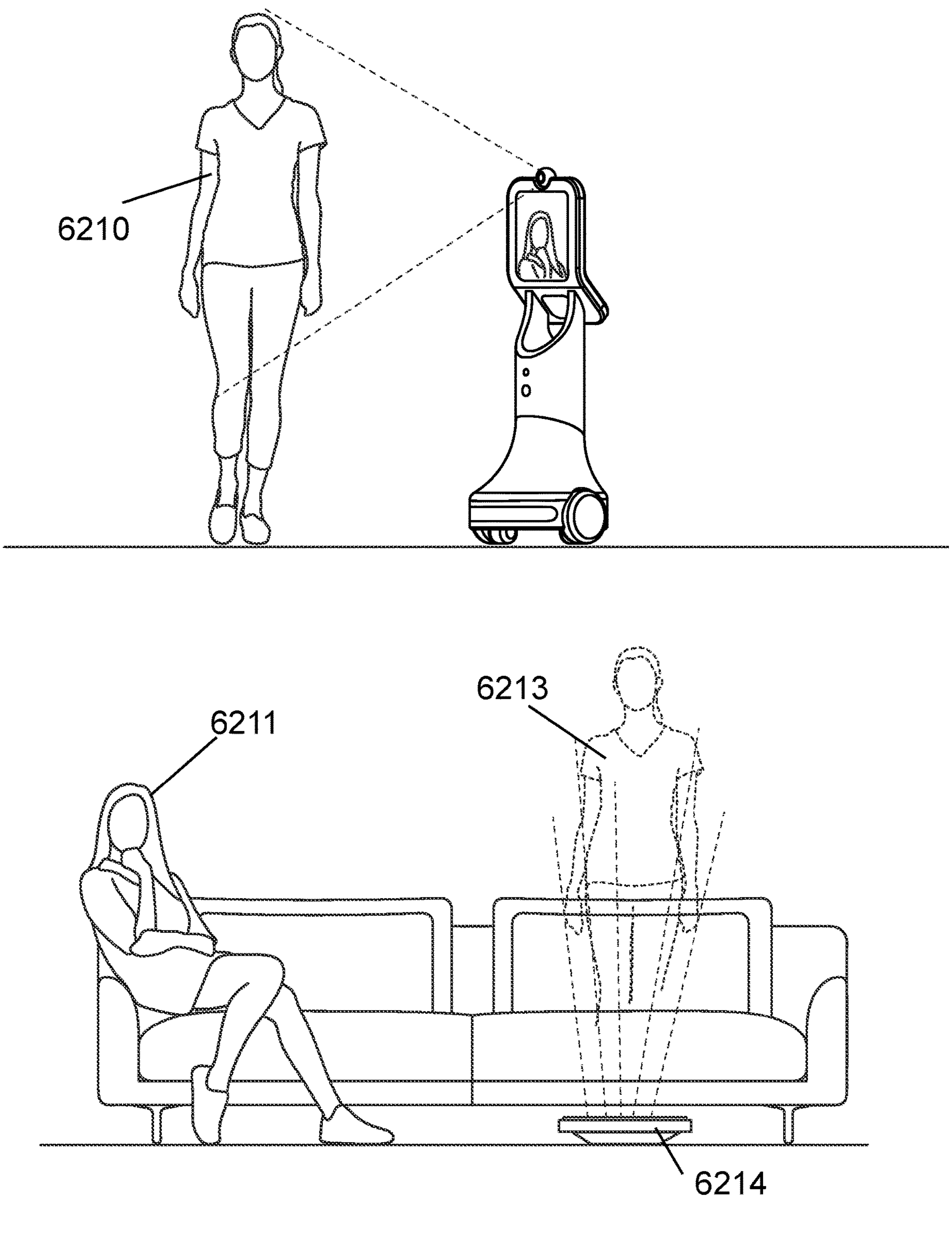
Figure 265J:
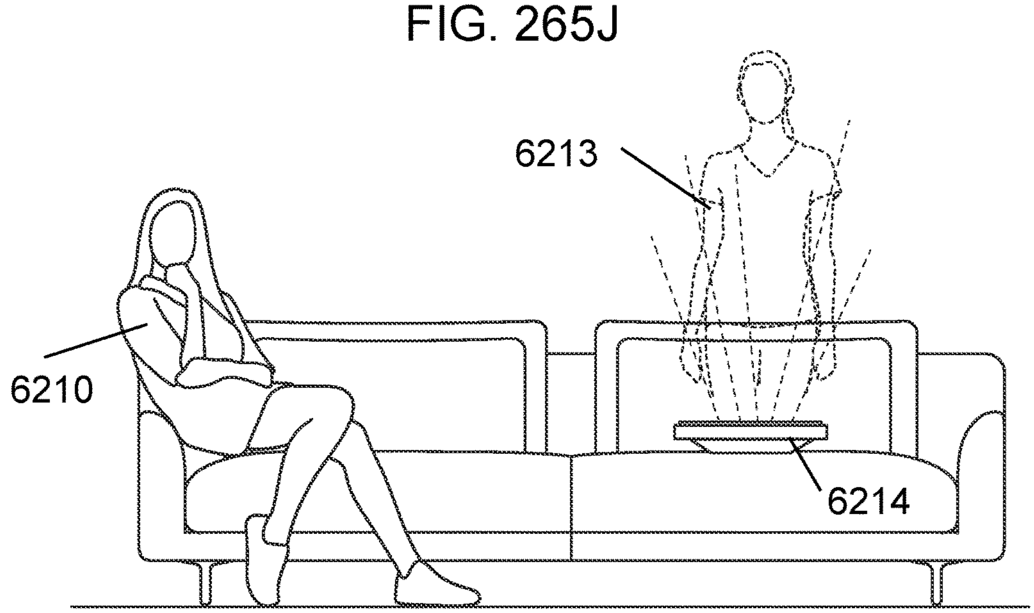
Figure 265K:
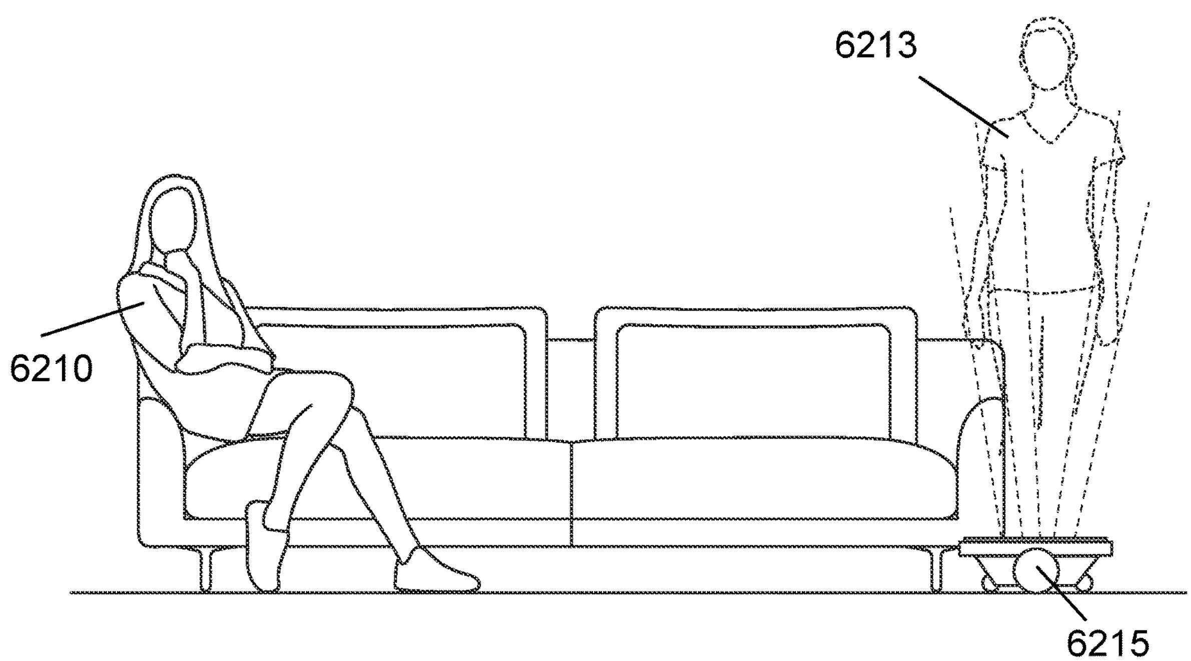
Figure 265L:
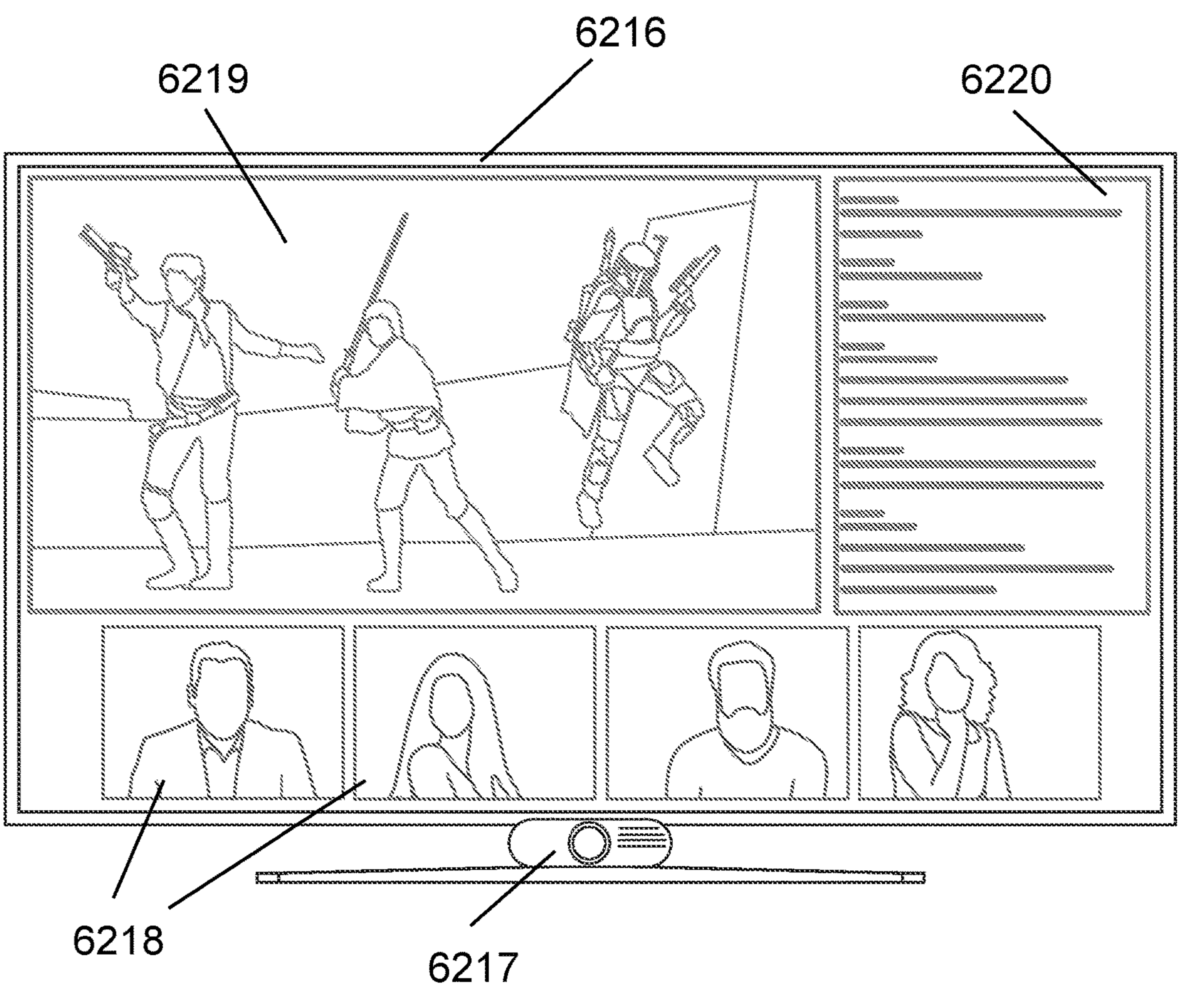
Figure 265M:
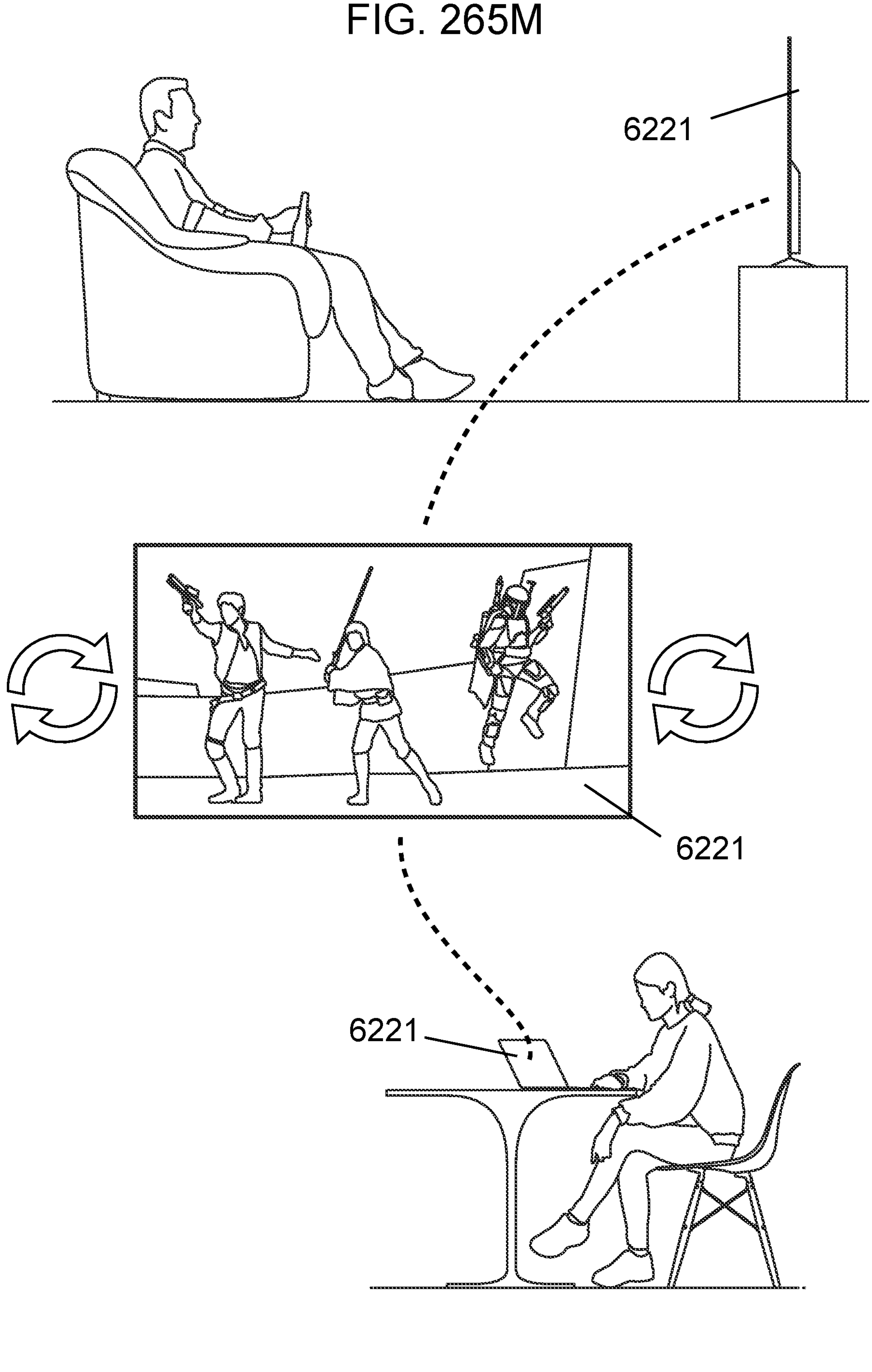
Figure 265N:
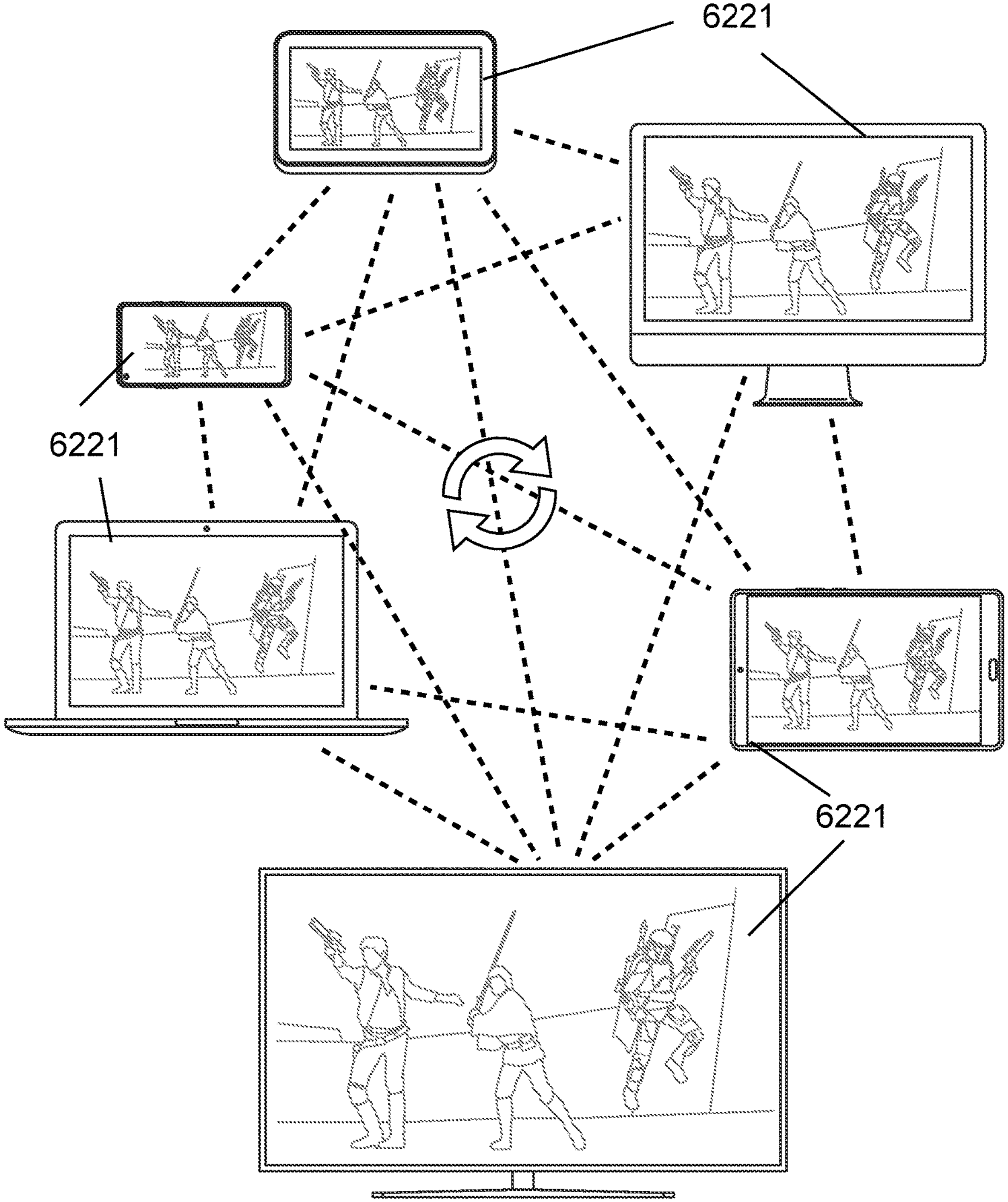
Figure 265O:
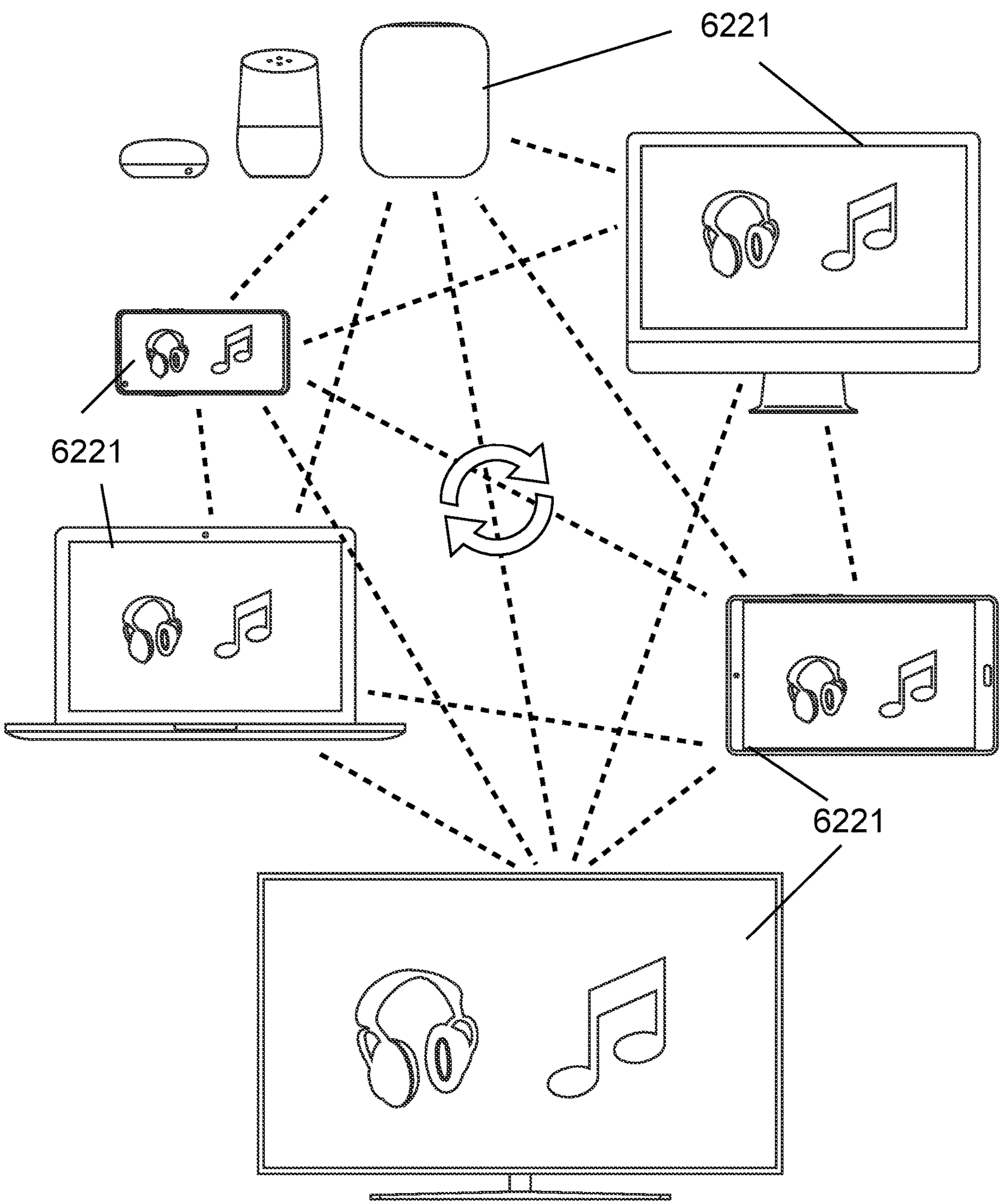

In some embodiments, VR wearable headsets may be connected, such that multiple users may interact with one another within a common VR experience. For example, FIG. 265A illustrates two users 6200, each wearing a VR wearable headset 6201. The VR wearable headsets 6201 may be wirelessly connected such that the two users 6200 may interact in a common virtual space (e.g., Greece, Ireland, an amusement park, theater, etc.) through their avatars 6202. In some cases, the users may be located in separate locations (e.g., at their own homes) but may still interact with one another in a common virtual space. FIG. 265B illustrates an example of avatars 6203 hanging out in a virtual theater. Since the space is virtual, it may be customized based on the desires of the users. For instance, FIGS. 265C-265E illustrate a classic seating area for a theater, a seating area within nature, and a mountainous backdrop, respectively, that may be chosen to customize the virtual theater space. In embodiments, robots, cameras, wearable technologies, and motion sensors may determine changes in location and expression of the user. This may be used in mimicking the real actions of the user by an avatar in virtual space. FIG. 265F illustrates a robot that may be used for VR and telecommunication including a camera 6204 for communication purposes, a display 6205, a speaker 6206, a camera 6207 for mapping and navigation purposes, sensor window 6208 behind which proximity sensors are housed, and drive wheels 6209. FIG. 265G illustrates two users 6210 and 6211 located in separate locations and communicating with one another through video chat by using the telecommunication functions of the robot (e.g., camera, speaker, display screen, wireless communications, etc.). In some cases, both users 6210 and 6211 may be streaming a same media through a smart television connected with the robot. FIG. 265H illustrates the user 6211 leaving the room and the robot following the user 6211 such that they may continue to communicate with user 6210 through video chat. The camera 6204 readjusts to follow the face of the user. The robot may also pause the smart television 6212 of each user when the user 6211 leaves the room such that they may continue where they left off when user 6211 returns to the room. In embodiments, smart and connected homes may be capable of learning and sensing interruption during movie watching sessions. Devices such as smart speakers and home assistants may learn and sense interruptions in sound. Devices such as cell phones may notify the robot to pause the media when someone calls the user. Also, relocation of the cell phone (e.g., from one room to another) may be used as an indication the user has left the room. FIG. 265I illustrates a virtual reconstruction 6213 of the user 6211 through VR base 6214 based on sensor data captured by at least the camera 6204 of the robot. The user 6210 may then enjoy the presence of user 6211 without them having to physically be there. The VR base 6214 may be positioned anywhere, as illustrated in FIG. 265J wherein the VR base 6214 is positioned on the couch. In some cases, the VR base may be robotic. FIG. 265K illustrates a robotic VR base 6215 that may follow user 6210 around the house such that they may continue to interact with the virtual reconstruction 6213 of the user 6211. The robotic VR base 6215 may use SLAM to navigate around the environment. FIG. 265L illustrates a smart screen (e.g., a smart television) including a display 6216 and a camera 6217 that may be used for telecommunications. For instance, the smart screen is used to simultaneously video chat with various persons 6218 (four in this case), watch a video 6219, and text 6220. The video 6219 may be simultaneously watched by the various persons 6218 through their own respective device. In embodiments, multiple devices (e.g., laptop, tablet, cell phone, television, smart watch, smart speakers, home assistant, etc.) may be connected and synched such that any media (e.g., music, movies, videos, etc.) captured, streamed, or downloaded on any one device may be accessed through the multiple connected devices. This is illustrated in FIGS. 265M-265O, wherein multiple devices 6221 are synched and connected such that any media (e.g., music, movies, videos, etc.) captured or downloaded on any one device may be accessed through the multiple connected devices 6221. These devices may have the same or different owners and may be located in the same or different locations (e.g., different households). In some cases, the devices are connected through a streaming or social media services such that streaming of a particular media may be accessed through each connected device.

In some embodiments, the processor may combine augmented reality (AR) with SLAM techniques. In some embodiments, a SLAM enabled device (e.g., robot, smart watch, cell phone, smart glasses, etc.) may collect environmental sensor data and generate maps of the environment. In some embodiments, the environmental sensor data as well as the maps may be overlaid on top of an augmented reality representation of the environment, such as a video feed captured by a video sensor of the SLAM enabled device or another device all together. In some embodiments, the SLAM enabled device may be wearable (e.g., by a human, pet, robot, etc.) and may map the environment as the device is moved within the environment. In some embodiments, the SLAM enabled device may simultaneously transmit the map as its being built and useful environmental information as its being collect for overlay on the video feed of a camera. In some cases, the camera may be a camera of a different device or of the SLAM enabled device itself. For example, this capability may be useful in situations such as natural disaster aftermaths (e.g., earthquakes or hurricanes) where first responders may be provided environmental information such as area maps, temperature maps, oxygen level maps, etc. on their phone or headset camera. Examples of other use cases may include situations handled by police or fire fighting forces. For instance, an autonomous robot may be used to enter a dangerous environment to collect environmental data such as area maps, temperature maps, obstacle maps, etc. that may be overlaid with a video feed of a camera of the robot or a camera of another device. In some cases, the environmental data overlaid on the video feed may be transmitted to a communication device (e.g., of a police or fire fighter for analysis of the situation). Another example of a use case includes the mining industry as SLAM enabled devices are not required to rely on light to observe the environment. For example, a SLAM enabled device may generate a map using sensors such as LIDAR and sonar sensors that are functional in low lighting and may transmit the sensor data for overlay on a video feed of camera of a miner or construction worker. In some embodiments, a SLAM enabled device, such as a robot, may observe an environment and may simultaneously transmit a live video feed of its camera to an application of a communication device of a user. In some embodiments, the user may annotate directly on the video to guide the robot using the application. In some embodiments, the user may share the information with other users using the application. Since the SLAM enabled device uses SLAM to map the environment, in some embodiments, the processor of the SLAM enabled device may determine the location of newly added information within the map and display it in the correct location on the video feed. In some cases, the advantage of combined SLAM and AR is the combined information obtained from the video feed of the camera and the environmental sensor data and maps. For example, in AR, information may appear as an overlay of a video feed by tracking objects within the camera frame. However, as soon as the objects move beyond the camera frame, the tracking points of the objects and hence information on their location are list. With combined SLAM and AR, location of objects observed by the camera may be saved within the map generated using SLAM techniques. This may be helpful in situations where areas may be off-limits, such as in construction sites. For example, a user may insert an off-limit area in a live video feed using an application displaying the live video feed. The off-limit area may then be saved to a map of the environment such that its position is known. In another example, a civil engineer may remotely insert notes associated with different areas of the environment as they are shown on the live video feed. These notes may be associated with the different areas on a corresponding map and may be accessed at a later time. In one example, a remote technician may draw circles to point out different components of a machine on a video feed from an onsite camera through an application and the onsite user may view the circles as overlays in 3D space.

Figure 266A:
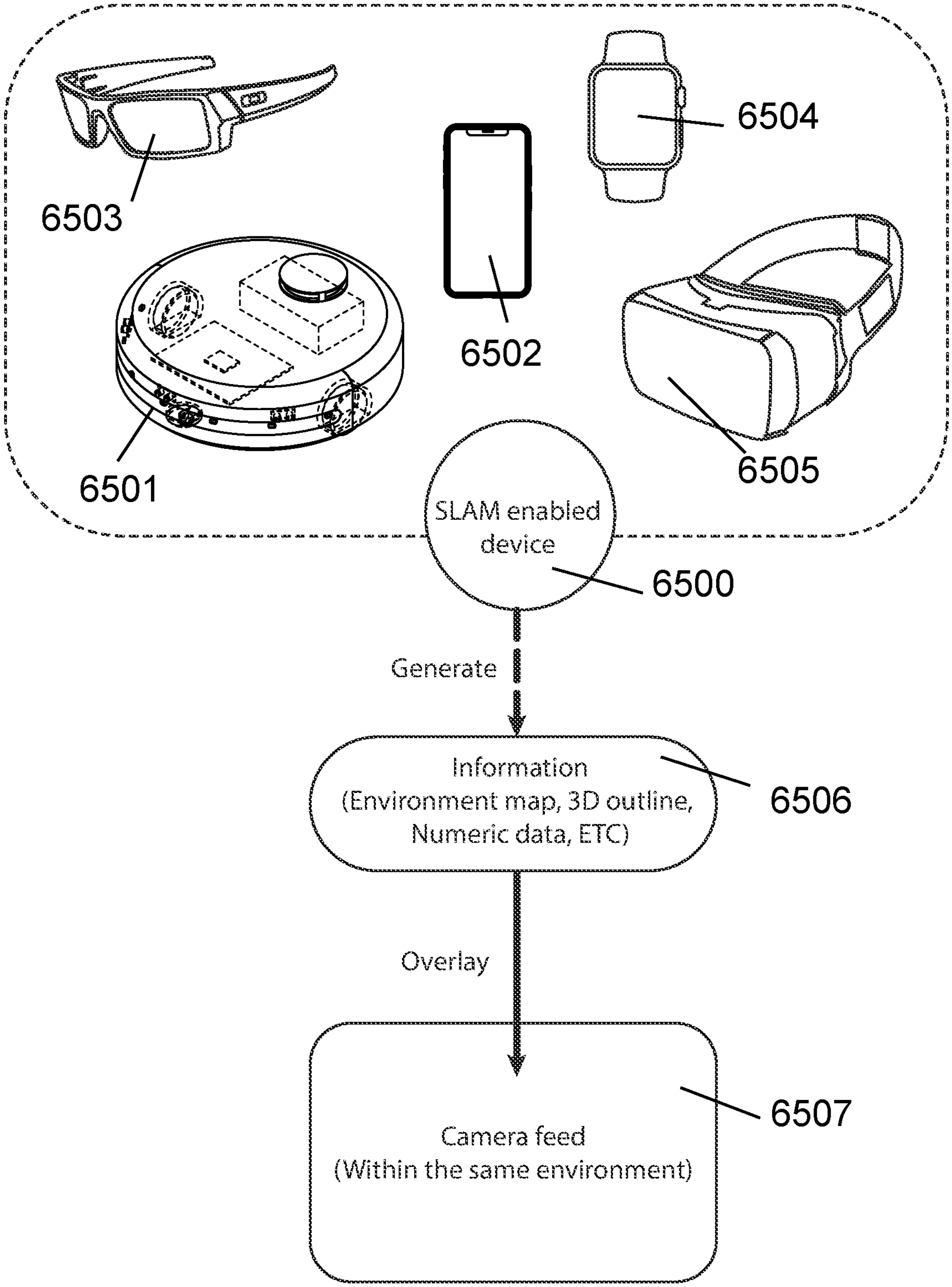
Figure 266B:
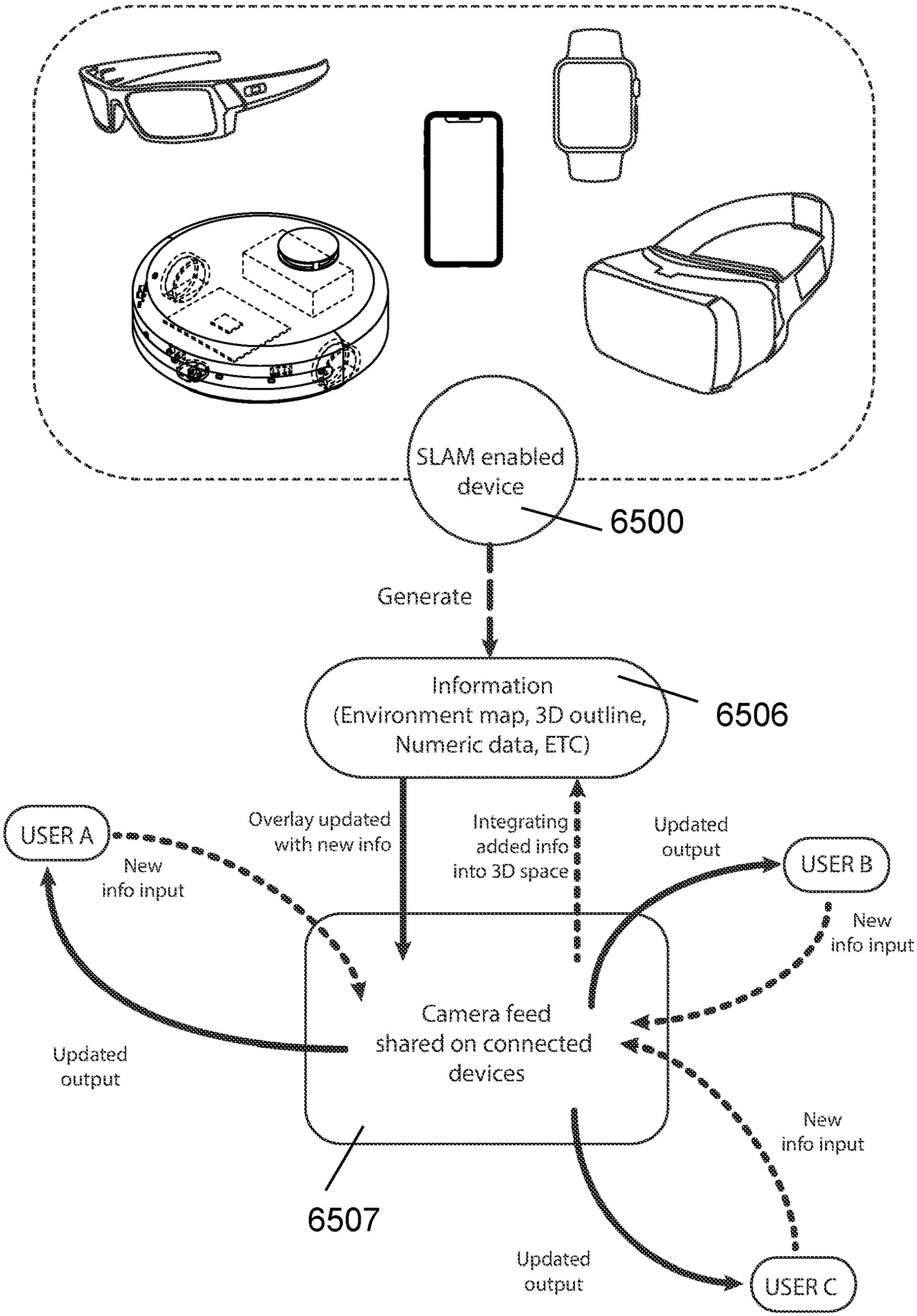
Figure 266C:
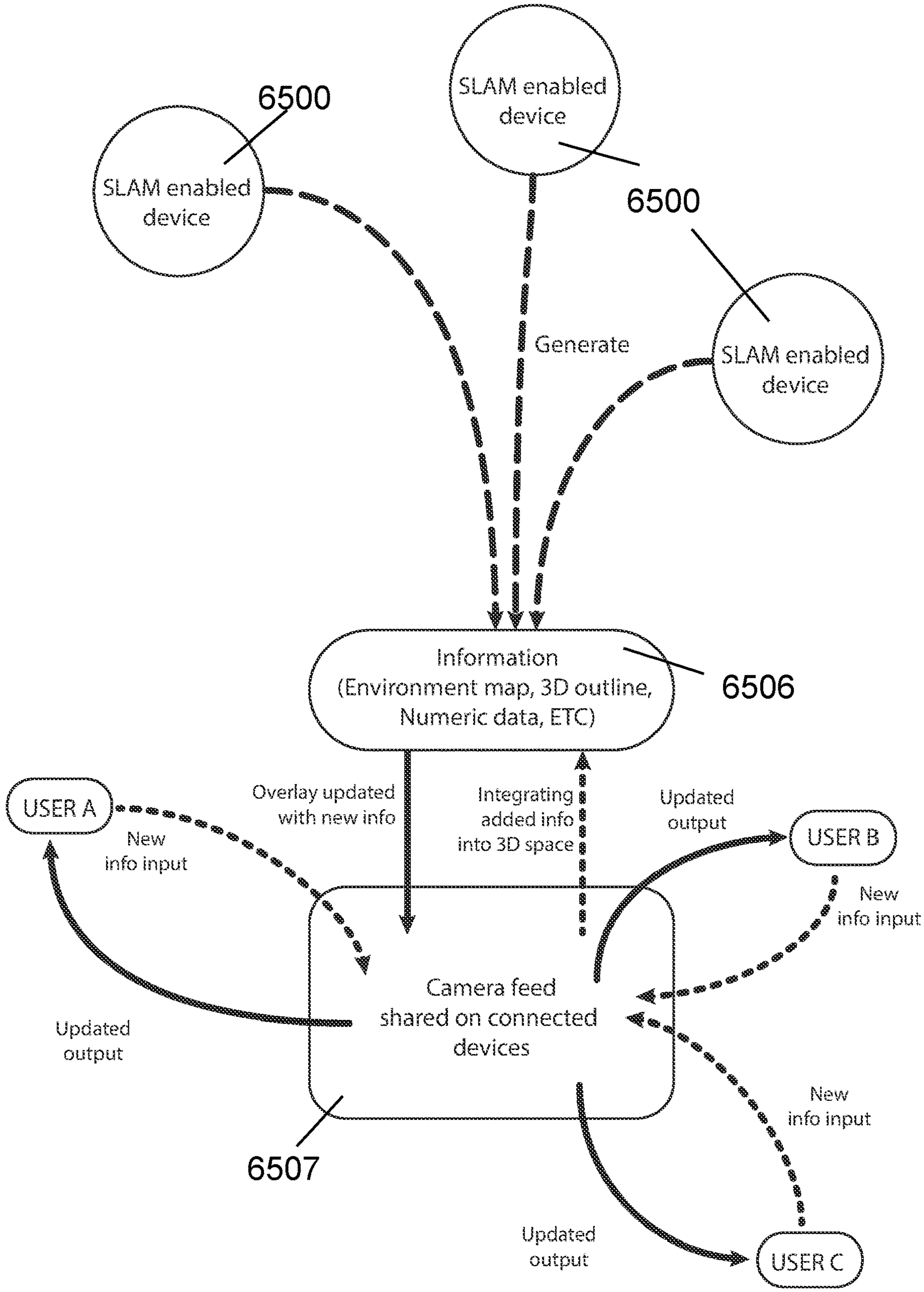
Figure 266D:
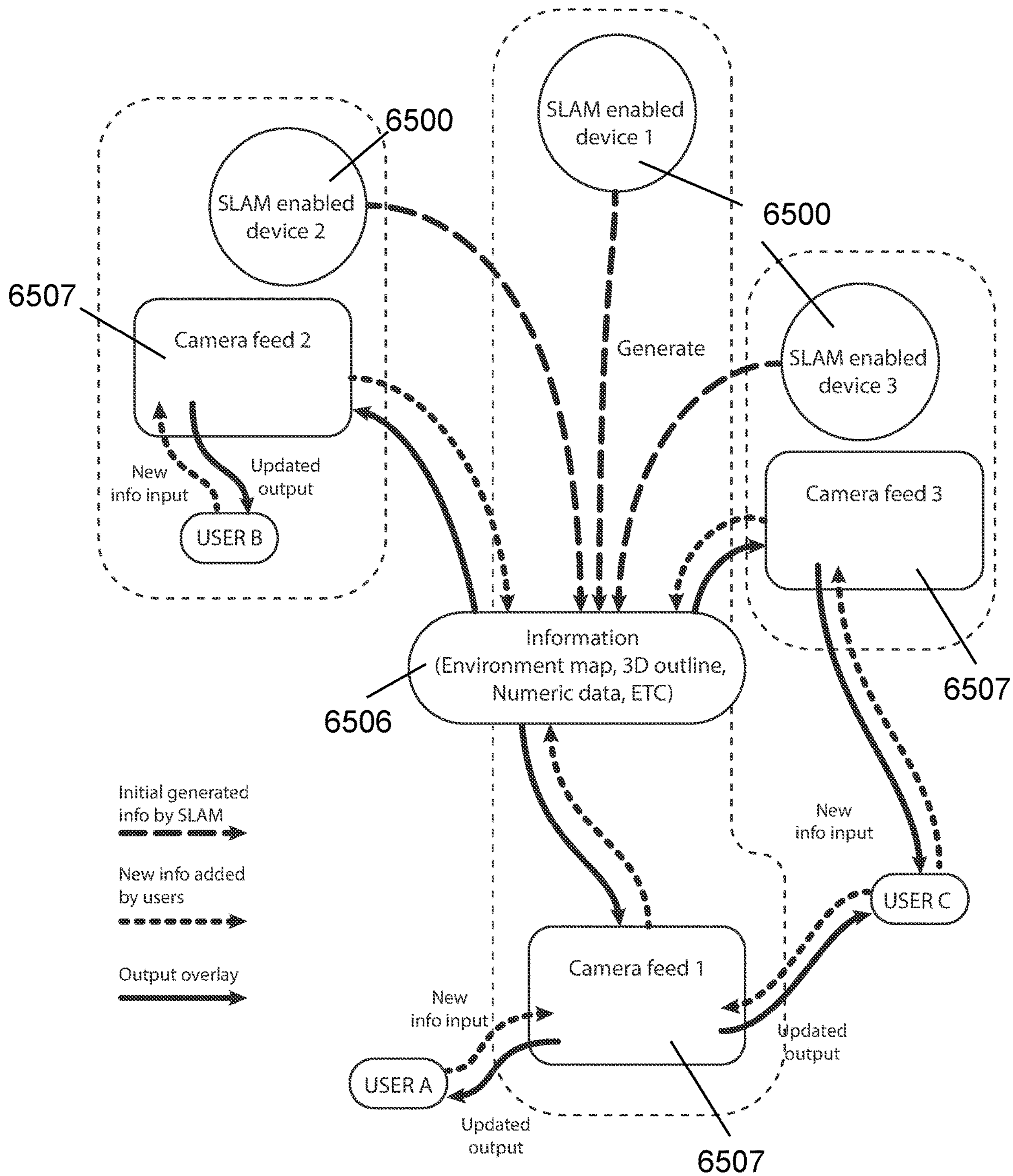
Figure 266E:
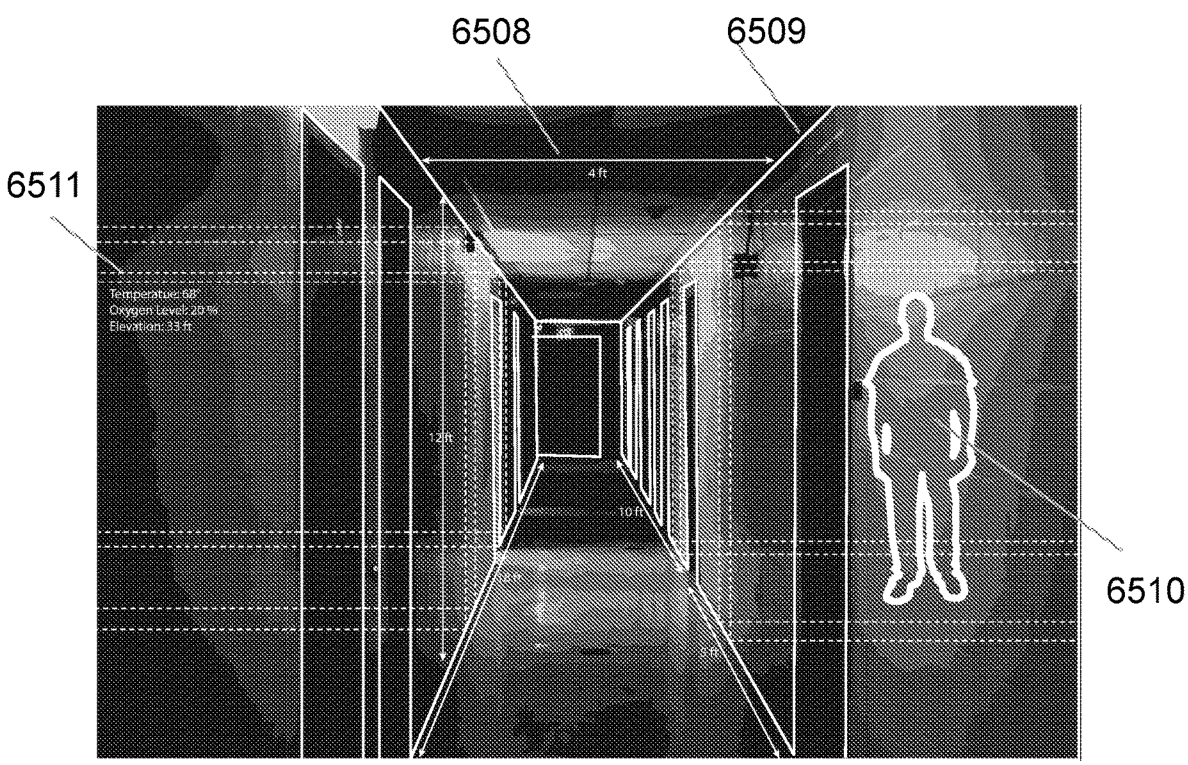
Figure 266F:
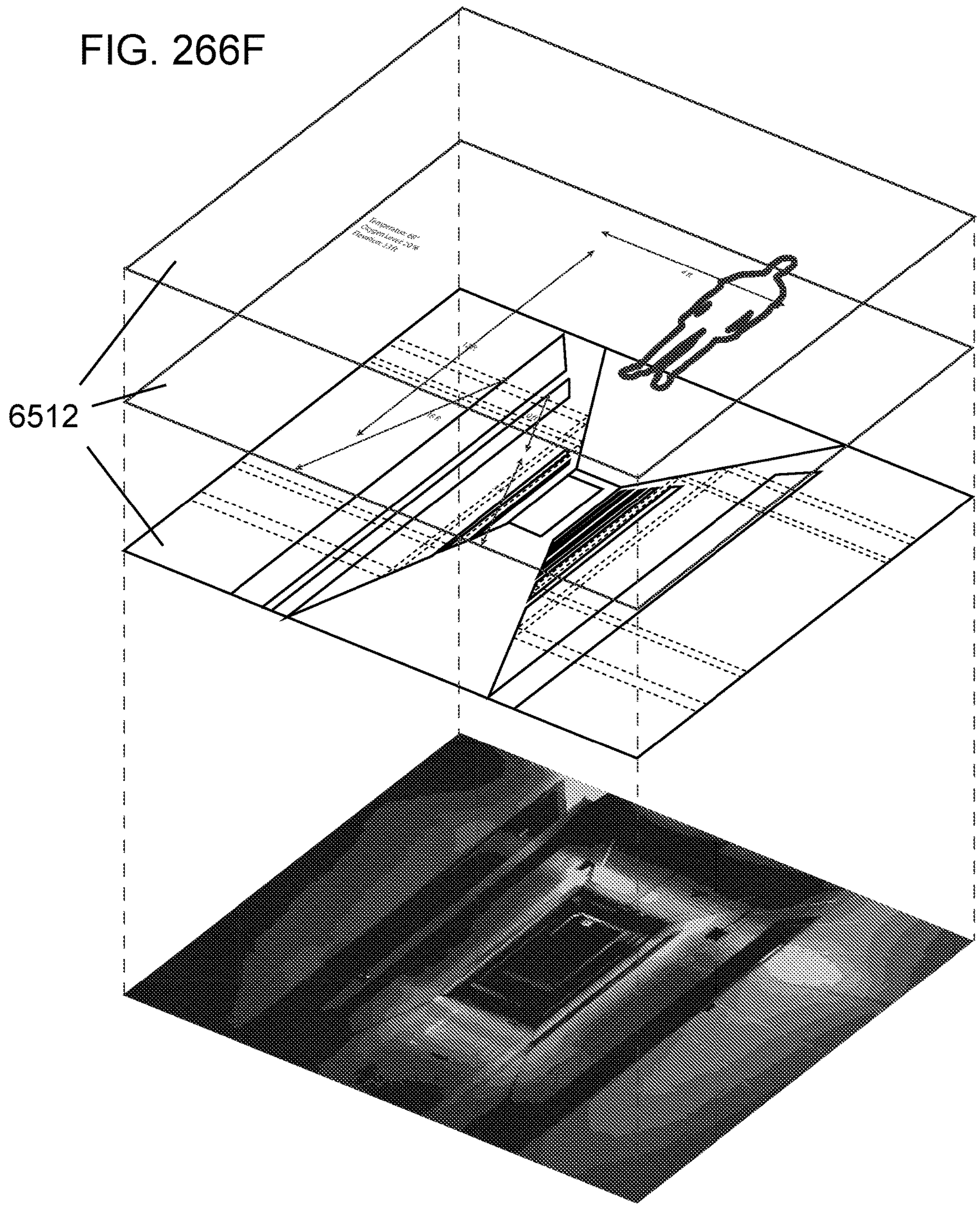
Figure 266G:
Figure 266H:
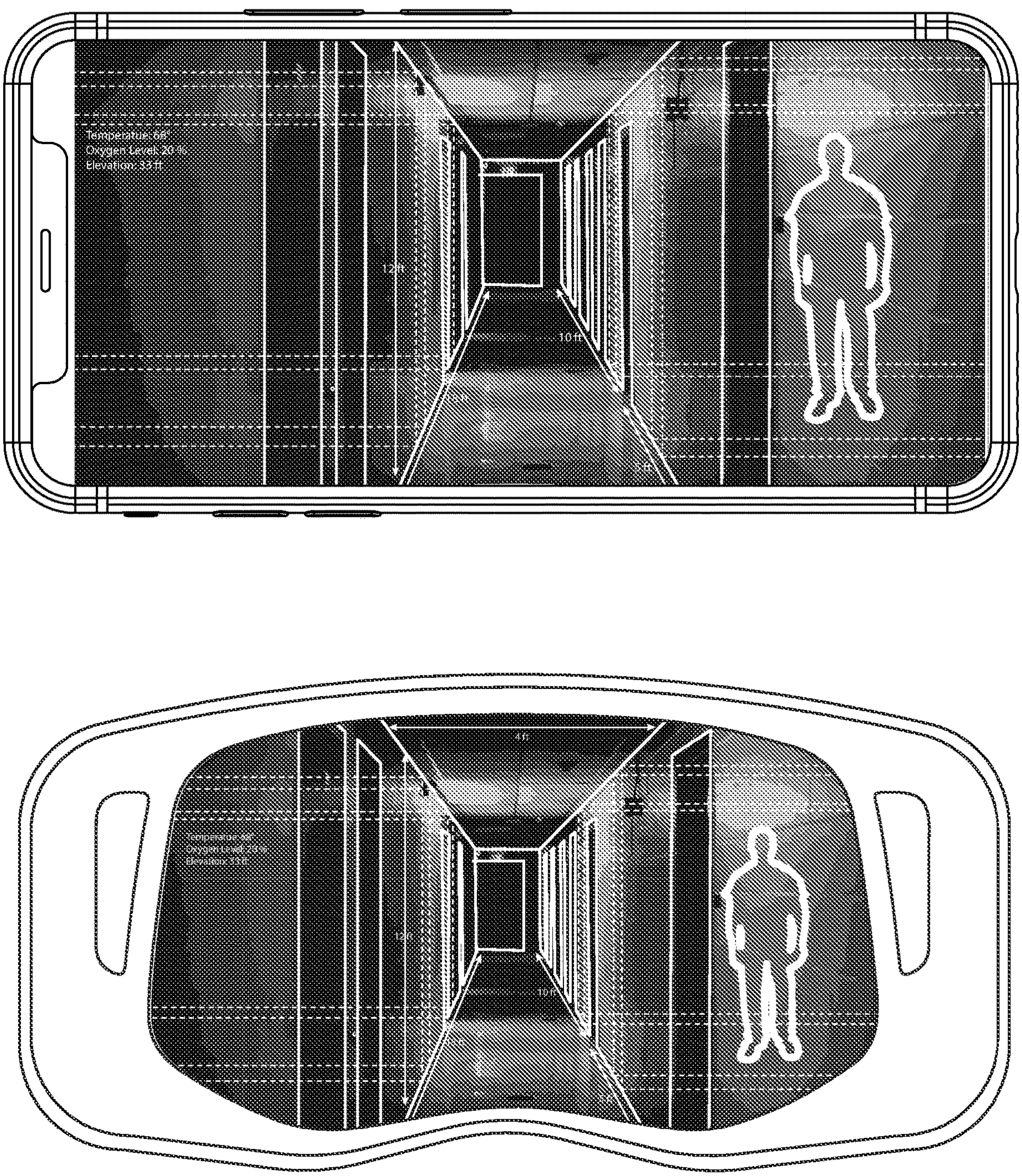

FIG. 266A illustrates a flowchart depicting the combination of SLAM and AR. A SLAM enabled device 6500 (e.g., robot 6501, smart phone 6502, smart glasses, 6503, smart watch 6504, and virtual reality goggles 6505, etc.) generates information 6506, such as an environmental map, 3D outline of the environment, and other environmental data (e.g., temperature, debris accumulation, floor type, edges, previous collisions, etc.), and places them as overlaid layers of a video feed of the same environment in real time 6502. In some embodiments, the video feed and overlays may be viewed on a device on site or remotely or both. FIG. 266B illustrates a flowchart depicting the combination of SLAM and AR from multiple sources. As in FIG. 266A the SLAM enabled device 6500 generates information of the environment 6506 and places them as overlaid layers of a video feed of the environment 6507. However, in this case, information from the video feed is also integrated into the 2D or 3D environmental data (e.g., maps). Additionally, users A, B, and C may provide inputs to the video feed using separate devices from which the video feed may be accessed. The overlaid layers of the video feed may be updated and update displayed in the video feed viewed by the users A, B, and C. In this way, multiple users may add information on top of the same video feed. The information added by the users A, B, and C may also be integrated into the 2D or 3D environmental data (e.g., maps) using the SLAM data. Users A, B and C may or may not be present within the same environment as one another or the SLAM enabled device 6500. FIG. 266C illustrates a flowchart similar to FIG. 266B but depicting multiple SLAM enabled devices 6500 generating environmental information 6506 and the addition of that environmental information from multiple SLAM enabled devices 6500 being overlaid onto the same camera feed 6507. For instance, a SLAM enabled autonomous robot may observe one side of an environment while a SLAM enabled headset worn by a user may observe the other side of the environment. The processors of both SLAM enabled devices may collaborate and share their observation to build a reliable map in a shorter amount of time. The combined observations may then be added as layer on top of the camera feed. FIG. 266D illustrates a flowchart depicting information 6506 generated by multiple SLAM enabled devices 6500 and inputs of users A, B, and C overlaid on multiple video feeds 6507. In this example, SLAM enabled device 1 may be an autonomous robot generating information 6506 and overlaying the information on top of a video of camera feed 1 of the autonomous robot. The video of camera feed 1 may also include generated information 6506 from SLAM enabled devices 2 and 3. Users A and C may provide inputs to the video of camera feed 1 that may be combined with the information 6506 that may be overlaid on top of the videos of camera feeds 1, 2, and 3 of corresponding SLAM enabled devices 1, 2, and 3. Users A and C may use an application of a communication device (e.g., mobile device, tablet, etc.) paired with SLAM enabled device 1 to access the video of camera feed 1 and may use the application to provide inputs directly on the video by, for example, interacting with the screen. SLAM enabled device 2 may be a wearable device (e.g., a watch) of user B generating information 6506 and overlaying the information on a video of camera feed 2 of the wearable device. The video of camera feed 2 may also include generated information 6506 from SLAM enabled devices 1 and 3. User B may provide inputs to the video of camera feed 2 that may be combined with the information 6506 that may be overlaid on top of the videos of camera feeds 1, 2, and 3 of corresponding SLAM enabled devices 1, 2, and 3. SLAM enabled device 3 may be a second autonomous robot generating information 6506 and overlaying the information on a video of camera feed 3 of the second autonomous robot. The video of camera feed 3 may also include generated information 6506 from SLAM enabled devices 1 and 2. User C may provide inputs to the video of camera feed 3 that may be combined with the information 6506 that may be overlaid on top of the videos of camera feeds 1, 2, and 3 of corresponding SLAM enabled devices 1, 2, and 3. Other users may also add information on top of any video feeds they have access to. Since information generated by all SLAM enabled devices and inputs into all camera feeds are shared, all information are collectively integrated into a 2D or 3D space using SLAM data and the overlays of videos of all camera feeds may be accordingly updated with the collective information. For example, although user A and C cannot access the video of camera feed 2, they may provide information in the form of inputs to the videos of camera feeds to which they have access to and that information may be visible by user B on the video of camera feed 2. FIG. 266E illustrates an example of a video of a camera feed with several layers of overlaid information, such as dimensions 6508, a three dimensional map of perimeters 6509, dynamic obstacle 6510, and information 6511. Because of SLAM, hidden elements, such as dynamic obstacle 6510 positioned behind a wall, may be shown. FIG. 266F illustrates the different layers 6512 that are overlaid on the video illustrated in FIG. 266E. FIG. 266G illustrates an example of an overlay of a map of an environment 6513 on a video of a camera feed observing the same environment. FIG. 266H the video camera feed on different devices (e.g., cellphone and AR headset).

Figure 267B:
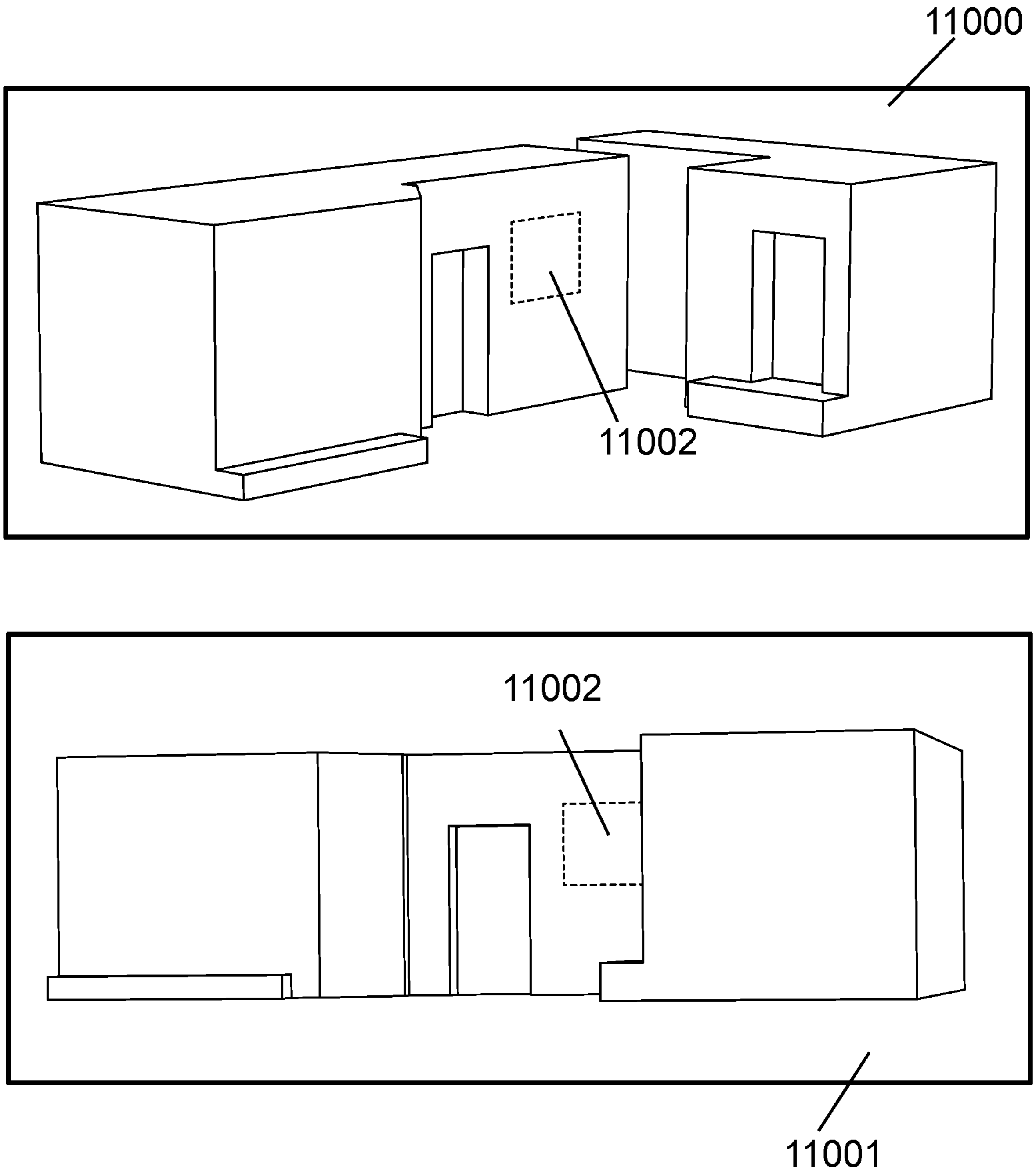
Figure 267C:
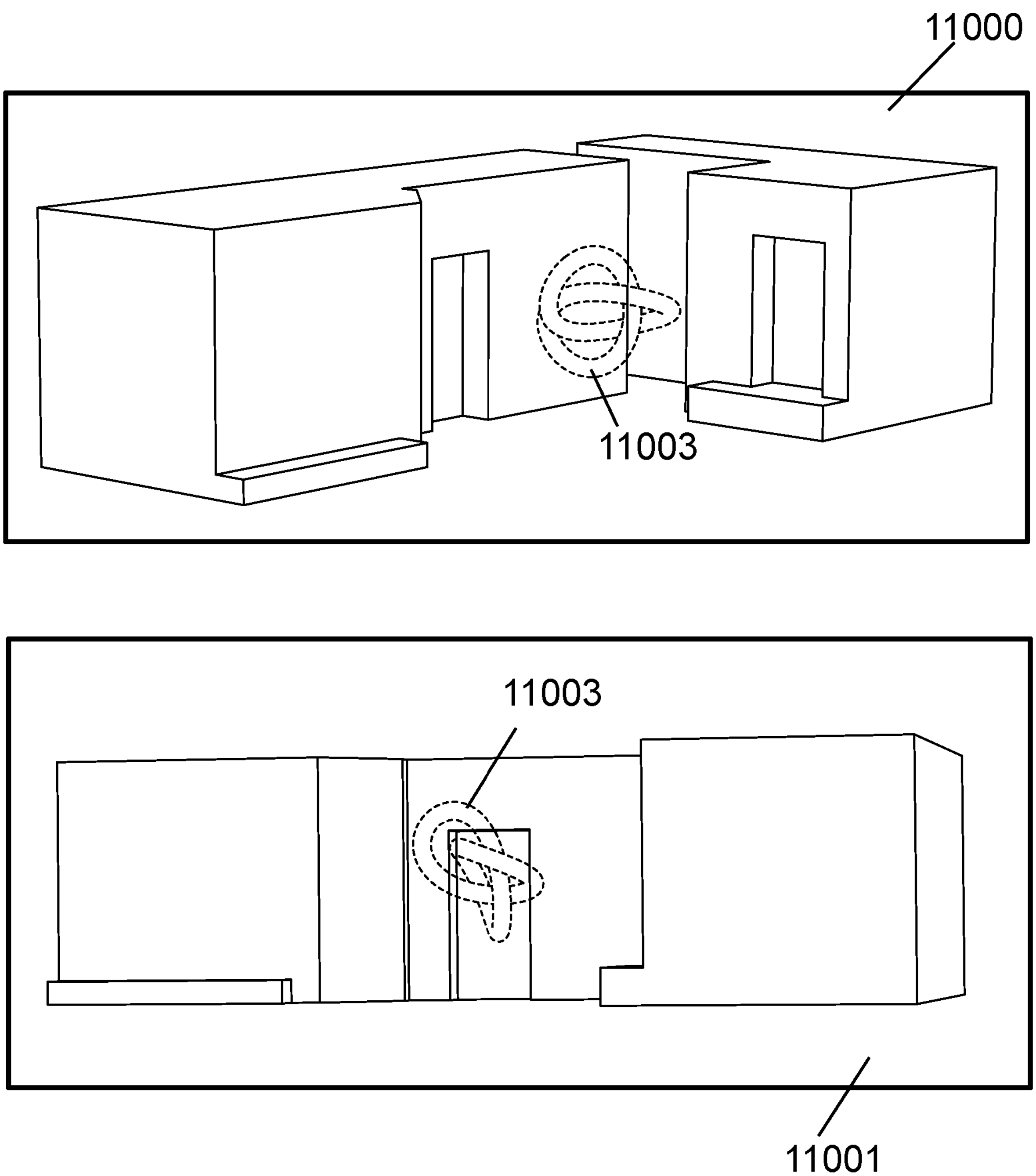

FIGS. 267A-267C illustrate another example of AR and SLAM integration. FIG. 267A illustrates a camera view of a first user 11000 and a camera view of a second user 11001. In FIG. 267B, new information 11002 (dotted square) is added by the first user on a wall. The second user can see the added information from the point of view of the camera of the second user 11001. Since the system knows the actual location of the new information 11002 based on SLAM, the system can recognize if the new information 11002 is behind real structures and may mask the new information 11002 as needed. For example, in the camera view of the second user 11001, part of new information 11003 is hidden behind a wall, as such it is masked out. FIG. 267C illustrates a 3D addition 11003 (a torus knot) added by the second user. The first user can see the new addition 11003 in their own camera feed 11000 from the point of view of their camera.

Figure 268A:
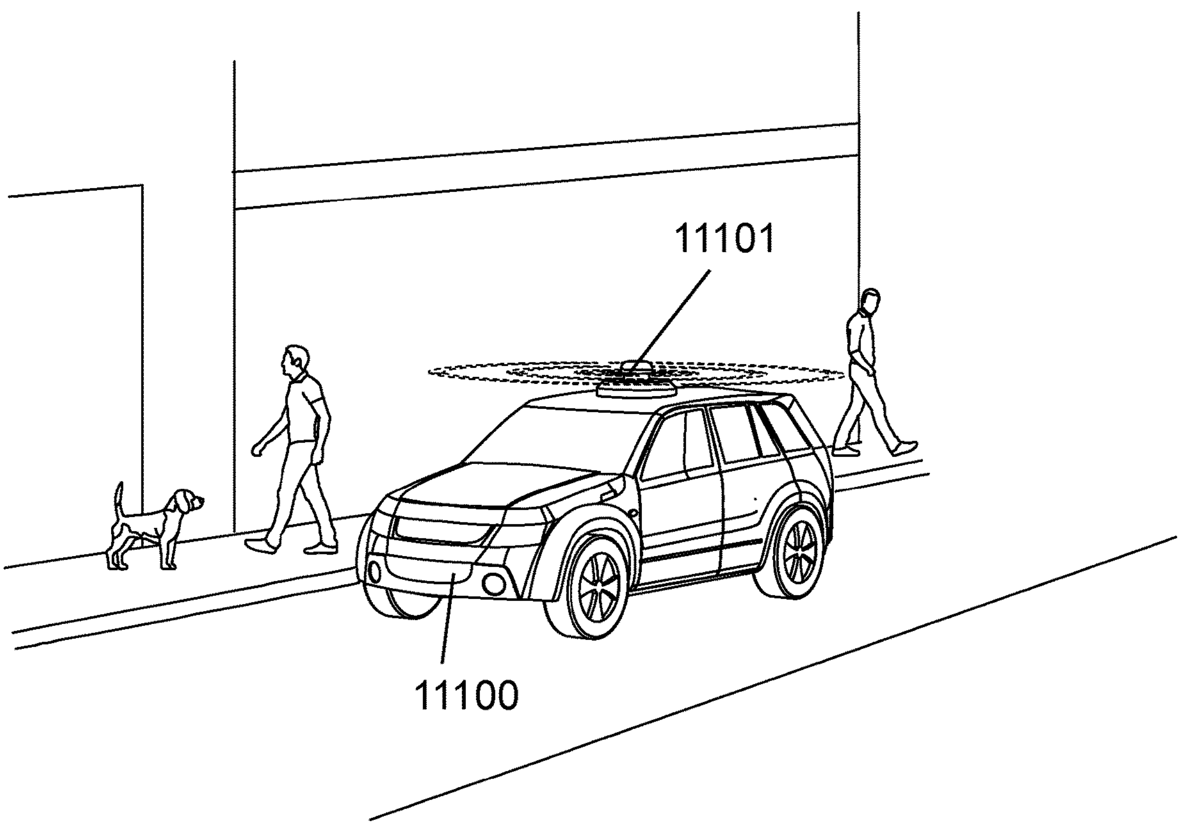
Figure 268B:
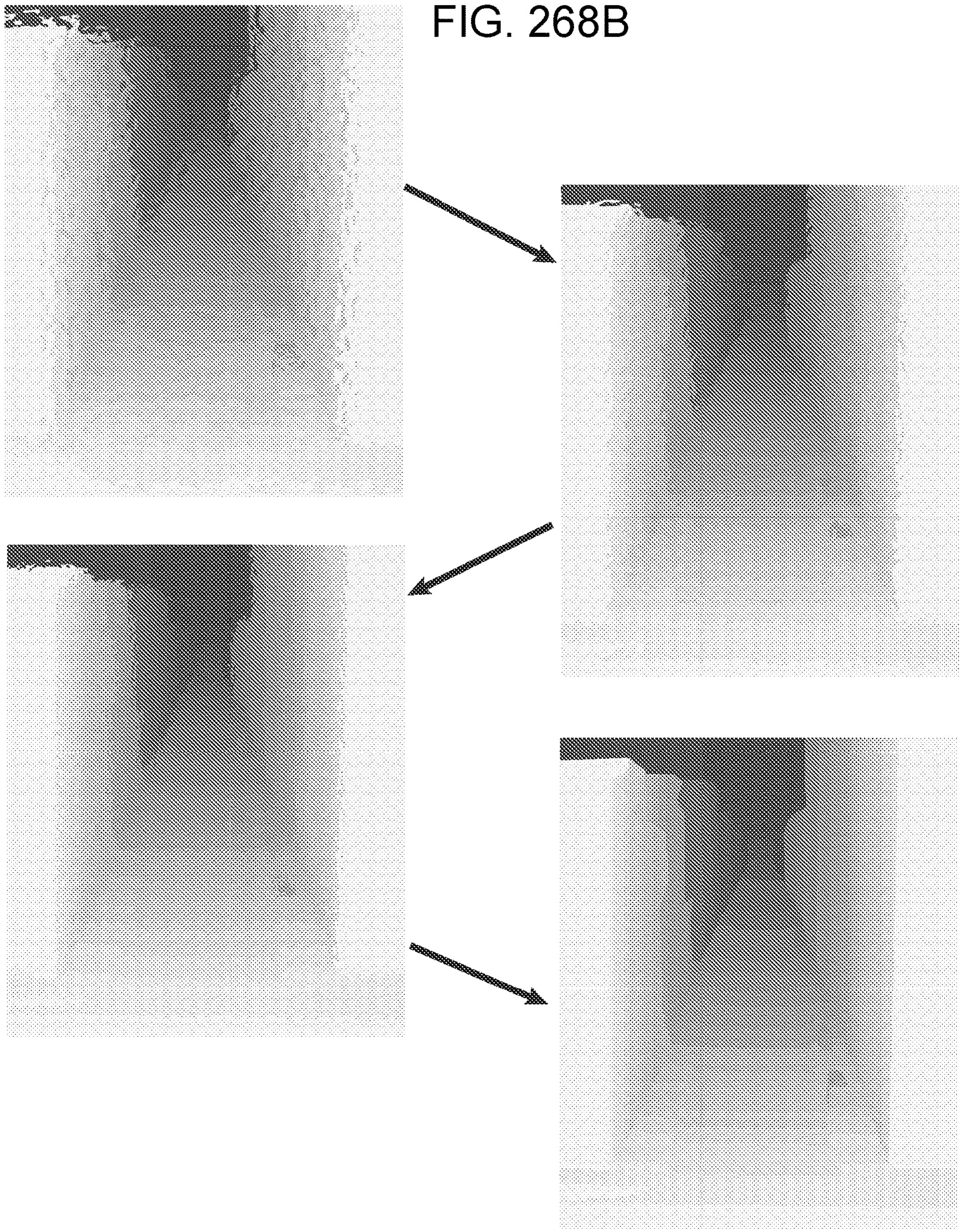
Figure 268C:
Figure 268D:
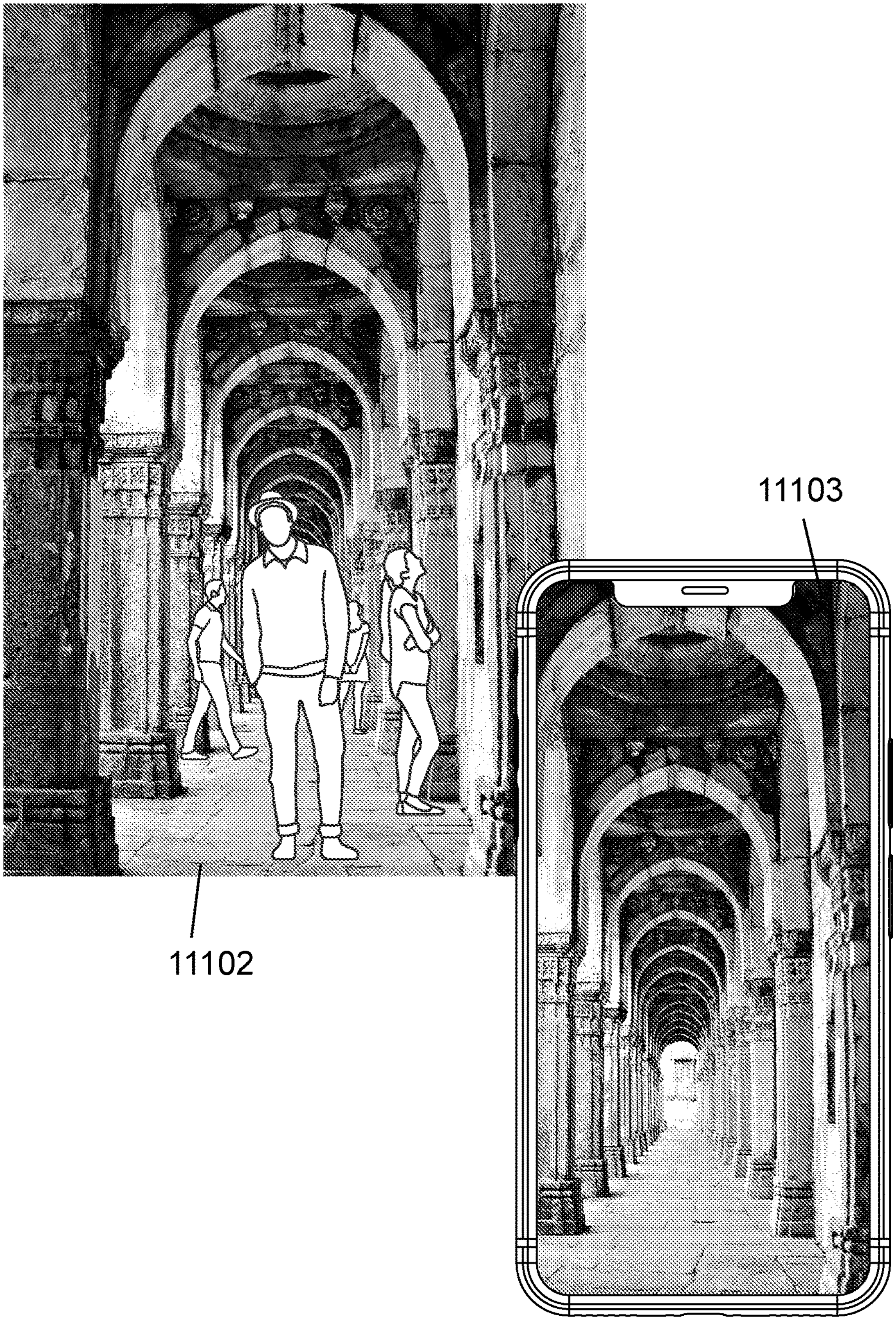
Figure 268E:
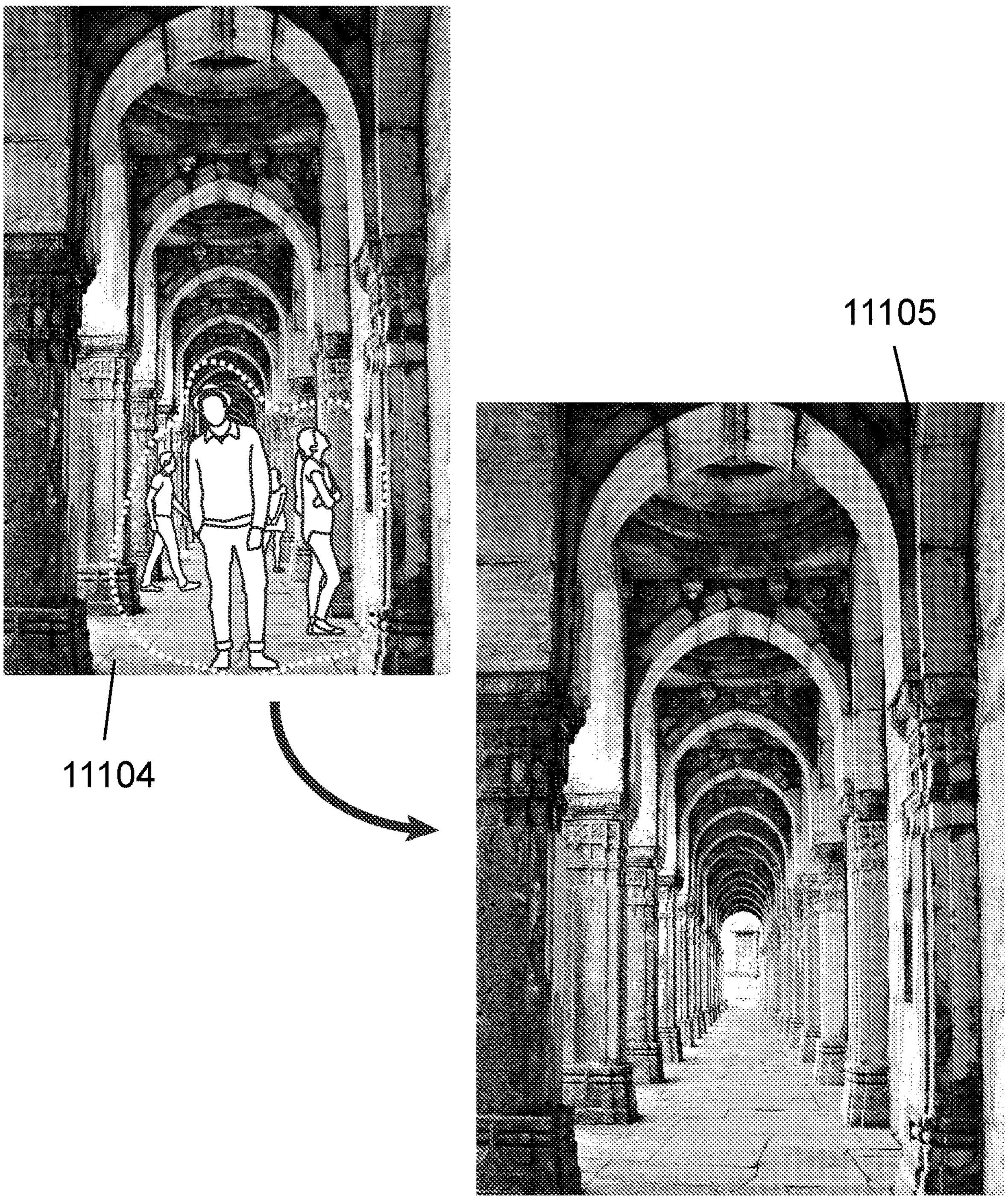
Figure 268F:
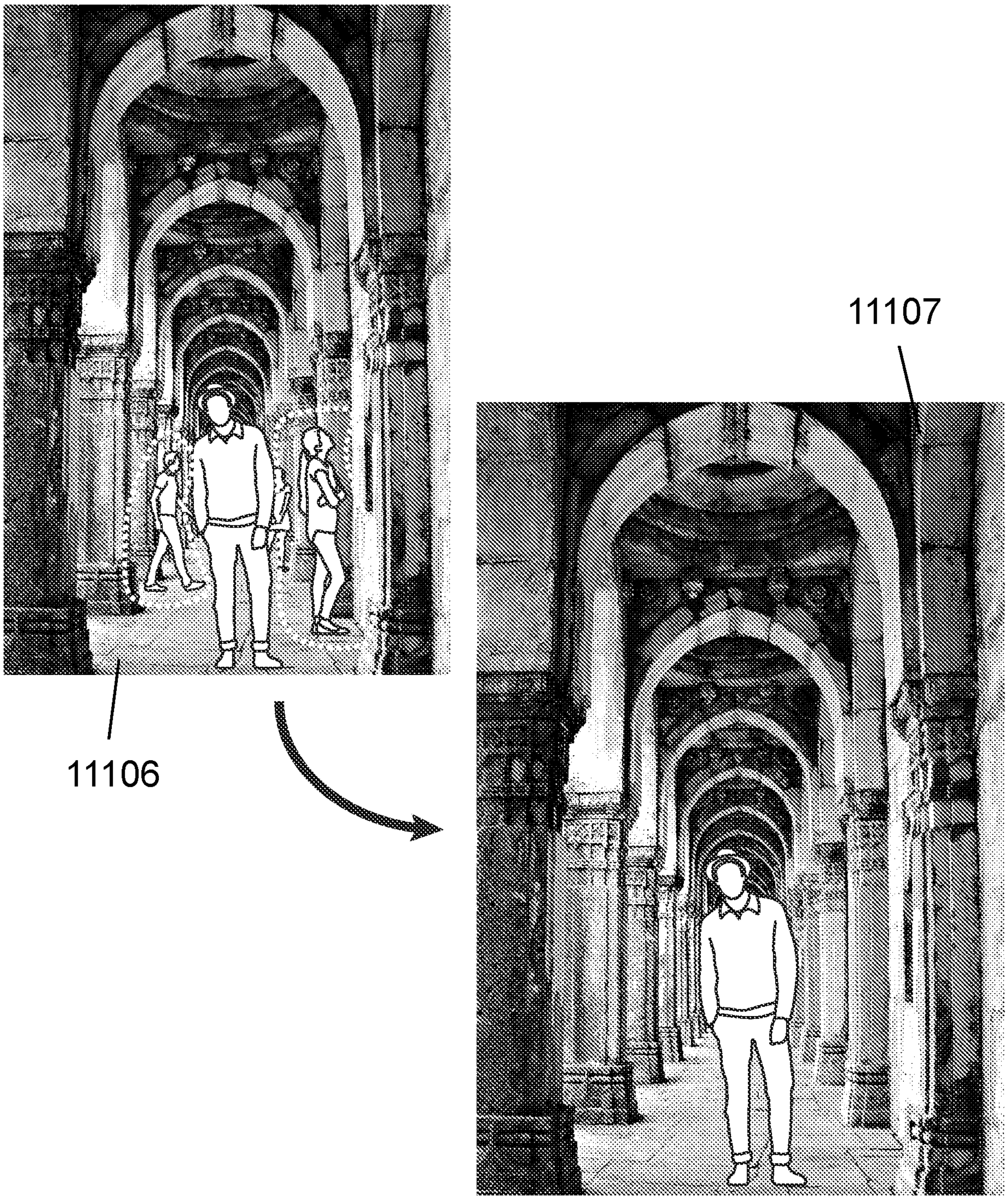
Figure 268G:
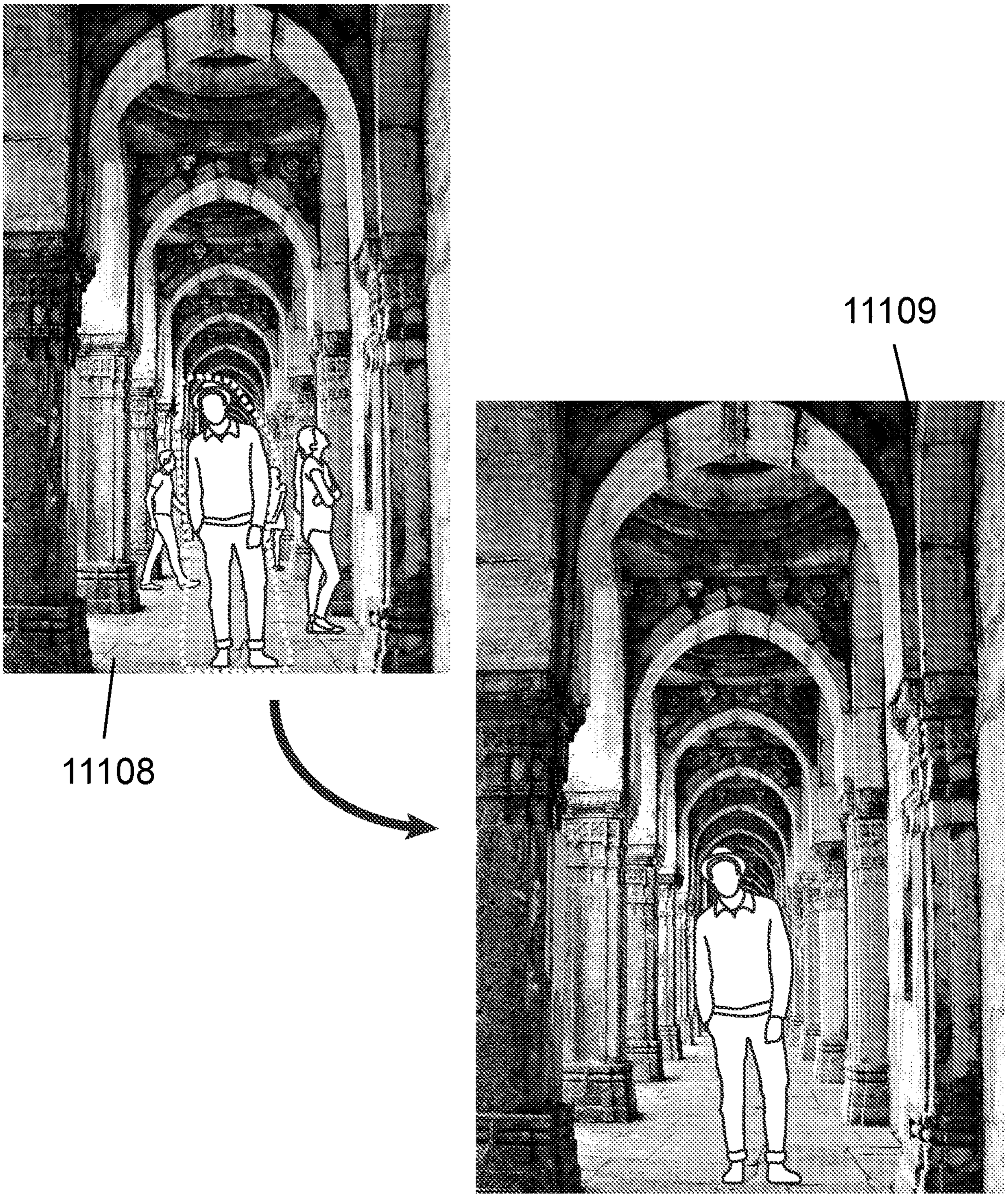
Figure 268H:
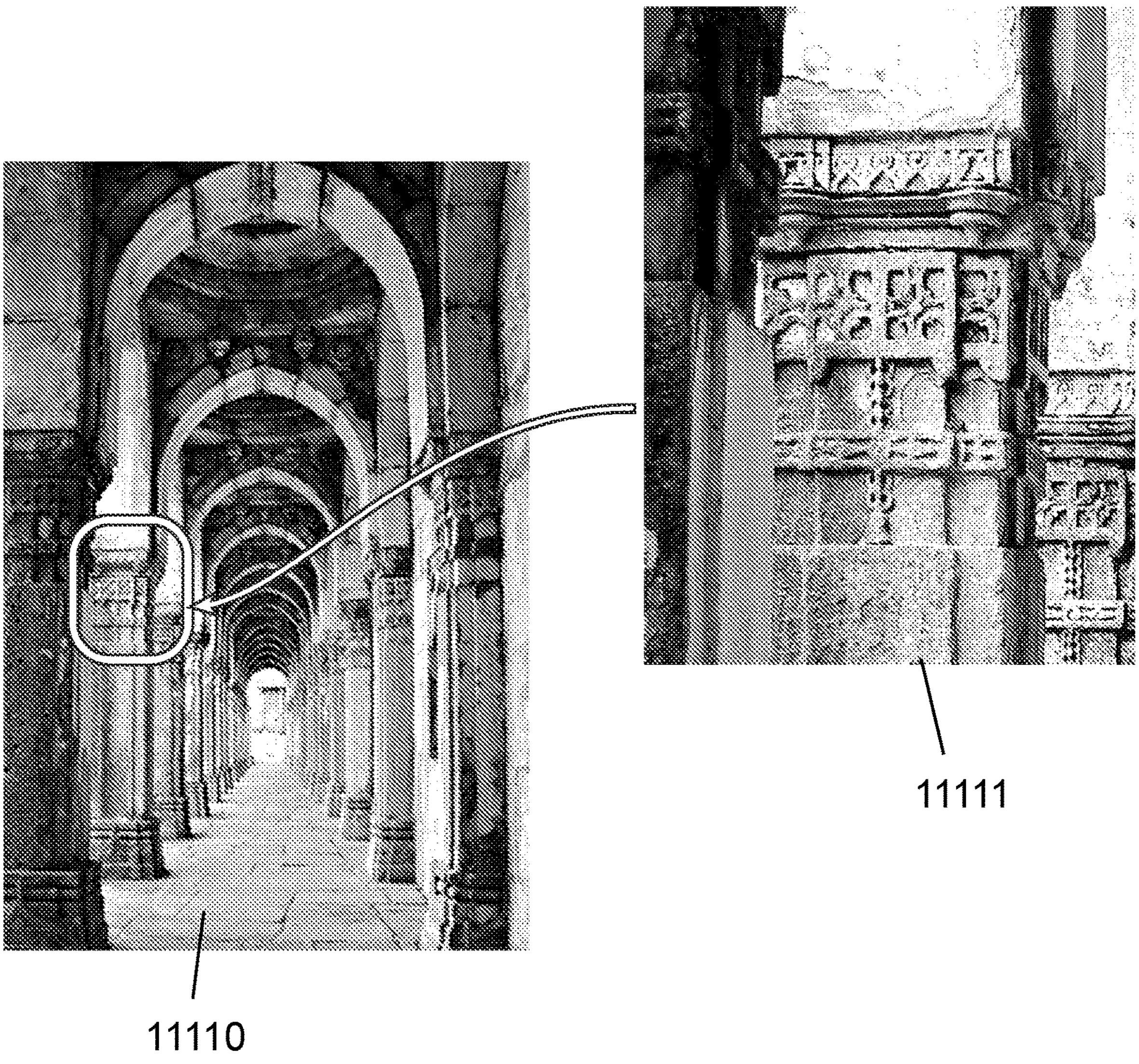
Figure 268I:

FIGS. 268A-268I illustrate other examples of SLAM and AR integration. FIG. 268A illustrates au autonomous vehicle 11100 with a scanning devices (e.g., 360 degrees LIDAR) 11101 scanning the environment. Each time the scanning device 11101 scans the same area accuracy of that area within the map increases. Overlapping scans may be collected during a same or separate work session and are not required to be collected continuously. For instance, FIG. 268B illustrates the progression of a depth map, beginning with the top left hand corner and following the arrows, after each scan, wherein the accuracy of the depth map increases with increased scans. This accurate map data may be used in AR and image processing. In some cases, scans of the same area may include temporary elements, such as people and cars. In some cases, the processor of the robot may differentiate between permanent and temporary elements of the environment (e.g., based on overlapping sensor data of the same area collected). For instance, FIG. 268C illustrates the same street captured by a scanning device at different times. Variation in lighting conditions, moving objects, and the position of the scanning device may help gather more data and separate permanent elements of the environment from temporary ones. When am area is scanned at different times, major differences in the map may be determined by comparing the results of the scans collected at different times. Based on the comparison, temporary elements (e.g., people and cars) of the environment may be identified and removed from the map. For instance, a picture of the environment may be cleaned up by removing unwanted elements, such as tourists captured in an image of a tourist site. In some cases, removal of unwanted elements may be executed in real time or afterwards by a processor. In some embodiments, the processor may automatically remove unwanted elements from an image or video or a user may be involved in the process. For instance, a user may define areas in an image containing unwanted elements and the processor may only focus on removing elements from those areas. This is useful for accuracy and gives the user more control over the process. For example, a user may want to remove all people except their friends from an image. FIGS. 269D-268G illustrate an example of object removal from an image. In FIG. 268D, processor removes people from the camera view in real time based on comparison between map data and the camera view frame, resulting in camera view 11102. Although the actual space 11103 is filled with people, the camera view frame 11102 removes the people in real time and the area can be seen without any persons in the actual space 11103. In FIG. 268E, the processor removes people (those within the dotted white lines) from the image 11104 after the image is captured, resulting in image 11105. While this type of processing may already exist, the image processing is limited to data contained within the image, however, in this case, access to location data and 3D map data of the actual environment within which the image was captured allows the processor to reconstruct the image based on real environment information. In FIG. 268F, a user selects objects to remove from the image 11106 (those within the white dotted lines), resulting in image 11107. In FIG. 268G, a user selects objects to keep in the image 11108 (those within the white dotted lines), resulting in image 11109. In some embodiments, the processor may adjust the resolution of image data. In some embodiments, up scaling and noise reduction may possible using SLAM data. For example, the processor may use images with better resolution to reconstruct and upscale a low resolution image based on the location and orientation from which the images were captured. Using such data, higher resolution images may be projected on the 3D map of environment to build higher resolution texture and then may be rendered from the main camera point of view. Images may be captured at the same time or different times and by the same user or different users. The process describes may be executed using any images regardless of user or time so long as the location and orientation of the images are known in relation to the 3D map of environment. FIGS. 268H and 269I illustrate an example of upscaling a low resolution image 11110 from a high resolution image 11111. Based on data from the map, the processor may locate the position of the camera and its field of view when images 11110 and 11111 were captured. The processor may also find similar images with equal or higher resolution of elements in the image 11110. Using these images, the location and orientation from which the images were captured in relation to the 3D map of the environment, and the location of elements within the images, the processor may construct a higher resolution of the elements in image 11110 to obtain a higher resolution image 11112 in FIG. 268H. This method may be applied to the entire image or on selected areas. This same process may be used for noise reduction. Given the location and orientation from which images were captured in relation to the 3D map of the environment and the location of elements within the images, the processor may differentiate texture from noise data and construct a less noisy and sharper image. This may be especially useful for night and low light photography.

Figure 269A:
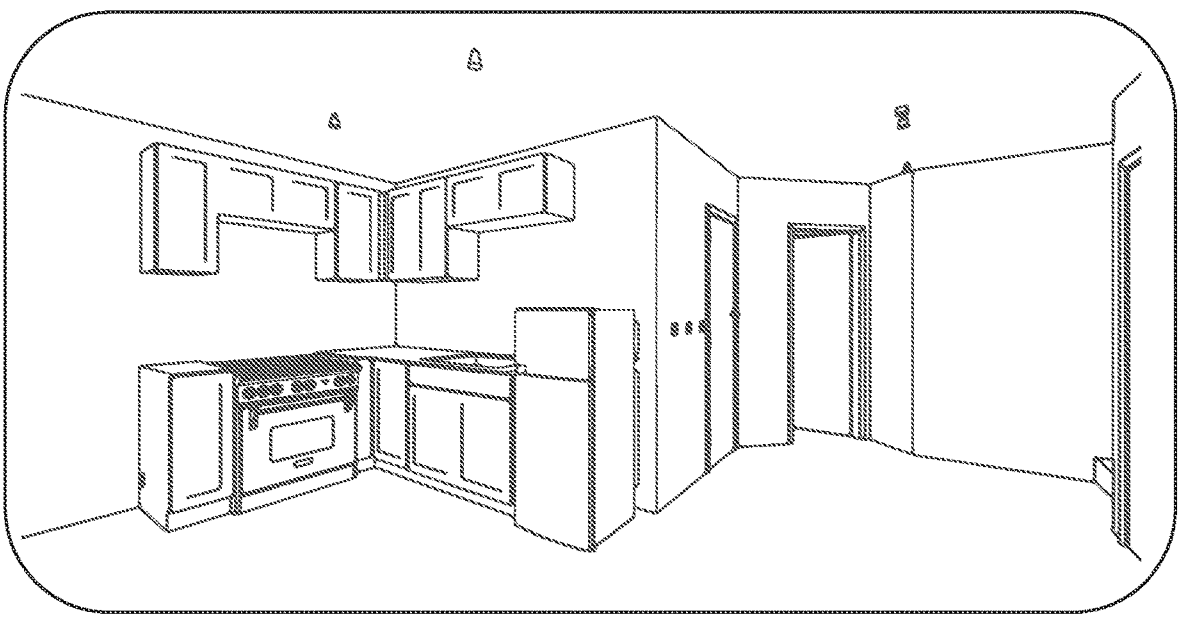
Figure 269B:
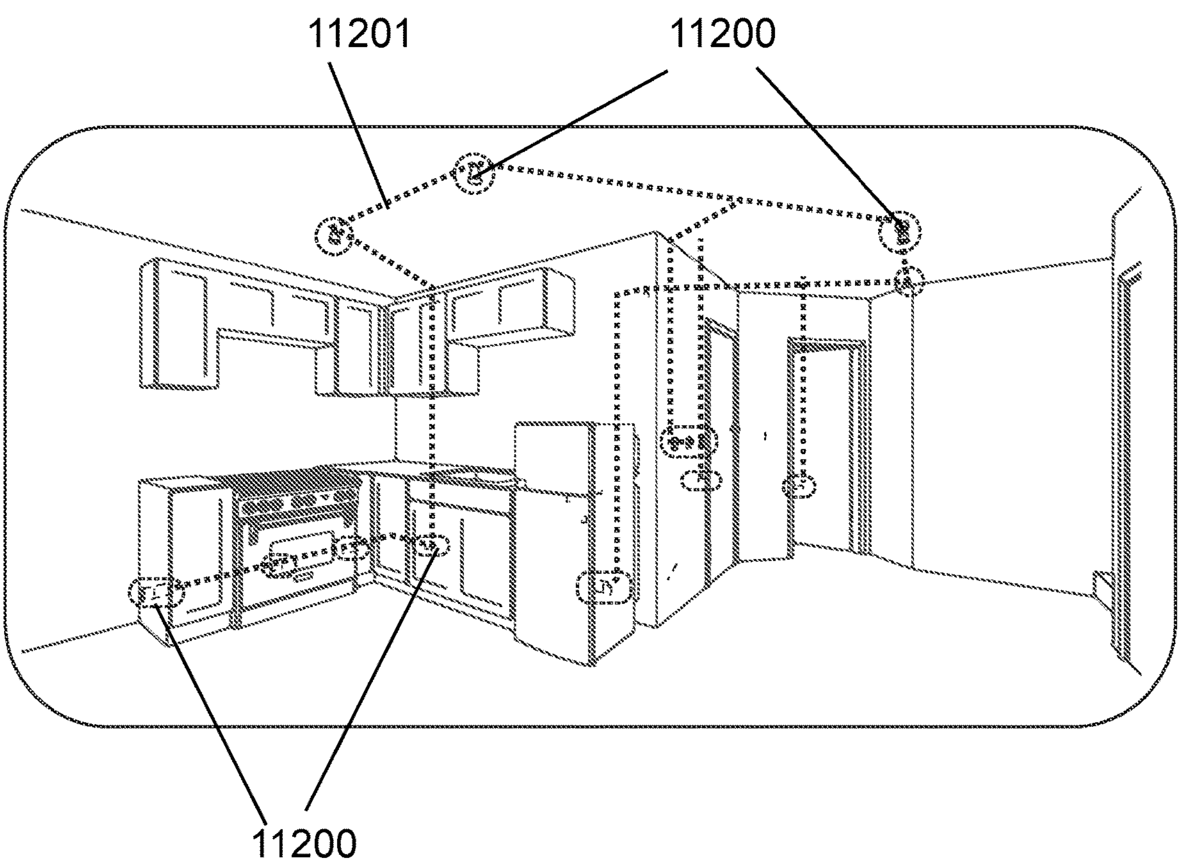
Figure 269C:
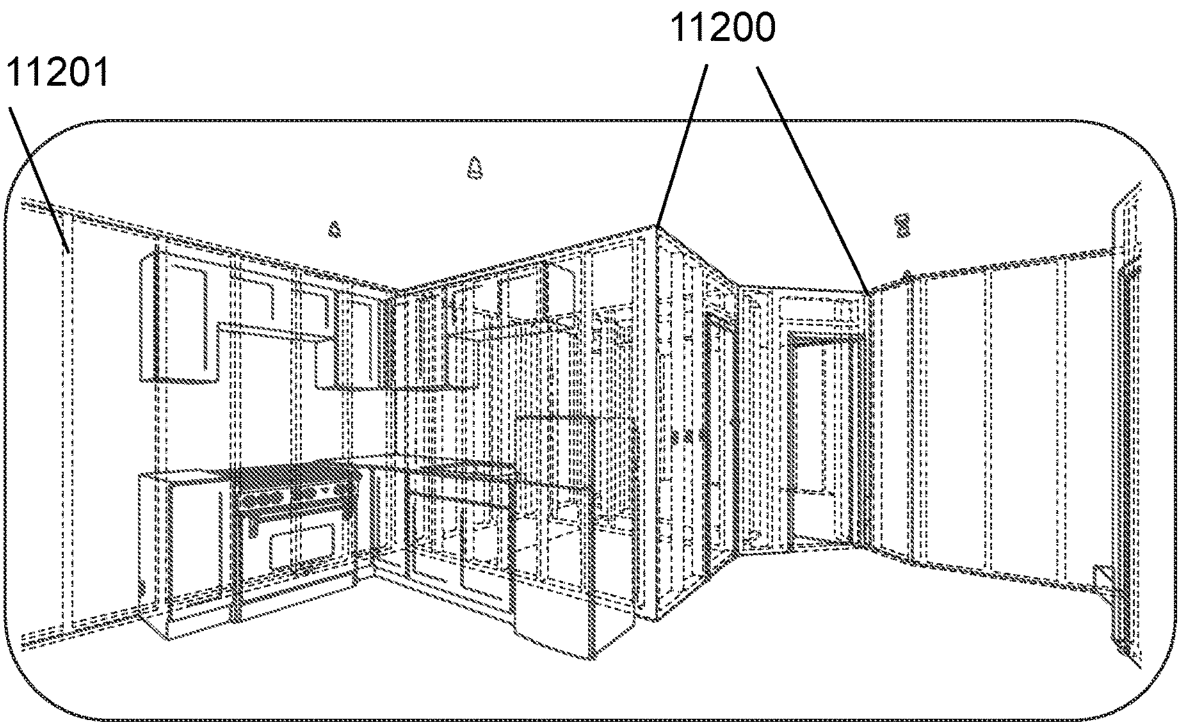
Figure 269D:
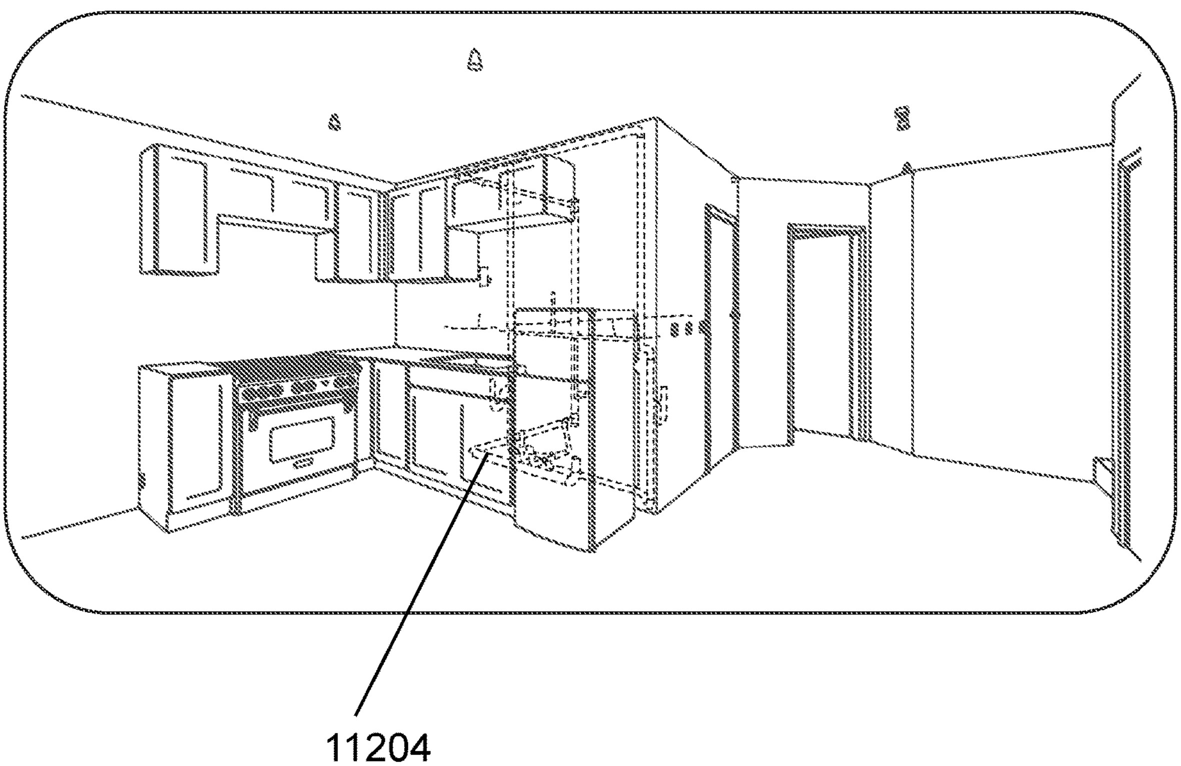
Figure 269E:
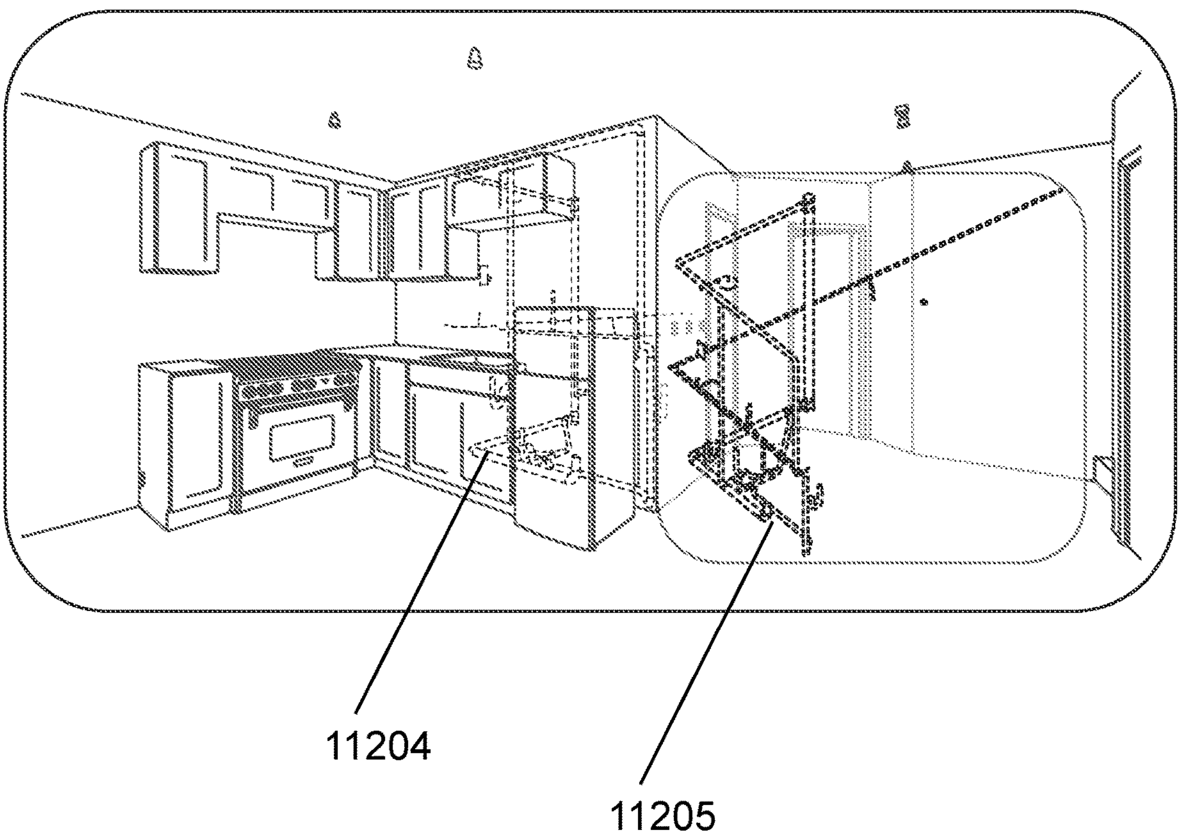
Figure 269F:
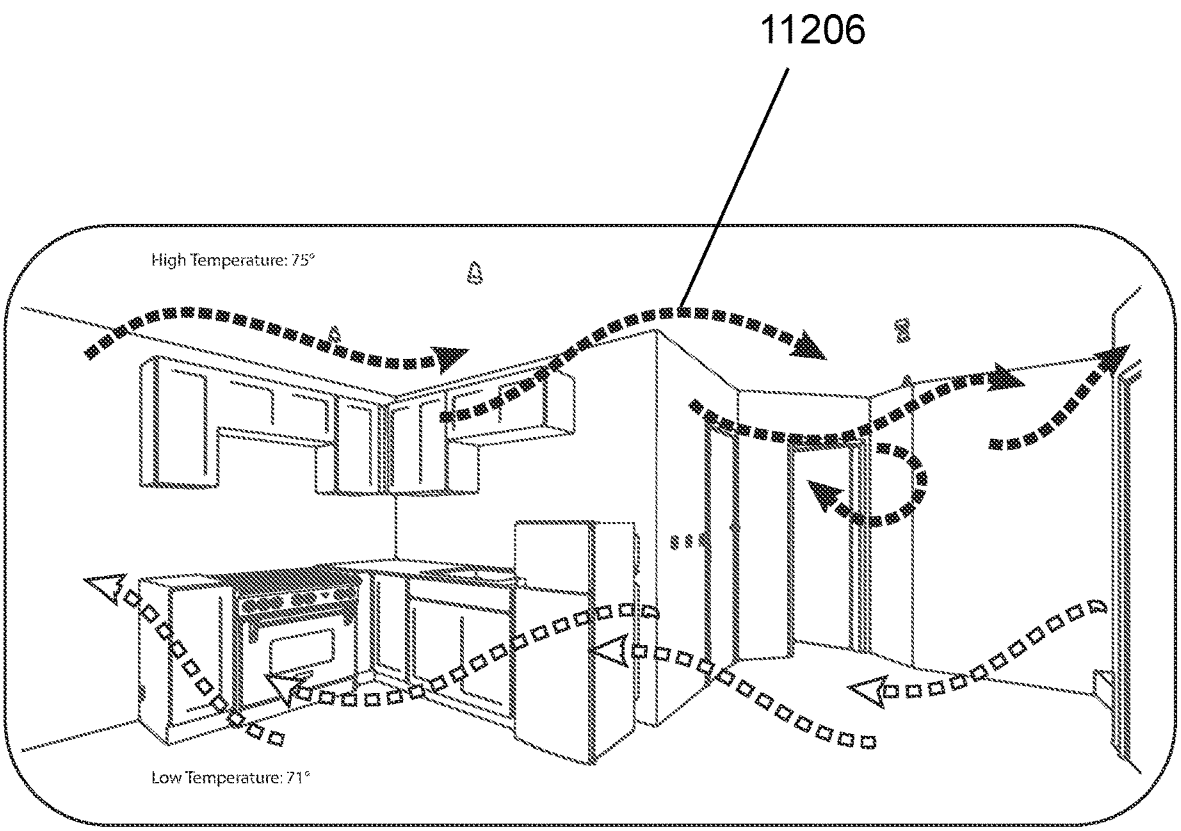
Figure 269G:
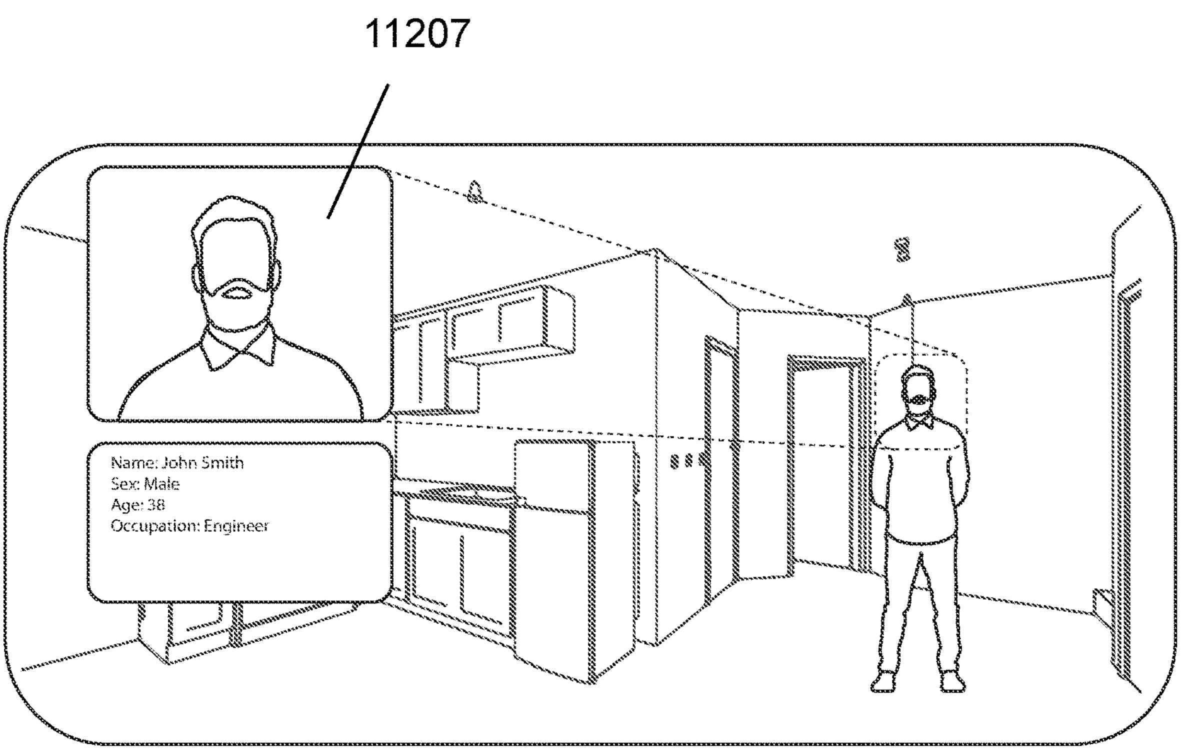
Figure 269H:
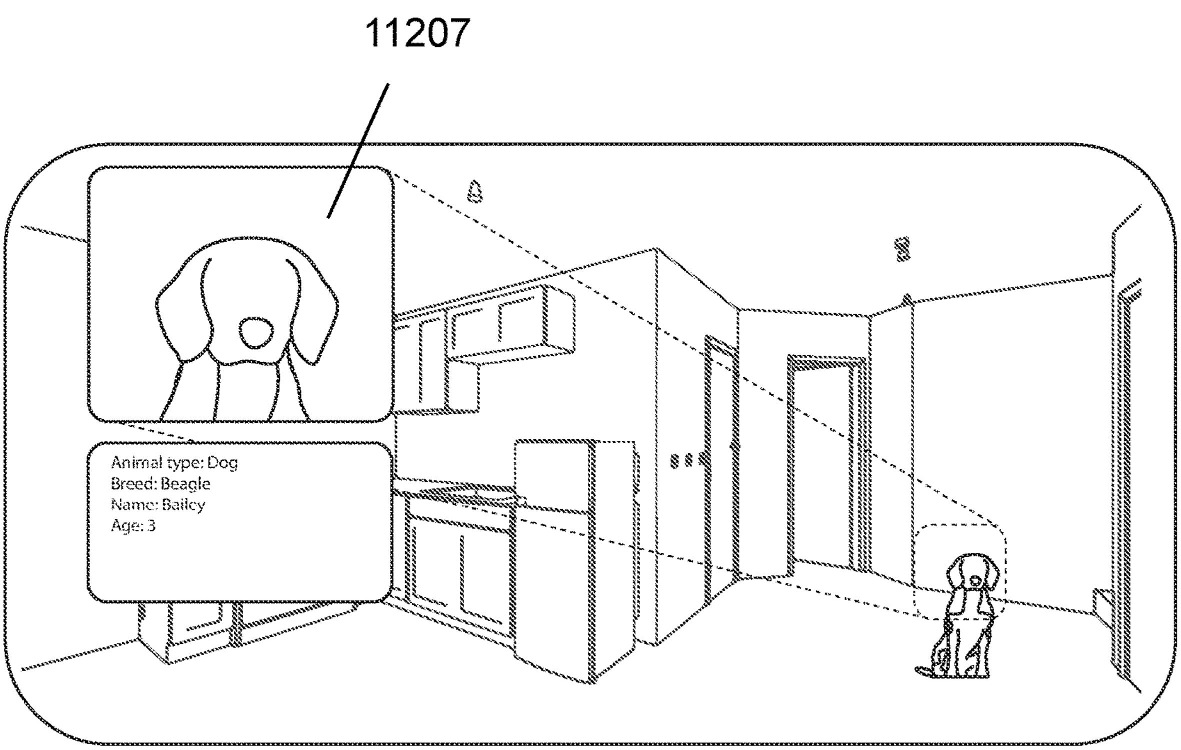
Figure 269I:
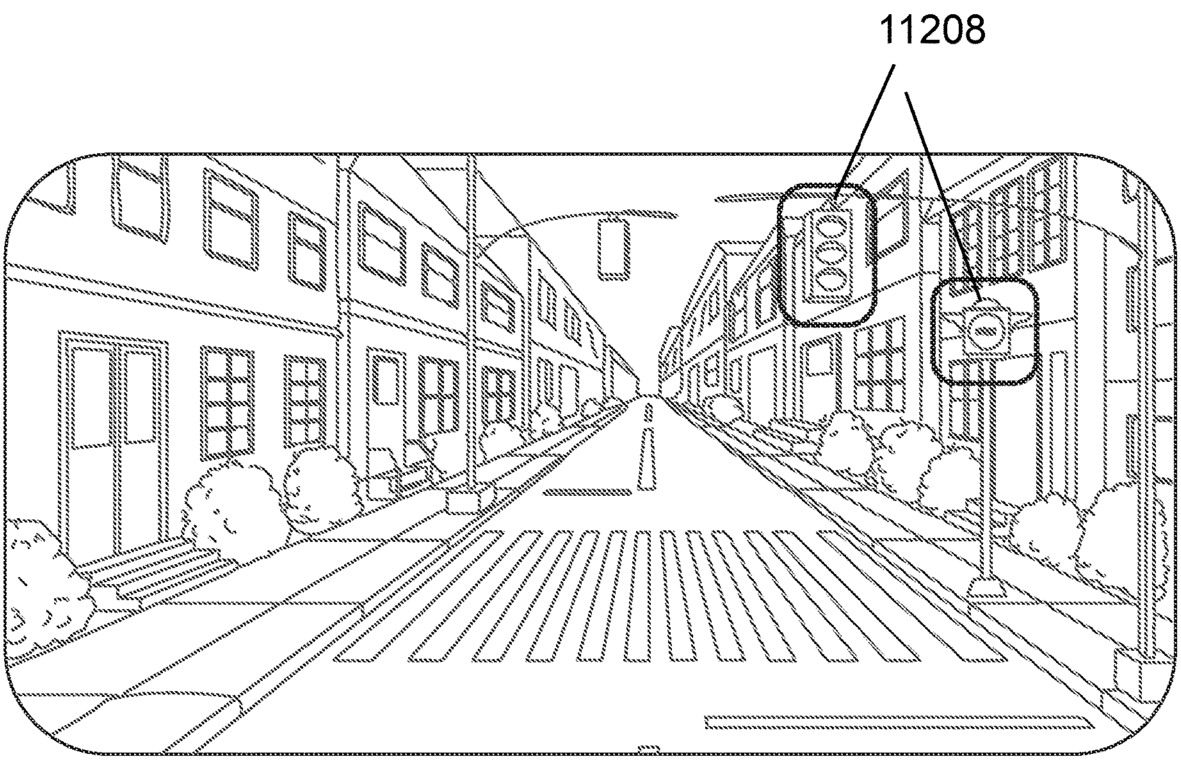

FIGS. 269A-269I illustrate another example of SLAM and AR integration. FIG. 269A illustrates a view of a SLAM based headset or the view of the robot without any added augmented elements. Based on SLAM data and/or map and other data sets, a processor may overlay various equipment and facilities related to the environment based on points of interest. For instance, FIG. 269B illustrates the identification of electrical sockets and lighting 11200 and the overlay of an electrical model of the building 11201 on the view of the headset based on the identified electrical sockets and lighting 11200. FIG. 269C illustrates the identification of wall corners 11202 and the overlay of a 3D model of wall studs 11203 on the view of the headset based on the identified wall corners and other data (e.g., RADAR sensor data). FIG. 269D illustrates the overlay of a 3D model of pipes 11204 on the view of the headset based on elements such as a faucet identified. FIG. 269E illustrates the overlay of pipes 11204 viewed independently 11205 from the its integration with the rest of the view of the headset. FIG. 269F illustrates the overlay of air flow 11206 and high and low temperatures on the view of the headset based on data from sensors that monitor temperature and air flow and circulation. FIGS. 269G and 269H illustrate overlay of information 11207 related to a user or pet on the view of the headset based on facial recognition data. FIG. 269I illustrates the identification of traffic lights and signs 11208 in the view of the headset. The robot may determine decision based on the identification of such points of interest.

Various different types of robots may use the methods and techniques described herein, such as the autonomous delivery robot described in U.S. Patent Non-Provisional patent application Ser. Nos. 16/179,855, 16/850,269, 16/751,115, 16/127,038, 16/230,805, 16/411,771, and 16/578,549, the entire contents of which are hereby incorporated by reference, and robots used in medical sectors, food sectors, retail sectors, financial sectors, security trading, banking, business intelligence, marketing, medical care, environment security, mining, energy sectors, transportation sectors, etc. In embodiments, the robot may perform or provide various different services (e.g., shopping, public area guide such as in an airport and mall, delivery, medical services, etc.). In some embodiments, the robot may be configured to perform certain functions by adding software applications to the robot as needed (e.g., similar to installing an application on a smart phone or a software application on a computer when a particular function, such as word processing or online banking, is needed). In some embodiments, the user may directly install and apply the new software on the robot. In some embodiments, software applications may be available for purchase through online means, such as through online application stores or on a website. In some embodiments, the installation process and payment (if needed) may be executed using an application (e.g., mobile application, web application, downloadable software, etc.) of a communication device (e.g., smartphone, tablet, wearable smart devices, laptop, etc.) paired with the robot. For instance, a user may choose an additional feature for the robot and may install software (or otherwise program code) that enables the robot to perform or possess the additional feature using the application of the communication device. In some embodiments, the application of the communication device may contact the server where the additional software is stored and allows that server to authenticate the user and check if a payment has been made (if required). Then, the software may be downloaded directly from the server to the robot and the robot may acknowledge the receipt of new software by generating a noise (e.g., a ping or beeping noise), a visual indicator (e.g., LED light or displaying a visual on a screen), transmitting a message to the application of the communication device, etc. In some embodiments, the application of the communication device may display an amount of progress and completion of the install of the software. In some embodiments, the application of the communication device may be used to uninstall software associated with certain features.

In one example, the robot may be a medical care robot. In some embodiments, the medical care robot may include one or more receptacles for dispensing items, such as needles, syringes, medication, testing swabs, tubing, saline bags, blood vials, etc. In some embodiments, the medical care robot may include one or more slots for disposing items, such as used needles and syringes. In some embodiments, the medical care robot may include one or more reservoirs for storing intravenous (IV) fluid, saline fluid, etc. In some embodiments, the medical care robot may include one or more slots for accepting items that require further processing, such as blood vials, testing swabs, urine samples, etc. In some embodiments, the medical care robot may administer medical care to a patient, such as medication administration, drawing blood samples, providing IV fluid or saline, etc. In some embodiments, the medical care robot may execute testing on a sample (e.g., blood sample, urine sample, or swab) on the spot or at a later time. In some embodiments, the medical care robot may include a printer for issuing a slip that includes information related to the medical care provided, such as patient information, the services provided to the patient, testing results, future follow-up appointment information, etc. In some embodiments, the medical care robot may include a payment terminal which a patient may use to pay for the medical care services they were provided. In some embodiments, the patient may pay for their services using an application of a communication device (e.g., mobile phone, tablet, laptop, etc.). In some embodiments, the medical care robot may include an interface (e.g., a touch screen) that may be used to input information, such as patient information, requested items, items provided to the medical care robot and following instructions for the items provided to the medical robot, etc. In some embodiments, the medical care robot may include media capabilities for telecommunication with hospital staff, such as nurses and doctors, or other persons (e.g., technical support staff). In some embodiments, the medical care robot may be remotely controlled using an application of a communication device. In some embodiments, patients may request medical care services or an appointment using an application of a communication device. In some embodiments, the medical care robot may provide services at a location specified by the patient, or in other embodiments, the patient may travel to a location of the medical care robot to receive medical care. In some embodiments, the medical care robot may provide instructions to the user for self-performing certain medical tests In some embodiments, the medical care robot may include disinfectant capabilities. In some embodiments, the medical care robot may disinfect an area occupied by a patient before and after medical care is given to the patient. For instance, the robot may disinfect surfaces in the are using, for example, UV light, disinfectant sprays and a scrubbing pad, steam cleaning, etc. In embodiments, UVC light, short wavelength UV light with a wavelength range of 200 nm to 280 nm, disinfects and kills microorganisms by destroying nucleic acids (which form DNA) and disrupting their DNA, consequently preventing vital cellular functions. The shorter wavelengths of UV light are strongly absorbed by nucleic acids. The absorbed energy may cause defects, such as pyrimidine dimers (e.g., molecular lesions formed from thymine bases in DNA), that can prevent replication or expression of necessary proteins, ultimately resulting in the death of the microorganism. In some cases, the medical care robot may include a mechanism for converting water into hydrogen peroxide disinfectant. In some embodiments, the process of water electrolysis may be used to generate the hydrogen peroxide. In some embodiments, the process of converting water to hydrogen peroxide may include water oxidation over an electrocatalyst in an electrolyte, resulting in hydrogen peroxide dissolved in the electrolyte. The hydrogen peroxide dissolved in electrolyte may be directly applied to the surface or may be further processed before applying it to the surface. In some embodiments, thin chemical films may be used to generate hydrogen from water splitting. For example, the methods (or a variation thereof) of generating hydrogen from water splitting using nanostructured ZnO may be used, as described by A. Wolcott, W. Smith, T. Kuykendall, Y. Zhao and J. Zhang "Photoelectrochemical Study of Nanostructured ZnO Thin Films for Hydrogen Generation from Water Splitting," in Advanced Functional Materials, vol. 19, no. 12, pp. 1849-1856, June 2009, the entire contents of which are hereby incorporated by reference. In embodiments, the medical care robot may dispense various different types of disinfectants separately or combined, such as detergents, soaps, water, alcohol based disinfectants, etc. In embodiments, the disinfectants may be dispensed as liquid, steam, aerosol, etc. In some embodiments, the dispensing speed may be adjusted autonomously or by an application of a communication device wirelessly paired with the medical care robot. In some embodiments, the medical care robot may use a motor to pump disinfectant liquid out of a reservoir of the robot storing the disinfectant. In embodiments, the reservoir may be filled autonomously at a service station (e.g., docking station) or manually by a user. In some embodiments, the medical care robot may drive at a reduced speed while disinfecting surfaces within the environment. For example, the robot may drive at half the normal driving speed while using UVC light to disinfect any of walls, floor, ceiling, and objects such as hospital beds, chairs, the surfaces of the robot itself, etc. In some embodiments, UV sterilizers may be positioned on any of a bottom, top, front, back, or side of the robot. In some embodiments, the medical care robot may include one or more receptacles configured with UV sterilizers. Smaller objects, such as surgical tools, syringes, needles, etc., may be positioned within the receptacles for sterilization. In some embodiments, the medical care robot may provide an indication to a user when sterilization is complete (e.g., visual indicator, audible indicator, etc.).

Figure 270A:
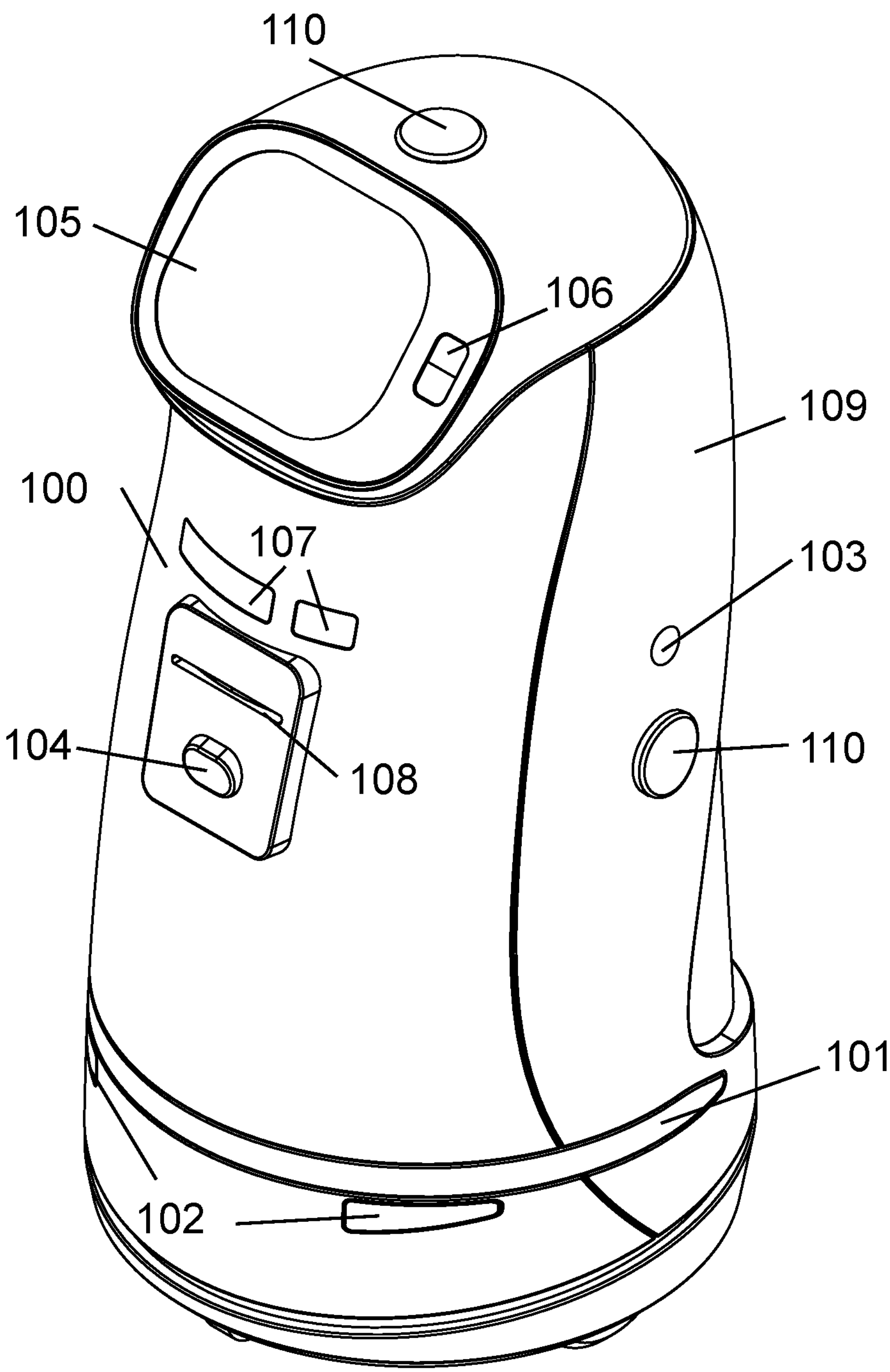
Figure 270B:
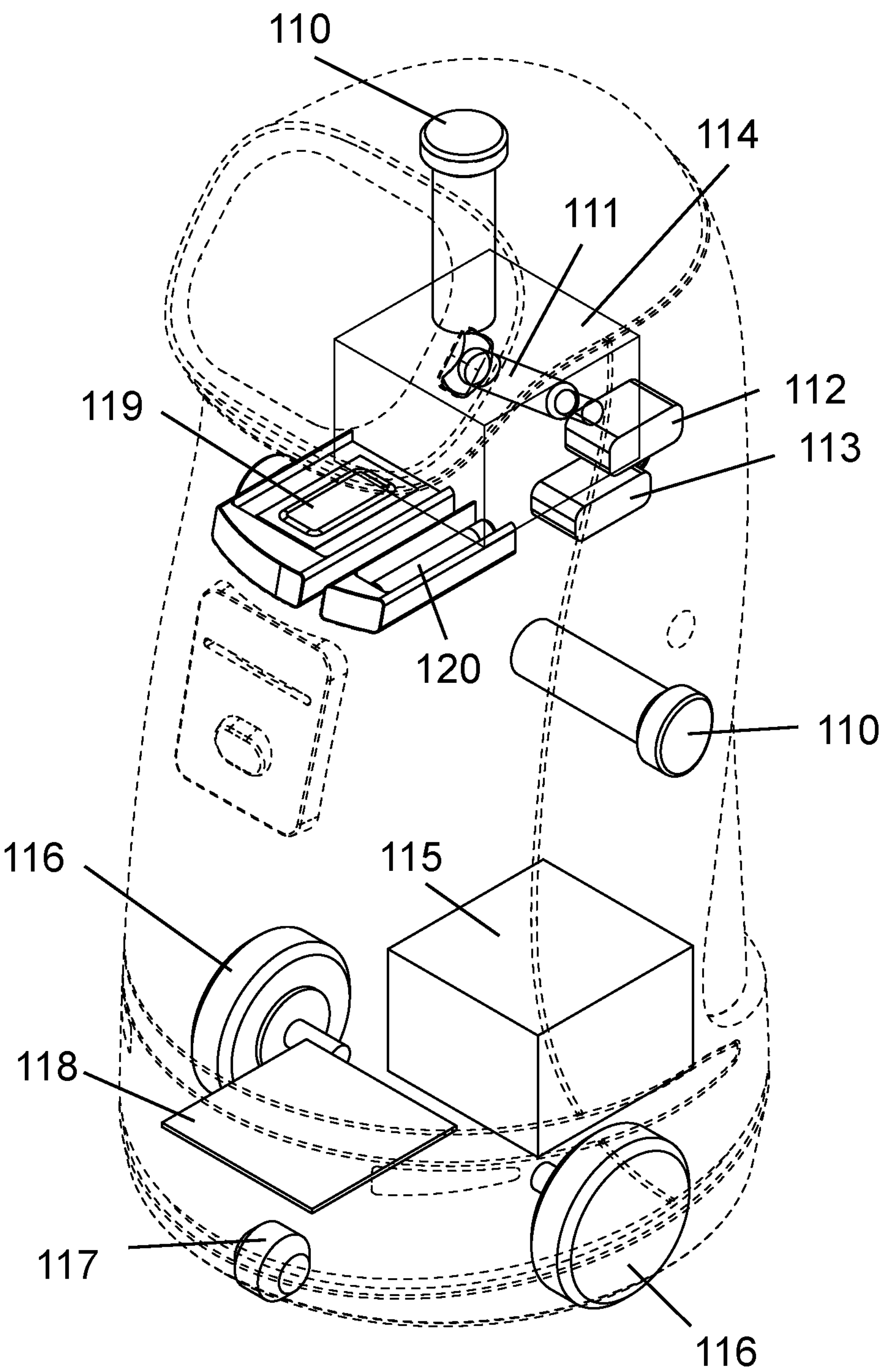
Figure 270C:
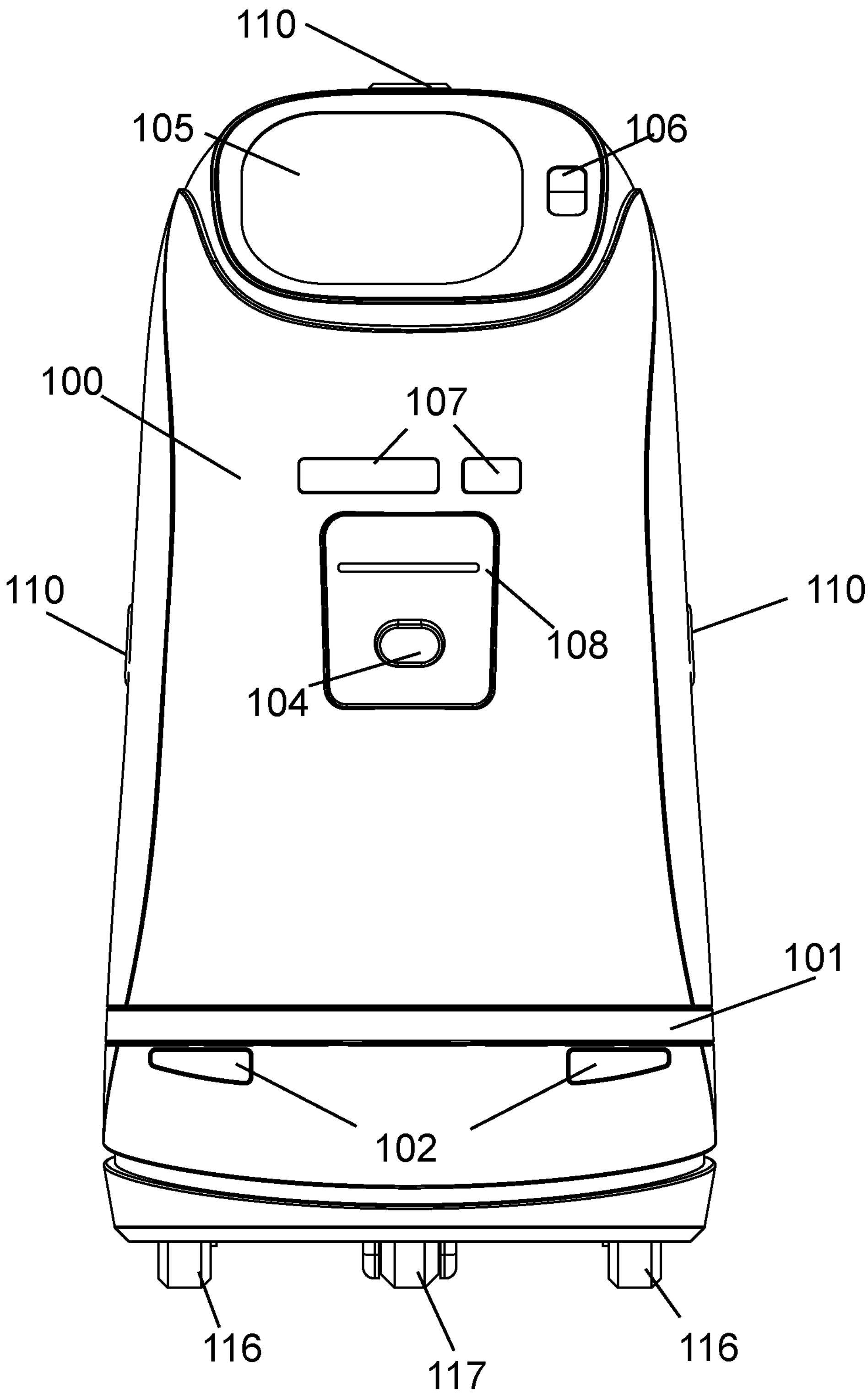
Figure 270D:
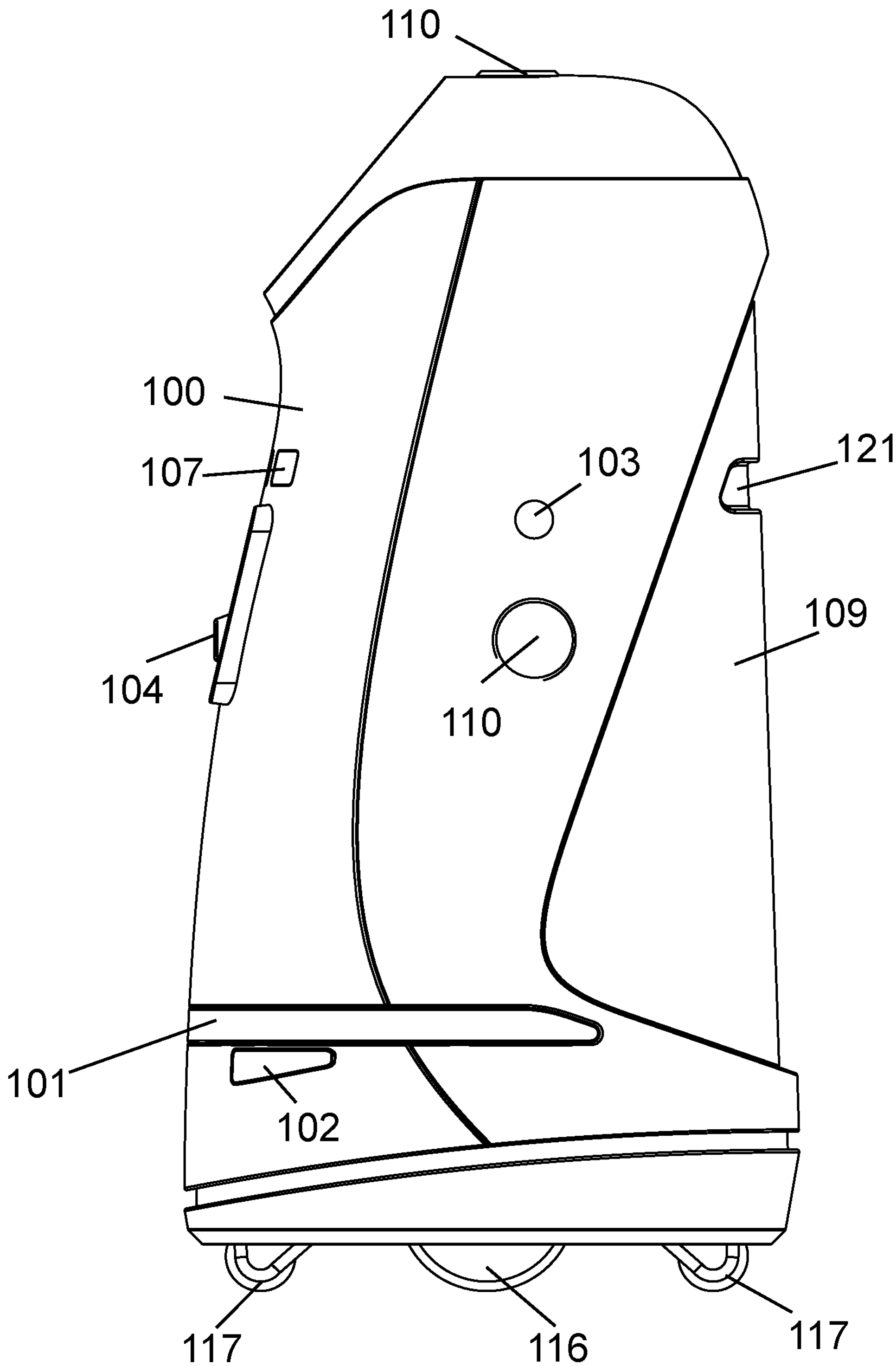
Figure 270E:
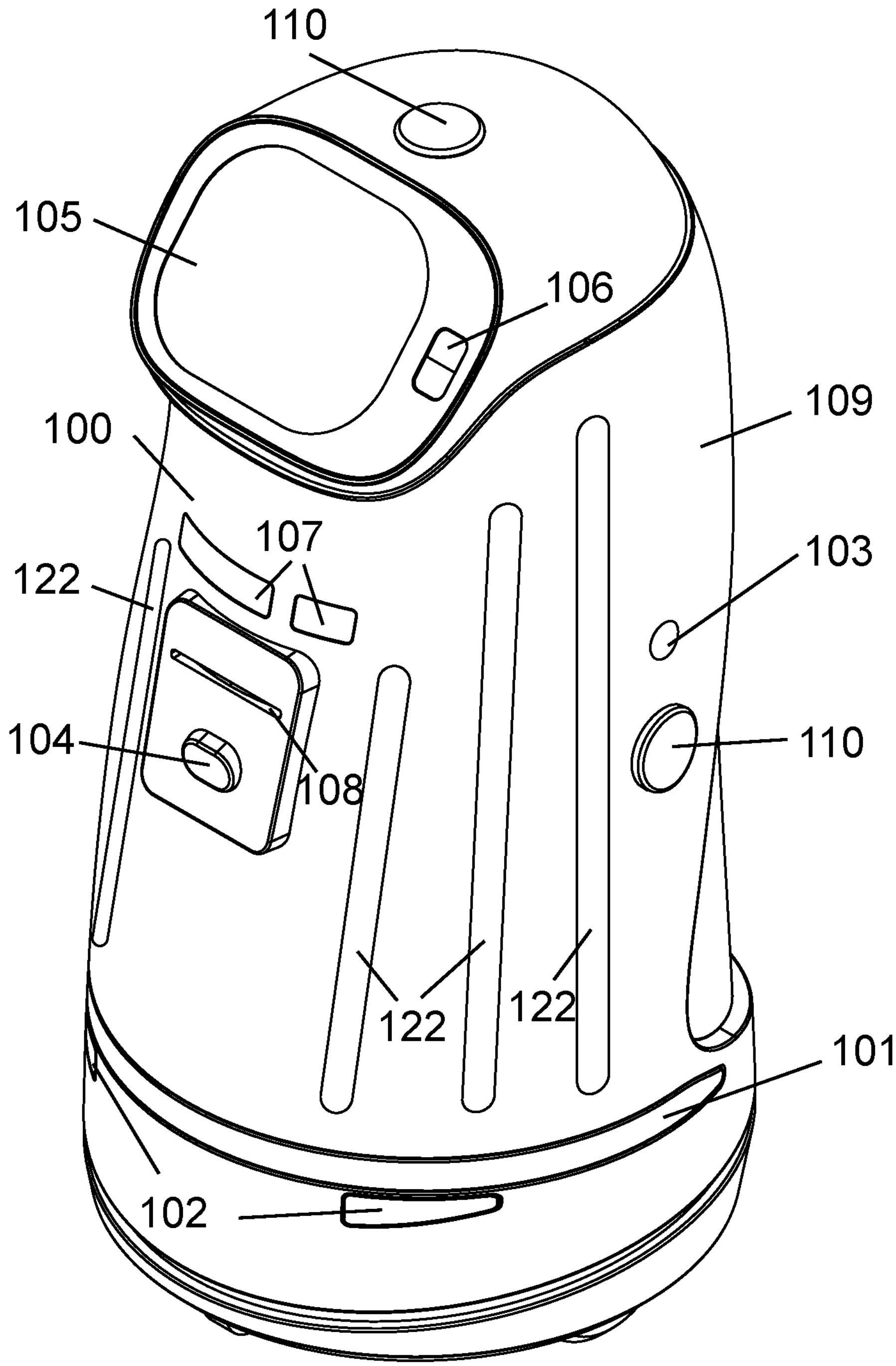
Figure 270F:
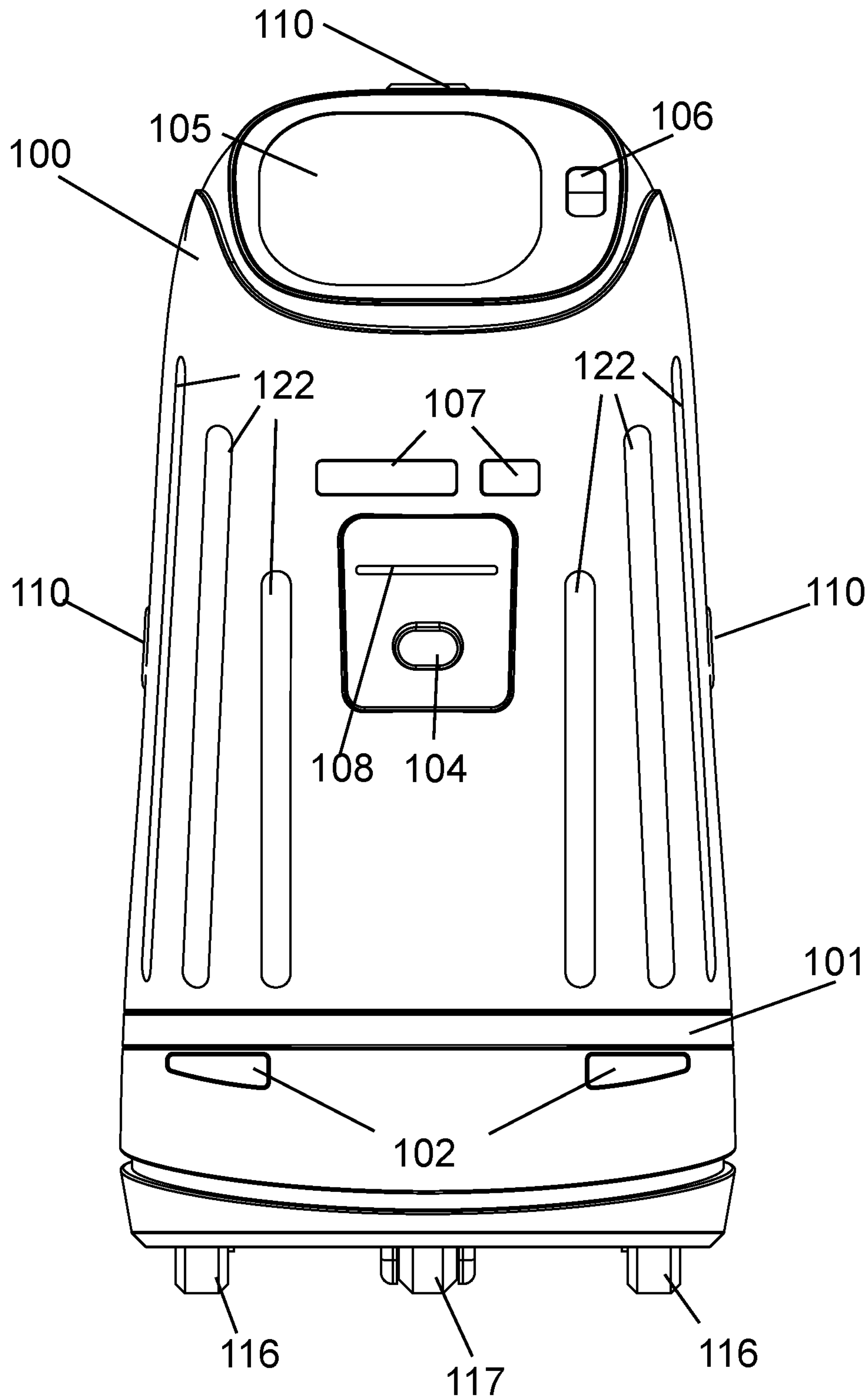
Figure 270G:
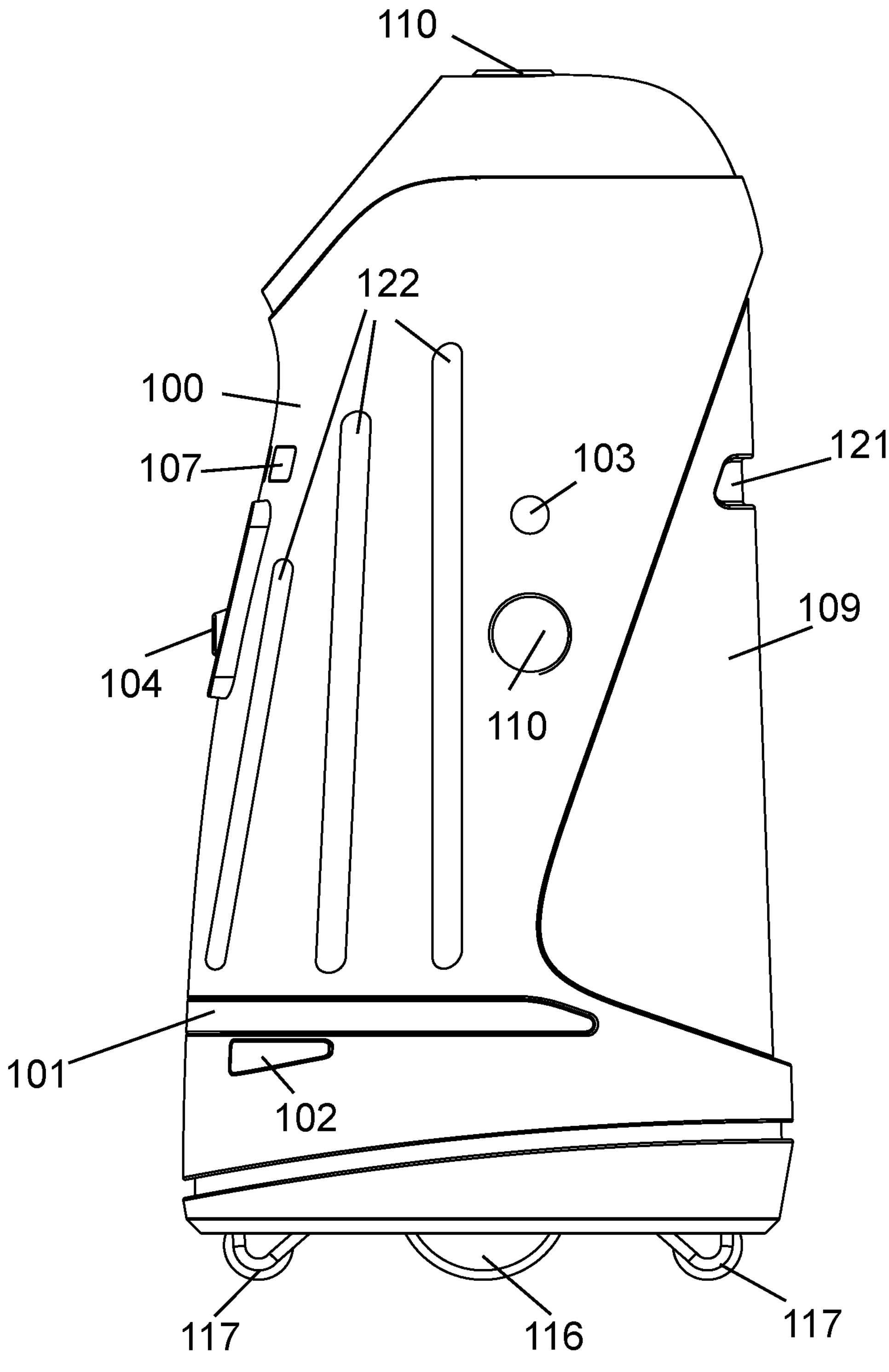
Figure 270H:
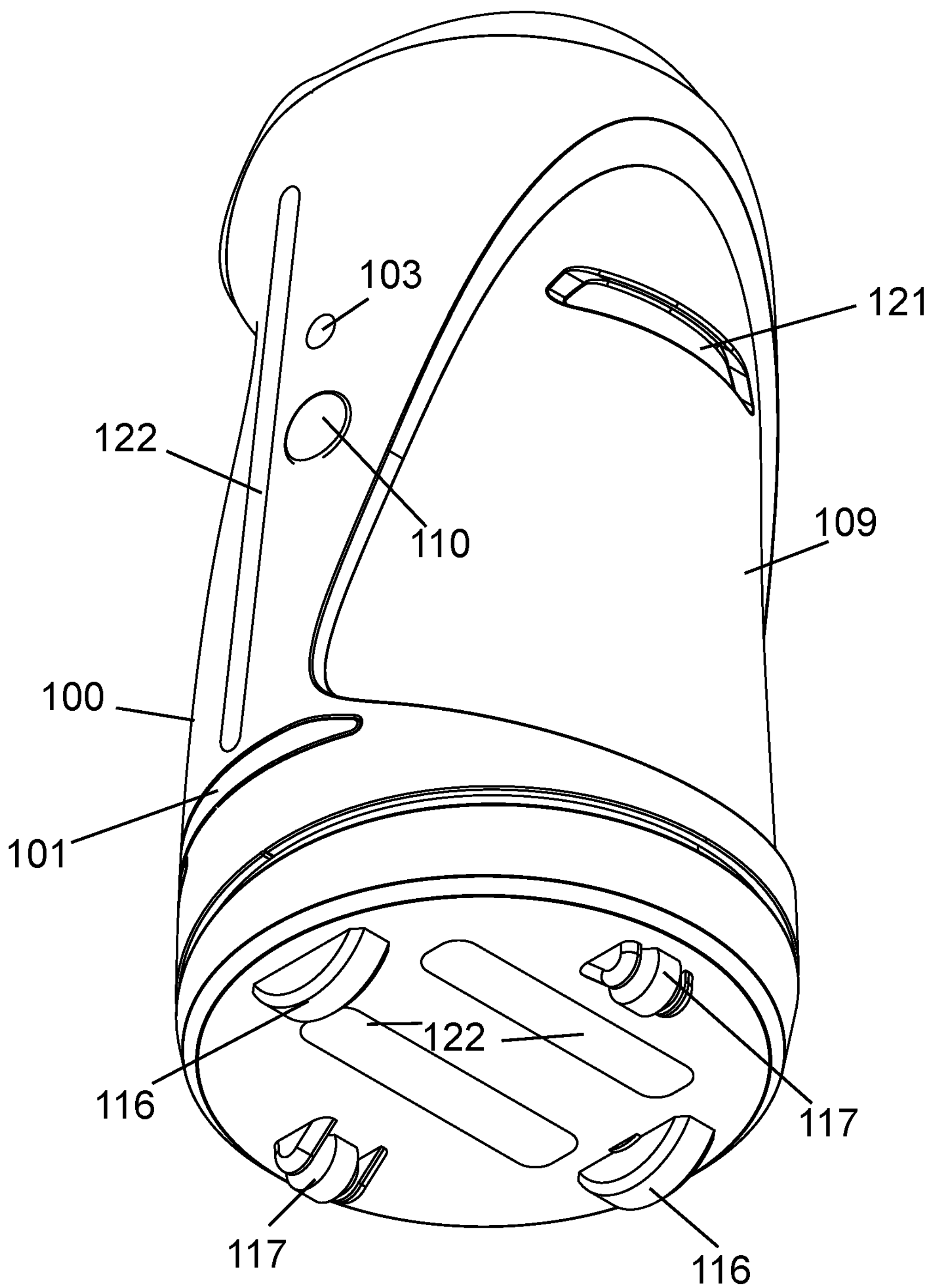
Figure 270I:
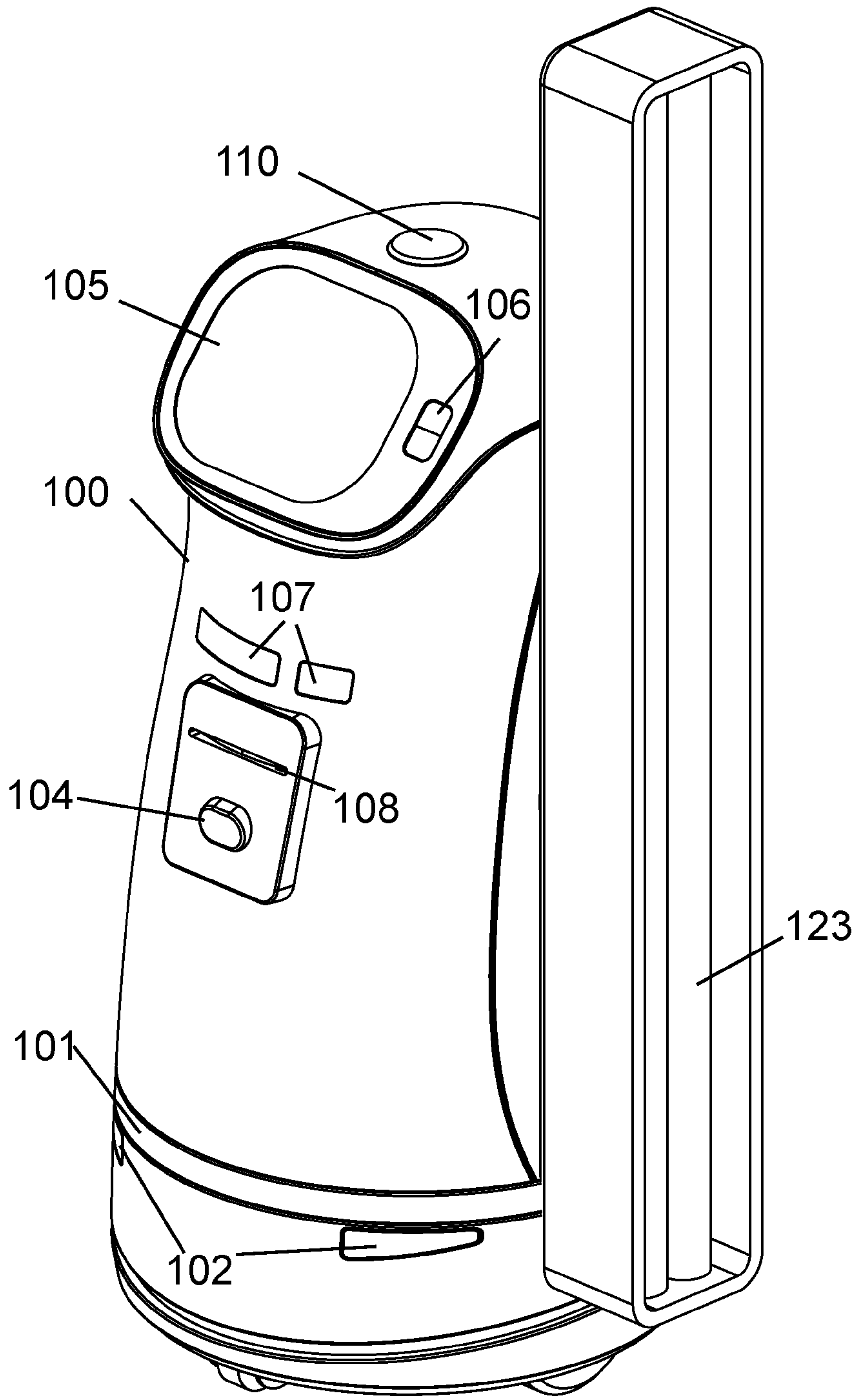
Figure 271A:
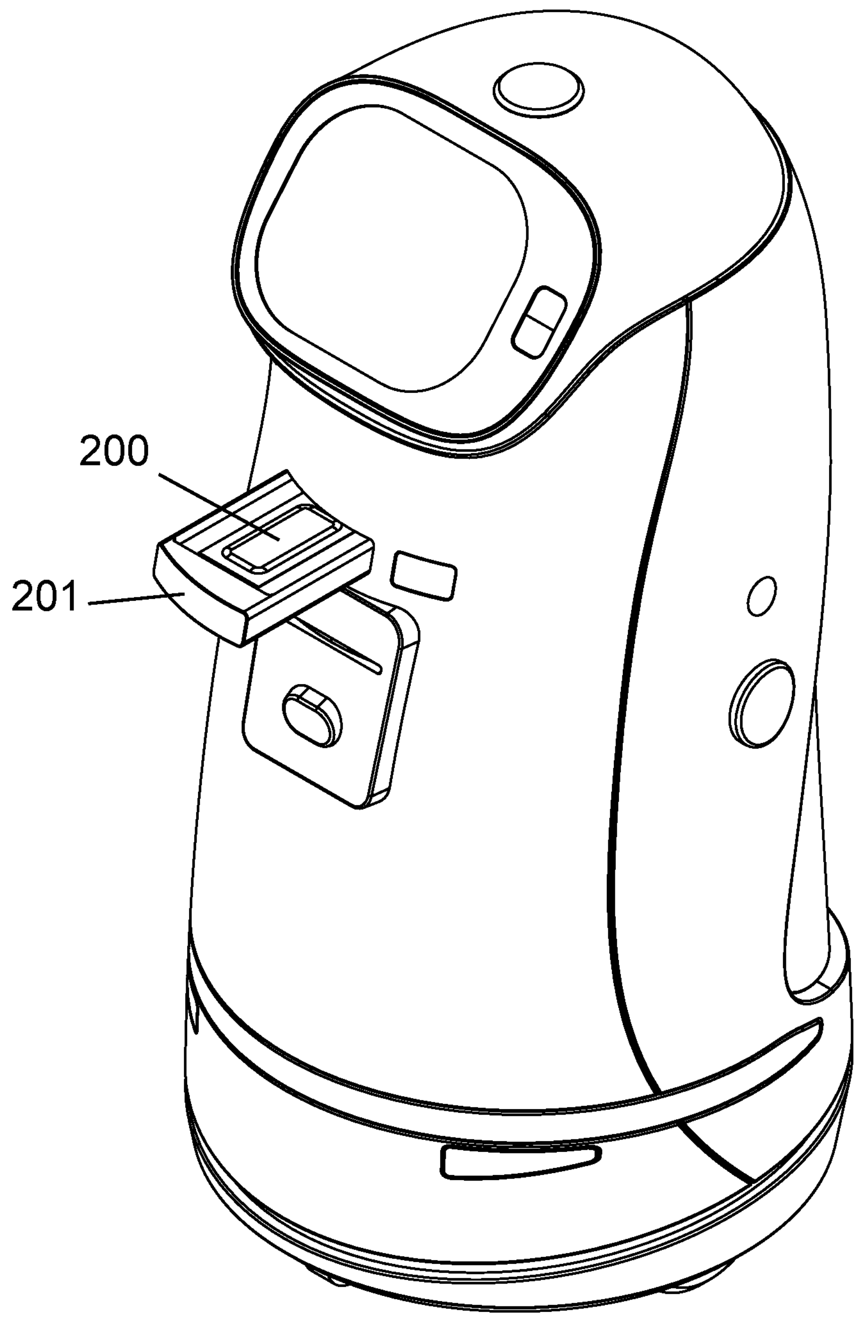
Figure 271B:
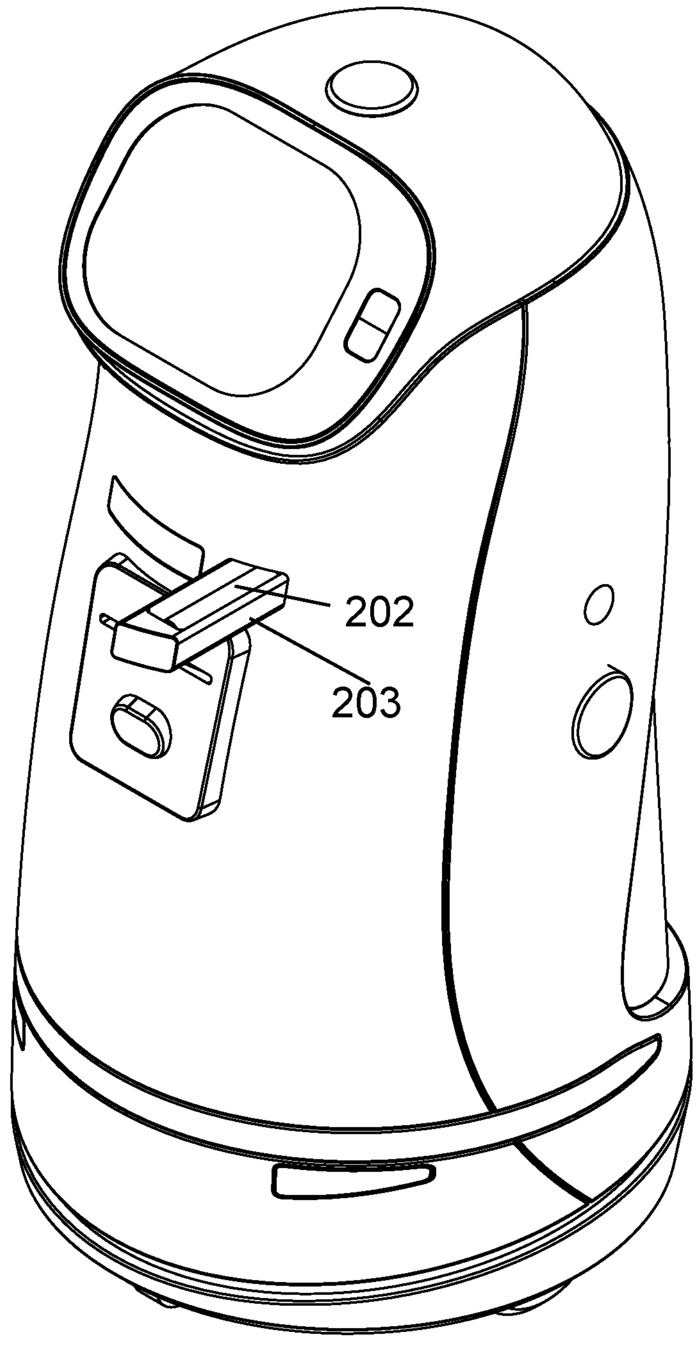
Figure 271C:
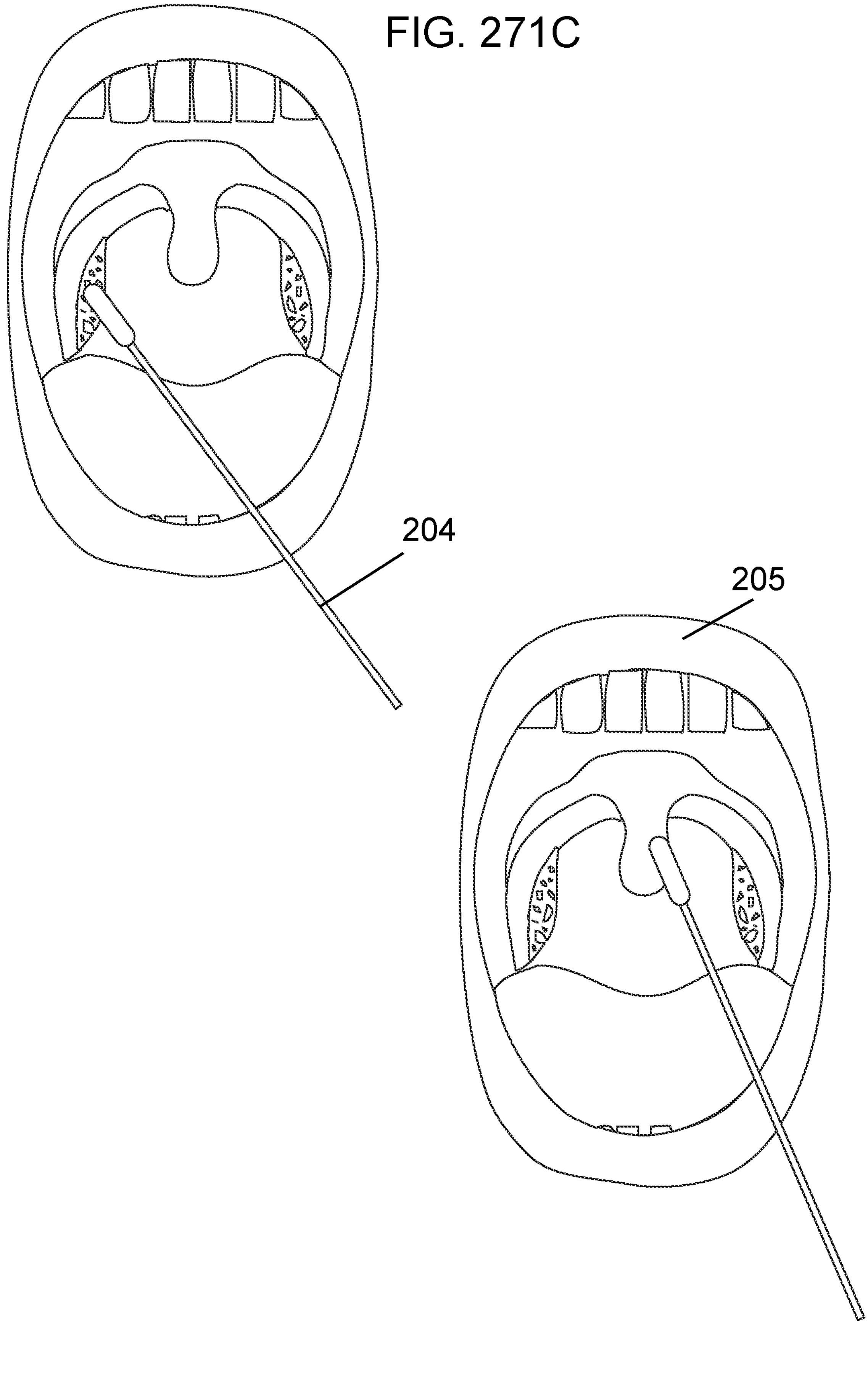
Figure 271D:
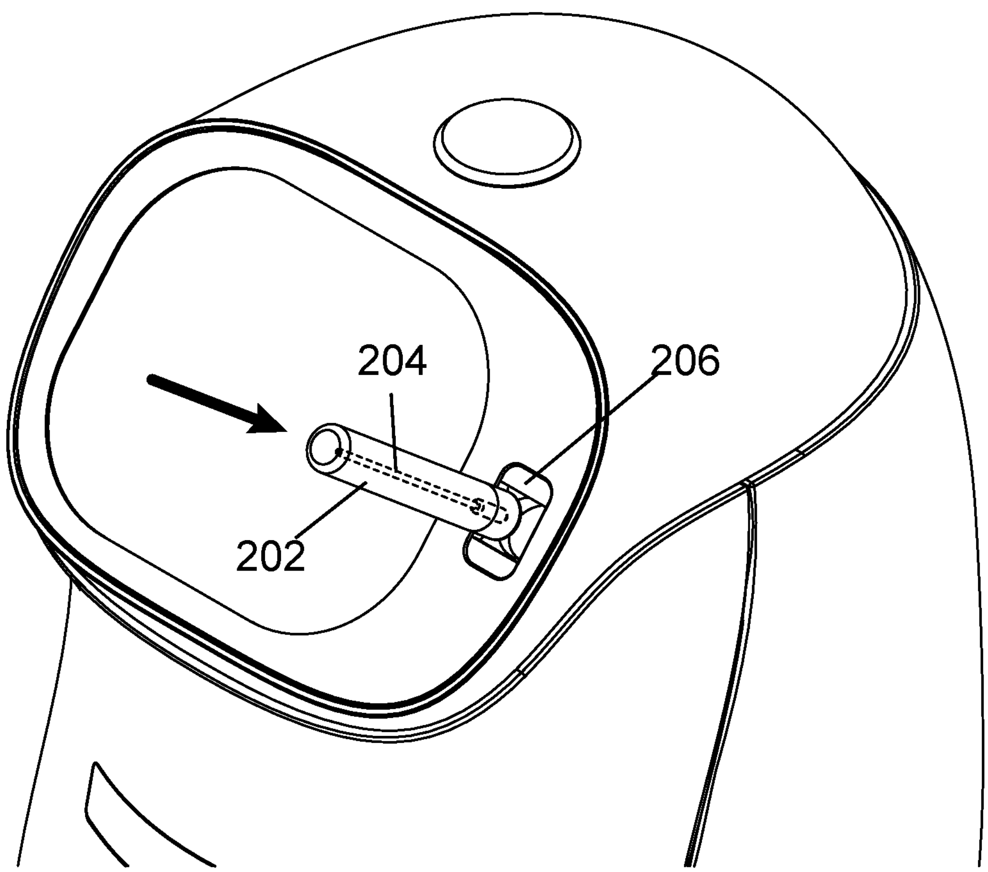
Figure 271E:
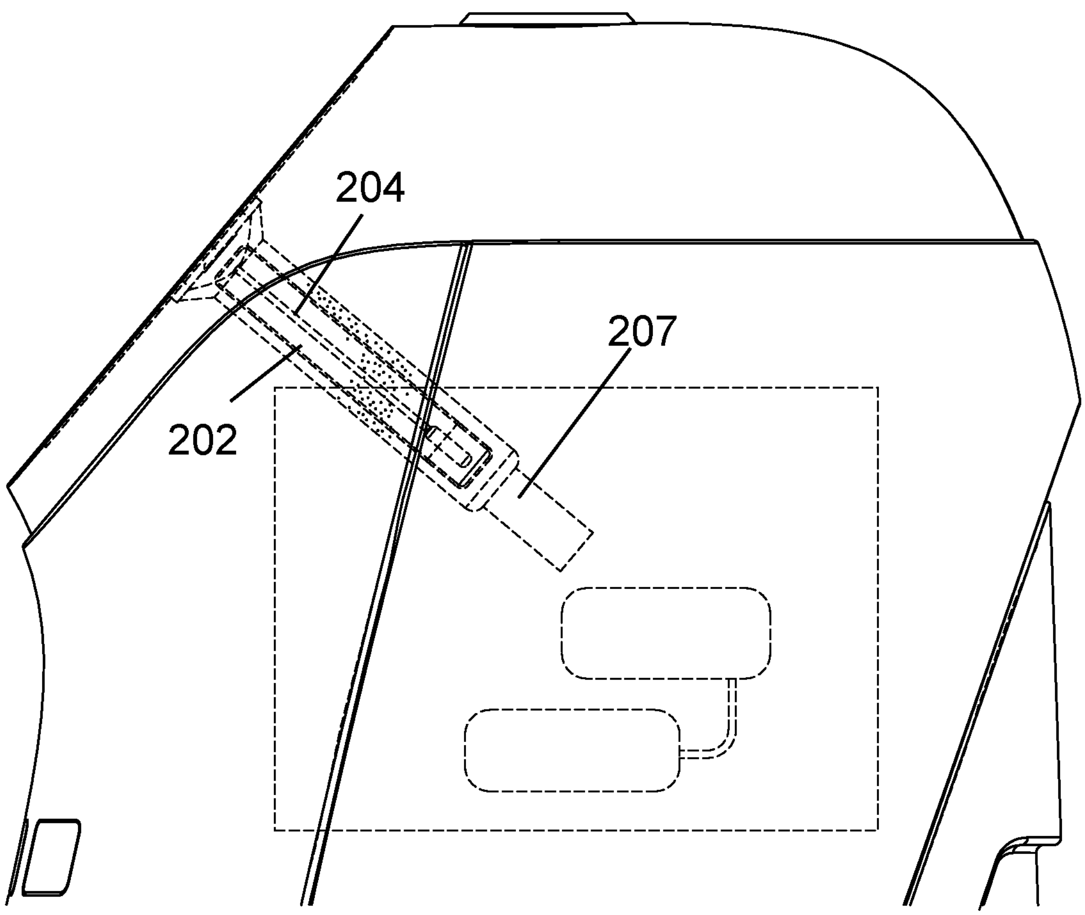
Figure 271F:
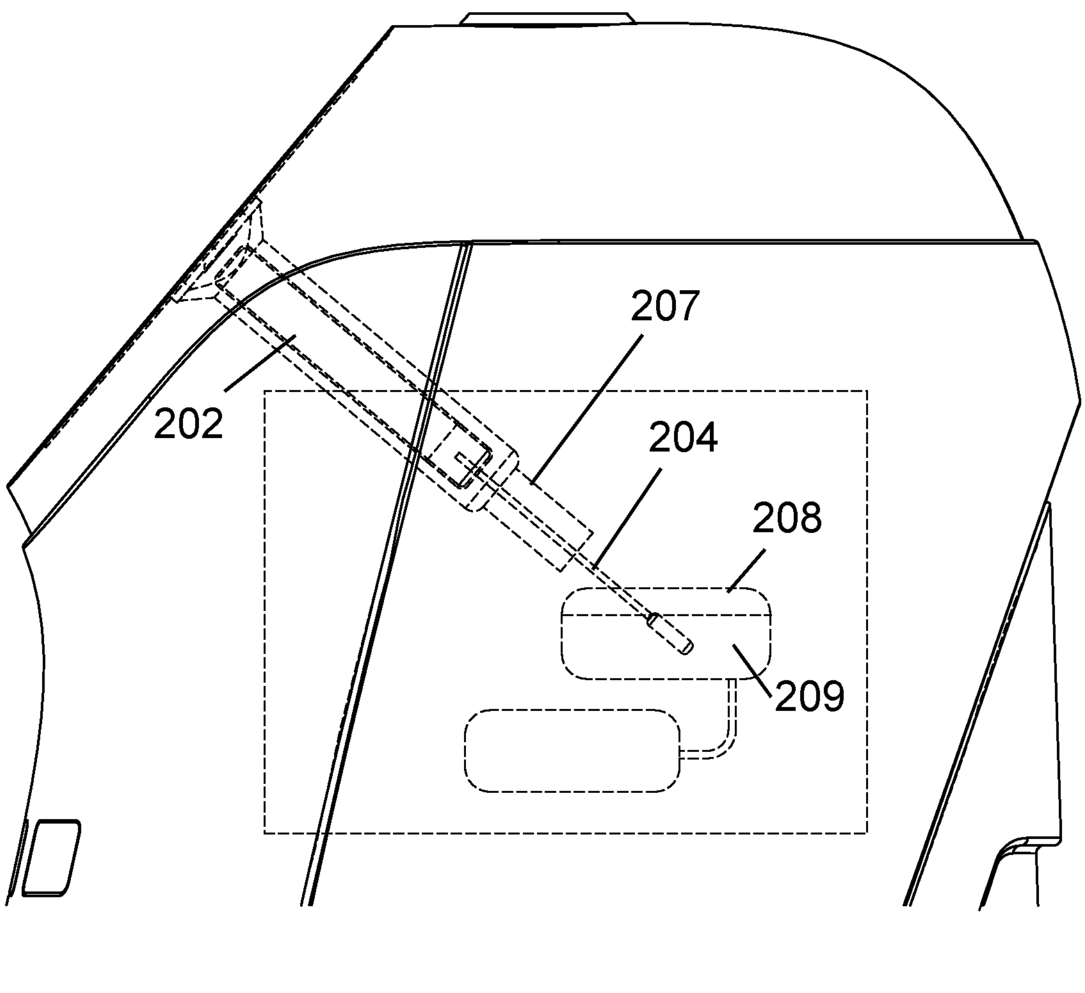
Figure 271G:
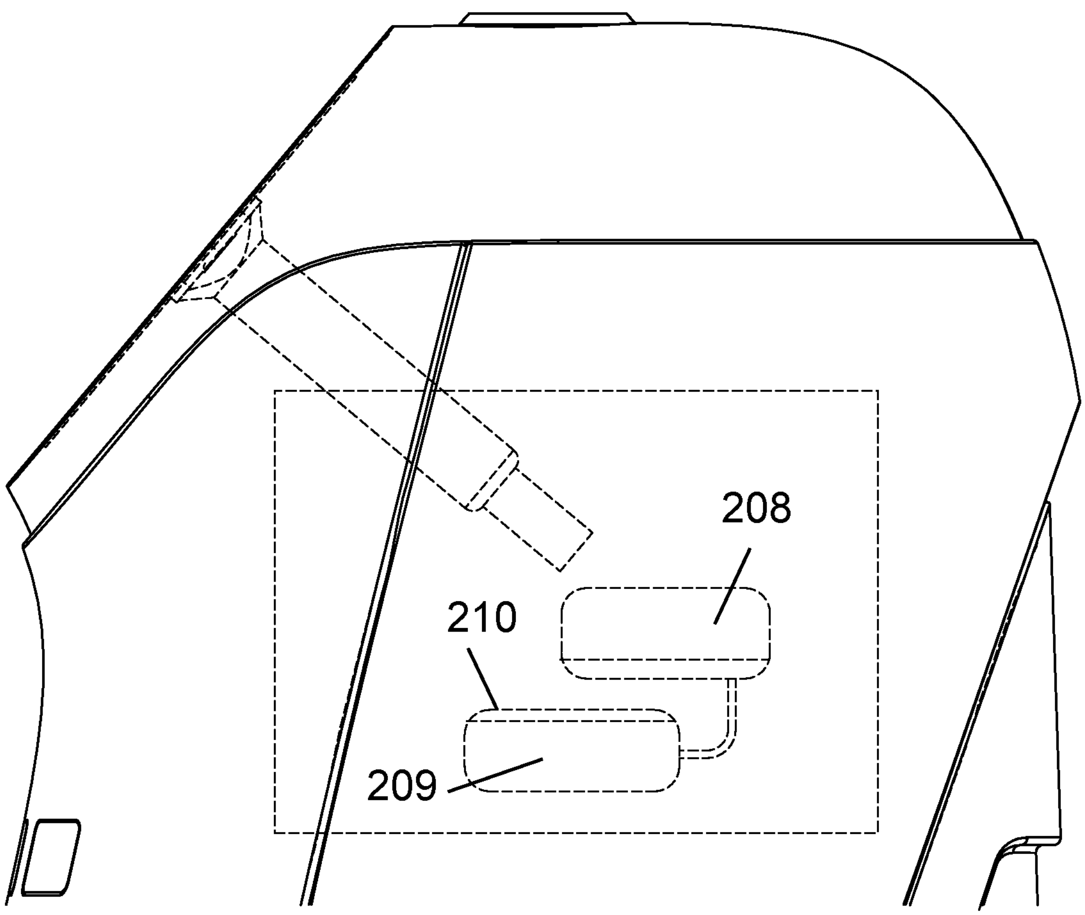
Figure 271H:
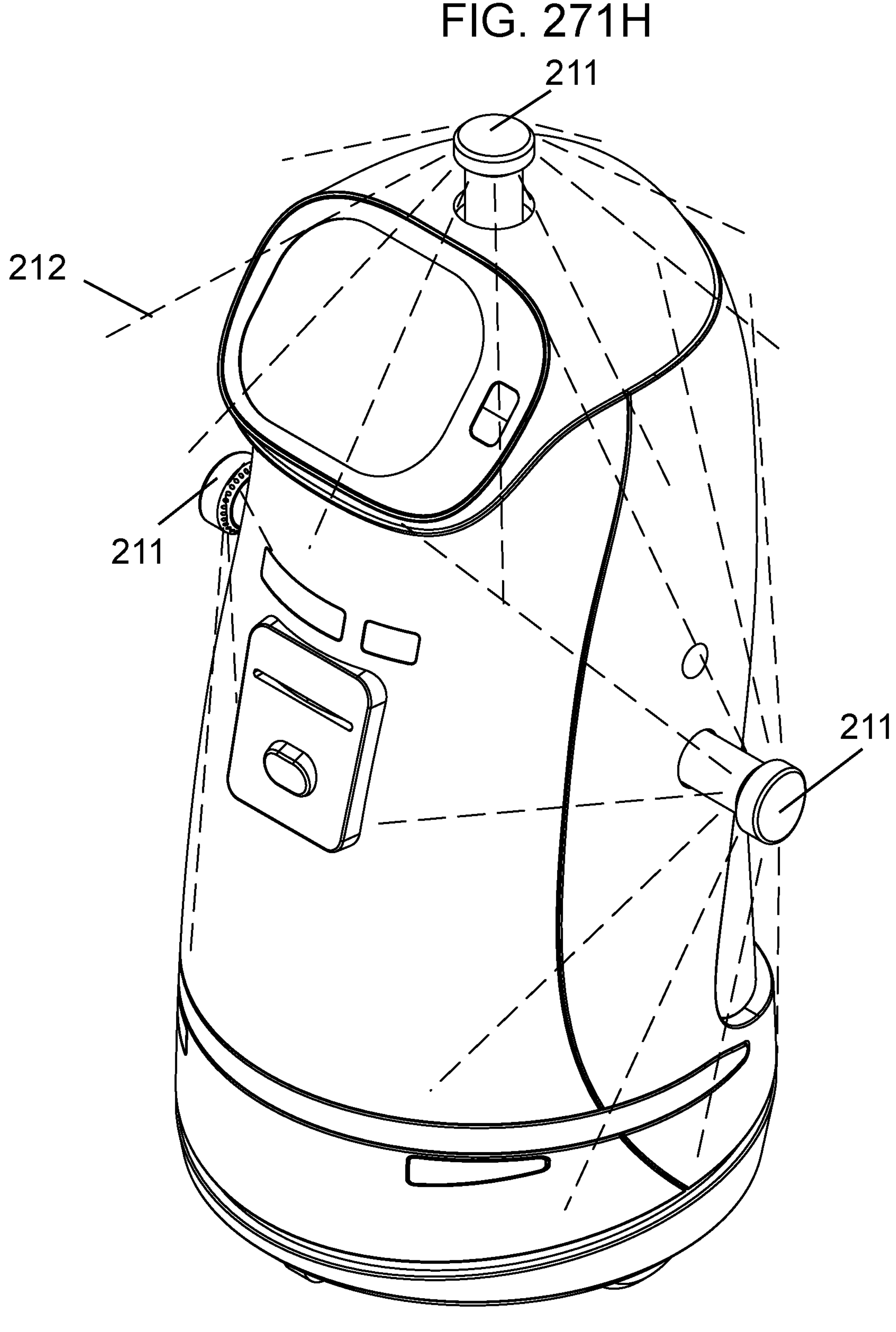
Figure 271I:
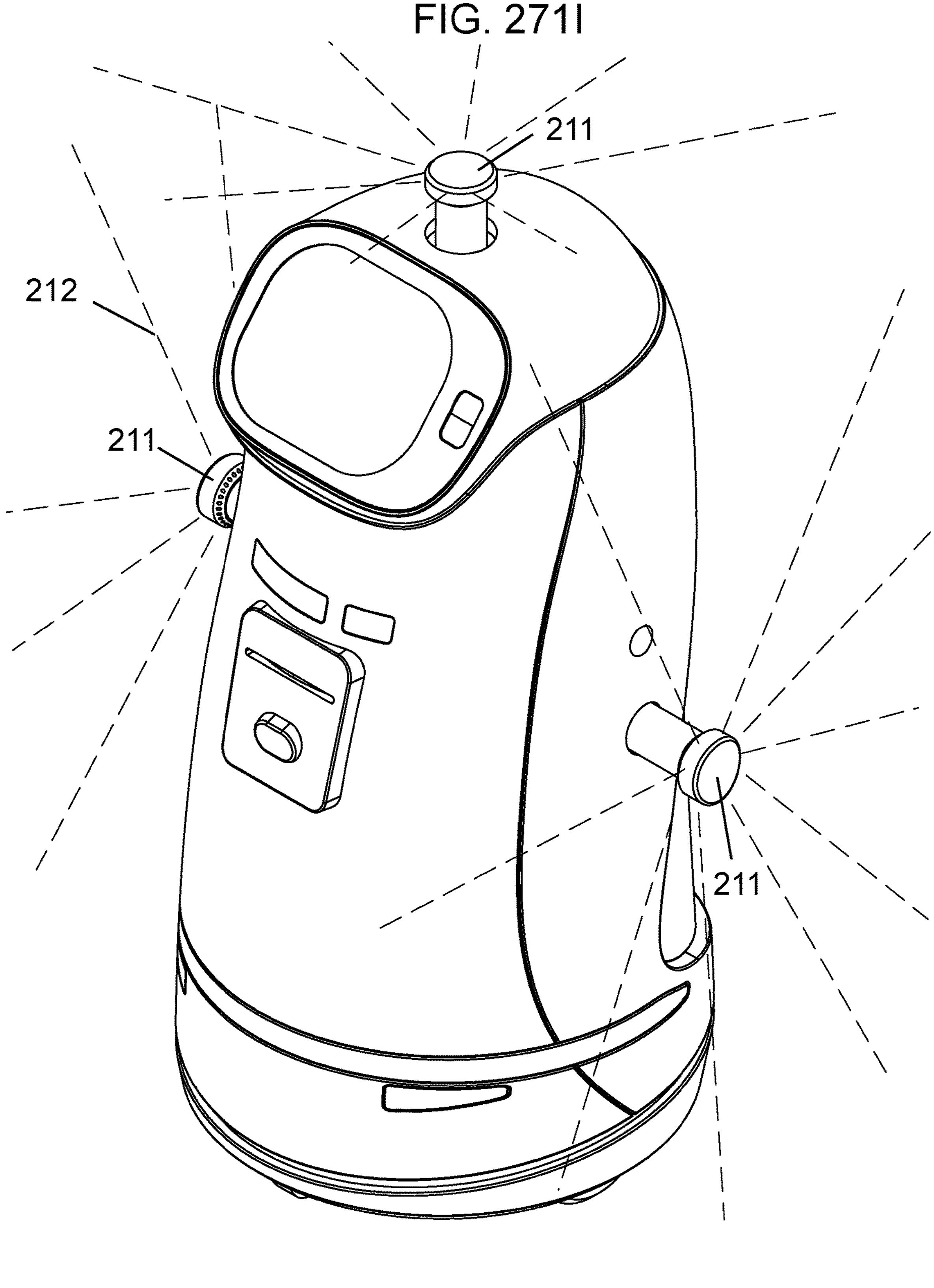
Figure 271J:
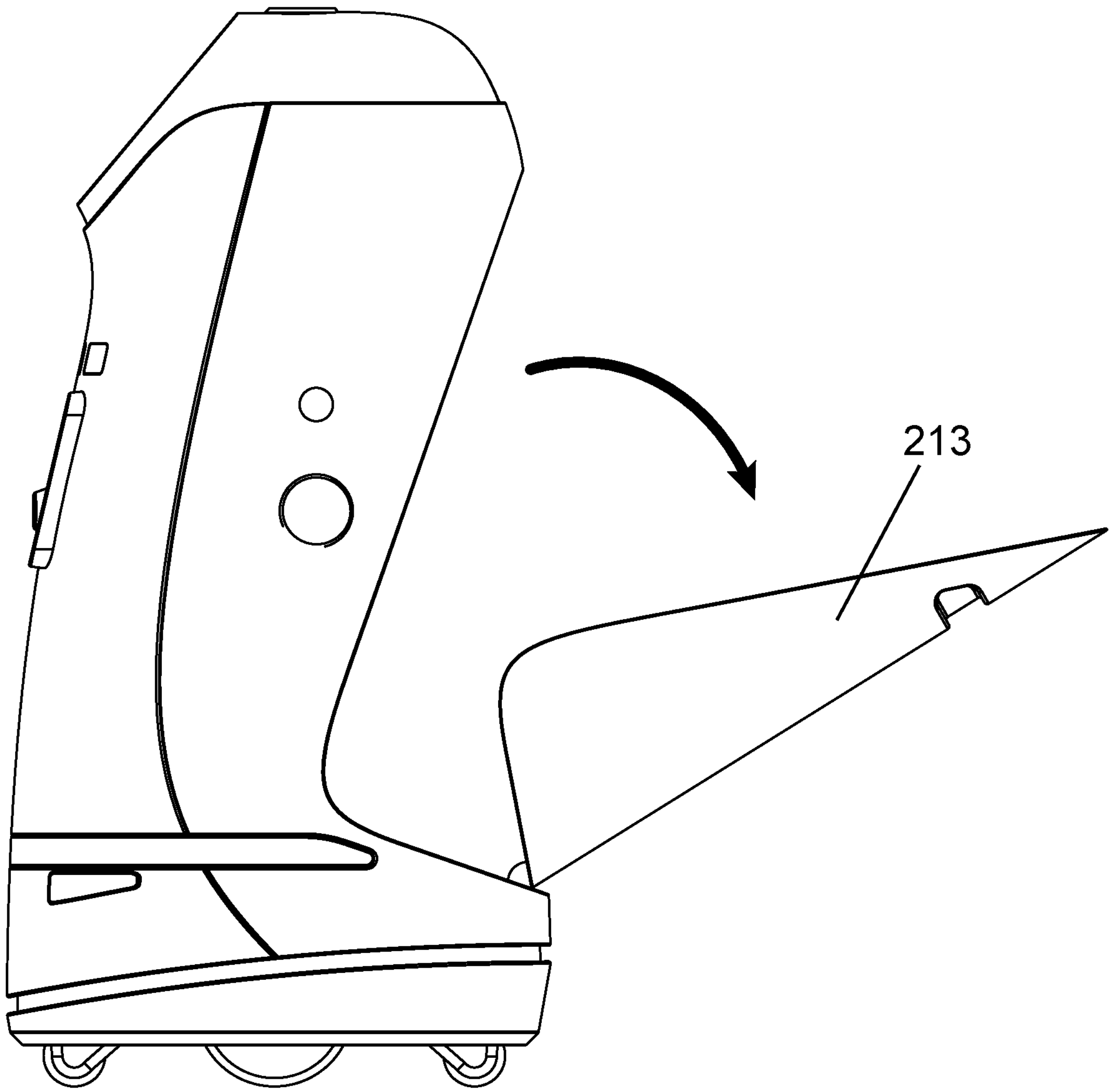

FIG. 270A illustrates an example of a medical care robot including a casing 100, a sensor window 101 behind which sensors for mapping and navigation are positioned (e.g., TOF sensors, TSSP sensors, imaging sensors, etc.), sensor windows 102 behind which proximity sensors are positioned, side sensors windows 103 behind which cameras are positioned, a front camera 104, a user interface 105 (e.g., LCD touch screen), an item slot 106 (e.g., for receiving swabs, blood vials, urine samples, etc.), item dispensers 107 (e.g., for dispensing hand sanitizer, swabs, syringes, needles, tubing, IV fluid, saline, medication, etc.), a printer 108 for printing slips including information related to a patient and services provided, a rear door 109 for accessing the inside of the robot, and spray nozzles 110 for dispensing disinfectant onto surfaces. FIG. 270B illustrates the internal components of the medical care robot including a disinfecting tube 111 that may disinfect items received from item slot 106, a sample receiver 112 that may receive items from disinfecting tube 111, which in some cases, may react with a reagent housed within sample receiver 112, a testing base 113 that may receive items for on-the-spot or future testing (e.g., swabs, blood vials, urine samples, etc.) from sample receiver 112, a testing mechanism 114 that may include mechanism required to facilitate the process of testing an item, a battery 115, drive wheels 116, caster wheel 117, and printed circuit board (PCB) 118 including processor and memory. Hand sanitizer 119 and clean swab 120 are shown in item dispensers 107. FIGS. 270C and 270D illustrate front and side views of the medical care robot. In FIG. 270D, a rear sensor window 121 is shown behind which sensors used for mapping and navigation are housed. FIGS. 270E-270H illustrate the medical care robot with added UV lights 122 for disinfecting surfaces. FIG. 270I illustrates the medical care robot with another configuration of UV lights 123 for disinfecting surfaces. The UV lights 123 are longer in height and may therefore disinfect a larger area. In some cases, the medical care robot may drive slowly in a direction parallel with the wall to allow sufficient time for the UV light 122 to disinfect the surfaces of the walls. In other cases, the UV light 122 may be used to disinfect other surfaces, such as chairs, hospital beds, and other object surfaces. In some embodiments, the medical care robot may drive slowly in a particular pattern to cover the driving surface of a room such that the UV lights 123 may disinfect the driving surface. FIGS. 271A-271J illustrate an example of a testing process that may be executed by the medical care robot. In FIG. 271A, the medical care robot dispenses a disposable hand sanitizing towel 200 from dispenser 201 for the user to sanitize their hands. In FIG. 271B, the medical care robot dispenses an unused swab stored in a tube 202 from dispenser 203. The patient or another person may remove the swab from the tube and take a sample by following the instructions provided by the robot (e.g., verbally and/or visually using an LCD screen and speaker). In some cases, a patient may perform the test on themselves, while in other cases, another person may perform the test on the patient. In FIG. 271C, the swab 204 is being used to take a sample from the mouth of the patient 205. After the test is complete, the swab 204 is returned to the tube 203. In FIG. 271D, a receptacle 206 opens to accept the swab 204 in the tube 202 after the test is complete. In FIG. 271E, the tube 204 is disinfected by disinfecting tube 207, and in FIG. 271F, the end of the swab 204 is released into sample receiver 208. The end of swab 204 reacts with a reagent 209 within the sample receiver 208 for a predetermined amount of time, after which the swab may be discarded into a container positioned within the casing of the robot. In FIG. 271G, the reagent from sample receiver 208 is transferred to testing base 210 for analysis. The results may then be displayed to the patient via a display screen of the robot, an application of a communication device, or a printed slip. In some cases, after each test, spray nozzles 211 may extend from within the casing of the medical care robot and spray disinfectant 212 to disinfect the surface of the robot, as illustrated in FIG. 271H. In some cases, the robot may also disinfect the surrounding environment, as illustrated in FIG. 271I. In FIG. 271J, a door 213 positioned on a back side of the robot is opened such that items and mechanisms within the robot casing may be accessed. In some cases, a user may replenish items (e.g., testing kits, swabs, blood vials, medication, etc.) by opening the door 213.

Figure 272A:
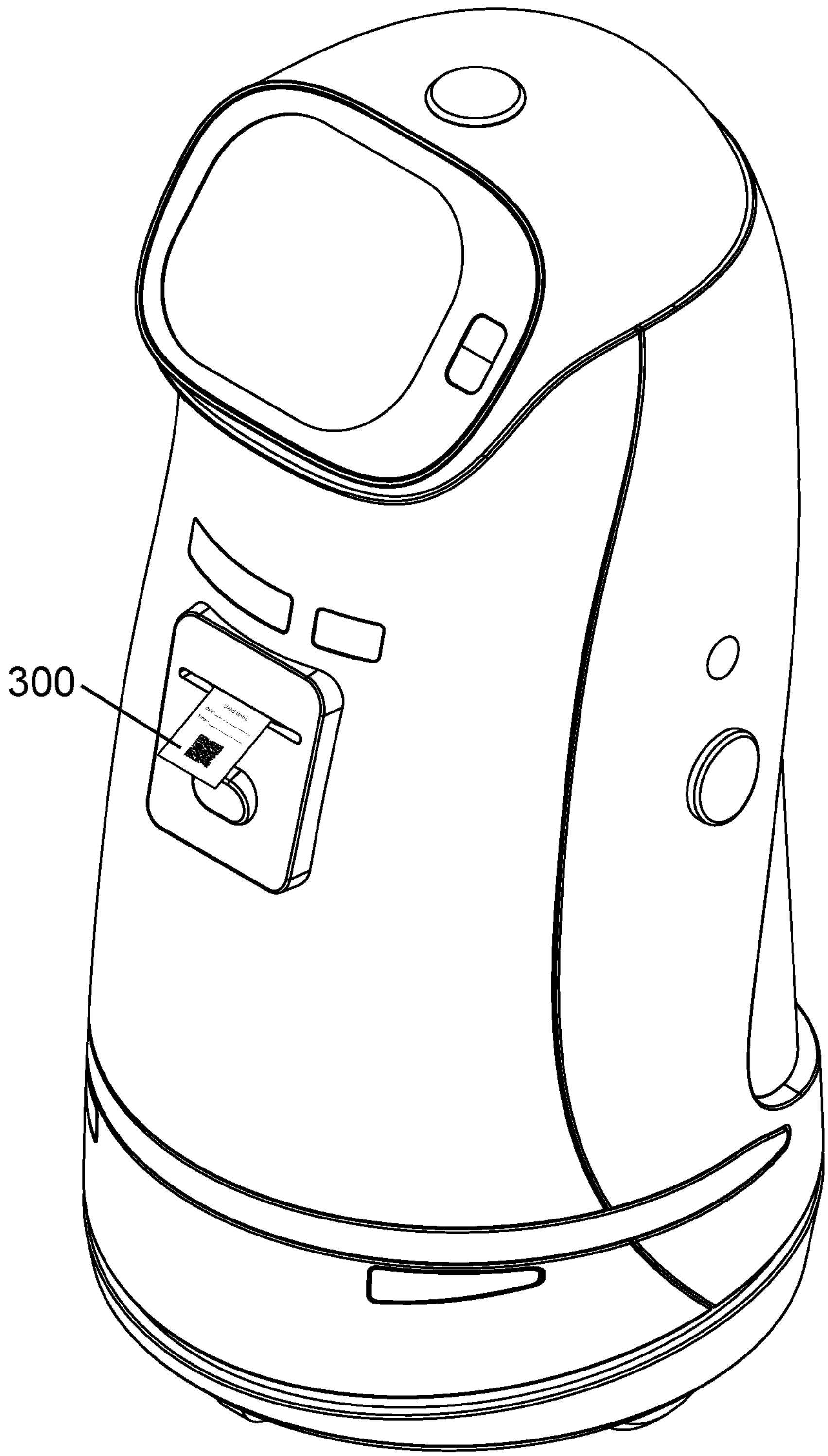
Figure 272B:
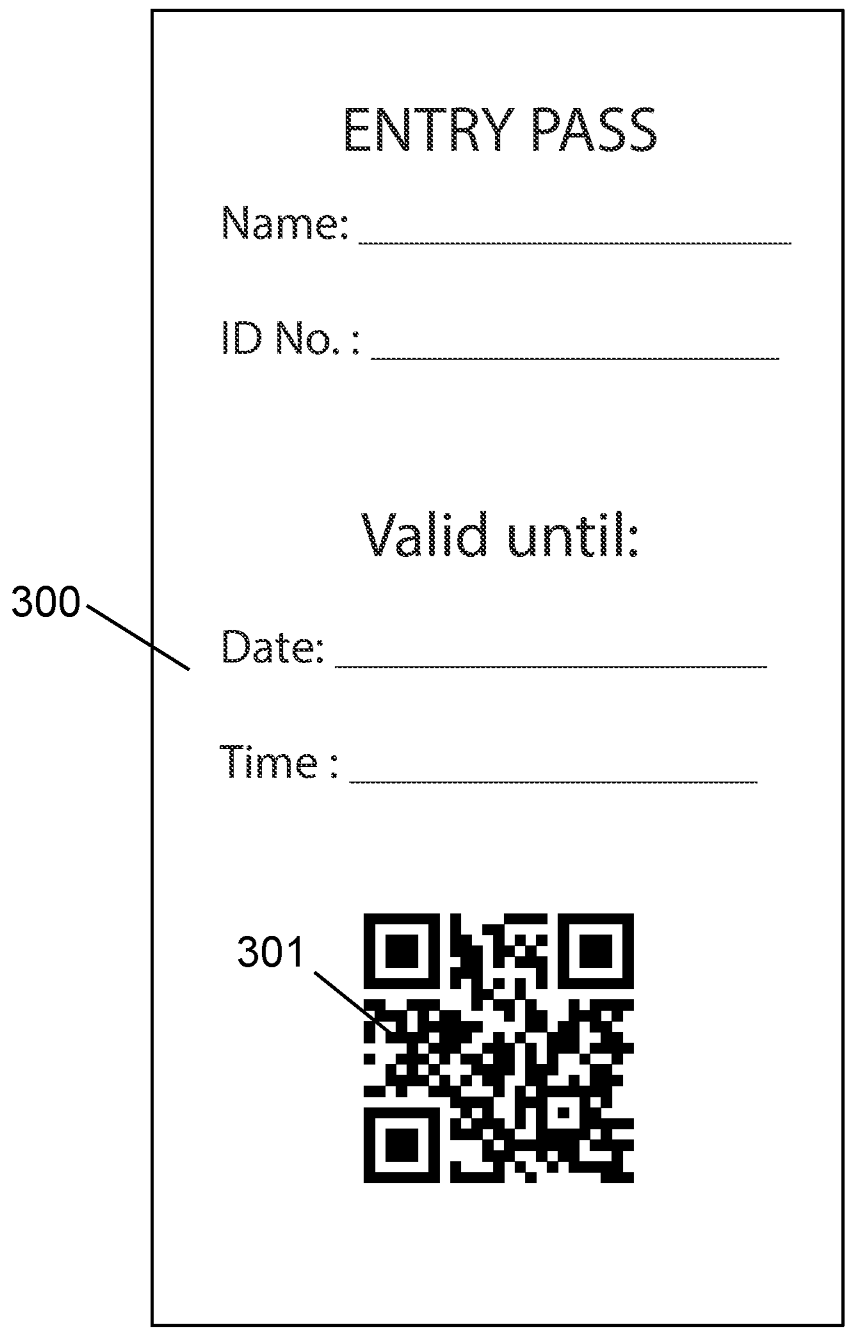
Figure 272C:
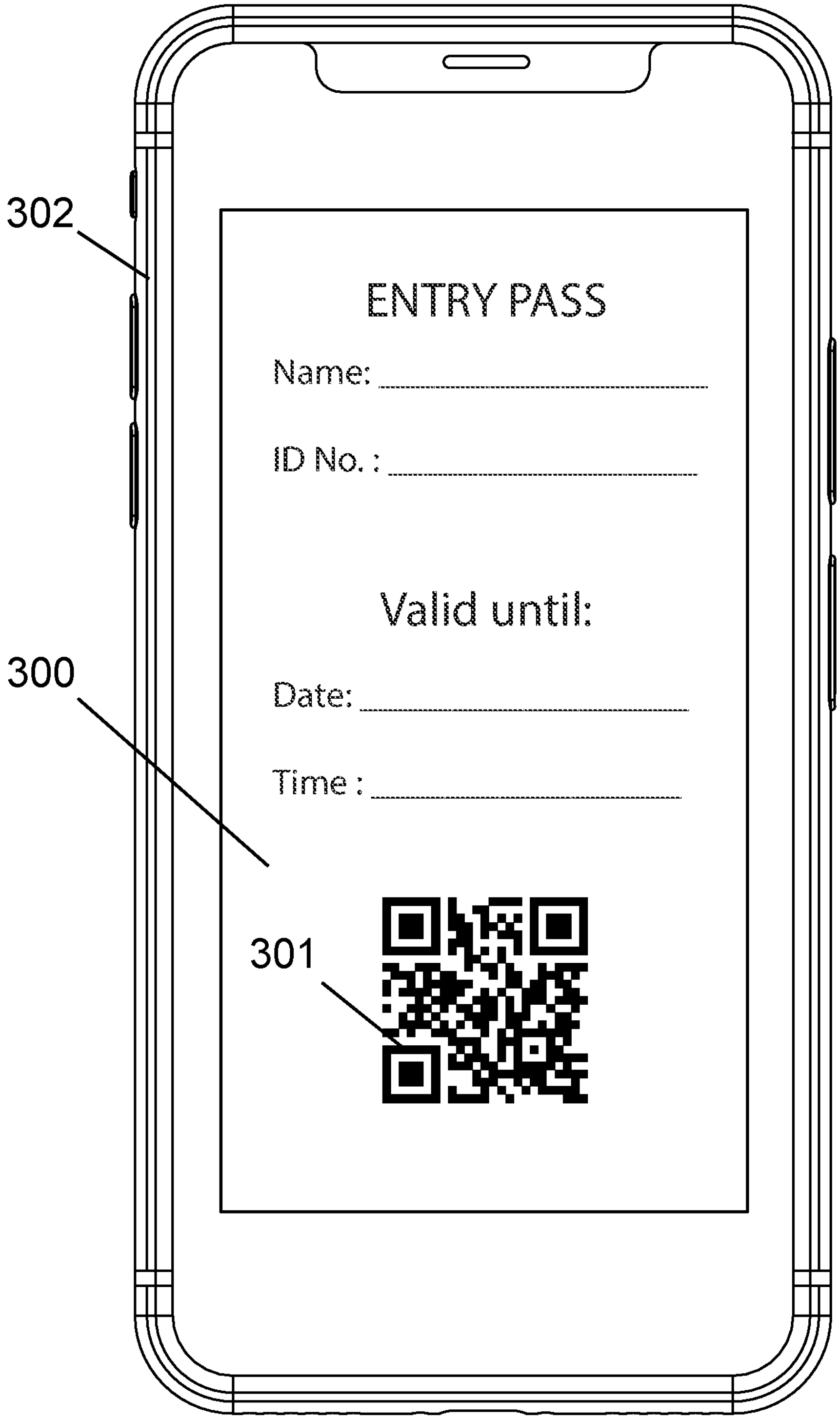
Figure 272D:
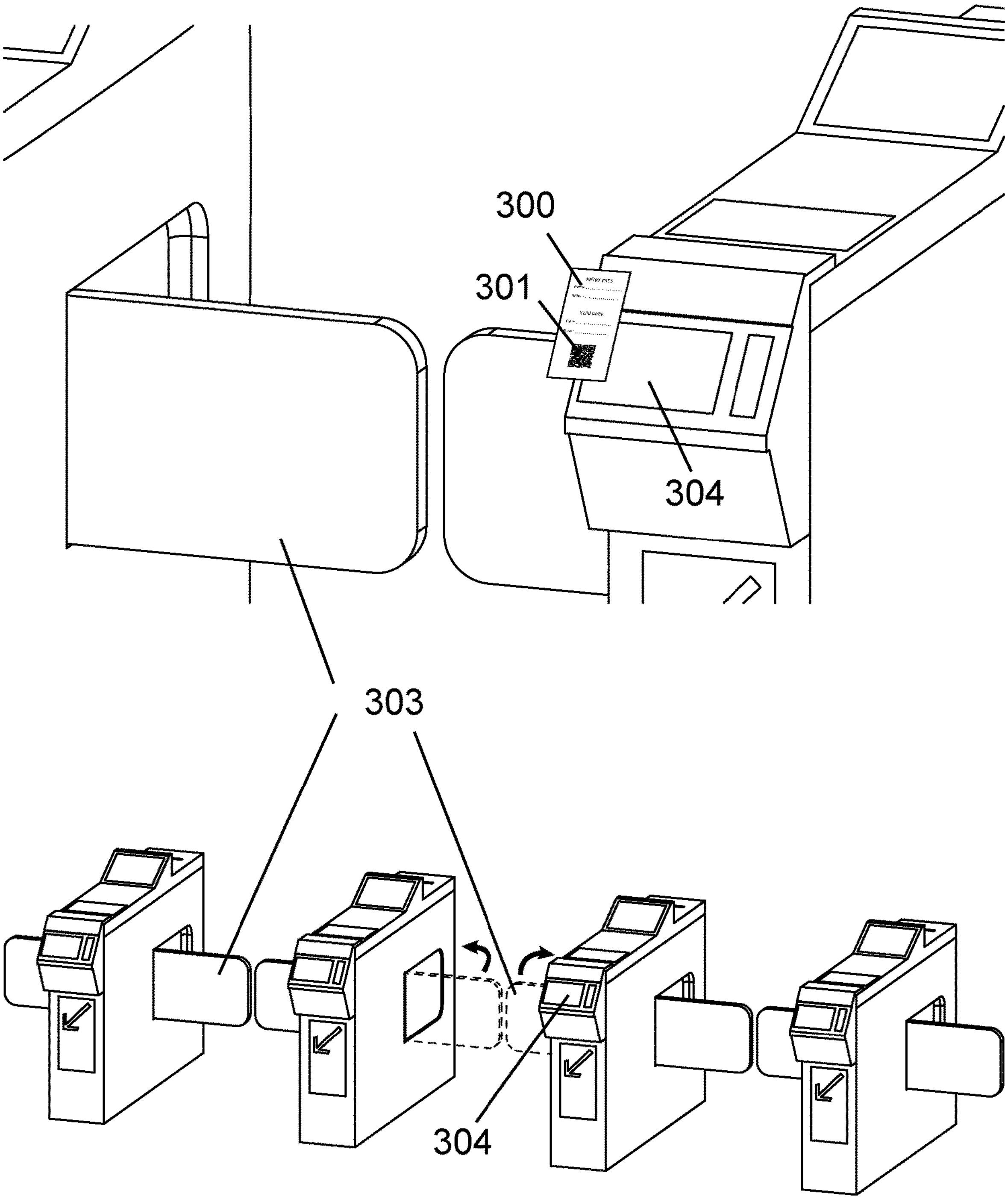
Figure 273A:
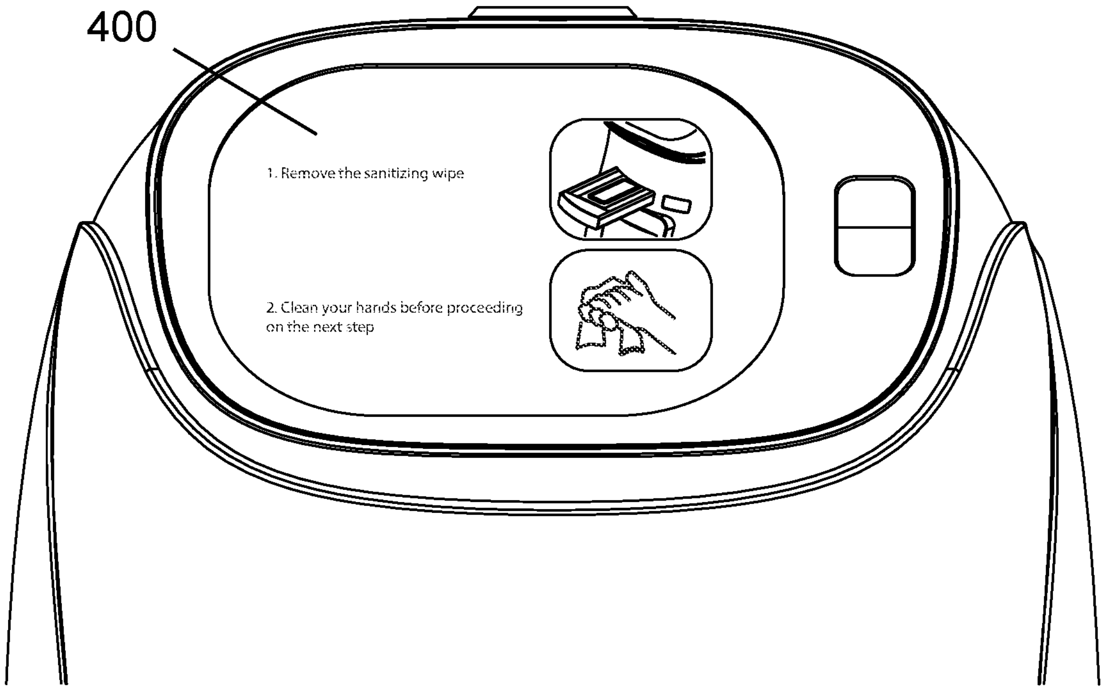
Figure 273B:
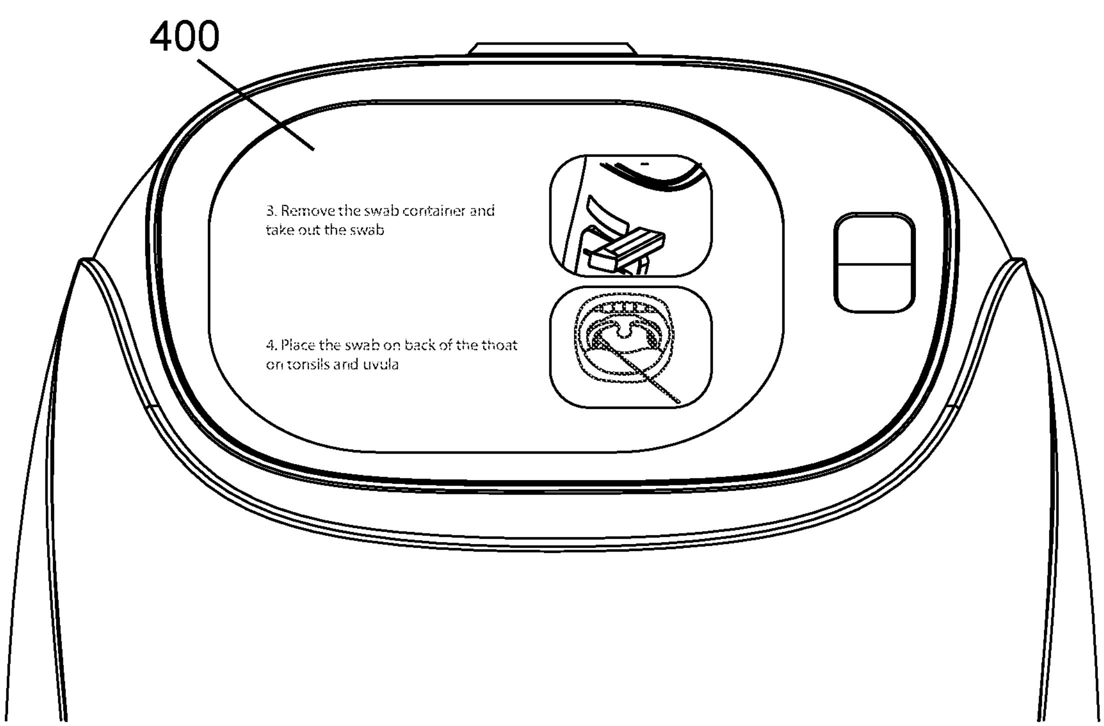
Figure 273C:
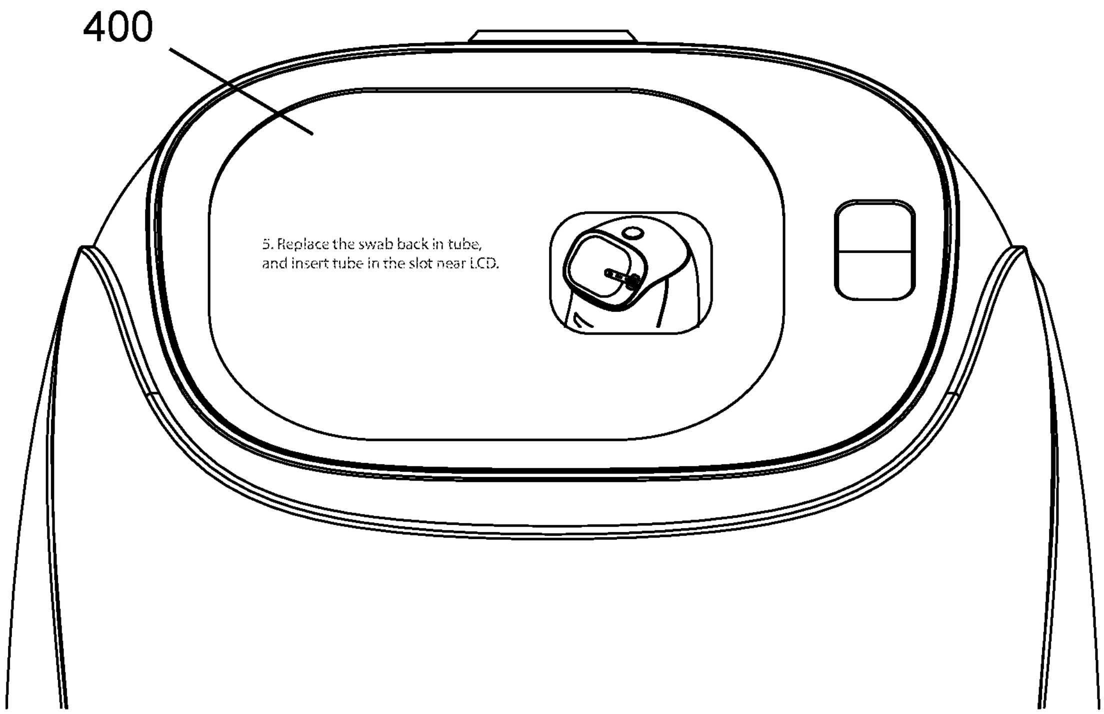
Figure 273D:
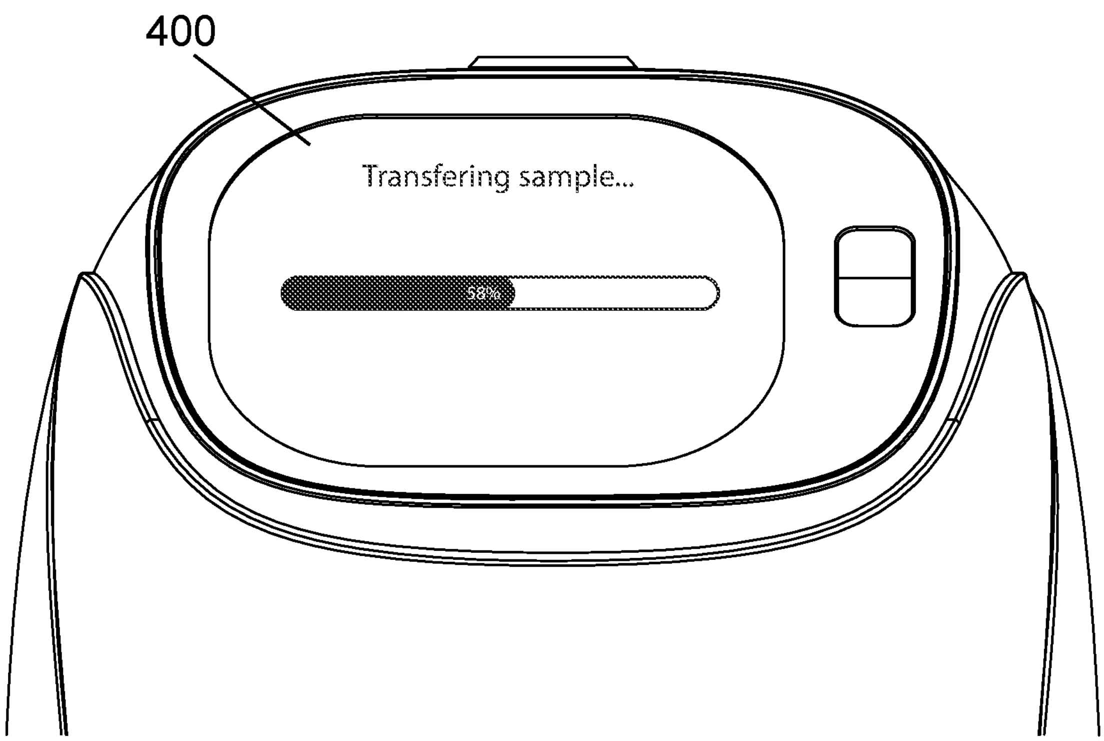
Figure 273E:
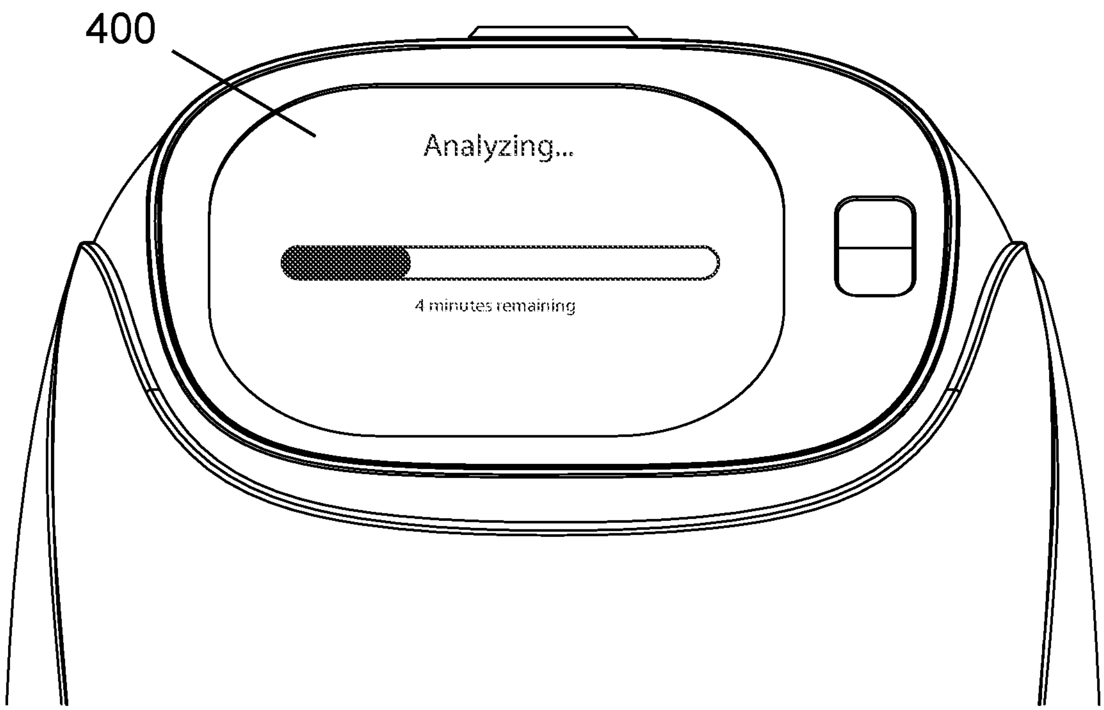
Figure 273F:
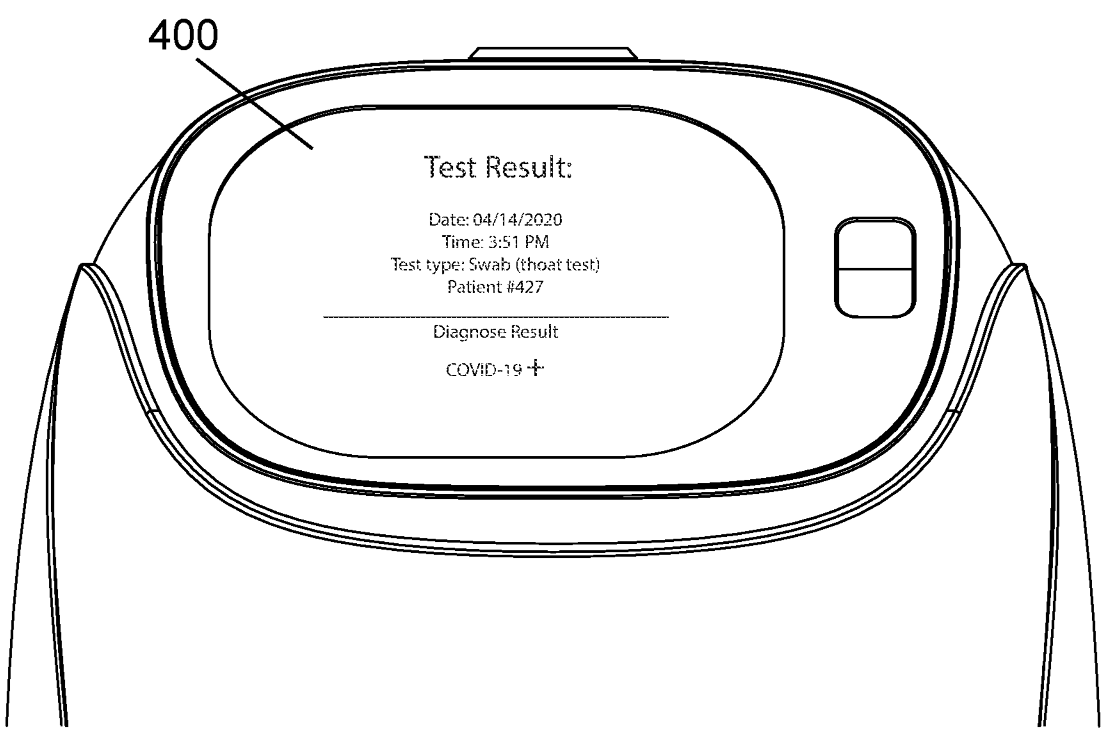

In some embodiments, the medical care robot may be used to verify the health of persons entering a particular building or area (e.g., subway, office building, hospital, airport, etc.). In some embodiments, the medical care robot may print a slip disclosing the result of the test. For example, FIG. 272A illustrates the medical care robot printing a slip 300 indicating the test results are negative. FIG. 272B illustrates the slip 300 with barcode 301. If the test results are negative, the barcode may be used to scan for entry into a particular area. In some cases, the barcode may only be active for a predetermined amount of time. In some cases, as illustrated in FIG. 272C, the slip 300 may be received electronically from the robot using an application of a communication device 302. FIG. 272D illustrates gates 303 that may be opened to gain entry to a particular area upon scanning barcode 301 using scanner 304. FIGS. 273A-273F illustrate examples of visualization displayed on a user interface 400 of the medical care robot during testing. FIGS. 273A-273C illustrate step-by-step instructions displayed via the user interface 400 for performing the test. FIGS. 273D and 273E illustrate statuses of the medical care robot after the swab has been deposited into the robot after testing. In FIG. 273D the medical care robot is transferring the swab sample to the testing mechanism housed within the medical care robot. A progress bar 401 is displayed to the user. In FIG. 273E the medical care robot is analyzing the swab sample, again a progress bar 402 is displayed to the user and an estimated time remaining. In FIG. 273F, after the analysis of the swab sample, test results are displayed to the user via the user interface 400. In this example, the test completed was a COVID-19 test.

Figure 274A:
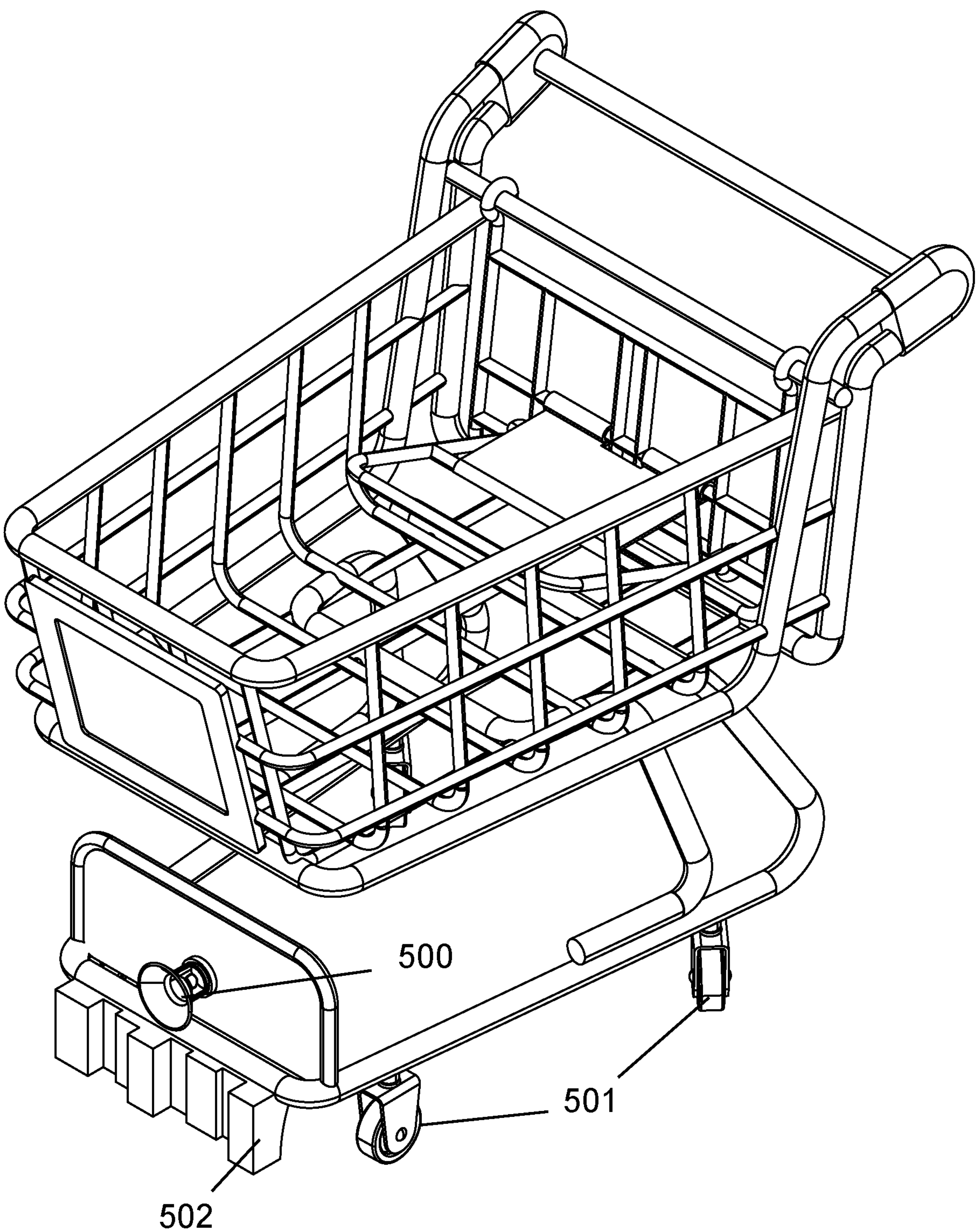
Figure 274B:
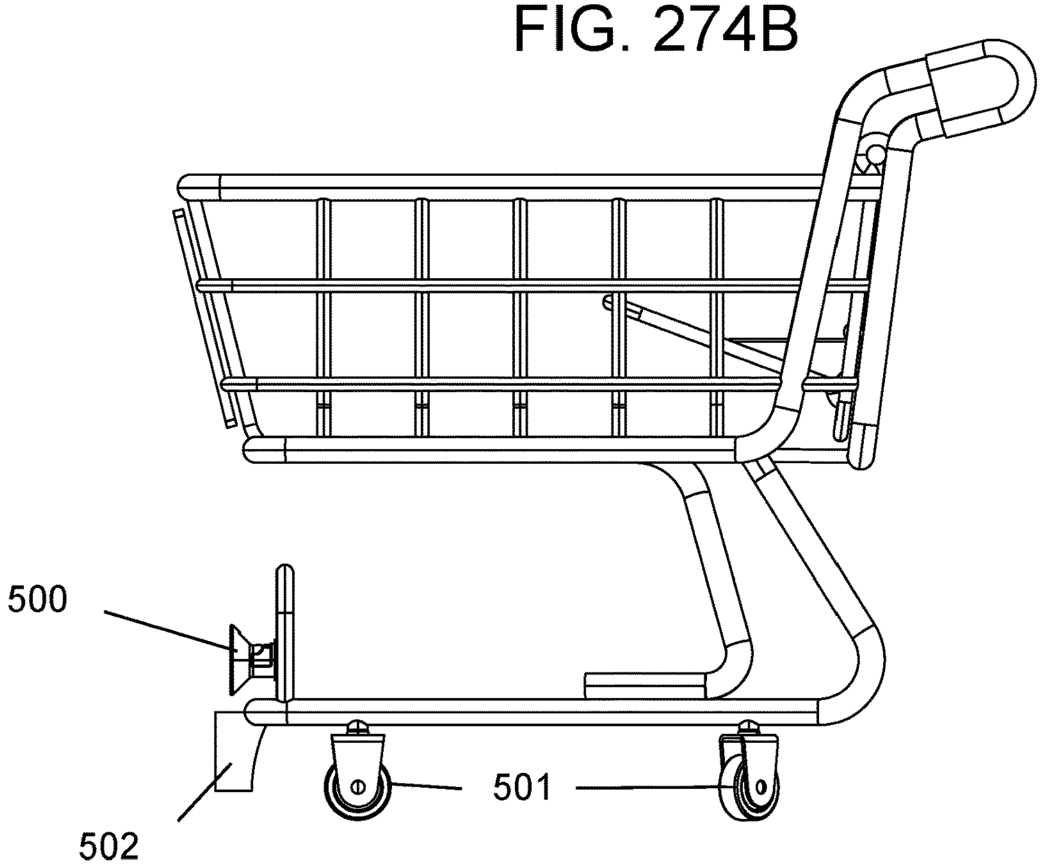
Figure 274C:
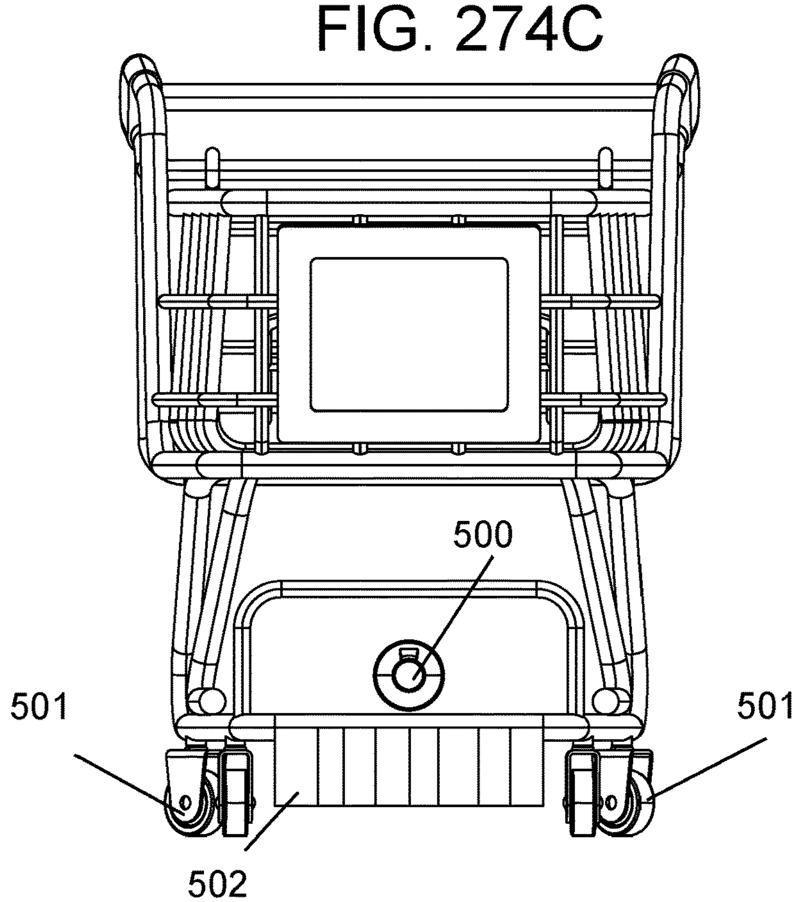
Figure 274D:
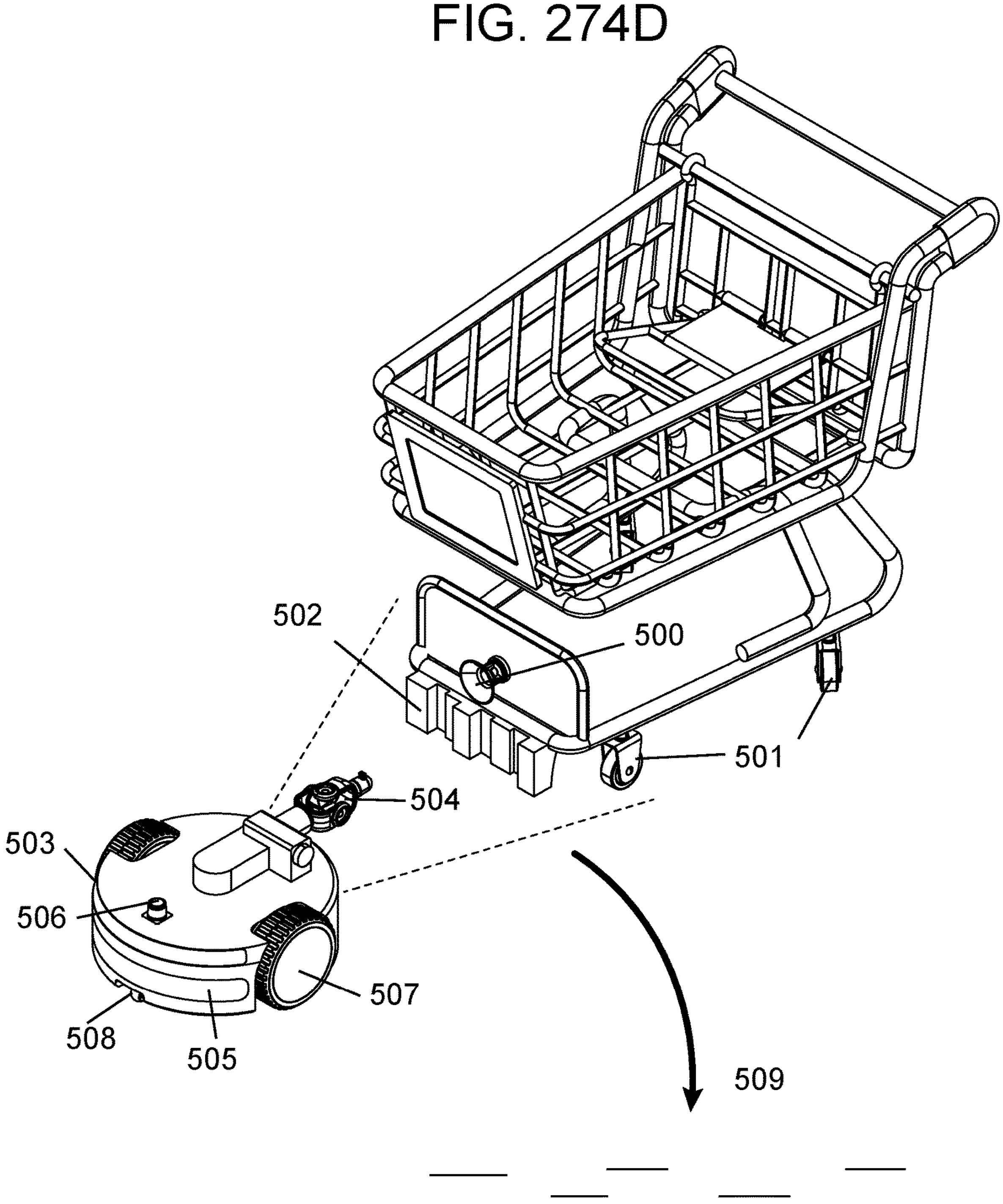
Figure 274E:
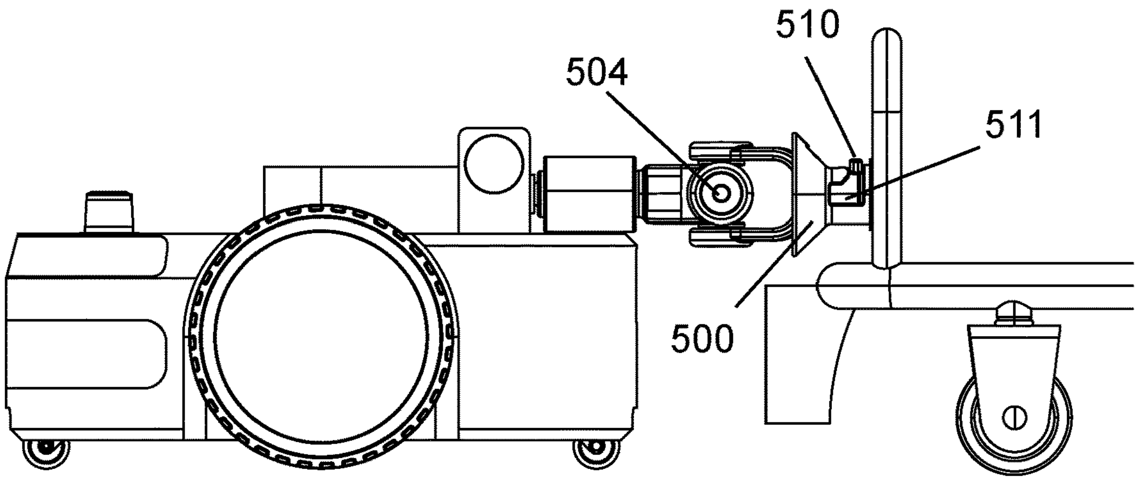
Figure 274F:
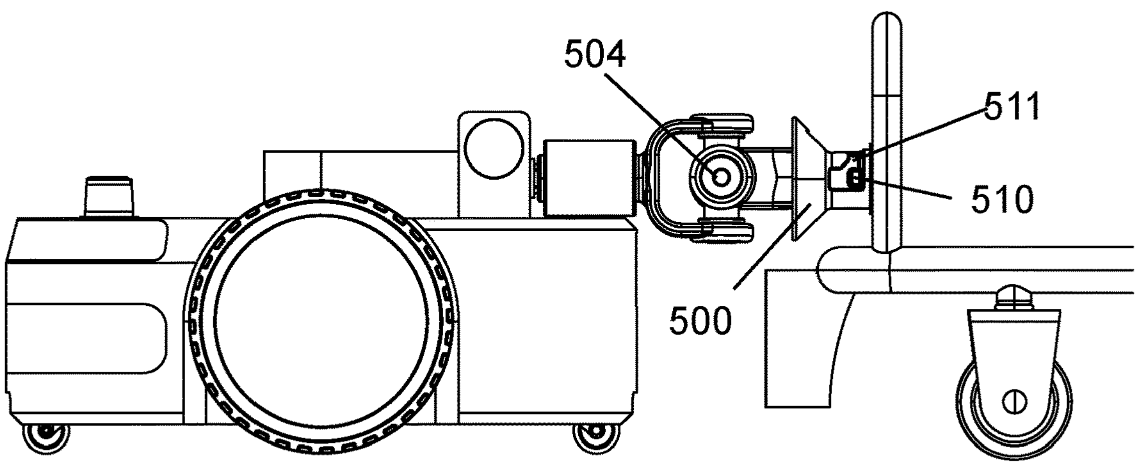
Figure 274G:
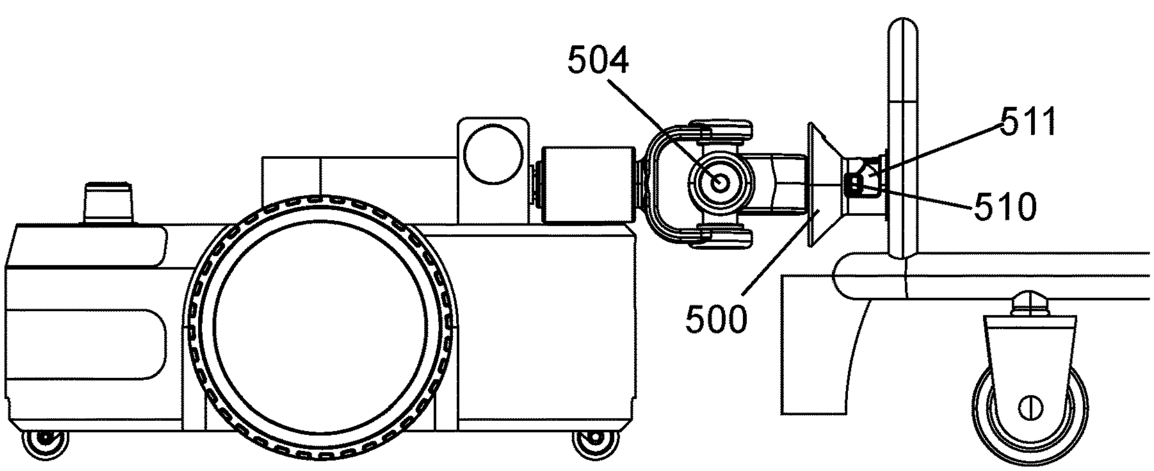
Figure 274H:
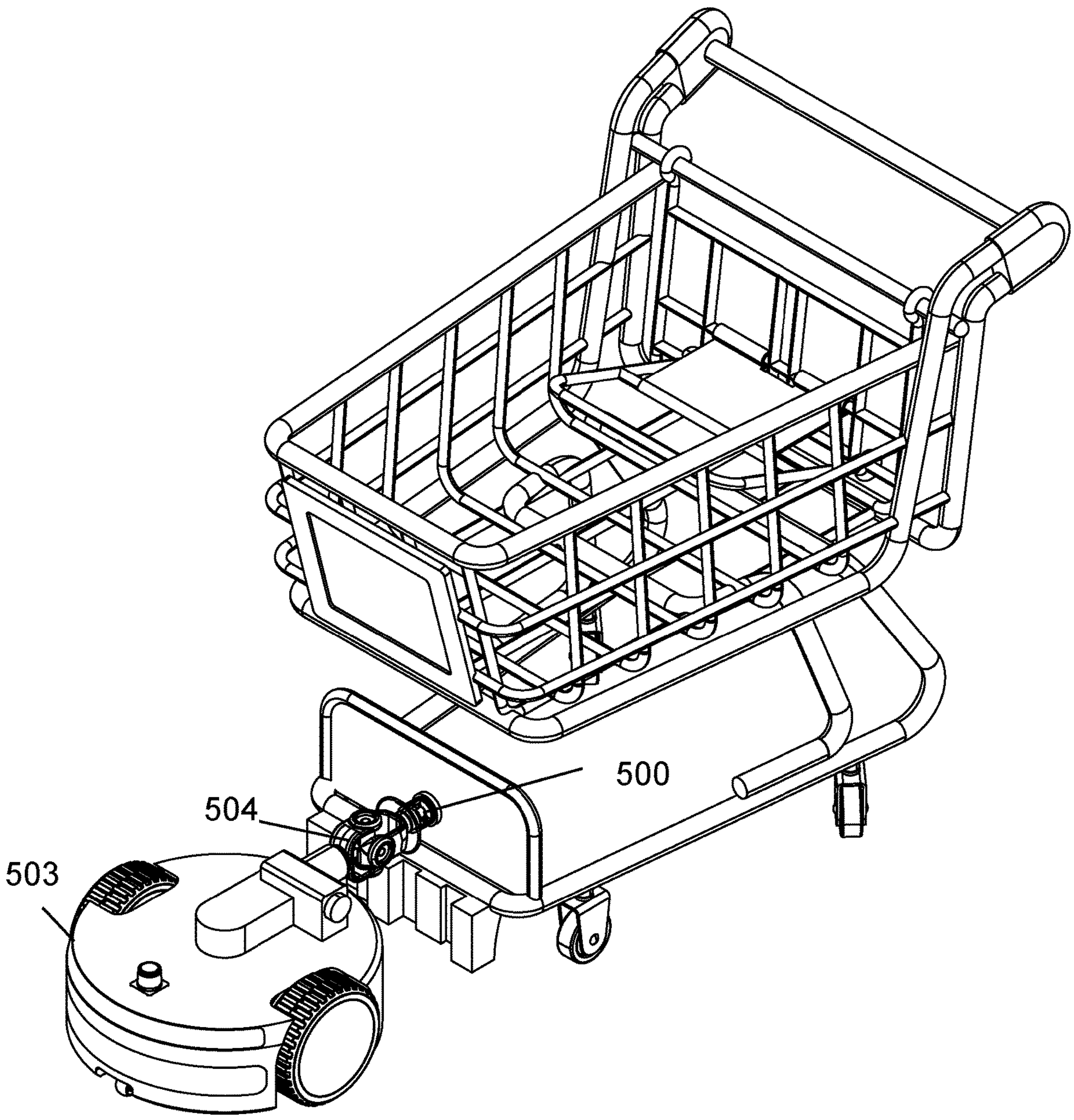
Figure 274I:
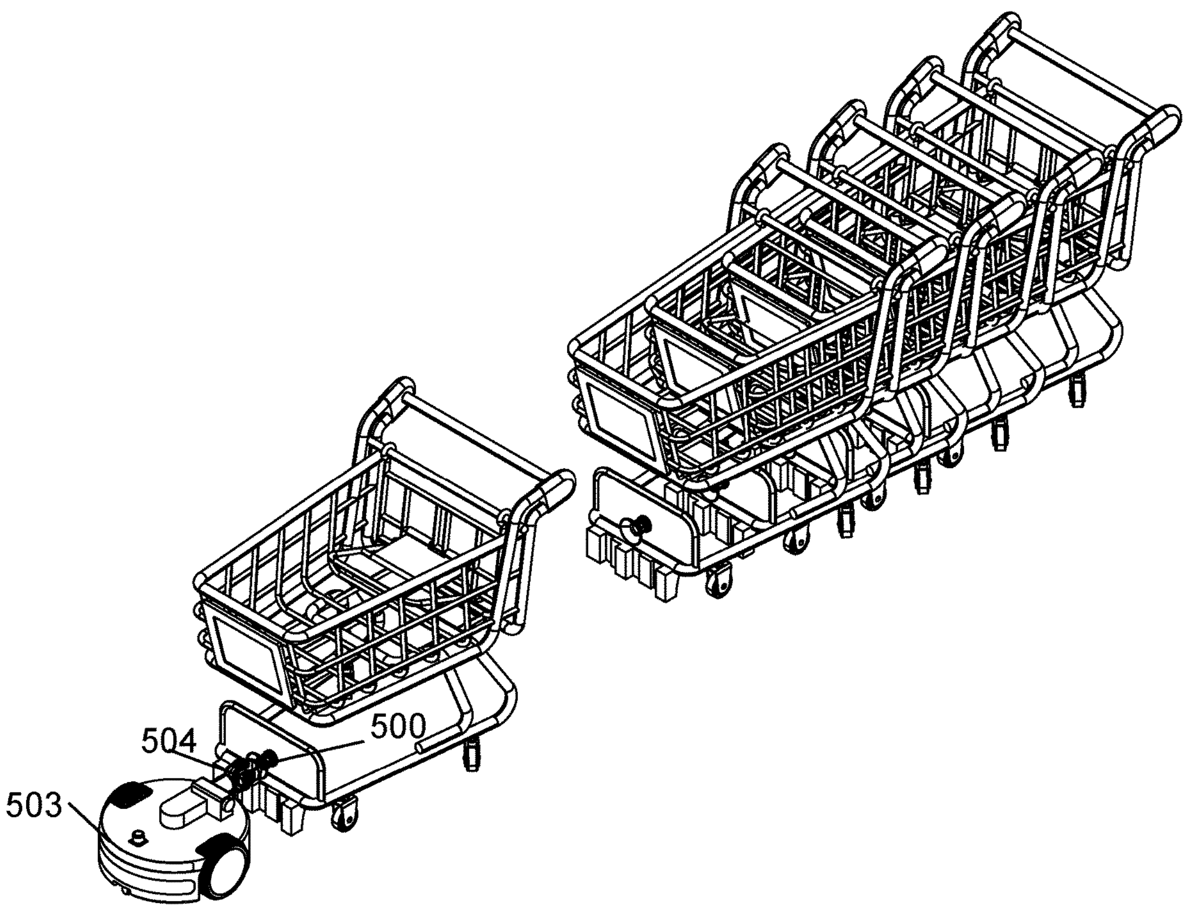
Figure 275A:
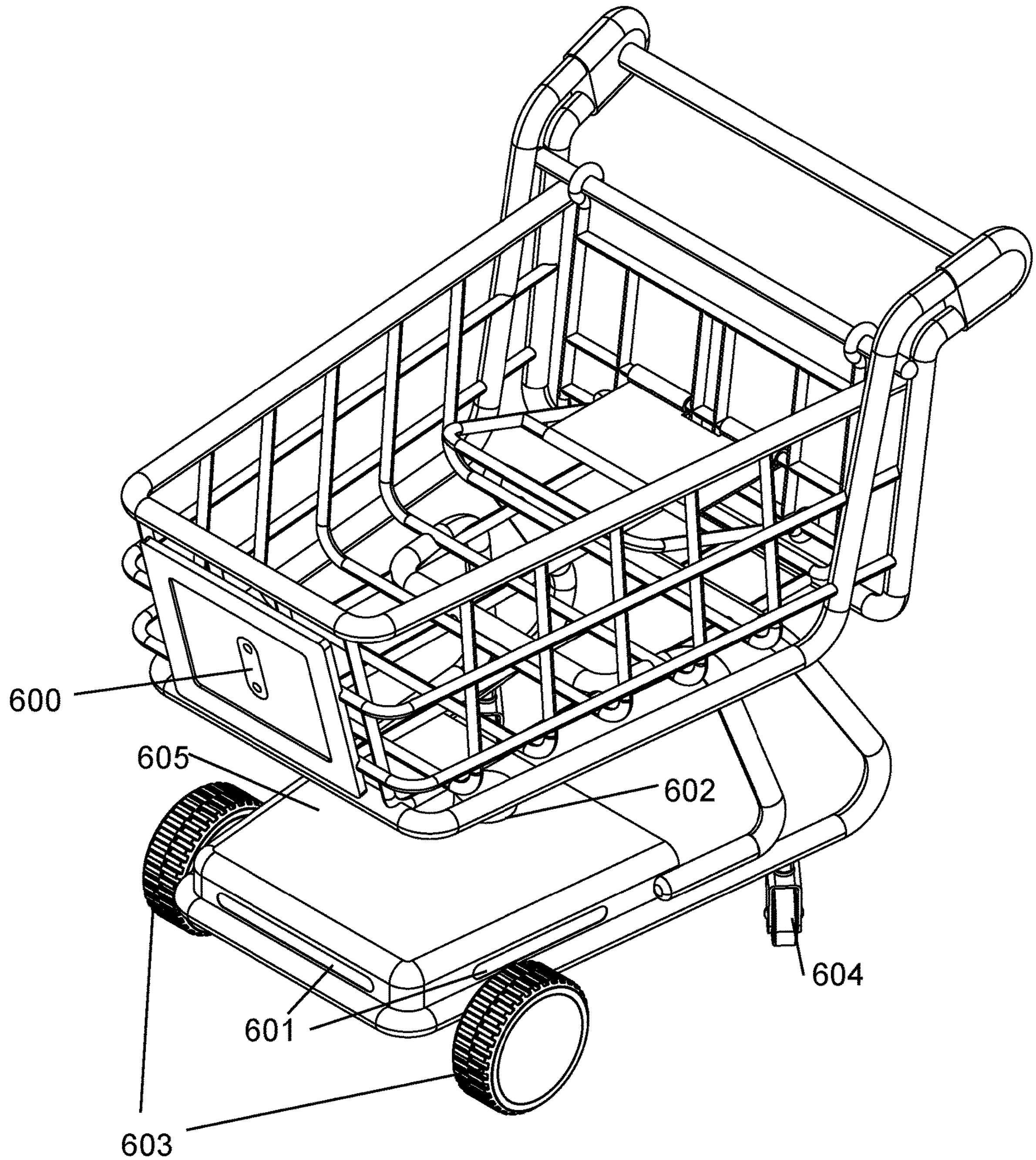
Figure 275B:
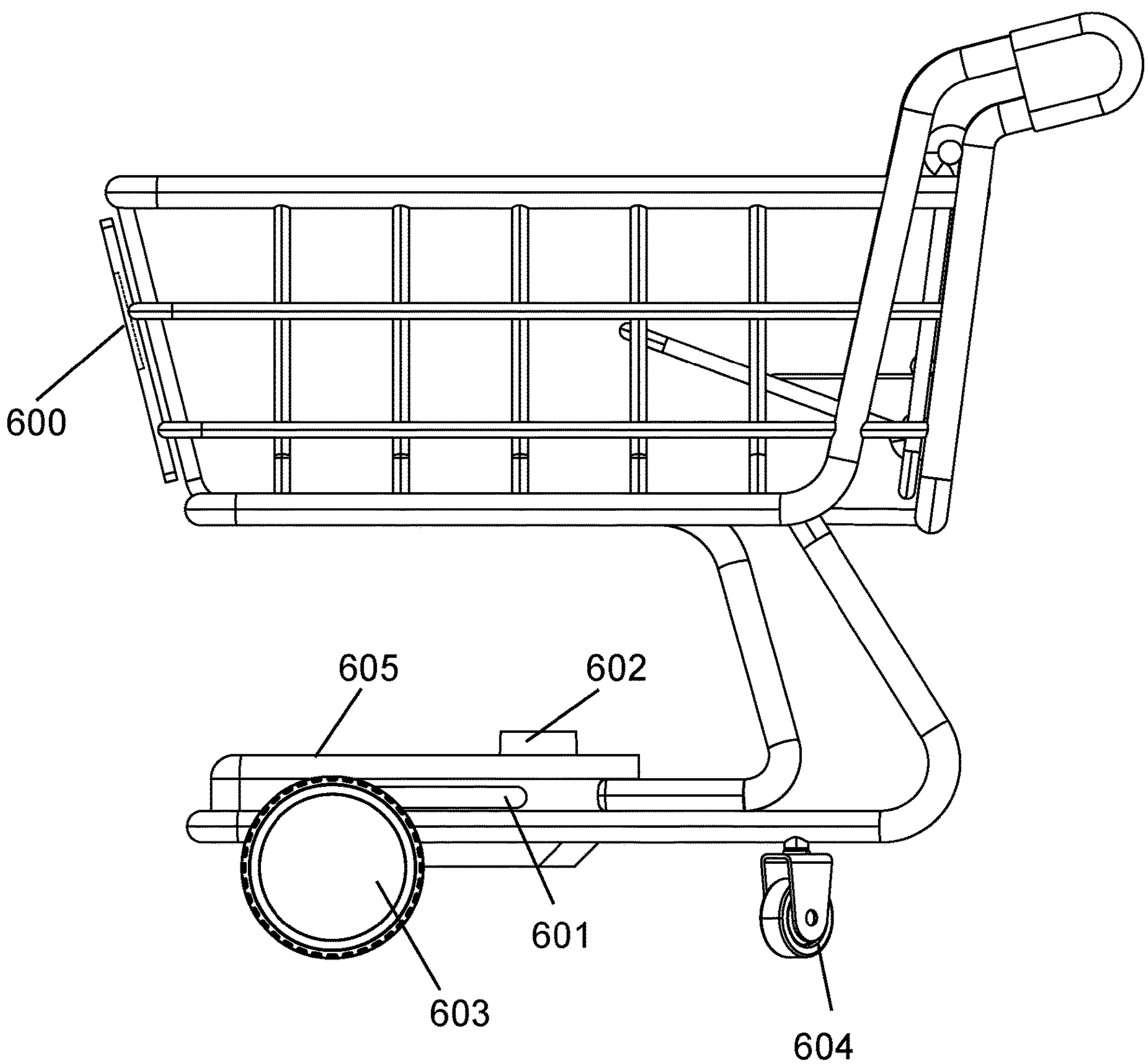

In another example, the robot may be a delivery robot that autonomously delivers items purchased by a user, such as food, groceries, clothing, electronics, sports equipment, etc., to the curbside of a store, a particular parking spot, a collection point, or a location specified by the user. In some cases, the user may use an application of a communication device to order and pay for an item and request pick-up (e.g., curbside) or delivery of the item (e.g., to a home of the user). In some cases, the user may choose the time and day of pick-up or delivery using the application. In the case of groceries, the robot may be a smart shopping cart and the shopping cart may autonomously navigate to a vehicle of the user for loading into their vehicle. Or, an autonomous robot may connect to a shopping cart through a connector, such that the robot may drive the shopping cart to a vehicle of a customer or a storage location. In some cases, the robot may follow the customer around the store such that the customer does not need to push the shopping cart while shopping. In some embodiments, the processor of the smart cart may identify the vehicle using imaging technology based on known features of the vehicle or the processor may locate the user using GPS technology (e.g., based on a location of a cell phone of the user). FIG. 274A illustrates an example of a shopping cart including a coupler arm receiver 500, caster wheels 501, and alignment component 502 including a particular indentation pattern. The indentation pattern of the alignment component 502 may be used by the processor of a robot to align and couple with the shopping cart. A light source of the robot may emit a laser line and a camera of the robot may capture images of the laser line projected onto objects. The processor of the robot may recognize alignment component 502 upon identifying a laser line in a captured image that corresponds with the indentation pattern of alignment component 502. The robot may then align with shopping cart and couple to the coupler arm receiver 500 of the shopping cart. FIGS. 274B and 274C illustrate side and front views of the shopping cart. FIG. 274D illustrates the robot 503 including a coupling arm 504, sensor window 505 behind which sensors for mapping and navigation are housed, LIDAR 506, drive wheels 507 and caster wheel 508. The indentation pattern 509 of alignment component 502 observed in a captured image of a line laser projected onto the alignment component 502 is also shown. FIGS. 274E-274G illustrates the process of connecting coupling arm 504 of the robot 503 to the coupling arm receiver 500 of the shopping cart. At a first step, the coupling arm 504 is inserted into the coupling arm receiver 500. A link 510 of the coupling arm 504 is in a first unlocked position within recess 511 of the coupling arm receiver 500. At a second step, the coupling arm 504 is rotated 90 degrees clockwise such that link 510 is in a second unlocked position within recess 511. At a third step, the robot 503 drives in a forward direction to move link 510 into a third locked position within recess 511. To decouple the coupling arm 504 from the coupling arm receiver 500 of the shopping cart, the steps are performed in reverse order. FIG. 274H illustrates the robot 503 pulling and driving the shopping cart (e.g., to a vehicle of a customer for curbside pickup of groceries). FIG. 274I illustrates the robot 503 retrieving or returning the shopping cart from a storage location of multiple shopping carts. FIGS. 275A and 275B illustrate an alternative example, wherein the shopping cart itself is a robot, i.e., a smart cart, including cameras 600, sensors windows 601 behind which proximity sensors are housed, LIDAR 602, drive wheels 603, caster wheels 604, and compartment 605 within which the electronic system of the shopping cart is housed (e.g., processor, memory, etc.).

In another example, the robot may be an autonomous versatile mobile robotic chassis that can be customized to provide a variety of different functions, as described in U.S. patent application Ser. Nos. 16/230,805, 16/578,549, and 16/411,771, the entire contents of which are hereby incorporated by reference. For example, the mobile robotic chassis may be customized to include a platform for transporting items, a cleaning tool for cleaning a surface (e.g., a vacuuming tool for vacuuming a surface or a mopping tool for mopping a surface), a shovel for plowing, a wheel lift for towing vehicles, robotic arms for garbage pickup, and a forklift for lifting vehicles. In some embodiments, the mobile robot chassis includes a loading and unloading mechanism for loading, transporting, and unloading passenger pods. In some embodiments, the mechanism for loading and unloading a pod to and from the mobile robotic chassis includes: a mobile robotic chassis with a front, rear and middle part wherein the middle part includes one or more pins on a front, back and top side, and wherein the front and rear part include a pair of wheels and one or more rails into which the one or more pins from the front and back side of the middle part fit; a pod including one or more rails on a bottom side; a transfer part including one or more pins on a front, back and top side, the one or more pins of the top side fitting into the one or more rails of the pod; a pod station with one or more rails into which the one or more pins on the front and back side of the transfer part fit. In some embodiments, the transfer part and the middle part of the mobile robotic chassis are exactly the same part and hence the distance between the rails on the front and rear parts of the mobile robotic chassis and the distance between the rails of the pod station are equal. In some embodiments, the front and rear parts of the mobile robotic chassis are configured such that two middle parts are slidingly coupled to the front and rear parts. In some embodiments, the pod is configured such that two middle parts are slidingly coupled to the bottom of the pod.

In some embodiments, the pod is slidingly coupled with the transfer part wherein one or more pins on a top side of the transfer part fit into one or more rails on a bottom side of the pod. In some embodiments, the transfer part is locked into place, such as in the center of the pod, such that it may not slide along the rails on the bottom side of the pod. In some embodiments, a locking mechanism includes locking pins driven by a motor connected to a gear box wherein locking pins are extended on either side of top pins of the transfer part. For example, the locking pins mechanism is implemented into the rails of the pod such that the locking pins extend through holes in the rails of the pod on either side of top pins of the transfer part to lock the transfer part in place relative to the pod. In some embodiments, the transfer part with coupled pod is slidingly coupled to a pod station wherein one or more pins on a front and back side of the transfer part fit into one or more rails of the pod station. In some embodiments, the transfer part is locked into place, such as in the center of the pod station, such that it may not slide along the rails of the pod station. In some embodiments, a locking mechanism includes locking pins driven by a motor connected to a gear box wherein locking pins are extended on either side of front and back pins of the transfer part. For example, the locking pins mechanism is implemented into the rails of the pod station such that locking pins extend through holes in the rails on either side of the front and back pins of the transfer part to lock the transfer part in place relative to the pod station. In some embodiments, the pod is located at a pod station when the pod is not required. In some embodiments, wherein the pod is required, the pod is loaded onto a mobile robotic chassis. In some embodiments, the mobile chassis includes a front and rear part with driving wheels and one or more rails, and a middle part with one or more pins on a front, back, and top side. The middle part is slidingly coupled with the front and rear parts wherein one or more pins of the front and back side fit into one or more rails of the front and rear part. In some embodiments, the mobile robotic chassis aligns itself adjacent to a pod station such that the pod can be loaded onto the mobile chassis when, for example, the pod is required for transportation of items and/or passengers. In some embodiments, the mobile robotic chassis is aligned with the pod station when the middle part of the mobile robotic chassis and the transfer part, and hence the rails of the mobile robotic chassis and pod station, are aligned with one another. In some embodiments, prior to loading the pod the middle part of the mobile robotic chassis is positioned towards the side of the mobile robotic chassis furthest away from the pod station. In some embodiments, the middle part is locked in place using similar mechanisms as described above. In some embodiments, the transfer part with locked-in pod slides along the rails of the pod station towards the mobile robotic chassis, and with the rails of the mobile robotic chassis aligned with those of the pod station, the pins of the transfer part with attached pod fit directly into the rails of front and rear parts of the mobile robotic chassis. In some embodiments, the pins on the front and back side of the transfer part retract when transferring from the pod station to the mobile robotic chassis and extend into the rails of the front and rear of the mobile robotic chassis once transferred to the mobile robotic chassis. In some embodiments, the pins on the top side of the middle part retract when transferring the pod from the pod station to the mobile robotic chassis and extend into the rails of the bottom of the pod once transferred to the mobile robotic chassis. In some embodiments, the middle part of the mobile robotic chassis and the transfer part are locked into place using similar mechanisms as described above. After the transfer is complete, the pod slides to either side such that it is aligned with the robotic chassis and is locked in place. In some embodiments, different locking mechanisms, such as those described above, are used to unlock/lock components that are slidingly coupled to one another such that components can freely slide relative to one another when unlocked and remain in place when locked.

In some embodiments, the pod is unloaded from the mobile robotic chassis when no longer required for use. In some embodiments, the mobile robotic chassis aligns itself adjacent to a pod station such that the pod can be loaded onto the pod station. In some embodiments, the pod slides towards the transfer part such that is it centrally aligned with the transfer part and is locked in place. The transfer part with pod slides along the rails of the mobile robotic chassis towards the pod station, and with the rails of the mobile robotic chassis aligned with those of the pod station, the pins of the transfer part with attached pod fit directly into the rails of the pod station. In some embodiments, the pins on the front and back side of the transfer part retract when transferring from the mobile robotic chassis to the pod station and extend into the rails of the front and rear of the pod station once transferred to the pod station. In some embodiments, the pins on the top side of the middle part retract when transferring the pod from the mobile robotic chassis to the pod station. In some embodiments, the transfer part is locked in place once the transfer is complete. In some embodiments, sets of rollers operated by one or more motors are used to force components to slide in either direction.

In some embodiments, pods and pod stations are located at homes of users or in public areas. In some embodiments, after unloading a pod at a pod station the mobile robotic chassis navigates to the closest or a designated mobile robotic chassis parking area or storage area or to a next pickup location. In some embodiments, the mobile robotic chassis recharges or refuels when the power remaining is below a predetermined threshold. In some embodiments, the mobile robotic chassis is replaced by another mobile robotic chassis when charging is required during execution of a task. In some embodiments, the mobile robotic chassis recharges or refuels at the nearest located recharging or refueling station or at a designated recharging station.

FIG. 276A illustrates an example of a front view of a pod 400 with transfer part 401. Transfer part 401 includes front pins 402, back pins (not shown) and top pins (not shown). FIG. 276B illustrates a perspective view of pod 400 with rails 403 on the bottom side of pod 400. Top pins of transfer part 401 fit within rails 403 such that transfer part 401 slides back and forth along rails 403. FIG. 276C illustrates a bottom view of pod 400 with rails 403 and rollers 404. Top pins of transfer part 401 fit into rails 403 such that transfer part 401 slides along rails 403. In some cases, rollers 404 are operated by a motor and when operated cause transfer part 401 to slide along rails 403. In some embodiments, the rollers in the rails of the pod have gear teeth and the top side of the top pins of the transfer part have gear grooves, such that the gear teeth of the rollers fit into the gear grooves of the top side of the top pins and when operated cause linear movement of the transfer part.

FIG. 277A illustrates an example of a pod station 500 with back rails 501 and front rails (not shown) within which back and front pins of a transfer part fit within such that the transfer part slides back and forth along front and back rails 501. FIG. 277B illustrates pod station 500 with transfer part 502 with pod 503 coupled to transfer part 502. FIG. 278 illustrates an example of a mobile robotic chassis 600 with front part 601, rear part 602 and middle part 603. Middle part 603 includes top pins 604, front pins (not shown) and back pins (not shown). Front and back pins of middle part 603 fit into front rails 605 and back rails 606 of front part 601 and rear part 603, respectively, such that middle part 603 slides along rails 605 and 606. Front part 601 and rear part 602 further include wheels 607.

Figure 279A:
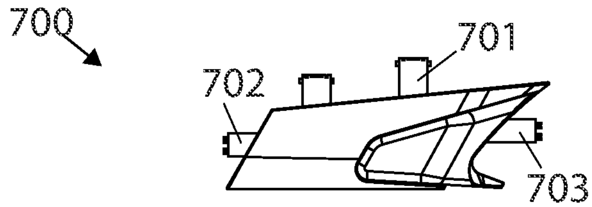
Figure 279B:
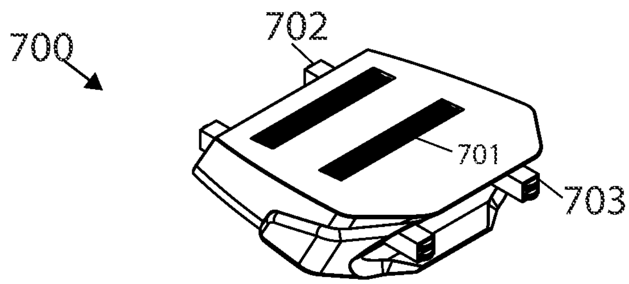
Figure 279C:
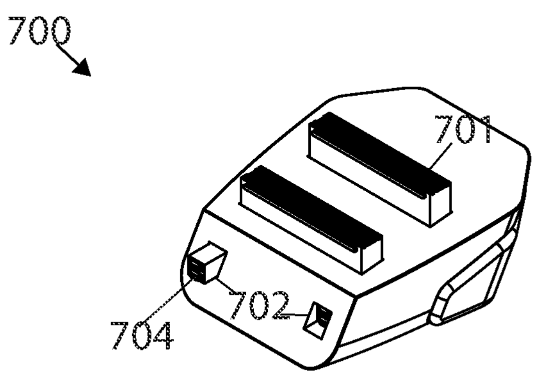
Figure 279D:
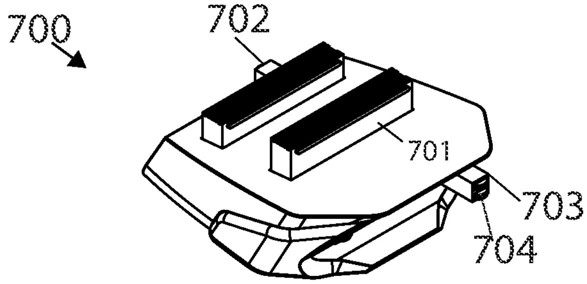

FIG. 279A illustrates an example of a middle or transfer part 700 (assuming they are the same design) with extended top pins 701, front pins 702 and back pins 703. Top pins 701, front pins 702 and back pins 703 are retracted in some instances. For example, front pins 702 and back pins 703 are retracted when transferring transfer part 700 with coupled pod from a pod station to a mobile chassis or top pins 701 of middle part 700 are retracted when transferring a pod on top of middle part 700. FIG. 279B illustrates an example of a middle or transfer part 700 (assuming they are the same design) with retracted top pins 701. FIG. 279C illustrates an example of a middle or transfer part 700 (assuming they are the same design) with one retracted and one extended front pin 702. FIG. 279D illustrates an example of a middle or transfer part 700 (assuming they are the same design) with one retracted and one extended back pin 703. Once transfer is complete, the pins are extended once again such that they fit into a set of rails. Front pins 702 and back pins 703 include rollers 704 operated by a motor. When rollers 704 are operated they cause transfer part 700 to slide along the rails of a pod station or mobile robotic chassis. In some embodiments, the rollers of the transfer part have gear teeth and the rails of the pod station and mobile robotic chassis have gear grooves, such that the gear teeth of the rollers fit into the gear grooves of the rail and when operated cause linear movement of the transfer part.

Other methods for loading and unloading the pod to and from the mobile robotic chassis can be used. For example, in some embodiments, the mobile robotic chassis aligns itself adjacent to a pod station such that the pod can be loaded onto the mobile robotic chassis. In some embodiments, the mobile robotic chassis is aligned with the pod station when the middle part of the mobile robotic chassis and the transfer part, and hence the rails of the mobile robotic chassis and pod station, are aligned with one another. In some embodiments, prior to loading the pod the middle part of the mobile robotic chassis is positioned towards the side of the mobile robotic chassis closest to the pod station. In some embodiments, the pod, initially centrally aligned with the transfer part, slides towards the mobile robotic chassis such that the transfer part and the middle part of the mobile robotic chassis are both positioned beneath the pod. In some embodiments, the pins on the top side of the middle part retract when transferring the pod onto the middle part and extend into the rails of the bottom of the pod once positioned on top of the transfer part and middle part. In some embodiments, the pod is locked in place. In some embodiments, the middle part of the mobile robotic chassis and the transfer part slide towards the mobile robotic chassis such that both are coupled to the front and rear parts of the mobile robotic chassis and the pod is centrally aligned with the mobile robotic chassis. In some embodiments, the pins on the front and back side of the transfer part retract when transferring from the pod station to the mobile robotic chassis and extend into the rails of the front and rear of the mobile robotic chassis once transferred to the mobile robotic chassis. In some embodiments, the middle part of the mobile robotic chassis and the transfer part are locked in place. In some embodiments, different locking mechanisms, such as those described above, are used to unlock/lock components that are slidingly coupled to one another such that components freely slide relative to one another when unlocked and remain in place when locked (e.g., transfer part relative to pod station or mobile robotic chassis, middle part relative to mobile robotic chassis, transfer part relative to pod). In some embodiments, the pod is unloaded from the mobile robotic chassis when no longer required for use. In some embodiments, the mobile robotic chassis aligns itself adjacent to a pod station such that the pod can be loaded onto the pod station. In some embodiments, the transfer part and middle part of the robotic chassis, to which the pod is locked, slide in a direction towards the pod station until the transfer part is coupled and centrally aligned with the pod station. In some embodiments, the transfer part is locked in place. In some embodiments, the pod slides towards the pod station until centrally aligned with the pod station and is locked in place. After unloading the pod at the pod station the mobile robotic chassis navigates to the closest or a designated parking area or to a next pickup location. In some embodiments, sets of rollers operated by one or more motors are used to force components to slide in either direction. In some embodiments, a pod is unloaded from a robotic chassis using an emergency button or switch within the pod.

Figure 280B:
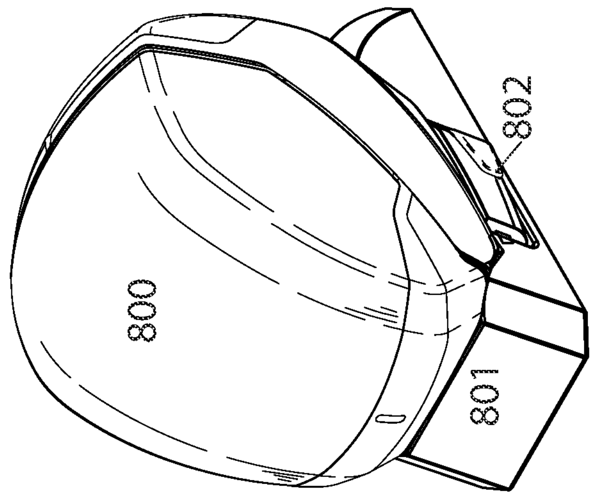
Figure 280A:
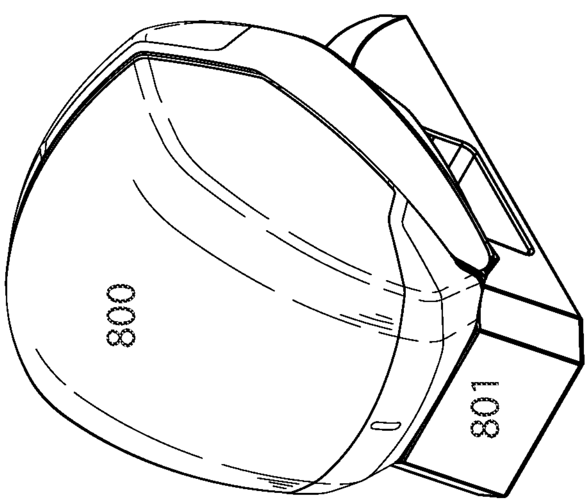
Figure 280D:
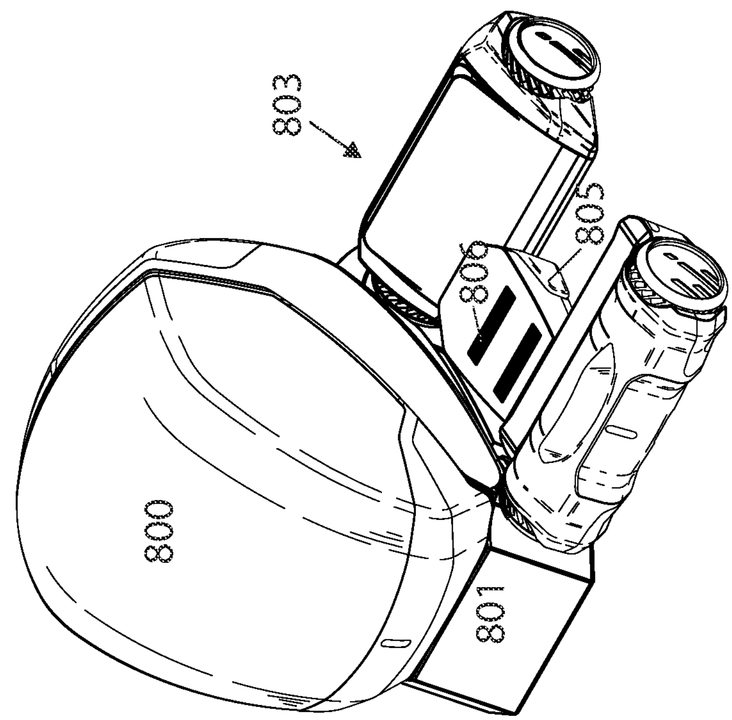
Figure 280C:
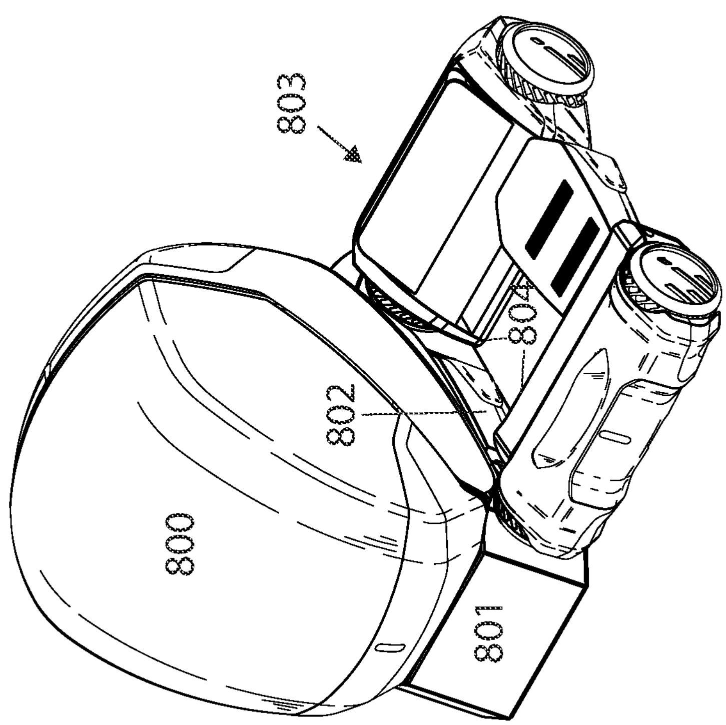
Figure 280E:
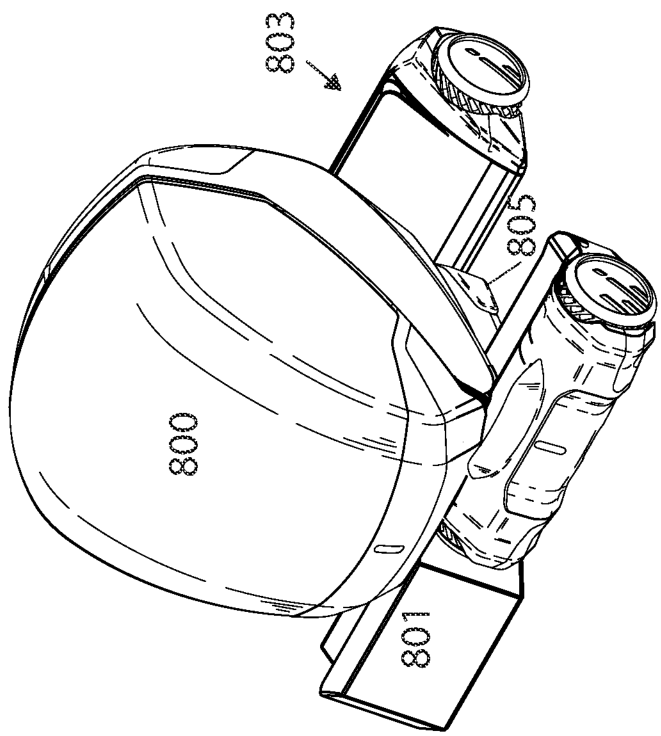
Figure 280F:
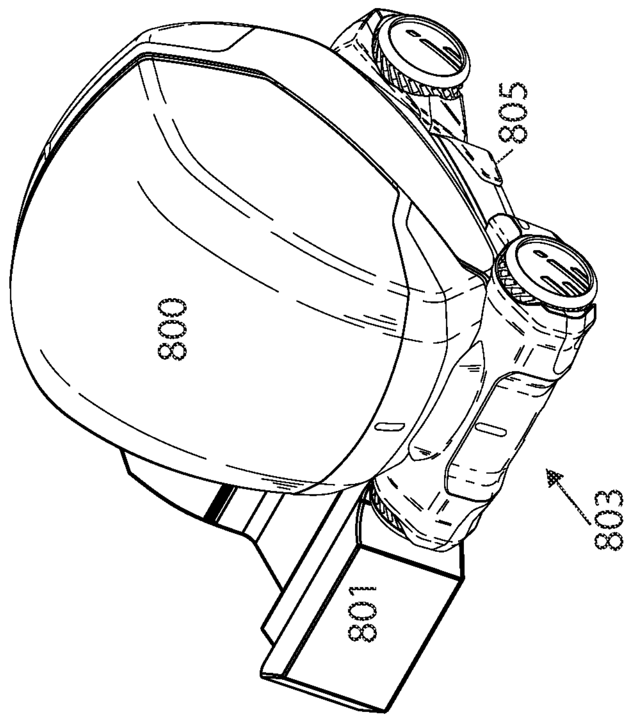
Figure 280G:
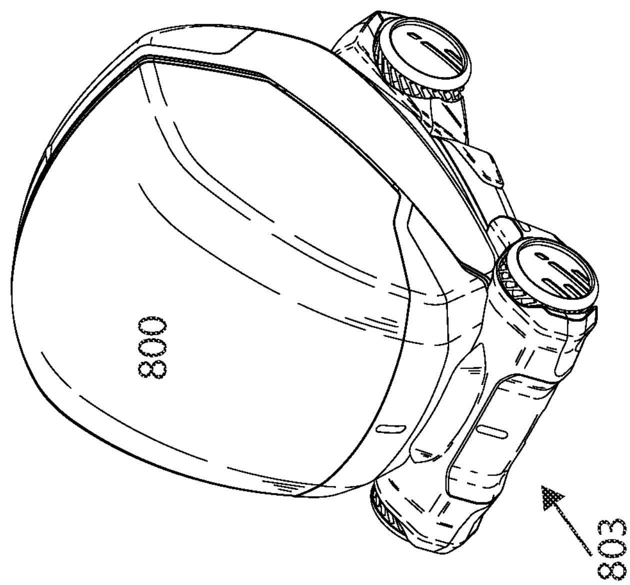

FIGS. 280A-280F illustrate an example of a sequence of steps for loading a pod onto a mobile robotic chassis. In FIG. 280A pod 800 is initially docked at pod station 801. A transfer part (not shown) is coupled to pod 800, the pins of which fit within rails on the bottom of pod 800 (not shown) such that the transfer part can slide back and forth along the rails of pod 801. In this position, the transfer part is positioned at the center of pod 800 and is locked in place. In FIG. 280B, transfer part 802 is unlocked and is moved as far as possible to one side of pod station 800 using, for example, rollers powered by a motor. Transfer part 802 is locked in place. In FIG. 280C, mobile robotic chassis 803 aligns with pod station 801 on the side closest to transfer part 802 to prepare for loading pod 800 onto mobile robotic chassis 803. The rails of pod station 801 (not shown) and rails 804 of mobile robotic chassis 803 align with one another. In FIG. 280D, middle part 805 of mobile robotic chassis 803 is unlocked and moved as far as possible in a direction towards transfer part 802 (not shown) and is locked in place. Middle part 805 can be moved in a similar way as transfer part 802. Top pins 806 of middle part 805 are retracted to prepare for loading of pod 800. In FIG. 280E, pod 800 is moved in a direction towards middle part 805 such that pod 800 is equally supported by transfer part 802 (not shown) and middle part 805. Once in place, top pins of middle part 805 are extended and pod 800 is locked in place. In FIG. 280F, transfer part 802 (not shown) and middle part 805 simultaneously move in a direction away from pod station 801 until pod 800 has been loaded onto mobile robotic chassis 803. Front and back pins of transfer part 802 (not shown) are retracted one by one as transfer part 802 is transferred from pod station 501 to mobile robotic chassis 803. Once each pin of transfer part 802 is adjacent with a rail of mobile robotic chassis 803 they are extended once again. In FIG. 280G, pod 800 is loaded onto mobile robotic chassis 803 and is used for, for example, transportation of items or humans or animals. In this example, transfer part 802 and middle part 805 are of the same design, however, in other embodiments they can be of different design. In other embodiments, different types loading and unloading mechanisms can be used, as described in U.S. patent application Ser. Nos. 16/230,805, 16/578,549, and 16/411,771, the entire contents of which are hereby incorporated by reference.

In some embodiments, a pod is transferred from one robotic chassis to another while stationary or while operating using similar loading and unloading mechanisms described above. In some embodiments, a first mobile robotic chassis with a pod, the pod being coupled to a transfer part coupled to the front and rear of the robotic chassis, aligns adjacent to a second mobile robotic chassis. In some embodiments, the first mobile robotic chassis is aligned with the second mobile robotic chassis when the middle part of the first mobile robotic chassis and the middle part of the second mobile robotic chassis, and hence the rails of the first mobile robotic chassis and second mobile robotic chassis, are aligned with one another. In some embodiments, the transfer part coupled to the pod slides along the rails of the first mobile robotic chassis towards the second mobile robotic chassis until the transfer part is coupled to front and rear rails of the second mobile robotic chassis. In some embodiments, the first mobile robotic chassis with pod is low on battery at which point the second mobile robotic chassis aligns itself with the first mobile robotic chassis to load the pod onto the second mobile robotic chassis and complete the transportation. In some embodiments, the first pod with low battery navigates to the nearest charging station or a designated charging station.

In some embodiments, a first robotic chassis transfers a component to a pod on a second robotic chassis or to the second robotic chassis while the second robotic chassis is moving or static. For example, a first robotic chassis may carry and transport detachable passenger pod wings for flying. A second robotic chassis with a passenger pod may be driving within the environment. The passenger may use an application to request passenger pod wings. A control system may transmit the request to the first robotic chassis, including a continuously updated location of the second robotic chassis. The first robotic chassis may navigate to the location of the second robotic chassis, align the front of the first robotic chassis with the rear of the second robotic chassis while both chassis are moving, and may attach the passenger pod wings to the pod on the second robotic chassis. Once the passenger pod wings are attached they may expand from a contracted and compacted state and the passenger pod may decouple from the second robotic chassis and take off for flight. After completing their flight, the passenger may request for landing at a particular location or a current location. The control system may transmit the request to the second robotic chassis or to another robotic chassis, including the location for landing. The second robotic chassis may navigate to the landing location and while driving, the pod may land on and couple to the second robotic chassis. The first robotic chassis or another robotic chassis may then align with the second robotic chassis once again and remove the passenger pod wings from the pod.

In some embodiments, the size of a mobile robotic chassis is adjusted such that two or more pods can be transported by the robotic chassis. In some embodiments, pods are of various sizes depending on the item or number of persons to be transported within the pods. In some embodiments, robotic chassis are of various sizes to accommodate pods of various sizes. In some embodiments, two or more pods link together to transport larger items and the required number of mobile robotic chassis are coupled to the two or more linked pods for transportation. In some embodiments, two or more mobile robotic chassis link together to form a larger vehicle to, for example, transport more items or passengers or larger items. In some embodiments, pods and/or mobile robotic chassis temporarily link together during execution of a task for, for example, reduced power consumption (e.g., when a portion of their paths are the same) or faster travel speed. In some embodiments, two or more robotic chassis without loaded pods stack on top of one another to minimize space (e.g., when idle or when a portion of their routes match). In some embodiments, the two or more robotic chassis navigate to a stacking device capable of stacking robotic chassis by, for example, providing a lift or a ramp.

In some embodiments, an application of a communication device is paired with a control system that manages multiple mobile robotic chassis. In some embodiments, the application of the communication device is paired with a robotic chassis upon loading of a pod or selection of the robotic chassis to provide the service. In some embodiments, a pod is paired with a robotic chassis upon loading. Examples of communication devices include, but are not limited to, a mobile phone, a tablet, a laptop, a remote control, and a touch screen of a pod. In some embodiments, the application of the communication device transmits a request to the control system for a mobile robotic chassis for a particular function (e.g., passenger pod transportation, driving service, food delivery service, item delivery service, plowing service, etc.). For example, the application of the communication device requests a mobile robotic chassis for transportation of persons or items (e.g., food, consumer goods, warehouse stock, etc.) in a pod (i.e., a driving service) from a first location to a second location. In another example, the application of the communication requests snow removal in a particular area at a particular time or garbage pickup at a particular location and time or for a vehicle tow from a first location to a second location immediately. In some embodiments, the application of the communication device is used to designate a pickup and drop off location and time, service location and time, service type, etc. In some embodiments, the application of the communication device is used to set a schedule for a particular function. For example, the application of the communication device is used to set a schedule for grocery pickup from a first location and delivery to a second location every Sunday at 3 pm by a robotic chassis customized to transport items such as groceries. In some embodiments, the application of the communication device provides information relating to the robotic chassis performing the function such as battery level, average travel speed, average travel time, expected travel time, expected arrival time to a pod station for pod pickup, expected arrival time to a final destination, navigation route, current location, drop off location, pick up location, etc. In some embodiments, some parameters are modified using the application of the communication device. For example, a navigation route or travel speed or a delivery location of a robotic chassis delivering food is modified using the application of the communication device. In some embodiments, the current location, pickup location, expected pickup time, drop off location, expected drop off time, and navigation route of the mobile robotic chassis is viewed in a map using the application of the communication device. In some embodiments, the application also provides an estimated time of arrival to a particular location and cost of the service if applicable. In some embodiments, the application of the communication device is a downloaded application, a web application or a downloaded software. FIG. 281 illustrates an example of a communication device 1100 with graphical user interface 1101 that a user may use to adjust settings of or provide instructions to a mobile robotic chassis or pod. Communication device 1100 may be paired and communicate with a pod, robotic chassis or control system.

In some embodiments, the application of the communication device is used to request a robotic chassis customized for transportation of pods within which persons or items are transported. In some embodiments, a nearby robotic chassis is requested to meet at a location of the pod (e.g., a garage, a designated parking area, etc.) given the particular address. In some embodiments, persons navigate the robotic chassis from within the pod while in other embodiments, the robotic chassis autonomously navigates. In one example, the mobile robotic chassis leaves a parking area and navigates to a location of a pod, loads the pod (with passengers) onto the chassis, transports items or passengers within the pod to a pod station close to the requested drop off location, then navigates back to the parking area and autonomously parks. In another example, the robotic chassis leaves its designated parking area and navigates to a location of a pod, loads the pod (with passengers) onto the chassis from a pod station, transports passengers within the pod to a pod station close to a requested parking area, unloads the pod into the pod station, and navigates back to its designated parking area (or closest robotic chassis parking area) until requested for another task. In some cases, the mobile robotic chassis may not unload the pod at a final destination and may wait until the passenger returns, then transports the passenger to another destination (e.g., back to their home where the mobile robotic chassis initially loaded the pod from). In some embodiments, robotic chassis are permanently equipped with pods for transportation of items or persons. In some embodiments, robotic chassis load a pod along their route to a requested pickup location if the person requesting the pickup does not own their own pod and pod station. In some embodiments, robotic chassis load the nearest available pod located along a route to the pickup location in cases where a user does not have a personal pod at their home. In some embodiments, wherein all pods along a route to the pickup location are unavailable or nonexistent, the route is altered such that the mobile robotic chassis passes a location of the nearest available pod. In some embodiments, the application of the communication device is used to select one or more pick up or drop off locations and times, travel speed, audio level, air temperature, seat temperature, route, service schedule, service type, etc. In some embodiments, the application of the communication device provides information such as the payload, battery level, wheel pressure, windshield washer fluid level, average travel speed, current speed, average travel time, expected travel time, navigation route, traffic information, obstacle density, etc. In some embodiments, the mobile robotic chassis includes a user activated voice command such that operational commands, such as those related to direction, speed, starting and stopping, can be provided verbally.

In some embodiments, a mobile robotic chassis completes a service or task when completion of the service or task is confirmed by the application of the communication device. In some embodiments, a mobile robotic chassis completes a service or task when completion of the service or task is confirmed by activating a button or switch positioned on the robotic chassis. In some embodiments, a mobile robotic chassis completes a service or task when completion of the service or task is confirmed by scanning of a barcode positioned on the robotic chassis whereby the scanner communicates the completion to a processor of the robotic chassis or a control system managing the robotic chassis (which then relays the information to the processor of the robotic chassis). In some embodiments, a processor of mobile robotic chassis or a control system managing a mobile robotic chassis autonomously detects completion of a task or service using sensors, such as imaging devices (e.g., observing position at a particular location such as tow yard), weight sensors (e.g., delivery of persons or items is complete when the weight has decreased by a particular amount), and inertial measurement units (e.g., observing coverage of roads within a particular area for tasks such as snow plowing or sweeping). In some embodiments, a processor of mobile robotic chassis or a control system managing a mobile robotic chassis autonomously detects completion of a task or service after being located at a final drop off location for a predetermined amount of time.

In some embodiments, a control system manages mobile robotic chassis (e.g., execution tasks and parking in parking areas) within an environment by monitoring and providing information and instructions to all or a portion of mobile robotic chassis. In some embodiments, the control system receives all or a portion of sensor data collected by sensors of a mobile robotic chassis from a processor of the mobile robotic chassis and from sensors fixed within the environment. In some embodiments, sensor data includes (or is used by the control system to infer) environmental characteristics such as road conditions, weather conditions, solar conditions, traffic conditions, obstacle density, obstacle types, road type, location of perimeters and obstacles (i.e., a map), and the like. In some embodiments, sensor data includes (or is used by the control system to infer) information relating to the function and operation of a robotic chassis such as the weight of any transported item or person, number of items being transported, travel speed, wheel conditions, battery power, solar energy, oil levels, wind shield fluid levels, GPS coordinates, fuel level, distance travelled, vehicle status, etc. In some embodiments, the control system receives information for all or a portion of robotic chassis within the environment relating to a current operation being executed, upcoming operations to execute, scheduling information, designated storage or parking location, and hardware, software, and equipment available, etc. from processors of all or a portion of robotic chassis.

In some embodiments, the control system evaluates all or a portion of sensor data received and all or a portion of information pertaining to the mobile robotic chassis in choosing optimal actions for the robotic chassis and which robotic chassis is to respond to a request (e.g., for passenger pod pickup and transportation to a destination). For example, a control system managing mobile robotic chassis customized to transport passenger pods receives wheel condition information indicating a tire with low pressure from a processor of a mobile robot chassis transporting passengers in a passenger pod. The control system determines that the robotic chassis cannot complete the transportation and instructs the robotic chassis to stop at a particular location and instructs another available nearby robotic chassis to load the pod and pick up the passengers at the particular location and complete the transportation. In another example, a control system instructs a processor of a mobile robotic chassis to modify its route based on continuous evaluation of traffic data received from various sensors of mobile robotic chassis and fixed sensors within the environment. In another instance, a control system instructs a processor of a mobile robotic chassis to modify its route based on continuous evaluation of road condition data received from various sensors of mobile robotic chassis and fixed sensors within the environment.

In some embodiments, the control system receives all or a portion of requests for mobile robotic chassis services from, for example, an application of a communication device paired with the control system, and instructs particular mobile robotic chassis to respond to the request. For example, the application of the communication device requests the control system to provide instructions to a mobile robotic chassis to plow a driveway at a particular location on Monday at 1 pm. In another example, the application of the communication device requests the control system to provide immediate instruction to a mobile robotic chassis to pick up an item at a provided pick up location and drop off the item at a provided drop off location and to drive at a speed of 60 km/h when executing the task. In some embodiments, the control system instructs the closest mobile robotic chassis equipped with the necessary battery level and hardware, software and equipment to complete the task or service. In some embodiments, the control system instructs mobile robotic chassis to park in a particular parking area after completion of a task. In some embodiments, the application of the communication device is used to monitor one or more robotic chassis managed by the control system. In some embodiments, the application of the communication device is used to request the control system to provide instructions to or modify settings of a particular mobile robotic chassis.

In some embodiments, the control system has an action queue for each mobile robotic chassis that stores a sequence of actions to be executed (e.g., drive to a particular location, load/unload a particular pod, charge battery, etc.). In some embodiments, the control system iterates in a time step manner. In some embodiments, the time step structure, in the particular case of a control system managing robotic chassis customized to transport pods, includes: checking, for running tasks, if corresponding pods are at their final destination, and if so, removing the tasks, and finding suitable robotic chassis for pods corresponding to new tasks, and adding the required actions to the suitable chassis action queues (e.g. drive to pod, load the pod, drive to final destination, and unload pod); checking the top of the action queue for all robotic chassis and if the action is to load/unload a pod, executing the action; handling special cases such as, robotic chassis with low battery level, critical battery level, or idle; computing a next action for robotic chassis that have a driving action at the top of their queue; and, checking the top of the action queue for all robotic chassis and if the action is to load/unload a pod, executing the action. In some embodiments, similar time step structure is used for robotic chassis customized for other functions.

In some embodiments, the control system uses a graph $G=(V, E)$ consisting of a set of nodes $V$ and a set of edges $E$ to compute the next action for a robotic chassis that has a driving action at the top of their queue. Nodes represent locations within the environment and are connected by edges, the edges representing a possible driving route from one node to another. In some embodiments, the control system uses an undirected graph wherein edges have no orientation (i.e., the edge $(x, y)$ is identical to the edge $(y, x)$), particularly in cases where all roads in the environment are two-way. In some cases, not all roads are two-way (e.g. one-ways), therefore, in some embodiments, the control system uses a directed graph where directed edges indicate travel in one direction (i.e. edge $(x, y)$ allows travel from node $x$ to $y$ but not vice versa). In some embodiments, the control system assigns each edge a weight corresponding to the length of the edge. In some embodiments, the control system computes the next driving action of a robotic chassis navigating from a first location to a second location by determining the shortest path in the directed, weighted graph. In other embodiments, the weight assigned to an edge depends on one or more other variables such as, traffic within close proximity of the edge, obstacle density within close proximity of the edge, road conditions, number of available charged robotic chassis within close proximity of the edge, number of robotic chassis with whom linking is possible within close proximity of the edge, etc.

In some embodiments, the control system uses the number of robotic chassis with whom linking is possible in determining the next driving action of a robotic chassis as linking multiple chassis together reduces battery consumption and travel time. Further, reduced battery consumption increases the range of the linked robotic chassis, the availability of robotic chassis, and the number of pod transfers between robotic chassis. Thus, in some situations a slightly longer (time and distance) route is preferable. In some embodiments, the control system estimates battery consumption. For example, the control system may use a discount factor $\alpha(n)$, wherein n represents the number of chassis linked. The discount factor for different numbers of linked robotic chassis may be provided by $$\alpha(n) = \begin{cases} 1, \text{ if } n = 1 \\ 0.8, \text{ if } n = 2 \\ 0.6, \text{ if } n = 3 \end{cases}.$$

Therefore, for two robotic chassis linked together (n=2), the battery consumption of each chassis is only 80% the normal battery discharge. In some embodiments, the control system solves the optimal route for reducing battery consumption using the strong product of graph G. In other embodiments, the control system checks the vicinity of a robotic chassis for other robotic chassis navigating in a similar direction. In some embodiments, the control system links two robotic chassis if the two are located close to one another and either their destinations are located close to one another, or the destination of one robotic chassis lies close to the travel path of the other robotic chassis. In some embodiments, the control system selects the next driving action of the robotic chassis to be along the edge that results in the minimum of the sum of distances to the destination from all edges of the current node. In some embodiments, the control system instructs the robotic chassis to unlink if the next action increases the distance to the destination for either robotic chassis.

In some embodiments, the control system computes a distance table including distances between all nodes of the graph and the control system chooses moving a robotic chassis to a neighbour node of the current node that minimizes the distance to the destination as the next driving action of the robotic chassis. In some embodiments, assuming all edge lengths are equal, the control system determines if a first robotic chassis waits for a second robotic chassis to form a link if they are within a predetermined distance from one another by: checking, when the distance between the robotic chassis is zero, if there is a neighbor node for which the distances to respective destinations of both robotic chassis decreases, and if so, linking the two robotic chassis; checking, when the distance between the two robotic chassis is one edge length, if the final destination of the first robotic chassis is roughly in the same direction as the final destination of the second robotic chassis by checking if the first robotic chassis has a neighbor node towards its final destination which also decreases the distance to the destination of the second chassis, and if so, instructing the first robotic chassis to wait for the second robotic chassis to arrive at its node, the second robotic chassis to travel to the node of the first robotic chassis and both robotic chassis to link; and, checking, when the distance between the two robotic chassis is two edge lengths, if the first robotic chassis is located along a path of the second robotic chassis, and if so, instructing the first robotic chassis to wait for the second robotic chassis to arrive at its node and both robotic chassis to link.

In some embodiments, the control system specifies the route of a mobile robotic chassis by a list of nodes that each robotic chassis passes to reach its final destination. In some embodiments, the control system chooses edges between nodes with shortest length as the driving path of the robotic chassis. In some embodiments, the control system composes route plans of robotic chassis such that they share as many edges as possible and therefore can link for travelling along shared driving paths to save battery and reduce operation time. For example, a first robotic chassis drives from node X to node Y via nodes L1 and L2 and a second robotic chassis drives from node Z to node U via nodes L1 and L2. In this example, the first and second robotic chassis link at node L1, drive linked along the edge linking nodes L1 and L2, then unlink at node L2 and the first robotic chassis drives to node Y while the second robotic chassis drives to node U. FIG. 282 illustrates paths of three robotic chassis initially located at nodes 1200 (X), 1201 (Z), and 1202 (V) with final destination at nodes 1203 (Y), 1204 (U), and 1205 (W), respectively. The robotic chassis initially located at nodes 1201 (Z) and 1202 (V) link at node 1206 (L3) and travel linked to node 1207 (L1). At node 1207 (L1), the robotic chassis initially located at node 1200 (X) links with them as well. All three linked robotic chassis travel together to node 1208 (L2), at which point the three robotic chassis become unlinked and travel to their respective final destinations.

In some embodiments, the control system minimizes a cost function to determine a route of a robotic chassis. In some embodiments, the cost function accounts for battery consumption and time to reach a final destination. In some embodiments, the control system may determine the cost C(S) of travelling along route S using $C(S)=\Sigma_{(x\rightarrow y)\in S}c(x\rightarrow y)+\beta\Sigma_{i\ chassis}\Delta t_i$ and $c(x\rightarrow y)=n\alpha(n)d(x, y)\gamma$, wherein $c(x\rightarrow y)$ is the cost of travelling along an edge from a first node x to a second node y, n is the number of chassis linked together, $\alpha(n)$ is the discount factor for battery discharge, d (x, y) is the length of the edge, $\gamma$ is a constant for battery discharge per distance unit, $\beta$ is a weight, $\Delta t_i$ is the time difference between the time to destination for linked chassis and the individual chassis i. In some embodiments, the control system uses individual weights $\beta_i$ with values that, in some instances, are based on travel distance. In some embodiments, the control system uses non-linear terms in the cost function. In some embodiments, the control system minimizes the cost function C(S).

In some embodiments, the control system initially chooses a route and identifies it as a current route. In some embodiments, the control system evolves the current route, and if the evolved route has a smaller cost than the current route, the evolved route becomes the current route and the previous current route is discarded. In some embodiments, the evolution of a route includes: merging driving segments of robotic chassis by finding overlaps in driving segments in a current route graph and identifying nodes where robotic chassis can link and drive the overlapping segment together and unlink; unlinking segments when, for example, a new robotic chassis begins a task nearby and splitting the robotic chassis into two groups provides more efficient routing; and, considering neighbouring nodes of start and end nodes of segments as the start and end nodes of the segments to determine if the cost lowers. In some embodiments, the control system iterates through different evolved routes until a route with a cost below a predetermined threshold is found or for a predetermined amount of time. In some embodiments, the control system randomly chooses a route with higher cost to avoid getting stuck in a local minimum.

Figure 283B:
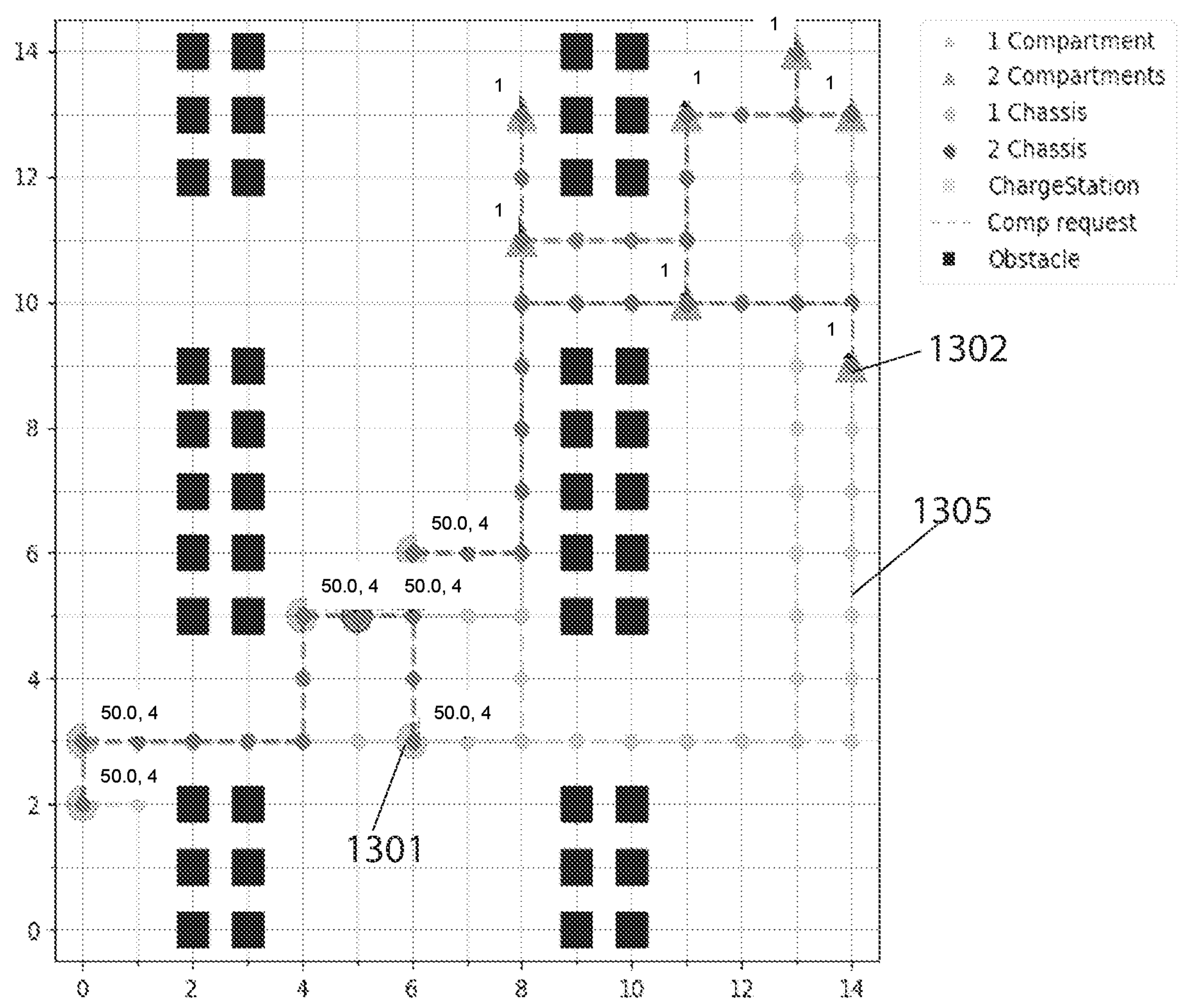

In some embodiments, the control system identifies if a pair of route segments (e.g., X→U, Y→V) match by computing an estimated cost of combined routing, and subtracting it from the cost of individual routing. The larger the difference, the more likely that the segments overlap. In some embodiments, the control system merges the route segments if the difference in combined routing and individual routing cost is greater than a predetermined threshold. In some embodiments, the estimated cost of combined routing is calculated as the minimum cost of four routing paths (e.g., X→Y→U→V; X→Y→V→U; Y→X→U→V; Y→X→V→U). FIGS. 283A and 283B illustrate an example of the implementation of the described method for matching route segments. FIG. 283A illustrates individual routes 1300 of seven robotic chassis 1301 from their current position to seven pods 1302 within environment 1303 with obstacles 1304 while FIG. 283B illustrates the updated routes 1305 to pods 1302 of robotic chassis 1301 including segments where robotic chassis are linked based on matching route segments identified using the approach described. In some embodiments, the control system identifies matching route segments of robotic chassis without pods and evaluates stacking those pods during navigation along matching route segments to minimize occupied space. In some embodiments, the control system uses a cost function to evaluate whether to stack robotic chassis. In some embodiments, the control system evaluates stacking idle robotic chassis without pods. In some embodiments, robotic chassis navigate to a stacking station to be stacked on top of one another. In some embodiments, the stacking station chosen is the stacking station that minimizes the total distance to be driven by all robotic chassis to reach the stacking station.

In some embodiments, the control system evaluates switching robotic chassis by transferring a pod from one robotic chassis to another during execution of a route as different robotic chassis may have different routing graphs, different nodes and edges (e.g., highways that may only be entered by certain robotic chassis), etc. that may result in reducing the overall route cost. In some embodiments, the control system evaluates switching robotic chassis during the route evolution step described above. For example, a first set of slower robotic chassis operate using routing graph G1=(V1, E1) and a second set of fast highway robotic chassis operate using routing graph G2=(V2, E2). In this example, at least the edge weights of G1 and G2 are different, otherwise there is no advantage in choosing a robotic chassis from either set of robotic chassis. Also, there is a subset N=V1∩V2 of nodes which are in both G1 and G2 and are accessible to both types of robotic chassis. These nodes serve as locations where pods can switch from one type of robotic chassis to the other. In FIG. 284, a slower robotic chassis from the first set of robotic chassis transports a pod from a location 1400 (X) to a location 1401 (U). During the route evolution step 1402, the control system identifies a close by faster robotic chassis from the second set of robotic chassis located at 1403 (Y) and a nearby transfer node 1404 (N1∈N). The control system evolves 1402 the route such that at 1404 (N1), the pod transfers from the slower robotic chassis to the faster robotic chassis. The faster robotic chassis drives the pod from 1404 (N1) to 1405 (N2∈N), then the pod transfers to another slower robotic chassis coming from a location 1406 (Z) that transports the pod to its final destination 1401 (U). In some embodiments, the pod is loaded and unloaded using mechanisms described above.

In some embodiments, the control system chooses two or more robotic chassis to complete a task during the first step of the time step structure described above wherein the control system checks, for running tasks, if corresponding pods are at their final destination, and if so, removes the tasks, and finds suitable robotic chassis for pods corresponding to new tasks, and adds the required actions to the suitable chassis action queues (e.g. drive to pod, load the pod, drive to final destination, and unload pod). In some embodiments, the control system uses other methods for choosing two or more chassis to completion of a task such as Multi-Modal Bellmann-Ford or Multi-Modal Dijkstra algorithms.

In some embodiments, the control system chooses the best robotic chassis for a task by evaluating a battery level of the robotic chassis, a required driving distance of the task, and a distance of the robotic chassis to the pickup location. In some embodiments, the control system assigns an idle chassis to a task by: determining a score for each robotic chassis in the environment having at least 50% battery power by calculating the distance of the robotic chassis to the pod; determining for each of the robotic chassis if their battery level is sufficient enough to complete the full task (e.g., driving the distance to the pod, then from the pod to the final destination), and, if so, subtracting three (or another reasonable number) from their score; and, choosing the robotic chassis with the lowest score. In this way, a closer robotic chassis scores better than a further robotic chassis, and a robotic chassis with enough charge to complete the task scores higher than a robotic chassis with not enough charge. In other embodiments, the control system evaluates other variables in determining the best robotic chassis for a task. In some embodiments, the control system chooses the best robotic chassis for a task during the first step and/or the route evolution step of the time step structure described above.

In some embodiments, the control system distributes robotic chassis throughout the environment based on, for example, demand within different areas of the environment. In some embodiments, wherein an abundance of robotic chassis exists, the control system positions a robotic chassis close to every pod, has excess robotic chassis that are fully charged distributed throughout the environment, and immediately transfers pods from low battery robotic chassis to fully charged robotic chassis. In some embodiments, the control system may distribute robotic chassis throughout the environment using the cost function $C(x, p)=\Sigma_{N_i} p_i \min d(N_i, x_i)$, wherein $N_i$ is a node in the routing graph, $p_i$ is the probability that a task will start from node $N_i$ at the next time frame, and $d(N_i, x_i)$ is the distance of the closest available robotic chassis from the node $N_i$, assuming there are n idle robotic chassis at positions $x_i$. The control system determines distribution of the robotic chassis by minimizing the cost function. For example, FIG. 285 illustrates results of minimizing the cost function to determine optimal distribution of seven idle robotic chassis within environment 1500. The color of the graph corresponds to the probability that a task will start from the particular node of the graph at the next time frame indicated by the colors on scale 1501. Darker dots 1502 represent initial position of idle robotic chassis and lighter dots 1503 represent their position after minimization of the cost function. After optimization, idle robotic chassis are closer to areas with nodes having a higher probability of a task starting.

In some embodiments, versatile mobile robotic chassis retreat to a designated parking area until requested for a particular function or task or after completing a particular function or task. For example, a mobile robotic chassis requested for pickup of persons (e.g., using an application of a communication device) autonomously traverses an environment from a parking area to a pickup location and transports the persons to a drop off location (e.g., specified using the application of the communication device). After completing the service, the mobile robotic chassis traverses the environment from the drop off location to the nearest parking area or to a designated parking area or to another requested pickup location. The mobile robotic chassis enters a parking area and autonomously parks in the parking area. In some embodiments, mobile robotic chassis autonomously park in a parking area using methods described in U.S. patent application Ser. Nos. 16/230,805, 16/578,549, and 16/411,771, the entire contents of which are hereby incorporated by reference. In some embodiments, mobile robotic chassis may autonomously park or navigate to a storage area within a building, a vehicle, or another place. For example, mobile robotic chassis may autonomously park or may be stored in a parking area within an airplane. The parking area may be multi-level and may be located on a bottom of the airplane, beneath the passenger seating area. This may allow passengers to bring their mode of transportation to another location or may allow for easy transportation of pods and chassis between different parts of the world.

Other examples of types of robots that may implement the methods and techniques described herein include a signal boosting robotic device, as described in U.S. patent application Ser. No. 16/243,524, a robotic towing device, as described in U.S. patent application Ser. No. 16/244,833, an autonomous refuse container, as described in U.S. patent application Ser. No. 16/129,757, a robotic hospital bed, as described in U.S. patent application Ser. No. 16/399,368, and a commercial robot, as described in U.S. patent application Ser. Nos. 14/997,801 and 16/726,471, the entire contents of which are hereby incorporated by reference. Further, the techniques and methods described in these different robotic devices may be used by the robot described herein.

The methods and techniques described herein may be implemented as a process, as a method, in an apparatus, in a system, in a device, in a computer readable medium (e.g., a computer readable medium storing computer readable instructions or computer program code that may be executed by a processor to effectuate robotic operations), or in a computer program product including a computer usable medium with computer readable program code embedded therein.

The foregoing descriptions of specific embodiments of the invention have been presented for purposes of illustration and description. They are not intended to be exhaustive or to limit the invention to the precise forms disclosed.

In block diagrams provided herein, illustrated components are depicted as discrete functional blocks, but embodiments are not limited to systems in which the functionality described herein is organized as illustrated. The functionality provided by each of the components may be provided by software or hardware modules that are differently organized than is presently depicted. For example, such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, the applicant has grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships (e.g., "in response to X, Y," "upon X, Y,", "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property (i.e., each does not necessarily mean each and every). Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus specially designed to carry out the stated functionality, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct (e.g., reference to "parallel" surfaces encompasses substantially parallel surfaces). The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. Negative inferences should not be taken from inconsistent use of "(s)" when qualifying items as possibly plural, and items without this designation may also be plural.

The invention claimed is:

1. A robot configured to perceive a model of an environment, comprising:

a chassis;

a set of wheels;

a plurality of sensors;

a processor, and memory storing instructions that when executed by the processor effectuates operations comprising:

capturing, with the plurality of sensors, a plurality of data while the robot moves within the environment, wherein:

the plurality of data comprises at least a first data and a second data captured by a first sensor of a first sensor type and a second sensor of a second sensor type, respectively;

the first sensor type is an imaging sensor;

the second senor type captures movement data;

an active source of illumination is positioned adjacent to the first sensor such that upon incidence of illumination light with an object in a path of the robot reflections of the illumination light fall within a field of view of the first sensor;

perceiving, with the processor, the model of the environment based on at least a portion of the plurality of data, the model being a top view of the environment;

storing, with the processor, the model of the environment in a memory accessible to the processor; and transmitting, with the processor, the model of the environment and a status of the robot to an application of a smartphone previously paired with the robot;

wherein:

the application is configured to display:

the model of the environment in the current work session or a subsequent work session; historical information relating to a previous work session comprising at least areas within which debris was detected, areas cleaned, and a total cleaning time; a robot status; a total area cleaned after completion of a work session; a battery level; a current cleaning duration; an estimated total cleaning duration required to complete a work session; an image of an object and an object type of the object; maintenance information; firmware information; and customer service information; and is configured to receive at least one user input designating a modification to a divider dividing at least a portion of the model of the environment; a deletion of a divider to merge at least two subareas within the model of the environment; an addition of a divider to divide an area within the model of the environment; a selection, an addition, or a modification of a label of a subarea within the model of the environment; an addition, a modification, or a deletion of a subarea within which the robot is not permitted to enter, scheduling information corresponding to different subareas; a number of coverage repetitions of a subarea or the environment by the robot during a work session; a vacuum power of the robot to use in a subarea or the environment; a vacuuming task to be performed within a subarea or the environment; a deletion or an addition of a robot paired with the application; an instruction to find the robot; an instruction for the docking station of the robot to empty a bin of the robot into a bin of the docking station; an instruction to dock at the docking station; and an instruction to navigate to a particular location to perform work;

the model of the environment is stored in the memory of the robot or on a cloud storage system and is accessible in a subsequent work session for use in autonomously navigating the environment; and the robot displays at least one status of the robot using a combination of LEDs disposed on the robot.

2. The robot of claim 1, wherein:

the robot further comprises at least two cleaning tools comprising at least a vacuum and a sweeper;

the robot cleans using at least one of the at leas two cleaning tools during a work session;

the robot transmits a message to the application, the cloud storage system, or a second robot upon completion of cleaning;

the message causes the second robot to start cleaning using at least a third cleaning tool complementary to the at least two cleaning tools of the robot, the at least third cleaning tool comprising at least a mop; and the second robot navigates the environment and performs work using at least one of a model of the environment perceived by a processor of the second robot or the model of the environment perceived by the processor of the robot.

3. The robot of claim 1, wherein the operations further comprise:

actuating, with the processor of the robot, the robot to avoid or perform work around an object encountered by the robot on a driving surface during a work session by adjusting a path of the robot;

capturing, with the image sensor of the robot, an image of the object encountered by the robot; and determining, with the processor of the robot, a processor on the cloud storage system, or an application of a smartphone previously paired with the robot, an object type of a detected object, wherein the object type comprises at least one of cords, garments, socks, shoes, feces, and earphones.

4. The robotic device of claim 3, wherein the operations further comprise:

generating, with the processor, a suggested personalized schedule for the robot to perform work based on user habits; and transmitting, with the processor, the suggested personalized schedule to the application for presenting to the user.

5. The robot of claim 4, wherein the operations further comprise:

learning, with the processor, user habits comprising days and times a user cleans different areas of the environment based on at least days and times previous work sessions were executed.

6. The robot of claim 4, wherein the operations further comprise:

identifying, with the processor, environmental characteristics of different areas within the environment based on sensor data captured by at least some of the plurality of sensors, wherein the environmental characteristics comprise at least a driving surface type comprising at least carpet and hard surface and debris accumulation;

associating, with the processor, the debris accumulation with areas of the environment in which debris accumulation is sensed; and wherein the application is configured to display the model of the environment and areas with debris accumulation within the model of the environment.

7. The robot of claim 6, wherein the operations further comprise:

generating, with the processor, a movement path of the robot;

actuating, with the processor, the robot to move along the movement path, wherein the at least one actuator is turned off when the robot traverses an area within which work by the robot is unrequired while driving to an area within which work is required.

8. The robot of claim 7, wherein the operations further comprise:

actuating, with the processor, the robot to clean an area upon detecting a level of debris accumulation within the area or upon a voice command from a user, wherein a coverage path or cleaning strategy of the robot is adjusted upon detecting the level of debris accumulation.

9. The robot of claim 8, further comprising:

actuating, with the processor, the robot to execute an instruction for the robot to clean an area in close proximity to a particular labelled object or a subarea of the environment, wherein the instruction is verbally received by a home assistant paired with the robot.

10. The robot of claim 9, wherein the operations further comprise:

actuating, with the processor, an adjustment to a speed of at least one actuator based on a type of driving surface determined using sensor data captured by at least one sensor of the plurality of sensors.

11. The robot of claim 10, wherein the operations further comprise:

actuating, with the processor, the robot to perform work based on a detected absence of a user.

12. The robot of claim 11, wherein the application or the processor of the robot divides the model of the environment into at least two subareas.

13. The robot of claim 12, wherein the first sensor of the first type and the illuminating light source are positioned in a plane substantially vertical to a driving surface of the robot.

14. The robot of claim 13, wherein the operations further comprise:

associating, with the processor, a previous work session with a date and a time work was performed and a model of the environment perceived during the work session.

15. The robot of claim 14, wherein the operations further comprise at least one of:

generating, with the processor, an alert for a user using LEDs disposed on the robot; and transmitting, with the processor, the alert to the application;

wherein:

the application is configured to display the alert to the user, and the alert indicates the robot or a component thereof is stuck, stalled, damaged or inoperable.

16. The robot of claim 15, wherein:

a system of the robot periodically downloads and updates a software or firmware of the robot to include new features, enhancements, and bug fixes or newly supported language packs; and the application indicates an availability of a new update and a status of a download or update as it occurs.

17. The robot of claim 1, wherein the robot further comprises:

a vacuuming assembly; and a mopping assembly comprising:

a fluid reservoir for storing a cleaning fluid;

a cloth for cleaning a driving surface; and a means to move at least the cloth upwards and downwards in relation to the driving surface to disengage and engage, respectively, at least the cloth, wherein:

the cloth is in contact with the driving surface when engaged and the cloth cannot make contact with the driving surface when disengaged; and the means to disengage and engage at least the cloth of the mopping assembly is controlled automatically based on sensory input provided by at least one of the plurality of sensors.

18. The robot of claim 17, wherein:

the robot further comprises a dust collection module for collecting dust;

the robot stores the collected dust within a bin that has a first mechanism for emptying the bin manually and at least a portion of a second mechanism for emptying the bin of the robot automatically to a second bin via an air path from the bin of the robot to the second bin;

the second bin is a part of a docking station of the robot; and the first mechanism removes the bin from all electrical parts of the robot.

19. The robot of claim 18, wherein the mopping assembly further comprises a pump to deliver water from the fluid reservoir to the driving surface.

20. The robot of claim 19, wherein the mopping assembly further comprises at least one nozzle for distributing the cleaning fluid from the fluid reservoir to the driving surface.

21. The robot of claim 20, wherein at least a portion of the mopping assembly is detached from the robot by releasing a latch.

22. The robot of claim 21, wherein the mopping assembly further comprises an electric motor for actuating movement of at least the cloth.

23. The robot of claim 22, wherein a predetermined quantity of the cleaning fluid is delivered from the fluid reservoir at predetermined intervals or continuously.

24. The robot of claim 22, wherein the mopping assembly further comprises flow reduction valves.

25. The robot of claim 22, wherein the operations further comprise:

determining, with the processor of the robot, a type of driving surface based on sensor data captured by at least one sensor of the plurality of sensors; and determining, with the processor of the robot, when to start or stop applying cleaning fluid to the driving surface based on the type of driving surface.

26. A method of perceiving a model of an environment, comprising:

capturing, with a plurality of sensors coupled to a robot, a plurality of data while the robot moves within the environment, wherein:

the plurality of data is captured from different positions within the environment through which the robot moves;

the plurality of sensors comprise at least a first sensor and a second sensor;

the first sensor is coupled with an active source of illumination positioned adjacent to the first sensor such that upon incidence of illumination light with an object in a path of the robot, reflections of the illumination light fall within a field of view of the first sensor, and the first sensor is a camera and the second sensor captures movement data;

perceiving, with a processor of the robot, a model of the environment based on at least a portion of the plurality of data, the model being a top view of the environment;

actuating, with the processor of the robot, the robot to avoid or perform work around an object encountered by the robot on a driving surface during a work session by adjusting a path of the robot;

capturing, with an image sensor of the robot, an image of the object encountered by the robot; determining, with the processor of the robot, a processor on a cloud storage system, or an application of a smartphone previously paired with the robot, an object type of a detected object, wherein the object type comprises at least one of cords, garments, socks, shoes, feces, and earphones;

storing, with the processor of the robot, the model of the environment in a memory accessible to the processor of the robot in a subsequent work session; and transmitting, with the processor of the robot, the model of the environment to the application of the smartphone;

wherein:

the application is configured to display:

the model of the environment autonomously divided into subareas; historical information relating to a previous work session comprising at least areas within which debris was detected, areas cleaned, and a total cleaning time; a robot status; a total area cleaned after completion of a work session; a battery level; a current cleaning duration; an estimated total cleaning duration required to complete a work session; an image of an object and an object type of the object; maintenance information; customer service information; and firmware information; and is configured to receive at least one user input designating a modification to a divider dividing at least a portion of the model of the environment; a deletion of a divider to merge at least two subareas within the model of the environment; an addition of a divider to divide an area within the model of the environment; a selection, an addition, or a modification of a label of a subarea within the model of the environment; an addition, a modification, or a deletion of a subarea within which the robot is not permitted to enter, scheduling information corresponding to different subareas; a number of coverage repetitions of a subarea or the environment by the robot during a work session; a vacuum power of the robot to use in a subarea or the environment; a vacuuming task to be performed within a subarea or the environment; a deletion or an addition of a robot paired with the application; an instruction to find the robot; an instruction for the docking station of the robot to empty a bin of the robot into a bin of the docking station; an instruction to dock at the docking station; and an instruction to navigate to a particular location to perform work; an intensity of cleaning; and a preference associated with content of a captured image; and the robot comprises a cleaning tool.

27. The method of claim 26, wherein:

the robot further comprises at least two cleaning tools comprising at least a vacuum and a sweeper;

the robot cleans using at least one of the at least two cleaning tools during a work session;

pairing the application with the robot comprises a one-time exchange of information between the application and the robot;

the robot further comprises a dust collection module for collecting dust;

the robot stores the collected dust within a bin that has a first mechanism for emptying the bin manually and at least a portion of a second mechanism for emptying the bin of the robot automatically to a second bin via an air path from the bin of the robot to the second bin;

the second bin is a part of a docking station of the robot; and the first mechanism removes the bin from all electrical parts of the robot.

28. The method of claim 27, wherein:

the robot transmits a message to the application, the cloud storage system, or a second robot upon completion of the cleaning;

the message causes the second robot to start cleaning using at least a third cleaning tool complementary to the at least two cleaning tools of the robot, the at least third cleaning tool comprising at least a mop; and the second robot navigates the environment and performs work using at least one of a model of the environment perceived by a processor of the second robot or the model of the environment perceived by the processor of the robot.

29. The robot of claim 26, wherein:

a system of the robot periodically downloads and updates a software or firmware of the robot to include new features, enhancements, and bug fixes or newly supported language packs; and the application indicates an availability of a new update and a status of a download or update as it occurs.

30. The method of claim 26, further comprising:

identifying, with the processor, environmental characteristics of different areas within the environment based on sensor data captured by at least some of the plurality of sensors, wherein the environmental characteristics comprise at least a driving surface type comprising at least carpet and hard surface and debris accumulation;

associating, with the processor, the debris accumulation with areas of the environment in which debris accumulation is sensed, wherein the application is configured to display the model of the environment and areas with debris accumulation within the model of the environment;

generating, with the processor, a suggested personalized schedule for the robot to perform work based on user habits; and transmitting, with the processor, the suggested personalized schedule to the application for presenting to the user.

31. The method of claim 30, further comprising:

learning, with the processor, user habits comprising days and times a user cleans different areas of the environment based on at least days and times previous work sessions were executed.

32. The method of claim 26, wherein:

the operations further comprise at least one of:

generating, with the processor, an alert for a user using LEDs disposed on the robot; and transmitting, with the processor, the alert to the application; and wherein:

the application is configured to display the alert to the user, and the alert indicates the robot or a component thereof is stuck, stalled, damaged or inoperable;

the application or the processor of the robot divides the model of the environment into at least two subareas; and the first sensor of the first type and the illuminating light source are positioned in a plane substantially vertical to a driving surface of the robot.

33. The method of claim 26, further comprising:

actuating, with the processor, an adjustment to a speed of at least one actuator based on a type of driving surface determined using sensor data captured by at least one sensor of the plurality of sensors;

associating, with the processor, a previous work session with a date and a time work was performed and a model of the environment perceived during the work session;

actuating, with the processor, the robot to execute an instruction for the robot to clean an area in close proximity to a particular labelled object or a subarea of the environment, wherein the instruction is verbally received by a home assistant paired with the robot;

actuating, with the processor of the robot, the robot to avoid or perform work around an object encountered by the robot on a driving surface during a work session by adjusting a path of the robot;

capturing, with the image sensor of the robot, an image of the object encountered by the robot; and determining, with the processor of the robot, a processor on the cloud storage system, or an application of a smartphone previously paired with the robot, an object type of a detected object, wherein the object type comprises at least one of cords, garments, socks, shoes, feces, and earphones.

34. The method of claim 26, further comprising:

generating, with the processor, a movement path of the robot;

actuating, with the processor, the robot to move along the movement path, wherein the at least one actuator is turned off when the robot traverses an area within which work by the robot is unrequired while driving to an area within which work is required; and actuating, with the processor, the robot to clean an area upon detecting a level of debris accumulation within the area or upon a voice command from a user, wherein a coverage path or cleaning strategy of the robot is adjusted upon detecting the level of debris accumulation.

35. The method of claim 26, wherein the robot further comprises:

a vacuuming assembly; and a mopping assembly comprising:

a fluid reservoir for storing a cleaning fluid;

a cloth for cleaning a driving surface; and a means to move at least the cloth upwards and downwards in relation to the driving surface to disengage and engage, respectively, at least the cloth, wherein:

the cloth is in contact with the driving surface when engaged and the cloth cannot make contact with the driving surface when disengaged; and
the means to disengage and engage at least the cloth of the mopping assembly is controlled automatically based on sensory input provided by at least one of the plurality of sensors.

36. The method of claim 35, wherein:
the mopping assembly further comprises a pump to deliver water from the fluid reservoir to the driving surface;
the mopping assembly further comprises an electric motor for actuating movement of at least the cloth;
the mopping assembly further comprises at least one nozzle distributes the cleaning fluid from the fluid reservoir to the driving surface; and
at least a portion of the mopping assembly is detached from the robot by releasing a latch.

37. The method of claim 35, wherein:
a predetermined quantity of the cleaning fluid is delivered from the fluid reservoir at predetermined intervals or continuously; and
the mopping assembly further comprises flow reduction valves.

38. The method of claim 35, further comprising:
determining, with the processor of the robot, a type of driving surface based on sensor data captured by at least one sensor of the plurality of sensors; and
determining, with the processor of the robot, when to start or stop applying cleaning fluid to the driving surface based on the type of driving surface.

39. A memory storing instructions that when executed by a processor of a robot effectuates operations comprising:
obtaining, with the processor of the robot, a plurality of data captured with a plurality of sensors coupled to the robot while the robot moves within the environment, wherein:
the plurality of data is captured from different positions within the environment through which the robot moves;
the plurality of sensors comprise at least a first sensor and a second sensor;
the first sensor is coupled with an active source of illumination positioned adjacent to the first sensor such that upon incidence of illumination light with an object in a path of the robot, reflections of the illumination light fall within a field of view of the first sensor, and
the first sensor is a camera and the second sensor captures movement data;
perceiving, with the processor of the robot, a model of the environment based on at least a portion of the plurality of data, the model being a top view of the environment;
actuating, with the processor of the robot, the robot to avoid or perform work around an object encountered by the robot on a driving surface during a work session by adjusting a path of the robot;
obtaining, with the processor of the robot, an image of the object encountered by the robot captured with an image sensor disposed on the robot, wherein:
the processor of the robot, a processor on a cloud storage system, or an application of a smartphone previously paired with the robot determine an object type of the object; and
the object type comprises at least one of cords, garments, socks, shoes, feces, and earphones;
storing, with the processor of the robot, the model of the environment in a memory accessible to the processor of the robot in a subsequent work session; and
transmitting, with the processor of the robot, the model of the environment to the application of the smartphone;
wherein:
the application is configured to display:
the model of the environment autonomously divided into subareas; historical information relating to a previous work session comprising at least areas within which debris was detected, areas cleaned, and a total cleaning time; a robot status; a total area cleaned after completion of a work session; a battery level; a current cleaning duration; an estimated total cleaning duration required to complete a work session; an image of an object and an object type of the object; maintenance information; customer service information; and firmware information; and is configured to
receive at least one user input designating a modification to a divider dividing at least a portion of the model of the environment; a deletion of a divider to merge at least two subareas within the model of the environment; an addition of a divider to divide an area within the model of the environment; a selection, an addition, or a modification of a label of a subarea within the model of the environment; an addition, a modification, or a deletion of a subarea within which the robot is not permitted to enter, scheduling information corresponding to different subareas; a number of coverage repetitions of a subarea or the environment by the robot during a work session; a vacuum power of the robot to use in a subarea or the environment; a vacuuming task to be performed within a subarea or the environment; a deletion or an addition of a robot paired with the application; an instruction to find the robot; an instruction for the docking station of the robot to empty a bin of the robot into a bin of the docking station; an instruction to dock at the docking station; and an instruction to navigate to a particular location to perform work; an intensity of cleaning; and a preference associated with content of a captured image; and
the robot comprises a cleaning tool.

40. The memory of claim 39, wherein:
the robot further comprises at least two cleaning tools comprising at least a vacuum and a sweeper;
the robot cleans using at least one of the at least two cleaning tools during a work session;
the application or the processor of the robot divides the model of the environment into at least two subareas;
the first sensor of the first type and the illuminating light source are positioned in a plane substantially vertical to a driving surface of the robot; and
pairing the application with the robot comprises a one-time exchange of information between the application and the robot.

41. The memory of claim 40, wherein:
the robot transmits a message to the application, the cloud storage system, or a second robot upon completion of the cleaning;
the message causes the second robot to start cleaning using at least a third cleaning tool complementary to the at least two cleaning tools of the robot, the at least third cleaning tool comprising at least a mop; and the second robot navigates the environment and performs work using at least one of a model of the environment perceived by a processor of the second robot or the model of the environment perceived by the processor of the robot.

42. The memory of claim 39, wherein the operations further comprise:

actuating, with the processor of the robot, the robot to avoid or perform work around an object encountered by the robot on a driving surface during a work session by adjusting a path of the robot;

capturing, with the image sensor of the robot, an image of the object encountered by the robot;

determining, with the processor of the robot, a processor on the cloud storage system, or an application of a smartphone previously paired with the robot, an object type of a detected object, wherein the object type comprises at least one of cords, garments, socks, shoes, feces, and earphones;

actuating, with the processor, the robot to perform work based on a detected absence of a user;

generating, with the processor, a movement path of the robot; and actuating, with the processor, the robot to move along the movement path, wherein the at least one actuator is turned off when the robot traverses an area within which work by the robot is unrequired while driving to an area within which work is required.

43. The memory of claim 39, wherein:

a system of the robot periodically downloads and updates a software or firmware of the robot to include new features, enhancements, and bug fixes or newly supported language packs; and the application indicates an availability of a new update and a status of a download or update as it occurs.

44. The memory of claim 39, wherein the operations further comprise:

actuating, with the processor, the robot to execute an instruction for the robot to clean an area in close proximity to a particular labelled object or a subarea of the environment, wherein the instruction is verbally received by a home assistant paired with the robot;

generating, with the processor, a suggested personalized schedule for the robot to perform work based on user habits; and transmitting, with the processor, the suggested personalized schedule to the application for presenting to the user.

45. The memory of claim 44, wherein the operations further comprise:

learning, with the processor, user habits comprising days and times a user cleans different areas of the environment based on at least days and times previous work sessions were executed.

46. The memory of claim 39, wherein the operations further comprise:

actuating, with the processor, an adjustment to a speed of at least one actuator based on a type of driving surface determined using sensor data captured by at least one sensor of the plurality of sensors;

identifying, with the processor, environmental characteristics of different areas within the environment based on sensor data captured by at least some of the plurality of sensors, wherein the environmental characteristics comprise at least a driving surface type comprising at least carpet and hard surface and debris accumulation;

associating, with the processor, the debris accumulation with areas of the environment in which debris accumulation is sensed; and wherein the application is configured to display the model of the environment and areas with debris accumulation within the model of the environment.

47. The memory of claim 39, wherein the operations further comprise:

actuating, with the processor, the robot to clean an area upon detecting a level of debris accumulation within the area or upon a voice command from a user, wherein a coverage path or cleaning strategy of the robot is adjusted upon detecting the level of debris accumulation;

associating, with the processor, a previous work session with a date and a time work was performed and a model of the environment perceived during the work session;

generating, with the processor, an alert for a user using LEDs disposed on the robot; and transmitting, with the processor, the alert to the application;

wherein:

the application is configured to display the alert to the user; and the alert indicates the robot or a component thereof is stuck, stalled, damaged or inoperable.

48. The memory of claim 39, wherein:

the robot further comprises a dust collection module for collecting dust;

the robot stores the collected dust within a bin that has a first mechanism for emptying the bin manually and at least a portion of a second mechanism for emptying the bin of the robot automatically to a second bin via an air path from the bin of the robot to the second bin;

the second bin is a part of a docking station of the robot;

the first mechanism removes the bin from all electrical parts of the robot; and the robot further comprises a mopping assembly comprising:

a fluid reservoir for storing a cleaning fluid;

a cloth for cleaning a driving surface;

a means to move at least the cloth upwards and downwards in relation to the driving surface to disengage and engage, respectively, at least the cloth, wherein:

the cloth is in contact with the driving surface when engaged and the cloth cannot make contact with the driving surface when disengaged; and the means to disengage and engage at least the cloth of the mopping assembly is controlled automatically based on sensory input provided by at least one of the plurality of sensors; and a pump to deliver water from the fluid reservoir to the driving surface; and at least one nozzle for distributing the cleaning fluid from the fluid reservoir to the driving surface; and a latch for releasing at least a portion of the mopping assembly from the robot.

49. The memory of claim 48, wherein:

a predetermined quantity of the cleaning fluid is delivered from the fluid reservoir at predetermined intervals or continuously;

the mopping assembly further comprises an electric motor for actuating movement of at least the cloth; and the mopping assembly further comprises flow reduction valves.

50. The memory of claim 48, wherein the operations further comprise:

determining, with the processor of the robot, a type of driving surface based on sensor data captured by at least one sensor of the plurality of sensors; and determining, with the processor of the robot, when to start or stop applying cleaning fluid to the driving surface based on the type of driving surface.

* * * * *